US011252003B2

(12) United States Patent
Qu et al.

(10) Patent No.: US 11,252,003 B2
(45) Date of Patent: Feb. 15, 2022

(54) SEQUENCE-BASED SIGNAL PROCESSING METHOD AND APPARATUS

(71) Applicant: HUAWEI TECHNOLOGIES CO., LTD., Guangdong (CN)

(72) Inventors: Bingyu Qu, Beijing (CN); Hao Sun, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 76 days.

(21) Appl. No.: 16/723,712

(22) Filed: Dec. 20, 2019

(65) Prior Publication Data

US 2020/0153669 A1 May 14, 2020

Related U.S. Application Data

(63) Continuation of application No. PCT/CN2018/108546, filed on Sep. 29, 2018.

(30) Foreign Application Priority Data

Sep. 29, 2017 (CN) ........................ 201710911459.0

(51) Int. Cl.
*H04L 27/26* (2006.01)
*H04L 5/00* (2006.01)

(52) U.S. Cl.
CPC ........ *H04L 27/2613* (2013.01); *H04L 5/0053* (2013.01); *H04L 27/2614* (2013.01)

(58) Field of Classification Search
CPC ............... H04L 27/2613; H04L 5/0052; H04L 27/2614
See application file for complete search history.

(56) References Cited

U.S. PATENT DOCUMENTS

2008/0240285 A1* 10/2008 Han .................. H04W 56/0015 375/295
2010/0285755 A1* 11/2010 Iwai .................... H04J 13/0062 455/68
2012/0177145 A1 7/2012 Han et al.

FOREIGN PATENT DOCUMENTS

CN 101174857 A 5/2008
CN 101330321 A 12/2008
(Continued)

OTHER PUBLICATIONS

Interdigital Inc: "Sequence design for 1-symbol short-PUCCH of up to 2 bits", 3GPP Draft; R1-1716478,Sep. 12, 2017 (Sep. 12, 2017),XP051330064,total 22 pages.
(Continued)

*Primary Examiner* — Duc C Ho
(74) *Attorney, Agent, or Firm* — Womble Bond Dickinson (US) LLP

(57) ABSTRACT

This application provides a sequence-based signal processing method and apparatus. A sequence meeting a requirement for sending a signal by using a physical uplink control channel (PUCCH) is determined. The sequence is a sequence $\{f_n\}$ including N elements, and $f_n$ is an element in the sequence $\{f_n\}$. The determined sequence $\{f_n\}$ is a sequence that meets a preset condition. Then the N elements in the sequence $\{f_n\}$ are respectively mapped to N subcarriers to generate and send a first signal. With the determined sequence, when the signal is sent by using the PUCCH, a low cross-correlation between sequences can be maintained, and a relatively small peak to average power ratio (PAPR) value and a relatively small and cubic metric (CM) value can be maintained. Therefore, a requirement in a communications application environment in which the signal is sent by using the PUCCH is met.

20 Claims, 5 Drawing Sheets

(56) References Cited

FOREIGN PATENT DOCUMENTS

| | | | |
|---|---|---|---|
| CN | 102246485 | A | 11/2011 |
| CN | 102362455 | A | 2/2012 |
| CN | 103312447 | A | 9/2013 |
| CN | 104468037 | A | 3/2015 |
| CN | 105072072 | A | 11/2015 |
| CN | 105119697 | A | 12/2015 |
| CN | 106803819 | A | 6/2017 |
| CN | 106817331 | A | 6/2017 |
| WO | 2013020565 | A1 | 2/2013 |

OTHER PUBLICATIONS

Huawei et al.,"Short PUCCH for up to 2 UCI bits",3GPP TSG RAN WG1 NR Ad-Hoc Meeting R1-1709958 ,Qingdao, China, Jun. 27-30, 2017,total 9 pages.

Huawei et al: "Short PUCCH for UCI of up to 2 bits",3GPP Draft; R1-1717066,Oct. 8, 2017 (Oct. 8, 2017), XP051340257,total 14 pages.

Wang Qiyi et al, Theory and Technology of Public Control, Machinery Industry Press, 1996, 1 Page (abstract).

* cited by examiner

SEQUENCE-BASED SIGNAL PROCESSING METHOD AND APPARATUS

CROSS-REFERENCE TO RELATED APPLICATIONS

This application is a continuation of International Application No. PCT/CN2018/108546, filed on Sep. 29, 2018, which claims priority to Chinese Patent Application No. 201710911459.0, filed on Sep. 29, 2017. The disclosures of the aforementioned applications are herein incorporated by reference in their entireties.

TECHNICAL FIELD

This application relates to the field of communications technologies, and in particular, to a sequence-based signal processing method and apparatus.

BACKGROUND

In a long term evolution (LTE) system, a physical uplink control channel (PUCCH) occupies 13 or 14 orthogonal frequency division multiplexing (OFDM) symbols or discrete Fourier transform spread orthogonal frequency division multiplexing (DFT-s-OFDM) symbols in one subframe for sending uplink control information (UCI). 1-bit or 2-bit response information is transmitted by using a PCUUH format 1a/1b, which is sent through sequence modulation. Usually, in the LTE system, to avoid interference between PUCCHs of two neighboring cells, sequences selected for the two neighboring cells need to have a low cross-correlation. To extend coverage of the PUCCH, it is necessary to ensure that all sent signals have relatively small peak to average power ratio (PAPR) values and cubic metric (CM) values.

Currently, in the LTE system, there are currently 30 root sequences $x_i$, i=0, 1, . . . , N−1 whose lengths are N. The root sequences are used to send UCI or a demodulation reference signal (DMRS) by using the PUCCH format 1a/1b in the LTE system. However, at the design beginning of the 30 root sequences whose lengths are N in the LTE system, optimization of a CM value and optimization of a sequence cross-correlation are mainly considered. For a relationship between a CM value and a PAPR value, a PAPR may not be small if the CM value is small. Therefore, when it is ensured that all the 30 root sequences whose lengths are N have relatively small CM values and a low cross-correlation, it cannot be ensured that PAPR values are also small. In the 3GPP proposal R1-1716478, some 12PSK, 16PSK, 64PSK low-PAPR signals used in a 5G system are proposed. Assuming ideal time synchronization, these signals have relatively good cross-correlation characteristics. However, when a time deviation is considered between signals arriving at a base station, signals with a time deviation have a relatively high cross-correlation. Therefore, more low-PAPR sequences need to be considered, so that some sequences with both relatively small PAPRs and relatively good cross-correlation characteristics can be selected from the low-PAPR sequences.

SUMMARY

In view of this, embodiments of this application provide a sequence-based signal processing method, a signal processing apparatus, and a communications system, to resolve a prior-art problem that 30 existing root sequences cannot meet a requirement in a current communication application environment in which a signal is sent by using a PUCCH.

A first aspect of the embodiments of this application provides a sequence-based signal processing method, including: determining a sequence $\{f_n\}$ including N elements, where $f_n$ is an element in the sequence $\{f_n\}$, the sequence $\{f_n\}$ is a sequence that meets a preset condition, the preset condition is $f_n=A\cdot x_n\cdot e^{2\pi\cdot j\cdot a\cdot n}$, a value of n ranges from 0 to N−1, A is a non-zero complex number, a is a real number, $j=\sqrt{-1}$, for an element $x_n$, $x_n=u\cdot e^{2\pi\cdot j\cdot s_n/M}$, M=12, u is a non-zero complex number, a set that consists of a sequence $\{s_n\}$ consisting of an element $s_n$ includes at least one of sequences in a first sequence set or at least one of equivalent sequences of the sequences in the first sequence set, and herein, for the sequence in the first sequence set, refer to descriptions in the specification; and mapping the sequence $\{f_n\}$ to N subcarriers to generate and send a first signal.

In the foregoing solution, with the determined sequence, when a signal is sent by using a PUCCH, a low cross-correlation between sequences can be maintained, and a relatively small PAPR value and a relatively small CM value can be maintained. Therefore, a requirement in a communications application environment in which the signal is sent by using the PUCCH is met.

In one embodiment, the mapping the sequence $\{f_n\}$ to N subcarriers includes: respectively mapping the N elements in the sequence $\{f_n\}$ to N consecutive subcarriers; or respectively mapping the N elements in the sequence $\{f_n\}$ to N equally spaced subcarriers.

In one embodiment, the first signal is a reference signal, or the first signal is a signal used to carry communication information.

In one embodiment, the set that consists of the sequence $\{s_n\}$ consisting of the element $s_n$ includes at least two sequences in a second sequence set or equivalent sequences of two sequences in the second sequence set. Herein, for a sequence in the second sequence set, refer to descriptions in the specification.

In one embodiment, the equivalent sequence is $\{q_n\}$, for $q_n$ in the equivalent sequence $\{q_n\}$, $q_n=s_n+u_n \pmod M$, and for $u_n$ in a sequence $\{u_n\}$ consisting of $u_n$, $u_n=f+g\cdot n \pmod M$, where $f\in\{0, 1, 2, \ldots, M-1\}$, $g\in\{0, 1, 2, \ldots, M-1\}$, and M=12.

A second aspect of the embodiments of this application provides a sequence-based signal processing method. The signal processing method includes: receiving a first signal carried on N subcarriers, and obtaining N elements in a sequence $\{f_n\}$, where the first signal is generated by mapping the sequence $\{f_n\}$ to the N subcarriers, $f_n$ is an element in the sequence $\{f_n\}$, the sequence $\{f_n\}$ is a sequence that meets a preset condition, the preset condition is $f_n=A\cdot x_n\cdot e^{2\pi\cdot j\cdot a\cdot n}$, a value of n ranges from 0 to N−1, A is a non-zero complex number, a is a real number, for an element $x_n$, $x_n=u\cdot e^{2\pi\cdot j\cdot s_n/M}$, M=12, u is a non-zero complex number, a set that consists of a sequence $\{s_n\}$ consisting of an element $s_n$ includes at least one of sequences in a first sequence set or at least one of equivalent sequences of the sequences in the first sequence set, and herein, for the sequence in the first sequence set, refer to descriptions in the specification; and processing the first signal based on the N elements in the sequence $\{f_n\}$.

In the foregoing solution, with the determined sequence, when a signal is sent by using a PUCCH, a low cross-correlation between sequences can be maintained, and a relatively small PAPR value and a relatively small CM value can be maintained. Therefore, a requirement in a communications application environment in which the signal is sent by using the PUCCH is met.

In one embodiment, the receiving a first signal carried on N subcarriers includes: obtaining the first signal on the N subcarriers on N consecutive subcarriers; or obtaining the first signal on the N subcarriers on N equally spaced subcarriers.

In one embodiment, the first signal is a reference signal, or the first signal is a signal used to carry communication information.

In one embodiment, the set that consists of the sequence $s_n$ consisting of the element $\{s_n\}$ includes at least two sequences in a second sequence set or equivalent sequences of two sequences in the second sequence set. Herein, for a sequence in the second sequence set, refer to descriptions in the specification.

In one embodiment, the equivalent sequence is $\{q_n\}$, for $q_n$ in the equivalent sequence $\{q_n\}$, $q_n = s_n + u_n \pmod M$, and for $u_n$ in a sequence $\{u_n\}$ consisting of $u_n$, $u_n = f + g \cdot n \pmod M$, where $f \in \{0, 1, 2, \ldots, M-1\}$ and $g \in \{0, 1, 2, \ldots, M-1\}$.

A third aspect of the embodiments of this application provides a signal processing apparatus. The signal processing apparatus may be a communications device, or may be a chip in the communications device. The communications device or the chip has a function of implementing the sequence-based signal processing method according to any one of the first aspect and the embodiments of the first aspect. The function may be implemented by using hardware, or may be implemented by hardware by executing corresponding software. The hardware or the software includes one or more units corresponding to the foregoing functions.

The communications device includes a processing unit and a transceiver unit. The processing unit may be a processor, the transceiver unit may be a transceiver, and the transceiver includes a radio frequency circuit. In one embodiment, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device performs the sequence-based signal processing method according to any one of the first aspect and the embodiments of the first aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip performs the sequence-based signal processing method according to any one of the first aspect and the embodiments of the first aspect. In one embodiment, the storage unit may be a storage unit (for example, a register or a cache) in the chip, or the storage unit may be a storage unit (for example, a read-only memory (ROM)) that is in the communications device and that is outside the chip, another type of static storage device (for example, a random access memory (RAM)) that may store static information and an instruction, or the like.

The processor mentioned in the third aspect may be a central processing unit (CPU), a microprocessor, or an application-specific integrated circuit (ASIC), or may be one or more integrated circuits configured to control program execution of the sequence-based signal processing method according to any one of the first aspect and the embodiments of the first aspect.

A fourth aspect of the embodiments of this application provides a signal processing apparatus. The signal processing apparatus may be a communications device, or may be a chip in the communications device. The communications device or the chip has a function of implementing the sequence-based signal processing method according to any one of the second aspect and the embodiments of the second aspect. The function may be implemented by using hardware, or may be implemented by hardware by executing corresponding software. The hardware or the software includes one or more units corresponding to the foregoing functions.

The communications device includes a processing unit and a transceiver unit. The processing unit may be a processor, the transceiver unit may be a transceiver, and the transceiver includes a radio frequency circuit. In one embodiment, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device performs the sequence-based signal processing method according to any one of the second aspect and the embodiments of the second aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip performs the sequence-based signal processing method according to any one of the second aspect and the embodiments of the second aspect. In one embodiment, the storage unit may be a storage unit (for example, a register or a cache) in the chip, or the storage unit may be a storage unit (for example, ROM) that is in the communications device and that is outside the chip, another type of static storage device (for example, RAM) that may store static information and an instruction, or the like.

The processor mentioned in the fourth aspect may be a CPU, a microprocessor, or an ASIC, or may be one or more integrated circuits configured to control program execution of the sequence-based signal processing method according to any one of the second aspect and the embodiments of the second aspect.

A fifth aspect of the embodiments of this application provides a communications system. The communications system includes the communications device provided in the third aspect of the embodiments of this application and the communications device provided in the fourth aspect of the embodiments of this application.

A sixth aspect of the embodiments of this application provides a computer readable storage medium, configured to store a computer instruction. When the computer instruction is run on a computer, the computer is enabled to perform the sequence-based signal processing method according to the first aspect or the second aspect of the embodiments of this application.

A seventh aspect of the embodiments of this application provides a computer program product including an instruction. When the computer program product is run on a computer, the computer is enabled to perform the sequence-based signal processing method according to the first aspect or the second aspect of the embodiments of this application.

According to the sequence-based signal processing method, the sequence-based signal processing apparatus, the communications system, the computer readable storage medium, and the computer program product disclosed in the embodiments of this application, a sequence meeting a requirement for sending a signal by using a PUCCH is determined, the sequence is the sequence $\{f_n\}$ including the N elements, $f_n$ is an element in the sequence $\{f_n\}$, and the determined sequence $\{f_n\}$ is a sequence that meets the preset condition. Then the sequence $\{f_n\}$ is mapped to the N subcarriers to generate and send the first signal. With the determined sequence, when the signal is sent by using the PUCCH, a low cross-correlation between sequences can be maintained, and a relatively small PAPR value and a relatively small CM value can be maintained. Therefore, the requirement in the communications application environment in which the signal is sent by using the PUCCH is met.

DESCRIPTION OF EMBODIMENTS

Figure 1:
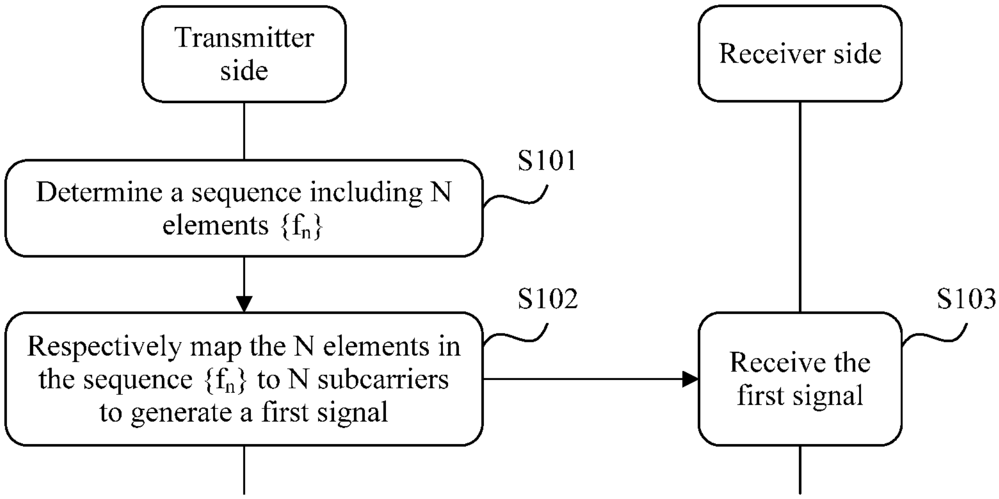
FIG. 1 is a schematic flowchart of sequence-based signal sending processing according to an embodiment of this application.

Embodiments of this application provide a sequence-based signal processing method, a related device, and a communications system. A sequence meeting a requirement for sending a signal by using a PUCCH is determined. In this way, when the signal is sent by using the PUCCH, a low cross-correlation between sequences can be maintained, and a relatively small PAPR value and a relatively small CM value can be maintained. Therefore, a requirement in a communications application environment in which the signal is sent by using the PUCCH is met.

In the embodiments, claims, and accompanying drawings of this application, the terms "first", "second", and the like are intended to distinguish between different objects but do not indicate a particular order. In addition, the terms "include" and "have" are not exclusive. For example, a process, a method, a system, a product, or a device including a series of operations or units is not limited to the listed operations or units, and may further include operations or units that are not listed.

Currently, in an LTE system, a 4G system, a 4.5G system, and a 5G system, a PUCCH can be used to send UCI and a DMRS. To improve coverage performance of the PUCCH, the PUCCH is sent through sequence modulation. To be specific, on all OFDM symbols for transmitting UCI, a to-be-sent signal is modulated onto a computer generated sequence (CGS). CGSs are filtered, to ensure that each sent signal has a relatively small PAPR value and a relatively small CM value, thereby extending coverage of the PUCCH. The PUCCH is also used on a cell border. Therefore, for a user on the cell border, a cross-correlation between sequences needs to be further considered when the CGSs are filtered.

For example, a first cell and a second cell are mutually neighboring cells. If a cross-correlation between a first sequence used by the first cell and a second sequence used by the second cell is relatively high, interference from a PUCCH sent by user equipment in the first cell may be caused, on a border of the first cell, to a base station of the second cell when the base station sends a signal using a PUCCH. Consequently, receiving performance of the PUCCH deteriorates. Therefore, sequences with a low cross-correlation need to be determined when the CGSs are filtered.

To ensure that a relatively small PAPR value and a relatively small CM value can be maintained and a low cross-correlation between sequences can be maintained when UCI and a DMRS are sent by using the PUCCH in the LTE system, the 4G system, the 4.5G system, and the 5G system, or even another communications system or communications application environment that has a higher requirement, the embodiments of this application provide a specific implementation process of sequence-based signal processing. The process is described in detail in the following embodiments.

In the embodiments of this application, sequence-based signal processing is described mainly from a receiver side and a transmitter side in a communications system or a communications application environment. The receiver side may be a network device, and the transmitter side may be a terminal device; or the receiver side may be a terminal device, and the transmitter side may be a network side. In the following embodiments, descriptions are provided by using an example in which the receiver side is a network device and the transmitter side is a terminal device, but the present invention is not limited thereto.

The terminal device used in the embodiments of this application may be user equipment. The user equipment may be a wired device, or may be a wireless device. The wireless device may be a handheld device having a wireless connection function, or another processing device connected to a wireless modem, or a mobile terminal that communicates with one or more core networks by using a radio access network. For example, the wireless terminal may be a mobile telephone, a mobile phone, a computer, a tablet computer, a personal digital assistant (PDA), a mobile internet device (MID), a wearable device, an electronic reader, or the like. For another example, the wireless terminal may alternatively be a portable, pocket-sized, handheld, computer built-in, or in-vehicle mobile device. For still another example, the wireless terminal may be a mobile station or an access point.

The network device used in the embodiments of this application may be a base station. The base station may include a macro base station, a micro base station, a relay node, an access point, a base station controller, a sending point, a receiving point, and the like in various forms. In systems in which different radio access technologies are used, specific names of the base station may be different.

FIG. 1 is a schematic flowchart of a sequence-based signal processing method according to an embodiment of this application. The method includes the following operations.

In operation S101, a terminal device determines a sequence $\{f_n\}$ including N elements, where N is a positive integer greater than 1, for example, N=12.

In one embodiment, operation S101 may be performed as follows: After accessing a network, the terminal device determines the sequence $\{f_n\}$ including the N elements. Alternatively, when the terminal device accesses a network, a network device determines a sequence $\{x_n\}$ and configures the sequence $\{x_n\}$ for the terminal device, and the terminal device determines, based on the sequence $\{x_n\}$, the sequence $\{f_n\}$ including the N elements.

In specific implementation, $f_n$ is an element in the sequence $\{f_n\}$, and the determined sequence $\{f_n\}$ is a sequence that meets a preset condition. The preset condition is $f_n=A\cdot x_n\cdot e^{2\pi\cdot j\cdot a\cdot n}$. Herein, n is an integer, a value of n ranges from 0 to N−1, A is a non-zero complex number, a is a real number, $j=\sqrt{-1}$, for an element $x_n$, $x_n=u\cdot e^{2\pi\cdot j\cdot s_n/M}$, M=12, and u is a non-zero complex number.

A set that includes a sequence $\{s_n\}$ including an element $s_n$ includes at least one of sequences in a first sequence set or at least one of equivalent sequences of the sequences in the first sequence set. In one embodiment, the first sequence set does not include a sequence $\{s_n\}$ corresponding to an existing low-PAPR sequence.

A length of a sequence in the first sequence set is 12, and the sequences in the first sequence set include some or all of the following 288 sequences (which are marked as a set 1). PAPRs of sequences corresponding to these sequences and equivalent sequences of these sequences are all less than 2.0 dB, and a largest value of a cross-correlation with an LTE sequence whose length is 12 is less than 0.79647. The 288 sequences are as follows:

{−2, 4, −2, 4, 0, 2, 2, 0, 5, 5, 0, 0}; {, −1, 6, 1, −4, −2, 4, −5, −5, 6, −5, 0, 0}; {3, −3, 3, −3, 0, −2, −2, 0, −5, −5, 0, 0}; {2, −4, 2, −4, −1, −2, −2, −1, −5, 6, 0, 0}; {, −4, 2, −4, 3, −1, 1, 2, 1, 4, 5, 0, 0}; {0, 6, 0, −5, −2, −4, −3, −1, 6, 6, 0, 0}; {0, 6, 0, −5, −2, −3, −3, −1, 6, 6, 0, 0}; {, −1, 5, −1, 6, −2, −3, −3, −1, 5, 5, 0, 0}; {, −4, 2, −4, 4, −4, −5, −4, −2, 5, 5, 0, 0}; {, −5, 1, −5, 3, −5, 6, −5, −3, 5, 5, 0, 0}; {4, −2, 4, 0, −4, −1, 0, −1, 3, 4, 0, 0}; {0, 4, −4, 2, −3, −2, −3, 4, 1, −2, 0, 0}; {, −1, 3, −5, 1, −4, −3, −3, 4, 1, −2, 0, 0}; {0, 5, −2, 5, 2, 4, 3, 1, −3, −4, 0, 0}; {, −3, 1, 5, −1, −5, −4, −5, 3, 0, −3, 0, 0}; {3, −3, 3, −1, 0, 6, −3, −3, −5, −4, 0, 0}; {1, 6, −1, 6, 6, 0, 2, 0, −3, −1, 0, 0}; {5, −2, 3, −2, 0, −1, 0, 0, −5, 6, 0, 0}; {, −3, 3, −3, 5, −4, −4, −4, −2, 5, 5, 0, 0}; {, −3, 0, 3, −3, 3, 1, 3, −5, 4, 1, 0, 0}; {, −1, 4, −3, 5, 4, −2, 1, 0, −3, −2, 0, 0}; {3, −1, −5, −5, 1, −4, 0, 1, 4, −1, 0, 0}; {2, −2, 6, 6, 1, −5, 0, 1, 4, −1, 0, 0}; {0, −5, 2, 2, −5, 1, 4, 4, 6, 1, 0, 0}; {1, −3, 5, 6, 0, −5, −1, 1, 3, −1, 0, 0}; {, −3, 4, −1, −1, 5, −1, 3, 4, 5, 0, 0, 0}; {, −5, 1, −5, 6, −1, 4, −5, −5, −5, 1, 0, 0}; {, −2, 5, 0, 0, 6, 0, 3, 4, 5, 0, 0, 0}; {, −5, 1, −5, 6, −1, 5, −5, 6, −5, 1, 0, 0}; {3, −3, 3, 3, −4, 2, 5, 5, 6, 0, 0, 0}; {, −3, 3, −3, −3, 4, −2, −5, −5, 6, 0, 0, 0}; {4, −3, 2, 2, −4, 1, −2, −3, −5, 0, 0, 0}; {5, −1, 5, 6, 1, −5, 5, 6, 5, −1, 0, 0}; {5, −1, 5, 6, 1, −4, 5, 5, 5, −1, 0, 0}; {3, −4, 1, 1, −5, 1, −3, −4, −5, 0, 0, 0}; {, −1, 3, −5, 6, 0, 5, 1, −1, −3, 1, 0, 0}; {0, 5, −2, −2, 5, −1, −4, −4, 6, −1, 0, 0}; {, −2, 2, 6, 6, −1, 5, 0, −1, −4, 1, 0, 0}; {, −2, 2, 6, 6, 0, 5, 1, −1, −3, 1, 0, 0}; {, −3, 1, 5, 5, −1, 4, 0, −2, −4, 1, 0, 0}; {, −3, 1, 5, 5, −1, 4, 0, −1, −4, 1, 0, 0}; {, −2, 3, −4, −3, 4, −2, −5, −5, 6, −1, 0, 0}; {3, 0, −3, 3, −3, −1, −3, 5, −4, −1, 0, 0}; {4, −2, 4, −4, 4, 5, 4, 2, −5, −5, 0, 0}; {, −5, 2, −3, 2, 0, 1, 0, 0, 5, 6, 0, 0}; {, −1, 5, −1, 3, 5, 1, 1, 6, 5, −1, 0, 0}; {0, −5, 2, −5, −2, −4, −3, −1, 3, 4, 0, 0}; {4, −2, 4, −3, 6, 6, 4, 3, −5, −5, 0, 0}; {2, −4, 2, −5, 4, 5, 3, 2, −5, −5, 0, 0}; {, −3, 3, −3, 2, 0, −5, 4, 3, −1, 0, 0, 0}; {0, 6, 0, 5, 3, 4, 3, 1, 6, 6, 0, 0}; {6, 0, 6, −1, 2, 0, −1, 0, −4, −5, 0, 0}; {, −4, 4, 1, −4, −4, 0, 4, 0, 3, −1, 0, 0}; {, −1, 5, 0, 5, 3, 3, 2, 1, 6, −5, 0, 0}; {, −3, 2, −4, 0, −2, −4, −5, 4, −4, −4, 0, 0}; {, −1, 6, 2, −4, −2, −3, 4, −5, −1, 2, 0, 0}; {5, −2, 4, −3, 5, 6, 5, 3, −5, −5, 0, 0}; {, −1, 5, 0, 6, −3, −4, −4, −2, 6, 6, 0, 0}; {, −5, 1, −4, 3, −5, 6, −5, −3, 5, 5, 0, 0}; {5, −3, 2, −5, −3, 6, 3, −4, 6, 0, 0, 0}; {3, −5, 0, 5, −4, 5, 2, −5, 5, 0, 0, 0}; {0, 5, −1, 5, 5, −2, −2, 2, 2, 2, 0, 0}; {, −5, 0, 6, 0, 2, 0, 0, 1, −4, −5, 0, 0}; {, −4, 1, −5, 3, −5, 6, −4, −3, 5, 5, 0, 0}; {, −3, 1, 6, 1, −5, −4, −4, 3, 1, −2, 0, 0}; {6, −3, 1, −5, 1, 0, 1, 6, 3, 0, 0, 0}; {, −5, −1, 4, 0, 3, −3, −4, 2, 0, −2, 0, 0}; {5, 0, −4, −4, 2, −3, 1, 2, 4, −1, 0, 0}; {3, −2, 6, 6, 1, −4, 0, 1, 4, −1, 0, 0}; {, −1, 5, 0, 0, 5, 0, 4, 4, 5, 0, 0, 0}; {5, −1, 6, 6, −1, −2, 4, 6, 2, 0, 0, 0}; {, −1, 5, 0, 0, 6, 0, 3, 4, 5, 0, 0, 0}; {, −1, 4, −2, −2, 4, −1, −4, −4, 6, −1, 0, 0}; {, −5, −1, 4, 3, −3, 3, −1, −2, −4, 0, 0, 0}; {, −3, 1, 6, 5, −1, 4, 0, −2, −3, 1, 0, 0}; {, −2, 3, −3, −3, 4, −2, −5, −5, 6, −1, 0, 0}; {, −5, −1, 4, 3, −2, 3, −1, −2, −4, 0, 0, 0}; {, −4, 1, −5, −5, 3, −3, 6, 6, 6, −1, 0, 0}; {6, −2, 3, 2, −3, 2, −1, −3, −4, 0, 0, 0}; {3, 6, −2, −3, 3, −5, 3, 1, −2, 2, 0, 0}; {, −5, −1, 4, 4, −3, 3, −1, −2, −4, 1, 0, 0}; {6, −2, 3, 3, −3, 3, −1, −2, −4, 0, 0, 0}; {5, −3, 2, 2, −4, 2, −2, −3, −5, 0, 0, 0}; {5, 1, −2, 4, −2, 0, −3, 6, −4, −1, 0, 0}; {3, −2, 6, −1, 4, 5, 1, −2, −2, 0, 0, 0}; {5, −1, −5, −1, 1, 3, −3, 3, 3, 1, 0, 0}; {4, 1, 0, −5, 1, 6, 2, 2, 5, −3, 0, 0}; {3, −1, −3, 3, −3, −1, 6, −4, −5, −1, 0, 0}; {1, −3, −5, 1, −5, −2, 6, −5, 6, −3, 0, 0}; {2, −5, 2, −5, 4, 5, 3, 2, −5, −5, 0, 0}; {, −1, 3, −3, 1, 0, 4, 1, −5, 6, 2, 0, 0}; {, −2, 2, −4, 0, −1, 3, 1, 6, 5, 3, 0, 0}; {5, −1, −5, 2, −5, −1, 3, 5, 4, 4, 0, 0}; {5, −1, −5, 2, −5, −1, 3, 6, 5, 4, 0, 0}; {0, 4, −2, 3, 6, 4, 0, 6, 4, 0, 0, 0}; {, −3, 3, −1, 6, −5, −2, −4, −2, 3, 3, 0, 0}; {, −4, −1, 4, −3, −1, −5, 3, −4, 5, 0, 0, 0}; {, −5, −2, 3, −4, −2, −5, 4, −4, 6, 0, 0, 0}; {0, 4, −2, 4, −2, −3, −1, −1, 4, 3, 0, 0}; {6, −3, 2, −5, 4, −5, −5, −3, 6, 3, 0, 0}; {6, −2, 4, −2, −4, 1, 0, 4, 4, 2, 0, 0}; {6, −2, 4, −2, −3, 2, 1, 5, 4, 2, 0, 0}; {4, −3, 4, 0, 0, 6, −5, −1, 1, −1, 0, 0}; {, −1, 2, −5, 1, 0, 4, 3, 6, 5, 3, 0, 0}; {3, 5, −3, 2, 3, −1, 6, −1, −5, 1, 0, 0}; {, −2, 1, 6, 0, −5, −4, −2, −2, 4, 2, 0, 0}; {, −3, 2, −3, 6, −3, 3, 4, −1, −2, −3, 0, 0}; {1, 3, −5, 1, 2, −3, 4, −3, 5, 0, 0, 0}; {0, 2, 6, 0, 1, −3, 4, −3, 5, 0, 0, 0}; {, −3, −1, 3, −2, 6, −2, −5, −3, −5, 5, 0, 0}; {0, 3, −4, −5, 1, 6, 1, 0, −3, 1, 0, 0}; {, −4, 3, 0, 4, −4, −3, 4, 0, 0, −1, 0, 0}; {, −4, 4, 2, −5, 0, 3, −2, −5, −2, 0, 0, 0}; {, −5, 3, 1, 6, −1, 2, −2, −5, −2, 0, 0, 0}; {5, 1, 0, 5, −2, 2, −3, 6, −2, 0, 0, 0}; {, −4, 4, 3, −3, 3, −5, 4, 5, 5, −4, 0, 0}; {4, −1, −3, 3, −3, −1, −5, −4, 6, −2, 0, 0}; {, −1, 5, 2, −4, −4, 1, 5, −1, 1, 0, 0, 0}; {, −3, 3, 0, 6, −5, −1, −5, −2, 3, 2, 0, 0}; {2, 6, 1, 6, 6, −1, −2, 4, 3, 1, 0, 0}; {, −1, 2, −4, 0, 0, 4, 2, −5, 5, 2, 0, 0}; {, −2, 4, 1, −4, 3, −5, −1, 4, 4, 3, 0, 0}; {, −5, −1, 6, −1, −3, 1, 2, −5, 4, 2, 0, 0}; {4, −4, 3, −4, −5, 0, −1, 4, 4, 1, 0, 0}; {4, −4, 3, −4, −5, 0, −1, 4, 4, 2, 0, 0}; {2, 5, −1, 3, 1, 5, 3, −4, 6, 3, 0, 0}; {1, 4, −2, 3, 1, 5, 3, −5, 6, 3, 0, 0}; {3, −4, 4, −1, −1, 5, 6, −1, 1, −1, 0, 0}; {, −2, 1, −5, 0, −1, 3, 2, 6, 5, 3, 0, 0}; {, −2, 4, 1, −3, 3, −5, 0, 3, 3, 3, 0, 0}; {6, −2, 5, −1, 5, 5, −4, −4, 5, 5, 0, 0}; {5, −3, 4, −2, 5, 5, −5, −4, 5, 5, 0, 0}; {5, −2, 6, 1, 0, 6, −5, 0, 2, 0, 0, 0}; {1, 4, −2, 3, 0, 4, 4, −4, 6, 3, 0, 0}; {0, 2, −5, 0, 1, −3, 4, −3, 5, 0, 0, 0}; {, −2, 0, 5, −2, 0, −4, 4, −3, 6, 0, 0, 0}; {5, −5, 0, 6, 3, −5, 5, −4, 6, 5, 0, 0}; {, −5, −2, 4, −1, 5, −4, −5, 3, 0, −2, 0, 0}; {, −3, −1, 4, 2, 4, −1, 6, 1, 0, 4, 0, 0}; {5, −5, 1, −1, 2, −3, 4, −1,

−1, 3, 0, 0}; {, −2, −5, −4, 2, −3, 2, 0, 2, 3, −5, 0, 0}; {0, −5, 6, −1, 3, 6, 1, −3, −1, −1, 0, 0}; {5, 0, −1, 5, 5, −3, 3, −2, 1, 0, 0, 0}; {1, −4, −5, 1, 3, −5, 1, −3, 0, −1, 0, 0}; {, −5, 2, 1, −5, −2, 3, −3, 6, −2, 0, 0, 0}; {0, 6, 4, −2, −4, 1, 5, −1, 1, 1, 0, 0}; {, −1, 4, 1, −5, −3, 3, 4, −1, 0, −2, 0, 0}; {, −2, 4, 2, −3, 1, 5, 4, 5, −1, 2, 0, 0}; {, −3, −1, 5, −2, −1, −5, 3, −4, 5, −1, 0, 0}; {, −5, −3, 3, −4, −2, 6, −5, 4, −1, 0, 0}; {6, −5, 0, 4, 5, 0, −5, −1, −5, 1, 0, 0}; {0, 4, 0, −5, −1, 4, 5, 1, −1, −3, 0, 0}; {2, −3, −3, 3, 5, 1, −4, 1, −2, −1, 0, 0}; {, −3, 3, 2, −4, −3, 5, −1, 3, 0, 0, 0, 0}; {, −4, 2, 1, −5, −4, 4, −2, 2, 0, 0, 0, 0}; {, −3, −1, 6, −4, 6, −2, 5, −1, −4, 5, 0, 0}; {1, −4, −4, 3, 2, 6, 0, −3, 0, −1, 0, 0}; {, −1, 5, 4, −2, −4, 0, 5, 0, 2, 1, 0, 0}; {0, −5, −5, 2, 1, 6, 0, −4, −1, −1, 0, 0}; {, −1, 6, 6, 1, 1, 6, 0, −4, −1, −1, 0, 0}; {, −4, 2, 1, −5, 6, −1, 3, −2, 1, 0, 0, 0}; {, −3, 4, 4, −1, −1, 5, −2, 6, −2, −2, 0, 0}; {, −4, 3, 3, −2, −2, 4, −2, 6, −2, −1, 0, 0}; {, −4, 3, 3, −2, −1, 4, −2, −5, −1, −1, 0, 0}; {, −5, 1, 0, 6, 6, −2, 4, −1, 1, 0, 0, 0}; {, −4, 3, 3, −2, −1, 4, −1, −5, −1, −1, 0, 0}; {3, 5, 0, 3, −4, 4, 2, −5, 5, −1, 0, 0}; {, −3, 3, 2, −3, 6, −3, 3, 0, 1, −1, 0, 0}; {1, 4, 0, −5, −1, 4, 5, 1, −1, −4, 0, 0}; {, −3, −2, 4, −2, −1, −5, 2, −5, 4, −1, 0, 0}; {, −4, 2, 2, −5, −3, 4, −2, 3, 0, 0, 0, 0}; {5, −3, −5, −1, −3, 4, −4, −3, 5, 4, 0, 0}; {, −5, 3, 5, 1, 3, −4, 4, 3, −5, −4, 0, 0}; {6, 0, 0, 6, −5, 3, −2, 2, −1, 0, 0, 0}; {6, 0, 0, 6, −5, 3, −2, 3, −1, 0, 0, 0}; {, −4, 2, 2, −4, 6, −2, 4, −1, 1, 1, 0, 0}; {, −5, 1, 1, −5, 5, −3, 3, −2, 1, 1, 0, 0}; {6, 0, 0, 6, 5, −3, 2, −2, 1, 0, 0, 0}; {6, 0, 0, 6, 5, −3, 3, −2, 1, 0, 0, 0}; {4, −2, −2, 5, 3, −4, 2, −3, 0, 0, 0, 0}; {6, 3, −5, 2, −4, 6, 5, 3, 6, −5, 0, 0}; {, −3, −5, 0, −3, 4, −4, −2, 5, −5, 1, 0, 0}; {, −4, 3, 5, −1, −5, 2, 6, −5, 0, 0, 0, 0}; {4, −2, −1, 5, 4, −4, 2, −2, 0, 0, 0, 0}; {, −1, 4, 4, −3, −2, 6, 0, 3, 0, 1, 0, 0}; {0, −5, −3, 4, −4, 5, 1, −5, −5, −2, 0, 0}; {5, −2, −2, 3, 0, 4, −4, 3, 1, 2, 0, 0}; {0, 6, −5, 2, 0, 5, 0, −4, −1, 0, 0, 0}; {, −2, 3, 3, −3, −5, −1, 4, −1, 2, 1, 0, 0}; {3, −4, −4, 2, −2, 1, −5, 3, 1, 1, 0, 0}; {2, −4, −3, 4, 1, 6, 1, −3, −1, 0, 0, 0}; {0, 4, 3, −4, 3, 6, −1, 6, 4, 2, 0, 0}; {, −5, 5, −1, 1, −2, 3, −4, 1, 1, −3, 0, 0}; {, −1, −3, 3, −4, 6, 3, −2, 0, −5, −1, 0, 0}; {, −4, 4, −4, 1, −5, −4, 6, 4, −5, −5, 0, 0}; {6, 5, 0, −4, −5, 0, 5, 1, 5, −1, 0, 0}; {5, 3, −3, 4, 2, 6, −1, 5, −4, 1, 0, 0}; {3, 1, −5, 2, 1, 5, −3, 4, −5, 1, 0, 0}; {4, −1, 2, −5, 0, −1, −3, −5, −4, −3, 0, 0}; {3, −2, 1, −5, 1, −2, −4, 6, −5, −3, 0, 0}; {, −4, 1, 2, −5, −4, 4, −2, 5, 0, 1, 0, 0}; {2, −4, −2, 4, 0, 5, −3, −3, 1, −1, 0, 0}; {5, −2, −1, 5, 2, −3, 3, 6, 2, 0, 0, 0}; {2, 5, 4, −2, 3, −2, 0, −2, −3, 5, 0, 0}; {, −5, −1, 0, −5, 2, −2, 3, 6, 2, 0, 0, 0}; {3, 1, −4, −2, −4, 1, 6, −1, 0, −4, 0, 0}; {2, −1, 5, −2, −5, 5, 0, 1, −4, −1, 0, 0}; {2, 0, −5, 2, 0, 4, −4, 3, 6, 0, 0, 0}; {0, −2, 5, 0, −1, 3, −4, 3, −5, 0, 0, 0}; {4, −1, 3, −4, 2, −1, −4, 6, −5, −4, 0, 0}; {2, −4, −1, 3, −3, 5, 0, −3, −3, −3, 0, 0}; {4, −2, 1, 6, 0, −1, −3, −5, −4, −3, 0, 0}; {, −1, 5, −4, 1, −5, 3, −1, −4, −4, −3, 0, 0}; {, −2, 4, −5, 0, 6, 2, −1, −4, −4, −3, 0, 0}; {3, −3, 0, 6, 5, 1, 5, 2, −3, −2, 0, 0}; {5, 2, −4, 5, 1, 5, −4, 4, 6, 0, 0, 0}; {3, 3, 0, 1, −5, 0, 6, 2, −4, −4, 0, 0}; {4, −4, −3, 3, −3, 5, −4, −5, −5, 4, 0, 0}; {, −1, 3, 5, −1, 5, 2, 6, 5, 6, 3, 0, 0}; {, −3, 1, 3, −3, 3, 1, 6, 4, 5, 1, 0, 0}; {, −4, −1, 0, 5, −1, 6, −2, −2, −5, 3, 0, 0}; {, −5, −1, 1, −4, 2, −1, 3, 6, 4, 1, 0, 0}; {5, −3, −1, 6, 1, −2, 2, 5, 2, 0, 0, 0}; {4, −4, −2, 5, 0, −3, 2, 5, 2, 0, 0, 0}; {4, −3, 0, −4, 4, 3, −4, 0, 0, 1, 0, 0}; {4, −2, 2, −1, −1, 6, −1, −3, −5, −4, 0, 0}; {0, −3, 4, 5, −1, 6, −1, 0, 3, −1, 0, 0}; {0, −2, 6, 0, −1, 3, −4, 3, −5, 0, 0, 0}; {, −1, −3, 5, −1, −2, 3, −4, 3, −5, 0, 0, 0}; {, −5, 2, −5, −1, 6, −5, 6, 4, −5, −5, 0, 0}; {, −5, 3, −3, 2, −2, 0, 1, 0, 4, 5, 0, 0}; {, −3, −5, 3, −2, −3, 1, 6, 1, 5, −1, 0, 0}; {, −3, 5, −1, 5, −1, 1, 2, 1, 4, 5, 0, 0}; {, −4, 4, −2, 4, −2, 1, 2, 1, 4, 5, 0, 0}; {, −5, 3, −3, 3, −2, 0, 1, 0, 4, 5, 0, 0}; {4, −1, 4, −3, 4, 5, 5, 3, 6, 6, 0, 0}; {1, −4, 1, 6, 1, 2, 6, 5, 1, −1, 0, 0}; {2, −3, 2, −5, 3, 4, 4, 2, 6, 6, 0, 0}; {5, 2, −3, 4, 2, 5, −4, 4, 6, 0, 0, 0}; {4, 1, −4, 3, 1, 5, −3, 4, −5, 0, 0, 0}; {, −5, 3, −3, 5, 3, −5, −3, 4, 6, 0, 0, 0}; {, −2, 6, 0, −4, 4, −5, −2, 5, −5, 0, 0, 0}; {3, −2, 3, −1, 0, 6, −2, −3, −5, −4, 0, 0}; {0, −5, 0, −4, 1, 3, 2, 1, 5, 5, 0, 0}; {, −1, 6, 0, −4, 3, 2, 2, −4, −1, 2, 0, 0}; {6, 1, −5, 3, −5, 6, −5, −2, 3, 4, 0, 0}; {, −1, 5, −2, 6, −1, 2, 2, 0, 4, 4, 0, 0}; {, −3, 2, 6, 1, −4, −5, −1, 2, 2, 0, 0, 0}; {, −5, −1, 2, −4, 2, 0, 3, 6, 4, 1, 0, 0}; {5, −1, 4, 1, −2, −3, 3, −4, −2, −1, 0, 0}; {0, −4, 3, 3, −4, −4, 0, 4, 0, 1, 0, 0}; {, −5, 3, −2, −2, 4, −2, 2, 3, 5, 0, 0, 0}; {6, 2, −3, −3, 3, −3, 1, 2, 4, 0, 0, 0}; {5, 1, −4, −4, 3, −3, 1, 2, 4, −1, 0, 0}; {6, 2, −3, −2, 3, −2, 1, 3, 4, 0, 0, 0}; {4, −1, 5, 5, −3, 3, 6, 6, 6, 1, 0, 0}; {5, 1, −4, −3, 2, −3, 1, 2, 4, 0, 0, 0}; {5, 1, −4, −3, 3, −3, 1, 2, 4, 0, 0, 0}; {2, −3, 3, 3, −4, 2, 5, 5, 6, 1, 0, 0}; {1, −4, 2, 2, −4, 1, 4, 4, 6, 1, 0, 0}; {1, −5, 0, 0, 6, 0, −3, −4, −5, 0, 0, 0}; {, −5, 1, 6, 6, 1, 2, −4, 6, −2, 0, 0, 0}; {1, −5, 0, 0, −5, 0, −4, −4, −5, 0, 0, 0}; {, −3, 2, 6, 6, −1, 4, 0, −1, −4, 1, 0, 0}; {, −5, 0, 4, 4, −2, 3, −1, −2, −4, 0, 0, 0}; {6, −1, 3, 3, −2, 3, −1, −3, −4, 1, 0, 0}; {, −1, −3, 6, 0, 3, −1, 2, 3, 3, −4, 0, 0}; {6, 3, −1, 5, −1, 0, −1, 6, −3, 0, 0, 0}; {6, 2, −3, 2, −4, −1, 3, 4, −1, −1, 0, 0}; {3, −2, 4, −4, 3, 4, 5, 3, 6, 6, 0, 0}; {4, −1, 5, −3, 5, 6, 4, 3, −5, −5, 0, 0}; {1, −4, 2, 6, 2, 3, 4, 2, 6, 6, 0, 0}; {1, −4, 2, −5, 3, 4, 3, 2, 6, 6, 0, 0}; {, −2, 5, −1, 4, 1, 2, 2, 1, 5, 6, 0, 0}; {5, −1, 4, −3, 5, 6, 5, 3, −5, −5, 0, 0}; {, −5, 3, −2, 5, 3, 6, −3, 4, 6, 0, 0, 0}; {, −3, 4, −2, 4, −1, 1, 2, 1, 4, 5, 0, 0}; {, −5, 2, −4, 2, −2, 0, 1, 0, 4, 5, 0, 0}; {, −3, 5, 0, −5, 4, −5, −2, 5, −5, 0, 0, 0}; {6, 0, 5, −1, −5, −5, 5, 4, −4, −4, 0, 0}; {2, −4, 1, −5, 3, 4, 4, 2, 6, 6, 0, 0}; {2, −4, 1, −5, 4, 4, 4, 2, 6, −5, 0, 0}; {, −1, 6, 0, −5, −2, −4, −3, −1, 5, 5, 0, 0}; {, −1, 6, 0, −5, −2, −3, −3, −1, 5, 5, 0, 0}; {, −4, 3, −3, 4, −4, −5, −4, −2, 5, 5, 0, 0}; {, −5, 2, −4, 3, −5, 6, −5, −3, 5, 5, 0, 0}; {, −5, 2, −4, 3, −4, −5, −5, −1, 2, 4, 0, 0}; and {−2, 5, −1, 6, −1, 2, 3, 1, 4, 5, 0, 0}.

The first sequence set may further include some or all of the following 283 sequences (which are marked as a set 1a). PAPRs of sequences corresponding to these sequences are less than 2.5 dB, and the sequences corresponding to these sequences may be used to form a plurality of low-correlation sequence groups (each group includes one root sequence, and another sequence is obtained by performing a cyclic shift on the root sequence, to be specific, different values of a are set to obtain cyclic shift sequences of one root sequence). The 283 sequences are as follows:

{−3, 2, −5, 0, −1, −3, −5, 5, −3, −4, 0, 0}; {6, 0, 6, 0, 4, −5, −4, 2, 0, −2, 0, 0}; {0, 0, 0, 1, 10, 8, 5, 0, 4, 9, 10, 2}; {1, −5, 1, −3, −5, −1, −1, 6, −5, 1, 0, 0}; {, −4, 1, 6, 1, −2, 6, 0, 2, 4, 3, 0, 0}; {, −3, 1, 5, 0, −5, −3, −4, 3, 0, −2, 0, 0}; {4, 5, 6, −2, 3, −1, 4, −1, −2, 4, 0, 0}; {, −4, −1, 2, −4, 6, −2, −4, −5, −4, 3, 0, 0}; {, −2, 3, −4, 4, 5, 6, 1, 1, −3, −5, 0, 0}; {0, 0, 0, 4, 8, 11, 9, 6, 10, 5, 0, 11}; {2, −4, 2, 1, 6, 4, −5, −1, 3, 1, 0, 0}; {5, 3, 1, 5, 1, 3, −2, 5, 6, −3, 0, 0}; {4, 6, −4, 4, −3, 6, 0, 6, 6, 3, 0, 0}; {, −4, 0, 4, 3, −2, 3, −1, −2, −5, 0, 0, 0}; {, −5, −5, −5, 2, 6, −2, 6, 4, −3, 6, 0, 0}; {, −2, −4, 6, 0, 5, −3, −5, 3, −4, −1, 0, 0}; {1, −2, −5, 0, 5, 0, 3, 2, 4, 6, 0, 0}; {2, −3, 4, −4, −5, 6, −1, −1, 3, 5, 0, 0}; {4, 0, −4, 2, 1, 4, −4, 3, 5, 0, 0, 0}; {3, −2, 5, −2, 0, −2, −3, 3, 3, −2, 0, 0}; {5, −1, 5, −2, 0, 0, −1, 0, −4, 6, 0, 0}; {6, 1, −3, 3, −4, 0, 4, 6, 6, 5, 0, 0}; {6, 0, −5, 1, 0, 2, 0, 0, 5, 5, 0, 0}; {, −1, 6, 2, −2, 3, −4, 0, 3, 3, 3, 0, 0}; {, −1, 5, 0, −5, 3, 2, 2, −5, −2, 1, 0, 0}; {1, 6, 0, −5, 4, −2, 0, 3, 3, 3, 0, 0}; {0, 0, 1, 3, 11, 7, 11, 4, 5, 0, 0, 7}; {6, −3, 1, −5, −2, −5, 3, −4, 6, 1, 0, 0}; {0, 2, 5, −2, 5, 3, 3, −3, 4, 0, 0, 0}; {, −4, 1, −5, 4, −4, −5, −4, −2, 5, 4, 0, 0}; {2, 4, −5, 1, 5, 0, −5, 5, 3, −1, 0, 0}; {0, 0, 1, 5, 9, 2, 10, 3, 0, 8, 4, 4}; {, −2, −1, 1, −5, 3, 6, 2, 0, −1, 6, 0, 0}; {0, 0, 1, 6, 3, −1, 4, 6, 1, 5, 0, 0}; {, −5, 1, −4, −5, −1, 5, −5, −5, −4, 2, 0, 0}; {1, −5, 2, 1, 5, 0, 1, −3, −5, −4, 0, 0}; {, −4, 0, 5, 2, −3, −4, 4, −2, 1, 1, 0, 0}; {0, 0, 1, 6, 11, 3, 10, 7, 4, 11, 2, 1}; {5, −1, 6, 6, 5, 2, −5, 4, 6, −4, 0, 0}; {, −2, −5, 5, −4, 4, 6, 1, 6, −4, −4, 0, 0}; {, −4, 3, −1, 0, 6, 6, −1, 3, −1, −1, 0, 0}; {0, 0, 1, 9, 0, 1, 6, 1, 8, 8, 5, 0}; {0, 0, 1, 9, 2, 5, 4, 8, 5, 1, 0, 6}; {, −1, −5, 4, −4, 3, 5, 0, 6, −5, −1, 0, 0}; {0, 0, 1, 10, 1, 8, 11, 3, 2, 8, 7, 2}; {2, −4, 3, −5, −5, 5, −2, 0, 4, 4, 0, 0}; {2, −4, 3, −5, −5, 5, −1, 0, 3, 4, 0, 0}; {0, 0, 2, 0, 8, 9, 6, 10, 3, 9, 9, 2}; {, −3, 1, −5, −2, −2, 3, −1, 6, 5, 1, 0, 0}; {3, −4, 3, −4, 5, 5, 2, 2, −4, −3, 0, 0}; {, −1, 0, 3, 4, −1, −5, 2, −5, 2, 3, 0, 0}; {, −5, 0, −5, 1, 3, −4, −4, 2, 1, 0, 0, 0}; {4, −5, 0, 4, 2, 6, 3, −4, 6, 4, 0, 0}; {0, 4, −2, 4, −3, −4, −1, −2, 6, 5, 0, 0}; {5, −4, 1, 6, 1, −1, 1, 0, 6, 3, 0, 0}; {, −1, 6, 3, 1, 6, −1, −2, 0, −5, −1, 0, 0}; {3, 6, −1, 5, 0, −2, 0, −2, −4, −5, 0, 0}; {3, −3, 5, 2, 2, −3, 1, −5, −3, −1, 0, 0}; {4, −5, 0, −5, −4, 0, 2, 1, 5, 1, 0, 0}; {, −3, 0, 5, 0, −5, −3, −5, 3, 0, −2, 0, 0}; {0, 0, 2, 7, 6, 4, 11, 8, 5, 9, 4, 7}; {, −3, 0, 5, 2, −5, 3, −1, −2, 2, 2, 0, 0}; {, −1, −1, 1, −4, 6, −3, 3, −2, −1, 5, 0, 0}; {3, 6, −1, −2, 3, −5, 3, 1, −2, 2, 0, 0}; {3, −1, −3, 1, 2, 5, 3, −5, 1, 4, 0, 0}; {0, 0, 2, 10, 4, 0, 11, 9, 6, 0, 3, 5}; {4, −2, 6, −3, −4, 6, 1, 0, 3, 6, 0, 0}; {, −1, 0, 3, 1, 0, −5, −2, 5, 1, 6, 0, 0}; {0, 0, 2, 11, 10, 4, 6, 9, 3, 8, 2, 9}; {0, 0, 2, 11, 11, 5, 6, 2, 5, 10, 6, 1}; {, −5, −2, 4, 4, −2, 3, 0, −2, −4, 0, 0, 0}; {6, 6, −3, −5, 3, −2, 2, −4, 3, 5, 0, 0}; {0, −4, −5, 1, −5, −2, 5, −4, −5, −1, 0, 0}; {, −4, 4, 3, −2, 1, 5, −1, −4, −1, −2, 0, 0}; {2, −5, 3, −4, 3, 3, 6, −5, 4, 5, 0, 0}; {0, 0, 3, 3, 7, 1, 5, 3, 1, 11, 7, 11}; {0, 0, 3, 3, 11, 8, 5, 7, 3, 6, 11, 4}; {1, 6, 2, −4, −2, 0, −2, −1, 4, 3, 0, 0}; {0, 0, 3, 4, 11, 1, 7, 10, 5, 11, 6, 3}; {2, −2, −3, −5, 0, 5, −4, −4, 1, −3, 0, 0}; {, −3, 5, 4, 3, −3, 2, 5, −5, 0, −3, 0, 0}; {0, 0, 3, 6, 5, 2, 7, 4, 3, 1, 7, 0}; {, −3, 1, −4, 3, 6, −2, −3, 5, 1, −1, 0, 0}; {, −1, 2, −4, 2, −4, 6, 1, 2, −2, −2, 0, 0}; {, −1, 2, −4, 2, −4, −4, −1, −2, 4, 2, 0, 0}; {0, 0, 3, 8, 2, 2, 9, 7, 6, 2, 6, 3}; {0, 0, 3, 8, 10, 7, 4, 3, 8, 4, 8, 6}; {3, 2, 4, −3, 6, −1, 5, 0, 1, 5, 0, 0}; {2, 1, 3, −4, 5, −2, 5, 0, 1, 5, 0, 0}; {, −5, 3, 2, 5, 3, 0, 4, −3, 5, −4, 0, 0}; {, −3, 0, 6, 5, 0, 2, −4, 4, −1, −1, 0, 0}; {0, 0, 4, 0, 6, 1, 9, 7, 6, 2, 5, 8}; {, −2, 1, −4, −4, 4, −4, 3, −1, −4, −2, 0, 0}; {0, 0, 4, 1, 8, 3, 5, 3, 2, 9, 11, 4}; {5, 1, 1, 6, −1, 2, −2, −5, −3, −3, 0, 0}; {, −5, 4, 5, −1, 6, −5, 1, 5, 5, −2, 0, 0}; {6, 3, 4, 0, 6, 4, −2, 4, 6, −2, 0, 0}; {, −5, 6, −3, −5, 3, −1, 2, −2, 3, 6, 0, 0}; {, −2, 2, −2, 1, 5, −2, −2, 6, 4, −1, 0, 0}; {, −5, −1, −5, −2, 4, −1, −4, 4, 5, 6, 0, 0}; {6, 6, −2, −3, 4, −2, 5, −3, 3, 3, 0, 0}; {3, 3, −5, −5, 1, −3, 3, −4, 2, 3, 0, 0}; {1, 4, −1, 4, −3, −3, 0, −2, 6, 2, 0, 0}; {6, 1, 0, −2, 3, −5, −2, −3, 2, −2, 0, 0}; {3, −5, 3, −1, −5, 6, 2, 5, −2, 0, 0, 0}; {0, 1, 6, −1, 6, 3, 4, −1, −2, 0, 0, 0}; {0, 0, 4, 8, 6, 2, 2, 11, 3, 4, 0, 5}; {, −1, 6, 5, 4, −2, 1, −2, 0, 1, −4, 0, 0}; {6, −4, 2, −4, −1, 4, 1, −5, 3, 0, 0, 0}; {0, 4, 0, −4, 2, −2, −2, 6, −4, 0, 0, 0}; {0, 0, 4, 8, 10, 3, 11, 4, 2, 2, 11, 6}; {, −3, 1, −3, 6, −4, 6, 5, −1, −5, −4, 0, 0}; {1, 3, −3, 4, 6, −3, 2, 0, 5, 0, 0}; {0, 0, 4, 10, 2, 4, 7, 6, 10, 7, 5, 3}; {1, 4, −1, −3, −1, −4, 5, −2, −2, −5, 0, 0}; {0, 0, 4, 11, 11, 0, 11, 9, 3, 5, 2, 8}; {5, 1, 2, 6, 0, 2, −2, 6, −3, −4, 0, 0}; {3, −3, −4, −1, 3, −2, −5, −5, −1, 4, 0, 0}; {0, 0, 5, 2, 1, 2, 1, 9, 6, 10, 3, 8}; {0, 0, 5, 2, 1, 5, 2, 5, 0, 10, 0, 7}; {2, −4, −5, −1, 2, −4, −4, 4, −1, 1, 0, 0}; {5, 2, 4, −1, 5, 6, 1, 5, 5, −3, 0, 0}; {5, 0, 0, 5, −4, 3, 5, 1, −3, 0, 0, 0}; {0, −3, −1, −5, 2, −3, −4, 3, −5, −2, 0, 0}; {0, −4, −3, 4, −2, −5, 1, 6, −5, −1, 0, 0}; {, −3, −5, −2, −4, 4, −4, 1, 6, −4, 6, 0, 0}; {3, 6, 2, 5, −5, 2, −2, 5, 5, 5, 0, 0}; {2, −4, −5, 1, 1, −5, 2, 6, 1, 1, 0, 0}; {, −4, 2, 1, −4, −2, 3, −3, 6, −2, 0, 0, 0}; {, −5, 4, 6, 4, −3, 0, −4, 2, 2, −4, 0, 0}; {, −3, −1, 6, −3, 1, 0, 4, 2, −5, 3, 0, 0}; {, −1, 4, 2, −3, −4, 0, 6, −2, 2, 0, 0, 0}; {, −1, 0, 6, −3, 6, −2, 6, −1, −4, 6, 0, 0}; {, −3, −1, 6, −2, 3, 1, 0, 5, 3, −2, 0, 0}; {, −4, −1, −5, 1, 0, 5, 0, 3, 5, 4, 0, 0}; {0, −1, 3, 5, 4, −1, 4, 5, 0, 4, 0, 0}; {, −1, −1, 4, −5, −4, 3, −2, 1, −3, 2, 0, 0}; {2, −4, −4, −1, 2, −3, −4, 4, −1, 2, 0, 0}; {, −3, −5, −1, −5, 4, 3, −3, −1, 5, −2, 0, 0}; {, −3, 1, −1, 1, 5, 1, −3, 5, 3, 4, 0, 0}; {, −2, −3, 2, −1, 3, 4, −3, 2, 5, 2, 0, 0}; {, −4, −5, 0, −2, −4, −3, 3, 6, 2, −5, 0, 0}; {0, 0, 6, 5, 8, 6, 6, 8, 1, 6, 11, 7}; {, −5, 5, −3, 6, −4, 1, −3, 1, 4, 6, 0, 0}; {, −4, 1, 0, 5, 1, 4, −2, 4, 4, 1, 0, 0}; {6, −3, 6, −3, 3, 6, −5, −1, −5, 4, 0, 0}; {4, 2, 6, 4, 6, 0, −4, 0, 3, 6, 0, 0}; {, −4, 2, 2, −4, 6, −1, 4, −1, 0, 0, 0, 0}; {, −4, 6, −2, −3, 1, −5, 0, 3, 6, 3, 0, 0}; {0, 0, 6, 7, 5, 5, 0, 4, 6, 3, 10, 4}; {, −4, −1, −4, 1, −3, 2, 3, −3, 4, 3, 0, 0}; {4, −5, 4, −3, 2, 4, −2, −4, 4, 0, 0, 0}; {, −2, 4, 4, 1, −2, 3, 4, −4, 1, −2, 0, 0}; {4, −5, 4, −2, −2, 3, −2, 1, 4, 3, 0, 0}; {0, 0, 6, 9, 6, 10, 5, 9, 8, 1, 11, 9}; {0, 0, 6, 9, 11, 3, 11, 3, 0, 1, 9, 4}; {0, 0, 6, 10, 2, 1, 4, 0, 8, 8, 11, 8}; {, −2, −3, 2, 6, 1, −5, −3, 3, 1, −2, 0, 0}; {6, 4, −3, 2, −2, 5, 5, −2, 0, 3, 0, 0}; {4, 2, −5, 0, −3, 6, 0, 2, −4, 0, 0, 0}; {3, 0, 4, −2, 0, 6, 0, −3, −5, −3, 0, 0}; {0, 0, 7, 5, 0, 9, 2, 9, 3, 6, 4, 5}; {, −3, 5, −4, 2, 2, −2, 2, −1, −4, −3, 0, 0}; {, −2, −3, 3, 1, −4, −3, 4, −4, 2, −2, 0, 0}; {, −1, 6, −4, 2, −5, 3, 0, −4, −3, −2, 0, 0}; {, −3, 2, 2, 6, −1, −5, 3, 3, 0, 3, 0, 0}; {0, 0, 7, 6, 9, 3, 3, 1, 3, 5, 1, 5}; {, −3, −5, 0, −2, 2, 4, −3, 2, 5, 2, 0, 0}; {1, −3, 0, −4, 1, −2, −4, 4, −5, −3, 0, 0}; {, −3, 6, −2, −5, −4, 2, −2, 1, 4, 6, 0, 0}; {0, 0, 7, 8, 2, 1, 9, 4, 9, 7, 8, 10}; {0, 3, 1, 5, −2, 3, 4, −3, 5, 2, 0, 0}; {, −2, 4, 5, 1, −2, 4, 4, −4, 1, −1, 0, 0}; {, −5, 0, 0, −5, 4, −3, −5, −1, 3, 0, 0, 0}; {4, −1, 1, −2, 6, −3, −5, −1, −1, −5, 0, 0}; {, −4, 0, −1, 6, 0, 1, −5, 3, 5, 1, 0, 0}; {0, 0, 7, 11, 5, 3, 6, 3, 0, 0, 4, 3}; {0, 0, −5, −1, 6, −4, 1, −3, 6, −1, 0, 0}; {0, 0, 7, 11, 10, 11, 4, 3, 7, 0, 8, 8}; {, −4, 5, −2, 0, 6, −4, 5, 2, −3, 0, 0, 0}; {0, 4, 4, 2, 2, −3, −1, 4, −2, −5, 0, 0}; {0, 0, 8, 3, 3, 2, 4, 10, 2, 0, 8, 0}; {2, 1, −4, 2, 3, −3, 3, 6, 4, −2, 0, 0}; {4, 2, −4, 2, 5, 1, 6, 5, 5, 6, 0, 0}; {1, −3, 1, 6, 6, −3, 1, 0, −2, 3, 0, 0}; {2, −1, 4, −1, 6, 5, 1, 2, −4, −1, 0, 0}; {4, 2, −4, 4, 1, 5, −4, 4, 6, 0, 0, 0}; {1, −3, 1, −4, 0, −3, −3, 0, 6, 6, 0, 0}; {, −3, 5, −3, 4, −2, −4, 6, 4, −5, −4, 0, 0}; {, −2, −5, 0, −4, 6, 5, −4, −1, 5, −3, 0, 0}; {0, 0, 8, 8, 0, 10, 8, 2, 7, 2, 9, 0}; {3, −3, −1, 5, 5, 1, 5, 1, −3, −1, 0, 0}; {, −4, −5, 2, 1, 6, −3, 3, −3, 1, −1, 0, 0}; {0, 0, 8, 8, 2, 8, 3, 10, 2, 0, 2, 4}; {6, −2, −2, 2, 3, −2, 3, −3, 3, 2, 0, 0}; {, −5, 6, 1, 0, 2, −1, 4, −1, 2, −5, 0, 0}; {, −2, 1, 0, 3, −3, −1, 5, −2, −5, 4, 0, 0}; {, −3, 1, 1, 6, 3, −1, 4, 6, 3, 2, 0, 0}; {6, −1, 0, 6, 5, −4, 2, −3, 1, 0, 0, 0}; {, −3, 3, 5, 0, −4, 1, −2, −4, −3, −4, 0, 0}; {, −4, 0, 0, 6, 0, −5, −2, −4, −4, 5, 0, 0}; {0, 0, 8, 10, 0, 7, 2, 0, 4, 8, 6, 9}; {4, 1, 6, 5, −3, 5, −2, 2, 5, 2, 0, 0}; {0, 0, 8, 11, 9, 4, 11, 2, 6, 5, 5, 10}; {0, 0, 9, 0, 5, 10, 10, 10, 3, 11, 5, 3}; {, −4, 6, 1, 2, −4, 4, −3, −1, 2, −1, 0, 0}; {, −1, 5, −4, 6, 1, 6, 4, −4, −3, 3, 0, 0}; {0, 0, 9, 2, 3, 1, 9, 1, 10, 5, 6, 9}; {3, 3, 0, 5, −5, 4, −3, 2, 1, 6, 0, 0}; {, −5, 2, 6, −5, −4, −2, 4, −3, 5, 3, 0, 0}; {0, 0, 9, 3, 10, 3, 4, 1, 4, 9, 10, 1}; {, −5, 4, −2, 2, −3, −1, 3, 3, −1, −2, 0, 0}; {, −2, −3, 5, −1, −2, 3, −4, 3, −5, 0, 0, 0}; {6, 5, 1, −5, −5, 0, 5, 1, 6, −1, 0, 0}; {5, 4, 0, −5, 3, −4, 2, 5, −4, 0, 0, 0}; {, −1, 6, −2, 1, −3, −2, −5, 4, −5, −5, 0, 0}; {0, 0, 9, 5, 10, 0, 5, 1, 6, 6, 8, 4}; {3, −2, 2, 5, 5, 5, 6, 1, 6, 4, 0, 0}; {0, 0, 9, 5, 11, 11, 0, 4, 8, 3, 6, 7}; {, −4, 3, −5, −1, −5, −4, 6, 4, −5, −5, 0, 0}; {3, −5, −4, −3, 3, −2, −5, 5, 0, 3, 0, 0}; {0, −5, −1, 4, 4, 0, 3, 1, −3, −3, 0, 0}; {0, 5, −5, −2, −1, −3, −4, 3, −3, 3, 0, 0}; {0, 0, 9, 8, 2, 5, 0, 6, 7, 11, 9, 2}; {, −2, −2, −5, 6, 0, 5, −1, 4, −3, −3, 0, 0}; {2, −2, 3, −2, 4, 5, 2, 2, 5, 5, 0, 0}; {3, −3, 0, 6, 5, 1, 4, 1, −3, −2, 0, 0}; {2, −2, 3, −1, 6, 5, 1, 2, −4, −1, 0, 0}; {, −5, −1, 0, 4, −2, 5, 2, 2, −2, 2, 0, 0}; {4, −5, −5, −1, 4, −1, 2, 0, −2, 5, 0, 0}; {1, 3, 2, 6, 0, −5, −1, −1, 5, 3, 0, 0}; {, −5, 2, 6, 3, 4, 6, −1, 0, −3, 6, 0, 0}; {6, −3, −2, 3, −3, 4, −3, −2, 6, 2, 0, 0}; {, −4, 0, 2, −3, 3, 0, 4, 6, 3, 1, 0, 0}; {0, 0, 10, 1, 8, 1, 4, 5, 10, 10, 4, 1}; {, −4, 2, 6, 3, 4, 6, −1, 0, −3, 6, 0, 0}; {3, −2, 3, 2, −3, 2, 4, 5, −5, 1, 0, 0}; {0, 0, 10, 2, 3, 8, 9, 10, 6, 1, 7, 0}; {2, −4, 0, −2, 6, 6, 1, −4, −2, 0, 0, 0}; {, −1, −1, −3, 1, −5, 4, 1, −1, 5, −3, 0, 0}; {1, −4, 1, 0, 2, −2, 2, 5, −5, 4, 0, 0}; {4, −1, 4, 4, −1, 0, −4, 5, −2, 0, 0, 0}; {4, 0, 6, −5, 4, −5, −1, 4, 3, −2, 0, 0}; {1, 6, −3, −4, 2, 6, 2, −1, −2, 2, 0, 0}; {3, −1, 5, −5, 6, −1, 2, 1, 0, 4, 0, 0}; {0, 5, −4, −4, 1, 6, 1, −2, −3, 2, 0, 0}; {0, 0, 10, 5, 5, 10, 3, 9, 10, 10, 2, 9}; {5, 3, −1, 4, 4, −1, 4, −5, 5, −2, 0, 0}; {3, 0, −5, 0, −5,

−2, 1, 0, 3, 4, 0, 0}; {1, −1, −5, 2, −4, −3, −2, 4, −4, 0, 0, 0}; {0, 0, 10, 7, 3, 8, 3, 7, 6, 8, 11, 4}; {, −3, 4, −3, 1, 5, 2, −1, 0, −2, −4, 0, 0}; {, −3, 6, 1, −5, 1, 1, −1, 2, 5, −1, 0, 0}; {5, −3, −1, 1, −2, 5, 2, 3, 0, 4, 0, 0}; {, −5, 4, −1, 6, −3, 6, 5, 3, −5, −2, 0, 0}; {1, 0, −3, −4, 1, 5, −2, 5, −2, −3, 0, 0}; {0, 0, 10, 11, 0, 2, 6, 10, 8, 3, 10, 3}; {, −2, 4, −4, 3, −4, −5, −1, −1, 3, 3, 0, 0}; {, −4, 2, −5, 2, −3, 6, 5, −2, 0, 2, 0, 0}; {, −1, 6, 0, −4, −4, 2, 6, −4, −2, 1, 0, 0}; {0, 0, 11, 1, 3, 9, 8, 5, 1, 6, 0, 8}; {6, 1, −5, 4, 4, −1, 3, −5, −4, 0, 0, 0}; {, −4, 2, −5, 3, 4, 6, 0, 0, −3, −5, 0, 0}; {0, 0, 11, 4, 1, 7, 8, 1, 3, 9, 0, 9}; {, −1, 4, −4, −5, 1, 4, 2, −1, −3, 2, 0, 0}; {, −1, 1, 2, −2, 2, −1, 3, −3, 6, 5, 0, 0}; {0, 0, 11, 6, 1, 0, 4, 7, 10, 5, 8, 4}; {, −5, 2, −4, −2, 1, 3, −3, 5, 1, 1, 0, 0}; {, −5, 3, −2, 1, −4, −1, 3, 3, −1, −2, 0, 0}; {, −4, 4, −1, 3, −2, 1, 3, 2, 4, 5, 0, 0}; {3, −3, 2, 4, −3, 5, 3, 4, −1, −2, 0, 0}; {0, 0, 11, 7, 8, 4, 11, 10, 2, 2, 9, 2}; {5, 2, −2, 3, 1, 1, −4, −2, 5, −3, 0, 0}; {6, 3, −1, 5, −5, 3, 6, 5, 5, −2, 0, 0}; {1, −4, 2, 6, −4, 3, 1, 0, −2, −3, 0, 0}; {, −5, 4, 0, −5, −5, 5, −5, 2, 5, −2, 0, 0}; {2, −1, −5, 2, 6, 3, 2, 2, −5, −2, 0, 0}; {0, 0, 11, 9, 4, 9, 3, 9, 3, 4, 8, 8}; {5, 1, −4, 2, −4, −1, 1, 0, 3, 4, 0, 0}; {6, 0, 5, −3, 5, 5, 5, 3, −3, −4, 0, 0}; {, −5, 1, 6, 0, −4, 5, 5, −3, 0, 1, 0, 0}; {2, −2, 5, 1, 2, −3, 1, 6, −4, −1, 0, 0}; and {1, −4, 2, −3, −1, −2, −3, 0, 5, 6, 0, 0}.

The first sequence set may further include some or all of the following 20 sequences (which are marked as a set 1b). PAPRs of sequences corresponding to these sequences are less than 2.5 dB. The 20 sequences are as follows:

{0, 0, 0, 0, 3, 6, 0, 10, 6, 3, 8, 1}; {0, 0, 1, 3, 3, 9, 6, 2, 4, 11, 2, 9}; {0, 0, 3, 0, 9, 4, 3, 3, 9, 1, 8, 0}; {0, 0, 3, 1, 10, 11, 8, 2, 6, 1, 2, 7}; {0, 0, 3, 1, 11, 6, 7, 1, 4, 11, 7, 11}; {0, 0, 3, 6, 10, 8, 8, 3, 11, 9, 0, 8}; {0, 0, 3, 7, 1, 4, 7, 6, 4, 0, 5, 2}; {0, 0, 4, 8, 8, 3, 9, 0, 7, 1, 10, 10}; {0, 0, 6, 5, 3, 5, 1, 5, 1, 8, 1, 2}; {0, 0, 6, 6, 1, 3, 4, 4, 5, 0, 6, 0}; {0, 0, 6, 8, 1, 3, 1, 4, 9, 5, 11, 8}; {0, 0, 7, 8, 8, 6, 2, 9, 6, 10, 3, 9}; {0, 0, 7, 8, 10, 9, 11, 2, 9, 1, 8, 4}; {0, 0, 8, 4, 4, 9, 3, 0, 5, 11, 2, 2}; {0, 0, 8, 5, 7, 10, 2, 10, 0, 11, 4, 11}; {0, 0, 8, 6, 9, 3, 11, 3, 4, 0, 4, 5}; {0, 0, 9, 1, 3, 9, 9, 9, 3, 0, 5, 0}; {0, 0, 10, 0, 7, 11, 7, 4, 11, 11, 2, 5}; {0, 0, 10, 11, 2, 7, 8, 2, 10, 2, 8, 4}; and {0, 0, 11, 6, 5, 0, 8, 1, 0, 4, 10, 1}.

The first sequence set may further include some or all of the following 3362 sequences (which are marked as seq22_lte_rm). PAPRs of sequences corresponding to sequences that are determined based on these sequences are less than 2.2 dB, and a largest value of a correlation with an LTE sequence is less than 0.79467. The 3362 sequences are as follows:

{0, 6, 0, 6, 1, 3, 3, 1, 6, 6, 0, 0}; {, −5, −1, 3, −5, 1, −4, 3, −1, −3, −2, 0, 0}; {1, −5, 1, −5, 3, 4, 3, 2, 6, 6, 0, 0}; {6, −1, 4, −3, 5, −5, 6, 2, −4, −5, 0, 0}; {, −3, 4, −1, 6, 4, −4, −2, 5, −5, 0, 0, 0}; {1, −5, 1, −5, 4, 4, 3, 2, −5, −4, 0, 0}; {, −1, 4, −3, 2, −2, −3, −4, 6, −4, −4, 0, 0}; {, −2, 3, −4, 1, −3, −4, −5, 5, −4, −4, 0, 0}; {, −3, 4, −1, 6, 4, 5, −1, 1, −4, −2, 0, 0}; {1, −5, 1, −5, 4, 5, 3, 2, −5, −5, 0, 0}; {, −1, 5, −1, 5, 2, 3, 3, 1, 5, 6, 0, 0}; {, −1, 6, 1, −4, 6, −3, −2, 6, −5, 1, 0, 0}; {0, −4, 4, 0, −1, 3, 6, 2, 4, −1, 0, 0}; {, −3, 4, −1, 6, 5, −4, −2, 5, −5, 1, 0, 0}; {1, −5, 1, −5, 5, 4, 3, 2, −5, −4, 0, 0}; {, −2, 3, −4, 1, −2, −4, −5, 5, −4, −4, 0, 0}; {1, 6, −1, 4, 1, 0, −4, 6, −1, −2, 0, 0}; {1, −5, 1, −5, 5, 5, 3, 3, −5, −5, 0, 0}; {, −1, 5, −1, 5, 3, 3, 2, 2, 6, −5, 0, 0}; {, −3, 3, −3, 3, 1, 2, 2, 0, 5, 6, 0, 0}; {5, −2, 3, −4, −4, 6, 5, 4, −4, −5, 0, 0}; {, −2, 5, 0, −5, −3, 3, −5, −5, 6, −5, 0, 0}; {, −4, 3, −2, 5, −4, −5, −5, −2, 4, 5, 0, 0}; {4, −3, 2, −5, −4, 5, 3, −5, 6, −1, 0, 0}; {3, −4, 1, 6, −5, 4, 2, −5, 5, −1, 0, 0}; {, −4, 3, −2, 5, −4, −5, −4, −2, 4, 4, 0, 0}; {6, 0, 6, 0, 2, 0, 0, 1, 6, 6, 0, 0}; {, −5, 2, −3, 4, −5, −5, −5, −3, 4, 5, 0, 0}; {5, −1, 5, −1, 1, 0, 0, 0, 5, 5, 0, 0}; {, −2, 5, 0, −5, −2, 3, −5, −5, 6, −5, 0, 0}; {, −3, 4, −1, 6, −3, 2, 6, 6, 5, 6, 0, 0}; {, −3, 4, −1, 6, −3, 2, 6, −5, 6, 6, 0, 0}; {3, −4, 1, 6, −4, 4, 2, −5, 5, 0, 0, 0}; {6, 1, −4, 3, −5, 5, 6, −2, 4, 5, 0, 0}; {6, 1, −4, 3, −5, 6, 6, −2, 2, 4, 0, 0}; {5, −1, 5, −1, 2, 0, −1, 2, 4, 5, 0, 0}; {0, 4, −4, 0, 1, −3, 6, −2, −4, 1, 0, 0}; {6, 1, −4, 3, −5, 6, −5, −3, 5, 5, 0, 0}; {4, −2, 4, −2, 1, −1, −1, 0, −5, 6, 0, 0}; {1, 6, −1, 4, 6, 3, 2, 6, 5, −1, 0, 0}; {1, −5, 1, −5, −2, −3, −3, −1, −5, 6, 0, 0}; {, −3, 4, −1, 6, −2, 2, 5, 6, 5, 5, 0, 0}; {3, −3, 3, −3, 1, −1, −2, 1, 4, 5, 0, 0}; {0, 6, 0, 6, −2, −3, −2, −1, 4, 4, 0, 0}; {, −1, 5, −1, 5, −3, −4, −3, −2, 6, 6, 0, 0}; {, −4, 2, −4, 3, −4, −5, −5, −2, 2, 3, 0, 0}; {1, −4, 3, −1, 5, −3, 1, 5, 5, 4, 0, 0}; {6, 0, 6, 1, −5, 6, 6, −2, 1, 3, 0, 0}; {, −1, 5, −1, 6, 0, 2, 3, 1, 4, 5, 0, 0}; {, −2, 4, −2, 5, 0, 0, 4, 5, 0, 1, 0, 0}; {, −4, 2, −4, 3, −1, 1, 2, 0, 4, 5, 0, 0}; {, −5, 1, −5, 2, −2, 0, 2, 1, 3, 5, 0, 0}; {6, 0, 6, 1, −2, 0, 1, −2, −5, −5, 0, 0}; {4, −3, 2, −4, 4, 5, 5, 2, −5, −5, 0, 0}; {3, −4, 1, −5, 3, 5, 4, 1, −3, −4, 0, 0}; {0, 5, −2, 4, 0, −3, 3, 3, 4, 4, 0, 0}; {2, 5, −4, 0, 6, 4, 5, 1, −3, 2, 0, 0}; {4, −3, 2, −4, 4, 4, −4, −5, 2, 0, 0}; {6, 0, 6, 1, −1, 0, 1, 0, 4, 6, 0, 0}; {3, −4, 1, −5, 4, 5, 5, 1, −1, −4, 0, 0}; {, −5, 1, −5, 2, 0, 0, 1, 0, 4, 6, 0, 0}; {, −1, 3, −5, 0, −3, −3, −4, 4, 0, −3, 0, 0}; {, −2, 2, 6, −1, −4, −3, −5, 3, 0, −3, 0, 0}; {, −5, 1, −5, 2, 1, −5, −3, 0, 1, 2, 0, 0}; {4, −4, 0, 5, 3, −5, 5, −4, 6, 3, 0, 0}; {1, 0, −1, −1, 5, −2, 4, 1, −5, −4, 0, 0}; {5, −1, 5, 0, 1, −5, −2, −3, −5, −3, 0, 0}; {4, −1, 6, 2, 5, 6, 6, −4, 3, 4, 0, 0}; {2, −4, 2, −3, −1, −1, −1, −1, 6, 5, 0, 0}; {, −2, 2, 6, −1, 0, −3, 5, −2, −5, 1, 0, 0}; {1, −5, 1, −4, −1, −2, −2, −1, 5, 5, 0, 0}; {3, −2, 5, 1, 5, 5, 6, −4, 4, 4, 0, 0}; {1, −5, 1, −4, −1, −2, −2, −1, 6, 5, 0, 0}; {2, −3, 4, 0, 4, 4, 5, −5, 4, 4, 0, 0}; {0, 6, 0, −5, −2, −3, −3, −1, 6, 5, 0, 0}; {1, −4, 3, −1, 3, 3, 4, −5, 4, 4, 0, 0}; {, −3, 3, −3, 4, −5, −5, −3, −3, 6, 5, 0, 0}; {, −1, 5, −1, 6, −3, −3, −3, −2, 6, 5, 0, 0}; {0, −5, 2, −2, 2, 3, 5, −5, 2, 2, 0, 0}; {, −4, 0, 4, −3, −1, −5, 4, −3, −5, 0, 0, 0}; {, −1, 5, −1, 6, −2, −4, −4, −1, 6, 6, 0, 0}; {, −2, 4, −2, 5, −3, −5, −4, −2, 5, 5, 0, 0}; {, −2, 4, −2, 5, −3, −5, −4, −2, 6, 6, 0, 0}; {0, 6, 0, −5, −1, −2, −3, 0, 4, 5, 0, 0}; {1, −4, 3, −1, 4, 4, 4, −4, 1, 3, 0, 0}; {, −1, 5, −1, 6, −2, −3, −3, −1, 4, 5, 0, 0}; {3, −2, 5, 1, 6, −2, 0, −2, 2, 3, 0, 0}; {4, −1, 6, 2, −5, −1, 3, 6, 5, 4, 0, 0}; {6, −1, 4, −1, 2, 1, 0, 1, 6, 5, 0, 0}; {6, −1, 4, −1, 2, 1, 0, 1, −5, 6, 0, 0}; {6, 0, 6, 2, 6, 6, −5, −3, 4, 4, 0, 0}; {6, 0, 6, 2, 6, 6, −5, −3, 5, 5, 0, 0}; {0, 6, 0, −4, 0, 3, 6, −4, 6, 4, 0, 0}; {6, 0, 6, 2, −5, 6, −5, −2, 2, 3, 0, 0}; {4, −4, 0, 6, −3, 6, 2, −4, 6, 0, 0, 0}; {3, −3, 3, −1, 4, 4, 6, −4, 2, 3, 0, 0}; {1, 6, −1, 6, −2, −3, −1, −1, 4, 4, 0, 0}; {3, −4, 1, −4, 3, 5, 5, 1, −2, −4, 0, 0}; {1, 6, −1, 6, 2, 3, 4, 0, −2, −4, 0, 0}; {0, 5, −2, 5, 1, 3, 4, 0, −2, −4, 0, 0}; {, −1, 3, −5, 1, −4, −2, −4, 3, −1, −3, 0, 0}; {5, −3, 1, −5, 2, −1, 4, 4, 5, 3, 0, 0}; {3, −5, −1, 5, 1, −1, 5, 3, 5, 2, 0, 0}; {, −2, 2, 6, 0, −4, −4, −4, 4, 0, −3, 0, 0}; {2, −4, 2, −2, −4, −1, −1, −2, 6, −5, 0, 0}; {, −1, 5, −1, −5, 5, −3, −1, −1, 2, 4, 0, 0}; {2, 6, −2, 4, 1, 6, 4, −5, 5, 3, 0, 0}; {2, 6, −2, 4, 1, 6, −5, 5, 1, −1, 0, 0}; {1, 5, −3, 3, 1, 5, 4, 6, 5, 4, 0, 0}; {6, 1, −4, 5, −5, 1, 6, 6, 5, −5, 0, 0}; {4, −2, 4, 0, 1, −5, −2, −3, −5, −3, 0, 0}; {3, −3, 3, −1, 0, 6, −2, −3, −5, −3, 0, 0}; {2, −4, 2, −2, −1, 6, −4, −3, −5, −4, 0, 0}; {, −5, 0, 5, 0, 1, 0, 1, 0, −5, −5, 0, 0}; {, −1, 6, 1, −2, 1, 2, 4, −5, 3, 4, 0, 0}; {4, −1, 6, 3, 6, −1, 5, 5, 4, 5, 0, 0}; {, −3, 1, 5, −1, −1, 4, 2, 6, 4, 1, 0, 0}; {, −4, 2, −4, 4, −5, 6, −4, −3, 5, 5, 0, 0}; {, −4, 2, −4, 4, −5, 6, −4, −2, 5, 5, 0, 0}; {, −5, 1, −5, 3, 6, 5, −5, −3, 5, 5, 0, 0}; {, −5, 1, −5, 3, 6, 5, −4, −3, 4, 4, 0, 0}; {6, −3, 0, 5, 5, 1, −4, 1, −3, 1, 0, 0}; {, −1, 5, −1, −5, −2, −3, −3, −1, 5, 5, 0, 0}; {0, −5, 2, −1, 3, 3, 4, −5, 3, 4, 0, 0}; {0, −5, 2, −1, 3, 3, 5, −5, 3, 3, 0, 0}; {, −5, 1, −5, 3, 6, 6, −4, −3, 5, 4, 0, 0}; {, −1, 5, −1, −5, −2, −2, −3, −1, 5, 5, 0, 0}; {, −1, 6, 1, −2, 2, 3, 4, −5, 2, 3, 0, 0}; {3, −2, 5, 2, 6, −2, 4, 5, 4, 5, 0, 0}; {6, −1, 4, 0, 2, −4, −4, 2, 0, −2, 0, 0}; {, −4, 3, −2, −4, 0, 0, 3, 6, 2, 3, 0, 0}; {1, −4, 3, 1, 5, −4, 1, 5, 3, 3, 0, 0}; {, −3, 2, −5, 3, 6, −2, −3, 4, 1, −1, 0, 0}; {4, −2, 4, 1, 5, 4, 6, −4, 4, 4, 0, 0}; {5, −1, 5, 2, 6, 5, −4, −3, 4, 3, 0, 0}; {5, −1, 5, 2, 6, 6, 6, −3, 4, 4, 0, 0}; {4, −2, 4, 1, 5, 5, 6, −4, 3, 4, 0, 0}; {2, −5, 0, −4, −1, −2, −1, −1, 5, 5, 0, 0}; {2, −4, 2, −1, 3, 3, 5, −5, 3, 4, 0, 0}; {5, 0, −5, 5, −1, 4, −5, 5, 6, 1, 0, 0}; {3, −3, 3, 0, 5, 4, 5, −4, 4, 4, 0, 0}; {, −2, 1, 4, −2, 3, 1, 4, −5, 4, 1, 0, 0}; {0, 4, −4, 3, −3, −4, 1, 1, 3, 0, 0, 0}; {, −5, 1, −5, 4, 0, 2, 2, −5, −3, 2, 0, 0}; {2, −5, 0, −4, 4, 3, −5, −1, 0, 1, 0, 0}; {, −1, 3, −5, 2, −3, −4, −1, 3, 2, 0, 0, 0}; {, −1, 4, −3, 5, 1, 3, 4, −1, −2, −4, 0, 0}; {1, −5, 1, −2, −4, −5, 1, 6, −3, −1, 0, 0}; {, −3, 0, 3, −3, 4, 1, −4, 4, 5, 1, 0, 0}; {, −4, 1, 6, 2, 1, −3, 1, −2, −4, −3, 0, 0}; {3, −3, 3, 0, 0, −5, −2, −3, −5, −3, 0, 0}; {6, 2, −2, −2, 3, −2, 2, 2, 5, 0, 0, 0}; {2, −5, 0, −3, −1, 6, 6, 0, −1, −3, 0, 0}; {, −4, 4, 0, 0, 5, −5, −2, 2, −1, 1, 0, 0}; {4, 1, −2, −1, 6, 1, −5, −3, 0, −3, 0, 0}; {3, −1, −5, −5, 1, −4, 0, 1, 3, −1, 0, 0}; {2, −5, 0, −3, 0, 6, 6, 1, −1, −3, 0, 0}; {4, −1, 6, 5, −2, −2, 2, 5, 2, 2, 0, 0}; {3, −1, −5, −5, 2, −4, 0, 1, 3, −1, 0, 0}; {1, −4, 3, 2, −4, 1, 5, 4, 5, 0, 0, 0}; {1, −3, 5, 5, 0, 6, −1, 2, 3, −2, 0, 0}; {2, −2, 6, 6, 1, −4, 0, 1, 3, −1, 0, 0}; {0, −5, 2, 1, −5, 1, 4, 4, 5, 1, 0, 0}; {, −1, −5, 3, 3, −1, 5, −2, −1, 2, −2, 0, 0}; {, −2, 5, 0, −1, 6, 0, 3, 3, 5, 0, 0, 0}; {, −1, 4, −3, 6, 0, −3, 6, 6, −1, 1, 0, 0}; {, −4, 4, 0, 0, −2, 2, −2, 2, 4, −4, 0, 0}; {, −5, 3, −1, −1, −3, 2, −2, 2, 4, −3, 0, 0}; {6, 1, −4, −5, 4, −3, 4, 6, 6, −1, 0, 0}; {, −3, 1, 5, 1, −4, 6, −2, 2, 2, 0, 0, 0}; {, −1, 4, −3, 6, 2, 1, 6, −3, 0, −1, 0, 0}; {, −2, 3, −4, 5, 1, 0, 6, −3, 0, −1, 0, 0}; {, −4, 0, 4, 0, −5, 6, −2, 2, 1, 0, 0, 0}; {2, 4, 6, 0, −5, 3, 5, −3, 4, 1, 0, 0}; {6, −1, 4, 1, 0, −5, −1, −2, −4, −3, 0, 0}; {5, 5, 5, −2, 6, 2, 6, −4, 3, 6, 0, 0}; {2, −2, 6, −5, 0, −4, 0, 1, 4, 0, 0, 0}; {, −4, −3, −2, 4, 2, −4, 2, −3, 0, 4, 0, 0}; {1, −4, 3, 3, −5, −4, 0, 4, 1, 2, 0, 0}; {0, −5, 2, 2, −5, 1, 4, 5, 6, 1, 0, 0}; {, −1, 6, 1, 1, 6, 0, 3, 5, 5, 0, 0, 0}; {, −2, 4, −2, −3, 1, 6, −3, −5, −5, 1, 0, 0}; {, −1, 6, 1, 1, 6, 0, 4, 4, 6, 0, 0, 0}; {0, −4, 4, 5, −1, 6, −1, 0, 3, −1, 0, 0}; {, −3, 4, −1, −1, 4, −2, 2, 4, 4, −1, 0, 0}; {, −3, 4, −1, −1, 4, −1, 3, 4, 4, 0, 0, 0}; {, −2, 5, 0, 0, 5, 0, 3, 3, 5, −1, 0, 0}; {, −1, 6, 1, 1, 6, 1, 4, 4, 6, 1, 0, 0}; {0, −4, 4, 5, −1, −5, −1, 1, 2, −1, 0, 0}; {6, 2, −2, −1, 5, 5, −1, 3, −1, −1, 0, 0}; {, −3, 4, −1, −1, 5, −2, 3, 3, 4, −1, 0, 0}; {, −3, 4, −1, −1, 5, −1, 3, 3, 5, 0, 0, 0}; {, −2, 6, 2, 3, −2, 5, −2, 0, 2, −2, 0, 0}; {, −4, 3, −2, −2, 4, −2, 2, 3, 4, 0, 0, 0}; {, −4, 3, −2, −2, 4, −2, 3, 3, 5, −1, 0, 0}; {, −4, 2, −4, −5, 0, 5, −5, −5, −4, 2, 0, 0}; {6, 0, 6, 5, −2, 4, 6, 6, −5, 1, 0, 0}; {, −5, 2, −3, −3, 3, −2, 2, 2, 4, −1, 0, 0}; {, −4, 3, −2, −2, 5, −2, 2, 3, 5, 0, 0, 0}; {, −5, 2, −3, −3, 4, −3, 2, 2, 5, −1, 0, 0}; {, −5, 2, −3, −3, 4, −2, 1, 2, 4, −1, 0, 0}; {5, −1, 5, 4, −2, 3, 6, 5, 6, 0, 0, 0}; {6, 0, 6, 5, −1, 4, −5, −5, −5, 1, 0, 0}; {6, 1, −4, −4, 3, −3, 1, 2, 4, −1, 0, 0}; {6, 1, −4, −4, 3, −3, 1, 3, 4, −1, 0, 0}; {6, 1, −4, −4, 3, −2, 1, 2, 5, −1, 0, 0}; {, −2, 1, 4, 0, 5, 1, 6, 4, 4, 4, 0, 0}; {1, −5, 1, 0, −4, 1, −4, −4, −4, 1, 0, 0}; {, −3, 1, 5, 2, −3, 6, −2, 1, 2, 1, 0, 0}; {0, 2, 4, −1, 5, 2, −3, 4, 6, 1, 0, 0}; {, −5, 1, −5, 6, 6, 2, −5, 6, 5, −4, 0, 0}; {2, 0, −2, 2, −5, −2, 3, −3, 6, −1, 0, 0}; {, −1, −5, 3, 5, −2, 6, −2, 1, 2, −2, 0, 0}; {, −5, 1, −5, −5, −1, 4, −4, −5, −5, 1, 0, 0}; {, −5, 2, −3, −2, 3, −3, 2, 3, 4, −1, 0, 0}; {, −4, 3, −2, −1, 4, −1, 2, 3, 5, 0, 0, 0}; {5, −1, 5, 5, −2, 4, 6, 6, 6, 1, 0, 0}; {3, −4, 1, 0, 4, −3, −2, −3, −3, 2, 0, 0}; {, −2, 4, −2, −2, 3, 1, 6, −4, 3, 1, 0, 0}; {2, −4, 2, 2, −3, −1, 6, 4, −3, −1, 0, 0}; {, −1, 5, −1, −1, 6, −1, −4, −5, −5, 0, 0, 0}; {, −4, 1, 6, 5, −1, 3, 0, −2, −3, 1, 0, 0}; {, −5, 1, −5, −5, 2, −4, 6, 6, 6, −1, 0, 0}; {, −4, 1, 6, 5, 0, 4, −1, −2, −3, 1, 0, 0}; {5, −2, 3, 2, −3, 2, −1, −3, −4, 1, 0, 0}; {4, −3, 2, 1, −4, 1, −2, −3, −5, 0, 0, 0}; {5, −2, 3, 2, −3, 3, −2, −3, −4, 1, 0, 0}; {5, −1, 5, 5, 1, −4, 4, 5, 5, −1, 0, 0}; {1, 0, −1, 5, 0, 4, −2, 4, 4, −3, 0, 0}; {3, −1, −5, −2, 3, 6, 2, −1, −2, −1, 0, 0}; {, −1, 5, −1, 0, 4, −1, 4, 4, 4, −1, 0, 0}; {, −4, 1, 6, 6, −1, 3, 0, −1, −4, 1, 0, 0}; {6, −1, 4, 4, −3, 2, −1, −2, −5, 1, 0, 0}; {5, −2, 3, 3, −4, 2, −1, −2, −4, 1, 0, 0}; {6, −1, 4, 4, −3, 3, −1, −3, −4, 1, 0, 0}; {6, −1, 4, 4, −3, 3, −1, −2, −4, 1, 0, 0}; {6, 0, 6, −5, 1, −4, 5, 5, 5, −1, 0, 0}; {, −5, 1, −5, −4, 2, −3, 6, −5, 6, 0, 0, 0}; {4, −3, 2, 2, −5, 2, −2, −3, −5, 0, 0, 0}; {5, −2, 3, 3, −4, 3, −2, −2, −5, 1, 0, 0}; {6, −1, 4, 4, −2, 2, −1, −3, −4, 0, 0, 0}; {6, 0, 6, −5, 2, −4, 6, 6, 5, −1, 0, 0}; {5, −2, 3, 3, −3, 2, −2, −2, −4, 1, 0, 0}; {2, 6, −2, −3, 2, −5, 2, 0, −2, 2, 0, 0}; {4, −3, 2, 2, −4, 2, −2, −3, −4, 0, 0, 0}; {3, −4, 1, 1, −5, 1, −3, −3, −5, 0, 0, 0}; {4, −3, 2, 2, −4, 2, −3, −3, −5, 1, 0, 0}; {3, −4, 1, 1, −5, 2, −3, −3, −4, 1, 0, 0}; {2, 6, −2, −3, 3, −5, 2, 0, −2, 2, 0, 0}; {3, −4, 1, 1, −4, 1, −3, −4, −4, 0, 0, 0}; {2, −5, 0, 0, −5, 0, −3, −4, −5, −1, 0, 0}; {2, −5, 0, 0, −5, 0, −3, −4, −5, 0, 0, 0}; {0, 4, −4, −5, 1, 5, 1, −1, −2, 1, 0, 0}; {1, 6, −1, −1, 6, −1, −4, −4, 6, −1, 0, 0}; {2, −5, 0, 0, −5, 0, −3, −3, −5, 1, 0, 0}; {0, 4, −4, −5, 1, 5, 2, 0, −3, 2, 0, 0}; {3, −4, 1, 1, −4, 2, −2, −4, −4, 1, 0, 0}; {0, 4, −4, −5, 1, 6, 1, 0, −3, 1, 0, 0}; {1, 6, −1, −1, 6, 0, −4, −4, 6, 0, 0, 0}; {2, −4, 2, 3, −1, 6, 3, 5, 5, −1, 0, 0}; {1, 6, −1, −1, 6, 0, −3, −5, −5, 0, 0, 0}; {0, 5, −2, −2, 5, −1, −4, −5, 6, −1, 0, 0}; {, −1, 4, −3, −3, 5, 4, 0, −4, −1, −2, 0, 0}; {, −2, 2, 6, 5, 0, 4, 0, −1, −4, 0, 0, 0}; {6, 4, 2, −4, 0, −4, 0, 1, 2, −5, 0, 0}; {, −5, 5, 3, −3, 2, −2, 0, 0, 6, −3, 0, 0}; {, −3, −5, 5, −1, 5, −3, 6, 3, −5, −2, 0, 0}; {4, 0, −4, 0, 5, 6, 2, −2, −1, 0, 0, 0}; {3, −1, −5, −1, 4, 6, 2, −2, −2, 0, 0, 0}; {1, −3, 5, −3, 4, −4, 0, 2, −2, −2, 0, 0}; {2, −5, 0, 1, 6, 0, −3, −3, −5, 0, 0, 0}; {1, 5, −3, −3, 1, −5, 2, 1, −2, 2, 0, 0}; {, −4, 4, 0, 4, 1, 3, −2, 0, −5, −4, 0, 0}; {0, 4, −4, −4, 1, 6, 1, −1, −3, 1, 0, 0}; {1, 6, −1, 0, 6, 0, −3, −4, −5, 0, 0, 0}; {0, 5, −2, −1, 5, −1, −4, −4, −5, −1, 0, 0}; {, −2, 2, 6, 6, −1, 4, 0, −1, −3, 1, 0, 0}; {, −1, 4, −3, −2, 4, −1, −5, −4, −5, 0, 0, 0}; {, −3, 1, 5, 5, −2, 4, 0, −1, −3, 1, 0, 0}; {, −4, −1, 2, 1, 6, −1, 5, 3, 0, 3, 0, 0}; {, −4, 1, 6, −5, 2, 2, −2, −5, −2, −2, 0, 0}; {, −1, 3, −5, −5, 1, 5, 1, −1, −3, 1, 0, 0}; {0, 5, −2, −1, 6, −1, −4, −5, −5, −1, 0, 0}; {, −3, 1, 5, 5, −1, 4, 0, −1, −3, 1, 0, 0}; {6, −2, 2, 2, −3, 2, −2, −2, −5, 0, 0, 0}; {4, −3, 2, 4, 0, 0, −3, 6, −2, −3, 0, 0}; {3, 0, −3, 3, −4, 3, 2, 2, −5, −1, 0, 0}; {4, −1, 6, −2, 1, −3, −2, 4, 3, −2, 0, 0}; {1, −3, 5, −2, 3, 4, 1, −3, −2, 0, 0, 0}; {, −3, 4, −1, 3, −4, −4, 5, 0, 0, 1, 0, 0}; {0, −4, 4, −3, 3, 4, −1, −1, −3, 0, 0, 0}; {3, 0, −3, 3, −2, −1, −5, −3, 6, −2, 0, 0}; {, −5, 0, 5, −5, 1, −4, 5, −5, 6, −1, 0, 0}; {, −3, 3, −3, 0, −5, −4, −5, 4, −4, −4, 0, 0}; {5, −4, −1, −1, 4, −3, 4, 2, −1, 2, 0, 0}; {6, 2, −2, 3, 1, 2, −3, −1, 6, −4, 0, 0}; {, −2, 4, −2, 1, −3, −3, −5, 5, −3, −4, 0, 0}; {, −5, 1, −5, −2, 6, −5, 4, 3, −4, −3, 0, 0}; {, −4, 2, −4, −1, −5, −4, 6, 4, −4, −4, 0, 0}; {6, 0, 6, −2, 6, 6, 5, 3, −5, −5, 0, 0}; {6, 1, −4, 1, −1, 0, 0, −1, 5, 6, 0, 0}; {6, 0, 6, −2, −5, −5, 5, 3, −4, −4, 0, 0}; {5, −1, 5, −3, 6, 6, 4, 3, −5, −4, 0, 0}; {5, −1, 5, −3, 6, 6, 4, 3, −4, −4, 0, 0}; {5, −1, 5, −3, 6, −5, 5, 3, −5, −5, 0, 0}; {4, −2, 4, −4, 5, 6, 4, 2, −5, −5, 0, 0}; {6, 3, 0, −5, −5, −1, 4, −1, 3, −1, 0, 0}; {5, −1, 5, −3, 6, −5, 4, 3, −4, −4, 0, 0}; {6, 1, −4, 1, 0, −1, 0, −1, 5, −5, 0, 0}; {3, −4, 1, 4, 1, −1, −3, 6, −3, −3, 0, 0}; {, −1, 1, 3, 3, −3, 4, −1, −5, 3, 3, 0, 0}; {4, −2, 4, −4, 6, 6, 4, 3, −5, −5, 0, 0}; {1, 6, −1, 2, −1, −2, −4, 5, −3, −4, 0, 0}; {4, −1, 6, −1, −1, −2, −1, −1, 4, 6, 0, 0}; {3, −3, 3, −5, 6, 5, 4, 2, −5, −5, 0, 0}; {1, 6, −1, 2, 1, −3, −5, −2, −3, 2, 0, 0}; {5, 0, −5, 0, 1, 0, −5, −3, 0, 3, 0, 0}; {0, 6, 0, 4, 5, 2, 2, 1, −4, −4, 0, 0}; {, −3, 5, 1, −5, −1, 1, −5, −3, −5, −2, 0, 0}; {2, −2, 6, 0, 4, −2, 2, 3, 4, 4, 0, 0}; {4, 0, −4, 2, 6, 0, 3, 4, 4, 5, 0, 0}; {1, −5, 1, 5, −5, 3, 1, 1, −2, −4, 0, 0}; {, −2, 3, −4, −1, 0, −4, 6, 4, −1, −2, 0, 0}; {2, −2, 6, 0, 4, 4, 4, −4, 0, 3, 0, 0}; {1, −3, 5, −1, 4, 2, 4, −3, 1, 3, 0, 0}; {, −5, 1, −5, −1, 2, 0, 0, 0, −4, −5, 0, 0}; {, −3, 4, −1, 4, −1, 1, 3, 2, 4, 5, 0, 0}; {6, 0, 6, −2, 4, 5, −4, −5, 3, 0, 0, 0}; {, −4, 4, 0, 6, 3, 6, −2, 4, 6, 0, 0, 0}; {, −5, 1, −5, −1, 6, −5, 6, 4, −5, −5, 0, 0}; {6, 0, 6, −2, 5, 6, 5, 3, −5, −5, 0, 0}; {5, 0, −5, 1, −3, −2, 2, 4, −2, 0, 0, 0}; {3, −3, 3, −4, 3, 4, 4, 2, 6, 6, 0, 0}; {3, −3, 3, −4, 3, 5, 5, 2, −5, −5, 0, 0}; {2, −4, 2, −5, 3, 4, 4, 2, 6, 6, 0, 0}; {2, −4, 2, −5, 3, 5, 4, 2, −5, −5, 0, 0}; {4, 0, −4, 3, 1, 5, −4, 3, 5, 0, 0, 0}; {, −2, 4, −2, 3, 0, −4, 4, 3, −1, 0, 0, 0}; {, −4, 3, −2, 4, 2, 2,

−1, 0, 6, −4, 0, 0}; {4, −2, 4, −3, 6, 6, 4, 3, −4, −4, 0, 0}; {3, −3, 3, −4, 5, 5, 3, 3, 6, −5, 0, 0}; {3, −3, 3, −4, 5, 5, 4, 3, −5, −5, 0, 0}; {2, −4, 2, −5, 4, 4, 4, 2, 6, −5, 0, 0}; {5, −1, 5, −2, −5, −5, 4, 3, −4, −4, 0, 0}; {5, −1, 5, −2, −5, −5, 4, 3, −3, −3, 0, 0}; {3, −3, 3, −4, 5, 6, 4, 3, −5, −5, 0, 0}; {, −1, 4, −3, 1, −3, −3, −4, 5, −4, −4, 0, 0}; {0, 6, 0, 5, 2, 3, 3, 1, 6, −5, 0, 0}; {2, −2, 6, 1, 0, 3, −5, 2, 5, −1, 0, 0}; {1, 6, −1, 3, 0, −2, −4, 6, −3, −4, 0, 0}; {, −4, −2, 0, 1, −5, 2, −3, 6, 2, 3, 0, 0}; {2, −4, 2, −5, 5, 4, 4, 2, 6, −5, 0, 0}; {4, −1, 6, 0, −1, 0, −2, −1, 6, −5, 0, 0}; {2, −4, 2, −5, 5, 5, 3, 3, −5, −5, 0, 0}; {, −3, 5, 1, −4, −3, 6, −2, 2, 4, −1, 0, 0}; {0, 6, 0, 5, 5, 3, 2, 2, −4, −4, 0, 0}; {, −2, 3, −4, 0, −1, −4, −5, 5, −3, −4, 0, 0}; {, −1, 5, −1, 4, 4, 3, 3, 1, 6, 6, 0, 0}; {2, −3, 4, −2, 0, 6, −2, −3, −5, −3, 0, 0}; {6, −2, 2, 5, 4, −1, −3, 0, −2, 2, 0, 0}; {1, −3, 5, 0, 3, 3, 4, −4, 0, 3, 0, 0}; {, −5, 1, −5, 0, 2, −1, −1, 4, 3, −2, 0, 0}; {, −3, 3, −3, 2, 4, 1, 1, 1, −4, −5, 0, 0}; {, −4, 2, −4, 1, 3, 0, 0, 1, −4, −4, 0, 0}; {, −1, 6, 1, −5, −2, −4, −3, −1, 3, 4, 0, 0}; {, −3, 4, −1, 5, −4, −5, −5, −1, 1, 4, 0, 0}; {, −4, 2, −4, 1, 3, 1, 0, 1, −4, −5, 0, 0}; {, −3, 3, −3, 2, 4, 2, 1, 2, 6, 6, 0, 0}; {, −5, 1, −5, 0, 2, 0, 0, 0, −5, −5, 0, 0}; {, −5, 1, −5, 0, 2, 0, 0, 0, −4, −5, 0, 0}; {, −4, 3, −2, 4, −4, −5, −5, −2, 5, 5, 0, 0}; {6, 0, 6, −1, 2, 0, 0, 0, −4, −5, 0, 0}; {, −3, 4, −1, 5, −3, −5, −4, −1, 3, 4, 0, 0}; {5, −2, 4, −4, 1, −1, 0, 0, −4, −4, 0, 0}; {, −1, 5, 0, 5, 2, 3, 2, 1, −5, −5, 0, 0}; {, −4, 1, −5, −1, −5, −4, 6, 4, −4, −4, 0, 0}; {6, −1, 5, −3, 5, 6, 5, 2, −4, −5, 0, 0}; {5, −2, 4, −4, 5, 6, 5, 2, −5, −5, 0, 0}; {, −3, 2, −4, 0, −3, −4, 6, 4, −3, −3, 0, 0}; {, −4, 1, −5, −1, −4, −5, 6, 4, −4, −4, 0, 0}; {, −3, 3, −2, 3, 1, 1, 1, 0, 6, −5, 0, 0}; {, −3, 2, −4, 0, −3, −3, 6, 4, −3, −4, 0, 0}; {, −5, 0, 6, −2, −5, −5, 5, 3, −4, −4, 0, 0}; {4, −4, 1, 4, 0, −1, −3, 6, −2, −3, 0, 0}; {6, −1, 5, −3, −5, −5, 5, 3, −4, −5, 0, 0}; {, −3, 2, −4, 0, −2, −3, −5, 4, −4, −4, 0, 0}; {1, 2, 4, 4, −1, 6, 0, −4, 3, 4, 0, 0}; {, −5, 6, 6, 4, −2, 4, −2, 2, 6, −4, 0, 0}; {5, −1, 6, −1, 1, −1, −1, −1, −5, −5, 0, 0}; {5, −1, 6, −1, 1, −1, −1, 0, 6, 6, 0, 0}; {3, −4, 2, 6, −5, 4, 3, 3, −3, −4, 0, 0}; {5, −1, 6, −1, 1, −1, 0, 0, 5, 5, 0, 0}; {1, 6, 0, 4, 6, 4, 1, 6, 5, 0, 0, 0}; {3, −1, −4, 3, −4, −2, 5, −5, 6, −2, 0, 0}; {, −4, 4, 1, −4, 1, −5, −1, 1, 2, 3, 0, 0}; {0, 5, −1, 3, 6, 4, 1, 6, 5, 0, 0, 0}; {3, −1, −4, 3, −3, −1, 6, −4, 6, −2, 0, 0}; {, −3, 3, −2, 3, −4, −5, −4, −3, 6, 6, 0, 0}; {, −5, 0, 6, −1, 3, 1, −2, 5, 3, −1, 0, 0}; {6, −2, 3, −5, −2, −5, 4, −4, 6, 0, 0, 0}; {5, −1, 6, 0, 5, 5, −5, −4, 5, 5, 0, 0}; {, −5, 0, 6, −1, 6, −5, 6, 4, −5, −5, 0, 0}; {5, −2, 4, −3, 5, 6, 5, 2, −3, −4, 0, 0}; {4, −3, 3, −4, 4, 5, 5, 2, −5, −5, 0, 0}; {6, −1, 5, −2, 6, 6, 5, 3, −5, −5, 0, 0}; {5, −2, 4, −3, 6, 6, 5, 3, −5, −5, 0, 0}; {, −5, 1, −4, 2, 0, 2, 0, 0, 5, 5, 0, 0}; {4, −1, −5, 2, 1, 4, −4, 3, 5, 0, 0, 0}; {2, −5, 1, 6, 3, 5, 4, 1, −5, 6, 0, 0}; {0, 5, −1, 4, 1, −3, 5, 4, −1, 0, 0, 0}; {0, −5, 3, −2, −3, −4, −3, 2, 6, −1, 0, 0}; {, −2, 4, −1, 5, 3, 3, 1, 1, −5, −4, 0, 0}; {, −3, 3, −2, 4, 2, 2, 1, 1, 5, 6, 0, 0}; {, −5, 0, 6, −1, −4, −5, 6, 4, −5, −4, 0, 0}; {5, −2, 4, −3, −5, 6, 5, 3, −5, −5, 0, 0}; {3, −4, 2, −5, 5, 4, 4, 2, −5, −4, 0, 0}; {2, −5, 1, 6, 6, 4, 4, 3, −5, 6, 0, 0}; {5, 0, −4, 3, 5, 6, 6, −4, 1, 4, 0, 0}; {, −2, 2, −5, −1, −1, −5, 5, −3, −5, 0, 0, 0}; {1, 6, 0, 5, 6, 3, 3, 2, −3, −4, 0, 0}; {3, −1, −4, 4, −4, 2, 1, 3, −3, 0, 0, 0}; {5, 0, −4, 3, 6, 0, 5, 5, 4, 5, 0, 0}; {1, −5, 2, −4, −1, −3, −3, −1, 6, 6, 0, 0}; {1, −5, 2, −4, −1, −2, −3, −1, 6, 6, 0, 0}; {, −3, 1, 6, −2, −1, −4, 5, −3, −5, 1, 0, 0}; {0, 6, 1, −5, −2, −3, −3, −2, 6, 6, 0, 0}; {, −3, 2, −4, 1, 3, 1, 1, 1, −4, −5, 0, 0}; {3, 0, −2, −5, 1, −5, 2, −4, −2, −1, 0, 0}; {5, 0, −4, 3, −5, 0, 4, 5, 5, 5, 0, 0}; {, −3, 2, −4, 1, 4, 1, −1, 5, 3, −1, 0, 0}; {, −4, 0, 5, −3, −1, −5, 4, −3, −5, 0, 0, 0}; {, −1, 5, 0, 6, −2, −4, −4, −1, 6, 6, 0, 0}; {, −1, 5, 0, 6, −2, −4, −4, −1, −5, −5, 0, 0}; {, −2, 4, −1, 5, −3, −5, −4, −2, 6, 6, 0, 0}; {, −4, 2, −3, 3, −5, −5, −4, −3, 6, 5, 0, 0}; {3, −2, 6, 1, 6, −2, 2, 5, 4, 4, 0, 0}; {6, −2, 3, −4, −2, −5, 3, −4, 6, 0, 0, 0}; {, −4, 2, −3, 4, −4, −5, −5, −2, 4, 5, 0, 0}; {5, −1, 6, 1, 5, 5, 6, −4, 5, 5, 0, 0}; {6, 0, −5, 2, −5, 6, 6, −2, 2, 4, 0, 0}; {4, −4, 1, 6, −3, 6, 3, −4, 6, 0, 0, 0}; {3, −4, 2, −4, 0, −1, −1, 0, 4, 4, 0, 0}; {, −1, 4, −2, 4, −4, −5, −2, −2, 4, 4, 0, 0}; {0, 5, −1, 5, −3, −3, −2, −2, −5, 6, 0, 0}; {, −3, 3, −2, 5, −2, 1, 5, −5, 6, 5, 0, 0}; {5, −1, 6, 1, −5, 6, 6, −2, 1, 3, 0, 0}; {4, −2, 5, 0, 6, 5, 5, −3, 1, 3, 0, 0}; {, −3, 2, −4, 2, −5, −5, −3, −3, 6, 5, 0, 0}; {, −5, 1, −4, 3, −3, −2, 3, 4, 0, 1, 0, 0}; {2, −4, 3, −2, 5, 4, 4, −4, −1, 2, 0, 0}; {2, −4, 3, −2, 5, 5, 5, −3, 0, 3, 0, 0}; {0, 6, 1, −4, 3, 3, 4, −4, −1, 2, 0, 0}; {0, 6, 1, −4, 4, 3, 3, −4, −1, 2, 0, 0}; {4, −3, 3, −3, 5, 5, 5, 3, 6, −5, 0, 0}; {3, −4, 2, −4, 4, 5, 4, 2, −5, −5, 0, 0}; {3, −3, 4, −1, −4, −2, 0, 6, −4, 1, 0, 0}; {1, 6, 0, 6, 2, 4, 4, 0, −4, −5, 0, 0}; {0, 5, −1, 5, 1, 3, 3, 0, −4, −5, 0, 0}; {3, −4, 2, −4, 5, 5, 4, 3, −5, −5, 0, 0}; {, −1, 4, −2, 4, 1, 3, 2, 0, −4, −4, 0, 0}; {, −5, −1, 4, −3, 5, −5, 6, 2, −3, −4, 0, 0}; {, −3, 2, −4, 2, 0, 1, 2, −1, −4, −5, 0, 0}; {, −5, −1, 4, −3, 6, −5, 6, 2, −1, −4, 0, 0}; {0, −5, 3, −1, 0, 4, 5, 5, 0, 2, 0, 0}; {, −1, 3, −4, 1, 0, 4, 2, 6, 5, 2, 0, 0}; {6, −3, 1, 5, 4, 0, −3, 0, −3, 2, 0, 0}; {, −2, 4, −1, 6, −4, −5, −4, −2, 5, 6, 0, 0}; {, −5, −1, 4, −3, −2, −5, 3, −4, 6, 0, 0, 0}; {, −2, 4, −1, 6, −3, −4, −4, −2, 6, 6, 0, 0}; {, −3, 3, −2, 5, −4, −5, −5, −2, 6, 6, 0, 0}; {, −3, 3, −2, 5, −4, −5, −4, −2, 5, 5, 0, 0}; {4, −3, 3, −3, −1, −1, 0, −1, −5, 5, 0, 0}; {, −4, 2, −3, 5, −4, −5, −4, −2, 5, 5, 0, 0}; {6, 0, −5, 3, 6, 6, −5, −3, 5, 4, 0, 0}; {5, −1, 6, 2, 5, 5, 6, −3, 5, 5, 0, 0}; {6, 1, −3, 6, −2, 0, 2, 4, 2, 3, 0, 0}; {4, −2, 5, 1, 4, 5, 6, −4, 5, 4, 0, 0}; {2, 6, −1, 5, −5, 3, 1, 6, 4, −1, 0, 0}; {2, 6, −1, 5, −5, 4, 2, −5, 5, −1, 0, 0}; {4, −2, 5, 1, 5, 4, 5, −4, 5, 5, 0, 0}; {6, 0, −5, 3, −5, 6, −4, −3, 5, 4, 0, 0}; {2, 5, −3, 2, 3, −1, −5, −1, −4, 1, 0, 0}; {4, −2, 5, 1, 5, 5, 6, −4, 5, 4, 0, 0}; {4, −2, 5, 1, 5, 5, −5, −4, 4, 3, 0, 0}; {3, −3, 4, 0, 4, 4, 6, −5, 5, 4, 0, 0}; {2, −4, 3, −1, 3, 4, 5, −5, 4, 4, 0, 0}; {1, −5, 2, −2, 2, 3, 5, −5, 4, 4, 0, 0}; {5, 0, −4, 5, −2, 2, 0, 1, −4, −1, 0, 0}; {, −4, 2, −3, 5, −3, 0, 4, −5, 5, 3, 0, 0}; {, −3, 4, 0, −3, 2, −5, 0, 3, 3, 3, 0, 0}; {, −5, 1, −4, 4, −4, 0, 5, 6, 5, 5, 0, 0}; {, −1, 2, 6, −1, 1, −3, 5, −2, −5, 1, 0, 0}; {0, 4, −3, 3, 6, 3, 0, 6, 4, −1, 0, 0}; {3, −3, 4, 0, 5, 5, 5, −3, 1, 3, 0, 0}; {2, −5, 1, −4, 0, −1, −2, 0, 5, 5, 0, 0}; {1, 6, 0, −5, −1, −2, −2, −1, 5, 5, 0, 0}; {1, 6, 0, −5, −1, −2, −2, −1, 4, 4, 0, 0}; {, −1, 4, −2, 5, −3, −4, −3, −2, 5, 5, 0, 0}; {, −2, 3, −3, 4, −4, −5, −3, −2, 4, 4, 0, 0}; {, −2, 3, −3, 4, −4, −5, −3, −2, 6, 6, 0, 0}; {, −4, 1, −5, 2, 6, 6, −4, −3, 5, 5, 0, 0}; {, −5, 1, −4, 4, −3, 0, 3, −5, 5, 4, 0, 0}; {, −1, 3, −4, 2, 6, 3, 0, 6, 4, 0, 0, 0}; {, −1, 4, −2, 5, −2, −3, −3, −1, 3, 4, 0, 0}; {, −5, 0, 6, 1, 6, 6, −4, −3, 3, 3, 0, 0}; {1, −5, 2, −2, 5, −5, 1, 2, −2, 0, 0, 0}; {5, −2, 4, −1, 5, 5, −5, −4, 5, 5, 0, 0}; {1, 5, −2, 4, −3, −4, −1, −2, 5, 3, 0, 0}; {2, 6, −1, 5, −1, −2, −1, −1, −4, −5, 0, 0}; {1, 5, −2, 4, −2, −3, −1, −1, 4, 3, 0, 0}; {1, 6, 0, −5, 2, 2, 6, 6, 1, 1, 0, 0}; {1, 5, −2, 4, −2, −2, −3, 4, 1, −2, 0, 0}; {, −1, 4, −2, 5, 0, 3, 3, 0, 6, 6, 0, 0}; {3, −5, 0, 6, 0, −2, 0, 0, 4, 3, 0, 0}; {1, 5, −2, 4, −2, −4, −1, −2, 4, 3, 0, 0}; {, −3, 1, 6, 0, −5, −5, −2, −3, 4, 1, 0, 0}; {, −3, 0, 4, −3, 3, 2, 1, −5, 3, −1, 0, 0}; {, −2, 2, −5, 1, −4, −3, −4, 3, 0, −3, 0, 0}; {, −3, 2, −4, 3, −1, 2, 3, −1, −3, −4, 0, 0}; {0, 5, −1, 6, 3, 4, 3, 3, 6, 6, 0, 0}; {, −5, 0, 6, 1, −2, 0, 1, −2, −4, −5, 0, 0}; {, −5, 0, 6, 1, −2, 0, 3, 2, 3, 5, 0, 0}; {, −5, −1, 4, −2, 6, −5, 6, 3, −1, −3, 0, 0}; {6, −2, 3, −3, 5, −5, 6, 2, −2, −4, 0, 0}; {, −2, 1, 5, −2, 6, −3, −3, −2, 6, 3, 0, 0}; {, −2, 1, 5, −2, −5, −2, −4, −2, −4, 4, 0, 0}; {, −3, 0, 4, −3, 6, −3, −4, −3, −5, 4, 0, 0}; {, −1, 5, 0, −4, −4, 2, 6, −3, −1, 1, 0, 0}; {, −3, 0, 4, −3, 6, −2, −4, −2, −4, 4, 0, 0}; {, −4, −1, 3, −4, 5, −3, −5, −3, −5, 4, 0, 0}; {, −2, 3, −3, 4, 4, −3, −3, 1, 2, 2, 0, 0}; {, −4, −1, 3, −4, 6, −3, −5, −3, −5, 3, 0, 0}; {, −1, 5, 0, −4, −3, 3, 5, −3, 0, −1, 0, 0}; {, −5, −2, 2, −5, 5, −4, −5, −3, 6, 3, 0, 0}; {0, 6, 1, −3, −2, 4, −4, −4, 6, −4, 0, 0}; {6, −3, 1, 6, 4, −4, 6, −3, 6, 3, 0, 0}; {0, 6, 1, −3, −2, 5, −4, −4, 6, −4, 0, 0}; {, −2, 4, −1, −5, −3, 3, −5, −5, 6, −5, 0, 0}; {3, 6, −2, 4, 3, −5, 5, −5, 6, 2, 0, 0}; {4, −4, 1, −4, −4, 1, 0, 4, 3, 0, 0, 0}; {2, 5, −3, 3, 2, 6, 5, −5, 6, 3, 0, 0}; {3, 1, 0,

1, −5, 0, 5, 2, −4, −4, 0, 0}; {4, −3, 3, −1, 1, 2, −1, 0, 6, 5, 0, 0}; {, −2, 1, 5, −1, 0, −4, 4, −3, 6, 0, 0, 0}; {, −4, −2, 1, 6, 6, 2, −3, 1, −3, 2, 0, 0}; {, −3, 0, 4, −2, −1, −4, 4, −3, 6, 0, 0, 0}; {5, 0, −4, 6, −1, 0, 2, 5, 1, 2, 0, 0}; {1, −5, 2, −1, 3, 3, 5, −5, 4, 4, 0, 0}; {2, −3, 5, 3, −4, −3, 0, 3, 2, 2, 0, 0}; {, −1, 4, −2, 6, −3, −4, −2, −2, 6, 5, 0, 0}; {, −2, 3, −3, 5, −4, −4, −4, −2, 6, 5, 0, 0}; {, −1, 5, 0, −3, 1, 2, 4, 6, 3, 4, 0, 0}; {, −4, −1, 3, −3, −1, −5, 3, −4, 5, 0, 0, 0}; {0, 6, 1, −2, 3, 3, 5, −5, 4, 4, 0, 0}; {, −2, 3, −3, 5, −3, −4, −3, −2, 6, 5, 0, 0}; {5, −3, 2, −3, 0, −1, 0, 0, 6, 5, 0, 0}; {2, −4, 3, 0, 6, −2, −1, −2, 2, 3, 0, 0}; {, −2, 4, −1, −4, 2, 2, 3, −5, 0, 2, 0, 0}; {6, −2, 3, −2, 4, −5, −5, 2, 0, −2, 0, 0}; {, −5, −1, 4, −1, 6, −5, −5, 2, 0, −3, 0, 0}; {, −5, −1, 4, −1, 6, −5, −5, 2, 0, −2, 0, 0}; {5, −4, 0, 6, 0, 0, 0, 5, 3, 0, 0, 0}; {6, −2, 3, −2, 5, −5, 6, 2, −1, −3, 0, 0}; {, −4, 2, −3, 6, 3, −5, −3, −3, 1, 3, 0, 0}; {4, −4, 1, −4, 3, 6, 6, 1, −1, −3, 0, 0}; {4, −4, 1, −4, 4, 5, 6, 1, −1, −3, 0, 0}; {3, −5, 0, −5, 3, 5, 5, 0, −2, −4, 0, 0}; {, −3, −1, 2, −5, 1, 4, 1, −5, 4, 1, 0, 0}; {, −1, 4, −2, 6, 4, −3, −1, 0, 2, 3, 0, 0}; {, −4, 0, 5, 0, −2, 3, 2, 4, 4, 4, 0, 0}; {6, −3, 1, −5, 4, −4, 6, −4, −5, 4, 0, 0}; {, −5, −1, 4, −1, −3, 2, 1, 4, 4, 3, 0, 0}; {5, −5, −2, 3, −1, 2, 0, 0, −3, 5, 0, 0}; {4, 6, −3, 2, −2, 1, −1, 0, −3, 5, 0, 0}; {5, −4, 0, 6, 3, −5, 6, −3, 6, 3, 0, 0}; {6, 0, −5, 4, 4, −1, 3, −4, −3, 0, 0, 0}; {4, −5, −1, 5, 3, −5, 5, −4, 6, 3, 0, 0}; {, −2, 3, −3, 5, 5, −1, 2, −1, −3, −1, 0, 0}; {, −2, 4, −1, −4, −3, 4, −4, −5, 6, −3, 0, 0}; {5, −2, 4, 0, 0, −5, −1, −2, −5, −3, 0, 0}; {6, −1, 5, 1, 1, −4, −1, −2, −5, −2, 0, 0}; {5, −1, 6, 4, −4, 2, 3, −2, −4, −3, 0, 0}; {, −1, 4, −2, −5, −2, 5, 5, −1, −3, −3, 0, 0}; {, −1, 4, −2, −5, −2, 5, 5, 0, −2, −3, 0, 0}; {, −3, 4, 0, −1, 5, −1, 3, 3, 5, 0, 0, 0}; {, −2, 3, −3, 6, −2, 5, 5, 0, −2, −3, 0, 0}; {4, −4, 1, −3, 0, −5, 6, 1, −1, −3, 0, 0}; {6, −3, 1, −4, −2, 5, 1, 6, 3, −1, 0, 0}; {6, −3, 1, −4, −2, 5, 1, −5, 3, 0, 0, 0}; {, −3, 3, −2, −4, 1, 1, 3, 6, 3, 3, 0, 0}; {, −3, 3, −2, −4, 1, 1, 3, 6, 3, 4, 0, 0}; {, −4, 2, −3, −5, 0, 0, 2, 5, 3, 3, 0, 0}; {, −5, 2, −2, −3, 4, −2, 2, 2, 4, 0, 0, 0}; {3, 6, −2, 5, −4, 2, −1, 5, 2, −1, 0, 0}; {, −3, 3, −2, −4, 3, −5, −3, −4, 1, 2, 0, 0}; {2, 6, −1, −5, 3, 4, 5, 0, −1, −3, 0, 0}; {5, −4, 0, −5, 4, −4, 5, −5, −5, 4, 0, 0}; {3, 5, −4, 2, −2, 1, −1, −1, −3, 5, 0}; {1, 3, 6, 0, −4, 0, −3, −2, −4, 5, 0, 0}; {4, 6, −3, 4, 3, −1, 6, −1, 6, 0, 0, 0}; {, −4, 3, −1, −1, 4, −1, 3, 3, 5, 0, 0, 0}; {2, 4, −5, 2, 2, −3, 4, −3, 5, 0, 0, 0}; {, −1, 6, 2, 2, −5, −5, −1, 3, 1, 2, 0, 0}; {, −1, 6, 2, 2, −5, −4, −1, 3, 0, 2, 0, 0}; {, −3, 3, −2, −3, 1, 1, 4, −5, 3, 2, 0, 0}; {6, 0, −5, 6, −1, 4, −5, 6, −5, 2, 0, 0}; {, −5, 2, −2, −2, 4, −2, 2, 3, 5, 0, 0, 0}; {3, −3, 4, 3, −4, 3, 6, 6, 6, 2, 0, 0}; {, −1, 6, 2, 2, −4, −5, 0, 4, 0, 0, 0, 0}; {2, −3, 5, 5, 0, −5, −1, 0, 3, −2, 0, 0}; {1, −5, 2, 1, −5, 1, 5, 5, 6, 0, 0, 0}; {, −1, 4, −2, −4, 1, −4, −4, 6, −4, 0, 0, 0}; {5, −3, 2, −1, 6, 4, −4, 0, 1, 0, 0, 0}; {4, −1, −5, −4, 1, −4, 0, 3, 3, −2, 0, 0}; {3, −2, 6, −5, 0, −5, 0, 2, 3, −2, 0, 0}; {6, 1, −3, −2, 3, 4, −3, 2, 0, 1, 0, 0}; {4, −1, −5, −4, 2, −4, 0, 2, 3, −1, 0, 0}; {0, 6, 1, 1, 6, 0, 4, 4, 5, 0, 0, 0}; {, −1, 5, 0, 0, 5, 0, 3, 4, 5, −1, 0, 0}; {, −4, 3, −1, 0, 6, 5, −1, 3, 0, 0, 0, 0}; {0, 6, 1, 1, −5, 1, 4, 5, 5, 0, 0, 0}; {, −3, 2, −4, −5, 0, 5, −4, −5, −5, 1, 0, 0}; {, −1, 5, 0, 0, 6, 1, 3, 4, 6, 0, 0, 0}; {, −4, 1, −5, 6, −1, 5, −5, −5, −5, 1, 0, 0}; {5, −1, 6, 6, 1, −4, 5, 6, 5, −1, 0, 0}; {3, −4, 2, 1, −4, 1, −3, −3, −5, 0, 0, 0}; {1, 6, 0, −1, 6, −1, −3, −4, −5, 0, 0, 0}; {2, −4, 3, 3, −1, 6, 4, 5, 4, −2, 0, 0}; {1, 5, −2, −4, 3, −5, 1, 0, −1, 2, 0, 0}; {0, 5, −1, −2, 6, −1, −3, −5, −5, 0, 0, 0}; {, −1, 4, −2, −3, 5, −1, −5, −5, −5, 0, 0, 0}; {6, −5, −3, 5, 0, 4, 1, −2, −2, 5, 0, 0}; {, −3, −5, 6, −1, 5, −4, 1, −5, 5, −2, 0, 0}; {2, −3, 5, −5, −1, 1, −5, 2, 0, 1, 0, 0}; {4, −1, −5, −3, 1, 5, 1, 0, 0, −3, 0, 0}; {6, 2, −1, 2, −4, 0, −4, −3, −3, −4, 0, 0}; {, −4, 2, −3, −2, 3, −2, 2, 3, 4, −1, 0, 0}; {5, −1, 6, −5, 1, −5, 6, −5, 5, 0, 0, 0}; {2, −5, 1, 1, 6, 1, −2, −3, −5, 0, 0, 0}; {, −5, 1, −4, −3, 3, −1, 1, 3, 4, −1, 0, 0}; {, −3, 1, 6, 5, −2, 5, 0, −3, −3, 2, 0, 0}; {2, −5, 1, 1, −5, 0, −2, −4, −5, 0, 0, 0}; {2, −4, 3, 4, −1, 6, 4, 5, 4, −1, 0, 0}; {0, 5, −1, −1, 5, −1, −3, −4, 6, 0, 0, 0}; {1, −5, 2, 3, −2, 6, 2, 4, 4, −1, 0, 0}; {0, 5, −1, −1, 5, 0, −4, −4, 6, 0, 0, 0}; {, −1, 4, −2, −2, 4, −1, −4, −5, −5, 0, 0, 0}; {, −2, 3, −3, −3, 3, −2, −5, −5, 6, −1, 0, 0}; {, −3, 1, 6, 5, −1, 5, 0, −1, −3, 1, 0, 0}; {0, 5, −1, −1, 6, −1, −4, −4, −5, 0, 0, 0}; {, −2, 2, −5, 6, 0, 4, 1, −1, −3, 1, 0, 0}; {0, 5, −1, −1, 6, 0, −4, −5, −5, 0, 0, 0}; {, −1, 4, −2, −2, 5, −1, −4, −5, −5, 0, 0, 0}; {, −3, 1, 6, 5, −1, 4, 0, −1, −4, 1, 0, 0}; {, −3, 2, −4, −4, 3, −3, −5, −5, 6, −1, 0, 0}; {, −4, 0, 5, 4, −1, 4, −1, −1, −3, 1, 0, 0}; {, −3, 2, −4, −4, 4, −2, 6, −5, −5, 0, 0, 0}; {, −4, 0, 5, 4, −1, 4, 0, −2, −3, 1, 0, 0}; {, −5, −1, 4, 3, −2, 3, −1, −2, −4, 1, 0, 0}; {, −5, 0, 6, 6, 2, −4, 6, 6, 5, −2, 0, 0}; {4, −4, 1, 1, −4, 1, −2, −3, −5, 0, 0, 0}; {6, 3, 1, 6, −1, 2, −2, 6, −3, −1, 0, 0}; {4, 2, 1, −5, 2, 6, −1, 5, 4, −3, 0, 0}; {3, 1, 0, 6, 1, 5, −1, 4, 4, −3, 0, 0}; {0, −5, 3, 6, −2, −1, 5, 1, 0, 1, 0, 0}; {4, 1, −1, 4, −2, 1, −3, 5, −4, −2, 0, 0}; {2, −2, −5, −1, 4, 6, 1, −3, −2, 0, 0, 0}; {2, −2, −5, −1, 4, 6, 1, −3, −1, 0, 0, 0}; {0, −4, 5, −3, 2, 5, 0, −3, −3, −1, 0, 0}; {, −2, 5, 1, 4, −4, −2, 5, 1, 0, 0, 0, 0}; {3, 0, −2, 3, −3, −1, 4, −4, −5, −1, 0, 0}; {, −4, 1, −5, −4, 1, −3, 6, −5, 6, −1, 0, 0}; {, −2, 2, −5, −5, −1, 5, 1, 0, −3, 2, 0, 0}; {, −3, 2, −4, −3, 3, −2, 6, −5, 6, 0, 0, 0}; {, −3, 2, −4, −3, 3, −2, −5, 6, 5, −1, 0, 0}; {, −4, 0, 5, 5, −2, 4, 0, −2, −3, 1, 0, 0}; {, −4, 0, 5, 5, −2, 4, 0, −1, −4, 1, 0, 0}; {, −3, 2, −4, −3, 3, −2, −5, −5, 6, −1, 0, 0}; {5, −4, 0, −1, 3, −3, 4, 2, −1, 2, 0, 0}; {, −3, 2, −4, −3, 3, −3, −5, −4, 6, 0, 0, 0}; {, −5, −1, 4, 4, −2, 3, −1, −3, −4, 0, 0, 0}; {, −5, −1, 4, 4, −2, 3, −1, −2, −4, 0, 0, 0}; {6, −2, 3, 3, −3, 2, −2, −3, −4, 0, 0, 0}; {, −5, −1, 4, 4, −2, 3, 0, −2, −4, 1, 0, 0}; {6, −2, 3, 3, −3, 3, −2, −2, −4, 1, 0, 0}; {4, −5, −1, −2, 3, −4, 3, 1, −1, 2, 0, 0}; {5, −3, 2, 2, −4, 2, −2, −2, −4, 0, 0, 0}; {6, −1, 5, 6, 1, −4, 5, 6, 6, −1, 0, 0}; {4, −4, 1, 1, −5, 1, −2, −3, −4, 0, 0, 0}; {4, −5, −1, −2, 3, −3, 3, 2, −1, 2, 0, 0}; {, −4, 0, 5, 5, −1, 3, 0, −1, −4, 1, 0, 0}; {1, −2, −4, 2, −5, −2, 4, −5, 6, −2, 0, 0}; {0, −3, −5, 1, 6, −3, 3, −5, 6, −2, 0, 0}; {1, −1, −2, 5, −1, 4, −1, 2, 3, −5, 0, 0}; {, −1, −5, 4, −3, 2, 4, 0, −4, −2, 0, 0, 0}; {, −2, 5, 1, 5, −3, −2, 5, 1, 0, 0, 0, 0}; {, −2, 6, 3, −4, 1, 3, −1, −4, −3, −1, 0, 0}; {, −2, 6, 3, −4, 1, 3, −1, −4, −2, 0, 0, 0}; {, −2, 6, 3, −4, 1, 3, 0, −4, −2, 0, 0, 0}; {0, −3, −5, 1, −5, −2, 4, −5, −5, −1, 0, 0}; {, −3, 3, −2, 1, 4, 5, −2, 5, 3, 2, 0, 0}; {, −2, −5, 5, −1, 5, −3, 5, 4, −5, −2, 0, 0}; {5, 1, −2, 3, −4, 0, −4, −5, −5, −3, 0, 0}; {6, 1, −3, 1, 6, −5, 3, −1, −1, 0, 0, 0}; {, −5, 3, 0, 5, −1, 1, −2, −5, −3, −1, 0, 0}; {, −2, −4, −5, 2, −2, 3, −1, 2, 5, −3, 0, 0}; {, −4, 5, 3, −3, 4, −4, 4, 6, 6, −4, 0, 0}; {6, 2, −1, 4, −2, 1, −4, −3, −4, −3, 0, 0}; {4, −1, −5, −1, 5, 5, 0, 1, −2, −1, 0, 0}; {, −4, 5, 3, −3, 5, −4, 4, 6, 5, −4, 0, 0}; {5, −3, 2, 3, −5, −5, 6, 2, −2, 2, 0, 0}; {5, −2, 4, 6, −1, 0, 1, −1, 6, 1, 0, 0}; {4, −4, 1, 2, −5, 1, −3, −3, −5, 0, 0, 0}; {2, 5, −3, −3, 1, −5, 2, 1, −2, 2, 0, 0}; {2, −2, −5, 0, −3, −1, −4, −2, 5, −5, 0, 0}; {3, −3, 4, −4, 4, 5, 3, 2, −5, −5, 0, 0}; {3, −3, 4, −4, 5, 5, 4, 2, −5, −5, 0, 0}; {1, −3, 6, 0, −1, 3, −5, 2, 5, 0, 0, 0}; {0, −4, 5, −1, −2, 2, −5, 1, 4, 0, 0, 0}; {2, −4, 3, −5, 5, 5, 2, 2, −4, −4, 0, 0}; {0, 5, −1, 2, −1, −2, −5, 5, −3, −4, 0, 0}; {, −1, 4, −2, 1, −2, −2, −5, 5, −3, −4, 0, 0}; {1, −4, 4, −3, −3, −2, −4, −2, 5, 6, 0, 0}; {, −2, −5, 5, 0, 4, −2, 4, 3, 5, −3, 0, 0}; {5, 1, −2, 4, −5, 1, 6, 6, 5, −3, 0, 0}; {6, −1, 5, −4, −4, 1, −3, 5, 4, 0, 0, 0}; {, −5, 0, 6, −3, −3, 6, 5, 4, −3, −5, 0, 0}; {, −2, −5, 5, 0, 5, −4, 2, 6, 5, −2, 0, 0}; {, −2, −5, 5, 0, 5, −4, 3, 6, 5, −3, 0, 0}; {, −1, −4, 6, 1, 6, −1, 5, 4, −4, −1, 0, 0}; {, −2, 5, 1, 6, −3, 3, −4, −5, 6, −5, 0, 0}; {5, −3, 2, 4, 4, −5, 4, −3, 6, 3, 0, 0}; {, −3, 4, 0, 5, −4, 3, 6, 6, 5, 6, 0, 0}; {, −5, 2, −2, 3, −5, −4, 4, 0, 0, −1, 0, 0}; {, −4, 5, 3, −2, 4, −4, 4, 3, 6, −2, 0, 0}; {6, 2, −1, 5, −2, 1, −4, −4, −5, −2, 0, 0}; {4, −1, −5, 0, 4, 6, 0, −1, −3, 0, 0, 0}; {4, −2, 5, −3, 0, 1, −4, 3, 2, 1, 0, 0}; {3, −1, −4, 2, −5, −1, 6, 6, 6, −4, 0, 0}; {, −5, 4, 2, −3, 4, −5, 3, 5, 5, −3, 0, 0}; {3, −2, 6, −1, 5, 5, 0, −1, 0, 2, 0, 0}; {4, 0, −3, 3, −2, −1, −3, 6, −4, −1, 0, 0}; {3, −4, 3, 6, 1, −2, −1, 0, −4, −4, 0, 0}; {, −2, 3, −2, 1, −3, −3, 6, 4, −2, −3, 0, 0}; {, −4, 1, −4, −1, −5, −5, 6, 3, −3, −4, 0, 0}; {, −4, 3, 0, 5, 3, 6, −2, 4, 6, 1, 0, 0}; {4, 0, −2, 4, 4, −4, 1, 6, 0, 0, 0, 0}; {4, −5, 0, 1, −4, 0, −5, 2, −2, −1, 0, 0}; {, −5, 2, −1, 4, 4, −1, 5, −4, 2, 1, 0, 0}; {, −2, −2, 0, −2, 5, 0, 4, −1, 4, 6, 0, 0}; {, −4, 2, −2, 2, 3, 5, −2, 4, 4, 1, 0, 0}; {5, −2, 5, −4, −4, −2, 3, −5, 6, 3, 0, 0}; {6, 3, 2, −3, 3, 6, 1, 5, 4, −3, 0, 0}; {4, −1, −4, 1, 5, 6, 1, −1, −2, −1, 0, 0}; {5, 2, 1, −4, 2, 6, 1, 4, 5, −3, 0, 0}; {5, 1, −1, 5, −2, 1, −4, 6, −3, 0, 0, 0}; {5, 2, 1, −4, 2, 6, 2, 3, 5, −3, 0, 0}; {3, −3, 5, −3, 0, 1, −5, 3, 2, 1, 0, 0}; {2, −4, 4, −4, −1, 0, −5, 2, 2, 0, 0, 0}; {6, 4, 4, 0, −5, 1, −3, −1, 2, −5, 0, 0}; {3, 0, −1, 6, 0, 5, 1, 2, 4, −4, 0, 0}; {0, 6, 2, 6, −3, −1, 6, 2, 1, 0, 0, 0}; {2, −3, 6, −1, 4, 5, −1, 0, −2, 1, 0, 0}; {3, −1, −3, 3, −3, −1, −5, −5, −5, −2, 0, 0}; {1, −5, 3, −5, −1, −1, 5, 3, 1, 2, 0, 0}; {1, −4, 5, −2, 3, 4, −1, 0, −3, 0, 0, 0}; {2, −3, 6, −1, 4, 5, 1, −2, −2, −1, 0, 0}; {1, −4, 5, −2, 3, 4, 0, −3, −2, 0, 0, 0}; {1, −4, 5, −2, 3, 4, 0, −3, −1, 1, 0, 0}; {, −1, 5, 1, 5, −3, −3, 4, 1, 0, 1, 0, 0}; {, −3, 2, −3, 0, 3, 2, −4, 5, 2, 2, 0, 0}; {3, −1, −3, 3, −3, 0, −4, 5, −4, −1, 0, 0}; {2, −2, −4, 2, −4, −1, −5, 6, −4, −1, 0, 0}; {2, −2, −4, 2, −4, −1, −5, −5, −5, −3, 0, 0}; {, −1, 5, 1, 5, −3, −2, 5, 1, 1, 0, 0, 0}; {0, −5, 4, −3, 2, 4, 0, −3, −2, −1, 0, 0}; {, −1, 6, 3, −4, 1, 3, −1, −3, −3, −1, 0, 0}; {, −1, −5, 5, −1, 5, −3, 5, 6, 6, −4, 0, 0}; {, −1, 5, 1, 5, −2, −3, 4, 2, 1, 3, 0, 0}; {, −3, 3, −1, 3, −4, −4, 4, 0, 0, 1, 0, 0}; {, −4, 3, 0, 6, 0, 1, −2, −5, −3, 0, 0, 0}; {5, −2, 5, −3, 2, 0, −2, 3, 2, −2, 0, 0}; {, −4, 3, 0, 6, 3, 6, −3, 4, 6, 1, 0, 0}; {6, 2, 0, −5, 6, −2, 3, −1, 2, −1, 0, 0}; {3, −4, 3, −5, 3, 5, 4, 2, −5, −5, 0, 0}; {4, −3, 4, −4, 5, 6, 3, 2, −4, −4, 0, 0}; {2, −3, 6, 0, −1, 3, −4, 2, 4, 1, 0, 0}; {3, −1, −3, 4, 5, −3, 2, −2, 1, −2, 0, 0}; {6, 1, −2, 4, 6, −2, −5, −2, 2, 2, 0, 0}; {5, 0, −3, 3, 5, −2, 3, 6, 2, 0, 0, 0}; {, −1, 2, −5, −3, −5, −2, −5, −1, −4, 4, 0, 0}; {, −2, 1, 6, −4, −5, −2, 5, −2, −4, 3, 0, 0}; {, −1, 3, −3, 0, 0, 4, 0, −5, 5, 2, 0, 0}; {, −1, 3, −3, 0, 0, 4, 2, −5, 5, 2, 0, 0}; {, −1, 3, −3, 0, 0, 4, 2, −5, 5, 3, 0, 0}; {, −3, 2, −3, 1, 3, 0, −1, 5, 4, −2, 0, 0}; {2, −2, −4, 3, −4, −2, 5, −5, 6, −2, 0, 0}; {0, −4, 6, 1, 6, −3, 3, 6, 5, −2, 0, 0}; {0, −4, 6, 1, 6, −3, 4, 6, 5, −3, 0, 0}; {1, −2, −3, 5, −1, 4, 0, 1, 3, −4, 0, 0}; {, −2, 6, 4, −1, 4, −4, 4, 5, 5, −4, 0, 0}; {, −5, 2, −1, 5, −3, 1, −4, −4, −5, −3, 0, 0}; {1, −3, −5, 2, −5, 2, 0, 2, −4, 0, 0, 0}; {, −2, 3, −2, 2, 4, −3, −4, 2, 2, 2, 0, 0}; {, −4, 0, 6, −3, −2, 2, 0, 6, 4, 2, 0, 0}; {0, −4, 6, 1, −5, −3, 5, 6, 6, −2, 0, 0}; {, −2, 6, 4, −1, 5, −4, 5, 4, 6, −2, 0, 0}; {5, −2, 5, −2, 1, −2, −1, 0, −5, −5, 0, 0}; {5, 0, −3, 4, −3, −1, −5, −5, 6, −2, 0, 0}; {, −1, 6, 3, −2, 3, −4, 1, 3, 3, 4, 0, 0}; {3, −5, 1, 5, −4, 5, 3, 6, 5, −1, 0, 0}; {1, 5, −1, 3, −5, 4, 1, 6, 4, −1, 0, 0}; {1, 5, −1, 3, −5, 4, 1, 6, 4, 0, 0, 0}; {, −1, 3, −3, 1, 5, 3, 0, −5, 4, −1, 0, 0}; {, −5, 1, −3, 3, −3, 0, 3, −5, 6, 5, 0, 0}; {, −5, 1, −3, 3, −3, 0, 4, −5, 6, 5, 0, 0}; {5, 0, −3, 4, 0, 3, −5, 3, 4, 0, 0, 0}; {3, −4, 3, −4, 4, 5, 4, 2, −5, −5, 0, 0}; {1, 6, 1, 6, 2, 4, 3, 1, −5, −5, 0, 0}; {0, 5, 0, 5, 1, 3, 3, 0, −5, −5, 0, 0}; {, −3, 1, −5, −1, −5, −4, 6, 3, −3, −4, 0, 0}; {, −4, 0, 6, −2, 6, −5, 6, 2, −3, −4, 0, 0}; {, −4, 0, 6, −2, 6, −5, 6, 2, −2, −4, 0, 0}; {, −3, 5, 3, −1, 0, 5, 0, 6, −1, −1, 0, 0}; {, −5, −1, 5, −3, 6, −5, 6, 2, −4, −5, 0, 0}; {, −3, 4, 1, −4, −4, 1, 4, −1, 2, −1, 0, 0}; {, −5, 2, −1, 6, 6, −1, 4, −2, 1, 0, 0, 0}; {2, −5, 2, −5, 6, 5, 4, 2, 6, −5, 0, 0}; {4, −1, −4, 3, 4, −4, 4, −4, 1, 1, 0, 0}; {, −1, 3, −3, 1, 0, 4, 2, −5, 5, 3, 0, 0}; {, −1, 3, −3, 1, 0, 4, 3, −4, 5, 3, 0, 0}; {1, −4, 5, 0, 3, −5, 5, −4, 1, 2, 0, 0}; {5, −4, 1, 4, 3, −5, 4, −3, 6, 3, 0, 0}; {, −5, 2, −1, 6, −2, 0, −5, −4, 6, −2, 0, 0}; {, −4, 4, 2, −2, 3, −5, 3, 4, 4, −4, 0, 0}; {0, −5, 4, −1, 3, −3, 2, 3, 3, 4, 0, 0}; {4, −3, 4, −2, 0, −2, −2, 0, −5, −5, 0, 0}; {2, 6, 0, 5, −5, 4, 2, 6, 5, −1, 0, 0}; {3, −4, 3, −3, 0, −2, −2, 0, −5, 6, 0, 0}; {1, 4, −3, 1, 2, −2, 6, −2, −5, 0, 0, 0}; {2, 6, 0, 5, −5, 4, 1, 6, 4, −1, 0, 0}; {1, −5, 3, −2, 2, 3, 5, 6, 4, 4, 0, 0}; {, −5, 1, −3, 4, −4, 0, 4, 6, 5, 4, 0, 0}; {, −3, 4, 1, −3, 2, −5, 0, 3, 3, 4, 0, 0}; {, −1, 2, −5, −1, 1, −3, 5, −3, 6, 1, 0, 0}; {0, 4, −2, 3, 6, 3, 0, 6, 4, −1, 0, 0}; {0, 4, −2, 3, 6, 3, 1, 6, 4, −1, 0, 0}; {1, −5, 3, −2, 3, 3, 5, −5, 4, 4, 0, 0}; {, −3, 2, −3, 3, −5, 6, −4, −3, 5, 5, 0, 0}; {3, −3, 5, 0, 6, −2, 2, 5, 5, 4, 0, 0}; {, −2, 2, −4, 1, 5, 2, −1, 5, 3, −1, 0, 0}; {, −3, 1, −5, 0, 4, 2, −1, 5, 3, −1, 0, 0}; {, −4, 1, −4, 2, −5, 6, −4, −3, 5, 5, 0, 0}; {6, −1, 6, 0, 5, 5, −4, −4, 4, 3, 0, 0}; {5, −2, 5, −1, 4, 4, −5, −4, 4, 4, 0, 0}; {2, −5, 2, −4, 2, 3, 6, −5, 3, 3, 0, 0}; {2, −4, 4, −1, 6, −2, 1, 6, 5, 4, 0, 0}; {, −5, −2, 3, −5, −1, −5, 4, −4, 6, 0, 0, 0}; {, −4, 0, 6, −1, 4, 2, −1, 6, 4, −1, 0, 0}; {5, −2, 5, −1, 5, 5, −5, −4, 5, 5, 0, 0}; {5, −2, 5, −1, 5, 5, −4, −4, 4, 3, 0, 0}; {4, −3, 4, −2, 4, 4, −5, −5, 4, 4, 0, 0}; {4, −3, 4, −2, 4, 4, −5, −4, 3, 3, 0, 0}; {4, −3, 4, −2, 4, 4, −5, −4, 4, 4, 0, 0}; {3, −4, 3, −3, 3, 3, 6, −5, 4, 4, 0, 0}; {3, −4, 3, −3, 4, 4, −5, −5, 4, 4, 0, 0}; {, −3, 3, −1, 6, 2, 1, 2, −5, −2, 1, 0, 0}; {4, −3, 4, −2, 5, 4, −5, −4, 4, 4, 0, 0}; {1, 5, −1, 4, −1, −2, −1, −1, −5, 6, 0, 0}; {0, 4, −2, 3, −1, −3, 0, −1, 5, 4, 0, 0}; {, −3, 2, −3, 3, 0, 2, 2, 0, 5, 6, 0, 0}; {5, −3, 3, −4, 4, 6, 5, 2, −4, −4, 0, 0}; {5, −3, 3, −4, 5, 5, 5, 2, −4, −4, 0, 0}; {, −3, 1, −5, 0, −2, 3, 2, 6, 5, 3, 0, 0}; {, −3, 1, −5, 0, −2, 3, 3, −5, 5, 2, 0, 0}; {, −2, 3, −2, 4, 4, −3, −2, 3, 2, 1, 0, 0}; {, −4, 0, 6, −1, −2, 2, 2, 6, 4, 3, 0, 0}; {, −3, 4, 1, −3, 0, 4, 4, 5, −1, 2, 0, 0}; {6, −2, 4, −3, −3, 1, 0, 5, 4, 2, 0, 0}; {1, 5, −1, 5, 5, −2, −2, 3, 2, 2, 0, 0}; {, −1, 2, −5, 0, 0, −4, 5, −3, 6, 0, 0, 0}; {2, −5, 2, −3, 0, −2, −1, −1, −5, 6, 0, 0}; {1, 6, 1, −4, −1, −3, −2, −1, −5, 6, 0, 0}; {, −4, −2, 2, 6, 6, 2, −3, 1, −3, 2, 0, 0}; {, −5, −3, 1, 5, 5, 1, −3, 0, −3, 2, 0, 0}; {4, −2, 6, 2, −5, −1, 3, 5, 5, 4, 0, 0}; {5, 0, −3, 6, 0, 5, −2, 1, 2, 2, 0, 0}; {3, −3, 5, 1, 6, −2, 2, 5, 4, 3, 0, 0}; {3, −3, 5, 1, 6, −2, 2, 5, 4, 4, 0, 0}; {, −5, −3, 1, 5, 2, −3, 0, −3, 2, 0, 0}; {, −4, 1, −4, 3, −5, −5, −4, −3, 6, 5, 0, 0}; {1, −5, 3, −1, 5, −3, 1, 5, 4, 4, 0, 0}; {6, −3, 2, −5, −2, −5, 3, −4, 6, 1, 0, 0}; {5, −4, 1, 6, −3, 6, 2, −4, 5, 0, 0, 0}; {6, −3, 2, −5, −2, −5, 4, −4, 6, 0, 0, 0}; {5, −4, 1, 6, −3, 6, 3, −4, 6, 0, 0, 0}; {3, −5, 1, −5, −1, −2, 0, −1, 5, 4, 0, 0}; {, −1, 3, −3, 3, −4, −4, −2, −2, −5, 6, 0, 0}; {0, 5, 0, −5, 1, 2, 5, 6, 4, 4, 0, 0}; {4, −5, 0, 5, −3, 5, 2, −5, 5, 0, 0, 0}; {, −2, 2, −4, 2, −4, −5, −2, −3, 6, 5, 0, 0}; {, −1, 3, −3, 3, −3, −4, −1, −2, 5, 3, 0, 0}; {, −1, 3, −3, 3, −3, −4, −1, −2, 5, 0, 0}; {, −1, 3, −3, 3, −3, −4, −2, −2, −5, −5, 0, 0}; {, −1, 3, −3, 3, −3, −4, −2, −1, 3, 3, 0}; {, −2, 2, −4, 2, −4, −4, −3, −2, −5, 6, 0, 0}; {, −2, 3, −2, 5, 1, 1, 5, 6, 1, 2, 0, 0}; {5, −4, 1, 6, 0, −1, 1, −1, 6, 2, 0, 0}; {6, −2, 4, −2, 5, 5, −3, −4, 3, 1, 0, 0}; {, −5, −2, 3, −4, 2, 1, 0, 6, 3, −1, 0, 0}; {4, −4, 2, −4, 3, 6, 5, 1, −3, −4, 0, 0}; {, −2, 3, −2, 5, 2, 3, 1, 1, −4, −3, 0, 0}; {1, 3, −5, −1, 5, 4, 4, 0, −4, 1, 0, 0}; {2, 5, −2, 3, −2, −2, 0, −3, 6, 0, 0, 0}; {1, 4, −3, 2, −3, −2, −3, 4, −1, −3, 0, 0}; {2, 6, 0, 6, 2, 5, 4, 1, −4, −4, 0, 0}; {, −2, 3, −2, 5, 3, −4, −2, 1, 2, 2, 0, 0}; {, −4, 0, 6, 0, −2, 2, 2, 5, 4, 3, 0, 0}; {, −2, 4, 0, −4, −4, 2, 4, −3, 0, −1, 0, 0}; {6, −3, 2, −5, 4, −5, 6, −3, −5, 4, 0, 0}; {6, −3, 2, −5, 4, −4, 6, −3, −5, 4, 0, 0}; {, −5, −1, 5, −1, −3, 2, 1, 5, 5, 2, 0, 0}; {6, −2, 4, −2, −4, 1, 0, 5, 4, 2, 0, 0}; {4, −5, 0, 5, 3, −5, 5, −4, 6, 3, 0, 0}; {5, −3, 3, −3, −4, 1, 0, 4, 4, 1, 0, 0}; {6, −1, 6, 1, 1, −5, −5, 0, 1, 0, 0, 0}; {3, 6, −1, 4, 2, 6, 4, −5, 6, 4, 0, 0}; {, −5, 0, −5, 2, 2, −5, −4, 0, 2, 0, 0, 0}; {5, −3, 3, −3, −4, 0, 1, 4, 3, 3, 0, 0}; {, −5, 1, −3, 5, 6, 0, 3, −4, −1, −1, 0, 0}; {2, 5, −2, 4, 2, 6, 4, −5, 6, 4, 0, 0}; {3, −5, 1, −4, −5, 0, −1, 3, 4, 1, 0, 0}; {0, 2, 6, −1, −4, −1, −3, −2, −4, 5, 0, 0}; {1, 4, −3, 3, 1, 5, 4, −5, 6, 3, 0, 0}; {2, 6, 0, −5, −5, 0, −2, 2, 3, 3, 0, 0}; {1, −4, 5, 3, −5, 1, −1, 1, −4, −1, 0, 0}; {1, 5, −1, 6, −4, 2, 0, 6, 2, 0, 0, 0}; {6, −3, 2, −4, −3, 5, 2, −5, 4, −1, 0, 0}; {2, −5, 2, −2, 2, 6, 6, 2, −1, −1, 0, 0}; {6, −3, 2, −4, −2, 5, 2, −5, 4, 0, 0, 0}; {5, −5, −1, 4, 5, 0, −5, −1, −5, 1, 0, 0}; {4, 6, −2, 3, 4, −1, 6, −1, −5, 1, 0, 0}; {4, −5, 0, 6, −4, 4, 0, 6, 3, −1, 0, 0}; {2, 4, −4, 1, 2, −2, 5, −2, 6, 1, 0, 0}; {, −5, 0, −5, 3, −5, 6, −4, −3, 5, 4, 0, 0}; {6, −1, 6, 2, 6, 5, −5, −3, 5, 5, 0, 0}; {4, −3, 4, 0, 4, 4, 6, −4, 4, 4, 0, 0}; {1, 3, −5, 0, 2, −2, 6, −2, −5, 1, 0, 0}; {6, −1, 6, 2, −5, 6, −5, −3, 4, 4, 0, 0}; {4, −3, 4, 0, 5, 4, 6, −4, 4, 4, 0, 0}; {4, −5, 0, 6, −1, −2, 1, −1, 6, 3, 0, 0}; {2, 6, 0, −5, 1, 5, 5, 0, −4, −5, 0, 0}; {3, 6, −1, 5, −1, −1, −2, 5, 2, −2, 0, 0}; {3, 6, −1, 5, −1, −1, 1, −2, −5, 1, 0, 0}; {1, 4, −3, 3, −3, −2, −2, 4, 1, −2, 0, 0}; {1, 4, −3, 3, −3, −1, −2, 5, 2, −1, 0, 0}; {2, 6, 0, −5, 3, 3, −5, −5, 1, 1, 0, 0}; {1, 4, −3, 3, −2, −2, −3, 5, 1, −2, 0, 0}; {, −1, 1, 5, −2, 4, 3, 2, −4, 4, 0, 0, 0}; {2, 6, 0, −5, 3, 5, 4, 2, −2, −3, 0, 0}; {, −1, 2, −5, 1, −4, −3, −3, 4, 1, −2, 0, 0}; {4, −5, 0, 6, 3, −5, 5, −5, 6, 4, 0, 0}; {4, −5, 0, 6, 3, −5, 5, −4, −5, 4, 0, 0}; {2, 4, −4, 1, −3, 0, −2, −1, −4, 5, 0, 0}; {5, −3, 3, −2, −4, 1, 1, 4, 4, 1, 0, 0}; {3, 6, −1, 5, 2, 6, 5, −5, 6, 3, 0, 0}; {3, 6, −1, 5, 2, 6, 5, −4, 6, 3, 0, 0}; {2, −5, 2, −2, −3, 3, 6, −1, −1, 1, 0, 0}; {3, 6, −1, 5, 2, −5, 4, −5, 6, 4, 0, 0}; {, −3, 3, −1, −4, −4, 2, 4, −4, 0, −1, 0, 0}; {2, 4, −4, 1, −3, −1, −1, −1, −5, 3, 0, 0}; {2, 5, −2, 5, 2, 6, 4, 6, 6, 4, 0, 0}; {0, 2, 6, 0, −4, −1, −3, −2, −4, 5, 0, 0}; {0, 3, −4, 3, 0, 5, 3, 6, 5, 3, 0, 0}; {2, 5, −2, 5, 2, −4, 3, 5, 5, 4, 0, 0}; {6, −3, 2, −3, −3, 2, 1, 5, 3, 0, 0, 0}; {, −5, −1, 5, 1, 3, −3, −4, 2, 0, −1, 0, 0}; {2, 4, −4, 2, 2, −2, 5, −2, 6, 0, 0, 0}; {2, 4, −4, 2, 2, −2, 5, −2, 5, 0, 0, 0}; {, −2, 3, −2, −5, −1, 4, 5, 0, −2, −2, 0, 0}; {, −5, 0, −5, 4, −4, 2, 3, −1, −3, −4, 0, 0}; {, −5, −1, 5, 1, 4, −2, −3, 3, 0, −1, 0, 0}; {6, −2, 4, 0, 3, −3, −4, 2, −1, −2, 0, 0}; {3, −5, 1, −3, 0, 6, 6, 0, −1, −3, 0, 0}; {3, −5, 1, −3, 0, 6, 6, 1, −1, −3, 0, 0}; {4, −5, 0, −5, −3, 3, 0, 6, 2, −1, 0, 0}; {3, −5, 1, −3, 0, −5, 6, 1, −1, −3, 0, 0}; {3, 6, −1, 6, −4, 3, 0, 6, 2, −1, 0, 0}; {1, 3, −5, 1, 2, −2, 5, −2, 6, 1, 0, 0}; {, −1, 0, 3, −4, −4, 3, −3, 1, −4, 2, 0, 0}; {3, −3, 5, 3, −3, 3, 6, 5, 6, 1, 0, 0}; {4, −4, 2, −2, 2, −5, −5, 1, −1, −2, 0, 0}; {1, 4, −3, 4, −5, 2, −1, 5, 2, −1, 0, 0}; {, −2, 0, 4, −2, 0, −5, 3, −4, 5, 0, 0, 0}; {2, 6, 0, −4, 2, 5, 6, 1, −1, −2, 0, 0}; {, −1, 2, −5, 2, −4, −2, −3, 4, 1, −1, 0, 0}; {2, 6, 0, −3, −1, 6, 6, 0, −1, −3, 0, 0}; {1, 4, −3, 5, 6, 2, −1, 2, 0, −4, 0, 0}; {, −1, 1, 5, 0, 0, −4, 3, −4, 4, −1, 0, 0}; {2, −3, 6, 6, 0, −5, 0, 1, 4, −1, 0, 0}; {2, −3, 6, 6, 0, −4, 0, 1, 4, −1, 0, 0}; {4, −3, 4, 2, 6, 1, 2, −3, −4, −4, 0, 0}; {0, 4, −2, −5, −2, 5, 5, 0, −2, −4, 0, 0}; {1, 4, −3, 5, −5, 2, −1, 5, 1, −1, 0, 0}; {, −2, 3, −2, −4, 1, 1, 3, 6, 3, 4, 0, 0}; {, −3, 3, −1, −1, 3, −2, −1, −4, 6, −4, 0, 0}; {, −4, −1, 4, 1, 3, −1, −4, 0, −1, −5, 0, 0}; {4, −1, −4, −3, 3, 4, −2, 2, −1, −2, 0, 0}; {, −2, 4, 0, 0, 5, −1, 3, 4, 5, 0, 0, 0}; {, −1, 5, 1, 1, 6, 0, 4, 4, 6, 1, 0, 0}; {0, 5, 0, −1, 3, −1, 0, −4, −5, −5, 0, 0}; {, −5, 0, −5, −5, 3, −3, 6, 6, 6, −1, 0, 0}; {6, −2, 4, 3, −2, 3, −1, −3, −3, 1, 0, 0}; {4, −4, 2, 1, −4, 2, −3, −3, −5, 0, 0, 0}; {, −1, 5, 1, 2, 6, −5, 1, 5, 3, 0, 0, 0}; {6, −3, 2, 0, 2, −3, 5, 0, −1, 3, 0, 0}; {1, −5, 3, 4, −3, −4, 2, 5, 1, 0, 0, 0}; {, −4, 0, 6, 5, −4, 5, 1, −4, −3, 2, 0, 0}; {6, −3, 2, 0, 2, −2, 5, 1, 0, 4, 0, 0}; {, −3, 2, −3, −3, 1, 0, 6, −5, 3, 0, 0, 0}; {, −3, 2, −3, −3, 2, −2, −5, −5, 5, −1, 0, 0}; {, −5, −1, 5, 4, −4, 3, 0, −3, −4, 1, 0, 0}; {, −4, 1, −4, −4, 1, 0, 4, −5, 2, 0, 0, 0}; {2, −5, 2, 2, −5, 1, 5, 5, 6, 0, 0, 0}; {, −4, 1, −4, −4, 2, −3, −5, −5, 5, −1, 0, 0}; {5, −3, 3, 2, −5, 2, −1, −3, −4, 0, 0, 0}; {2, 6, 0, 0, 6, 0, −3, −4, −5, 0, 0, 0}; {2, 6, 0, 0, 6, 0, −3, −3, −5, 0, 0, 0}; {3, −4, 3, 4, −1, 6, 4, 5, 4, −2, 0, 0}; {1, 5, −1, −1, 5, 0, −4, −4, 6, −1, 0, 0}; {, −2, 2, −4, −4, 2, 3, −3, 6, −1, 0, 0, 0}; {3, −5, 1, 1, −4, 1, −2, −4, −4, 0, 0, 0}; {1, 4, −3, −4, 2, 6, 2, −1, −2, 1, 0, 0}; {0, 3, −4, −5, 1, 6, 1, 0, −2, 2, 0, 0}; {2, 0, 0, 6, 1, 5, −1, 4, 4, −3, 0, 0}; {0, −3, −4, 1, −5, −1, −5, 4, −5, −2, 0, 0}; {4, −3, 4, 5, −2, −5, 4, 5, 4, −2, 0, 0}; {3, −5, 1, 1, 6, 1, −3, −3, 6, 0, 0, 0}; {4, −3, 4, 5, −1, −5, 4, 5, 4, −2, 0, 0}; {3, −5, 1, 2, −5, 0, −2, −2, −5, 1, 0, 0}; {, −1, 2, −5, −5, 0, 5, 1, −1, −3, 1, 0, 0}; {, −5, 0, −5, −3, 4, 1, 0, 2, −3, −3, 0, 0}; {, −1, 2, −5, −5, 1, 5, 2, −1, −3, 1, 0, 0}; {, −2, 1, 6, 6, 0, 5, 1, −2, −3, 1, 0, 0}; {, −2, 1, 6, 6, 0, 5, 1, −1, −3, 0, 0, 0}; {5, 0, −3, 1, −1, 1, −3, −1, 6, −5, 0, 0}; {, −2, −5, 6, 0, 5, −2, 6, 3, −5, −2, 0, 0}; {6, −1, 6, −4, −3, −2, 3, −4, 6, 3, 0, 0}; {, −4, 3, 0, 4, −4, −3, 4, 0, 0, 0, 0, 0}; {, −1, −3, −3, 4, −1, 3, −2, 2, 3, −4, 0, 0}; {, −3, 5, 3, −4, 1, 4, −1, −5, −3, −1, 0, 0}; {6, 0, −4, −1, 2, 3, −3, 3, 3, 1, 0, 0}; {6, 0, −4, −1, 2, 3, −3, 4, 2, 1, 0, 0}; {, −5, 2, −1, 3, −5, −3, 4, 0, 0, −1, 0, 0}; {6, 1, −2, 2, 6, −4, 3, −1, 0, 1, 0, 0}; {, −5, 3, 1, 6, −1, 2, −2, −5, −3, −1, 0, 0}; {, −4, 5, 4, −2, 4, −4, 5, 3, −5, −2, 0, 0}; {6, 0, −4, −1, 2, 4, −3, 3, 2, 1, 0, 0}; {5, −1, −5, −2, 1, 3, −4, 3, 1, 1, 0, 0}; {4, −2, 6, −3, 0, 2, −4, 3, 2, 1, 0, 0}; {4, −2, 6, −3, 1, 0, 6, 4, 1, 2, 0, 0}; {, −5, 3, 1, 6, 0, 2, −2, −5, −3, −1, 0, 0}; {5, 0, −3, 1, 6, −5, 2, −2, −1, 1, 0, 0}; {6, 2, 0, 5, −1, 1, −3, −4, −4, −2, 0, 0}; {3, −3, 5, −4, 0, 0, 6, 3, 1, 2, 0, 0}; {4, −1, −4, 0, 5, 6, 1, 0, −2, 0, 0, 0}; {0, 5, 0, 2, 5, 4, −3, 6, 3, 3, 0, 0}; {3, −2, −5, −1, 4, 5, 1, −2, −1, 0, 0, 0}; {2, −4, 4, −5, −1, −1, 6, 2, 1, 2, 0, 0}; {6, 3, 2, −4, 3, −5, 3, 5, 5, −3, 0, 0}; {5, 2, 1, −5, 2, 6, 3, 4, 5, −4, 0, 0}; {5, 2, 1, −5, 2, 6, 3, 4, 5, −3, 0, 0}; {1, −4, 5, −3, 2, 4, 0, −2, −2, −2, 0, 0}; {1, −3, −5, 0, 6, −2, −5, 6, −5, −2, 0, 0}; {0, 5, 0, 2, −5, −2, −1, −3, 5, 0, 0, 0}; {, −3, 2, −2, 0, 5, −3, −2, −5, 4, −1, 0, 0}; {4, 6, −1, −2, 4, −4, 3, 1, −2, 1, 0, 0}; {, −5, 3, 2, −5, −1, 3, −2, 6, −1, 0, 0, 0}; {6, 2, 1, 6, −2, 2, −2, 6, −2, 0, 0, 0}; {6, 2, 1, 6, −1, 2, −3, 6, −3, −1, 0, 0}; {6, 2, 1, 6, −1, 3, −3, 6, −1, 0, 0, 0}; {2, −5, 3, 5, −5, −4, 1, 6, 5, 2, 0, 0}; {4, 0, −1, 4, −3, 1, −3, 6, −3, −1, 0, 0}; {4, −1, −3, 1, 6, −5, 1, −2, 0, 2, 0, 0}; {3, −2, −4, 0, 5, 6, 1, −3, −1, 1, 0, 0}; {3, −2, −4, 0, 5, 6, 1, −2, −1, 1, 0, 0}; {4, 1, 1, −5, 2, 6, −1, 5, 4, −3, 0, 0}; {2, −3, −5, −1, 4, 6, 1, −3, −1, 1, 0, 0}; {3, −1, −2, 3, −3, 0, −4, 5, −4, −1, 0, 0}; {4, 2, 3, −2, 6, −1, −3, 0, 2, −5, 0, 0}; {1, −2, −2, 4, −1, 4, 1, 3, 4, −5, 0, 0}; {, −1, 6, 4, −4, 1, 4, 0, −3, −2, 0, 0, 0}; {6, −5, −1, −3, −3, 4, −2, 5, 2, 5, 0, 0}; {, −3, 5, 4, −3, 4, −4, 5, 6, 5, −4, 0, 0}; {, −3, 3, 0, 4, −3, −4, 3, 2, −1, 1, 0, 0}; {, −1, −5, 6, 0, −5, −3, 5, −5, 6, −2, 0, 0}; {, −3, 4, 2, −5, 1, 2, −3, −1, −4, 0, 0, 0}; {, −2, 6, 5, −1, 6, −4, 4, −5, 5, −2, 0, 0}; {2, 2, 5, 3, 2, −4, 1, −4, 4, 6, 0, 0}; {, −4, 4, 3, −3, 4, −5, 4, 5, 5, −4, 0, 0}; {, −2, 6, 5, −1, 6, −3, 6, 3, −5, −1, 0, 0}; {, −5, 2, 0, 5, −1, 1, −2, −5, −3, 0, 0, 0}; {, −4, 0, −5, −3, −5, 1, 4, 1, −2, −5, 0, 0}; {, −2, −5, −5, 2, 6, −2, 6, 4, −4, −2, 0, 0}; {, −5, 2, 0, 5, −5, −2, 4, −1, 1, −1, 0, 0}; {6, 1, −1, 4, 6, −3, 4, −1, 1, −1, 0, 0}; {6, 1, −1, 4, 6, −3, 4, −1, 1, 0, 0, 0}; {, −5, 3, 2, −4, 0, 3, −3, −5, −2, 0, 0, 0}; {5, 0, −2, 3, 6, −4, 3, −1, 0, −1, 0, 0}; {5, 0, −2, 3, 6, −3, 3, −2, 0, −1, 0, 0}; {2, −3, −5, 0, 3, 6, 0, −3, −1, 1, 0, 0}; {3, −3, 6, −2, 0, 2, −4, 2, 3, 1, 0, 0}; {2, −4, 5, −3, −1, 1, −5, 2, 2, 1, 0, 0}; {4, 0, −1, 5, −3, 1, −3, 6, −3, −2, 0, 0}; {5, 5, −4, 6, 2, −2, 2, −3, 3, 5, 0, 0}; {3, −1, −2, 4, −4, 1, −4, 5, −3, −1, 0, 0}; {0, 5, 1, 4, 5, −5, 0, 5, 5, 2, 0, 0}; {5, 2, 2, −3, 3, 6, 2, 4, 5, −3, 0, 0}; {2, −3, −5, 0, 4, 5, 0, −2, −2, 0, 0, 0}; {3, 0, 0, −5, 1, 5, 1, 3, 4, −4, 0, 0}; {5, 1, 0, 6, −1, 2, −2, 6, −3, −2, 0, 0}; {2, −3, −5, 0, 4, 6, 1, −2, −1, −1, 0, 0}; {2, −2, −3, 3, −4, 0, −5, 5, −4, −1, 0, 0}; {0, −3, −3, 4, −2, 3, −1, 2, 3, −5, 0, 0}; {0, 6, 3, −5, −2, 0, 6, 1, 1, 0, 0, 0}; {1, −5, 4, −4, −1, 1, −5, 2, 2, 1, 0, 0}; {0, 6, 3, −5, −2, 0, 6, 1, 1, 1, 0, 0}; {1, −4, 6, −1, 3, 6, 1, −3, −1, 0, 0, 0}; {0, −5, 5, −2, 2, 5, 0, −3, −2, −2, 0, 0}; {, −1, 5, 2, 6, −3, −1, 5, 1, 1, 1, 0, 0}; {, −3, 2, −2, 1, 3, 5, −2, 5, 3, 2, 0, 0}; {1, −3, −4, 2, −4, −2, 6, −5, −5, −2, 0, 0}; {, −2, 4, 1, 5, −3, −3, 4, 1, 0, 1, 0, 0}; {, −1, 6, 4, −3, 2, 3, −1, −2, −3, −1, 0, 0}; {0, −4, −5, 1, −5, −3, 6, −5, 6, −3, 0, 0}; {, −1, −5, 6, 0, 6, −3, 4, −5, 6, −2, 0, 0}; {, −3, 4, 2, −5, 0, 2, −3, −2, −4, 0, 0, 0}; {, −1, −5, 6, 0, 6, −3, 5, −5, 6, −2, 0, 0}; {0, −3, −3, 4, −1, 3, 0, 3, 4, −3, 0, 0}; {0, −4, −5, 1, −5, −2, 6, 5, −4, −1, 0, 0}; {1, −2, −2, 5, 0, 4, 1, 2, 4, −4, 0, 0}; {, −1, −4, −4, 3, −2, 2, 0, 2, 3, −5, 0, 0}; {0, −4, −5, 1, −5, −2, −5, 4, −4, −1, 0, 0}; {, −2, 5, 3, −4, 1, 3, −1, −3, −3, −2, 0, 0}; {, −4, 2, −1, 3, −5, −4, 3, 0, 0, 1, 0, 0}; {0, −3, −3, 4, −1, 3, 1, 2, 4, −4, 0, 0}; {, −2, 6, 5, −1, 5, −4, 5, 5, 6, −3, 0, 0}; {, −4, 4, 3, −3, 3, −5, 4, 5, 5, −5, 0, 0}; {6, −1, −5, −2, 1, 2, −4, 4, 2, 2, 0, 0}; {6, 0, −3, 2, 6, 6, 1, 0, −2, 0, 0, 0}; {6, 1, −1, 5, −2, 0, −5, −3, −5, −1, 0, 0}; {5, 0, −2, 4, −3, −1, 6, −4, −5, −1, 0, 0}; {6, 1, −1, 5, −2, 0, −4, −4, −5, −2, 0, 0}; {, −5, 3, 2, −3, 3, 6, 3, 5, 4, −4, 0, 0}; {, −4, 5, 5, 1, −4, 1, −2, 0, 2, −5, 0, 0}; {, −5, 3, 2, −3, 3, −5, 3, 5, 5, −4, 0, 0}; {4, −3, 5, −3, 1, 0, −4, 3, 2, −1, 0, 0}; {6, 2, 1, −4, 3, 6, 3, 5, 4, −4, 0, 0}; {, −2, 2, −3, 0, 5, 2, 0, 5, 4, −1, 0, 0}; {, −2, 2, −3, 0, 5, 2, 1, 5, 4, −1, 0, 0}; {, −5, −1, 6, −3, 3, 0, −1, 4, 3, −2, 0, 0}; {, −1, 6, 4, −2, −3, 1, 5, 0, 3, 0, 0, 0}; {0, −4, −5, 2, 2, −5, 1, −4, 0, −1, 0, 0}; {0, −3, −3, 5, −5, 0, −5, 5, −3, −3, 0, 0}; {, −4, 3, 1, −5, −5, −1, 5, −1, 2, 0, 0, 0}; {5, 0, −2, 4, 5, −2, 2, −3, 0, −2, 0, 0}; {3, −3, 6, −1, −1, 3, −5, 1, 2, 0, 0, 0}; {, −2, −4, −3, 6, −1, 5, 0, 1, 6, −4, 0, 0}; {2, −3, −5, 1, 3, −5, 1, −3, −1, −1, 0, 0}; {, −4, 4, 3, −2, 1, −2, 4, −3, −1, −2, 0, 0}; {, −4, 6, −5, 4, −2, 4, −1, 1, 6, −4, 0, 0}; {1, 0, 2, 0, −5, 2, 5, 0, 5, 6, 0, 0}; {0, 6, 3, −4, −2, 1, 6, 1, 2, 0, 0, 0}; {0, −5, 5, −1, 2, 6, 0, −4, −1, 0, 0, 0}; {, −2, 4, 1, 6, −4, −1, 5, 0, 1, 0, 0, 0}; {, −2, 6, 5, 0, 4, −2, 5, 3, −5, −2, 0, 0}; {6, −3, 3, 5, 4, −5, 4, −3, −5, 5, 0, 0}; {1, −2, −2, 6, 0, 3, −2, 3, 2, −4, 0, 0}; {, −3, 3, 0, 5, −4, −2, 5, 0, 1, 0, 0, 0}; {1, 4, −2, 1, 1, 5, 2, −4, 6, 2, 0, 0}; {1, 4, −2, 1, 1, 5, 3, −4, 6, 3, 0, 0}; {, −5, 3, 2, −2, 3, 6, 1, 5, 4, −3, 0, 0}; {6, 1, −1, 6, −1, 0, −5, −3, −5, −1, 0, 0}; {5, 0, −2, 5, −2, 3, 2, 4, −2, 1, 0, 0}; {6, 1, −1, 6, 0, 5, −2, 2, 2, 3, 0, 0}; {1, −5, 4, −2, 3, 3, −1, −2, −4, −1, 0, 0}; {, −2, 1, −5, −2, 1, −3, 5, −4, 6, 0, 0, 0}; {, −3, 1, −4, 0, 4, 2, −1, 5, 3, −1, 0, 0}; {, −4, −1, 5, −4, 0, −4, 4, −4, 6, 0, 0, 0}; {5, −4, 2, 5, −2, 6, 3, −4, 6, −1, 0, 0}; {3, 6, 0, 3, −2, −1, −3, 5, −2, −3, 0, 0}; {4, −1, −3, 4, 4, −3, 2, −4, 0, −1, 0, 0}; {4, −1, −3, 4, 4, −3, 3, −3, −3, 1, 0, 0, 0}; {, −1, 2, −4, −1, −5, −3, 6, 2, −3, −4, 0, 0}; {0, −5, 5, 0, 1, 6, 2, 6, 0, 0, 0, 0}; {, −1, 5, 2, −4, −4, 1, 4, −2, 1, 0, 0, 0}; {4, 0, −1, −5, −2, −4, 2, −5, −2, −3, 0, 0}; {, −2, −1, 4, 4, −3, −2, 4, 2, 1, 0, 0}; {, −4, 0, −5, −1, −2, 2, 2, −5, 4, 3, 0, 0}; {6, −2, 5, −3, −4, 1, −1, 5, 5, 1, 0, 0}; {4, −5, 1, 4, 3, −5, 4, −3, −5, 3, 0, 0}; {3, 6, 0, 3, 2, 6, 3, −4, 6, 4, 0, 0}; {4, −4, 3, −5, −5, 0, −2, 4, 4, 1, 0, 0}; {3, 6, 0, 3, 2, 6, 4, −3, 6, 3, 0, 0}; {, −3, −4, −2, −3, 4, −1, 3, −1, 4, 6, 0, 0}; {4, −4, 3, −4, −4, 0, 0, 5, 3, 2, 0, 0}; {6, 1, −1, −5, −1, 3, 2, 5, −1, 1, 0, 0}; {4, −1, −3, 5, −3, 2, 1, 3, −2, 1, 0, 0}; {1, −4, 6, 2, −5, 1, 0, 2, −4, 0, 0, 0}; {, −1, 5, 2, −3, 1, 2, −3, −3, −5, −1, 0, 0}; {4, −1, −3, 5, −2, 2, 1, 4, −2, 1, 0, 0}; {3, −2, −4, 4, −3, 1, 0, 3, −3, 0, 0, 0}; {1, −5, 4, −1, 4, −3, 2, 4, 4, 4, 0, 0}; {1, 6, 2, −4, 0, −3, −2, −1, −5, 6, 0, 0}; {0, 6, 3, −2, 4, −4, 1, 4, 4, 4, 0, 0}; {, −1, 5, 2, −3, 3, −5, 0, 4, 4, 3, 0, 0}; {6, −3, 3, −5, −2, 6, 3, −5, 5, −1, 0, 0}; {6, −3, 3, −5, −2, 6, 3, −4, 6, 0, 0, 0}; {, −5, −1, 6, −1, 3, 1, −2, 4, 3, −1, 0, 0}; {3, −4, 4, −2, 3, 3, 6, −5, 4, 4, 0, 0}; {1, 5, 0, 5, −2, −3, 0, −2, 6, 4, 0, 0}; {0, 4, −1, 4, −3, −3, 0, −2, 6, 3, 0, 0}; {4, −5, 1, 5, −3, 5, 2, −5, 5, 0, 0, 0}; {4, −5, 1, 5, −3, 6, 2, −5, 5, 0, 0, 0}; {0, 4, −1, 4, −2, −3, 0, −2, 6, 4, 0, 0}; {, −2, 2, −3, 2, −4, −5, −2, −2, −5, −5, 0, 0}; {, −4, 0, −5, 0, 6, 6, −2, −4, 5, 1, 0, 0}; {, −2, 2, −3, 2, −3, −4, −2, −2, 6, 5, 0, 0}; {, −1, 3, −2, 3, −2, −3, 0, −2, 6, 4, 0, 0}; {, −4, 0, −5, 0, −5, −5, −3, −3, 6, 5, 0, 0}; {, −2, 3, −1, 5, 2, 2, 5, 6, 3, 4, 0, 0}; {, −4, 0, −5, 0, −4, −5, −2, −3, 5, 5, 0, 0}; {4, −4, 3, −4, 4, 5, 5, 2, −5, −5, 0, 0}; {2, 6, 1, 6, 2, 4, 4, 0, −3, −5, 0, 0}; {2, 6, 1, 6, 2, 4, 4, 1, −5, −5, 0, 0}; {, −1, 4, 0, 6, 3, −4, −2, 3, 3, 2, 0, 0}; {0, 5, 1, −5, 4, −3, −1, 4, 3, 2, 0, 0}; {, −5, −2, 4, −4, 4, 1, 3, 1, −4, 6, 0, 0}; {, −3, 1, −4, 1, −2, 2, 2, −5, 5, 3, 0, 0}; {, −1, 5, 2, −3, −4, 2, 5, −1, 1, 0, 0, 0}; {, −3, 1, −4, 1, −2, 2, 3, −4, 5, 3, 0, 0}; {, −4, 1, −3, 3, 1, −5, −3, 2, 2, 2, 0, 0}; {, −5, 0, −4, 2, 0, 6, −4, 1, 2, 2, 0, 0}; {, −3, 3, 0, −5, −5, −1, 6, −2, 2, 1, 0, 0}; {, −4, 1, −3, 3, 2, −5, −4, 2, 3, 0, 0, 0}; {, −2, 5, 3, −1, 0, −5, −1, 6, −2, −2, 0, 0}; {6, −1, −5, 1, 0, 6, −5, 0, 2, 1, 0, 0}; {4, −5, 1, 5, 2, 6, 5, −3, −5, 3, 0, 0}; {5, −3, 4, −3, −5, 0, 0, 5, 4, 3, 0, 0}; {4, −5, 1, 5, 2, 6, 6, −2, 6, 3, 0, 0}; {3, 6, 0, 4, 2, 6, 4, −4, 6, 3, 0, 0}; {5, −3, 4, −3, −4, 1, 0, 5, 4, 2, 0, 0}; {3, −5, 2, −5, 6, −1, −2, 3, 4, 2, 0, 0}; {2, 5, −1, 3, 1, 5, 3, −4, 6, 4, 0, 0}; {3, −5, 2, −5, 6, −1, −2, 4, 4, 1, 0, 0}; {2, 5, −1, 3, 1, 5, 4, −4, 6, 3, 0, 0}; {2, 5, −1, 3, 5, 5, −3, 6, 3, 0, 0}; {1, 4, −2, 2, 0, 5, 2, −5, 6, 2, 0, 0}; {, −5, 1, −2, 5, 6, −2, 5, −4, 1, 0, 0, 0}; {, −5, 0, −4, 2, 2, −5, −3, 3, 1, 0, 0, 0}; {5, 0, −2, 6, −4, 3, −4, 4, −4, −2, 0, 0}; {0, 3, −3, 2, 0, 4, 2, −5, 6, 2, 0, 0}; {0, 3, −3, 2, 0, 4, 3, −5, 6, 3, 0, 0}; {3, −4, 4, −1, −1, 5, 6, 0, 1, −1, 0, 0}; {0, 3, −3, 2, 0, 4, 3, −4, 5, 3, 0, 0}; {0, 3, −3, 2, 0, 5, 2, 6, 6, 2, 0, 0}; {, −1, 2, −4, 1, 0, 4, 3, −5, 5, 3, 0, 0}; {0, 4, −1, 5, 5, −2, −2, 3, 2, 2, 0, 0}; {1, 6, 2, −3, −2, 4, 5, −1, 0, −1, 0, 0}; {, −1, 3, −2, 4, 4, −3, −3, 2, 2, 2, 0, 0}; {2, −4, 5, 1, 3, 6, 6, 0, 3, 0, 0}; {2, −4, 5, 1, 3, −5, 5, −4, 1, 2, 0, 0}; {0, −5, 5, 2, 6, 0, −1, 1, −4, −1, 0, 0}; {, −3, 0, 6, −1, −1, −4, 4, −4, 6, 0, 0, 0}; {0, 5, 1, −4, 0, 5, 5, 2, −1, −2, 0, 0}; {3, 5, −2, 2, 3, −2, 6, −2, −5, 1, 0, 0}; {, −4, 1, −3, 4, −4, 6, −5, −2, 6, 6, 0, 0}; {, −5, 1, −2, 6, −1, 0, 2, 5, 3, 3, 0, 0}; {3, −4, 4, −1, 4, 4, 6, −5, 5, 4, 0, 0}; {2, 4, −3, 1, 3, −2, 6, −2, −5, 1, 0, 0}; {3, 6, 0, 5, −4, 4, 1, 6, 4, −1, 0, 0}; {2, 4, −3, 1, 3, −1, 6, −2, −5, 1, 0, 0}; {1, 3, −4, 0, 2, −2, 6, −2, −5, 1, 0, 0}; {2, 5, −1, 4, −5, 4, 1, 6, 4, −1, 0, 0}; {1, 4, −2, 3, −5, 4, 0, 6, 4, 0, 0, 0}; {1, 3, −4, 0, 3, −2, 6, −2, −5, 1, 0, 0}; {, −2, 1, −5, 0, 5, 2, 0, 5, 4, −1, 0, 0}; {, −4, 0, −5, 1, −5, 6, −4, −3, 6, 6, 0, 0}; {, −4, 0, −5, 1, −5, 6, −3, −3, 5, 4, 0, 0}; {, −5, −1, 6, 0, 6, 5, −3, −3, 4, 3, 0, 0}; {, −5, −1, 6, 0, 6, 6, −4, −3, 6, 5, 0, 0}; {6, −2, 5, −1, 5, 5, −4, −4, 6, 5, 0, 0}; {5, −3, 4, −2, 4, 4, −4, −4, 3, 3, 0, 0}; {5, −3, 4, −2, 4, 5, −5, −4, 5, 4, 0, 0}; {6, −2, 5, −1, 5, 6, −3, −4, 3, 1, 0, 0}; {5, −3, 4, −2, 4, 5, −4, −4, 6, 6, 0, 0}; {, −3, 1, −4, 2, −3, −5, −2, −2, 5, 4, 0, 0}; {, −5, −1, 6, 0, −5, 6, −3, −3, 4, 3, 0, 0}; {, −5, −1, 6, 0, −5, −5, −4, −3, 6, 5, 0, 0}; {6, −2, 5, −1, 6, 6, −4, −4, 6, 5, 0, 0}; {4, −4, 3, −3, 4, 4, −5, −5, 5, 5, 0, 0}; {2, 6, 1, −5, 2, 4, 4, 1, 6, 6, 0, 0}; {, −5, −1, 6, 0, −4, 6, −3, −2, 4, 3, 0, 0}; {4, −5, 1, 6, 1, −1, 1, 0, 6, 4, 0, 0}; {0, 4, −1, 5, 1, 4, 3, 1, −5, −5, 0, 0}; {, −2, 2, −3, 3, −1, 2, 2, −1, −4, −5, 0, 0}; {, −4, −1, 5, −2, 5, −4, 6, 2, −3, −4, 0, 0}; {5, −3, 4, −2, −5, 0, 1, 5, 4, 2, 0, 0}; {6, −1, −5, 2, 0, 6, −4, 1, 2, 1, 0, 0}; {5, −3, 4, −2, −5, 0, 1, 6, 4, 2, 0, 0}; {2, 5, −1, 4, 1, 5, 4, −4, 6, 3, 0, 0}; {2, 5, −1, 4, 1, 5, 4, −4, 6, 4, 0, 0}; {3, −5, 2, −4, 6, −1, −1, 4, 4, 1, 0, 0}; {4, −3, 5, 0, −1, 5, −5, 0, 1, 1, 0, 0}; {2, 5, −1, 4, 1, 5, 5, −3, 6, 3, 0, 0}; {2, 6, 1, −5, 5, −2, 0, 4, 4, 2, 0, 0}; {, −2, 0, 5, −2, 6, −3, −4, −2, −5, 4, 0, 0}; {, −1, 2, −4, 2, −1, 3, 3, 6, 5, 3, 0, 0}; {, −2, 1, −5, 1, −2, 2, 3, −4, 4, 2, 0, 0}; {2, −5, 3, −1, −1, 5, 6, −2, 1, −1, 0, 0}; {, −1, 3, −2, 5, 4, −3, −2, 1, 3, 1, 0, 0}; {, −2, 1, −5, 1, −1, 4, 1, 5, 5, 3, 0, 0}; {, −3, 1, −4, 3, 3, −4, −2, 3, 1, −1, 0, 0}; {, −1, −1, 2, 5, 2, −2, 4, 5, 0, 4, 0, 0}; {3, 5, −2, 3, 3, −1, 6, −2, −5, 1, 0, 0}; {1, 2, 6, −2, −3, 5, −1, 2, −2, 3, 0, 0}; {2, 4, −3, 2, 2, −1, 6, −2, −5, 1, 0, 0}; {4, −2, −5, 4, −3, 2, 0, 1, −4, −1, 0, 0}; {1, 3, −4, 1, 2, −2, 5, −2, 6, 1, 0, 0}; {, −2, 1, −5, 1, 5, 2, 0, 5, 4, −1, 0, 0}; {, −5, −3, 2, −5, −2, −5, 4, −4, 6, 0, 0, 0}; {1, 5, 0, −5, 0, 5, 5, 0, −3, −4, 0, 0}; {6, −3, 3, −3, 2, 0, 1, 1, 5, 4, 0, 0}; {5, −3, 4, −1, 5, 4, −5, −4, 5, 5, 0, 0}; {1, 4, −2, 4, −2, −3, −1, −2, −5, 6, 0, 0}; {1, 4, −2, 4, −2, −3, −1, −1, 4, 3, 0, 0}; {1, 4, −2, 4, −2, −3, 0, −1, 4, 3, 0, 0}; {2, 6, 1, −4, 3, 3, −5, −5, 2, 2, 0, 0}; {1, 4, −2, 4, −2, −3, 0, −1, 5, 3, 0, 0}; {2, 6, 1, −4, 3, 4, −4, −5, 2, 1, 0, 0}; {, −1, 2, −4, 2, −3, −4, −1, −2, 4, 3, 0, 0}; {0, 4, −1, 6, 2, 2, 6, −5, 1, 1, 0, 0}; {5, −4, 2, −4, 3, 5, −4, −4, 3, 1, 0, 0}; {, −1, 2, −4, 2, −2, 3, 3, −5, 5, 2, 0, 0}; {6, −4, 1, −5, 4, −4, 6, −4, 6, 5, 0, 0}; {5, −5, 0, 6, 3, −5, 5, −4, 6, 4, 0, 0}; {0, 3, −3, 4, 2, −5, 2, 4, 5, 4, 0, 0}; {, −5, −3, 2, −4, 5, −3, 6, −4, −5, 4, 0, 0}; {, −5, −3, 2, −4, 5, −3, 6, −4, −5, 5, 0, 0}; {, −3, −1, 4, −2, −1, −5, 2, −4, 4, −1, 0, 0}; {, −2, 1, −5, 2, 4, 1, −3, 4, 1, −2, 0, 0}; {1, 6, 2, −1, 3, 2, 5, −4, 5, 5, 0, 0}; {5, 5, −4, 0, −1, −5, 1, 3, −1, 4, 0, 0}; {4, −4, 3, −1, 2, −4, −5, 2, −1, −2, 0, 0}; {1, 4, −2, 5, −5, 1, −1, 5, 1, −1, 0, 0}; {, −2, 0, 5, −1, 0, −5, 3, −4, 4, 0, 0, 0}; {2, 6, 1, −3, 1, 6, 6, 1, −1, −2, 0, 0}; {, −2, 1, −5, 2, 5, −2, −3, 3, 1, −1, 0, 0}; {, −3, 0, 6, 1, 4, −3, −4, 3, 1, −2, 0, 0}; {, −4, −1, 5, 0, 4, −3, −4, 2, −1, −3, 0, 0}; {, −4, −1, 5, 0, 4, −2, −4, 3, 0, −2, 0, 0}; {1, 4, −2,

5, −2, 0, −3, 6, 1, −1, 0, 0}; {, −4, −1, 5, 0, 5, −3, −4, 3, 0, −2, 0, 0}; {, −3, 0, 6, 2, 4, 0, −3, 1, −1, −4, 0, 0}; {, −3, 0, 6, 2, 4, 0, −3, 2, −1, −3, 0, 0}; {6, −4, 1, −4, −3, 5, 0, 6, 3, −1, 0, 0}; {, −5, −2, 4, 0, 2, −1, −5, 2, 0, −3, 0, 0}; {6, −5, −1, 5, 5, 0, −5, −1, 6, 1, 0, 0}; {, −1, 3, −2, −5, −2, 6, 5, 0, −3, −3, 0, 0}; {, −3, 0, 6, 2, 4, −1, −3, 3, 0, −2, 0, 0}; {5, −5, 0, −5, −3, 4, −1, 5, 2, −2, 0, 0}; {5, −5, 0, −5, −3, 4, 0, 5, 2, −2, 0, 0}; {4, 6, −1, 6, −4, 3, −1, 5, 2, −2, 0, 0}; {5, −5, 0, −5, −3, 4, 0, 6, 3, −1, 0, 0}; {2, 3, −5, 1, 2, −3, 4, −3, 5, 0, 0, 0}; {, −3, 1, −4, 5, −3, 4, 4, −1, −4, −4, 0, 0}; {3, 6, 0, −4, 0, 6, 6, 1, −1, −3, 0, 0}; {, −1, 3, −2, −5, 1, −3, −3, 6, −4, 0, 0, 0}; {6, −4, 1, −3, −3, 5, 1, 4, 1, −3, 0, 0}; {1, 1, 4, −2, −4, 4, −2, 1, −5, 1, 0, 0}; {, −5, 1, −2, −2, 3, 5, 1, 2, 1, −3, 0, 0}; {, −1, 4, 0, −1, 3, −1, 0, −5, 6, −5, 0, 0}; {0, 6, 3, 4, −3, 5, −5, 4, 3, 6, 0, 0}; {, −2, 6, 5, −3, 3, 5, 0, −5, −3, −4, 0, 0}; {1, −5, 4, 6, −1, 6, −4, 4, 3, −3, 0, 0}; {, −3, 0, −5, 6, −2, 5, 1, −4, −3, 2, 0, 0}; {, −2, 1, −4, −5, 1, 3, −3, 5, −1, −1, 0, 0}; {, −3, 0, −5, 6, 0, 2, −4, 5, −1, −1, 0, 0}; {5, 6, −1, −4, 6, 0, −5, 2, 5, 0, 0, 0}; {4, −2, −4, −2, 3, 1, 4, 0, 1, 4, 0, 0}; {2, −4, 6, −3, 2, 0, 3, −1, 0, 4, 0, 0}; {6, 2, 2, −5, 2, 6, 3, 5, 5, −5, 0, 0}; {2, −3, −4, 0, 2, −5, 2, −4, 1, 1, 0, 0}; {3, −1, −1, 4, −3, 1, −4, 5, −2, −1, 0, 0}; {, −1, 5, 3, 6, −3, −1, 5, 0, 2, 2, 0, 0}; {1, −4, −5, −1, 4, 5, 0, −3, −1, 1, 0, 0}; {, −2, 5, 4, −4, 1, 4, −1, −5, −1, 0, 0, 0}; {, −2, −5, −4, 2, −3, 2, 0, 2, 3, 6, 0, 0}; {, −3, 6, −5, 1, −4, 1, −1, 2, 3, 6, 0, 0}; {, −1, −5, −5, 1, −5, −3, 6, 5, −5, −2, 0, 0}; {, −1, −4, −3, 4, −1, 3, 0, 2, 4, −4, 0, 0}; {, −4, 4, 4, −2, 4, −5, 3, 6, 5, −2, 0, 0}; {, −1, −5, −5, 1, −5, −2, 6, 4, −4, −1, 0, 0}; {, −3, 5, 5, −1, 5, −4, 5, 5, 6, −3, 0, 0}; {6, 0, −2, 2, 6, −5, 2, 0, −1, 1, 0, 0}; {, −5, 3, 3, −3, 3, 6, 3, 5, 5, −4, 0, 0}; {, −5, 4, 5, 0, −5, 0, −2, 1, 2, 6, 0, 0}; {, −4, 3, 2, −5, 0, 3, −1, −5, −2, 0, 0, 0}; {6, 0, −2, 2, 6, −4, 3, −1, 0, 1, 0, 0}; {, −5, 2, 1, 6, −1, 2, −2, −5, −2, 0, 0, 0}; {4, 0, 0, 6, 0, 5, 2, 4, 4, −5, 0, 0}; {, −5, 4, 5, 0, −4, 0, −2, 1, 2, −5, 0, 0}; {6, 1, 0, 5, −1, 1, −3, 6, −3, 0, 0, 0}; {, −5, −2, 5, 6, 1, 1, −2, 5, −1, −3, 0, 0}; {, −2, 4, 2, 6, −5, 0, 5, −4, 3, 1, 0, 0}; {4, 0, 0, 6, −2, 2, −3, 6, −2, −2, 0, 0}; {2, −2, −2, 4, −4, 0, −5, 5, −3, −1, 0, 0}; {2, −3, −4, 1, 4, −5, 2, −3, 0, −1, 0, 0}; {0, 6, 4, −4, −2, 0, 6, 1, 2, 1, 0, 0}; {1, −4, −5, 0, 3, 6, 1, −3, 0, 0, 0, 0}; {0, −1, 2, −1, 6, 2, 4, 0, 4, −5, 0, 0}; {, −5, 3, 3, −3, 2, 1, −5, −2, −4, 0, 0, 0}; {1, −4, −5, 0, 4, 6, 1, −3, −1, −1, 0, 0}; {, −2, 5, 4, −3, 1, 4, −1, −4, −2, 0, 0, 0}; {3, −3, −5, 0, 3, −1, 4, 4, 2, 4, 0, 0}; {, −3, 5, 5, 0, 5, −4, 4, 5, 6, −3, 0, 0}; {, −5, 2, 1, −5, −1, 3, −2, −5, −2, −1, 0, 0}; {5, −1, −3, 2, 5, −4, 2, −2, 0, 1, 0, 0}; {4, −4, 4, −5, −4, −3, 2, −5, 5, 3, 0, 0}; {, −4, 2, 0, 5, −3, −5, 2, 1, 0, 2, 0, 0}; {5, 1, 1, −4, 2, 5, 2, 4, 4, −4, 0, 0}; {5, 0, −1, 5, −2, 1, −3, 6, −3, −1, 0, 0}; {4, −1, −2, 4, −3, 0, −4, 6, −3, −1, 0, 0}; {2, −3, −4, 2, −5, −2, 6, −5, 6, −2, 0, 0}; {2, −3, −4, 2, −4, −2, −5, −5, 6, −3, 0, 0}; {, −3, 2, −1, 3, −1, 0, 2, −3, −4, 6, 0, 0}; {5, 0, −1, 5, 4, −4, 2, 6, 0, 0, 0, 0}; {, −5, 2, 1, −5, 6, −2, 4, −1, 2, 0, 0, 0}; {4, −1, −2, 4, 3, −4, 1, 6, 0, 0, 0, 0}; {5, 0, −1, 5, 4, −3, 3, −5, 1, 0, 0, 0}; {4, −1, −2, 4, 4, −4, 3, −2, 1, −1, 0, 0}; {3, −2, −3, 3, 3, −4, 3, −3, 1, 0, 0, 0}; {, −3, −5, −3, 6, −2, 3, −1, 1, 5, −5, 0, 0}; {5, 1, 1, −4, −2, 3, −3, 6, −2, −2, 0, 0}; {3, −2, −3, 3, 4, −4, 2, −3, 0, −2, 0, 0}; {, −2, 5, 4, −2, −1, 6, 0, 4, 0, −1, 0, 0}; {0, 4, 0, 3, 2, −4, 0, −2, −4, 5, 0, 0}; {5, 2, 3, −1, 3, −4, 3, 3, −5, −3, 0, 0}; {4, 0, 0, −5, −2, 2, −3, 6, −2, −2, 0, 0}; {3, −1, −1, 6, −3, 1, −4, 6, −2, −1, 0, 0}; {0, −5, 6, 0, 2, 6, 0, −4, −1, −1, 0, 0}; {0, −5, 6, 0, 2, 6, 1, −3, 0, −1, 0, 0}; {, −4, 3, 2, −4, −2, 4, −1, 3, −1, −1, 0, 0}; {, −5, 3, 3, −2, 1, −2, 5, −2, −3, −2, 0, 0}; {0, −4, −4, 3, −5, −1, 6, 5, −4, −2, 0, 0}; {, −2, 5, 4, −2, 1, 5, −1, −4, −1, −1, 0, 0}; {, −2, 5, 4, −2, 1, 5, −1, −4, −1, 0, 0, 0}; {, −4, 3, 2, −4, −1, 4, −2, −5, −1, 0, 0, 0}; {6, −1, −4, 0, 1, 4, −3, 3, 3, 1, 0, 0}; {, −5, 3, 3, −2, 2, −3, 4, −2, −3, −1, 0, 0}; {0, −5, 6, 1, 4, −1, −5, 0, 0, −1, 0, 0}; {6, 1, 0, −5, −2, 3, −3, 6, −2, −1, 0, 0}; {3, −4, 5, −2, −1, 2, −4, 2, 3, 1, 0, 0}; {2, −5, 4, −3, −2, 2, −5, 1, 2, 1, 0, 0}; {, −3, −1, 5, −5, 6, −2, 5, −1, −4, 4, 0, 0}; {5, 6, −1, 0, −2, 1, −4, 1, −2, 5, 0, 0}; {5, 1, 1, −3, 2, 5, 1, 4, 4, −3, 0, 0}; {0, 5, 2, −5, −2, 4, 5, 1, 0, −2, 0, 0}; {2, −2, −2, 6, 0, 3, −1, 3, 2, −4, 0, 0}; {6, 2, 2, −2, 5, 0, 4, 6, −2, 0, 0, 0}; {5, −1, −3, 3, −4, 2, 3, 0, −2, −2, 0, 0}; {, −1, 6, 5, 0, 6, −4, 4, 6, 5, −2, 0, 0}; {5, −4, 3, 6, −3, 2, 0, −5, 5, 0, 0, 0}; {, −3, 3, 1, −5, 2, 6, −1, 3, 4, 3, 0, 0}; {, −3, 3, 1, −5, 2, 6, −1, 4, 4, 3, 0, 0}; {5, −4, 3, 6, −2, 6, 3, −5, 5, −1, 0, 0}; {4, −5, 2, 5, −3, 6, 2, −5, 5, 0, 0, 0}; {4, −4, 4, −4, 1, −1, −4, 3, 2, −2, 0, 0}; {0, 3, −2, 1, 6, 3, 1, 6, 4, −1, 0, 0}; {, −5, 0, −3, 2, −3, −1, 2, −5, −5, 4, 0, 0}; {6, 1, 0, −5, 4, −3, 3, −3, 0, 0, 0, 0}; {5, −1, −3, 3, −1, 4, −4, 1, 3, 2, 0, 0}; {5, −3, 5, −3, 4, 5, 5, 0, −2, −5, 0, 0}; {6, 2, 2, −2, −3, 2, −3, 3, −3, −2, 0, 0}; {6, 1, 0, −5, 5, −3, 3, −2, 1, 0, 0, 0}; {5, −1, −3, 3, 0, 4, −4, 2, 3, 2, 0, 0}; {5, 0, −1, 6, 4, −3, 3, −3, 0, 0, 0, 0}; {5, 0, −1, 6, 4, −3, 3, −2, 1, 0, 0, 0}; {0, 4, 0, 4, 0, −3, 0, −1, −5, 5, 0, 0}; {3, −2, −3, 4, 3, −4, 1, −3, 0, −1, 0, 0}; {3, −2, −3, 4, 3, −4, 2, −4, 0, −1, 0, 0}; {2, −3, −4, 3, 2, −4, 1, −4, 0, −1, 0, 0}; {0, 6, 4, −2, −3, 0, 5, −3, 2, 1, 0, 0}; {2, −3, −4, 3, 3, −4, 1, −4, 0, −1, 0, 0}; {, −1, 5, 3, −3, −4, 1, 4, −1, 2, 0, 0, 0}; {, −2, 4, 2, −4, −5, 0, 4, −2, 1, 0, 0, 0}; {2, −2, −2, 6, −4, 1, −4, 5, −3, −2, 0, 0}; {1, −3, −3, 5, −5, 0, −5, 5, −3, −2, 0, 0}; {1, −3, −3, 5, −5, 0, −4, 4, −3, −2, 0, 0}; {, −1, 6, 5, 0, 1, 6, 0, −4, 0, 0, 0, 0}; {, −5, 0, −3, 2, 1, 5, −4, 2, 3, 1, 0, 0}; {, −4, 2, 0, 6, 6, 0, 3, −3, 1, −1, 0, 0}; {6, 0, −2, 4, 4, −2, 3, −5, 1, 0, 0, 0}; {2, −4, 6, 0, 1, −4, 2, 5, 1, 0, 0, 0}; {2, −2, −2, 6, −3, −5, 2, −5, −3, −3, 0, 0}; {, −2, 6, 6, 2, 5, −2, 5, 4, −4, −2, 0, 0}; {, −3, 4, 3, −2, 0, 5, −1, −5, −1, −1, 0, 0}; {6, 0, −2, 4, 5, −2, 3, −2, 0, 0, 0, 0}; {6, 0, −2, 4, 5, −2, 4, −5, 2, 0, 0, 0}; {5, −1, −3, 3, 4, −3, 4, −4, 2, 1, 0, 0}; {4, −3, 6, −1, −1, 4, −5, 1, 2, 0, 0, 0}; {2, −5, 4, −2, −2, 4, 5, −1, 1, 0, 0, 0}; {2, −5, 4, −2, −2, 4, 5, −1, 2, 0, 0, 0}; {, −1, 2, −3, 1, −1, 3, 2, −5, 6, 3, 0, 0}; {0, 4, 0, 5, 4, −2, −3, 3, 4, 0, 0, 0}; {0, 5, 2, −4, −3, 3, 5, 0, 0, −2, 0, 0}; {, −3, 0, −5, −1, −2, 2, 2, −5, 5, 3, 0, 0}; {, −4, −2, 4, −5, 5, −3, 5, −2, −4, 4, 0, 0}; {6, −4, 2, 5, 3, −5, 4, −3, −5, 5, 0, 0}; {2, −5, 4, −2, 1, 6, −5, 3, 0, −1, 0, 0}; {, −4, 2, 0, −5, 0, 2, 5, 3, 5, 0, 0, 0}; {1, 4, −1, 3, −5, 4, 0, 6, 4, 0, 0, 0}; {, −1, 1, −5, −2, 1, −3, 5, −3, 6, 0, 0, 0}; {, −1, 1, −5, −2, 1, −3, 5, −3, −5, 1, 0, 0}; {, −4, 2, 0, −5, 2, 6, −1, 3, 3, 3, 0, 0}; {, −3, −1, 5, −4, 0, −4, 4, −3, −5, 1, 0, 0}; {6, −1, −4, 2, −3, −1, 3, 4, 3, 4, 0, 0}; {5, −2, −5, 1, −4, −1, 2, −5, 5, 4, 0, 0}; {3, −5, 3, −4, 2, 4, −5, −4, 6, 5, 0, 0}; {, −3, 1, −3, 2, −2, −5, −3, −2, 6, 5, 0, 0}; {, −4, 0, −4, 1, −3, −5, −3, −2, 6, 5, 0, 0}; {2, −5, 4, −2, −5, −2, −1, −3, 4, 5, 0, 0}; {0, −5, 6, 2, 1, 6, 0, 6, −2, −1, 0, 0}; {, −1, 6, 5, 1, 0, 5, −1, 5, −2, −1, 0, 0}; {, −2, 4, 2, −3, −5, −1, 5, −2, 1, 1, 0, 0}; {, −3, 0, −5, −1, 6, −4, −5, 2, −3, −5, 0, 0}; {, −4, −1, 6, −2, 5, −4, 6, 2, −4, −5, 0, 0}; {5, −4, 3, −5, 3, −1, 2, 0, −4, 6, 0, 0}; {4, −5, 2, 6, 2, −1, 2, −1, −4, 6, 0, 0}; {, −4, 2, 0, −5, 6, −2, 4, −4, 1, 0, 0, 0}; {, −2, 5, 4, 0, 0, 5, 0, 6, −1, −1, 0, 0}; {, −5, 1, −1, 6, 5, −2, 3, −4, 0, 0, 0, 0}; {, −5, 1, −1, 6, 5, −2, 3, −3, 0, 0, 0, 0}; {, −5, −1, −5, 0, −3, 1, 2, −4, 5, 3, 0, 0}; {5, −3, 5, −2, −5, 0, 1, 6, 4, 2, 0, 0}; {2, 5, 0, 4, 1, 5, 4, −3, 6, 4, 0, 0}; {3, −5, 3, −4, 6, −1, −1, 5, 4, 1, 0, 0}; {4, −4, 4, −3, −5, 0, 1, −5, 3, 2, 0, 0}; {2, 5, 0, 4, 1, 5, 5, −2, 6, 4, 0, 0}; {5, −1, −3, 4, 4, −3, 4, −4, 1, 0, 0, 0}; {4, −2, −4, 3, 3, −3, 1, −5, −1, −1, 0, 0}; {1, 6, 3, −2, −3, 3, 5, −2, 1, 0, 0, 0}; {, −1, 2, −3, 2, −1, 3, 4, −3, 5, 3, 0, 0}; {, −4, −1, 6, −1, −4, 1, 1, 6, 5, 2, 0, 0}; {, −4, −1, 6, −1, −3, 2, 0, 5, 5, 2, 0, 0}; {, −4, −1, 6, −1, −3, 2, 0, 6, 6, 1, 0, 0}; {, −2, 2, −2, 4, 3, −3, −4, 1, 3, 0, 0, 0}; {6, −4, 2, 6, 3, −5, 5, −3, −5, 4, 0, 0}; {6, −3, 4, −3, −4, 1, −1, 4, 5, 2, 0, 0}; {, −2, 3, 0, −5, −3, 3, 5, 0, −1, −2, 0, 0}; {4, −5, 2, −5, −5, 0, −2, 3, 4, 3, 0, 0}; {5, −4, 3, −4, −4, 1, −2, 3, 4, 3, 0, 0}; {3, −3, −5, 3, −5, −2, 5, 6, 4, −2, 0, 0}; {, −5, 1, −1, −5, −1, 3, 2, 4, −2, 1, 0, 0}; {6, 1, 0, −3, 3, −5, −2, −2, 2, −2, 0, 0}; {2, 4, −2, 2, 3, −1, 6, −2, −5, 1, 0, 0}; {, −1, 1, −5, −1, 1, −3, 4, −3, 6, 0, 0, 0}; {, −2, −1, 4, −5, −4, 3, −2, 1, −3, 2, 0, 0}; {, −5, 1, −1, −5, 1, 6, −1, 2, 3, 3, 0, 0}; {6, 0, −2, 6, 0, 5, −2, 2, 2, 3, 0, 0}; {3, −5, 3, −3, 1, 6, 6, 2, 0, −2, 0, 0}; {, −1, 2, −3, 2, 5, −2, −3, 4, 2, −1, 0, 0}; {5, −1, −3, 5, 0, 5, −2, 1, 2, 2, 0, 0}; {4, −4, 4, −2, 4, 4, −5, −4, 6, 5, 0, 0}; {6, −2, 6, 0, 6, 6, −2, −4, 6, 2, 0, 0}; {, −1, 5, 3, −1, −5, −2, −3, 0, 5, −1, 0, 0}; {, −2, 2, −2, 4, −2, 2, 3, −1, −3, −5, 0, 0}; {3, 6, 1, 6, 0, −2, 1, −1, −5, 5, 0, 0}; {4, −4, 4, −2, 5, 5, −5, −4, 5, 4, 0, 0}; {, −4, −1, 6, −1, 5, 6, −2, −4, 4, 0, 0, 0}; {, −1, 3, −1, 5, 0, 3, 3, 0, 6, 6, 0, 0}; {1, 4, −1, 4, −1, −3, 0, −1, 5, 4, 0, 0}; {6, −3, 4, −3, 4, 6, 6, 2, −4, −5, 0, 0}; {6, −3, 4, −3, 4, −5, 6, 2, −4, −5, 0, 0}; {0, 2, −4, 0, −5, −2, −5, 3, −2, −3, 0, 0}; {, −2, 0, 6, −2, 5, −3, 6, 2, −2, −3, 0, 0}; {, −1, 2, −3, 2, −2, 3, 2, −5, 5, 3, 0, 0}; {, −5, −1, −5, 2, 1, −5, −5, 0, 2, 0, 0, 0}; {4, 6, 0, 5, 2, 6, 4, −4, 6, 4, 0, 0}; {3, 5, −1, 4, 1, 5, 4, −4, 6, 4, 0, 0}; {, −5, −2, 5, −1, −3, 2, 0, 4, 5, 1, 0, 0}; {1, 3, −3, 2, 0, 5, 1, 6, 6, 2, 0, 0}; {, −2, 0, 6, −1, 0, −4, 3, −4, 5, 0, 0, 0}; {, −3, −1, 5, −2, −1, −4, 3, −4, 5, 0, 0, 0}; {6, 6, −2, 1, 0, −5, 1, 3, −2, 3, 0, 0}; {5, 5, −3, 0, −1, 6, 1, 3, −1, 3, 0, 0}; {1, −5, 5, 2, −5, 0, −1, 1, −5, 0, 0, 0}; {, −1, 2, −3, 3, 5, −2, −3, 3, 2, −1, 0, 0}; {, −3, −1, 5, −2, 0, −5, 3, −4, 5, 0, 0, 0}; {, −4, −2, 4, −3, −1, 6, 2, −5, 4, −1, 0, 0}; {, −5, −4, 1, 5, 6, 1, −4, −1, −5, 1, 0, 0}; {, −5, −4, 1, 5, 6, 1, −4, 0, −4, 2, 0, 0}; {5, 6, −1, 3, 4, 0, −5, −1, −5, 1, 0, 0}; {, −2, 3, 0, −4, 1, 1, 3, 6, 4, 4, 0, 0}; {2, 6, 2, −3, 1, 6, 6, 2, −1, −2, 0, 0}; {, −1, 3, −1, 6, −2, 4, 4, 0, −2, −3, 0, 0}; {6, −3, 4, −1, −3, 2, 0, 3, 5, 1, 0, 0}; {, −4, −2, 4, −2, −5, −1, 6, −5, −5, 6, 0, 0}; {, −5, −3, 3, −3, −2, 6, 2, −5, 4, −1, 0, 0}; {5, 6, −1, 4, 4, 0, −5, −1, 6, 1, 0, 0}; {, −1, 3, −1, −5, −2, 4, 5, 0, −2, −3, 0, 0}; {, −2, 2, −2, 6, −3, 3, 4, −1, −2, −3, 0, 0}; {5, −5, 1, −5, −3, 4, 0, 6, 3, −1, 0, 0}; {5, −5, 1, −5, −3, 5, 0, 6, 3, −1, 0, 0}; {3, 4, −3, 2, 3, −2, 5, −2, 6, 0, 0, 0}; {6, −2, 6, 2, 6, 5, −5, −3, 6, 5, 0, 0}; {3, 4, −3, 2, 3, −1, 6, −2, −5, 1, 0, 0}; {0, 4, 0, −4, 0, 5, 5, 1, −2, −2, 0, 0}; {, −3, 1, −3, 5, −3, 3, 4, −1, −3, −4, 0, 0}; {6, −3, 4, −1, 3, −4, −5, 2, −1, −3, 0, 0}; {2, 5, 0, −5, 0, 5, 5, 0, −2, −4, 0, 0}; {6, −3, 4, −1, 4, −4, −5, 3, 0, −2, 0, 0}; {4, −5, 2, −3, 2, 6, 6, 1, −1, −3, 0, 0}; {3, 6, 1, −4, 1, 5, 6, 1, −1, −3, 0, 0}; {1, 3, −3, 3, −4, −3, 0, −1, 5, 2, 0, 0}; {, −2, −1, 4, −2, 6, −2, −5, −3, −5, 6, 0, 0}; {5, −5, 1, −4, −3, 5, 0, 5, 3, −2, 0, 0}; {4, 6, 0, −5, −4, 4, 0, 5, 2, −2, 0, 0}; {2, 4, −2, 5, −5, 3, −2, 3, 1, −3, 0, 0}; {1, 2, −5, 1, 2, −3, 4, −3, 5, 0, 0, 0}; {0, 1, 6, 0, 1, −4, 3, −4, 4, −1, 0, 0}; {3, −5, 3, 0, 4, 3, 5, −4, 5, 5, 0, 0}; {1, 3, −3, 4, −5, 1, −2, 4, 1, −2, 0, 0}; {4, −5, 2, −2, 3, −5, 6, 2, −1, −2, 0, 0}; {6, −3, 4, 1, 6, 1, 0, −4, −3, 1, 0, 0}; {6, −2, 6, 4, −5, 3, 3, −2, −4, −4, 0, 0}; {4, −5, 2, −1, 1, −3, −5, 1, −2, −3, 0, 0}; {, −1, 1, −5, 3, 5, 1, −3, 1, 0, −4, 0, 0}; {4, −3, 6, 6, 0, −5, −3, 5, 4, −4, 0, 0}; {, −3, 2, 0, 1, 6, 3, 6, 2, 3, 5, 0, 0}; {1, −3, −2, 3, −3, 0, −4, 5, −4, −4, 0, 0}; {, −1, 6, 6, −1, 3, 4, −1, −3, −2, 0, 0, 0}; {, −2, 6, −5, 1, 6, −2, 6, 4, −4, −3, 0, 0}; {, −4, 4, 5, −1, 5, −4, 5, 4, 6, −4, 0, 0}; {6, 2, 3, −3, 3, −5, 4, 4, 6, −4, 0, 0}; {2, −2, −1, 5, 0, 4, 1, 4, 4, −3, 0, 0}; {2, −3, −3, 2, 2, −4, 2, 6, 1, −1, 0, 0}; {, −4, 6, −3, 5, −3, 2, 0, 0, 4, 6, 0, 0}; {6, 3, 5, 0, 4, −4, 4, 3, −5, −4, 0, 0}; {2, −2, −1, 5, −4, 0, −4, 5, −2, −1, 0, 0}; {, −5, 2, 2, −5, −3, 3, −2, 4, −1, 0, 0, 0}; {1, −5, 6, −1, 1, −5, 1, 5, 1, 0, 0, 0}; {1, −3, −2, 5, −3, 6, 2, −5, −5, −3, 0, 0}; {, −1, 6, 6, 0, 3, −1, 6, −1, −3, −2, 0, 0}; {, −2, 6, −5, 2, 6, 3, 0, 4, −4, −4, 0, 0}; {, −1, −5, −4, 3, −5, 5, 1, −5, 6, −3, 0, 0}; {, −1, 6, 6, 0, 3, 0, −5, −1, −3, −2, 0, 0}; {, −2, 6, −5, 2, 6, 4, 0, 5, −4, −4, 0, 0}; {, −2, 6, −5, 2, 6, −3, 5, 5, −5, −2, 0, 0}; {, −4, 3, 3, −3, 0, 3, −2, −5, −2, −1, 0, 0}; {, −5, 2, 2, −4, −1, 3, −2, −5, −2, −1, 0, 0}; {6, 0, −1, 4, 6, −3, 4, −1, 1, 0, 0, 0}; {, −5, 2, 2, −4, 0, −3, 4, −4, −1, −2, 0, 0}; {6, 2, 3, −2, 3, −4, 4, 3, −5, −3, 0, 0}; {4, −1, −1, 5, −3, 1, −3, 5, −2, −1, 0, 0}; {3, −3, −4, 1, 4, −5, 2, −2, 0, 0, 0, 0}; {1, −5, 6, −1, 3, 6, 1, −3, 0, 0, 0, 0}; {2, −3, −3, 3, −4, 0, −4, 5, −3, −1, 0, 0}; {3, −5, 4, −5, 2, 3, 5, −2, −3, 4, 0, 0}; {2, −5, 5, −3, 6, −4, 0, 6, 6, 3, 0, 0}; {1, −4, −4, 2, 1, 6, 1, 6, 0, 0, 0, 0}; {0, −5, −5, 1, 0, 6, 0, 5, 0, 0, 0, 0}; {6, 4, −5, 4, −5, 2, −3, −1, 4, 6, 0, 0}; {1, −4, −4, 2, 2, −5, 0, −5, 0, −1, 0, 0}; {0, −5, −5, 1, 1, 6, 1, −4, 0, 0, 0, 0}; {3, −4, 6, −2, −4, 3, −5, −3, 5, 4, 0, 0}; {5, 2, 4, 0, 3, −4, 3, 3, −5, −4, 0, 0}; {3, 0, 2, −2, 1, 6, 2, 2, 6, −4, 0, 0}; {3, 0, 2, −2, 1, 6, 3, 2, 6, −4, 0, 0}; {1, −4, −4, 2, 3, −5, 1, −3, 0, −1, 0, 0}; {0, −5, −5, 1, 2, 6, 1, −4, 0, −1, 0, 0}; {, −2, 4, 3, −4, −4, −1, 5, 0, 2, 1, 0, 0}; {, −1, 6, 6, 0, 1, 5, 0, −4, 0, 0, 0, 0}; {5, 0, 0, 6, −5, 3, −2, 3, −1, −1, 0, 0}; {2, −4, −5, 0, 1, −4, 1, 5, 1, 0, 0, 0}; {1, −4, −4, 2, 4, 1, −5, 1, −2, −1, 0, 0}; {, −5, 1, 0, 5, 6, −2, 4, −1, 1, 0, 0, 0}; {, −4, 3, 3, −3, −1, 4, −1, −5, −1, −1, 0, 0}; {, −5, 2, 2, −4, −2, 3, −2, 6, −1, 0, 0, 0}; {5, 0, 0, 6, −4, 2, −2, 4, −1, 0, 0, 0}; {3, −3, −4, 1, 2, −4, 2, 5, 1, 0, 0, 0}; {4, −1, −1, 5, −5, 2, −3, 2, −1, −1, 0, 0}; {1, −5, 6, 0, 1, −5, 1, −4, 0, 0, 0, 0}; {1, −5, 6, 0, 1, −5, 1, 5, 1, 0, 0, 0}; {0, 6, 5, −1, 0, 6, 1, 5, 1, 1, 0, 0}; {0, 6, 5, −1, 0, 6, 2, 6, 1, 1, 0, 0}; {, −1, 5, 4, −2, −1, 5, 1, 5, 1, 1, 0, 0}; {1, −5, 6, 0, 1, −5, 0, −4, 0, 1, 0, 0}; {0, −5, −5, 2, 4, 0, −4, 0, −2, −2, 0, 0}; {0, −5, −5, 2, 4, 0, 5, −1, −3, −1, 0, 0}; {, −1, 6, 6, 1, 3, 0, −5, 0, −3, −2, 0, 0}; {, −2, 5, 5, 0, 2, −1, 6, −2, −1, −2, 0, 0}; {5, −4, 4, −5, 5, −1, 2, 0, −3, 6, 0, 0}; {3, 6, 2, 5, 3, −3, 1, −1, −4, 5, 0, 0}; {, −5, 2, 2, −3, −1, 3, −2, −5, −2, −2, 0, 0}; {, −4, 4, 5, 1, 4, −3, 5, 3, −4, −2, 0, 0}; {, −5, 2, 2, −3, −1, 4, −2, −5, −1, −1, 0, 0}; {4, −1, −1, 6, −4, 2, −4, 5, −3, −2, 0, 0}; {, −1, 5, 4, −2, 0, 6, 0, 4, 0, −1, 0, 0}; {, −2, 6, −5, 3, −5, 4, 0, 6, −4, −3, 0, 0}; {, −5, 3, 4, 0, 4, 2, −1, 4, −5, −4, 0, 0}; {, −2, 0, −5, −3, −5, 0, 5, 0, −3, 6, 0, 0}; {3, −3, −4, 2, 4, −5, −4, 5, −1, 2, 0, 0}; {3, −2, −2, 5, −4, 1, −4, 5, −2, −1, 0, 0}; {0, 6, 5, −1, 2, 5, 0, −4, −1, 0, 0, 0}; {, −5, 2, 2, −3, 3, 6, 2, 5, 4, −2, 0, 0}; {3, −3, −4, 2, −5, 1, 2, −1, −3, −1, 0, 0}; {3, −4, 6, −1, 6, −3, 1, 6, 5, 4, 0, 0}; {3, −3, −4, 2, −2, 2, −4, 1, 3, 2, 0, 0}; {2, −4, −5, 1, −2, 1, 6, 1, 3, 1, 0, 0}; {2, −5, 5, −2, 6, −4, 0, 6, 5, 4, 0, 0}; {0, 5, 3, −4, 4, 6, −2, 5, 5, 2, 0, 0}; {1, −5, 6, 0, −3, 0, 6, 1, 2, 2, 0, 0}; {1, −5, 6, 0, −3, 1, 6, 0, 2, 1, 0, 0}; {2, −3, −3, 4, 2, −5, 1, −3, −1, −1, 0, 0}; {1, −5, 6, 0, −3, 1, 6, 1, 2, 2, 0, 0}; {1, −5, 6, 0, −2, 1, 6, 0, 3, 1, 0, 0}; {, −1, 5, 4, −2, −4, 0, 4, −1, 2, 0, 0, 0}; {, −2, 2, −1, 3, −1, 1, 3, −3, 6, 4, 0, 0}; {0, −5, −5, 2, 1, 6, 0, 6, −1, −1, 0, 0}; {1, −4, −4, 3, 2, −5, 1, −4, −1, −1, 0, 0}; {0, −5, −5, 2, 1, 6, 0, −5, −1, −1, 0, 0}; {1, −4, −4, 3, 2, −5, 1, −3, 0, 0, 0, 0}; {, −2, 4, 3, −3, −5, −1, 4, −1, 1, 1, 0, 0}; {, −4, 1, −1, 4, 1, 5, −4, 2, 3, 2, 0, 0}; {, −3, 3, 2, −4, 6, −1, 3, −2, 1, 0, 0, 0}; {, −3, 3, 2, −4, 6, −1, 4, −2, 1, 0, 0, 0}; {, −2, 5, 5, 0, −1, 5, −1, 6, −2, −1, 0, 0}; {, −4, 2, 1, −5, 5, −1, 3, −3, 1, 0, 0, 0}; {, −5, 1, 0, 6, 4, −2, 2, −4, 0, 0, 0, 0}; {, −4, 0, −3, 1, −2, 6, −3, −2, 6, 5, 0, 0}; {2, −1, 1, −2, 0, 6, 1, 2, 6, −5, 0, 0}; {0, −5, −5, 2, 2, 6, 0, −4, 0, −1, 0, 0}; {0, −4, −3, 5, 6, −1, 6, 5, −4, −3, 0, 0}; {0, −4, −3, 5, 6, −1, 6, 5, −3, −3, 0, 0}; {, −1, 6, 6, 1, 1, 5, 0, −4, −1, −1, 0, 0}; {0, −4, −3, 5, 6, −1, −5, 4, −4, −3, 0, 0}; {, −1, 6, 6, 1, 1, 5, 0, −4, −1, 0, 0, 0}; {, −3, 3, 2, −4, −5, −2, 4, 0, 1, 0, 0, 0}; {, −2, 4, 3, −3, −4, 0, 4, −1, 2, 0, 0, 0}; {, −2, 5, 5, 0, 0, 5, −1, −5, −2, −2, 0, 0}; {, −2, 5, 5, 0, 0, 5, −1, −5, −2, −1, 0, 0}; {, −2, 4, 3, −3, −4, 0, 5, 0, 3, 1, 0, 0}; {, −3, 3, 2, −4, −5, −1, 4, −1, 2, 1, 0, 0}; {, −4, 2, 1, −5, 6, −2, 3, −2, 1, 1, 0, 0}; {, −2, 5, 5, 0, 0, 5, −1, −4, −1, −2, 0, 0}; {, −4, 2, 1, −5, 6, −2, 3, −1, 1, 0, 0, 0}; {, −4, 2, 1, −5, 6, −2, 3, −1, 1, 1, 0, 0}; {, −5, 1, 0, 6, 5, −2, 2, −3, 0, 0, 0, 0}; {6, 0, −1, 5, 4, −3, 2, −3, 0, 1, 0, 0}; {, −3, 4, 4, −1, −1, 5, −1, −5, −1, −1, 0, 0}; {, −2, 3, 1, 6, 5, 0, 5, −5, 3, 2, 0, 0}; {, −1, 6, 6, 1, 2, 0, 6, −2, −1, −2, 0, 0}; {6, −2, −5, −1, −3, 5, −3, −3, 5, 4, 0, 0}; {, −2, 6, −5, 3, 5, −2, 5, 4, −4, −3, 0, 0}; {, −3, 4, 4, −1, 0, 4, −1, −5, −1, −1, 0, 0}; {, −2, 6, −5, 3, 5, −2, 6, 4, −4, −3, 0, 0}; {, −4, 3, 3, −2, −1, 4, −2, −5, −2, −2, 0, 0}; {, −4, 4, 5, 1, 3, −3, 4, 3, −5, −3, 0, 0}; {5, −1, −2, 4, 4, −4, 1, −2, 0, 1, 0, 0}; {5, −1, −2, 4, 4, −3, 2, −3, 0, −1, 0, 0}; {5, 0, 0, −5, −4, 2, −4, 5, −3, −1, 0, 0}; {5, −1, −2, 4, 4, −3, 3, −2, 1, 0, 0, 0}; {, −2, 4, 3, −2, −1, 5, −1, 6, −1, 0, 0, 0}; {, −3, 2, 0, 6, 6, 0, 3, −3, 1, 0, 0, 0}; {, −4, 2, 1, −4, −3, 5, −2, 5, −2, −1, 0, 0}; {, −5, −3, 4, −5, 4, −4, 5, −2, −5, 5, 0, 0}; {, −2, 3, 1, −5, −5, 2, 3, −2, 1, −2, 0, 0}; {, −1, 1, −4, −1, −4, 2, 5, 1, −2, −5, 0, 0}; {3, 4, −2, 0, −3, 0, −4, 1, −3, 6, 0, 0}; {6, 1, 1, −3, 3, 5, 1, 4, 3, −3, 0, 0}; {3, −3, −4, 3, −2, 3, −3, 1, 2, 2, 0, 0}; {5, 6, 0, 2, 5, 0, −4, −1, −4, 1, 0, 0}; {, −1, 4, 2, −4, 3, 4, −4, 5, 5, 2, 0, 0}; {0, 6, 5, 0, −4, −1, 4, 1, 3, 0, 0, 0}; {0, 6, 5, 0, −4, 0, 6, 0, 1, 1, 0, 0}; {, −1, 5, 4, −1, −5, −1, 5, 0, 1, 1, 0, 0}; {1, −5, 6, 1, −3, 2, −5, 1, 2, 2, 0, 0}; {6, −4, 3, 6, −1, 6, 3, −4, 6, 0, 0, 0}; {, −3, 3, 2, −3, 6, −3, 3, 0, 1, 0, 0, 0}; {, −2, 5, 5, 1, −1, 3, −1, −4, −2, −2, 0, 0}; {, −1, 6, 6, 2, 0, 5, 0, −5, −2, −1, 0, 0}; {, −2, 4, 3, −2, −5, −1, 5, −1, 2, 1, 0, 0}; {, −3, 3, 2, −3, 6, −2, 4, 0, 1, 0, 0, 0}; {, −2, 4, 3, −2, −5, 0, 5, −1, 1, 1, 0, 0}; {, −3, 3, 2, −3, 6, −1, 5, −2, 1, 1, 0, 0}; {, −3, 4, 4, 0, −1, 4, −1, 6, −2, −1, 0, 0}; {, −4, 0, −3, 2, −2, 1, 2, −2, 5, 5, 0, 0}; {, −4, 0, −3, 2, −2, 1, 3, −3, 5, 4, 0, 0}; {, −5, −1, −4, 1, −3, 0, 2, −3, 5, 4, 0, 0}; {5, −1, −2, 5, 3, −3, 2, −4, 0, 0, 0, 0}; {0, 2, −3, 0, −5, −2, −5, 3, −3, −4, 0, 0}; {3, −3, −4, 3, 2, −3, 1, −4, 0, −1, 0, 0}; {, −5, 2, 2, −2, −2, 3, −2, 6, −2, −1, 0, 0}; {6, −2, −5, 1, 0, 6, −5, 1, 2, −1, 0, 0}; {, −4, −2, 5, −3, −1, −5, 2, −5, 5, −1, 0, 0}; {0, 4, 1, −5, −1, 4, 5, 1, −1, −3, 0, 0}; {, −2, 2, −1, 5, −3, 3, 4, 0, −1, −4, 0, 0}; {6, −4, 3, −5, −2, 6, 2, −5, 5, −1, 0, 0}; {3, 3, −4, −2, −1, 6, 0, 2, −2, 3, 0, 0}; {1, −5, 6, 2, −3, 2, −4, 0, 1, 2, 0, 0}; {0, 0, 5, −5, −3, 4, −1, 1, −2, 3, 0, 0}; {4, −4, 5, −1, −5, 0, 1, −4, 4, 4, 0, 0}; {, −1, 1, −4, 0, 6, −2, −4, 3, −3, −4, 0, 0}; {, −5, 2, 2, −1, −2, 3, −2, 4, −3, −2, 0, 0}; {1, 2, −4, 0, 5, 2, 5, 2, −2, −4, 0, 0}; {1, −4, −4, 6, −2, 3, −1, 1, 1, −5, 0, 0}; {, −1, 4, 2, −2, 2, 1, 3, −5, 4, 5, 0, 0}; {, −4, 0, −3, 4, −4, 2, 3, 0, −2, −4, 0, 0}; {2, 4, −1, 4, −5, 3, −1, 5, 3, −2, 0, 0}; {0, 0, 5, −4, −3, 4, −2, 1, −3, 2, 0, 0}; {4, −5, 3, −3, 1, 6, 6, 2, 0, −3, 0, 0}; {4, 6, 1, −5, −3, 4, 0, 6, 3, −1, 0, 0}; {2, 4, −1, 5, −5, 3, −1, 5, 3, −2, 0, 0}; {, −5, −4, −2, −4, 2, −5, −5, 2, 5, 0, 0}; {, −4, −5, −1, 2, 1, −4, 2, 4, −1, 3, 0, 0}; {, −3, −4, 0, 3, 2, −3, 2, 4, −2, 3, 0, 0}; {2, 5, 1, −4, 0, 5, 6, 1, −1, −3, 0, 0}; {3, 5, 0, 6, −3, 2, −1, 6, 2, −1, 0, 0}; {3, 6, 2, −3, 1, −5, 6, 2, −1, −3, 0, 0}; {, −1, 0, 6, −1, 1, −4, 2, −4, 5, −1, 0, 0}; {, −2, −1, 5, −2, 0, −5, 2, −4, 5, −1, 0, 0}; {6, −4, 3, −2, 2, −5, −5, 2, 0, −3, 0, 0}; {, −4, −2, 5, 0, 5, −3, −5, 3, 0, −2, 0, 0}; {, −2, 1, −3, 5, −3, 3, 4, −1, −2, −4, 0, 0}; {6, −1, −3, −4, 1, −4, −3, −5, 4, −5, 0, 0}; {, −3, −4, 1, −5, 5, 2, −3, −1, 6, −1, 0, 0}; {, −3, −3, 3, −2, −1, 6, 1, 4, 2, −3, 0, 0}; {4, 2, 6, 0, −4, 6, 1, 2, −4, 0, 0, 0}; {5, 5, −1, −5, 6, −1, 5, 1, 5, −1, 0, 0}; {2, −1, 2, −5, 3, −3, −4, 0, 2, 4, 0, 0}; {, −4, 6, −2, 5, 0, 5, −4, −1, −5, −5, 0, 0}; {, −1, −4, −1, 5, 1, −4, −5, −1, 1, 4, 0, 0}; {5, 6, 1, −1, −1, 4, −1, −3, 2, −3, 0, 0}; {0, −3, 0, 6, 2, −4, −5, −1, 1, 4, 0, 0}; {2, 0, 4, 0, 6, 4, 4, −3, 3, 5, 0, 0}; {1, −4, −3, 2, 5, 5, 1, −3, −1, 0, 0}; {1, −5, −5, −1, 1, −5, 0, 6, 1, 0, 0, 0}; {, −1, 5, 5, −3, −1, 6, −1, 5, 0, 0, 0}; {0, −5, −4, 1, 4, 0, 6, 1, −2, −1, 0, 0}; {, −2, −5, −2, 5, −1, −3, −5, 4, −5, −4, 0, 0}; {4, −1, 0, 5, −1, 1, −2, 6, −3, −4, 0, 0}; {3, 5, 1, 1, −4, −1, 6, 2, −3, −3, 0, 0}; {4, 2, 6, 2, −5, 3, 6, −3, 4, 5, 0, 0}; {3, −2, −1, 4, 6, 1, −5, 3, −2, 0, 0, 0}; {, −2, 4, 4, −3, −2, 5, −1, 4, 0, 0, 0, 0}; {, −1, 6, −5, 1, 3, 0, −5, 0, −2, −2, 0, 0}; {, −4, 1, 0, 4, 4, −1, 4, −5, 3, 2, 0, 0}; {, −2, 5, 6, 0, 2, −1, 6, −1, −3, −2, 0, 0}; {, −3, 3, 3, −4, −3, 5, −1, 4, 0, 0, 0, 0}; {, −5, −1, −3, 0, −1, 5, −3, −2, 6, 4, 0, 0}; {0, −3, 0, −4, 0, 4, 2, 1, 5, 6, 0, 0}; {, −4, 4, 6, 1, 4, −3, 5, 3, −4, −3, 0, 0}; {, −3, 4, 5, −1, 2, −3, 5, −2, −4, −2, 0, 0}; {, −4, 3, 4, −2, 1, −3, 5, −3, −4, −3, 0, 0}; {, −4, 3, 4, −2, 1, −3, 5, −2, −4, −2, 0, 0}; {, −3, 6, −3, 5, −2, −4, −5, 0, 5, 6, 0, 0}; {, −5, 1, 1, 6, −4, 4, −2, 3, 0, 0, 0, 0}; {, −5, 0, −1, 3, 5, −2, 4, −4, 4, 2, 0, 0}; {6, 2, 4, −1, 4, 1, −2, 4, 6, −4, 0, 0}; {6, 1, 2, −4, 0, −3, 4, −4, −2, −1, 0, 0}; {, −4, 3, 4, −2, 2, 0, −5, −2, −3, −1, 0, 0}; {6, 0, 0, 5, −4, 5, −1, 1, −1, 1, 0, 0}; {1, 4, 1, 3, 3, −3, 1, −2, −5, 5, 0, 0}; {4, 1, 4, 0, −4, 6, 0, 2, −5, −1, 0, 0}; {4, −1, 0, 6, 0, −2, −5, −3, −5, −1, 0, 0}; {6, 3, 6, 2, −2, 1, 5, −2, −2, −5, 0, 0}; {3, 0, 3, −1, −4, 6, −1, 0, 6, −2, 0, 0}; {, −2, 5, 6, 0, −4, 3, −5, −5, −1, 1, 0, 0}; {, −3, 4, 5, −1, −2, 4, −1, 4, −1, −1, 0, 0}; {, −4, 0, −2, 1, −3, 1, −3, −3, 5, 6, 0, 0}; {4, 2, 6, 3, 6, 0, −3, −1, 3, 6, 0, 0}; {1, −5, −5, 0, 0, −5, 1, 5, 1, 0, 0, 0}; {, −1, 4, 3, −5, 6, 0, 5, −4, 3, 2, 0, 0}; {, −5, 2, 3, −3, −2, 3, −2, 6, −1, −1, 0, 0}; {0, 6, 6, 0, 0, 6, 1, 5, 1, 0, 0, 0}; {, −2, 3, 2, −5, 6, −1, 5, −4, 3, 2, 0, 0}; {2, −3, −2, 5, 6, 1, −5, 4, −3, −2, 0, 0}; {0, 6, 6, 0, 0, 6, −1, −5, −1, 0, 0, 0}; {, −1, 5, 5, −1, −1, 6, 0, 4, 0, −1, 0, 0}; {, −5, −1, −3, 1, −1, 4, −3, −2, 5, 3, 0, 0}; {, −4, 1, 0, 5, 4, −1, 3, −5, 2, 1, 0, 0}; {6, −1, −2, 3, 2, −2, 3, 5, 3, 1, 0, 0}; {5, −3, −5, −1, −3, 4, −4, −3, 6, 4, 0, 0}; {3, 6, 3, 6, 3, −2, 0, 0, −4, 6, 0, 0}; {, −3, 6, −3, 6, −3, 2, 0, 0, 4, 6, 0, 0}; {, −5, 3, 5, 1, 3, −4, 4, 3, 6, −4, 0, 0}; {6, 1, 2, −3, −2, 2, −3, −5, −3, −1, 0, 0}; {6, 1, 2, −3, −2, 3, −3, 6, −2, −2, 0, 0}; {4, −1, 0, −5, −4, 1, −3, 5, −2, −1, 0, 0}; {5, 1, 3, −1, 1, −4, 3, 2, −5, −3, 0, 0}; {3, −2, −1, 6, −5, 1, −4, 5, −3, −2, 0, 0}; {1, −5, −5, 1, 1, 6, 0, −4, 0, 1, 0, 0}; {0, 6, 6, 0, 1, 6, 0, −4, 0, 0, 0, 0}; {1, −4, −3, 4, 6, 0, −5, 4, −3, −2, 0, 0}; {, −5, 1, 1, −5, −4, 4, −3, 2, −1, −1, 0, 0}; {, −5, 1, 1, −5, −4, 4, −3, 2, −1, 0, 0, 0}; {6, −1, −2, 3, 3, −2, 3, 6, 2, 1, 0, 0}; {, −5, 1, 1, −5, −4, 4, −2, 2, −1, −1, 0, 0}; {, −5, 1, 1, −5, −4, 4, −2, 5, −1, 0, 0, 0}; {4, −3, −4, 1, 1, −4, 2, 5, 2, 1, 0, 0}; {5, −1, −1, 5, 6, 3, −3, 1, −1, −1, 0, 0}; {5, −1, −1, 5, 6, 3, −3, 1, −1, 0, 0, 0}; {, −3, 3, 3, −3, −1, 4, −1, −5, −1, 0, 0, 0}; {, −5, 2, 3, −2, 1, −3, 1, −3, −5, −2, 0, 0}; {6, 0, 0, 6, −4, 3, −3, 2, −1, −1, 0, 0}; {6, 1, 2, −3, 0, −3, 4, −3, −3, −2, 0, 0}; {4, −2, −2, 4, 6, 2, −4, 1, −2, −1, 0, 0}; {4, −2, −2, 4, 6, 2, −3, 1, −1, −1, 0, 0}; {4, −2, −2, 4, 6, 2, −3, 1, −1, 0, 0, 0}; {4, −1, 0, −5, −2, −5, 3, −4, −5, −3, 0, 0}; {3, −2, −1, 6, −3, −5, 3, −4, −5, −3, 0, 0}; {, −4, −2, 6, −4, 6, 0, 4, 0, −3, 6, 0, 0}; {, −3, 3, 3, −3, 0, 4, −1, −5, −1, −1, 0, 0}; {5, −2, −3, 2, 4, −3, 3, −5, 3, 1, 0, 0}; {5, 1, 3, −1, 4, 1, −2, 5, 6, −3, 0, 0}; {2, −3, −2, 5, −3, 6, 1, −5, −4, −3, 0, 0}; {2, −3, −2, 5, −3, 6, 2, −5, 6, −4, 0, 0}; {2, −3, −2, 5, −3, 6, 2, −5, −3, −3, 0, 0}; {3, −1, 1, −3, 2, 0, −3, 3, 6, −4, 0, 0}; {3, −2, −1, 6, −2, −4, 3, −4, −5, −2, 0, 0}; {1, −3, −1, −5, 1, −3, −4, 5, −5, −3, 0, 0}; {3, −2, −1, 6, 0, −4, −3, −5, −5, −3, 0, 0}; {3, 0, 3, 0, −4, −1, 4, −3, −3, −5, 0, 0}; {, −3, 4, 5, 0, −5, 3, 6, 5, 5, −5, 0, 0}; {0, −4, −2, 6, 4, −2, 3, 5, −3, −4, 0, 0}; {, −3, 2, 1, 6, 2, 4, −3, 4, 5, 2, 0, 0}; {1, −5, −5, 1, −2, 2, −5, 2, 1, 2, 0, 0}; {, −3, 1, −1, 3, −2, 0, 3, −3, 6, 4, 0, 0}; {, −2, 3, 2, −5, 3, 6, −2, 5, 3, 3, 0, 0}; {, −2, 3, 2, −5, 3, 6, −2, 5, 6, 4, 0, 0}; {, −2, 3, 2, −5, 3, 6, −1, 5, 4, 3, 0, 0}; {, −2, 4, 4, −2, −5, −1, 5, 0, 1, 1, 0, 0}; {, −3, 2, 1, 6, 2, 5, −2, 5, 3, 2, 0, 0}; {, −5, −1, −3, 1, −4, −2, 2, −4, 6, 3, 0, 0}; {, −3, 3, 3, −3, 6, −1, 4, −1, 0, 1, 0, 0}; {, −5, 2, 3, −2, −4, 3, −3, 5, −3, −1, 0, 0}; {, −3, 2, 1, 6, 3, 5, −3, 4, 5, 3, 0, 0}; {, −3, 3, 3, −3, −5, −2, 4, 0, 1, 1, 0, 0}; {, −3, 2, 1, 6, 3, 6, −2, 5, 3, 2, 0, 0}; {, −4, 1, 0, 5, 2, 5, −3, 4, 5, 3, 0, 0}; {, −4, 2, 2, −4, 6, −2, 3, −1, 1, 0, 0, 0}; {, −4, 2, 2, −4, 6, −2, 3, −1, 1, 1, 0, 0}; {, −4, 2, 2, −4, 6, −2, 4, −1, 1, 0, 0, 0}; {, −4, 2, 2, −4, 6, −2, 4, −1, 2, 1, 0, 0}; {6, −1, −2, 3, 0, 3, −4, 3, 3, 2, 0, 0}; {, −5, 1, 1, −5, 5, −2, 3, −2, 0, 0, 0, 0}; {6, 0, 0, 6, 4, −3, 3, −2, 1, 1, 0, 0}; {, −5, 2, 3, −2, −3, 3, −2, 6, −2, −1, 0, 0}; {3, −3, −3, 3, 1, −4, 1, 5, 1, 0, 0, 0}; {, −1, 4, 3, −4, 6, 0, 5, −4, 3, 2, 0, 0}; {, −2, 6, −4, 4, 5, −2, 6, 4, −5, −3, 0, 0}; {, −5, 1, 1, −5, 6, −3, 3, −1, 1, 1, 0, 0}; {, −5, 1, 1, −5, 6, −3, 3, −1, 1, 0, 0, 0}; {, −3, 5, −5, 3, 4, −3, 5, 4, −5, −3, 0, 0}; {, −3, 5, −5, 3, 4, −3, 5, 4, −5, −4, 0, 0}; {, −4, 3, 4, −1, −1, 4, −2, −5, −2, −1, 0, 0}; {5, −1, −1, 5, 4, −4, 2, −5, 1, 0, 0, 0}; {6, 0, 0, 6, 5, −3, 3, −1, 0, 0, 0, 0}; {5, −1, −1, 5, 4, −4, 2, −2, 1, 1, 0, 0}; {6, 1, 2, −3, −3, 2, −3, 6, −2, −1, 0, 0}; {5,

−1, −1, 5, 4, −4, 3, −2, 1, 0, 0, 0}; {5, −1, −1, 5, 4, −4, 3, −2, 1, 1, 0, 0}; {6, 1, 2, −3, −3, 3, −3, 6, −3, −2, 0, 0}; {4, −2, −2, 4, 3, −4, 1, −3, 0, −1, 0, 0}; {4, −2, −2, 4, 3, −4, 1, −3, 0, 0, 0, 0}; {4, −4, 6, −1, −4, 3, −5, −3, 4, 3, 0, 0}; {6, −5, 2, 4, −2, 2, −2, 5, −2, −3, 0, 0}; {0, 3, 0, 4, 0, −4, −2, −1, −5, 6, 0, 0}; {2, −5, 6, 0, −2, 1, 6, 1, 3, 2, 0, 0}; {4, −1, 0, −4, −4, 1, −4, 5, −3, −2, 0, 0}; {1, 6, 5, −1, −3, 0, 5, 0, 2, 2, 0, 0}; {5, 1, 3, 0, 1, −5, 3, 2, 6, −4, 0, 0}; {3, −3, −3, 4, 3, −5, 1, −4, 0, 0, 0, 0}; {2, −4, −4, 3, 2, −5, 1, −4, 0, 0, 0, 0}; {2, −4, −4, 3, 2, −5, 1, −3, 0, 0, 0, 0}; {1, −4, −3, 5, 6, 0, −5, 4, −3, −2, 0, 0}; {, −1, 5, 5, 0, 0, 5, −1, −5, −1, 0, 0, 0}; {5, −2, −3, 3, 2, −3, 2, 6, 1, 1, 0, 0}; {3, −4, −5, 1, 0, −4, 2, 5, 1, 1, 0, 0}; {6, −1, −2, 4, 4, −1, 2, −4, 1, −1, 0, 0}; {4, −2, −2, 5, 6, 2, −3, 2, −2, −1, 0, 0}; {, −4, −2, 6, −3, 6, 0, 3, 1, −3, 6, 0, 0}; {3, −4, −5, 1, 2, −4, 1, −4, 1, 1, 0, 0}; {5, −5, 3, 6, 4, −1, 3, −1, −4, 6, 0, 0}; {3, 0, 3, 1, −4, 4, 4, 1, 5, −4, 0, 0}; {, −4, 1, 0, 6, 0, 2, 5, 3, 5, 1, 0, 0}; {, −3, 2, 1, −5, 2, 5, −2, 4, 2, 2, 0, 0}; {, −3, 2, 1, −5, 2, 5, −1, 4, 3, 3, 0, 0}; {5, −2, −3, 3, −2, 1, −5, 3, 3, 0, 0, 0}; {, −1, −4, −1, −3, −3, 3, −1, 2, 5, −5, 0, 0}; {4, −3, −4, 2, −2, 0, 5, 2, 3, 1, 0, 0}; {6, 0, 0, −5, 4, −5, 1, −1, 1, −1, 0, 0}; {6, 0, 0, −5, 4, −5, 2, −1, 0, −1, 0, 0}; {, −3, 6, −3, −5, −5, 2, −2, 1, 5, −5, 0, 0}; {5, −3, −5, 0, −5, −3, 1, −5, 5, 3, 0, 0}; {6, −1, −2, 4, 0, 3, −4, 4, 2, 1, 0, 0}; {4, −3, −4, 2, −2, 1, −5, 3, 2, 1, 0, 0}; {3, −4, −5, 1, −3, 0, 6, 2, 2, −1, 0, 0}; {5, −2, −3, 3, −1, 2, −4, 3, 2, 1, 0, 0}; {6, 0, 0, −5, 4, −4, 3, −1, 0, 0, 0, 0}; {5, −1, −1, 6, 3, −5, 2, −2, 0, 0, 0, 0}; {5, 0, 1, −3, −5, 2, −4, 4, −4, −2, 0, 0}; {5, −1, −1, 6, 4, −4, 2, −3, 0, 0, 0, 0}; {3, 6, 3, −5, 2, 4, 5, 0, −5, 6, 0, 0}; {4, −3, −4, 2, −1, 3, −5, 3, 4, 3, 0, 0}; {3, −3, −3, 4, 2, −4, 1, −5, −1, −1, 0, 0}; {, −1, 5, 5, 1, −1, 5, 0, 6, −1, 0, 0, 0}; {0, 3, 0, 5, 0, 3, 4, 0, 6, 6, 0, 0}; {, −2, 0, −4, 0, 6, −4, −4, 3, −3, −5, 0, 0}; {, −2, 1, −2, 3, −2, 3, 3, −2, 5, 4, 0, 0}; {1, −5, −5, 3, 1, 6, 1, −5, −1, 0, 0, 0}; {0, 6, 6, 2, 0, 5, 0, −5, −1, 0, 0, 0}; {2, 2, −4, −2, 6, 1, 6, 0, −1, −3, 0, 0}; {3, −1, 1, −1, −5, −1, 3, −5, −3, −4, 0, 0}; {, −4, 1, 0, −5, 1, −1, 2, 6, 3, 4, 0, 0}; {4, −2, −2, 6, 1, 5, 1, 0, 1, −3, 0, 0}; {2, −5, 6, 1, −4, −1, 6, 2, 2, −1, 0, 0}; {, −4, −3, 4, −4, 2, −1, 3, 0, −3, −4, 0, 0}; {6, 0, 0, −3, 2, 5, 1, 3, 2, −3, 0, 0}; {1, 4, 1, −5, −1, 4, 5, 1, −1, −4, 0, 0}; {0, 3, 0, 6, −2, 4, 5, 1, −1, −4, 0, 0}; {, −5, 6, −1, 1, 1, −4, 1, 3, −2, 3, 0, 0}; {, −2, 1, −2, 5, −3, 3, 4, 0, −2, −4, 0, 0}; {, −5, −5, 1, 5, 6, 1, −5, −1, −5, 1, 0, 0}; {6, −5, 2, −4, −2, 5, 0, 5, 3, −2, 0, 0}; {5, 4, −2, 4, 3, −1, −5, −2, 4, −1, 0, 0}; {4, 3, −3, 3, −1, 3, −3, −1, −4, −4, 0, 0}; {4, 2, −5, 0, −5, 3, 5, −3, 0, 2, 0, 0}; {2, 1, −5, 2, 0, 5, −2, 4, −5, 1, 0, 0}; {1, 0, 6, 1, −1, 4, −2, 4, −5, 1, 0, 0}; {, −3, −5, 0, 6, 3, −2, 1, 6, −2, 1, 0, 0}; {4, 5, 1, −2, −1, 4, −2, −4, 1, −3, 0, 0}; {3, 4, 0, −3, −2, 3, −2, −4, 2, −3, 0, 0}; {, −2, −4, 1, −5, 5, −3, 1, −5, −3, 2, 0, 0}; {, −4, 6, −1, 5, 3, −4, 0, 6, −3, 1, 0, 0}; {, −4, 5, −3, 3, −1, 6, 6, −2, 0, 3, 0, 0}; {0, 0, −5, 4, 3, −4, 2, −1, 3, −2, 0, 0}; {, −2, −4, 1, −4, 5, −3, 1, −5, −3, 2, 0, 0}; {, −2, −2, 5, 2, 2, −5, 0, −2, 2, −3, 0, 0}; {1, −4, −2, 2, −2, −1, −3, 5, −4, −5, 0, 0}; {0, −3, 1, −5, −3, 5, −2, −4, 6, −4, 0, 0}; {, −5, 2, 4, −3, 1, −3, 3, −1, −3, −2, 0, 0}; {5, −1, 0, 4, −5, 2, −4, 2, −1, −1, 0, 0}; {, −4, 5, −3, 4, −2, 1, 1, 0, 4, 5, 0, 0}; {, −1, 6, −4, 1, 6, 3, 0, −3, −3, −2, 0, 0}; {, −4, 3, 5, −2, 3, 2, −1, −4, −3, −3, 0, 0}; {0, 0, −5, 5, 3, −4, 1, −1, 2, −3, 0, 0}; {, −1, 5, 6, −2, 3, −2, 4, 0, −1, −2, 0, 0}; {, −3, −3, 4, 2, 1, 6, 0, −2, 2, −3, 0, 0}; {6, 4, −3, 5, 2, 6, −2, 5, −5, 1, 0, 0}; {, −5, 6, 0, −3, −5, 0, 5, 1, 5, −1, 0, 0}; {2, −2, 1, −5, 3, −3, −4, 0, 1, 4, 0, 0}; {, −2, 5, −5, 0, −5, 3, −5, 6, 6, 6, 0, 0}; {4, 2, −5, 3, 1, 5, −2, 5, −5, 1, 0, 0}; {, −1, 6, −4, 2, 3, −1, 3, −1, −4, −1, 0, 0}; {4, 0, 3, −2, 2, −1, −2, 2, −5, −5, 0, 0}; {3, −4, −4, 0, 1, −4, 1, 6, 2, 1, 0, 0}; {4, −2, −1, 4, 6, 2, −4, 3, −1, 0, 0, 0}; {3, −4, −4, 0, 1, −4, 2, −4, 2, 2, 0, 0}; {3, −3, −2, 3, 6, 1, −5, 2, −2, −1, 0, 0}; {2, −4, −3, 2, 5, 1, −5, 1, −2, −1, 0, 0}; {3, −1, 2, −3, 2, 0, −3, 4, 5, −4, 0, 0}; {2, −2, 1, −4, 1, −1, −3, 4, 4, −4, 0, 0}; {6, 4, −3, 6, 1, 6, −3, 4, 6, 0, 0, 0}; {1, −4, −2, 4, −3, 5, 1, −4, −5, −3, 0, 0}; {, −1, 5, 6, −1, 3, −2, 5, −1, −2, −2, 0, 0}; {2, −2, 1, −4, 2, −1, −4, 4, 5, −4, 0, 0}; {, −1, −5, −2, 5, −1, −4, −5, 5, −5, −4, 0, 0}; {1, −3, 0, −5, 1, −1, −5, 4, 5, −4, 0, 0}; {, −1, 6, −4, 2, −5, 4, 0, −5, −5, −3, 0, 0}; {, −3, 4, 6, 0, 5, 2, −1, −4, −3, −2, 0, 0}; {1, −4, −2, 4, −3, −4, 4, −5, −5, −2, 0, 0}; {4, −1, 1, −5, 0, −1, −4, −5, −4, −2, 0, 0}; {2, −4, −3, 2, 6, 4, 0, −1, −2, 0, 0, 0}; {, −5, 6, 0, −2, −5, 0, 4, 1, 4, −1, 0, 0}; {4, 2, −5, 4, 0, 5, −4, 3, 6, 0, 0, 0}; {0, −5, −3, 3, −3, 4, 0, −4, −4, −3, 0, 0}; {, −3, 3, 4, −3, 2, −3, 3, −1, −2, −2, 0, 0}; {, −3, 3, 4, −3, 2, −3, 4, −1, −1, −2, 0, 0}; {3, −2, 0, 6, 0, −3, −3, −5, −5, −3, 0, 0}; {1, −5, −4, 1, 6, 3, −1, 0, −2, 2, 0, 0}; {1, −5, −4, 1, 6, 4, 1, −2, −2, −2, 0, 0}; {, −2, 3, 3, −5, −1, −4, 4, 1, 0, 1, 0, 0}; {, −2, 5, −5, 1, −4, 4, −5, 6, 6, −5, 0, 0}; {, −3, 4, 6, 0, −5, 3, −5, 6, 6, −5, 0, 0}; {, −3, 4, 6, 0, −4, 4, 6, −5, −1, 1, 0, 0}; {, −4, 4, −5, 2, −1, −3, 2, 2, −4, 0, 0, 0}; {, −5, −1, −2, 1, −3, −2, 2, −4, −5, 4, 0, 0}; {4, −2, −1, 4, 2, −3, 3, 6, 2, 0, 0, 0}; {, −1, 5, 6, 0, −1, 5, −1, −5, −1, 0, 0, 0}; {, −1, 5, 6, 0, −1, 5, 0, 4, 0, −1, 0, 0}; {1, −5, −4, 2, 1, −5, −1, −5, −1, −1, 0, 0}; {0, 6, −5, 1, 0, 6, −2, 6, −1, −1, 0, 0}; {0, 6, −5, 1, 0, 6, −1, −5, −1, −1, 0, 0}; {, −2, 3, 3, −4, 6, 0, 4, −2, 2, 0, 0, 0}; {4, −4, −5, −1, −4, 3, −5, −3, 4, 2, 0, 0}; {, −3, 6, −2, −5, −3, 3, −1, 1, 4, −5, 0, 0}; {, −5, 4, −4, 5, −5, 1, −2, 0, 3, 6, 0, 0}; {2, −5, −5, 0, −2, 1, 6, 2, 1, 2, 0, 0}; {0, 5, 5, −2, −4, 0, 4, 0, 2, 2, 0, 0}; {, −5, 0, 0, 5, 4, −2, 4, −5, 3, 1, 0, 0}; {, −5, 1, 2, −4, −4, 4, −1, 2, 0, −1, 0, 0}; {4, −4, −5, −1, −3, 3, −4, −3, 5, 3, 0, 0}; {2, 6, 5, −3, −5, 2, 6, −4, 4, 3, 0, 0}; {2, 6, 5, −3, −5, 2, −5, −4, 4, 3, 0, 0}; {1, 6, 6, −1, −2, 0, 6, 2, 1, 2, 0, 0}; {3, −3, −2, 4, 5, 1, −4, 3, −2, 0, 0, 0}; {1, 6, 6, −1, −1, −5, 0, 4, 0, 0, 0}; {0, 4, 3, −5, 6, 1, 5, −4, 4, 3, 0, 0}; {0, 4, 3, −5, 6, 1, 6, −5, 3, 3, 0, 0}; {0, 4, 3, −5, 6, 1, 6, −5, 4, 3, 0, 0}; {2, −4, −3, 3, 4, 1, −4, 1, −2, −1, 0, 0}; {0, 5, 5, −2, −2, 6, 0, 4, 0, 1, 0, 0}; {, −2, 1, −1, 2, 0, 6, −1, −2, 6, 5, 0, 0}; {4, 0, 3, −1, 2, 6, 3, 2, 6, −5, 0, 0}; {5, −1, 0, 6, −4, 2, −2, 4, 0, 0, 0, 0}; {0, 5, 5, −2, −1, 6, 0, 6, 1, 1, 0, 0}; {1, −5, −4, 2, 4, 0, −4, 1, −2, 0, 0, 0}; {, −1, 5, 6, 0, 2, −1, 6, 0, −3, −1, 0, 0}; {, −1, 4, 4, −3, −2, 6, 0, 6, 1, 1, 0, 0}; {0, −4, −1, −5, 0, −2, −4, 3, 4, −4, 0, 0}; {0, −5, −3, 4, −4, 6, 2, −5, −5, −2, 0, 0}; {, −2, 5, −5, 2, 6, 4, 0, 6, −5, −4, 0, 0}; {, −2, 4, 5, −1, 2, −1, 6, −1, −3, −1, 0, 0}; {, −1, −5, −2, 6, −1, −2, −4, 3, 3, −4, 0, 0}; {, −4, 3, 5, 0, 4, 2, 0, 6, 5, −3, 0, 0}; {, −3, 4, 6, 1, 6, 3, −1, 6, −5, −4, 0, 0}; {5, −2, −2, 3, −3, 6, −2, −5, −4, 2, 0, 0}; {6, 0, 1, −5, 3, −5, −1, −2, 2, −1, 0, 0}; {3, −5, 6, −2, 4, −5, 1, −5, 5, 2, 0, 0}; {0, 6, −5, 1, −2, −5, 0, 4, 1, 0, 0, 0}; {, −5, 0, 0, 5, 1, 4, −2, 4, 3, 3, 0, 0}; {5, −2, −2, 3, −1, 3, −3, 3, 3, 2, 0, 0}; {, −3, 2, 2, −5, 4, −1, 4, −5, 2, 1, 0, 0}; {3, −5, 6, −2, 6, −5, 0, 6, 6, 3, 0, 0}; {5, −3, −4, 0, −4, −2, 1, −4, 5, 4, 0, 0}; {4, −4, −5, −1, −5, −3, 1, −5, 5, 3, 0, 0}; {3, −5, 6, −2, 6, −4, 1, −5, 5, 4, 0, 0}; {4, −3, −3, 2, −1, 2, −4, 3, 2, 2, 0, 0}; {2, 6, 5, −3, 5, −5, 0, 6, 5, 3, 0, 0}; {4, −3, −3, 2, −1, 3, −5, 2, 1, 2, 0, 0}; {3, −5, 6, −2, 6, −3, 1, −5, 4, 3, 0, 0}; {2, 6, 5, −3, 5, −4, 0, 6, 4, 3, 0, 0}; {1, −5, −4, 2, 0, 6, 0, −4, 0, 1, 0, 0}; {, −1, 5, 6, 1, −1, 5, −1, −5, −1, 0, 0, 0}; {0, 6, −5, 2, 0, 6, 0, −4, −1, 0, 0, 0}; {, −1, 5, 6, 1, −1, 5, −1, −5, −2, 0, 0, 0}; {4, −3, −3, 3, 0, −3, 2, 5, 2, 1, 0, 0}; {2, 6, 5, −2, 6, 3, −5, −5, 5, 2, 0, 0}; {2, 6, 5, −2, 6, −4, 0, −5, 4, 4, 0, 0}; {1, 6, 6, 0, −3, 0, 5, 1, 3, 2, 0, 0}; {2, −2, 1, −2, −2, 4, 0, 2, 5, −5, 0, 0}; {0, 4, 3, −4, 4, 6, −1, 5, 4, 3, 0, 0}; {2, −4, −3, 4, 2, 6, 1, −3, −1, 0, 0, 0}; {0, 5, 5, −1, −4, −1, 5, 1, 2, 0, 0, 0}; {, −2, 3, 3, −3, 6, −2, 4, 0, 1, −1, 0, 0}; {2, 6, 5, −2, 6, −3, 0, −4, 4, 4, 0, 0}; {1, 6, 6, 0, −3, 1, 6, 1, 3, 2, 0, 0}; {, −1, 2, 0, 4, −1, 1, 4, −2, −5, 5, 0, 0}; {, −2, 4, 5, 0, −1, 4, −1, −5, −1, 0, 0, 0}; {, −4, 1, 1, −5, 5, −2, 3, −2, 1, 1, 0, 0}; {, −3, 3, 4, −1, −2, 4, −2, −5, −1, 0, 0, 0}; {, −5, 0, 0, 6, 4, −2, 2, −4, 1, 0, 0, 0}; {5, −2, −2, 4, 2, −3, 2, 6, 1, 0, 0, 0};

{, −1, 4, 4, −2, −4, −1, 5, −1, 2, 1, 0, 0}; {2, −2, 1, −2, −1, 5, 1, 2, 5, −4, 0, 0}; {1, 6, 6, 0, −1, −5, 0, 4, 0, 0, 0, 0}; {, −3, 0, −2, 2, −1, 6, −3, −2, 6, 4, 0, 0}; {, −3, 0, −2, 2, −1, 6, −2, −2, 6, 4, 0, 0}; {, −1, 4, 4, −2, −3, 6, 0, 3, 0, 0, 0, 0}; {, −3, 1, 0, 5, 3, −1, 4, −5, 2, 2, 0, 0}; {, −5, −2, −4, 0, −3, 4, −3, −3, 5, 4, 0, 0}; {, −3, 4, 6, 2, 4, −3, 5, 3, −5, −4, 0, 0}; {, −5, 1, 2, −3, −2, 3, −2, 6, −2, −2, 0, 0}; {0, 5, 5, −1, −1, 6, −1, 4, 0, 0, 0, 0}; {, −1, 4, 4, −2, −2, 5, 0, 5, 0, 1, 0, 0}; {6, −4, 5, −4, 5, −2, 3, 1, −4, 6, 0, 0}; {0, 5, 5, −1, 0, 6, 0, −5, 0, 0, 0, 0}; {, −2, 5, −5, 3, 6, 4, 0, 6, 6, −3, 0, 0}; {, −3, 5, −4, 5, −2, −3, −5, 2, 3, −4, 0, 0}; {6, 1, 3, −1, 3, 2, −1, 5, 4, −5, 0, 0}; {, −4, 2, 3, −2, 3, −2, −1, −3, −5, −2, 0, 0}; {, −2, 3, 3, −3, 4, 0, 4, −5, 3, 1, 0}; {, −1, 5, 6, 1, −3, 6, −1, 3, 0, 0, 0, 0}; {3, −5, 6, −1, 5, −4, 1, −5, 4, 2, 0, 0}; {2, −5, −5, 1, −4, 0, −5, 2, 2, 0, 0, 0}; {, −4, 1, 1, −5, 3, −1, 3, −5, 2, 1, 0, 0}; {6, −2, −3, 2, −3, 4, −4, −3, 5, 3, 0, 0}; {, −1, 4, 4, −2, 6, −3, 5, 1, 2, −2, 0, 0}; {5, −2, −2, 4, 0, 3, −4, 4, 1, 2, 0, 0}; {4, −3, −3, 3, −1, 2, −4, 3, 1, 1, 0, 0}; {5, −1, 0, −5, 4, −4, 3, −1, −1, 0, 0, 0}; {3, −4, −4, 2, −2, 1, −5, 2, 2, 1, 0, 0}; {4, −2, −1, 6, 3, −5, 2, −1, −1, −1, 0, 0}; {2, −5, −5, 1, −3, 0, 6, 2, 2, 0, 0, 0}; {2, −5, −5, 1, −3, 0, 6, 2, 2, 1, 0, 0}; {5, −2, −2, 4, 0, 3, −3, 3, 2, 3, 0, 0}; {1, 6, 6, 0, −4, 0, 6, 1, 2, 1, 0, 0}; {1, 6, 6, 0, −4, 0, 6, 2, 2, 0, 0, 0}; {2, −3, −1, −5, 5, −1, −5, 5, −4, −2, 0, 0}; {2, 6, 5, −1, 6, 2, 6, −4, 4, 3, 0, 0}; {1, 6, 6, 1, −3, −4, 1, 3, 2, 0, 0, 0}; {, −5, −2, −4, 1, −5, 6, −1, −5, −5, 3, 0, 0}; {, −5, −1, −2, 4, −1, 2, −4, 4, 3, 0, 0, 0}; {, −2, 2, 1, −5, 4, 0, 4, −5, 2, 1, 0, 0}; {6, −3, −5, 0, −4, 4, −4, −3, 5, 4, 0, 0}; {, −5, −5, 2, 4, −3, 4, −4, 4, −2, −4, 0, 0}; {, −3, −3, 4, 6, 0, 3, −1, 6, −1, −3, 0, 0}; {, −4, −4, 3, 5, −1, 2, −1, 6, −1, −3, 0, 0}; {4, 6, 3, −5, 3, −2, 0, 0, −4, 6, 0, 0}; {5, 5, 0, 2, −4, 3, −5, 3, −1, −3, 0, 0}; {, −2, 3, 3, −2, −2, 4, −2, 6, −1, 1, 0, 0}; {6, 3, −5, 6, 3, −5, −1, 5, 6, 6, 0, 0}; {, −2, 2, 1, −5, 0, −4, −1, −4, −4, 3, 0, 0}; {6, −2, −3, 3, −3, 5, −4, −4, 6, 4, 0, 0}; {4, −4, −5, 1, −5, 4, −5, −4, 6, 4, 0, 0}; {, −1, 4, 4, −1, 6, −3, 4, 1, 2, −1, 0, 0}; {1, −5, −4, 4, 0, 5, 1, −3, −1, 0, 0, 0}; {, −1, 3, 2, −3, 3, 0, 4, −5, 4, 4, 0, 0}; {, −3, −1, −4, 1, −2, 0, −5, 3, 3, −5, 0, 0}; {, −5, −1, −2, 6, 0, −2, 2, 6, 3, 4, 0, 0}; {, −5, 6, 1, 4, 6, 0, 5, −2, −5, 0, 0, 0}; {, −1, −1, −5, −1, 6, −5, 1, −3, 6, −3, 0, 0}; {3, 0, 5, 6, 2, −5, −1, 4, 3, −2, 0, 0}; {, −4, 5, −2, 1, −1, 3, 5, −1, 2, 3, 0, 0}; {2, 1, −4, 1, 3, −3, 3, −5, 5, −1, 0, 0}; {, −1, −5, −1, 2, −3, −2, −4, 5, −4, −5, 0, 0}; {, −1, −3, 3, −4, 5, −1, 2, −4, −1, 2, 0, 0}; {, −3, 5, −3, 0, −4, −3, −5, 4, −5, −5, 0, 0}; {0, −1, 6, 0, −1, 4, −3, 4, −4, 1, 0, 0}; {, −1, −2, 5, −1, −2, 3, −4, 3, −5, 0, 0, 0}; {, −4, 6, 0, 5, 4, −4, 0, −5, −2, 2, 0, 0}; {3, 0, 5, −2, 4, 5, 4, 3, 6, 6, 0, 0}; {, −4, 4, −4, 0, −5, −4, 6, 4, −5, −5, 0, 0}; {6, 2, 6, −2, 6, −5, 5, 3, 6, −5, 0, 0}; {, −3, −4, 3, −2, −3, 2, −5, 2, 6, 0, 0, 0}; {, −5, 5, −1, 5, 3, −5, 0, 6, −3, 1, 0, 0}; {1, 6, −5, −4, 2, −1, 2, 0, −1, 4, 0, 0}; {, −5, 6, 1, −4, −4, 0, 5, 1, 6, −1, 0, 0}; {5, 3, −3, 3, 2, 6, −2, 5, −4, 1, 0, 0}; {4, 4, 0, −4, −2, 4, −2, 2, 1, −4, 0, 0}; {, −1, −4, 1, −5, 1, 3, 2, 1, 5, 6, 0, 0}; {, −5, 3, −5, 0, −5, 6, 6, 4, 6, −5, 0, 0}; {6, 2, 6, −1, 6, 6, 5, 4, 6, −5, 0, 0}; {5, 1, 5, −2, 5, 6, 5, 3, 6, −5, 0, 0}; {4, 2, −4, 3, 1, 6, −2, 5, −4, 1, 0, 0}; {3, 1, −5, 2, 0, 5, −3, 4, −5, 0, 0, 0}; {2, −3, 0, 4, −1, −1, −3, 6, −4, −4, 0, 0}; {, −5, 6, 1, −3, −4, 0, 5, 1, 5, −1, 0, 0}; {5, 4, −1, −5, 6, −1, 4, 0, 4, −2, 0, 0}; {5, 4, −1, −5, 6, −1, 4, 1, 5, −1, 0, 0}; {2, 0, 6, 1, 0, 4, −3, 4, −5, 0, 0, 0}; {, −5, −5, 3, 0, 1, 6, −1, −3, 1, −3, 0, 0}; {6, 6, 2, −1, 0, 5, −1, −3, 2, −3, 0, 0}; {3, 1, −5, 2, 1, 4, −3, 4, −5, 0, 0, 0}; {6, 3, −4, 3, −4, 5, 6, −2, 4, 5, 0, 0}; {6, 3, −4, 3, −4, 6, 6, −2, 4, 5, 0, 0}; {3, −1, 3, −3, 1, −2, −2, 0, −5, 6, 0, 0}; {1, −3, 1, −5, 0, −3, −3, 0, 6, 6, 0, 0}; {, −4, 4, −4, 2, −5, −4, 6, 4, −5, −5, 0, 0}; {, −4, 5, −2, 5, −1, 1, 1, 0, 4, 5, 0, 0}; {5, 1, 5, −1, 4, 6, 5, 3, 6, 6, 0, 0}; {6, 2, 6, 0, 5, −5, 5, 3, −5, −5, 0, 0}; {0, −4, 0, 6, 0, −3, −4, 1, 3, 5, 0, 0}; {, −1, −5, −1, 5, −1, −3, −5, 5, −5, −4, 0, 0}; {, −2, 6, −2, 4, −2, −4, 6, 4, 6, −4, 0, 0}; {, −5, 2, 5, −2, 3, 1, −2, −4, −3, −3, 0, 0}; {4, 1, 6, 1, −4, −2, 0, −1, 3, 4, 0, 0}; {2, −2, 2, −4, 2, 4, 3, 2, 5, 6, 0, 0}; {, −5, 1, 3, −5, 0, −5, 2, −1, −2, −2, 0, 0}; {, −5, 2, 5, −2, 4, 1, −3, −5, −5, −3, 0, 0}; {4, −1, 2, −5, 1, −1, −3, −5, −4, −4, 0, 0}; {2, 1, −4, 5, 4, −3, 2, −1, 3, −2, 0, 0}; {1, −1, 5, 1, −1, 3, −4, 3, 6, 0, 0, 0}; {1, −2, 3, −2, −5, 2, 3, −4, −2, 1, 0, 0}; {6, 0, 2, 6, 0, −5, 2, −2, −2, −3, 0, 0}; {5, −1, 1, 5, −1, 6, 1, −2, −3, −3, 0, 0}; {, −2, −4, 2, −2, −3, 1, 6, 2, 5, −1, 0, 0}; {6, 2, 6, 0, −2, −4, 1, 1, −5, −1, 0, 0}; {, −3, 3, 5, −3, 5, 2, −5, 6, −4, 2, 0, 0}; {, −2, 6, −2, 4, 4, −5, 0, −1, −3, 2, 0, 0}; {, −4, 5, −2, 5, 6, 3, −4, −5, 5, −5, 0, 0}; {, −3, 6, −1, 6, −4, 3, −4, −5, 6, −5, 0, 0}; {3, −1, 3, −2, −1, 6, −1, −3, −5, −4, 0, 0}; {, −2, −3, 4, 2, −5, −3, 3, −3, 2, −1, 0, 0}; {4, 1, 6, 2, −5, 4, 6, −2, 4, 5, 0, 0}; {3, 0, 5, 1, 6, 4, 5, −2, 3, 5, 0, 0}; {1, 6, −5, −1, 0, −5, 1, −5, 2, 1, 0, 0}; {, −2, 5, −4, 2, 5, 2, 1, 3, −4, −5, 0, 0}; {3, −1, 3, −2, 2, 5, 3, 2, 6, −5, 0, 0}; {2, −1, 4, 0, 6, −3, −1, −2, 3, 3, 0, 0}; {1, −3, 1, −4, 1, 4, 3, 1, 5, 5, 0, 0}; {, −3, 3, 5, −2, 2, −2, 4, −1, −3, −1, 0, 0}; {, −3, 3, 5, −2, 2, −2, 5, −2, −3, −1, 0, 0}; {, −3, 4, −5, 1, 6, 3, −1, −5, 6, −3, 0, 0}; {, −5, 2, 5, −1, 4, 1, −2, −4, −4, −3, 0, 0}; {1, −5, −3, 2, 6, 4, 1, −2, −3, −1, 0, 0}; {0, −5, −2, 4, −3, −3, −5, 5, −5, −4, 0, 0}; {, −1, −5, −1, 6, 0, 2, 3, 1, 5, 5, 0, 0}; {, −3, 4, −5, 1, −5, −4, −5, 4, −5, −5, 0, 0}; {1, −1, 5, 2, −1, 3, −5, 3, 5, −1, 0, 0}; {1, −1, 5, 2, −1, 3, −5, 3, 6, 0, 0, 0}; {, −1, −3, 3, 0, −3, 2, 6, 2, 5, −1, 0, 0}; {5, −1, 1, 6, −1, −5, 2, −3, −3, −2, 0, 0}; {6, 1, 4, −2, 4, 1, −3, 6, −5, −4, 0, 0}; {4, −2, 0, 5, −2, 6, 1, −3, −3, −3, 0, 0}; {5, 0, 3, −3, 3, 0, −3, 6, −5, −3, 0, 0}; {1, −4, −1, 5, −1, −3, −4, 6, −5, −4, 0, 0}; {, −1, 5, −5, 0, 5, 3, 0, −3, −3, −2, 0, 0}; {, −4, 2, 4, −3, 2, 1, −2, −4, −3, −2, 0, 0}; {, −2, 5, −4, 2, −4, −4, −5, 5, −5, −5, 0, 0}; {0, 4, 4, −5, 1, −4, 5, 4, 0, 3, 0, 0}; {5, −1, 1, 6, 2, 0, 5, 4, 6, 1, 0, 0}; {, −5, −1, −1, 2, −2, −4, 1, −5, −3, 4, 0, 0}; {2, −5, −4, 1, −2, 1, −5, 3, 1, 2, 0, 0}; {, −1, 3, 3, −5, 3, 6, 0, 6, 4, 3, 0, 0}; {, −5, 1, 3, −3, −4, 3, −4, 4, −2, −1, 0, 0}; {6, 0, 2, −4, −5, 2, −4, 5, −2, 0, 0, 0}; {2, 6, 6, −2, −5, 2, −5, −4, 4, 2, 0, 0}; {, −1, 0, −3, −2, 4, −2, 4, 1, −5, −4, 0, 0}; {, −2, 2, 2, 6, 3, 5, −2, 5, 3, 3, 0, 0}; {, −2, −3, 4, 3, −4, −2, 4, −2, 2, −1, 0, 0}; {, −1, 3, 3, −5, 5, 0, 5, −5, 3, 2, 0, 0}; {5, 3, −3, −5, 0, 1, −5, 0, 4, 0, 0, 0}; {0, 6, −4, 2, 3, 0, −5, 3, −2, −1, 0, 0}; {, −2, −2, 6, 6, 1, 6, −2, 5, −1, −3, 0, 0}; {, −2, 6, −2, 6, −2, 2, 1, 0, 4, 5, 0, 0}; {, −2, 3, 4, −3, −2, 5, 0, 6, 1, 1, 0, 0}; {, −4, 1, 2, −5, −4, 4, −1, 5, 0, 1, 0, 0}; {1, −2, 3, 0, 5, −3, 0, 6, −5, 1, 0, 0}; {, −2, 6, −2, 6, −1, 2, 2, 0, 4, 5, 0, 0}; {, −5, 3, −5, 3, −4, −5, −5, 0, 2, 5, 0, 0}; {, −4, 2, 4, −2, 1, −2, 5, −2, −3, 0, 0, 0}; {6, −1, 0, 5, −5, 3, −3, 2, −1, 0, 0, 0}; {0, −3, 2, −1, 6, −3, −1, 6, −4, 1, 0, 0}; {, −2, −5, 0, −3, 4, −4, −2, 5, −5, 0, 0, 0}; {, −3, 6, −1, −4, 3, −5, −2, 5, −5, 0, 0, 0}; {6, 0, 2, −4, 0, −4, 2, −2, −4, −2, 0, 0}; {5, 3, −2, 3, 1, −2, 5, 5, −4, 0, 0}; {, −4, 4, −4, 4, −1, 1, 4, −3, −2, 2, 0, 0}; {, −4, 5, −2, −5, 3, 6, −2, 5, −5, 0, 0, 0}; {, −5, 4, −3, 6, 2, 6, −3, 5, −5, 1, 0, 0}; {3, −3, −1, 5, −2, 6, 1, −3, −4, −3, 0, 0}; {3, −2, 1, −4, 2, −1, −4, 5, 6, −4, 0, 0}; {, −5, 1, 3, −3, 2, 0, −2, −4, −4, −2, 0, 0}; {, −5, 4, −3, 6, 3, −2, 0, 5, −5, 0, 0, 0}; {2, −4, −2, 4, −2, 5, 0, −3, −4, −3, 0, 0}; {1, 6, −5, 0, 6, 4, −4, 6, −5, 2, 0, 0}; {3, −1, 3, −1, −4, 6, −1, 0, −5, −2, 0, 0}; {, −2, 2, 2, 6, 0, −3, 1, −3, −2, 4, 0, 0}; {, −5, −1, −1, 3, −2, −5, −1, −4, −4, 3, 0, 0}; {, −3, 1, 1, 6, 1, 5, −2, 5, 3, 2, 0, 0}; {, −5, −1, −1, 4, −1, 3, −3, 4, 3, 1, 0, 0}; {3, −5, −5, 0, −5, 4, −4, −5, 6, 3, 0, 0}; {, −3, 3, 5, 0, −3, 1, −4, −4, −2, −4, 0, 0}; {, −1, 5, −5, 2, −1, 4, −1, −3, −3, −2, 0, 0}; {, −3, 1, 1, 6, 1, 4, −2, 5, 4, 1, 0, 0}; {6, −3, −4, 0, 6, −4, 2, −4, 6, 2, 0, 0}; {, −4, 0, 0, 5, 1, 4, −3, 4, 2, 2, 0, 0}; {, −4, 0, 0, 5, 1, 4, −3, 4, 3, 2, 0, 0}; {, −3, 2, 3, −3, 6, −2, 5, 0, 1, 1, 0, 0}; {, −3, 1, 1, 6, 2, 5, −1, 5, 3, 2, 0, 0}; {6, −3, −4, 0, −5, −3, 2, −4, 5, 3, 0, 0}; {4, −3, −2, 4, 1, −4, 2, 5, 1, 0, 0, 0}; {0, 4, 4, −3, 5, 1, 6, −5, 4, 2, 0, 0}; {, −1, 4, 5, −1, −4, −1, 5, 2, 0, 1, 0, 0}; {, −2, 2, 2, −5, 3, 5, −1, 5, 3, 3, 0, 0}; {0, −4, 0, −3, −2, 4, 0, 2, 4, −5, 0, 0}; {0, −4, 0, −3, −2, 4, −2, −4, 6, −5, 0, 0}; {5, −3, −3, 2, −1, 2, −5, 2, 3, 2, 0, 0}; {4, −3, −2, 4, 2, −4, 1, −3, 1, 1, 0, 0}; {, −1, −1, −5, −4, 1, 4, 0, 5, −1, −4, 0, 0}; {, −3, 1, 1, 6, 3, −1, 4, 6, 2, 1, 0, 0}; {, −5, −2, −3, 1, −3, 4, −3, −3, 5, 3, 0, 0}; {4, −5, 6, −2, 6, 1, −5, −4, 3, 3, 0, 0}; {2, −5, −4, 2, 1, 6, 0, −4, 0, 1, 0, 0}; {2, 4, 2, 5, 1, −5, 0, −1, 6, 5, 0, 0}; {, −5, −5, 3, 4, −2, 3, −3, 4, −2, −3, 0, 0}; {3, 5, 3, 6, 2, −3, 1, −1, −5, 5, 0, 0}; {, −5, −5, 3, 4, −1, 3, −3, 4, −2, −4, 0, 0}; {4, 4, 0, 1, −4, 1, −4, 3, −3, −3, 0, 0}; {, −5, 0, 1, −5, −4, 3, −3, 5, −1, 0, 0, 0}; {, −4, 1, 2, −4, −3, 4, −1, 6, 0, 0, 0, 0}; {, −5, 0, 1, −5, −4, 4, −2, 6, 0, 0, 0, 0}; {5, 0, 3, −1, 3, 1, −2, 5, 5, −2, 0, 0}; {3, −3, −1, 6, −3, 6, 2, −4, −5, −1, 0, 0}; {3, −2, 1, −3, 1, 0, −2, 3, 4, 6, 0, 0}; {3, −1, 3, 0, 5, 5, 5, −1, 1, 5, 0, 0}; {, −2, 6, −2, −5, 1, 2, 3, −3, −1, 3, 0, 0}; {1, −4, −1, −5, 1, −3, −4, 5, −5, −4, 0, 0}; {, −5, 0, 1, −5, 2, −1, 3, 6, 3, 1, 0, 0}; {, −2, 3, 4, −2, 5, 2, 6, 5, 6, 2, 0, 0}; {, −4, 1, 2, −4, 3, 0, 4, 6, 3, 1, 0, 0}; {, −5, −1, −1, 4, −2, −5, −2, −4, −4, 4, 0, 0}; {4, −2, 0, −5, 3, 5, −2, −1, 0, −2, 0, 0}; {, −3, 1, 1, 6, 0, 4, −1, 5, 4, 2, 0, 0}; {5, −3, −3, 3, −3, 1, −4, 3, 3, 0, 0, 0}; {5, −2, −1, 6, 1, −2, 2, 5, 2, 0, 0, 0}; {6, 0, 2, −2, 6, 4, −3, 1, 0, −1, 0, 0}; {4, −3, −2, 5, 0, −3, 1, 5, 2, 0, 0, 0}; {5, −4, −5, 0, 5, 0, 2, −1, −2, 6, 0, 0}; {3, −5, −5, 1, −5, 4, −5, −5, 6, 3, 0, 0}; {6, 0, 2, −2, 6, 5, −2, 0, 1, −1, 0, 0}; {5, −3, −3, 3, −3, 6, −3, −5, −5, 4, 0, 0}; {1, 4, 3, −4, 1, −3, 0, −2, −4, 4, 0, 0}; {1, 5, 5, −1, 5, 2, 6, −4, 4, 1, 0, 0}; {4, −4, −4, 2, −4, 5, −3, 6, −5, 2, 0, 0}; {1, 5, 5, −1, 5, 3, 6, −5, 5, 2, 0, 0}; {5, −3, −3, 3, −3, 0, −5, 3, 3, 0, 0, 0}; {5, −1, 1, −3, 6, 0, −4, 6, −2, 0, 0, 0}; {2, −5, −4, 3, −1, −4, 1, 4, 2, 0, 0, 0}; {, −4, 1, 2, −3, 5, −4, 3, 0, 0, −1, 0, 0}; {, −1, 4, 5, 0, −3, 6, −1, 3, 0, 0, 0, 0}; {, −2, 2, 2, −4, 4, 0, 5, −5, 3, 1, 0, 0}; {, −1, −5, −1, −3, −2, 3, −3, −4, 5, −5, 0, 0}; {2, −4, −2, 6, 5, 0, −5, 4, −3, −1, 0, 0}; {5, 5, 1, 3, −3, 1, −3, 2, −3, −5, 0, 0}; {5, 1, 3, −3, 2, −4, 4, −3, −4, 0, 0}; {5, 5, 1, 3, −3, 2, −4, 4, −2, −3, 0, 0}; {4, −2, 0, −4, 2, 6, −3, −2, 2, 0, 0, 0}; {6, −1, 0, −5, 1, −1, 3, 6, 3, 0, 0, 0}; {5, −4, −5, 0, 4, 0, 2, −1, −2, 5, 0, 0}; {, −1, 6, −3, 6, 2, −4, −5, 4, −4, −1, 0, 0}; {6, −2, −2, 5, −2, 6, −3, −5, −5, 5, 0, 0}; {3, 6, 5, −1, 4, −1, 1, −2, −3, 6, 0, 0}; {2, 5, 4, −2, 3, −2, 0, −2, −3, 6, 0, 0}; {2, −5, −4, 4, −1, −4, 1, 5, 1, 0, 0, 0}; {, −1, 4, 5, 1, −4, −5, 0, 3, 1, −1, 0, 0}; {1, −5, −3, 6, 3, 1, −5, 0, −2, −2, 0, 0}; {, −3, 1, 1, −4, 3, −1, 4, −5, 2, 1, 0, 0}; {, −2, 3, 4, 0, −2, 5, −2, 4, −1, −1, 0, 0}; {3, 4, 1, 5, 0, −4, 0, −1, −5, −5, 0, 0}; {1, 1, −3, 0, 6, 1, 5, 2, −3, −4, 0, 0}; {3, −5, −4, 3, −4, 4, −5, 6, −5, 4, 0, 0}; {1, 6, −4, 4, −1, −4, 0, 3, 2, 0, 0, 0}; {, −1, 2, 2, −4, 1, −4, −1, −3, −4, 5, 0, 0}; {, −4, −2, −3, 2, 6, 1, 3, 0, −2, 5, 0, 0}; {, −2, 3, 5, 1, −4, 6, −1, 3, 1, −1, 0, 0}; {, −3, 1, 2, −3, 3, 0, 4, −5, 4, 1, 0, 0}; {, −4, −1, −1, 5, −2, 6, 1, −5, −4, 3, 0, 0}; {, −3, 2, 4, 0, −5, 6, −1, 2, 1, −1, 0, 0}; {, −3, 2, 4, 0, −5, 6, −1, 3, 1, −1, 0, 0}; {, −4, 1, 3, −1, 6, 5, −1, 2, 0, −2, 0, 0}; {, −4, 0, 1, −4, 3, −1, 3, 6, 3, 1, 0, 0}; {6, −2, −1, 6, 1, −3, 3, 6, 1, 0, 0, 0}; {6, −2, −1, 6, 1, −2, 3, 6, 3, 1, 0, 0}; {6, −2, −1, 6, 2, −2, 2, 6, 2, 0, 0, 0}; {5, −3, −2, 5, 1, −3, 2, 6, 1, 0, 0, 0}; {, −4, 2, 5, 2, 2, −4, 2, −1, −5, −3, 0, 0}; {, −1, −5, 0, −1, 2, −4, 1, 4, 6, 3, 0, 0}; {3, 0, 6, −5, 3, −5, 0, 4, 3, −2, 0, 0}; {5, −1, 2, 2, −3, −5, −1, −2, −1, 3, 0, 0}; {, −1, −1, −4, 2, 4, −4, 2, −1, 5, −1, 0, 0}; {6, 4, −1, 4, 0, 4, −3, −1, −4, −4, 0, 0}; {, −4, 6, 1, 6, 4, −3, 1, −5, −2, 2, 0, 0}; {, −5, 5, 0, 5, 3, −4, 0, 6, −3, 1, 0, 0}; {, −5, 5, 0, 5, 3, −4, 0, −5, −2, 2, 0, 0}; {, −5, 5, 0, 5, 3, −4, 1, −5, −2, 2, 0, 0}; {5, 2, −4, 0, −2, 1, 5, −2, 0, 3, 0, 0}; {6, 4, −1, 4, 3, −5, 0, 6, −3, 1, 0, 0}; {0, −2, 5, −1, 5, 3, 1, 1, −5, −2, 0, 0}; {, −4, 5, −1, 4, −2, 0, 2, 1, 4, 4, 0, 0}; {, −4, 5, −1, 4, −1, 1, 1, 1, 4, 5, 0, 0}; {6, 3, −3, 2, −2, −4, 1, 3, −3, 0, 0, 0}; {4, 0, 5, −3, 4, 2, 6, −5, 0, 1, 0, 0}; {4, 0, 5, −3, 4, 5, 5, 3, 6, 6, 0, 0}; {3, −1, 4, −4, 4, 5, 5, 2, 6, 6, 0, 0}; {3, 1, −4, 2, 1, 5, −2, 4, −4, 1, 0, 0}; {2, 0, −5, 1, 0, 5, −3, 4, −4, 0, 0, 0}; {3, −1, 4, −4, 5, 1, 4, 6, −1, 1, 0, 0}; {, −5, −5, 4, 0, 1, 5, −1, −3, 1, −4, 0, 0}; {0, −3, 3, −4, −2, 5, −2, −4, −5, −4, 0, 0}; {, −4, 5, −1, 5, −1, 0, 1, 0, 4, 5, 0, 0}; {, −5, 4, −2, 4, −2, 0, 1, 0, 4, 5, 0, 0}; {, −4, 5, −1, 5, −1, 1, 1, 1, 4, 5, 0, 0}; {5, 1, 6, −1, 5, 6, 5, 3, −5, −5, 0, 0}; {4, 0, 5, −2, 4, 5, 4, 3, 6, 6, 0, 0}; {3, 0, 6, 0, −5, −3, 0, 0, 2, 4, 0, 0}; {3, −1, 4, −3, 3, 5, 5, 3, 6, 6, 0, 0}; {3, 0, 6, 0, −5, −2, −1, −1, 3, 4, 0, 0}; {3, 0, 6, 0, −5, −2, 0, −1, 3, 4, 0, 0}; {2, −1, 5, −1, 6, −3, −1, −1, 3, 4, 0, 0}; {2, −1, 5, −1, −5, −5, 0, 2, −4, −1, 0, 0}; {3, −1, 4, −3, 4, 5, 4, 3, 6, 6, 0, 0}; {1, −4, 0, 4, −2, −2, −4, 6, −4, −4, 0, 0}; {1, −3, 2, −5, 2, 3, 3, 2, 5, 6, 0, 0}; {5, 3, −2, 5, 2, 5, −4, 4, 6, 0, 0, 0}; {0, −4, 1, 6, 1, 3, 3, 1, 5, 5, 0, 0}; {, −3, 4, −4, 0, −5, −4, −5, 4, −4, −5, 0, 0}; {, −1, −5, 0, 5, 1, 3, 4, 1, 5, 5, 0, 0}; {1, −3, 2, −5, 3, 1, 4, 6, −1, 1, 0, 0}; {1, −3, 2, −5, 3, 3, 4, 2, 5, 6, 0, 0}; {, −3, 5, −2, 3, 0, 2, 2, 0, 4, 5, 0, 0}; {, −1, −3, 4, −1, −2, 2, −5, 2, 6, −1, 0, 0}; {, −2, 5, −3, 1, −3, −4, −5, 5, −5, −4, 0, 0}; {, −2, −4, 3, −2, −2, 1, 6, 2, 5, −1, 0, 0}; {, −1, −2, 6, 2, 3, −5, 1, −2, 2, −3, 0, 0}; {, −3, −5, 2, −3, −3, 1, 6, 2, 5, −1, 0, 0}; {, −2, 0, −1, −2, 3, −4, 3, −1, 5, 6, 0, 0}; {1, 1, −2, −5, −2, 2, −4, −5, 0, −4, 0, 0}; {, −4, 5, −1, 5, 6, 0, 5, −5, −5, 1, 0, 0}; {, −4, 5, −1, 6, −4, 0, 5, −5, −5, 1, 0, 0}; {3, −1, 4, −2, 1, −2, −1, 0, 6, 6, 0, 0}; {4, 1, −5, 2, −5, 4, 6, −2, 3, 4, 0, 0}; {2, −2, 3, −3, 1, −2, −2, 1, 4, 5, 0, 0}; {0, −4, 1, −5, −1, −4, −3, −1, 5, 5, 0, 0}; {, −2, 6, −1, 5, −2, −4, −4, −1, 6, 6, 0, 0}; {5, 1, 6, 0, 5, 5, 4, 3, 6, −5, 0, 0}; {4, 0, 5, −1, 4, 5, 4, 3, 6, 6, 0, 0}; {2, −2, 3, −3, 2, 4, 3, 2, 5, 6, 0, 0}; {3, 0, 6, 1, −5, −2, 0, −1, 3, 4, 0, 0}; {2, −4, −1, 3, −5, 4, 2, −1, −3, −1, 0, 0}; {0, −4, 1, −5, 1, 1, 5, 6, 0, 1, 0, 0}; {1, −4, 0, 5, −2, −2, −4, 6, −4, −4, 0, 0}; {3, 0, 6, 1, −4, −2, −1, −1, 3, 4, 0, 0}; {, −1, −4, 2, −3, 4, 6, −2, −1, 1, 3, 0, 0}; {1, −3, 2, −4, 2, 4, 3, 2, 6, 6, 0, 0}; {1, −3, 2, −4, 2, 4, 4, 2, 5, 6, 0, 0}; {0, −4, 1, −5, 1, 3, 3, 1, 5, 5, 0, 0}; {0, −3, 3, −2, 5, −4, −2, −3, 2, 3, 0, 0}; {, −2, 6, −1, 5, 0, 2, 2, 1, 5, 5, 0, 0}; {, −4, 3, −5, 0, 6, −5, 6, 4, −5, −5, 0, 0}; {, −2, 6, −1, 5, 0, 2, 3, 1, 5, 5, 0, 0}; {, −1, −3, 4, 0, −3, 2, 6, 2, 5, −1, 0, 0}; {2, −3, 1, 6, 0, −2, −4, 6, −5, −4, 0, 0}; {, −3, 4, −4, 1, −4, −4, 6, 5, −5, −4, 0, 0}; {, −4, 3, −5, 0, −5, −5, 6, 4, 6, −5, 0, 0}; {, −2, −5, 1, −4, 5, −4, −1, 6, −4, 1, 0, 0}; {, −1, −3, 4, 0, −2, 2, 6, 2, 5, −1, 0, 0}; {, −2, −4, 3, −1, −3, 1, 6, 2, 5, −1, 0, 0}; {, −5, 3, −4, 2, −2, 1, 1, 0, 4, 5, 0, 0}; {, −3, 6, 0, −5, 4, −4, −1, 6, −4, 1, 0, 0}; {, −2, −4, 3, −1, −3, 2, 6, 2, 5, −1, 0, 0}; {4, −2, 1, 5, −1, 6, 1, −3, −4, −3, 0, 0}; {0, −5, −1, 4, −1, −4, −5, 5, 6, −4, 0, 0}; {4, −1, 3, −4, 3, 0, 6, 5, 6, 6, 0, 0}; {4, −1, 3, −4, 3, 0, −5, 5, 6, −5, 0, 0}; {1, −5, −2, 2, −4, 4, 0, −3, −3, −3, 0, 0}; {, −5, 3, −4, 2, −2, −2, 1, 1, 3, 5, 0, 0}; {5, −2, 0, 3, −3, 6, 3, 0, −1, −1, 0, 0}; {5, −1, 2, 6, 1, 0, −2, −5, −3, −3, 0, 0}; {6, 1, 5, −2, 6, 6, 5, 4, 6, −5, 0, 0}; {4, −1, 3, −4, 4, 6, 5, 2, 6, 6, 0, 0}; {, −3, −5, 2, −2, −3, 2, 6, 2, 5, −1, 0, 0}; {, −2, 1, 1, 2, −5, 2, −2, −5, 2, 4, 0, 0}; {, −4, −1, −1, 0, 5, 1, −3, 6, 2, 4, 0, 0}; {3, 0, 6, 1, 1, 4, −4, 4, 6, 0, 0, 0}; {5, −5, 6, 6, 0, 6, 1, −2, 4, 6, 0, 0}; {, −3, 6, 0, −5, −4, 1, 6, −5, −4, 1, 0, 0}; {5, 3, −2, −5, −2, 3, −2, 2, 3, −1, 0, 0}; {2, −1, 5, 1, 3, −4, 2, 5, 6, 0, 0, 0}; {0, −4, 1, −4, −1, −3, −3, 0, 5, 6, 0, 0}; {, −2, 6, −1, 6, −2, −5, −4, −1, 5, 5, 0, 0}; {, −2, 6, −1, 6, −2, −4, −4, −1, 5, 5, 0, 0}; {, −2, 6, −1, 6, −2, −4, −4, 0, 3, 5, 0, 0}; {, −4, 4, −3, 4, −4, −5, −5, −2, 5, 5, 0, 0}; {, −1, −5, 0, −5, 0, 2, 2, 1, 5, 5, 0, 0}; {, −2, 6, −1, 6, 0, 2, 2, 1, 5, 5, 0, 0}; {, −3, 6, 0, −4, 3, 6, −3, −3, 1, 3, 0, 0}; {, −5, 3, −4, 3, −3, −1, 1, 0, 4, 4, 0, 0}; {, −2, 5, −3, 3, −4, −4, 6, 5, −5, −4, 0, 0}; {, −4, 4, −3, 4, −1, 1, 2, 0, 4, 5, 0, 0}; {5, 0, 4, −2, 4, 5, 5, 3, 6, 6, 0, 0}; {0, −5, −1, 5, −1, −3, −5, 6, −5, −3, 0, 0}; {, −5, 1, 4, −3, 3, 1, −2, −4, −3, −3, 0, 0}; {5, −1, 2, −5, 1, −1, −2, −4, −4, −3, 0, 0}; {3, −3, 0, 5, −1, −2, −3, −5, −4, −4, 0, 0}; {3, −2, 2, −4, 3, 4, 4, 3, 5, 6, 0, 0}; {6, 3, −3, 5, 2, 6, −3, 4, 6, 0, 0, 0}; {6, 3, −3, 5, 2, 6, −3, 5, −5, 1, 0, 0}; {0, −5, −1, 5, 0, −3, −5, 5, −5, −4, 0, 0}; {1, −5, −2, 3, −3, 5, 0, −4, −4, −3, 0, 0}; {0, 6, −3, 2, −4, 4,

−1, −4, −4, −4, 0, 0}; {, −4, 2, 5, −2, 4, 1, −2, −4, −4, −2, 0, 0}; {3, −3, 0, 5, 0, −2, −3, −5, −4, −4, 0, 0}; {2, −4, −1, 4, −1, −3, −4, −5, −5, −3, 0, 0}; {2, −1, 5, 1, −1, 1, −5, −3, 6, −4, 0, 0}; {2, −1, 5, 1, −1, 4, −5, 3, 6, −1, 0, 0}; {2, −2, 3, −2, −5, 2, 3, −4, −2, 1, 0, 0}; {, −1, 5, −4, 1, −4, 3, −2, −4, −4, −4, 0, 0}; {6, 2, −5, 2, −1, −3, 0, 3, −4, −1, 0, 0}; {1, −5, −2, 3, −1, −2, 3, 3, 5, 1, 0, 0}; {4, 6, 5, 6, −1, 5, 0, −2, 4, 5, 0, 0}; {5, −3, −2, 2, −3, 6, −1, −5, −4, 3, 0, 0}; {1, 3, 2, 4, −2, 4, −1, −3, 4, 5, 0, 0}; {, −2, −1, −3, −2, 3, −3, 3, 0, 6, 6, 0, 0}; {, −4, 0, 1, 5, 2, 4, −2, 5, 2, 3, 0, 0}; {, −1, 6, −2, 5, 5, −2, 2, 0, −3, −3, 0, 0}; {5, −4, −4, −1, −5, −3, 2, −4, 5, 4, 0, 0}; {5, −4, −4, −1, −5, −3, 3, −3, 5, 4, 0, 0}; {, −1, 1, 0, 2, −3, 3, −2, −3, 4, 6, 0, 0}; {, −4, −3, −5, −4, 2, −4, 2, 0, 6, −5, 0, 0}; {, −2, 6, −1, −5, −3, 3, −4, −5, 6, −5, 0, 0}; {0, 5, −5, 0, −1, 6, −2, 6, 0, 0, 0, 0}; {6, 6, 3, 3, −3, 1, −5, 3, −3, −4, 0, 0}; {6, 6, 3, 3, −3, 1, −5, 3, −3, −3, 0, 0}; {5, 4, 0, −1, 4, −4, 1, −5, −1, −2, 0, 0}; {, −1, −4, 2, −1, 2, 6, 0, 4, 5, 0, 0, 0}; {, −1, −4, 2, −1, 3, −5, 0, 4, 5, 1, 0, 0}; {, −3, −5, 2, 0, 6, 0, 5, −2, 2, 0, 0, 0}; {, −3, 6, 0, −3, 2, 1, 3, −5, 2, 3, 0, 0}; {6, 2, −5, 3, −3, −1, 1, −1, 3, 4, 0, 0}; {5, 0, 4, −1, 4, 6, 5, 3, 6, 6, 0, 0}; {6, 2, −5, 3, −3, 0, 1, −1, 4, 4, 0, 0}; {, −5, 4, −2, −5, 2, 6, −3, 4, 6, 1, 0, 0}; {2, −4, −1, 5, −3, 6, 2, −4, −5, −1, 0, 0}; {6, −1, 1, 6, −3, 6, 4, 0, −3, 0, 0, 0}; {4, −1, 3, −2, 4, 4, 5, 3, 5, 6, 0, 0}; {2, −3, 1, −4, 2, 3, 4, 2, 5, 5, 0, 0}; {4, 1, −5, 4, 0, 4, −4, 4, 6, 0, 0, 0}; {, −1, 6, −2, 5, −1, −3, −5, 3, 5, −5, 0, 0}; {2, −4, −1, 5, −1, −3, −4, 6, −5, −4, 0, 0}; {3, −1, 4, 0, −4, −2, 1, −5, −3, 1, 0, 0}; {2, −1, 5, 2, −1, 3, −5, 4, 6, 0, 0, 0}; {, −1, 6, −2, 5, 0, −3, −5, 5, −4, −3, 0, 0}; {6, −1, 1, 6, 0, −5, 2, −2, −2, −3, 0, 0}; {6, −1, 1, 6, 1, 0, 5, 3, 5, 1, 0, 0}; {6, 1, 5, 1, −2, 6, 3, 3, −4, −1, 0, 0}; {5, −3, −2, 3, −3, 5, −3, −5, −5, 4, 0, 0}; {5, −3, −2, 3, −3, 6, −3, −5, −4, 4, 0, 0}; {, −5, 0, 2, −4, 3, 1, 6, 4, 5, 1, 0, 0}; {6, −1, 1, −5, 2, 0, 5, 3, 5, 1, 0, 0}; {6, 0, 3, −2, 6, 6, −1, 0, 2, 0, 0, 0}; {, −1, 2, 2, 6, 0, −3, 2, −3, −2, 4, 0, 0}; {, −4, 1, 3, −3, 6, −3, 4, 1, −1, 0, 0, 0}; {4, −4, −3, 2, −2, 2, −4, 3, 2, 1, 0, 0}; {2, 6, −5, 0, −4, 2, −5, −3, 5, 2, 0, 0}; {4, −4, −3, 2, −1, 2, −4, 3, 1, 2, 0, 0}; {5, 5, 2, 3, −3, 2, −4, 3, −3, −4, 0, 0}; {1, 0, −4, −4, 1, 6, −1, 6, −2, −3, 0, 0}; {6, 4, −1, −2, 4, −1, 4, −3, 1, 0, 0, 0}; {4, 0, 5, 2, −5, −2, 0, −2, 3, 3, 0, 0}; {5, 1, 6, 3, −3, 0, 1, −4, −3, 2, 0, 0}; {0, −5, −1, −5, 1, 2, 3, 1, 4, 5, 0, 0}; {2, −2, 3, 0, −5, −2, −1, −5, −4, 1, 0, 0}; {2, −2, 3, 0, −5, −2, 0, −5, −4, 1, 0, 0}; {, −4, 3, −5, 3, −1, 0, 4, −3, −2, 1, 0, 0}; {5, −2, 0, −5, 1, −1, 2, 5, 3, 0, 0, 0}; {2, 6, −5, 1, 6, 3, 6, −3, 5, 1, 0, 0}; {4, −4, −3, 3, −4, 5, −4, −5, −5, 4, 0, 0}; {1, 5, 6, 0, 5, 3, −5, 5, 6, 2, 0, 0}; {2, 6, −5, 1, 6, 4, −4, 5, −5, 2, 0, 0}; {3, −4, −2, 5, −1, −2, 3, 1, 4, 0, 0, 0}; {2, 5, 5, −2, 3, −5, 1, −5, 5, 2, 0, 0}; {2, 5, 5, −2, 3, −5, 2, −5, 5, 3, 0, 0}; {6, 1, 5, 2, −1, −2, 4, −4, −2, −2, 0, 0}; {4, −4, −3, 3, −3, 5, −4, −5, −5, 5, 0, 0}; {1, 4, 4, −3, 2, −2, 0, −2, −3, 5, 0, 0}; {2, 6, −5, 1, −5, 4, −5, −5, 6, 3, 0, 0}; {4, −2, 1, −3, 5, 4, −3, 0, 0, −1, 0, 0}; {2, −5, −3, 4, −1, −3, 1, 3, 3, 2, 0, 0}; {0, 4, 5, −1, 5, 2, 5, −4, 4, 1, 0, 0}; {0, 3, 3, −4, 1, −3, 0, −3, −4, 3, 0, 0}; {3, −4, −2, 5, 0, −2, 3, 2, 4, 0, 0, 0}; {1, 5, 6, 0, 6, 3, −5, 5, 6, 2, 0, 0}; {, −1, 2, 2, −5, 0, −4, −1, −2, −4, 4, 0, 0}; {0, 4, 5, −1, 5, 2, 6, −5, 4, 1, 0, 0}; {1, 5, 6, 0, 6, 3, −4, 5, 6, 2, 0, 0}; {0, 4, 5, −1, 5, 2, −5, 4, 5, 1, 0, 0}; {0, 4, 5, −1, 5, 3, 6, 5, 6, 3, 0, 0}; {1, 6, −4, 3, −2, −3, 1, 2, 3, 1, 0, 0}; {2, −4, −1, −5, 3, 3, −4, −1, 0, −1, 0, 0}; {, −1, 3, 4, −2, 4, 2, 6, 5, 5, 2, 0, 0}; {, −1, 2, 2, −5, 1, 5, −1, 6, 4, 2, 0, 0}; {0, 3, 3, −4, 2, −3, 1, −2, −3, 5, 0, 0}; {, −2, 2, 3, −3, 4, 0, 5, −5, 4, 1, 0, 0}; {, −2, 3, 5, 0, −4, 6, −1, 2, 1, 1, 0, 0}; {, −3, 0, 0, 5, −1, −5, −1, −3, −4, 4, 0, 0}; {, −2, 3, 5, 0, −4, −5, 0, 2, 2, 0, 0, 0}; {, −5, −2, −2, 3, −3, 6, −2, −4, −5, 3, 0, 0}; {4, −2, 1, −3, −5, 0, −4, −5, −5, −3, 0, 0}; {0, 3, 3, −4, 3, 6, 0, 6, 4, 3, 0, 0}; {, −3, 1, 2, −4, 4, −1, 4, −5, 3, 1, 0, 0}; {, −2, 3, 5, 0, −3, 6, 0, 3, 1, −1, 0, 0}; {5, −3, −2, 4, 0, −3, 3, 5, 2, 0, 0, 0}; {2, 5, 5, −2, 6, 2, 6, −4, 4, 2, 0, 0}; {6, 2, −5, 5, −5, 0, −5, 6, 4, 6, 0, 0}; {4, 0, 5, 3, 5, −1, −4, −1, 2, 5, 0, 0}; {1, 0, −4, −3, 2, 5, 0, 6, −1, −3, 0, 0}; {, −4, −1, −1, 4, 1, −3, 3, 6, 2, 4, 0, 0}; {2, 2, −1, 1, −5, 0, −4, 3, −4, −4, 0, 0}; {, −2, −3, 5, 6, 0, 5, −3, 5, −1, −3, 0, 0}; {, −4, 6, 1, 1, 6, −4, 2, −4, 1, −1, 0, 0}; {2, −3, 2, −1, 6, −3, −1, −5, −4, 1, 0, 0}; {, −4, 1, 4, −1, 5, −3, −3, 2, 1, −1, 0, 0}; {1, −4, 1, −2, 6, 3, 1, 2, −5, −1, 0, 0}; {1, −5, −1, −5, 2, 3, −4, −2, −1, −3, 0, 0}; {3, −4, −1, 6, 1, −2, 2, 3, 4, 2, 0, 0}; {1, 5, −5, 1, −5, 3, −5, 6, 6, 4, 0, 0}; {1, 6, −3, 4, −1, −3, 1, 3, 3, 1, 0, 0}; {2, −4, 0, −4, 4, 3, −4, −1, 0, 0, 0, 0}; {0, 5, −4, 3, −2, −4, 0, 3, 2, 1, 0, 0}; {1, −5, −1, −5, 3, 2, −5, −1, −1, 0, 0, 0}; {, −2, 2, 4, −2, 4, 1, 5, 5, 5, 3, 0, 0}; {, −2, 2, 4, −2, 4, 1, 5, 6, 4, 1, 0, 0}; {, −3, 1, 3, −3, 3, 0, 4, −5, 4, 1, 0, 0}; {1, −5, −1, −5, 3, 3, −4, −1, 0, −1, 0, 0}; {, −2, 3, 6, 1, −4, −5, −1, 2, 2, 1, 0, 0}; {, −1, 4, −5, 2, −3, −4, 0, 3, 1, −1, 0, 0}; {, −1, 4, −5, 2, −3, −4, 0, 3, 2, 0, 0, 0}; {, −1, 4, −5, 2, −3, −4, 1, 0, 3, 0, 0, 0}; {, −1, 5, −3, 5, 1, 1, −5, −3, −1, −2, 0, 0}; {, −3, 1, 3, −3, 3, 1, 5, 5, 5, 2, 0, 0}; {, −2, 3, 6, 1, −4, −5, 0, 2, 1, −1, 0, 0}; {, −2, 3, 6, 1, −4, −5, 1, 0, 2, −1, 0, 0}; {, −3, 2, 5, 0, −5, −3, −4, 2, 0, −3, 0, 0}; {0, 6, −2, 6, 3, 1, 6, −2, −1, 0, 0, 0}; {, −3, 0, 1, 6, 0, −5, −1, −2, −4, 4, 0, 0}; {6, −4, −4, 0, 5, −1, 3, 1, −2, 5, 0, 0}; {, −2, 4, −4, 4, 1, 0, 5, −2, −2, 0, 0, 0}; {, −3, 3, −5, 3, 0, −1, 5, −3, −2, −1, 0, 0}; {, −5, −2, −1, 4, −2, 6, −2, −3, −5, 3, 0, 0}; {, −5, −1, 1, −5, 2, −1, 4, 6, 3, 0, 0, 0}; {, −5, −2, −1, 4, −2, 6, −1, −4, −5, 3, 0, 0}; {, −4, 1, 4, −1, −5, 6, −1, 1, 2, 1, 0, 0}; {6, −3, −2, 3, −3, 6, −1, −5, −4, 3, 0, 0}; {, −3, 0, 1, 6, 1, 4, −2, 5, 3, 1, 0, 0}; {3, −4, −1, 6, 4, 4, −3, 6, 1, −2, 0, 0}; {6, 5, 2, 3, −4, 2, −5, 3, −4, −4, 0, 0}; {0, −5, 0, −3, −2, 4, −3, −4, 6, −4, 0, 0}; {6, 5, 2, 3, −3, 2, −3, 4, −3, −3, 0, 0}; {2, −2, 4, 2, 5, −2, 4, 5, 4, 5, 0, 0}; {, −1, 6, −1, −4, −2, 3, −4, −4, 6, 6, 0, 0}; {4, −1, 4, 1, 4, 4, −5, −3, 4, 4, 0, 0}; {4, −3, 0, −5, −3, 6, 2, −4, 6, −1, 0, 0}; {4, −1, 4, 1, 5, 5, 6, −3, 3, 4, 0, 0}; {, −3, 4, −3, 6, −1, 2, 1, 0, 4, 4, 0, 0}; {, −3, 5, −1, −2, 5, 0, 2, 2, 5, −1, 0, 0}; {2, −4, 0, −3, 5, 3, −4, −2, 0, 1, 0, 0}; {, −1, 3, 5, 0, 6, 2, 5, 6, 5, 2, 0, 0}; {, −1, 4, −5, 3, −2, −5, 0, 1, 3, 1, 0, 0}; {, −1, 4, −5, 3, −2, −4, 0, 2, 2, 2, 0, 0}; {, −5, −2, −1, 5, −2, 6, −3, −4, −5, 3, 0, 0}; {, −5, −2, −1, 5, −2, 6, −3, −4, −5, 4, 0, 0}; {6, −3, −2, 4, −3, 5, −3, −5, −5, 3, 0, 0}; {, −3, 2, 5, 1, −4, −5, −1, 2, 1, 0, 0, 0}; {, −2, 4, −4, 5, 1, 1, 6, −2, −1, −2, 0, 0}; {0, −5, 0, −2, −5, −4, 3, 6, −3, −3, 0, 0}; {, −4, 1, 4, 0, −5, 6, −1, 0, 2, 0, 0, 0}; {, −3, 3, −5, 4, 0, 0, 6, −3, −1, −2, 0, 0}; {6, −2, 0, −5, 1, −1, 3, 4, 4, 2, 0, 0}; {, −5, 0, 3, −1, 6, 5, −2, 2, 1, −1, 0, 0}; {5, −3, −1, 6, 0, −2, 2, 5, 3, 1, 0, 0}; {, −4, 2, 6, 3, −1, 0, 6, −4, −1, −2, 0, 0}; {, −4, 2, 6, 3, 0, −2, 4, −3, −2, −1, 0, 0}; {4, −5, −4, 2, −4, 4, −5, −3, 5, 2, 0, 0}; {5, −3, −1, 6, 1, −2, 2, 5, 3, 1, 0, 0}; {6, −1, 2, −2, 6, 4, −3, 1, 0, −1, 0, 0}; {5, −2, 1, −3, 5, 3, −4, 0, 0, 1, 0, 0}; {6, 0, 4, 1, −2, −3, 3, −4, −2, −1, 0, 0}; {1, 3, 3, −4, 1, −3, 2, −2, −3, 4, 0, 0}; {2, 5, 6, 0, 6, 3, 6, −4, 5, 2, 0, 0}; {4, −3, 0, −4, 4, 3, −4, 0, 0, 0, 0, 0}; {2, 5, 6, 0, −5, 2, 6, −3, 5, 2, 0, 0}; {1, −5, −1, −4, −5, −3, 3, 1, −3, −4, 0, 0}; {, −3, 3, −5, 4, 4, −5, 2, −1, −5, −5, 0, 0}; {2, −5, −2, 6, 5, −1, 4, 1, −3, −2, 0, 0}; {, −4, 3, −4, 6, −4, 1, −5, −5, 5, 6, 0, 0}; {5, 1, −5, 6, −1, −1, 2, 6, 1, 2, 0, 0}; {, −5, 0, 3, −1, 1, −1, 3, 1, 6, 5, 0, 0}; {5, 0, 5, 3, −4, −1, 0, −2, 3, 3, 0, 0}; {, −1, −5, 1, 1, −5, 0, 4, 4, 6, 1, 0, 0}; {, −3, 4, −3, −4, 1, 6, −4, −5, −4, 2, 0, 0}; {, −2, 6, 0, 0, 6, 0, 3, 3, 5, 0, 0, 0}; {, −2, 6, 0, 0, 6, 0, 3, 4, 5, 0, 0, 0}; {, −4, 3, −4, −5, 1, 5, −4, −5, −4, 2, 0, 0}; {, −4, 3, −4, −5, 2, 5, −4, −5, −4, 2, 0, 0}; {, −3, 2, 5, 2, −3, 6, −1, 0, 3, 1, 0, 0}; {0, 3, 4, −1, 5, 1, 5, −4, 5, 2, 0, 0}; {, −2, 0, 0, 6, −1, −5, 1, −4, −4, 3, 0, 0}; {1, −3, 3, 3, −5, −1, 6, 2, 2, −1, 0, 0}; {1, −4, 1, 0, 3, −2, 2, 5, 6, 4, 0, 0}; {0, −3, 4, 5, −1, 6, −1, 0, 2, −2, 0, 0}; {, −4, 4, −2, −1, 4, −2, 3, 3, 5, 0, 0, 0}; {5, 0, 5, 5, −3, 3, 6, 6, 6, 1, 0, 0}; {4, −1, 4, 4, −2, 3, 5, 5, −5, 1, 0, 0}; {, −5, 3, −3, −2, 5, −2, 1, 3, 4, 0, 0, 0}; {5, 1, −5, −4, 4, −3, 0, 3, 4, −1, 0, 0}; {3, −2, 3,

3, −2, 2, 5, 5, −5, 1, 0, 0}; {, −2, 5, −2, −2, 5, −1, −5, −5, 6, 0, 0, 0}; {3, −2, 3, 3, −1, 0, 6, 5, −3, 0, 0, 0}; {6, 3, −2, 0, −2, 2, −5, −1, 0, −4, 0, 0}; {, −1, 5, −3, −4, 3, 4, −2, −5, −1, 0, 0, 0}; {4, −2, 2, 2, −3, 2, −2, −3, −5, 1, 0, 0}; {2, −5, −2, −3, 3, −5, 2, 0, −2, 2, 0, 0}; {1, 6, −3, −4, 2, 6, 2, −2, −2, 2, 0, 0}; {2, −4, 0, 0, −5, 1, −3, −4, −5, 0, 0, 0}; {1, −5, −1, −1, 6, 0, −4, −4, 6, −1, 0, 0}; {0, −3, 4, −4, 4, −4, 0, 1, −2, −3, 0, 0}; {, −1, −4, 3, −5, 3, −5, −1, 1, −3, −3, 0, 0}; {, −1, −4, 3, −5, 5, −2, 1, −5, −1, 1, 0, 0}; {0, 6, −2, −1, 6, −1, −4, −5, 6, −1, 0, 0}; {, −2, 3, 6, 6, 0, 4, 0, −1, −4, 1, 0, 0}; {, −2, 3, 6, 6, 0, 5, 0, −1, −4, 1, 0, 0}; {1, −1, −5, 0, 0, 4, −3, 4, −4, 1, 0, 0}; {6, 3, −2, 3, 6, 2, 6, 5, 5, 6, 0, 0}; {1, −2, 5, −2, 6, −3, −1, −1, 2, 4, 0, 0}; {, −1, −5, 1, 5, 0, 2, 3, 2, 5, 5, 0, 0}; {2, 0, −4, 2, 0, 5, −3, 4, −5, 0, 0, 0}; {, −1, −4, 3, −4, 5, −2, 1, −5, −2, 1, 0, 0}; {, −3, 3, −5, −3, 3, −3, 6, −5, 6, −1, 0, 0}; {, −1, −3, 5, −1, −3, 0, 6, −3, 5, −4, 0, 0}; {1, 0, −3, 4, 4, −3, 3, −1, 4, −2, 0, 0}; {, −1, −3, 5, −1, −2, 2, −5, 2, 6, −1, 0, 0}; {, −3, 6, 1, 6, 4, −3, 0, 6, −2, 1, 0, 0}; {, −2, −4, 4, −2, −2, 2, −5, 2, 6, 0, 0, 0}; {, −2, −4, 4, −2, −2, 2, −5, 2, −5, 0, 0, 0}; {, −2, 6, 0, 5, −3, −5, −4, −2, 2, 3, 0, 0}; {, −1, −4, 3, −3, 2, 2, 3, −5, −1, 2, 0, 0}; {, −3, 6, 1, −5, 1, 1, 2, −5, −2, 2, 0, 0}; {3, −1, 5, −2, 4, 5, 4, 3, 6, 6, 0, 0}; {2, −2, 4, −3, 3, 4, 3, 2, 5, 6, 0, 0}; {3, 0, −5, 1, −4, −2, −1, −1, 3, 4, 0, 0}; {1, −2, 5, −1, 6, −3, −1, −1, 2, 4, 0, 0}; {0, −3, 4, −2, 5, −4, −2, −1, 2, 3, 0, 0}; {, −1, −5, 1, 6, 0, 2, 4, 3, 5, 5, 0, 0}; {, −1, −4, 3, −3, 4, −5, −2, −2, 2, 3, 0, 0}; {, −1, −3, 5, 0, −4, 0, 5, −5, −2, 1, 0, 0}; {, −2, 5, −2, 2, −4, −3, −5, 5, −4, −4, 0, 0}; {, −3, 5, −1, 4, −1, 1, 2, 1, 4, 5, 0, 0}; {, −3, 5, −1, 4, −1, 1, 2, 1, 5, 5, 0, 0}; {, −3, 5, −1, 4, −1, 1, 2, 2, 4, 5, 0, 0}; {, −2, −5, 2, −4, 4, −5, −3, −2, 2, 3, 0, 0}; {0, −4, 2, −5, 2, 1, 4, 6, −1, 1, 0, 0}; {1, −3, 3, −4, 3, 3, 3, 2, 5, 6, 0, 0}; {, −2, 6, 0, 5, 0, 1, 3, 2, 4, 5, 0, 0}; {, −5, 2, −5, −1, 5, 5, −4, −4, 2, 1, 0, 0}; {, −4, 3, −4, 0, −5, −5, 6, 4, −5, −5, 0, 0}; {, −4, 4, −2, 3, −1, 0, 2, 1, 4, 5, 0, 0}; {, −4, 3, −4, 0, −5, −4, 6, 4, −5, −5, 0, 0}; {, −4, 3, −4, 0, −5, −4, 6, 4, −4, −4, 0, 0}; {, −3, 5, −1, 4, 0, 2, 2, 1, 5, 5, 0, 0}; {, −4, 4, −2, 3, −1, 1, 1, 0, 4, 5, 0, 0}; {6, 2, −4, 1, −3, −1, 0, 0, 4, 5, 0, 0}; {, −1, −3, 5, 0, −2, 2, 6, 2, 5, −1, 0, 0}; {, −4, 3, −4, 0, −4, −4, 6, 4, −4, −4, 0, 0}; {, −3, −5, 3, −2, −3, 0, 5, 1, 4, −2, 0, 0}; {, −3, −5, 3, −2, −3, 0, 6, 1, 5, −2, 0, 0}; {6, 1, 6, −2, 6, −5, 5, 3, −5, −5, 0, 0}; {5, 0, 5, −3, 5, 6, 4, 3, −5, −4, 0, 0}; {, −2, −4, 4, −1, −2, 2, −5, 2, 6, −1, 0, 0}; {, −4, 5, 0, 6, 4, −4, 0, 6, −3, 1, 0, 0}; {, −4, 6, 2, −3, −4, 1, 6, 1, 5, −1, 0, 0}; {, −5, 5, 1, −4, −5, 0, 5, 1, 5, −1, 0, 0}; {6, 3, −2, 4, 2, −5, −2, 5, −4, 0, 0, 0}; {6, 3, −2, 4, 3, −5, −2, 5, −4, 1, 0, 0}; {0, −4, 2, −4, −1, −3, −3, 0, 5, 5, 0, 0}; {, −2, 6, 0, 6, −2, −5, −4, −1, 4, 4, 0, 0}; {, −1, −4, 3, −2, 3, 2, 3, −4, 1, 3, 0, 0}; {2, −3, 2, −5, −2, −3, −2, −2, −5, 6, 0, 0}; {, −4, 4, −2, 4, −3, 6, −5, −1, 3, 4, 0, 0}; {, −1, −5, 1, −5, 0, 2, 3, 2, 4, 5, 0, 0}; {, −2, 6, 0, 6, 0, 2, 2, 1, 4, 5, 0, 0}; {, −4, 5, 0, −5, 2, 5, −3, −2, 1, 2, 0, 0}; {, −4, 5, 0, −5, 2, 6, −3, −2, 1, 3, 0, 0}; {2, −2, 4, −2, 4, 4, 3, 2, 5, 6, 0, 0}; {, −2, 6, 0, 6, 0, 0, 4, 6, −1, 1, 0, 0}; {, −5, 3, −3, 3, −2, 0, 1, 0, 4, 4, 0, 0}; {5, 1, −5, 1, −4, −2, 1, 1, 3, 4, 0, 0}; {, −5, 3, −3, 3, −2, −2, 3, 5, −2, 0, 0, 0}; {5, 0, 5, −2, 5, 6, 5, 3, −5, −5, 0, 0}; {6, 3, −2, 5, 2, 5, −4, 4, 6, 0, 0, 0}; {3, −2, 3, −4, 3, 4, 5, 3, 6, 6, 0, 0}; {4, −1, 4, −3, 5, 5, 4, 3, 6, −5, 0, 0}; {3, −1, 5, −1, −4, −2, 0, −1, 3, 4, 0, 0}; {5, 3, −1, −5, 6, −2, 3, 0, 3, −2, 0, 0}; {0, 6, −2, 2, −2, −4, −4, 6, −4, −4, 0, 0}; {5, 3, −1, −5, −5, −1, 3, 0, 3, −2, 0, 0}; {4, 2, −2, 6, 6, −2, 3, −1, 3, −2, 0, 0}; {1, −2, 5, 0, 0, 4, −5, 3, 6, 0, 0, 0}; {, −4, 4, −2, 5, 4, −5, −3, 5, 6, 0, 0, 0}; {, −1, −5, 1, −4, −2, 4, −3, −4, 6, −4, 0, 0}; {6, 1, 6, 0, 2, 0, 0, 1, 6, 6, 0, 0}; {6, 1, 6, 0, 2, 0, 0, 1, −5, 6, 0, 0}; {5, 0, 5, −1, 1, −1, 0, 0, 6, 6, 0, 0}; {, −5, 3, −3, 4, −4, 6, −5, −2, 4, 4, 0, 0}; {5, 0, 5, −1, 2, −1, −1, 1, −5, −5, 0, 0}; {4, −1, 4, −2, 1, −1, −1, 0, 6, 6, 0, 0}; {6, 2, −4, 3, −5, 6, −5, −2, 4, 4, 0, 0}; {3, −2, 3, −3, 0, −2, −2, 0, −5, 6, 0, 0}; {4, 0, 6, 1, 6, 5, 5, −3, 1, 3, 0, 0}; {1, −4, 1, −5, −1, −3, −2, −1, 6, 6, 0, 0}; {3, −1, 5, 0, 5, 5, 5, −2, 1, 3, 0, 0}; {, −1, −5, 1, −4, 1, 2, 1, 1, 5, 6, 0, 0}; {5, 1, −5, 2, −4, −2, 0, −1, 3, 4, 0, 0}; {4, −1, 4, −2, 3, 5, 4, 2, 6, 6, 0, 0}; {4, −1, 4, −2, 3, 5, 5, 3, 6, 6, 0, 0}; {5, 1, −5, 2, −4, −1, 0, 0, 3, 4, 0, 0}; {6, 0, 4, −3, 2, 0, −2, −4, −4, −3, 0, 0}; {3, −2, 3, −3, 3, 4, 4, 3, 5, 6, 0, 0}; {4, 0, 6, 1, −4, −2, −1, −1, 3, 4, 0, 0}; {3, −1, 5, 0, −5, −2, −1, −1, 3, 4, 0, 0}; {4, 0, 6, 1, −4, −1, 0, −1, 3, 4, 0, 0}; {, −2, 5, −2, 4, −2, −4, 6, 4, 6, −5, 0, 0}; {1, −5, −1, 4, −2, −3, −4, 6, −5, −4, 0, 0}; {4, −1, 4, −2, 5, 6, 4, 3, −5, −5, 0, 0}; {1, −4, 1, −5, 2, 3, 3, 2, 5, 6, 0, 0}; {0, −5, 0, 6, 1, 2, 3, 2, 5, 5, 0, 0}; {1, −4, 1, −5, 2, 4, 4, 2, 6, 6, 0, 0}; {0, −5, 0, 6, 1, 3, 3, 2, 5, 6, 0, 0}; {, −3, 3, −5, 0, 6, 2, −2, −5, −5, −4, 0, 0}; {1, −5, −1, 4, −1, −3, −5, 6, −5, −4, 0, 0}; {3, −2, 3, −3, 5, 6, 4, 3, −5, −5, 0, 0}; {, −1, 5, −3, 2, −3, −3, −5, 5, −4, −4, 0, 0}; {0, −4, 2, −3, 6, −3, 0, 6, −4, 1, 0, 0}; {1, −2, 5, 1, −1, 3, −5, 3, 6, −1, 0, 0}; {1, −3, 3, −2, −5, −2, −1, −2, 3, 4, 0, 0}; {0, −4, 2, −3, 6, −3, −1, 6, −4, 1, 0, 0}; {1, −2, 5, 1, −1, 3, 6, 3, 5, −1, 0, 0}; {0, −5, 0, 6, 3, 2, 3, 2, 5, −5, 0, 0}; {, −1, 5, −3, 2, −2, −3, −5, 6, −4, −4, 0, 0}; {, −3, 3, −5, 0, −4, −5, −5, 5, −5, −5, 0, 0}; {, −2, 6, 0, −5, 5, −4, −2, 6, −5, 1, 0, 0}; {, −2, 6, 0, −5, 5, −4, −1, 6, −4, 1, 0, 0}; {, −3, 5, −1, 6, 4, −5, −2, 5, −5, 0, 0, 0}; {, −1, −4, 3, −1, −2, 2, 6, 2, 5, 0, 0, 0}; {1, −5, −1, 5, 1, −2, 3, 3, 4, 4, 0, 0}; {, −4, 3, −4, 3, 0, 2, 2, 0, 5, 6, 0, 0}; {4, −4, −2, 2, −3, 5, −3, −4, −4, 4, 0, 0}; {5, −2, 1, 6, 2, 0, 5, 4, 6, 2, 0, 0}; {, −4, 1, 4, −3, −4, 4, −4, 4, −1, −1, 0, 0}; {0, 0, −2, −2, 4, −1, 4, 1, 6, −4, 0, 0}; {5, 1, −5, 3, 6, 5, 6, −2, 4, 5, 0, 0}; {4, 0, 6, 2, 6, 5, 6, −2, 2, 4, 0, 0}; {4, 0, 6, 2, 6, 5, 6, −2, 3, 4, 0, 0}; {3, −1, 5, 1, 5, 4, 6, −3, 3, 4, 0, 0}; {1, −4, 1, −4, −1, −3, −2, 0, 6, 6, 0, 0}; {, −1, 5, −3, 3, 5, 3, 2, 3, −4, −5, 0, 0}; {0, −5, 0, −5, −1, −3, −3, 0, 5, 5, 0, 0}; {, −1, 6, −1, 6, −2, −4, −3, −1, 5, 5, 0, 0}; {4, −1, 4, −1, 4, 5, 5, 3, 5, 6, 0, 0}; {4, 0, 6, 2, −4, −1, 0, −1, 3, 4, 0, 0}; {, −5, 0, 3, −4, 0, −4, 4, −2, −4, −1, 0, 0}; {, −5, 0, 3, −4, 0, −3, 5, −3, −4, 0, 0, 0}; {, −1, 6, −1, 6, 0, 2, 3, 1, 5, 5, 0, 0}; {5, −1, 3, −3, 3, 0, −4, 5, 6, −5, 0, 0}; {5, −1, 3, −3, 3, 0, −3, 5, 6, −5, 0, 0}; {1, −3, 3, −1, −5, −3, 0, 5, −4, 1, 0, 0}; {, −1, −5, 1, −3, 5, −4, −1, 6, −4, 1, 0, 0}; {, −1, 5, −3, 3, −2, −5, 6, 5, 6, −4, 0, 0}; {, −3, 3, −5, 1, −4, 6, 6, 5, 6, −5, 0, 0}; {, −5, 1, 5, −1, 6, 6, 5, 4, 6, −5, 0, 0}; {, −3, 5, −1, −5, 4, −5, −3, 6, −5, 1, 0, 0}; {, −5, 1, 5, −1, 6, −5, −5, 4, −5, −5, 0, 0}; {, −5, 1, 5, −1, 6, −5, 6, 4, −5, −5, 0, 0}; {, −5, 1, 5, 0, −5, 5, 5, 4, 5, −5, 0, 0}; {4, 0, 6, 3, 0, 4, −5, 4, 6, 0, 0, 0}; {2, 6, −4, 1, −5, 4, −5, −4, 6, 2, 0, 0}; {2, 6, −4, 1, −5, 4, −4, −5, −5, 3, 0, 0}; {0, 4, 6, −1, 5, 3, −5, 6, 6, 2, 0, 0}; {, −1, 2, 3, −5, 1, 5, 0, 6, 4, 2, 0, 0}; {5, −2, 1, −5, 3, −1, 4, 4, 5, 3, 0, 0}; {3, −2, 3, −1, −3, −4, 2, −5, −3, −1, 0, 0}; {2, 6, −4, 1, −4, 4, −4, −5, −5, 4, 0, 0}; {, −1, 2, 3, −5, 1, −4, 0, −1, −3, 4, 0, 0}; {0, 4, 6, −1, 6, 3, −4, 6, −5, 3, 0, 0}; {0, 4, 6, −1, 6, 3, −3, 6, −5, 2, 0, 0}; {, −2, 2, 4, −3, 4, 2, −5, 5, 6, 2, 0, 0}; {2, −3, 2, −2, 0, 5, −3, −3, −5, −5, 0, 0}; {, −4, 3, −4, 4, −5, 6, −3, −2, 4, 4, 0, 0}; {6, −2, 0, 5, 6, 2, −3, 1, −2, 1, 0, 0}; {6, −1, 2, −4, −2, −5, 4, −2, −5, 0, 0, 0}; {0, −5, 0, −4, 0, 3, 3, 1, 4, 5, 0, 0}; {0, −3, 4, 2, −4, 2, −5, 0, 3, 1, 0, 0}; {, −3, 4, −3, 5, −3, −5, −4, −2, 5, 5, 0, 0}; {4, −3, 0, 6, −3, 6, 3, −4, 6, −1, 0, 0}; {0, −4, 2, −1, 5, −4, −2, −3, 2, 3, 0, 0}; {, −3, 4, −3, 5, −2, 1, 2, 0, 4, 4, 0, 0}; {, −1, 6, −1, −5, 1, 3, 2, 1, 5, 5, 0, 0}; {, −5, 1, 5, 0, 5, 6, 5, 3, 6, 6, 0, 0}; {, −4, 3, −4, 4, −2, 1, 2, −1, 5, 5, 0, 0}; {, −3, 4, −3, 5, −1, 2, 2, 0, 5, 5, 0, 0}; {, −5, 2, −5, 3, −2, 0, 2, −3, −2, 2, 0, 0}; {0, −5, 1, −3, 4, 3, 3, −4, −1, 2, 0, 0}; {, −5, 2, −4, 4, −1, 1, 0, 0, 4, 4, 0, 0}; {4, −1, 5, 1, −4, −1, 0, −1, 3, 4, 0, 0}; {3, −3, 2, −3, 4, 5, 4, 3, 6, 6, 0, 0}; {6, −1, 3, −3, 4, 0, −4, 6, 6, −5, 0, 0}; {, −3, 1, 4, −3, 3, 1, 6, 4, 6, 2, 0, 0}; {0, −5, 1, −3, 6, −4, −1, 6, −5, 0, 0, 0}; {, −1, 5, −2, 5, 1, 2, 5, −2, −1, 1, 0, 0}; {, −1, 5, −2, 5, 1, 4, 3, 1, −5, −5, 0, 0}; {, −3, 1, 4, −3, 4, 2, −5, 5, 6, 2, 0, 0}; {, −1, 6, 0, −4, 6, −4, −1, 6, −5, 0, 0, 0}; {, −3, 0, 2, 6, 1, 4, 1, 6, 4, 2, 0, 0}; {, −3, 3, −4, 3, 3, −2, 0, −1, −4, −2, 0, 0}; {4, 2, −1, −2, 3, 6, −1, 6, −1, −2, 0, 0}; {, −4, 2, −5, 2, 3, −3, 0, −1, −4, −3, 0, 0}; {6, −1, 3, −3, −3, 3, 4, 2, −2, −1, 0, 0}; {, −5, 2, −4, 4, −5, 6, −5, −2, 5, 5, 0, 0}; {, −5, 2, −4, 4, −5, −5, −5, −2, 4, 5, 0, 0}; {, −4, 4, −1, −4, 0, 1, 3, 6, 2, 3, 0, 0}; {3, −3, 2, −3, −1, −2, 0, −1, 6, 5, 0, 0}; {0, −4, 3, 0, 4, −3, 2, 4, 3, 4, 0, 0}; {, −3, 4, −2, 6, −3, 2, 6, −5, 6, 6, 0, 0}; {, −5, 2, −4, 4, −4, −5, −5, −2, 3, 4, 0, 0}; {6, 1, −5, 3, −5, 6, −5, −2, 4, 5, 0, 0}; {4, −1, 5, 1, 5, 4, 6, −4, 4, 4, 0, 0}; {2, −4, 1, −4, −1, −3, −2, −1, 6, 6, 0, 0}; {0, 4, −5, 0, 1, −2, 6, −1, −4, 1, 0, 0}; {5, 0, 6, 2, 6, 6, 6, −2, 2, 4, 0, 0}; {3, −3, 2, −3, 0, −1, −1, 0, 6, 6, 0, 0}; {, −2, 6, 1, −2, 3, −4, 0, 3, 3, 3, 0, 0}; {, −4, 3, −3, 5, −3, 1, 5, −5, 6, 5, 0, 0}; {, −1, 4, −4, 2, 5, 3, 1, −5, 5, −1, 0, 0}; {2, −3, 3, −1, 4, 4, 5, −3, 1, 3, 0, 0}; {6, 1, −5, 3, −4, 0, 1, −1, 3, 4, 0, 0}; {3, −2, 4, 1, −5, −2, −1, −2, 3, 3, 0, 0}; {, −2, 4, −3, 5, −1, 2, 2, 0, 4, 4, 0, 0}; {, −5, 0, 4, −1, 6, −4, −5, 3, −1, −3, 0, 0}; {6, −1, 3, −2, 5, −5, −5, 1, −1, −4, 0, 0}; {5, −4, −2, 3, −4, 5, −3, −5, −5, 3, 0, 0}; {, −4, 1, 5, 0, −5, −4, −4, 2, 0, −3, 0, 0}; {, −5, 0, 4, −1, 6, −5, −5, 2, 0, −3, 0, 0}; {, −2, 3, −5, 2, −2, −5, 0, 2, 3, 2, 0, 0}; {, −3, 1, 4, −2, 5, 1, 6, 6, 6, 4, 0, 0}; {, −3, 3, −4, 4, 1, 0, 5, −3, −1, 0, 0, 0}; {, −4, 2, −5, 3, 0, −1, 4, −3, −2, −1, 0, 0}; {, −5, 0, 4, −1, −5, 5, −2, 1, 2, 1, 0, 0}; {, −4, 2, −5, 3, 0, −1, 5, −3, −1, 0, 0, 0}; {, −4, 1, 5, 0, −4, 6, 0, 1, 3, 0, 0, 0}; {6, −2, 1, −5, 2, −1, 4, 4, 5, 2, 0, 0}; {4, −5, −3, 2, −4, 4, −4, −3, 6, 2, 0, 0}; {5, −2, 2, −3, 5, 4, −4, 0, 0, 1, 0, 0}; {1, 4, 6, −1, 6, 1, −5, −4, 4, 1, 0, 0}; {2, 5, −5, 0, −5, 4, −3, 6, −5, 3, 0, 0}; {2, 5, −5, 0, −5, 4, −2, 6, −5, 2, 0, 0}; {2, 5, −5, 0, −4, 2, −4, −3, −5, 3, 0, 0}; {, −4, 2, −5, 3, 3, −4, 0, −1, −4, −3, 0, 0}; {, −2, 5, −1, −4, −3, 4, −4, −5, 6, −4, 0, 0}; {5, −2, 2, −3, −4, 2, 3, 2, −2, −1, 0, 0}; {4, −3, 1, −4, −5, 1, 3, 1, −2, −1, 0, 0}; {3, −3, 2, −2, −2, 6, −2, −3, −5, −4, 0, 0}; {, −1, 4, −4, 3, 2, −2, 2, −1, −4, −3, 0, 0}; {3, 2, 0, 1, −5, 0, 6, 2, −4, −4, 0, 0}; {3, 2, 0, 1, −5, 0, −5, 2, −4, −4, 0, 0}; {, −1, 4, −4, 3, 3, 2, 4, 2, −5, 6, 0, 0}; {, −5, 1, 6, 2, 3, 6, 0, −2, −5, −5, 0, 0}; {3, −4, 0, −5, −5, 1, 3, 1, −3, −1, 0, 0}; {1, −4, 2, −1, 2, 2, 5, −5, 3, 4, 0, 0}; {0, −5, 1, −2, 1, 2, 5, −5, 3, 4, 0, 0}; {, −4, 3, −3, 6, −3, 1, 6, −5, 6, 5, 0, 0}; {, −1, 3, 6, 0, 1, −3, 5, −2, −5, 0, 0, 0}; {3, −2, 4, 1, 5, 5, 5, −4, 3, 4, 0, 0}; {, −3, 3, −4, 4, −4, −5, −3, −2, 5, 5, 0, 0}; {, −2, 3, −5, 2, 5, 3, 0, 6, 5, −1, 0, 0}; {1, −4, 2, −1, 4, 4, 4, −4, 1, 3, 0, 0}; {0, −5, 1, −2, 3, 3, 4, −4, 1, 3, 0, 0}; {1, −5, 0, −4, 0, 4, 4, 1, 5, 5, 0, 0}; {, −5, 0, 4, 0, 3, −3, −4, 2, 0, −2, 0, 0}; {, −1, 6, 0, −2, 4, −5, −2, −4, 1, 2, 0, 0}; {, −2, −5, 3, 3, −1, 5, −2, −1, 2, −2, 0, 0}; {, −4, 4, −1, −2, 5, −1, 3, 3, 5, 0, 0, 0}; {4, −3, 1, −3, 4, −1, −4, −5, 0, 1, 0, 0}; {, −5, 0, 4, 0, −5, 5, −2, 0, 1, 1, 0, 0}; {6, −2, 1, −4, 2, −1, 4, 3, 4, 3, 0, 0}; {4, −5, −3, 3, −4, 4, −4, 6, 6, 4, 0, 0}; {5, −3, 0, −5, 1, −1, 2, 5, 3, 1, 0, 0}; {6, −1, 3, −1, 6, 5, −3, 1, 1, 0, 0, 0}; {, −5, −1, 2, −3, 4, 0, 4, 5, 5, 3, 0, 0}; {6, −2, 1, −4, 3, −1, 4, 4, 5, 3, 0, 0}; {, −5, 0, 4, 0, −4, 5, −1, 1, 3, 1, 0, 0}; {6, 0, 5, 2, −1, −2, 4, −4, −2, −1, 0, 0}; {5, −2, 2, −2, 6, 4, −2, 0, 2, 0, 0, 0}; {2, 5, −5, 1, −5, 3, −5, −4, 5, 2, 0, 0}; {3, −3, 2, −1, −4, −5, 2, −5, −3, −2, 0, 0}; {0, 3, 5, −1, 5, 2, −4, 5, 5, 1, 0, 0}; {2, 6, −3, 4, −1, −3, 0, 4, 2, 0, 0, 0}; {3, −4, 0, −4, 4, 3, −4, −1, 0, 1, 0, 0}; {2, 6, −3, 4, −1, −3, 1, 4, 2, 0, 0, 0}; {2, 6, −3, 4, −1, −3, 1, 4, 3, 1, 0, 0}; {2, −5, −1, −5, 3, 2, −5, −1, 0, 0, 0, 0}; {1, 5, −4, 3, −2, −4, 0, 4, 2, 0, 0, 0}; {0, 3, 5, −1, 6, 3, −3, 5, 6, 2, 0, 0}; {, −1, 2, 4, −2, 5, 2, −4, 5, 6, 2, 0, 0}; {, −1, 1, 2, −5, 1, −4, 1, −2, −3, 5, 0, 0}; {4, −2, 3, 0, 0, 6, −1, −3, −5, −4, 0, 0}; {1, 6, −2, 6, 5, −1, 2, 0, −3, −2, 0, 0}; {1, −5, 0, −3, −3, 5, −2, −4, 6, −4, 0, 0}; {, −2, 3, −5, 3, 2, −3, 1, −1, −3, −3, 0, 0}; {, −3, 2, 6, 2, 1, −3, 1, −2, −4, −3, 0, 0}; {1, 0, −2, 0, 6, −1, 4, 1, −5, −4, 0, 0}; {0, 6, −1, −4, −3, 4, −3, −4, 6, −5, 0, 0}; {, −3, 2, 6, 2, 2, −3, 1, −1, −4, −3, 0, 0}; {2, −2, 5, 4, −3, −3, 0, 4, 1, 2, 0, 0}; {, −2, 6, 1, 1, 6, −5, −1, 3, 0, 1, 0, 0}; {6, 2, −3, −3, 3, −2, 2, 3, 4, 0, 0, 0}; {, −4, 5, 1, 2, −3, 3, −3, −2, 1, −2, 0, 0}; {, −4, 4, −1, −1, 5, −1, 2, 3, 4, 0, 0, 0}; {, −4, 5, 1, 2, −3, 4, −3, −1, 1, −2, 0, 0}; {6, 1, −5, 6, −1, 4, −5, 6, 6, 1, 0, 0}; {, −5, 3, −2, −2, 4, −2, 2, 2, 4, 0, 0, 0}; {6, 2, −3, −3, 3, −3, 2, 2, 4, −1, 0, 0}; {3, −2, 4, 3, −3, 2, 5, 5, 6, 1, 0, 0}; {4, 0, −5, −5, 2, −4, 0, 1, 4, −1, 0, 0}; {3, −2, 4, 3, −3, 2, 5, 6, −5, 1, 0, 0}; {3, −2, 4, 3, −3, 2, 6, 5, 6, 0, 0, 0}; {3, −2, 4, 3, −3, 3, 5, 4, 6, 0, 0, 0}; {, −5, 4, 0, 1, −3, 3, −4, −2, 1, −2, 0, 0}; {4, −1, 5, 4, −1, 3, 6, 5, 6, 1, 0, 0}; {2, −2, 5, 5, 1, −5, −1, 0, 3, −2, 0, 0}; {3, 0, −4, −3, −5, 0, −4, 0, 2, −4, 0, 0}; {0, 5, −3, 6, 2, 1, −5, −1, 0, −1, 0, 0}; {, −2, 2, 5, 1, −4, 6, −1, 3, 1, 0, 0, 0}; {, −2, 2, 5, 1, −4, 6, −1, 3, 2, 0, 0, 0}; {, −4, −1, 1, −4, 2, −1, 3, −5, 4, 2, 0, 0}; {, −3, 0, 2, −3, 3, 1, −4, 4, 5, 1, 0, 0}; {0, 4, −5, 3, −2, −5, 0, 3, 3, 1, 0, 0}; {2, −5, −1, −4, 4, 2, −5, −1, 0, 0, 0, 0}; {6, −3, −1, 6, 1, −2, 2, 6, 3, 1, 0, 0}; {, −1, −3, −3, 3, −3, −5, 4, −4, −2, 0, 0}; {5, 0, 6, 6, −2, 4, 6, 6, −5, 2, 0, 0}; {5, 0, 6, 6, −2, 4, −5, 6, −5, 2, 0, 0}; {5, 1, −4, −3, 2, −3, 1, 2, 4, −1, 0, 0}; {3, −2, 4, 4, −4, 2, 6, 5, 5, 0, 0, 0}; {4, 0, −5, −4, 1, −4, 1, 1, 3, −1, 0, 0}; {3, −1, 6, −5, 1, −5, 0, 1, 3, −1, 0, 0}; {3, −2, 4, 4, −3, 3, 5, 5, 6, 1, 0, 0}; {3, −1, 6, −5, 1, −4, 0, 1, 4, −1, 0, 0}; {1, −4, 2, 2, −5, 1, 4, 5, 5, 0, 0, 0}; {0, −5, 1, 1, 6, 0, 4, 5, 5, 0, 0, 0}; {0, −5, 1, 1, 6, 1, 4, 4, 5, 0, 0, 0}; {3, −1, 6, −5, 2, −5, 0, 3, 3, −2, 0, 0}; {2, −3, 3, 3, −3, 2, 5, 5, 6, 1, 0, 0}; {1, −4, 2, 2, −4, 1, 4, 5, 5, 0, 0, 0}; {0, −5, 1, 1, −5, 0, 4, 4, 6, 0, 0, 0}; {, −1, 5, −2, −3, 2, 6, −2, −4, −4, 1, 0, 0}; {0, −5, 1, 1, −5, 1, 3, 4, 6, 0, 0, 0}; {, −2, 4, −3, −4, 1, 6, −4, −5, −4, 1, 0, 0}; {5, −1, 4, 3, −3, 1, −1, −3, −4, 1, 0, 0}; {, −2, 5, −1, −1, 6, −1, 2, 3, 5, 0, 0, 0}; {, −5, 1, 6, 5, −1, 5, 6, 5, −5, 0, 0, 0}; {4, −2, 3, 2, −3, 2, −2, −3, −4, 1, 0, 0}; {6, −2, 1, −2, 4, 0, 4, 3, 3, 4, 0, 0}; {, −2, 3, −5, 5, 1, −1, 5, −2, 0, −1, 0, 0}; {1, −3, 4, 6, −2, 0, −5, 2, 0, 1, 0, 0}; {1, −4, 2, 3, −5, 1, 5, 5, 5, 0, 0, 0}; {, −1, −5, 2, 4, −3, 5, −1, 0, 1, −2, 0, 0}; {0, −5, 1, 2, 6, 1, 3, 5, 5, 0, 0, 0}; {, −2, 4, −3, −3, 1, 6, −4, −5, −4, 2, 0, 0}; {, −3, 4, −2, −1, 4, −1, 3, 3, 5, 0, 0, 0}; {, −1, 6, 0, 1, 6, 1, 3, 4, 5, 0, 0, 0}; {, −5, 1, 6, 6, −1, 4, −5, 6, −5, 1, 0, 0}; {, −1, −4, 4, −5, 3, −5, −1, 1, −3, −3, 0, 0}; {4, −2, 3, 3, −3, 1, −2, −3, −5, 0, 0, 0}; {4, −1, 5, 6, 1, −5, 5, 5, 5, −1, 0, 0}; {1, −5, 0, 0, 6, −1, −3, −4, 6, 0, 0, 0}; {3, −2, 4, 5, 0, −5, 4, 5, 5, −1, 0, 0}; {0, 6, −1, −1, 5, −1, −4, −5, −5, 0, 0, 0}; {1, −5, 0, 0, −5, 0, −3, −4, −5, 1, 0, 0}; {0, 6, −1, −1, 6, 0, −4, −4, −5, 0, 0, 0}; {, −4, 1, 5, 4, −2, 4, 0, −2, −3, 1, 0, 0}; {6, −1, 3, 2, −3, −4, 3, −2, 0, −1, 0, 0}; {, −3, 2, 6, 5, 0, 5, 0, −2, −3, 2, 0, 0}; {, −4, 1, 5, 4, −1, 4, 0, −3, −3, 2, 0, 0}; {, −5, 3, −2, 1, 6, −4, 4, 0, −1, 0, 0, 0}; {, −4, 5, 1, 5, 1, 6, −2, 0, −4, −3, 0, 0}; {, −1, 4, −4, −4, 1, 5, 1, −1, −3, 1, 0, 0}; {, −1, 5, −2, −1, 5, −1, −5, −5, 6, 0, 0, 0}; {, −2, 3, −5, −5, 0, 5, 1, 0, −3, 2, 0, 0}; {, −2, 3, −5, −5, 1, 4, 0, −2, −3, 0, 0, 0}; {, −3, 2, 6, 6, 0, 4, 0, −3, −3, 1, 0, 0}; {, −3, 3, −4, −3, 4, −3, 6, 6, 6, −2, 0, 0}; {, −4, 1, 5, 5, −1, 4, −1, −2, −4, 1, 0, 0}; {, −4, 1, 5, 5, −1, 4, 0, −2, −3, 1, 0, 0}; {, −5, 0, 4, 4, −2, 3, −1, −3, −4, 1, 0, 0}; {5, −2, 2, 2, −4, 2, −2, −3, −5, 0, 0, 0}; {6, 0, 5, 6, 1, −4, 5, 6, 5, −2, 0, 0}; {1, 6, −2, −2, 5, 5, 1, −3, −1, −2, 0, 0}; {, −2, −4, 5, −2, −2, 3, −4, 3, −5, 0, 0, 0}; {3, −5, −2, −3, 3, −5, 3, 0, −2, 2, 0, 0}; {5, −1, 4, 5, 1, −5, 5, 5, 4, −2, 0, 0}; {4, −3, 1, 1, −4, 1, −3, −3, −5, 0, 0, 0}; {0, 0, −1, 6, −3, 1, −4, 6, −1, −5, 0, 0}; {, −4, 6, 3, −4, −3, 1, 6, 1, 6, 0, 0, 0}; {, −3, −5, 4, −2, 2, −1, 1, 1, 3, −5, 0, 0}; {, −3, 5, 0, 4, −1, 1, 2, −4, −3, 1, 0, 0}; {4, −1, 5, −4, 2, 4, −5, 6, 1, −1, 0, 0}; {4, 0, −5, −1, 6, −2, 1, 3, −2, −2, 0, 0}; {, −5, 2, −4, −1, 6, −5, 6, 4, −5, −5, 0, 0}; {5, −2, 2, 3, −4, 2, −2, −2, −4, 0, 0, 0}; {4, 1, −3, 2, 0, 1, −4, −2, 5, −4, 0, 0}; {4, −2, 3, 5, 0, 0, −2, −5, −3, −3, 0, 0}; {3, −3, 2, 4, −1, −1, −3, 6, −3, −3, 0, 0}; {3, −3, 2, 4, −1, −1, −3, 6, −3, −4, 0, 0}; {4, −1, 5, −4, 4, 5, 4, 2, −5, −4, 0, 0}; {6, 3, −1, 4, 2, −5, −1, 5, −3, 0, 0,

0}; {6, 3, −1, 4, 2, −5, −1, 6, −3, 1, 0, 0}; {5, −2, 2, 3, −3, 2, −2, −3, −4, 0, 0, 0}; {3, −4, 0, 1, −5, 1, −3, −3, −5, 0, 0, 0}; {, −5, 5, 2, −3, 1, −2, 0, 0, 3, −5, 0, 0}; {0, −2, −5, 2, −5, −3, −3, 3, −4, 0, 0, 0}; {4, −2, 3, 6, −3, 5, 3, 3, −1, −3, 0, 0}; {5, 1, −4, 1, −4, −1, 1, 0, 3, 4, 0, 0}; {3, −1, 6, −1, 6, −3, 1, 2, −2, −2, 0, 0}; {3, −1, 6, −1, 6, −3, 2, 3, −2, −2, 0, 0}; {5, 0, 6, −2, 5, 6, 5, 3, −5, −5, 0, 0}; {6, 2, −3, 2, −2, 0, 0, 0, 4, 5, 0, 0}; {4, −1, 5, −3, 4, 5, 5, 3, 6, −5, 0, 0}; {3, −1, 6, −1, −5, −2, 0, 0, 3, 4, 0, 0}; {0, −5, 1, 5, 1, −1, 4, 5, −2, 0, 0, 0}; {, −5, 3, −2, 3, 0, 1, 0, 0, 6, −5, 0, 0}; {3, −2, 4, −4, 4, 5, 4, 3, 6, −5, 0, 0}; {2, −3, 3, −5, 3, 4, 3, 2, 6, −5, 0, 0}; {0, 6, −1, 2, −3, −3, −5, 5, −4, −4, 0, 0}; {1, −4, 2, 6, 2, 3, 3, 2, 6, 6, 0, 0}; {2, −3, 3, −5, 3, 4, 4, 2, 6, 6, 0, 0}; {4, 1, −3, 3, 1, 5, −3, 4, −5, 0, 0, 0}; {1, −5, 0, 3, −1, −2, −4, 6, −3, −4, 0, 0}; {2, −3, 3, −5, 4, 4, 4, 2, 6, −5, 0, 0}; {3, 0, −4, 2, 1, 4, −3, 3, −5, 0, 0, 0}; {1, −4, 2, 6, 3, 4, 2, 2, 6, −5, 0, 0}; {, −2, 3, −5, −3, 4, 3, 0, −3, −2, −2, 0, 0}; {, −1, 5, −2, 1, −3, −3, −5, 5, −4, −4, 0, 0}; {3, 0, −4, 2, 1, 4, −4, 3, 6, 0, 0, 0}; {4, 2, −1, 6, 6, −2, 3, −1, 3, −2, 0, 0}; {2, −1, −5, 1, 0, 4, −4, 3, 6, 0, 0, 0}; {5, 0, 6, −1, −3, 5, 2, 1, −2, 0, 0, 0}; {, −2, 5, −1, 4, 2, 1, 2, 1, 5, −5, 0, 0}; {, −4, 2, −5, −1, −4, −5, 6, 4, −5, −4, 0, 0}; {6, −1, 3, 6, 2, 0, −2, −4, −2, −3, 0, 0}; {3, 6, −4, −3, 3, −1, −5, 4, 1, 2, 0, 0}; {, −5, 1, 6, −2, −5, −5, 6, 3, −5, −5, 0, 0}; {6, 0, 5, −3, 6, 6, 5, 3, −5, −4, 0, 0}; {, −3, 3, −4, 0, −2, −4, −5, 4, −4, −4, 0, 0}; {0, −4, 3, −3, −1, −2, 5, −5, −1, 2, 0, 0}; {4, −2, 3, −5, −4, 4, 3, −5, 6, 0, 0, 0}; {4, −2, 3, −5, −4, 5, 4, 3, −2, −4, 0, 0}; {, −3, 5, 0, 6, −3, −4, 4, 6, −2, 1, 0, 0}; {6, 2, −3, 3, −5, 5, 6, −2, 2, 4, 0, 0}; {5, 0, 6, −1, 2, 0, −1, 2, 4, 5, 0, 0}; {5, 1, −4, 2, 6, 5, 6, −3, 1, 3, 0, 0}; {5, 0, 6, −1, 2, 0, −3, −2, −3, −5, 0, 0}; {3, 0, −4, 3, −3, −2, −1, 5, −3, 1, 0, 0}; {6, 3, −1, 6, 1, 5, −4, −4, 0, 2, 0, 0}; {1, −4, 2, −5, 0, −3, −3, 0, 6, 6, 0, 0}; {, −1, −5, 2, −4, 2, 2, 3, −4, −1, 2, 0, 0}; {, −5, 2, −4, 1, −5, −5, 5, 4, −5, −5, 0, 0}; {3, −2, 4, −3, 3, 3, 6, −5, 1, 1, 0, 0}; {4, −1, 5, −2, 4, 5, 4, 3, 6, 6, 0, 0}; {5, 0, 6, −1, 5, 6, 6, 4, 6, −5, 0, 0}; {3, −1, 6, 0, −5, −2, −1, −1, 3, 4, 0, 0}; {3, −1, 6, 0, −5, −2, 0, 0, 3, 4, 0, 0}; {1, −4, 2, −5, 2, 1, 5, 6, 0, 1, 0, 0}; {2, −2, 5, −1, −5, −2, −1, −1, 3, 4, 0, 0}; {0, −5, 1, 6, 1, 3, 3, 2, 5, 6, 0, 0}; {4, −1, 5, −2, 6, 6, 4, 3, −5, −5, 0, 0}; {2, −3, 3, −4, 4, 5, 3, 2, 6, 6, 0, 0}; {1, −4, 2, −5, 3, 4, 3, 2, −5, −5, 0, 0}; {, −2, 4, −3, 1, −4, −4, −5, 5, −5, −4, 0, 0}; {, −1, 6, 0, 5, 1, 2, 2, 1, 5, 6, 0, 0}; {0, −4, 3, −3, 6, −3, 0, 6, −4, 1, 0, 0}; {1, −2, 6, 1, −1, 3, −5, 2, 5, −1, 0, 0}; {, −3, 3, −4, 0, −5, −4, −5, 5, −5, −4, 0, 0}; {3, −3, 2, 6, 2, −1, 4, 4, 5, 5, 0, 0}; {5, 0, 6, −1, −4, −5, 0, 0, 3, 4, 0, 0}; {1, −4, 2, −5, 4, 4, 3, 2, 6, −5, 0, 0}; {, −1, 5, −2, 2, −2, −3, −5, 5, −4, −4, 0, 0}; {, −2, 4, −3, 1, −3, −4, −5, 5, −4, −4, 0, 0}; {, −3, 3, −4, 0, −4, −4, 6, 5, −5, −4, 0, 0}; {, −4, 2, −5, −1, −5, −5, 6, 4, −5, −4, 0, 0}; {, −2, 6, 1, −5, 5, −4, −2, 5, −5, 1, 0, 0}; {, −2, −5, 3, −2, −3, 1, 5, 4, −1, 0, 0}; {, −2, 6, 1, −5, 5, −3, −1, 6, −4, 1, 0, 0}; {0, −5, 1, −5, 4, 4, 2, 2, 6, −5, 0, 0}; {, −5, 2, −4, 2, −1, 0, 1, 0, 4, 5, 0, 0}; {, −3, 5, 0, −5, 5, −5, −1, 5, −4, 0, 0, 0}; {, −5, 6, −1, −5, −5, 6, 4, −5, −5, 0, 0}; {4, −2, 3, −4, 4, 5, 5, 2, −4, −5, 0, 0}; {6, 2, −3, 4, 2, 5, −3, 4, 6, 0, 0, 0}; {, −5, 1, 6, −1, −4, 6, 6, 4, −5, −4, 0, 0}; {, −5, 2, −4, 2, 0, 0, 1, 0, 4, 6, 0, 0}; {, −4, 3, −3, 3, 1, 1, 0, 1, 5, −5, 0, 0}; {6, 1, −5, 1, −1, 0, 1, −1, 4, 5, 0, 0}; {4, −2, 3, −4, 5, 5, 5, 3, 6, −5, 0, 0}; {4, −2, 3, −4, 5, 6, 5, 2, −5, −5, 0, 0}; {3, −3, 2, −5, 4, 5, 5, 2, 6, 6, 0, 0}; {5, 1, −4, 3, 2, 5, −3, 4, 6, 0, 0, 0}; {6, 1, −5, 1, 0, −1, 0, 0, 5, −5, 0, 0}; {, −1, 2, 4, 6, 1, −3, 5, 4, 0, 2, 0, 0}; {5, 0, 6, 0, 1, −5, −1, −2, −4, −3, 0, 0}; {6, 2, −3, 4, −5, 6, 6, −2, 3, 5, 0, 0}; {4, −1, 5, −1, 1, −1, −1, 1, 5, 5, 0, 0}; {5, 1, −4, 3, 6, 5, 6, −2, 1, 4, 0, 0}; {, −4, 4, −1, 6, −3, −4, 3, 5, −2, 1, 0, 0}; {3, −2, 4, −2, 0, −1, −2, 0, 6, 6, 0, 0}; {3, −2, 4, −2, 0, −1, −2, 1, 4, 5, 0, 0}; {3, −1, 6, 1, 5, −2, 2, 4, 5, 4, 0, 0}; {5, 1, −4, 3, −5, 5, 6, −2, 3, 4, 0, 0}; {1, −4, 2, −4, −1, −3, −3, −1, 6, 6, 0, 0}; {1, −4, 2, −4, −1, −3, −2, 0, 4, 4, 0, 0}; {0, −5, 1, −5, −2, −3, −3, −2, 6, 6, 0, 0}; {, −4, 3, −3, 3, −5, −5, −5, −3, 6, 5, 0, 0}; {, −1, 6, 0, 6, −2, −4, −4, 0, 4, 5, 0, 0}; {0, −5, 1, −5, −1, −3, −3, 0, 3, 4, 0, 0}; {0, −5, 1, −5, −1, −3, −3, 0, 4, 5, 0, 0}; {, −1, 6, 0, 6, −2, −4, −3, −1, 6, 6, 0, 0}; {1, −4, 2, −4, 1, 4, 4, 2, 5, 6, 0, 0}; {0, −5, 1, −5, 1, 3, 4, 2, 5, 6, 0, 0}; {0, −4, 3, −2, 5, −4, −2, −2, 2, 3, 0, 0}; {, −2, 5, −1, 5, 0, 2, 3, 1, 4, 5, 0, 0}; {, −2, 5, −1, 5, 0, 2, 3, 1, 5, 6, 0, 0}; {, −2, 4, −3, 2, −3, −4, 6, 5, −5, −5, 0, 0}; {, −4, 3, −3, 3, −1, 1, 2, 1, 4, 5, 0, 0}; {, −4, 4, −1, 6, 3, 6, −3, 4, 6, 0, 0, 0}; {0, 5, −3, 2, −4, 4, 0, −4, −5, −3, 0, 0}; {6, 0, 5, −1, 6, 6, 6, 4, 6, −5, 0, 0}; {, −5, 1, 6, 0, −5, −5, 5, 4, −5, −5, 0, 0}; {5, −1, 4, −2, 5, 6, 6, 4, 6, −5, 0, 0}; {4, −2, 3, −3, 4, 5, 5, 3, 6, 6, 0, 0}; {5, 0, 6, 1, −3, −1, 0, −1, 4, 5, 0, 0}; {6, 2, −3, 5, 2, 5, −4, 4, 6, 0, 0, 0}; {4, −1, 5, 0, −4, −2, 0, −1, 3, 4, 0, 0}; {5, 0, 6, 1, −3, −1, 2, −5, −3, 1, 0, 0}; {3, −3, 2, −4, 3, 5, 5, 2, 6, 6, 0, 0}; {4, −2, 3, −3, 5, 5, 4, 3, 6, −5, 0, 0}; {4, −2, 3, −3, 5, 6, 5, 3, −5, −5, 0, 0}; {2, −3, 3, −2, −5, −3, 0, 0, 2, 4, 0, 0}; {2, −4, 1, −5, 3, 5, 4, 2, 6, 6, 0, 0}; {1, −5, 0, 6, 2, 4, 4, 1, 5, 5, 0, 0}; {1, −5, 0, 6, 2, 4, 4, 1, 6, 6, 0, 0}; {4, 0, −5, 3, 1, 5, −4, 3, 5, 0, 0, 0}; {3, −2, 4, −1, −4, −1, 1, −5, −3, 1, 0, 0}; {6, 1, −5, 2, 0, 0, 0, 0, 5, −5, 0, 0}; {4, −2, 3, −3, 6, 5, 5, 3, −5, −4, 0, 0}; {3, −3, 2, −4, 5, 4, 4, 3, 6, −5, 0, 0}; {1, −5, 0, 6, 3, 3, 3, 2, 5, −5, 0, 0}; {2, −4, 1, −5, 4, 5, 4, 2, −5, −5, 0, 0}; {3, −1, 6, 2, 1, 4, −5, 3, 5, −1, 0, 0}; {3, −2, 4, −1, 0, −5, −2, −3, −5, −3, 0, 0}; {2, −3, 3, −2, −1, 6, −3, −4, −5, −4, 0, 0}; {6, −3, −1, 2, −1, 5, 2, 3, 0, 4, 0, 0}; {5, −4, −2, 1, −2, 5, 2, 3, 0, 4, 0, 0}; {1, 2, 2, 3, −2, 4, −1, −3, 4, 6, 0, 0}; {2, −3, 3, −2, 0, 6, −3, −3, −5, −4, 0, 0}; {0, −5, 1, −4, −2, −3, −3, −1, 5, 6, 0, 0}; {, −2, 5, −1, 6, −3, −5, −4, −1, 5, 6, 0, 0}; {, −4, 1, 5, −2, −1, −4, 4, −3, −5, 0, 0, 0}; {, −3, 3, −4, 2, 4, 2, 1, 3, 6, 6, 0, 0}; {, −1, 6, 0, −5, −2, −3, −3, −1, 4, 5, 0, 0}; {, −2, 5, −1, 6, −3, −4, −3, −1, 4, 4, 0, 0}; {, −2, 5, −1, 6, −3, −4, −3, −2, 5, 5, 0, 0}; {6, 0, 5, −1, 1, −1, 0, 0, −5, −5, 0, 0}; {5, −1, 4, −2, 0, −2, 0, 0, −5, −5, 0, 0}; {, −4, 3, −3, 4, −4, −5, −5, −2, 5, 5, 0, 0}; {6, 1, −5, 2, 6, 6, −5, −3, 5, 5, 0, 0}; {0, −4, 3, −1, 4, −3, 1, 4, 4, 4, 0, 0}; {, −1, −5, 2, −2, 3, −4, 0, 3, 3, 3, 0, 0}; {, −3, 4, −2, 5, −3, −5, −4, −1, 3, 4, 0, 0}; {6, 1, −5, 2, −5, 6, 6, −1, 2, 4, 0, 0}; and {−1, 6, 0, −5, 0, 2, 3, 1, 4, 5, 0, 0}.

The first sequence set may further include some or all of the following 3922 sequences (which are marked as seq21_rm). PAPRs of sequences corresponding to these sequences are less than 2.1 dB, but a value of a cross-correlation with an LTE sequence is relatively large. These sequences belong to suboptimal sequences. The 3922 sequences are as follows:

{−1, 6, 1, −4, 3, 2, 2, −5, −2, 1, 0, 0}; {, −2, 4, −2, 4, −2, −3, 4, 3, −1, −1, 0, 0}; {2, −4, 2, −4, 2, 3, −4, −3, 1, 1, 0, 0}; {1, 6, −1, 4, −3, −2, −2, 5, 2, −1, 0, 0}; {6, −1, 4, −3, 3, 0, −1, 0, −3, −4, 0, 0}; {, −4, 2, −4, 2, −3, −4, 3, 3, −2, −1, 0, 0}; {, −3, 3, −3, 3, −2, −3, 5, 5, −2, −1, 0, 0}; {, −4, 2, −4, 2, −3, −4, 4, 4, −2, −1, 0, 0}; {0, 5, −2, 3, −3, −4, −1, −2, 4, 2, 0, 0}; {2, −4, 2, −4, 3, 4, 3, 2, 6, 6, 0, 0}; {, −5, 1, −5, 1, −3, 6, 5, −2, 0, 2, 0, 0}; {6, 0, 6, 0, −4, 5, 4, −2, 0, 2, 0, 0}; {5, −1, 5, −1, −5, 4, 3, −3, −1, 1, 0, 0}; {5, −1, 5, −1, −5, 6, 3, 3, −3, −2, 0, 0}; {, −3, 2, −5, 0, −5, −5, −5, 3, −1, −3, 0, 0}; {, −2, 4, −2, 4, 0, 2, 2, 0, 6, 6, 0, 0}; {4, −3, 2, −5, 3, −1, −5, 6, −5, −5, 0, 0}; {4, −3, 2, −5, 3, −1, −4, 6, −5, −4, 0, 0}; {4, −2, 4, −2, −5, 4, 3, −3, −1, 1, 0, 0}; {2, −5, 0, 5, 1, −2, 3, 3, 5, 4, 0, 0}; {1, −5, 1, −5, 4, 4, 3, 2, 6, −5, 0, 0}; {, −2, 4, −2, 4, 1, 2, 2, 1, 5, 6, 0, 0}; {, −2, 5, 0, −5, 5, −5, −1, 5, −5, 0, 0, 0}; {, −3, 3, −3, 3, 0, 2, 2, 0, 5, 5, 0, 0}; {, −3, 3, −3, 3, 0, 2, 2, 0, 6, 6, 0, 0}; {, −4, 2, −4, 2, −1, 1, 1, −1, −5, −5, 0, 0}; {, −4, 2, −4, 2, 0, 2, 1, 0, 6, 6, 0, 0}; {, −5, 1, −5, 1, −1, 1, 1, 0, 5, 5, 0, 0}; {6, 1, −4, 3, 2, 6, −4, 3, 5, 0, 0, 0}; {6, 1, −4, 3, 2, −2, −1, 6, −4, −1, 0, 0}; {4, −3,

2, −5, 4, −1, −5, 5, 1, 1, 0, 0}; {, −2, 4, −2, 4, 2, 2, 2, 1, 5, −5, 0, 0}; {, −2, 4, −2, 4, 2, 3, 2, 1, 6, 6, 0, 0}; {5, −2, 3, −4, 5, 5, 5, 3, −5, −5, 0, 0}; {4, −2, 4, −2, −3, −1, −1, −1, 5, 5, 0, 0}; {, −1, 6, 1, −4, −4, 2, 5, −3, −1, 0, 0, 0}; {, −2, 3, −4, 1, −1, 4, 3, 6, 5, 2, 0, 0}; {, −2, 3, −4, 1, −1, 4, 3, 6, 5, 3, 0, 0}; {1, 6, −1, 4, 2, −4, 5, 5, 6, 5, 0, 0}; {, −1, 4, −3, 2, 0, −2, −4, 5, −3, −3, 0, 0}; {, −1, 5, −1, 5, 4, 3, 3, 1, 6, −5, 0, 0}; {, −5, 0, 5, −2, −4, 6, 6, 4, −4, −4, 0, 0}; {, −2, 5, 0, −5, −4, 2, 4, −3, −1, 0, 0, 0}; {, −3, 4, −1, 6, −5, 1, 4, −3, −2, 0, 0, 0}; {, −2, 3, −4, 1, 0, 4, 2, 5, 5, 2, 0, 0}; {, −3, 2, −5, 0, −1, 3, 2, 5, 4, 3, 0, 0}; {4, −1, 6, 1, 2, −3, −1, −4, −4, −3, 0, 0}; {3, −2, 5, 0, 1, −4, −2, −4, −5, −3, 0, 0}; {, −3, 2, −5, 0, −1, 4, 2, 4, 5, 3, 0, 0}; {, −4, 1, 6, −1, −2, 3, 1, 4, 4, 3, 0, 0}; {2, −5, 0, 5, 4, −2, −4, 3, 1, 0, 0, 0}; {3, −2, 5, 0, 1, −3, −2, −5, −4, −3, 0, 0}; {2, −3, 4, −1, 0, −4, −2, −5, −5, −2, 0, 0}; {3, −4, 1, 6, 5, −1, −4, 3, 2, 0, 0, 0}; {5, 0, −5, 2, 4, 6, 6, −4, 4, 4, 0, 0}; {1, −5, 1, −5, −4, −3, −3, −1, 6, 5, 0, 0}; {1, −4, 3, −2, 0, 2, 4, −5, 3, 3, 0, 0}; {2, −3, 4, −1, 1, −4, −3, 6, −5, −3, 0, 0}; {2, −3, 4, −1, 1, −4, −3, 6, −5, −2, 0, 0}; {1, 6, −1, 4, 4, −2, −5, 3, 1, 0, 0, 0}; {, −4, 2, −4, 2, 3, 1, 1, 1, −5, −5, 0, 0}; {5, −1, 5, −1, 1, −1, −1, 0, −5, −5, 0, 0}; {4, −2, 4, −2, 0, −2, −1, 0, 6, 6, 0, 0}; {, −5, 2, −3, 4, −5, −5, −5, −3, 5, 5, 0, 0}; {2, −4, 2, −4, −2, −3, −2, −1, 6, 6, 0, 0}; {2, −4, 2, −4, −2, −2, −2, −1, −5, 5, 0, 0}; {, −4, 3, −2, 5, −4, 1, 5, −5, −1, −1, 0, 0}; {6, −1, 4, −3, −2, 6, 4, −3, −5, 0, 0, 0}; {4, −2, 4, −2, 1, −1, −1, 1, 5, 5, 0, 0}; {5, 0, −5, 2, 6, 5, 6, −3, 4, 4, 0, 0}; {3, −3, 3, −3, 0, −2, −2, 0, 6, 6, 0, 0}; {2, −5, 0, 5, −5, 5, 1, −5, 5, 0, 0, 0}; {, −1, 5, −1, 5, −4, −4, −3, −2, 6, 5, 0, 0}; {, −2, 5, 0, −5, −1, 2, −3, −3, −5, −4, 0, 0}; {6, −1, 4, −3, −1, 1, 0, −5, 4, 0, 0, 0}; {, −4, 2, −4, 2, 5, −4, −3, 3, 1, −1, 0, 0}; {, −4, 3, −2, 5, −3, 1, 4, 6, 5, 4, 0, 0}; {, −4, 3, −2, 5, −3, 1, 5, 6, 5, 5, 0, 0}; {2, −4, 2, −4, 0, −2, −2, 0, 6, 6, 0, 0}; {2, −4, 2, −4, 0, −2, −2, 0, −5, −5, 0, 0}; {3, −2, 5, 0, 5, 5, 5, −3, 1, 3, 0, 0}; {, −5, 1, −5, 1, 5, 6, −3, −3, 3, 2, 0, 0}; {, −5, 1, −5, 1, 5, −4, −3, 3, 1, −1, 0, 0}; {5, −1, 5, −1, 3, 6, −5, 2, 0, −2, 0, 0}; {, −2, 4, −2, 4, −3, −4, −3, −2, 6, 6, 0, 0}; {0, −5, 2, −3, 3, 4, 1, 2, −4, −2, 0, 0}; {4, −2, 4, −2, 3, 4, −4, −4, 2, 1, 0, 0}; {3, −3, 3, −3, 2, 3, −5, −5, 2, 1, 0, 0}; {4, −2, 4, −2, 3, 4, −3, −3, 2, 1, 0, 0}; {6, 1, −4, 3, −3, 0, 1, 0, 3, 4, 0, 0}; {, −5, 1, −5, 2, −5, 6, 6, −4, 6, 5, 0, 0}; {, −3, 3, −3, 4, −3, −4, −4, −1, 3, 4, 0, 0}; {5, −1, 5, 0, 5, 5, −5, −4, 5, 5, 0, 0}; {0, 6, 0, −5, 0, 1, 6, 6, 1, 1, 0, 0}; {1, −5, 1, −4, 1, 2, −5, −4, 1, 1, 0, 0}; {0, 6, 0, −5, 1, 1, −5, −4, 0, 1, 0, 0}; {5, −1, 5, 0, −5, 5, 5, −3, 0, 2, 0, 0}; {, −2, 3, −4, 2, −4, −5, −1, −1, 3, 2, 0, 0}; {, −1, 5, −1, 6, 1, 1, 6, −4, 0, 1, 0, 0}; {, −2, 3, −4, 2, −4, −5, 0, 0, 3, 2, 0, 0}; {5, −1, 5, 0, −5, −5, 4, 4, −3, −2, 0, 0}; {4, −2, 4, −1, 6, 6, 3, 3, −3, −2, 0, 0}; {3, −3, 3, −2, 5, 5, 2, 2, −3, −2, 0, 0}; {5, −2, 3, −3, 4, 6, 6, 1, −2, −4, 0, 0}; {3, −3, 3, −2, 6, 4, 3, −3, −1, 1, 0, 0}; {4, −3, 2, −4, 3, 0, −4, −5, 0, 0, 0, 0}; {3, −4, 1, −5, 2, 0, −5, 6, 0, 0, 0, 0}; {6, 0, 6, 1, −2, 0, 0, −1, −5, −5, 0, 0}; {, −5, 1, −5, 2, −1, 1, 1, 0, 5, 6, 0, 0}; {6, 0, 6, 1, −2, 0, 1, 0, 4, 5, 0, 0}; {3, −4, 1, −5, 3, 5, 5, 1, −4, −5, 0, 0}; {3, −4, 1, −5, 3, 5, 5, 1, −2, −4, 0, 0}; {2, −5, 0, 6, 3, 4, 4, 1, −3, −4, 0, 0}; {4, −3, 2, −4, 5, −1, −2, 3, 2, 1, 0, 0}; {1, 6, −1, 5, 2, −3, −5, 2, 1, 1, 0, 0}; {0, 5, −2, 4, 1, −3, 2, 3, 5, 4, 0, 0}; {, −5, −1, 3, −4, 4, 0, 5, 5, 6, 4, 0, 0}; {2, −4, 2, −3, −4, −1, −1, −1, 4, 4, 0, 0}; {, −5, 0, 5, −1, −3, 2, 1, 4, 4, 2, 0, 0}; {5, −3, 1, 6, 3, −5, 6, −3, 6, 3, 0, 0}; {2, 6, −2, 3, 1, 6, 2, 6, 5, 2, 0, 0}; {0, 4, −4, 1, −1, 4, 1, 6, 4, 3, 0, 0}; {1, −5, 1, −4, −4, 3, 2, −3, −1, −1, 0, 0}; {, −3, 1, 5, −2, −4, 1, −2, 5, 2, 2, 0, 0}; {0, 6, 0, −5, −4, −4, −3, −1, 6, 6, 0, 0}; {6, 0, 6, 1, 2, −4, −1, −2, −4, −3, 0, 0}; {, −1, 4, −3, 3, 4, 2, 1, 3, −3, −4, 0, 0}; {1, −5, 1, −4, −2, −3, −2, −1, 6, 6, 0, 0}; {0, 6, 0, −5, −3, −4, −3, −1, 6, 6, 0, 0}; {, −1, 5, −1, 6, −4, −4, −3, −2, 6, 5, 0, 0}; {, −1, 5, −1, 6, −4, −3, −3, −2, 6, 5, 0, 0}; {, −4, 1, 6, 0, 1, 1, 1, 1, −4, 6, 0, 0}; {, −3, 3, −3, 4, 6, −5,

−4, −2, 5, 4, 0, 0}; {5, −1, 5, 0, 2, 5, 0, −1, −4, −4, 0, 0}; {3, −3, 3, −2, 0, 5, −4, −3, 1, 0, 0, 0}; {, −1, 5, −1, 6, −3, −5, −4, −2, 6, 6, 0, 0}; {1, −5, 1, −4, −1, −2, −2, −1, 6, 6, 0, 0}; {0, 6, −5, −2, −3, −2, −2, 6, 5, 0, 0}; {, −2, 4, −2, 5, −4, −5, −3, −2, 5, 5, 0, 0}; {, −4, 2, −4, 3, 6, 6, −4, −3, 5, 5, 0, 0}; {, −2, 4, −2, 5, −4, −4, −3, −2, 5, 4, 0, 0}; {, −2, 4, −2, 5, −4, −4, −3, −2, 6, 5, 0, 0}; {4, −3, 2, −4, −2, 0, 0, −5, 4, 0, 0, 0}; {3, −3, 3, −2, 1, 4, −3, −3, 3, 1, 0, 0}; {4, −2, 4, −1, 2, 6, −5, 1, 0, −2, 0, 0}; {, −2, 4, −2, 5, −3, −4, −4, −2, 5, 5, 0, 0}; {, −5, 1, −5, 2, 6, 6, −4, −3, 3, 3, 0, 0}; {5, −1, 5, 0, 4, 4, −5, −4, 3, 3, 0, 0}; {2, −5, 0, 6, −3, −3, 1, 0, 5, 3, 0, 0}; {4, −3, 2, −4, −1, 0, −1, 6, 3, −1, 0, 0}; {3, −3, 3, −2, 2, 4, −4, −4, 2, 1, 0, 0}; {2, −4, 2, −3, 1, 3, −4, −4, 2, 1, 0, 0}; {4, −1, 6, 2, −5, −1, 2, 5, 4, 3, 0, 0}; {4, −1, 6, 2, −5, −1, 3, 6, 5, 5, 0, 0}; {1, −5, 1, −4, 0, 4, 5, 1, −1, −3, 0, 0}; {, −3, 3, −3, 5, −3, −4, −4, −2, 5, 5, 0, 0}; {, −5, 1, −5, 3, −5, −5, −5, −3, 5, 5, 0, 0}; {1, 6, −1, 6, −3, −4, 0, −1, 5, 4, 0, 0}; {0, 5, −2, 5, −4, −4, 0, −1, 5, 3, 0, 0}; {, −1, 5, −1, −5, −1, 1, −5, −5, 1, 1, 0, 0}; {, −2, 3, −4, 3, 6, −5, 0, −1, 5, 2, 0, 0}; {, −3, 2, −5, 2, 5, 6, −1, −2, 4, 2, 0, 0}; {1, −5, 1, −3, 1, 5, 6, 1, −1, −2, 0, 0}; {4, −3, 2, −3, 1, −2, −3, 0, −4, −5, 0, 0}; {4, −3, 2, −3, 1, −1, −2, 0, −5, 6, 0, 0}; {4, −4, 0, 6, −3, 6, 3, −4, 6, 0, 0, 0}; {, −3, 3, −3, 5, −2, 2, 4, −4, 6, 5, 0, 0}; {2, −4, 2, −2, 4, 5, 2, 2, −3, −2, 0, 0}; {, −4, 1, 6, 1, 6, −4, −3, 3, 1, −1, 0, 0}; {5, −2, 3, −2, 4, 6, −5, 2, 0, −2, 0, 0}; {4, −3, 2, −3, 3, 6, −5, 1, −1, −3, 0, 0}; {0, 5, −2, 5, −1, −4, −5, −3, −5, 6, 0, 0}; {2, −5, 0, −5, 1, −1, −5, 6, 0, 0, 0, 0}; {2, −4, 2, −2, 5, 5, 2, 2, −3, −2, 0, 0}; {, −4, 1, 6, 1, −5, 6, −1, −1, 2, 2, 0, 0}; {, −5, 0, 5, 0, 6, 5, −2, −1, 2, 2, 0, 0}; {, −4, 1, 6, 1, −5, −5, −2, −2, 3, 2, 0, 0}; {, −5, 0, 5, 0, 6, 6, −1, −1, 2, 1, 0, 0}; {3, −4, 1, −4, 3, 5, 6, 1, −1, −3, 0, 0}; {2, −5, 0, −5, 2, 5, 5, 0, −4, −5, 0, 0}; {, −1, 4, −3, 4, −1, −4, 6, 0, 1, 2, 0, 0}; {6, −1, 4, −1, 6, 5, −3, −3, 2, 2, 0, 0}; {2, 6, −2, 4, −2, −3, 2, 1, 4, 1, 0, 0}; {, −4, 2, −4, 4, 0, 1, 2, −4, −2, 2, 0, 0}; {5, −2, 3, −2, 5, 5, −3, −3, 2, 1, 0, 0}; {6, −1, 4, −1, −5, 5, −2, 0, 2, 2, 0, 0}; {, −2, 2, 6, 0, −4, −3, −4, 3, 0, −3, 0, 0}; {, −1, 4, −3, 4, 1, 3, 3, 0, −3, −4, 0, 0}; {0, 6, 0, −4, 6, −2, −1, −1, 3, 4, 0, 0}; {3, −5, −1, 5, 2, −5, 5, −5, 6, 4, 0, 0}; {, −4, 1, 6, 1, 0, 1, 2, 1, 6, 5, 0, 0}; {2, 6, −2, 4, 2, 6, 4, 6, 6, 4, 0, 0}; {2, 6, −2, 4, 2, 6, 5, 6, 6, 4, 0, 0}; {5, −1, 5, 1, 1, −4, −1, −3, −4, −3, 0, 0}; {1, −4, 3, 0, 2, 5, 5, −5, 2, 3, 0, 0}; {2, −4, 2, −2, −1, 6, −3, −3, −5, −4, 0, 0}; {0, 5, −2, 5, 5, −1, 1, 0, −3, −2, 0, 0}; {2, −4, 2, −2, 0, 3, −3, −3, −5, 6, 0, 0}; {, −4, 0, 4, −2, −1, −4, 4, −3, −5, 0, 0, 0}; {, −2, 4, −2, 6, −3, −4, −3, −2, 5, 5, 0, 0}; {, −1, 6, 1, −2, 2, 2, 4, −5, 3, 4, 0, 0}; {3, −2, 5, 2, 6, −2, 3, 5, 4, 4, 0, 0}; {2, −3, 4, 1, 5, −2, 3, 5, 5, 5, 0, 0}; {, −1, 4, −3, 4, 6, −2, −2, 4, 2, −1, 0, 0}; {, −2, 5, 0, −2, 2, 2, 4, −5, 2, 3, 0, 0}; {6, −1, 4, 0, 3, −4, −4, 2, 0, −2, 0, 0}; {3, −4, 1, −3, 0, −1, −1, 0, 6, 5, 0, 0}; {3, −3, 3, 0, 4, 4, 6, −4, 4, 4, 0, 0}; {, −4, 1, 6, 2, 5, 6, −1, −2, 4, 2, 0, 0}; {3, −3, 3, 0, 5, 3, 4, −5, 5, 4, 0, 0}; {, −3, 4, −1, −3, 3, −5, −3, −4, 1, 2, 0, 0}; {4, −3, 2, −2, 2, 4, −3, −3, 3, 1, 0, 0}; {4, −2, 4, 1, −5, −2, 0, −2, 2, 3, 0, 0}; {0, 5, −2, 6, −1, −3, −5, −3, −5, 6, 0, 0}; {, −2, 2, 6, 1, −5, −5, 0, 0, 3, 1, 0, 0}; {1, 5, −3, 4, −2, −4, 1, 1, 3, 2, 0, 0}; {2, 6, −2, 5, −1, −3, 1, 1, 4, 2, 0, 0}; {, −5, 0, 5, 1, 1, −4, 0, −2, −5, −3, 0, 0}; {0, 6, 0, −3, −2, 4, −3, −4, 6, −4, 0, 0}; {, −3, 2, −5, 3, 3, −3, 1, −1, −4, −2, 0, 0}; {5, 2, −1, −1, 4, −5, −1, −5, 0, −2, 0, 0}; {4, 0, −4, −4, 2, −3, 1, 2, 4, −1, 0, 0}; {3, −1, −5, −5, 1, −4, 0, 2, 4, −1, 0, 0}; {2, −2, 6, 6, 0, −5, −1, 1, 3, −1, 0, 0}; {6, 1, −4, −5, 0, −1, 3, 6, 2, 2, 0, 0}; {, −2, 5, 0, −1, 5, −1, 2, 4, 5, 0, 0, 0}; {, −1, 3, −5, 3, 6, 0, −2, 4, 1, −1, 0, 0}; {6, −2, 2, −2, 2, 0, −2, 0, −4, 6, 0, 0}; {4, −4, 0, −4, 2, 0, −4, 2, 3, 2, 0, 0}; {1, 6, −1, −4, 4, 2, −5, −2, 1, 0, 0, 0}; {, −1, 4, −3, 6, 2, 0, 6, −3, 0, 0, 0, 0}; {, −3, 1, 5, 1, −4, 6, −2, 1, 2, 1, 0, 0}; {, −2, 3, −4, 5, 1, 1, 5, −2, −1, −2, 0, 0}; {, −4, −1, 2, −3, 4, 1, −4, 4, 5, 1, 0, 0}; {, −1, 2, 5, 0, −5, 0, −3, −2, −4, 6, 0, 0}; {, −5, 0, 5, 2, 1, −4, 0, −2, −4, −3, 0, 0}; {6, −1, 4, 1, 0, −4, 0, −3, −4, −3, 0, 0}; {4, 0, −4, −3, 2, −3, 1, 2, 5, 0, 0, 0}; {, −2, 5, 0, 0, 5, −1, 3, 4, 5, 0, 0, 0}; {5, 1, −3, −2, 4, 4, −3, 1, −1, −1, 0, 0}; {4, 0, −4, −3, 3, 4, −4, 1, −2, 0, 0, 0}; {1, −4, 3, 3, −4, −4, 1, 4, 0, 0, 0, 0}; {, −2, 5, 0, 0, 6, −1, 3, 3, 5, 1, 0, 0}; {, −3, 4, −1, −1, 5, −2, 2, 3, 4, 0, 0, 0}; {, −4, 2, −4, −5, 0, 5, −4, −5, −5, 2, 0, 0}; {, −4, 2, −4, −5, 0, 5, −4, −5, −5, 1, 0, 0}; {, −4, 3, −2, −2, 4, −2, 2, 3, 4, −1, 0, 0}; {, −3, 4, −1, −1, 5, −1, 2, 3, 5, 0, 0, 0}; {, −4, −2, −2, 4, −1, 2, 3, 5, 0, 0, 0}; {6, 1, −4, −4, 2, −2, 1, 2, 4, −1, 0, 0}; {5, −1, 5, 4, −2, 4, 6, 6, −5, 1, 0, 0}; {6, 1, −4, −4, 3, −2, 1, 2, 4, −1, 0, 0}; {2, 5, −4, 4, −4, 6, 0, 6, 5, 2, 0, 0}; {3, −4, 1, −1, 6, 5, 2, −3, 0, 0, 0, 0}; {2, 6, −2, −5, 1, 0, −5, 2, 2, 2, 0, 0}; {0, 3, 6, 2, −5, 5, −1, 5, 4, 3, 0, 0}; {0, 3, 6, 2, −5, 5, −1, 5, 5, 3, 0, 0}; {1, 5, −3, 6, 0, −1, 6, 1, 2, 1, 0, 0}; {1, 5, −3, 6, 0, −1, 6, 1, 2, 2, 0, 0}; {0, 3, 6, 2, −5, 5, −1, 5, 5, 2, 0, 0}; {0, 4, −4, 5, −1, −2, 5, 0, 2, 1, 0, 0}; {0, 3, 6, 2, −5, 5, −1, 6, 4, 3, 0, 0}; {, −2, 1, 4, 0, 5, 3, −3, 4, 4, 2, 0, 0}; {, −2, 1, 4, 0, 5, 3, −2, 4, 5, 3, 0, 0}; {, −2, 1, 4, 0, 6, 3, −2, 4, 4, 3, 0, 0}; {, −4, −1, 2, −2, 4, 2, −3, 3, 4, 2, 0, 0}; {6, −4, −2, 5, −2, −5, 1, −5, −5, 4, 0, 0}; {, −5, −2, 1, −3, 3, 1, −4, 3, 4, 2, 0, 0}; {4, 6, −4, 3, −4, 5, 0, 6, −5, 3, 0, 0}; {2, 4, 6, 1, −5, 4, −1, 5, 6, 2, 0, 0}; {2, 4, 6, 1, −5, 4, −1, 5, 6, 3, 0, 0}; {1, 3, 5, 0, 6, 3, −2, 5, 6, 2, 0, 0}; {5, 4, 3, −4, 2, 5, −1, 6, 4, −3, 0, 0}; {0, −2, −4, 0, 6, −2, 2, −5, 6, −2, 0, 0}; {, −1, −3, −5, −1, 6, −4, 1, −5, 6, −4, 0, 0}; {, −2, −4, 6, −2, 5, −5, 1, −5, 6, −3, 0, 0}; {0, −1, −2, 3, −1, 3, −3, 3, 4, −5, 0, 0}; {, −4, 5, 2, 5, −1, 1, 5, −2, −4, −1, 0, 0}; {, −5, 4, 1, 4, −2, 0, 5, −2, −4, −2, 0, 0}; {, −4, 6, 4, −4, 3, 6, 0, 6, 6, −4, 0, 0}; {, −4, 6, 4, −4, 3, 6, 0, 6, 6, −3, 0, 0}; {, −3, −5, 5, −3, 4, −5, 1, 6, 6, −4, 0, 0}; {6, 3, 0, 3, −3, 0, 4, −3, −4, −1, 0, 0}; {5, −1, 5, 5, −3, 3, 6, 6, 6, 0, 0, 0}; {5, −1, 5, 5, −3, 3, −5, 6, 6, 1, 0, 0}; {, −5, 5, 3, −5, 3, 5, −1, 5, 6, −4, 0, 0}; {, −5, 5, 3, −5, 3, 5, −1, 6, 5, −4, 0, 0}; {5, 2, −1, 2, −3, −2, 4, −3, −4, −3, 0, 0}; {6, 4, 2, 6, 2, 4, −1, 5, 6, −4, 0, 0}; {4, 1, −2, 1, −4, −3, 3, −4, −4, −3, 0, 0}; {4, 1, −2, 1, −4, −3, 3, −4, −3, −3, 0, 0}; {4, 1, −2, 1, −4, −3, 3, −3, −4, −2, 0, 0}; {2, −2, 6, −4, 2, 2, −4, 0, −2, −2, 0, 0}; {4, 2, 0, 4, 0, 3, −2, 4, 6, −4, 0, 0}; {1, −3, 5, −5, 1, 2, −5, 0, −2, −1, 0, 0}; {0, −4, 4, 6, 0, 1, 6, −1, −2, 0, 0, 0}; {1, −3, 5, −5, 1, 2, −4, 0, −2, −2, 0, 0}; {5, 0, −5, −4, 2, −2, 0, 2, 4, −1, 0, 0}; {2, −4, 2, 2, −5, 2, 5, 5, 6, 1, 0, 0}; {, −3, −1, 1, −3, −2, 2, −3, 4, −4, 4, 0, 0}; {0, −4, 4, 6, 1, 1, −5, 0, −2, −1, 0, 0}; {, −3, 3, −3, −3, 2, 0, 5, −5, 3, 1, 0, 0}; {4, 2, 0, 4, 2, −1, 3, −4, 5, −4, 0, 0}; {2, −1, −4, −1, −4, 4, −5, 0, −4, −3, 0, 0}; {1, −5, 1, 1, −5, 1, 4, 4, 6, 0, 0, 0}; {, −1, 5, −1, −1, 5, −1, −4, −4, 6, 0, 0, 0}; {, −2, 1, 4, 1, 4, −4, 5, 0, 4, 3, 0, 0}; {3, −3, 3, 3, −2, 0, −5, 5, −3, −1, 0, 0}; {0, 4, −4, 6, −1, −1, 5, 0, 2, 1, 0, 0}; {3, 1, −1, 3, 2, −2, 3, −4, 4, −4, 0, 0}; {, −2, 4, −2, −2, 5, −2, −5, −5, 6, −1, 0, 0}; {, −5, 0, 5, 4, −2, 2, 0, −2, −4, 1, 0, 0}; {, −1, 3, −5, 5, −1, −2, 4, 0, 2, 2, 0, 0}; {0, 4, −4, 6, 0, −1, 6, 1, 2, 0, 0, 0}; {, −1, 3, −5, 5, −1, −2, 5, 0, 2, 1, 0, 0}; {, −4, −2, 0, −4, 0, −3, 2, −4, 6, 4, 0, 0}; {, −2, 2, 6, 4, −2, −2, 4, 0, 2, 2, 0, 0}; {, −4, −1, 2, −1, 4, 3, −3, 3, 4, 2, 0, 0}; {, −4, −1, 2, −1, 4, 3, −3, 4, 4, 3, 0, 0}; {6, −4, −2, 6, −2, −4, 1, −5, 6, 4, 0, 0}; {, −5, −2, 1, −2, 3, 2, −4, 3, 4, 3, 0, 0}; {5, −5, −3, 5, −3, −5, 1, −5, 6, 4, 0, 0}; {5, −5, −3, 5, −3, −5, 1, 6, −5, 4, 0, 0}; {, −5, 1, −5, −5, 3, −3, 5, 6, 6, −1, 0, 0}; {, −5, 1, −5, −5, 3, −3, 6, 6, 6, 0, 0, 0}; {6, −3, 0, −3, 3, 0, −4, 3, 4, 1, 0, 0}; {4, 6, −4, 4, −3, 6, 0, 6, 6, 4, 0, 0}; {5, −4, −1, −4, 2, 0, −5, 2, 4, 2, 0, 0}; {3, 5, −5, 3, −4, 5, −1, 6, 6, 4, 0, 0}; {4, −5, −2, −5, 1, −1, −5, 2, 4, 1, 0, 0}; {0, 1, 2, −3, 1, −3, 3, −3, −4, 5, 0, 0}; {2, 4, 6, 2, −5, 5, −1, 5, 6, 3, 0, 0}; {1, 3, 5, 1, 6, 4, −1, 5, 6, 4, 0, 0}; {0, 2, 4, 0, 6, 2, −2, 5, 6, 2, 0, 0}; {, −5, −4, −3, 4, −2, −5, 1, 6, −4, 3, 0, 0}; {, −1, −3, −5, 0, 6, −3, 2, −5, 6, −2, 0, 0}; {, −2, −4, 6, −1, 5, −4, 1, −5, 6, −3, 0, 0}; {, −2, −4,

6, −1, 5, −4, 1, −5, 6, −2, 0, 0}; {, −4, 6, 4, −3, 4, −5, 0, 6, 5, −3, 0, 0}; {5, 2, −1, 3, −3, −1, 4, −3, −4, −2, 0, 0}; {6, 4, 2, −5, 2, 5, −1, 5, 5, −4, 0, 0}; {4, 1, −2, 2, −4, −2, 3, −3, −4, −2, 0, 0}; {2, −1, −4, 0, 6, −3, 2, −4, −4, −3, 0, 0}; {2, −1, −4, 0, −5, −3, 2, −4, −5, −3, 0, 0}; {2, −1, −4, 0, −5, −3, 3, −4, −4, −2, 0, 0}; {0, −3, 6, −2, 5, −5, 1, 6, −4, −3, 0, 0}; {0, −4, 4, −5, 1, 2, −5, 0, −2, −1, 0, 0}; {, −1, −5, 3, 6, 0, 1, 6, −1, −2, −1, 0, 0}; {0, −3, 6, −2, 5, −5, 1, −5, −5, −3, 0, 0}; {0, −3, 6, −2, 5, −5, 1, −5, −5, −2, 0, 0}; {0, −3, 6, −2, 5, −5, 1, −5, −4, −3, 0, 0}; {, −2, 6, 2, 5, −1, 0, 5, −2, −2, −2, 0, 0}; {, −3, 4, −1, 1, 6, −5, −2, 3, 0, 0, 0, 0}; {, −2, −5, 4, −4, 4, 6, 0, 6, −5, −2, 0, 0}; {6, −1, 4, 4, −3, 2, −1, −2, −4, 1, 0, 0}; {, −5, 1, −5, −4, 2, −4, 6, 6, 5, −1, 0, 0}; {6, −1, 4, 4, −2, 2, −1, −2, −4, 1, 0, 0}; {4, −3, 2, 2, −4, 2, −2, −3, −4, 1, 0, 0}; {4, −3, 2, 2, −4, 2, −2, −2, −4, 1, 0, 0}; {4, −2, 4, 5, 0, −5, 4, 5, 5, −2, 0, 0}; {4, −2, 4, 5, 0, −5, 4, 5, 5, −1, 0, 0}; {3, −4, 1, 1, −5, 1, −2, −3, −5, 0, 0, 0}; {3, −4, 1, 1, −5, 2, −2, −3, −4, 0, 0, 0}; {2, −5, 0, 0, 6, 1, −3, −3, −5, −1, 0, 0}; {, −1, 4, −3, −3, 4, 4, −1, −4, 0, 0, 0, 0}; {, −4, 0, 4, 3, −3, −4, 4, −1, 2, 0, 0, 0}; {, −5, −1, 3, 2, −4, −4, 3, −1, 1, 1, 0, 0}; {2, −5, 0, 0, −5, 1, −3, −4, −5, 0, 0, 0}; {5, 0, −5, −2, −1, 4, 0, 2, 4, 3, 0, 0}; {6, 1, −4, −1, 0, 4, 0, 3, 4, 3, 0, 0}; {4, 1, −2, 3, −4, −1, 4, −4, −5, −1, 0, 0}; {, −1, 6, 1, 4, −4, −2, 5, 2, −1, 0, 0, 0}; {1, −4, 3, 6, −2, 0, 6, 3, 0, 0, 0, 0}; {2, −3, 4, −5, −1, −1, −5, 2, 1, 2, 0, 0}; {3, −1, −5, −1, 4, 6, 2, −1, −2, −1, 0, 0}; {, −4, 4, 0, 4, −2, 0, 4, −2, −3, −2, 0, 0}; {6, 2, −2, 2, −2, 0, 2, 0, 4, 6, 0, 0}; {1, −3, 5, −3, 6, 0, 2, −4, −1, 1, 0, 0}; {2, −5, 0, 1, −5, 1, −2, −4, −5, 0, 0, 0}; {6, −1, 4, 5, 0, 1, −3, 6, −2, −2, 0, 0}; {, −4, 0, 4, 4, −2, 3, −1, −2, −4, 1, 0, 0}; {2, −5, 0, 2, −2, −2, −4, 5, −2, −3, 0, 0}; {, −5, −2, 1, 1, −4, 5, 1, 5, 0, 2, 0, 0}; {5, 0, −5, −1, −1, 4, 0, 2, 5, 3, 0, 0}; {3, −2, 5, −3, −3, 3, −1, 1, 4, 2, 0, 0}; {4, 1, −2, 4, 6, 2, 4, 5, 4, −3, 0, 0}; {1, −4, 3, −5, −4, 2, −1, 0, 3, 2, 0, 0}; {, −1, −5, 3, −4, 2, 4, −1, −1, −3, −2, 0, 0}; {, −2, 6, 2, −5, 1, 3, −1, −1, −4, −2, 0, 0}; {2, −2, 6, −1, 5, 5, 0, 0, −3, −1, 0, 0}; {, −4, 2, −4, −1, 5, 2, 0, 2, −2, −3, 0, 0}; {0, −5, 2, 6, 1, 3, 5, 3, 5, 6, 0, 0}; {, −4, 3, −2, 2, −2, −4, 3, 3, −3, −1, 0, 0}; {3, −4, 1, 3, −3, 5, 3, 4, −1, −2, 0, 0}; {, −3, 3, −3, 0, −5, −3, −4, 5, −5, −4, 0, 0}; {4, −1, 6, −2, −5, 6, 1, 2, −4, −2, 0, 0}; {, −3, 3, −3, 0, −4, −4, 6, 4, −4, −4, 0, 0}; {, −3, 4, −1, 3, 0, 1, 1, 0, 6, −5, 0, 0}; {6, 1, −4, 0, −3, 4, 4, −2, 0, 2, 0, 0}; {, −1, 5, −1, 3, −1, −5, 6, −1, 1, 2, 0, 0}; {3, −2, 5, −2, −5, 6, 1, 2, −4, −2, 0, 0}; {2, −3, 4, −3, 6, 5, 0, 1, −5, −2, 0, 0}; {1, −5, 1, 5, 1, −1, 5, 5, −1, −1, 0, 0}; {0, −5, 2, −5, 4, 4, 0, 1, −5, −3, 0, 0}; {5, −1, 5, −3, 5, 5, 5, 3, −5, −5, 0, 0}; {, −1, 6, 1, 6, 3, 4, 0, 1, −5, −4, 0, 0}; {4, −2, 4, −4, 4, 5, 4, 2, −4, −4, 0, 0}; {3, −3, 3, −5, 3, 4, 4, 2, −5, −5, 0, 0}; {1, −4, 3, −4, 6, 2, 2, −4, −2, 1, 0, 0}; {, −2, 3, −4, −1, −5, 2, −3, −5, −5, −5, 0, 0}; {, −3, 2, −5, −2, 6, 2, −3, −5, −4, −4, 0, 0}; {3, −3, 3, −5, 4, 4, 4, 2, −5, −5, 0, 0}; {1, 6, −1, 2, −2, −2, −4, 5, −3, −4, 0, 0}; {2, −4, 2, 6, 3, 4, 3, 2, −5, −5, 0, 0}; {, −2, 4, −2, 2, 0, −3, 3, 3, 5, 6, 0, 0}; {, −1, 6, 1, 6, 6, 0, −2, 0, 3, 1, 0, 0}; {, −2, 4, −2, 2, 1, 6, 3, 3, 5, 4, 0, 0}; {0, −5, 2, −5, −5, 1, −1, 0, 3, 2, 0, 0}; {, −3, 3, −3, 1, 0, 6, 3, 3, 5, 4, 0, 0}; {, −1, 4, −3, 0, −2, −5, −5, 5, −2, −3, 0, 0}; {, −5, 1, −5, −1, −1, 4, 1, 3, 4, 3, 0, 0}; {, −2, 6, 2, −4, −2, 6, −5, 6, 6, −4, 0, 0}; {, −2, 6, 2, −4, −2, 6, −4, 6, 6, −4, 0, 0}; {4, −1, 6, −1, 0, −1, −2, −1, 6, −5, 0, 0}; {, −3, 5, 1, −5, −2, 5, −5, 5, 6, −4, 0, 0}; {0, 6, 0, 4, 6, 2, 1, 1, −3, −4, 0, 0}; {3, −1, −5, 1, 5, 4, 5, −3, 0, 3, 0, 0}; {1, −4, 3, −4, −1, −3, −3, 0, 3, 4, 0, 0}; {2, −2, 6, 0, 4, 3, 4, −3, 0, 3, 0, 0}; {6, 1, −4, 1, 5, −5, 2, 0, −2, −2, 0, 0}; {1, −3, 5, −1, 4, 3, 3, −4, −1, 2, 0, 0}; {0, −4, 4, −2, 3, 2, 3, −4, −1, 2, 0, 0}; {, −2, 6, 2, −4, 2, 3, −2, −1, −4, −1, 0, 0}; {, −5, 2, −3, 2, −5, −5, 3, 3, −2, −1, 0, 0}; {4, −2, 4, −4, 0, −1, −2, 4, 2, −2, 0, 0}; {6, 1, −4, 1, 6, −5, 3, 3, −2, −2, 0, 0}; {1, −4, 3, −4, 1, 4, 6, 0, −1, −2, 0, 0}; {, −2, 5, 0, 5, −2, −5, −5, 0, 4, 5, 0, 0}; {, −3, 4,

−1, 4, −3, −5, 6, −1, 1, 3, 0, 0}; {, −4, 2, −4, 0, 4, 1, 0, 1, −3, −4, 0, 0}; {, −5, 2, −3, 2, −4, 6, 5, −2, 0, 2, 0, 0}; {6, 1, −4, 1, −5, −5, 2, 2, −2, −1, 0, 0}; {5, 0, −5, 0, 6, 6, 1, 1, −2, −1, 0, 0}; {4, −1, 6, −1, 5, 5, 2, 2, −3, −2, 0, 0}; {, −2, 4, −2, 2, −5, −5, −2, −2, 3, 2, 0, 0}; {5, 0, −5, 0, 6, −5, 2, 1, −2, −2, 0, 0}; {4, −1, 6, −1, 5, 6, 1, 1, −2, −2, 0, 0}; {, −2, 5, 0, 5, −1, 1, 5, 6, 0, 0, 0, 0}; {0, −5, 2, −5, 1, 4, 5, 3, 5, 6, 0, 0}; {, −4, 3, −2, 3, −3, 6, 5, −1, 1, 3, 0, 0}; {4, −1, 6, −1, 6, 4, 3, −3, −1, 1, 0, 0}; {, −2, 4, −2, 2, −4, −5, −2, −2, 3, 2, 0, 0}; {3, −3, 3, −5, 2, −2, −4, 4, 6, −5, 0, 0}; {, −4, 3, −2, 3, −1, 1, 2, 0, 5, 6, 0, 0}; {, −4, 4, 0, 6, 3, 6, −3, 4, 6, 0, 0, 0}; {, −4, 3, −2, 3, −1, 2, 3, 0, 4, 5, 0, 0}; {0, 6, 0, 5, 0, −1, 6, 6, −1, −1, 0, 0}; {, −1, 5, −1, 4, −1, −2, 5, 4, −1, −1, 0, 0}; {, −5, 1, −5, 0, −5, −5, 5, 4, −5, −5, 0, 0}; {3, −3, 3, −4, 3, 4, 4, 1, −3, −4, 0, 0}; {5, −1, 5, −2, 5, 6, 6, 4, 6, −5, 0, 0}; {, −1, 5, −1, 4, 0, −4, −5, −1, 1, 3, 0, 0}; {, −4, 1, 6, −2, 5, 1, −3, 6, −5, −5, 0, 0}; {, −4, 1, 6, −2, 5, 1, −2, −5, −4, −3, 0, 0}; {, −3, 3, −3, 2, −2, −4, 4, 4, −2, −1, 0, 0}; {, −4, 3, −2, 4, 1, 0, 1, 6, −3, 1, 0, 0}; {, −2, 5, 0, 6, 3, 3, −1, 0, −5, −3, 0, 0}; {, −5, 1, −5, 0, −4, −4, 5, 4, −3, −3, 0, 0}; {5, −1, 5, −2, 6, 6, 4, 3, −3, −3, 0, 0}; {2, −4, 2, −5, 3, 4, 4, 2, −5, −5, 0, 0}; {, −4, 2, −4, 1, −2, 6, 5, −1, 0, 2, 0, 0}; {, −3, 3, −3, 2, −1, −4, 3, 3, −3, −1, 0, 0}; {, −4, 3, −2, 4, 2, 0, 0, 5, −4, 0, 0, 0}; {2, −4, 2, −5, 4, 4, 3, 2, 6, −5, 0, 0}; {2, −4, 2, −5, 4, 4, 3, 2, −5, −4, 0, 0}; {0, 6, 0, 5, 2, 3, 2, 2, 6, −5, 0, 0}; {0, 6, 0, 5, 2, 3, 3, 1, 6, 6, 0, 0}; {, −2, 3, −4, 0, −4, −4, −5, 4, −3, −4, 0, 0}; {, −1, 5, −1, 4, 1, 2, 2, 1, 6, 6, 0, 0}; {1, −5, 1, 6, 3, 5, 4, 2, 6, 6, 0, 0}; {0, 6, 0, 5, 2, 4, 3, 1, 6, 6, 0, 0}; {, −5, 1, −5, 0, −2, −5, 0, 1, 4, 4, 0, 0}; {3, −3, 3, −4, 6, 5, 4, 2, −5, −4, 0, 0}; {4, −1, 6, 0, −1, −1, −1, −1, 4, 6, 0, 0}; {1, −5, 1, 6, 4, 4, 3, 2, 6, −5, 0, 0}; {, −1, 5, −1, 4, 2, 3, 2, 1, 6, 6, 0, 0}; {1, −4, 3, −3, −4, −2, −1, −3, 3, 4, 0, 0}; {, −3, 3, −3, 2, 1, 6, 2, 3, 5, 4, 0, 0}; {6, 0, 6, −1, −2, 4, 1, 2, 4, 3, 0, 0}; {0, 6, 0, 5, 4, 4, 3, 1, 6, 6, 0, 0}; {, −2, 6, 2, −3, −1, 6, −2, 6, −5, −2, 0, 0}; {3, −1, −5, 2, 4, −1, 2, −5, −2, −2, 0, 0}; {, −1, 5, −1, 4, 4, −3, −2, 3, 1, 1, 0, 0}; {0, −4, 4, −1, 1, −4, −1, 6, −4, −3, 0, 0}; {5, 0, −5, 1, 3, −2, −1, −4, −4, −2, 0, 0}; {, −5, 3, −1, 6, −3, 5, 6, 3, 6, −3, 0, 0}; {, −2, 4, −2, 3, 4, 1, 1, 1, −4, −4, 0, 0}; {5, 1, −3, 4, −4, 0, −5, −5, 6, −4, 0, 0}; {0, −5, 2, −4, −1, 3, −2, −3, −5, −4, 0, 0}; {, −1, 6, 1, −5, −2, 3, 5, −2, −1, −1, 0, 0}; {, −4, 3, −2, 4, −5, 1, 2, −3, −2, −1, 0, 0}; {, −2, 5, 0, 6, −3, −4, −4, −1, 3, 4, 0, 0}; {5, −1, 5, −2, 1, −1, −1, 0, −5, 6, 0, 0}; {6, 0, 6, −1, 2, 0, 0, 1, 5, 5, 0, 0}; {, −3, 4, −1, 5, −3, −5, −5, −1, 2, 4, 0, 0}; {, −3, 4, −1, 5, −3, −5, −5, −1, 4, 5, 0, 0}; {, −5, 2, −3, 3, −4, 6, 6, −1, 2, 4, 0, 0}; {4, −2, 4, −3, 1, −1, −2, −1, −4, −5, 0, 0}; {, −3, 4, −1, 5, −2, 0, 5, 6, 0, 0, 0, 0}; {, −3, 3, −3, 2, 6, −4, −3, 3, 1, −1, 0, 0}; {, −4, 3, −2, 4, −3, 0, 4, 5, 0, 0, 0, 0}; {, −3, 3, −3, 2, −5, −5, −2, −2, 3, 2, 0, 0}; {, −4, 2, −4, 1, 6, 6, −3, −3, 3, 2, 0, 0}; {, −5, 1, −5, 0, 5, 5, −4, −4, 3, 2, 0, 0}; {2, −3, 4, −2, 4, 5, 0, 0, −3, −2, 0, 0}; {1, −5, 1, 6, −1, −1, 6, 4, 0, −1, 0, 0}; {2, −3, 4, −2, 4, 5, 1, 1, −3, −2, 0, 0}; {, −5, 1, −5, 0, 5, −5, −5, 3, 0, −2, 0, 0}; {0, 6, 0, 5, −1, −1, 5, 4, 0, −1, 0, 0}; {, −1, 5, 0, 5, −1, −3, −3, −1, −5, −5, 0, 0}; {, −2, 4, −1, 4, −2, −3, 4, 3, −1, −1, 0, 0}; {, −3, 3, −2, 3, −3, −3, 4, 3, −1, −1, 0, 0}; {2, −4, 3, −4, 2, 3, −5, −4, 1, 1, 0, 0}; {1, 6, 0, 4, −3, −2, −2, 4, 1, −2, 0, 0}; {, −4, 2, −3, 2, −3, −4, 3, 3, −2, −1, 0, 0}; {6, 0, −5, 0, −5, −5, 2, 2, −2, −2, 0, 0}; {6, 0, −5, 0, −5, −5, 3, 2, −2, −2, 0, 0}; {6, 0, −5, 0, −4, −5, 3, 3, −3, −2, 0, 0}; {6, −1, 5, −3, 5, −5, 6, 3, −5, −5, 0, 0}; {, −1, 5, 0, 5, 2, 3, 2, 1, 6, 6, 0, 0}; {, −5, 0, 6, −2, 6, −5, 5, 3, −4, −4, 0, 0}; {6, −1, 5, −3, 5, 6, 5, 2, −3, −4, 0, 0}; {5, −2, 4, −4, 5, 6, 4, 2, −4, −4, 0, 0}; {, −1, 5, 0, 5, 3, 3, 1, 1, −5, −4, 0, 0}; {, −3, 2, −4, 0, −3, −4, 6, 4, −4, −4, 0, 0}; {, −2, 4, −1, 4, 2, 3, 1, 1, 6, 6, 0, 0}; {2, −5, 1, 5, 3, −3, 5, 5, 6, 5, 0, 0}; {1, 6, 0, 4, 2, −3, 4, 4, 5, 5, 0, 0}; {, −1, 4, −2, 2, 0, −4, 2, 3, 5, 4, 0, 0}; {3, −3, 4, −3, −3, 3, 0, 1, 3, 3, 0, 0}; {5, −2, 4, −4, −4, 0, 0, 5, 3, 2, 0, 0}; {5, 1, −2, 5, −4, 3, −5, 4, 6, −3, 0, 0}; {3, −5, 0, 3, 2, 6, 2, −4, 6, 2, 0, 0}; {4, −3, 3, −5, −4, 5, 4, 3, −2, −4, 0, 0}; {2, −5, 1, 5, 6, 3, 3, 3, −4, −5, 0, 0}; {, −5, 1, −4, 1, 3, −5, −4, 2, 1, 0, 0, 0}; {6, 0, −5, 0, 2, −5, −5, 1, 1, 0, 0, 0}; {2, −5, 1, 5, −5, 4, 2, 6, 5, −1, 0, 0}; {2, −4, 3, −4, −1, −3, −2, −1, 5, 5, 0, 0}; {4, 0, −3, 4, −3, −1, 6, −4, 6, −2, 0, 0}; {0, 5, −1, 3, 5, 5, −1, 6, 3, 1, 0, 0}; {, −1, 6, 2, −4, 0, 3, −2, −3, −4, −3, 0, 0}; {3, −2, 6, 0, 5, 4, 4, −3, 0, 3, 0, 0}; {1, −5, 2, −5, −1, −3, −3, −1, 6, 6, 0, 0}; {0, 6, 6, −2, −2, 5, 2, 0, −1, 0, 0}; {, −3, 3, −2, 3, −5, −4, 3, 1, −1, −2, 0, 0}; {6, 0, −5, 0, 4, −5, −4, 2, 0, −1, 0, 0}; {4, −2, 5, −2, 2, 5, −4, −4, 3, 1, 0, 0}; {0, 6, 1, 6, −1, −3, −3, −1, −5, −5, 0, 0}; {, −2, 4, −1, 4, −3, −3, 4, 2, −1, −1, 0, 0}; {, −3, 3, −2, 3, −4, −4, 4, 3, −1, −2, 0, 0}; {, −5, 1, −4, 1, 6, −5, 2, 1, −2, −2, 0, 0}; {3, −4, 2, 6, −2, −1, −1, 5, 2, −1, 0, 0}; {4, −2, 5, −2, 3, 5, −5, 1, −1, −2, 0, 0}; {4, −2, 5, −2, 3, 6, −5, 2, 0, −2, 0, 0}; {, −3, 3, −2, 4, −3, −4, −4, −2, 6, 6, 0, 0}; {5, −1, 6, 0, 5, 6, −5, −4, 6, 5, 0, 0}; {6, 1, −3, 4, −2, 0, 2, 4, 4, 3, 0, 0}; {0, 5, −1, 4, −4, −4, 2, 2, −1, −2, 0, 0}; {0, 5, −1, 4, −4, −2, −2, 5, 2, −1, 0, 0}; {, −5, 1, −4, 2, −4, 6, 5, −2, 0, 2, 0, 0}; {, −2, 3, −3, 2, −5, 6, −1, −1, 2, 2, 0, 0}; {6, 0, −5, 1, −5, −5, 2, 2, −2, −1, 0, 0}; {, −5, 1, −4, 2, −4, −4, 4, 4, −2, −1, 0, 0}; {4, −3, 3, −4, 1, 0, −4, 6, 1, −1, 0, 0}; {, −2, 3, −3, 2, −5, −5, −1, −1, 3, 2, 0, 0}; {, −2, 3, −3, 2, −5, −3, −2, 4, 2, −1, 0, 0}; {4, −3, 3, −4, 2, 0, −5, 5, 1, 0, 0, 0}; {4, −2, 5, −1, 6, 6, 2, 2, −3, −2, 0, 0}; {3, −3, 4, −2, 5, 5, 1, 1, −3, −2, 0, 0}; {4, −2, 5, −1, 6, −5, 2, 2, −2, −2, 0, 0}; {6, 0, −5, 1, −4, −3, 4, 5, −2, −1, 0, 0}; {, −3, 3, −2, 4, −1, 2, 3, 1, 4, 5, 0, 0}; {3, −4, 2, −5, 2, −1, −2, 0, −4, −4, 0, 0}; {2, −5, 1, 6, 1, −2, −3, −1, −4, −5, 0, 0}; {2, −4, 3, −3, 5, 5, 1, 1, −3, −2, 0, 0}; {, −5, 1, −4, 2, −2, −1, 4, 5, −1, 0, 0, 0}; {5, −2, 4, −3, 4, 5, 5, 1, −2, −4, 0, 0}; {6, −1, 5, −2, 6, −5, 6, 4, −5, −5, 0, 0}; {4, −3, 3, −4, 4, 5, 4, 2, −5, −5, 0, 0}; {0, 6, 1, −5, 4, 2, 2, −5, −2, 1, 0, 0}; {0, 5, −1, 4, 0, −2, 6, 5, −1, −1, 0, 0}; {0, 5, −1, 4, 0, −1, 6, 5, −1, −1, 0, 0}; {6, 0, −5, 1, −1, 0, −1, 0, 6, −5, 0, 0}; {3, −4, 2, −5, 4, 4, 4, 2, −5, −5, 0, 0}; {3, −4, 2, −5, 4, 5, 4, 2, −5, −5, 0, 0}; {1, 6, 0, 5, 2, 3, 3, 1, −5, −5, 0, 0}; {1, 6, 0, 5, 2, 4, 3, 1, −5, −5, 0, 0}; {1, 6, 0, 5, 2, −3, 6, 4, 0, 0, 0, 0}; {, −2, 3, −3, 2, −1, −4, 2, 3, 5, 4, 0, 0}; {, −4, 1, −5, 0, −3, −4, 6, 4, −4, −4, 0, 0}; {, −5, 1, −4, 2, 1, 1, 0, 0, 5, −5, 0, 0}; {4, −2, 5, −1, −2, 0, −1, −1, 5, 5, 0, 0}; {3, −3, 4, −2, −3, −1, −1, −2, 4, 5, 0, 0}; {, −1, 4, −2, 3, 1, 2, 3, 0, −5, 6, 0, 0}; {, −5, 0, 6, −1, −3, 1, 2, −5, 4, 2, 0, 0}; {6, −1, 5, −2, −4, 1, 1, 5, 4, 2, 0, 0}; {6, 0, −5, 1, 0, 6, −5, 0, 1, 0, 0, 0}; {6, −1, 5, −2, −4, 1, 2, 6, 4, 2, 0, 0}; {, −2, 3, −3, 2, 0, −5, 2, 3, 5, 4, 0, 0}; {, −2, 3, −3, 2, 0, −4, 2, 3, 5, 5, 0, 0}; {4, −3, 3, −4, −5, 5, 5, 3, −5, −5, 0, 0}; {, −5, 2, −2, 5, 6, 0, 2, −4, −1, −1, 0, 0}; {, −5, 2, −2, 5, 6, 0, 3, −4, −1, −1, 0, 0}; {5, −2, 4, −3, −4, 0, 1, 5, 3, 1, 0, 0}; {5, −2, 4, −3, −4, 1, 0, 4, 4, 2, 0, 0}; {3, −5, 0, 4, 2, 6, 4, −4, 6, 3, 0, 0}; {, −5, 1, −4, 2, 2, −4, −4, 0, 2, 0, 0, 0}; {6, 3, 1, −2, 2, −5, −2, −3, 1, −3, 0, 0}; {5, −2, 4, −3, −3, 0, 1, −5, 4, 1, 0, 0}; {4, −3, 3, −4, −4, 0, 0, 4, 3, 2, 0, 0}; {5, −1, 6, 0, 1, 6, −5, 0, 1, 0, 0, 0}; {4, −2, 5, −1, 0, 5, −5, 0, 0, 1, 0, 0}; {5, 0, −4, 3, 5, −1, 2, −4, −2, −1, 0, 0}; {0, 4, −3, 1, 0, 4, 1, −5, 5, 2, 0, 0}; {, −1, 3, −4, 0, −1, 4, 0, 6, 5, 2, 0, 0}; {, −2, 2, −5, −1, −2, 3, −1, 6, 4, 1, 0, 0}; {1, 6, 0, 5, 6, 3, 1, 6, 5, −1, 0, 0}; {4, −2, 5, −1, 1, 6, −5, 0, 0, −1, 0, 0}; {4, −2, 5, −1, 1, 6, −5, 0, 0, 0, 0, 0}; {3, −3, 4, −2, 0, 5, 6, 0, 0, −1, 0, 0}; {2, −5, 1, 6, −5, −1, −1, 4, 3, 2, 0, 0}; {, −4, 0, 5, −3, −2, −4, 4, −3, 6, 1, 0, 0}; {, −2, 4, −1, 5, −4, −4, −4, −2, 6, 5, 0, 0}; {4, −2, 5, −1, 2, 6, −5, 1, 0, −1, 0, 0}; {, −3, 1, 6, −2, 0, −4, 5, −3, −5, 0, 0, 0}; {, −1, 5, 0, 6, −2, −4, −4, −2, −5, 6, 0, 0}; {0, 6, 1, −5, −1, −3, −3, 0, 3, 4, 0, 0}; {, −3, 2, −4, 1, 4, 2, 0, 5, 4, −1, 0, 0}; {, −4, 1, −5, 0, 3, 1, −1, 5, 3, −1, 0, 0}; {, −2, 4, −1, 5, −3, −4, −4, −2, 6, 5, 0, 0}; {, −2, 4, −1, 5, −3, −4, −4, −2, 6, 6, 0, 0}; {, −2, 4, −1, 5, −3, −4, −4, −1, 2, 4, 0, 0}; {, −5,

1, −4, 2, 6, 6, −5, −4, 5, 5, 0, 0}; {6, 0, −5, 1, 5, 5, −5, −4, 4, 4, 0, 0}; {, −2, 5, 1, −4, 1, 2, 3, 5, 4, 4, 0, 0}; {, −4, 2, −3, 3, −5, −5, −5, −3, 6, 5, 0, 0}; {, −5, 1, −4, 2, 6, −5, 2, 0, −2, −2, 0, 0}; {4, −2, 5, −1, 3, 5, 0, −1, −3, −3, 0, 0}; {2, −4, 3, −3, 1, 5, 6, 2, 0, −2, 0, 0}; {4, −3, 3, −3, 0, −2, −1, 0, −5, −5, 0, 0}; {4, −4, 1, 6, −4, 5, 2, −5, 5, 0, 0, 0}; {4, −4, 1, 6, −4, 5, 3, −5, 6, 0, 0, 0}; {, −5, 1, −4, 3, −5, −5, −5, −3, 5, 5, 0, 0}; {6, 0, −5, 2, 6, 6, −5, −4, 5, 5, 0, 0}; {0, 5, −1, 5, −4, −4, −2, −2, 5, 4, 0, 0}; {1, −4, 4, 0, 5, −3, 1, 4, 3, 3, 0, 0}; {5, −2, 4, −2, 2, 0, −1, 0, −4, −5, 0, 0}; {4, −3, 3, −3, 1, −1, −2, 0, −4, −5, 0, 0}; {6, 0, −5, 2, −5, 6, −5, −3, 5, 5, 0, 0}; {0, 6, 1, −4, 1, 2, 5, 6, 4, 4, 0, 0}; {, −2, 3, −3, 3, −5, −5, −2, −2, 4, 3, 0, 0}; {, −3, 2, −4, 2, 6, 6, −3, −3, 4, 3, 0, 0}; {, −5, −1, 4, −3, 0, 1, 1, −5, 4, 0, 0, 0}; {, −4, 2, −3, 4, −3, 1, 2, 0, 3, 4, 0, 0}; {3, −4, 2, −4, 1, −1, −3, −2, −4, −5, 0, 0}; {3, −4, 2, −4, 1, −1, −2, −1, −4, −5, 0, 0}; {, −5, 0, 6, 0, 5, 4, −2, −2, 2, 2, 0, 0}; {, −4, 1, −5, 1, 6, 6, −2, −2, 3, 2, 0, 0}; {5, −2, 4, −2, 4, 4, −4, −5, 3, 1, 0, 0}; {1, 6, 0, 6, 0, 0, 6, 5, 1, 0, 0, 0}; {1, −5, 2, −3, 5, 3, 3, −4, −1, 1, 0, 0}; {, −2, 3, −3, 3, −2, −3, 5, 4, −1, −1, 0, 0}; {5, −2, 4, −2, 5, 5, −4, −3, 2, 2, 0, 0}; {4, −3, 3, −3, 4, 4, −4, −4, 2, 1, 0, 0}; {2, −5, 1, −5, 3, 5, 4, 2, −5, −5, 0, 0}; {1, 6, 0, 6, 2, 4, 3, 1, −5, −5, 0, 0}; {1, 6, 0, 6, 2, 4, 4, 1, −5, −5, 0, 0}; {1, 6, 0, 6, 3, 4, 3, 2, −5, −5, 0, 0}; {0, 5, −1, 5, 2, 3, 3, 1, −5, −5, 0, 0}; {, −2, 3, −3, 3, 0, 2, 2, 0, 6, 6, 0, 0}; {, −2, 3, −3, 3, 0, 2, 2, 0, −4, −5, 0, 0}; {, −5, −1, 4, −3, 5, 0, −4, −5, −5, −5, 0, 0}; {, −5, 0, 6, 0, −3, 6, 0, 2, 4, 3, 0, 0}; {, −2, 3, −3, 3, 1, 2, 2, 1, 6, 6, 0, 0}; {, −5, −1, 4, −3, 6, 6, 6, 3, −2, −4, 0, 0}; {, −1, 5, 0, −5, 6, −3, −3, −3, 4, 5, 0, 0}; {, −4, 1, −5, 1, −1, 1, 1, 0, 6, 6, 0, 0}; {, −1, 5, 0, −5, 6, −2, −2, 6, −5, 1, 0, 0}; {5, −2, 4, −2, −4, 1, 1, 4, 4, 2, 0, 0}; {4, −3, 3, −3, −5, 0, 0, 4, 4, 2, 0, 0}; {2, 6, −1, 4, 1, 5, 4, −4, 6, 3, 0, 0}; {3, −3, 4, −1, −2, 4, 6, −1, 0, 0, 0, 0}; {2, 6, −1, 4, 1, 5, 5, −3, 6, 3, 0, 0}; {3, −4, 2, −4, 6, −1, 0, 5, 3, 1, 0, 0}; {, −2, 2, −5, 0, −3, 2, 0, 6, 4, 2, 0, 0}; {0, 6, 1, −4, −5, 2, 3, −2, −1, −1, 0, 0}; {, −4, 1, −5, 1, 0, 5, 2, 3, 5, 4, 0, 0}; {, −5, 0, 6, 0, −1, 4, 1, 2, 5, 3, 0, 0}; {4, −3, 3, −3, −4, 1, 0, 3, 4, 1, 0, 0}; {4, −3, 3, −3, −4, 1, 0, 3, 4, 2, 0, 0}; {2, 6, −1, 4, 2, 6, 4, −5, 6, 3, 0, 0}; {3, −4, 2, −4, −5, 0, −1, 3, 4, 1, 0, 0}; {3, −4, 2, −4, −5, 0, −1, 3, 4, 2, 0, 0}; {1, 5, −2, 3, 1, 5, 3, −5, 6, 3, 0, 0}; {1, 5, −2, 3, 1, 5, 4, 6, 5, 4, 0, 0}; {4, −2, 5, 0, 0, 6, −5, −1, 1, −1, 0, 0}; {4, −2, 5, 0, 0, 6, −5, −1, 1, 0, 0, 0}; {1, 5, −2, 3, 1, 5, 4, −5, 5, 3, 0, 0}; {2, −5, 1, −5, 6, −1, −1, 3, 3, 1, 0, 0}; {2, −5, 1, −5, 6, −1, −1, 3, 3, 2, 0, 0}; {3, −3, 4, −1, −1, 5, −5, −1, 1, 0, 0, 0}; {0, 4, −3, 2, 0, 4, 4, −5, 5, 3, 0, 0}; {1, 6, 0, 6, 5, −2, −1, 3, 2, 2, 0, 0}; {2, −4, 3, −2, −2, 4, 6, −1, 0, 0, 0, 0}; {0, 4, −3, 2, 0, 4, 4, −4, 5, 2, 0, 0}; {1, 6, 0, 6, 5, −2, −1, 4, 2, 1, 0, 0}; {1, −5, 2, −3, −3, 3, 5, −1, −1, −1, 0, 0}; {1, −5, 2, −3, −3, 3, 6, −1, −1, 1, 0, 0}; {, −3, 3, −2, 5, 5, 0, 2, −2, −3, −2, 0, 0}; {, −1, 5, 0, −5, −4, −1, −3, −1, 4, 3, 0, 0}; {2, −5, 1, −5, −5, 0, −1, 2, 3, 2, 0, 0}; {1, 6, 0, 6, 6, −1, −2, 2, 3, 2, 0, 0}; {1, 6, 0, 6, 6, −1, −1, 3, 2, 2, 0, 0}; {2, −4, 3, −2, −1, 5, 6, −1, 0, −1, 0, 0}; {, −1, 3, −4, 1, 0, 4, 3, 6, 5, 3, 0, 0}; {2, −4, 3, −2, −1, 5, 6, −1, 0, 0, 0, 0}; {0, 5, −1, 5, 5, −2, −2, 3, 2, 2, 0, 0}; {, −2, 2, −5, 0, −1, 3, 2, −5, 4, 2, 0, 0}; {1, −4, 4, 0, 2, −3, 0, 6, −3, −2, 0, 0}; {0, 5, −1, 5, 5, −2, −1, 4, 2, 0, 0, 0}; {, −3, 1, 6, −1, −2, 3, 0, 5, 4, 2, 0, 0}; {1, −5, 2, −3, −1, 3, −3, −4, 6, 6, 0, 0}; {, −2, 3, −3, 3, 4, −3, −4, 1, 2, 2, 0, 0}; {0, 6, 1, −4, −2, 4, 5, −1, −1, −1, 0, 0}; {, −5, 1, −4, 3, 6, 6, −5, −3, 5, 5, 0, 0}; {, −5, 1, −4, 3, 6, −5, −5, −3, 5, 4, 0, 0}; {6, 0, −5, 2, 5, 6, −5, −4, 5, 4, 0, 0}; {, −2, 3, −3, 3, 5, −3, −3, 4, 2, −1, 0, 0}; {, −2, 3, −3, 3, 5, −2, −2, 3, 2, 0, 0, 0}; {6, −2, 3, −3, −2, 2, 1, 5, 3, 0, 0, 0}; {, −5, 0, 6, 1, 3, −4, −4, 2, 1, −1, 0, 0}; {3, 6, −2, 3, 3, −1, −5, −1, −4, 1, 0, 0}; {4, −2, 5, 1, 4, 4, 6, −4, 4, 5, 0, 0}; {, −4, 3, −1, −4, 0, 5, 2, 3, −2, 0, 0, 0}; {, −3, 3, −2, 6, −3, 2, 6, −5, 6, 6, 0, 0}; {, −3, 3, −2, 6, −3, 2, 6, −4, −4, −5, 0, 0}; {, −5, 0, 6, 1, 4, −4, −4, 3, 1, −1, 0, 0}; {6, −1, 5, 0, 3, −5, −4, 3, 1, −2, 0, 0}; {6, 0, −5, 3, −5, 6, −5, −3, 5, 5, 0, 0}; {6, 0, −5, 3, −5, −5, −5, −3, 3, 4, 0, 0}; {2, −5, 1, −4, −1, −2, −2, −1, −5, 6, 0, 0}; {4, −2, 5, 1, 5, 5, −5, −4, 5, 4, 0, 0}; {2, −4, 3, −1, 3, 3, 5, −5, 4, 4, 0, 0}; {, −3, 2, −4, 3, 6, 5, −2, −2, 3, 3, 0, 0}; {2, −5, 1, −4, −1, −1, −2, −1, −5, 6, 0, 0}; {6, 0, −5, 3, −4, 0, 1, −1, 3, 4, 0, 0}; {2, −5, 1, −4, 0, −2, −2, −1, −5, 6, 0, 0}; {, −1, 4, −2, 5, −3, −4, −3, −2, 6, 6, 0, 0}; {, −3, 2, −4, 3, −5, 6, −4, −3, 5, 5, 0, 0}; {6, −1, 5, 0, 4, 3, −3, −3, 2, 2, 0, 0}; {6, −1, 5, 0, 4, 4, −3, −3, 3, 2, 0, 0}; {, −1, 4, −2, 5, −2, −4, −4, −2, 6, 6, 0, 0}; {1, −5, 2, −2, 4, 4, 4, −4, 0, 2, 0, 0}; {, −4, 1, −5, 2, −5, 6, −4, −3, 5, 5, 0, 0}; {1, −5, 2, −2, 4, 5, 2, 3, −3, −1, 0, 0}; {6, −1, 5, 0, 5, 5, −3, −3, 3, 2, 0, 0}; {4, −3, 3, −2, 3, 3, −4, −4, 2, 2, 0, 0}; {4, −3, 3, −2, 3, 4, −3, −3, 2, 1, 0, 0}; {3, −4, 2, −3, 2, 3, −4, −4, 2, 1, 0, 0}; {, −3, 1, 6, 0, 5, 2, 0, 1, −3, −4, 0, 0}; {, −3, 2, −4, 3, −3, −5, −5, −3, 6, 6, 0, 0}; {, −4, 1, −5, 2, −4, −5, −4, −2, 2, 3, 0, 0}; {6, −1, 5, 0, 6, 5, −5, −4, 5, 5, 0, 0}; {2, 6, −1, 5, −2, −4, 1, 0, 4, 3, 0, 0}; {1, 5, −2, 4, −3, −4, 1, 0, 4, 2, 0, 0}; {4, −3, 3, −2, 4, 4, −4, −4, 2, 2, 0, 0}; {2, 6, −1, 5, −2, −3, 0, −1, 5, 3, 0, 0}; {3, −4, 2, −3, 3, 3, −5, −5, 2, 2, 0, 0}; {, −1, 3, −4, 2, −4, −5, 0, 0, 3, 2, 0, 0}; {3, −4, 2, −3, 4, 4, −5, −4, 1, 2, 0, 0}; {2, −5, 1, −4, 3, 3, −5, −5, 2, 1, 0, 0}; {1, 5, −2, 4, −2, −3, 0, 0, 4, 3, 0, 0}; {0, 5, −1, 6, 1, 2, 6, −5, 1, 1, 0, 0}; {0, 4, −3, 3, −3, −2, −3, 4, 1, −2, 0, 0}; {, −2, 2, −5, 1, −5, −3, −3, 3, 1, −2, 0, 0}; {, −5, −1, 4, −2, 4, 1, −1, 0, −3, −4, 0, 0}; {, −5, 0, 6, 1, −4, 6, 5, −2, 0, 2, 0, 0}; {, −3, 3, −2, 6, 2, 1, 2, −5, −2, 1, 0, 0}; {1, 5, −2, 4, −2, −4, 1, 1, 3, 3, 0, 0}; {, −3, 3, −2, 6, 2, 2, 0, 1, −5, −2, 0, 0}; {4, −3, 3, −2, 5, 4, −4, −3, 2, 2, 0, 0}; {, −1, 3, −4, 2, −3, −4, −1, −2, 4, 2, 0, 0}; {, −4, 0, 5, −1, 6, −4, −4, 3, 1, −2, 0, 0}; {5, −2, 4, −1, −5, 5, 4, −3, 0, 1, 0, 0}; {, −4, 0, 5, −1, −5, −4, −5, 3, 0, −3, 0, 0}; {, −3, 3, −2, 6, 4, −4, −3, 5, 6, 0, 0, 0}; {6, −2, 3, −3, 5, −5, 5, 2, −2, −3, 0, 0}; {0, 5, −1, 6, 3, −3, −2, 3, 2, 1, 0, 0}; {, −5, 0, 6, 1, −1, 1, 0, 0, −5, −5, 0, 0}; {2, −4, 3, −1, −2, 4, −5, −2, 0, 1, 0, 0}; {, −2, 1, 5, −2, 6, −3, −2, −2, 5, 2, 0, 0}; {, −1, 3, −4, 2, −1, 4, 3, 6, 5, 3, 0, 0}; {, −1, 3, −4, 2, −1, 4, 4, −5, 5, 3, 0, 0}; {1, 5, −2, 4, 2, 6, 4, 6, 6, 3, 0, 0}; {2, −5, 1, −4, −5, 0, −1, 2, 4, 2, 0, 0}; {0, 4, −3, 3, 1, 5, 3, 6, 6, 2, 0, 0}; {3, −3, 4, 0, 0, 6, −5, −2, 1, 0, 0, 0}; {1, 6, 0, −5, 6, −1, −1, 2, 3, 0, 0, 0}; {, −3, 0, 4, −3, 6, −3, −4, −1, −4, 4, 0, 0}; {1, 5, −2, 4, 2, −5, 4, 5, 6, 4, 0, 0}; {, −1, 3, −4, 2, 0, 5, 3, 5, 5, 4, 0, 0}; {, −1, 3, −4, 2, 0, 5, 3, 6, 5, 3, 0, 0}; {, −2, 2, −5, 1, −1, 4, 2, 5, 5, 2, 0, 0}; {, −2, 2, −5, 1, −1, 4, 2, 5, 5, 3, 0, 0}; {, −2, 2, −5, 1, −1, 4, 3, 5, 5, 4, 0, 0}; {, −2, 2, −5, 1, −1, 4, 3, 6, 5, 2, 0, 0}; {, −5, 1, −4, 4, 4, −1, 2, −3, −3, −1, 0, 0}; {, −3, 1, 6, 0, −1, 3, 2, 5, 5, 3, 0, 0}; {, −5, −2, 2, −5, 5, −3, −5, −3, −5, 3, 0, 0}; {, −5, −1, 4, −2, −2, 3, 2, 6, 4, 1, 0, 0}; {, −3, 3, −2, 6, −4, −2, −4, −2, 4, 4, 0, 0}; {5, 3, 2, 3, −3, 1, −5, 2, −4, −4, 0, 0}; {2, 6, −1, 6, −5, 0, −1, 4, 2, 0, 0, 0}; {4, −3, 3, −1, 1, 2, −1, 0, −5, 6, 0, 0}; {4, −3, 3, −1, 2, −5, −5, 2, 0, −2, 0, 0}; {3, −3, 4, 1, 5, 4, 6, −4, 4, 4, 0, 0}; {, −1, 2, 6, 0, 1, −3, 4, −3, 6, 0, 0, 0}; {3, −3, 4, 1, 5, 5, 6, −4, 4, 4, 0, 0}; {0, 6, 1, −2, 2, 2, 5, −5, 3, 3, 0, 0}; {0, 6, 1, −2, 2, 2, 5, −5, 4, 4, 0, 0}; {0, 4, −3, 4, −5, −4, 1, 0, 5, 2, 0, 0}; {1, 6, 0, −4, 0, 2, −4, −4, 2, 1, 0, 0}; {, −3, 0, 4, −2, 0, −4, 3, −3, 6, 0, 0, 0}; {, −1, 4, −2, 6, −2, −3, −4, −2, 6, 6, 0, 0}; {, −2, 3, −3, 5, −3, −4, −4, −2, 6, 5, 0, 0}; {2, 6, −1, 6, −3, −4, 1, 0, 5, 3, 0, 0}; {2, −5, 1, −3, 1, 2, −4, −4, 2, 1, 0, 0}; {, −3, 2, −4, 4, −3, −4, −5, −3, 6, 6, 0, 0}; {, −5, −1, 4, −1, 3, 1, −1, 0, −3, −5, 0, 0}; {, −3, 2, −4, 4, −3, −4, −4, −2, 6, 6, 0, 0}; {6, −2, 3, −2, 2, 0, −1, 0, −4, −5, 0, 0}; {0, 4, −3, 4, −4, −5, 0, −1, 4, 3, 0, 0}; {, −1, 3, −4, 3, −4, −5, −1, −2, 4, 3, 0, 0}; {, −2, 2, −5, 2, −5, 4, −1, −2, 2, 2, 0, 0}; {, −2, 2, −5, 2, −4, 6, −1, −1, 3, 2, 0, 0}; {, −4, −1, 3, −3, 2, 0, 4, 3, 5, 3, 0, 0}; {, −1, 4, −2, 6, 1, 1, −5, −4, 0, 0, 0, 0}; {, −3, 1, 6, 1, −5, −5, 0, −1, 3, 1, 0, 0}; {, −3, 1, 6, 1, −5, −4, −3, 3, 1, −1, 0, 0}; {6, −2, 3, −2, 4, 1, −3, −4, 1, 1, 0, 0}; {0, 5, −1, −5, 3, 2, 6, −4, 1, 1, 0, 0}; {, −3, 1, 6, 1, −4, −5, −2, −2, 3, 2, 0, 0}; {5, −3, 2, −3, 4, 6, 6, 1, −1, −4, 0, 0}; {6, −2, 3, −2, 5, −5, −5, 2, 0, −2, 0, 0}; {5, −3, 2, −3, 4, 6, −5, 2, 0, −2, 0, 0}; {, −1, 3, −4, 3, 1, 5, 3, 5, 6, 3, 0, 0}; {, −2, 2, −5, 2, 0, 5, 3, 5, 5, 4, 0, 0}; {, −5, −2, 2, −4, 5, −3, 6, −4, −5, 4, 0, 0}; {, −5, −2, 2, −4, 5, −3, −5, −4, −5, 5, 0, 0}; {5, −4, 0, 6, 3, −5, 5, −4, 6, 4, 0, 0}; {6, −3, 1, −5, 4, −4, −5, −4, −5, 4, 0, 0}; {5, −4, 0, 6, 3, −5, 6, −4, 6, 4, 0, 0}; {6, −2, 3, −2, −4, 1, 1, 4, 3, 3, 0, 0}; {5, −4, 0, 6, 4, −4, 6, −5, −5, 3, 0, 0}; {5, −4, 0, 6, 4, −4, 6, −5, −5, 4, 0, 0}; {4, −3, 3, 0, 0, −5, −1, −3, −5, −2, 0, 0}; {3, −4, 2, −1, −1, 6, −2, −3, −5, −3, 0, 0}; {1, 3, 6, 0, −3, 1, −2, −3, −3, 4, 0, 0}; {, −3, 4, 0, −1, 4, −1, 2, 4, 5, 0, 0, 0}; {, −1, 3, −4, 4, 6, 0, −2, 4, 1, −1, 0, 0}; {, −5, −2, 2, −3, −1, −1, 4, 2, −5, 3, 0, 0}; {, −4, 0, 5, 1, 4, −1, −3, 3, −1, −2, 0, 0}; {, −4, 0, 5, 1, 4, −1, −3, 3, 0, −2, 0, 0}; {, −5, −2, 2, −3, −1, 6, 2, −4, 4, 0, 0, 0}; {, −3, 3, −2, −4, 1, 1, 3, 6, 2, 3, 0, 0}; {, −5, −1, 4, 0, 5, 2, −2, −3, 1, 2, 0, 0}; {4, −4, 1, −3, 2, −1, −3, −2, −4, −5, 0, 0}; {5, −5, −2, 4, −2, 6, 1, −5, 6, 4, 0, 0}; {5, −4, 0, −5, 3, −4, 6, −4, 6, 5, 0, 0}; {6, −3, 1, −4, 5, −3, 6, −5, −5, 5, 0, 0}; {5, −4, 0, −5, 4, −4, 6, −5, −5, 4, 0, 0}; {, −5, 2, −2, −2, 3, −2, 2, 2, 5, −1, 0, 0}; {, −5, 2, −2, −2, 3, −2, 2, 3, 4, −1, 0, 0}; {, −5, 2, −2, −2, 3, −2, 2, 3, 5, 0, 0, 0}; {6, 1, −3, −3, 2, −3, 1, 3, 4, −1, 0, 0}; {6, −2, 3, 0, 2, −2, −4, −1, −2, −5, 0, 0}; {5, 0, −4, −4, 2, −4, 1, 2, 4, −1, 0, 0}; {4, −2, 5, 4, −3, 3, 6, 5, 6, 0, 0, 0}; {4, −2, 5, 4, −3, 3, 6, 6, 6, 1, 0, 0}; {4, −2, 5, 4, −3, 3, 6, 6, −5, 1, 0, 0}; {5, 0, −4, −4, 2, −3, 1, 2, 4, 0, 0, 0}; {5, 0, −4, −4, 2, −3, 1, 2, 5, −1, 0, 0}; {4, −1, −5, −5, 1, −3, 0, 2, 4, −1, 0, 0}; {2, −4, 3, 2, −4, 2, 5, 5, 6, 1, 0, 0}; {1, −5, 2, 1, −5, 2, 4, 4, 6, 0, 0, 0}; {5, −3, 2, −1, 4, 1, −3, −3, 1, 2, 0, 0}; {4, −5, −1, −5, −1, −5, 2, 0, 4, 3, 0, 0}; {5, −5, −2, 5, −2, −5, 1, −5, 6, 4, 0, 0}; {, −5, −2, 2, −2, 4, 2, −3, 3, 4, 2, 0, 0}; {4, 6, −3, 4, −3, 6, 1, 6, 6, 3, 0, 0}; {, −1, 0, 2, −4, 1, −3, 3, −3, −4, 5, 0, 0}; {, −5, 5, 4, −4, 3, 6, 0, 6, 5, −4, 0, 0}; {4, −1, −5, −4, 1, −5, 0, 2, 2, −2, 0, 0}; {1, −2, −4, −1, 6, −4, 2, −5, −4, −3, 0, 0}; {1, −2, −4, −1, 6, −4, 2, −4, −5, −3, 0, 0}; {1, −1, −2, 2, −2, 1, −3, 3, 6, −5, 0, 0}; {2, −4, 3, 3, −4, 2, 5, 5, 6, 1, 0, 0}; {3, −2, 6, −5, 1, −4, 0, 2, 3, −1, 0, 0}; {1, −5, 2, 2, −5, 1, 5, 5, 5, 0, 0, 0}; {0, 6, 1, 1, 6, 0, 4, 4, 5, −1, 0, 0}; {, −1, 4, −2, −3, 1, −5, −3, −4, −4, 2, 0, 0}; {, −3, 4, 0, 1, −5, 6, −1, 3, 0, −1, 0, 0}; {, −5, 1, −4, −4, 1, −1, 5, −5, 2, 1, 0, 0}; {, −2, −5, 5, −4, 4, 6, 0, 5, −4, −4, 0, 0}; {, −2, 4, −1, −1, 5, 0, 3, 4, 5, 0, 0, 0}; {6, 0, −5, −5, 2, −4, 6, 6, 5, −1, 0, 0}; {, −5, 4, 2, 5, 4, 0, 4, −3, 5, −4, 0, 0}; {3, 6, −2, −5, 1, 0, −5, 2, 3, 2, 0, 0}; {1, 3, 6, 2, −5, 5, −1, 5, 6, 3, 0, 0}; {, −2, −1, 1, −4, 0, −3, 3, −4, −4, 5, 0, 0}; {0, 5, −1, −2, 6, −1, −4, −4, 6, −1, 0, 0}; {, −2, 3, −3, −4, 4, −2, −5, −5, 6, −1, 0, 0}; {, −1, 1, 4, 0, 6, 3, −2, 4, 5, 2, 0, 0}; {, −3, −1, 2, −2, 4, 2, −3, 3, 5, 2, 0, 0}; {, −5, −4, −2, 5, −2, −5, 1, −5, −5, 4, 0, 0}; {, −5, −4, −2, 5, −2, −5, 1, −5, −5, 3, 0, 0}; {4, 5, −5, 3, −4, 6, 0, 5, −5, 4, 0, 0}; {, −4, −5, −5, 1, −3, 1, −5, 2, 2, −5, 0, 0}; {5, 3, 2, −5, 2, 6, −1, 5, 5, −4, 0, 0}; {2, −1, −3, 1, −5, −2, 3, −4, −5, −2, 0, 0}; {, −3, 6, 4, −4, 3, 6, 0, 6, −5, −4, 0, 0}; {3, 1, 0, 5, 1, 4, −2, 4, 4, −4, 0, 0}; {1, −2, −4, 0, −5, −3, 2, −4, 6, −3, 0, 0}; {, −5, 4, 2, 6, 2, 4, −1, 5, −5, −4, 0, 0}; {4, −1, −5, −3, 3, 3, −4, 1, −1, −1, 0, 0}; {4, −1, −5, −3, 3, 3, −3, 1, −2, −2, 0, 0}; {2, −4, 3, 4, −2, 6, 4, 5, 4, −2, 0, 0}; {1, 6, 0, 0, 6, 0, −3, −4, −5, 0, 0, 0}; {0, 5, −1, −1, 5, −1, −4, −4, 6, −1, 0, 0}; {1, −5, 2, 3, −2, 5, 3, 4, 4, −2, 0, 0}; {, −3, 1, 6, 5, −2, 4, 0, −2, −3, 1, 0, 0}; {, −2, 3, −3, −3, 4, −1, 6, −5, 6, 0, 0, 0}; {, −4, 0, 5, 4, −2, 4, −1, −2, −4, 1, 0, 0}; {, −3, 2, −4, −4, 3, −2, 6, −5, 6, −1, 0, 0}; {1, 6, 0, 0, −5, 0, −3, −4, −5, 0, 0, 0}; {, −2, 2, −5, 6, 0, 5, 0, −1, −3, 1, 0, 0}; {, −1, 4, −2, −2, 5, −1, −5, −5, −5, 0, 0, 0}; {, −1, 4, −2, −2, 5, −1, −5, −4, −5, 0, 0, 0}; {, −4, 0, 5, 4, −2, 3, −1, −2, −4, 0, 0, 0}; {, −3, 1, 6, 5, −1, 4, 0, −1, −3, 1, 0, 0}; {, −1, 5, 0, 1, −3, 4, 2, 4, 4, −2, 0, 0}; {, −2, 3, −3, −3, 4, −2, −4, −5, 6, −1, 0, 0}; {, −4, 0, 5, 4, −2, 3, 0, −2, −4, 1, 0, 0}; {, −4, 0, 5, 4, −2, 3, 0, −2, −3, 1, 0, 0}; {0, 3, −5, 5, −1, −2, 5, 0, 3, 1, 0, 0}; {6, −3, 1, −1, 5, −4, 4, 1, −1, 2, 0, 0}; {3, 6, −2, −3, 3, −5, 3, 0, −2, 2, 0, 0}; {0, 4, −3, −3, 4, 4, 0, −4, 0, −1, 0, 0}; {4, 1, −1, 4, −2, 1, −3, 6, −4, −2, 0, 0}; {, −1, 6, 2, 5, −3, −1, 5, 1, −1, 0, 0, 0}; {5, 3, 2, −4, 3, 6, 0, 5, 4, −3, 0, 0}; {4, 0, −3, 1, −5, −3, 3, −4, −3, −3, 0, 0}; {3, −2, 6, −3, 2, 3, −4, 1, −1, −1, 0, 0}; {1, −3, 6, −2, 6, −2, 1, 0, 2, 5, 0, 0}; {, −4, 0, 5, 5, −2, 4, −1, −2, −4, 1, 0, 0}; {, −5, −1, 4, 4, −3, 3, −1, −3, −4, 1, 0, 0}; {, −4, 1, −5, −4, 2, −3, 6, 6, 5, −1, 0, 0}; {, −5, −1, 4, 4, −2, 3, −1, −2, −4, 1, 0, 0}; {6, −2, 3, 3, −3, 2, −1, −2, −4, 1, 0, 0}; {, −1, −5, 4, −3, 1, 5, −1, −4, −4, −2, 0, 0}; {, −1, −5, 4, −3, 1, −5, 5, −5, −1, 1, 0, 0}; {, −2, 5, 1, 5, −3, −2, 5, 1, 0, −1, 0, 0}; {, −3, 3, −2, 1, 4, 5, −2, 5, 3, 1, 0, 0}; {, −5, 1, −4, −1, 2, 3, −3, 4, 2, 1, 0, 0}; {, −4, 3, −1, 3, −5, −3, 4, 0, 0, 0, 0, 0}; {6, 0, −5, −2, 1, 2, −4, 4, 1, 1, 0, 0}; {, −5, 2, −2, 2, 6, −4, 3, 0, −1, −1, 0, 0}; {, −4, 4, 6, −1, 2, −2, −4, −4, −2, 0, 0}; {, −4, 3, −1, 3, −4, −4, 2, 2, −1, 1, 0, 0}; {, −2, −5, 5, −1, 6, −3, 5, 6, 6, −3, 0, 0}; {6, 1, −3, 1, 6, −5, 2, 1, −2, 0, 0, 0}; {5, 0, −4, 0, 5, 6, 2, −1, −1, −1, 0, 0}; {5, 0, −4, 0, 5, −5, 2, 1, −2, −1, 0, 0}; {6, 2, −1, 4, −2, 1, −3, −3, −4, −3, 0, 0}; {5, −1, 6, −3, 4, −5, −5, 4, 6, −5, 0, 0}; {1, −5, 2, 6, 1, −2, −2, 0, −4, −4, 0, 0}; {5, −1, 6, −2, 5, −5, 6, 4, −5, −5, 0, 0}; {3, −3, 4, −4, 3, 6, 6, 3, 6, −5, 0, 0}; {, −2, 4, −1, 3, −1, −3, 4, 4, −2, −1, 0, 0}; {, −1, 6, 2, −5, 4, 3, −1, 0, −5, −2, 0, 0}; {, −2, 5, 1, 6, 3, 3, −1, 0, −5, −3, 0, 0}; {, −1, 6, 2, −5, 5, 0, 1, −4, −2, 1, 0, 0}; {, −5, 0, 6, −3, 5, 0, −4, 6, −5, −5, 0, 0}; {, −2, 3, −3, 0, −4, −4, −5, 4, −3, −4, 0, 0}; {, −4, 2, −3, 1, −1, 5, 3, 2, 4, 4, 0, 0}; {5, −2, 4, −5, 4, −1, 6, 5, 6, 6, 0, 0}; {, −3, −2, 0, −1, 4, −1, 6, −2, 4, 4, 0, 0}; {, −5, 1, −4, 0, −1, 5, 2, 2, 4, 4, 0, 0}; {5, −1, 6, −2, −3, 6, 0, 1, 4, 5, 0, 0}; {4, −2, 5, −3, −4, 6, 0, 0, 3, 5, 0, 0}; {6, 0, −5, −1, −1, 5, 1, 2, 4, 4, 0, 0}; {4, −1, −5, 0, 1, 0, 6, −3, 1, 3, 0, 0}; {, −1, 6, 2, −5, −3, 2, 5, −1, −1, −1, 0, 0}; {5, 1, −2, 4, −4, 0, −5, −5, 6, −3, 0, 0}; {, −3, 5, 2, −4, 0, 6, 4, 6, −2, 1, 0, 0}; {6, −1, 5, −4, −3, 1, −2, 4, 4, 2, 0, 0}; {, −5, 3, 0, 6, −1, 1, −5, −3, −5, −1, 0, 0}; {, −5, 3, 0, 6, −1, 1, −5, −3, −4, 0, 0, 0}; {5, −1, 6, −2, 1, 2, −4, 4, 2, 1, 0, 0}; {4, −1, −5, 0, 4, 6, 1, −1, −2, −2, 0, 0}; {5, 1, −2, 4, −3, 0, −4, −5, −5, −3, 0, 0}; {1, −4, 4, −3, 1, 4, −1, −2, −3, −3, 0, 0}; {, −4, 3, −1, 4, −4, 6, 6, −1, 1, 3, 0, 0}; {6, 1, −3, 2, −5, 5, 5, −2, 0, 3, 0, 0}; {5, 0, −4, 1, 6, 4, 5, −2, 1, 3, 0, 0}; {4, −1, −5, 0, 5, 3, 5, −3, 1, 3, 0, 0}; {5, 1, −2, 4, −2, 0, −4, −4, −5, −2, 0, 0}; {3, −3, 4, −4, 0, 0, −5, 3, 1, 0, 0, 0}; {2, −4, 3, −5, −1, −1, 6, 3, 0, 0, 0, 0}; {1, −5, 2, 6, −2, −2, 5, 2, 0, 0, 0, 0}; {4, 0, −3, 3, −3, −1, −4, −3, 6, −3, 0, 0}; {2, −3, 5, −2, 3, 5, 0, −1, −3, −1, 0, 0}; {3, −2, 6, −1, 5, 4, 3, −3, −1, 2, 0, 0}; {4, 0, −3, 3, −2, 0, −4, −3, −5, −3, 0, 0}; {2, −3, 5, −2, 4, 5, 0, 0, −3, −1, 0, 0}; {0, −5, 3, −4, 2, 4, 0, 0, −3, −3, 0, 0}; {5, −1, 6, −2, 4, 5, −4, −4, 2, 1, 0, 0}; {0, 5, 0, 3, −3, −3, −3, 3, 1, −3, 0, 0}; {6, 1, −2, 3, −1, 1, −3, −2, −5, −4, 0, 0}; {2, −4, 4, −4, 4, 5, 1, 1, −4, −3, 0, 0}; {, −5, −3, 1, 1, −4, 5, 0, 5, 0, 2, 0, 0}; {, −4, −1, 4, 5, 1, 0, −5, 1, −3, 0, 0, 0}; {, −5, 1, −3, 1, 1, 5, 0, 3, 5, 3, 0, 0}; {3, −3, 5, −3, −3, 3, −1, 1, 4, 3, 0, 0}; {5, 0, −3, 2, 5, −2, −5, −3, 1, 2, 0, 0}; {0, 3, −4, −3, −4, −1, −5, −1, −4, 4, 0, 0}; {4, 0, −2, 4, −3, −1, 5, −4, −5, −1, 0, 0}; {6, 3, 2, −3, 3, −4, 3, 2, 6, −2, 0, 0}; {1, −5, 3, −5, −2, 0, 6, 2, 1, 0, 0, 0}; {1, −4, 5, −2, 3, 4, −1, −1, −3, 0, 0, 0}; {2, −2, −4, 2, −4, −2, 6, −4, 6, −2, 0, 0}; {0, 6, 2, 6, −2, −2, 5, 2, 0, 0, 0, 0}; {2, −2, −4, 2, −4, −1, −5, 5, −4, −1, 0, 0}; {3, 0, −1, 6, 1, 5, 2, 2, 5, −3, 0, 0}; {, −1, 6, 3, −4, 1, 3, −2, −2, −4, −1, 0, 0}; {, −2, 3, −2, 1, 4, 4, −2, 5, 3, 1, 0, 0}; {, −1, 5, 1, 5, −3, −2, 5, 1, 1, 1, 0, 0}; {0, −5, 4, −3, 2, 4, 0, −3, −2, 0, 0, 0}; {1, −3, −5, 1, −5, −2, −5, 5, −4, −1, 0, 0}; {, −1, 5, 1, 5, −3, −2, 5, 2, 0, 0, 0, 0}; {, −2, 4, 0, 4, −4, −3, 4, 1, 0, −1, 0, 0}; {, −1, 6, 3, −4, 1, 3, −1, −2, −4, −2, 0, 0}; {, −3, 4, 1, 6, −1, 2, −2, −2, −4, −3, 0, 0}; {, −4, 2, −2, 2, 6, −4, 3, 1, −1, −1, 0, 0}; {, −2, 4, 0, 4, −3, −3, 4, 2, −1, 0, 0, 0}; {, −3, 4, 1, 6, 0, 2, −2, −2, −4, −3, 0, 0}; {6, −1, 6, −2, 2, 1, −4, 4, 2, 0, 0, 0}; {, −5, 2, −1, 5, 0, 1, −3, −2, −5, −2, 0, 0}; {5, 0, −3, 3, −1, −1, −2, 5, −4, 0, 0, 0}; {0, 5, 0, 4, −2, −3, −2, −2, −5, −5, 0, 0}; {2, −4, 4, −3, 4, 5, 1, 1, −3, −3, 0, 0}; {0, 5, 0, 4, −1, −3, −2, −1, −5, −5, 0, 0}; {, −1, 4, −1, 3, −2, −4, −3, −2, −5, −5, 0, 0}; {0, 4, −2, 1, −4, −3, −5, 3, −2, −3, 0, 0}; {1, −5, 3, −4, 5, 4, 0, 1, −5, −2, 0, 0}; {, −1, 3, −3, 0, −4, −3, −5, 3, −3, −4, 0, 0}; {5, 6, −3, −3, 3, −2, 4, −3, 3, 3, 0, 0}; {3, 4, −5, −5, 1, −4, 3, −4, 3, 3, 0, 0}; {4, 5, −4, −4, 2, −2, 4, −3, 3, 3, 0, 0}; {, −1, 3, −3, 0, −3, 2, −2, −4, −5, −5, 0, 0}; {, −3, 2, −3, 1, −1, −5, 1, 2, 5, 4, 0, 0}; {, −3, 2, −3, 1, 0, 6, 2, 3, 5, 4, 0, 0}; {, −3, 2, −3, 1, 0, −5, 2, 3, 5, 5, 0, 0}; {2, −4, 4, −3, −2, 2, −2, 0, 4, 3, 0, 0}; {5, 0, −3, 3, 5, −1, 2, −3, −2, −2, 0, 0}; {2, −5, 2, 6, 6, −2, 0, 5, 3, 1, 0, 0}; {1, −5, 3, −4, −3, 2, −2, 0, 3, 3, 0, 0}; {, −2, 5, 2, −4, −2, 6, −1, 2, 3, 0, 0, 0}; {4, 0, −2, 5, −3, −1, 5, −4, −5, −1, 0, 0}; {2, −3, 6, 0, 3, −4, 6, −4, 0, 2, 0, 0}; {3, −3, 5, −2, 0, 5, −5, 1, 0, −1, 0, 0}; {, −1, 3, −3, 0, 0, 4, 0, −5, 6, 1, 0, 0}; {, −1, 3, −3, 0, 0, 4, 1, 6, 5, 3, 0, 0}; {, −2, 2, −4, −1, −1, 3, 0, 6, 5, 3, 0, 0}; {0, −4, 6, 1, 6, −3, 4, 6, 6, −2, 0, 0}; {, −5, 2, −1, 5, −3, 4, 5, 0, −1, −1, 0, 0}; {, −2, 4, 0, 5, −3, −3, 5, 1, 0, −1, 0, 0}; {, −5, 1, −3, 2, 6, −5, 2, 0, −2, 0, 0, 0}; {6, 1, −2, 4, −3, 0, −4, −4, −5, −4, 0, 0}; {4, −1, −4, 2, −5, −1, 2, −3, −3, −3, 0, 0}; {3, −3, 5, −2, 2, 6, −5, 2, 0, −1, 0, 0}; {6, −2, 4, −4, −2, 6, 4, −4, 6, 0, 0, 0}; {5, −3, 3, −5, −3, 5, 3, −4, 6, 0, 0, 0}; {, −5, 0, −5, 0, 3, 0, 0, 1, −4, −5, 0, 0}; {, −4, 2, −2, 4, −4, −5, −5, −3, 6, 6, 0, 0}; {1, −5, 3, −3, 1, 5, 6, 1, −1, −1, 0, 0}; {4, −3, 4, −3, 1, −1, −2, 0, −4, −5, 0, 0}; {1, −5, 3, −3, 2, 3, 5, 6, 4, 4, 0, 0}; {, −5, 0, −5, 0, 4, 4, −2, −2, 2, 1, 0, 0}; {, −1, 5, 1, −5, 0, 3, 5, −5, 6, 4, 0, 0}; {, −3, 2, −3, 2, 6, −3, −3, 4, 1, −1, 0, 0}; {, −4, 3, 0, −5, 1, 6, −2, 2, 2, 2, 0, 0}; {3, −4, 3, −4, 1, −1, −2, 0, −4, −4, 0, 0}; {2, −5, 2, −5, 0, −1, −2, −1, −4, −5, 0, 0}; {, −1, 6, 3, −2, 5, −4, −1, 1, 2, 2, 0, 0}; {5, −2, 5, −2, 3, 4, −3, −3, 2, 1, 0, 0}; {, −2, 3, −2, 3, −3, −3, 5, 4, −1, −2, 0, 0}; {, −5, 0, −5, 0, 6, 6, −3, −3, 3, 2, 0, 0}; {5, −2, 5, −2, 4, 4, −3, −3, 2, 1, 0, 0}; {4, −3, 4, −3, 3, 4, −4, −4, 2, 1, 0, 0}; {4, −3, 4, −3, 3, 4, −3, −3, 2, 1, 0, 0}; {, −5, 0, −5, 0, −5, 6, −4, −3, 6, 6, 0, 0}; {, −2, 3, −2, 3, −1, −4, −4, −2, −5, −5, 0, 0}; {, −5, −1, 5, −3, 4, 1, −4, −5, 1, 0, 0, 0}; {, −3, 3, −1, 5, 2, 2, −1, 0, −5, −3, 0, 0}; {1, 6, 1, 6, 3, 4, 3, 1, −5, −5, 0, 0}; {, −2, 2, −4, 0, −4, −4, −5, 4, −3, −4, 0, 0}; {, −1, 4, −1, 4, 1, 3, 3, 0, 6, 6, 0, 0}; {, −2, 3, −2, 3, 0, 2, 2, −1, 6, 6, 0, 0}; {1, −4, 5, 0, −1, 3, 6, 2, 4, 0, 0, 0}; {2, −5, 2, −5, 5, −2, −1, 4, 3, 1, 0, 0}; {5, −3, 3, −5, 4, −1, 6, 6, −5, 6, 0, 0}; {, −2, −2, 0, 0, 6, 1, −5, −1, 5, 4, 0, 0}; {3, −4, 3, −4, −5, −1, 0, 6, 3, 2, 0, 0}; {1, 5, −1, 3, 1, 4, 4, −3, 6, 3, 0, 0}; {0, 4, −2, 2, 0, 4, 3, −5, 5, 3, 0, 0}; {1, 6, 1, 6, 5, −2, −2, 3, 3, 1, 0, 0}; {1, 6, 1, 6, 5, −2, −1, 4, 3, 1, 0, 0}; {, −1, 3, −3, 1, −1, 3, 3, −4, 5, 2, 0, 0}; {, −1, 5, 1, −5, −4, 0, −3, −1, 3, 3, 0, 0}; {1, 6, 1, 6, 6, −2, −1, 5, 3, 1, 0, 0}; {1, −4, 5, 0, 2, −4, 0, −5, −3, −2, 0, 0}; {0, 5, 0, 5, 5, −3, −1, 4, 2, 1, 0, 0}; {, −1, 4, −1, 4, 4, −3, −4, 2, 3, 1, 0, 0}; {, −2, 2, −4, 0, −1, 3, 2, −5, 5, 2, 0, 0}; {0, −5, 4, −1, 1, −4, −1, 6, −3, −2, 0, 0}; {, −1, 4, −1, 4, 4, −3, −2, 4, 2, 0, 0, 0}; {0, 6, 2, −4, −2, 3, 5, −1, 0, −1, 0, 0}; {, −2, 3, −2, 3, 4, −3, −4, 2, 2, 1, 0, 0}; {0, 6, 2, −4, −2, 4, 5, −1, 0, −1, 0, 0}; {, −4, 0, 6, −2, −2, 2, 1, 6, 4, 2, 0, 0}; {, −2, 4, 0, 6, −4, 2, 3, −2, −1, −1, 0, 0}; {6, −3, 2, 5, 4, −4, 3, −2, −4, 2, 0, 0}; {6, −2, 4, −4, −4, 1, −2, 5, 4, 1, 0, 0}; {, −3, 2, −3, 2, 4, 1, 0, 5, 4, −1, 0, 0}; {, −2, 3, −2, 3, 5, −3, −3, 3, 2, 0, 0, 0}; {1, −5, 3, −3, 0, 5, 6, 1, 0, −1, 0, 0}; {, −3, 2, −3, 2, 4, −3, −3, 3, 2, 0, 0, 0}; {, −5, 0, −5, 0, 2, −5, −5, 1, 1, 1, 0, 0}; {5, −3, 3, −4, −3, 1, 0, 5, 3, 1, 0, 0}; {3, −4, 3, −3, −1, 1, 0, −4, 3, 2, 0, 0}; {, −5, 2, −1, −5, −1, 5, 2, 3, −2, 0, 0, 0}; {6, 1, −2, 6, −2, 4, 2, 3, −3, 0, 0, 0}; {, −5, 0, −5, 1, 4, −4, −4, 3, 1, −1, 0, 0}; {3, −5, 1, 6, −4, 0, −1, 5, 3, 0, 0, 0}; {5, −2, 5, −1, 2, −1, −1, 0, −4, −5, 0, 0}; {1, 6, 1, −5, −2, −4, −3, −1, 6, 6, 0, 0}; {3, −3, 5, 0, 4, 5, 6, −5, 5, 4, 0, 0}; {0, 3, −4, 0, 2, −2, 6, −2, −5, 1, 0, 0}; {1, 6, 1, −5, −1, −2, −3, −2, −5, −5, 0, 0}; {0, 5, 0, 6, −2, −3, −3, −2, −5, 6, 0, 0}; {0, 5, 0, 6, −2, −2, −3, −2, −5, 6, 0, 0}; {, −5, 0, −5, 1, 5, 5, −4, −4, 4, 4, 0, 0}; {3, −3, 5, 0, 5, −5, 3, 4, −2, −1, 0, 0}; {4, −3, 4, −2, 2, 3, −3, −3, 2, 1, 0, 0}; {3, −4, 3, −3, 1, 3, −3, −3, 2, 1, 0, 0}; {, −3, 3, −1, 6, −1, 2, 4, 6, 5, 4, 0, 0}; {6, 0, −4, 3, −3, 0, 3, 6, 5, 4, 0, 0}; {4, −2, 6, 1, −5, −1, 2, 5, 4, 3, 0, 0}; {3, −3, 5, 0, 6, −2, 1, 5, 4, 3, 0, 0}; {0, 5, 0, 6, −1, −3, −3, −1, 6, 6, 0, 0}; {0, 5, 0, 6, −1, −3, −3, −1, −5, −5, 0, 0}; {0, 5, 0, 6, −1, −2, −3, 0, 3, 4, 0, 0}; {, −3, 1, −5, 0, 4, 2, 1, 1, −3, −4, 0, 0}; {5, −2, 5, −1, 4, 5, −4, −4, 3, 2, 0, 0}; {3, −4, 3, −3, 2, 3, −4, −4, 2, 1, 0, 0}; {1, 6, 1, −5, 1, 2, −5, −4, 1, 1, 0, 0}; {4, −3, 4, −2, 4, 5, −5, −4, 6, 5, 0, 0}; {3, −4, 3, −3, 3, 4, 6, −5, 5, 4, 0, 0}; {, −2, 3, −2, 4, −2, −4, −4, −2, 6, 6, 0, 0}; {0, 4, −2, 3, −4, 6, 0, −1, 3, 2, 0, 0}; {, −4, 1, −4, 2, −4, −5, −4, −2, 2, 3, 0, 0}; {0, 4, −2, 3, −4, −5, 0, −1, 4, 2, 0, 0}; {3, −4, 3, −3, 3, 3, −4, −3, 1, 1, 0, 0}; {, −1, 3, −3, 2, −4, −5, −1, −2, 4, 2, 0, 0}; {0, 5, 0, 6, 1, 1, 6, −5, 0, 1, 0, 0}; {6, −1, 6, 0, −5, −5, 4, 3, −2, −2, 0, 0}; {4, −3, 4, −2, 5, 5, −5, −4, 5, 5, 0, 0}; {3, −4, 3, −3, 4, 4, 6, −5, 5, 5, 0, 0}; {1, 5, −1, 4, −2, −3, 0, −1, 5, 3, 0, 0}; {, −5, −1, 5, −2, 4, 1, 0, 1, −3, −4, 0, 0}; {6, −1, 6, 0, −4, −5, 3, 3, −2, −1, 0, 0}; {2, −5, 2, −4, 4, 3, −5, −4, 2, 2, 0, 0}; {5, −2, 5, −1, −5, −5, 3, 3, −2, −2, 0, 0}; {, −2, 3, −2, 4, 0, 2, 2, 0, 6, 6, 0, 0}; {, −5, −1, 5, −2, 5, −5, 6, 2, −3, −4, 0, 0}; {6, −1, 6, 0, −4, 6, −5, −3, 6, 6, 0, 0}; {, −4, 1, −4, 2, −1, 1, 1, −1, −5, −5, 0, 0}; {2, −5, 2, −4, 6, 3, −3, 0, 3, 2, 0, 0}; {3, −5, 1, 6, 3, 5, 4, 1, −4, −5, 0, 0}; {0, 4, −2, 3, 0, 4, 4, −5, 5, 3, 0, 0}; {, −2, 2, −4, 1, −2, 2, 2, −5, 5, 2, 0, 0}; {0, 4, −2, 3, 0, 4, 5, −4, 5, 3, 0, 0}; {0, 5, 0, 6, 4, −3, −1, 3, 3, 2, 0, 0}; {, −1, 5, 1, −4, −5, 1, 4, −2, −1, 0, 0, 0}; {, −1, 3, −3, 2, −1, 4, 4, −4, 5, 3, 0, 0}; {, −1, 4, −1, 5, 4, −3, −3, 2, 3, 1, 0, 0}; {, −2, 2, −4, 1, −1, 3, 2, 6, 5, 3, 0, 0}; {0, 6, 2, −3, −3, 3, 5, −2, 0, −1, 0, 0}; {, −1, 4, −1, 5, 4, −3, −2, 3, 3, 1, 0, 0}; {, −3, 1, −5, 0, −2, 2, 2, −5, 5, 2, 0, 0}; {, −1, 5, 1, −4, −4, 2, 5, −2, 0, 0, 0, 0}; {, −3, 1, −5, 0, −2, 2, 3, −5, 5, 2, 0, 0}; {, −3, 1, −5, 0, −2, 2, 3, −5, 5, 3, 0, 0}; {, −2, 3, −2, 4, 3, −4, −2, 3, 2, 2, 0, 0}; {, −2, 4, 0, −5, −5, 1, 4, −2, −1, 0, 0, 0}; {, −3, 1, −5, 0, −2, 2, 3, −5, 4, 2, 0, 0}; {, −3, 1, −5, 0, −2, 3, 2, 6, 5, 2, 0, 0}; {, −4, 0, 6, −1, −2, 2, 1, 6, 5, 2, 0, 0}; {, −4, 0, 6, −1, −2, 2, 2, 6, 4, 2, 0, 0}; {, −3, 2, −3, 3, 3, −4, −3, 2, 2, 1, 0, 0}; {, −2, 4, 0, −5, −4, 2, 4, −2, −1, −1, 0, 0}; {, −5, −1, 5, −2, −3, 1, 1, 6, 4, 2, 0, 0}; {, −3, 2, −3, 3, 3, −4, −2, 3, 2, 0, 0, 0}; {, −5, −1, 5, −2, −3, 1, 2, 6, 4, 2, 0, 0}; {, −3, 3, −1, 6, −5, 1, 4, −2, −1, 0, 0, 0}; {, −4, 2, −2, 5, 6, 0, 3, −3, −2, 0, 0, 0}; {, −5, −1, 5, −2, −3, 1, 2, −5, 4, 1, 0, 0}; {, −4, 2, −2, 5, 6, 0, 3, −2, −2, 0, 0, 0}; {6, −2, 4, −3, −4, 1, −1, 4, 4, 2, 0, 0}; {3, 6, −1, 3, 2, 6, 2, −4, 6, 2, 0, 0}; {4, −4, 2, −5, −5, 0, −2, 4, 3, 2, 0, 0}; {, −3, 3, −1, 6, −4, −1, −4, −2, 3, 3, 0, 0}; {, −5, −1, 5, −2, −2, 2, 1, 6, 4, 2, 0, 0}; {6, −2, 4, −3, −3, 1, 0, 6, 4, 1, 0, 0}; {, −3, 3, −1, 6, −4, 2, 4, −2, −1, −1, 0, 0}; {, −5, 0, −5, 1, 2, −5, −4, 1, 1, 1, 0, 0}; {, −4, 2, −2, 5, −5, 1, 3, −3, −1, −1, 0, 0}; {, −5, 0, −5, 1, 2, −5, −4, 2, 1, 0, 0, 0}; {3, −5, 1, −5, −5, 0, −1, 3, 3, 3, 0, 0}; {3, −5, 1, −5, −5, 0, −1, 4, 3, 1, 0, 0}; {, −1, 2, −5, 0, −1, 4, 0, 6, 5, 2, 0, 0}; {2, 6, 0, 6, −5, −1, −1, 5, 3, 0, 0, 0}; {4, −1, −4, 5, −3, 2, 1, 2, −3, 0, 0, 0}; {4, −3, 4, −1, 2, 6, −5, 2, 0, −2, 0, 0}; {, −2, 1, 6, −1, 0, −4, 4, −3, 6, 0, 0, 0}; {3, −4, 3, −2, 1, 3, −3, −3, 3, 1, 0, 0}; {1, 6, 1, −4, 0, 2, −4, −4, 2, 1, 0, 0}; {, −2, 3, −2, 5, −3, −5, −5, −2, 6, 6, 0, 0}; {, −2, 3, −2, 5, −3, −5, −4, −2, 6, 6, 0, 0}; {, −4, −1, 4, −3, −1, −4, 4, −3, 6, 1, 0, 0}; {, −5, −2, 3, −4, −2, −5, 3, −4, 5, 0, 0, 0}; {, −2, 3, −2, 5, −3, −4, −4, −2, 6, 6, 0, 0}; {, −1, 5, 1, −3, 2, 3, 4, 6, 4, 4, 0, 0}; {, −2, 4, 0, −4, 1, 2, 3, 5, 4, 4, 0, 0}; {, −4, 1, −4, 3, −5, −5, −5, −3, 6, 5, 0, 0}; {2, −5, 2, −3, 1, 2, −4, −4, 2, 1, 0, 0}; {1, 6, 1, −4, 1, 2, −5, −5, 2, 1, 0, 0}; {0, 5, 0, −5, 0, 1, −5, −5, 1, 1, 0, 0}; {, −2, 2, −4, 2, 6, 6, −1, −2, 4, 2, 0, 0}; {5, −2, 5, 0, 5, 6, −5, −4, 6, 5, 0, 0}; {0, 5, 0, −5, 0, 2, −5, −5, 2, 1, 0, 0}; {, −2, 3, −2, 5, −2, 0, 6, 6, 1, 0, 0, 0}; {3, −5, 1, −5, −1, 0, −2, 6, 2, −1, 0, 0}; {4, −2, 6, 2, −4, −1, 2, 4, 4, 3, 0, 0}; {0, 4, −2, 4, −4, −2, −2, 5, 2, −1, 0, 0}; {5, −4, 1, 6, −3, 5, 2, −5, 5, 0, 0, 0}; {, −4, 0, 6, 0, 4, 1, 0, 1, −3, −4, 0, 0}; {, −1, 4, −1, 6, −1, −2, 6, −5, −1, 1, 0, 0}; {, −5, −1, 5, −1, 3, 1, 0, 1, −4, −5, 0, 0}; {, −4, 1, −4, 3, −4, −5, −5, −3, 6, 6, 0, 0}; {0, 4, −2, 4, −4, −5, 0, −1, 4, 3, 0, 0}; {, −2, 2, −4, 2, 6, 5, −1, −2, 3, 2, 0, 0}; {6, −1, 6, 1, 6, 6, −5, −4, 5, 5, 0, 0}; {6, −1, 6, 1, 6, 6, −5, −4, 6, 5, 0, 0}; {, −1, 3, −3, 3, −4, −5, −1, −2, 4, 3, 0, 0}; {, −2, 2, −4, 2, −5, 6, −2, −3, 4, 3, 0, 0}; {, −5, −1, 5, −1, 4, 3, −2, −3, 2, 1, 0, 0}; {2, −5, 2, −3, 3, 3, 6, −5, 4, 4, 0, 0}; {1, 6, 1, −4, 2, 2, 5, 6, 4, 4, 0, 0}; {0, 4, −2, 4, −3, −4, −1, −2, 5, 4, 0, 0}; {, −2, 2, −4, 2, −5, −5, −2, −2, 4, 3, 0, 0}; {, −2, 2, −4, 2, −5, −5, −1, −2, 4, 2, 0, 0}; {, −1, 4, −1, 6, 0, 1, 6, 6, 1, 1, 0, 0}; {, −3, 1, −5, 1, 6, 6, −2, −3, 4, 2, 0, 0}; {, −2, 2, −4, 2, −5, −5, 0, −1, 4, 2, 0, 0}; {1, 6, 1, −4, 2, 3, 6, −5, 5, 5, 0, 0}; {6, −2, 4, −2, 3, 0, −1, 0, −4, −5, 0, 0}; {5, −3, 3, −3, 2, −1, −2, 0, −4, −5, 0, 0}; {, −5, 0, −5, 2, −4, −5, 6, −2, 1, 3, 0, 0}; {5, −3, 3, −3, 2, 0, −1, 0, −4, −5, 0, 0}; {, −5, 0, −5, 2, −4, −5, −5, −2, 2, 3, 0, 0}; {6, −2, 4, −2, 4, 2, −4, −5, 2, 1, 0, 0}; {3, 6, −1, 4, −3, 6, 3, 3, −1, −3, 0, 0}; {3, −5, 1, −5, 1, −1, −2, −1, −4, −5, 0, 0}; {1, 4, −3, 2, −5, 4, 3, 2, −2, −3, 0, 0}; {3, −4, 3, −2, 5, 4, 5, −5, 5, 5, 0, 0}; {, −2, 2, −4, 2, −4, −5, −2, −2, 4, 3, 0, 0}; {, −3, 1, −5, 1, −5, 6, −2, −2, 3, 2, 0, 0}; {, −3, 1, −5, 1, −5, 6, −1, −1, 3, 2, 0, 0}; {, −4, 0, 6, 0, 6, 5, −2, −2, 2, 2, 0, 0}; {, −1, 3, −3, 3, −3, −4, −2, −2, −5, 6, 0, 0}; {, −1, 3, −3, 3, −3, −4, −2, −2, 6, 5, 0, 0}; {, −1, 4, −1, 6, 1, 2, 6, 6, 1, 1, 0, 0}; {, −3, 1, −5, 1, −5, −5, −2, −3, 4, 2, 0, 0}; {, −3, 1, −5, 1, −5, −5, −2, −2, 3, 2, 0, 0}; {, −4, 0, 6, 0, 6, 6, −2, −2, 3, 2, 0, 0}; {, −5, −2, 3, −4, 1, 1, 0, 6, 3, −1, 0, 0}; {4, −4, 2, −4, 2, −1, −2, −1, −4, −5, 0, 0}; {, −3, 1, −5, 1, −4, −5, −2, −2, 3, 3, 0, 0}; {, −2, 3, −2, 5, 1, 1, 5, 6, 1, 1, 0, 0}; {, −3, 1, −5, 1, −4, −5, −2, −2, 4, 3, 0, 0}; {6, −2, 4, −2, 5, 4, −3, −3, 2, 1, 0, 0}; {, −5, −1, 5, −1, 6, 6, −3, −3, 3, 2, 0, 0}; {5, −3, 3, −3, 4, 6, 6, 2, −1, −3, 0, 0}; {4, −4, 2, −4, 3, 6, 5, 1, −4, −5, 0, 0}; {, −5, −1, 5, −1, −4, 1, 1, 5, 4, 2, 0, 0}; {, −5, −1, 5, −1, −4, 1, 2, 6, 4, 2, 0, 0}; {5, −4, 1, 6, 3, 6, −5, −3, 5, 2, 0, 0}; {, −3, 2, −3, 4, 3, −3, −3, 1, 3, 0, 0, 0}; {, −4, 1, −4, 3, 2, −4, −4, 0, 2, 0, 0, 0}; {, −5, −1, 5, −1, −3, 2, 2, 6, 4, 3, 0, 0}; {5, −4, 1, 6, 3, −5, 6, −3, −5, 4, 0, 0}; {6, −2, 4, −2, −4, 1, 1, 5, 4, 2, 0, 0}; {5, −3, 3, −3, −5, 0, 0, 5, 3, 2, 0, 0}; {4, −5, 0, 5, 2, 6, 6, −3, 6, 3, 0, 0}; {5, −3, 3, −3, −5, 0, 1, 6, 3, 1, 0, 0}; {5, −2, 5, 0, −1, 5, −5, 1, 0, 0, 0, 0}; {5, −3, 3, −3, −4, 1, 0, 4, 4, 2, 0, 0}; {3, 6, −1, 4, 2, 6, 4, −4, 6, 3, 0, 0}; {4, −4, 2, −4, −5, 0, −1, 4, 3, 2, 0, 0}; {3, 6, −1, 4, 2, 6, 5, −4, 6, 3, 0, 0}; {4, −4, 2, −4, −5, 0, 0, 4, 3, 3, 0, 0}; {, −5, 3, 1, −1, 2, −5, −2, −3, 0, −4, 0, 0}; {4, −4, 2, −3, −4, 1, 0, 3, 4, 1, 0, 0}; {2, 5, −2, 4, 2, 6, 4, −5, 6, 3, 0, 0}; {0, 2, 6, −1, −4, −1, −3, −2, −4, 4, 0, 0}; {1, 4, −3, 3, 1, 5, 4, −5, 5, 3, 0, 0}; {0, 5, 0, −4, −2, 4, 5, −1, −1, −2, 0, 0}; {4, 5, −4, 0, −2, 6, 1, 3, −1, 3, 0, 0}; {1, 0, 1, 3, −1, 5, −1, −3, 4, 6, 0, 0}; {, −1, 4, −1, −5, −2, 4, 5, 0, −1, −3, 0, 0}; {5, −5, −1, 4, 4, 0, −5, −1, −5, 1, 0, 0}; {, −3, 1, −5, 2, 5, 6, 0, −1, 5, 2, 0, 0}; {, −3, 1, −5, 2, 5, −3, −3, 3, 1, −1, 0, 0}; {5, −4, 1, −5, −3, 5, 1, −5, 4, −1, 0, 0}; {, −4, 1, −4, 4, −4, −5, −4, −3, 6, 5, 0, 0}; {, −5, 0, −5, 3, −5, 6, −5, −3, 6, 5, 0, 0}; {, −3, 1, −5, 2, 6, 5, −1, −2, 3, 3, 0, 0}; {5, −2, 5, 1, 6, 6, 6, −4, 5, 5, 0, 0}; {2, 6, 0, −5, −1, −2, −2, −1, −5, 6, 0, 0}; {, −5, 0, −5, 3, −4, −2, 5, 6, 0, 0, 0, 0}; {6, −2, 4, −1, 3, 4, −2, −3, 3, 1, 0, 0}; {3, 6, −1, 5, −4, 5, 2, −5, 5, 0, 0, 0}; {5, −3, 3, −2, 2, 0, −1, 0, −4, −5, 0, 0}; {5, −2, 5, 1, 6, 5, 6, −4, 5, 5, 0, 0}; {4, −5, 0, 6, −2, −5, 2, 0, 4, 2, 0, 0}; {5, −3, 3, −2, 3, 1, −3, −4, 1, 1, 0, 0}; {1, 4, −3, 3, −5, 4, 1, 6, 5, 0, 0, 0}; {2, 6, 0, −5, 0, −2, −2, −1, −5, 6, 0, 0}; {6, −3, 2, −4, 0, −2, 2, 0, 6, 4, 0, 0}; {, −4, 0, 6, 1, 6, 5, −2, −2, 3, 2, 0, 0}; {2, −5, 2, −2, 4, 4, 5, −5, 5, 5, 0, 0}; {0, 4, −2, 5, −2, −3, −3, −2, −5, 6, 0, 0}; {, −5, −1, 5, 0, 5, 5, −2, −3, 3, 2, 0, 0}; {2, 6, 0, −5, 0, 0, −4, −5, 1, 0, 0, 0}; {6, −2, 4, −1, 4, 5, −2, −3, 3, 1, 0, 0}; {, −5, 0, −5, 3, −3, −1, 5, 5, 0, 0, 0, 0}; {4, −4, 2, −3, 3, 1, −4, −4, 1, 1, 0, 0}; {0, 4, −2, 5, −1, −3, −3, −2, −5, −5, 0, 0}; {, −5, −1, 5, 0, 6, 5, −3, −3, 3, 2, 0, 0}; {6, −2, 4, −1, 5, 4, −4, −4, 3, 2, 0, 0}; {6, −2, 4, −1, 5, 4, −3, −3, 2, 2, 0, 0}; {4, −5, 0, 6, −1, −3, 2, 1, 4, 3, 0, 0}; {, −5, −1, 5, 0, 6, 6, −3, −3, 3, 2, 0, 0}; {3, −5, 1, −4, 2, 5, 6, 1, −1, −3, 0, 0}; {5, −3, 3, −2, 5, 4, −4, −4, 2, 2, 0, 0}; {4, −5, 0, 6, 0, −1, 1, 0, 5, 3, 0, 0}; {4, −4, 2, −3, 4, 4, −4, −4, 2, 1, 0, 0}; {5, −4, 1, −5, 3, 6, −4, −4, 3, 1, 0, 0}; {, −5, −1, 5, 0, −2, 3, 1, 4, 5, 2, 0, 0}; {, −5, 0, −5, 3, 2, −4, −4, 0, 2, 0, 0, 0}; {3, 6, −1, 5, 2, 6, 4, −5, 6, 3, 0, 0}; {3, 6, −1, 5, 2, 6, 5, −5, 6, 4, 0, 0}; {, −5, 1, −3, 6, 6, 1, 3, −4, −1, −2, 0, 0}; {, −4, 0, 6, 2, 4, −2, −3, 3, 0, −1, 0, 0}; {6, −2, 4, 0, 2, −4, −4, 2, 0, −2, 0, 0}; {2, 4, −4, 2, 3, −2, 4, −2, 6, 0, 0, 0}; {2, −5, 2, −1, 4, 3, 5, −5, 5, 4, 0, 0}; {4, −4, 2, −2, 2, 3, −3, −3, 3, 1, 0, 0}; {4, −4, 2, −2, 2, −4, −5, 2, −1, −2, 0, 0}; {2, 6, 0, −4, 0, 6, 6, 1, −1, −3, 0, 0}; {1, 5, −1, −5, −1, 5, 5, 0, −2, −4, 0, 0}; {5, −3, 3, −1, 4, 2, −3, −3, 2, 2, 0, 0}; {, −1, 3, −3, 5, −2, −4, −3, −2, −5, 6, 0, 0}; {, −3, 0, 5, 0, 4, 2, 0, 1, −3, −5, 0, 0}; {1, 5, −1, −5, 1, −1, −5, −5, 0, 1, 0, 0}; {0, 3, −4, 3, −4, 5, 0, −1, 3, 2, 0, 0}; {2, 5, −2, 5, 0, 5, 5, −4, 6, 4, 0, 0}; {, −3, −1, 3, −2, −3, 2, −3, 6, −4, 2, 0, 0}; {, −5, −3, 1, −4, −4, 1, −4, 5, −5, 2, 0, 0}; {0, 3, −4, 4, 6, 2, −2, 4, 2, −2, 0, 0}; {0, −5, 4, 4, −1, 6, −1, 2, 3, −2, 0, 0}; {, −2, 4, 0, −1, 5, 0, 3, 4, 5, 0, 0, 0}; {, −2, 1, 6, 2, 5, 0, −3, 1, −1, −4, 0, 0}; {, −1, −1, 1, −5, 0, −3, 3, −4, −4, 4, 0, 0}; {3, 1, 1, 5, 1, 5, −2, 4, 4, −5, 0, 0}; {2, 0, 0, 4, 0, 4, −2, 4, 4, −5, 0, 0}; {5, −5, −1, −5, −5, 0, −5, 4, −5, 2, 0, 0}; {3, 4, −5, 2, 1, 5, 0, −5, −3, 4, 0, 0}; {, −4, 2, −2, −2, 3, −2, 2, 4, 4, −1, 0, 0}; {6, −1, 6, 5, −2, 4, −5, 6, −5, 1, 0, 0}; {, −5, 1, −3, −3, 3, −2, 2, 3, 4, −1, 0, 0}; {5, −1, −5, −5, 1, −3, 1, 2, 4, −1, 0, 0}; {, −2, −1, 2, −3, 1, −2, 3, −3, −5, 5, 0, 0}; {1, 1, 3, −2, 2, −1, 4, −3, −4, 5, 0, 0}; {4, 1, 0, 4, 1, −1, 3, −4, 5, −4, 0, 0}; {5, −2, 5, 5, −1, −5, 5, 5, 5, −2, 0, 0}; {0, 3, −4, −5, 0, 6, 1, 0, −3, 1, 0, 0}; {, −1, 4, −1, 0, −2, 2, −2, −5, 5, −4, 0, 0}; {2, 0, 0, 6, 1, 5, −2, 4, 4, −4, 0, 0}; {5, 3, 3, −3, 4, 6, 0, 5, 4, −3, 0, 0}; {, −2, 4, 0, 2, 6, 6, −1, 4, 2, 0, 0, 0}; {, −3, 6, 5, −2, 5, −4, 1, 6, 5, −2, 0, 0}; {, −3, 2, −3, −2, 3, −2, −4, −5, 5, −1, 0, 0}; {, −3, 0, 5, 5, −2, 4, −1, −1, −4, 1, 0, 0}; {, −4, 2, −2, 1, 1, 6, 1, 3, 5, 4, 0, 0}; {3, −4, 3, 5, 4, −2, 4, 5, −5, 5, 0, 0}; {, −4, 3, 0, 4, −5, −1, −1, −5, 0, 1, 0, 0}; {, −4, 4, 2, −5, 0, 3, −2, −5, −3, −1, 0, 0}; {6, 2, 0, 5, −1, 1, −3, −5, −3, −1, 0, 0}; {4, −1, −4, 0, 5, 6, 2, −2, −1, 1, 0, 0}; {4, 0, −2, 3, −3, 0, −4, 6, −3, −1, 0, 0}; {4, 0, −2, 3, −3, 0, −4, −4, −5, −3, 0, 0}; {3, −1, −3, 2, −4, −1, −5, −4, −5, −3, 0, 0}; {1, −4, 5, −3, 2, 4, 0, −1, −3, −1, 0, 0}; {, −1, 6, 3, −5, 0, 3, −1, −1, −3, −3, 0, 0}; {, −4, 1, −3, −1, −5, 0, −3, 6, 6, −5, 0, 0}; {6, 2, 1, 6, −1, 2, −3, 6, −2, 0, 0, 0}; {4, −1, −3, 1, 5, −5, 2, −2, 0, 1, 0, 0}; {4, 0, −1, 4, −3, 1, −4, 5, −3, −1, 0, 0}; {1, −4, 6, −2, 3, 5, 0, −3, −1, 1, 0, 0}; {6, 1, −1, 4, −2, 0, −4, −3, −5, −2, 0, 0}; {, −2, 2, −3, −1, −5, 1, −3, 6, 6, −5, 0, 0}; {2, 2, 5, 3, −4, 1, −4, −1, 4, 4, 0, 0}; {3, −2, −4, 1, 4, −5, 0, −3, −1, 1, 0, 0}; {4, −1, −3, 2, 5, −4, 3, −2, 0, 0, 0, 0}; {3, −2, −4, 1, 4, −4, −3, 5, −1, 1, 0, 0}; {2, 0, 1, −3, 3, 1, −4, 3, 5, −3, 0, 0}; {0, −3, −3, 4, −3, 6, 0, 6, −4, −2, 0, 0}; {2, −3, −5, 0, 4, 6, 0, −3, −1, 1, 0, 0}; {2, −2, −3, 3, −4, −1, −5, 6, −5, −3, 0, 0}; {1, −3, −4, 2, −5, −1, −5, 5, −4, −2, 0, 0}; {, −2, 3, −1, 2, 4, 5, −1, 5, 4, 2, 0, 0}; {, −1, 6, 4, −3, 2, 3, −1, −3, −2, 0, 0, 0}; {, −2, 6, 5, −1, 5, −4, 4, 6, 6, −2, 0, 0}; {, −1, 6, 4, −3, 2, 4, −1, −4, −1, 1, 0, 0}; {, −2, 5,

3, −4, 1, 3, −1, −4, −2, 0, 0, 0}; {, −1, −5, 6, 0, 6, −3, 6, 5, −5, −2, 0, 0}; {, −1, −4, −4, 3, −2, 3, 0, 2, 4, −4, 0, 0}; {, −5, 1, −2, 2, 6, −4, 3, 1, −1, 0, 0, 0}; {, −4, 4, 3, −2, 4, −5, 3, 5, 5, −3, 0, 0}; {, −1, 4, 0, 4, −1, −4, −3, −1, −5, −5, 0, 0}; {, −2, 3, −1, 3, −1, −4, −3, −1, −5, −5, 0, 0}; {, −3, 3, 0, 5, 3, 6, −2, 4, 5, 1, 0, 0}; {2, 3, −5, −5, 1, −3, 3, −4, 2, 2, 0, 0}; {, −3, 4, 2, −4, −4, 0, 5, 0, 3, 0, 0, 0}; {6, 1, −1, 5, 5, −2, 5, −3, 2, 0, 0, 0}; {2, 6, 1, 4, 2, −2, 3, 4, −5, 5, 0, 0}; {, −3, −3, 0, −1, 5, 0, 5, −2, 4, 4, 0, 0}; {, −3, −3, 0, −1, 5, 0, 6, −2, 4, 4, 0, 0}; {3, −5, 2, 5, 3, −2, 4, −5, 6, 0, 0}; {, −1, −4, −4, 4, −4, 5, 0, 6, −4, −3, 0, 0}; {2, −4, 5, −2, 0, −4, 0, 3, 3, 0, 0, 0}; {2, −2, −3, 4, −4, 1, −5, 5, −3, −1, 0, 0}; {, −2, 3, −1, 3, 4, 6, −1, 5, 4, 2, 0, 0}; {, −3, 2, −2, 2, 3, 6, −2, 4, 3, 1, 0, 0}; {, −3, 2, −2, 2, 3, 6, −2, 4, 3, 2, 0, 0}; {, −2, −5, −5, 3, −4, 4, 0, 6, −4, −2, 0, 0}; {5, −2, 6, −1, 1, 6, −5, 2, 1, −1, 0, 0}; {5, −1, −4, 2, 5, −3, −5, −4, 1, 2, 0, 0}; {3, −3, 6, 0, 4, −3, 6, 6, 0, 1, 0, 0}; {, −2, 4, 1, −5, −1, 4, 5, 1, −1, −1, 0, 0}; {3, −5, 2, 6, −4, 0, −1, 5, 3, 1, 0, 0}; {4, −3, 5, −2, 1, 6, −5, 3, 1, −2, 0, 0}; {6, −1, −5, 0, 4, −4, −4, 4, 1, −1, 0, 0}; {, −4, 2, −1, 5, −1, 2, 3, 5, 5, 3, 0, 0}; {, −5, 1, −2, 4, −2, 1, 3, 4, 4, 3, 0, 0}; {, −4, 3, 1, −4, 3, −5, −2, 0, 2, 1, 0, 0}; {4, −3, 5, −2, 3, 5, −4, −5, 3, 1, 0, 0}; {, −3, 2, −2, 3, −4, −4, 4, 1, −1, −2, 0, 0}; {, −1, 5, 2, −4, 2, 3, 4, 6, 5, 4, 0, 0}; {1, 5, 0, 4, −4, −4, 1, 0, 4, 2, 0, 0}; {0, 4, −1, 3, −4, −4, 0, −1, 4, 2, 0, 0}; {5, −2, 6, −1, 5, 6, −5, −4, 6, 5, 0, 0}; {6, 0, −3, 3, −2, 0, 2, 4, 4, 3, 0, 0}; {, −2, 2, −3, 1, 6, −5, −1, −2, 4, 1, 0, 0}; {6, 1, −1, 6, 2, 6, −3, 0, 2, 1, 0, 0}; {, −4, 0, −5, −1, 4, 1, −1, 5, 3, −1, 0, 0}; {0, 4, −1, 3, −3, −3, −4, 3, 0, −3, 0, 0}; {, −5, −1, 6, −2, 4, 1, 0, 1, −3, −4, 0, 0}; {, −4, 0, −5, −1, 6, −5, 6, 2, −2, −4, 0, 0}; {, −3, 2, −2, 3, −1, 1, 2, −1, 6, 6, 0, 0}; {6, 1, −1, 6, 5, −3, 2, −5, 0, 0, 0, 0}; {6, 0, −3, 3, 1, 5, −4, 2, 4, 1, 0, 0}; {, −2, −1, 3, 4, −2, 6, 0, 6, 1, 2, 0, 0}; {1, −5, 4, −2, −3, 2, 5, −1, 1, 0, 0, 0}; {0, 4, −1, 3, 1, −4, 3, 4, 6, 5, 0, 0}; {, −4, −4, −1, −1, 5, 0, 6, −2, 4, 3, 0, 0}; {, −3, −2, 2, 3, −2, 6, 1, 6, 1, 2, 0, 0}; {, −4, −3, 1, 2, −3, 5, 0, 6, 1, 2, 0, 0}; {6, 6, −3, −3, 3, −1, 4, −2, 3, 4, 0, 0}; {6, −3, 3, 6, 3, −5, 6, −2, −5, 3, 0, 0}; {, −3, 3, 0, 6, −5, −1, −4, −1, 3, 2, 0, 0}; {, −4, 1, −3, 2, 2, −5, −5, 1, 3, 1, 0, 0}; {, −5, −1, 6, −2, −3, 1, 2, −5, 4, 2, 0, 0}; {, −5, −1, 6, −2, −3, 2, 0, 5, 5, 2, 0, 0}; {5, −4, 2, 5, 3, −5, 4, −3, −5, 3, 0, 0}; {4, −5, 1, 4, 3, −5, 3, −3, −5, 3, 0, 0}; {, −5, 1, −2, 4, 6, −2, −5, −3, 2, 2, 0, 0}; {5, −2, 6, −1, 0, 3, −1, 0, 5, 3, 0, 0}; {, −4, 2, −1, 5, −5, 1, 3, −2, −1, −2, 0, 0}; {3, −5, 2, −5, −5, −1, 0, 5, 3, 1, 0, 0}; {, −1, 2, −4, 0, −1, 4, 0, −5, 6, 1, 0, 0}; {5, −4, 2, 6, 5, 1, −5, 6, 6, 0, 0, 0}; {3, −4, 4, −2, −1, 2, −2, 0, 4, 3, 0, 0}; {4, −2, −5, 2, 4, −4, 6, −4, 1, 2, 0, 0}; {2, −5, 3, −3, −2, 1, −2, −1, 4, 3, 0, 0}; {2, −5, 3, −3, −2, 1, −2, 0, 4, 3, 0, 0}; {3, −3, 6, 1, 4, −4, 6, 6, 0, 2, 0, 0}; {2, −3, −5, 3, −4, 1, 0, 2, −4, 0, 0, 0}; {, −2, 3, −1, 5, −4, −1, −2, 6, 2, 1, 0, 0}; {0, 6, 3, −2, 2, −5, 4, 4, −1, 0, 0, 0}; {2, −5, 3, −3, 0, 5, 6, 1, 0, −2, 0, 0}; {2, −5, 3, −3, 0, 5, 6, 2, 0, −2, 0, 0}; {1, −4, 6, 2, −4, 0, −1, 2, −4, 0, 0, 0}; {, −1, 5, 2, −3, 2, 6, 3, 4, −2, 0, 0, 0}; {2, −4, 5, 0, 5, −2, 2, 4, 4, 4, 0, 0}; {4, −3, 5, −1, 3, −5, −5, 3, 0, −1, 0, 0}; {, −2, 2, −3, 2, 5, −3, −3, 4, 2, −1, 0, 0}; {, −4, −1, 5, −3, −1, −5, 4, −4, 6, 0, 0, 0}; {, −2, 3, −1, 5, −3, −5, −4, −2, 6, 6, 0, 0}; {, −3, 3, 0, −5, 0, 2, 3, 5, 4, 3, 0, 0}; {, −5, 1, −2, 5, −1, 1, 3, 5, 4, 3, 0, 0}; {, −3, 2, −2, 4, −3, −1, 6, 6, 0, 0, 0, 0}; {5, −1, −4, 3, −3, 0, 2, 4, 4, 3, 0, 0}; {4, −2, −5, 2, −4, −1, 2, 4, 4, 3, 0, 0}; {1, −5, 4, −1, 5, −3, 1, 4, 4, 3, 0, 0}; {0, 6, 3, −2, 4, −4, 0, 4, 3, 3, 0, 0}; {1, −4, 6, 2, −3, 2, −5, 0, 1, 1, 0, 0}; {1, −5, 4, −1, 5, −3, 2, 4, 4, 4, 0, 0}; {3, −3, 6, 1, −5, −1, 2, 4, 4, 3, 0, 0}; {2, −4, 5, 0, 6, −2, 1, 4, 4, 2, 0, 0}; {2, −4, 5, 0, 6, −2, 1, 4, 4, 3, 0, 0}; {, −2, 3, −1, 5, −2, 2, 4, −5, 5, 4, 0, 0}; {, −1, 5, 2, −3, 3, −4, 0, 3, 3, 3, 0, 0}; {, −5, −2, 4, −4, −1, −5, 4, −4, 6, 0, 0, 0}; {5, −4, 2, 6, −3, 6, 2, −4, 5, 0, 0, 0}; {, −4, 1, −3, 3, −4, −5, −5, −3, 6, 6, 0, 0}; {, −4, 2, −1, 6, 0, 1, 3, 5, 4, 3, 0, 0}; {5, −2, 6, 0, 6, 6, 6, −4, 6, 5, 0, 0}; {5, −2, 6, 0, 6, 6, −5, −4, 6, 5, 0, 0}; {3, −3, 6, 1, −4, −2, 1, 3, 3, 2, 0, 0}; {2, −5, 3, −3, 3, 4, 6, −5, 5, 4, 0, 0}; {0, 5, 1, −5, 1, 2, 5, 6, 4, 4, 0, 0}; {, −4, 1, −3, 3, −3, −1, 5, 6, 0, 0, 0, 0}; {2, −4, 5, 0, −5, −2, 1, 3, 3, 2, 0, 0}; {3, −2, −4, 4, 0, 4, −4, −1, 1, 0, 0, 0}; {0, 5, 1, −5, 1, 3, 5, −5, 6, 4, 0, 0}; {, −3, 2, −2, 4, −2, 1, 4, −4, 6, 4, 0, 0}; {, −1, 5, 2, −3, 4, −4, 0, 4, 4, 3, 0, 0}; {, −3, 3, 0, −5, 2, 6, −1, 3, 4, 3, 0, 0}; {4, −5, 1, 5, −3, 5, 2, −5, 5, −1, 0, 0}; {3, 6, 0, 4, −4, 5, 2, −5, 5, 0, 0, 0}; {2, 5, −1, 3, −4, 5, 3, 3, −2, −3, 0, 0}; {1, 5, 0, 5, −1, −3, −2, −1, −5, −5, 0, 0}; {4, −4, 3, −4, 2, 1, −4, −5, 1, 0, 0, 0}; {, −2, 3, −1, 5, 0, 1, 4, 5, 4, 4, 0, 0}; {, −3, 1, −4, 1, −5, −5, −3, −2, −5, 6, 0, 0}; {, −3, 1, −4, 1, −5, −5, −1, −2, 4, 2, 0, 0}; {3, 6, 0, 4, −3, 5, 2, −5, 5, 0, 0, 0}; {2, 6, 1, 6, 1, −2, −2, −1, −4, −5, 0, 0}; {4, −4, 3, −4, 3, 5, 5, 1, −4, −5, 0, 0}; {, −4, −1, 5, −3, 4, 1, 3, 1, −4, 6, 0, 0}; {, −5, −5, −2, −1, 4, −1, 4, −2, 4, 3, 0, 0}; {, −4, 1, −3, 3, 1, 6, −4, 1, 2, 1, 0, 0}; {6, −2, 5, −2, −5, 0, 0, 5, 4, 2, 0, 0}; {5, 5, −4, −3, 3, −3, 4, −3, 4, 3, 0, 0}; {4, 4, −5, −4, 2, −2, 4, −3, 3, 3, 0, 0}; {6, −2, 5, −2, −4, 0, 1, 5, 4, 2, 0, 0}; {, −5, 0, −4, 2, 1, 6, −4, 1, 2, 1, 0, 0}; {6, −2, 5, −2, −4, 0, 1, 6, 4, 2, 0, 0}; {5, −3, 4, −3, −5, 0, 0, 5, 4, 1, 0, 0}; {5, −3, 4, −3, −5, 0, 0, 5, 4, 2, 0, 0}; {5, 1, 0, −3, 0, 6, −3, −4, −1, −4, 0, 0}; {, −5, 1, −2, 5, 6, −2, 6, −3, 2, 1, 0, 0}; {4, −3, 5, −1, −1, 3, −2, 1, 4, 3, 0, 0}; {3, −4, 4, −2, −2, 2, −2, 0, 4, 3, 0, 0}; {, −4, 2, −1, 6, −5, 1, 3, −2, 0, −2, 0, 0}; {3, 6, 0, 4, 2, 5, 5, −3, 6, 3, 0, 0}; {4, −4, 3, −4, −5, −1, 1, 6, 4, 2, 0, 0}; {2, 6, 1, −5, 6, −1, −2, 3, 4, 1, 0, 0}; {3, −4, 4, −1, −1, 5, 6, −1, 1, 0, 0, 0}; {0, 3, −3, 2, 0, 4, 3, −5, 5, 3, 0, 0}; {3, −3, 6, 2, 3, −2, 1, −5, −2, −2, 0, 0}; {, −1, 2, −4, 1, −1, 3, 3, −5, 5, 3, 0, 0}; {, −1, 2, −4, 1, −1, 3, 4, −4, 5, 2, 0, 0}; {0, 5, 1, −4, −4, 0, −3, −1, 3, 3, 0, 0}; {2, −3, −5, 4, −4, 1, 0, 2, −3, 0, 0, 0}; {, −2, 3, −1, 6, −4, 0, −4, −4, 2, 1, 0, 0}; {, −1, 5, 2, −2, 2, 5, 4, 6, 0, 2, 0, 0}; {6, −3, 3, −4, −3, −3, 6, 3, −4, 5, 0, 0}; {, −2, 5, 3, 0, 5, −1, −2, 0, −5, −1, 0, 0}; {, −4, 0, −5, 1, 3, −4, −4, 2, 1, −1, 0, 0}; {, −5, −2, 4, −3, −2, 2, 1, 6, 4, 1, 0, 0}; {5, −2, 6, 1, 5, −5, 6, −5, 6, 5, 0, 0}; {, −4, 1, −3, 4, −4, −1, 6, 6, 0, 0, 0, 0}; {, −4, 0, −5, 1, 4, −4, −4, 3, 1, −2, 0, 0}; {, −5, −1, 6, 0, 3, −4, −4, 3, 1, −2, 0, 0}; {5, −4, 2, −5, −3, 6, 2, −5, 5, 0, 0, 0}; {4, −5, 1, 6, −4, 5, 2, −5, 5, −1, 0, 0}; {, −5, 0, −4, 3, −5, 6, −5, −3, 6, 5, 0, 0}; {, −5, −1, 6, 0, 4, 5, −2, −2, 3, 1, 0, 0}; {6, −2, 5, −1, 3, 4, −2, −3, 3, 1, 0, 0}; {, −3, 1, −4, 2, 6, −3, −3, 4, 1, −1, 0, 0}; {3, 6, 0, 5, −4, 5, 2, −5, 5, 0, 0, 0}; {6, −2, 5, −1, 4, 2, −3, −3, 1, 2, 0, 0}; {3, −5, 2, −4, 1, −1, −2, −1, −4, −5, 0, 0}; {6, −2, 5, −1, 4, 3, −3, −3, 2, 2, 0, 0}; {5, −3, 4, −2, 3, 2, −3, −3, 1, 2, 0, 0}; {2, −5, 3, −2, 4, 4, 5, −5, 5, 5, 0, 0}; {5, −4, 2, −5, −1, −2, 2, 1, 5, 3, 0, 0}; {6, −2, 5, −1, 4, 4, −3, −3, 3, 2, 0, 0}; {, −2, 3, −1, 6, 0, 2, 5, 6, 5, 4, 0, 0}; {4, −5, 1, 6, −2, −2, 2, 1, 5, 2, 0, 0}; {5, −3, 4, −2, 3, 4, −3, −3, 2, 1, 0, 0}; {, −5, 0, −4, 3, −3, −1, 5, 5, 0, 0, 0, 0}; {5, −3, 4, −2, 3, 4, −3, −4, 3, 1, 0, 0}; {5, −3, 4, −2, 3, 4, −2, −3, 3, 1, 0, 0}; {, −4, 1, −3, 4, −2, 1, 4, 6, 5, 4, 0, 0}; {6, −2, 5, −1, 4, −5, −5, 2, −1, −3, 0, 0}; {6, −1, −5, 2, −4, 0, 3, 6, 5, 4, 0, 0}; {, −1, 3, −2, 4, −2, −3, −3, −2, −5, 6, 0, 0}; {, −5, −1, 6, 0, 6, 6, −3, −4, 6, 5, 0, 0}; {, −5, −1, 6, 0, 6, 6, −3, −3, 3, 2, 0, 0}; {4, −5, 1, 6, −1, −2, 1, 0, 5, 3, 0, 0}; {4, −5, 1, 6, −1, −2, 1, 0, 6, 4, 0, 0}; {3, 6, 0, 5, −2, −3, 1, 0, 5, 3, 0, 0}; {4, −4, 3, −3, 3, 3, −4, −4, 2, 2, 0, 0}; {4, −4, 3, −3, 3, 4, −4, −4, 2, 1, 0, 0}; {4, −4, 3, −3, 3, 4, −4, −4, 3, 2, 0, 0}; {5, −3, 4, −2, 4, 5, −3, −4, 3, 1, 0, 0}; {2, 5, −1, 4, −3, −3, 1, 0, 5, 2, 0, 0}; {3, −5, 2, −4, 2, 3, −4, −4, 2, 1, 0, 0}; {, −2, 1, −5, 0, 6, 3, 1, 1, −2, −4, 0, 0}; {, −3, 0, 6, −1, 5, 2, 1, 1, −3, −4, 0, 0}; {, −3, 0, 6, −1, 5, 2, 2, 1, −3, −4, 0, 0}; {4, −5, 1, 6, 0, −1, 1, 0, 6, 4, 0, 0}; {5, −3, 4, −2, 5, 5, −3, −4, 3, 2, 0, 0}; {4, −4, 3, −3, 4, 5, −4, −4, 3, 2, 0, 0}; {1, 5, 0, 6, 1, 4, 4, 0, −4, −5, 0, 0}; {, −1, 3, −2, 4, 0, 3, 3, 0, 6, 6, 0, 0}; {3, −5, 2, −4, 6, −1, 0, 5, 3, 2, 0, 0}; {2, 6, 1, −5, 5, −2, −1, 4, 3, 1, 0, 0}; {, −4, −2, 3, −4, 5, −4, −5, −2, −5, 4, 0, 0}; {, −4, 0, −5, 2, 3, −4, −3, 3, 1, −1, 0, 0}; {4, −5, 1, −5, −4, 5, 1, 6, 4, −1, 0, 0}; {5, −3, 4, −1, 2, 4, −2, −2, 4, 1, 0, 0}; {1, 3, −4, 1, 2, −2, 6, −2, −5, 1, 0, 0}; {0, 2, −5, 0, 1, −3, 5, −3, 6, 0, 0, 0}; {4, −3, 5, 1, 5, 4, 6, −4, 5, 5, 0, 0}; {1, 5, 0, −5, −1, −3, −3, −1, −5, −5, 0, 0}; {, −2, 0, 5, −2, 0, −3, 4, −3, 6, 1, 0, 0}; {1, 6, 2, −2, 3, 3, 5, −5, 5, 4, 0, 0}; {3, −5, 2, −3, 1, 3, −3, −3, 3, 1, 0, 0}; {1, 4, −2, 4, −5, −1, −2, 4, 2, −1, 0, 0}; {1, 5, 0, −5, 0, −1, −3, −2, −5, −5, 0, 0}; {2, 5, −1, 5, −3, −4, 1, 0, 5, 3, 0, 0}; {3, −5, 2, −3, 2, 2, −4, −4, 2, 1, 0, 0}; {1, 4, −2, 4, −4, −4, 1, 0, 5, 2, 0, 0}; {2, 6, 1, −4, 1, 2, −4, −4, 2, 1, 0, 0}; {0, 3, −3, 3, −5, −5, 0, −1, 5, 2, 0, 0}; {6, −3, 3, −3, 2, 0, 0, 0, −4, −5, 0, 0}; {6, −2, 5, 0, 6, 5, −5, −4, 5, 5, 0, 0}; {1, 4, −2, 4, −3, −5, 0, −1, 4, 3, 0, 0}; {, −4, −1, 5, −1, 4, 2, 0, 1, −3, −4, 0, 0}; {, −4, 0, −5, 2, −4, −5, −5, −3, 6, 6, 0, 0}; {3, 6, 0, 6, −1, −2, −1, −1, −5, 6, 0, 0}; {2, 5, −1, 5, −2, −3, 0, −1, 5, 3, 0, 0}; {2, 6, 1, −4, 2, 2, −5, −5, 2, 1, 0, 0}; {1, 5, 0, −5, 1, 1, −5, −5, 1, 1, 0, 0}; {0, 3, −3, 3, −4, −5, 0, −1, 4, 2, 0, 0}; {0, 3, −3, 3, −4, −4, 0, −1, 4, 2, 0, 0}; {, −3, 1, −4, 3, −3, −2, 6, 5, 0, −1, 0, 0}; {2, 5, −1, 5, −1, −3, 0, −1, 5, 4, 0, 0}; {3, −5, 2, −3, 4, 3, −5, −4, 2, 2, 0, 0}; {2, 6, 1, −4, 3, 3, −5, −5, 2, 1, 0, 0}; {0, 3, −3, 3, −3, −4, −1, −1, 4, 3, 0, 0}; {, −1, 3, −2, 5, 0, 1, 6, 6, 1, 0, 0, 0}; {, −3, 0, 6, 0, 6, −5, −2, −2, 4, 2, 0, 0}; {, −5, −1, 6, 1, −4, 2, 3, −5, 5, 4, 0, 0}; {, −2, 1, −5, 2, −2, 3, 3, 6, 5, 4, 0, 0}; {6, −4, 1, −5, 3, −5, 6, −3, 6, 4, 0, 0}; {, −4, −1, 5, 0, −2, 3, 1, 4, 5, 1, 0, 0}; {, −2, 0, 5, −1, 0, −4, 3, −4, 5, 0, 0, 0}; {6, −5, −1, 4, 5, 0, −5, −1, −5, 1, 0, 0}; {, −2, 1, −5, 2, 5, −5, 0, −1, 4, 1, 0, 0}; {0, 4, −1, −5, −1, 5, 5, 0, −2, −3, 0, 0}; {, −1, 2, −4, 3, −4, 5, 0, −1, 3, 3, 0, 0}; {, −2, 1, −5, 2, −5, 5, −1, −2, 3, 3, 0, 0}; {4, 6, −1, 5, −3, 6, 3, 3, −1, −3, 0, 0}; {, −4, −1, 5, 0, 5, 6, −1, −2, 3, 1, 0, 0}; {, −3, 0, 6, 1, −5, 6, −2, −3, 3, 3, 0, 0}; {6, −3, 3, −2, 4, −5, −5, 2, 0, −2, 0, 0}; {6, −5, −1, 5, 4, 0, −5, −1, 6, 0, 0, 0}; {, −5, −3, 2, −3, −2, 5, 1, 5, 2, −2, 0, 0}; {, −5, −3, 2, −3, −2, 5, 1, 6, 3, −1, 0, 0}; {, −5, −2, 4, 0, 2, 6, −1, −2, 3, 0, 0, 0}; {, −4, 0, −5, 4, −4, 3, 3, −1, −3, −4, 0, 0}; {, −2, −2, 1, −5, 0, −3, 3, −4, −4, 4, 0, 0}; {, −3, −3, 0, 6, 4, −4, 2, −2, −1, 4, 0, 0}; {5, 5, −4, 3, 2, 6, 0, −4, −2, 4, 0, 0}; {1, −1, 0, 5, 2, 4, −3, 3, 2, −5, 0, 0}; {, −5, −4, 0, −4, −3, 1, −3, 3, 6, 4, 0, 0}; {, −3, −2, 2, −1, 4, 3, −3, 2, 5, 2, 0, 0}; {6, −2, 5, 5, 2, 6, 1, −2, −5, −3, 0, 0}; {1, −1, 0, 6, 2, 4, −2, 3, 3, −4, 0, 0}; {, −5, 2, 0, 3, −4, −3, 4, −1, 0, −2, 0, 0}; {, −1, 3, −1, −1, 6, −3, 4, 1, −4, −2, 0, 0}; {, −1, −2, 1, −4, 0, −2, 4, −4, −4, 5, 0, 0}; {, −3, 1, −3, −2, 5, −4, 3, 1, −4, −3, 0, 0}; {1, −3, −3, 2, −4, −1, −5, 5, −4, −1, 0, 0}; {, −3, 5, 5, −1, 5, −4, 4, 6, 6, −2, 0, 0}; {, −3, 5, 5, −1, 5, −4, 5, 5, 6, −4, 0, 0}; {, −5, 2, 1, 6, 2, −4, −1, −2, 1, 3, 0, 0}; {3, −1, −1, 5, −4, 1, −3, 5, −2, −1, 0, 0}; {, −1, 6, 5, −2, 0, 6, 0, 4, 0, −1, 0, 0}; {4, 0, 0, 6, −2, 2, −3, 6, −3, −3, 0, 0}; {0, −5, 6, −1, 3, 5, 0, −3, −1, 0, 0, 0}; {, −2, 5, 4, −3, 1, 4, −1, −4, −1, 0, 0, 0}; {, −4, 2, 0, 4, −5, −2, 4, −1, 1, 1, 0, 0}; {, −5, 4, 5, 0, 6, 3, −2, 4, −5, −3, 0, 0}; {1, −4, −5, 1, 5, 1, −5, −1, 0, 0, 0, 0}; {3, −1, −1, 6, −1, −4, 2, −5, −3, −1, 0, 0}; {, −2, 4, 2, −5, −2, 6, −1, 1, 2, 1, 0, 0}; {6, 0, −2, 3, 6, −3, 3, −1, 1, 1, 0, 0}; {6, 1, 0, 6, −2, 2, −3, 6, −2, 0, 0, 0}; {5, −2, −5, −1, 1, 3, −3, 3, 3, 2, 0, 0}; {4, −2, −4, 1, 4, −3, −3, 5, −1, 1, 0, 0}; {4, 0, 0, −5, 1, 5, 1, 4, 4, −3, 0, 0}; {, −4, 3, 2, −4, −5, −1, 4, −1, 2, 0, 0, 0}; {, −5, −5, −1, −2, 3, −2, 4, −3, 3, 4, 0, 0}; {5, 0, −1, 5, 5, −3, 3, −2, 1, −1, 0, 0}; {6, 2, 2, −3, −2, 3, −2, 6, −2, −2, 0, 0}; {6, 6, −2, −3, 3, −2, 4, −3, 3, 4, 0, 0}; {5, 5, −3, −4, 2, −3, 3, −4, 3, 4, 0, 0}; {0, 6, 4, −3, −3, 1, −5, 1, 3, 1, 0, 0}; {6, 1, 0, 6, −5, 4, −2, 3, −1, 0, 0, 0}; {1, 5, 1, 4, 3, −3, 1, −1, −4, 6, 0, 0}; {3, −1, −1, 6, −3, 1, −4, 6, −3, −2, 0, 0}; {5, 1, 1, −4, 0, −3, 3, −4, −3, −1, 0, 0}; {5, 2, 3, −1, 4, 2, −3, 4, 6, −3, 0, 0}; {2, −4, 6, −1, 1, −4, 1, 4, 2, 0, 0, 0}; {4, 0, 0, −5, −1, −4, 3, −4, −4, −2, 0, 0}; {3, −1, −1, 6, −2, −5, 2, −5, −3, −3, 0, 0}; {3, −1, −1, 6, −2, −5, 2, −5, −3, −2, 0, 0}; {0, 6, 4, −3, −1, −5, 0, 2, 3, 1, 0, 0}; {, −3, 3, 1, 6, −4, −1, 5, 0, 1, 0, 0, 0}; {, −3, 4, 3, −3, 0, 4, −1, −5, −1, 0, 0, 0}; {6, 3, 4, 0, 5, 1, −2, 4, −5, −3, 0, 0}; {6, 0, −2, 3, 5, −1, 4, 6, 2, 0, 0, 0}; {6, 3, 4, 0, 5, 2, −2, 4, −5, −3, 0, 0}; {5, 1, 1, −4, 0, −4, 3, −3, −3, −2, 0, 0}; {3, 0, 1, −2, 3, 1, −4, 2, 6, −4, 0, 0}; {, −2, 5, 4, −1, 2, −1, 5, −3, −1, −1, 0, 0}; {, −2, 5, 4, −1, 2, −1, 5, −2, −2, −2, 0, 0}; {, −5, 1, −1, 5, −5, 3, −3, 0, 1, −1, 0, 0}; {4, −2, −4, 2, 4, −4, −3, 5, −1, 1, 0, 0}; {, −1, 5, 3, −3, 0, 5, 6, 3, −1, 0, 0, 0}; {2, −1, 0, −3, 3, 1, −5, 2, 5, −4, 0, 0}; {1, 5, 1, 5, 6, −5, 5, 1, 5, 5, 0, 0}; {0, 6, 4, −2, 2, −5, 5, 5, −1, 1, 0, 0}; {, −1, 5, 3, −3, 1, −5, 4, 4, −1, 1, 0, 0}; {, −2, 4, 2, −4, 0, −5, 3, 3, −1, 1, 0, 0}; {5, −1, −3, 3, −3, 1, 2, 4, 4, 3, 0, 0}; {4, −2, −4, 2, −4, 0, 2, 3, 4, 3, 0, 0}; {, −4, 2, 0, 6, 1, 5, −2, 3, 4, 2, 0, 0}; {, −3, 4, 3, −2, 6, −1, 5, −1, 1, 1, 0, 0}; {4, −1, −2, 5, 1, 6, −4, −1, 2, 0, 0, 0}; {1, −5, 5, −1, 6, −2, 0, 2, 3, 2, 0, 0}; {, −5, 0, −3, 2, −4, 0, 2, 6, 4, 3, 0, 0}; {, −5, 1, −1, 5, 1, 5, −2, 3, 4, 2, 0, 0}; {5, −2, −5, 0, −5, −1, 1, 5, 4, 3, 0, 0}; {6, 0, −2, 4, 0, 5, −4, 1, 2, 1, 0, 0}; {4, −3, 6, −1, 6, −2, 0, 5, 4, 2, 0, 0}; {5, −1, −3, 3, −1, 4, −4, 1, 2, 2, 0, 0}; {1, 4, −1, 2, −5, 3, 1, 6, 5, −1, 0, 0}; {1, 4, −1, 2, −4, 4, 1, 6, 5, −1, 0, 0}; {6, 0, −2, 4, 1, 5, −4, 2, 4, 1, 0, 0}; {4, −2, −4, 2, −1, 3, −5, 1, 3, 1, 0, 0}; {3, −4, 5, −2, 6, −2, 0, 5, 4, 2, 0, 0}; {4, −1, −2, 5, 4, −4, 2, −5, 0, −1, 0, 0}; {4, −1, −2, 5, 4, −3, 2, −4, 0, −1, 0, 0}; {3, −2, −3, 4, 3, −4, 1, −5, −1, −1, 0, 0}; {3, −3, −5, 1, −1, 3, −5, 1, 3, 0, 0, 0}; {3, −3, −5, 1, −1, 3, −5, 2, 4, 1, 0, 0}; {3, −3, −5, 1, −1, 3, −4, 2, 4, 1, 0, 0}; {2, −3, −4, 3, 2, −5, 2, −5, 0, 0, 0, 0}; {, −2, 3, 0, 5, 2, −5, −3, 2, 3, 2, 0, 0}; {2, −3, −4, 3, 3, −5, 1, −3, 0, 0, 0, 0}; {2, −3, −4, 3, 3, −4, 1, −3, 0, −1, 0, 0}; {, −3, 2, −1, 4, 2, 6, −3, 3, 3, 1, 0, 0}; {3, 3, −5, −5, 1, −4, 3, −4, 2, 3, 0, 0}; {, −5, −3, 3, 5, 1, −2, 6, 0, −4, −1, 0, 0}; {4, 5, −2, −1, 6, 3, −3, 3, −1, 1, 0, 0}; {0, −5, 6, 1, 2, −5, 0, −4, 0, −1, 0, 0}; {, −2, 4, 2, −4, −4, 0, 5, 0, 2, 0, 0, 0}; {, −3, 3, 1, −5, −5, −1, −5, −1, 3, 1, 0, 0}; {, −2, −2, 2, 2, −3, 6, −1, 6, 1, 3, 0, 0}; {4, −2, −4, 2, 3, −3, 3, 6, 1, 0, 0, 0}; {, −4, 1, −2, 4, 6, −2, −3, 6, 1, 2, 0, 0}; {, −3, 2, −1, 5, −4, 0, −4, −4, 2, 1, 0, 0}; {, −4, 1, −2, 4, −5, −1, −4, −5, 1, 2, 0, 0}; {, −3, 3, 1, −4, 0, 5, 3, 3, −2, 0, 0, 0}; {, −3, 3, 1, −4, 0, 5, 3, 4, −1, 0, 0, 0}; {, −5, 0, −3, 3, 6, −2, −4, 6, 1, 1, 0, 0}; {6, −1, −4, 2, 5, −3, −4, 5, 0, 1, 0, 0}; {, −5, 0, −3, 3, 6, −2, −3, 5, 1, 1, 0, 0}; {5, −2, −5, 1, 4, −4, −4, 5, 1, 0, 0, 0}; {, −3, 3, 1, −4, 0, 6, 3, 3, −2, 0, 0, 0}; {, −4, 2, 0, −5, −1, 5, 2, 3, −2, 0, 0, 0}; {3, −4, 5, −1, 2, −5, −5, 3, 0, 0, 0, 0}; {2, 5, 0, 4, 6, −5, 4, 1, −5, 3, 0, 0}; {, −1, 4, 1, −5, −1, 4, 5, 1, −1, −2, 0, 0}; {3, −4, 5, −1, 4, 6, 6, −5, 6, 4, 0, 0}; {6, −2, 6, −1, 3, 5, −2, −3, 3, 1, 0, 0}; {6, −2, 6, −1, 3, 5, −1, −2, 4, 1, 0, 0}; {5, −3, 5, −2, 2, 4, −2, −3, 3, 1, 0, 0}; {0, 3, −2, 2, 6, 3, 0, 6, 4, −1, 0, 0}; {0, 5, 2, −4, 2, 3, 5, 6, 5, 4, 0, 0}; {, −1, 4, 1, −5, 1, 3, 5, 6, 5, 3, 0, 0}; {0, 6, 4, −1, 6, −3, 0, 3, 3, 2, 0, 0}; {5, −4, 3, −5, −1, −1, 2, 0, −5, 3, 0, 0}; {1, −5, 5, 0, −5, −2, 0, 2, 3, 2, 0, 0}; {, −1, 6, 5, 1, −3, 2, 6, −3, 0, 0, 0, 0}; {, −3, 2, −1, 5, −1, 2, 4, 6, 5, 3, 0, 0}; {, −3, 3, 1, −4, 3, −5, −1, 2, 3, 2, 0, 0}; {, −5, 1, −1, 6, 1, 5, −2, 3, 3, 3, 0, 0}; {3, −5, 3, −4, 1, 3, −4, −4, 2, 1, 0, 0}; {, −5, 0, −3, 3, −3, 1, 3, 6, 5, 3, 0, 0}; {5, −2, −5, 1, −5, −1, 2, 6, 5, 4, 0, 0}; {, −2, 1, −4, 0, 5, 2, 0, 5, 4, −1, 0, 0}; {, −3, 1, −3, 2, −4, −4, −1, −3, 6, 3, 0, 0}; {, −5, 0, −3, 3, −2, 0, 3, 4, 4, 3, 0, 0}; {3, −3, −5, 2, −2, 1, 6, 2, 3, 0, 0, 0}; {3, −5, 3, −4, 2, 4, 6, −4, 5, 4, 0, 0}; {4, −3, 6, 0, −5, −2, 1, 6, 6, 3, 0, 0}; {3, −4, 5, −1, 6, −3, 0, 6, 6, 2, 0, 0}; {2, 6, 2, −5, 1, 4, 6, −3, 6, 4, 0, 0}; {3, −4, 5, −1, 6, −2, 1, 5, 4, 3, 0, 0}; {2, −5, 4, −2, 5, −3, 0, 4, 3, 2, 0, 0}; {3, −3, −5, 2, −2, 3, −4, 1, 3, 2, 0, 0}; {1, 5, 1, 6, 1, 3, 5, −5, 5, 4, 0, 0}; {2, −4, 6, 1, −2, 3, −5, 1, 3, 1, 0, 0}; {0, 6, 4, −1, −4, 1, 6, −1, 2, 1, 0, 0}; {, −1, 5, 3, −2, −4, 0, 6, −1, 2, 1, 0, 0}; {, −2, 2, −2, 3, −1, 2, 2, −1, 6, 6, 0, 0}; {, −1, 3, −1, 4, 0, 3, 3, 0, 6, 6, 0, 0}; {, −3, 3, 1, −4, −5, −1, 4, −3, 1, 0, 0, 0}; {, −4, 2, 0, −5, 6,

−1, 4, −2, 1, 0, 0, 0}; {5, −2, −5, 1, −1, 4, −5, 0, 2, 1, 0, 0}; {4, −4, 4, −3, 6, −1, 0, 5, 4, 2, 0, 0}; {4, −3, 6, 0, −1, 5, 6, 0, 2, 0, 0, 0}; {1, 4, −1, 3, 0, 4, 4, −3, 6, 3, 0, 0}; {2, 2, 6, −5, 1, −3, 3, −4, 2, 2, 0, 0}; {5, −1, −3, 4, 4, −2, 2, −4, 0, −1, 0, 0}; {, −1, 2, −3, 2, −1, 3, 3, −5, 5, 3, 0, 0}; {, −1, 2, −3, 2, −1, 3, 4, −4, 5, 3, 0, 0}; {, −3, 0, −5, 0, −3, 2, 1, 6, 5, 2, 0, 0}; {5, −5, 1, 5, 3, −5, 4, −4, −5, 4, 0, 0}; {6, −5, 0, 3, 1, −4, 1, −2, −2, 3, 0, 0}; {6, 0, −2, 6, −2, 3, 2, 2, −3, 0, 0, 0}; {6, 0, −2, 6, −2, 3, 2, 3, −3, 1, 0, 0}; {3, −5, 3, −3, 0, 3, −2, −3, 3, 1, 0, 0}; {, −3, 1, −3, 3, 6, −2, −3, 5, 1, 0, 0, 0}; {1, 3, −3, 1, 2, −2, 5, −3, 6, 0, 0, 0}; {, −2, 0, 6, −2, 0, −4, 4, −3, 6, 0, 0, 0}; {2, 6, 2, −4, 0, 2, −4, −4, 2, 0, 0, 0}; {2, 6, 2, −4, 0, 3, −4, −4, 2, 0, 0, 0}; {, −1, 1, −5, −1, 1, −4, 4, −3, 6, 0, 0, 0}; {3, −4, 5, 0, 5, 3, 5, −4, 5, 5, 0, 0}; {, −3, −1, 5, −3, 0, −4, 3, −3, 5, 1, 0, 0}; {, −3, −1, 5, −3, 0, −4, 4, −4, 6, 0, 0, 0}; {, −3, −1, 5, −3, 0, −4, 4, −3, 6, 1, 0, 0}; {, −4, −2, 4, −4, −1, −5, 4, −4, 6, 0, 0, 0}; {, −5, 1, −1, −5, 2, 6, −2, 1, 2, 2, 0, 0}; {5, −2, −5, 2, −4, −1, 2, 5, 4, 3, 0, 0}; {0, 3, −2, 3, −5, −4, 0, −1, 5, 2, 0, 0}; {1, 5, 1, −5, 0, 2, −4, −5, 2, 0, 0, 0}; {2, −5, 4, −1, 5, −3, 2, 5, 5, 4, 0, 0}; {1, 5, 1, −5, 0, 4, 5, 0, −2, −4, 0, 0}; {6, −4, 2, 6, −2, 6, 3, −4, 6, 0, 0, 0}; {, −4, 1, −2, 5, 0, 1, 3, 5, 4, 3, 0, 0}; {5, −3, 5, −1, 5, 5, −5, −4, 6, 5, 0, 0}; {, −2, 1, −4, 1, 6, 6, −1, −2, 4, 1, 0, 0}; {, −2, 1, −4, 1, 6, −5, −1, −2, 4, 1, 0, 0}; {, −1, 3, −1, 5, −1, 3, 3, 0, 5, 5, 0, 0}; {0, 3, −2, 3, −3, −4, −1, −2, −5, 6, 0, 0}; {2, 6, 2, −4, 3, 4, 6, −5, 5, 4, 0, 0}; {, −1, 2, −3, 2, −4, −4, −2, −2, −5, 5, 0, 0}; {, −1, 2, −3, 2, −4, −4, −2, −2, −5, 6, 0, 0}; {0, 4, 0, 6, 1, 2, 6, 6, 4, 5, 0, 0}; {, −4, −2, 4, −4, 1, 0, 3, 1, −5, 3, 0, 0}; {, −3, 1, −3, 3, −2, 2, 2, −1, 5, 5, 0, 0}; {6, −3, 4, −3, 4, 1, −1, 0, −4, −4, 0, 0}; {3, 6, 1, 6, 2, 5, 4, 1, −5, −5, 0, 0}; {, −2, 1, −4, 2, 1, −3, 4, 3, 5, −1, 0, 0}; {6, −4, 2, −5, 6, 1, −5, 6, 6, 0, 0, 0}; {, −5, −2, 5, −1, −1, −5, 2, 3, 3, −2, 0, 0}; {, −3, −2, 3, −5, 6, 2, −3, 0, −4, 1, 0, 0}; {, −3, −1, 5, −2, −1, −4, 4, −4, 6, 0, 0, 0}; {5, 5, −3, 0, −1, −5, 1, 3, −1, 4, 0, 0}; {1, 5, 1, −4, −1, 5, 6, 1, −1, −3, 0, 0}; {, −4, −2, 4, −3, −1, −5, 3, −4, 5, 0, 0, 0}; {, −2, 1, −4, 2, 5, −5, 0, −1, 4, 1, 0, 0}; {, −2, 1, −4, 2, 5, −5, 0, −1, 5, 1, 0, 0}; {, −3, −1, 5, −2, 1, −1, 4, 2, 6, 4, 0, 0}; {, −4, −1, 6, 0, 4, 5, −1, −2, 4, 1, 0, 0}; {, −3, 0, −5, 1, 5, −5, −1, −2, 4, 1, 0, 0}; {6, −2, 6, 1, −5, 5, −5, −3, 5, 5, 0, 0}; {4, −4, 4, −1, 5, 4, 6, −4, 5, 5, 0, 0}; {3, −5, 3, −2, 4, 4, 6, −5, 5, 5, 0, 0}; {, −2, 1, −4, 2, −5, −5, −1, −2, 4, 2, 0, 0}; {2, 5, 0, 6, 0, −2, −2, −1, −5, −5, 0, 0}; {5, −4, 3, −3, 3, 1, −2, −1, −4, −4, 0, 0}; {6, −4, 2, −5, 0, −1, 2, 1, 6, 3, 0, 0}; {5, −5, 1, −5, 5, 0, −5, 5, 6, 0, 0, 0}; {, −2, −5, −4, −3, 5, −2, 3, 0, 6, −5, 0, 0}; {4, 6, 0, 6, −4, 4, −1, 5, 2, −2, 0, 0}; {5, −5, 1, −5, −3, 5, 1, 6, 4, −1, 0, 0}; {1, 1, 5, −3, −3, 4, −2, 1, −4, 2, 0, 0}; {2, 5, 0, −5, 0, 5, 5, 1, −1, −3, 0, 0}; {2, 4, −2, 4, −4, −3, 1, 0, 5, 2, 0, 0}; {3, 6, 1, −4, 2, 1, −4, −4, 0, 2, 0, 0}; {6, −3, 4, −1, 5, 5, −3, −3, 3, 1, 0, 0}; {, −2, −1, 4, −2, −3, 3, −3, 6, −4, 2, 0, 0}; {3, 5, −1, 6, −4, 3, −1, 3, 1, −3, 0, 0}; {, −2, −1, 4, −1, −5, −1, −5, −3, −5, 6, 0, 0}; {, −5, −5, −1, 5, 3, −5, 1, −3, −2, 3, 0, 0}; {4, 3, 6, −1, −3, 0, 5, −1, −1, 5, 0, 0}; {, −5, −5, −1, 6, −2, −4, 2, 6, −5, 4, 0, 0}; {3, 3, −5, 2, 1, 5, −1, −5, −3, 3, 0, 0}; {, −5, 5, −4, 1, −1, 1, 6, −1, −1, 5, 0, 0}; {, −3, −4, 0, −5, 5, −3, 1, −5, −3, 3, 0, 0}; {, −4, −5, −1, 6, 4, −4, 1, −5, −3, 3, 0, 0}; {, −5, 3, 4, −3, 3, 0, 5, −3, −3, 1, 0, 0}; {2, −2, −1, 4, −1, −2, 4, −4, 6, −1, 0, 0}; {, −2, −5, −3, 3, 0, 2, −4, 2, 1, −4, 0, 0}; {3, −1, 0, 6, −1, −4, 2, −4, −4, −1, 0, 0}; {, −4, 0, −3, −1, 3, −4, −4, −2, 6, 3, 0, 0}; {6, 3, 5, 0, 5, 3, −2, 5, 6, −2, 0, 0}; {3, 0, 2, −2, 3, 0, −3, 4, 6, −3, 0, 0}; {2, −2, −1, 6, −2, −5, 2, −5, −4, −2, 0, 0}; {0, 6, 5, −2, 0, −5, 0, 4, 1, 0, 0, 0}; {0, −5, −5, 1, 4, 0, 6, −1, −2, −1, 0, 0}; {2, −2, −1, 6, −2, −5, 2, −4, −4, −1, 0, 0}; {1, −3, −2, 5, −3, 6, 1, −5, −5, −2, 0, 0}; {1, −3, −2, 5, −3, 6, 1, −5, −4, −2, 0, 0}; {0, −5, −5, 1, 4, 0, −5, −1, −3, −2, 0, 0}; {1, −3, −2, 5, −3, −5, 2, −5, −4, −2, 0, 0}; {, −1, 6, 6, 0, 3, 0, 6, −1, −2, −2, 0, 0};

{, −1, 6, 6, 0, 3, 0, 6, −1, −2, −1, 0, 0}; {, −1, 6, 6, 0, 3, 1, −5, −1, −2, 0, 0, 0}; {, −3, 4, 4, −2, 1, 3, −2, −4, −2, 0, 0, 0}; {, −3, 5, 6, 1, 5, −3, 5, 4, −5, −3, 0, 0}; {5, 0, 0, 6, −3, 2, −3, 6, −2, −1, 0, 0}; {1, −5, 6, −1, 2, −5, −5, 4, −1, 1, 0, 0}; {, −3, 4, 4, −2, 2, −2, 4, −2, −2, −2, 0, 0}; {0, −4, −3, 4, −3, 6, 1, 6, −4, −2, 0, 0}; {, −2, 4, 3, −4, −1, 6, −1, 3, 1, 0, 0, 0}; {, −2, 5, 5, −1, 3, −1, 5, −2, −2, −1, 0, 0}; {, −1, −5, −4, 3, −4, 5, 0, 6, −5, −3, 0, 0}; {, −1, −5, −4, 3, −4, 5, 0, 6, −4, −2, 0, 0}; {, −2, 6, −5, 2, −5, 4, 0, 5, −4, −3, 0, 0}; {, −3, 3, 2, −5, −2, 6, −1, 2, 1, 1, 0, 0}; {, −3, 4, 4, −2, 2, −1, 5, −3, −1, −1, 0, 0}; {, −2, 5, 5, −1, 4, 0, 5, −2, −2, −1, 0, 0}; {3, −3, −4, 1, −5, 3, 1, 0, −3, −1, 0, 0}; {4, −4, 5, −4, 2, 6, 6, −3, 6, 4, 0, 0}; {2, −4, −5, 0, −2, 2, 6, 0, 3, 1, 0, 0}; {, −5, 5, −4, 5, −4, 2, −2, 0, 4, 6, 0, 0}; {, −5, 1, 0, 5, 4, −2, 4, −5, 2, 1, 0, 0}; {, −3, 4, 4, −2, −2, 5, 0, 4, 0, −1, 0, 0}; {3, −3, −4, 1, 1, −4, 2, 6, 1, 1, 0, 0}; {2, −3, −3, 3, 5, 1, −4, 0, −2, −2, 0, 0}; {3, −1, 0, −5, −2, −5, 2, −4, −4, −2, 0, 0}; {0, −4, −3, 4, −5, −1, 6, 5, −4, −2, 0, 0}; {0, −4, −3, 4, −5, −1, −5, 5, −4, −3, 0, 0}; {, −2, 5, 5, −1, 1, 4, −1, −4, −1, 0, 0, 0}; {, −1, −5, −4, 3, 6, −1, 6, 4, −3, −2, 0, 0}; {2, −3, −3, 4, 6, 1, −5, 4, −3, −1, 0, 0}; {, −1, 5, 4, −2, −1, 6, 0, 4, 0, 0, 0, 0}; {, −1, 6, 6, 1, 3, −1, −5, 0, −2, −1, 0, 0}; {5, −3, 6, −2, −3, 4, −4, −4, 6, 4, 0, 0}; {0, 6, 5, −1, 1, 6, 0, −4, −1, 0, 0, 0}; {, −1, −4, −2, −5, 0, −2, −5, 2, 5, −4, 0, 0}; {, −3, 5, 6, 2, 6, 3, 0, 6, −4, −3, 0, 0}; {, −5, 2, 2, −3, 0, −4, 4, −3, −1, −2, 0, 0}; {, −3, 5, 6, 2, 6, 4, 0, 6, 6, −3, 0, 0}; {, −5, 2, 2, −3, 0, −3, 4, −3, −3, −2, 0, 0}; {6, 0, −1, 5, −5, 3, −3, 1, 0, −1, 0, 0}; {5, −1, −2, 4, 6, 2, −4, 0, 0, −1, 0, 0}; {6, 1, 1, −4, −1, −4, 4, −4, −2, −3, 0, 0}; {5, 0, 0, −5, −2, −5, 3, −5, −2, −3, 0, 0}; {3, 6, 2, 5, 4, −2, 2, −1, −4, 6, 0, 0}; {3, −5, 4, −4, −4, 4, −2, 1, 4, 4, 0, 0}; {2, −4, −5, 1, 3, −5, 1, −3, 0, 0, 0, 0}; {3, −2, −2, 5, −4, 1, −4, 5, −3, −2, 0, 0}; {, −5, 2, 2, −3, 1, −4, 4, −2, −1, −2, 0, 0}; {, −3, 5, 6, 2, −5, 4, −2, 5, 6, −3, 0, 0}; {, −4, 3, 3, −2, 2, −2, 4, −2, −3, −2, 0, 0}; {, −4, 4, 5, 1, 6, 3, −1, 5, −5, −2, 0, 0}; {6, 1, 1, −4, 0, −4, 4, −3, −1, −2, 0, 0}; {5, 0, 0, −5, −1, −4, 3, −5, −2, −2, 0, 0}; {, −4, 1, −1, 4, −5, −1, −3, −5, 1, 2, 0, 0}; {, −5, 0, −2, 3, 6, −2, −3, 6, 1, 1, 0, 0}; {, −5, 3, 4, 0, −5, 1, 5, 6, −1, −2, 0, 0}; {4, −3, −5, 0, 4, −3, −5, 5, 0, 1, 0, 0}; {5, 0, 0, −5, 2, −5, −3, −1, 2, 0, 0, 0}; {3, −1, 0, −4, 4, −1, 3, 6, −2, −1, 0, 0}; {3, −2, −2, 5, 1, 5, −4, −1, 1, 0, 0, 0}; {, −1, 6, 6, 1, −3, 3, 6, −3, 0, 0, 0, 0}; {3, −4, 6, −1, 6, −3, 1, 6, 5, 2, 0, 0}; {3, −4, 6, −1, 6, −3, 1, 6, 5, 3, 0, 0}; {2, −5, 5, −2, 5, −4, 0, 6, 4, 2, 0, 0}; {2, −5, 5, −2, 5, −3, 0, 5, 3, 2, 0, 0}; {1, 5, 2, 6, 0, 3, 5, −3, −5, 4, 0, 0}; {2, −5, 5, −2, 6, −4, −1, 6, 6, 4, 0, 0}; {1, 6, 4, −3, 5, −4, −1, 5, 6, 3, 0, 0}; {0, 4, 1, 5, 0, 2, 4, −3, −5, 4, 0, 0}; {1, −4, −4, 3, 1, 6, 0, −4, −1, −1, 0, 0}; {, −1, 5, 4, −2, −5, −1, 4, 0, 1, −1, 0, 0}; {0, 5, 3, −4, 4, −5, 0, 5, 5, 2, 0, 0}; {1, −5, 6, 0, −3, 2, 6, 0, 0, 0, 0, 0}; {1, 6, 4, −3, 5, −3, 0, 5, 3, 2, 0, 0}; {, −1, 3, 0, 4, −1, 2, 4, −4, 5, 3, 0, 0}; {, −2, 2, −1, 3, −2, 1, 3, −4, 6, 3, 0, 0}; {, −1, 4, 2, −5, 3, −5, −2, 4, 3, 1, 0, 0}; {, −1, 4, 2, −5, 3, −5, −1, 4, 4, 2, 0, 0}; {0, 6, 5, −1, −4, 1, 6, 0, 2, 1, 0, 0}; {, −1, 5, 4, −2, −5, 0, 5, −1, 1, 1, 0, 0}; {, −2, 2, −1, 3, −2, 2, 3, −5, 5, 3, 0, 0}; {, −2, 2, −1, 3, −1, 1, 3, −3, −5, 4, 0, 0}; {0, 6, 5, −1, −3, 1, 6, 1, 2, 1, 0, 0}; {0, 6, 5, −1, −3, 1, 6, 1, 3, 1, 0, 0}; {, −1, 5, 4, −2, −4, 0, 5, 0, 2, 0, 0, 0}; {, −1, 6, 6, 1, 0, 5, 0, 5, −1, −1, 0, 0}; {, −1, 5, 4, −2, −4, 0, 6, 0, 2, 0, 0, 0}; {, −1, 5, 4, −2, −4, 0, 6, 0, 2, 1, 0, 0}; {0, −5, −5, 2, 1, 6, 1, −4, 0, 0, 0, 0}; {, −2, 4, 3, −3, −5, 0, 4, −2, 1, 0, 0, 0}; {, −3, 2, 0, 5, 2, 6, −3, 3, 3, 1, 0, 0}; {, −3, 2, 0, 5, 2, 6, −3, 3, 4, 1, 0, 0}; {, −4, 1, −1, 4, 1, 5, −4, 2, 3, 1, 0, 0}; {, −2, 4, 3, −3, −4, 0, 5, 0, 2, 0, 0, 0}; {, −2, 5, 5, 0, 0, 5, −1, −5, −1, −1, 0, 0}; {, −3, 4, 4, −1, −1, 4, −2, −5, −2, −1, 0, 0}; {, −3, 3, 2, −4, −5, −1, 5, −1, 2, 0, 0, 0}; {, −2, 5, 5, 0, 0, 5, 0, −5, −1, −1, 0, 0}; {, −3, 3, 2, −4, −5, −1, 5, 0, 2, 0, 0, 0}; {, −4, 2, 1, −5, 6, −2, 4, −1, 1, 0, 0, 0}; {, −4, 2, 1, −5, 6, −1, 4, −1, 2, 0, 0, 0}; {, −5, −1,

−4, 0, −2, 5, −3, −3, 6, 4, 0, 0}; {0, −3, −1, −4, −1, 5, 1, 1, 6, −4, 0, 0}; {, −4, 3, 3, −2, −1, 3, −2, −5, −2, −1, 0, 0}; {, −4, 3, 3, −2, −1, 4, −2, 6, −2, −2, 0, 0}; {, −4, 3, 3, −2, −1, 4, −2, −5, −2, −1, 0, 0}; {, −5, 2, 2, −3, −2, 3, −2, 6, −2, −1, 0, 0}; {4, −2, −3, 3, 3, −4, 1, −3, 0, 1, 0, 0}; {2, −4, −5, 1, 1, −5, 1, 5, 0, 0, 0, 0}; {0, 6, 5, 0, 0, −5, 0, −5, −1, −1, 0, 0}; {1, 4, 0, 4, 1, 1, −3, 5, 4, −4, 0, 0}; {2, −5, 5, −1, −2, 2, −5, 1, 3, 0, 0, 0}; {, −3, 2, 0, 6, 6, 0, 4, −4, 2, 0, 0, 0}; {4, −4, 5, −2, 0, 3, 0, −3, 3, 3, 0, 0}; {4, −3, −5, 1, 5, −2, 6, 5, 0, 0, 0, 0}; {3, −4, 6, 0, 4, −3, 6, 5, 0, 1, 0, 0}; {3, −2, −2, 6, 1, 5, −3, −3, 0, −3, 0, 0}; {6, 2, 3, 0, −4, 1, 5, −5, −1, −3, 0, 0}; {0, 5, 3, −3, 3, −5, 1, 4, 5, 3, 0, 0}; {, −3, 3, 2, −3, 5, −5, −1, 1, 2, 0, 0, 0}; {, −1, 5, 4, −1, −5, −2, 4, 1, 2, −1, 0, 0}; {0, 5, 3, −3, 4, −5, 0, 5, 4, 3, 0, 0}; {, −1, 5, 4, −1, −5, −1, 5, 0, 1, 0, 0, 0}; {, −2, 1, −3, 1, 6, −5, 0, −2, 5, 1, 0, 0}; {1, 6, 4, −2, 5, −3, 0, 4, 3, 2, 0, 0}; {, −1, 3, 0, 5, −1, 2, 4, −4, 6, 4, 0, 0}; {0, 5, 3, −3, 4, −4, 0, 4, 4, 2, 0, 0}; {1, −5, 6, 1, −3, 2, −5, 0, 1, 1, 0, 0}; {0, 5, 3, −3, 4, −4, 0, 4, 3, 3, 0, 0}; {0, 5, 3, −3, 4, −4, 0, 5, 4, 3, 0, 0}; {, −1, 4, 2, −4, 3, −5, −1, 4, 4, 2, 0, 0}; {, −3, 1, −2, 3, −3, 1, 3, −5, 5, 3, 0, 0}; {, −3, 1, −2, 3, −3, 2, 3, −5, 5, 3, 0, 0}; {, −3, 0, −4, 0, 6, −5, −3, −2, −5, 5, 0, 0}; {, −2, 3, 1, −5, 3, 6, −2, 4, 5, 2, 0, 0}; {, −2, 3, 1, −5, 3, 6, −2, 4, 5, 3, 0, 0}; {, −3, 2, 0, 6, 2, 5, −2, 3, 4, 2, 0, 0}; {, −2, 4, 3, −2, −5, −1, 5, −1, 1, 1, 0, 0}; {, −3, 2, 0, 6, 2, 6, −2, 4, 5, 2, 0, 0}; {, −5, 0, −2, 4, 1, 4, −3, 3, 4, 1, 0, 0}; {, −4, 2, 1, −4, 6, −2, 4, −1, 1, 1, 0, 0}; {, −4, 2, 1, −4, 6, −1, 4, −2, 1, 0, 0, 0}; {, −5, 1, 0, −5, 5, −2, 3, −3, 0, 0, 0, 0}; {, −5, 1, 0, −5, 5, −2, 3, −3, 1, 0, 0, 0}; {, −5, 1, 0, −5, 5, −2, 4, −3, 1, 0, 0, 0}; {5, −3, 6, −1, −5, −1, 1, 6, 4, 2, 0, 0}; {6, 0, −1, 6, 4, −2, 3, −2, 1, 0, 0, 0}; {4, −4, 5, −2, 6, −1, 0, 5, 4, 2, 0, 0}; {5, −1, −2, 5, 4, −4, 2, −5, 0, 0, 0, 0}; {5, −1, −2, 5, 4, −3, 2, −4, 0, −1, 0, 0}; {1, −5, 6, 2, 1, −5, 0, 6, −1, −1, 0, 0}; {2, 6, 3, −3, −2, 1, 0, −4, 2, 3, 0, 0}; {2, −5, 5, 0, 3, −5, 6, 5, −1, 2, 0, 0}; {, −3, 0, −4, 1, 4, 6, 0, −1, 5, 1, 0, 0}; {, −4, −1, −5, 0, 4, 6, −1, −2, 4, 1, 0, 0}; {3, 4, −2, 1, 4, −1, −5, −1, −4, 2, 0, 0}; {5, −5, 2, 6, −2, −2, 3, 1, −5, 2, 0, 0}; {6, −3, 5, −2, 4, 6, −5, −3, 6, 5, 0, 0}; {4, −5, 3, −4, 2, 5, 6, −3, 6, 4, 0, 0}; {4, −2, −3, 5, 3, −4, 2, −4, 0, 0, 0, 0}; {, −3, 0, −4, 2, 0, 6, 0, 3, 5, 3, 0, 0}; {5, −5, 2, −5, −3, 5, 0, 6, 4, −2, 0, 0}; {4, 6, 1, 6, −4, 4, 0, 6, 4, −2, 0, 0}; {3, 4, −2, 2, 3, −1, 6, −2, −5, 1, 0, 0}; {2, 3, −3, 1, 3, −2, 5, −2, 6, 1, 0, 0}; {1, 2, −4, 0, 2, −3, 4, −3, 6, 0, 0, 0}; {5, −5, 2, −5, 0, −4, 3, 1, 5, 5, 0, 0}; {, −3, −2, 4, −2, −5, −1, 6, −4, −5, 6, 0, 0}; {3, 5, 0, −5, −4, 4, −1, 3, 2, −3, 0, 0}; {1, 1, 6, 0, −1, 4, −2, −5, −3, 2, 0, 0}; {, −5, 6, −2, 3, 2, −5, 1, −3, −2, 4, 0, 0}; {3, 1, 4, −4, 6, −1, 4, 0, 0, 5, 0, 0}; {2, −2, 0, 6, −2, −4, 2, −4, −4, 0, 0, 0}; {3, 1, 5, 1, −5, 3, 5, −3, 4, 5, 0, 0}; {0, −3, 0, −5, 1, −5, −4, −1, −5, −5, 0, 0}; {, −3, 5, −5, 1, 6, 0, 0, 2, −3, −4, 0, 0}; {, −4, 5, −4, 3, −2, −4, 2, 4, −4, 0, 0, 0}; {5, 2, 5, 0, 4, −1, −2, 4, −4, −3, 0, 0}; {3, −2, −1, 4, 6, 1, −4, 3, −1, 0, 0, 0}; {0, −5, −4, 2, 4, −1, −5, 1, −2, 0, 0, 0}; {, −1, 5, 5, −2, −1, 6, 0, 4, 1, 0, 0, 0}; {, −1, 6, −5, 1, 3, −1, 3, −1, −4, −1, 0, 0}; {, −1, 6, −5, 1, 3, 0, 6, −1, −2, 0, 0, 0}; {6, 1, 2, −4, −2, 2, −2, 6, −1, −1, 0, 0}; {0, −3, 0, −4, 1, −2, −4, 4, 6, −3, 0, 0}; {, −3, 4, 5, −1, 2, −2, 4, −1, −3, −1, 0, 0}; {, −3, 4, 5, −1, 2, −2, 5, −2, −3, −1, 0, 0}; {, −2, 6, −4, 3, −5, 4, 0, 6, −5, −2, 0, 0}; {, −3, 4, 5, −1, 2, −2, 5, −1, −3, −1, 0, 0}; {, −2, 6, −4, 3, −5, 4, 0, −5, −5, −2, 0, 0}; {, −3, 6, −3, 5, −1, −5, −5, 3, 6, −4, 0, 0}; {, −4, 5, −4, 4, −2, −5, 6, 3, 6, −4, 0, 0}; {, −5, 2, 3, −3, 1, −3, 3, −2, −3, −2, 0, 0}; {, −5, 2, 3, −3, 1, −3, 4, −2, −3, −2, 0, 0}; {, −4, 4, 6, 1, 6, 3, −1, 6, −5, −2, 0, 0}; {, −5, 3, 5, 0, 5, 2, −2, 5, −5, −3, 0, 0}; {, −5, 3, 5, 0, 5, 2, −1, 5, 6, −2, 0, 0}; {5, 1, 3, −2, 3, 0, −2, 6, −4, −3, 0, 0}; {5, −1, −1, 4, −5, 3, −3, 1, −1, −1, 0, 0}; {, −4, 2, 2, −5, −1, 5, 5, 2, −2, 0, 0, 0}; {, −5, 2, 3, −3, 2, −1, 4, −3, −3, 0, 0, 0}; {, −5, 2, 3, −3, 2, −1, 5, −3, −2, 0, 0, 0}; {, −3, 1, −1, 2, 5, 1, −4, 5, 3, 4, 0, 0}; {1, −3, −1, 6, 3, −1, 2, 5, −2, −2, 0, 0}; {, −1, −5, −3, 4, 2, −1, 1, 4, −2, −3, 0, 0}; {, −3, 2, 1, 6, 5, −1, 4, −5, 2, 1, 0, 0}; {, −2, 4, 4, −2, −2, 5, 0, 4, 0, 0, 0, 0}; {, −3, 3, 3, −3, −3, 5, −1, 3, 0, 0, 0, 0}; {, −5, 0, −1, 4, 3, −2, 3, 6, 2, 1, 0, 0}; {, −5, 0, −1, 4, 3, −2, 3, 6, 3, 2, 0, 0}; {, −4, 2, 2, −4, −4, 4, −2, 2, 0, 0, 0, 0}; {5, −3, −5, −1, −3, 4, −4, −3, 5, 3, 0, 0}; {6, −1, −2, 3, 2, −2, 3, 6, 2, 2, 0, 0}; {, −5, 3, 5, 1, 3, −4, 4, 3, −5, −3, 0, 0}; {6, 1, 2, −3, −2, 2, −3, 6, −2, −2, 0, 0}; {4, −2, −2, 4, 4, −4, 2, −2, 0, 0, 0, 0}; {5, 0, 1, −4, −3, 2, −3, 6, −3, −2, 0, 0}; {5, 0, 1, −4, −3, 2, −3, 6, −2, −1, 0, 0}; {3, −3, −3, 3, 3, −5, 1, −3, 0, 0, 0, 0}; {2, −4, −4, 2, 2, −5, 0, −4, 0, 0, 0, 0}; {3, −2, −1, 6, −5, 1, −4, 5, −2, −1, 0, 0}; {, −4, 2, 2, −4, −3, 3, −1, 4, 0, 1, 0, 0}; {, −5, 0, −1, 4, 4, −2, 3, −5, 2, 1, 0, 0}; {, −5, 1, 1, −5, −4, 3, −3, 2, −1, 0, 0, 0}; {, −4, 2, 2, −4, −3, 4, −1, 4, 0, 0, 0, 0}; {, −5, 1, 1, −5, −4, 3, −2, 3, −1, 0, 0, 0}; {, −5, 1, 1, −5, −4, 3, −2, 3, 0, 1, 0, 0}; {, −5, 1, 1, −5, −4, 4, −2, 2, 0, −1, 0, 0}; {, −5, 2, 3, −2, 0, −3, 4, −3, −3, −2, 0, 0}; {6, 0, 0, 6, −5, 3, −3, 2, −1, 0, 0, 0}; {, −4, 3, 4, −1, 1, −2, 6, −1, −3, −2, 0, 0}; {5, 0, 1, −4, −2, 2, −3, 6, −2, −2, 0, 0}; {6, 2, 4, 0, 3, −4, 4, 3, −5, −4, 0, 0}; {4, −1, 0, −5, −3, 1, −3, 6, −3, −3, 0, 0}; {6, 1, 2, −3, 0, −4, 4, −2, −3, −1, 0, 0}; {4, −2, −2, 4, 6, 1, −4, 1, 0, 0, 0, 0}; {6, 1, 2, −3, 0, −3, 3, −3, −4, −1, 0, 0}; {6, 1, 2, −3, 0, −3, 4, −3, −3, −1, 0, 0}; {5, 0, 1, −4, −1, −4, 3, −4, −3, −2, 0, 0}; {5, −1, −1, 5, −5, 3, −3, 2, −1, −1, 0, 0}; {4, −2, −2, 4, 6, 2, −4, 1, −1, −1, 0, 0}; {3, −3, −3, 3, 5, 1, −5, 0, −1, −1, 0, 0}; {4, −1, 0, −5, −2, −5, 2, −4, −4, −1, 0, 0}; {5, −1, −1, 5, −5, 3, −2, 2, −1, 0, 0, 0}; {5, 0, 1, −4, −1, −4, 4, −3, −4, −3, 0, 0}; {5, 0, 1, −4, −1, −4, 4, −3, −4, −2, 0, 0}; {5, 0, 1, −4, −1, −3, 4, −3, −4, −2, 0, 0}; {6, 3, 6, 3, −3, 6, 5, 1, 5, −4, 0, 0}; {2, −3, −2, 5, −3, 5, 2, −4, −2, −2, 0, 0}; {4, −1, 0, −5, −1, −4, 2, −4, −4, −1, 0, 0}; {4, −1, 0, −5, −1, −4, 3, −4, −3, −1, 0, 0}; {2, −4, −4, 2, 5, 1, −5, 0, −2, −2, 0, 0}; {3, −2, −1, 6, −2, −5, 2, −4, −4, −3, 0, 0}; {3, −2, −1, 6, −2, −5, 2, −4, −4, −2, 0, 0}; {4, 0, 2, −2, 3, 1, −3, 4, 6, −3, 0, 0}; {1, −4, −3, 4, −4, 5, 1, 6, −3, −2, 0, 0}; {, −5, 1, 1, −5, −1, 4, 4, 2, −2, −1, 0, 0}; {3, −3, −3, 3, −4, 3, 1, 0, −3, −1, 0, 0}; {0, 5, 4, −3, 1, −5, 5, 3, −1, 1, 0, 0}; {0, −5, −4, 3, −1, 5, −5, −3, 1, −1, 0, 0}; {, −3, 3, 3, −3, 4, −3, −1, 0, 3, 1, 0, 0}; {5, −1, −1, 5, 1, −4, −4, −2, 2, 1, 0, 0}; {, −1, 4, 3, −4, 4, −5, −1, 6, 3, 2, 0, 0}; {, −4, 0, −2, 2, −3, −1, 3, −4, 6, 3, 0, 0}; {, −3, 2, 1, 6, 2, 5, −2, 4, 4, 2, 0, 0}; {, −3, 2, 1, 6, 2, 5, −2, 4, 4, 3, 0, 0}; {, −2, 4, 4, −2, −5, −1, 5, 0, 2, 2, 0, 0}; {, −4, 1, 0, 5, 1, 4, −3, 4, 3, 1, 0, 0}; {, −2, 3, 2, −5, 3, −5, −2, 4, 2, 2, 0, 0}; {, −5, 0, −1, 4, 1, 3, −4, 3, 4, 2, 0, 0}; {, −5, 0, −1, 4, 1, 4, −4, 3, 4, 2, 0, 0}; {, −5, 0, −1, 4, 1, 4, −4, 3, 4, 3, 0, 0}; {, −5, 1, 1, −5, 5, −3, 2, −2, 1, 0, 0, 0}; {, −4, 1, 0, 5, 2, 5, −2, 4, 4, 1, 0, 0}; {, −3, 3, 3, −3, −5, −1, 5, 0, 1, 1, 0, 0}; {, −5, 0, −1, 4, 1, 4, −3, 3, 4, 2, 0, 0}; {, −5, 0, −1, 4, 1, 4, −3, 4, 3, 2, 0, 0}; {6, −1, −2, 3, 0, 3, −4, 3, 3, 1, 0, 0}; {6, −1, −2, 3, 0, 3, −3, 3, 4, 1, 0, 0}; {6, −1, −2, 3, 0, 4, −4, 2, 3, 1, 0, 0}; {, −4, 1, 0, 5, 3, −1, 3, 6, 3, 3, 0, 0}; {, −5, 0, −1, 4, 2, −2, 3, 6, 2, 0, 0}; {6, −2, −4, 0, −3, 4, −4, −3, 5, 4, 0, 0}; {6, 0, 0, 6, 5, −3, 2, −4, 1, 0, 0, 0}; {6, 0, 0, 6, 5, −3, 2, −3, 1, 0, 0, 0}; {4, −3, −4, 1, −1, 2, 6, 1, 3, 2, 0, 0}; {5, −2, −3, 2, 0, 3, −4, 3, 3, 2, 0, 0}; {5, −1, −1, 5, 4, −4, 2, −2, 0, 1, 0, 0}; {5, −1, −1, 5, 4, −3, 2, −3, 0, −1, 0, 0}; {5, −1, −1, 5, 4, −3, 2, −3, 1, 0, 0, 0}; {4, −2, −2, 4, 3, −4, 1, −4, 0, 0, 0, 0}; {5, −1, −1, 5, 4, −3, 3, −2, 1, 0, 0, 0}; {5, 0, 1, −4, −4, 2, −3, 5, −2, −1, 0, 0}; {4, −2, −2, 4, 3, −3, 1, −4, 0, −1, 0, 0}; {0, 5, 4, −2, −4, 1, 5, −1, 2, 0, 0, 0}; {6, −1, −2, 4, 2, −2, 2, 6, 1, 1, 0, 0}; {1, 6, 5, −1, −3, 0, 6, 1, 2, 0, 0, 0}; {1, 6, 5, −1, −3, 1, −3, 1, 4, 1, 0, 0}; {1, −5, −5, 2, 1, 6, 0, −4, −1, 0, 0, 0}; {1, 5, 3, −4, −2, 1, −1, −4, 2, 3, 0, 0}; {, −1, 3, 1, 6, −3, 1, −2, −5, 2, 2, 0, 0}; {3, −1, 1, −2, −5, −1, 4, −5, −3, −4, 0, 0}; {4, 5, 0, 2, 4, 3, −3, 6, −2, 5, 0, 0}; {5, −2, −3, 3, −2, 1, −5, 3, 2, 0, 0, 0}; {5, −2, −3, 3, −2, 1, −4, 3, 3, 0, 0,

0}; {3, 4, −1, 1, 4, 3, −4, 5, −2, 4, 0, 0}; {4, −2, −2, 5, 1, −5, −5, −2, 2, 0, 0, 0}; {, −5, 1, 1, −4, 5, −3, 3, −1, 1, 1, 0, 0}; {, −5, −1, −3, 2, −3, 0, 2, 6, 4, 3, 0, 0}; {5, −3, −5, 0, −5, −2, 1, −5, 6, 2, 0, 0}; {5, −3, −5, 0, −5, −2, 2, −5, 5, 3, 0, 0}; {4, −4, 6, −1, 6, −3, 1, 6, 5, 2, 0, 0}; {5, −2, −3, 3, −1, 3, −4, 2, 3, 2, 0, 0}; {5, −2, −3, 3, −1, 3, −3, 2, 3, 2, 0, 0}; {4, −5, 4, −4, 2, 5, 6, −3, 6, 4, 0, 0}; {5, −3, −5, 0, −5, −1, 1, 6, 4, 2, 0, 0}; {3, 6, 3, −5, 1, 5, 5, −3, 6, 4, 0, 0}; {2, 6, 4, −3, 5, −4, 0, 6, 5, 2, 0, 0}; {3, −4, −5, 1, −2, 2, −5, 2, 3, 1, 0, 0}; {2, 6, 4, −3, 5, −4, 0, 5, 5, 2, 0, 0}; {3, −4, −5, 1, −2, 2, −5, 1, 3, 1, 0, 0}; {3, −4, −5, 1, −2, 2, −4, 1, 3, 1, 0, 0}; {0, 3, 0, 4, −1, 2, 4, −4, 6, 3, 0, 0}; {, −3, −1, −5, −1, 5, −3, −5, 3, −4, −5, 0, 0}; {, −2, 2, 0, 6, 2, 4, −2, 4, 4, 0, 0, 0}; {, −3, 2, 1, −4, 6, −1, 4, −3, 1, 0, 0, 0}; {2, 3, −2, 1, −3, −4, 3, −2, −5, −2, 0, 0}; {3, −5, 5, −1, 6, 0, 0, −2, 3, 4, 0, 0}; {0, 3, 0, 5, −1, 5, 4, 1, 5, 5, 0, 0}; {5, −5, 4, −1, 1, −1, 6, 1, 1, −5, 0, 0}; {, −3, −1, −4, 4, 6, 1, −4, 0, 0, −5, 0, 0}; {5, 6, 2, −3, −2, 5, −1, 3, 2, −4, 0, 0}; {, −1, −1, 6, 0, 1, −4, 2, 5, 3, −2, 0, 0}; {3, 2, −4, 2, 1, 5, −2, 5, −4, 1, 0, 0}; {, −3, −5, 0, 5, 4, −4, 1, −3, −2, 3, 0, 0}; {3, 2, −4, 2, 5, 1, 6, 4, 5, 6, 0, 0}; {, −5, 5, −2, 5, 0, 4, −3, −1, −5, −5, 0, 0}; {1, 1, −4, 5, 4, −3, 2, −1, 3, −2, 0, 0}; {, −1, −2, 4, 0, −2, 3, −4, 3, 6, 0, 0, 0}; {, −2, −3, 3, −1, −3, 2, −5, 2, 6, −1, 0, 0}; {0, 1, −3, −5, −4, 1, −4, −5, 0, −4, 0, 0}; {, −3, −4, 2, −2, −3, 1, 6, 2, 5, −1, 0, 0}; {, −4, 6, −1, 6, 4, −4, 0, 6, −4, 2, 0, 0}; {, −5, 5, −2, 5, 3, −5, 0, 6, −4, 2, 0, 0}; {, −1, 5, 6, −2, −1, 5, 0, 6, 1, 1, 0, 0}; {, −4, 2, 3, −5, −3, 4, −2, 4, 0, 0, 0, 0}; {, −4, 5, −3, 4, −2, −5, 6, 3, 6, −4, 0, 0}; {, −5, 5, −2, 6, 2, 2, −3, −1, 5, −2, 0, 0}; {, −3, −4, 2, −1, −4, 1, 5, 1, 4, −2, 0, 0}; {4, 1, 5, 0, −4, 6, 1, 2, −4, −1, 0, 0}; {3, 0, 4, −1, −4, 6, 0, 1, −5, −1, 0, 0}; {, −2, 5, −5, 0, −3, 5, 6, −5, 1, −2, 0, 0}; {, −2, 6, −3, 3, 2, −1, 0, 4, −2, −3, 0, 0}; {, −2, 5, −5, 1, 2, −2, 5, −1, −3, 0, 0, 0}; {0, 6, −5, 0, 0, 5, 0, 5, 1, 1, 0, 0}; {, −5, 1, 2, −5, −4, 3, −2, 4, 0, 1, 0, 0}; {, −5, 1, 2, −5, −4, 4, −2, 5, 0, 0, 0, 0}; {, −4, 4, −5, 2, 6, 1, 0, −5, −4, −2, 0, 0}; {6, 0, 1, 6, −4, 2, −3, 2, −1, 0, 0, 0}; {, −5, 3, 6, 1, 5, 1, −1, 6, −4, −2, 0, 0}; {5, −1, 0, 5, −5, 2, −4, 3, −1, 0, 0, 0}; {5, −1, 0, 5, −5, 2, −3, 3, −1, 0, 0, 0}; {5, −1, 0, 5, −5, 2, −3, 3, 0, 0, 0, 0}; {4, −2, −1, 4, 6, 1, −4, 2, −1, 0, 0, 0}; {4, −2, −1, 4, 6, 2, −4, 1, −1, −1, 0, 0}; {5, 0, 2, −4, −1, −4, 3, −3, −4, −1, 0, 0}; {4, −2, −1, 4, 6, 2, −4, 2, −1, −1, 0, 0}; {3, −2, 0, 6, −2, 6, 2, −4, −5, −2, 0, 0}; {2, −4, −3, 2, 5, 1, −5, 1, −1, −1, 0, 0}; {3, −2, 0, 6, −2, −5, 2, −3, −4, −2, 0, 0}; {2, −3, −1, 5, −3, 6, 2, −4, −5, −3, 0, 0}; {2, −3, −1, 5, −3, 6, 2, −4, −5, −2, 0, 0}; {3, 0, 4, 0, 6, 5, 3, 2, 5, −5, 0, 0}; {3, −3, −2, 3, 6, 3, −3, 0, −1, 1, 0, 0}; {3, −1, 2, −3, 3, −1, −3, 5, −5, −3, 0, 0}; {0, −5, −3, 3, −4, 4, 0, −5, −4, −3, 0, 0}; {1, −4, −2, 4, −3, 5, 1, −4, −4, −2, 0, 0}; {, −1, 5, 6, −1, 3, −2, 5, 0, −1, −1, 0, 0}; {0, −5, −3, 3, −4, 4, 0, −4, −4, −2, 0, 0}; {0, −5, −3, 3, −4, 4, 0, −4, −3, −3, 0, 0}; {1, −3, 0, −5, 1, −2, −4, 4, 6, −4, 0, 0}; {2, −1, 3, −1, 6, 5, 0, 2, −5, −1, 0, 0}; {1, −5, −4, 1, 5, 1, −5, 0, −1, 0, 0, 0}; {0, −5, −3, 3, −4, 5, 0, −5, −4, −3, 0, 0}; {3, 1, 6, 3, −1, 0, −4, −2, 5, −3, 0, 0}; {1, −5, −4, 1, 5, 2, −4, −1, −2, 1, 0, 0}; {3, −3, −2, 3, −5, 5, 1, −1, −2, 0, 0, 0}; {0, −5, −3, 3, −3, 5, −1, −4, −5, −3, 0, 0}; {6, −2, −3, 0, 4, −1, −5, 5, 1, 3, 0, 0}; {, −3, 4, 6, 0, −4, 3, 6, −5, 0, −1, 0, 0}; {, −4, 4, −5, 2, 0, −3, 0, 3, −3, −3, 0, 0}; {3, −2, 0, 6, 6, 0, −4, 4, −2, 0, 0, 0}; {, −2, 3, 3, −4, 6, −1, 5, −4, 3, 1, 0, 0}; {, −5, 3, 6, 2, 3, −4, 4, 6, −4, 0, 0}; {3, −3, −2, 4, 3, −5, 1, −3, 0, 0, 0, 0}; {1, 6, 6, −1, −3, 1, 5, 0, 2, 1, 0, 0}; {1, −5, −4, 2, 1, 6, 0, −4, 0, 0, 0, 0}; {, −2, 4, 5, −1, −1, 5, −2, 6, −1, −1, 0, 0}; {, −2, 4, 5, −1, −1, 5, −1, −5, 0, 0, 0, 0}; {, −4, 2, 3, −3, −3, 4, −1, 3, 0, −1, 0, 0}; {4, −3, −3, 2, 1, −4, 1, 5, 1, 1, 0, 0}; {5, −2, −2, 3, 2, −3, 2, 6, 2, 1, 0, 0}; {5, −1, 0, 6, 6, 2, −4, 1, −1, 0, 0, 0}; {4, −3, −3, 2, 1, −4, 2, 5, 1, 1, 0, 0}; {4, −3, −3, 2, 1, −4, 2, 5, 2, 1, 0, 0}; {4, −3, −3, 2, 1, −4, 2, 6, 2, 2, 0, 0}; {4, −3, −3, 2, 1, −3, 2, 5, 2, 1, 0, 0}; {0, 3, 1, 4, 1, −5, −1, −1, 6, 4, 0, 0}; {5, 1, 4, 0, 2, −5, 3, 3, 6, −4, 0, 0}; {4, −3, −3, 2, 2, −4, 2, 6, 2, 1, 0, 0}; {4, −2, −1, 5, 6, 1, −4, 1, −2, 0, 0, 0}; {3, −4, −4, 1, 1, −5, 2, 6, 2, 2, 0, 0}; {4, −2, −1, 5, 6, 1, −3, 2, −1, 0, 0, 0}; {4, −2, −1, 5, 6, 2, −4, 1, −1, 0, 0, 0}; {3, −3, −2, 4, 5, 1, −5, 0, −2, 0, 0, 0}; {2, −5, −5, 0, 0, −5, 0, 5, 1, 1, 0, 0}; {3, −3, −2, 4, 5, 1, −5, 1, −2, 0, 0, 0}; {3, −4, −4, 1, 1, −4, 2, 5, 2, 1, 0, 0}; {2, −5, −5, 0, 0, −5, 1, 5, 1, 1, 0, 0}; {1, 6, 6, −1, −1, 6, 0, 4, 1, 1, 0, 0}; {2, −4, −3, 3, 4, 0, −5, 0, −2, 0, 0, 0}; {4, −1, 1, −4, −1, −5, 4, −2, −3, −1, 0, 0}; {3, −2, 0, −5, −2, 6, 3, −3, −4, −1, 0, 0}; {3, −2, 0, −5, −2, 6, 3, −3, −3, −1, 0, 0}; {2, −4, −3, 3, 5, 0, −4, 2, −1, 0, 0, 0}; {0, 5, 5, −2, −1, 6, −1, 4, 0, 0, 0, 0}; {1, −5, −4, 2, 4, 0, 6, 0, −2, −1, 0, 0}; {1, −5, −4, 2, 4, 0, 6, 0, −2, 0, 0, 0}; {1, 6, 6, −1, 0, −5, 0, −5, 1, 1, 0, 0}; {0, 5, 5, −2, −1, 6, 0, 4, 1, 1, 0, 0}; {1, −5, −4, 2, 4, 0, −5, 0, −2, −1, 0, 0}; {0, 6, −5, 1, 3, −1, 6, −1, −3, −1, 0, 0}; {1, −5, −4, 2, 4, 0, −5, 0, −2, 0, 0, 0}; {0, 6, −5, 1, 3, −1, 6, −1, −2, −1, 0, 0}; {1, −5, −4, 2, 4, 0, −5, 1, −2, −1, 0, 0}; {2, −2, 1, −3, 1, −1, −3, 3, 5, −4, 0, 0}; {1, −5, −4, 2, 5, 0, −5, 1, −1, −1, 0, 0}; {0, 6, −5, 1, 4, −1, 6, 0, −2, −1, 0, 0}; {1, −4, −2, −3, 5, 1, −4, −4, −2, 0, 0}; {1, −4, −2, 5, −3, 5, 2, −4, −3, −1, 0, 0}; {2, −2, 1, −3, 2, −1, −3, 4, 6, −3, 0, 0}; {, −1, 5, 6, 0, 3, −2, 6, 0, −1, 0, 0, 0}; {, −1, 6, −4, 3, −5, 3, 0, −5, −3, −2, 0, 0}; {0, −5, −3, 4, −4, 5, 0, −5, −5, −2, 0, 0}; {1, −5, −4, 2, 5, 1, −4, 0, −1, 1, 0, 0}; {, −1, 4, 4, −3, −1, 6, 0, 4, 1, 1, 0, 0}; {0, −4, −1, −5, 0, −2, −4, 3, 5, −4, 0, 0}; {, −1, 6, −4, 3, −5, 4, 1, −5, 6, −3, 0, 0}; {, −2, 5, −5, 2, 6, 4, 1, 6, 6, −4, 0, 0}; {, −1, −5, −2, 6, 0, −3, −5, 3, 5, −4, 0, 0}; {, −2, 5, −5, 2, −5, 3, 0, −5, −3, −2, 0, 0}; {, −4, 3, 5, 0, 5, 1, −1, −5, −4, −2, 0, 0}; {, −2, 5, −5, 2, −5, 4, 0, 6, −4, −2, 0, 0}; {, −3, 4, 6, 1, 6, 3, −1, 6, −5, −3, 0, 0}; {, −3, 4, 6, 1, 6, 3, −1, 6, −5, −2, 0, 0}; {1, 6, 6, −1, 3, −3, 6, 3, 0, 0, 0, 0}; {, −2, 3, 3, −4, 0, −5, 4, 2, −1, 1, 0, 0}; {, −3, 2, 2, −5, −1, −5, 4, 1, −1, 0, 0, 0}; {, −3, 1, 0, 4, −4, 1, −3, 6, 2, 1, 0, 0}; {, −5, 0, 0, 5, −2, 5, 3, 1, −2, 0, 0, 0}; {, −4, 3, 5, 0, −4, 3, 5, −5, 0, −1, 0, 0}; {5, −3, −4, 0, 5, −1, −5, 6, 1, 2, 0, 0}; {5, 0, 2, −3, 6, 2, 3, 6, −1, −1, 0, 0}; {4, −1, 1, −4, 5, 1, 3, 5, −1, −2, 0, 0}; {, −5, 0, 0, 5, 1, 4, −3, 5, 2, 2, 0, 0}; {6, −1, −1, 4, 0, 4, −4, 3, 1, 2, 0, 0}; {4, −4, −5, −1, 6, −3, 1, −5, 5, 2, 0, 0}; {4, −3, −3, 2, −2, 2, −4, 2, 3, 2, 0, 0}; {3, −5, 6, −2, 5, −4, 2, −5, 6, 3, 0, 0}; {5, −2, −2, 3, −1, 4, −4, 2, 1, 2, 0, 0}; {0, 6, −5, 1, −1, 6, 0, 4, 1, 0, 0, 0}; {, −3, 2, 2, −5, 4, −1, 4, −5, 3, 2, 0, 0}; {, −2, 4, 5, −1, −3, 5, −1, 3, 0, 0, 0, 0}; {, −3, 5, −4, 4, 4, −4, 2, −1, −4, −4, 0, 0}; {3, 1, 6, 4, 6, 2, −5, 1, 4, −5, 0, 0}; {, −5, 0, 0, 5, 2, 5, −3, 5, 2, 3, 0, 0}; {6, −1, −1, 4, 1, 4, −4, 4, 2, 3, 0, 0}; {, −5, 1, 2, −4, 6, −2, 4, 0, 0, 1, 0, 0}; {5, −2, −2, 3, 0, 3, −4, 3, 3, 2, 0, 0}; {6, 0, 1, −5, 5, −3, 3, −1, 0, 1, 0, 0}; {3, −5, 6, −2, 6, −4, 0, 6, 6, 3, 0, 0}; {3, −5, 6, −2, 6, −3, 0, 6, 4, 3, 0, 0}; {1, 4, 2, 5, 0, 2, 5, −2, −5, 4, 0, 0}; {, −3, 0, −2, 2, −3, 0, 3, −4, 6, 3, 0, 0}; {, −5, 0, 0, 6, 3, −2, 3, 6, 2, 1, 0, 0}; {3, −5, 6, −1, −5, 3, −5, −4, 5, 3, 0, 0}; {3, −4, −4, 2, −1, −3, 2, 4, 2, 0, 0, 0}; {1, 6, 6, 0, −3, −1, 5, 1, 2, 0, 0, 0}; {1, 6, 6, 0, −3, 0, 6, 1, 2, 1, 0, 0}; {1, 6, 6, 0, −3, 0, 6, 1, 2, 2, 0, 0}; {, −1, 3, 2, −5, 3, 5, −2, 5, 4, 2, 0, 0}; {, −1, 3, 2, −5, 3, 6, −1, 5, 4, 2, 0, 0}; {, −1, 3, 2, −5, 3, 6, −1, 5, 5, 2, 0, 0}; {, −2, 2, 1, 6, 2, 5, −2, 4, 4, 0, 0}; {0, 5, 5, −1, −4, 0, 6, 1, 2, 1, 0, 0}; {, −2, 2, 1, 6, 2, 5, −2, 5, 4, 2, 0, 0}; {0, 5, 5, −1, −4, 0, 5, 1, 3, 2, 0, 0}; {, −2, 3, 3, −3, −5, −1, 4, 0, 2, 2, 0, 0}; {, −3, 1, 0, 5, 2, 5, −2, 4, 4, 2, 0, 0}; {1, 5, 4, −3, 6, 1, 6, −4, 3, 2, 0, 0}; {2, −5, −5, 1, −1, −4, 1, 4, 1, 0, 0, 0}; {0, 4, 3, −4, 5, 1, 5, −5, 4, 3, 0, 0}; {0, 4, 3, −4, 5, 1, 6, −5, 4, 2, 0, 0}; {, −3, 3, 4, −1, −1, 4, −2, 6, −1, −1, 0, 0}; {5, −1, 0, −5, −4, 2, −4, 5, −2, −1, 0, 0}; {3, −4, −4, 2, 2, −5, 0, −4, 0, 1, 0, 0}; {5, −5, 4, −5, 4, −2, 2, 0, −4, 6, 0, 0}; {, −2, 4, 5, 0, 2, −2, 6, 0, −3, −1, 0, 0}; {, −4, 4, −5, 4, −2, 6, 6, 3, 6, −4, 0, 0}; {2, −5, −5, 1, −4, 0, −5, 2, 2, 1, 0, 0}; {, −1, 5, 6, 1, −2, 5, 5, −4, 1, −1, 0, 0}; {2, 6, 5,

−2, 5, −4, 0, −5, 4, 3, 0, 0}; {3, −4, −4, 2, −2, 2, −4, 2, 2, 2, 0, 0}; {1, 5, 4, −3, 4, −5, 0, 6, 4, 2, 0, 0}; {1, 5, 4, −3, 4, −5, 0, 6, 5, 3, 0, 0}; {2, −5, −5, 1, −3, 1, −5, 2, 2, 1, 0, 0}; {, −3, 1, 0, 6, 1, 4, −2, 4, 4, 1, 0, 0}; {6, −3, −5, 0, −5, −3, 2, −5, 6, 2, 0, 0}; {4, 0, 3, 1, −3, 4, 4, 2, 6, −3, 0, 0}; {5, −3, −4, 3, −3, 0, −5, 3, 3, −1, 0, 0}; {2, 5, 3, −3, 0, −2, 4, −2, −1, 4, 0, 0}; {, −2, 2, 1, −4, 1, 2, −4, 4, 6, 1, 0, 0}; {4, 5, 1, 6, −4, 4, −1, 5, 3, −3, 0, 0}; {3, 4, 0, 5, −5, 3, −1, 5, 3, −3, 0, 0}; {1, 2, −1, 4, 0, 2, −4, 4, 4, −5, 0, 0}; {1, −3, 1, 1, 6, 3, −4, −1, 4, 2, 0, 0}; {, −1, −4, 1, 3, 1, 4, −5, 2, 2, 5, 0, 0}; {5, 5, 1, 6, 2, 4, −2, 6, 5, −4, 0, 0}; {, −4, −3, 6, 1, 3, 0, −5, 1, 1, −5, 0, 0}; {5, 5, 1, −5, −3, 5, −1, 3, 2, −3, 0, 0}; {2, 1, −4, 1, 5, 1, 5, 3, 5, 6, 0, 0}; {, −3, −5, 1, 6, 4, −3, 1, −3, −1, 3, 0, 0}; {6, 3, −4, 1, −5, −5, 3, 3, −3, −1, 0, 0}; {, −3, 6, −1, 4, −2, −1, 4, 4, 0, −2, 0, 0}; {, −2, −5, 0, 5, 0, −5, −5, −1, 1, 3, 0, 0}; {, −2, −4, 2, −4, 4, 3, −1, 0, −5, −2, 0, 0}; {, −1, −1, −5, 3, 3, −4, 2, −1, 4, −2, 0, 0}; {, −5, 5, −1, 5, 3, −5, −1, 6, −4, 1, 0, 0}; {, −4, 6, 0, 6, 4, −4, 1, −5, −2, 2, 0, 0}; {2, 5, 4, 3, −5, 2, −3, 0, 6, 5, 0, 0}; {, −5, 5, −1, 5, −5, 0, 5, −5, 6, 0, 0, 0}; {3, 0, 5, −1, 4, 5, 3, 3, 6, 6, 0, 0}; {6, 4, −2, 5, 0, 1, −2, −1, 6, −3, 0, 0}; {, −5, 4, −3, 3, −3, −1, 2, 1, 4, 4, 0, 0}; {, −2, −5, 0, 6, 0, 2, 2, 1, 5, 5, 0, 0}; {2, −1, 4, −2, 5, 5, 1, 2, −4, −2, 0, 0}; {, −3, 5, −3, 2, −4, −4, 6, 5, −5, −5, 0, 0}; {6, 2, 6, −1, 5, −5, 5, 3, −5, −5, 0, 0}; {3, 0, 5, −1, −5, 5, 1, 2, −4, −1, 0, 0}; {4, 1, 6, 0, −4, −5, 1, 2, −4, −1, 0, 0}; {3, 1, −5, 2, −1, 1, −4, −2, 6, −4, 0, 0}; {2, −1, 4, −2, −5, 5, 0, 1, −5, −1, 0, 0}; {2, −1, 4, −2, −5, 5, 0, 1, −4, −1, 0, 0}; {4, 2, −4, 3, 1, 5, −3, 4, −5, 0, 0, 0}; {, −1, −5, −1, 4, 1, −5, 6, −1, 1, 3, 0, 0}; {, −5, −5, 3, 0, 1, 5, −1, −3, 1, −4, 0, 0}; {3, 1, −5, 2, 1, 4, −4, 4, 6, 0, 0, 0}; {3, 2, −3, 5, 6, −2, 3, 0, 4, −1, 0, 0}; {5, 2, −5, 1, 1, 5, −2, −3, −3, 2, 0, 0}; {6, 4, −2, 5, 6, −1, 5, 6, 6, 0, 0, 0}; {3, 0, 5, 0, 3, −2, −1, 6, −5, −2, 0, 0}; {1, −2, 3, −2, 1, −3, −4, 4, −5, −3, 0, 0}; {1, −2, 3, −2, 1, −3, −3, 5, −5, −3, 0, 0}; {, −3, 6, −1, 6, −2, −5, −4, −1, 5, 5, 0, 0}; {6, 3, −4, 3, −4, −1, 1, 0, 4, 4, 0, 0}; {3, −1, 3, −3, 2, −2, −2, 1, −5, −5, 0, 0}; {4, 2, −4, 4, −1, 0, −3, −1, 5, −3, 0, 0}; {0, −4, 0, 6, −1, −2, 6, 6, −4, −5, 0, 0}; {1, −2, 3, −2, 4, 4, 2, 2, 5, 6, 0, 0}; {1, −2, 3, −2, 4, 4, 2, 2, 5, −5, 0, 0}; {, −2, 6, −2, 4, −3, −4, 6, 5, −5, −4, 0, 0}; {0, −3, 2, −3, 3, 4, 1, 2, 5, 6, 0, 0}; {1, −3, 1, −5, 1, −3, −3, 0, −5, −5, 0, 0}; {2, −1, 4, −1, 6, 6, 1, 2, −4, −1, 0, 0}; {, −1, −4, 1, −4, 3, 3, 0, 2, 6, −2, 0, 0}; {, −5, 3, −5, 1, −5, −5, 5, 4, 6, −5, 0, 0}; {6, 4, −2, 6, 2, 6, −3, 4, 6, 0, 0, 0}; {, −1, −5, −1, 5, 0, −4, −5, 0, 2, 4, 0, 0}; {, −2, 5, −4, 1, −5, 3, −2, −5, −5, −4, 0, 0}; {, −1, −5, −1, 5, 0, −2, 4, 5, −2, 0, 0, 0}; {0, −3, 2, −3, 5, 4, 0, 1, −5, −2, 0, 0}; {5, −1, 1, 5, −2, 6, 2, −1, −2, −2, 0, 0}; {, −5, 2, 5, −2, 4, 1, −2, −5, −4, −3, 0, 0}; {3, 1, −5, 3, 0, 4, −4, 3, 6, −1, 0, 0}; {3, 1, −5, 3, 0, 4, −4, 4, 6, 0, 0, 0}; {3, 1, −5, 3, 0, 4, −3, 3, −5, −1, 0, 0}; {2, 0, 6, 2, 0, 4, −4, 3, 6, 0, 0, 0}; {, −3, 4, −5, 0, −5, −3, −5, 4, −5, −5, 0, 0}; {1, −1, 5, 1, −1, 4, −4, 3, 6, 0, 0, 0}; {, −2, 6, −2, 4, 0, −3, 4, 4, −2, 0, 0, 0}; {, −2, 6, −2, 4, 0, −2, 4, 4, −2, 0, 0, 0}; {, −1, −3, 3, −1, −2, 2, −5, 3, 6, 0, 0, 0}; {3, −1, 3, −3, 6, 2, 3, −5, −1, 0, 0, 0}; {, −3, 5, −3, 3, 0, −3, 2, 3, −3, −1, 0, 0}; {6, 0, 2, 6, 2, −3, −2, −3, 3, −1, 0, 0}; {6, 0, 2, 6, 2, −3, −2, −2, 3, 0, 0, 0}; {, −5, 5, −1, −5, −3, 5, −4, 4, 5, −4, 0, 0}; {, −1, −4, 1, −3, 0, −4, −4, 3, 6, −3, 0, 0}; {, −4, 3, 6, 0, 1, −5, 6, 0, −2, 0, 0, 0}; {, −5, 1, 3, −4, −4, 2, −2, 4, 0, 1, 0, 0}; {, −2, −2, 6, 5, −1, 3, −3, 4, −2, −2, 0, 0}; {, −4, 4, −4, 3, 6, 1, 0, −5, −4, −2, 0, 0}; {, −5, 2, 5, −1, 1, −4, 5, 0, −2, −1, 0, 0}; {4, −2, 0, 5, 6, 1, −4, 2, −1, 0, 0, 0}; {3, −3, −1, 4, 5, 1, −4, 3, −1, 0, 0, 0}; {2, −2, 2, −3, 1, −2, −2, 1, 6, 6, 0, 0}; {1, −5, −3, 2, 4, 0, 6, 1, −2, −1, 0, 0}; {0, 6, −4, 1, 4, −1, 6, 1, −2, −1, 0, 0}; {, −2, 4, 6, −1, 2, −3, 5, −1, −3, −1, 0, 0}; {, −1, −5, −1, 6, −1, −3, −5, 5, −5, −4, 0, 0}; {, −3, 3, 5, −2, 2, −3, 4, −1, −3, −2, 0, 0}; {, −2, 5, −4, 2, −5, 3, 0, −4, −3, −2, 0, 0}; {, −3, 4, −5, 1, 6, 2, −1, −5, −4, −3, 0, 0}; {, −2, 6, −2, 5, −1, −4, 6, 3, 6, −4, 0, 0}; {, −3, 4, −5, 1, 6, 3, 0, 6, 6, −2, 0, 0}; {, −4, 3, 6, 0, 5, 2, −1, 6, 6, −3, 0, 0}; {, −3, 3, 5, −2, 2, −1, 6, −2, −3, 0, 0, 0}; {5, 0, 3, −3, 2, 0, −3, −4, −4, −3, 0, 0}; {3, −1, 3, −2, 4, 4, 1, 3, 6, −3, 0, 0}; {2, −1, 4, 0, −5, −2, 0, −5, −4, 1, 0, 0}; {0, −3, 2, −2, 6, −3, 0, 6, −4, 1, 0, 0}; {, −5, 2, 5, −1, 5, 1, −2, 6, −5, −4, 0, 0}; {5, 0, 3, −3, 3, −1, −3, 6, −5, −3, 0, 0}; {, −3, 5, −3, 4, −1, −3, 4, 4, −2, −1, 0, 0}; {5, −1, 1, 6, −1, −5, 2, −3, −3, −3, 0, 0}; {3, −3, −1, 4, −3, 5, 1, −2, −3, −2, 0, 0}; {1, 6, −5, −1, 3, −2, 6, 3, 0, 0, 0, 0}; {0, 6, −4, 1, 6, 3, 0, −3, −3, −2, 0, 0}; {1, −4, −1, 5, −1, −3, −5, 6, −5, −3, 0, 0}; {, −1, 5, −5, 0, 5, 2, 0, −2, −3, −2, 0, 0}; {, −5, 4, −3, 5, 1, 1, −2, 0, 5, −3, 0, 0}; {0, −5, −2, 4, −2, −3, −5, 6, −5, −4, 0, 0}; {, −5, 3, −5, 2, −2, −4, 2, 3, −3, −1, 0, 0}; {6, 2, 6, 1, −3, −5, 1, 2, −4, −1, 0, 0}; {6, 2, 6, 1, −3, −5, 2, 3, −3, −1, 0, 0}; {, −3, 4, −5, 1, −4, 6, 6, 5, 6, −4, 0, 0}; {1, −4, −1, 5, 1, −4, −5, −1, 1, 2, 0, 0}; {, −3, 4, −5, 1, −2, 5, 5, −3, 0, 0, 0, 0}; {3, −3, −1, 4, 0, 6, −3, −3, 2, 0, 0, 0}; {4, −2, 0, 5, 1, −5, −2, −3, 2, 0, 0, 0}; {, −5, 2, 5, −1, −4, 4, 4, −5, −1, 0, 0, 0}; {6, 1, 4, −2, −5, 3, 4, −5, 0, −1, 0, 0}; {5, 0, 3, −3, 6, 2, 3, −5, −1, −1, 0, 0}; {5, 0, 3, −3, 6, 2, 4, 6, −1, −1, 0, 0}; {4, −1, 2, −4, 5, 1, 4, 5, −1, −2, 0, 0}; {3, −3, −1, 4, 0, −5, −3, −4, 1, 0, 0, 0}; {3, −2, 1, −5, 4, 0, 4, 4, −2, −1, 0, 0}; {2, −4, −2, 3, −1, −5, −4, −5, 1, −2, 0, 0}; {1, −4, −1, 5, 3, −3, −4, 1, 0, 2, 0, 0}; {4, −1, 2, −4, 6, 2, 3, 6, −1, −2, 0, 0}; {, −4, 2, 4, −2, −4, 4, 3, −5, 1, −1, 0, 0}; {5, −1, 1, −5, 5, −3, 3, 0, −1, 1, 0, 0}; {2, −5, −4, 1, −2, 1, −5, 2, 2, 2, 0, 0}; {2, −5, −4, 1, −2, 1, −5, 3, 1, 1, 0, 0}; {, −3, 0, −1, 2, −3, −1, 4, −2, 6, 4, 0, 0}; {, −4, 2, 4, −2, −3, 3, −3, 6, −1, 0, 0, 0}; {2, 2, −2, −2, 3, 6, 1, 6, −1, −3, 0, 0}; {2, −4, −2, 4, 4, 0, −5, 0, −2, 0, 0, 0}; {0, 5, 6, −1, −2, 5, 0, 4, 0, 1, 0, 0}; {, −3, −3, 5, 5, −1, 3, −3, 4, −2, −3, 0, 0}; {, −3, −3, 5, 5, −1, 4, −3, 4, −2, −3, 0, 0}; {5, 3, −3, −5, −1, 2, 6, 0, 4, 1, 0, 0}; {3, −2, 1, −4, −2, 6, 3, −3, −3, −1, 0, 0}; {, −2, 3, 4, −3, −3, 4, −1, 3, 0, 1, 0, 0}; {, −2, 3, 4, −3, −3, 5, −1, 3, 0, 0, 0, 0}; {2, −3, 0, −5, −2, 5, 3, −2, −3, −2, 0, 0}; {0, 6, −4, 2, 4, −1, −5, 1, −1, −1, 0, 0}; {, −2, 3, 4, −3, −2, 5, −2, 5, 0, 0, 0, 0}; {, −3, 3, 5, −1, 1, −3, 4, −2, −4, −1, 0, 0}; {, −3, 3, 5, −1, 1, −3, 5, −2, −4, −1, 0, 0}; {, −3, 3, 5, −1, 1, −3, 5, −1, −3, 0, 0, 0}; {, −3, 2, 3, −4, −3, 4, −1, 5, 1, 1, 0, 0}; {, −4, 1, 2, −5, −4, 3, −2, 4, 0, 1, 0, 0}; {, −1, −4, 1, −2, 4, −4, −1, 6, −5, 1, 0, 0}; {, −3, 4, −5, 2, 6, 2, 0, −5, −4, −2, 0, 0}; {, −4, 2, 4, −2, 1, −3, 5, −1, −3, −1, 0, 0}; {6, 0, 2, −4, −1, −5, 4, −2, −4, −1, 0, 0}; {, −1, −4, 1, −2, 5, −3, −1, 6, −5, 1, 0, 0}; {, −5, 1, 3, −3, 1, −4, 4, −1, −2, −2, 0, 0}; {, −4, 3, 6, 1, 6, 2, 0, −5, −4, −2, 0, 0}; {6, 0, 2, −4, 0, −5, 4, −1, −2, −1, 0, 0}; {, −5, 2, 5, 0, 5, 1, −1, −5, −4, −3, 0, 0}; {5, −1, 1, −5, −1, −5, 2, −3, −4, −2, 0, 0}; {5, 0, 3, −2, 4, 0, −2, 6, −4, −3, 0, 0}; {, −1, 5, −5, 1, 6, 2, 0, −2, −3, −2, 0, 0}; {, −4, 1, 2, −5, −1, 6, 4, 1, −2, 0, 0, 0}; {4, −2, 0, 6, −1, −5, 2, −3, −4, −2, 0, 0}; {3, −4, −3, 2, 6, 1, −5, 1, −1, −1, 0, 0}; {, −4, 2, 4, −2, 4, 0, −2, −3, −4, −3, 0, 0}; {, −5, 1, 3, −3, 3, −1, −2, −4, −4, −3, 0, 0}; {1, −5, −3, 3, −1, 5, −4, −4, 1, −1, 0, 0}; {0, 6, −4, 2, −2, 5, −5, −5, 1, −1, 0, 0}; {1, −5, −3, 3, 0, −5, 6, −3, 1, 0, 0, 0}; {, −1, −5, −1, −5, 6, 5, −5, −1, −5, −5, 0, 0}; {, −4, 2, 4, −1, −4, 3, 3, −5, 1, −1, 0, 0}; {, −5, 2, 5, 1, −1, −3, 3, −3, −3, −2, 0, 0}; {6, −1, 0, 6, 2, −2, 3, 6, 2, 0, 0, 0}; {6, 0, 2, −3, 6, 3, −3, 1, −1, −1, 0, 0}; {2, −4, −2, 5, 2, 6, 1, −1, −2, −1, 0, 0}; {, −1, 4, 5, −1, −5, −1, 5, 1, 0, 0, 0, 0}; {, −3, 1, 1, 6, 1, 4, −2, 5, 3, 1, 0, 0}; {, −4, 0, 0, 5, 1, 4, −3, 4, 4, 2, 0, 0}; {, −2, 4, 6, 1, −1, 4, −1, −4, −2, 0, 0, 0}; {, −3, 1, 1, 6, 2, 5, −2, 5, 3, 2, 0, 0}; {, −3, 1, 1, 6, 2, 5, −2, 5, 3, 3, 0, 0}; {, −5, −2, −3, 1, −4, −2, 3, −4, 6, 3, 0, 0}; {, −5, −1, −1, 4, 0, 3, −3, 4, 3, 1, 0, 0}; {, −5, −1, −1, 4, 0, 4, −3, 3, 3, 2, 0, 0}; {6, −3, −4, 0, −5, −2, 2, −4, 5, 3, 0, 0}; {6, 0, 2, −3, −5, 1, −4, 6, −2, 0, 0, 0}; {6, −3, −4, 0, −5, −1, 2, −4, 5, 3, 0, 0}; {3, −4, −3, 3, 0, −4, 1, 5, 1, 0, 0, 0}; {3, −3, −1, 6, 4, 1, −5, 0, −1, 0, 0, 0}; {0, 6,

−4, 3, 1, 5, 0, −2, −3, −1, 0, 0}; {, −1, −5, −1, −4, −3, 3, −1, 1, 4, 6, 0, 0}; {, −1, 4, 5, −1, −3, 5, −1, 3, 0, 1, 0, 0}; {6, 6, 2, 3, −4, 2, −5, 3, −3, −3, 0, 0}; {0, 6, −4, 3, 3, −1, 5, −1, −3, −1, 0, 0}; {5, −3, −3, 2, 0, −4, 2, 5, 1, 2, 0, 0}; {, −5, −5, 3, 4, −2, 3, −3, 4, −3, −4, 0, 0}; {6, 6, 2, 3, −3, 2, −4, 3, −3, −4, 0, 0}; {6, −2, −2, 3, 2, −3, 2, 6, 2, 2, 0, 0}; {, −5, 0, 1, −5, −5, 3, −3, 2, −1, 0, 0, 0}; {, −5, 0, 1, −5, −5, 3, −3, 2, −1, 1, 0, 0}; {5, 5, 1, 2, −3, 2, −4, 3, −3, −4, 0, 0}; {4, −3, −2, 4, 5, 1, −4, 1, −2, 0, 0, 0}; {5, 1, 5, 2, −4, 1, 4, −4, −5, 6, 0, 0}; {, −4, 0, 0, 5, −1, −5, −1, −4, −4, 3, 0, 0}; {3, −5, −5, 1, −5, 4, −5, −5, 6, 4, 0, 0}; {3, −5, −5, 1, −5, 4, −4, 6, 6, 2, 0, 0}; {5, −4, −5, 0, 6, −3, 2, −4, 5, 3, 0, 0}; {4, −2, 0, −4, 5, 2, −4, 1, −1, −1, 0, 0}; {2, −5, −4, 3, −1, −4, 1, 4, 1, 0, 0, 0}; {0, 5, 6, 1, −3, 6, −1, 3, 1, 1, 0, 0}; {0, 5, 6, 1, −3, −5, 0, 3, 1, 0, 0, 0}; {, −4, 0, 0, 6, 2, −2, 3, 6, 3, 3, 0, 0}; {1, 6, −5, 2, 0, 6, 0, −4, 0, 1, 0, 0}; {, −3, 1, 1, −5, 4, −1, 3, −5, 2, 1, 0, 0}; {5, −2, −1, 6, −2, 4, 1, 2, −1, −3, 0, 0}; {, −1, 3, 3, −2, 4, 1, 5, −5, 4, 1, 0, 0}; {5, −4, −5, 1, 6, 5, −1, −5, −5, 2, 0, 0}; {3, −1, 3, 2, −5, 4, −3, −1, 4, 3, 0, 0}; {, −1, 4, 6, 2, −3, −5, 0, 3, 1, −1, 0, 0}; {, −4, 0, 1, −4, 3, −1, 4, −5, 3, 1, 0, 0}; {, −4, 1, 3, −1, −5, 5, −2, 2, 0, −1, 0, 0}; {6, −2, −1, 6, 1, −2, 3, 6, 2, 0, 0, 0}; {4, −4, −3, 4, −1, −4, 1, 5, 3, 3, 0, 0}; {4, −1, 3, 1, 5, 0, 3, 6, 6, 5, 0, 0}; {, −1, 1, 0, 6, −2, −4, 2, −3, −3, 4, 0, 0}; {6, 2, −5, −5, −2, 6, −1, 2, 5, 3, 0, 0}; {3, 0, 6, −5, 0, −2, 4, −4, 1, 1, 0, 0}; {3, 2, −2, 1, −4, −3, 3, −2, −5, −2, 0, 0}; {5, 4, 0, 4, 3, −1, 3, −3, 6, −4, 0, 0}; {, −1, 1, 0, −5, −2, −4, 3, −3, −2, 5, 0, 0}; {, −5, −5, 4, −3, −2, 6, 0, 4, 2, −4, 0, 0}; {3, 3, 0, 6, −4, 4, −2, 2, 1, −4, 0, 0}; {, −2, −1, −3, 4, −5, 2, −5, 0, −1, −5, 0, 0}; {, −3, −2, −4, 3, 6, 1, −5, 0, −1, −5, 0, 0}; {2, 2, −1, 5, 0, 3, −3, 4, 4, −4, 0, 0}; {4, 0, 5, −4, 4, −3, −3, 1, 3, 4, 0, 0}; {5, 3, −2, 3, 2, −5, −1, 6, −3, 1, 0, 0}; {5, 3, −2, 3, 2, −5, −1, −5, −2, 2, 0, 0}; {5, 2, −4, 0, −2, 6, 1, 2, −3, 0, 0, 0}; {6, 5, 1, −5, −4, 0, 5, 1, 6, 0, 0, 0}; {2, −1, 5, −2, 2, −3, −3, 6, −5, −4, 0, 0}; {6, 3, −3, 2, −4, 5, 5, −2, 0, 2, 0, 0}; {5, 2, −4, 1, −5, 4, 5, −3, 0, 2, 0, 0}; {3, 0, 6, −1, 5, 6, 2, 3, −3, −3, 0, 0}; {4, 1, −5, 0, −5, 6, 1, 2, −3, −1, 0, 0}; {, −4, 6, 1, −5, 3, 6, −3, −3, 1, 3, 0, 0}; {2, −1, 5, −2, 5, −5, 1, 2, −3, −3, 0, 0}; {1, −2, 4, −3, 4, −5, 0, 1, −3, −3, 0, 0}; {0, −4, 1, 5, 1, −5, −5, 0, 2, 3, 0, 0}; {6, 5, 1, −4, −5, 0, 5, 1, 5, −1, 0, 0}; {2, 0, −5, 1, 0, 4, −3, 4, −5, 0, 0, 0}; {, −5, 5, 0, 6, −3, 5, −5, 4, 6, −5, 0, 0}; {4, 1, −5, 0, 2, −3, −1, −4, −5, −1, 0, 0}; {, −1, −4, 2, −5, −2, 4, −2, −4, −5, −4, 0, 0}; {6, 4, −1, 5, −3, 5, 6, 3, 6, −4, 0, 0}; {4, 0, 5, −2, 2, 0, −4, −3, −3, −5, 0, 0}; {5, 1, 6, −1, 4, −2, −3, 5, −5, −4, 0, 0}; {3, 0, 6, 0, 6, 5, 2, 2, −4, −2, 0, 0}; {1, −3, 2, −5, 0, −1, 6, 6, −1, 0, 0, 0}; {1, −2, 4, −2, 4, 4, 1, 2, −4, −2, 0, 0}; {0, −3, 3, −3, 3, 4, 1, 1, −4, −3, 0, 0}; {, −2, 6, −1, 4, −3, −3, 5, 5, −2, −1, 0, 0}; {, −2, −5, 1, −5, 1, 3, 0, 1, −5, −4, 0, 0}; {, −3, 5, −2, 3, −4, −3, 5, 4, −2, −2, 0, 0}; {3, −1, 4, −3, 3, 2, 6, −5, 0, 1, 0, 0}; {0, −3, 3, −3, 4, 4, 0, 1, −4, −2, 0, 0}; {, −1, −5, 0, 5, −1, −1, 5, 5, −1, −1, 0, 0}; {0, −3, 3, −3, 4, 5, 0, 1, −4, −2, 0, 0}; {, −2, 6, −1, 4, −2, −2, 5, 5, −2, −1, 0, 0}; {, −2, −5, 1, −5, 2, 3, 0, 1, −5, −3, 0, 0}; {, −3, 6, 0, 6, 1, 2, 1, 1, 5, 6, 0, 0}; {6, 3, −3, 3, −2, 0, 0, 0, 4, 5, 0, 0}; {4, 0, 5, −2, 4, 5, 5, 3, 6, 6, 0, 0}; {4, 1, −5, 1, −4, −2, 0, −1, 3, 4, 0, 0}; {, −1, −4, 2, −4, 3, 5, 0, 1, −4, −3, 0, 0}; {6, 2, −5, 0, 6, −5, 5, 4, −5, −5, 0, 0}; {0, −3, 3, −3, 5, 5, 0, 1, −5, −2, 0, 0}; {, −2, 6, −1, 4, −1, −2, 4, 4, −2, −1, 0, 0}; {, −1, −4, 2, −4, 4, 4, −1, 0, −5, −2, 0, 0}; {, −3, 5, −2, 3, −2, −2, 4, 4, −2, −1, 0, 0}; {, −2, −5, 1, −5, 3, 4, −1, 0, −5, −3, 0, 0}; {, −1, −5, 0, 5, 0, 1, 3, 2, 5, 5, 0, 0}; {, −1, −5, 0, 5, 1, 3, 3, 1, 5, 5, 0, 0}; {, −1, −4, 2, −4, 5, 1, 2, −4, −2, 1, 0, 0}; {, −3, 5, −2, 3, −1, −3, 3, 3, −3, −1, 0, 0}; {, −1, 6, −2, 2, −3, −3, −5, 5, −5, −4, 0, 0}; {2, 0, −5, 2, 0, 3, −4, 3, 6, −1, 0, 0}; {0, −2, 5, 0, −1, 3, −5, 3, 6, 0, 0, 0}; {, −1, −3, 4, −1, −2, 2, 6, 2, 5, −1, 0, 0}; {, −5, 3, −4, 1, −2, 5, 5, −2, 0, 2, 0, 0}; {3, −1, 4, −3, 6, 2, 3, −5, −1, 1, 0, 0}; {, −5, 3, −4, 1, −2, −4, 2, 2, −4, −1, 0, 0}; {, −4, 5, −1, 5, 4, −5, −1, 6, −4, 1, 0, 0}; {4, 0, 5, −2, −3, 4, 3, −3, −1, 1, 0, 0}; {4, 2, −3, 4, −5, 4, 5, 2, 5, −4, 0, 0}; {1, −2, 4, −1, 1, −3, −4, 4, −5, −2, 0, 0}; {1, −2, 4, −1, 1, −3, −3, 5, −5, −3, 0, 0}; {, −3, 3, 6, −2, −3, 2, −1, 5, 2, 2, 0, 0}; {0, −3, 3, −2, 0, −4, −3, 5, −5, −3, 0, 0}; {, −3, 4, −4, 1, 1, −5, 6, 1, −1, 0, 0, 0}; {, −3, 4, −4, 1, 1, −5, 6, 1, −1, 1, 0, 0}; {, −2, 6, −1, 5, 6, 1, 2, −3, −4, −1, 0, 0}; {, −1, −4, 2, −3, −1, −5, −3, 5, 6, −3, 0, 0}; {, −2, 6, −1, 5, −5, 2, 1, −4, −3, −1, 0, 0}; {, −1, −4, 2, −3, 0, −4, −4, 4, 6, −3, 0, 0}; {, −3, 5, −2, 4, 6, 1, 0, −5, −3, −2, 0, 0}; {, −5, 2, 6, −1, 0, 6, 5, 0, −2, 0, 0, 0}; {1, −3, 2, −4, 0, −3, −3, 0, 6, 6, 0, 0}; {, −1, −5, 0, 6, −1, −4, −4, 0, 4, 5, 0, 0}; {, −4, 4, −3, 3, −4, −5, 4, 4, −3, −2, 0, 0}; {, −5, 3, −4, 2, −5, −5, 3, 4, −3, −2, 0, 0}; {, −4, 5, −1, 6, 0, 1, −1, 0, 6, −4, 0, 0}; {, −5, 3, −4, 2, −5, −5, 5, 4, −5, −5, 0, 0}; {3, 0, 6, 1, −5, −2, −2, −1, 3, 4, 0, 0}; {3, 0, 6, 1, −5, −2, −1, −1, 3, 4, 0, 0}; {2, −1, 5, 0, 6, −3, −1, −1, 2, 4, 0, 0}; {, −3, 5, −2, 4, −2, −3, 4, 4, −2, −1, 0, 0}; {, −2, −5, 1, −4, 3, 3, −1, 0, −5, −2, 0, 0}; {, −4, 4, −3, 3, −3, −4, 4, 4, −3, −2, 0, 0}; {, −4, 4, −3, 3, −3, −4, 4, 4, −2, −1, 0, 0}; {, −5, 3, −4, 2, −4, −5, 3, 4, −3, −1, 0, 0}; {, −4, 4, −3, 3, −3, −3, 4, 4, −2, −2, 0, 0}; {, −3, 6, 0, −5, 2, 3, −1, 0, −5, −3, 0, 0}; {, −4, 5, −1, 6, 1, 2, −1, 0, 6, −4, 0, 0}; {, −4, 5, −1, 6, 1, 2, −1, 0, −5, −3, 0, 0}; {5, 1, 6, 0, 6, 6, 3, 3, −3, −2, 0, 0}; {6, 2, −5, 1, −5, −5, 4, 4, −5, −5, 0, 0}; {5, 1, 6, 0, 6, 6, 3, 4, 6, −5, 0, 0}; {5, 1, 6, 0, 6, 6, 4, 4, 6, −5, 0, 0}; {1, −3, 2, −4, 2, 3, 3, 2, 5, 6, 0, 0}; {, −3, 5, −2, 4, −1, 1, 2, 1, 4, 5, 0, 0}; {6, 2, −5, 1, −4, −2, 3, 3, −1, −2, 0, 0}; {6, 1, 5, −2, 4, 0, −3, 6, −5, −4, 0, 0}; {6, 2, −5, 1, −4, 5, 5, −2, 1, 3, 0, 0}; {, −5, 3, −4, 2, −3, −4, 2, 3, −3, −1, 0, 0}; {, −5, 3, −4, 2, −3, −4, 3, 3, −2, −1, 0, 0}; {, −4, 5, −1, 6, 2, 2, −2, −1, −5, −2, 0, 0}; {, −5, 3, −4, 2, −3, −4, 3, 4, −3, −1, 0, 0}; {5, 0, 4, −3, 3, 1, −5, −5, 0, 0, 0, 0}; {2, −3, 1, 6, 0, −2, −5, 6, −5, −4, 0, 0}; {, −5, 4, −2, 5, 1, 2, −2, −1, −5, −3, 0, 0}; {6, 2, −5, 1, −4, −4, 3, 3, −3, −2, 0, 0}; {, −2, 5, −3, 2, −4, −4, −5, 5, −5, −5, 0, 0}; {, −5, 3, −4, 2, −3, −2, 3, 3, −1, −2, 0, 0}; {6, 2, −5, 1, −4, −3, 3, 3, −2, −2, 0, 0}; {, −3, 6, 0, −5, 4, −5, −2, 5, −5, 0, 0, 0}; {3, −1, 4, −2, 6, 3, 3, −4, −1, 1, 0, 0}; {6, 2, −5, 1, −3, −4, 2, 3, −3, −1, 0, 0}; {5, 1, 6, 0, −4, −5, 2, 2, −3, −1, 0, 0}; {5, 0, 4, −3, 5, 6, 5, 3, 6, −5, 0, 0}; {, −4, 5, −1, 6, 4, −5, −2, 5, −5, 1, 0, 0}; {, −5, 4, −2, 5, 3, 6, −2, 5, −5, 0, 0, 0}; {5, 1, 6, 0, −3, 4, 4, −3, −1, 2, 0, 0}; {4, 0, 5, −1, −4, 4, 4, −3, −1, 2, 0, 0}; {4, −1, 3, −4, 4, 1, 6, 6, 0, 0, 0, 0}; {, −5, 2, 6, −1, −5, 5, 6, 5, 6, −5, 0, 0}; {6, 3, −3, 4, 3, 3, 6, −3, 4, −5, 0, 0}; {1, −5, −2, 2, −2, −5, −4, 6, 0, −2, 0, 0}; {4, 0, 5, −1, −3, 4, 4, −2, −1, 1, 0, 0}; {5, 2, −4, 3, 2, −2, −1, 6, −4, −1, 0, 0}; {2, −5, −3, 0, −5, 1, 2, 0, 5, 0, 0}; {, −2, 3, 5, −4, 4, −1, 0, −2, 3, 0, 0, 0}; {2, −3, 1, 6, 4, 0, 4, 4, −2, −1, 0, 0}; {2, −1, 5, 0, 1, −3, −2, 6, −5, −3, 0, 0}; {, −3, 5, −2, 5, 5, 1, 0, −5, −3, −1, 0, 0}; {, −2, 5, −3, 3, 2, −1, 2, 0, −4, −3, 0, 0}; {, −2, 5, −3, 3, 2, −1, 2, 1, −4, −3, 0, 0}; {, −4, 2, 5, −2, −4, 4, 6, 4, −1, −2, 0, 0}; {, −3, 4, −4, 2, 1, −2, 2, 0, −4, −3, 0, 0}; {, −5, 4, −2, 6, −5, −1, 5, 6, 6, 0, 0, 0}; {1, −2, 4, 0, 1, −4, 0, 5, 6, −1, 0, 0}; {, −2, 6, −1, 6, 6, 1, 2, −4, −3, −1, 0, 0}; {, −2, −5, 1, −3, −1, −5, −3, 4, 6, −3, 0, 0}; {, −4, 4, −3, 4, 5, 0, 1, −4, −4, −2, 0, 0}; {, −4, 4, −3, 4, 5, 0, 1, −4, −4, −1, 0, 0}; {, −4, 4, −3, 4, 5, 1, −1, 6, −4, −2, 0, 0}; {, −3, 6, 0, −4, −2, −5, −5, 3, 6, −3, 0, 0}; {4, −2, 1, 6, 5, −1, −3, 2, 0, 2, 0, 0}; {, −4, 3, −5, 1, 1, −3, 2, −1, −4, −3, 0, 0}; {, −3, 4, −4, 2, 2, −2, 2, 0, −4, −3, 0, 0}; {5, −1, 2, −5, 6, 2, 6, 3, −2, −1, 0, 0}; {, −5, −1, 0, 3, 0, 6, 3, 4, 1, 4, 0, 0}; {, −5, 3, −4, 3, 5, 0, 0, −5, −4, −2, 0, 0}; {, −5, 3, −4, 3, 5, 0, 0, −5, −4, −1, 0, 0}; {6, 2, −5, 2, 4, 0, −1, 6, −4, −2, 0, 0}; {5, 1, 6, 1, 3, −1, −2, 5, −4, −2, 0, 0}; {5, 0, 4, −2, −1, 6, 4, −1, −2, −1, 0, 0}; {6, 2, −5, 2, 4, 0, −1, −5, −4, −2, 0, 0}; {, −4, −4, 5, 4, −2, 2, −4, 3, −3, −3, 0, 0}; {, −5, −5, 4, 3, −3, 3, −4, 3, −4, −3, 0, 0}; {6, 2, −5, 2, 5, 0, 0, −5, −4, −2, 0, 0}; {4, −1, 3, −3, −1, 6, 4, −1, −2, −1, 0, 0}; {5, 5, 2, 1, −4, 1, −4, 2, −4, −3, 0, 0}; {4, 1, −5, 3, −4, −1, −3, −1, 4, 6, 0, 0}; {, −2, 6, −1, 6, −1, 2, 2, 1, 4, 5, 0, 0}; {, −4, 4, −3, 4, −3, −5, −5, −1, 4, 5, 0, 0}; {, −1, −5, 0, −5, 1, 3, 2, 1, 5, 5, 0, 0}; {, −2, −5, 1, −3, 4, −5, −3, −3, 2, 3, 0, 0}; {, −3, 6, 0, −4, 3, −5, −2, 5, −5, 0, 0, 0}; {3, −1, 4, −1, 5, 5, 3, 2, 5, 6, 0, 0}; {2, −3, 1, −5, 0, −1, −4, −5, −4, −4, 0, 0}; {3, −1, 4, −1, 5, 5, 1, 2, −4, −2, 0, 0}; {, −4, 4, −3, 4, −2, −1, 4, 5, −1, 0, 0, 0}; {, −5, 2, 6, 0, 6, 6, 5, 4, 6, −5, 0, 0}; {, −5, 2, 6, 0, 6, 6, 6, 4, 6, −5, 0, 0}; {, −3, 6, 0, −4, 4, −5, −2, 5, −5, 0, 0, 0}; {, −4, 5, −1, −5, 3, −5, −2, 5, −5, 1, 0, 0}; {3, −3, 0, 5, −2, 6, 1, −3, −4, −3, 0, 0}; {2, −4, −1, 4, −3, 5, 1, −4, −4, −3, 0, 0}; {3, −2, 2, −4, 2, −1, −4, 4, 6, −4, 0, 0}; {1, −5, −2, 3, −4, 4, 0, −4, −4, −3, 0, 0}; {0, −5, −1, 5, −1, −3, −5, 5, 6, −4, 0, 0}; {, −3, 2, 4, −4, 0, −4, 4, 1, −1, 0, 0, 0}; {, −2, 4, −5, 0, 5, 2, −1, −3, −3, −2, 0, 0}; {4, −1, 3, −3, 3, 1, −5, 6, 0, 0, 0, 0}; {0, −5, −1, 5, −1, −2, −5, 6, −4, −4, 0, 0}; {, −3, 3, 6, −1, 4, 2, −1, −3, −3, −2, 0, 0}; {, −2, 5, −3, 3, −3, −4, 6, 5, −5, −4, 0, 0}; {5, −1, 2, −5, 1, −1, −3, −5, −4, −3, 0, 0}; {4, −1, 3, −3, 4, 5, 5, 3, 6, 6, 0, 0}; {, −5, 4, −2, 6, 3, 6, −2, 4, −5, 0, 0, 0}; {5, 2, −4, 4, 1, 5, −4, 4, 6, 0, 0, 0}; {2, −3, 1, −5, 2, −2, −4, 5, −5, −4, 0, 0}; {1, −5, −2, 3, −3, 4, 0, −3, −3, −3, 0, 0}; {, −1, 4, 6, −2, 3, −2, 5, 0, −1, −1, 0, 0}; {0, 6, −3, 2, −4, 4, 0, −4, −3, −3, 0, 0}; {, −2, 4, −5, 0, 6, 2, −1, −4, −4, −2, 0, 0}; {, −3, 3, 6, −1, 5, 1, −2, −4, −4, −3, 0, 0}; {, −1, 5, −4, 1, −5, 3, −2, −4, −4, −4, 0, 0}; {, −4, 2, 5, −2, 4, 1, −2, −4, −4, −3, 0, 0}; {, −5, 1, 4, −3, 3, 0, −2, −4, −4, −3, 0, 0}; {3, −2, 2, −4, 3, 1, 6, 6, 0, 0, 0, 0}; {, −1, 4, 6, −2, 4, 0, 1, −2, 4, 0, 0, 0}; {3, −3, 0, 5, 0, −2, −3, −5, −4, −3, 0, 0}; {2, −3, 1, −5, 3, 5, 4, 2, 6, 6, 0, 0}; {4, 1, −5, 3, 1, 5, −4, 4, 6, 0, 0, 0}; {2, −2, 3, −2, −5, 3, 3, −4, −2, 1, 0, 0}; {, −2, 4, −5, 0, −5, 2, −2, −4, −4, −4, 0, 0}; {, −4, 3, −5, 1, −3, 5, 5, −3, 0, 1, 0, 0}; {1, −5, −2, 3, −2, 6, −3, −4, 2, 0, 0, 0}; {2, −3, 1, −5, 4, 1, 2, 6, −2, −1, 0, 0}; {, −2, 3, 5, −3, 4, −1, 0, −2, 4, 0, 0, 0}; {, −2, 5, −3, 3, 0, −5, 6, −1, 0, 2, 0, 0}; {, −2, 5, −3, 3, 0, −5, 6, −2, 0, 2, 0, 0}; {0, 6, −3, 2, −2, 5, −4, −4, 1, 0, 0, 0}; {, −1, 6, −2, 4, 2, 0, 2, 1, −4, −3, 0, 0}; {1, −2, 4, 0, 0, −4, −2, 5, −5, −2, 0, 0}; {, −5, 2, 6, 1, −1, 6, 5, −2, −1, 1, 0, 0}; {, −5, 1, 4, −2, −5, 3, 5, 4, −1, −2, 0, 0}; {, −4, 5, −1, −4, −3, 5, −3, 3, 5, −3, 0, 0}; {4, −2, 1, −5, 5, −1, −3, 2, 1, 2, 0, 0}; {, −5, 2, 6, 1, 0, −3, 1, 0, −5, −3, 0, 0}; {5, −1, 2, −4, 6, 2, 5, 3, −2, −2, 0, 0}; {, −5, 4, −2, −5, −3, 5, −4, 3, 5, −3, 0, 0}; {5, 1, 6, 2, 3, −2, 0, −5, −5, −2, 0, 0}; {5, 1, 6, 2, 3, −1, −2, 5, −4, −2, 0, 0}; {4, −1, 3, −2, −2, 5, 5, −1, −3, −1, 0, 0}; {0, −4, 1, −3, −1, 4, −3, −4, 6, −5, 0, 0}; {6, 3, −3, 6, −3, 5, 6, 2, 5, −3, 0, 0}; {1, −5, −2, 4, 4, −1, −5, 1, −1, 0, 0, 0}; {6, 6, 3, 3, −3, 1, −4, 2, −3, −4, 0, 0}; {4, 3, −1, −2, 3, −5, 0, 6, −1, −2, 0, 0}; {3, 2, −2, −3, 2, 6, −1, 6, −1, −2, 0, 0}; {4, 4, 1, 1, −5, 0, 6, 2, −4, −3, 0, 0}; {, −1, 5, −4, 2, 3, −2, −5, 1, −1, 0, 0, 0}; {2, 1, −3, −4, 2, 6, 0, 6, −1, −2, 0, 0}; {6, 0, 3, −3, −1, −5, 4, −2, −4, −1, 0, 0}; {6, −1, 1, 6, −5, 3, −2, 5, 0, 0, 0, 0}; {3, −2, 2, −3, 1, −1, −2, 1, 6, 6, 0, 0}; {4, 0, 5, 1, 6, 5, 6, −2, 2, 4, 0, 0}; {5, 1, 6, 2, −4, −1, 0, −1, 3, 4, 0, 0}; {0, −4, 1, −3, 3, 3, 4, −3, 0, 3, 0, 0}; {0, −4, 1, −3, 4, 4, 0, 1, −4, −2, 0, 0}; {6, 0, 3, −3, 2, 0, −2, −4, −4, −3, 0, 0}; {, −5, 2, 6, 1, −5, 6, 5, 4, 6, −5, 0, 0}; {4, 0, 5, 1, −4, −1, 1, −5, −3, 1, 0, 0}; {6, −1, 1, 6, −2, 6, 3, 0, −2, −1, 0, 0}; {, −4, 3, −5, 2, −3, −5, 4, 5, −3, −1, 0, 0}; {4, −3, −1, 4, −3, 5, 2, 0, −2, −1, 0, 0}; {5, −1, 2, −4, 2, −1, −3, −4, −4, −3, 0, 0}; {4, −2, 1, −5, 1, −2, −3, −5, −5, −3, 0, 0}; {, −1, −5, 0, −4, 4, 4, −1, 0, −4, −2, 0, 0}; {1, −5, −2, 4, −2, −3, −4, 6, −5, −4, 0, 0}; {3, −2, 2, −3, 4, 4, −4, −1, 1, 2, 0, 0}; {6, 1, 5, 0, −4, 4, 4, −4, −1, 1, 0, 0}; {2, −4, −1, 5, 1, −4, −5, −1, 1, 1, 0, 0}; {, −3, 3, 6, 0, −4, 3, 6, 6, 0, −1, 0, 0}; {, −4, 3, −5, 2, −1, 6, 5, −3, −1, 2, 0, 0}; {, −3, 5, −2, 6, 4, 0, 1, −5, −3, −1, 0, 0}; {4, −4, −3, 2, −4, 5, −3, −5, −5, 3, 0, 0}; {, −2, 4, −5, 2, 0, 4, 0, −3, −3, 0, 0, 0}; {2, 5, 5, −3, 4, −4, 0, 6, 4, 2, 0, 0}; {3, −2, 2, −2, −3, 6, 2, −4, −3, −2, 0, 0}; {3, −2, 2, −2, −3, 6, 2, −4, −3, −1, 0, 0}; {2, −3, 1, −3, −4, 6, 1, −5, −4, −2, 0, 0}; {, −2, 2, 3, −4, 4, −1, 5, −5, 3, 1, 0, 0}; {1, 4, 4, −4, 4, −5, 0, 6, 4, 3, 0, 0}; {4, −4, −3, 2, −1, −5, 1, 4, 1, 2, 0, 0}; {, −2, 6, −1, −4, −2, 2, −3, −4, 5, −5, 0, 0}; {, −3, 5, −2, −5, −3, 2, −4, −5, 5, 6, 0, 0}; {3, 3, 0, 1, −5, 0, −5, 2, −4, −4, 0, 0}; {6, −1, 1, −5, −5, 2, −5, 3, −2, 0, 0, 0}; {3, −4, −2, 4, 4, 0, −5, 0, −3, 0, 0, 0}; {, −2, −3, 5, 5, −1, 3, −3, 4, −2, −2, 0, 0}; {3, −3, 0, −5, −3, 6, 2, −4, −5, −1, 0, 0}; {2, −3, 1, −3, 1, 4, 3, 1, 5, 5, 0, 0}; {1, −4, 0, −4, 1, 4, 3, 1, 5, 5, 0, 0}; {6, −1, 1, −4, 2, 0, 4, 3, 5, 2, 0, 0}; {5, −1, 2, −2, 6, 4, −3, −1, 1, 0, 0, 0}; {1, 4, 4, −3, 2, −3, 0, −2, −4, 4, 0, 0}; {1, 5, 6, 0, 6, 3, 6, −5, 5, 2, 0, 0}; {2, −5, −3, 4, −1, −3, 1, 4, 2, 0, 0, 0}; {3, −5, −4, 2, −4, 5, −4, 6, −5, 4, 0, 0}; {2, 6, −5, 1, −5, 4, −4, 6, 6, 2, 0, 0}; {1, 6, −4, 3, −2, −4, 1, 4, 1, −1, 0, 0}; {1, 6, −4, 3, −2, −3, 1, 3, 2, 0, 0, 0}; {0, 5, −5, 2, −2, 2, −2, −3, −2, −4, 0, 0}; {2, −3, 1, −2, −4, −5, 1, −5, −4, −2, 0, 0}; {, −1, 3, 4, −2, 5, 1, 5, −5, 4, 2, 0, 0}; {, −2, 2, 3, −3, 4, 1, 5, 6, 5, 3, 0, 0}; {, −2, 3, 5, 0, −4, 6, 0, 3, 1, −1, 0, 0}; {0, 3, 3, −4, 3, 6, 0, 6, 4, 2, 0, 0}; {, −2, 0, −1, 3, −3, −1, 4, −3, −5, 3, 0, 0}; {, −3, 2, 4, −1, −4, 4, 3, −5, 1, −1, 0, 0}; {, −4, 1, 3, −2, −5, 4, −3, 2, 0, 0, 0, 0}; {, −3, 2, 4, −1, −4, 5, 0, 3, 1, −1, 0, 0}; {, −2, −2, −5, −3, 4, −1, 4, 1, −4, −4, 0, 0}; {2, −2, 3, 1, 5, −1, 3, 6, 6, 5, 0, 0}; {3, −4, −1, 6, 0, −2, 2, 2, 4, 3, 0, 0}; {2, −4, 0, −4, 3, 3, −4, −2, 1, 0, 0, 0}; {3, −4, −1, 6, 1, −2, 2, 2, 4, 3, 0, 0}; {4, −2, 2, −2, 6, 4, −3, −1, 1, 1, 0, 0}; {1, 6, −3, 4, −1, −3, 1, 2, 4, 2, 0, 0}; {2, −4, 0, −4, 4, 3, −4, −1, 0, 1, 0, 0}; {1, −5, −1, −5, 3, 2, −5, −2, 0, 0, 0, 0}; {, −1, 3, 5, −1, 5, 2, 5, −5, 4, 1, 0, 0}; {0, 5, −4, 3, −2, −4, 0, 3, 2, 0, 0, 0}; {1, −5, −1, −5, 3, 2, −5, −1, −1, −1, 0, 0}; {2, −3, 2, −1, −4, −4, 2, −5, −3, −1, 0, 0}; {1, 6, −3, 4, −1, −3, 2, 2, 4, 1, 0, 0}; {, −3, 0, 1, 6, −1, −5, −2, −2, −5, 3, 0, 0}; {, −2, 2, 4, −2, 4, 1, 5, −5, 4, 1, 0, 0}; {0, 6, −2, 6, 2, 2, −5, −2, 0, 0, 0, 0}; {, −2, 2, 4, −2, 4, 2, 6, 4, 6, 2, 0, 0}; {, −1, 4, −5, 2, −3, −4, 1, 1, 3, 0, 0, 0}; {, −1, 5, −3, 5, 2, 0, 6, −2, −1, 0, 0, 0}; {, −4, 0, 2, −4, 3, 1, −5, 4, 5, 1, 0, 0}; {0, −3, 4, 3, 4, 1, 5, 1, 4, −4, 0, 0}; {, −5, 0, 3, −2, −5, 2, 5, 3, −1, −2, 0, 0}; {, −5, 1, 5, 1, −1, −3, 3, −3, −3, −1, 0, 0}; {5, −1, 3, −1, −1, −5, 0, −3, −5, −3, 0, 0}; {, −2, 4, −4, 4, −4, −5, −1, −1, 4, 3, 0, 0}; {6, −1, 2, −3, 1, −1, 3, 2, 5, 4, 0, 0}; {0, −5, 0, −3, 3, 3, 3, −3, −1, 3, 0, 0}; {1, 6, −3, 5, 0, −3, 1, 1, 3, 3, 0, 0}; {, −1, 4, −5, 3, −2, −4, 0, 1, 3, 1, 0, 0}; {, −3, 1, 3, −2, 4, 1, 5, 4, 5, 3, 0, 0}; {, −4, 0, 2, −3, 3, 0, 4, 4, 5, 3, 0, 0}; {, −4, 1, 4, 0, −5, 6, −2, 2, 1, −1, 0, 0}; {6, −2, 0, −5, 1, −1, 3, 5, 3, 1, 0, 0}; {4, −4, −2, 5, 0, −3, 2, 5, 3, 1, 0, 0}; {4, −3, 0, −4, 5, 1, 1, 5, 0, −1, 0, 0}; {, −3, 4, −3, −5, −4, 2, −4, −5, 5, −5, 0, 0}; {3, 0, −5, −5, 2, −4, 1, 1, 4, −1, 0, 0}; {0, −3, 4, 5, 0, 6, −1, 0, 3, −1, 0, 0}; {3, 6, −5, 2, −5, 4, −1, 6, −5, 2, 0, 0}; {, −5, −3, −3, 3, −4, 6, 0, −5, −4, 3, 0, 0}; {, −2, 0, 0, 6, −1, −5, 2, −4, −4, 4, 0, 0}; {, −5, 2, −5, −5, 1, 5, −5, −5, −5, 2, 0, 0}; {, −4, −1, 0, −4, −1, 1, −3, 4, −5, 4, 0, 0}; {1, 1, −1, 4, 6, 3, −3, 2, 1, −5, 0, 0}; {, −1, −1, −3, 2, −2, 1, −4, 3, 4, −5, 0, 0}; {2, 1, −2, 3, −1, 2, −3, 3, 5, −5, 0, 0}; {3, 0, −5, −2, 5, −3, 1, 2, −2, −2, 0, 0}; {5, −1, 3, 3, −3, 2, −2, −3, −4, 1, 0, 0}; {6, 1, 6, −5, 2, −4, 5, 6, 5, −1, 0, 0}; {4, −2, 2, 2, −3, 2, −2, −4, −4, 1, 0, 0}; {, −2, 0, 0, −4, 0, −4, 2, −4, −4, 5, 0, 0}; {, −3, −1, −1, −5, −1, −5, 2, −4, −4, 5, 0, 0}; {, −3, −4, 5, −2, −1, −5, 0, 5, 3, −4, 0, 0}; {, −5, 5, 1, 5, 5, 0, 5, −4, 5, −2, 0, 0}; {1, 1, −1, 5, 0, 3, −3, 4, 4, −4, 0, 0}; {2, −1, 6, −2, −5, 0, 3, −1, 1, 4, 0, 0}; {2, −4, 0, 1, −5, 0, −3, −4, −5, 0, 0, 0}; {0, −3, 4, −4, 6, −2, 2, −4, −2, 2, 0, 0}; {3, 1, −3, 2, 3, −2, 3, 6, 4, −2, 0, 0}; {3, 1, −3, 2, 6, 2, 5, 3, 5, −5, 0, 0}; {, −2, −5, 2, −5, 0, −5, −5, 4, 6, −4, 0, 0}; {3, 0, −5, 0, 5, 3, 5, −3, 0, 2, 0, 0}; {, −1, −5, 1, 5, −1, 1, 5, 5, 0, −1, 0, 0}; {0, −3, 4, −3, 4, −5, 0, 1, −3, −2, 0, 0}; {3, 0, −5, 0, −4, −2, 0, −1, 3, 5, 0, 0}; {1, −3, 3, −5, 2, 4, 3, 2, 5, 6, 0,

0}; {, −5, 3, −3, 1, −4, −2, 3, 3, −2, −2, 0, 0}; {, −2, 5, −2, 1, −4, −3, −5, 5, −5, −4, 0, 0}; {, −1, −5, 1, 5, 1, −5, −5, 0, 2, 4, 0, 0}; {, −2, 6, 0, 4, 0, 6, 6, −1, 1, 3, 0, 0}; {, −4, 4, −2, 2, −2, 4, 5, −2, 1, 2, 0, 0}; {, −4, 4, −2, 2, −2, −3, 3, 3, −3, −1, 0, 0}; {, −2, −4, 4, −2, −3, 2, −4, 2, 6, 0, 0, 0}; {6, 2, −4, 0, −2, 4, 4, −2, 0, 2, 0, 0}; {4, 0, 6, −2, −4, 2, 3, −3, 0, 1, 0, 0}; {3, −2, 3, 6, 3, −3, −4, 1, 2, 3, 0, 0}; {, −1, −4, 3, −3, −1, −5, −4, 5, −5, −3, 0, 0}; {, −4, 3, −4, 0, 0, 6, 5, 1, −1, 1, 0, 0}; {0, −2, 6, 1, 4, 1, 3, 2, 4, −4, 0, 0}; {, −2, −5, 2, −4, −2, 6, −4, 5, 6, −3, 0, 0}; {, −4, 4, −2, 3, 4, −1, 0, −3, −4, −1, 0, 0}; {, −3, 3, −5, −2, −2, 3, −1, 5, 3, 1, 0, 0}; {5, −1, 3, 6, 6, −1, −3, 4, 1, 2, 0, 0}; {, −3, 6, 1, −5, −2, 6, −5, 5, 6, −4, 0, 0}; {, −3, 6, 1, −5, −2, 6, −4, 5, 6, −3, 0, 0}; {5, 0, 5, −3, −2, 4, 4, 0, −2, 0, 0, 0}; {5, 1, −5, 0, 2, −3, −1, −4, −5, −2, 0, 0}; {, −5, 4, −1, 5, −3, 6, 4, 4, −3, −1, 0, 0}; {2, −1, 6, 0, 5, 4, 2, 2, −4, −2, 0, 0}; {, −3, 6, 1, −5, 0, 2, 0, 2, 4, 5, 0, 0}; {, −4, 4, −2, 3, −4, −4, 4, 4, −2, −1, 0, 0}; {, −4, 5, 0, 6, 0, 1, −1, 0, −5, −3, 0, 0}; {, −5, 3, −3, 2, −5, −4, 4, 4, −2, −2, 0, 0}; {, −3, 5, −1, 4, −2, −5, 6, −1, 1, 3, 0, 0}; {5, 1, −5, 0, 6, 6, 3, 3, −3, −2, 0, 0}; {, −4, 5, 0, 6, 1, 3, −2, −1, −4, −3, 0, 0}; {6, 2, −4, 1, −5, −4, 3, 3, −2, −2, 0, 0}; {5, 1, −5, 0, 6, −5, 3, 3, −3, −2, 0, 0}; {6, 2, −4, 1, −5, −4, 4, 4, −3, −2, 0, 0}; {0, −4, 2, −5, 1, 3, 3, 2, 5, 5, 0, 0}; {, −4, 4, −2, 3, −3, −1, 4, 4, −1, −1, 0, 0}; {, −2, 6, 0, 5, 0, 2, 2, 1, 5, 6, 0, 0}; {, −1, −4, 3, −3, 5, −4, −1, 6, −5, 0, 0, 0}; {, −5, 3, −3, 2, −3, −1, 3, 4, −1, −1, 0, 0}; {, −4, 5, 0, 6, 2, 5, −2, 0, −4, −2, 0, 0}; {5, 0, 5, −3, 3, 1, −5, −5, 0, 0, 0, 0}; {6, 2, −4, 1, −4, −5, 2, 3, −3, −1, 0, 0}; {, −2, 6, 0, 5, 0, 0, 4, 5, −1, 0, 0, 0}; {5, 1, −5, 0, −5, −5, 2, 3, −3, −2, 0, 0}; {0, −4, 2, −5, 2, 3, 3, 2, 5, 6, 0, 0}; {, −2, 5, −2, 2, −4, −4, −5, 5, −5, −5, 0, 0}; {4, 0, 6, −1, 6, −5, 2, 2, −3, −2, 0, 0}; {6, 3, −2, 4, 0, 2, −2, 0, 6, −4, 0, 0}; {, −2, 6, 0, 5, 1, 2, 2, 1, 5, 6, 0, 0}; {, −5, 2, −5, −1, 6, 6, 6, 4, −5, −5, 0, 0}; {3, −1, 5, −2, 6, −5, 1, 2, −3, −3, 0, 0}; {, −3, 6, 1, −5, 4, −5, −2, 5, −5, 0, 0, 0}; {5, 0, 5, −3, 4, 2, −5, 6, 0, 0, 0, 0}; {6, 2, −4, 1, −3, −4, 2, 3, −3, −1, 0, 0}; {5, 0, 5, −3, 5, 6, 5, 3, 6, −5, 0, 0}; {4, −1, 4, −4, 4, 5, 4, 3, 6, −5, 0, 0}; {, −5, 4, −1, 5, 3, −5, −1, 5, −4, 1, 0, 0}; {3, −1, 5, −2, −5, 3, 3, −3, −1, 1, 0, 0}; {3, −1, 5, −2, −5, 6, 0, 1, −5, −2, 0, 0}; {, −5, 5, 1, −4, −4, 0, 5, 1, 5, −1, 0, 0}; {1, −4, 1, 5, 2, −4, −5, 0, 1, 3, 0, 0}; {1, 6, −3, −1, 6, 1, 2, 0, 5, 1, 0, 0}; {, −1, 0, −1, −3, 1, −5, 1, 3, −4, 6, 0, 0}; {, −4, −5, 4, 0, 2, 6, −1, −3, 1, −3, 0, 0}; {0, −5, 0, 4, 2, −4, −5, 1, 1, 2, 0, 0}; {1, −2, 5, −1, 0, −4, −3, 6, −5, −3, 0, 0}; {1, −2, 5, 0, 1, −4, 0, 6, −5, −2, 0, 0}; {, −3, 5, −1, 5, 5, 0, 1, −4, −3, −1, 0, 0}; {, −3, 5, −1, 5, 5, 0, 1, −3, −3, −3, 0, 0}; {, −4, 4, −2, 4, 5, 0, 0, −4, −3, −3, 0, 0}; {, −3, 6, 1, −4, −2, 6, −5, 4, 6, −3, 0, 0}; {, −4, 4, −2, 4, 5, 0, 1, −4, −3, −2, 0, 0}; {, −3, 6, 1, −4, −2, 6, −4, 4, 6, −3, 0, 0}; {6, 2, −4, 2, 3, −2, −1, −5, −4, −2, 0, 0}; {, −5, 2, −5, 0, 1, −5, 5, −1, 0, 0, 0, 0}; {, −5, 3, −3, 3, 5, 0, −1, 6, −3, −1, 0, 0}; {, −4, 5, 0, −5, −2, 6, 6, 3, 6, −3, 0, 0}; {6, 2, −4, 2, 4, −1, −1, −5, −4, −2, 0, 0}; {, −5, 4, −1, 6, −3, 5, 6, 3, 5, −4, 0, 0}; {5, 1, −5, 1, 3, −2, −2, 6, −4, −3, 0, 0}; {6, 2, −4, 2, 4, −1, 0, −4, −4, −2, 0, 0}; {4, −1, 4, −3, −2, 4, 4, 0, −2, 0, 0, 0}; {3, −2, 3, −4, −3, 3, 3, −1, −3, 0, 0, 0}; {6, 3, −2, 5, −4, 5, 5, 3, 6, −3, 0, 0}; {5, 1, −5, 1, 4, −1, −2, 6, −4, −2, 0, 0}; {5, 1, −5, 1, 4, −1, −1, −5, −4, −2, 0, 0}; {, −4, 4, −2, 4, −3, 6, −5, −1, 4, 5, 0, 0}; {, −5, 3, −3, 3, −4, 6, 6, −2, 1, 3, 0, 0}; {5, 1, −5, 1, 6, 6, 3, 3, −3, −2, 0, 0}; {6, 2, −4, 2, −5, −4, 3, 3, −2, −1, 0, 0}; {2, −3, 2, −5, −1, −1, −5, 6, −1, −1, 0, 0}; {3, −1, 5, −1, 4, 5, 2, 2, −4, −3, 0, 0}; {3, −1, 5, −1, 4, 5, 2, 2, −3, −3, 0, 0}; {, −3, 4, −3, 2, −5, −4, −5, 5, −5, −5, 0, 0}; {, −1, −4, 3, −2, 5, −4, −3, −2, 2, 3, 0, 0}; {, −3, 6, 1, −4, 3, 6, −3, −3, 1, 3, 0, 0}; {6, 2, −4, 2, −4, −2, 4, 5, −2, −1, 0, 0}; {5, 2, −3, 4, −1, −1, 0, 6, −3, 1, 0, 0}; {4, 0, 6, 0, 6, 6, 2, 2, −3, −2, 0, 0}; {3, −1, 5, −1, 5, 5, 2, 2, −3, −2, 0, 0}; {3, −1, 5, −1, 5, 5, 2, 3, −4, −2, 0, 0}; {1, −4, 1, 6, −1, −2, 6, 6, −1, −1, 0, 0}; {2, −2, 4, −2, 4, 5, 2, 2, −4, −3, 0, 0}; {1, −3, 3, −3, 3, 4, 2, 2, 5, 6, 0, 0}; {1, −3, 3, −3, 3, 4, 2, 2, 6, −5, 0, 0}; {0, −4, 2, −4, 2, 3, 1, 1, −4, −3, 0, 0}; {4, 0, 6, 0, 6, −5, 2, 2, −2, −2, 0, 0}; {3, −1, 5, −1, 5, 6, 2, 2, −3, −2, 0, 0}; {2, −2, 4, −2, 5, 6, 2, 3, −4, −3, 0, 0}; {1, −3, 3, −3, 4, 5, 1, 2, −4, −3, 0, 0}; {0, −4, 2, −4, 3, 4, 1, 2, 6, −5, 0, 0}; {0, −4, 2, −4, 3, 4, 1, 2, −5, −4, 0, 0}; {, −1, 6, −1, 4, −2, −2, −5, 6, −4, −4, 0, 0}; {, −2, 5, −2, 3, −3, −3, 6, 5, −4, −4, 0, 0}; {5, 1, −5, 1, −4, −3, 2, 3, −2, −1, 0, 0}; {5, 0, 5, −2, 4, 5, 5, 2, −2, −3, 0, 0}; {5, 0, 5, −2, 4, 5, 6, 2, −1, −3, 0, 0}; {, −5, 3, −3, 3, −2, 1, 2, 0, 4, 5, 0, 0}; {6, 2, −4, 2, −3, 0, 1, 0, 4, 5, 0, 0}; {2, −2, 4, −2, 5, 5, 2, 2, −4, −3, 0, 0}; {, −1, 6, −1, 4, −2, −3, 6, 5, −5, −5, 0, 0}; {2, −2, 4, −2, 5, 5, 0, 1, −4, −2, 0, 0}; {3, −1, 5, −1, 6, 6, 2, 3, −4, −2, 0, 0}; {1, −4, 1, 6, 0, −1, 6, 6, −1, −1, 0, 0}; {2, −2, 4, −2, 5, 5, 1, 2, −4, −2, 0, 0}; {, −1, 6, −1, 4, −1, −2, 5, 5, −2, −1, 0, 0}; {, −5, 2, −5, 0, −5, 6, 5, 4, 6, −5, 0, 0}; {2, −2, 4, −2, 6, 6, 1, 2, −4, −2, 0, 0}; {0, −5, 0, 5, 0, −1, 5, 5, −1, −1, 0, 0}; {1, −3, 3, −3, 5, 5, 0, 1, −4, −2, 0, 0}; {0, −4, 2, −4, 4, 5, 0, 1, −4, −3, 0, 0}; {6, 1, 6, −1, 6, 6, 5, 4, 6, −5, 0, 0}; {6, 1, 6, −1, 6, 6, 5, 4, −5, −5, 0, 0}; {2, −2, 4, −2, 6, −5, 1, 2, −3, −2, 0, 0}; {5, 1, −5, 1, −3, −1, 0, −1, 4, 5, 0, 0}; {4, 0, 6, 0, −4, −1, 0, −1, 3, 4, 0, 0}; {, −5, 4, −1, 6, 3, −5, −2, 5, −5, 0, 0, 0}; {0, −4, 2, −4, 4, 2, 2, −5, −2, 1, 0, 0}; {, −4, 2, 6, −2, 4, 1, −2, −4, −4, −3, 0, 0}; {, −3, 5, −1, 5, 1, 0, 2, 6, −2, 1, 0, 0}; {2, −3, 2, −5, 2, 0, 6, 6, −1, 0, 0, 0}; {0, −5, 0, 5, 0, −2, 5, 5, −2, −1, 0, 0}; {, −1, 6, −1, 4, 0, −2, 4, 4, −2, −1, 0, 0}; {4, −1, 4, −3, 5, 5, 5, 3, 6, −5, 0, 0}; {2, −4, 0, 4, −1, −2, −3, −5, −4, −4, 0, 0}; {1, −5, −1, 3, −2, −3, −4, 6, −4, −4, 0, 0}; {5, 2, −3, 4, 2, 5, −3, 4, −5, 0, 0, 0}; {4, 1, −4, 3, 1, 4, −4, 3, 6, −1, 0, 0}; {2, −3, 2, −5, 3, 5, 4, 2, 6, 6, 0, 0}; {2, −3, 2, −5, 3, 5, 5, 2, 6, 6, 0, 0}; {, −3, 4, −3, 2, −1, −3, 3, 3, −3, −1, 0, 0}; {2, −1, 6, 1, 0, 4, −4, 3, 6, 0, 0, 0}; {, −4, 3, −4, 1, −2, 6, 5, −2, 0, 2, 0, 0}; {, −4, 1, 4, −5, 3, −2, −1, −2, 3, 0, 0, 0}; {, −2, 6, 0, 6, 5, 1, 1, −5, −3, 0, 0, 0}; {, −5, 3, −3, 4, 3, −1, 0, −5, −3, −1, 0, 0}; {5, 0, 5, −1, −3, 4, 4, −2, −1, 0, 0, 0}; {6, −1, 2, 6, 2, −4, −2, −3, 3, 0, 0, 0}; {5, −2, 1, 5, 1, −5, −2, −3, 2, 0, 0, 0}; {, −3, 4, −3, 3, 1, −1, 0, 4, −3, −2, 0, 0}; {, −4, 4, −2, 5, 5, 0, 2, −4, −3, −2, 0, 0}; {, −3, 6, 1, −3, −2, 6, −2, 4, 6, −2, 0, 0}; {5, 0, 5, −1, −2, 5, 4, −2, −1, 0, 0, 0}; {4, −2, 2, −5, 5, −1, −3, 3, 1, 1, 0, 0}; {5, 0, 5, −1, −2, 5, 4, −1, −1, −1, 0, 0}; {3, −3, 1, 6, 4, −2, −4, 2, 1, 1, 0, 0}; {6, 2, −4, 3, 3, −1, 0, 6, −4, −1, 0, 0}; {5, 1, −5, 2, 2, −2, −1, 6, −4, −2, 0, 0}; {3, −3, 1, 6, 4, 1, 4, 2, −3, −3, 0, 0}; {6, 2, −4, 3, 4, −1, 1, −4, −4, −2, 0, 0}; {4, −2, 2, −5, 6, 0, −3, 2, 2, 0, 0, 0}; {5, 1, −5, 2, 3, −1, −2, 5, −4, −1, 0, 0}; {4, −2, 2, −5, 6, 0, −3, 3, 2, 0, 0, 0}; {3, −3, 1, 6, 5, −1, −4, 2, 1, 0, 0, 0}; {5, 1, −5, 2, 3, −1, −2, 6, −4, −2, 0, 0}; {3, −2, 3, −3, −3, 4, 2, −3, −2, 0, 0, 0}; {5, 1, −5, 2, 3, −1, −1, 6, −4, −2, 0, 0}; {4, 0, 6, 1, 2, −2, −2, 6, −4, −2, 0, 0}; {2, −4, 0, 5, 4, −2, −4, 2, 1, 1, 0, 0}; {3, −2, 3, −3, −3, 4, 3, −2, −2, −1, 0, 0}; {4, 0, 6, 1, 2, −2, −1, 6, −5, −2, 0, 0}; {3, −3, 1, 6, 5, 2, 4, 2, −3, −3, 0, 0}; {3, −1, 5, 0, 2, −3, −2, 6, −5, −2, 0, 0}; {2, −3, 2, −4, −3, 4, 2, −3, −2, −2, 0, 0}; {3, −1, 5, 0, 2, −2, −3, 5, −5, −3, 0, 0}; {3, −1, 5, 0, 2, −2, −3, 5, −5, −2, 0, 0}; {3, −1, 5, 0, 2, −2, −3, 5, −4, −2, 0, 0}; {2, −4, 0, 5, 5, −1, −4, 2, 1, 0, 0, 0}; {1, −5, −1, 4, 4, −2, −5, 2, 0, 0, 0, 0}; {3, −1, 5, 0, 2, −2, −2, 5, −5, −2, 0, 0}; {1, −4, 1, −5, −4, 3, 2, −3, −3, −1, 0, 0}; {0, 6, −2, 3, 3, −3, −5, 2, 0, 1, 0, 0}; {1, −4, 1, −5, −4, 3, 3, −2, −3, −1, 0, 0}; {2, −2, 4, −1, 1, −3, −2, 6, −5, −3, 0, 0}; {, −2, 5, −2, 4, 6, −3, 3, 0, −3, −2, 0, 0}; {1, −3, 3, −2, 1, −4, −4, 4, −5, −3, 0, 0}; {1, −5, −1, 4, 5, −1, −4, 2, 1, 0, 0, 0}; {0, −5, 0, 6, −4, 3, 1, −3, −3, −2, 0, 0}; {0, −4, 2, −3, 0, −4, −5, 4, −5, −3, 0, 0}; {2, −2, 4, −1, 2, −2, −2, 5, −5, −2, 0, 0}; {0, −4, 2, −3, 0, −4, −4, 5, −5, −3, 0, 0}; {, −3, 5, −1, 6, −3, −5, −4, −1, 4, 5, 0, 0}; {4, −1, 4, −2, 1, −1, −1, 1, 5, 5, 0, 0}; {, −2, 5, −2, 4, −4, −3, 5, 4, −2, −2, 0, 0}; {6, 1, 6, 0, 4, 5, −3, −3, 2, 1, 0, 0}; {6, 1, 6, 0, 4, 6, 5, 3, 6, 6, 0, 0}; {5, 1, −5, 2, −5, 5, 6, −2, 3, 4, 0, 0}; {2, −3, 2, −4, 0, −2, −2, 0, 6, 6, 0, 0}; {, −5, 2, −5, 1, 5, 5, −3, −3, 2, 2, 0, 0}; {0, −5, 0, 6, −1, −1, 6, 5, 0, −1, 0, 0}; {1, −3, 3, −2, 4, 5, 1, 2, −4, −2, 0, 0}; {, −1, −5, 1, −4, 2, 3, 0, 1, −5, −3, 0, 0}; {, −3, 4, −3, 3, −4, −4, 6, 5, −5, −5, 0, 0}; {, −4, 3, −4, 2, −5, −5, 5, 4, −5, −5, 0, 0}; {6, 1, 6, 0, 5, 5, −4, −3, 2, 2, 0, 0}; {5, 1, −5, 2, −4, −1, 0, −1, 3, 4, 0, 0}; {, −1, 6, −1, 5, −1, −2, 5, 4, −1, −1, 0, 0}; {, −3, 4, −3, 3, −3, −4, 6, 5, −5, −4, 0, 0}; {, −4, 3, −4, 2, −4, −5, 5, 4, 6, −5, 0, 0}; {0, −4, 2, −3, 4, 5, 0, 1, −4, −2, 0, 0}; {, −3, 4, −3, 3, −3, −3, 4, 3, −1, −1, 0, 0}; {0, −4, 2, −3, 4, 6, 0, 1, −3, −2, 0, 0}; {4, −1, 4, −2, 4, 5, 4, 2, −2, −3, 0, 0}; {2, −3, 2, −4, 2, 4, 4, 2, 6, 6, 0, 0}; {6, 0, 4, −3, 3, 0, −3, 6, −5, −4, 0, 0}; {, −3, 4, −3, 3, −2, −3, 4, 4, −2, −1, 0, 0}; {, −5, 2, −5, 1, −4, −5, 4, 4, −3, −2, 0, 0}; {3, −1, 5, 0, −4, −2, −1, −1, 3, 4, 0, 0}; {0, −5, 0, 6, 1, 2, 3, 0, −3, −4, 0, 0}; {0, −5, 0, 6, 1, 3, 3, 1, 5, 5, 0, 0}; {0, −5, 0, 6, 1, 3, 3, 1, 6, 6, 0, 0}; {, −3, 3, −5, 0, 6, 2, −1, −5, −4, −3, 0, 0}; {, −4, 2, 6, −1, 5, 1, −2, −5, −4, −3, 0, 0}; {, −5, 1, 5, −2, 5, 1, −3, 6, −5, −4, 0, 0}; {, −5, 1, 5, −2, 5, 1, −3, −5, −4, −4, 0, 0}; {, −3, 4, −3, 3, −1, −3, 3, 3, −2, −1, 0, 0}; {3, −3, 1, 6, 1, −2, −4, 6, −5, −4, 0, 0}; {, −3, 3, −5, 0, −5, 5, −3, −4, 2, 1, 0, 0}; {, −4, 3, −4, 2, −2, −3, 3, 3, −2, −1, 0, 0}; {5, 0, 5, −1, −5, −5, 4, 4, −4, −4, 0, 0}; {0, −5, 0, 6, 2, 2, 3, 2, 5, 6, 0, 0}; {0, −4, 2, −3, 6, −4, 0, 6, −4, 0, 0, 0}; {0, −5, 0, 6, 2, 3, 3, 2, 5, 6, 0, 0}; {, −1, 6, −1, 5, 1, 2, 3, 2, 5, 5, 0, 0}; {0, −3, 4, 0, −2, 2, 6, 2, 5, −1, 0, 0}; {5, 0, 5, −1, −4, 4, 4, −3, −1, 1, 0, 0}; {, −3, 3, −5, 0, −4, −5, 6, 5, −5, −4, 0, 0}; {, −1, 6, −1, 5, 2, 4, 3, 1, 6, 6, 0, 0}; {, −5, 2, −5, 1, −2, 1, 1, 0, 4, 5, 0, 0}; {, −3, 5, −1, 6, 4, 0, 1, −5, −3, 0, 0, 0}; {, −1, 5, −3, 3, −1, −5, 6, −1, 1, 1, 0, 0}; {4, −2, 2, −4, 4, 5, 5, 3, 6, 6, 0, 0}; {5, 0, 5, 0, −3, 0, 0, −1, 4, 5, 0, 0}; {6, 2, −4, 4, 2, 6, −4, 4, 6, 0, 0, 0}; {5, 0, 5, 0, −2, 5, 5, −1, −1, −1, 0, 0}; {3, −2, 3, −2, −4, 3, 3, −3, −2, 0, 0, 0}; {2, −3, 2, −3, −5, 3, 3, −3, −2, 0, 0, 0}; {, −1, 5, −3, 3, 0, −5, 6, −1, 0, 1, 0, 0}; {3, −2, 3, −2, −4, −1, 0, −5, −4, 1, 0, 0}; {6, 2, −4, 4, 4, −1, 2, −5, −4, −1, 0, 0}; {6, 3, −2, −5, −4, 4, −3, 2, 4, −2, 0, 0}; {4, 0, 6, 2, 2, −2, −1, 6, −4, −2, 0, 0}; {2, −4, 0, 6, 4, −2, −3, 2, 1, 1, 0, 0}; {0, 6, −2, 4, 2, −4, −5, 1, 0, 1, 0, 0}; {2, −3, 2, −3, −4, 3, 4, −2, −2, −1, 0, 0}; {0, 6, −2, 4, 2, −3, −5, 1, 0, 1, 0, 0}; {1, −4, 1, −4, −4, 3, 2, −4, −2, 0, 0, 0}; {0, 5, −4, 1, −1, 4, 1, 6, 3, 2, 0, 0}; {2, −2, 4, 0, 1, −3, −2, 5, −5, −2, 0, 0}; {1, −4, 1, −4, −4, 3, 4, −2, −3, −1, 0, 0}; {2, −2, 4, 0, 1, −3, −1, 6, −5, −3, 0, 0}; {1, −3, 3, −1, 0, −4, −1, 5, 6, −2, 0, 0}; {, −1, 4, −5, 0, −2, 4, 0, 5, 3, 2, 0, 0}; {0, −5, 0, −5, −5, 3, 1, −4, −2, −1, 0, 0}; {, −1, 6, −1, 6, 6, 2, 1, −5, −3, −1, 0, 0}; {1, −5, −1, 5, 4, 0, 3, 1, −3, −3, 0, 0}; {1, −3, 3, −1, 1, −3, −3, 4, −5, −2, 0, 0}; {, −1, 6, −1, 6, −5, 2, 1, −4, −3, −1, 0, 0}; {, −1, 6, −1, 6, −5, 2, 2, −3, −3, −1, 0, 0}; {0, −4, 2, −2, 0, −4, −3, 5, −5, −3, 0, 0}; {, −1, −5, 1, −3, −1, −4, −4, 3, 6, −3, 0, 0}; {, −3, 4, −3, 4, 5, 1, 0, 6, −3, −2, 0, 0}; {2, 2, 0, 0, 6, −1, 5, 1, −5, −4, 0, 0}; {, −5, 3, −3, 5, −4, 1, 6, 6, 5, 6, 0, 0}; {, −2, 5, −2, 5, −5, 2, 1, −4, −3, −1, 0, 0}; {, −1, 4, −5, 0, 1, −3, 6, −2, −4, 0, 0, 0}; {2, −3, 2, −3, 0, −2, −2, 1, 6, 6, 0, 0}; {1, −4, 1, −4, −1, −3, −3, 0, 6, 6, 0, 0}; {2, −2, 4, 0, 4, 4, 5, −4, 3, 4, 0, 0}; {, −1, 6, −1, 6, −3, −4, −3, −1, 5, 5, 0, 0}; {, −2, 5, −2, 5, −4, −5, −3, −2, 5, 5, 0, 0}; {3, −3, 1, −5, −2, −2, 1, 0, 5, 3, 0, 0}; {5, 1, −5, 3, −4, −1, 4, 5, −1, 0, 0, 0}; {2, −3, 2, −3, 1, 4, 4, 2, 5, 5, 0, 0}; {5, 0, 5, 0, 5, 6, 4, 3, 6, 6, 0, 0}; {, −4, 3, −4, 3, −3, −4, 3, 3, −2, −1, 0, 0}; {, −4, 3, −4, 3, −3, −4, 4, 4, −2, −1, 0, 0}; {, −5, 2, −5, 2, −4, −4, 3, 3, −2, −1, 0, 0}; {5, 0, 5, 0, 6, 6, 3, 3, −3, −2, 0, 0}; {2, −3, 2, −3, 3, 3, −5, −4, 1, 2, 0, 0}; {, −5, 2, −5, 2, −3, −4, 3, 3, −2, −1, 0, 0}; {1, 6, −3, 2, −5, 4, 1, −1, −2, −2, 0, 0}; {, −2, 5, −2, 5, 0, 1, 2, 1, 4, 5, 0, 0}; {, −3, 4, −3, 4, −1, 1, 2, 0, 4, 4, 0, 0}; {4, −3, 0, 5, −1, 6, 2, −2, −2, −2, 0, 0}; {3, −2, 3, −2, 6, 3, 3, −4, −1, 1, 0, 0}; {1, −5, −1, 5, 0, −3, −5, 5, 6, −4, 0, 0}; {5, 0, 5, 0, −4, −4, 2, 2, −2, −1, 0, 0}; {, −1, 5, −3, 3, −2, −3, −5, 6, −4, −4, 0, 0}; {, −4, 3, −4, 3, −1, 1, 2, 0, 4, 5, 0, 0}; {6, 1, 6, 2, −2, −1, 4, −4, −2, 0, 0, 0}; {, −3, 3, −5, 2, −2, 6, 5, −2, 0, 1, 0, 0}; {, −4, 1, 4, −2, 5, 1, −2, 3, 3, 3, 0, 0}; {6, −1, 2, −4, 3, 0, 4, 4, 5, 4, 0, 0}; {5, −1, 3, −2, 6, 5, −2, 0, 2, 0, 0, 0}; {2, −4, 0, −5, 3, 3, −5, −1, 0, 1, 0, 0}; {5, −2, 1, −5, 3, −4, −5, 0, 1, 1, 0, 0}; {3, −1, 5, 2, 2, −3, 1, 6, −5, −1, 0, 0}; {2, −2, 4, 1, 1, −3, 0, 6, −5, −3, 0, 0}; {1, −3, 3, 0, 0, −4, −1, 6, −5, −3, 0, 0}; {1, −3, 3, 0, 0, −4, 0, 5, 6, −1, 0, 0}; {, −3, 3, −5, 2, 0, −5, 5, −1, 0, 1, 0, 0}; {, −2, 3, 6, 0, −3, 4, 6, 4, 0, −2, 0, 0}; {, −4, 0, 2, −5, 3, 1, −5, 4, 5, 1, 0, 0}; {2, −5, −2, 4, 2, 6, 1, −2, −3, 0, 0, 0}; {, −1, 5, −3, 4, 3, −2, 2, 0, −3, −3, 0, 0}; {, −2, 5, −2, 6, 6, 2, 0, −5, −3, −1, 0, 0}; {, −5, 0, 3, −3, −5, 1, −2, 3, 2, 2, 0, 0}; {, −2, 4, −4, 3, 2, −2, 2, 0, −4, −3, 0, 0}; {3, −2, 3, −1, 0, 5, −2, −3, −5, −5, 0, 0}; {, −3, −4, 5, 5, −1, 4, −3, 4, −3, −3, 0, 0}; {, −5, 6, 3, 3, −3, 2, −4, 3, −3, −3, 0, 0}; {3, −2, 3, −1, 1, 5, −1, −2, −5, −4, 0, 0}; {1, −3, 3, 0, 3, −2, 2, 4, 5, 5, 0, 0}; {, −4, −5, 4, 4, −2, 2, −4, 3, −3, −3, 0, 0}; {1, −3, 3, 0, 4, 3, 5, −3, 3, 4, 0, 0}; {, −1, 5, −3, 4, −5, −4, 0, −1, 5, 2, 0, 0}; {0, −4, 2, −1, 4, 3, 5, −3, 2, 3, 0, 0}; {1, −4, 1, −3, 2, 4, 3, 2, 5, 5, 0, 0}; {0, −5, 0, −4, 2, 3, 2, 2, 5, 5, 0, 0}; {, −5, 0, 3, −3, 1, 1, 2, −5, 4, 0, 0, 0}; {5, −2, 1, −5, 0, −1, 3, 2, 5, 2, 0, 0}; {, −2, 4, −3, 4, −2, −3, 5, 4, −1, −1, 0, 0}; {3, −3, 2, −3, 3, 3, −4, −3, 1, 1, 0, 0}; {2, −4, 1, −4, 2, 3, −4, −3, 1, 1, 0, 0}; {1, −5, 0, −5, 1, 3, 3, 1, 5, 5, 0, 0}; {, −4, 2, −5, 2, −3, −5, 5, −1, 1, 2, 0, 0}; {, −3, 4, −2, 6, 2, 1, 1, −5, −2, 1, 0, 0}; {3, −3, 2, −3, 4, 4, −4, −3, 1, 2, 0, 0}; {2, −4, 1, −4, 3, 3, −4, −2, 1, 1, 0, 0}; {0, 6, −1, 6, 1, 3, 3, 1, 5, 5, 0, 0}; {, −4, 2, −5, 2, −2, −5, 4, 4, −3, −1, 0, 0}; {6, 0, 5, 0, −4, 5, 4, −2, 0, 1, 0, 0}; {3, −3, 2, −3, 5, 4, −3, −1, 1, 2, 0, 0}; {0, 6, −1, 6, 2, 2, −5, −2, 0, 1, 0, 0}; {, −1, 5, −2, 5, 1, 3, 3, 1, 6, 6, 0, 0}; {, −3, 2, 6, 0, −5, −4, −4, 3, 0, −3, 0, 0}; {1, 6, −2, 4, 0, −3, 2, 3, 4, 3, 0, 0}; {0, −5, 1, −3, −5, −5, 1, 6, −3, −1, 0, 0}; {, −4, 0, 3, −4, 3, 1, 6, 4, 6, 2, 0, 0}; {, −2, 4, −3, 4, 1, 3, 2, 1, −5, −5, 0, 0}; {, −2, 5, −1, −5, 5, −4, −2, 6, −5, 1, 0, 0}; {, −2, 5, −1, −5, 6, −3, −3, −3, 4, 5, 0, 0}; {, −4, 3, −3, 5, 4, −5, −4, −3, 2, 4, 0, 0}; {6, 0, 5, 0, −2, 5, 5, −1, −1, 0, 0, 0}; {5, −1, 4, −1, −3, 5, 4, −2, −1, 0, 0, 0}; {1, 6, −2, 4, 2, 3, −4, 5, 1, −2, 0, 0}; {, −3, 5, 0, −3, −2, 6, −2, 4, 6, −2, 0, 0}; {, −5, −1, 2, −5, 4, −3, 5, −4, 6, 3, 0, 0}; {, −5, 2, −4, 4, 4, 0, 0, −5, −3, −2, 0, 0}; {, −3, 3, −4, 3, 3, −3, 0, −1, −3, −3, 0, 0}; {3, −2, 4, 0, 2, 4, 5, −4, 4, 4, 0, 0}; {1, −4, 2, −2, 0, 4, −2, −3, −5, −4, 0, 0}; {, −1, 6, 0, −4, −2, 3, −4, −4, −5, −5, 0, 0}; {, −2, 5, −1, −5, −3, 3, −5, −5, 6, −5, 0, 0}; {4, −4, −1, 4, 4, 0, −4, 0, −3, 1, 0, 0}; {, −5, 2, −4, 4, −5, 6, −4, −2, 4, 4, 0, 0}; {2, −4, 1, −4, −2, −3, −1, −1, 6, 6, 0, 0}; {3, −2, 4, 0, 3, 4, 6, −4, 4, 4, 0, 0}; {1, −5, 0, −5, −3, −3, −2, −1, 6, 5, 0, 0}; {1, −5, 0, −5, −3, −3, −1, −1, 5, 4, 0, 0}; {6, 1, −5, 3, −5, 5, 6, −3, 5, 5, 0, 0}; {5, 0, 6, 2, 6, 5, −5, −3, 4, 4, 0, 0}; {1, −5, 0, −5, −2, −3, −2, −1, 6, 6, 0, 0}; {6, 0, 5, 0, 4, 5, −3, −3, 3, 2, 0, 0}; {6, 0, 5, 0, 5, 5, −3, −2, 2, 2, 0, 0}; {6, 0, 5, 0, 5, 5, −2, −2, 2, 2, 0, 0}; {4, −2, 3, −2, 3, 4, −3, −3, 2, 1, 0, 0}; {, −3, 3, −4, 4, −3, 6, 6, −3, 6, 5, 0, 0}; {, −5, 1, 6, 2, −5, 5, 6, −4, 5, 5, 0, 0}; {, −5, 1, 6, 2, −4, −5, 4, 4, −2, −1, 0, 0}; {0, 5, −3, 4, −2, −4, 0, 0, 3, 3, 0, 0}; {, −2, 3, −5, 2, −4, −5, 0, 0, 3, 1, 0, 0}; {, −4, 0, 3, −3, 2, 0, 4, 3, 5, 3, 0, 0}; {, −3, 2, 6, 1, −5, −4, −3, 3, 1, −2, 0, 0}; {, −4, 1, 5, 0, −5, −3, −5, 3, −1, −3, 0, 0}; {, −5, 0, 4, −1, 6, −4, −5, 2, −1, −3, 0, 0}; {6, −1, 3, −2, 5, −5, −5, 2, 0, −3, 0, 0}; {, −2, 3, −5, 2, −3, −5, 0, 1, 3, 1, 0, 0}; {, −2, 3, −5, 2, −3, −5, 0, 1, 3, 2, 0, 0}; {, −4, 0, 3, −3, 3, 1, 4, 3, 6, 3, 0, 0}; {, −1, 5, −2, 6, 2, 2, −5, −2, 0, 0, 0, 0}; {, −2, 4, −3, 5, 1, 1, 6, −3, 0, 0, 0, 0}; {, −3, 3, −4, 4, 0, 0, 5, −3, −1, 0, 0, 0}; {, −5, −1, 2, −4, 2, 0, 4, 4, 5, 2, 0, 0}; {4, −3, 1, −4, 4, 6, 6, 1, −1, −3, 0, 0}; {, −1, 4, −4, 3, −1, −4, 1, 2, 3, 3, 0, 0}; {, −5, −1, 2, −4, 3, 0, 4, 5, 5, 3, 0, 0}; {, −4, 1, 5, 0, −4, 6, −1, 1, 2, 2, 0, 0}; {, −5, 1, 6, 2, −1, −2, 4, −4, −2, −1, 0, 0}; {5, −3, 0, 6, 1, −1, 5, 3, 4, 0, 0, 0}; {5, −3, 0, 6, 1, −1, 5, 3, 5, 1, 0, 0}; {6, 1, −5, 4, 3, −1, 2, −4, −4, −2, 0, 0}; {3, −5, −2, 4, 0, 6, −4, 6, 2, −1, 0, 0}; {, −5, −1, 2, −4, 4, 0, 5, 5, 6, 3, 0, 0}; {1, 6, −2, 5, 3, −2, −5, 1, 1, 1, 0, 0}; {, −2, 4, −3, 5, 5, −5, 1, 0, −3, −4, 0, 0}; {, −2, 4, −3, 5, 5, −5, 2, 0, −4, −4, 0, 0}; {, −4, 1, 5, 0, −1, 0, 6, 3, −1, −3, 0, 0}; {6, 0, 5, 1, 1, −5, −1, −2, −4, −4, 0, 0}; {, −5, 1, 6, 2, 3, 6, 0, −1, −4, −5, 0, 0}; {5, −1, 4, 0, 1, −5, −2, −2, −4, −4, 0, 0}; {3, 2, 0, 1, −4, 1, 6, 2, −4, −4, 0, 0}; {, −5, 2, −4, 5, −4, 1, 6, −5, 6, 6, 0, 0}; {4, −2, 3, −1, 1, −5, −3, −2, −4, −4, 0, 0}; {5, 0, 6, 3, −5, 0, 4, 6, 5, 5, 0, 0}; {1, 6, −2, 5, −5, 0, −1, 4, 2, −1, 0, 0}; {2, −5, −1, 6, −3, −3, 1, 0, 5, 3, 0, 0}; {1, 6, −2, 5, −4, −3, 1, 0, 5, 2, 0, 0}; {2, −4, 1, −3, 1, 3, −4, −4, 2, 1, 0, 0}; {, −5, 1, 6, 3, −4, 5, 5, −4, 6, 5, 0, 0}; {6, −2, 1, −4, 2, −1, 3, 3, 4, 3, 0, 0}; {, −5, 0, 4, 0, −5, 5, −2, −1, 2, 1, 0, 0}; {, −5, 0, 4, 0, −5, 6, −2, 1, 1, 1, 0, 0}; {6, −1, 3, −1, 6, 5, −2, −1, 2, 0, 0, 0}; {2, 5, −5, 1, 6, 3, −5, 6, 6, 3, 0, 0}; {4, −3, 1, −3, 4, 4, −2, −2, 1, −1, 0, 0}; {4, −4, −1, 6, 1, −2, 2, 4, 4, 2, 0, 0}; {5, −2, 2, −2, 6, 4, −3, 0, 1, 1, 0, 0}; {6, 0, 5, 2, −1, −2, 4, −4, −1, −1, 0, 0}; {4, −3, 1, −3, 5, 3, −4, 0, 0, 0, 0, 0}; {3, −3, 2, −1, −4, −5, 2, −5, −3, −1, 0, 0}; {2, −5, −1, −5, 3, 2, −5, −1, 0, 1, 0, 0}; {1, 5, −4, 3, −1, 5, −5, 5, 1, −1, 0, 0}; {1, 5, −4, 3, −1, −5, 1, 4, 4, 2, 0, 0}; {, −3, 6, 2, 3, −3, 5, −3, 0, 2, −2, 0, 0}; {, −3, 6, 2, 3, −3, 5, −3, −1, 2, −2, 0, 0}; {6, 2, −3, −3, 3, −2, 1, 2, 4, −1, 0, 0}; {5, 1, −4, −4, 2, −3, 1, 2, 4, −1, 0, 0}; {4, −1, 5, 4, −2, 3, 6, 6, −5, 1, 0, 0}; {5, 1, −4, −4, 3, −3, 1, 3, 4, −1, 0, 0}; {4, 0, −5, −5, 2, −4, 1, 2, 4, −1, 0, 0}; {, −1, 3, 6, 2, 6, 2, −1, 0, −2, −5, 0, 0}; {, −3, 2, 6, 3, −2, −3, 4, −1, 1, 1, 0, 0}; {, −4, 0, 3, −1, 5, 3, −3, 4, 3, 3, 0, 0}; {, −4, −1, 1, −4, 2, −1, 3, 6, 4, 2, 0, 0}; {, −5, −3, −2, 4, −3, 6, 0, −5, −4, 3, 0, 0}; {1, 6, −2, −5, 3, 1, −5, −1, 1, 0, 0, 0}; {0, 6, −1, −3, −3, 4, −3, −4, 6, −4, 0, 0}; {, −4, −5, 5, −3, 4, 6, 0, −5, 5, −4, 0, 0}; {6, 3, −1, 1, −5, 4, −4, −1, 1, −2, 0, 0}; {0, −3, 5, −5, 1, 2, −5, 0, −3, −1, 0, 0}; {3, −2, 4, 4, −3, 2, 6, 5, 6, 1, 0, 0}; {4, 0, −5, −4, 2, −4, 1, 2, 4, −1, 0, 0}; {2, −3, 3, 3, −4, 1, 6, 5, 6, 0, 0, 0}; {4, 0, −5, −4, 2, −3, 0, 2, 3, −1, 0, 0}; {4, 0, −5, −4, 2, −3, 0, 2, 4, −1, 0, 0}; {2, −3, 3, 3, −4, 2, 4, 5, 6, 1, 0, 0}; {1, −5, 0, −1, 3, −4, −2, −4, −4, 2, 0, 0}; {4, 0, −5, −4, 2, −3, 1, 2, 4, 0, 0, 0}; {3, −1, 6, −5, 1, −4, 0, 1, 3, −1, 0, 0}; {1, −4, 2, 2, −5, 1, 5, 4, 5, 0, 0, 0}; {1, −4, 2, 2, −5, 1, 5, 5, 5, 0, 0, 0}; {2, −2, 5, 6, 0, −5, 0, 1, 3, −1, 0, 0}; {, −1, 6, 0, 0, 5, 0, 3, 4, 5, 0, 0, 0}; {3, −1, 6, −5, 2, −4, 0, 2, 3, −1, 0, 0}; {, −1, 5, −2, −3, 2, −5, −3, −4, −4, 2, 0, 0}; {0, −5, 1, 1, −5, 1, 4, 4, 6, 1, 0, 0}; {, −1, 6, 0, 0, 6, 0, 3, 4, 5, 0, 0, 0}; {, −2, 4, −3, −4, 2, 6, −4, −5, −4, 2, 0, 0}; {, −4, 1, 5, 3, −3, −3, 3, −1, 2, 2, 0, 0}; {, −4, 1, 5, 3, −3, −3, 4, −1, 1, 1, 0, 0}; {5, −4, −2, 6, −2, −4, 1, −5, 5, 4, 0, 0}; {3, 6, −4, 4, −3, 6, 0, 6, 5, 4, 0, 0}; {, −1, 2, 4, 0, 5, 3, −2, 4, 6, 3, 0, 0}; {, −3, −1, 0, −5, −1, −4, 2, −4, −4, 4, 0, 0}; {, −2, 1, 3, −1, 5, 2, −3, 4, 5, 2, 0, 0}; {, −5, −3, −2, 5, −2, 6, 1, −5, −5, 4, 0, 0}; {4, 5, 5, −1, 3, −1, 5, −2, −2, 5, 0, 0}; {5, 4, 2, −5, 2, 5, −1, 5, 5, −4, 0, 0}; {5, 4, 2, −5, 2, 5, −1, 5, 5, −3, 0, 0}; {3, 1, −2, 2, −4, −2, 3, −3, −5, −2, 0, 0}; {1, −1, −4, 0, 6, −3, 2, −4, −5, −2, 0, 0}; {2, −3, 3, 4, −4, 2, 5, 5, 6, 1, 0, 0}; {0, −5, 1, 2, 6, 1, 4, 4, 6, 1, 0, 0}; {, −3, 6, 2, 5, −1, 0, 5, −2, −3, −2, 0, 0}; {, −1, −3, 6, −2, 5, −5, 1, −5, 6, −3, 0, 0}; {5, −4, −2, −5, −4, 0, −4, 3, −5, 4, 0, 0}; {6, 0, 5, 5, −2, 4, 6, 6, −5, 1, 0, 0}; {2, −4, 1, 1, −5, 0, −3, −4, −5, 0, 0, 0}; {4, −3, 1, 0, 6, 6, 1, −3, 1, 1, 0, 0}; {2, 5, −5, 4, −4, 6, −1, 6, 4, 4, 0, 0}; {2, 5, −5, 4, −4, 6, 0, −5, 4, 4, 0, 0}; {5, −1, 4, 4, −1, 1, −5, 5, −2, −1, 0, 0}; {3, −4, 0, −1, 5, 6, 1, −3, 0, 1, 0, 0}; {1, −4, 2, 3, −1, 5, 3, 4, 4, −2, 0, 0}; {0, 6, −1, −1, 6, 0, −4, −4, −5, 1, 0, 0}; {, −1, 5, −2, −2, 5, −1, −5, −5, −5, 0, 0, 0}; {, −3, 2, 6, 5, −1, 4, 0, −2, −3, 1, 0, 0}; {, −2, 4, −3, −3, 4, −2, −5, −5, 6, −1, 0, 0}; {, −1, 2, 4, 1, 6, 4, −2, 4, 5, 3, 0, 0}; {, −1, 2, 4, 1, 6, 4, −2, 5, 4, 3, 0, 0}; {, −4, 1, 5, 4, −1, 5, 0, −2, −2, 2, 0, 0}; {5, −5, −4, 4, −3, 6, 0, 6, −5, 4, 0, 0}; {1, 0, −2, 4, −1, 3, −3, 3, 4, −5, 0, 0}; {, −4, 6, 3, −4, 3, 6, −1, 6, 6, −3, 0, 0}; {, −5, 5, 2, −5, 2, 5, −1, 5, 6, −4, 0, 0}; {5, 2, −2, 2, −4, −2, 3, −3, −4, −2, 0, 0}; {4, 0, −5, −2, 3, 4, −4, 2, −1, −1, 0, 0}; {, −1, 5, −2, −1, 5, −2, −4, −4, 6, 0, 0, 0}; {, −2, 4, −3, −2, 4, −2, −5, −5, 6, −1, 0, 0}; {, −4, 1, 5, 5, −1, 3, 0, −2, −4, 1, 0, 0}; {, −5, 0, 4, 4, −2, 3, −1, −2, −5, 1, 0, 0}; {, −4, 2, −5, −4, 3, −3, 6, 6, 5, −1, 0, 0}; {, −4, 2, −5, −4, 3, −3, 6, 6, 6, −1, 0, 0}; {, −4, 2, −5, −4, 3, −3, 6, −5, 6, 0, 0, 0}; {, −5, 0, 4, 4, −2, 4, −1, −2, −4, 1, 0, 0}; {6, 2, −3, 0, −2, 2, 4, 1, 2, 5, 0, 0}; {5, −2, 2, 2, −3, 2, −2, −3, −4, 1, 0, 0}; {5, −2, 2, 2, −3, 2, −2, −2, −5, 1, 0, 0}; {, −3, 4, −2, 1, 1, 6, 2, 3, 5, 3, 0, 0}; {, −4, 3, −3, 0, 0, 5, 1, 3, 5, 2, 0, 0}; {, −5, 4, 0, 5, −4, 4, 6, 5, 5, −4, 0, 0}; {6, 3, −1, 4, −5, 3, 6, 5, 5, −5, 0, 0}; {, −5, 4, 0, 5, −3, 4, 6, 4, 6, −5, 0, 0}; {, −5, 5, 2, −4, 2, 6, −1, 5, 6, −4, 0, 0}; {5, 1, −4, 0, −5, −2, 2, 3, −1, −2, 0, 0}; {3, −3, 2, 4, −1, −1, −3, 6, −2, −3, 0, 0}; {5, 2, −2, 3, 1, 6, −2, 4, −4, 0, 0, 0}; {4, 0, −5, −1, −4, 1, 3, −3, 0, 2, 0, 0}; {4, 0, −5, −1, −4, 1, 3, −3, 1, 2, 0, 0}; {5, 1, −4, 0, −3, 3, 4, −2, 0, 2, 0, 0}; {1, −3, 4, −4, 6, 0, 2, −4, −1, 1, 0, 0}; {3, −4, 0, 1, −4, 1, −2, −4, −5, 0, 0, 0}; {, −5, −3, −2, −3, 3, −1, 5, −2, 4, 4, 0, 0}; {, −5, 4, 0, 6, −4, 4, 6, 5, 5, −4, 0, 0}; {, −5, 4, 0, 6, −4, 4, 6, 5, 5, −3, 0, 0}; {6, 2, −3, 2, 4, −1, −1, −4, −3, −3, 0, 0}; {, −5, 4, 0, 6, −3, 5, 6, 4, 6, −4, 0, 0}; {6, 3, −1, 5, −4, 4, 5, 4, 5, −4, 0, 0}; {, −5, 4, 0, 6, −3, 5, −5, 4, 6, −4, 0, 0}; {5, 2, −2, 4, −5, 3, 5, 4, 5, −5, 0, 0}; {5, 2, −2, 4, −5, 3, 6, 4, 5, −4, 0, 0}; {2, −2, 5, −2, 0, −5, −3, −5, −5, −4, 0, 0}; {1, −3, 4, −3, −1, −5, −3, −5, 6, −3, 0, 0}; {, −5, 3, −2, 3, −4, 6, 5, −2, 0, 2, 0, 0}; {6, 2, −3, 2, −5, 5, 5, −2, 0, 2, 0, 0}; {, −5, 3, −2, 3, −4, 6, 6, −1, 1, 4, 0, 0}; {3, −1, 6, −1, 4, 5, 2, 2, −3, −2, 0, 0}; {0, −5, 1, 5, −3, −2, 6, 4, −1, −1, 0, 0}; {2, −2, 5, −2, 4, 6, 1, 1, −3, −2, 0, 0}; {3, −1, 6, −1, 5, 4, 3, −3, −1, 1, 0, 0}; {3, −1, 6, −1, 5, 4, 4, −3, −1, 2, 0, 0}; {3, −1, 6, −1, 5, 5, 0, 1, −3, −1, 0, 0}; {1, −4, 2, 6, −1, −1, 5, 4, 0, 0, 0, 0}; {4, 1, −3, 3, −2, 0, −4, −3, −5, −3, 0, 0}; {1, −3, 4, −3, 4, 5, 1, 2, −4, −3, 0, 0}; {2, −2, 5, −2, 5, −4, 1, 2, −2, −2, 0, 0}; {0, −4, −4, 4, 5, 0, 1, −4, −3, 0, 0}; {6, 2, −3, 2, −2, 0, 1, 0, 4, 5, 0, 0}; {3, −2, 4, −4, 3, 4, 4, 2, 6, 6, 0, 0}; {5, 1, −4, 1, −3, −1, 1, 0, 3, 5, 0, 0}; {, −1, 6, 0, 4, 0, −2, 4, 4, −2, −1, 0, 0}; {0, −4, 3, −4, 5, 4, −1, 0, −5, −2, 0, 0}; {, −2, 5, −1, 3, −1, −2, 4, 4, −2, −1, 0, 0}; {, −2, 6, 1, 6, 3, 4, −1, 0, −5, −3, 0, 0}; {2, −3, 3, −5, 3, 4, 4, 2, 6, −5, 0, 0}; {3, 0, −4, 2, 0, 4, −3, 3, 6, 0, 0, 0}; {0, 6, −1, 2, −2, −2, −5, 5, −4, −4, 0, 0}; {0, 6, −1, 2, −2, −2, −5, 5, −3, −3, 0, 0}; {, −3, 3, −4, −1, −5, −5, 6, 4, −4, −4, 0, 0}; {1, −2, 6, 0, −1, 3, −4, 3, 6, 0, 0, 0}; {, −3, 3, −4, −1, −5, −4, 6, 4, −4, −4, 0, 0}; {, −4, 3, −3, 1, −2, 5, 5, −2, 0, 2, 0, 0}; {, −4, 3, −3, 1, −1, −2, 1, 0, 5, 6, 0, 0}; {, −2, 6, 1, 6, 5, 0, 1, −4, −2, 0, 0, 0}; {5, 0, 6, −1, −3, 4, 4, −2, −1, 1, 0, 0}; {6, 2, −3, 3, 2, −2, −1, −5, −3, 0, 0, 0}; {3, −3, 2, 6, 3, −2, 6, 4, 4, 5, 0, 0}; {3, −3, 2, 6, 3, −2, 6, 5, 6, 6, 0, 0}; {4, −3, 1, 4, 0, −5, −2, −3, 2, 0, 0, 0}; {, −4, 2, −5, −1, −4, −4, 6, 4, −4, −5, 0, 0}; {, −3, 6, 2, −3, −3, 1, 5, 1, 4, −1, 0, 0}; {5, 1, −4, 2, 2, −3, −2, 6, −4, −1, 0, 0}; {3, −3, 2, 6, 4, 2, 4, 2, −4, −4, 0, 0}; {5, 2, −2, 5, −5, 3, 5, 3, 5, −3, 0, 0}; {3, −1, 6, 0, 1, −3, −2, −5, −5, −3, 0, 0}; {5, −1, 4, −4, −4, 1, −2, 3, 3, 1, 0, 0}; {2, −2, 5, −1, 1, −4, −3, 6, −5, −2, 0, 0}; {2, −2, 5, −1, 1, −4, −3, −5, −5, −4, 0, 0}; {2, −2, 5, −1, 1, −4, −2, −5, −5, −3, 0, 0}; {2, −2, 5, −1, 1, −4, −2, −5, −5, −2, 0, 0}; {1, −3, 4, −2, 0, −5, −3, 6, −5, −3, 0, 0}; {1, −3, 4, −2, 0, −5, −3, −5, −5, −4, 0, 0}; {, −1, −5, 2, −4, −2, 5, −4, −5, 6, −4, 0, 0}; {3, 0, −4, 3, 6, 3, 4, 1, 4, −4, 0, 0}; {, −1, 6, 0, 5, 6, 1, 1, −2, −3, 0, 0, 0}; {, −3, 3, −4, 0, 0, 6, 5, 2, −1, 0, 0, 0}; {0, −4, 3, −3, −1, −5, −3, 6, 6, −2, 0, 0}; {, −2, 5, −1, 4, 5, 0, 1, −2, −4, −2, 0, 0}; {, −1, −5, 2, −4, −2, 6, −4, 6, 6, −3, 0, 0}; {1, −3, 4, −2, 1, −4, −4, 5, −5, −3, 0, 0}; {1, −3, 4, −2, 1, −4, −3, 6, −5, −3, 0, 0}; {, −2, 4, −3, 1, 2, −4, 5, 2, 0, −1, 0, 0}; {5, 0, 6, −1, 1, −1, 0, 0, 5, 5, 0, 0}; {, −1, 6, 0, 5, −4, 2, 0, −3, −3, −3, 0, 0}; {0, −5, 1, 6, −3, 3, 2, −3, −2, −1, 0, 0}; {3, −3, 2, 6, −4, 4, 3, −5, 6, 0, 0, 0}; {6, 2, −3, 3, −5, 5, −5, −2, 2, 3, 0, 0}; {4, 0, −5, 1, 5, 4, 5, −3, 0, 3, 0, 0}; {, −5, 2, −4, 1, 5, −5, −4, 3, 0, −1, 0, 0}; {4, 0, −5, 1, 6, 4, 4, −3, −1, 2, 0, 0}; {1, −3, 4, −2, 3, 4, 1, 2, −4, −2, 0, 0}; {, −1, −5, 2, −4, 2, 3, 0, 0, −4, −3, 0, 0}; {, −2, 5, −1, 4, −3, −3, 5, 5, −2, −1, 0, 0}; {, −3, 4, −2, 3, −4, −4, 5, 4, −1, −2, 0, 0}; {1, −3, 4, −2, 4, 5, 0, 0, −3, −2, 0, 0}; {, −1, −5, 2, −4, 2, 4, −1, −1, −3, −3, 0, 0}; {, −4, 3, −3, 2, −5, −4, 4, 3, −2, −2, 0, 0}; {3, −3, 2, 6, −2, −2, 0, −1, 5, 2, 0, 0}; {3, −3, 2, 6, −2, −1, −2, 5, 2, −1, 0, 0}; {5, 0, 6, −1, 4, 6, −5, 2, 0, −2, 0, 0}; {2, −2, 5, −1, 5, 3, 3, −3, −1, 2, 0, 0}; {0, −4, 3, −3, 3, 2, 3, −4, −1, 2, 0, 0}; {0, −5, 1, 6, −1, −2, 6, 5, −1, −1, 0, 0}; {, −1, −5, 2, −4, 3, 4, −1, 0, −4, −2, 0, 0}; {, −3, 4, −2, 3, −3, −3, 5, 5, −2, −2, 0, 0}; {, −2, 6, 1, −5, 2, 3, 0, 1, −5, −3, 0, 0}; {, −4, 3, −3, 2, −4, −4, 4, 4, −2, −2, 0, 0}; {, −2, 6, 1, −5, 2, 4, −1, 0, −4, −3, 0, 0}; {6, 1, −5, 0, 6, −5, 5, 4, −5, −5, 0, 0}; {4, −1, 5, −2, 4, 5, 4, 2, −2, −3, 0, 0}; {3, −2, 4, −3, 3, 5, 5, 3, 6, 6, 0, 0}; {3, −1, 6, 0, −5, −2, 0, −1, 3, 4, 0, 0}; {, −3, 4, −2, 3, −2, −3, 4, 4, −2, −1, 0, 0}; {, −4, 3, −3, 2, −3, −3, 4, 4, −2, −2, 0, 0}; {6, 1, −5, 0, −5, −5, 3, 3, −3, −2, 0, 0}; {, −1, 5, −2, 2, −4, −5, −2, −3, 3, 1, 0, 0}; {4, −1, 5, −2, 5, 6, 4, 3, −5, −5, 0, 0}; {4, −1, 5, −2, 5, 6, 4, 3, −4, −4, 0, 0}; {, −1, 5, −2, 2, −4, −4, −4, 4, 0, −2, 0, 0}; {1, −4, 2, −5, 2, 4, 4, 2, 6, 6, 0, 0}; {6, 0, 5, −3, 4, 0, −1, 1, −3, −4, 0, 0}; {6, 1, −5, 0, −4, −4, 3, 3, −3, −2, 0, 0}; {6, 1, −5, 0, −4, −3, 3, 3, −2, −2, 0, 0}; {3, −2, 4, −3, 5, 6, 4, 3, −5, −5, 0, 0}; {, −2, 5, −1, 4, 0, 2, 2, 1, 5, 6, 0, 0}; {6, 1, −5, 0, −3, 5, 4, −3, −1, 2, 0, 0}; {5, 0, 6, −1, −4, 4, 4, −3, −1, 1, 0, 0}; {, −2, 5, −1, 4, 1, 1, 2, 1, 5, 6, 0, 0}; {3, −2, 4, −3, 6, −5, 2, 2, −3, −3, 0, 0}; {, −2, 4, −3, 1, −3, −3, −5, 5, −4, −4, 0, 0}; {, −4, 2, −5, −1, −5, −5, 5, 4, −5, −4, 0, 0}; {6, 0, 5, −3, 5, 6, 5, 3, −5, −5, 0, 0}; {1, 6, −2, 2, −3, 4, 0, −3, −3, −3, 0, 0}; {, −1, 4, −4, 0, −5, 3, −1, −4, −3, −3, 0, 0}; {0, −5, 1, −5, 4, 4, 2, 2, −5, −4, 0, 0}; {5, −1, 4, −3, 5, 5, 5, 3, −5, −5, 0, 0}; {6, 0, 5, −2, 6, 6, 5, 4, −5, −5, 0, 0}; {, −4, 4, −1, 6, 4, −5, −3, 5, 6, 0, 0, 0}; {, −4, 4, −1, 6, 4, −5, −2, 5, −5, 0, 0, 0}; {, −4, 3, −3, 3, 0, 2, 1, 0, 5, 5, 0, 0}; {2, −3, 3, −3, −5, 2, 2, −3, −2, 0, 0, 0}; {2, −3, 3, −3, −5, 3, 3, −4, −2, 1, 0, 0}; {5, −1, 4, −3, 6, 5, 5, 3, −5, −4, 0, 0}; {6, 0, 5, −2, −5, 6, 5, 4, −5, −4, 0, 0}; {5, −1, 4, −3, 6, 6, 5, 3, −5, −5, 0, 0}; {5, 0, 6, 0, −2, 0, 0, −1, 4, 5, 0, 0}; {0, 6, −1, 4, 2, −4, −5, 1, 1, 1, 0, 0}; {1, −4, 2, −4, −5, 2, 2, −3, −2, 0, 0, 0}; {2, −3, 3, −3, −4, 3, 4, −1, −2, −2, 0, 0}; {, −1, 5, −2, 3, 1, −3, 3, 4, 6, 6, 0, 0}; {3, −1, 6, 1, 2, −3, 0, −5, −4, −2, 0, 0}; {0, −5, 1, −5, −5, 2, 1, −4, −2, 0, 0, 0}; {, −1, 4, −4, 0, −2, 3, 0, 6, 3, 2, 0, 0}; {2, −2, 5, 0, 1, −3, −2, 5, −4, −2, 0, 0}; {0, −5, 1, −5, −5, 2, 2, −3, −2, −2, 0, 0}; {0, −5, 1, −5, −5, 2, 2, −2, −2, −2, 0, 0}; {, −2, 4, −3, 2, 1, −5, 6, 1, 0, 0, 0, 0}; {1, −3, 4, −1, 0, −4, −3, 6, −5, −3, 0, 0}; {, −2, 4, −3, 2, 1, −5, 6, 1, 0, 1, 0, 0}; {, −1, 6, 0, 6, 6, 1, 1, −3, −3, −1, 0, 0}; {, −1, 6, 0, 6, 6, 1, 1, −3, −2, −2, 0, 0}; {, −1, 6, 0, 6, 6, 1, 2, −2, −3, −2, 0, 0}; {, −2, 5, −1, 5, 5, 0, 1, −2, −3, −2, 0, 0}; {1, −5, 0, 5, 4, 1, 3, 1, −4, −3, 0, 0}; {3, −3, 2, −5, −5, 0, −2, 2, 3, 2, 0, 0}; {5, 0, 6, 0, 1, −4, −1, −2, −5, −3, 0, 0}; {4, −1, 5, −1, 0, −5, −2, −3, −5, −4, 0, 0}; {, −1, 5, −2, 3, 3, −3, 6, 1, 1, −1, 0, 0}; {, −1, 5, −2, 3, 3, −3, −5, 1, 1, 1, 0, 0}; {, −1, 6, 0, 6, −5, 2, 1, −4, −2, −1, 0, 0}; {0, −4, 3, −2, 0, −4, −4, 4, −5, −2, 0, 0}; {, −2, 4, −3, 2, 2, −4, 6, 1, 0, 0, 0, 0}; {, −1, 6, 0, 6, −5, 2, 1, −3, −2, −2, 0, 0}; {0, −4, 3, −2, 0, −4, −4, 5, −5, −3, 0, 0}; {, −3, 3, −4, 1, 1, −5, 5, 1, −1, 0, 0, 0}; {, −2, 5, −1, 5, 6, 1, 1, −3, −3, −2, 0, 0}; {, −2, 5, −1, 5, 6, 1, 1, −3, −3, −1, 0, 0}; {, −1, −5, 2, −3, −1, −5, −4, 5, −5, −3, 0, 0}; {, −4, 2, −5, 0, 0, 6, 5, 1, −1, 0, 0, 0}; {, −4, 2, −5, 0, 0, 6, 5, 1, −1, 1, 0, 0}; {, −1, −5, 2, −3, −1, −5, −4, 6, −5, −4, 0, 0}; {, −4, 3, −3, 3, 4, −1, 0, −3, −4, −1, 0, 0}; {, −4, 3, −3, 3, 4, −1, 0, −3, −4, −2, 0, 0}; {, −1, −5, 2, −3, −1, −5, −3, 5, 6, −3, 0, 0}; {, −3, 4, −2, 4, 5, 0, 1, −3, −4, −2, 0, 0}; {, −3, 4, −2, 4, 5, 0, 1, −3, −4, −1, 0, 0}; {, −2, 6, 1, −4, −2, 6, −4, 5, 6, −3, 0, 0}; {0, 6, −1, 4, 5, −2, −3, 2, 1, 1, 0, 0}; {2, −2, 5, 0, 3, −2, 0, 6, −4, −2, 0, 0}; {, −3, 4, −2, 4, 6, 1, 0, −5, −3, −1, 0, 0}; {, −2, 6, 1, −4, −1, −5, −5, 3, 6, −3, 0, 0}; {, −3, 3, −4, 1, 2, −4, 6, 1, 0, 0, 0, 0}; {, −5, 2, −4, 2, 4, −1, −1, −4, −4, −2, 0, 0}; {, −2, 6, 1, −4, −1, −5, −4, 4, 6, −3, 0, 0}; {, −4, 3, −3, 3, 5, 0, 0, −4, −4, −2, 0, 0}; {1, −5, 0, 5, 6, 2, 2, 6, 5, −1, 0, 0}; {4, −1, 5, −1, 1, −1, −1, 0, 6, 6, 0, 0}; {1, −5, 0, 5, 6, 3, 3, 3, −4, −5, 0, 0}; {5, 1, −4, 3, 6, 6, 6, −3, 2, 4, 0, 0}; {2, −3, 3, −3, −1, −2, −2, −1, 6, 6, 0, 0}; {5, 0, 6, 0, 3, 6, 0, −2, −4, −3, 0, 0}; {5, 1, −4, 3, −5, 0, 4, 5, 5, 5, 0, 0}; {2, −3, 3, −3, 0, −2, −2, 0, 4, 5, 0, 0}; {2, −3, 3, −3, 0, −2, −2, 0, 6, 6, 0, 0}; {0, −5, 1, −5, −2, −3, −3, −1, 5, 5, 0, 0}; {, −1, 6, 0, 6, −3, −4, −3, −2, 5, 5, 0, 0}; {, −1, 6, 0, 6, −2, −4, −4, −1, 5, 5, 0, 0}; {, −1, 6, 0, 6, −2, −4, −3, −1, 5, 5, 0, 0}; {, −2, 5, −1, 5, −3, −5, −4, −2, 5, 5, 0, 0}; {, −4, 3, −3, 3, −4, −4, 4, 4, −2, −1, 0, 0}; {, −5, 2, −4, 2, −5, −5, 4, 3, −2, −2, 0, 0}; {2, −3, 3, −3, 2, 3, −5, −4, 1, 1, 0, 0}; {1, −5, 0, 5, −3, −2, −2, 5, 2, −1, 0, 0}; {, −1, 5, −2, 3, −5, −3, −3, 4, 1, −1, 0, 0}; {, −1, 6, 0, 6, 0, 0, 6, −5, −1, 0, 0, 0}; {, −5, 2, −4, 2, −4, −4, 4, 5, −3, −1, 0, 0}; {4, −1, 5, −1, 6, 6, 2, 2, −3, −2, 0, 0}; {5, 0, 6, 0, −5, −4, 2, 2, −2, −2, 0, 0}; {, −3, 4, −2, 4, −1, 1, 3, 2, 4, 5, 0, 0}; {4, −2, 3, −4, 3, −1, −2, 0, −3, −4, 0, 0}; {5, 1, −4, 3, 0, −1, −1, 5, −4, 0, 0, 0}; {3, −2, 4, −2, 6, 6, 3, 3, −4, −3, 0, 0}; {2, −3, 3, −3, 5, 5, 2, 2, −4, −3, 0, 0}; {0, 6, −1, 4, −1, −2, −5, 6, −4, −4, 0, 0}; {, −4, 3, −3, 3, −1, 1, 2, 0, 4, 5, 0, 0}; {6, 0, 5, −2, 5, 6, 5, 3, −5, −5, 0, 0}; {0, −5, 1, −4, 4, 2, 2, −5, −2, 1, 0, 0}; {0, −5, 1, −4, 4, 4, −2, −2, 1, 2, 0, 0}; {6, −1, 3, −4, 2, 0, −2, −4, −4, −3, 0, 0}; {, −5, 1, 6, 0, −5, 6, 5, 4, 6, −5, 0, 0}; {3, −3, 2, −4, 3, 4, 4, 2, 6, 6, 0, 0}; {, −2, 4, −3, 3, −1, −5, 6, −2, 0, 2, 0, 0}; {, −4, 2, −5, 1, −3, −5, 0, 1, 3, 3, 0, 0}; {5, −1, 4, −2, 6, 5, −2, 0, 2, 2, 0, 0}; {5, −1, 4, −2, 6, 6, 5, 4, −5, −5, 0, 0}; {4, −2, 3, −3, 5, 5, 5, 3, 6, −5, 0, 0}; {2, −5, −1, 4, −1, −2, −3, −5, −4, −4, 0, 0}; {2, −4, 1, −5, 3, 4, 4, 1, −2, −4, 0, 0}; {2, −4, 1, −5, 3, 4, 4, 2, 6, −5, 0, 0}; {4, −1, 5, 0, −3, −1, 1, −5, −3, 1, 0, 0}; {3, −2, 4, −1, −4, −2, 0, −5, −4, 1, 0, 0}; {0, 6, −1, 5, 1, 3, 3, 0, −3, −4, 0, 0}; {1, −5, 0, 6, 2, 4, 4, 2, 5, 6, 0, 0}; {3, −1, 6, 2, 0, 4, −5, 3, 5, 0, 0, 0}; {, −4, 2, −5, 1, −2, 6, 5, −1, 0, 1, 0, 0}; {4, 0, −5, 3, 2, 4, −4, 3, 6, −1, 0, 0}; {1, −5, 0, 6, 3, 4, 4, 2, 6, 6, 0, 0}; {, −2, 5, −1, 6, 5, 1, 1, −4, −3, −2, 0, 0}; {, −3, 3, −4, 2, 0, −5, 6, 0, 0, 1, 0, 0}; {, −4, 2, −5, 1, −1, 6, 5, 0, 0, 0, 0, 0}; {, −4, 2, −5, 1, −1, 6, 5, 0, 0, 1, 0, 0}; {, −1, 6, 0, −5, 6, −3, −1, 6, −5, 1, 0, 0}; {1, −3, 4, 0, 1, −4, 0, 6, −5, −2, 0, 0}; {0, −4, 3, −1, 0, −4, −1, 5, −5, −2, 0, 0}; {, −5, 0, 4, −3, −5, 1, −2, 4, 2, 1, 0, 0}; {, −4, 2, −5, 1, 0, −5, 5, 0, 0, −1, 0, 0}; {, −5, 1, 6, 0, −1, 6, 5, 0, −1, 0, 0, 0}; {, −4, 3, −3, 4, 4, 0, 0, −4, −3, −2, 0, 0}; {, −5, 2, −4, 3, 3, 0, −1, 5, −4, −1, 0, 0}; {6, −3, −1, 2, −2, 5, 2, 3, −1, 3, 0, 0}; {, −4, 3, −3, 4, 5, −5, −5, −3, 5, 5, 0, 0}; {, −5, 2, −4, 3, 4, −1, 0, −4, −4, −2, 0, 0}; {5, −1, 4, −2, −2, 4, 4, 0, −2, 0, 0, 0}; {, −3, 5, 0, −4, −2, 6, −4, 4, 6, −3, 0, 0}; {5, −2, 2, −5, 6, 0, −3, 4, 1, 1, 0, 0}; {, −5, 2, −4, 3, 4, 0, −1, −5, −3, −1, 0, 0}; {5, −2, 2, −5, 6, 0, −2, 4, 1, 1, 0, 0}; {5, −1, 4, −2, −1, −1, 0, 0, −5, 5, 0, 0}; {2, −3, 3, −2, 0, 4, −2, −3, −5, −5, 0, 0}; {2, −3, 3, −2, 0, 5, −2, −3, −5, −4, 0, 0}; {6, 1, −5, 2, 4, −1, −2, 6, −4, −2, 0, 0}; {6, 0, 5, −1, 0, 6, 5, 0, −1, 0, 0, 0}; {6, 1, −5, 2, 4, −1, −1, −5, −4, −2, 0, 0}; {5, 0, 6, 1, 3, −1, −2, 5, −4, −2, 0, 0}; {, −3, 3, −4, 2, 3, 1, 1, 2, −4, −5, 0, 0}; {, −4, 2, −5, 1, 2, 0, 1, 1, −5, −5, 0, 0}; {, −3, 4, −2, 5, −4, −4, −4, −2, 5, 5, 0, 0}; {6, 0, 5, −1, 1, 0, 1, 0, 6, 5, 0, 0}; {4, −1, 5, 0, 3, 4, 6, −4, 4, 4, 0, 0}; {2, −3, 3, −2, 1, 4, −2, −3, −5, −4, 0, 0}; {, −1, 6, 0, −5, −2, 3, 6, −4, 0, 0, 0, 0}; {, −3, 4, −2, 5, −4, −5, −4, −2, 5, 5, 0, 0};

{6, 1, −5, 2, 6, 5, 6, −4, 5, 5, 0, 0}; {0, −5, 1, −4, 0, 1, 6, −5, 1, 1, 0, 0}; {0, −5, 1, −4, 0, 2, 6, −5, 1, 1, 0, 0}; {0, 6, −1, 5, −4, −2, −2, 5, 2, −1, 0, 0}; {5, −1, 4, −2, 2, 1, −4, −5, 1, 0, 0, 0}; {, −2, 4, −3, 3, −5, −5, −1, −1, 3, 2, 0, 0}; {, −3, 4, −2, 5, −2, 1, 2, 0, 4, 4, 0, 0}; {3, −3, 2, −4, 1, −2, −3, −1, −4, −5, 0, 0}; {6, 0, 5, −1, 4, 3, −4, −5, 2, 1, 0, 0}; {, −4, 2, −5, 1, 6, 5, −2, −2, 2, 2, 0, 0}; {, −3, 3, −4, 2, −5, −5, −1, −1, 3, 2, 0, 0}; {, −4, 2, −5, 1, 6, 6, −2, −2, 3, 2, 0, 0}; {, −4, 3, −3, 4, −2, 0, 5, −5, −1, 0, 0, 0}; {2, −3, 3, −2, 5, 3, 2, −4, −2, 1, 0, 0}; {2, −3, 3, −2, 5, 5, 1, 1, −3, −2, 0, 0}; {, −4, 3, −3, 4, −1, 0, 4, 6, −1, 1, 0, 0}; {5, −1, 4, −2, 4, 4, −4, −4, 2, 1, 0, 0}; {6, 0, 5, −1, 5, 5, −2, −2, 2, 1, 0, 0}; {2, −3, 3, −2, 5, 6, 1, 1, −2, −2, 0, 0}; and {5, −1, 4, −2, 4, 6, −5, 2, 0, −2, 0, 0}.

M may be another integer. The sequence $\{f_n\}$ including the N elements is determined, and $f_n$ is an element in the sequence $\{f_n\}$. The sequence $\{f_n\}$ is a sequence that meets a preset condition, and the preset condition is $f_n = A \cdot x_n \cdot e^{2\pi \cdot j \cdot a \cdot n}$, where a value of n ranges from 0 to N−1, A is a non-zero complex number, a is a real number, $j=\sqrt{-1}$, for an element $x_n$, $x_n = u \cdot e^{2\pi \cdot j \cdot s_n / M}$, u is a non-zero complex number, and a set of sequences $\{s_n\}$ including an element $s_n$ includes at least one of sequences in a first sequence set or at least one of equivalent sequences of the sequences in the first sequence set.

When M=16, the first sequence set may further include some or all of the following 1864 sequences (which are marked as Seq16psk_lte_idc). A value of a correlation between an LTE sequence and sequences corresponding to these sequences is less than 0.79467, and PAPRs are less than 2.0 dB. The 1864 sequences are as follows:

{6, −4, 3, 2, −6, 2, −2, −4, −6, 0, 0, 0}; {2, −1, 8, 2, −1, 5, −6, 4, 8, −1, 0, 0}; {8, −4, 3, −5, 2, 0, 2, 1, 7, 5, 0, 0}; {, −6, 1, 8, 3, 3, −5, 0, −2, −5, −4, 0, 0}; {4, −7, 7, −3, −7, 3, −7, −5, 5, 4, 0, 0}; {4, −5, 2, −7, −6, 6, 3, −7, 8, −1, 0, 0}; {0, −5, 8, 1, −7, −3, 7, −7, 8, −4, 0, 0}; {4, 6, −5, 3, 4, −2, 7, −3, 8, 1, 0, 0}; {, −3, 7, −2, 7, −4, −6, −5, −2, 7, 7, 0, 0}; {5, −1, −4, 2, −6, −1, −6, −5, −6, −5, 0, 0}; {, −5, 4, −3, 5, −5, −7, −6, −3, 7, 7, 0, 0}; {7, −4, 3, −7, −4, 8, 4, −6, 7, 0, 0, 0}; {4, −7, 0, 7, −6, 6, 3, −7, 7, −1, 0, 0}; {5, 7, 1, 8, −5, 5, −1, 7, 4, −3, 0, 0}; {, −4, 5, 3, −4, −7, −1, 6, −1, 2, 1, 0, 0}; {, −5, 0, −7, −1, −3, 3, 1, 8, 7, 3, 0, 0}; {7, −3, 4, 4, −5, 3, −2, −4, −6, 1, 0, 0}; {2, −5, 3, −5, −1, −3, −3, −1, 8, 8, 0, 0}; {0, 5, −4, 3, 0, 6, 5, −6, 7, 4, 0, 0}; {, −7, 0, −4, 3, 1, 7, −6, 2, 4, 1, 0, 0}; {2, −5, 2, −5, 0, −2, −3, 1, 6, 7, 0, 0}; {7, 3, −3, 6, −2, −1, 0, 8, −4, 1, 0, 0}; {, −2, 7, −2, 6, 1, 4, 4, 1, 7, 7, 0, 0}; {1, 8, −1, 0, 8, −1, −5, −5, −7, 0, 0, 0}; {, −4, −5, 6, 7, −1, 4, −4, 5, −3, −4, 0, 0}; {1, −4, −7, 1, −7, −3, 7, −7, 8, −4, 0, 0}; {, −4, 6, −3, 7, −4, −7, −6, −2, 7, 7, 0, 0}; {0, −2, 5, 0, −3, 4, −6, 3, 8, −1, 0, 0}; {, −3, 6, 7, −1, 3, 0, −7, −2, −4, −2, 0, 0}; {2, −7, 2, 8, 3, 5, 5, 2, −7, −7, 0, 0}; {0, −1, −6, −6, 1, 7, −2, 7, −2, −4, 0, 0}; {0, −1, −6, −6, 1, 7, −2, 7, −3, −4, 0, 0}; {, −3, −7, 2, 4, 0, 7, −4, 1, 2, −3, 0, 0}; {8, 0, 8, −2, −7, −7, 7, 5, −6, −6, 0, 0}; {8, −3, 4, 4, −3, 3, −1, −4, −5, 0, 0, 0}; {2, −5, −6, 2, 4, −7, 2, −4, 0, −1, 0, 0}; {8, 5, −4, 5, 3, 8, −2, 7, −6, 1, 0, 0}; {8, 4, −3, 6, 3, 8, −4, 6, −7, 0, 0, 0}; {, −5, 3, −6, 0, −5, −6, 8, 6, −6, −6, 0, 0}; {8, 0, 7, −3, 8, 8, 6, 5, −7, −6, 0, 0}; {, −2, 6, 5, −2, −6, 0, 7, 0, 3, 2, 0, 0}; {, −2, 6, 5, −2, −6, 0, 7, 0, 2, 2, 0, 0}; {1, −7, 0, 0, 8, 0, −4, −5, −7, 0, 0, 0}; {1, 7, 0, 8, 7, −2, −2, 4, 4, 2, 0, 0}; {, −2, 7, 1, −4, 1, 3, 5, 8, 4, 4, 0, 0}; {3, −2, −2, 7, −5, 1, −5, 7, −3, −2, 0, 0}; {3, −2, −2, 7, −5, 1, −5, 7, −4, −3, 0, 0}; {, −4, 5, 6, −1, 2, −2, 7, −2, −4, −2, 0, 0}; {8, 0, 8, −3, −6, −7, 7, 4, −6, −6, 0, 0}; {3, −6, 3, −7, 5, 6, 4, 2, −6, −6, 0, 0}; {2, −4, −3, 7, −7, 0, −7, 6, −5, −3, 0, 0}; {3, −6, 2, −7, 5, 7, 5, 2, −6, −7, 0, 0}; {, −1, 4, −2, 6, 0, 4, 4, 0, 8, 8, 0, 0}; {, −5, 3, −5, 4, 0, 2, 2, 0, 6, 7, 0, 0}; {, −4, 4, −3, −3, 3, 0, 8, −5, 4, 1, 0, 0}; {4, −2, 7, 2, 8, −2, 4, 7, 6, 6, 0, 0}; {, −6, 4, −5, 4, −3, 0, 1, 0, 5, 6, 0, 0}; {1, −6, 1, 8, 3, 5, 5, 2, 8, 8, 0, 0}; {, −3, 7, 6, −1, 6, −6, 4, 8, 7, −3, 0, 0}; {3, −3, 4, −5, 4, 6, 5, 3, 8, 8, 0, 0}; {5, −3, −1, 7, 5, −6, 3, −2, −1, 1, 0, 0}; {8, −4, −3, 4, −3, 8, −1, −7, −6, 4, 0, 0}; {1, 7, −5, 5, −2, −5, 0, 4, 3, 1, 0, 0}; {5, −3, 2, −7, 1, −1, −4, −6, −5, −4, 0, 0}; {5, −1, 0, −6, −5, 2, −5, 7, −4, −3, 0, 0}; {0, 5, −5, 3, −4, −3, −4, 5, 1, −3, 0, 0}; {6, −3, 1, −5, 6, 4, −5, 0, 0, 1, 0, 0}; {8, 0, 7, −2, −7, −7, 7, 5, −6, −6, 0, 0}; {1, 5, −2, 4, −7, 5, 1, 8, 6, −1, 0, 0}; {2, 6, −1, 4, −6, 6, 1, −7, 6, 0, 0, 0}; {8, 0, −7, 3, 8, 8, −7, −5, 7, 6, 0, 0}; {, −1, 5, −1, 6, 0, 3, 4, −1, −5, −7, 0, 0}; {, −7, 1, 1, −6, 7, −4, 4, −2, 1, 1, 0, 0}; {0, 5, −3, 5, −3, −5, −1, −2, 7, 5, 0, 0}; {7, 0, 0, 8, −6, 3, −5, 6, −3, 0, 0, 0}; {7, 7, 2, 3, −4, 2, −5, 4, −4, −5, 0, 0}; {3, −4, 4, −2, 0, 7, −3, −4, −7, −5, 0, 0}; {0, −6, 2, 2, −6, 1, 6, 6, 8, 1, 0, 0}; {5, −4, 5, −3, 1, −2, −2, 0, −6, −7, 0, 0}; {3, −4, −5, 4, 3, −6, 1, −6, −1, −1, 0, 0}; {3, −4, 2, −6, 4, 6, 6, 3, 8, 8, 0, 0}; {, −1, −6, 1, 8, 1, 4, 3, 2, 7, 8, 0, 0}; {, −2, 6, −2, 6, 2, 3, 3, 1, 8, −7, 0, 0}; {2, −6, 1, −7, 3, 5, 5, 2, 8, 8, 0, 0}; {8, 0, 7, −3, 7, 8, 7, 4, −6, −6, 0, 0}; {8, 0, 7, −3, 7, 8, 7, 4, −7, −7, 0, 0}; {, −7, 1, −6, 3, 8, 8, −6, −5, 7, 6, 0, 0}; {, −1, 8, −1, −7, −2, −4, −4, −1, 7, 7, 0, 0}; {, −1, −6, −2, −6, −3, 5, 0, 1, 6, −7, 0, 0}; {, −4, 5, −6, 3, −2, 8, 7, −4, −1, 2, 0, 0}; {2, 5, −3, 3, 1, 7, 3, −7, 8, 6, 0, 0}; {6, 2, 1, −5, 2, −6, 3, 2, 8, −3, 0, 0}; {6, 0, 1, −6, −2, −5, 4, −5, −4, −4, 0, 0}; {4, −5, 2, 3, −6, 0, −3, −3, −7, 1, 0, 0}; {, −7, −6, 1, 7, 7, 1, −6, −1, −7, 1, 0, 0}; {, −4, 8, −2, 7, −1, 2, 3, 0, 6, 6, 0, 0}; {, −7, −2, −4, 1, −5, −2, 3, −5, 8, 5, 0, 0}; {7, −1, −1, 7, −7, 3, −4, 2, −2, −1, 0, 0}; {, −7, 4, 1, 8, −1, 2, −3, −7, −4, −1, 0, 0}; {6, −3, 5, −4, 8, 8, 6, 4, −6, −6, 0, 0}; {1, −2, 8, 0, −1, 5, −5, 5, −7, 0, 0, 0}; {, −7, 5, −3, 7, 3, 8, −4, 6, −7, 0, 0, 0}; {, −6, 3, −1, 5, −6, −4, 5, 0, 0, −1, 0, 0}; {6, −6, 3, −7, 3, −1, 2, 0, −6, 8, 0, 0}; {0, 1, −6, −1, 2, −5, 4, −5, 7, −1, 0, 0}; {7, −1, 7, 0, 1, −6, −1, −3, −6, −4, 0, 0}; {, −5, 4, 8, 0, 7, 3, −2, 8, −7, −5, 0, 0}; {, −4, 1, −7, 1, −6, −7, −3, −3, 4, 3, 0, 0}; {8, 2, 8, −1, 7, 8, 7, 5, 8, −7, 0, 0}; {, −4, 1, 8, −2, −1, −6, 6, −4, −7, 0, 0, 0}; {, −5, 3, 3, −5, −7, −2, 5, −1, 2, 1, 0, 0}; {, −5, 5, −5, 2, −7, −6, 8, 6, −7, −6, 0, 0}; {7, −2, 2, −6, −3, −7, 4, −4, −7, −1, 0, 0}; {6, −2, 5, −2, 1, −1, −1, 1, −7, 8, 0, 0}; {, −3, −4, 7, 2, 3, −7, 0, −3, 2, −4, 0, 0}; {, −3, 5, 4, −3, −7, −2, 6, 0, 2, 0, 0, 0}; {, −1, 6, −2, −2, 7, −2, −5, −6, −7, 0, 0, 0}; {, −1, 6, −2, −2, 7, −2, −5, −6, 8, −1, 0, 0}; {7, −2, −7, 3, 8, 6, 8, −4, 7, 8, 0, 0}; {7, −2, −7, 3, 8, 6, 8, −4, 7, 7, 0, 0}; {, −7, −1, 5, 5, −3, 4, −1, −4, −5, 1, 0, 0}; {, −4, 4, 8, 0, −7, 2, −3, −6, −5, −5, 0, 0}; {0, −7, −7, 1, 2, 8, −1, −6, −1, −1, 0, 0}; {6, −1, 7, 8, 1, −7, 7, 7, 6, −2, 0, 0}; {7, −1, 5, 1, −3, −4, 4, −5, −3, −1, 0, 0}; {, −4, −7, 1, 8, 6, −5, 0, −7, −4, 2, 0, 0}; {, −5, 0, 6, −2, 7, −5, −6, 3, 0, −3, 0, 0}; {, −5, 4, −7, 0, −6, 8, 8, 7, 8, −6, 0, 0}; {, −2, 4, 3, −7, 4, 7, −2, 7, 5, 4, 0, 0}; {1, 7, −2, −1, 8, −1, −5, −5, −7, 0, 0, 0}; {, −1, 4, −6, −7, 0, 7, 1, −2, −4, 2, 0, 0}; {1, −7, 0, 3, −3, −3, −5, 7, −4, −5, 0, 0}; {6, 3, −5, 4, 6, −3, 5, 8, 8, 0, 0, 0}; {0, 6, 0, −5, 0, 7, 7, 1, −3, −3, 0, 0}; {5, −3, 4, −5, 5, 7, 6, 3, −7, −7, 0, 0}; {5, −3, 3, −5, 1, −3, −4, −7, 0, 0, 0}; {2, −7, −1, 0, −7, 0, −4, −6, −7, 0, 0, 0}; {, −6, −3, 3, −4, −2, 8, 2, −7, 5, −1, 0, 0}; {, −6, −3, 3, −4, −2, 8, 2, −7, 4, −1, 0, 0}; {, −3, 5, −4, −5, 1, 8, −5, −6, −6, 2, 0, 0}; {, −7, 1, 8, 3, −1, −2, 5, −5, −2, 0, 0, 0}; {, −7, 1, −5, 4, −7, 8, −7, −4, 7, 7, 0, 0}; {, −5, 3, −7, 0, −6, −7, 8, 6, −7, −6, 0, 0}; {4, −3, 4, 4, −4, 3, 6, 6, −7, 1, 0, 0}; {0, 6, 4, −6, 8, 1, 8, −6, 5, 4, 0, 0}; {0, 6, 4, −6, 8, 1, 8, −6, 5, 3, 0, 0}; {8, 0, 0, −7, 6, −5, 3, −2, 1, 0, 0, 0}; {6, −1, 7, 1, −5, −2, 0, −2, 4, 5, 0, 0}; {, −4, 5, −4, 0, −6, −5, −7, 6, −6, −6, 0, 0}; {, −2, 4, 3, −7, 4, 8, −2, 7, 4, 3, 0, 0}; {, −7, −1, 5, 5, −3, 4, 0, −3, −5, 1, 0, 0}; {, −6, −2, −4, 1, −3, 6, −4, −3, 7, 5, 0, 0}; {, −6, 0, 7, 6, −3, 5, 0, −2, −4, 2, 0, 0}; {0, 4, −4, 2, 0, 6, 2, −7, 7, 4, 0, 0}; {1, 7, −5, 4, −2, −5, 1, 4, 4, 3, 0, 0}; {1, 7, −5, 4, −2, −5, 1, 4, 4, 2, 0, 0}; {2, −7, 3, −7, 5, 6, 3, 2, −6, −6, 0, 0}; {3, 4, −7, −2, −3, 7, 0, 3, −2, 4, 0, 0}; {6, −4, 2, 2, −5, 2, −3, −4, −7, 0, 0, 0}; {7, 2, −5, −4, 3, −4, 2, 2, 5, −1, 0, 0}; {8, 1, 8, 1, 2, −5, −1, −3, −6, −4, 0, 0}; {, −7, 0, 6, 6, −3, 4, −1, −2, −6, 1, 0, 0}; {0, 8, −4, 5, 4, −1, 4, 0, −5, −3, 0, 0}; {7, −1, 6, −4, 7, 8, 7, 4, −7, −7, 0, 0}; {2, −4, 3, −6, 3, 4, 5, 3, 7, 8, 0, 0}; {2, −2, 7, −2, 8, −4, −1, −1, 3, 5, 0, 0}; {, −3, 6, −2, 6, 2, 3, 2, 2, 7, 8, 0, 0}; {0, −6, −2, 8, 1, −5, −6, 6, −7, −5, 0, 0}; {6, 1, −5, −5, 3, −4, 1, 2, 5, −1, 0, 0}; {3, −5, −2, 5, −3, 6, 0, −4, −4, −4, 0, 0}; {, −1, 7, 0, −7, −3, −5, −4, −2, 8, 8, 0, 0}; {, −7, −1, 6, 6, −3, 3, −1, −2, −6, 1, 0, 0}; {4, −5, 1, 1, −5, 2, −3, −5, −6, 1, 0, 0}; {3, 5, −5, 2, 4, −3, 7, −3, 8, 1, 0, 0}; {8, 2, −7, −1, 7, −7, 8, 5, −7, −7, 0, 0}; {, −4, 4, −6, 1, −5, −6, 8, 6, −7, −6, 0, 0}; {6, −1, 7, 6, −3, 4, 8, 7, 8, 1, 0, 0}; {7, −1, 7, −3, −7, −7, 6, 4, −6, −6, 0, 0}; {, −7, −4, 8, −5, 7, −1, 3, 1, −5, 8, 0, 0}; {7, 4, 3, −6, 4, −7, 0, 7, 6, −3, 0, 0}; {, −7, 2, −7, −2, 8, −7, 7, 5, −6, −6, 0, 0}; {, −7, 2, −7, −2, 8, −7, 7, 5, −7, −6, 0, 0}; {3, 0, −6, 2, 0, 6, −4, 5, −6, 0, 0, 0}; {, −2, 1, 8, −2, 1, −5, 5, −4, 8, 0, 0, 0}; {, −3, 8, 6, −1, 6, −5, 5, 7, 7, −4, 0, 0}; {0, 5, −2, 4, 8, 4, 0, 8, 5, −1, 0, 0}; {, −1, 8, 8, 1, 4, 0, 8, −1, −4, −2, 0, 0}; {8, 0, −2, 7, 6, −3, 3, −5, 0, −1, 0, 0}; {, −2, 2, −6, 1, −1, 5, 2, 8, 7, 5, 0, 0}; {, −2, 2, −6, 1, −1, 5, 2, 8, 7, 3, 0, 0}; {, −2, 8, −1, 7, 0, 2, 3, 2, 6, 7, 0, 0}; {, −5, 0, 8, −1, −3, 3, 1, 7, 7, 4, 0, 0}; {, −5, 0, 8, −1, −3, 3, 1, 7, 6, 4, 0, 0}; {, −5, 0, 8, −1, −3, 3, 1, 7, 6, 3, 0, 0}; {, −5, 5, −1, −2, 6, −2, 3, 4, 6, 0, 0, 0}; {, −4, 3, −5, −5, 4, −3, −7, −7, 8, −1, 0, 0}; {8, 2, −5, −4, 4, −4, 2, 3, 5, −1, 0, 0}; {8, −4, 3, −6, −3, 8, 4, −6, 7, 0, 0, 0}; {, −6, 2, −6, 3, 0, 1, 2, 0, 6, 8, 0, 0}; {7, −1, −1, 7, 6, −5, 4, −2, 1, −1, 0, 0}; {1, 5, 7, −1, 8, 2, 8, −5, 7, 3, 0, 0}; {1, 5, 7, −1, 8, 2, 8, −5, 6, 2, 0, 0}; {3, −6, 3, −5, −1, −4, −3, −1, −7, −7, 0, 0}; {4, −1, 7, 0, −7, −4, −1, −2, 4, 5, 0, 0}; {7, −4, 4, −4, −6, 1, −1, 5, 5, 2, 0, 0}; {, −5, 1, −6, 1, −5, −6, −4, −3, 8, 7, 0, 0}; {4, −4, −2, 6, 7, 1, 7, 1, −4, −1, 0, 0}; {8, 1, 3, −5, 0, −5, 3, −3, −5, −2, 0, 0}; {2, −6, −5, 4, 2, 8, 1, −4, −1, −1, 0, 0}; {2, −5, 2, −5, −1, −3, −3, 0, 8, 8, 0, 0}; {3, −4, 3, −5, 0, −3, −3, −1, −7, 8, 0, 0}; {3, 7, 3, 7, 4, −4, 1, −1, −6, 7, 0, 0}; {, −5, −5, 5, 6, −1, 4, −3, 5, −3, −5, 0, 0}; {1, −6, 8, 0, 3, −7, 1, −5, −1, −1, 0, 0}; {4, −3, −3, 5, 8, 3, −4, 1, −2, −2, 0, 0}; {, −5, −4, 1, 8, 8, 2, −5, 0, −6, 2, 0, 0}; {8, −2, 6, −4, 7, −7, 7, 3, −5, −6, 0, 0}; {, −4, 5, 5, −2, −1, 6, −1, −7, −2, −2, 0, 0}; {, −4, 8, 1, 8, 6, −5, 0, −7, −4, 2, 0, 0}; {3, −6, −5, 4, 0, −6, 1, 6, 1, 0, 0, 0}; {3, −4, 3, −6, 6, 7, 5, 3, −7, −7, 0, 0}; {2, −6, 3, 3, −6, 1, 6, 6, 7, 0, 0, 0}; {1, −2, 6, 0, −1, 4, −6, 4, 8, 0, 0, 0}; {, −6, 5, 4, −3, 5, −7, 2, 7, 6, −3, 0, 0}; {, −5, 3, −6, 4, −2, 1, 2, 0, 5, 6, 0, 0}; {, −7, 6, −4, 6, −3, 7, −6, −2, 7, 7, 0, 0}; {0, −5, 3, −6, 2, 4, 4, 3, 7, 7, 0, 0}; {0, 3, −6, −1, 2, −3, 7, −3, −7, 2, 0, 0}; {, −7, −4, 6, −6, 7, −1, 4, 0, −4, 8, 0, 0}; {0, −7, −7, 2, 2, 8, 1, −5, −1, −1, 0, 0}; {3, −5, 3, 4, −1, 8, 4, 6, 6, −2, 0, 0}; {, −6, −2, 5, −5, −2, −6, 5, −5, 8, 1, 0, 0}; {8, −3, −2, 5, −4, 8, −4, −6, −6, 5, 0, 0}; {2, −7, −4, 6, −1, −4, 2, 2, 5, 1, 0, 0}; {, −3, 6, −5, 2, −5, −6, −7, 7, −7, −6, 0, 0}; {7, 0, −3, 3, 8, −5, 4, −2, 0, 0, 0, 0}; {7, 0, −3, 3, 8, −5, 4, −2, 0, −1, 0, 0}; {2, −6, −7, 0, 1, −7, 2, 8, 2, 2, 0, 0}; {4, −2, 5, −3, 5, 6, 5, 4, 7, 8, 0, 0}; {3, −3, −4, 5, −7, 1, −7, 6, −4, −1, 0, 0}; {1, −6, 8, −2, 4, 6, 0, −4, −1, 1, 0, 0}; {, −2, −3, −7, 8, 0, 6, −3, 6, −3, −4, 0, 0}; {3, −7, 2, 8, 3, 6, 5, 1, −7, −7, 0, 0}; {, −7, 2, −5, 4, −7, −7, −7, −4, 7, 7, 0, 0}; {, −1, 6, −2, −7, −3, −5, −3, −2, 8, 7, 0, 0}; {, −7, 3, 2, −7, −1, 3, −3, −7, −3, −1, 0, 0}; {, −5, 3, 1, 8, −7, −2, 6, −1, 2, 0, 0, 0}; {8, 0, 8, 7, −2, 5, −7, −7, −7, 1, 0, 0}; {, −5, 3, −2, 7, −7, −3, −6, −3, 4, 4, 0, 0}; {0, −4, 6, 0, −2, 3, 8, 3, 6, −1, 0, 0}; {5, −3, −3, 6, 4, −6, 2, −4, 0, 0, 0, 0}; {, −4, 6, 4, −5, 1, 5, −2, −6, −2, 0, 0, 0}; {6, −2, 8, 0, 6, 6, 8, −6, 6, 6, 0, 0}; {, −2, 5, −5, 7, 2, 0, 7, −3, −1, 0, 0, 0}; {, −2, 5, −5, 7, 2, 0, 7, −3, −1, −1, 0, 0}; {, −2, −7, −4, 8, 1, −5, −7, 4, −7, −3, 0, 0}; {, −6, 3, −3, −3, 4, −3, 3, 4, 5, −1, 0, 0}; {1, 8, −1, −1, 8, 1, −5, −6, −6, 1, 0, 0}; {, −7, 1, 3, −4, −4, 4, −4, 8, −2, −1, 0, 0}; {3, −5, 1, 1, −6, 2, −4, −5, −6, 1, 0, 0}; {, −5, 1, 0, 6, 4, −2, 5, 8, 3, 3, 0, 0}; {7, −1, 7, 6, −3, 4, 8, 7, 8, 0, 0, 0}; {, −7, 1, 8, 0, 3, 0, 0, 1, −6, −7, 0, 0}; {0, 5, 6, −2, 7, 2, 8, −6, 6, 2, 0, 0}; {4, −3, 4, −1, 0, 8, −3, −4, −7, −5, 0, 0}; {, −5, −2, 4, −3, −2, 8, 2, −7, 5, −1, 0, 0}; {3, −4, 3, −6, 4, 6, 6, 3, 8, 8, 0, 0}; {1, −6, −3, 6, −5, 7, 2, −6, −7, −2, 0, 0}; {, −3, 8, 0, 7, 0, 2, 3, 2, 6, 7, 0, 0}; {0, −7, −3, 5, −3, −5, −7, 8, −7, −5, 0, 0}; {, −3, 4, −4, 6, −5, −6, −5, −3, 7, 7, 0, 0}; {, −7, 3, −7, −1, 8, −7, 8, 5, −7, −7, 0, 0}; {, −7, −1, −7, 5, −6, 3, 4, −2, −4, −5, 0, 0}; {, −2, 6, 5, −2, 4, −3, 0, −4, −5, −4, 0, 0}; {, −1, 7, −2, −1, 7, −1, −5, −6, −7, 0, 0, 0}; {4, −7, −5, 3, −6, 6, −6, 8, −7, 5, 0, 0}; {7, −3, 4, 3, −4, 3, −2, −4, −5, 1, 0, 0}; {2, 8, 1, 8, 3, 5, 5, 1, −7, −7, 0, 0}; {2, −7, 3, −1, 5, 4, 7, −6, 6, 6, 0, 0}; {, −6, 4, −6, 1, 8, −7, 7, 5, −7, −7, 0, 0}; {, −2, 6, 2, −4, 4, −6, 0, 4, 4, 4, 0, 0}; {, −6, −1, −3, 2, −4, −1, 3, −5, 8, 5, 0, 0}; {, −6, −1, −3, 2, −4, −1, 3, −5, 7, 5, 0, 0}; {, −5, 6, −2, 6, −2, 1, 2, 0, 5, 6, 0, 0}; {1, 5, −5, −6, 1, 8, 2, 0, −3, 2, 0, 0}; {, −2, −7, 1, −6, 7, −5, −2, 8, −6, 1, 0, 0}; {0, 4, −6, 0, 1, −4, 8, −3, −6, 1, 0, 0}; {8, 0, 1, −6, 6, −5, 4, −1, −1, 0, 0, 0}; {, −4, 4, 5, −1, −2, 5, −2, 8, −2, −1, 0, 0}; {1, −7, −6, 3, 1, 8, 0, −6, −1, 0, 0, 0}; {5, −3, 7, 1, 7, 6, 8, −5, 6, 6, 0, 0}; {7, 8, 0, −6, −4, 6, −1, 5, 3, −3, 0, 0}; {6, −3, 3, 3, −5, 2, −3, −4, −6, 0, 0, 0}; {6, −3, 3, 3, −5, 2, −3, −4, −7, 0, 0, 0}; {, −3, 8, 7, −1, 7, −5, 7, 7, 8, −5, 0, 0}; {, −6, 2, −6, 1, 3, 0, 0, 1, −6, −6, 0, 0}; {6, 1, −7, 1, −4, −1, 0, −1, 5, 6, 0, 0}; {, −1, −5, 4, 5, 0, 7, −2, 3, 3, −3, 0, 0}; {5, −4, 2, 1, −6, 1, −3, −5, −6, 0, 0, 0}; {, −7, 0, −7, 4, −7, 8, −6, −4, 7, 6, 0, 0}; {2, 6, −3, 6, −7, 4, −1, 7, 4, −2, 0, 0}; {, −7, 5, −4, 2, −2, −6, 2, 4, −4, 0, 0, 0}; {3, 8, 1, 8, 3, 7, 5, 1, −6, −7, 0, 0}; {2, −5, −5, 3, 6, 2, −5, 1, −3, −1, 0, 0}; {, −4, 5, −1, −2, 6, 0, 4, 4, 7, 0, 0, 0}; {, −6, 3, −5, 1, 3, 0, 1, 1, 7, 7, 0, 0}; {, −7, −2, 5, 4, −4, 4, −1, −3, −5, 0, 0, 0}; {, −4, 0, −3, 3, −2, 8, −4, −3, 8, 6, 0, 0}; {6, −4, 4, −7, −5, 6, 4, −6, 8, 0, 0, 0}; {4, −3, 7, 0, 5, 6, 7, −7, 6, 6, 0, 0}; {1, 8, 8, 0, −5, 0, 8, 2, 2, 2, 0, 0}; {1, 8, 8, 0, −5, 0, 8, 2, 2, 1, 0, 0}; {4, −4, −5, 3, −7, 1, 3, −1, −4, −2, 0, 0}; {5, −2, 5, −5, 5, 7, 6, 3, −7, −7, 0, 0}; {5, −2, 5, −5, 5, 7, 6, 3, 8, 8, 0, 0}; {, −1, −7, 1, 7, 2, 4, 3, 2, 7, 8, 0, 0}; {0, 8, 0, −7, −3, −4, −3, −2, 8, 7, 0, 0}; {4, −5, −3, 6, 0, −4, 2, 6, 2, 0, 0, 0}; {7, −3, 3, 3, −4, 3, −3, −3, −5, 1, 0, 0}; {2, 6, −1, 3, −6, 5, 2, −7, 7, −1, 0, 0}; {4, −1, −7, −6, 1, −5, 0, 1, 6, −1, 0, 0}; {, −6, −1, 6, 5, −4, 4, −1, −3, −5, 1, 0, 0}; {, −2, 2, −5, 3, −5, −5, −4, −3, −7, 8, 0, 0}; {8, 0, 8, −3, 8, −7, 6, 4, −5, −5, 0, 0}; {8, 0, 8, −3, 8, −7, 6, 4, −6, −6, 0, 0}; {1, 7, −2, 7, 3, 6, 4, 1, −4, −5, 0, 0}; {6, 5, −2, −6, 8, −2, 5, 0, 5, −3, 0, 0}; {0, 8, 1, 1, 8, 1, 5, 6, 7, 0, 0, 0}; {, −4, 6, 6, −1, 0, 6, −1, −6, −1, −1, 0, 0}; {6, −4, −6, −1, −6, −4, 1, −7, −7, 5, 0, 0}; {, −3, −7, 0, −4, 6, −5, −2, 7, −7, 1, 0, 0}; {, −7, −1, 0, −7, 3, −2, 4, 8, 3, 1, 0, 0}; {7, 3, −6, 3, −5, −2, 0, −1, 5, 6, 0, 0}; {5, −3, 1, 7, −2, 8, 2, −4, −5, −4, 0, 0}; {, −6, 3, −5, 2, 0, 2, 2, −1, 6, 7, 0, 0}; {3, −4, 5, 0, 5, 6, 7, −6, 5, 5, 0, 0}; {, −1, 7, −7, 0, 4, −1, 8, 0, −3, −2, 0, 0}; {5, −3, −2, 6, 4, −6, 1, −4, 0, 0, 0, 0}; {, −2, 1, 7, −1, 0, −5, 4, −5, 6, 0, 0, 0}; {1, 1, −6, 6, 5, −4, 4, −1, 5, −2, 0, 0}; {, −5, 5, −2, −1, 6, −2, 3, 5, 5, −1, 0, 0}; {7, 0, −7, 2, 8, 8, 8, −3, 2, 4, 0, 0}; {8, 0, −6, −1, 2, 4, −4, 5, 4, 1, 0, 0}; {, −7, 2, 2, −6, −3, 4, −3, 8, −2, −1, 0, 0}; {, −7, 2, 8, −2, 8, −7, 8, 5, −7, −7, 0, 0}; {, −2, −3, 8, 8, −1, 6, −3, 6, −3, −4, 0, 0}; {, −1, 7, −1, 5, 6, 3, 3, 3, 8, 8, 0, 0}; {, −7, −1, −7, 1, 2, 5, 0, 1, 7, 5, 0, 0}; {, −4, 3, −5, −5, 5, −2, 8, −7, −7, 0, 0, 0}; {, −6, 4, −3, −3, 5, −1, 2, 3, 6, −1, 0, 0}; {5, −3, −2, 7, 4, −7, 2, −3, 0, 0, 0, 0}; {0, 8, −1, 8, 3, 3, 4, 2, 6, 8, 0, 0}; {3, −3, −5, 2, 6, −6, 3, −3, 0, −2, 0, 0}; {, −4, −1, 7, −4, 0, −5, 5, −4, 8, 1, 0, 0}; {6, 0, −6, −5, 3, −4, 1, 3, 4, −1, 0, 0}; {, −6, 4, −3, 4, −1, 1, 1, 1, 6, 7, 0, 0}; {5, −1, −7, −6, 1, −6, 1, 2, 4, −2, 0, 0}; {0, 8, 7, −2, −1,

−7, 1, 6, 1, 1, 0, 0}; {4, −4, −4, 5, 3, −6, 2, −5, 0, 0, 0, 0}; {, −4, 5, 5, −2, 0, 6, −1, −6, −2, −2, 0, 0}; {4, 0, 8, −2, 7, −4, 1, 2, −3, −4, 0, 0}; {2, −7, −6, 3, −2, −6, 1, 5, 2, 0, 0, 0}; {5, 5, 1, 2, −6, 1, −7, 3, −5, −5, 0, 0}; {, −2, 7, 6, −2, 1, 7, −1, −6, −2, −2, 0, 0}; {, −3, 7, −1, 6, 0, 2, 3, 1, 7, 8, 0, 0}; {, −3, 7, −1, 6, 0, 2, 3, 1, 6, 7, 0, 0}; {4, −4, 4, −6, 6, 6, 5, 3, −7, −6, 0, 0}; {, −4, 1, 8, 7, −2, 5, 0, −2, −5, 1, 0, 0}; {6, 2, −5, 5, 2, 6, −5, 5, 8, −1, 0, 0}; {, −3, 7, −2, 7, −3, −6, −5, −1, 5, 6, 0, 0}; {, −7, −1, −2, 5, 3, −3, 4, 8, 2, 2, 0, 0}; {4, −1, −4, 4, −4, −1, 8, −5, −7, −2, 0, 0}; {5, −2, 6, 6, −5, 3, 8, 7, 7, 0, 0, 0}; {1, −6, −7, 0, 4, 8, 1, −4, −1, −1, 0, 0}; {, −6, 4, −3, −2, 6, −2, 2, 4, 6, 0, 0, 0}; {6, 0, 1, −6, −4, 3, −5, 7, −3, −3, 0, 0}; {, −5, 2, −5, 3, −2, 1, 2, −2, −6, −7, 0, 0}; {1, −4, 6, 7, 0, 8, −1, 0, 4, −1, 0, 0}; {, −1, 7, −1, −1, 8, −1, −5, −6, −7, 0, 0, 0}; {, −1, 3, −2, 8, −3, 4, 6, 0, −2, −5, 0, 0}; {, −1, 5, −2, 6, 0, 4, 4, −1, −6, −7, 0, 0}; {8, −1, −2, 6, 0, 4, −5, 5, 2, 2, 0, 0}; {, −7, 1, −1, 6, 8, −3, 4, −2, 1, 0, 0, 0}; {4, −1, 8, −7, 2, −5, 0, 2, 5, −1, 0, 0}; {5, −3, 5, 1, 6, 5, −7, −5, 5, 5, 0, 0}; {, −7, 1, 6, −4, 4, 0, −3, −6, −6, −4, 0, 0}; {4, −7, 0, 7, −6, 6, 2, −7, 6, −1, 0, 0}; {7, 0, 0, 7, −6, 4, −4, 3, −1, −1, 0, 0}; {5, −1, −4, 4, −4, −1, −6, −6, −7, −3, 0, 0}; {1, −5, 2, −5, −1, −4, −4, 0, 8, 8, 0, 0}; {, −7, 6, −3, 6, −7, 3, −6, 8, 7, −7, 0, 0}; {, −6, 0, 6, −1, −7, −5, −7, 4, −1, −4, 0, 0}; {3, −5, −5, 3, 6, 2, −5, 0, −3, −1, 0, 0}; {5, −5, 2, 2, −6, 1, −3, −4, −6, 0, 0, 0}; {, −5, 2, −7, −6, 3, −4, 8, −7, 7, −2, 0, 0}; {6, −6, 2, 8, −4, 7, 2, −7, 6, −1, 0, 0}; {3, 8, 7, −3, 7, −5, 0, −7, 6, 4, 0, 0}; {3, 4, 8, −2, −3, 7, −1, 3, −3, 4, 0, 0}; {6, −2, 6, −4, −7, 8, 6, 4, −6, −6, 0, 0}; {, −1, 4, −4, 2, 0, 5, 3, −7, 7, 4, 0, 0}; {6, 1, −1, 6, −3, 1, −4, 8, −4, −1, 0, 0}; {0, −4, −7, 2, 8, −4, 4, −7, 7, −3, 0, 0}; {, −7, 2, 3, −4, 0, −3, 6, −3, −5, −2, 0, 0}; {, −7, 2, 3, −4, 0, −3, 6, −3, −5, −3, 0, 0}; {, −5, 5, 5, −2, 2, −3, 6, −3, −4, −2, 0, 0}; {, −5, 3, 3, −6, −4, 6, −2, 4, 0, 0, 0, 0}; {, −7, 2, −6, 4, −7, 8, −6, −4, 6, 6, 0, 0}; {8, −1, 5, 5, −4, 3, −2, −4, −6, 1, 0, 0}; {6, −1, −7, 3, −7, −1, 4, 7, 6, 6, 0, 0}; {2, −7, 2, −7, 6, 6, 5, 2, 8, −7, 0, 0}; {, −3, 6, 6, −1, 2, −1, 8, −2, −4, −3, 0, 0}; {1, 6, −1, 5, −2, −4, 0, −1, 7, 5, 0, 0}; {8, −3, 7, −2, 7, 7, −5, −6, 8, 7, 0, 0}; {4, −5, 4, 1, 6, 5, 8, −5, 6, 5, 0, 0}; {7, −3, −3, 5, −1, 3, −5, 5, 2, 1, 0, 0}; {5, −2, 7, 6, −3, 4, 8, 7, −7, 2, 0, 0}; {5, 2, −6, 5, 1, 6, −6, 5, 8, 0, 0, 0}; {0, −7, −1, 6, −2, −4, −7, 7, −7, −6, 0, 0}; {, −1, −6, 1, 8, 1, 4, 5, 2, 7, 7, 0, 0}; {4, −2, −1, −7, −3, −6, 4, −5, −6, −4, 0, 0}; {8, 0, 8, 7, −2, 5, −7, 8, −7, 1, 0, 0}; {3, −5, 4, 5, −2, 8, 5, 6, 6, −2, 0, 0}; {, −7, 6, −1, 1, −3, 4, −5, 1, 1, −4, 0, 0}; {, −1, −7, 5, −5, 2, 5, 0, −4, −3, −1, 0, 0}; {, −4, 5, 5, −3, 1, 5, −1, −6, −2, −2, 0, 0}; {8, 0, 0, −6, 6, −4, 5, −3, 0, 1, 0, 0}; {6, −4, 3, 3, −5, 1, −2, −3, −6, 1, 0, 0}; {8, 2, −4, −7, −1, 0, 3, 7, 2, 3, 0, 0}; {, −4, 6, −1, −1, 6, −1, 4, 4, 6, 0, 0, 0}; {5, −5, 2, 8, −6, 7, 3, −6, 7, 0, 0, 0}; {2, −7, 0, −1, −7, 1, −5, −5, −7, 0, 0, 0}; {2, 6, −3, 5, 1, 7, 5, −7, 7, 5, 0, 0}; {4, −1, −3, 4, −5, 0, −6, 7, −4, −1, 0, 0}; {5, −3, −7, 2, 6, −5, 8, −5, 2, 3, 0, 0}; {3, −6, −7, 1, 0, −6, 2, 7, 1, 1, 0, 0}; {4, −4, 5, −6, 6, 7, 4, 3, −6, −6, 0, 0}; {, −7, 2, −7, 3, −3, 1, 2, −1, 5, 6, 0, 0}; {, −5, 1, −5, 3, −2, 2, 2, −1, 7, 7, 0, 0}; {2, 7, −4, 5, −3, −4, 3, 1, 5, 1, 0, 0}; {1, −4, −3, 5, −2, 4, 1, 4, 5, −7, 0, 0}; {7, 0, −7, −1, 2, −2, −2, 5, 5, −2, 0, 0}; {1, −7, −1, 3, −3, −3, −6, 7, −5, −5, 0, 0}; {5, −6, −2, 7, 0, −3, 2, 6, 4, 1, 0, 0}; {, −6, 2, 1, −7, 8, −2, 4, −2, 2, 0, 0, 0}; {1, 5, −4, 4, −3, −4, −1, −2, 6, 3, 0, 0}; {, −6, 8, 3, −5, −5, 1, 8, 2, 8, −1, 0, 0}; {1, −6, 2, 2, −7, 2, 5, 6, 7, 0, 0, 0}; {5, 7, −1, −7, −5, 5, −1, 5, 2, −3, 0, 0}; {5, −5, 2, 2, −6, 3, −3, −4, −6, 0, 0, 0}; {, −3, 6, −2, 7, −4, −6, −5, −2, 7, 7, 0, 0}; {7, 1, −7, 0, 7, 8, 6, 5, 8, 8, 0, 0}; {, −5, 4, −5, −1, −7, −6, 8, 5, −6, −6, 0, 0}; {8, −2, 5, 4, −3, 4, −2, −3, −5, 1, 0, 0}; {8, 7, 3, 4, −4, 3, −6, 4, −5, −5, 0, 0}; {3, 7, −3, 3, 2, −2, −7, −2, −6, 1, 0, 0}; {5, −5, −7, −1, −7, −4, 1, −6, 6, 5, 0, 0}; {2, −5, 2, −7, 3, 5, 5, 2, 8, 8, 0, 0}; {5, −2, 0, −7, −3, −7, 4, −4, −6, −2, 0, 0}; {6, 3, −4, 4, 2, −7, −2, 7, −5, 1, 0, 0}; {0, 4, 7, −3, −6, 5, −1, 3, −2, 3, 0, 0}; {6, −2, −3, 7, 4, −5, 3, −5, 0, 0, 0, 0}; {2, 8, −4, 5, −2, −4, 1, 4, 4, 2, 0, 0}; {7, 0, −6, −5, 2, −5, 1, 3, 4, −2, 0, 0}; {, −4, 6, −4, 3, −6, −5, 8, 6, −6, −6, 0, 0}; {, −4, 2, −5, 0, −5, −5, 8, 5, −4, −5, 0, 0}; {0, −7, 8, 0, 3, 8, 1, −5, −1, −2, 0, 0}; {1, −7, −2, −7, 4, 2, −7, −2, −1, 0, 0, 0}; {, −7, −2, 6, −2, −4, 2, 1, 6, 6, 3, 0, 0}; {0, −6, 1, 8, 1, 3, 4, 2, 7, 7, 0, 0}; {, −4, 2, 1, 7, 6, −1, 6, −7, 4, 3, 0, 0}; {, −5, 1, −5, 3, 2, −6, −7, 1, 3, 0, 0, 0}; {6, 0, −7, −6, 3, −5, 0, 2, 4, −2, 0, 0}; {4, −6, −5, 5, −2, −4, 2, 6, 3, 0, 0, 0}; {8, 2, −1, 8, −2, 5, 3, 6, −3, 1, 0, 0}; {6, 2, 4, −1, 3, −6, 4, 3, −7, −5, 0, 0}; {, −2, −7, 1, −7, 1, 3, 3, 2, 6, 7, 0, 0}; {7, −3, 6, −4, 6, 8, 7, 3, −5, −6, 0, 0}; {8, −3, 6, −1, 8, 7, −5, −4, 4, 3, 0, 0}; {3, −3, 4, −6, 3, 5, 5, 3, 8, 8, 0, 0}; {1, −6, 2, −7, 3, 5, 4, 2, −7, −7, 0, 0}; {, −7, 3, 3, −4, −2, 4, −3, −7, −3, −3, 0, 0}; {8, −4, 3, 7, 5, −6, 5, −4, −7, 5, 0, 0}; {, −7, −1, 1, −6, 3, −1, 4, 7, 4, 1, 0, 0}; {3, 8, −5, 5, −2, −5, 1, 6, 3, 0, 0, 0}; {6, −1, 0, −6, −5, 2, −5, 7, −4, −2, 0, 0}; {, −6, 2, −7, 3, −1, 2, 2, −1, −6, −6, 0, 0}; {8, −4, 4, −6, −3, −7, 3, −6, 7, 0, 0, 0}; {7, −1, −1, 7, 5, −4, 4, −3, 1, 0, 0, 0}; {0, −2, 6, 1, −2, 4, −6, 4, 8, 0, 0, 0}; {7, −1, 8, 3, 8, 7, −7, −4, 6, 6, 0, 0}; {, −3, 4, 7, −1, 8, 3, 8, 7, 8, 7, 0, 0}; {4, −6, 3, −6, 4, 6, 6, 1, −5, −6, 0, 0}; {, −5, 5, 4, −2, −1, 6, −2, −7, −2, −2, 0, 0}; {6, −3, 3, 3, −4, 3, −3, −4, −5, 1, 0, 0}; {2, 7, 6, −4, 6, −6, 0, −7, 6, 4, 0, 0}; {, −3, 6, 5, −4, 1, 6, −1, −6, −2, −1, 0, 0}; {7, −6, 3, 8, −3, 7, 3, −6, 7, −1, 0, 0}; {, −5, 1, 7, 0, −7, −6, −6, 3, 0, −4, 0, 0}; {0, 8, −1, −1, 8, −1, −5, −6, −7, 0, 0, 0}; {, −1, 8, −1, 8, 1, 3, 4, 2, 6, 7, 0, 0}; {, −1, −7, 3, −1, 5, −5, 2, 5, 4, 5, 0, 0}; {0, −7, 0, 8, 3, 4, 4, 2, 7, 8, 0, 0}; {7, −1, 3, −6, 2, −1, −4, −6, −5, −4, 0, 0}; {4, −5, 2, 8, −7, 5, 3, −7, 7, −1, 0, 0}; {4, −4, 3, 8, −7, 4, 4, −7, 7, −1, 0, 0}; {, −1, 8, −7, 1, 4, 0, −7, 0, −3, −2, 0, 0}; {, −2, 2, −5, 3, −5, −6, −3, −4, −7, 8, 0, 0}; {, −3, 6, −2, 8, −4, −5, −5, −2, 6, 7, 0, 0}; {8, −4, 4, −6, −3, 8, 3, −6, 7, −1, 0, 0}; {5, 0, −6, −6, 2, −5, 1, 2, 5, −1, 0, 0}; {4, −4, −6, 3, −2, 3, −6, 2, 3, 3, 0, 0}; {8, −1, −6, −1, 2, 4, −4, 5, 4, 2, 0, 0}; {8, 2, −6, 2, −3, 0, 1, 0, 5, 6, 0, 0}; {5, −5, 2, −6, 5, 7, 7, 2, −2, −5, 0, 0}; {5, −5, 2, −6, 5, 7, 7, 2, −5, −6, 0, 0}; {2, −5, −5, 4, 2, −7, 1, −5, −1, −1, 0, 0}; {7, 0, −1, 7, −6, 4, −3, 2, −2, −1, 0, 0}; {6, −4, 3, 3, −6, 3, −2, −3, −6, 0, 0, 0}; {, −3, 6, −2, 8, −4, −6, −5, −1, 7, 7, 0, 0}; {2, 1, −4, 5, 6, −4, 4, −1, 6, −2, 0, 0}; {, −1, 8, 8, 1, 4, 0, −7, −1, −3, −2, 0, 0}; {, −1, 8, 8, 1, 4, 0, −7, −1, −4, −3, 0, 0}; {1, 8, 1, 8, 6, 5, 4, 2, 8, −6, 0, 0}; {2, 3, −4, 0, 7, 3, 7, 3, −2, −5, 0, 0}; {8, 2, −5, 2, −3, −1, 1, 0, 5, 7, 0, 0}; {, −4, 2, 2, −6, 4, −1, 5, 8, 4, 3, 0, 0}; {, −4, 2, 2, −6, 4, −1, 5, 8, 4, 2, 0, 0}; {0, 7, −2, −1, 8, −1, −4, −6, 8, 0, 0, 0}; {, −4, 5, 5, −2, 0, 5, −1, −6, −2, −3, 0, 0}; {2, −6, 3, −7, 4, 5, 4, 2, −7, −7, 0, 0}; {, −6, 1, 6, 6, −3, 4, −1, −3, −5, 1, 0, 0}; {7, −3, 1, −6, 3, −1, 5, 5, 6, 4, 0, 0}; {, −7, −1, 6, 5, −4, 4, −1, −3, −5, 1, 0, 0}; {6, −1, 6, −3, 6, 7, 6, 4, −7, −7, 0, 0}; {8, −2, 4, −4, 7, −7, 8, 3, −1, −4, 0, 0}; {, −7, 1, 3, −5, 0, −5, 5, −3, −5, −3, 0, 0}; {8, −2, 4, −4, 7, −7, 8, 3, −3, −5, 0, 0}; {6, 1, −6, −6, 3, −4, 1, 2, 6, −1, 0, 0}; {3, −2, 8, −7, 0, −6, 0, 1, 4, −2, 0, 0}; {, −6, 4, −3, 4, −2, 1, 2, 1, 6, 7, 0, 0}; {7, −2, 6, 1, 1, −6, −2, −3, −6, −4, 0, 0}; {0, 5, 6, −2, 7, 2, 7, −5, 5, 1, 0, 0}; {, −7, 1, 1, −7, −4, 4, −4, 7, −2, 0, 0, 0}; {, −4, 8, 1, 8, 5, 4, −3, −1, 8, −3, 0, 0}; {2, 7, 8, 0, 8, 3, 8, −5, 6, 2, 0, 0}; {, −2, 7, 7, 0, 1, 7, −1, −6, −1, −1, 0, 0}; {7, −3, 4, −1, 3, −5, −6, 2, −1, −3, 0, 0}; {, −7, −3, 6, −4, 6, −7, 8, 3, −5, −6, 0, 0}; {, −3, 6, −6, 3, 8, 5, 0, −7, 8, −2, 0, 0}; {4, −1, 7, 1, 7, 6, 7, −4, 3, 5, 0, 0}; {, −6, −1, −1, 7, −2, −7, −4, −5, −6, 6, 0, 0}; {4, −4, 2, 2, −5, 2, −4, −5, −6, 1, 0, 0}; {8, −2, 4, −3, 7, −7, 8, 3, −1, −4, 0, 0}; {5, 5, 1, 2, −6, 1, −6, 3, −5, −5, 0, 0}; {, −1, 8, −5, 4, −7, 6, 1, −6, 8, −3, 0, 0}; {, −4, 3, 4, −4, −7, −3, 5, 0, 1, 2, 0, 0}; {7, −4, 4, −5, −5, 1, 0, 6, 5, 3, 0, 0}; {, −3, 8, −1, 8, −1, 2, 2, 1, 6, 7, 0, 0}; {7, −5, 5, −5, 5, −7, 7, 2, −6, −7, 0, 0}; {, −4, −7, 3, −3, −4, 1, 7, 2, 6, −2, 0, 0}; {, −1, 2, −6, 0, 1,

−4, 6, −4, 8, 0, 0, 0}; {, −2, −7, −6, 4, 8, −2, 7, 6, −5, −3, 0, 0}; {, −3, 5, −3, 5, 0, 3, 3, 0, 7, 7, 0, 0}; {, −5, 3, −3, −3, 5, −1, 3, 4, 7, 0, 0, 0}; {1, 7, −6, 4, −2, −6, 0, 5, 2, 0, 0, 0}; {5, −4, −2, 5, 1, −5, 3, 7, 2, 0, 0, 0}; {5, 2, −7, 5, 0, 6, −5, 5, 8, 0, 0, 0}; {, −6, 0, −7, 0, −6, −7, −4, −4, 7, 7, 0, 0}; {1, −6, 3, 2, −6, 1, 6, 6, 7, 0, 0, 0}; {, −6, 2, −5, 5, −7, 8, −6, −4, 7, 7, 0, 0}; {5, −5, 2, 0, −6, 1, −3, −5, −6, 0, 0, 0}; {, −2, 5, 1, −6, −4, 4, 7, 0, −1, −2, 0, 0}; {, −3, 2, −5, 1, 6, 3, 0, 7, 5, −1, 0, 0}; {, −4, 3, −6, −1, −3, −6, −7, 6, −5, −6, 0, 0}; {0, 7, −2, −2, 8, −1, −6, −6, −7, −1, 0, 0}; {8, −5, 7, −6, 6, −3, 3, 0, −6, 7, 0, 0}; {, −1, 2, −7, −1, 2, −4, 7, −3, −7, 1, 0, 0}; {7, −1, 3, −5, 2, −1, −3, −6, −6, −4, 0, 0}; {, −4, 5, −7, 0, 8, 3, −2, −7, −6, −5, 0, 0}; {5, 7, −3, 4, 4, −1, 8, −2, 8, 1, 0, 0}; {, −2, 3, −7, 8, 1, 7, 1, −1, −4, 2, 0, 0}; {1, −6, 8, −2, 4, 7, 0, −5, −1, 1, 0, 0}; {5, −4, −6, 3, −3, 1, −7, 3, 3, 0, 0, 0}; {2, −6, 5, −6, −2, 0, −7, 3, 2, 1, 0, 0}; {0, −5, 1, −7, 1, 4, 4, 2, 7, 7, 0, 0}; {2, −5, 3, −7, 4, 5, 4, 3, 8, −7, 0, 0}; {, −7, 5, −5, 5, −5, 7, −7, −2, 6, 7, 0, 0}; {, −2, 3, 3, −7, 3, 8, −2, 7, 4, 3, 0, 0}; {, −4, −5, 3, −3, −4, 2, −7, 3, 8, 0, 0, 0}; {6, 1, −7, 1, −5, −2, 0, −1, 5, 6, 0, 0}; {0, −7, 0, 8, 2, 3, 4, 2, 7, 8, 0, 0}; {, −1, 7, −2, 2, −4, −3, −6, 7, −5, −5, 0, 0}; {, −1, 5, −6, −7, 1, 7, 1, −1, −4, 2, 0, 0}; {, −3, 1, −7, −3, 1, −4, 7, −5, 8, 0, 0, 0}; {5, −2, −3, 7, 4, −6, 3, −4, 0, 0, 0, 0}; {, −3, 7, −2, 6, 0, 2, 3, 1, 6, 7, 0, 0}; {5, −4, −5, 3, −2, 3, −6, 3, 4, 3, 0, 0}; {0, −7, 2, −2, 4, 4, 6, −6, 3, 4, 0, 0}; {5, 3, −3, 8, 7, −3, 4, 0, 5, −2, 0, 0}; {0, 6, −1, 7, 6, −3, −3, 3, 4, 2, 0, 0}; {7, −1, 6, 6, −3, 5, 7, 8, −7, 1, 0, 0}; {, −5, 3, −6, −5, 4, −4, 8, 8, 7, −2, 0, 0}; {7, −1, 7, 8, 1, −5, 6, 7, 7, −1, 0, 0}; {, −7, −2, 3, −5, −2, −6, 5, −4, −7, 1, 0, 0}; {, −7, 3, −5, 3, −1, 1, 1, 0, 6, 7, 0, 0}; {, −7, −1, −1, 5, 1, 5, −4, 5, 4, 2, 0, 0}; {, −1, 3, −5, 3, −1, 5, 4, 8, 7, 5, 0, 0}; {, −6, 2, 2, −6, 8, −3, 5, −1, 1, 1, 0, 0}; {, −7, 2, −6, 3, −3, 0, 1, 0, 5, 6, 0, 0}; {, −2, 3, 8, 0, −6, 2, −3, −4, −5, −6, 0, 0}; {1, −6, 0, −7, 2, 4, 5, 2, 7, 7, 0, 0}; {7, 1, 0, 7, −3, 2, −4, 8, −3, −1, 0, 0}; {4, −5, 1, −6, 5, 8, 6, 2, −4, −5, 0, 0}; {, −1, −7, −2, 5, −4, −4, −7, 7, −6, −5, 0, 0}; {, −1, 7, 8, 1, −3, 8, −1, 5, 0, 0, 0, 0}; {, −5, 5, −2, −2, 6, −1, 3, 4, 6, 0, 0, 0}; {5, −2, 3, −5, 3, −1, −5, 7, −7, −6, 0, 0}; {1, −5, −3, 7, −7, −1, −7, 6, −5, −3, 0, 0}; {1, −5, −3, 7, −7, −1, −7, 6, −5, −4, 0, 0}; {0, −7, 2, 2, −7, 1, 5, 6, 7, 1, 0, 0}; {0, −7, 2, 2, −7, 1, 5, 6, 7, 0, 0, 0}; {, −6, −2, 4, −5, 7, −5, −7, −4, −7, 5, 0, 0}; {, −5, 4, −4, 8, −5, 2, −7, −7, 7, 8, 0, 0}; {, −3, 7, 1, −3, 4, −6, 0, 4, 4, 4, 0, 0}; {4, −4, 4, −6, 6, 7, 5, 3, −7, −7, 0, 0}; {4, −6, 1, 1, −6, 1, −3, −5, −6, 0, 0, 0}; {, −4, 3, −6, −5, 5, −3, −7, 8, 8, −1, 0, 0}; {, −1, −5, 4, −6, 4, −7, −1, 1, −4, −4, 0, 0}; {, −2, 7, −1, −5, 3, 3, 4, −5, −1, 3, 0, 0}; {, −4, −6, 4, −2, −4, 1, 7, 2, 6, −2, 0, 0}; {0, −3, 6, 0, −2, 4, −6, 4, 8, 0, 0, 0}; {8, −1, 5, 5, −4, 4, −2, −3, −6, 1, 0, 0}; {6, −5, −6, 0, −6, 4, −6, −5, 6, 4, 0, 0}; {, −2, 3, −7, 8, −1, 6, 1, −2, −4, 2, 0, 0}; {, −4, 4, −4, −4, 5, −3, −6, −7, 8, 0, 0, 0}; {4, −3, −4, 6, 3, −6, 3, −6, 0, 0, 0, 0}; {6, −5, 4, −2, 2, −7, −7, 2, 0, −3, 0, 0}; {, −7, 3, −6, 0, 8, −7, 8, 6, −7, −7, 0, 0}; {, −2, 6, −2, 6, 3, 3, 3, 2, 7, −7, 0, 0}; {2, −6, −1, 6, −1, −4, −6, 8, −7, −5, 0, 0}; {1, 8, 0, −4, 0, 8, 8, 1, −2, −3, 0, 0}; {, −4, 7, −1, 6, −1, 1, 3, 1, 6, 7, 0, 0}; {0, −7, −7, 2, 2, 8, 0, −5, −1, −1, 0, 0}; {0, −7, −7, 2, 2, 8, 0, −5, 0, −1, 0, 0}; {0, −7, −7, 2, 2, 8, 0, −5, −1, −2, 0, 0}; {, −5, 3, −3, 6, −5, −7, −6, −3, 8, 8, 0, 0}; {, −5, 3, −3, 6, −5, −7, −6, −3, 7, 7, 0, 0}; {, −1, 7, 1, 1, 8, 0, 5, 6, 7, 0, 0, 0}; {, −6, 4, −3, 7, 5, −7, −4, 6, 8, 0, 0, 0}; {2, 7, −7, 1, −7, 4, −7, −6, 6, 2, 0, 0}; {, −7, 4, −4, 5, −5, 7, −7, −2, 5, 6, 0, 0}; {1, 7, 6, −2, 7, 2, 7, −6, 5, 3, 0, 0}; {1, −4, 2, −6, 2, 5, 4, 2, 7, 7, 0, 0}; {0, 8, 6, −2, −2, −7, 1, 5, 1, 0, 0, 0}; {7, 1, −6, 1, −4, −1, 1, −1, 5, 6, 0, 0}; {, −5, 3, 3, −6, −4, 6, −2, 5, 0, 0, 0, 0}; {, −1, −7, 3, 3, −6, −6, 0, 5, 0, 1, 0, 0}; {5, −2, −3, 5, 6, −5, 3, −3, 1, −1, 0, 0}; {, −3, 0, 8, −2, 0, −5, 5, −5, 8, 0, 0, 0}; {8, −1, 4, 4, −3, 4, −2, −3, −6, 1, 0, 0}; {, −7, −2, 4, −3, 8, −7, −7, 3, −1, −4, 0, 0}; {1, 4,

−5, 1, 2, −3, 8, −3, −7, 1, 0, 0}; {4, −3, 5, 5, −5, 3, 7, 7, 8, 1, 0, 0}; {4, −6, 4, −4, 6, 6, −7, −6, 6, 6, 0, 0}; {, −3, 2, −7, 8, −2, 6, 1, −2, −4, 2, 0, 0}; {7, 4, 2, −5, 3, 8, 0, 6, 6, −4, 0, 0}; {5, −4, −3, 6, 0, −4, 2, 7, 2, 0, 0, 0}; {6, 1, −5, −5, 3, −4, 1, 3, 5, −1, 0, 0}; {6, 3, −5, 4, 2, 8, −3, 6, −6, 1, 0, 0}; {0, −7, −7, 2, 1, 8, 0, −6, −1, −1, 0, 0}; {, −7, 5, 0, 1, −5, 4, −5, −3, 1, −3, 0, 0}; {, −5, −3, 6, −1, 5, −5, −6, 3, 1, −3, 0, 0}; {, −4, 4, −7, 0, 8, 3, −2, −7, −7, −5, 0, 0}; {2, −3, 6, −2, 8, −4, −1, −1, 3, 5, 0, 0}; {0, 6, −2, −2, 6, −1, −6, −6, 8, −1, 0, 0}; {3, −3, 7, 8, 0, −6, 0, 1, 4, −1, 0, 0}; {0, 4, 2, 6, 0, 1, 6, −3, −7, 6, 0, 0}; {, −5, 1, −7, −1, −6, −6, 8, 5, −4, −5, 0, 0}; {, −2, 3, −5, 2, −1, 4, 5, −6, 6, 3, 0, 0}; {0, 8, −4, 2, 8, 4, 0, −3, −4, −2, 0, 0}; {, −4, 5, −2, −1, 5, −2, 4, 5, 5, −1, 0, 0}; {4, 2, −5, 3, 1, 7, −3, 6, −6, 1, 0, 0}; {5, −3, 4, −5, 5, 6, 6, 3, −7, −7, 0, 0}; {5, −5, −4, 3, −5, 7, −4, −7, −6, 4, 0, 0}; {, −5, 2, −6, −1, −6, −6, 7, 5, −5, −5, 0, 0}; {, −5, 5, 7, 1, 8, 3, −1, 8, −5, −2, 0, 0}; {1, 7, 2, −5, −4, 1, −4, 0, 4, 4, 0, 0}; {, −6, −1, −7, −1, −4, 2, 3, −6, 6, 3, 0, 0}; {, −6, 4, 1, 8, −1, 2, −3, −6, −4, −1, 0, 0}; {8, −1, 7, −1, 2, 0, −1, 1, −6, −7, 0, 0}; {5, −5, −2, 7, 0, −3, 3, 6, 3, 0, 0, 0}; {4, −5, 1, −6, 4, 7, 8, 1, −2, −5, 0, 0}; {, −3, 6, 1, −5, 1, 3, 5, 7, 5, 5, 0, 0}; {0, 4, −4, 4, −4, −5, −1, −2, 6, 4, 0, 0}; {0, 4, −4, 4, −4, −5, −1, −2, 6, 3, 0, 0}; {, −3, 2, 3, −4, 4, 0, 6, −7, 5, 1, 0, 0}; {, −4, 3, 1, 8, 4, 7, −4, 5, 7, 4, 0, 0}; {1, −7, 2, −1, 5, 4, 7, −6, 5, 5, 0, 0}; {5, −4, 2, 6, 0, −1, −4, −7, −4, −4, 0, 0}; {7, 2, −5, 5, 2, 7, −5, 5, 8, 0, 0, 0}; {, −1, 7, 1, −3, 3, 3, 6, −7, 5, 5, 0, 0}; {, −1, −6, 5, 5, −1, 7, −2, −1, 3, −2, 0, 0}; {, −2, 6, 5, −3, −3, 8, 0, 5, 0, 0, 0, 0}; {1, 6, 0, 7, 1, 5, 5, 0, −7, 8, 0, 0}; {, −3, 3, −3, 4, 4, 7, 2, 3, 8, 6, 0, 0}; {, −3, 3, −3, −7, −2, 6, 6, 0, −4, −3, 0, 0}; {7, −2, 4, −4, 6, 8, 8, 2, −2, −5, 0, 0}; {4, 8, 0, 6, 2, 7, 7, −4, 8, 4, 0, 0}; {1, −3, −3, 6, −1, 5, 0, 4, 5, −5, 0, 0}; {, −2, 3, −4, 3, −4, −6, −3, −3, −7, 8, 0, 0}; {, −7, −2, −1, 5, 0, 5, −4, 5, 3, 3, 0, 0}; {2, −5, 4, 3, −6, 2, 6, 7, 8, 1, 0, 0}; {, −2, 7, 7, −1, 2, 6, −1, −5, −2, −1, 0, 0}; {, −4, 4, −5, −6, 1, 8, −6, −7, −6, 2, 0, 0}; {5, −5, 5, −3, 7, 6, −7, −5, 6, 6, 0, 0}; {, −6, 7, 0, 7, 4, −5, 0, 8, −3, 1, 0, 0}; {6, −2, 4, −2, −2, −7, −1, −4, −7, −5, 0, 0}; {, −6, −1, 7, −2, −3, 3, 1, 7, 6, 2, 0, 0}; {1, −6, −7, 1, 3, −7, 1, −5, −1, −2, 0, 0}; {, −1, 6, 6, −3, −2, 8, −1, 5, 0, 0, 0, 0}; {, −2, 7, −1, −7, −3, −5, −4, −1, 7, 7, 0, 0}; {4, −7, 6, −2, 6, 6, −4, 7, 8, 2, 0, 0}; {, −2, 7, −1, 8, −3, −5, −5, −1, 6, 7, 0, 0}; {3, −2, 7, 8, 2, −6, −1, 2, 4, −2, 0, 0}; {1, 8, −1, 7, 3, 5, 5, 0, −3, −6, 0, 0}; {, −2, −6, 3, −6, 7, −3, 1, −7, −3, 2, 0, 0}; {, −5, 5, −3, 6, −2, 1, 2, 1, 5, 6, 0, 0}; {6, −2, 8, 2, 8, 7, −7, −5, 6, 5, 0, 0}; {, −3, 7, 3, −6, 2, 3, −3, −2, −5, −1, 0, 0}; {, −5, 4, −2, −1, 6, −1, 3, 5, 6, 0, 0, 0}; {, −5, 5, −3, 5, −2, 1, 2, 0, 6, 6, 0, 0}; {, −3, 5, −3, 7, −4, −5, −5, −2, 7, 7, 0, 0}; {, −3, 5, −3, 7, −4, −5, −5, −2, 6, 6, 0, 0}; {, −3, 5, −3, 7, −4, −5, −5, −2, 5, 6, 0, 0}; {, −1, 4, −6, 2, −5, −4, −4, 5, 1, −3, 0, 0}; {, −5, 0, −7, 1, −7, 8, −4, −4, 7, 6, 0, 0}; {3, −5, 3, −5, −1, −4, −3, −1, −7, −7, 0, 0}; {2, −6, 3, −3, −1, 7, −5, −5, −7, −6, 0, 0}; {6, 0, −6, −5, 2, −5, 1, 2, 5, −1, 0, 0}; {6, 0, −6, −5, 2, −5, 1, 2, 4, −2, 0, 0}; {6, 1, 4, −1, 2, −7, 4, 3, 8, −5, 0, 0}; {6, 1, 4, −1, 2, −7, 4, 3, 8, −6, 0, 0}; {, −4, 2, 8, 7, −1, 5, 0, −2, −4, 1, 0, 0}; {, −7, −2, 1, −6, 2, −1, 4, 7, 5, 2, 0, 0}; {0, 4, −4, 4, −3, −5, −1, −2, 5, 4, 0, 0}; {5, −5, 2, −5, 6, 8, 6, 3, −3, −4, 0, 0}; {1, 6, −5, −5, 1, −7, 2, 1, −3, 2, 0, 0}; {0, 8, −2, 7, 7, −1, 2, 0, −4, −3, 0, 0}; {, −5, 3, −5, 5, −7, −7, −5, −4, 7, 6, 0, 0}; {, −6, 3, −3, −3, 5, −2, 3, 4, 7, 0, 0, 0}; {, −6, 3, −3, −3, 5, −2, 3, 4, 6, 0, 0, 0}; {2, 6, 2, 8, 1, 5, 6, 0, −7, 8, 0, 0}; {5, 0, −5, −4, −6, 0, −5, 1, 4, −6, 0, 0}; {6, 1, −6, 4, 2, 7, −5, 5, 8, 0, 0, 0}; {0, 7, −2, 5, 7, 4, 3, 3, −4, −6, 0, 0}; {1, −4, 7, −3, 5, 6, −2, 0, −4, 0, 0, 0}; {7, 0, 8, 0, 2, −6, −1, −3, −6, −4, 0, 0}; {2, −6, 8, 0, 3, −7, 0, −5, 0, 1, 0, 0}; {, −2, 4, −7, 8, 0, 7, 1, −1, −4, 2, 0, 0}; {, −4, 3, 7, −3, 5, 2, −1, −4, −4, −3, 0, 0}; {, −3, 6, 3, −5, −5, 0, 7, 0, 3, 0, 0, 0}; {6, 4, −4, 4, 2, 8, −2, 7, −5, 1, 0, 0}; {2, 6, −2,

5, −7, 5, 2, 8, 6, −1, 0, 0}; {, −2, 8, −1, 8, −3, −5, −5, −1, 7, 7, 0, 0}; {1, −5, 3, −7, 2, 5, 5, 3, 7, 8, 0, 0}; {5, −7, 2, −4, 1, −7, 8, 2, −1, −4, 0, 0}; {, −7, 2, 3, −3, −3, 4, −3, 8, −3, −2, 0, 0}; {7, 1, 8, 0, 6, 8, 7, 5, 8, 8, 0, 0}; {3, −4, 5, −3, −1, 8, −4, −5, −7, −6, 0, 0}; {, −6, −1, 8, −2, −4, 3, 0, 7, 7, 2, 0, 0}; {6, 8, −1, 5, 5, 0, −7, −2, −7, 1, 0, 0}; {0, 3, −6, 0, 2, −4, 6, −4, 8, 0, 0, 0}; {7, 0, 7, −2, 6, 8, 8, 5, 8, −7, 0, 0}; {, −4, 7, −2, 7, −1, 2, 2, 1, 6, 6, 0, 0}; {0, −5, 2, −3, 7, −5, −1, 8, −6, 1, 0, 0}; {, −1, 5, −2, 8, 1, 1, 7, 8, 1, 2, 0, 0}; {7, −3, −3, 4, −1, 3, −5, 4, 4, 3, 0, 0}; {7, −3, −3, 4, −1, 3, −5, 4, 4, 2, 0, 0}; {4, −5, −1, 5, −3, 7, 1, −4, −4, −4, 0, 0}; {8, 1, −5, −4, 3, −4, 2, 3, 5, −1, 0, 0}; {3, −5, −4, 4, 7, 2, −6, 0, −2, 1, 0, 0}; {, −5, 1, −6, 6, −5, 5, 5, −1, −4, −5, 0, 0}; {, −1, 1, 6, −4, −6, 5, −2, 2, −3, 3, 0, 0}; {5, −1, 6, −4, 5, 7, 7, 4, 8, 8, 0, 0}; {7, 1, −6, −6, 4, −4, 1, 2, 6, −1, 0, 0}; {, −5, 7, −1, 6, −1, 1, 2, 1, 5, 7, 0, 0}; {, −4, 1, 8, 0, −2, 4, 3, 7, 6, 4, 0, 0}; {, −2, 8, 0, 0, 8, 0, 4, 5, 7, 0, 0, 0}; {7, −1, −7, 2, 7, 7, 8, −5, 7, 6, 0, 0}; {4, −7, 1, 6, −5, 7, 3, −7, 7, 0, 0, 0}; {, −2, 7, 6, −2, 1, 7, −2, −6, −1, 0, 0, 0}; {7, −5, 2, −7, −4, 8, 4, −6, 7, 0, 0, 0}; {, −3, 3, −4, 5, 5, −4, −4, 2, 3, 0, 0, 0}; {, −6, 4, −4, 5, −5, −7, −7, −2, 3, 5, 0, 0}; {5, −3, 5, −4, 0, −2, −2, 0, −6, −7, 0, 0}; {, −5, −2, 4, −3, −1, −7, 2, −6, 6, −1, 0, 0}; {, −4, 5, −4, 5, −1, 2, 3, 1, 6, 7, 0, 0}; {, −7, −1, 0, 7, 2, −4, 4, 7, 2, 1, 0, 0}; {, −2, 6, 1, 6, −5, −3, 6, 2, 0, 1, 0, 0}; {8, 5, −2, 5, 4, −7, −1, 8, −4, 2, 0, 0}; {, −5, 2, −2, 7, −7, −2, −6, −3, 3, 3, 0, 0}; {, −7, 3, −7, 0, 8, −7, 7, 5, −7, −7, 0, 0}; {4, −1, 8, 2, 1, 6, −7, 4, 7, −1, 0, 0}; {, −4, 3, 4, −6, −4, 6, −2, 7, 1, 1, 0, 0}; {7, −3, 0, −7, 1, −1, 5, 3, 6, 1, 0, 0}; {6, 0, −6, −6, 3, −5, 1, 2, 6, −1, 0, 0}; {6, 0, −6, −6, 3, −5, 1, 2, 5, −1, 0, 0}; {, −3, 5, −1, −1, 6, −2, 4, 5, 6, −1, 0, 0}; {3, 7, −3, −4, 3, −7, 3, 0, −3, 2, 0, 0}; {, −7, −1, 1, −6, 2, 0, 6, 4, 6, 1, 0, 0}; {, −4, 4, −5, 2, −5, −6, 7, 6, −7, −6, 0, 0}; {6, 2, −6, 5, 1, 6, −5, 5, 8, 0, 0, 0}; {3, −5, 3, −6, 6, 7, 5, 3, −7, −7, 0, 0}; {, −6, 3, −4, 5, −7, −7, −7, −4, 7, 7, 0, 0}; {, −3, 2, 8, 7, −1, 6, 0, −2, −4, 2, 0, 0}; {, −3, 6, 4, −5, 1, 5, −1, −6, −2, 0, 0, 0}; {7, 0, −7, 3, 8, 7, −7, −4, 5, 5, 0, 0}; {3, −2, 8, −6, 0, −6, 0, 1, 5, −1, 0, 0}; {, −1, 8, 1, 1, 8, 0, 5, 5, 7, 0, 0, 0}; {, −7, −6, 0, 6, 7, 1, −6, −1, −6, 2, 0, 0}; {2, −7, 0, −1, −7, 0, −5, −5, −7, −1, 0, 0}; {, −5, −6, 5, 6, −2, 4, −5, 5, −3, −4, 0, 0}; {2, 6, 4, 7, 0, 2, 8, −1, −6, 6, 0, 0}; {, −3, 6, −1, 0, 7, −2, 4, 4, 6, 0, 0, 0}; {5, −3, 7, 2, 7, 6, 8, −5, 6, 6, 0, 0}; {0, 7, −7, 3, −3, −6, 0, 5, 1, −1, 0, 0}; {, −6, 7, 0, 7, 5, −5, 0, 8, −3, 2, 0, 0}; {, −3, 5, −2, 7, −4, −6, −5, −3, 8, 7, 0, 0}; {, −1, 6, 1, −6, −5, 0, −4, −1, 4, 4, 0, 0}; {, −3, 7, 7, 0, 3, −1, 8, −1, −4, −2, 0, 0}; {7, 1, −6, −6, 4, −4, 1, 3, 6, −1, 0, 0}; {, −2, 2, −5, 1, −2, 3, 4, −6, 7, 3, 0, 0}; {8, 0, −1, 7, 7, −4, 4, −2, 1, 0, 0, 0}; {, −4, 2, 6, 0, −6, 8, −2, 2, 2, 2, 0, 0}; {, −2, 8, −7, 2, 8, −3, 8, 6, −6, −4, 0, 0}; {4, 7, −3, 3, 4, −1, −7, −2, −6, 2, 0, 0}; {2, −6, 2, −7, 4, 5, 5, 3, 8, −7, 0, 0}; {5, −6, 1, −5, 5, 7, 7, 1, −1, −4, 0, 0}; {8, −2, 7, −1, 8, 8, −5, −5, 8, 7, 0, 0}; {, −1, 8, −2, −2, 8, 0, −6, −6, −7, 1, 0, 0}; {, −2, −7, 0, 7, 0, 3, 3, 2, 6, 7, 0, 0}; {, −4, 4, −4, 1, 6, 2, 1, 2, −4, −5, 0, 0}; {, −4, 4, 2, −5, 8, −1, 5, −3, 1, 0, 0, 0}; {, −4, 3, 1, 8, 4, 7, −4, 4, 7, 3, 0, 0}; {, −2, 2, 8, −1, 0, −5, 6, −4, 8, 0, 0, 0}; {6, −1, 7, −2, 2, −1, −1, 1, 6, 7, 0, 0}; {, −3, 7, −4, 5, 0, −7, 8, −3, −1, 3, 0, 0}; {, −4, −5, 6, 7, −1, 6, −4, 6, −2, −4, 0, 0}; {3, −6, 0, 0, −6, 1, −4, −5, −7, 0, 0, 0}; {, −7, −1, 5, 5, −3, 4, −2, −3, −5, 1, 0, 0}; {, −7, −1, 5, 5, −3, 4, −2, −3, −6, 1, 0, 0}; {, −7, 3, −4, −4, 5, −3, 2, 4, 6, −1, 0, 0}; {5, 0, −7, −7, 3, −5, 1, 2, 6, −1, 0, 0}; {, −4, 4, 3, −5, −7, −2, 5, −3, 2, 1, 0, 0}; {4, −1, 8, 2, 1, 6, −6, 4, 7, 0, 0, 0}; {4, 2, 8, 4, 0, 0, −7, −4, 5, −4, 0, 0}; {4, −3, −1, 8, −4, −7, 4, −5, −7, −4, 0, 0}; {6, −2, 6, 0, 1, −6, −2, −4, −6, −4, 0, 0}; {, −3, 2, 8, 7, 0, 6, 1, −2, −4, 2, 0, 0}; {6, −4, −1, 8, 1, −2, 3, 6, 4, 1, 0, 0}; {2, 7, 6, −4, 5, −7, 0, −7, 6, 3, 0, 0}; {1, −6, 3, 2, −6, 2, 6, 6, 8, 1, 0, 0}; {3, −4, 4, 3, −5, 2, 7, 7, 8, 0, 0, 0}; {4, −3, 4, −5, 4, 6, 6, 3, −7, −7, 0, 0}; {, −3, −1, 7, −2, 0, −6, 3, −6, 6, −1, 0, 0}; {0, 5, −5, −6, 1, 8, 2, 0, −3, 2, 0, 0}; {0, −6, 3, −3, 4, 4, 5, −5, 0, 3, 0, 0}; {, −1, 6, −3, −3, 7, −2, −6, −7, −7, −1, 0, 0}; {1, −5, 3, 3, −6, 2, 6, 6, 8, 1, 0, 0}; {8, 2, 6, −1, 5, 2, −2, 7, 7, −3, 0, 0}; {8, 2, 6, −1, 5, 2, −2, 7, 7, −4, 0, 0}; {8, 6, −1, −5, −7, −1, 5, 1, 5, −2, 0, 0}; {6, 7, −1, 4, 6, −1, 8, −2, −7, 1, 0, 0}; {1, −7, −1, −1, 8, 0, −5, −6, −7, 0, 0, 0}; {5, −3, 8, 1, −7, −2, 3, 8, 7, 6, 0, 0}; {, −4, −7, 7, −2, 7, −5, 2, −7, 7, −3, 0, 0}; {3, −5, 2, −2, −5, −6, 2, −7, −4, −2, 0, 0}; {0, 8, 3, −4, −3, 5, 8, 0, 0, −1, 0, 0}; {, −4, 7, −2, 7, −3, −7, −6, −1, 7, 8, 0, 0}; {, −4, 7, −2, 7, −3, −7, −6, −1, 6, 7, 0, 0}; {4, −4, 2, 5, −1, −1, −4, 8, −4, −5, 0, 0}; {1, 6, −4, 4, −3, −3, −4, 6, 2, −3, 0, 0}; {0, 7, −2, −2, 7, −1, −5, −6, −7, 0, 0, 0}; {0, 7, −2, −2, 7, −1, −5, −6, −7, −1, 0, 0}; {, −1, 7, −4, 2, −4, −4, −6, 7, −6, −6, 0, 0}; {6, −4, 2, −3, 7, 5, −5, 0, 0, 0, 0}; {, −1, 2, 6, −2, −6, −1, −4, −4, −5, 6, 0, 0}; {, −3, 6, 7, 0, 0, 6, −1, −6, −1, −1, 0, 0}; {, −3, 6, 7, 0, 0, 6, −1, −6, −2, −1, 0, 0}; {, −6, 0, 6, −1, 8, −6, −6, 2, −1, −5, 0, 0}; {8, 0, −1, 7, 7, −4, 3, −2, 1, 1, 0, 0}; {3, −5, −1, 6, −1, −3, −5, −7, −6, −4, 0, 0}; {3, −5, −1, 6, −1, −3, −5, −7, −6, −5, 0, 0}; {1, −7, 2, −6, −2, −4, −4, −2, −7, 8, 0, 0}; {, −4, 1, 3, −4, 4, 0, 5, −7, 5, 2, 0, 0}; {4, −7, −3, 4, 5, 0, −6, 0, −4, 2, 0, 0}; {8, −1, 6, −3, 7, 8, 7, 4, −7, −7, 0, 0}; {5, −3, 5, −6, 6, 7, 4, 3, −6, −5, 0, 0}; {2, −6, 1, −7, 5, 5, 5, 3, 8, −7, 0, 0}; {, −4, 4, 6, −1, −3, 5, −3, −7, −2, 0, 0, 0}; {5, −4, 2, −5, 5, 8, 7, 2, −3, −5, 0, 0}; {3, −3, 4, −6, 4, 6, 5, 3, 8, 8, 0, 0}; {1, −6, 5, −1, 5, −4, 2, 5, 5, 5, 0, 0}; {3, −5, 4, 3, −5, 3, 7, 7, −7, 1, 0, 0}; {3, −4, −4, 5, 3, −7, 2, −5, 0, 0, 0}; {, −1, 4, −6, −7, 0, 8, 1, 0, −4, 1, 0, 0}; {4, 6, −3, 2, 4, −1, −7, −2, −6, 2, 0, 0}; {, −1, −1, 6, −6, −5, 4, −4, 1, −5, 2, 0, 0}; {, −2, 7, 3, −5, 1, 3, −4, −3, −6, −1, 0, 0}; {, −7, 1, 8, −2, −7, −7, 7, 5, −6, −6, 0, 0}; {4, −7, 1, 7, 0, −2, 1, 0, 8, 6, 0, 0}; {2, −4, 4, −6, 3, 5, 5, 3, 7, 8, 0, 0}; {2, −5, 1, −7, 3, 5, 5, 3, 7, 8, 0, 0}; {, −2, 4, 7, −3, 7, 3, −7, 8, −7, 4, 0, 0}; {, −6, 1, 6, 6, −2, 5, −1, −2, −5, 2, 0, 0}; {1, −3, 7, 1, −2, 3, 8, 3, 6, −1, 0, 0}; {7, 1, −7, 3, −7, 8, 8, −3, 3, 5, 0, 0}; {, −1, 5, 0, −6, −1, 6, 7, 1, −2, −3, 0, 0}; {3, 7, −3, 3, 3, −2, −7, −2, −6, 1, 0, 0}; {, −1, 8, 1, 1, 8, 1, 5, 6, 7, 1, 0, 0}; {8, 1, −7, −2, 7, −7, 8, 5, −7, −7, 0, 0}; {, −2, 4, 7, 1, −5, 8, −1, 4, 1, −1, 0, 0}; {6, −7, 1, −7, −5, 6, 0, 8, 4, −2, 0, 0}; {, −7, 2, 6, −2, 7, −6, 8, 4, −7, −7, 0, 0}; {, −7, −1, 6, 5, −2, 4, −2, −3, −5, 0, 0, 0}; {8, −3, 6, −4, −5, 1, 0, 7, 5, 4, 0, 0}; {2, −6, 3, −5, −1, −3, −3, −1, −7, 8, 0, 0}; {4, −6, 1, 1, −7, 1, −4, −5, −6, 0, 0, 0}; {, −5, 4, 3, −6, 0, 4, −2, −7, −2, 0, 0, 0}; {0, 1, −3, −7, −4, 2, −6, −7, −1, −6, 0, 0}; {5, −2, 6, 5, −4, 3, 7, 8, 8, 1, 0, 0}; {, −6, −1, 5, 5, −2, 4, 0, −3, −5, 1, 0, 0}; {, −1, 6, −3, 6, 1, 4, 5, 0, −3, −5, 0, 0}; {1, −6, 3, 8, 3, 4, 5, 2, 8, −7, 0, 0}; {, −7, 0, −5, 1, 2, 6, −4, 4, 4, 1, 0, 0}; {0, −5, 5, 6, −1, 8, −2, 0, 3, −2, 0, 0}; {2, 6, 8, 0, 8, 3, 8, −5, 7, 3, 0, 0}; {2, 6, 8, 0, 8, 3, 8, −5, 6, 2, 0, 0}; {, −4, 4, 4, −4, −4, 7, −1, 4, 0, −1, 0, 0}; {, −5, 4, −3, 7, 2, 1, 1, 8, −4, 1, 0, 0}; {3, −5, −5, 4, 2, −6, 1, −6, −1, −1, 0, 0}; {6, 1, 6, −2, −1, −6, 0, −3, −7, −5, 0, 0}; {8, 1, −6, 3, −7, 8, −7, −4, 7, 7, 0, 0}; {6, −3, 6, 5, −4, 5, 8, 8, −7, 2, 0, 0}; {3, −5, 4, 3, −6, 3, 7, 7, 8, 1, 0, 0}; {7, −1, 7, 8, 2, −6, 7, 7, 7, −2, 0, 0}; {, −5, 5, −2, 8, 6, −6, −3, 6, −7, 1, 0, 0}; {2, −5, 2, 8, 5, 6, 5, 2, 8, 8, 0, 0}; {3, −7, 0, 0, 8, 0, −4, −5, −6, 0, 0, 0}; {, −7, 1, −6, −6, 3, −5, −7, 8, 7, −1, 0, 0}; {, −5, 0, 7, 6, −1, 5, 0, −3, −4, 1, 0, 0}; {, −4, 6, 4, −5, 0, 5, −3, −7, −3, 0, 0, 0}; {, −3, 5, 1, −7, −6, −1, −6, −2, 4, 3, 0, 0}; {7, 2, −7, 0, 7, 8, 6, 5, −7, 8, 0, 0}; {2, 7, 6, −4, −7, 2, 8, −5, 5, 3, 0, 0}; {6, −5, 4, −5, −6, 0, 0, 7, 4, 3, 0, 0}; {3, −5, 3, −6, 7, 7, 5, 3, −7, −7, 0, 0}; {, −4, 0, 8, 1, −6, −7, −3, −3, 4, 3, 0, 0}; {0, 7, −1, −7, −3, −4, −3, −2, 8, 7, 0, 0}; {, −3, 0, 7, −2, 0, −6, 5, −5, 7, 0, 0, 0}; {2, −6, 2, −3, −2, 7, −4, −5, −7, −5, 0, 0}; {, −1, 5, 4, −4, 6, 1, 6, −7, 5, 4, 0, 0}; {6, −2, 7, −2, 1, −2, −1, 1, 6, 6, 0, 0}; {2, −3, 3, −5, 2, 5, 4, 3, 7, 8, 0, 0}; {, −5, 4, −6, 0, −6, −6, 8, 6, −7, −6, 0, 0}; {, −6, 2, 8,

–1, –7, –7, 8, 6, –7, –6, 0, 0}; {0, 5, 5, –5, 6, 0, 7, –7, 4, 3, 0, 0}; {8, –1, 5, 5, –4, 4, –1, –3, –5, 1, 0, 0}; {, –5, 3, 3, –4, 8, –3, 5, –1, 1, 1, 0, 0}; {, –1, 8, 8, 1, 1, 7, 0, –5, –1, –2, 0, 0}; {2, –7, 1, –6, –3, –3, –2, –2, –7, 7, 0, 0}; {0, –4, 7, 0, –2, 3, –7, 2, 6, –1, 0, 0}; {1, 8, –7, 1, –4, 0, 8, 3, 0, 1, 0, 0}; {6, 0, 7, –3, 6, 7, 6, 4, 8, –7, 0, 0}; {, –4, 1, 7, 7, –1, 5, 0, –2, –5, 1, 0, 0}; {6, 0, 7, –4, 6, 8, 6, 4, 8, –7, 0, 0}; {3, 8, 1, 8, 2, 6, 5, 0, –5, –6, 0, 0}; {, –3, 4, –4, –4, 6, –2, –6, –7, –7, 0, 0, 0}; {, –7, 3, –4, 5, –4, 0, 2, 0, 4, 6, 0, 0}; {6, 4, –4, 4, 2, 8, –1, 7, –5, 2, 0, 0}; {3, –3, 4, –2, 0, 8, –3, –4, –7, –5, 0, 0}; {, –7, 3, –6, 4, –6, 8, –7, –3, 5, 6, 0, 0}; {, –3, 6, –1, –4, 2, 2, 5, –7, 3, 4, 0, 0}; {8, –2, 5, 4, –4, 3, –1, –4, –5, 1, 0, 0}; {4, –6, –4, 6, –1, –4, 2, 6, 3, 0, 0, 0}; {4, 7, 0, 5, –5, 6, 2, –7, 7, –1, 0, 0}; {2, –6, –6, 4, 1, –7, 1, –6, –1, 0, 0, 0}; {7, –1, 7, –4, 8, 8, 6, 4, –6, –6, 0, 0}; {7, –7, –4, 4, –1, 4, 0, –2, –3, 6, 0, 0}; {, –7, 1, 1, 8, –6, 5, –3, 3, –1, 0, 0, 0}; {6, –4, 3, 3, –6, 3, –3, –4, –6, 1, 0, 0}; {, –6, 3, –5, 4, –7, 8, –6, –4, 7, 7, 0, 0}; {2, –5, –6, 3, 4, –7, 2, –4, 0, –2, 0, 0}; {, –4, –1, 7, –4, 0, –5, 6, –5, 8, 0, 0, 0}; {3, 8, 6, –4, –7, 2, –7, –5, 5, 4, 0, 0}; {2, 5, –4, 1, 4, –2, 8, –2, –6, 1, 0, 0}; {, –7, –1, 5, 5, –4, 4, –1, –2, –5, 1, 0, 0}; {, –3, 4, –5, –5, 5, –3, –7, –7, 8, –1, 0, 0}; {, –3, 4, –5, –5, 5, –3, –7, –7, 7, –2, 0, 0}; {, –7, 3, 6, 0, 6, 3, –1, 7, 8, –4, 0, 0}; {6, 3, –4, 4, 2, 8, –2, 7, –5, 1, 0, 0}; {6, –2, 5, –4, 7, 8, 6, 4, –7, –7, 0, 0}; {, –7, 3, –5, 3, –3, 0, 2, 0, 5, 6, 0, 0}; {4, –4, –3, 5, 4, –6, 1, –4, 0, 0, 0, 0}; {8, 3, –5, 4, –4, –1, 1, 0, 4, 6, 0, 0}; {7, –4, 0, –7, 1, –2, 3, 6, 4, 1, 0, 0}; {4, –5, 2, 2, –6, 2, –3, –4, –6, 1, 0, 0}; {4, –5, 2, 2, –6, 2, –3, –4, –6, 0, 0, 0}; {, –3, 4, –4, –4, 6, –2, –7, –7, –7, 0, 0, 0}; {1, –7, 2, –4, 6, 4, 4, –6, –2, 2, 0, 0}; {4, 0, 7, 1, –7, –3, –1, –2, 4, 5, 0, 0}; {8, 1, –7, 4, –7, 7, –7, –4, 6, 6, 0, 0}; {, –2, 3, –5, 3, –4, –5, –3, –3, –7, 8, 0, 0}; {, –5, 7, –2, 6, –2, 1, 2, 1, 6, 6, 0, 0}; {7, 0, 7, 8, 2, –5, 6, 7, 7, –1, 0, 0}; {7, –4, 7, –2, 2, –7, –6, 4, 1, –3, 0, 0}; {6, 3, –5, 6, 2, 7, –5, 5, 8, 0, 0, 0}; {2, –7, 1, –7, 4, 6, 5, 3, 8, 8, 0, 0}; {3, –6, 1, 1, –7, 1, –4, –5, –7, 0, 0, 0}; {8, 4, –5, 4, –5, 7, 8, –2, 5, 6, 0, 0}; {, –5, 8, 1, 8, 5, –4, 1, –7, –3, 2, 0, 0}; {, –4, 3, –6, 4, 4, –4, 1, –1, –5, –3, 0, 0}; {7, –2, 7, 3, 8, 6, –7, –5, 7, 6, 0, 0}; {8, –1, 8, 3, 8, 7, –7, –4, 7, 7, 0, 0}; {3, –4, 2, –7, 0, –2, –5, –7, –6, –5, 0, 0}; {, –6, 3, –4, 5, –6, –7, –7, –4, 7, 7, 0, 0}; {, –1, 6, 3, –7, –4, 0, 8, 1, 3, 2, 0, 0}; {0, 8, 8, 1, 1, 8, 0, –6, –1, –1, 0, 0}; {4, –6, 1, 0, –6, 1, –3, –5, –6, 0, 0, 0}; {, –5, 4, –2, –2, 5, –2, 3, 4, 6, –1, 0, 0}; {2, –5, 4, –5, –1, –3, –4, 1, 4, 6, 0, 0}; {, –3, –4, 0, –4, 6, 1, 4, –1, 5, 8, 0, 0}; {5, –3, 5, –5, –7, 7, 6, 3, –7, –6, 0, 0}; {0, –1, 3, 7, 4, –2, 6, 7, 1, 6, 0, 0}; {3, 5, –4, 1, 4, –2, 8, –2, –6, 1, 0, 0}; {7, 1, –6, 2, –5, –1, 2, 1, 4, 6, 0, 0}; {4, –5, 2, 2, –6, 2, –3, –5, –6, 1, 0, 0}; {3, –6, 6, –2, –3, 5, 7, –1, 2, 0, 0, 0}; {, –6, 4, –3, –3, 6, –3, 2, 3, 6, 0, 0, 0}; {4, –4, 3, –6, 7, 7, 6, 3, –7, –7, 0, 0}; {6, 1, 7, –3, 6, 8, 6, 4, 8, –7, 0, 0}; {6, 1, 7, –3, 6, 8, 6, 4, 8, 8, 0, 0}; {0, –7, 0, –7, –2, –4, –3, –1, 7, 7, 0, 0}; {7, –3, –2, 8, 1, –3, 3, 7, 3, 0, 0, 0}; {, –5, 6, 0, 8, 5, –6, –2, 7, –6, 1, 0, 0}; {7, –2, 5, –2, 2, 0, –1, 1, –7, 8, 0, 0}; {, –1, 8, 0, 7, 1, 3, 4, 2, 7, 8, 0, 0}; {, –3, –6, 8, –1, 7, –5, 2, –7, 7, –3, 0, 0}; {, –5, 2, 7, 7, –1, 5, –1, –3, –5, 1, 0, 0}; {0, 7, 8, –1, –5, 1, 7, 1, 0, 2, 0, 0}; {, –6, 4, –6, 0, –7, –7, 8, 6, –7, –7, 0, 0}; {7, –1, –4, 5, –5, 3, 4, –1, –3, –2, 0, 0}; {, –4, 1, 7, 0, –7, –5, –6, 3, 0, –4, 0, 0}; {, –4, 2, 1, 8, 3, 7, –3, 6, 5, 4, 0, 0}; {0, 7, –2, –2, 7, –1, –6, –6, 8, –1, 0, 0}; {0, –7, 2, 1, –7, 1, 5, 5, 7, 0, 0, 0}; {8, 0, 8, 1, –3, 1, 1, –2, 6, 6, 0, 0}; {8, 1, –7, 4, –7, 8, –7, –3, 5, 6, 0, 0}; {, –5, 2, –6, –6, 4, –4, –7, –7, 7, –2, 0, 0}; {7, –2, 8, 3, 7, 6, 8, –4, 7, 7, 0, 0}; {1, 6, 7, –1, 7, 3, 8, –6, 6, 2, 0, 0}; {, –6, 0, 6, 6, –2, 5, –1, –3, –5, 1, 0, 0}; {, –2, 6, 2, –4, 4, –6, 0, 5, 5, 5, 0, 0}; {4, –4, 4, –5, 7, 8, 5, 4, –7, –7, 0, 0}; {2, –7, 3, –5, –1, –4, –4, –1, –7, –7, 0, 0}; {, –6, 1, –7, –6, 3, –5, 8, –7, 7, –1, 0, 0}; {7, –2, –6, –1, 2, 4, –4, 4, 4, 2, 0, 0}; {2, –4, –2, 7, –4, 8, 2, –6, –6, –3, 0, 0}; {, –6, 3, –5, 4, –5, –7, –7, –2, 3, 5, 0, 0}; {3, 7, –1, 3, 2, 7, 3, –6, 8, 5, 0, 0}; {, –3, 2, –7, 1, –2, 4, 3, 7, 6, 4, 0, 0}; {, –6, 1, –4, 6, –6, –3, –5, –5, 3, 5, 0, 0}; {, –1, 7, –1, 7, 4, 4, 3, 2, 8, –6, 0, 0}; {1, –6, –6, 3, 2, 8, 1, –5, 0, 0, 0, 0}; {0, 4, –5, –6, 2, 8, 2, –1, –3, 2, 0, 0}; {, –3, –3, 7, 8, 0, 5, –2, 7, –2, –4, 0, 0}; {, –6, –1, 4, –3, –2, 5, 2, 8, 5, 0, 0, 0}; {, –1, 3, –5, 2, –1, 5, 3, 8, 7, 5, 0, 0}; {, –4, 4, 4, –4, –2, 6, –2, –7, –1, 0, 0, 0}; {2, –6, 1, –7, 3, 5, 5, 3, 7, 8, 0, 0}; {8, 1, 3, –5, 0, –5, 4, –4, –5, –2, 0, 0}; {, –2, 4, 8, 2, –5, –7, –1, 2, 3, 2, 0, 0}; {, –3, 5, 4, –4, –6, –1, 7, 0, 2, 1, 0, 0}; {, –5, 5, –2, 7, 6, –6, –3, 7, –7, 1, 0, 0}; {, –5, 0, 7, 0, 8, –5, –5, 4, 1, –2, 0, 0}; {8, 1, –5, –5, 4, –3, 2, 4, 6, –1, 0, 0}; {5, –3, –2, 6, 5, –6, 2, –3, 0, 0, 0, 0}; {6, –3, 2, –3, 7, 5, –4, –1, 1, 1, 0, 0}; {, –5, 3, –5, –1, –6, –5, 7, 5, –5, –5, 0, 0}; {3, –1, –5, 3, 7, 1, 5, 5, 5, –5, 0, 0}; {, –5, 5, –2, –1, 5, –2, 4, 4, 5, –1, 0, 0}; {, –3, 7, –1, 6, –1, 2, 2, 1, 6, 7, 0, 0}; {, –6, 4, –6, –1, –7, –6, 8, 5, –7, –6, 0, 0}; {, –6, 4, –6, –1, –7, –6, 8, 5, –7, –7, 0, 0}; {0, 8, 3, –7, –3, –1, 8, 2, 2, 0, 0, 0}; {, –4, 3, –6, –5, 5, –3, –7, –7, 8, –1, 0, 0}; {0, –6, 1, –7, 1, 4, 4, 2, 6, 7, 0, 0}; {1, –7, –2, 5, –2, –4, –6, 8, –6, –5, 0, 0}; {2, –6, –1, –6, –7, –4, 5, 1, –4, –5, 0, 0}; {4, –6, 2, 2, –6, 2, –3, –5, –6, 1, 0, 0}; {4, –5, 4, 4, –6, 2, 7, 7, 8, 0, 0, 0}; {2, 8, 7, –2, 8, 3, 8, –6, 6, 4, 0, 0}; {6, –2, 6, 6, –3, 5, 7, 8, –7, 1, 0, 0}; {2, –6, 3, –1, 5, 4, 7, –6, 5, 5, 0, 0}; {, –1, 4, –4, 0, 0, 5, 2, –7, 7, 4, 0, 0}; {, –4, 4, –3, 6, –5, –7, –6, –3, 8, 8, 0, 0}; {, –4, 4, –3, 6, –5, –7, –6, –3, 7, 7, 0, 0}; {8, 5, –2, 0, –3, 4, –6, 0, 1, –4, 0, 0}; {8, 5, –2, 7, –7, –1, 6, –7, 6, –2, 0, 0}; {6, 4, –1, –2, 5, –7, 0, –7, 0, –3, 0, 0}; {4, –7, 2, –7, 3, 7, 6, 1, –6, –7, 0, 0}; {4, –7, 2, –7, 3, 7, 6, 1, –7, 8, 0, 0}; {4, –3, –1, 8, –3, –7, 3, –5, –6, –3, 0, 0}; {6, –2, 3, 3, –4, 3, –3, –4, –6, 1, 0, 0}; {7, –2, 6, –2, 1, –1, –1, 0, –6, –7, 0, 0}; {, –5, –6, 2, –2, –5, 2, 8, 2, 6, –1, 0, 0}; {, –4, 5, –4, 6, –5, –6, –5, –2, 5, 6, 0, 0}; {, –2, 6, –2, 7, –5, –5, –4, –3, 8, 7, 0, 0}; {, –7, 1, –4, –4, 3, –4, 2, 4, 5, –2, 0, 0}; {2, –5, 5, –7, –2, 0, –7, 3, 1, 1, 0, 0}; {, –2, 5, –3, 6, –5, –5, –4, –3, 8, 7, 0, 0}; {2, –6, –5, 3, 6, 0, –6, 1, –3, –1, 0, 0}; {, –4, 5, 6, –1, 2, –2, 8, –1, –4, –2, 0, 0}; {, –2, 4, –2, 5, 5, –4, –5, 2, 4, 2, 0, 0}; {5, –7, 1, 8, 0, –2, 1, 0, 7, 5, 0, 0}; {6, –1, 7, 6, –2, 4, 8, 8, –7, 2, 0, 0}; {0, 6, 5, –5, 6, –7, –1, 8, 5, 4, 0, 0}; {, –2, 6, 8, –1, 4, –2, 6, 0, –3, –2, 0, 0}; {5, –3, 5, 4, –4, 4, 7, 7, –7, 1, 0, 0}; {, –2, 5, 6, –2, –6, –1, 7, 1, 1, 2, 0, 0}; {7, 2, –4, 5, 2, 7, –5, 5, 8, 0, 0, 0}; {7, –4, 5, –3, –6, 1, 0, 6, 6, 2, 0, 0}; {4, 7, –7, 1, –7, 4, 8, –4, 7, 3, 0, 0}; {, –1, 3, 5, –2, 6, 1, 6, –6, 6, 2, 0, 0}; {, –1, –7, 1, 1, –7, 0, 5, 6, 7, 0, 0, 0}; {6, –3, 6, 0, 6, 6, 8, –6, 6, 6, 0, 0}; {, –2, 6, –4, 2, –4, –5, –7, 7, –6, –5, 0, 0}; {, –2, 6, –4, 2, –4, –5, –7, 7, –6, –6, 0, 0}; {, –4, –7, 7, –2, 6, –5, 2, 8, 7, –3, 0, 0}; {8, 1, 0, 8, 7, –3, 4, –3, 2, 0, 0, 0}; {5, –2, 4, –5, 5, 7, 6, 3, 8, 8, 0, 0}; {6, –5, –7, –1, –5, 4, –5, –4, 6, 4, 0, 0}; {8, 3, –6, 4, –4, 0, 1, –1, 5, 6, 0, 0}; {7, –2, 7, –1, 7, 7, –6, –5, 7, 7, 0, 0}; {4, –3, 5, 5, –4, 3, 7, 7, 8, 1, 0, 0}; {, –1, –7, 1, 7, 1, 3, 4, 2, 7, 8, 0, 0}; {, –1, –7, 1, 7, 1, 3, 4, 2, 7, 7, 0, 0}; {7, 1, 1, 8, –5, 3, 7, 2, –4, 0, 0, 0}; {, –5, 1, –5, 7, –4, 5, 5, –1, –4, –4, 0, 0}; {, –3, 6, –3, 8, 0, 3, 2, 1, 6, 6, 0, 0}; {3, 7, –1, 6, –1, –2, –1, –1, –6, 8, 0, 0}; {7, 0, –7, 4, –6, –1, 5, 8, 7, 6, 0, 0}; {0, 7, 7, –1, –5, 0, 7, 1, 4, 3, 0, 0}; {0, 7, 7, –1, –5, 0, 7, 1, 3, 2, 0, 0}; {1, –5, 1, –5, 2, 5, 4, 2, 7, 7, 0, 0}; {, –7, 3, –4, –4, 5, –3, 2, 3, 7, –1, 0, 0}; {, –7, 3, –4, –4, 5, –3, 2, 3, 6, –1, 0, 0}; {, –4, 3, –5, 2, 4, 1, 1, 2, –5, –6, 0, 0}; {, –3, 6, 6, –1, 0, 7, –1, –6, –2, –2, 0, 0}; {7, –1, 7, 1, 2, –6, –1, –3, –6, –4, 0, 0}; {3, –5, –5, 4, 2, –6, 1, –5, 0, 0, 0, 0}; {, –6, 0, –7, –1, 4, 1, –2, 6, 4, –2, 0, 0}; {, –7, 1, 0, –7, 7, –4, 4, –2, 1, 1, 0, 0}; {, –5, 4, 4, –3, –2, 6, –3, 8, –3, –3, 0, 0}; {, –2, 4, –7, 8, 0, 6, 1, –2, –4, 2, 0, 0}; {1, –7, 2, 8, 4, 5, 4, 2, –7, –7, 0, 0}; {8, 0, 8, 2, –3, 0, 1, 0, 5, 6, 0, 0}; {4, –5, –6, 1, –2, 3, 8, 1, 4, 2, 0, 0}; {4, –4, –4, 3, 2, –5, 3, 7, 2, 0, 0, 0}; {0, 8, –4, 2, –5,

5, −2, −5, −5, −5, 0, 0}; {, −2, −3, 8, 8, 0, 6, −2, 6, −3, −4, 0, 0}; {, −3, 3, −4, 8, −3, 6, 6, −1, −4, −4, 0, 0}; {0, −6, −5, 5, −6, 7, 1, 8, −5, −4, 0, 0}; {, −5, 3, −4, 6, −6, −7, −6, −3, 7, 7, 0, 0}; {, −4, 0, 3, −4, 4, 0, 5, −7, 5, 2, 0, 0}; {1, −7, 1, 8, 4, 6, 4, 2, −7, −7, 0, 0}; {, −7, 7, 1, −5, −6, −1, 6, 1, 6, −2, 0, 0}; {6, 0, −1, 7, −3, 2, −4, 8, −4, −2, 0, 0}; {, −6, −2, 0, 7, −2, 8, −3, −4, 8, 3, 0, 0}; {4, 8, −2, −3, 2, −6, 3, 0, −3, 3, 0, 0}; {, −2, 1, −7, −2, 1, −4, 6, −4, 8, 1, 0, 0}; {5, 0, −7, 1, −6, −2, 0, −1, 4, 6, 0, 0}; {, −1, −3, 6, −1, −2, 4, −6, 4, −7, 0, 0, 0}; {, −2, −7, 4, −5, 3, 4, −3, −1, −5, −1, 0, 0}; {, −6, 4, 7, 0, 7, 3, −2, 7, −7, −4, 0, 0}; {, −6, −3, −2, 6, −3, 8, 0, −6, −6, 4, 0, 0}; {4, −4, 3, −4, 0, −2, −2, 0, 8, 8, 0, 0}; {, −5, 6, −1, 8, 5, −6, −2, 7, −6, 1, 0, 0}; {8, 2, −5, 4, −7, 8, 8, −3, 2, 5, 0, 0}; {2, 8, 1, −4, −1, 7, 8, 0, −1, −3, 0, 0}; {, −7, 2, 7, −3, 8, −6, 8, 4, −7, −7, 0, 0}; {, −7, 2, 7, −3, 8, −6, 8, 4, −7, 8, 0, 0}; {7, 1, 4, −3, 4, 0, −3, −7, −5, −4, 0, 0}; {, −4, 3, 1, 8, −7, −1, 6, −1, 2, 0, 0, 0}; {, −4, 5, −4, 6, −5, −7, −6, −3, 7, 7, 0, 0}; {1, 5, −2, 3, 0, 6, 3, −6, 8, 4, 0, 0}; {6, −3, 4, 4, −5, 2, −2, −3, −6, 1, 0, 0}; {, −4, 1, 7, −1, −7, −5, −6, 4, 0, −3, 0, 0}; {, −3, 7, 5, −1, 7, −6, 5, 7, 6, −4, 0, 0}; {1, −7, 2, −2, 4, 3, 6, −7, 5, 5, 0, 0}; {0, −7, 2, 2, 8, 0, 5, 6, 7, 0, 0, 0}; {5, −4, 1, 2, −5, 2, −3, −5, −7, 0, 0, 0}; {7, 2, −4, 3, 8, 7, 7, −3, 1, 4, 0, 0}; {, −7, 0, −7, 4, 8, 7, −6, −4, 7, 7, 0, 0}; {3, 7, −1, 7, −2, −4, 0, −1, 7, 5, 0, 0}; {7, −3, −3, 4, −1, 4, −5, 4, 4, 3, 0, 0}; {1, 5, −2, 5, −3, −4, −2, −2, −6, 8, 0, 0}; {, −7, −2, 5, 4, −3, 4, −1, −3, −5, 0, 0, 0}; {7, 1, 2, −5, −1, −5, 4, −5, −4, −3, 0, 0}; {, −4, 4, −3, 5, −6, −6, −5, −4, 8, 7, 0, 0}; {5, −3, 3, −1, −1, 8, −1, −4, −7, −5, 0, 0}; {3, −4, −5, 2, 5, −6, 3, −3, 0, −1, 0, 0}; {5, −3, 5, 1, 6, 6, 8, −5, 5, 5, 0, 0}; {0, 8, −7, 2, 4, −1, −7, 0, −4, −1, 0, 0}; {4, −4, 6, 0, 6, 6, 8, −6, 6, 5, 0, 0}; {1, −6, 5, −1, 6, −4, 2, 5, 5, 5, 0, 0}; {8, 1, −4, −4, 3, −4, 2, 3, 6, −1, 0, 0}; {6, −2, −2, 7, 4, −5, 3, −4, 0, 0, 0, 0}; {, −5, 2, 2, −5, 6, −5, 4, 0, 1, −2, 0, 0}; {6, −1, 8, 1, 8, 7, 7, −3, 1, 4, 0, 0}; {, −7, −2, 4, −5, −3, −7, 4, −5, 7, 0, 0, 0}; {, −3, 5, −4, −4, 6, −2, −7, −7, −7, 0, 0, 0}; {, −3, 5, 5, −3, −6, −1, 6, 0, 3, 2, 0, 0}; {, −3, 5, 5, −3, −6, −1, 6, 0, 2, 2, 0, 0}; {, −5, 4, −5, −6, 1, 7, −6, −7, −6, 3, 0, 0}; {3, −3, 7, 1, 1, 6, −7, 4, 7, 0, 0, 0}; {3, −5, 4, 4, −6, 2, 7, 7, 7, 0, 0, 0}; {7, −2, 3, 7, 1, 0, −3, −7, −3, −4, 0, 0}; {, −7, 3, −4, −3, 4, −3, 2, 4, 5, −1, 0, 0}; {, −3, 3, 1, 7, 6, 0, 6, −7, 4, 3, 0, 0}; {5, −5, −3, 6, 0, −3, 3, 6, 3, 0, 0, 0}; {8, −2, 0, 8, −6, 4, −4, 6, −1, −1, 0, 0}; {6, −6, 1, −7, 0, −2, 1, 0, 7, 5, 0, 0}; {, −7, 1, −7, −2, −7, −6, 7, 5, −6, −6, 0, 0}; {, −4, 4, 3, −5, −4, 6, −1, 4, 0, 0, 0, 0}; {3, −4, 4, 4, −5, 3, 6, 7, 8, 1, 0, 0}; {4, −1, −3, 4, −4, 0, −5, 7, −5, −2, 0, 0}; {3, −7, 3, −5, 3, 4, 8, −7, 6, 6, 0, 0}; {4, −4, 2, 8, 3, −1, 5, 5, 7, 7, 0, 0}; {3, −5, −1, 7, 6, 1, 6, 2, −4, −3, 0, 0}; {3, −1, −3, 4, −4, 0, −5, 7, −6, −3, 0, 0}; {, −5, 3, 8, −1, 7, 2, −3, 8, −7, −6, 0, 0}; {0, 8, −6, 3, 1, 7, 0, −5, −2, 0, 0, 0}; {, −6, 2, −7, 3, 3, −5, −1, −2, −5, −4, 0, 0}; {, −5, 5, −2, 7, −4, −7, −5, −1, 4, 5, 0, 0}; {, −2, −7, 7, 0, 7, −5, 4, 8, 7, −3, 0, 0}; {2, −1, 6, −3, −6, 6, −1, 1, −6, −1, 0, 0}; {, −5, 4, −5, 4, −1, 2, 3, 0, 6, 7, 0, 0}; {, −7, 2, −4, −3, 3, −4, 2, 4, 5, −2, 0, 0}; {, −3, 6, −2, 6, 0, 2, 3, 1, 6, 7, 0, 0}; {5, −4, −5, 2, −1, 3, −7, 1, 5, 2, 0, 0}; {, −6, 0, 7, −1, −3, 3, 2, 6, 5, 4, 0, 0}; {, −1, 6, −2, 6, 1, 4, 4, 0, 8, 8, 0, 0}; {4, −7, −1, 6, 3, 8, 7, −6, 8, 5, 0, 0}; {7, 2, −6, 4, −6, 7, −7, −2, 4, 5, 0, 0}; {, −1, 8, −7, 1, 4, 0, 8, −1, −3, 0, 0, 0}; {, −5, 2, 2, −6, 8, −3, 5, −2, 2, 1, 0, 0}; {8, −1, 6, −3, −7, 8, 8, 5, −7, −6, 0, 0}; {, −3, −5, 5, −3, −3, 3, −7, 3, −7, 0, 0, 0}; {, −7, 0, −7, −7, 3, −5, 8, 8, 7, −2, 0, 0}; {, −7, −1, 5, 4, −3, 4, −1, −3, −5, 1, 0, 0}; {, −7, 4, 0, 7, −1, 2, −3, −6, −4, −1, 0, 0}; {, −4, 4, 4, −5, −4, 6, −1, 6, 0, 1, 0, 0}; {, −1, 8, 7, 0, 1, −7, −1, −7, −2, −3, 0, 0}; {8, 5, −4, 6, 3, 8, −2, 7, −6, 1, 0, 0}; {, −4, 5, −2, −2, 6, −2, 3, 5, 6, −1, 0, 0}; {, −6, 2, −7, 2, 2, −4, 0, −2, −6, −4, 0, 0}; {5, 0, −7, −6, 3, −5, 1, 3, 5, −1, 0, 0}; {3, 8, 7, −3, 5, −7, 1, −7, 7, 3, 0, 0}; {, −1, 8, −1, 6, 3, 4, 4, 1, 7, 8, 0, 0}; {6, −3, 2, 2, −5, 2, −3, −4, −7, 0, 0, 0}; {8, 4, −6, 4, −5, 7, 8, −2, 6, 7, 0, 0}; {2, −3, 7, 8, 0, −7, −1, 1, 3, −2, 0, 0}; {1, −5, 3, −7, 3, 4, 5, 3, 7, 8, 0, 0}; {, −7, 5, 3, −4, 4, −7, 3, 6, 6, −5, 0, 0}; {, −4, 1, 8, 7, −1, 5, 0, −1, −5, 1, 0, 0}; {3, −4, −7, 0, 5, −7, 2, −4, −1, 0, 0, 0}; {3, −5, 3, −5, 0, −3, −3, 0, −7, −7, 0, 0}; {2, −4, 4, −5, 3, 5, 5, 3, 7, 8, 0, 0}; {3, 7, −1, 6, −1, −3, 0, −2, −6, −7, 0, 0}; {, −2, 5, 6, −2, −6, −2, 6, 2, 0, 1, 0, 0}; {4, 8, 0, 5, 3, 8, 4, −5, −7, 4, 0, 0}; {8, 0, 7, 1, 2, −6, −1, −3, −6, −4, 0, 0}; {4, −5, 2, 2, −6, 3, −4, −5, −6, 2, 0, 0}; {, −7, −2, 7, −3, 4, 1, −2, 6, 4, −2, 0, 0}; {, −3, 1, 8, −2, 0, −5, 6, −4, 8, 1, 0, 0}; {, −3, 1, 8, −2, 0, −5, 6, −4, −7, 0, 0, 0}; {4, −5, 4, −5, 7, 8, 5, 4, −7, −7, 0, 0}; {0, 6, 7, −1, 7, 4, −7, 7, 8, 3, 0, 0}; {, −1, 7, 3, −7, −4, 0, 8, 1, 2, 1, 0, 0}; {8, 0, 7, −2, −7, 8, 7, 5, −7, −6, 0, 0}; {6, −2, −1, 6, −7, 3, −5, 3, −1, −1, 0, 0}; {2, 8, 0, 0, 8, 0, −4, −5, −7, 0, 0, 0}; {, −1, −6, 1, −7, 1, 3, 3, 2, 7, 7, 0, 0}; {, −5, 1, 7, 6, −1, 6, −1, −2, −4, 2, 0, 0}; {7, −1, 8, 2, 7, 7, −7, −5, 6, 6, 0, 0}; {, −7, 0, 4, −5, 3, 0, −2, −5, −5, −4, 0, 0}; {7, 1, −5, 4, 8, 8, 8, −4, 2, 5, 0, 0}; {, −3, 1, −7, 1, −2, 4, 3, 8, 6, 5, 0, 0}; {, −1, 8, 7, −3, 4, 5, −1, −5, −2, 1, 0, 0}; {3, 0, 8, 3, −1, 5, −6, 4, 8, −1, 0, 0}; {0, 7, −2, 7, 7, −1, 2, 0, −4, −3, 0, 0}; {2, −5, 8, 4, −6, 1, −1, 2, −5, −1, 0, 0}; {1, 6, −1, 4, −7, 5, 1, 8, 6, −1, 0, 0}; {8, 2, 0, 7, −2, 2, −4, −7, −3, 0, 0, 0}; {0, 8, 3, −3, 3, 4, 6, 8, 6, 5, 0, 0}; {, −7, −2, 6, −3, −4, 2, 1, 7, 5, 3, 0, 0}; {7, −1, 6, −4, 7, 7, 7, 4, −7, −7, 0, 0}; {, −1, 5, −6, 4, −3, −6, 0, 2, 4, 1, 0, 0}; {, −4, 4, 7, −3, 5, 2, −1, −4, −4, −3, 0, 0}; {, −1, 5, 6, −3, −2, 7, −2, 7, 0, 1, 0, 0}; {, −4, 4, −5, 1, −6, −6, −6, 7, −7, −6, 0, 0}; {, −5, 3, −5, −6, 0, 7, −5, −7, −7, 2, 0, 0}; {, −2, −5, 5, −2, −3, 3, −7, 3, 8, −1, 0, 0}; {3, −1, 8, 2, 0, 5, −6, 4, 7, 0, 0, 0}; {3, −1, 8, 2, 0, 5, −6, 4, 8, −1, 0, 0}; {7, −1, 0, 7, −7, 4, −4, 2, −1, −1, 0, 0}; {, −3, 6, −7, 0, 6, 3, −1, −4, −4, −2, 0, 0}; {7, −6, 2, 7, −3, 8, 4, −6, 8, 0, 0, 0}; {, −2, 6, 8, 0, −3, 8, 0, 5, 1, −1, 0, 0}; {2, −5, 2, −7, 3, 5, 5, 3, 7, 8, 0, 0}; {2, −5, 3, −3, −1, 7, −4, −5, −7, −5, 0, 0}; {5, −3, −3, 5, 5, −5, 3, −3, 0, −1, 0, 0}; {, −6, 1, −2, 6, −5, 3, 5, 0, −2, −3, 0, 0}; {, −5, 4, 4, −4, −1, 5, −3, −7, −2, −1, 0, 0}; {, −2, 8, −6, 4, −7, 6, 1, −7, −7, −4, 0, 0}; {, −6, −2, −1, 5, −2, 6, −3, −2, 8, 3, 0, 0}; {0, −5, 5, −1, −1, 4, 8, 3, 6, −1, 0, 0}; {4, −6, −3, 6, −1, −4, 1, 6, 3, 1, 0, 0}; {3, 2, −4, 7, 6, −4, 3, −1, 4, −3, 0, 0}; {4, −4, −5, 3, 4, −6, 2, −4, 0, 0, 0, 0}; {, −6, 3, 6, −3, 4, 1, −2, −5, −5, −3, 0, 0}; {7, −2, 3, −3, 7, 5, −4, −1, 1, 1, 0, 0}; {, −3, 5, −3, −4, 1, 8, −4, −6, −6, 2, 0, 0}; {, −6, 3, 4, −2, −3, 4, −3, −7, −3, −2, 0, 0}; {8, −1, 4, 4, −3, 3, −2, −4, −6, 0, 0, 0}; {2, −6, 1, 1, −6, 1, −4, −5, −6, 1, 0, 0}; {3, −6, 0, 1, −7, 1, −4, −6, −7, 0, 0, 0}; {1, −6, 3, −4, −1, 6, −4, −5, −7, −5, 0, 0}; {, −7, −2, 7, −3, −5, 1, 0, 7, 6, 4, 0, 0}; {3, −5, 3, −2, −1, 8, −4, −4, −7, −5, 0, 0}; {7, −1, −1, 8, 5, −5, 4, −3, 1, 1, 0, 0}; {4, 6, −4, 2, 4, −1, −7, −2, −6, 2, 0, 0}; {3, −6, 3, −6, 6, 7, 4, 3, −6, −6, 0, 0}; {, −3, 6, −2, 7, −4, −6, −6, −3, 8, 7, 0, 0}; {, −3, −7, −3, −7, −4, 4, −1, 1, 6, −7, 0, 0}; {7, 0, 6, −3, 8, 7, 6, 5, 8, −6, 0, 0}; {, −2, 4, 2, −6, 3, 4, −5, 6, 7, 2, 0, 0}; {4, −4, 5, 5, −5, 3, 7, 7, −7, 1, 0, 0}; {, −3, 1, −2, 3, −1, 8, −2, −2, 8, 6, 0, 0}; {, −1, −7, 5, −4, 4, 4, −2, −1, −5, −1, 0, 0}; {, −5, −3, 2, 8, −7, 3, −4, 1, −4, 3, 0, 0}; {, −7, 1, −7, 8, −2, 5, −7, −7, −7, 1, 0, 0}; {, −1, 8, 8, 1, 1, 7, 0, −6, −1, −1, 0, 0}; {, −2, 6, −2, 8, −3, −5, −5, −2, 7, 7, 0, 0}; {7, −1, 7, 1, 2, −6, −2, −3, −6, −4, 0, 0}; {, −5, 1, 7, 7, −2, 5, 0, −1, −5, 1, 0, 0}; {4, −7, 0, 7, 0, −2, 1, 0, 7, 5, 0, 0}; {5, −2, −3, 6, 5, −5, 3, −3, 1, 0, 0, 0}; {, −6, 4, −3, −3, 5, −3, 3, 4, 6, −1, 0, 0}; {5, 0, −6, −6, 2, −4, 1, 2, 5, −1, 0, 0}; {4, −3, 5, −2, −1, −7, −3, −4, −7, −5, 0, 0}; {2, −4, 1, −7, 0, −3, −6, 8, −6, −5, 0, 0}; {, −3, 4, −4, −4, 5, −3, −6, −7, 8, −1, 0, 0}; {7, 0, 0, 8, −6, 4, −3, 2, −1, −2, 0, 0}; {8, −2, 4, −3, 7, −6, 8, 3, −2, −4, 0, 0}; {0, −4, −3, 6, −1, 4, 1, 3, 5, −6, 0, 0}; {4, −4, 5, 1, 7, 6, 8, −5, 5, 5, 0, 0}; {7, −1, −3, 7, 5, −4, 3, −5, 0, 0, 0, 0}; {, −1, 6, 0, 6, 1, 3, 4, 0, −7, −7, 0, 0}; {, −2, 6, 4, −3, −7, 0, 6, −2, 1, 1, 0, 0}; {8, 1, 7, −2, 8, 7, 7, 6, 8, −7, 0, 0}; {0, 8,

1, −7, −3, −4, −4, −2, −7, 8, 0, 0}; {4, −5, 3, −2, −1, 8, −3, −4, −7, −5, 0, 0}; {, −1, −7, 1, −3, 4, 4, 5, −5, 1, 4, 0, 0}; {2, −7, 0, 0, −7, 1, −4, −5, −6, 1, 0, 0}; {1, 6, −4, 5, −2, −4, 0, −1, 5, 4, 0, 0}; {4, −2, 5, −4, 4, 6, 6, 4, 8, 8, 0, 0}; {4, −2, 5, −4, 4, 6, 6, 4, 7, 8, 0, 0}; {7, −2, −1, 7, 5, −5, 2, −3, 1, 1, 0, 0}; {7, −1, 7, −4, 8, −7, 6, 4, −6, −6, 0, 0}; {5, −3, 5, 6, −1, −7, 6, 7, 6, −3, 0, 0}; {6, −4, 3, −5, 5, 8, 7, 2, −5, −6, 0, 0}; {8, 3, −4, −3, 4, −3, 2, 3, 6, 0, 0, 0}; {5, −4, 3, −5, 5, 7, 6, 3, −7, −7, 0, 0}; {6, 0, −6, −6, 3, −4, 1, 2, 5, −1, 0, 0}; {1, 5, −5, 1, 2, −3, 8, −2, −6, 1, 0, 0}; {4, −5, 3, −6, 6, 6, 5, 3, −7, −6, 0, 0}; {2, −6, −5, 4, 1, 8, 0, −5, −1, 0, 0, 0}; {5, −5, 4, −3, 5, 5, −7, −6, 6, 6, 0, 0}; {, −6, −1, 8, 1, 5, −4, −5, 4, 1, −2, 0, 0}; {7, −2, 6, −1, 7, 7, −6, −5, 7, 7, 0, 0}; {, −3, 3, −4, 4, −1, 2, 3, −2, −5, −7, 0, 0}; {1, 6, 8, 0, 8, 4, −6, 7, 8, 3, 0, 0}; {, −2, 5, 5, −4, −3, 8, 0, 4, 0, 1, 0, 0}; {6, −4, 3, 2, −5, 3, −3, −4, −5, 1, 0, 0}; {4, −4, 4, −4, 0, −2, −2, −1, −7, 8, 0, 0}; {, −7, 1, −6, 2, 8, 8, −6, −5, 7, 7, 0, 0}; {3, −2, −3, 4, −4, 0, −6, 7, −5, −1, 0, 0}; {6, −4, 4, −3, 6, 5, −6, −6, 3, 3, 0, 0}; {0, 5, −6, −7, 1, 7, 2, −1, −4, 2, 0, 0}; {7, −3, 0, 8, 1, −1, 6, 4, 6, 1, 0, 0}; {, −5, 3, 2, −6, 8, −2, 4, −3, 1, 0, 0, 0}; {, −3, 3, −3, 5, 4, −5, −5, 2, 4, 1, 0, 0}; {1, −5, −3, 6, −5, 7, 2, −6, −7, −3, 0, 0}; {7, −4, 4, 3, −4, 3, −2, −3, −6, 0, 0, 0}; {, −1, 3, 3, −6, 1, 5, 0, −4, −5, 5, 0, 0}; {, −1, 7, 0, 7, 4, 4, 3, 2, 8, −7, 0, 0}; {, −2, 6, 2, −6, −6, 1, 6, −2, 1, 0, 0, 0}; {, −2, 5, 5, −4, −6, −1, 6, −1, 3, 1, 0, 0}; {, −2, 7, 7, 0, 0, 7, 0, −6, −1, −1, 0, 0}; {4, −2, 4, −5, 5, 7, 6, 3, 8, 8, 0, 0}; {, −2, 7, −6, 4, 4, −2, 7, 4, −5, −2, 0, 0}; {3, −2, 4, −4, 4, 6, 5, 3, 7, 8, 0, 0}; {8, −4, 5, −5, 5, −7, 7, 2, −5, −6, 0, 0}; {8, −4, 5, −5, 5, −7, 7, 2, −6, −7, 0, 0}; {6, 3, 2, −6, 3, 8, 0, 6, 6, −4, 0, 0}; {3, −4, 2, −5, 4, 5, 5, 3, 7, 8, 0, 0}; {2, 1, −5, 6, 6, −4, 3, −1, 4, −3, 0, 0}; {1, −2, 7, 1, −1, 4, −7, 4, 7, −1, 0, 0}; {, −3, 8, −4, 7, 0, −6, −6, 5, −7, −5, 0, 0}; {, −4, −7, 7, −1, 7, −4, 8, 4, −7, −3, 0, 0}; {5, −5, 5, −3, 6, 6, −7, −6, 7, 7, 0, 0}; {6, −2, 6, 0, 1, −6, −2, −3, −6, −4, 0, 0}; {5, −4, 1, −4, 6, 4, −5, −1, 1, 1, 0, 0}; {1, −4, 3, −6, 3, 5, 4, 3, 7, 8, 0, 0}; {7, −1, 0, 7, −7, 4, −4, 3, −1, −1, 0, 0}; {8, 0, 3, −6, 0, −6, 4, −3, −5, −3, 0, 0}; {6, −3, −7, −1, 0, 4, −5, 3, 4, 1, 0, 0}; {, −5, −2, 5, −3, 3, 0, 3, 1, 8, 6, 0, 0}; {4, 8, 2, 2, −5, −1, 8, 3, −4, −3, 0, 0}; {2, −4, −3, 7, −4, 8, 2, −7, −4, −3, 0, 0}; {5, −3, 0, 7, −2, 8, 2, −4, −5, −4, 0, 0}; {8, 3, −5, 3, −4, 0, 2, 0, 5, 6, 0, 0}; {8, 1, 8, −3, 7, 8, 7, 4, −6, −6, 0, 0}; {8, 1, 8, −3, 7, 8, 7, 4, −7, −7, 0, 0}; {4, 0, 8, −2, −5, 1, 4, −5, 0, 3, 0, 0}; {, −4, 3, 3, −4, 8, −2, 6, −1, 2, 2, 0, 0}; {7, 3, 2, −5, 3, 8, 1, 6, 6, −4, 0, 0}; {, −2, 8, −6, 3, −7, 5, 0, 7, −5, −4, 0, 0}; {, −5, 5, −4, 6, −5, −7, −6, −2, 6, 7, 0, 0}; {0, −6, 1, −6, 1, 4, 4, 2, 7, 7, 0, 0}; {0, −6, 1, −6, 1, 4, 4, 2, 6, 7, 0, 0}; {3, −5, 1, 0, −6, 2, −4, −5, −6, 1, 0, 0}; {3, −6, −7, 1, −4, 0, 8, 3, 2, 0, 0, 0}; {4, 8, −1, 8, −6, 1, −1, 6, 3, −1, 0, 0}; {7, −1, 7, 7, −3, 5, 8, 8, −7, 1, 0, 0}; {, −3, 8, −1, 8, −3, −7, −5, −1, 6, 7, 0, 0}; {5, −1, −2, 6, −4, 1, −5, 7, −4, −1, 0, 0}; {, −7, 0, 6, 5, −2, 5, −1, −3, −4, 2, 0, 0}; {4, 8, 0, 6, −5, 6, 2, −7, 6, 0, 0, 0}; {2, −5, 2, −3, −2, 7, −4, −5, −7, −5, 0, 0}; {1, −5, 2, −5, −1, −4, −3, 0, 7, 7, 0, 0}; {1, −5, 2, −5, −1, −4, −3, 0, 6, 7, 0, 0}; {4, 0, 3, −2, 2, −7, 3, 3, −7, −5, 0, 0}; {, −5, 6, 8, 2, 6, −4, 6, 5, −6, −4, 0, 0}; {5, −2, −2, 6, 8, 3, −5, 2, −2, −1, 0, 0}; {, −4, 6, −3, 6, −2, 1, 2, 0, 6, 6, 0, 0}; {, −2, 8, 0, 7, −1, 1, 6, 7, 0, 0, 0, 0}; {, −2, 7, −3, 1, −5, −4, −7, 6, −6, −6, 0, 0}; {, −3, 5, −4, −3, 6, −3, −7, −7, 8, −1, 0, 0}; {, −1, 6, 0, 8, −3, −6, −5, −2, 8, 8, 0, 0}; {1, −7, 8, 1, −4, 2, −7, 1, 2, 2, 0, 0}; {4, −3, 6, 5, −5, 3, 7, 8, 8, 1, 0, 0}; {, −3, 7, −3, 2, −5, −4, −7, 6, −6, −6, 0, 0}; {4, −2, 5, −6, 5, 7, 5, 3, 8, −7, 0, 0}; {0, 6, 0, 8, 5, −4, −1, 5, 4, 3, 0, 0}; {, −6, 4, 2, −7, −1, 3, −4, −7, −3, 0, 0, 0}; {, −2, 3, −4, 1, 7, 4, 0, 8, 5, −1, 0, 0}; {, −4, 6, 0, 1, 8, 8, −1, 4, −1, 0, 0, 0}; {, −2, 7, 0, 8, −3, −5, −5, −2, 8, 8, 0, 0}; {5, −2, −3, 7, 4, −6, 3, −5, 0, 0, 0, 0}; {, −3, 3, −4, 4, 4, −5, −4, 3, 2, 3, 0, 0}; {6, 0, −7, −7, 3, −5, 0, 1, 5, −2, 0, 0}; {6, −4, 5, 1, 7, 6, 8, −5, 7, 6, 0, 0}; {4, −6, 1, 1, −7, 2, −3, −4, −6, −1, 0, 0}; {3, −4, −6, 1, 5, −7, 2, −3, −1, −1, 0, 0}; {1, −3, 5, −4, 8, 7, −1, 1, −7, −2, 0, 0}; {2, 7, −7, 0, −7, 5, −4, 8, −7, 3, 0, 0}; {, −1, −5, 4, −6, 8, −3, 2, −6, −3, 3, 0, 0}; {1, −4, 0, −6, 1, −2, −5, 4, 6, −5, 0, 0}; {, −7, −3, 4, −5, −3, 8, 3, −6, 6, −1, 0, 0}; {, −6, 5, −2, −2, 5, −2, 3, 4, 6, 0, 0, 0}; {, −2, −7, 0, 8, 0, 3, 3, 2, 6, 7, 0, 0}; {1, 6, 0, −6, −1, 6, 7, 0, −2, −4, 0, 0}; {4, −4, −4, 4, 4, −6, 2, −4, 0, −1, 0, 0}; {3, −5, 3, −5, −1, −3, −3, −1, −7, 8, 0, 0}; {, −4, 1, 7, 7, −1, 6, 1, −2, −4, 1, 0, 0}; {, −1, 6, −2, −1, 6, −2, −5, −5, 8, 0, 0, 0}; {, −4, 5, 1, −5, 3, −7, −1, 4, 4, 4, 0, 0}; {, −6, 2, −7, −2, 8, −7, 8, 5, −6, −6, 0, 0}; {8, 2, −4, 4, −7, 7, −7, −3, 2, 4, 0, 0}; {1, −4, 6, 7, 1, −7, −2, 1, 3, −2, 0, 0}; {, −6, 2, −6, −6, 3, −5, −7, 8, 7, −1, 0, 0}; {, −1, 8, 0, 8, −2, −5, −5, 0, 6, 7, 0, 0}; {6, −1, −3, 5, 6, −4, 3, −4, 0, −2, 0, 0}; {2, −7, 2, −2, 5, 4, 7, −6, 6, 6, 0, 0}; {6, 1, 3, −2, 4, 1, −3, 5, −7, −5, 0, 0}; {6, −1, 6, −4, 7, 8, 6, 4, −7, −7, 0, 0}; {3, −5, 3, −6, 6, 6, 4, 3, −6, −5, 0, 0}; {, −7, −2, 8, −3, 4, 1, −2, 6, 4, −2, 0, 0}; {, −1, 7, 0, −4, −3, 6, −5, −6, 8, −4, 0, 0}; {, −1, 7, −2, 1, −5, −4, −7, 6, −5, −5, 0, 0}; {, −5, 3, 2, −6, −5, 6, −2, 3, 0, 0, 0, 0}; {3, −3, 4, −5, 4, 5, 5, 4, 7, 8, 0, 0}; {, −3, 2, −6, 0, −2, 4, 1, 8, 7, 3, 0, 0}; {, −7, 4, −4, 4, −4, 0, 2, 1, 5, 6, 0, 0}; {2, 7, −4, −5, 3, −7, 3, 1, −3, 3, 0, 0}; {, −7, −1, 5, −2, 7, −6, −6, 3, 0, −3, 0, 0}; {, −7, −1, 5, −2, 7, −6, −6, 3, −1, −4, 0, 0}; {, −6, 6, −2, −6, 3, 8, −4, 6, 8, 0, 0, 0}; {, −5, 0, 7, 7, −3, 5, −1, −2, −6, 1, 0, 0}; {, −1, −6, −7, 1, −7, −3, 8, 6, −6, −2, 0, 0}; {3, −5, 1, −6, 4, 6, 6, 3, 8, 8, 0, 0}; {4, 8, −1, −7, −5, 4, 0, 8, 2, −1, 0, 0}; {, −6, −1, 6, 6, −3, 4, −1, −2, −6, 1, 0, 0}; {6, −2, −2, 7, 4, −6, 2, −3, 0, 0, 0, 0}; {, −6, 3, 2, −7, 7, −2, 5, −5, 2, 0, 0, 0}; {, −6, 2, −4, 5, −6, −7, −6, −4, 8, 7, 0, 0}; {, −6, 4, −3, −2, 4, −3, 3, 4, 5, −1, 0, 0}; {1, 8, 1, −6, −2, −5, −5, −1, −7, −7, 0, 0}; {, −6, 3, −4, −3, 5, −2, 2, 4, 5, −1, 0, 0}; {, −2, 6, −4, 7, 2, 1, 8, −3, −2, 0, 0, 0}; {, −2, 6, −4, 7, 2, 1, 8, −3, −1, −1, 0, 0}; {, −3, 1, 1, 8, −1, −6, −2, −4, −6, 5, 0, 0}; {, −2, 3, −2, −7, 1, −4, −4, 7, −6, 0, 0, 0}; {, −6, 0, 6, 6, −3, 4, −1, −2, −5, 1, 0, 0}; {8, −2, 8, 0, 1, 4, 0, 1, 7, 5, 0, 0}; {6, −5, 4, −2, 3, −6, −7, 3, −1, −3, 0, 0}; {, −2, −7, −1, 8, 0, 3, 3, 1, 6, 7, 0, 0}; {, −1, −7, −5, 4, −6, 6, 1, −7, −7, −4, 0, 0}; {, −2, 3, −1, 4, 0, −6, −2, −2, −7, 7, 0, 0}; {, −5, 6, 8, 2, 6, −4, 7, 5, −6, −5, 0, 0}; {8, −1, 6, 1, 1, −6, 0, −3, −6, −4, 0, 0}; {, −4, 6, −3, 7, −5, −7, −5, −2, 6, 7, 0, 0}; {, −5, 4, −4, 6, −3, 2, 3, 0, 5, 6, 0, 0}; {, −5, 4, 3, −4, 8, −1, 6, −2, 1, 1, 0, 0}; {2, −6, −1, −6, 5, 3, −6, −2, 0, 0, 0, 0}; {2, −6, −1, −6, 5, 3, −6, −2, 0, −1, 0, 0}; {2, 5, −4, 2, 3, −2, 8, −3, −7, 1, 0, 0}; {, −1, −6, 4, −3, 3, 3, 4, −6, −1, 3, 0, 0}; {, −1, 4, −6, −7, 1, 7, 1, −1, −4, 1, 0, 0}; {2, −6, 2, −7, 5, 5, 4, 3, 8, −7, 0, 0}; {, −1, 3, −4, 2, −1, 4, 4, −6, 7, 4, 0, 0}; {, −3, 4, 7, −3, 3, −3, 6, −1, −3, −2, 0, 0}; {1, −7, 2, −6, −2, −4, −4, −1, −7, −7, 0, 0}; {, −2, 3, −4, 7, −4, 5, 6, −1, −3, −6, 0, 0}; {7, 0, −6, 2, 0, 1, −3, −1, 8, −6, 0, 0}; {4, 7, −6, 2, −3, 2, −2, −2, −4, 7, 0, 0}; {, −5, 4, 5, −2, 1, −3, 7, −1, −5, −2, 0, 0}; {, −1, 5, −4, 3, 7, 4, 0, 8, 5, −1, 0, 0}; {, −4, 3, −7, 0, −5, −6, −7, 7, −6, −6, 0, 0}; {8, 0, −7, 2, 7, 8, −7, −5, 7, 6, 0, 0}; {5, −3, 5, −1, 0, 8, −3, −4, −6, −5, 0, 0}; {, −6, 5, 5, −3, 5, −7, 4, 8, 7, −3, 0, 0}; {, −6, 3, −4, −3, 4, −3, 3, 4, 5, −1, 0, 0}; {, −5, 2, 7, 0, −5, −7, 1, 1, 4, 0, 0, 0}; {, −5, 5, 4, −5, 1, 4, −2, −6, −3, −1, 0, 0}; {, −4, 5, −2, −2, 6, −3, 4, 5, 6, −2, 0, 0}; {1, 7, 1, −6, 3, 4, 7, 8, 6, 6, 0, 0}; {5, −2, 5, −3, 2, −1, −2, 2, 6, 7, 0, 0}; {3, −4, 0, 7, −1, −2, −5, 8, −6, −5, 0, 0}; {8, −5, 4, −5, −3, 8, 2, −7, 6, −1, 0, 0}; {2, 8, 0, 0, 8, 0, −4, −4, −7, 0, 0, 0}; {, −5, 4, 5, −2, 2, −3, 6, −2, −4, −2, 0, 0}; {2, −2, 7, 2, −1, 4, −7, 4, 7, −1, 0, 0}; {5, −4, −5, 2, 1, −5, 2, 7, 1, 1, 0, 0}; {8, 3, −7, −1, 7, −7, 7, 5, −7, −7, 0, 0}; {, −2, 6, −3, −4, 2, −7, −5, −6, −5, 3, 0, 0}; {, −6, 2, 1, −7, 8, −3, 5, −1, 2, 0, 0, 0}; {, −6, 2, 1, −7, 8, −3, 5, −1, 1, 0, 0, 0}; {, −7, 0, 8, 7, −2, 6, −7, 8, −7, 1, 0, 0}; {, −4, 5, −2, −2, 6, −2, 3, 4, 6, 0, 0, 0}; {, −4, 5, −2,

−2, 6, −2, 3, 4, 6, −1, 0, 0}; {, −2, −3, 8, 8, 0, 6, −3, 6, −3, −4, 0, 0}; {, −3, 5, −5, 5, 5, −3, 1, −1, −5, −3, 0, 0}; {, −3, 6, −6, 1, −7, 3, −2, −6, −5, −5, 0, 0}; {2, −6, −2, 4, −4, 6, 0, −4, −4, −4, 0, 0}; {, −5, 0, 6, 6, −2, 4, −1, −2, −5, 1, 0, 0}; {, −2, 8, −1, 8, −2, −5, −5, 0, 5, 6, 0, 0}; {, −2, 8, −1, 8, −2, −5, −5, 0, 4, 6, 0, 0}; {4, −6, 1, 1, −7, 1, −3, −4, −6, 0, 0, 0}; {6, −4, 7, −1, −1, 4, −2, 1, 6, 4, 0, 0}; {5, −2, 7, 3, 8, −2, 5, 7, 6, 6, 0, 0}; {, −1, 4, 3, −5, 2, −4, −1, −4, −5, 7, 0, 0}; {3, −5, 6, −5, −1, 1, −7, 3, 2, 1, 0, 0}; {3, 7, −2, −4, 0, −7, 4, −1, −2, 3, 0, 0}; {2, 6, −5, 3, −5, −1, −3, 6, 3, −1, 0, 0}; {, −2, 6, 8, 0, −3, 7, 0, 5, 0, −1, 0, 0}; {5, −5, 2, −7, −6, 6, 3, −7, 7, −1, 0, 0}; {, −1, 6, 7, −1, −6, −1, 7, 2, 0, 0, 0, 0}; {2, 7, 6, −4, 8, 2, −7, −6, 5, 3, 0, 0}; {3, 7, 2, −5, 0, 7, 8, 2, −1, −4, 0, 0}; {, −4, −2, 6, −3, −1, −7, 3, −6, 6, −1, 0, 0}; {2, 7, 6, −4, 8, 2, 8, −6, 5, 4, 0, 0}; {2, 7, 6, −4, 8, 2, 8, −6, 5, 3, 0, 0}; {6, −2, 6, 7, 1, −6, 6, 7, 7, −1, 0, 0}; {6, −2, 6, 7, 1, −6, 6, 7, 7, −2, 0, 0}; {, −2, 3, −4, 2, −1, 4, 4, −5, 7, 4, 0, 0}; {5, 3, −2, 8, 7, −3, 4, −1, 4, −3, 0, 0}; {1, −7, 0, −7, −3, −5, −3, −2, 8, 8, 0, 0}; {6, −6, 1, 7, 4, 8, 8, −4, 8, 4, 0, 0}; {, −7, 1, −7, −7, 3, −5, 8, 8, 7, −1, 0, 0}; {7, −1, −1, −7, 5, −5, 4, −3, 0, 1, 0, 0}; {, −7, −1, −6, 2, 1, −7, −7, 1, 3, 0, 0, 0}; {4, −5, 1, 1, −6, 2, −4, −4, −6, 1, 0, 0}; {, −5, 8, 1, 8, 2, 7, −2, 0, −5, −4, 0, 0}; {, −7, 4, −5, 3, −3, 0, 1, 0, 5, 6, 0, 0}; {, −6, −1, 7, −1, −4, 3, 1, 6, 6, 3, 0, 0}; {8, −2, 4, 4, −4, 4, −2, −4, −6, 1, 0, 0}; {, −3, 7, −2, 8, −3, −6, −5, −1, 7, 7, 0, 0}; {3, −4, −5, 4, 4, −6, 2, −4, 0, −1, 0, 0}; {, −4, 1, −6, 0, 6, 3, −1, 7, 5, −1, 0, 0}; {0, 4, −4, 2, 0, 5, 4, −6, 7, 4, 0, 0}; {, −2, 6, 2, 7, −4, −3, 6, 2, 0, 1, 0, 0}; {7, −2, −3, 4, 0, 4, −6, 3, 5, 3, 0, 0}; {7, −2, −3, 4, 0, 4, −6, 3, 5, 2, 0, 0}; {0, 6, −1, 7, 2, 5, 4, 1, −7, −7, 0, 0}; {8, −2, −2, 5, 0, 5, −4, 5, 4, 3, 0, 0}; {, −1, 6, −3, −3, 6, −2, −6, −6, −7, −1, 0, 0}; {, −6, 2, −7, −2, −6, −7, 8, 5, −6, −6, 0, 0}; {, −3, 6, 6, −1, 0, 6, −1, −6, −2, −2, 0, 0}; {3, −5, 1, 1, −6, 1, −4, −5, −6, 1, 0, 0}; {6, −5, 5, −3, 6, 6, −6, −6, 7, 7, 0, 0}; {2, −7, 2, −7, 5, 6, 4, 3, −7, −7, 0, 0}; {, −6, 2, −6, 5, −6, −7, −6, −3, 6, 6, 0, 0}; {1, −6, −6, 3, 2, 8, 0, −5, −1, −1, 0, 0}; {1, −6, −6, 3, 2, 8, 0, −5, −1, −2, 0, 0}; {8, −3, 5, −3, −5, 1, 1, 6, 5, 4, 0, 0}; {8, −3, 5, −3, −5, 1, 1, 6, 5, 3, 0, 0}; {8, 4, −4, 6, 3, 7, −3, 6, −7, 0, 0, 0}; {, −4, 2, 1, 8, 5, −1, 5, −7, 3, 2, 0, 0}; {7, −3, 6, −2, 7, 6, −7, −6, 7, 7, 0, 0}; {8, −3, 5, 0, 3, −3, −5, 4, −1, −3, 0, 0}; {7, 0, 7, −2, 8, 7, 6, 5, 8, −7, 0, 0}; {, −7, 5, −3, 7, 4, −7, −3, 6, −7, 1, 0, 0}; {, −1, 4, −5, 3, −4, −5, −2, −2, 5, 3, 0, 0}; {, −1, 8, −7, 1, 4, 0, −7, −1, −3, −3, 0, 0}; {, −6, 4, −3, 7, −5, −7, −6, −2, 5, 6, 0, 0}; {, −4, 4, 4, −5, −4, 6, −2, 4, −1, 0, 0, 0}; {, −5, 2, −6, −5, 4, −3, −7, 8, 8, −1, 0, 0}; {6, −4, −2, 7, 1, −4, 3, 7, 3, 0, 0, 0}; {6, −4, −2, 7, 1, −4, 3, 7, 2, 0, 0, 0}; {, −7, 1, 8, 0, −7, 8, 6, 5, 8, −7, 0, 0}; {8, −3, −1, 8, 2, −2, 3, 8, 3, 0, 0, 0}; {0, 8, 1, 1, 8, 1, 5, 5, 8, 0, 0, 0}; {, −2, 5, −5, 5, 5, −3, 3, 0, −5, −3, 0, 0}; {3, −4, −4, 5, 8, 1, −7, 5, −4, −1, 0, 0}; {, −4, −6, 5, −3, −4, 2, −7, 3, 8, −1, 0, 0}; {, −3, 2, 8, 6, 0, 6, 0, −1, −5, 1, 0, 0}; {, −1, 6, 8, 2, −4, −7, 0, 5, 1, −1, 0, 0}; {4, −5, 1, 1, −7, 1, −4, −5, −7, 0, 0, 0}; {4, 1, −5, 2, 1, 7, −3, 6, −5, 1, 0, 0}; {2, −7, −1, 4, −1, −3, −5, 8, −4, −4, 0, 0}; {, −2, 6, 5, −3, −6, 0, 6, −1, 3, 1, 0, 0}; {, −2, 6, 5, −3, −6, 0, 6, −1, 2, 1, 0, 0}; {, −1, 7, −5, 2, −6, 4, −1, −5, −5, −4, 0, 0}; {, −4, 6, −2, −7, 6, −5, −3, 7, −7, 1, 0, 0}; {, −4, 5, 0, 6, −5, −4, 6, 1, 0, −1, 0, 0}; {, −5, 3, −5, 6, −6, −7, −4, −3, 6, 5, 0, 0}; {, −7, 1, −7, 4, 8, 8, −6, −4, 6, 6, 0, 0}; {7, −5, 1, 8, 5, −6, 8, −5, −7, 5, 0, 0}; {, −4, 3, 5, −1, −6, 7, −2, 3, 0, −1, 0, 0}; {, −1, 5, 4, −6, 5, 8, −2, 7, 6, 4, 0, 0}; {, −1, 5, 4, −6, 5, 8, −2, 7, 6, 3, 0, 0}; {1, 7, −1, −1, 7, 0, −5, −6, −7, 0, 0, 0}; {, −2, 3, −6, 2, −5, −6, −2, −3, 5, 3, 0, 0}; {1, −6, 8, −1, 4, 8, 1, −4, −1, 0, 0, 0}; {5, −7, −1, 7, −1, −1, −2, 7, 3, −2, 0, 0}; {2, −7, 8, −1, −1, −6, 1, 6, 1, 1, 0, 0}; {8, 0, −3, 6, 6, −2, 3, −5, 0, −1, 0, 0}; {3, −3, −2, 8, −6, 1, −6, 7, −4, −3, 0, 0}; {4, −4, 3, 3, −3, 0, 8, 5, −4, −1, 0, 0}; {, −3, 4, −5, 0, −2, −5, −7, 7, −4, −6, 0, 0}; {, −1, −7, −5, 4, −6, 6, 0, −7, −6, −4, 0, 0}; {, −7, 1, 8, 2, 3, −5, −1, −2, −5, −4, 0, 0}; {, −6, 2, −5, 4, −7, 8, −6, −4, 7, 7, 0, 0}; {1, −6, −6, 3, 3, −7, 1, −4, 0, −1, 0, 0}; {2, −6, 2, −6, −2, −3, −3, −2, −7, 8, 0, 0}; {, −6, 1, 8, −2, −6, −7, 8, 5, −6, −6, 0, 0}; {7, 0, −1, 8, 6, −5, 3, −2, 1, −1, 0, 0}; {5, 0, 6, −3, 5, 7, 6, 4, 8, 8, 0, 0}; {7, −1, 4, 0, 0, −7, 0, −3, −7, −5, 0, 0}; {, −3, −7, 3, −3, −2, 2, 7, 2, 6, −1, 0, 0}; {3, −6, 1, 1, −7, 1, −3, −4, −7, 0, 0, 0}; {2, −3, 5, −3, 4, 5, 4, 3, 7, 8, 0, 0}; {, −3, 5, −6, 3, 2, −3, 2, −1, −5, −4, 0, 0}; {6, −7, 0, −7, −4, 5, 0, 8, 3, −1, 0, 0}; {, −4, 6, 3, −6, 1, 4, −1, −6, −3, −1, 0, 0}; {, −4, 3, −5, −1, −6, −5, 8, 5, −5, −5, 0, 0}; {5, 8, −1, −7, −5, 5, −1, 7, 3, −2, 0, 0}; {3, 7, −2, 6, −2, −3, 0, −1, 7, 4, 0, 0}; {, −6, 1, −7, −6, 3, −4, 8, −7, 8, −1, 0, 0}; {, −6, −1, 5, 5, −3, 4, −1, −2, −5, 1, 0, 0}; {7, −4, 3, −4, 5, −7, −7, 3, 0, −3, 0, 0}; {7, −1, 0, 6, −6, 3, −5, 3, −1, −1, 0, 0}; {3, −4, 4, 4, −5, 2, 7, 7, 7, 0, 0, 0}; {3, −7, 1, −7, −7, −1, −1, 4, 4, 2, 0, 0}; {4, −1, 6, −4, 5, 6, 6, 4, 8, 8, 0, 0}; {8, 2, 1, 8, −2, 3, −4, 8, −3, −1, 0, 0}; {0, 5, −3, 5, −4, −5, −2, −3, −7, 8, 0, 0}; {, −5, 5, 2, −7, 0, 3, −3, −6, −3, 0, 0, 0}; {3, −4, −1, 8, 2, −5, −6, −2, 1, 3, 0, 0}; {0, 4, −4, 3, 0, 6, 4, −7, 7, 5, 0, 0}; {7, 4, −6, 4, −5, 6, 8, −3, 6, 7, 0, 0}; {, −7, 0, 0, −7, 6, −4, 4, −3, 1, 1, 0, 0}; {, −4, 5, 6, −1, 2, −2, 8, −2, −4, −3, 0, 0}; {2, −4, 3, −4, 2, 5, 5, 3, 7, 7, 0, 0}; {4, 0, −7, 3, 1, 6, −5, 4, 8, 0, 0, 0}; {, −7, 1, −2, 4, 8, −4, 5, −1, 1, 1, 0, 0}; {, −6, −1, 6, 6, −3, 5, −1, −4, −5, 1, 0, 0}; {, −3, 6, 0, 0, 6, −1, 4, 5, 7, 0, 0, 0}; {3, −5, 1, 2, −6, 0, −4, −5, −7, 0, 0, 0}; {1, −5, −4, 6, −7, −1, −7, 6, −5, −3, 0, 0}; {, −6, 1, 1, −5, 4, −7, 4, 0, 1, −3, 0, 0}; {0, 8, −1, −1, 8, 0, −5, −6, −7, 1, 0, 0}; {, −4, 0, 7, −2, −1, −6, 5, −5, 7, 0, 0, 0}; {, −3, 5, −3, 7, −5, −6, −4, −3, 7, 6, 0, 0}; {, −2, 7, 1, 0, 8, 0, 5, 5, 7, 0, 0, 0}; {, −6, 4, 2, −7, −1, 4, −3, −7, −2, 0, 0, 0}; {, −6, 4, 2, −7, −1, 4, −3, −7, −3, 0, 0, 0}; {1, 8, 7, 0, −6, −2, 7, 2, 2, −1, 0, 0}; {0, 8, 4, −5, −3, 1, −7, 1, 3, 1, 0, 0}; {6, −3, 4, −3, 1, −1, −1, 0, −7, 8, 0, 0}; {, −4, 0, 3, −5, 4, −1, 5, −7, 5, 2, 0, 0}; {, −7, 8, 1, −5, −6, 0, 7, 2, 7, −1, 0, 0}; {, −1, 3, −4, 2, −1, 4, 5, −5, 7, 4, 0, 0}; {, −6, 0, 0, 6, 2, 5, −4, 5, 5, 3, 0, 0}; {, −4, 5, −1, 8, −4, 3, −7, −7, 8, −7, 0, 0}; {, −5, 8, 6, −2, 6, −6, 2, 8, 7, −3, 0, 0}; {6, 3, −3, 4, 2, −7, −2, 7, −4, 1, 0, 0}; {8, −2, −2, 5, 2, −3, 4, 7, 3, 1, 0, 0}; {8, −1, 5, 4, −3, 4, −2, −3, −5, 1, 0, 0}; {2, 2, −1, −1, 7, −2, 6, 2, −6, −5, 0, 0}; {5, 1, 3, −2, 2, −7, 4, 3, −7, −5, 0, 0}; {3, −7, 2, −7, 4, 6, 5, 2, −7, −7, 0, 0}; {7, 4, 1, −6, 4, −5, 3, 7, −6, −1, 0, 0}; {3, −7, 2, −7, 3, 6, 5, 1, −5, −6, 0, 0}; {, −2, 3, −7, 7, 0, 6, 1, −2, −3, 2, 0, 0}; {3, 8, 2, −7, 8, −1, −3, 4, 5, 2, 0, 0}; {, −1, 8, −3, 3, −4, −4, −6, 7, −6, −6, 0, 0}; {2, −7, 0, 0, −7, 0, −4, −5, −7, 0, 0, 0}; {7, 0, 7, 1, 2, −6, −1, −3, −6, −4, 0, 0}; {8, 6, 0, −1, 6, −6, 1, −6, 1, −2, 0, 0}; {, −7, −1, −1, 6, 1, 5, −4, 6, 3, 3, 0, 0}; {7, −3, 6, −2, 6, 6, −6, −6, 7, 7, 0, 0}; {2, −6, 2, −5, 2, 5, 6, 3, 6, 7, 0}; {0, −6, −7, 2, 2, −7, 0, −6, −1, −2, 0, 0}; {4, −3, 7, 6, −4, −3, 1, 6, 2, 3, 0, 0}; {, −1, 8, 4, −7, −2, 0, 8, 1, 2, −1, 0, 0}; {, −5, 0, 6, 6, −2, 5, −1, −2, −5, 1, 0, 0}; {3, −5, 3, −2, −1, 8, −3, −5, −7, −4, 0, 0}; {4, −3, 3, −6, 5, 7, 7, 3, 8, 8, 0, 0}; {0, 4, 7, −1, 6, 3, −7, 6, 8, 3, 0, 0}; {7, 0, −2, 7, 6, −3, 3, −4, 0, −1, 0, 0}; {, −5, −2, 7, −5, 0, −6, 5, −5, 8, 0, 0, 0}; {3, 1, −7, 2, 0, 6, −3, 6, −6, 1, 0, 0}; {5, −3, −3, 5, 7, 2, −5, 1, −2, −1, 0, 0}; {4, −4, 5, 6, −1, 8, 6, 7, 6, −2, 0, 0}; {, −5, 2, 3, −7, 6, −2, 6, −6, 4, 1, 0, 0}; {4, −5, 2, −5, −2, −3, −1, −1, −7, 8, 0, 0}; {1, −4, 6, 7, 0, −7, −1, 1, 4, −1, 0, 0}; {7, 3, −6, 4, −6, 7, 8, −3, 5, 6, 0, 0}; {, −2, 6, 6, −4, −2, 8, −1, 6, 1, 0, 0, 0}; {, −6, 3, 2, −6, −5, 6, −2, 4, −1, 0, 0, 0}; {2, −1, 8, 1, 3, −5, 3, 7, 7, −1, 0, 0}; {7, −1, −7, −3, 1, 3, −5, 5, 3, 1, 0, 0}; {1, −5, 3, −7, 3, 1, 6, 8, −1, 1, 0, 0}; {, −4, 2, 8, 7, 0, 6, 0, −2, −4, 2, 0, 0}; {, −6, −3, 5, −4, −2, −7, 3, −6, 7, −1, 0, 0}; {, −5, 5, 7, 1, 6, 3, −1, 6, −6, −5, 0, 0}; {0, 5, −6, −6, 1, 8, 2, −1, −4, 2, 0, 0}; {8, 0, 1, 8, −6, 4, −4, 5, −1, 0, 0, 0}; {, −4, 4, −3, 4, 2, 3, 2, 0, 7, 8, 0, 0}; {, −7, −4, 3, −7, 5, −6, 7, −4, −7, 5, 0, 0}; {8, 0, 8, 3, 8,

7, −6, −4, 6, 6, 0, 0}; {8, 0, 8, 3, 8, 7, −6, −4, 5, 5, 0, 0}; {0, 5, 7, −1, 7, 3, 8, −7, 6, 2, 0, 0}; {, −1, 7, −5, 1, −7, 4, −1, −5, −5, −4, 0, 0}; {, −2, −6, −2, −7, −2, 4, 1, 1, 6, 8, 0, 0}; {8, 0, 8, 8, −3, 5, −7, 8, −7, 1, 0, 0}; {3, 7, −2, 8, −6, 3, −1, 7, 2, −1, 0, 0}; {0, 4, −6, 0, 2, −3, 7, −3, −7, 1, 0, 0}; {0, −4, 6, 0, −2, 3, −7, 3, 7, −1, 0, 0}; {, −7, −2, 5, 4, −3, 4, −2, −2, −5, 1, 0, 0}; {, −3, 6, 7, −1, 3, −2, 7, −1, −4, −2, 0, 0}; {, −4, −1, 7, −3, −1, −6, 4, −5, 7, 0, 0, 0}; {7, −2, −1, 7, −7, 3, −5, 5, −2, 0, 0, 0}; {0, −7, 2, 3, −5, −6, 2, 6, 1, −1, 0, 0}; {, −7, 3, −7, −1, 8, −7, 7, 5, −7, −6, 0, 0}; {6, 2, 0, −7, 2, 8, 3, 4, 8, −3, 0, 0}; {5, −7, 0, −7, −5, 6, 0, 8, 5, −2, 0, 0}; {, −3, −2, −5, −4, 5, −4, 5, 0, −7, −6, 0, 0}; {, −5, 2, 5, −1, −7, 7, −3, 2, 1, 2, 0, 0}; {, −2, 6, −2, 5, 6, 3, 3, 2, −7, −7, 0, 0}; {3, −7, 6, −4, −6, 3, −7, −5, 6, 4, 0, 0}; {, −7, 2, −7, −2, −7, −6, 7, 5, −6, −6, 0, 0}; {7, −6, 3, 8, −3, 8, 3, −6, 7, 0, 0, 0}; {, −6, 2, 2, −5, 7, −4, 4, −1, 1, 1, 0, 0}; {, −6, 2, 2, −5, 7, −4, 4, −1, 1, 0, 0, 0}; {4, −6, 4, −4, 4, 5, −7, −7, 6, 6, 0, 0}; {8, 1, −7, 8, −1, 6, −7, 8, −7, 2, 0, 0}; {, −3, 7, −1, 6, 0, 2, 3, 2, 6, 7, 0, 0}; {, −5, 5, −2, −2, 7, −2, 3, 4, 6, 0, 0, 0}; {, −5, −7, 3, −3, −5, 1, 7, 2, 6, −2, 0, 0}; {4, −3, 4, −4, 0, −2, −2, 0, −7, 8, 0, 0}; {6, −2, 7, 8, 1, −6, 7, 8, 7, −1, 0, 0}; {, −7, −4, 4, −7, −2, −7, 4, −5, 8, 0, 0, 0}; {6, −3, 5, −2, 0, −2, −2, 1, −6, −7, 0, 0}; {, −1, 8, 1, −7, 0, 4, 5, 2, 6, 7, 0, 0}; {5, −2, −2, 7, 5, −5, 3, −3, 0, 0, 0, 0}; {4, −3, 5, −6, 5, 6, 5, 3, −7, −6, 0, 0}; {, −1, 7, 0, 7, 3, 4, 3, 2, 8, −7, 0, 0}; {, −1, 6, −3, −3, 6, −2, −6, −7, 8, −1, 0, 0}; {, −5, 4, 2, −5, −1, 5, −3, −7, −2, 0, 0, 0}; {0, 4, 5, 8, 3, −4, 7, 7, 2, 6, 0, 0}; {2, −5, 3, −7, 5, 6, 3, 3, −7, −6, 0, 0}; {, −2, 2, −6, 2, −1, 5, 3, 7, 7, 4, 0, 0}; {3, −6, −7, 1, −3, 1, 8, 2, 4, 1, 0, 0}; {, −3, 4, −4, −3, 5, −3, −6, −6, 8, 0, 0, 0}; {, −3, 4, −4, −3, 5, −3, −6, −6, 8, −1, 0, 0}; {, −2, 7, 7, 0, 3, 0, −7, −1, −4, −2, 0, 0}; {5, −5, 2, 1, −5, 2, −4, −4, −5, 1, 0, 0}; {1, 8, 8, −2, −1, −7, 1, 8, 2, 2, 0, 0}; {, −6, 4, 3, −4, 0, 5, −2, −6, −2, −2, 0, 0}; {7, 1, 0, −7, −2, 4, −4, −7, −2, −1, 0, 0}; {8, −2, −1, 8, 2, −3, 4, 8, 3, 1, 0, 0}; {, −4, 3, 3, −5, −5, 6, −2, 4, −1, 0, 0, 0}; {1, −7, 2, −7, 4, 5, 3, 2, −6, −6, 0, 0}; {7, −1, 7, −2, 2, −1, −1, 0, −6, −7, 0, 0}; {, −6, 7, −5, 7, −5, 3, −2, 0, 6, −7, 0, 0}; {, −5, −1, −2, 2, −5, −2, 6, −3, −7, 6, 0, 0}; {0, 7, 7, −1, −5, 0, 8, 1, 2, 2, 0, 0}; {6, −2, 7, 2, 7, 7, 8, −5, 6, 6, 0, 0}; {0, 3, 8, −1, −5, −1, −4, −3, −5, 6, 0, 0}; {, −3, 7, 7, 0, 4, −2, 7, −2, −3, −1, 0, 0}; {2, −3, 7, −7, 0, −6, −1, 2, 3, −2, 0, 0}; {6, 1, −5, 4, 2, 7, −5, 5, 8, 0, 0, 0}; {0, −7, 1, −6, −2, −4, −4, −1, 8, 8, 0, 0}; {5, 0, 0, −7, 1, 6, 2, 5, 5, −5, 0, 0}; {, −3, 2, −7, 1, −6, −6, −3, −3, 5, 3, 0, 0}; {5, −1, 7, −3, 5, 7, 6, 4, 8, 8, 0, 0}; {, −1, 7, −2, 7, 1, 3, 4, 2, 6, 7, 0, 0}; {8, 0, 0, 8, −7, 5, −3, 2, −1, −1, 0, 0}; {7, 6, 0, −6, −7, −1, 6, 1, 6, −2, 0, 0}; {3, −6, 2, −7, 4, 6, 6, 2, −7, −7, 0, 0}; {1, −6, 0, 8, 3, 6, 5, 2, 8, 8, 0, 0}; {4, −3, 2, −7, 1, −2, −5, −7, −6, −5, 0, 0}; {8, −2, 4, 4, −3, 4, −1, −4, −5, 1, 0, 0}; {, −4, 6, −1, 5, −1, 1, 3, 1, 6, 7, 0, 0}; {, −4, 8, 1, 7, 5, −4, 0, 8, −2, 1, 0, 0}; {, −5, 1, 7, 7, −2, 5, 0, −2, −5, 1, 0, 0}; {, −4, 6, 6, −1, 3, −2, 7, −2, −4, −2, 0, 0}; {3, −4, 4, −2, 0, 7, −4, −5, −7, −6, 0, 0}; {6, −1, 5, 1, −3, −4, 4, −6, −3, −2, 0, 0}; {0, −7, 1, 8, 2, 4, 4, 2, 8, 8, 0, 0}; {7, −4, 3, −4, 6, 8, 8, 2, −1, −4, 0, 0}; {4, −3, −3, 6, 4, −6, 3, −4, 0, 0, 0, 0}; {5, −5, −5, 3, −4, 1, −6, 4, 3, 1, 0, 0}; and {4, −1, 2, −4, 3, 0, −4, 5, 8, −5, 0, 0}.

When M=16, the first sequence set may further include some or all of the following 3737 sequences (which are marked as Seq16psk_lte_idc_high). PAPRs of sequences corresponding to these sequences are less than 2.0 dB, but a value of a cross-correlation with an LTE sequence is relatively large. These sequences belong to suboptimal sequences. The 3737 sequences are as follows:

{−3, 5, −3, 5, −3, −4, 6, 5, −1, −1, 0, 0}; {5, −3, 5, −3, 6, 6, −6, −4, 2, 3, 0, 0}; {, −5, 2, −7, 0, 8, 7, −4, −5, 4, 2, 0, 0}; {3, −5, 3, −5, 4, 4, −5, −3, 1, 2, 0, 0}; {, −7, 1, −7, 1, −5, −6, 4, 4, −3, −2, 0, 0}; {8, 0, 8, 0, −5, 7, 5, −2, 0, 2, 0, 0}; {8, 0, 8, 0, −5, 7, 6, −4, −1, 2, 0, 0}; {7, −2, 5, −4, 6, 7, 7, 2, −2, −5, 0, 0}; {, −2, 6, −2, 6, 1, 4, 4, 2, 7, 8, 0, 0}; {, −3, 5, −3, 5, 0, 3, 4, 1, 6, 7, 0, 0}; {6, −2, 6, −2, −6, 6, 4, −3, 0, 2, 0, 0}; {, −1, 7, −1, 7, 3, 4, 3, 2, 8, −7, 0, 0}; {, −4, 4, −4, 4, 0, 2, 2, 0, −7, −7, 0, 0}; {6, −3, 4, −5, 6, 7, 7, 4, −7, −7, 0, 0}; {6, −3, 4, −5, 7, 7, 7, 4, −7, −7, 0, 0}; {, −5, 3, −5, 3, 0, 2, 1, 1, 7, 8, 0, 0}; {0, −7, 2, −5, −7, −4, −3, −3, 4, 6, 0, 0}; {4, −5, 2, −7, 5, 6, 6, 3, −7, −7, 0, 0}; {, −4, 5, −2, 7, 6, −6, −3, 7, 8, 1, 0, 0}; {5, −3, 5, −3, −4, 4, 0, 2, 5, 4, 0, 0}; {8, −1, 6, −3, −5, 2, 0, 5, 5, 2, 0, 0}; {0, 7, −2, 5, 3, −5, −7, 3, 1, 0, 0, 0}; {8, 2, −4, 6, 8, 1, 4, −6, −2, −2, 0, 0}; {3, −3, 7, 1, 3, −4, 0, −7, −5, −3, 0, 0}; {6, 0, −6, 4, 6, −1, 3, −7, −3, −2, 0, 0}; {2, 8, −2, 4, 2, 8, 4, 8, 7, 3, 0, 0}; {8, −2, 4, −6, 8, −1, −4, 6, 2, 2, 2, 0, 0}; {0, −7, 2, −5, −3, 5, 7, −3, −1, 0, 0, 0}; {, −6, 2, −6, 2, 3, −6, −5, 1, 1, 2, 0, 0}; {8, 1, −6, 3, 5, −2, 0, −5, −5, −2, 0, 0}; {, −7, 2, −5, 4, 7, −7, −7, −5, 7, 6, 0, 0}; {4, −5, 2, −7, −6, 0, −1, 5, 3, 1, 0, 0}; {8, 1, −6, 3, 7, 8, 8, −5, 7, 6, 0, 0}; {1, −7, 1, −7, −4, −4, −3, −2, 8, 6, 0, 0}; {0, 8, 0, 8, −5, −5, −4, −2, 8, 7, 0, 0}; {, −3, 5, −3, 5, 8, 8, −4, −4, 5, 5, 0, 0}; {1, −7, 1, −7, −3, −4, −3, −2, 8, 7, 0, 0}; {, −5, 3, −5, 3, 7, −5, −4, 4, 1, −1, 0, 0}; {1, −7, 1, −7, −2, −4, −4, −2, −7, 8, 0, 0}; {8, 0, 8, 0, 5, 7, −4, −4, 4, 2, 0, 0}; {6, −2, 6, −2, 4, 6, −4, −3, 2, 1, 0, 0}; {5, −3, 5, −3, 4, 4, −5, −4, 1, 2, 0, 0}; {5, −2, 7, 0, 8, −7, 4, 5, −4, −2, 0, 0}; {, −5, 3, −5, 3, −6, −6, 6, 4, −2, −3, 0, 0}; {5, −3, 5, −3, 4, 5, −5, −4, 2, 2, 0, 0}; {, −5, 3, −5, 4, −5, −7, 8, −5, −7, 7, 0, 0}; {2, −6, 2, −5, 2, 3, −6, −5, 1, 1, 0, 0}; {, −7, 1, −7, 2, −5, 8, 7, −3, 0, 3, 0, 0}; {4, −5, 2, −6, 2, 0, −7, 7, 1, 0, 0, 0}; {, −4, 3, −6, 2, −6, −7, −3, −3, 4, 3, 0, 0}; {, −4, 3, −6, 2, −6, −7, −2, −2, 4, 3, 0, 0}; {, −5, 2, −7, 1, −7, 8, −3, −3, 4, 3, 0, 0}; {, −4, 3, −6, 2, −6, −7, −1, −1, 4, 3, 0, 0}; {0, 8, 0, −7, 2, 2, −7, −5, 0, 1, 0, 0}; {8, 0, 8, 1, −6, −6, 5, 5, −3, −2, 0, 0}; {, −7, 0, 7, −1, 7, −7, −6, 3, 0, −3, 0, 0}; {3, −6, 1, −7, 2, −1, 8, 7, 0, 0, 0, 0}; {7, −2, 5, −3, 7, 8, 7, 3, −2, −4, 0, 0}; {6, −3, 4, −4, 6, 7, 7, 2, −2, −4, 0, 0}; {, −6, 2, −6, 3, −1, 2, 2, 1, 6, 7, 0, 0}; {, −7, 1, −7, 2, −2, 1, 1, 0, 6, 7, 0, 0}; {1, 8, −1, 7, 3, 4, 5, 2, 8, 8, 0, 0}; {0, 7, −2, 6, 2, 4, 4, 1, −4, −6, 0, 0}; {5, −4, 3, −5, 7, 7, 6, 5, −7, −7, 0, 0}; {, −6, 2, −6, 3, 0, 1, 1, 1, 6, 8, 0, 0}; {, −7, −1, 5, −4, 8, 8, 8, 4, −2, −5, 0, 0}; {4, −4, 4, −3, −5, −2, −2, −2, 8, 8, 0, 0}; {0, −7, 2, −4, −3, 5, 7, −4, 0, −1, 0, 0}; {1, 8, −1, 7, 6, −2, −5, 2, 3, 1, 0, 0}; {6, −1, 8, 2, 3, −3, −1, −6, −5, −3, 0, 0}; {, −5, 3, −5, 4, 4, −3, 0, −2, −5, −4, 0, 0}; {, −1, 3, 7, −4, −7, 4, −1, 2, −2, 3, 0, 0}; {8, 1, −6, 4, 7, −7, −7, −5, 6, 6, 0, 0}; {, −1, 8, 1, −5, −2, 4, −5, −5, −7, −6, 0, 0}; {4, −3, 6, 0, 4, 6, 7, −6, 6, 5, 0, 0}; {, −4, 4, −4, 5, 8, −7, −6, −3, 7, 6, 0, 0}; {, −2, 7, 0, −6, −2, 3, −5, −5, −7, −6, 0, 0}; {, −1, 7, −1, 8, −4, −5, −4, −2, 7, 7, 0, 0}; {, −3, 5, −3, 6, −6, −7, −5, −3, 7, 7, 0, 0}; {, −4, 4, −4, 5, −7, 8, −5, −4, 7, 7, 0, 0}; {, −5, 3, −5, 4, 8, 8, −5, −4, 6, 6, 0, 0}; {, −3, 6, −1, −7, −2, 2, −5, −5, −7, −6, 0, 0}; {1, 8, −1, 7, −6, −2, −2, 6, 3, −1, 0, 0}; {, −2, 6, −2, 7, −4, −5, −5, −3, 8, 7, 0, 0}; {, −2, 6, −2, 7, −4, −5, −4, −2, 5, 5, 0, 0}; {, −6, 2, −6, 3, 8, 8, −5, −4, 4, 4, 0, 0}; {1, 8, −1, 7, −5, −5, 0, −1, 6, 4, 0, 0}; {5, −3, 5, −2, 3, 5, −5, −5, 3, 2, 0, 0}; {, −2, 6, −2, 7, −3, −6, −6, −3, −7, 8, 0, 0}; {, −2, 5, −4, 4, −7, −7, −1, −2, 5, 3, 0, 0}; {4, −4, 4, −3, 3, 5, −5, −5, 3, 2, 0, 0}; {, −5, 3, −5, 5, −5, −7, −7, −4, 8, 7, 0, 0}; {0, 8, 0, −6, 0, 2, −7, −7, 2, 1, 0, 0}; {, −3, 4, −5, 4, −7, −4, −3, 5, 2, −1, 0, 0}; {8, 0, 8, 2, −6, 8, 7, −3, 1, 3, 0, 0}; {, −2, 6, −2, 8, 0, 1, 7, 8, 1, 2, 0, 0}; {, −6, 1, 8, 1, 8, 8, −2, −2, 3, 2, 0, 0}; {0, 7, −2, 7, −1, −5, −6, −3, −7, 8, 0, 0}; {2, 8, −2, 6, −3, −5, 1, 0, 5, 3, 0, 0}; {7, −2, 5, −2, 6, 6, −3, −3, 2, 1, 0, 0}; {4, −4, 4, −2, −5, −1, −1, −1, 5, 6, 0, 0}; {3, −6, 1, −6, 6, −2, −1, 5, 3, 1, 0, 0}; {6, −1, 8, 3, 3, −3, 0, −6, −5, −3, 0, 0}; {6, −1, 8, 3, 3, −3, 1, −6, −5, −2, 0, 0}; {, −2, 4, −6, 2, 0, 6, 4, 6, 7, 5, 0, 0}; {, −3, 3, −7, 1, −1, 5, 3, 6, 6, 5, 0, 0}; {1, 8, −1, 8, −7, −5, 4, 2, −3, −5, 0, 0}; {8, −1, 6, −1, 1, 0, 0, 1, −6, 8, 0, 0}; {, −6, 2, −6, 4, 7, 8, −6, −4, 6, 6, 0, 0}; {3, −4, 5, 0, 4, 6, 7, −6, 5, 5, 0, 0}; {, −5, 3, −5, 5, −7, −7, −5, −4, 6, 6, 0, 0}; {4, −5, 2, −5, −2, −3, −1, −1, 8, 7, 0, 0}; {, −7, 1, −7, 3, 8, 8, −6, −4, 5, 5, 0, 0}; {5, −3, 5, −1, 4, 4, −6, −5, 3, 3, 0, 0}; {, −1, 6, −3, 6, −6, −6, −1, −2, 6, 4, 0, 0}; {2, −6, 2, −4, 1, 3, −6, −6, 2, 2, 0, 0}; {1, −7, 1, −5, 0, 3, −6, −6, 2, 1, 0, 0}; {, −4, 3, −6, 3, 7, −4, −4, 4, 1, −2, 0, 0}; {7, −1, 7, 2, 8, 7, 8, −5, 6, 6, 0, 0}; {5, −5, 1, −6, −2, −3, 2, 0, 8, 5, 0, 0}; {8, −1, 6, 0, 5, 6, −3, −4, 4, 2, 0, 0}; {, −4, 4, −4, 7, −3, 0, 8, 8, 1, 0, 0, 0}; {1, 8, −1, −7, −1, −4, −5, −2, −7, 8, 0, 0}; {6, −2, 6, 1, 8, 6, 7, −6, 7, 6, 0, 0}; {8, −1, 6, 0, 6, 6, −4, −4, 4, 3, 0, 0}; {1, 7, −3, 6, −5, −5, 1, 0, 6, 3, 0, 0}; {1, 7, −3, 6, −4, −5, 0, −1, 6, 4, 0, 0}; {8, −2, 4, −3, 4, −1, −3, −1, −5, −7, 0, 0}; {, −3, 3, −7, 2, −6, −5, −3, 4, 2, −1, 0, 0}; {4, −5, 2, −4, 5, 4, −5, −3, 1, 1, 0, 0}; {, −2, 4, −6, 3, −5, −6, 0, 0, 4, 2, 0, 0}; {, −3, 3, −7, 2, −6, −7, −1, −1, 4, 2, 0, 0}; {7, −4, 1, −7, 0, −2, 4, 3, 6, 3, 0, 0}; {0, 7, −2, 8, 3, 2, −7, −3, 0, 1, 0, 0}; {3, −4, 5, 1, 1, −5, −1, −7, −6, −3, 0, 0}; {4, −7, −2, 6, 2, −7, 5, −7, 7, 4, 0, 0}; {, −2, 5, −4, 6, 5, −3, 1, 0, −4, −3, 0, 0}; {7, −3, 3, −4, −6, 2, 5, 3, −2, −2, 0, 0}; {4, −7, −2, 6, 4, −7, 7, 8, −7, 5, 0, 0}; {, −4, 3, −6, 4, 4, −4, 1, −1, −5, −4, 0, 0}; {8, 0, 8, 3, 6, 7, −7, −4, 6, 6, 0, 0}; {, −7, −1, 5, −1, 8, 6, −3, −1, 2, 2, 0, 0}; {5, −5, 1, −5, −7, 0, 4, 2, −2, −3, 0, 0}; {, −3, 1, 5, −3, −7, −1, −5, −5, −5, 5, 0, 0}; {, −3, 3, −7, 4, −3, −5, 7, −1, 2, 2, 0, 0}; {, −1, 3, 7, 0, 8, 4, −2, 6, 6, 3, 0, 0}; {3, −5, 3, 1, 5, −1, 4, 7, 7, 7, 0, 0}; {0, −6, 4, 4, −5, −5, 0, 5, 0, 1, 0, 0}; {5, −1, −7, −7, 2, −5, 0, 2, 5, −1, 0, 0}; {8, −3, 2, −3, 4, 2, −4, 4, 4, 4, 0, 0}; {, −3, 1, 5, −1, 7, 3, −3, 5, 6, 4, 0, 0}; {1, 4, 7, 0, 8, 4, −2, 6, 8, 3, 0, 0}; {3, −2, −7, −5, 3, 4, −5, 1, −3, −2, 0, 0}; {, −5, 5, −1, 0, 8, 8, −1, 4, −1, −1, 0, 0}; {, −6, 3, −4, −4, 5, −2, 2, 4, 6, −1, 0, 0}; {8, 1, −6, −6, 3, −3, 1, 2, 6, −1, 0, 0}; {, −5, −1, 3, −2, 3, −6, 6, 1, 7, 4, 0, 0}; {5, −6, −1, −5, 2, 1, −6, 3, 3, 3, 0, 0}; {, −7, −4, −1, −7, −2, −5, 2, −6, 8, 5, 0, 0}; {, −7, −1, 5, 2, −5, −6, 4, −3, 1, 1, 0, 0}; {, −2, 2, 6, 1, 8, 5, −3, 6, 5, 4, 0, 0}; {, −3, 1, 5, 0, 7, 5, −3, 5, 6, 3, 0, 0}; {1, 6, −5, 7, −1, −2, 7, 1, 3, 2, 0, 0}; {3, 6, −7, 3, −6, 6, −1, 7, 8, 5, 0, 0}; {2, 5, 8, 2, −7, 6, −2, 7, 8, 4, 0, 0}; {, −7, −5, −3, 6, −3, −7, 1, −7, −6, 5, 0, 0}; {6, 4, 2, 8, 2, 6, −2, 6, 7, −6, 0, 0}; {6, 4, 2, 8, 2, 7, −2, 6, 6, −5, 0, 0}; {6, 4, 2, 8, 2, 7, −1, 6, 7, −6, 0, 0}; {, −1, −4, −7, −2, 7, −5, 2, −7, −7, −4, 0, 0}; {8, 4, 0, 4, −4, −1, 6, −3, −5, −3, 0, 0}; {, −7, 5, 1, 5, −2, −2, 5, −4, −4, −4, 0, 0}; {7, 3, −1, 3, −4, −3, 4, −5, −4, −4, 0, 0}; {6, 2, −2, 2, −5, −3, 5, −4, −6, −4, 0, 0}; {6, 2, −2, 2, −5, −3, 5, −4, −5, −3, 0, 0}; {, −5, 8, 5, −6, 4, 7, 0, 8, −7, −5, 0, 0}; {4, 0, −4, 0, −6, −5, 4, −5, −5, −4, 0, 0}; {2, −2, −6, −2, 8, −6, 2, −7, −4, −4, 0, 0}; {8, 2, −4, −2, 6, 6, −2, 3, −1, −2, 0, 0}; {, −5, 8, 5, −6, 7, 1, 6, −4, 7, −5, 0, 0}; {5, 8, −5, 6, −7, −1, −6, 4, −7, 5, 0, 0}; {, −2, 5, −4, −5, 4, 5, −2, −6, −1, 0, 0, 0}; {8, −2, 4, 2, −6, −6, 2, −3, 1, 2, 0, 0}; {8, −2, 4, 2, −6, −6, 3, −3, 1, 1, 0, 0}; {8, −5, −2, −7, −2, −5, 2, −6, 7, 5, 0, 0}; {, −4, 0, 4, 0, 6, 5, −4, 5, 5, 4, 0, 0}; {3, 8, −3, −6, 2, −1, −7, 2, 3, 1, 0, 0}; {5, 8, −5, 6, −4, −7, 0, 8, 7, 5, 0, 0}; {, −6, −2, 2, −2, 5, 3, −5, 4, 5, 3, 0, 0}; {, −6, −2, 2, −2, 5, 3, −5, 4, 6, 4, 0, 0}; {4, 7, −6, 5, −5, 8, −1, 8, 7, 5, 0, 0}; {4, 7, −6, 5, −5, −7, 0, 8, 7, 5, 0, 0}; {3, 6, −7, 4, −6, 8, 0, 8, 7, 5, 0, 0}; {7, −5, −1, −5, 2, 2, −5, 4, 4, 4, 0, 0}; {3, 0, −3, 2, 2, −3, 3, −7, 5, −6, 0, 0}; {8, −4, 0, −4, 4, 1, −6, 3, 5, 3, 0, 0}; {1, 4, 7, 2, −7, 5, −2, 7, 7, 4, 0, 0}; {, −6, −4, −2, 8, −2, −7, 1, −6, −7, 6, 0, 0}; {, −1, 2, 5, 0, 7, 4, −3, 6, 7, 4, 0, 0}; {0, 1, 2, −5, 1, −4, 4, −4, −5, 6, 0, 0}; {8, 6, 4, −5, 4, 8, −1, 7, 6, −4, 0, 0}; {0, −3, −6, 0, −7, −4, 3, −6, 8, −3, 0, 0}; {, −3, −6, 7, −3, 6, −6, 1, −7, 8, −5, 0, 0}; {, −1, −6, 5, −7, 1, 2, −7, −1, −3, −2, 0, 0}; {4, 0, −4, 1, −6, −4, 4, −5, −6, −3, 0, 0}; {, −2, −7, 4, 8, 0, 1, 8, −1, −3, −2, 0, 0}; {4, 0, −4, 1, −6, −3, 3, −5, −6, −4, 0, 0}; {, −3, 8, 3, 7, −1, 1, 7, −2, −3, −2, 0, 0}; {7, 1, −5, −2, 5, 6, −4, 3, −1, −1, 0, 0};

{7, 4, 1, 7, 2, 5, −2, 6, 8, −5, 0, 0}; {5, −1, −7, −4, 4, 4, −5, 1, −1, −2, 0, 0}; {5, 1, −3, 2, −3, 6, −6, −1, −7, −4, 0, 0}; {, −3, 2, 7, 5, −3, −4, 5, −1, 3, 2, 0, 0}; {1, 7, −3, −4, 5, 6, −1, −6, 0, 0, 0, 0}; {, −1, 2, 5, 1, 8, 4, −3, 6, 7, 4, 0, 0}; {, −1, −4, −7, 0, 8, −4, 2, −6, 8, −3, 0, 0}; {5, 1, −3, 3, −5, −2, 5, −5, −6, −2, 0, 0}; {4, 0, −4, 2, −6, −3, 4, −5, −6, −3, 0, 0}; {3, −1, −5, 1, −7, −3, 3, −5, −6, −4, 0, 0}; {1, −3, −7, −1, 8, −5, 2, −6, −6, −3, 0, 0}; {8, 3, −2, 3, −4, −2, 4, −4, −4, −4, 0, 0}; {1, 7, −3, −3, 6, 6, 0, −5, 0, −1, 0, 0}; {0, 6, −4, −4, 5, 5, 0, −5, 0, −1, 0, 0}; {1, −3, −7, 0, 8, −4, 2, −6, −6, −3, 0, 0}; {, −6, 5, 0, 6, −3, 0, 6, −3, −4, −2, 0, 0}; {7, 2, −3, 4, 3, −4, −1, −7, −4, 0, 0, 0}; {4, −4, 4, 8, 5, −4, 8, 6, 7, 7, 0, 0}; {8, 1, −6, −1, −1, 6, 1, 3, 6, 4, 0, 0}; {6, −1, 8, −3, −3, 5, 0, 2, 5, 4, 0, 0}; {, −5, 5, −1, 5, 7, 0, −4, −2, 2, 3, 0, 0}; {7, 1, −5, 1, 8, 8, 4, −2, −1, 1, 0, 0}; {5, −3, 5, −6, 5, 6, 5, 3, −6, −6, 0, 0}; {8, −2, 4, 7, 1, 0, −3, −7, −2, −3, 0, 0}; {, −3, 5, −3, 2, 1, 8, 3, 5, 7, 4, 0, 0}; {, −2, 6, −2, 3, 2, −6, 4, 5, 7, 6, 0, 0}; {, −4, 7, 2, −6, −4, 7, −7, 8, 7, −5, 0, 0}; {2, −5, 4, −6, −5, 3, −1, 0, 4, 3, 0, 0}; {, −3, 4, −5, −1, −1, 5, 0, 7, 6, 2, 0, 0}; {, −3, 4, −5, −1, −1, 5, 1, 7, 6, 3, 0, 0}; {, −2, 7, 0, 6, −6, −3, 5, 1, −2, −1, 0, 0}; {0, −5, 6, −2, 4, 3, 4, −5, −1, 3, 0, 0}; {, −6, 4, −2, 5, −5, 8, 8, −2, 1, 4, 0, 0}; {8, 2, −4, 3, −7, 7, 8, −3, 1, 4, 0, 0}; {6, 0, −6, 1, 7, 5, 7, −4, 1, 4, 0, 0}; {, −4, 5, 2, 4, −6, −5, 6, 4, −2, −2, 0, 0}; {7, 1, −5, 2, −7, 6, 6, −3, 0, 3, 0, 0}; {7, 1, −5, 2, −7, 6, 6, −3, 1, 4, 0, 0}; {6, 0, −6, 1, 8, 6, 6, −3, 0, 4, 0, 0}; {, −6, 5, 0, 8, 0, 0, 1, −7, −3, 2, 0, 0}; {1, −5, 5, −4, 4, 5, 0, 1, −5, −3, 0, 0}; {2, −4, 6, −3, 5, 7, 0, 0, −3, −3, 0, 0}; {, −4, 5, −2, 4, −5, −4, 5, 3, −1, −1, 0, 0}; {2, −4, 6, −3, 6, 6, 0, 0, −4, −2, 0, 0}; {, −1, −7, 3, −6, 3, 5, −1, 0, −5, −4, 0, 0}; {, −1, −7, 3, −6, 4, 5, 0, 1, −6, −4, 0, 0}; {2, −5, 4, −6, 3, 6, 7, 4, 7, −7, 0, 0}; {, −2, 8, 2, −7, 4, 5, −1, 0, −6, −4, 0, 0}; {, −5, 3, −5, 0, −7, −7, −7, 3, −1, −4, 0, 0}; {0, −7, 2, 8, 2, 5, 6, 3, 7, 8, 0, 0}; {0, −7, 2, 8, 2, 6, 6, 3, 7, 8, 0, 0}; {4, −4, 4, −7, 3, 0, 8, 8, −1, 0, 0, 0}; {, −5, 5, −1, 6, 2, 3, −2, 0, 8, −5, 0, 0}; {, −2, 7, 0, 6, 1, 3, 4, 1, 7, 8, 0, 0}; {1, −7, 1, 7, 1, −1, 7, 7, −1, −1, 0, 0}; {5, −3, 5, −5, 5, 7, 7, 4, 8, −7, 0, 0}; {, −6, 3, −4, 3, −2, 1, 2, 0, 6, 7, 0, 0}; {4, −3, 6, −3, −7, 5, 4, −5, −2, 2, 0, 0}; {, −3, 5, −3, 3, −2, −7, 7, −1, 1, 3, 0, 0}; {, −5, 3, −5, 1, −4, −4, 6, 5, −3, −3, 0, 0}; {7, −1, 7, −3, 8, 8, 6, 4, −5, −5, 0, 0}; {4, −4, 4, −6, 5, 6, 5, 3, −7, −7, 0, 0}; {4, −4, 4, −6, 5, 6, 5, 3, −6, −6, 0, 0}; {1, 7, −3, 1, −5, 5, −2, −5, −4, −5, 0, 0}; {, −5, 2, −7, −2, −7, −7, 8, 5, −5, −6, 0, 0}; {6, −3, 4, −7, 5, −1, 7, 7, −7, 8, 0, 0}; {, −6, 3, −4, 3, 1, 2, 0, 1, 7, 8, 0, 0}; {, −5, 2, −7, −2, −6, −6, 8, 5, −5, −6, 0, 0}; {1, −6, 3, −6, −6, 2, −2, 0, 4, 3, 0, 0}; {, −3, 4, −5, 0, −1, 5, 2, 7, 6, 3, 0, 0}; {8, 3, −2, 7, −6, 5, 8, 6, 7, −5, 0, 0}; {, −3, 6, −1, 6, −6, 2, 1, −5, −3, −1, 0, 0}; {, −5, 3, −5, 1, 4, 1, 1, 2, 8, 7, 0, 0}; {6, −1, 8, −1, 4, 8, −6, 2, 0, −1, 0, 0}; {3, −3, 7, −1, 6, 5, 5, −5, −1, 3, 0, 0}; {, −6, 3, −4, 3, −6, −6, 4, 3, −2, −2, 0, 0}; {, −7, 2, −5, 2, −7, −6, 3, 2, −2, −2, 0, 0}; {, −2, 8, 2, −6, 2, 4, 0, 1, −6, −4, 0, 0}; {, −3, 5, −3, 3, −7, −4, −3, 5, 2, −1, 0, 0}; {, −1, −7, 3, −5, 4, 3, 2, −6, −3, 1, 0, 0}; {, −2, 8, 2, −6, 3, 2, 2, −6, −3, 2, 0, 0}; {, −2, 8, 2, −6, 3, 5, −1, 0, −5, −3, 0, 0}; {7, 0, −7, 0, 8, −7, 4, 4, −4, −3, 0, 0}; {, −1, 8, 1, 8, 0, 2, 8, −7, 0, 0, 0, 0}; {, −4, 4, −4, 2, −6, −7, −3, −3, 4, 3, 0, 0}; {6, −1, 8, −1, 8, 8, 2, 2, −3, −2, 0, 0}; {6, −1, 8, −1, 8, 8, 3, 3, −4, −3, 0, 0}; {6, −1, 8, −1, 8, −7, 2, 2, −3, −3, 0, 0}; {2, −6, 2, 8, 1, −3, −4, −1, −5, −6, 0, 0}; {, −2, 6, −2, 5, −2, −3, 6, 5, −1, −1, 0, 0}; {5, −3, 5, −4, 5, 7, 8, 5, 7, −7, 0, 0}; {, −2, 6, −2, 5, −1, −3, 6, 6, −2, −1, 0, 0}; {, −4, 4, −4, 3, −3, −5, 5, 5, −3, −2, 0, 0}; {1, −6, 3, −5, 7, 3, 3, −6, −3, 1, 0, 0}; {, −7, 1, −7, 0, −5, 7, 6, −3, 0, 2, 0, 0}; {, −5, 3, −5, 2, −3, −5, 5, 5, −3, −2, 0, 0}; {, −1, 8, 1, −7, 5, 5, 0, 1, −6, −4, 0, 0}; {2, −6, 2, −7, 4, 5, 4, 2, −5, −5, 0, 0}; {1, −7, 1, 8, 3, 4, 4, 2, 8, 8, 0, 0}; {, −1, 7, −1, 6, 1, 3, 3, 0, −5, −6, 0, 0}; {1, −7, 1, 8, 3, 6, 6, 3, 7, 8, 0, 0}; {0, 8, 0, 7, 3, 4, 3, 2, 8, −7, 0, 0}; {2, −7, 0, 6, 2, −3, 5, 5, 7, 6, 0, 0}; {3, −4, 5, −3, −5, −2, −1, −3, 5, 6, 0, 0}; {7, −2, 5, −5, 7, 8, 7, 3, −6, −7, 0, 0}; {, −7, 1, −7, 0, −1, 6, 2, 3, 6, 5, 0, 0}; {, −6, 1, 8, −2, −3, 3, 2, 7, 5, 3, 0, 0}; {4, −4, 4, −5, −5, 4, 4, 0, −3, −1, 0, 0}; {4, −4, 4, −5, −4, 4, 4, −1, −3, 0, 0, 0}; {, −3, 6, −1, 7, −7, 2, 1, −5, −2, −1, 0, 0}; {1, −6, 3, −5, −2, 5, 7, −2, −1, 0, 0, 0}; {, −7, 1, −7, 0, 3, 0, 0, 2, 7, 7, 0, 0}; {, −4, 4, −4, 3, 7, −5, −4, 4, 1, −1, 0, 0}; {, −4, 4, −4, 3, 7, −5, −4, 5, 2, −1, 0, 0}; {5, −3, 5, −4, 1, −1, −2, 0, −6, −7, 0, 0}; {, −7, 2, −5, 3, −7, 8, −7, −3, 2, 4, 0, 0}; {4, −4, 4, −5, 1, −2, −4, −2, −5, −7, 0, 0}; {, −4, 4, −4, 3, −7, −7, −3, −3, 4, 3, 0, 0}; {5, −4, 3, −7, −2, −1, −1, 8, 4, −1, 0, 0}; {7, 0, −7, 1, −7, 7, 6, −3, 0, 3, 0, 0}; {0, 8, 0, 7, −2, −2, 7, 5, 0, −1, 0, 0}; {, −1, 7, −1, 6, −3, −3, 7, 5, −1, −2, 0, 0}; {4, −3, 6, −2, 6, 7, 2, 2, −4, −3, 0, 0}; {5, −2, 7, −1, 7, 8, 3, 3, −4, −3, 0, 0}; {4, −3, 6, −2, 6, 7, 3, 3, −4, −3, 0, 0}; {0, 8, 0, 7, −1, −2, 7, 5, 0, −1, 0, 0}; {6, −2, 7, −2, 6, 6, −6, −5, 3, 3, 0, 0}; {, −4, 4, −3, 4, −4, −4, 5, 4, −1, −1, 0, 0}; {, −5, 3, −4, 3, −5, −5, 5, 3, −1, −2, 0, 0}; {2, −6, 3, −6, 2, 3, −7, −6, 1, 1, 0, 0}; {8, 0, −7, 0, −6, −7, 4, 4, −4, −3, 0, 0}; {, −6, 1, −7, −1, 8, −7, −7, 3, −1, −4, 0, 0}; {2, −7, 1, 7, 1, −3, −4, −1, −5, −6, 0, 0}; {8, 0, −7, 0, −5, −7, 4, 4, −4, −2, 0, 0}; {4, −4, 5, −4, 7, 7, 3, 3, −5, −4, 0, 0}; {1, −7, 2, −7, 4, 5, 3, 2, −5, −5, 0, 0}; {, −3, 5, −2, 5, 0, 2, 2, 0, 8, 8, 0, 0}; {, −4, 2, −7, −2, 8, 2, −4, −7, −6, −6, 0, 0}; {3, −6, 2, 8, 3, −1, 8, 7, −1, 0, 0, 0}; {, −2, 6, −1, 6, 2, 4, 2, 1, 8, 8, 0, 0}; {7, −2, 6, −4, 7, 8, 6, 4, −6, −6, 0, 0}; {, −4, 4, −3, 4, 0, 2, 2, 0, 8, 8, 0, 0}; {, −5, 3, −4, 3, −1, 1, 1, −1, −7, −7, 0, 0}; {5, −4, 4, −6, 5, 6, 6, 2, −5, −6, 0, 0}; {5, −4, 4, −6, 5, 6, 6, 2, −4, −6, 0, 0}; {, −1, 5, −4, 1, −5, −5, −6, 5, −2, −4, 0, 0}; {4, −5, 3, −7, 4, 6, 5, 2, −7, −7, 0, 0}; {3, −6, 2, 8, 4, 6, 5, 2, −7, −7, 0, 0}; {, −6, 0, 7, −4, 7, 1, −5, −7, −6, −6, 0, 0}; {6, −3, 5, −5, 7, 6, 6, 3, −5, −5, 0, 0}; {, −2, 6, −1, 6, 3, 4, 2, 2, 8, 8, 0, 0}; {, −5, 3, −4, 3, 0, 2, 1, 0, 8, 8, 0, 0}; {, −3, 4, −4, 2, 0, −7, 3, 4, 6, 5, 0, 0}; {, −3, 4, −4, 2, 0, −7, 3, 4, 7, 5, 0, 0}; {6, −2, 7, −2, −2, 4, 0, 2, 6, 4, 0, 0}; {3, −3, 8, 1, 3, −4, 0, −7, −4, −3, 0, 0}; {, −4, 3, −5, 1, 0, 7, 3, 4, 7, 4, 0, 0}; {, −6, 2, −5, 2, 4, −6, −5, 2, 1, 1, 0, 0}; {8, 0, −7, 0, 2, −7, −7, 0, 1, 1, 0, 0}; {2, −7, 1, 7, −7, 4, 3, −7, 7, −1, 0, 0}; {2, −7, 1, 7, −7, 4, 3, −7, 7, 0, 0, 0}; {, −1, 8, 2, −6, −1, 5, 7, 0, −1, −2, 0, 0}; {2, −6, 3, −6, −1, −4, −4, 0, 7, 7, 0, 0}; {8, 1, −5, 3, −7, 8, 8, −3, 1, 4, 0, 0}; {0, 8, 1, 8, −3, −3, −4, −2, −6, 8, 0, 0}; {, −7, 0, 8, −2, 3, 2, −5, 6, 2, 0, 0, 0}; {1, 8, 0, 6, −5, −2, −2, 6, 2, −1, 0, 0}; {, −5, 3, −4, 3, −6, −6, 3, 2, −2, −2, 0, 0}; {7, −1, 8, 0, 7, 8, −6, −5, 8, 7, 0, 0}; {, −4, 3, −5, 2, 8, −5, −4, 5, 2, −2, 0, 0}; {, −1, 7, 0, 8, 0, 1, 8, −7, 0, 1, 0, 0}; {5, −3, 6, −2, 7, 7, 2, 2, −4, −3, 0, 0}; {, −2, 6, −1, 7, 0, 1, 8, −6, 0, 1, 0, 0}; {, −5, 4, −2, 7, 2, 1, 1, 8, −4, 1, 0, 0}; {4, −4, 5, −3, 7, 7, 2, 2, −4, −3, 0, 0}; {5, −3, 6, −2, 8, −7, 3, 3, −3, −3, 0, 0}; {3, −5, 4, −4, 7, 4, 3, −5, −2, 1, 0, 0}; {0, 6, −3, 3, −4, −5, −1, −3, 6, 2, 0, 0}; {0, 6, −3, 3, −4, −4, −5, 5, 0, −3, 0, 0}; {, −6, 2, −5, 3, −2, 1, 2, 0, 6, 7, 0, 0}; {3, −6, 2, −7, 4, 6, 6, 3, 8, −7, 0, 0}; {, −3, 4, −4, 3, −2, −3, 7, 6, −2, −2, 0, 0}; {, −6, 2, −5, 3, −1, 1, 1, 0, 7, 8, 0, 0}; {3, −6, 2, −7, 5, 6, 5, 3, −7, −7, 0, 0}; {1, 8, 0, 7, 3, 4, 4, 2, −7, −7, 0, 0}; {0, 7, −1, 6, 2, 4, 4, 1, 8, 8, 0, 0}; {, −5, 3, −4, 4, 1, 2, 1, 1, 7, 8, 0, 0}; {3, −6, 2, −7, 6, 6, 5, 3, −7, −7, 0, 0}; {5, −4, 4, −5, 8, −1, −1, 5, 4, 2, 0, 0}; {, −6, 1, −7, 0, −3, −7, 0, 2, 5, 5, 0, 0}; {2, −6, 3, −5, −5, 1, −2, 0, 5, 4, 0, 0}; {0, −7, 3, −4, −3, 5, 7, −3, 0, −2, 0, 0}; {0, −7, 3, −4, −3, 5, 7, −3, 0, −1, 0, 0}; {2, −4, 7, 1, 3, −4, 1, −7, −4, −2, 0, 0}; {, −4, 3, −5, 2, 1, 7, 3, 4, 7, 5, 0, 0}; {3, −6, 2, −7, −7, −1, −2, 4, 4, 2, 0, 0}; {2, −4, 7, 1, 4, −3, 1, −7, −4, −3, 0, 0}; {2, −7, 1, 8, 8, −2, −1, 6, 3, 1, 0, 0}; {6, −5, 1, 6, 4, −7, 4, −5, 8, 4, 0, 0}; {, −7, −1, 6, −4, −5, 2, −2, 6, 5, 2, 0, 0}; {6, −2, 7, −1, 1, 8, −7, 0, 1, 0, 0, 0}; {6, −2, 7, −1, 1, 8, −7, 0, 1, 1, 0, 0}; {0, 7, −1, 6, 7, −2, −3, 3, 3, 3, 0, 0}; {4, −4, 5, −3, 0, 7, 8, 0, 0, −1, 0, 0}; {, −2, 6, −1, 7, −5, −5, −5, −3, 8, 7, 0, 0}; {0, 8, 1, −7, −2, −4, −4, −2, −7, 8, 0, 0}; {, −6, 1, −7, 0, 4, 1, 0, 1, −5, −6, 0, 0}; {, −2, 6, −1, 7, −3, −6, −6, −3, −7, 8, 0, 0}; {, −3, 5, −2, 6, −4, −5, −5, −3, 8, 8, 0, 0}; {, −1, 6, −2, 5, −6, −3, −3, 6, 2, −1, 0, 0}; {, −3, 4, −4, 3, 8, −4, −4, 5, 2, −2, 0, 0}; {, −4, 3, −5, 2, 7, −5, −5, 4, 1, −2, 0, 0}; {5, −4, 4, −4, 1, −2, −3, −1, −6, −7, 0, 0}; {, −3, 4, −4, 4, −7, −7, −3, −3, 5, 4, 0, 0}; {, −5, 2, −6, 2, 7, 8, −2, −2, 4, 2, 0, 0}; {0, 8, 1, −6, 0, 3, −7, −7, 2, 1, 0, 0}; {4, −5, 3, −5, 1, −2, −3, −1, −6, −7, 0, 0}; {3, −6, 2, −6, 0, −2, −3, −1, −6, −7, 0, 0}; {4, −4, 5, −2, 5, 6, −7, −6, 7, 6, 0, 0}; {, −3, 4, −4, 4, −6, −6, −2, −3, 6, 4, 0, 0}; {, −5, 2, −6, 2, 8, 8, −3, −3, 4, 3, 0, 0}; {, −7, 0, 8, 0, 6, 6, −3, −3, 3, 2, 0, 0}; {, −7, 0, 8, 0, 6, −6, −5, 3, 0, −3, 0, 0}; {8, −1, 7, −1, 6, 6, −5, −6, 4, 2, 0, 0}; {, −6, 1, −7, 1, 8, 8, −3, −3, 4, 3, 0, 0}; {8, −1, 7, −1, 6, 6, −5, −5, 4, 3, 0, 0}; {8, −1, 7, −1, 6, 6, −4, −4, 3, 2, 0, 0}; {7, −2, 6, −2, 5, 5, −5, −5, 3, 2, 0, 0}; {8, −1, 7, −1, 6, 6, −3, −3, 3, 2, 0, 0}; {6, −2, 7, 0, −7, 7, 6, −4, 0, 3, 0, 0}; {, −7, 0, 8, 0, 8, 8, −4, −4, 4, 3, 0, 0}; {6, −3, 5, −3, 5, 5, −6, −6, 3, 2, 0, 0}; {8, −1, 7, −1, 7, 7, −2, −2, 3, 2, 0, 0}; {6, −3, 5, −3, 5, 5, −4, −3, 2, 2, 0, 0}; {, −3, 4, −4, 4, −3, −4, 7, 6, −2, −2, 0, 0}; {, −4, 3, −5, 3, −4, −5, 6, 5, −2, −2, 0, 0}; {, −2, 5, −3, 5, −2, −3, 7, 6, −1, −1, 0, 0}; {4, −5, 3, −5, 4, 4, −6, −6, 2, 1, 0, 0}; {5, −4, 4, −4, 5, 5, −5, −4, 2, 2, 0, 0}; {7, −3, 4, −5, 4, 0, −2, 0, −4, −6, 0, 0}; {, −6, 2, −5, 4, −1, 0, 5, 7, −1, 1, 0, 0}; {0, 7, −1, 7, 1, 2, 8, 8, 1, 0, 0, 0}; {1, 8, 0, 8, 3, 5, 4, 2, 8, 8, 0, 0}; {0, 7, −1, 7, 2, 4, 4, 1, 8, 8, 0, 0}; {0, 7, −1, 7, 2, 4, 4, 0, −4, −6, 0, 0}; {, −1, 6, −2, 6, 1, 3, 4, −1, −4, −6, 0, 0}; {8, −2, 5, −4, 7, 8, 8, 3, −2, −5, 0, 0}; {, −2, 4, −5, 2, −1, 5, 4, 8, 6, 4, 0, 0}; {8, 0, −7, 2, 1, −7, −6, 0, 2, 0, 0, 0}; {8, 1, −5, 5, 5, −2, 2, −5, −4, −2, 0, 0}; {, −7, 0, 8, 0, −2, 6, 1, 3, 6, 4, 0, 0}; {, −4, 2, −7, 0, −2, 3, 4, −6, 6, 2, 0, 0}; {1, 8, 0, 8, 7, −2, −3, 2, 4, 2, 0, 0}; {, −3, 3, −6, 1, −1, 5, 3, 8, 7, 3, 0, 0}; {6, −2, 7, 0, 0, 8, −7, −1, 1, 0, 0, 0}; {, −4, 2, −7, 0, −2, 4, 3, 8, 6, 3, 0, 0}; {, −5, 1, 8, −1, −3, 3, 3, 8, 5, 3, 0, 0}; {7, 0, −6, 4, 5, −2, 2, −5, −4, −2, 0, 0}; {8, −1, 7, −1, −2, 5, 1, 3, 6, 5, 0, 0}; {, −7, −1, 6, −3, −4, 2, 0, 6, 5, 3, 0, 0}; {, −1, 6, −2, 6, 6, −3, −3, 2, 3, 2, 0, 0}; {, −6, 0, 7, −2, −3, 3, 2, 7, 5, 2, 0, 0}; {, −6, 0, 7, −2, −3, 3, 2, 7, 5, 3, 0, 0}; {, −1, 6, −2, 6, 6, −3, −3, 3, 3, 1, 0, 0}; {, −6, 0, 7, −2, −3, 3, 3, 8, 5, 2, 0, 0}; {8, 1, −5, 5, 7, 0, 3, −5, −3, −2, 0, 0}; {, −2, 5, −3, 5, 6, −3, −3, 3, 3, 1, 0, 0}; {1, −7, 2, −5, −3, 5, 6, −2, −1, −1, 0, 0}; {, −4, 4, −3, 6, −7, −7, −6, −3, 7, 7, 0, 0}; {, −5, 3, −4, 5, −7, −6, −6, −4, 8, 6, 0, 0}; {8, 1, −5, 5, −6, 0, 7, 8, 7, 8, 0, 0}; {7, −2, 6, −2, 2, −1, −1, 0, −6, −7, 0, 0}; {7, −2, 6, −2, 2, 0, −1, 0, −6, −7, 0, 0}; {, −5, 3, −4, 5, −6, −7, −7, −4, 8, 7, 0, 0}; {6, −3, 5, −3, 1, −1, −1, −1, −6, −7, 0, 0}; {, −3, 4, −4, 4, 8, −4, −3, 4, 1, −1, 0, 0}; {, −5, 2, −6, 2, 6, −5, −5, 5, 2, −2, 0, 0}; {, −5, 3, −4, 6, −5, 8, −7, −3, 8, 8, 0, 0}; {, −4, 4, −3, 7, −4, −5, −5, −3, 7, 7, 0, 0}; {, −7, 1, −6, 4, −7, −7, −7, −4, 7, 7, 0, 0}; {, −2, 5, −3, 6, −6, −6, −4, −3, 7, 6, 0, 0}; {, −7, 0, 8, 1, 5, −6, −5, 3, 1, −2, 0, 0}; {1, 8, 0, −7, −2, −4, −4, −2, −7, 8, 0, 0}; {2, −7, 1, −6, −1, −3, −3, −1, 8, 8, 0, 0}; {2, −7, 1, −6, −1, −2, −3, −1, −7, 8, 0, 0}; {1, 8, 0, −7, −2, −3, −3, −2, −7, 8, 0, 0}; {7, −2, 6, −1, 4, 6, −4, −4, 4, 2, 0, 0}; {2, −7, 1, −6, 0, −2, −3, −1, −7, −7, 0, 0}; {, −5, 1, 8, 0, 5, 2, 1, 1, −5, −6, 0, 0}; {0, 7, −1, 8, −2, −4, −4, −2, 8, 8, 0, 0}; {4, −4, 5, −1, 6, 6, 6, −7, 7, 6, 0, 0}; {, −2, 5, −3, 6, −4, −5, −4, −3, 8, 8, 0, 0}; {4, −4, 5, −1, 7, 6, 6, −4, 0, 3, 0, 0}; {, −2, 5, −3, 6, −3, −5, −6, −4, −7, 8, 0, 0}; {7, −2, 6, −1, 6, 6, −5, −5, 4, 3, 0, 0}; {5, −4, 4, −3, 4, 4, −6, −6, 3, 3, 0, 0}; {, −1, 6, −2, 7, −2, −1, −7, 8, 0, −1, 0, 0}; {6, −3, 5, −2, 5, 6, −5, −5, 4, 3, 0, 0}; {5, −4, 4, −3, 4, 5, −4, −4, 2, 1, 0, 0}; {, −3, 3, −6, 2, −7, −5, −4, 5, 2, −2, 0, 0}; {, −7, −1, 6, −2, 5, 1, −2, −1, −4, −6, 0, 0}; {0, 6, −3, 5, −4, −5, 0, −1, 6, 4, 0, 0}; {4, −5, 3, −4, 4, 4, −6, −5, 2, 2, 0, 0}; {, −3, 3, −6, 2, −7, 8, −1, −2, 4, 2, 0, 0}; {, −1, 7, 0, −6, 4, 3, 3, −6, −2, 2, 0, 0}; {, −1, 5,

−4, 4, −4, −5, −1, −2, 6, 4, 0, 0}; {, −7, −1, 6, −2, 7, −7, −7, 3, −1, −4, 0, 0}; {, −5, 1, 8, 0, −7, 8, −3, −4, 4, 2, 0, 0}; {, −6, 1, −7, 2, −2, 1, 1, −1, −6, −7, 0, 0}; {, −2, 6, −1, −7, 7, −4, −3, 7, −7, 1, 0, 0}; {, −7, −1, 6, −2, −5, 2, 1, 6, 5, 3, 0, 0}; {, −4, 2, −7, 1, −1, 5, 3, 6, 7, 3, 0, 0}; {1, 8, 0, −7, 8, −1, −2, 2, 4, 2, 0, 0}; {0, 7, −1, 8, 7, −2, −3, 2, 4, 1, 0, 0}; {0, 7, −1, 8, 7, −2, −3, 2, 4, 2, 0, 0}; {5, −6, 0, 7, 4, −7, 7, −6, 8, 4, 0, 0}; {, −6, 0, 7, −1, −3, 3, 2, 6, 6, 4, 0, 0}; {5, −2, 8, 3, 4, −3, 2, −6, −4, −1, 0, 0}; {3, 8, −2, 5, 2, 8, 5, −7, 7, 4, 0, 0}; {, −5, 3, −4, 6, 6, −1, 2, −3, −4, −2, 0, 0}; {8, −2, 5, −3, −4, 2, 1, 5, 5, 4, 0, 0}; {2, 7, −3, 4, 2, 7, 6, −6, 6, 3, 0, 0}; {, −6, 2, −5, 5, −7, −6, −6, −4, 7, 6, 0, 0}; {7, −1, 8, 2, 6, 7, −7, −5, 6, 5, 0, 0}; {0, 6, −3, 6, 8, −1, −2, 5, 3, −1, 0, 0}; {, −1, 5, −4, 5, 7, −2, −3, 4, 2, −1, 0, 0}; {5, −4, 4, −2, 2, 8, −7, 2, 0, −3, 0, 0}; {5, −4, 4, −2, 2, 5, −4, −4, 4, 1, 0, 0}; {6, −3, 5, −1, 3, 8, −7, 3, 1, −3, 0, 0}; {, −1, 5, −4, 5, −7, −3, −3, 6, 3, −1, 0, 0}; {4, −4, 5, 0, 6, 5, 7, −6, 6, 6, 0, 0}; {0, 7, −1, −7, −2, −3, −4, −2, 8, 8, 0, 0}; {5, −3, 6, 1, 7, 7, 8, −5, 6, 6, 0, 0}; {, −1, 6, −2, 8, −3, −4, −4, −2, 8, 7, 0, 0}; {, −2, 5, −3, 7, −4, −5, −4, −3, 7, 7, 0, 0}; {, −2, 5, −3, 7, −4, −5, −4, −3, 8, 7, 0, 0}; {3, −6, 2, −4, 1, 3, −5, −5, 3, 1, 0, 0}; {3, −6, 2, −4, 1, 4, −5, −5, 3, 1, 0, 0}; {, −7, −1, 6, −1, 4, 1, −1, 1, −5, −6, 0, 0}; {8, −2, 5, −2, 3, 1, −1, 0, −5, −7, 0, 0}; {, −1, 5, −4, 5, −6, −6, −1, −2, 6, 4, 0, 0}; {, −3, 3, −6, 3, 8, 8, −1, −2, 5, 3, 0, 0}; {4, −4, 5, 0, 7, −6, 4, 5, −2, −1, 0, 0}; {1, 8, 0, −6, 0, 2, −6, −6, 2, 1, 0, 0}; {, −5, 2, −6, 4, −5, −7, −7, −4, 8, 7, 0, 0}; {2, −6, 3, −2, 6, 7, 3, 4, −4, −1, 0, 0}; {, −3, 3, −6, 3, −7, −7, −1, −2, 5, 3, 0, 0}; {, −7, −1, 6, −1, 7, −7, −5, 3, 1, −2, 0, 0}; {2, 7, −3, 5, −4, −2, −2, 6, 3, −1, 0, 0}; {2, 7, −3, 5, −4, 8, 1, −1, 4, 2, 0, 0}; {, −2, 6, −1, −6, 4, 3, 2, −7, −2, 1, 0, 0}; {, −4, 2, −7, 2, −6, 8, −1, −1, 3, 3, 0, 0}; {0, 7, −1, −7, 2, 2, 8, −7, 1, 2, 0, 0}; {, −6, 0, 7, 0, −7, 8, −3, −3, 3, 3, 0, 0}; {3, 8, −2, 6, −2, −3, 1, 0, 6, 3, 0, 0}; {8, −2, 5, −2, 7, 7, −4, −3, 3, 2, 0, 0}; {6, −3, 5, −1, −3, 0, −1, −1, −7, −7, 0, 0}; {3, 8, −2, 6, 2, 8, 7, −6, 8, 6, 0, 0}; {, −2, 5, −3, 7, 6, −3, −3, 1, 4, 1, 0, 0}; {2, 7, −3, 5, 2, 8, 5, 8, 8, 4, 0, 0}; {, −2, 3, −7, 1, −2, 5, 1, 7, 6, 3, 0, 0}; {1, 8, 0, −5, −1, 6, 7, 1, −1, −4, 0, 0}; {3, −5, 4, 0, 6, 4, 6, −6, 6, 6, 0, 0}; {, −6, 1, −7, 4, −6, −7, −7, −4, 7, 7, 0, 0}; {8, −1, 7, 2, −7, 7, 8, −5, 7, 7, 0, 0}; {4, −6, 1, −5, 1, −1, −3, −1, −6, −7, 0, 0}; {, −2, 3, −7, 2, 8, 4, 0, 0, −3, −5, 0, 0}; {3, 8, −2, 7, −2, −4, 1, 0, 6, 4, 0, 0}; {, −7, −1, 6, 0, 8, 7, −4, −4, 4, 3, 0, 0}; {0, 5, −5, 4, −5, −5, 1, 0, 5, 2, 0, 0}; {8, −4, 1, −7, −1, −6, 5, 4, 0, −3, 0, 0}; {8, −2, 5, −1, 8, 6, −3, −2, 2, 2, 0, 0}; {1, 6, −4, 5, −3, −5, 1, 1, 5, 2, 0, 0}; {, −5, −1, 4, −4, 7, −4, −6, −4, −7, 6, 0, 0}; {5, −4, 4, −1, −1, 8, −3, −4, −6, −5, 0, 0}; {, −6, −2, 3, −4, 5, 1, −4, 4, 5, 2, 0, 0}; {2, −4, 7, 7, 0, −7, −1, 1, 4, −1, 0, 0}; {, −4, 5, −1, −2, 6, −2, 3, 5, 6, 0, 0, 0}; {2, 5, −7, 2, −6, 5, −1, 7, 7, 4, 0, 0}; {0, 3, 7, 0, 8, 4, −2, 6, 7, 3, 0, 0}; {, −2, 7, 1, 1, 7, 0, 4, 6, 7, 0, 0, 0}; {3, −3, 8, −7, 0, −6, −1, 3, 4, −2, 0, 0}; {, −4, 5, −1, −1, 5, −2, 3, 5, 6, −1, 0, 0}; {1, −5, 6, 7, −1, −7, −1, 1, 4, −2, 0, 0}; {, −1, −7, 4, 5, −2, 8, −2, 1, 3, −2, 0, 0}; {7, 0, −6, −6, 2, −4, 1, 3, 5, −1, 0, 0}; {8, −4, 1, −4, 1, −7, 4, 0, 5, 4, 0, 0}; {5, 8, −4, 6, −4, −7, 1, 8, 7, 5, 0, 0}; {4, 7, −5, 5, −5, 8, 0, 8, 7, 4, 0, 0}; {8, −4, 1, −4, 4, 2, −5, 3, 5, 3, 0, 0}; {1, 4, 8, 2, −7, 6, −1, 7, 7, 4, 0, 0}; {1, 4, 8, 2, −7, 6, −1, 7, 7, 5, 0, 0}; {0, 3, 7, 1, 8, 5, −2, 6, 7, 3, 0, 0}; {, −6, −4, −1, 8, −1, −6, 2, −5, −6, 7, 0, 0}; {, −2, 1, 5, −1, 7, 4, −3, 5, 7, 3, 0, 0}; {, −3, 0, 4, −2, 6, 3, −4, 5, 7, 3, 0, 0}; {5, 7, −6, 3, −5, 7, 0, 7, −7, 4, 0, 0}; {4, 6, −7, 2, −6, 6, −1, 7, −7, 3, 0, 0}; {, −5, −6, −6, 1, −4, 2, −6, 2, 4, 8, 0, 0}; {, −4, −7, 7, −4, 5, −7, 1, −7, 8, −5, 0, 0}; {4, 0, −3, 1, −6, −4, 4, −5, −6, −4, 0, 0}; {, −5, 8, 6, −5, 5, −7, 0, 8, 7, −5, 0, 0}; {3, −1, −4, 0, −7, −4, 4, −5, −6, −4, 0, 0}; {2, −2, −5, −1, 8, −5, 3, −6, −6, −4, 0, 0}; {7, 1, −4, −2, 5, 6, −3, 3, −1, −1, 0, 0}; {7, 1, −4, −2, 6, 6, −3, 3, −2, −1, 0, 0}; {, −2, −6, 7, −5, 5, 8, 1, 8, −5, −5, 0, 0}; {1, 4, 8, 3, 6, −3, 8, 3, 8, 4, 0, 0}; {7, −5, 0, −4, 3, 2, −6, 3, 5, 3, 0, 0}; {, −5, −3, 0, −6, −1, −4, 3, −6, −7, 5, 0, 0}; {4, 8, −3, −7, 1, −1, −7, 2, 4, 2, 0, 0}; {8, −6, −3, 7, −3, −6, 2, −7, −7, 5, 0, 0}; {3, 1, 0, 7, 1, 6, −3, 5, 5, −6, 0, 0}; {5, 1, −2, 3, −5, −2, 5, −4, −6, −3, 0, 0}; {, −4, −7, 7, −3, 6, −5, 1, 8, 7, −3, 0, 0}; {2, −2, −5, 0, −7, −4, 3, −6, −6, −4, 0, 0}; {, −4, 7, 3, 7, −1, 1, 8, −2, −4, −1, 0, 0}; {, −4, 7, 3, 7, −1, 1, 8, −2, −4, −2, 0, 0}; {0, −4, −7, −2, 7, −6, 2, −7, −6, −5, 0, 0}; {, −7, 4, 0, 4, −3, −2, 6, −3, −5, −3, 0, 0}; {, −2, −6, 7, −4, 6, 8, 1, −7, −7, −4, 0, 0}; {, −3, −7, 6, −5, 5, 8, 0, 8, −7, −5, 0, 0}; {7, −2, 6, 6, −1, 1, −6, 7, −3, −1, 0, 0}; {4, 8, −3, −6, 1, 0, 8, 1, 4, 2, 0, 0}; {5, −7, −2, −5, 2, 1, −6, 3, 4, 2, 0, 0}; {3, 7, −4, −7, 1, −1, 8, 1, 4, 2, 0, 0}; {7, −7, −4, 7, −3, −7, 1, −7, 8, 5, 0, 0}; {0, −2, −3, 5, −1, 4, −4, 4, 4, −6, 0, 0}; {, −5, 8, 6, −3, 6, −6, 2, 8, 7, −4, 0, 0}; {5, 0, −4, 1, −7, −4, 3, −5, −4, −4, 0, 0}; {6, 1, −3, 2, −5, −3, 4, −5, −4, −4, 0, 0}; {2, −5, 5, −7, −2, 0, −7, 3, 1, 0, 0, 0}; {, −7, 2, −4, 1, −3, 6, 6, −2, 0, 3, 0, 0}; {, −2, 6, −1, 3, 2, −6, 3, 5, 8, 6, 0, 0}; {, −4, 6, 1, 7, −7, 0, −4, −1, 3, 3, 0, 0}; {5, −2, 8, −3, −2, 5, 0, 2, 5, 4, 0, 0}; {3, −4, 6, −5, −4, 4, −1, 1, 4, 4, 0, 0}; {, −3, 5, −2, 2, 5, 6, −2, 7, 4, 2, 0, 0}; {, −2, 7, 1, 6, −5, −3, 6, 2, −1, 0, 0, 0}; {, −2, 7, 1, 6, −4, −3, 6, 3, −1, 0, 0, 0}; {1, −5, 6, −4, 3, 5, 0, 0, −5, −2, 0, 0}; {7, 2, −2, 5, −3, 1, −5, −5, −6, −4, 0, 0}; {1, −5, 6, −4, 3, 6, 0, −1, −4, −2, 0, 0}; {2, −4, 7, −3, 5, 6, −1, 0, −4, −1, 0, 0}; {7, 2, −2, 5, −2, 1, −5, −4, −7, −3, 0, 0}; {7, 2, −2, 5, −2, 1, −5, −4, −6, −4, 0, 0}; {, −5, 4, −2, 4, −7, −5, 4, 0, −1, −2, 0, 0}; {, −7, 2, −4, 2, 7, −6, 3, 0, −3, −1, 0, 0}; {6, 1, −3, 5, −3, 0, −6, −5, −7, −3, 0, 0}; {1, −5, 6, −3, 4, 6, 0, −2, −3, −3, 0, 0}; {5, −3, 6, −5, 0, 0, −7, 4, 1, 1, 0, 0}; {5, −3, 6, −5, 0, 0, −7, 4, 2, 0, 0, 0}; {, −6, 3, −3, 3, −7, −5, 4, 1, −1, −2, 0, 0}; {8, 1, −5, 1, 7, −7, 2, 0, −3, −1, 0, 0}; {3, −5, 4, −7, −2, −1, 8, 4, 0, 0, 0, 0}; {8, 1, −5, 1, 7, −6, 3, 1, −2, −2, 0, 0}; {0, −6, 5, −4, 4, 5, −1, −1, −4, −2, 0, 0}; {5, 0, −4, 4, −3, −1, −6, −5, −7, −3, 0, 0}; {, −1, −7, 4, −5, 3, 4, −2, −1, −5, −2, 0, 0}; {, −7, 2, −4, 2, −7, −6, 3, 2, −2, −1, 0, 0}; {, −2, 8, 3, −6, 2, 4, −2, −2, −5, −3, 0, 0}; {, −2, 8, 3, −6, 2, 4, −2, −2, −5, −2, 0, 0}; {7, 0, −6, 0, 7, −7, 3, 2, −3, −2, 0, 0}; {, −3, 5, −2, 3, −7, −5, −3, 5, 1, −1, 0, 0}; {, −5, 5, 0, 7, 0, 3, −3, −2, −5, −4, 0, 0}; {2, −7, 1, 5, −3, −3, −4, 5, 1, −3, 0, 0}; {, −7, 2, −4, 3, −3, 1, 3, 1, 5, 7, 0, 0}; {, −1, 8, 2, −7, 4, 5, −1, 0, −6, −4, 0, 0}; {, −1, 8, 2, −7, 4, 5, 0, 1, −6, −4, 0, 0}; {4, −4, 5, −5, 5, 6, 5, 2, −4, −5, 0, 0}; {2, −6, 3, −7, 3, 7, 7, 3, 7, 8, 0, 0}; {, −4, 4, −3, 3, −2, −4, 5, 5, −3, −1, 0, 0}; {0, −7, 3, −6, 6, 6, 0, 1, −6, −3, 0, 0}; {6, −2, 7, −3, −7, 8, 3, 3, −5, −3, 0, 0}; {, −2, 6, −1, 5, 1, 2, 3, 0, −7, −7, 0, 0}; {2, −7, 1, 6, 3, −3, 5, 6, 8, 7, 0, 0}; {1, 8, 0, 5, 2, −4, 4, 5, 7, 6, 0, 0}; {2, −7, 1, 6, 4, −5, 6, 6, 7, 6, 0, 0}; {, −7, 1, −6, 0, 0, 7, 2, 3, 5, 5, 0, 0}; {5, −3, 6, −4, −4, 4, 0, 2, 5, 4, 0, 0}; {5, −2, 8, −1, 1, −1, −7, −4, 0, 4, 0, 0}; {0, 6, −3, 1, 1, 6, 1, −7, 7, 2, 0, 0}; {0, 6, −3, 1, 1, 6, 1, −7, 7, 3, 0, 0}; {4, −5, 3, 8, −7, −1, −4, 4, 4, 2, 0, 0}; {, −2, 4, −5, −1, −1, 5, 0, 8, 6, 2, 0, 0}; {7, −1, 8, −2, 1, −2, −1, 0, 7, 7, 0, 0}; {, −4, 5, −1, 6, −5, −7, −7, −1, 2, 5, 0, 0}; {8, 2, −3, 5, −5, 1, 4, −3, −3, −2, 0, 0}; {, −4, 5, −1, 6, −4, −7, 8, −1, 2, 5, 0, 0}; {, −5, 4, −2, 5, −5, −7, −7, −2, 2, 5, 0, 0}; {0, −6, 5, −3, 4, 3, 4, −5, −1, 3, 0, 0}; {3, −5, 4, −6, −1, −1, 8, 4, 0, 0, 0, 0}; {8, 1, −5, 2, −7, −6, 3, 2, −2, −1, 0, 0}; {, −5, 5, 0, 8, 0, 2, −4, −3, −6, −3, 0, 0}; {, −7, 1, −6, 0, 6, −7, −5, 3, 0, −2, 0, 0}; {3, −5, 4, −6, 1, −2, −3, 0, −6, −6, 0, 0}; {, −5, 5, 0, 8, 1, 1, −1, −7, −4, 0, 0, 0}; {, −1, 7, 0, 6, −3, −3, 6, 4, 0, −1, 0, 0}; {4, −3, 7, −2, 7, 5, 3, −4, −2, 1, 0, 0}; {1, −6, 4, −5, 4, 5, 1, 1, −5, −4, 0, 0}; {, −5, 4, −2, 5, −2, 2, 4, 2, 5, 7, 0, 0}; {, −7, 1, −5, 1, −6, −7, 3, 3, −3, −2, 0, 0}; {7, −1, −7, −1, 8, 8, 3, 3, −4, −3, 0, 0}; {, −2, 5, −2, 3, 1, −6, 3, 4, 7, 6, 0, 0}; {, −3, 4, −3, 2, 0, −6, 2, 4, 7, 6, 0, 0}; {, −4, 3, −4, 1, −1, −6, 2, 3, 6, 6, 0, 0}; {, −4, 3, −4, 1, −1, −6, 3, 4, 7, 7, 0, 0}; {, −4, 3, −4, 1, 0, 8, 2, 4, 7, 5, 0, 0}; {, −3, 8, 5, −2, 5, −1, 2, −5, −4, −2, 0, 0}; {6, −1, −6, 1, 7, 8, 2, −1, −3, −2, 0, 0}; {1, −7, 3, −7, −2, −2, 8, 3, 1, −1, 0, 0}; {4, −3, 8, −1, 5, 7, 1, −2, −3, −3, 0, 0}; {, −6, 1, −6, −1, 3, 3, −4, 6, 3, 1, 0, 0}; {, −2, 6, 0, 6, −5, −3, 6, 2, 0, −1, 0, 0}; {, −1, 8, 3, −6, 0, 4, −2, −3, −5, −4, 0, 0}; {6, −1, −6, 1, 8, 6, 6, −3, 0, 4, 0, 0}; {0, 8, 2, 8, −2, −3, 7, 3, 0, 0, 0, 0}; {, −2, 6, 0, 6, −4, −4, 6, 2, 0, −1, 0, 0}; {, −4, 4, −2, 4, −6, −5, 5, 2, −1, −2, 0, 0}; {6, −3, 6, −5, 0, 0, −7, 5, 1, 0, 0, 0}; {, −6, 2, −4, 2, 8, −6, 3, 1, −2, −2, 0, 0}; {, −5, 4, −1, 7, −1, 1, −3, −2, −7, −5, 0, 0}; {, −2, 5, −2, 4, −6, −3, −3, 6, 2, −1, 0, 0}; {5, −4, 5, −5, 2, −1, −2, 0, −5, −6, 0, 0}; {5, −3, 7, −2, 7, 7, 2, 2, −4, −3, 0, 0}; {, −7, 0, −7, −1, 7, 7, −4, −4, 3, 2, 0, 0}; {4, −4, 6, −3, 6, 7, 1, 1, −4, −3, 0, 0}; {4, −4, 6, −3, 8, 5, 4, −5, −2, 2, 0, 0}; {, −2, 5, −2, 4, −2, −3, 7, 6, −2, −2, 0, 0}; {4, −5, 4, −6, 5, 7, 6, 3, −7, −7, 0, 0}; {4, −4, 6, −3, −7, 4, 4, −4, −1, 2, 0, 0}; {3, −6, 3, −7, 4, 5, 5, 1, −5, −6, 0, 0}; {5, −5, 3, 8, 4, −2, 6, 6, 8, 7, 0, 0}; {5, −4, 5, −5, −7, −1, 0, 6, 4, 2, 0, 0}; {5, −4, 5, −5, −6, −1, 1, 8, 4, 2, 0, 0}; {4, −5, 4, −6, −7, −2, 0, 7, 4, 2, 0, 0}; {3, −6, 3, −7, 8, −2, −1, 6, 4, 1, 0, 0}; {, −6, 1, −6, 0, −1, 7, 2, 3, 6, 5, 0, 0}; {, −7, 1, −5, 2, 3, 1, −6, −3, 1, 4, 0, 0}; {7, −1, −7, 0, 2, 8, −6, 2, 1, 0, 0, 0}; {5, −3, 7, −2, 1, 7, −7, 1, 0, 0, 0, 0}; {3, −5, 5, −4, −1, 6, 7, −1, 0, 0, 0, 0}; {7, 0, −5, 3, 7, −1, 2, −5, −3, −1, 0, 0}; {1, −6, 5, −3, 3, 5, −1, −3, −5, −3, 0, 0}; {1, −6, 5, −3, 3, 5, −1, −3, −5, −2, 0, 0}; {, −4, 5, 0, 8, −2, 2, −4, −4, −6, −5, 0, 0}; {, −3, 4, −3, 3, 8, −4, −4, 5, 2, −1, 0, 0}; {8, 0, −6, 2, 8, −7, −7, −5, 8, 7, 0, 0}; {, −4, 5, 0, −7, 0, 3, 5, 7, 6, 5, 0, 0}; {4, −5, 4, −5, 1, −2, −3, −1, −6, −7, 0, 0}; {7, −1, −7, 1, 8, 8, −7, −5, 8, 7, 0, 0}; {5, −5, 3, −7, −2, −3, 5, 4, 0, −2, 0, 0}; {8, −1, 8, −1, 5, 7, −4, −4, 4, 2, 0, 0}; {7, −2, 7, −2, 4, 6, −4, −4, 3, 1, 0, 0}; {, −4, 4, −2, 6, −3, 0, 8, −7, 0, 0, 0, 0}; {1, 8, 1, 8, −1, −3, −4, −2, −6, −7, 0, 0}; {, −6, 1, −6, 1, 8, 8, −4, −4, 4, 3, 0, 0}; {2, 8, 0, 6, −4, −2, −2, 6, 2, −2, 0, 0}; {6, −3, 6, −3, 5, 5, −5, −4, 2, 2, 0, 0}; {, −4, 3, −4, 3, −4, −5, 5, 4, −2, −2, 0, 0}; {5, −4, 5, −4, 5, 5, −6, −5, 2, 2, 0, 0}; {8, −2, 6, −4, 5, 1, −1, 1, −4, −5, 0, 0}; {, −7, 0, −7, 0, −6, −6, 5, 4, −3, −3, 0, 0}; {0, 7, 0, 7, 2, 4, 3, 1, −7, −7, 0, 0}; {1, 8, 1, 8, 3, 5, 4, 1, −5, −6, 0, 0}; {, −6, 0, 8, −2, 8, −7, 8, 3, −3, −5, 0, 0}; {6, −4, 4, −6, 4, 0, −7, 8, 0, 0, 0, 0}; {, −2, 5, −2, 5, 1, 3, 3, 0, 8, 8, 0, 0}; {0, 5, −4, 1, −5, 4, −2, −5, −5, −5, 0, 0}; {6, −2, 8, 0, −2, 0, −1, −1, 6, 7, 0, 0}; {2, −6, 4, −4, −6, −3, −3, −3, 6, 7, 0, 0}; {3, −6, 3, −6, 7, −2, −1, 5, 4, 2, 0, 0}; {, −2, 4, −4, 2, −1, 4, 3, −7, 7, 4, 0, 0}; {2, −7, 2, −7, 7, −3, −2, 4, 4, 2, 0, 0}; {1, 8, 1, 8, 6, −4, −2, 5, 3, 1, 0, 0}; {2, −7, 2, −7, 7, −2, −1, 5, 4, 0, 0}; {, −4, 2, −6, 0, −2, 3, 4, −6, 6, 3, 0, 0}; {7, −2, 7, −2, −3, 4, 1, 2, 6, 4, 0, 0}; {, −5, 1, −7, −1, −3, 3, 2, 8, 6, 3, 0, 0}; {, −1, 6, −1, 6, 5, −4, −4, 3, 3, 1, 0, 0}; {8, −1, 8, −1, −2, 5, 1, 3, 6, 4, 0, 0}; {, −6, 3, −2, 7, −7, 1, 4, −4, −1, −2, 0, 0}; {7, 0, −5, 4, 6, −2, 2, −5, −3, −1, 0, 0}; {, −7, −1, 7, −3, −4, 1, 2, −7, 5, 2, 0, 0}; {8, −2, 6, −4, −5, 1, −1, 6, 5, 3, 0, 0}; {, −6, 4, 0, −6, −3, 7, −4, 6, −6, −3, 0, 0}; {, −7, 2, −3, 6, −7, 1, 4, −4, −2, −2, 0, 0}; {8, −2, 6, −4, −4, 1, 1, 8, 5, 2, 0, 0}; {1, −7, 3, −5, −3, 4, 7, −1, −1, 0, 0, 0}; {1, −7, 3, −5, −3, 4, 7, −1, −1, 1, 0, 0}; {6, −4, 4, −6, −6, 0, −1, 6, 4, 3, 0, 0}; {, −1, 4, −5, 0, −1, 5, 1, −7, 6, 3, 0, 0}; {, −2, 5, −2, 5, 7, −4, −3, 6, 3, 0, 0, 0}; {, −3, 4, −3, 4, 6, −4, −4, 3, 2, 1, 0, 0}; {, −4, 3, −4, 3, 5, −5, −5, 2, 2, 2, 0, 0}; {2, −6, 4, −4, −1, 6, 8, 0, 0, −1, 0, 0}; {5, −5, 3, −7, −6, 0, −1, 6, 4, 2, 0, 0}; {6, −4, 4, −6, −4, 1, 0, 8, 5, 1, 0, 0}; {, −2, 6, 0, 8, −3, −5, −5, −3, −7, 8, 0, 0}; {2, −6, 4, −4, 1, 7, 8, 2, 0, −2, 0, 0}; {5, −5, 3, −7, −4, 0, −1, 7, 4, 0, 0, 0}; {8, 0, −6, 3, 8, 8, 8, −5, 7, 7, 0, 0}; {6, −2, 8, 1, 6, 8, 8, −6, 7, 6, 0, 0}; {2, −7, 2, −6, −1, −4, −4, −1, −7, −7, 0, 0}; {0, 7, 0, 8, −3, −4, −4, −2, −7, 8, 0, 0}; {1, 8, 1, −7, −1, −4, −4, −2, −7, 8, 0, 0}; {0, 7, 0, 8, −2, −3, −4, −2, −7, 8, 0, 0}; {, −4, 3, −4, 4, −6, −6, −5, −4, 8, 7, 0, 0}; {, −7, 0, −7, 1, 7, 7, 0, 0, −4, −3, 0, 0}; {0, 8, 2, −5, 2, 4, 7, −7, 7, 6, 0, 0}; {0, 6, −2, 5, −6, −3, −3, 5, 2, −2, 0, 0}; {7, −2, 7, −1, 6, 6, −5, −5, 4, 3, 0, 0}; {6, −4, 4, −5, 1, 0, −7, 5, 1, −1, 0, 0}; {7, −2, 7, −1, 6, 7, −6, −5, 8, 7, 0, 0}; {3, −6, 3, −5, 2, 3, −6, −6, 2, 1, 0, 0}; {, −1, 5, −3, 4, −6, −4, −3, 5, 2, −2, 0, 0}; {4, −5, 4, −4, 3, 6, −7, −4, −7, 7, 0, 0}; {, −2, 4, −4, 3, −6, −7, −1, −1, 4, 3, 0, 0}; {5, −5, 3, −6, 2, −1, −2, −1, −5, −6, 0, 0}; {5, −4, 5, −3, 6, 6, −6, −5, 3, 3, 0, 0}; {, −2, 4, −4, 3, −5, −6, −2, −3, 6, 4, 0, 0}; {, −3, 3, −5, 2, −6, −7, −2, −2, 4, 3, 0, 0}; {, −7, 0, −7, 1, −5, 8, 7, −3, 0, 3, 0, 0}; {, −7, 0, −7, 1, −5, −6, 5, 5, −3, −2, 0, 0}; {, −2, 4, −4, 3, −4, −6, −1, −1, 5, 4, 0, 0}; {7, −2, 7, −1, −7, −7, 5, 4, −3, −3, 0, 0}; {2, −7, 2, −6, 4, 4, −7, −6, 2, 2, 0, 0}; {, −4, 2, −6, 1, −6, −7, −3, −3, 4, 3, 0, 0}; {2, −7, 2, −6, 4, 4, −7, −6, 2, 3, 0, 0}; {7, −2, 7, −1, −6, −7, 4, 4, −4, −2, 0, 0}; {, −4, 3, −4, 4, 0, 3, 2, 0, 8, 8, 0, 0}; {4, −6, 2, −7, 4, 6, 5, 2, −7, −7, 0, 0}; {, −7, 0, −7, 1, −2, 1, 1, −1, 7, 7, 0, 0}; {2, 8, 0, 7, 3, 5, 5, 1, −6, −7, 0, 0}; {, −5, 1, −7, 0, −3, 3, 4, −7, 6, 3, 0, 0}; {, −5, 1, −7, 0, −3, 3, 4, −7, 6, 4, 0, 0}; {, −1, 6, −1, 7, 5, −4, −2, 4, 3, 1, 0, 0}; {, −2, 5, −2, 6, 4, −5, −3, 3, 3, 2, 0, 0}; {, −7, −1, 7, −2, −5, 1, 2, 8, 5, 2, 0, 0}; {, −3, 4, −3, 5, 3, −6, −4, 3, 2, 1, 0, 0}; {, −2, 4, −4, 3, 0, −6, 3, 4, 6, 5, 0, 0}; {, −1, 6, −1, 7, 6, −3, −3, 2, 4, 1, 0, 0}; {, −7, −1, 7, −2, −4, 2, 1, 6, 6, 3, 0, 0}; {3, 8, −1, 5, 2, 7, 5, −5, 8, 4, 0, 0}; {, −7, 2, −3, 7, 8, 1, 4, −5, −1, −2, 0, 0}; {3, −5, 5, −2, −2, 6, 8, −2, 1, 0, 0, 0}; {3, 8, −1, 5, 2, 7, 6, −5, 8, 4, 0, 0}; {, −4, 3, −4, 4, 3, −6, −5, 2, 2, 1, 0, 0}; {, −3, 4, −3, 5, 4, −5, −3, 4, 2, 1, 0, 0}; {0, 8, 2, −5, −5, 3, 6, −2, −1, 0, 0, 0}; {, −7, −1, 7, −2, −4, 3, 1, 6, 6, 3, 0, 0}; {7, −3, 5, −4, −6, 1, −1, 5, 5, 2, 0, 0}; {2, 7, −2, 4, 2, 6, 6, −4, 8, 4, 0, 0}; {, −4, 3, −4, 4, 4, −5, −5, 1, 3, 1, 0, 0}; {, −4, 3, −4, 4, 4, −5, −5, 1, 3, 2, 0, 0}; {, −4, 3, −4, 4, 4, −5, −4, 3, 2, 1, 0, 0}; {6, −4, 4, −5, −6, 0, 0, 6, 4, 2, 0, 0}; {6, −4, 4, −5, −6, 0, 0, 6, 4, 3, 0, 0}; {, −5, 2, −5, 3, 3, −6, −5, 2, 2, 1, 0, 0}; {5, −5, 3, −6, −7, −1, −1, 6, 4, 3, 0, 0}; {0, 8, 2, −5, −4, 4, 7, −1, −1, −1, 0, 0}; {, −6, 1, −6, 2, 2, −7, −5, 3, 1, 0, 0, 0}; {6, −4, 4, −5, −6, 1, −1, 5, 5, 2, 0, 0}; {0, 5, −4, 2, 1, 6, 4, −6, 7, 3, 0, 0}; {1, −7, 3, −4, −2, 6, 8, −1, 0, −2, 0, 0}; {, −5, 2, −5, 3, 4, −5, −4, 3, 2, 0, 0, 0}; {5, −5, 3, −6, −6, 0, 0, 6, 4, 2, 0, 0}; {, −3, 5, −1, 8, −6, 2, 5, −3, −2, 0, 0, 0}; {, −5, 2, −5, 3, 5, −4, −4, 3, 2, 1, 0, 0}; {, −4, 1, 8, −2, −1, −6, 7, −4, −7, 1, 0, 0}; {3, −7, 1, 8, −6, −1, −1, 6, 4, 1, 0, 0}; {0, 6, −2, 6, 8, −2, −2, 4, 3, 0, 0, 0}; {6, −3, 6, −1, 3, −7, −6, 2, 0, −2, 0, 0}; {2, −7, 2, −5, −1, −3, −4, −1, −7, −7, 0, 0}; {1, 8, 1, −6, −2, −4, −4, −1, −7, −7, 0, 0}; {, −5, 1, −7, 1, 4, 1, 0, 2, −5, −6, 0, 0}; {, −4, 4, −2, 8, −3, 1, −5, −5, −7, −7, 0, 0}; {, −1, 5, −3, 5, −7, −3, −3, 6, 3, −1, 0, 0}; {0, 7, 0, −7, −2, −6, −6, −2, −7, 8, 0, 0}; {, −1, 6, −1, 8, −3, −5, −5, −2, 8, 8, 0, 0}; {0, 7, 0, −7, −2, −4, −3, −2, −7, 8, 0, 0}; {4, −4, 6, 0, 6, 6, 7, −6, 6, 6, 0, 0}; {, −2, 5, −2, 7, −4, −5, −5, −3, 8, 8, 0, 0}; {4, −7, 0, 7, −6, 7, 0, −7, 5, 0, 0, 0}; {3, −5, 5, −1, 5, 6, 7, −7, 6, 6, 0, 0}; {8, 1, −4, 7, −2, 0, 2, 5, 4, 4, 0, 0}; {8, 0, −6, 4, −6, −1, 4, 8, 6, 4, 0, 0}; {8, 0, −6, 4, −5, 0, 4, 8, 6, 4, 0, 0}; {, −2, 5, −2, 7, −3, −5, −5, −2, 8, 8, 0, 0}; {8, −2, 6, −2, 3, 0, −1, 1, −6, −7, 0, 0}; {, −2, 5, −2, 7, −3, −4, −5, −3, 8, 8, 0, 0}; {, −7, 0, −7, 2, 8, 8, −6, −5, 7, 7, 0, 0}; {, −2, 4, −4, 4, −7, 8, −2, −3, 5, 4, 0, 0}; {, −3, 3, −5, 3, 8, 8, −1, −2, 5, 3, 0, 0}; {, −6, 1, −6, 3, −6, −7, −6, −4, 7, 7, 0, 0}; {, −3, 3, −5, 3, −7, −7, −1, −2, 5, 3, 0, 0}; {0, 7, 0, −7, 0, 1, −7, −7, 1, 1, 0, 0}; {0, 7, 0, −7, 0, 1, −7, −6, 1, 1, 0, 0}; {, −6, 0, 8, 0, 6, 7, −3, −4, 5, 2, 0, 0}; {, −5, 1, −7, 1, 7, 8, −2, −2, 4, 2, 0, 0}; {, −7, −1, 7, −1, 6, −7, −6, 3, 0, −3, 0, 0}; {6, −4, 4, −4, 3, 0, −2, −1, −5, −6, 0, 0}; {4, −6, 2, −6, 1, −2, −3, −1, −6, −7, 0, 0}; {7, −3, 5, −3, 4, 3, −4, −5, 2, 1, 0, 0}; {, −5, 2, −5, 4, −4, −4, 7, 7, −2, −1, 0, 0}; {, −6, 1, −6, 3, −5, −5, 6, 6, −2, −1, 0, 0}; {, −2, 5, −2, 7, −1, 0, 8, −7, 0, 1, 0, 0}; {, −2, 5, −2, 7, 0, 1, 7, 8, 1, 2, 0, 0}; {, −7, −1, 7, −1, 7, 5, −3, −3, 2, 2, 0, 0}; {, −7, −1, 7, −1, 7, 6, −3,

−3, 2, 2, 0, 0}; {, −4, 2, −6, 2, −6, −7, −3, −3, 5, 4, 0, 0}; {, −4, 2, −6, 2, −6, −7, −3, −3, 6, 5, 0, 0}; {, −5, 1, −7, 1, −7, 8, −3, −3, 4, 3, 0, 0}; {, −6, 0, 8, 0, 8, 7, −4, −4, 4, 3, 0, 0}; {, −5, 1, −7, 1, −7, 8, −2, −2, 4, 3, 0, 0}; {, −7, −1, 7, −1, 8, 7, −3, −3, 3, 3, 0, 0}; {, −6, 0, 8, 0, −7, 8, −3, −3, 4, 3, 0, 0}; {, −7, −1, 7, −1, 8, 7, −4, −4, 4, 3, 0, 0}; {8, −2, 6, −2, 7, 7, −4, −5, 4, 2, 0, 0}; {7, −3, 5, −3, 6, 6, −5, −5, 3, 2, 0, 0}; {, −1, 6, −1, 8, 2, 3, 6, 7, 6, 6, 0, 0}; {2, 8, 0, 8, 1, −2, 8, 7, 0, 0, 0, 0}; {, −5, 3, −3, 7, 2, 1, 1, 8, −3, 1, 0, 0}; {7, −3, 5, −3, 7, 6, −5, −5, 3, 2, 0, 0}; {, −5, 2, −5, 4, 1, −7, −5, 2, 2, 1, 0, 0}; {, −4, 3, −4, 5, 4, −5, −4, 1, 3, 1, 0, 0}; {0, 5, −4, 3, 0, 5, 5, −6, 6, 3, 0, 0}; {0, 5, −4, 3, 0, 6, 4, 8, 7, 4, 0, 0}; {3, −7, 1, −7, 7, −2, −1, 6, 3, 1, 0, 0}; {5, −5, 3, −5, −6, 0, −1, 4, 5, 3, 0, 0}; {, −6, 1, −6, 3, 3, −6, −5, 0, 3, 1, 0, 0}; {, −1, 7, 1, −5, −4, 4, 7, −4, 0, −1, 0, 0}; {, −3, 2, −7, 0, −2, 4, 1, 7, 6, 4, 0, 0}; {, −2, 3, −6, 1, −1, 5, 3, 7, 6, 5, 0, 0}; {, −7, −2, 5, −4, −5, 2, −2, 6, 5, 2, 0, 0}; {7, −4, 3, −6, −6, 1, −3, 6, 4, 1, 0, 0}; {, −4, 1, 8, −1, −1, 4, 3, −7, 6, 2, 0, 0}; {1, 7, −1, 7, 8, −2, −2, 5, 3, 0, 0, 0}; {, −1, 5, −3, 6, 7, −3, −2, 6, 3, −1, 0, 0}; {3, −6, 3, −3, 1, 7, 8, 2, 0, −3, 0, 0}; {, −4, 2, −6, 3, 6, −4, −4, 4, 2, −1, 0, 0}; {4, −5, 4, −2, 3, 8, −7, 2, −1, −2, 0, 0}; {, −4, 3, −4, 6, −5, −6, −5, −3, 8, 7, 0, 0}; {, −5, 2, −5, 5, −6, −5, −6, −4, 8, 7, 0, 0}; {, −5, 2, −5, 5, −5, −7, −6, −4, 8, 7, 0, 0}; {5, −5, 3, −4, 1, −1, −2, 0, −6, −7, 0, 0}; {6, −5, 2, −6, −2, −4, 3, 1, 7, 5, 0, 0}; {, −6, 0, 8, 1, 6, 7, −2, −3, 5, 2, 0, 0}; {, −5, 2, −5, 5, −4, −2, 7, 7, 0, 0, 0, 0}; {5, −5, 3, −4, 2, −1, −2, −1, −6, −7, 0, 0}; {4, −6, 2, −5, 1, −2, −3, −1, −6, −7, 0, 0}; {, −7, 0, −7, 3, −6, 8, −7, −4, 7, 7, 0, 0}; {3, −7, 1, −6, 0, −2, −3, −2, −6, −7, 0, 0}; {3, −7, 1, −6, 0, −2, −3, −1, −7, 8, 0, 0}; {3, −7, 1, −6, 0, −2, −3, −1, −6, −7, 0, 0}; {, −7, 0, −7, 3, −6, −7, −7, −3, 2, 4, 0, 0}; {8, −2, 6, −1, 5, 5, −3, −4, 3, 2, 0, 0}; {7, −3, 5, −2, 5, 5, −4, −4, 3, 2, 0, 0}; {, −2, 3, −6, 2, 8, 4, 1, 1, −3, −5, 0, 0}; {2, 8, 0, −7, 0, −3, −4, −2, −6, −7, 0, 0}; {2, 8, 0, −7, 0, −2, −3, −1, −7, −7, 0, 0}; {, −7, 0, −7, 3, −5, −5, 6, 7, −2, 0, 0, 0}; {7, −3, 5, −2, 6, 5, −4, −3, 2, 2, 0, 0}; {, −5, 1, −7, 2, −6, −7, −5, −4, 8, 8, 0, 0}; {, −7, −1, 7, 0, 8, 7, −4, −4, 4, 3, 0, 0}; {, −1, 5, −3, 6, −2, −5, −5, −3, −7, 8, 0, 0}; {3, −7, 1, −6, 2, 0, −6, −6, 0, 1, 0, 0}; {2, 8, 0, −7, 1, −1, −6, −7, 0, 0, 0, 0}; {8, −2, 6, −1, 8, 7, −4, −4, 4, 3, 0, 0}; {6, −4, 4, −3, 6, 5, −5, −4, 2, 2, 0, 0}; {8, −2, 6, −1, 8, 7, −5, −4, 3, 3, 0, 0}; {6, −4, 4, −3, 6, 6, −5, −5, 3, 2, 0, 0}; {4, −6, 2, −5, 4, 5, −5, −5, 2, 1, 0, 0}; {0, 5, −4, 4, −3, −4, −1, −1, 6, 4, 0, 0}; {1, 6, −3, 5, 0, 6, 6, −6, 7, 4, 0, 0}; {1, 8, 1, −5, −7, −3, −3, −2, 5, 6, 0, 0}; {4, −6, 2, −5, 8, −1, −1, 4, 4, 2, 0, 0}; {0, 5, −4, 4, 0, 6, 5, −7, 7, 4, 0, 0}; {0, 5, −4, 4, 0, 6, 5, −7, 7, 5, 0, 0}; {, −1, 4, −5, 3, −1, 5, 5, −7, 7, 5, 0, 0}; {, −2, 3, −6, 2, −2, 4, 4, −7, 6, 3, 0, 0}; {8, −2, 6, −1, −3, 4, 1, 4, 6, 4, 0, 0}; {5, −5, 3, −4, −6, 1, 0, 4, 5, 3, 0, 0}; {4, −6, 2, −5, −7, 0, −1, 4, 5, 2, 0, 0}; {3, −7, 1, −6, 8, −1, −1, 4, 4, 1, 0, 0}; {8, −4, 2, −7, 5, −6, −7, −4, −7, 5, 0, 0}; {, −4, 1, 8, 0, −3, 3, 3, −7, 5, 3, 0, 0}; {6, −4, 4, −2, 2, 5, −3, −4, 4, 1, 0, 0}; {7, −3, 5, −1, 4, 5, −3, −4, 4, 2, 0, 0}; {5, −5, 3, −3, 2, −7, −7, 1, −2, −4, 0, 0}; {8, −1, 8, 3, −7, 8, −7, −4, 6, 6, 0, 0}; {8, −1, 8, 3, −7, 8, −7, −4, 7, 7, 0, 0}; {3, 8, −1, 8, −4, −5, 2, 0, 7, 4, 0, 0}; {2, 8, 0, −6, 0, −2, −4, −2, −7, −7, 0, 0}; {, −1, 5, −3, 7, −3, −4, −5, −3, −7, 8, 0, 0}; {6, −4, 4, −2, 5, 4, −5, −5, 3, 3, 0, 0}; {6, −3, 6, 1, −7, −7, 5, 6, −3, 0, 0, 0}; {3, −6, 3, −2, 6, 8, 4, 4, −3, −2, 0, 0}; {, −2, 3, −6, 3, −7, 6, −1, −3, 4, 3, 0, 0}; {, −7, −2, 5, −2, 4, 1, 0, 0, −5, −6, 0, 0}; {, −3, 3, −5, 5, −4, −6, −6, −4, 8, 8, 0, 0}; {0, 5, −4, 5, −4, −5, −1, −2, 6, 4, 0, 0}; {4, 8, −2, 6, −4, 7, 3, 2, −2, −4, 0, 0}; {, −2, 3, −6, 3, −5, −7, −1, −1, 4, 3, 0, 0}; {4, −6, 2, −4, 6, 5, −6, −5, 2, 2, 0, 0}; {, −2, 3, −6, 3, −4, −6, −2, −2, 5, 3, 0, 0}; {7, −5, 1, −7, 4, −7, 8, −5, 8, 5, 0, 0}; {, −3, 3, −5, 5, 2, −6, −4, 3, 1, 1, 0, 0}; {, −1, 4, −5, 4, 1, 7, 4, 7, 7, 5, 0, 0}; {6, −6, 0, 8, 4, −7, 8, −6, 8, 6, 0, 0}; {, −5, 0, 7, 0, −3, 3, 3, 6, 5, 5, 0, 0}; {4, −5, 4, 0, 6, 6, 7, −6, 6, 6, 0, 0}; {6, −6, 0, −7, 3, −7, 8, −5, 8, 6, 0, 0}; {5, −6, 1, −4, 0, −6, −7, −2, −5, 8, 0, 0}; {8, 1, −4, −4, 3, −3, 2, 4, 6, 0, 0, 0}; {5, −2, −7, −7, 1, −5, 1, 3, 5, −1, 0, 0}; {5, −2, −7, −7, 2, −5, 0, 2, 5, −1, 0, 0}; {, −2, 6, 0, −1, 7, 0, 4, 5, 7, 0, 0, 0}; {6, 8, −4, 5, −4, 8, 1, 8, 8, 4, 0, 0}; {8, −7, −4, 5, 3, −7, 1, −5, −2, 5, 0, 0}; {, −2, −2, 0, 8, 5, −4, 4, −3, 0, 6, 0, 0}; {6, 8, −4, 6, −4, −7, 1, 8, 8, 4, 0, 0}; {, −4, −1, 4, −1, 6, 4, −3, 5, 6, 4, 0, 0}; {6, 8, −4, 6, −4, −7, 1, 8, 8, 5, 0, 0}; {6, 8, −4, 6, −4, −7, 1, −7, 8, 6, 0, 0}; {5, 7, −5, 5, −5, 8, 0, 8, 8, 4, 0, 0}; {0, 2, 6, 1, 8, 6, −2, 5, 8, 4, 0, 0}; {5, 4, 5, −3, −7, −1, 7, 0, 1, 8, 0, 0}; {7, 4, 3, −7, 3, 7, −1, 7, 6, −5, 0, 0}; {6, 7, −6, 4, 3, 8, 1, −6, −3, 7, 0, 0}; {6, 1, −2, 2, −5, −4, 4, −5, −4, −4, 0, 0}; {1, 5, −5, 8, 0, −2, 8, 1, 4, 1, 0, 0}; {5, −6, 1, 0, −7, 8, 3, −3, 1, −1, 0, 0}; {3, 6, −5, 8, 0, −1, 8, 0, 5, 2, 0, 0}; {7, 4, 3, −6, 3, 8, −1, 7, 6, −5, 0, 0}; {, −3, −5, −5, 3, −2, 3, −5, 3, 3, −6, 0, 0}; {4, 1, 0, 8, 1, 7, −2, 6, 6, −5, 0, 0}; {, −7, 1, −5, −1, −1, 7, 1, 3, 6, 5, 0, 0}; {7, −1, −7, −3, 1, 3, −5, 5, 2, 1, 0, 0}; {, −5, 4, −1, 4, −6, −4, 5, 1, −1, −1, 0, 0}; {8, 1, −4, 1, 7, −6, 3, 1, −2, −1, 0, 0}; {7, 0, −5, 0, 6, −7, 2, 0, −3, −1, 0, 0}; {6, −1, −6, −1, 5, −7, 2, 0, −3, −2, 0, 0}; {5, −2, −7, −2, 5, 8, 2, 0, −3, −2, 0, 0}; {, −7, 2, −3, 3, −3, 2, 4, 1, 5, 7, 0, 0}; {3, −5, 5, −6, 3, 7, 8, 5, 7, −7, 0, 0}; {2, 4, 8, 7, 0, −5, 4, −6, 3, 4, 0, 0}; {0, −6, 6, −3, 4, 5, −1, −2, −4, −2, 0, 0}; {, −2, 8, 4, −5, 2, 4, −1, −3, −4, −3, 0, 0}; {, −4, 3, −4, 0, 4, 4, −4, 7, 3, 2, 0, 0}; {0, 8, 2, 7, −4, −2, 7, 3, 0, 0, 0, 0}; {4, −3, 8, −2, 4, 7, 1, −1, −3, −3, 0, 0}; {, −3, 7, 3, −6, 2, 3, −3, −2, −5, −2, 0, 0}; {, −7, 3, −1, 6, −2, 1, −4, −3, −6, −4, 0, 0}; {, −7, 3, −1, 6, −2, 2, −4, −3, −5, −4, 0, 0}; {3, −4, 7, −3, 4, 7, 1, 0, −3, −3, 0, 0}; {1, −6, 5, −5, 2, 5, −1, −2, −4, −3, 0, 0}; {, −4, 3, −3, 1, 0, −7, 2, 4, 7, 6, 0, 0}; {, −2, 6, 1, 6, 7, 4, −5, −1, 4, 5, 0, 0}; {5, −2, −6, 0, 6, 8, 2, −1, −2, −2, 0, 0}; {, −2, 6, 1, 6, −5, −3, 6, 2, 0, 0, 0, 0}; {, −2, 6, 1, 6, −4, −4, 5, 3, −1, 1, 0, 0}; {5, −1, −4, 3, −4, −1, −6, −5, −7, −4, 0, 0}; {, −7, 0, −6, −1, −2, 7, 1, 3, 6, 5, 0, 0}; {, −6, 3, −1, 6, −4, 1, −5, −5, −6, −6, 0, 0}; {, −3, 5, 0, 6, −4, −5, 5, 2, −1, 0, 0, 0}; {, −5, 3, −2, 4, −6, −6, 4, 1, −2, 0, 0, 0}; {5, −1, −4, 4, −4, −1, −6, −6, −7, −4, 0, 0}; {7, 0, −4, 4, −5, −1, −6, −5, −7, −6, 0, 0}; {1, 8, 2, 8, −1, −3, −4, −1, −6, −7, 0, 0}; {, −1, 6, 0, 6, −2, −4, −4, −2, −6, −7, 0, 0}; {1, 7, 0, 5, −4, −5, 0, −1, 5, 3, 0, 0}; {7, −3, 6, −5, 4, 0, −1, 1, −5, −5, 0, 0}; {, −7, 2, −2, 6, 3, 7, −4, 4, 7, 1, 0, 0}; {, −6, −4, 1, 2, −5, 7, 0, 7, 0, 3, 0, 0}; {1, 8, 2, 8, 7, −3, −1, 6, 3, 2, 0, 0}; {4, −5, 5, −5, −6, 6, −2, 1, 5, 5, 0, 0}; {2, −6, 5, −4, −3, 2, −3, 0, 5, 4, 0, 0}; {, −5, 2, −4, 2, 4, −6, −5, 3, 2, 1, 0, 0}; {6, −3, 7, −2, 2, 8, −7, 3, 1, −2, 0, 0}; {, −3, 3, −4, 2, 6, 4, −2, 7, 4, 0, 0, 0}; {7, −2, 8, −1, 4, −7, −6, 4, 1, −2, 0, 0}; {7, −2, 8, −1, 5, −7, −6, 3, 0, −2, 0, 0}; {, −4, 5, 1, −6, 3, −7, −1, 4, 5, 4, 0, 0}; {, −3, 4, −2, 5, −4, −5, −5, −3, −7, 8, 0, 0}; {, −3, 3, −4, 2, 8, 8, −1, −2, 4, 2, 0, 0}; {3, −6, 4, −5, 2, 4, −5, −5, 2, 1, 0, 0}; {1, 8, 2, −7, 0, 2, −6, −6, 1, 0, 0, 0}; {0, 6, −1, 5, −4, −5, −1, −2, 6, 4, 0, 0}; {0, 5, −3, 2, −7, 5, 3, 3, −3, −4, 0, 0}; {, −2, 4, −3, 3, −5, −7, −2, −2, 4, 4, 0, 0}; {4, −6, 3, −7, 5, 7, 5, 2, −6, −7, 0, 0}; {3, −5, 6, −2, −3, 4, 8, −1, 1, 1, 0, 0}; {, −6, 0, −7, −1, −4, 2, 2, 8, 6, 3, 0, 0}; {, −2, −2, 1, 1, −7, 2, −6, −2, 6, 5, 0, 0}; {, −2, 5, −1, 6, 5, −5, −3, 4, 3, 1, 0, 0}; {8, −2, 7, −3, −5, 0, 1, 8, 6, 2, 0, 0}; {6, −1, −5, 4, 5, −3, 2, −5, −2, −1, 0, 0}; {1, −7, 4, −4, −4, 3, 7, −1, 0, 1, 0, 0}; {8, −2, 7, −3, −5, 1, 0, 7, 6, 2, 0, 0}; {, −3, 4, −2, 5, 4, −5, −4, 3, 3, 1, 0, 0}; {, −4, 3, −3, 4, 3, −6, −5, 2, 3, 1, 0, 0}; {7, −3, 6, −4, −5, 0, 1, 8, 5, 3, 0, 0}; {, −4, 3, −3, 4, 4, −6, −3, 4, 2, 1, 0, 0}; {, −4, 3, −3, 4, 4, −6, −3, 4, 2, 2, 0, 0}; {, −5, 2, −4, 3, 3, −7, −4, 3, 2, 2, 0, 0}; {, −5, 2, −4, 3, 3, −7, −4, 4, 2, 1, 0, 0}; {6, −4, 5, −5, −6, 0, −1, 6, 5, 3, 0, 0}; {8, −1, −7, 0, 1, 5, 0, 2, 7, 5, 0, 0}; {3, −7, 2, 8, −7, −2, −1, 6, 4, 2, 0, 0}; {, −7, 0, −6, 1, 3, −7, −5, 4, 2, −1, 0, 0}; {, −2, 3, −5, 0, 0, 5, 3, −6, 7, 3, 0, 0}; {, −2, 6, 1, −7, −3, 4, 6, −1, −1, −2, 0, 0}; {, −3, 6, 2, −4, 1, 8, 5, 5, −2, 0, 0, 0}; {, −2, 6, 1, −6, −1, 5, 7, 0, −2, −2, 0, 0}; {7, −1, −6, 3, −6, −1, 4, 7, 6, 5, 0, 0}; {, −4, 2, −5, 2, 7, −5, −4, 4, 1, −2, 0, 0}; {6, −2, −7, 2, −7, −1, 3, 7, 5, 4, 0, 0}; {, −2, 5, −1, 7, −3, −6, −6, −2, 8, 8, 0, 0}; {3, 8, 0, 6, −6, 6, 2, −7, 6, 0, 0, 0}; {, −2, 5, −1, 7, −3, −5, −5, −3, −7, 8, 0, 0}; {, −3, 4, −2, 6, −4, −6, −6, −3, 8, 8, 0, 0}; {, −1, 7, 2, −5, 2, 4, 6, 8, 6, 5, 0, 0}; {, −5, 1, −6, 1, 6, 8, −2, −3, 5, 2, 0, 0}; {, −1, 8, 4, −2, 7, −4, 0, 3, 4, 2, 0, 0}; {, −3, 3, −4, 3, −7, −4, −4, 5, 1, −2, 0, 0}; {4, −4, 7, 0, 8, −3, 2, 7, 7, 5, 0, 0}; {, −3, 5, 0, −7, 1, 3, 5, 7, 6, 5, 0, 0}; {, −5, 3, −2, 7, −1, 1, 4, 6, 5, 4, 0, 0}; {8, 0, −5, 4, −3, 0, 3, 5, 5, 4, 0, 0}; {6, −4, 5, −4, 3, 0, −1, 0, −5, −6, 0, 0}; {, −7, −1, 8, −1, 6, 6, −3, −3, 3, 2, 0, 0}; {2, −7, 3, −5, 3, 4, −7, −7, 3, 2, 0, 0}; {, −6, 0, −7, 0, 7, 7, −4, −4, 4, 3, 0, 0}; {8, −2, 7, −2, 6, 6, −4, −4, 3, 2, 0, 0}; {, −5, 1, −6, 1, −7, −7, −3, −3, 4, 3, 0, 0}; {, −5, 1, −6, 1, −7, −7, −2, −3, 5, 3, 0, 0}; {0, 6, −1, 6, −2, −4, −3, −2, −7, −7, 0, 0}; {, −7, −1, 8, −1, 7, 6, −4, −4, 3, 2, 0, 0}; {3, 8, 0, 6, −2, −4, 1, 0, 6, 4, 0, 0}; {1, 7, 0, 7, 0, −1, −7, 8, 0, −1, 0, 0}; {, −6, 0, −7, 0, −7, −7, −5, −4, 8, 7, 0, 0}; {, −4, 1, −7, −1, 7, 3, 1, 2, −4, −5, 0, 0}; {3, 8, 0, 6, −1, −3, 1, 0, 7, 5, 0, 0}; {1, 7, 0, 7, 2, 5, 5, 1, 8, 8, 0, 0}; {, −5, 2, −4, 4, 2, −7, −5, 2, 3, 1, 0, 0}; {, −5, 2, −4, 4, 2, −7, −5, 2, 3, 2, 0, 0}; {6, −4, 5, −4, −7, −1, 0, 6, 5, 2, 0, 0}; {6, −4, 5, −4, −7, −1, 0, 6, 5, 3, 0, 0}; {, −5, 2, −4, 4, 2, −7, −5, 2, 2, 1, 0, 0}; {5, −5, 4, −5, −7, −1, −1, 5, 5, 3, 0, 0}; {6, −4, 5, −4, −6, 0, 0, 6, 5, 2, 0, 0}; {0, 8, 3, −4, −4, 4, 7, −2, 0, −1, 0, 0}; {4, −6, 3, −6, 8, −2, −1, 5, 4, 3, 0, 0}; {5, −5, 4, −5, −7, −1, 0, 7, 5, 1, 0, 0}; {5, −5, 4, −5, −7, −1, 0, 7, 5, 2, 0, 0}; {5, −5, 4, −5, −7, −1, 0, 7, 4, 2, 0, 0}; {5, −5, 4, −5, −7, −1, 1, 7, 5, 2, 0, 0}; {5, −5, 4, −5, −7, −1, 1, 7, 5, 3, 0, 0}; {4, −6, 3, −6, 8, −2, 0, 6, 5, 3, 0, 0}; {, −7, 0, −6, 2, 1, 8, −5, 2, 2, 2, 0, 0}; {0, −4, −5, 8, −3, 4, −7, −7, −2, −6, 0, 0}; {4, −6, 3, −6, −7, −1, 0, 7, 4, 2, 0, 0}; {3, −7, 2, −7, 8, −2, −1, 6, 4, 1, 0, 0}; {3, −7, 2, −7, 8, −2, −1, 6, 4, 2, 0, 0}; {8, −1, −7, 1, 1, 8, −6, 2, 1, 0, 0, 0}; {3, −7, 2, −7, 8, −2, −1, 6, 4, 3, 0, 0}; {, −3, 5, 0, −7, −6, 2, 5, −2, −1, −2, 0, 0}; {2, 8, 1, 8, 7, −3, −1, 6, 3, 2, 0, 0}; {7, −2, 8, 0, 0, 7, −6, 2, 1, 0, 0, 0}; {3, −7, 2, −7, 8, −1, −2, 4, 5, 2, 0, 0}; {, −4, 1, −7, −1, −3, 3, 1, 8, 6, 3, 0, 0}; {, −4, 1, −7, −1, −3, 3, 1, 8, 6, 4, 0, 0}; {, −5, 0, 8, −2, −4, 3, −1, 7, 6, 2, 0, 0}; {, −6, 1, −5, 3, 4, −6, −4, 5, 2, 0, 0, 0}; {2, 8, 1, 8, 8, −2, −2, 5, 4, 1, 0, 0}; {2, 8, 1, 8, 8, −2, −1, 6, 3, 1, 0, 0}; {2, 8, 1, 8, 8, −2, −1, 6, 4, 1, 0, 0}; {7, −2, 8, 0, 1, 8, −6, 2, 1, −1, 0, 0}; {7, −2, 8, 0, 1, 8, −6, 2, 1, 0, 0, 0}; {1, 7, 0, 7, 7, −3, −2, 5, 3, 2, 0, 0}; {1, 7, 0, 7, 7, −2, −3, 4, 4, 1, 0, 0}; {, −4, 4, −1, 8, −5, 3, 5, −2, −1, −2, 0, 0}; {, −5, 0, 8, −2, −2, 3, 2, −7, 6, 2, 0, 0}; {, −2, 4, −3, 5, 7, −3, −3, 4, 2, 0, 0, 0}; {, −7, 2, −2, −7, −2, 5, 3, 4, −3, 0, 0, 0}; {, −5, 1, −6, 2, 6, −5, −5, 5, 2, −2, 0, 0}; {, −4, 2, −5, 3, 7, −4, −4, 5, 2, −1, 0, 0}; {, −4, 3, −3, 6, −5, −7, −7, −3, 8, 8, 0, 0}; {1, −7, 4, −2, 4, 4, 6, −7, 6, 6, 0, 0}; {, −5, 2, −4, 5, −5, −6, −6, −4, 8, 8, 0, 0}; {8, −1, −7, 2, 8, −7, −7, −6, 8, 7, 0, 0}; {8, −2, 7, −1, 5, 6, −3, −4, 4, 2, 0, 0}; {6, −4, 5, −3, 3, 4, −4, −5, 3, 1, 0, 0}; {, −4, 5, 1, −4, 5, −6, −1, 3, 4, 1, 0, 0}; {4, −6, 3, −5, 1, −2, −3, −1, −6, −7, 0, 0}; {3, −7, 2, −6, 0, −2, −3, −1, −6, −7, 0, 0}; {, −7, −1, 8, 0, 6, 5, −3, −3, 3, 3, 0, 0}; {4, −5, 5, −2, 5, 6, 8, −7, 7, 6, 0, 0}; {7, −3, 6, −2, 5, 5, −4, −4, 3, 2, 0, 0}; {, −7, −1, 8, 0, 7, 7, −4, −5, 5, 3, 0, 0}; {8, −2, 7, −1, 6, 6, −5, −5, 4, 3, 0, 0}; {6, −4, 5, −3, 4, 5, −5, −5, 3, 2, 0, 0}; {2, 7, −1, 6, −4, −2, −2, 6, 2, −2, 0, 0}; {5, −5, 4, −4, 3, 7, 8, 2, −1, −4, 0, 0}; {2, 8, 1, −7, 0, −3, −4, −2, −6, −7, 0, 0}; {, −4, 1, −7, 0, 6, 3, 1, 1, −4, −5, 0, 0}; {6, −4, 5, −3, 4, 3, −5, −5, 2, 2, 0, 0}; {1, 7, 0, 8, 0, −1, −7, 8, 0, 0, 0, 0}; {6, −4, 5, −3, 5, 5, −5, −5, 3, 2, 0, 0}; {0, 5, −3, 4, −5, −6, 0, −1, 5, 3, 0, 0}; {, −7, 0, −6, 3, −4, −2, 6, 7, −1, 0, 0, 0}; {3, −7, 2, −6, 2, 3, −6, −6, 2, 1, 0, 0}; {, −4, 3, −3, 6, −1, 1, 5, 6, 5, 5, 0, 0}; {, −5, 0, 8, −1, 6, 2, 0, 2, −4, −5, 0, 0}; {7, −4, 4, −5, 3, 0, −1, 0, −5, −6, 0, 0}; {, −4, 2, −5, 3, −4, −6, −6, −4, −7, 8, 0, 0}; {, −6, −1, 7, −2, 6, 2, 0, 1, −4, −5, 0, 0}; {5, −5, 4, −4, 6, 6, −5, −5, 3, 3, 0, 0}; {7, −4, 4, −5, 6, 8, 7, 3, −5, −6, 0, 0}; {, −1, 4, −4, 3, −1, 5, 4, −7, 7, 4, 0, 0}; {, −2, 3, −5, 2, −2, 4, 3, −7, 7, 4, 0, 0}; {, −3, 2, −6, 1, −3, 3, 2, 8, 6, 3, 0, 0}; {, −2, 3, −5, 2, −2, 4, 4, −6, 7, 3, 0, 0}; {4, −6, 3, −5, 8, −1, 1, 7, 4, 3, 0}; {, −3, 5, 0, −6, −6, 2, 5, −4, 0, −1, 0, 0}; {, −3, 2, −6, 1, −2, 3, 4, −5, 6, 3, 0, 0}; {, −4, 1, −7, 0, −3, 2, 4, −7, 5, 2, 0, 0}; {2, 8, 1, −7, 7, −2, −2, 4, 4, 2, 0, 0}; {0, 6, −1, 7, 5, −4, −2, 5, 3, 1, 0, 0}; {4, 8, −1, 5, 2, 8, 4, −6, 8, 4, 0, 0}; {, −4, 1, −7, 0, −2, 4, 2, 7, 6, 4, 0}; {, −4, 1, −7, 0, −2, 4, 2, 7, 7, 3, 0, 0}; {1, 7, 0, 8, 7, −2, −3, 3, 4, 1, 0, 0}; {1, 7, 0, 8, 7, −2, −3, 3, 4, 2, 0, 0}; {1, 7, 0, 8, 7, −2, −2, 4, 4, 1, 0, 0}; {, −1, 5, −2, 6, 5, −4, −4, 3, 3, 2, 0, 0}; {, −6, −1, 7, −2, −4, 2, 1, 8, 5, 3, 0, 0}; {, −2, 4, −3, 5, 5, −4, −4, 3, 3, 1, 0, 0}; {5, −7, 0, 6, 4, 8, 7, −4, 8, 4, 0, 0}; {4, 8, −1, 5, 3, 7, 6, −4, 8, 4, 0, 0}; {6, −5, 3, −5, −6, 0, 1, 7, 4, 1, 0, 0}; {6, −4, 5, −2, 3, 8, −7, 2, 0, −3, 0, 0}; {7, −2, 8, 2, 8, 7, 8, −5, 7, 7, 0, 0}; {1, 6, −2, 6, −5, −6, 0, −1, 6, 4, 0, 0}; {, −1, 4, −4, 4, −7, 8, 0, −2, 5, 3, 0, 0}; {3, −6, 4, −2, 5, 6, 7, −7, 7, 6, 0, 0}; {, −4, 2, −5, 4, −6, −6, −5, −4, 8, 7, 0, 0}; {4, −6, 3, −4, 2, 3, −5, −5, 2, 2, 0, 0}; {1, 7, 0, −7, −1, −3, −4, −2, −7, −7, 0, 0}; {0, 6, −1, 8, −2, −4, −4, −2, −7, 8, 0, 0}; {0, 6, −1, 8, −2, −4, −4, −2, −7, −7, 0, 0}; {4, −5, 5, −1, 6, 6, 8, −6, 7, 6, 0, 0}; {0, 5, −3, 5, −5, −7, −1, −2, 5, 4, 0, 0}; {0, 5, −3, 5, −5, −7, 0, −1, 5, 4, 0, 0}; {, −2, 4, −3, 6, −3, −4, −5, −3, −7, 8, 0, 0}; {, −3, 3, −4, 5, −4, −5, −5, −4, −7, 8, 0, 0}; {, −2, 3, −5, 3, −7, 8, −1, −2, 5, 3, 0, 0}; {6, −3, 7, 1, −7, −6, 5, 6, −3, 0, 0, 0}; {4, −5, 5, −1, 7, −7, 4, 5, −3, −1, 0, 0}; {, −1, 5, −2, 7, −2, −5, −5, −2, −7, −7, 0, 0}; {0, 6, −1, 8, −1, −3, −4, −2, −7, −7, 0, 0}; {, −1, 5, −2, 7, −2, −4, −5, −3, −7, −7, 0, 0}; {, −3, 3, −4, 5, −4, −6, −5, −3, 8, 8, 0, 0}; {0, 5, −3, 5, −4, −6, −1, −2, 6, 5, 0, 0}; {0, 5, −3, 5, −4, −5, −1, −2, 6, 4, 0, 0}; {, −2, 3, −5, 3, −6, −7, −2, −3, 6, 4, 0, 0}; {4, −6, 3, −4, 4, 4, −6, −6, 3, 2, 0, 0}; {, −1, 4, −4, 4, −5, −6, −1, −2, 6, 4, 0, 0}; {4, −6, 3, −4, 4, 4, −6, −6, 3, 3, 0, 0}; {, −2, 3, −5, 3, −6, −7, −1, −2, 5, 3, 0, 0}; {7, −3, 6, −1, 7, 7, −7, −6, 7, 7, 0, 0}; {4, −6, 3, −4, 4, 5, −6, −6, 3, 2, 0, 0}; {, −4, 1, −7, 1, 8, 8, −2, −3, 5, 2, 0, 0}; {, −5, 0, 8, 0, 7, 7, −2, −3, 4, 2, 0, 0}; {, −3, 3, −4, 5, −3, −2, 8, 7, 0, −1, 0, 0}; {8, −3, 5, −3, 4, 0, −2, 0, −5, −6, 0, 0}; {, −6, −1, 7, −1, 7, 4, −3, −4, 2, 2, 0, 0}; {0, 5, −3, 5, −3, −5, −1, −1, 5, 4, 0, 0}; {2, 7, −1, 7, −1, −3, −3, −2, −6, −7, 0, 0}; {2, 7, −1, 7, −1, −3, −2, −2, −6, −7, 0, 0}; {1, 6, −2, 6, −2, −4, −2, −2, −6, −7, 0, 0}; {4, −6, 3, −4, 5, 5, −6, −6, 3, 3, 0, 0}; {, −3, 2, −6, 2, −6, −7, −2, −3, 5, 3, 0, 0}; {2, 8, 1, −6, 3, 3, −7, −7, 2, 2, 0, 0}; {1, 7, 0, −7, 2, 2, −7, −6, 1, 1, 0, 0}; {2, 8, 1, −6, 3, 4, −7, −7, 2, 1, 0, 0}; {7, −5, 2, −7, 0, 0, −1, 7, 3, −2, 0, 0}; {, −4, 1, −7, 1, −6, −7, −3, −3, 5, 3, 0, 0}; {, −1, 5, −2, 7, 1, 2, 8, −7, 1, 1, 0, 0}; {, −7, −2, 6, −2, 7, 7, −4, −4, 4, 2, 0, 0}; {, −3, 3, −4, 5, 4, −5, −3, 3, 2, 3, 0, 0}; {, −1, 4, −4, 5, 8, −2, −3, 5, 2, −1, 0, 0}; {, −3, 2, −6, 3, 7, −7, 0, −1, 6, 2, 0, 0}; {2, 8, 1, −5, 0, 7, 8, 0, −2, −4, 0, 0}; {, −5, 1, −6, 4, −6, −7, −6, −4, 8, 7, 0, 0}; {, −5, 1, −6, 4, −6, −6, −6, −4, 8, 7, 0, 0}; {, −7, −2, 6, −1, 4, 5, −2, −4, 4, 1, 0, 0}; {, −3, 3, −4, 6, −4, −6, −5, −3, 8, 8, 0, 0}; {, −5, 1, −6, 4, −5, −7, −7, −4, 8, 8, 0, 0}; {, −5, 1, −6, 4, −5, −7, −6, −4, 8, 7, 0, 0}; {, −5, 1, −6, 4, −5, −6, −6, −4, 8, 8, 0, 0}; {, −5, 0, 8, 1, 7, 6, −2, −3, 4, 3, 0, 0}; {, −5, 0, 8, 1, 7, 7, −2, −3, 5, 2, 0, 0}; {6, −5, 3, −4, 3, 0, −3, −2, −5, −6, 0, 0}; {7, −4, 4, −3, 4, 2, −4, −5, 2, 1, 0, 0}; {, −1, 3, −6, 2, 8, 5, 2, 2, −3, −5, 0, 0}; {4, −7, 1, −6, 1, −1, −3, −1, −6, −7, 0, 0}; {7, −3, 6, 0, 8, 7, 8, −6, 7, 7, 0, 0}; {, −3, 2, −6, 3, −6, −7, −3, −3, 5, 4, 0, 0}; {0, 5, −3, 6, −2, −4, −4, −3, −7, −7, 0, 0}; {, −5, 0, 8, 1, −7, 8, −3, −4, 5, 3, 0, 0}; {, −1, 5, −2, 8, 2, 2, 8, −7, 1, 1, 0, 0}; {8, −3, 5, −2, 7, 7, −4, −4, 3, 2, 0, 0}; {6, −6, 1, −7, 4, −7, 8, −5, 8, 6, 0, 0}; {2, 6, −3, 5, 1, 6, 6, −7, 7, 5, 0, 0}; {8, −3, 5, −1, −4, 3, 0, 4, 6, 2, 0, 0}; {, −5, −2, 4, −4, 8, −3, −7, −5, −6, 6, 0, 0}; {0, 4, −5, 4, 1, 7, 4, 7, 8, 3, 0, 0}; {1, 7, 0, −5, −1, 6, 7, 1, −1, −4, 0, 0}; {3, 8, 0, −6, 0, −2, −3, −1, −6, −7, 0, 0}; {7, −3, 6, 1, 8, 7, 8, −5, 7, 7, 0, 0}; {1, 6, −2, 8, −2, −4, −4, −2, −7, 8, 0, 0}; {, −5, −1, 6, −1, 5, 2, 1, 1, −4, −6, 0, 0}; {5, 8, −2, 6, −4, 8, 4, 4, −1, −4, 0, 0}; {1, 5, −4, 5, 0, 6, 6, −7, 7, 6, 0, 0}; {7, 8, −4, 6, −4, −7, 1, 8, −7, 5, 0, 0}; {, −5, −7, −6, 1, −4, 2, −6, 2, 3, 8, 0, 0}; {, −1, −1, 2, −5, 8, −4, 5, −2, −1, 8, 0, 0}; {4, 5, −7, 3, 2, 7, 0, 8, −5, 6, 0, 0}; {, −2, −2, 1, −6, 8, −4, 4, −3, −2, 7, 0, 0}; {3, 4, 8, 2, 1, 6, 0, −7, −4, 6, 0, 0}; {2, 3, 7, 1, 1, 5, −1, 8, −5, 6, 0, 0}; {0, 1, 5, −1, 0, 4, −2, 8, −5, 6, 0, 0}; {1, 4, −6, 7, −1, −2, 7, −1, 4, 1, 0, 0}; {, −5, −3, 2, −2, 5, 3, −4, 3, 7, 3, 0, 0}; {, −5, −3, 2, −2, 5, 3, −4, 4, 6, 3, 0, 0}; {, −3, −5, −4, 4, −1, 3, −5, 3, 3, −6, 0, 0}; {2, 1, 3, −4, −7, −2, 6, −1, 0, −7, 0, 0}; {5, −7, 0, −1, 7, 8, 1, −6, 1, 0, 0, 0}; {, −7, 1, −4, 0, 0, 7, 0, 3, 7, 5, 0, 0}; {8, 1, −2, 3, 8, −2, −3, 8, −1, 1, 0, 0}; {3, −7, 3, 6, 4, −3, 5, 6, −7, 7, 0, 0}; {, −1, 7, 3, 8, −4, 1, 0, −6, 1, 2, 0, 0}; {5, 6, −5, −6, 2, −4, 4, −5, 3, 4, 0, 0}; {1, 2, 7, 6, −1, −6, 2, −7, 2, 4, 0, 0}; {6, −3, 8, −3, −4, 6, −2, 1, 6, 5, 0, 0}; {2, −7, 4, −7, −7, 5, −3, 0, 5, 5, 0, 0}; {0, −7, 6, −3, 3, −6, 7, −7, −1, 2, 0, 0}; {5, 6, −5, −5, 2, −4, 4, −5, 3, 4, 0, 0}; {0, −7, 6, −2, −3, 2, 8, 1, 4, 0, 0, 0}; {3, 4, −7, −7, 1, −6, 3, −6, 3, 4, 0, 0}; {3, 4, −7, −7, 1, −5, 3, −6, 3, 3, 0, 0}; {3, 4, −7, −7, 1, −5, 3, −6, 3, 4, 0, 0}; {, −7, −5, 1, 2, −5, 7, 0, 7, 0, 2, 0, 0}; {8, −6, 0, 1, −6, 6, −1, 6, −1, 2, 0, 0}; {2, 3, 8, 8, 1, −6, 3, −6, 3, 4, 0, 0}; {1, 2, 7, 7, 0, −6, 3, −7, 2, 4, 0, 0}; {, −5, −5, −1, −2, 6, 0, 8, −3, 5, 5, 0, 0}; {, −3, 3, −3, 2, 0, −6, 2, 4, 7, 6, 0, 0}; {, −3, 3, −3, 3, 5, 7, 2, 3, 8, 5, 0, 0}; {2, −7, 4, −5, −2, 2, −2, −1, 5, 4, 0, 0}; {6, −2, −6, 2, 7, −3, −7, 8, 0, 1, 0, 0}; {, −1, 6, 1, 8, −2, 2, −6, −6, 2, 0, 0, 0}; {1, −6, 7, 0, −7, −3, 0, 3, 4, 3, 0, 0}; {3, −6, 5, −4, 4, 6, 8, −7, 7, 6, 0, 0}; {0, 8, 4, −4, 5, −5, 0, 5, 5, 4, 0, 0}; {8, −1, −6, 1, −6, 8, −7, −4, 8, 8, 0, 0}; {, −1, 8, 5, −2, −5, 1, 8, −1, 3, 1, 0, 0}; {, −6, −1, 8, −3, 6, 2, 0, 2, −4, −5, 0, 0}; {, −1, 8, 5, −2, −4, 1, 7, 1, 4, 0, 0, 0}; {, −2, 7, 4, −3, −5, 1, 7, −1, 3, 0, 0, 0}; {, −4, 5, 2, −5, −6, 0, 6, −1, 3, 0, 0, 0}; {3, 4, −7, −6, 2, −4, 4, −5, 3, 3, 0, 0}; {, −5, 2, −3, 4, 2, 8, −5, 2, 3, 2, 0, 0}; {3, 2, 5, 4, −5, 4, −5, 0, 7, 6, 0, 0}; {, −2, −1, 4, 5, −2, −7, 2, −7, 2, 3, 0, 0}; {7, 7, −5, −5, 3, −3, 5, −4, 4, 5, 0, 0}; {4, −6, 4, −6, 8, −2, −1, 6, 5, 2, 0, 0}; {, −3, 5, 1, −7, −4, 3, 6, 0, −1, −2, 0, 0}; {6, −3, 8, −1, 1, 8, −6, 3, 1, −1, 0, 0}; {3, −5, 7, 0, 5, −5, 6, 7, −1, 0, 0, 0}; {3, −5, 7, 0, 5, −5, 7, 8, 0, 1, 0, 0}; {2, −6, 6, −1, 4, −6, 7, 6, −1, 0, 0, 0}; {7, 0, −3, 7, −3, 4, 2, 3, −4, 0, 0, 0}; {8, 1, −2, 8, −2, 5, 3, 5, −3, 1, 0, 0}; {8, −1, −6, 2, 6, −5, −5, 6, 1, 0, 0, 0}; {1, −7, 5, −2, 3, −6, 6, 6, −1, 1, 0, 0}; {7, 0, −3, 7, −3, 5, 2, 4, −4, 0, 0, 0}; {1, −7, 5, −2, 3, −6, 7, 6, −1, 0, 0, 0}; {, −6, 0, −6, 1, 4, −5, −5, 4, 2, −1, 0, 0}; {4, −5, 6, −2, 3, −7, −7, 3, 0, −1, 0, 0}; {, −7, −1, −7, 0, 4, −6, −6, 4, 2, −2, 0, 0}; {3, 8, 1, 7, −6, 5, 2, −7, 6, −1, 0, 0}; {, −7, 2, −1, −7, 1, 8, −2, 2, 3, 3, 0, 0}; {, −4, 4, 0, −7, 0, 3, 5, 7, 6, 4, 0, 0}; {1, −6, 7, 1, −7, −3, 0, 3, 3, 3, 0, 0}; {8, 0, −4, 5, −3, 0, 3, 5, 4, 4, 0, 0}; {6, −4, 6, −3, 3, 5, −4, −4, 3, 1, 0, 0}; {, −3, 6, 3, −3, 6, −5, −2, 1, 3, 2, 0, 0}; {7, −1, −5, 4, −4, 0, 3, 6, 6, 4, 0, 0}; {6, −2, −6, 3, −5, 0, 3, 6, 6, 3, 0, 0}; {2, −6, 6, −1, 7, −4, 1, 6, 5, 4, 0, 0}; {0, 8, 4, −3, 5, −5, 0, 5, 4, 3, 0, 0}; {, −5, 2, −3, 5, −4, 1, 5, −7, 7, 5, 0, 0}; {8, −4, 4, −7, −3, 8, 5, −6, 8, 0, 0, 0}; {2, −7, 4, −4, 4, 5, 7, −7, 7, 6, 0, 0}; {6, −2, −6, 3, −4, −1, 2, 5, 5, 4, 0, 0}; {0, 7, 2, −6, 2, 4, 7, 8, 6, 5, 0, 0}; {0, 7, 2, −6, 2, 4, 7, 8, 7, 5, 0, 0}; {5, −3, −7, 2, −5, −1, 2, 4, 5, 3, 0, 0}; {, −6, 1, −4, 4, −4, 1, 4, −7, 7, 5, 0, 0}; {7, −3, 7, −2, 6, 7, −4, −5, 4, 2, 0, 0}; {, −1, 4, −3, 3, −6, −6, −1, −2, 6, 3, 0, 0}; {, −2, 3, −4, 2, −7, −7, −1, −2, 5, 2, 0, 0}; {, −5, 3, −1, 8, 2, 8, −3, 4, 5, 3, 0, 0}; {0, 6, 0, 7, −1, −4, −5, −2, −7, −7, 0, 0}; {, −2, 4, −2, 5, −2, −5, −5, −2, −7, −7, 0, 0}; {, −5, 2, −3, 5, 2, −7, −4, 3, 3, 2, 0, 0}; {5, −5, 5, −4, −7, −1, 0, 7, 5, 3, 0, 0}; {, −4, 1, −6, 0, −3, 2, 3, −7, 7, 3, 0, 0}; {, −4, 1, −6, 0, −3, 2, 3, −6, 7, 3, 0, 0}; {0, 6, 0, 7, 5, −4, −4, 3, 4, 2, 0, 0}; {, −6, −1, 8, −2, −4, 1, 3, −7, 6, 3, 0, 0}; {, −1, 5, −1, 6, 5, −4, −4, 3, 4, 2, 0, 0}; {, −7, −2, 7, −3, −5, 1, 0, 7, 6, 3, 0, 0}; {4, 8, 0, 5, 2, 7, 6, −4, 8, 4, 0, 0}; {8, −3, 6, −4, −5, 1, 2, −7, 5, 1, 0, 0}; {1, 8, 3, −5, −4, 2, −3, 0, 4, 4, 0, 0}; {6, −5, 4, −5, −6, 0, 0, 7, 5, 1, 0, 0}; {8, −2, 8, 0, 0, 5, 0, 2, 6, 5, 0, 0}; {, −6, 0, −6, 2, 3, −6, −4, 4, 2, −1, 0, 0}; {2, −6, 6, 0, 4, −6, 6, 8, 0, 1, 0, 0}; {0, 8, 4, −2, 2, −7, 5, 6, −1, 0, 0, 0}; {, −5, 2, −3, 6, −6, −1, −6, −6, 2, 2, 0, 0}; {, −6, 1, −4, 5, −7, −2, −6, −7, 2, 1, 0, 0}; {, −6, 1, −4, 5, −7, −2, −6, −7, 1, 2, 0, 0}; {, −1, 7, 3, −3, 2, 8, 5, 5, −2, 0, 0, 0}; {, −2, 6, 2, −4, 1, 8, 5, 5, −2, 0, 0, 0}; {7, −3, 7, −1, 2, −7, −6, 3, 1, −2, 0, 0}; {6, −4, 6, −2, 2, 5, −2, −3, 5, 2, 0, 0}; {, −2, 6, 2, −4, 2, 8, 4, 5, −2, 0, 0, 0}; {0, 5, −2, 5, −7, −2, −3, 6, 3, −1, 0, 0}; {3, −6, 5, −2, 5, 6, 7, −7, 7, 6, 0, 0}; {4, −4, 8, 2, −6, −2, 2, 5, 5, 3, 0, 0}; {1, −7, 5, −1, 7, −4, 1, 5, 5, 3, 0, 0}; {1, −7, 5, −1, 7, −4, 1, 5, 5, 4, 0, 0}; {0, 8, 4, −2, 6, −5, 0, 5, 4, 3, 0, 0}; {7, −5, 3, −7, −3, 8, 4, −6, 7, 0, 0, 0}; {0, 5, −2, 5, −5, −6, −1, −2, 6, 4, 0, 0}; {4, −6, 4, −4, 3, 4, −6, −6, 3, 2, 0, 0}; {, −3, 2, −5, 2, 8, 8, −2, −3, 5, 3, 0, 0}; {, −2, 3, −4, 3, −7, −7, −1, −2, 5, 3, 0, 0}; {, −3, 2, −5, 2, 8, 8, −1, −2, 5, 2, 0, 0}; {, −3, 2, −5, 2, 8, 8, −1, −2, 5, 3, 0, 0}; {0, 6, 0, 8, −1, 0, −7, −7, 1, 0, 0, 0}; {, −3, 2, −5, 2, 8, −7, −1, −2, 5, 2, 0, 0}; {, −4, 1, −6, 1, 7, 8, −2, −3, 5, 2, 0, 0}; {, −4, 1, −6, 1, 7, 8, −1, −2, 5, 2, 0, 0}; {1, 7, 1, −7, 0, 2, −6, −6, 2, 1, 0, 0}; {4, −4, 8, 2, −5, −1, 0, 3, 5, 3, 0, 0}; {7, −2, −7, 2, −6, −1, 3, 8, 6, 5, 0, 0}; {7, −2, −7, 2, −6, −1, 3, 8, 7, 5, 0, 0}; {, −5, 3, −1, −7, 2, 8, −2, 4, 5, 4, 0, 0}; {7, −4, 5, −4, 3, 0, −1, 0, −5, −6, 0, 0}; {, −3, 2, −5, 2, −7, 7, −2, −3, 4, 3, 0, 0}; {, −4, 1, −6, 1, 8, 7, −2, −3, 4, 3, 0, 0}; {6, −4, 6, −2, 6, 6, −7, −6, 7, 6, 0, 0}; {4, −6, 4, −4, 4, 5, −7, −7, 7, 6, 0, 0}; {3, −7, 3, −5, 3, −6, −6, 3, 2, 0, 0}; {, −7, 0, −5, 4, −3, 0, 4, 5, 5, 5, 0, 0}; {1, 7, 1, −7, 1, 3, −7, −7, 2, 0, 0}; {0, 6, 0, 8, 0, 2, −7, −7, 2, 1, 0, 0}; {7, −4, 5, −4, 4, 0, −1, 0, −5, −6, 0, 0}; {6, −5, 4, −5, 3, −1, −1, 0, −5, −6, 0, 0}; {, −7, −2, 7, −2, 6, 3, −4, −5, 2, 2, 0, 0}; {, −7, −1, −7, 1, −6, 8, −6, −4, 7, 7, 0, 0}; {3, 8, 1, 8, 0, −3, −2, −1, −6, −6, 0, 0}; {5, −5, 5, −3, 6, 6, −7, −6, 7, 6, 0, 0}; {4, −6, 4, −4, 5, 6, −7, −7, 7, 6, 0, 0}; {3, −7, 3, −5, 4, 5, 8, −7, 7, 6, 0, 0}; {, −3, 5, 1, −5, 6, −6, −2, 1, 3, 2, 0, 0}; {, −5, 0, −7, 0, −4, 2, 3, −7, 6, 3, 0, 0}; {, −6, −1, 8, −1, −4, 2, 1, 7, 6, 3, 0, 0}; {, −1, 5, −1, 7, 5, −4, −3, 3, 4, 1, 0, 0}; {, −6, −1, 8, −1, −4, 2, 2, 8, 6, 3, 0, 0}; {, −1, 5, −1, 7, 5, −4, −3, 4, 4, 1, 0, 0}; {, −7, −2, 7, −2, −5, 1, 2, 8, 6, 2, 0, 0}; {, −7, −2, 7, −2, −5, 1, 2, 8, 6, 3, 0, 0}; {, −2, 4, −2, 6, 5, −4, −3, 4, 3, 1, 0, 0}; {2, −7, 4, −3, −3, 5, 7, −1, 1, −1, 0, 0}; {2, 6, −2, 4, 1, 6, 5, −5, 8, 4, 0, 0}; {7, −4, 5, −4, −6, 0, 1, 8, 5, 1, 0, 0}; {0, 4, −4, 3, 0, 5, 6, −5, 7, 3, 0, 0}; {6, −6, 2, −7, −3, −3, 3, 1, 8, 4, 0, 0}; {, −4, 2, −4, 5, −5, −7, −6, −3, 8, 8, 0, 0}; {, −4, 1, −6, 2, 8, 8, −2, −3, 5, 3, 0, 0}; {, −6, −1, 8, 0, 6, 7, −2, −3, 5, 2, 0, 0}; {3, 7, −1, 6, −4, −7, −1, 5, 3, 0, 0}; {7, −3, 7, 0, 8, 7, −7, −5, 7, 7, 0, 0}; {3, 7, −1, 6, −4, −6, 1, −1, 6, 3, 0, 0}; {, −5, 0, −7, 1, 8, 8, −3, −4, 5, 3, 0, 0}; {, −7, −2, 7, −1, 6, 6, −3, −4, 4, 2, 0, 0}; {8, −3, 6, −2, 5, 6, −4, −4, 4, 2, 0, 0}; {2, 7, 0, 8, 0, −3, −3, −2, −6, −7, 0, 0}; {2, 7, 0, 8, 0, −3, −3, −1, −6, −7, 0, 0}; {6, −4, 6, −1, 8, 7, −7, −5, 7, 7, 0, 0}; {5, −5, 5, −2, 7, 6, 8, −6, 7, 6, 0, 0}; {3, −7, 3, −4, 5, 5, 7, −7, 7, 6, 0, 0}; {, −3, 2, −5, 3, −5, −6, −4, −3, −7, 8, 0, 0}; {2, 6, −2, 5, −4, −5, 0, −2, 7, 3, 0, 0}; {, −4, 0, 8, −1, 7, 3, 1, 1, −4, −5, 0, 0}; {, −3, 2, −5, 3, −4, −6, −4, −3, 8, 7, 0, 0}; {, −3, 2, −5, 3, −4, −6, −4, −3, −7, 8, 0, 0}; {, −6, −2, 6, −3, 5, 2, 0, 1, −4, −6, 0, 0}; {3, 7, −1, 6, −2, −3, 1, 0, 7, 4, 0, 0}; {3, 7, −1, 7, 6, −1, 7, 6, 6, −1, 0, 0}; {, −2, 1, 8, −1, −3, 5, −3, −7, −7, 1, 0, 0}; {2, 6, −2, 6, 5, −2, 7, 6, 6, −1, 0, 0}; {8, −2, 8, 2, −7, 7, −7, −4, 7, 7, 0, 0}; {3, 8, 1, −6, 0, −2, −3, −1, −6, −7, 0, 0}; {7, −3, 7, 1, 8, 7, 8, −5, 7, 7, 0, 0}; {0, 4, −4, 4, −7, −6, 1, −1, 7, 2, 0, 0}; {7, −4, 5, −2, 5, 3, −4, −4, 2, 3, 0, 0}; {2, 8, 2, −4, 4, 4, 7, −7, 6, 6, 0, 0}; {4, 8, 0, 8, −2, −4, 1, −1, 7, 5, 0, 0}; {8, −3, 6, −1, 6, 5, −4, −4, 4, 3, 0, 0}; {0, 4, −4, 4, −6, 8, 0, −2, 5, 3, 0, 0}; {, −1, 4, −3, 6, −2, −4, −5, −3, −7, −7, 0, 0}; {7, −5, 3, −5, 2, 0, −1, 0, −5, −6, 0, 0}; {1, 5, −3, 5, −4, −6, 0, −1, 5, 4, 0, 0}; {6, −5, 4, −3, 5, 4, −5, −5, 3, 2, 0, 0}; {1, 5, −3, 5, −4, −5, 0, −1, 6, 3, 0, 0}; {1, 5, −3, 5, −4, −4, 0, −2, 7, 3, 0, 0}; {, −7, −2, 7, 0, −7, 8, −6, −5, 7, 8, 0, 0}; {3, 7, −1, 7, −1, −3, −1, −2, −6, −7, 0, 0}; {1, 5, −3, 5, −3, −5, 0, −1, 5, 4, 0, 0}; {6, −5, 4, −3, 6, 5, −5, −4, 3, 2, 0, 0}; {6, −5, 4, −3, 6, 6, −5, −5, 3, 2, 0, 0}; {, −1, 3, −5, 4, 8, −7, 1, −1, 7, 2, 0, 0}; {0, 4, −4, 5, −5, 8, 0, −1, 5, 4, 0, 0}; {7, −6, 1, −6, 3, −7, −7, −4, −7, 7, 0, 0}; {5, 8, −1, 8, −2, −7, 2, 0, 5, 4, 0, 0}; {2, 3, 8, 2, −7, 6, −1, 6, 8, 3, 0, 0}; {, −6, −6, −2, 7, 5, −6, 2, −4, −2, 6, 0, 0}; {8, 8, −4, 5, 4, 8, 1, −5, −3, 6, 0, 0}; {2, 3, 8, 3, −7, 7, −1, 6, 8, 4, 0, 0}; {2, 1, 4, −3, −6, −2, 6, −2, −1, 8, 0, 0}; {, −7, 7, −7, 2, −2, 1, −7, 1, 1, −7, 0, 0}; {, −5, −6, −2, 8, 6, −6, 3, −5, −3, 7, 0, 0}; {, −2, −5, −3, 6, 1, 3, −5, 3, 2, −6, 0, 0}; {0, −7, 7, −3, 2, −7, −6, 5, −2, 0, 0, 0}; {, −5, 7, 8, 2, 8, 4, −2, 6, −7, −4, 0, 0}; {, −2, 7, 5, −4, 0, 7, −7, 4, −2, 0, 0, 0}; {, −5, 7, 8, 2, −7, 5, −2, 7, −7, −3, 0, 0}; {7, 0, −2, 5, −6, 5, −4, 0, 2, 1, 0, 0}; {3, −3, −4, 5, −1, 6, −6, −3, 1, 1, 0, 0}; {3, −3, −4, 5, 0, 7, −6, −2, 2, 0, 0, 0}; {, −4, 4, 1, 8, 4, 8, −3, 5, 7, 2, 0, 0}; {, −5, 4, 2, −6, −7, −1, 5, −3, 2, −1, 0, 0}; {0, −6, −7, 2, 2, −7, 0, −7, −1, −2, 0, 0}; {, −7, −7, −2, −3, 5, −2, 6, −4, 4, 4, 0, 0}; {, −2, −1, 5, 5, −2, 8, 1, 8, 1, 3, 0, 0}; {7, 7, −4, −5, 3, −4, 5, −5, 4, 5, 0, 0}; {7, 0, −2, 6, −7, 4, −5, 1, 0, −1, 0, 0}; {2, −6, 7, −2, 0, −6, 1, 5, 3, 0, 0, 0}; {3, −2, −2, 8, −3, −7, 2, −7, −4, −3, 0, 0}; {8, 4, 5, 0, 7, 4, −3, 5, 8, −4, 0, 0}; {1, −4, −4, 6, −4, 8, 1, 8, −5, −3, 0, 0}; {, −6, 4, 3, −4, 1, −3, 5, −5, −2, −2, 0, 0}; {6, 2, 3, −1, 6, 2, −4, 5, 8, −4, 0, 0}; {, −7, 0, −4, 3, 7, −4, −4, 7, 1, 1, 0, 0}; {0, 7, 3, −6, 2, 5, 7, 8, 7, 5, 0, 0}; {5, −3, −6, 2, −5, 0, 2, 4, 5, 3, 0, 0}; {4, −4, −7, 1, −6, −1, 2, 3, 4, 4, 0, 0}; {1, −6, 8, 1, −4, 2, −7, 0, 3, 2, 0, 0}; {, −4, 4, 1, −7, 3, 8, −2, 4, 6, 3, 0, 0}; {1, 7, 2, 8, 0, 4, 6, −5, 8, 5, 0, 0}; {7, −2, −6, 1, −6, −1, 2, 7, 6, 4, 0, 0}; {, −6, 2, −1, 7, 1, 7, −3, 3, 5, 3, 0, 0}; {8, 0, −3, 5, 0, 6, −5, 2, 4, 2, 0, 0}; {8, 0, −3, 5, 1, 6, −4, 4, 5, 2, 0, 0}; {6, −2, −5, 3, 0, 5, −6, 2, 5, 1, 0, 0}; {, −6, 3, 1, −6, 8, −2, 6, −3, 2, 0, 0, 0}; {, −6, 3, 1, −6, 8, −2, 6, −2, 2, 0, 0, 0}; {4, −4, −7, 1, −2, 4, −7, 1, 4, 1, 0, 0}; {8, 1, −1, 8, 7, −3, 4, −4, 1, −1, 0, 0}; {, −7, 2, 0, −7, 8, −2, 5, −2, 2, 0, 0, 0}; {6, 2, 3, −1, 5, 2, −5, 4, 8, −5, 0, 0}; {6, −4, 7, −2, 0, 4, −1, 0, 6, 4, 0, 0}; {, −5, 2, −2, 6, −6, −1, −5, −7, 1, 2, 0, 0}; {, −6, 1, −3, 5, −7, −2, −5, −7, 1, 3, 0, 0}; {, −2, 6, 3, −4, 1, 8, 5, 5, −2, 1, 0, 0}; {, −1, 7, 4, −3, 2, −7, 6, 6, −2, 1, 0, 0}; {0, 6, 1, 8, −4, 1, −2, −6, 3, 2, 0, 0}; {, −5, 1, −4, 3, 8, −3, −4, 7, 2, 0, 0, 0}; {3, −7, 4, −5, 0, 7, 8, 3, 1, −3, 0, 0}; {1, 7, 2, −7, −1, 2, −6, −6, 2, 0, 0, 0}; {, −3, 5, 2, −5, 3, −6, 0, 4, 4, 4, 0, 0}; {, −1, 6, 2, −6, 2, 4, 6, 8, 7, 5, 0, 0}; {, −3, 4, 0, 8, 0, 3, 6, 7, 7, 4, 0, 0}; {0, 8, 5, −2, 7, −4, 0, 3, 4, 3, 0, 0}; {, −4, 1, −5, 1, 7, −7, −2, −3, 6, 2, 0, 0}; {, −3, 5, 2, −5, 4, −6, −1, 4, 4, 3, 0, 0}; {1, −6, 8, 2, −4, 3, −6, 0, 2, 2, 0, 0}; {, −5, 0, −6, 0, 6, −7, −3, −3, 5, 2, 0, 0}; {0, 6, 1, 8, −1, 4, 6, −6, 7, 5, 0, 0}; {5, −7, 2, 7, −3, −3, 2, 0, 8, 3, 0, 0}; {6, −3, −7, 1, −6, −2, 2, 8, 7, 5, 0, 0}; {5, −4, 8, 0, −7, −3, 2, 8, 7, 5, 0, 0}; {5, −4, 8, 0, −7, −2, 2, 7, 5, 4, 0, 0}; {, −1, 5, 0, 7, −1, 3, 6, −6, 7, 5, 0, 0}; {5, −4, 8, 0, −7, −2, 2, 7, 6, 4, 0, 0}; {4, −5, 7, −1, 8, −3, 1, 6, 5, 4, 0, 0}; {, −7, 1, −2, 7, 1, 7, −3, 3, 4, 3, 0, 0}; {8, 0, −3, 6, 0, 6, −4, 3, 4, 3, 0, 0}; {8, 0, −3, 6, 0, 6, −4, 3, 5, 3, 0, 0}; {3, −6, 6, −2, 7, −3, 1, 6, 5, 4, 0, 0}; {, −5, 1, −4, 3, −4, −7, −6, −3, 8, 8, 0, 0}; {3, −6, 6, −2, 8, −4, 0, 7, 8, 4, 0, 0}; {, −7, −1, −6, 1, −5, 8, −7, −4, 8, 8, 0, 0}; {, −7, −1, −6, 1, −5, 8, −6, −3, 8, 8, 0, 0}; {4, −4, −7, 2, −2, 3, −6, 0, 4, 2, 0, 0}; {1, −7, 6, −1, −4, 2, 8, −1, 3, 1, 0, 0}; {0, 8, 5, −2, −5, 1, 7, −2, 2, 1, 0, 0}; {2, −6, 7, 0, −3, 3, −7, 2, 4, 2, 0, 0}; {, −7, −2, 8, −2, −5, 1, 1, 8, 6, 3, 0, 0}; {, −1, 3, −4, 2, −1, 4, 5, −5, 7, 3, 0, 0}; {, −4, 0, −7, −1, −3, 2, 4, −6, 7, 3, 0, 0}; {, −4, 7, 7, 4, −4, 3, 8, 8, −1, −4, 0, 0}; {7, −2, −6, 3, 7, −4, −7, 8, 0, 2, 0, 0}; {, −3, 5, 2, −4, 1, 8, 4, 5, −2, −1, 0, 0}; {7, −2, −6, 3, 7, −3, 8, −7, 1, 1, 0, 0}; {5, −4, 8, 1, 6, −4, 8, 7, 0, 1, 0, 0}; {, −6, 2, −1, −7, −1, 6, 3, 3, −3, −1, 0, 0}; {5, −4, 8, 1, 6, −4, 8, 8, 0, 2, 0, 0}; {, −6, 2, −1, −7, −1, 6, 3, 4, −3, 0, 0, 0}; {4, −5, 7, 0, 5, −5, 8, 6, 0, 0, 0, 0}; {, −1, 2, −6, −1, 2, −4, 7, −3, −7, 1, 0, 0}; {4, 8, 1, 7, −4, −6, 2, 0, 6, 3, 0, 0}; {, −2, 5, 1, −6, 2, 3, 5, 8, 6, 5, 0, 0}; {, −3, 4, 0, −7, 1, 2, 5, 8, 6, 5, 0, 0}; {, −4, 3, −1, 8, 0, 1, 5, 7, 5, 4, 0, 0}; {5, −7, 2, 8, −3, −4, 2, 0, 7, 4, 0, 0}; {, −3, 4, 0, −7, 1, 3, 5, 7, 6, 5, 0, 0}; {5, −7, 2, 8, −3, −3, 2, 0, 8, 4, 0, 0}; {8, −3, 7, −2, 4, 6, −3, −4, 4, 1, 0, 0}; {, −5, 3, 0, −6, 3, −7, −2, 3, 4, 3, 0, 0}; {, −7, 0, −4, 5, −2, 0, 4, 6, 5, 4, 0, 0}; {3, −7, 4, −4, 4, 5, 8, −7, 7, 6, 0, 0}; {3, 7, 0, 6, −4, −5, 1, −1, 7, 3, 0, 0}; {7, −2, −6, 3, −4, −1, 3, 5, 5, 4, 0, 0}; {, −6, −1, −7, 0, 7, 8, −3, −4, 5, 2, 0, 0}; {3, 7, 0, 6, −4, −4, 1, −1, 7, 3, 0, 0}; {2, 6, −1, 5, −5, −5, 1, −1, 7, 3, 0, 0}; {7, −4, 6, −3, 4, 6, −4, −5, 4, 1, 0, 0}; {0, 7, 3, −4, 5, −5, 0, 5, 5, 4, 0, 0}; {3, −7, 4, −4, 5, 5, 8, −6, 7, 6, 0, 0}; {0, 6, 1, −7, 2, 3, 7, 8, 6, 6, 0, 0}; {, −5, 0, −6, 1, −7, −7, −4, −4, −7, 7, 0, 0}; {, −1, 5, 0, 8, 1, 3, 6, 8, 6, 5, 0, 0}; {, −2, 4, −1, 7, 0, 2, 6, 7, 6, 5, 0, 0}; {, −4, 0, −7, −1, 7, 3, 1, 2, −4, −5, 0, 0}; {, −1, 4, −2, 5, −2, −5, −4, −2, −7, −7, 0, 0}; {0, 4, −3, 4, −7, −6, 1, −1, 7, 2, 0, 0}; {6, −5, 5, −3, 3, 8, −7, 2, −1, −4, 0, 0}; {1, 5, −2, 5, −5, 8, 0, −1, 4, 4, 0, 0}; {, −4, 0, −7, 0, 7, 3, 1, 2, −4, −5, 0, 0}; {0, 5, −1, 7, −1, −4, −4, −2, −7, −7, 0, 0}; {0, 5, −1, 7, −1, −4, −3, −2, −7, 8, 0, 0}; {6, −5, 5, −3, 5, 6, −4, −5, 4, 2, 0, 0}; {, −2, 2, −5, 2, −7, −7, −1, −3, 6, 2, 0, 0}; {6, −5, 5, −3, 5, 7, −7, −5, 8, 6, 0, 0}; {, −2, 3, −3, 5, −2, −5, −4, −3, −7, 8, 0, 0}; {, −6, −1, −7, 1, −6, 8, −6, −4, 8, 8, 0, 0}; {, −6, −1, −7, 2, −6, 8, −6, −4, 8, 8, 0, 0}; {, −4, 0, −7, 1, 8, −7, −2, −3, 5, 2, 0, 0}; {, −6, −2, 7, −1, 6, 7, −3, −3, 5, 2, 0, 0}; {5, −7, 2, −6, 2, −1, −2, −1, −6, −6, 0, 0}; {4, 7, −1, 6, −3, −3, 1, 0, 7, 3, 0, 0}; {, −5, 0, −6, 4, −5, −7, −6, −4, 8, 8, 0, 0}; {8, −3, 7, 1, −7, 7, −7, −5, 7, 7, 0, 0}; {0, 1, 7, −1, −2, 5, −3, −7, −5, 3, 0, 0}; {, −2, −1, 5, −2, −3, 4, −4, 8, −5, 3, 0, 0}; {0, 3, −5, 6, 8, 2, −3, 2, 0, −5, 0, 0}; {0, −1, 3, −5, 8, −3, 4, −2, −1, 6, 0, 0}; {7, 5, 8, 0, −3, 0, 7, 0, 0, 7, 0, 0}; {1, −2, 0, 7, 4, 5, −5, 2, 1, 8, 0, 0}; {7, 3, 5, −4, 7, 8, −1, 6, 4, −4, 0, 0}; {, −4, −7, −4, 4, 0, 3, −6, 1, 0, −6, 0, 0}; {, −7, 6, −7, 1, −2, 1, −7, 1, 0, −6, 0, 0}; {1, −4, −3, 6, −3, −7, 1, −7, −6, −2, 0, 0}; {, −1, −6, −5, 4, −5, 7, 0, 8, −5, −3, 0, 0}; {2, −3, −2, 7, −3, −7, 2, −7, −5, −2, 0, 0}; {4, 0, 2, −3, 4, 0, −4, 5, 8, −4, 0, 0}; {0, −5, −4, 6, −4, 7, 1, −7, −6, −2, 0, 0}; {0, 8, 6, −3, 0, −7, 0, 5, 2, 0, 0, 0}; {5, −2, −3, 5, −7, 3, −5, 1, −1, −1, 0, 0}; {, −2, −7, −6, 4, −6, 6, 0, 8, −7, −4, 0, 0}; {, −2, −7, −6, 4, −6, 6, 0, 8, −6, −4, 0, 0}; {, −2, −7, −6, 4, −6, 6, 0, 8, −6, −3, 0, 0}; {, −2, −7, −6, 4, −6, 6, 0, 8, −5, −3, 0, 0}; {8, 2, 2, −5, 0, −4, 5, −5, −3, −2, 0, 0}; {7, 1, 1, −6, −1, −5, 4, −6, −3, −3, 0, 0}; {2, −5, −6, 2, 6, 1, −7, −1, −1, −2, 0, 0}; {7, 1, 1, −6, −1, −5, 4, −5, −4, −3, 0, 0}; {8, 2, 2, −5, 1, −4, 4, −5, −4, −2, 0, 0}; {, −6, 2, 0, 7, −5, 6, −3, 1, 2, 0, 0, 0}; {2, −6, 8, −1, −3, 2, −7, 1, 4, 0, 0, 0}; {1, −4, −3, 7, −4, 8, 1, −7, −6, −3, 0, 0}; {5, 1, 3, −2, 4, 1, −5, 4, 8, −5, 0, 0}; {2, −6, 8, −1, 1, −6, 1, 6, 2, 0, 0, 0}; {7, 0, −1, 7, −6, 4, −4, 2, −1, −1, 0, 0}; {1, −4, −3, 7, −4, 8, 2, −6, −6, −3, 0, 0}; {0, −5, −4, 6, −5, 7, 1, −7, −6, −3, 0, 0}; {0, −5, −4, 6, −5, 8, 1, −7, −6, −4, 0, 0}; {, −3, 8, −7, 4, −7, 6, 0, 8, −7, −4, 0, 0}; {, −5, 3, 1, −7, −5, 6, −3, 2, 1, −1, 0, 0}; {0, −4, −2, −6, 0, −1, −6, 3, 7, −6, 0, 0}; {0, −7, 8, 1, 5, −1, −7, −1, 0, −2, 0, 0}; {, −6, 5, 6, 1, 7, 4, −2, 6, −7, −4, 0, 0}; {7, −1, −3, 5, 8, 3, −5, 0, 0, −2, 0, 0}; {6, −4, 8, −2, 0, 4, 1, −3, 4, 5, 0, 0}; {, −7, 0, −3, 4, 8, −3, −4, −7, 1, 3, 0, 0}; {6, −1, −2, 7, 1, 8, −5, −2, 2, 1, 0, 0}; {4, −5, 8, −1, 7, −3, 1, 7, 4, 2, 0, 0}; {4, −5, 8,

−1, 8, −2, 1, 6, 5, 3, 0, 0}; {, −2, 4, 0, 6, −2, 3, 5, −6, 7, 5, 0, 0}; {4, −4, −6, 2, −2, 3, −7, 2, 4, 1, 0, 0}; {4, −4, −6, 2, −2, 3, −6, 1, 4, 2, 0, 0}; {, −6, 0, −4, 2, −4, 0, 3, −6, 7, 4, 0, 0}; {, −7, −1, −5, 1, −5, 0, 2, 8, 6, 3, 0, 0}; {, −7, −1, −5, 1, −5, 0, 2, 8, 6, 4, 0, 0}; {1, −7, 7, −1, −5, 2, 7, −1, 1, 1, 0, 0}; {, −6, 0, −4, 2, −4, 1, 4, −6, 6, 4, 0, 0}; {2, −6, 8, 0, −3, 2, −7, 0, 4, 1, 0, 0}; {3, −5, −7, 1, −2, 3, −6, 2, 4, 1, 0, 0}; {2, −6, 8, 0, −3, 2, −7, 1, 4, 1, 0, 0}; {2, −6, 8, 0, −3, 2, −7, 2, 4, 1, 0, 0}; {2, −6, 8, 0, −3, 3, 8, 0, 3, 0, 0, 0}; {, −7, −1, −5, 1, −4, 0, 3, −6, 6, 4, 0, 0}; {1, −7, 7, −1, −4, 2, 8, 0, 3, 1, 0, 0}; {, −4, 3, 0, 7, 3, 8, −3, 5, 6, 2, 0, 0}; {, −6, 1, −2, 5, 1, 7, −5, 2, 4, 2, 0, 0}; {0, 8, 6, −2, −4, 1, 7, −2, 3, 0, 0, 0}; {, −1, 7, 5, −3, −5, 1, 6, −2, 2, 0, 0, 0}; {0, 8, 6, −2, −4, 2, 7, 0, 3, 0, 0, 0}; {, −1, 7, 5, −3, −5, 1, 7, −1, 3, 0, 0, 0}; {, −2, 6, 4, −4, −6, 0, 6, −1, 2, 0, 0, 0}; {, −4, 4, 2, −6, −7, −1, −7, −1, 4, 1, 0, 0}; {, −4, 4, 2, −6, −7, 0, 5, −2, 2, −1, 0, 0}; {, −5, 3, 1, −7, −7, −2, 6, −1, 2, 0, 0, 0}; {, −2, 5, 2, −6, −6, 0, 7, −1, 2, 0, 0, 0}; {8, −1, −4, 4, 7, −4, −4, 7, 0, 2, 0, 0}; {5, −4, −7, 1, 5, −5, −7, 7, 0, 2, 0, 0}; {8, 3, 4, 0, −7, 1, 6, 7, −2, −4, 0, 0}; {, −7, 1, −1, 8, −2, 5, 3, 4, −3, 1, 0, 0}; {, −6, 2, 0, −7, −1, 7, 3, 3, −3, −1, 0, 0}; {, −7, 1, −1, 8, −2, 6, 3, 3, −3, 0, 0, 0}; {2, −7, 6, −2, 3, −6, 8, 5, −1, 0, 0, 0}; {1, 8, 5, −3, 2, −7, 8, 4, −1, 0, 0, 0}; {1, 8, 5, −3, 3, −6, 6, 6, −1, 1, 0, 0}; {5, −3, −5, 4, −4, 0, 2, 4, 5, 3, 0, 0}; {1, 8, 5, −3, 5, −4, 0, 5, 4, 4, 0, 0}; {3, 7, 1, 6, −4, −3, 1, −1, 8, 3, 0, 0}; {8, 0, −2, 7, 1, 7, −4, 2, 3, 2, 0, 0}; {1, 8, 5, −3, 6, −5, 0, 6, 5, 4, 0, 0}; {, −5, 1, −3, 4, −4, 0, 4, −6, 7, 4, 0, 0}; {0, 7, 4, −4, 5, −6, 0, 6, 6, 3, 0, 0}; {0, 7, 4, −4, 5, −6, 0, 6, 6, 4, 0, 0}; {1, 8, 5, −3, 6, −4, 0, 6, 4, 3, 0, 0}; {0, 7, 4, −4, 5, −5, −1, 5, 4, 2, 0, 0}; {0, 7, 4, −4, 5, −5, −1, 5, 4, 3, 0, 0}; {, −6, 0, −4, 3, −4, 0, 4, −6, 7, 4, 0, 0}; {, −2, 5, 2, −6, 4, −7, −1, 5, 6, 3, 0, 0}; {3, −5, −7, 2, −3, 3, −6, 1, 3, 2, 0, 0}; {2, −6, 8, 1, −4, 2, −7, 1, 3, 2, 0, 0}; {2, −6, 8, 1, −4, 2, −6, 0, 3, 2, 0, 0}; {, −7, −1, −5, 2, −5, 0, 3, 8, 6, 4, 0, 0}; {, −7, −1, −5, 2, −5, 0, 3, −7, 6, 4, 0, 0}; {, −7, −1, −5, 2, −5, 0, 3, −7, 7, 4, 0, 0}; {8, −2, −6, 1, −6, −1, 2, 8, 6, 4, 0, 0}; {8, −2, −6, 1, −6, −1, 2, 8, 7, 4, 0, 0}; {, −3, 4, 1, −7, 3, −7, −2, 4, 4, 3, 0, 0}; {8, −2, −6, 1, −5, −2, 2, −7, −7, 3, 0, 0}; {8, −2, −6, 1, −5, −2, 2, −7, −7, 4, 0, 0}; {7, −3, −7, 0, −6, −2, 2, −7, 8, 4, 0, 0}; {, −4, 3, 0, 8, 3, 8, −3, 5, 6, 2, 0, 0}; {7, −3, −7, 0, −6, −1, 2, 7, 5, 3, 0, 0}; {, −6, 1, −2, 6, 2, 7, −4, 4, 6, 2, 0, 0}; {, −2, 6, 4, −3, −6, 1, 7, 0, 3, 1, 0, 0}; {, −3, 5, 3, −4, −6, −1, 6, −4, 2, 0, 0, 0}; {7, −2, −5, 3, 0, 5, −5, 3, 5, 1, 0, 0}; {5, −4, −7, 1, −2, 4, −7, 0, 3, 1, 0, 0}; {, −6, 2, 0, −7, 8, −2, 6, −2, 2, 0, 0, 0}; {, −7, 1, −1, 8, 7, −2, 4, −4, 1, −1, 0, 0}; {, −7, 1, −1, 8, 7, −2, 5, −2, 2, 0, 0, 0}; {, −6, 2, 0, −6, −1, 5, 4, 4, −3, 1, 0, 0}; {8, −3, 8, −1, 3, 6, −1, −2, 6, 2, 0, 0}; {6, −5, 6, −3, 2, 5, −3, −4, 4, 1, 0, 0}; {4, 6, −2, 2, 5, −1, −7, −2, −6, 2, 0, 0}; {, −3, 0, −7, −2, 2, −1, 6, 3, 8, 5, 0, 0}; {, −6, −3, 6, −5, −1, −2, 5, 2, 8, 4, 0, 0}; {, −7, −1, −5, 3, −5, 0, 3, 8, 6, 4, 0, 0}; {, −2, 5, 2, −5, 4, −6, −1, 4, 4, 3, 0, 0}; {3, −6, 7, 0, −6, −3, 1, 4, 4, 2, 0, 0}; {, −4, 2, −2, 6, −1, 1, 5, 7, 5, 5, 0, 0}; {6, −5, 6, −3, 5, 7, −7, −5, 8, 6, 0, 0}; {, −2, 2, −4, 2, −7, −6, −1, −3, 7, 2, 0, 0}; {, −2, 2, −4, 2, −7, −6, −1, −2, 7, 3, 0, 0}; {3, 8, 3, −6, 2, 5, 8, −5, 8, 5, 0, 0}; {3, 8, 3, −6, 2, 5, 8, −5, 8, 6, 0, 0}; {, −1, 4, −1, 6, 0, 5, 4, 1, 8, 8, 0, 0}; {, −7, −2, −7, 1, 0, 6, 0, 3, 6, 5, 0, 0}; {, −5, −1, −7, 0, 5, 7, −1, −3, 5, 1, 0, 0}; {7, −6, 3, −7, −2, −3, 3, 1, 8, 4, 0, 0}; {, −4, 0, −6, 1, 7, 8, −1, −2, 6, 2, 0, 0}; {6, −7, 2, 8, −3, −3, 3, 1, 8, 3, 0, 0}; {6, −7, 2, 8, −3, −3, 3, 1, 8, 4, 0, 0}; {, −4, 2, −2, 7, 0, 1, 5, 7, 5, 5, 0, 0}; {1, 4, −3, 4, −6, −5, 1, −1, 7, 2, 0, 0}; {2, 6, 0, 8, 1, −2, −4, −2, −7, −6, 0, 0}; {1, 2, −7, −1, −3, 6, −2, −6, −4, 3, 0, 0}; {5, 6, −3, 3, 1, 8, −1, −4, −4, 3, 0, 0}; {3, 4, −5, 1, −1, 7, −2, −5, −4, 3, 0, 0}; {, −7, −5, 3, −5, −6, 2, −6, 7, −6, 2, 0, 0}; {, −2, 1, −6, 3, 6, −6, 1, −1, 6, 1, 0, 0}; {, −7, −7, −1, 6, 4, −6, 1, −4, −3, 4, 0, 0}; {8, 8, −2, 5, 3, −7, 0, −4, −3, 4, 0, 0}; {7, 7, −3, 4,

2, −7, 0, −5, −3, 4, 0, 0}; {3, 5, −3, 6, −7, −3, 3, 0, 7, 1, 0, 0}; {6, 6, −4, 4, 2, 8, 0, −5, −3, 4, 0, 0}; {, −4, −5, 0, 7, 5, −5, 2, −3, −2, 5, 0, 0}; {8, 7, −4, 4, 2, 8, 0, −4, −3, 4, 0, 0}; {1, 3, −4, 7, −7, 3, −3, 2, 1, −5, 0, 0}; {, −2, −7, −5, 3, −5, −5, 4, −7, 8, −2, 0, 0}; {, −6, 4, 5, −3, 2, −3, 5, −3, −4, −1, 0, 0}; {4, 0, 3, −3, 4, −3, −4, 4, −6, −4, 0, 0}; {4, −3, −3, 4, −7, 4, −5, 0, −1, 1, 0, 0}; {4, −3, −3, 4, −7, 5, −4, 0, −1, 2, 0, 0}; {2, −5, −5, 2, 8, 3, −6, −1, −1, 1, 0, 0}; {, −3, 5, 4, −5, −3, 7, −2, 4, 1, 0, 0, 0}; {2, −5, −5, 3, 7, 1, −7, 0, −2, −1, 0, 0}; {1, −6, −6, 2, 6, 0, 8, −1, −3, −2, 0, 0}; {, −4, 7, −7, 3, −7, 5, −1, 8, −7, −3, 0, 0}; {, −5, 6, 8, 2, 8, 4, −1, 7, 8, −4, 0, 0}; {, −5, 6, 8, 2, 8, 4, −1, 7, −7, −4, 0, 0}; {5, −1, 0, −7, −2, −7, 3, −6, −5, −2, 0, 0}; {0, −4, −1, −6, 1, −2, −6, 3, 6, −5, 0, 0}; {, −6, 5, 7, 1, 7, 3, −2, 6, 8, −4, 0, 0}; {, −6, 5, 7, 1, 7, 3, −2, 6, −7, −4, 0, 0}; {, −6, 5, 7, 1, 7, 3, −2, 6, −6, −4, 0, 0}; {, −5, 3, 2, −7, −4, 6, −3, 3, 0, −1, 0, 0}; {6, 0, 1, −6, −1, −5, 4, −4, −5, −2, 0, 0}; {, −6, 5, 7, 1, 7, 4, −2, 7, 8, −3, 0, 0}; {0, −7, −7, 1, 5, 0, 8, −1, −2, −2, 0, 0}; {0, −7, −7, 1, 5, 0, 8, −1, −2, −1, 0, 0}; {, −6, 5, 7, 1, 7, 4, −2, 7, 8, −4, 0, 0}; {, −6, 5, 7, 1, 7, 4, −2, 7, −7, −3, 0, 0}; {, −6, 5, 7, 1, 7, 4, −2, 7, −7, −4, 0, 0}; {2, −5, −5, 3, 7, 2, −6, 0, −2, −1, 0, 0}; {1, −6, −6, 2, 6, 1, −7, −1, −2, −2, 0, 0}; {1, −6, −6, 2, 6, 1, −7, −1, −2, −1, 0, 0}; {, −7, 4, 6, 0, 6, 3, −2, 6, −7, −4, 0, 0}; {, −7, 4, 6, 0, 6, 3, −2, 6, −7, −5, 0, 0}; {5, −1, 0, −7, −2, −5, 4, −5, −5, −2, 0, 0}; {, −2, 7, 7, −1, 3, −1, 7, −2, −2, −3, 0, 0}; {, −3, −7, −4, 7, −1, −6, −6, 4, 8, −5, 0, 0}; {, −7, 4, 6, 0, 7, 2, −2, 7, −6, −3, 0, 0}; {4, −2, −1, 8, −2, −7, 2, −5, −5, −3, 0, 0}; {, −7, 4, 6, 0, 7, 3, −2, 7, −6, −3, 0, 0}; {, −7, 1, 0, 7, −5, 5, −4, 2, 0, −1, 0, 0}; {, −2, 7, 7, −1, 4, −1, 7, −2, −2, −2, 0, 0}; {7, −4, 8, −4, 2, 8, −7, −3, 8, 4, 0, 0}; {6, −5, 7, −5, 3, 7, 8, −3, −7, 5, 0, 0}; {6, −5, 7, −5, 3, 7, 8, −3, −7, 6, 0, 0}; {, −6, 4, 5, −2, 1, −3, 6, −3, −4, −2, 0, 0}; {4, −2, −1, −7, −3, −6, 3, −6, −5, −3, 0, 0}; {2, −4, −3, 7, −4, 7, 2, −6, −4, −3, 0, 0}; {4, −2, −1, −7, −2, −6, 2, −6, −6, −2, 0, 0}; {3, −3, −2, 8, −3, −7, 2, −6, −6, −3, 0, 0}; {3, −3, −2, 8, −3, −7, 2, −6, −6, −2, 0, 0}; {1, −5, −4, 6, −5, 7, 1, 8, −5, −3, 0, 0}; {6, 1, 3, −2, 4, 1, −3, 5, 8, −5, 0, 0}; {8, 3, 5, 0, 6, 4, −2, 6, 8, −4, 0, 0}; {1, −5, −4, 6, −4, 8, 1, −7, −6, −3, 0, 0}; {0, −6, −5, 5, −5, 7, 1, 8, −4, −3, 0, 0}; {3, 8, 4, −7, 0, 6, 6, −5, 7, 5, 0, 0}; {8, −2, −5, 1, −6, −1, 2, 8, 5, 3, 0, 0}; {7, −3, −6, 0, −7, −1, 2, 8, 5, 3, 0, 0}; {8, −2, −5, 1, −5, −2, 2, −7, −7, 4, 0, 0}; {7, −3, −6, 0, −6, −3, 2, −7, 8, 3, 0, 0}; {7, −3, −6, 0, −6, −3, 2, −7, 8, 4, 0, 0}; {2, 7, 3, 8, 1, 4, 6, −4, −7, 5, 0, 0}; {7, −3, −6, 0, −6, −2, 2, −7, 7, 3, 0, 0}; {7, −3, −6, 0, −6, −2, 2, −7, 7, 4, 0, 0}; {8, −2, −5, 1, −5, −1, 3, −6, 7, 4, 0, 0}; {1, 6, 2, 7, 0, 4, 5, −5, 8, 5, 0, 0}; {7, −3, −6, 0, −6, −1, 2, 8, 5, 3, 0, 0}; {5, −5, 8, −2, 8, −2, 0, 6, 5, 3, 0, 0}; {, −5, 2, 0, 7, 3, 7, −4, 4, 6, 2, 0, 0}; {, −6, 1, −1, 6, 2, 6, −4, 5, 5, 2, 0, 0}; {, −3, 5, 4, −4, −7, −2, 6, 0, 2, −1, 0, 0}; {, −7, 0, −2, 5, 1, 6, −4, 4, 4, 2, 0, 0}; {, −7, 0, −2, 5, 1, 6, −4, 4, 5, 2, 0, 0}; {3, −7, 6, −4, 7, −4, 0, 7, 5, 3, 0, 0}; {, −5, 3, 2, −6, 8, −2, 4, −4, 1, 0, 0, 0}; {7, −2, −4, 3, 0, 5, −6, 2, 4, 1, 0, 0}; {, −5, 3, 2, −6, 8, −2, 6, −1, 2, 0, 0, 0}; {5, −4, −6, 1, −2, 4, −6, 2, 4, 1, 0, 0}; {8, 0, −1, 7, 6, −3, 4, −3, 1, −1, 0, 0}; {0, 8, 7, −1, −1, 8, 1, 6, 1, 1, 0, 0}; {1, 8, 6, −2, 3, −6, 7, 5, −1, 1, 0, 0}; {, −1, 6, 4, −4, 2, −7, 6, 4, −1, −1, 0, 0}; {, −5, 2, 0, 8, 1, 7, −2, 4, 5, 3, 0, 0}; {8, −2, −5, 2, −6, 0, 3, 8, 6, 3, 0, 0}; {1, 6, 2, 8, 0, 3, 7, −4, −7, 5, 0, 0}; {, −5, 2, 0, 8, 2, 7, −2, 4, 5, 3, 0, 0}; {, −6, 1, −1, 7, 1, 6, −2, 4, 5, 3, 0, 0}; {1, −7, 8, 1, −4, 3, −7, 0, 1, 1, 0, 0}; {, −6, 1, −1, 7, 1, 7, −3, 3, 4, 2, 0, 0}; {5, −5, 8, −1, 8, −2, 1, 7, 5, 4, 0, 0}; {4, −6, 7, −2, 8, −4, 1, 8, 7, 3, 0, 0}; {4, −6, 7, −2, 8, −4, 1, 8, 7, 4, 0, 0}; {8, −1, −3, 5, 0, 5, −4, 4, 5, 2, 0, 0}; {8, −1, −3, 5, 0, 5, −3, 3, 5, 2, 0, 0}; {, −2, 3, −1, 5, −2, 2, 4, −6, 7, 4, 0, 0}; {, −1, 4, 0, 6, −1, 3, 6, −4, 8, 5, 0, 0}; {2, 8, 5, −4, 6, −5, 0, 6, 6, 3, 0, 0}; {, −4, 4, 3, −4, 8, −1, 6, −1, 2, 1, 0, 0}; {, −2, 3, −1, 5, −2, 3, 4, −6, 7, 5, 0,

0}; {2, 8, 5, −4, 7, −5, −1, 7, 8, 3, 0, 0}; {7, −2, −4, 4, 0, 5, −5, 3, 5, 2, 0, 0}; {7, −2, −4, 4, 0, 5, −5, 4, 5, 1, 0, 0}; {, −5, 3, 2, −5, 8, −2, 6, −1, 2, 1, 0, 0}; {, −6, 2, 1, −6, 7, −2, 5, −3, 1, 0, 0, 0}; {5, −4, −6, 2, −2, 4, −6, 2, 4, 1, 0, 0}; {5, −4, −6, 2, −2, 4, −6, 2, 4, 2, 0, 0}; {8, 0, −1, 8, 6, −3, 3, −5, 0, −1, 0, 0}; {4, −5, −7, 1, −2, 4, −7, 2, 5, 1, 0, 0}; {3, −6, 8, 0, −3, 3, −7, 2, 4, 1, 0, 0}; {8, 0, −1, 8, 7, −4, 4, −5, 1, −1, 0, 0}; {, −1, 6, 4, −4, −6, 1, 6, −2, 2, 0, 0, 0}; {7, −4, 8, −1, 1, 4, 1, −3, 4, 5, 0, 0}; {, −5, −1, −6, 0, 6, 8, −1, −3, 6, 1, 0, 0}; {5, 8, 2, 7, −4, −3, 3, 1, −7, 3, 0, 0}; {, −3, 2, −2, 5, −3, 2, 5, −6, 7, 4, 0, 0}; {, −7, −4, 6, −4, 5, −6, 8, 3, −6, −7, 0, 0}; {7, −6, 4, −6, 3, −7, 6, 2, −7, −7, 0, 0}; {1, 5, 0, 7, 0, 6, 5, 1, 8, 8, 0, 0}; {, −1, 2, −4, 3, 8, −6, 1, −1, 7, 2, 0, 0}; {, −5, −2, 8, 0, 5, 8, −1, −3, 5, 0, 0, 0}; {, −1, 0, 8, −1, −3, 5, −3, −7, −5, 2, 0, 0}; {5, 7, 0, −6, −5, 5, −1, 3, 2, −4, 0, 0}; {, −2, −4, 1, 7, 5, −4, 3, −2, −1, 5, 0, 0}; {0, −3, 2, 8, 6, −4, 3, −1, −1, 5, 0, 0}; {0, −3, 2, −4, 0, −1, 5, −6, −5, 6, 0, 0}; {2, −2, 2, −4, 2, −4, −5, 3, −7, −5, 0, 0}; {, −1, −5, −1, −7, 0, −4, −7, 4, −7, −4, 0, 0}; {8, 0, 0, 6, −6, 4, −5, 3, 0, −1, 0, 0}; {1, −6, −5, 3, 5, 0, −7, 0, −3, −1, 0, 0}; {0, −7, −6, 2, 5, −1, 8, −1, −3, −1, 0, 0}; {, −6, 2, 2, −7, −4, 5, −3, 4, 0, 0, 0, 0}; {, −2, 7, 8, 0, 4, −1, 7, −2, −3, −1, 0, 0}; {3, −3, −1, 8, −3, −7, 2, −6, −6, −2, 0, 0}; {, −7, 1, 1, 8, −5, 5, −4, 3, −1, −1, 0, 0}; {, −3, 6, 7, −1, 3, −2, 6, −2, −3, −2, 0, 0}; {8, 3, 6, 0, 6, 3, −3, 7, 8, −3, 0, 0}; {4, −5, −6, 0, 2, −5, 2, 6, 2, 1, 0, 0}; {, −2, 7, 8, 0, 4, −1, 8, −2, −3, −2, 0, 0}; {, −7, 1, 1, 8, −5, 5, −3, 3, −1, −1, 0, 0}; {, −7, 1, 1, 8, −5, 5, −3, 3, 0, −1, 0, 0}; {, −7, 1, 1, 8, −5, 5, −3, 3, 0, 0, 0, 0}; {2, −4, −2, 7, −4, 8, 2, −6, −6, −2, 0, 0}; {, −3, 6, 7, −1, 3, −2, 7, −1, −3, −2, 0, 0}; {8, 0, 0, 7, −6, 5, −3, 2, −1, 0, 0, 0}; {6, 1, 4, −2, 5, 0, −3, 7, −6, −3, 0, 0}; {0, −6, −4, 5, −5, 5, 1, −6, −4, −2, 0, 0}; {0, −6, −4, 5, −5, 5, 1, −6, −3, −2, 0, 0}; {, −5, 7, −5, 6, −2, −6, −7, 3, 7, −5, 0, 0}; {5, 0, 3, −3, 4, −1, −3, 6, −6, −4, 0, 0}; {1, −5, −3, 6, −4, 7, 1, −6, −6, −3, 0, 0}; {5, 0, 3, −3, 4, 0, −4, 4, 8, −5, 0, 0}; {, −6, 3, 4, −4, 1, −4, 5, −3, −3, −3, 0, 0}; {4, −1, 2, −4, 3, 0, −4, 5, 7, −5, 0, 0}; {, −3, 6, 7, −1, 4, 0, 8, −3, −2, 0, 0, 0}; {, −4, 5, 6, −2, 3, −1, 7, −3, −3, 0, 0, 0}; {5, −3, −3, 4, 8, 3, −5, 1, −1, −1, 0, 0}; {6, −2, −2, 5, −7, 5, −3, 1, −1, 1, 0, 0}; {, −2, 8, −6, 3, −6, 6, 0, 8, −6, −3, 0, 0}; {, −2, 8, −6, 3, −6, 6, 0, 8, −5, −3, 0, 0}; {2, −7, 8, −2, 3, −5, −7, 5, −1, 1, 0, 0}; {0, −5, −2, 8, 4, −1, 2, 6, −3, −3, 0, 0}; {, −1, −6, −3, 7, 4, −2, 2, 6, −3, −4, 0, 0}; {3, −4, −3, 5, 0, −7, −6, −3, 2, 0, 0, 0}; {0, 5, 2, 6, −1, 3, 6, −4, 8, 4, 0, 0}; {4, −3, −2, 6, 7, 2, −6, 1, −2, 0, 0, 0}; {, −2, 6, 6, −3, −3, 7, −1, 5, 0, 1, 0, 0}; {, −3, 6, 7, −1, 0, 6, −2, −7, −1, −1, 0, 0}; {, −4, 4, 4, −4, −4, 6, −1, 4, 0, 0, 0, 0}; {5, −4, −5, 2, 1, −5, 2, 7, 2, 2, 0, 0}; {, −4, 5, 6, −1, 0, 5, −2, −6, −2, −1, 0, 0}; {1, −5, −3, 7, −7, −1, −7, 6, −4, −3, 0, 0}; {, −7, 1, 1, −7, −6, 5, −4, 2, −1, 1, 0, 0}; {, −7, 1, 1, −7, −5, 4, −4, 3, −1, 0, 0, 0}; {, −7, 1, 1, −7, −5, 4, −3, 4, −1, 0, 0, 0}; {, −7, 1, 1, −7, −5, 4, −2, 4, 0, 1, 0, 0}; {, −3, 6, 7, 0, 3, −2, 6, −2, −4, −1, 0, 0}; {, −3, 6, 7, 0, 3, −2, 8, −1, −3, −2, 0, 0}; {1, 8, 7, −2, −1, −7, 0, 5, 1, 0, 0, 0}; {6, −2, −2, 6, 8, 3, −5, 1, −1, −1, 0, 0}; {, −5, 4, 5, −2, 1, −3, 6, −3, −4, −2, 0, 0}; {, −1, −7, −5, 5, −6, 6, 0, 8, −7, −3, 0, 0}; {2, −3, 0, −5, 2, −2, −5, 4, 8, −4, 0, 0}; {2, −3, 0, −5, 2, −2, −4, 5, −7, −5, 0, 0}; {, −3, 7, −7, 3, −7, 5, 0, 8, −6, −2, 0, 0}; {, −4, 6, 8, 2, 8, 4, −1, 7, −6, −3, 0, 0}; {, −4, 6, 8, 2, 8, 4, −1, 7, −5, −3, 0, 0}; {4, −7, 6, −5, −1, 4, 0, −4, 4, 4, 0, 0}; {3, −7, 7, −3, 7, −6, 0, 8, 7, 3, 0, 0}; {4, −6, 8, −2, 8, −4, 1, −7, 5, 3, 0, 0}; {4, −6, 8, −2, 8, −4, 1, −7, 6, 3, 0, 0}; {, −2, 3, 0, 5, −2, 1, 5, −4, −7, 5, 0, 0}; {, −2, 3, 0, 5, −2, 1, 5, −4, −6, 5, 0, 0}; {3, −7, 7, −3, 7, −5, 1, 8, 7, 3, 0, 0}; {, −3, 2, −1, 4, −3, 0, 5, −5, −7, 4, 0, 0}; {2, 8, 6, −4, 6, −6, 0, 8, 6, 3, 0, 0}; {1, 7, 5, −5, 5, −7, −1, 7, 6, 2, 0, 0}; {, −3, 2, −1, 4, −3, 1, 5, −5, 8, 4, 0, 0}; {, −3, 2, −1, 4, −3, 2, 4, −6, 7, 4, 0, 0}; {1, 7, 5, −5, 6, −7, −1, 7, 7, 3, 0, 0}; {2, 8, 6, −4, 7, −5, 0, 8, 6, 3, 0, 0}; {1, 7, 5, −5, 6, −6, −1, 7, 6, 3, 0, 0}; {1, 7, 5, −5, 6, −6, −1, 7, 7, 3, 0, 0}; {5, −4, −5, 2, −2, 3, −6, 2, 4, 2, 0, 0}; {0, 6, 4, −6, 5, −7, −1, 7, 6, 3, 0, 0}; {5, −4, −5, 2, −2, 3, −5, 3, 4, 2, 0, 0}; {0, 6, 4, −6, 5, −6, −2, 6, 4, 3, 0, 0}; {5, −4, −5, 2, −1, 3, −6, 3, 4, 2, 0, 0}; {3, −6, −7, 0, −3, 2, −7, 2, 3, 1, 0, 0}; {3, −6, −7, 0, −3, 2, −7, 2, 4, 1, 0, 0}; {, −3, 3, 1, 7, 3, 8, −3, 5, 5, 2, 0, 0}; {, −2, 7, 8, 1, 1, 6, −1, −6, −1, −1, 0, 0}; {, −4, 3, 2, −6, −7, −2, 6, −1, 2, 0, 0, 0}; {, −7, −1, −3, 4, 8, −2, −5, 7, 1, 2, 0, 0}; {, −3, 4, 3, −5, 0, 7, 6, 3, −2, 0, 0, 0}; {0, 5, 2, 8, −4, 1, −2, −6, 3, 3, 0, 0}; {, −2, 7, 8, 2, −3, 5, 7, −5, 1, −1, 0, 0}; {1, 7, 5, −4, 5, −6, −1, 7, 4, 2, 0, 0}; {1, 7, 5, −4, 5, −5, 0, 6, 5, 3, 0, 0}; {1, 7, 5, −4, 6, −6, −1, 7, 7, 4, 0, 0}; {5, −4, −5, 3, −2, 3, −6, 3, 4, 2, 0, 0}; {0, 6, 4, −5, 5, −7, 0, 7, 6, 3, 0, 0}; {, −1, 5, 3, −6, 4, −7, −1, 6, 6, 3, 0, 0}; {5, −7, 5, −6, 2, 6, 7, −3, −7, 5, 0, 0}; {, −7, −2, −5, 1, −6, −1, 2, −7, 6, 3, 0, 0}; {, −2, 4, 2, −7, 4, 7, −2, 6, 5, 1, 0, 0}; {, −7, −2, −5, 1, −5, −2, 3, −6, 8, 4, 0, 0}; {, −2, 4, 2, −7, 4, 8, −2, 6, 6, 2, 0, 0}; {, −2, 4, 2, −7, 4, 8, −2, 6, 6, 3, 0, 0}; {2, −7, 8, 0, −4, 1, 8, 1, 3, 1, 0, 0}; {3, −6, −7, 1, −3, 2, −6, 2, 3, 2, 0, 0}; {2, −7, 8, 0, −4, 1, −7, 2, 3, 1, 0, 0}; {8, −3, −6, 0, −6, −2, 2, −6, 8, 4, 0, 0}; {, −1, 5, 3, −6, 5, −5, −1, 6, 3, 2, 0, 0}; {, −3, 4, 3, −5, 8, 0, 5, −3, 2, 0, 0, 0}; {2, −7, 8, 0, −3, 1, 8, 1, 4, 1, 0, 0}; {1, 8, 7, −1, −4, 1, 8, 0, 3, 1, 0, 0}; {, −2, 5, 4, −4, −7, 0, 6, −2, 2, 0, 0, 0}; {, −5, 2, 1, −6, 8, −2, 5, −3, 2, 0, 0, 0}; {, −4, −2, 8, −4, 0, 0, 7, 4, −5, 4, 0, 0}; {4, 8, 4, −6, 1, 6, 7, −4, 8, 5, 0, 0}; {1, 8, 7, 0, −5, 1, −7, 0, 3, 2, 0, 0}; {3, 7, 3, −7, 1, 5, 7, −4, 8, 5, 0, 0}; {6, −7, 4, −6, 3, 8, 7, 2, −7, −7, 0, 0}; {, −5, 4, 5, 3, −6, 0, −4, −1, −1, −7, 0, 0}; {, −2, −3, 4, −7, 7, −3, 3, −2, −1, 5, 0, 0}; {, −7, 8, −1, 5, 3, −6, 1, −4, −2, 4, 0, 0}; {, −1, −3, 4, −7, 7, −3, 3, −2, −1, 5, 0, 0}; {, −5, −7, 0, 6, 5, −5, 1, −3, −2, 4, 0, 0}; {6, 7, 1, −6, −4, 6, −1, 4, 2, −4, 0, 0}; {, −5, −5, 4, −3, −1, 8, 1, 5, 3, −4, 0, 0}; {, −7, −7, 2, −4, −2, 7, 0, 4, 3, −4, 0, 0}; {1, 0, 8, 1, 3, −5, 3, 7, 5, −2, 0, 0}; {, −3, −7, −2, 5, 0, −7, 8, −2, 1, 4, 0, 0}; {6, 1, 5, −4, 6, −2, −4, 1, 3, 6, 0, 0}; {8, 3, 7, −1, 5, −1, −1, 2, −6, −7, 0, 0}; {, −1, −5, 0, −7, 0, −6, −5, −1, 8, 8, 0, 0}; {, −1, −5, 0, −7, 0, −6, −5, 0, 8, 8, 0, 0}; {, −1, −4, 2, −4, 6, 5, −1, 1, 8, −2, 0, 0}; {, −2, −5, 1, −5, 6, 5, −2, 0, 8, −2, 0, 0}; {7, 2, 6, −1, 4, −1, −3, 4, −6, −5, 0, 0}; {, −6, 2, 3, −7, −4, 5, −3, 5, 0, 0, 0, 0}; {3, −2, 2, −5, 3, −2, −5, 6, −7, −4, 0, 0}; {2, −3, 1, −6, 2, −3, −5, 6, −7, −5, 0, 0}; {8, 5, −5, 6, 0, 0, −3, 0, 6, −4, 0, 0}; {8, 5, −5, 6, 4, 3, −7, −4, 6, −6, 0, 0}; {, −6, 2, 3, −6, −5, 5, −3, 4, 0, 0, 0, 0}; {, −3, 6, 8, 0, 3, −3, 7, −2, −4, −1, 0, 0}; {, −4, 5, 7, −1, 2, −4, 7, −2, −5, −1, 0, 0}; {, −4, 5, 7, −1, 3, −4, 7, −1, −4, −1, 0, 0}; {6, −2, −1, 6, −7, 2, −5, 2, −2, −1, 0, 0}; {, −5, 4, 6, −2, 2, −4, 6, −2, −4, −2, 0, 0}; {, −5, 4, 6, −2, 2, −4, 6, −2, −4, −1, 0, 0}; {0, −6, −3, 6, −5, 6, 2, −6, −7, −2, 0, 0}; {6, −2, −1, 6, −7, 3, −5, 2, −1, 0, 0, 0}; {5, −3, −2, 5, 8, 2, −6, 1, −2, −1, 0, 0}; {, −6, 3, 5, −3, 1, −4, 5, −3, −4, −2, 0, 0}; {5, −3, −2, 5, 8, 3, −5, 2, −1, −1, 0, 0}; {3, −2, 2, −4, 3, −2, −4, 6, −7, −4, 0, 0}; {5, −3, −2, 5, −7, 2, −5, 2, −1, −1, 0, 0}; {, −2, 8, −5, 4, −6, 5, 0, −6, −6, −3, 0, 0}; {3, −2, 2, −4, 3, −1, −4, 6, −7, −3, 0, 0}; {, −4, 6, −7, 2, 8, 3, −1, −7, −4, −3, 0, 0}; {, −5, 5, 8, 1, 7, 2, −2, 8, −5, −3, 0, 0}; {, −3, 7, −6, 3, −7, 5, 0, 8, −7, −3, 0, 0}; {, −3, 7, −6, 3, −7, 5, 0, −7, −7, −3, 0, 0}; {3, −5, −4, 3, 7, 2, −6, 1, −2, −1, 0, 0}; {3, −5, −4, 3, 7, 3, −5, 0, −2, 0, 0, 0}; {6, −1, 1, −7, −1, −7, 3, −3, −4, −2, 0, 0}; {0, −5, −1, −7, 1, −3, −6, 4, 7, −5, 0, 0}; {5, −2, 0, 8, −2, 8, 3, −4, −3, −3, 0, 0}; {4, −3, −1, 7, −3, 7, 3, −3, −3, −2, 0, 0}; {6, −1, 1, −7, −1, −6, 2, −4, −5, −3, 0, 0}; {2, −6, −5, 2, 7, 1, −7, 0, −2, −1, 0, 0}; {0, 8, −7, 0, 5, −1, 7, 0, −2, −2, 0, 0}; {, −1, 7, 8, −1, 4, −2, 7, −1, −2, −2, 0, 0}; {3, −5, −4, 3, 8, 3, −5, 0, −1, 1, 0, 0}; {4, −3, −1, 7, −2, 7, 2, −4, −3, −3, 0, 0}; {1, −6, −4, 4, −2, 7, −6, −4, 1, 1, 0, 0}; {, −1, 8, −6, 2, −3, 7, 8, −5, 1, −1, 0, 0}; {4, −2, 1, −6, 6, 1, 4, 6, −2, −3, 0, 0}; {1, −5, −2, 7, 4, 0, 2, 6, −2, −4, 0, 0}; {, −6, 2, 3, −5, −6, 5, −4, 3, −1, 1, 0, 0}; {4, −5, −5, 2, 0, −6, 1, 6, 2, 2, 0, 0}; {4, −5, −5, 2, 0, −5, 1, 6, 2, 3, 0, 0}; {, −2, 5, 5, −4, −6, −1, 7, 0, 3, 1, 0, 0}; {, −7, 1, 2, −6, −6, 4, −4, 3, −1, 1, 0, 0}; {3, −6, −6, 1, 0, −7, 1, 6, 2, 2, 0, 0}; {3, −6, −6, 1, 0, −6, 1, 6, 2, 2, 0, 0}; {2, −7, −7, 0, −1, −7, 0, 5, 1, 2, 0, 0}; {, −3, 3, 2, 8, 6, −1, 6, −7, 4, 3, 0, 0}; {, −2, 4, 3, −7, 7, 0, 7, −6, 5, 3, 0, 0}; {2, −7, −7, 0, −1, −7, 1, 6, 1, 1, 0, 0}; {7, −1, 0, 8, −7, 3, −6, 2, −2, 0, 0, 0}; {2, −7, −7, 0, 0, −7, 1, 6, 2, 2, 0, 0}; {7, −1, 0, 8, −7, 3, −3, 3, −1, 0, 0, 0}; {6, −2, −1, 7, 8, 2, −4, 2, −2, 0, 0, 0}; {1, 8, 8, −1, −1, −7, 0, 5, 1, 2, 0, 0}; {6, −2, −1, 7, 8, 3, −5, 1, −2, 0, 0, 0}; {6, −2, −1, 7, 8, 3, −5, 1, −1, 0, 0, 0}; {5, −3, −2, 6, 7, 2, −6, 1, −2, 0, 0, 0}; {6, −2, −1, 7, 8, 3, −4, 2, −1, −1, 0, 0}; {, −6, 0, −1, 5, 4, −3, 4, 8, 3, 2, 0, 0}; {5, −3, −2, 6, 7, 2, −5, 1, −2, −1, 0, 0}; {5, −3, −2, 6, 7, 2, −5, 1, −2, 0, 0, 0}; {6, −2, −1, 7, −7, 2, −4, 3, −1, 0, 0, 0}; {6, −2, −1, 7, −7, 2, −4, 3, −1, 1, 0, 0}; {5, −3, −2, 6, 8, 2, −6, 1, −2, 0, 0, 0}; {5, −3, −2, 6, 8, 2, −6, 2, −2, 0, 0, 0}; {4, −4, −3, 5, 7, 1, −6, 1, −2, 0, 0, 0}; {4, −4, −3, 5, 7, 2, −6, 1, −2, −1, 0, 0}; {4, −4, −3, 5, 7, 2, −6, 1, −2, 0, 0, 0}; {3, −5, −4, 4, 6, 1, −7, 0, −2, −1, 0, 0}; {4, −4, −3, 5, 7, 2, −5, 1, −2, −1, 0, 0}; {4, −4, −3, 5, 7, 2, −5, 1, −2, 0, 0, 0}; {3, −5, −4, 4, 7, 1, −6, 2, −2, −1, 0, 0}; {, −6, 4, 7, 1, 6, 2, −2, 6, −6, −4, 0, 0}; {2, −6, −5, 3, 6, 0, −6, 1, −2, −1, 0, 0}; {7, 0, 2, −5, −1, −5, 4, −4, −5, −1, 0, 0}; {, −3, 4, 4, −5, −3, 7, −2, 5, 0, 0, 0, 0}; {1, −7, −6, 2, 5, 0, 8, 0, −3, −1, 0, 0}; {, −5, 5, 8, 2, 7, 4, −1, 7, −7, −4, 0, 0}; {, −5, 2, 2, −7, −5, 5, −3, 3, 0, 0, 0, 0}; {0, 8, −7, 1, 4, −1, 8, −1, −3, −1, 0, 0}; {, −5, 5, 8, 2, 8, 3, 0, −7, −5, −3, 0, 0}; {4, −3, −1, 8, −3, 7, 3, −4, −3, −2, 0, 0}; {4, −3, −1, 8, −3, 7, 3, −4, −3, −1, 0, 0}; {8, 2, 5, −1, 5, 1, −3, 6, −7, −4, 0, 0}; {8, 2, 5, −1, 5, 1, −2, 7, −7, −3, 0, 0}; {6, −1, 1, −6, −1, −5, 4, −5, −5, −1, 0, 0}; {, −1, 7, 8, 0, 4, −1, 7, −1, −3, −2, 0, 0}; {, −1, 7, 8, 0, 4, −1, 8, −1, −3, −2, 0, 0}; {, −7, 3, 6, 0, 7, 1, −2, 8, −5, −3, 0, 0}; {, −7, 3, 6, 0, 7, 1, −1, −7, −5, −4, 0, 0}; {, −7, 3, 6, 0, 7, 1, −1, −7, −5, −3, 0, 0}; {, −7, 3, 6, 0, 7, 2, −2, 8, −6, −3, 0, 0}; {, −7, 3, 6, 0, 7, 2, −1, 8, −5, −3, 0, 0}; {, −7, 3, 6, 0, 7, 3, −2, 7, −7, −3, 0, 0}; {1, −6, −4, 5, −2, 6, −6, −6, 1, −1, 0, 0}; {, −4, 4, 5, −3, 7, −1, −3, 1, 4, 2, 0, 0}; {, −7, −2, −4, 1, −6, −2, 3, −6, 7, 3, 0, 0}; {, −2, 4, 3, −7, 4, 8, −1, 7, 6, 3, 0, 0}; {, −3, 3, 2, 8, 3, 7, −2, 6, 6, 3, 0, 0}; {, −3, 3, 2, 8, 3, 7, −2, 6, 6, 2, 0, 0}; {, −4, 2, 1, 7, 2, 6, −2, 6, 6, 2, 0, 0}; {, −2, 4, 3, −7, 4, −7, −2, 6, 4, 3, 0, 0}; {8, −3, −5, 0, −6, −2, 3, −6, 7, 4, 0}; {, −3, 3, 2, 8, 3, 8, −2, 6, 5, 2, 0, 0}; {, −3, 5, 6, −2, −4, 6, −2, 4, 0, 1, 0, 0}; {7, −1, 0, 8, 6, −5, 3, −3, 1, 1, 0, 0}; {, −4, 2, 1, 7, 3, 6, −3, 5, 6, 3, 0, 0}; {5, −4, −4, 4, 1, −5, 3, 7, 2, 1, 0, 0}; {2, −7, −7, 1, −2, −6, 1, 5, 2, 1, 0, 0}; {, −3, 4, 4, −4, −7, −1, 7, 0, 2, 1, 0, 0}; {, −4, 3, 3, −5, 8, −2, 6, −1, 2, 1, 0, 0}; {8, −2, −3, 4, 0, 5, −5, 4, 5, 2, 0, 0}; {1, 8, 8, 0, −2, −7, 0, 5, 1, 1, 0, 0}; {, −3, 4, 4, −4, −6, −2, 5, −2, 3, 1, 0, 0}; {6, −4, −5, 2, −1, 3, −6, 3, 4, 2, 0, 0}; {, −6, 0, −1, 6, 4, −3, 5, −7, 3, 3, 0, 0}; {, −7, −1, −2, 5, 3, −3, 4, 8, 3, 3, 0, 0}; {, −6, 5, −7, 5, −3, −7, 8, 3, 7, −6, 0, 0}; {, −6, 5, −7, 5, −3, −7, 8, 3, 7, −5, 0, 0}; {, −3, 3, 2, −7, 3, 7, −2, 6, 5, 3, 0, 0}; {6, −5, −7, −1, 8, −4, 2, −7, 7, 3, 0, 0}; {0, 7, 7, −1, −6, 0, 8, 1, 2, 1, 0, 0}; {3, 7, 4, −7, 1, 6, 6, −4, 8, 5, 0, 0}; {1, 5, 2, 7, −1, 4, 6, −4, 8, 4, 0, 0}; {5, −4, −4, 4, 0, −5, 1, 6, 2, 2, 0, 0}; {6, −5, −7, −1, −7, −4, 2, −7, 7, 3, 0, 0}; {6, −5, −7, −1, −7, −4, 2, −7, 7, 4, 0, 0}; {6, −5, −7, −1, −7, −4, 2, −7, 8, 3, 0, 0}; {6, −5, −7, −1, −7, −4, 2, −7, 8, 4, 0, 0}; {0, 7, 7, −1, −5, 0, 8, 1, 2, 1, 0, 0}; {5, −6, 8, −2, 8, −4, 1, 8, 7, 3, 0, 0}; {5, −6, 8, −2, 8, −4, 1, −7, 7, 4, 0, 0}; {5, −6, 8, −2, 8, −4, 1, −7, 8, 4, 0, 0}; {, −6, 0, −1, 6, 1, 6, −4, 5, 5, 2, 0, 0}; {4, −7, 7, −3, 7, −5, 0, 8, 7, 3, 0, 0}; {, −2, 5, 5, −3, −7, −1, 7, 0, 2, 1, 0, 0}; {, −7, −1, −2, 5, 0, 5, −4, 5, 5, 2, 0, 0}; {5, 2, −7, −4, −6, 0, 6, 0, 1, 6, 0, 0}; {2, −1, 6, −5, −7, −2, 4, −1, 0, 5, 0, 0}; {4, 5, 0, −7, −5, 5, −2, 3, 2, −5, 0, 0}; {, −7, 7, −1, 6, 4, −6, 0, −6, −3, 3, 0, 0}; {, −7, −7, 3, −4, −2, 7, 0, 5, 3, −4, 0, 0}; {7, 7, 1, −6, −4, 6, −1, 4, 3, −4, 0, 0}; {, −2, −3, 6, −1, 1, −7, 2, 6, 4, −3, 0, 0}; {, −4, 8, −2, 5, −1, −7, 8, −1, 2, 5, 0, 0}; {, −5, 7, −3, 4, −2, 8, 8, −2, 1, 4, 0, 0}; {, −6, 6, −4, 3, −3, 7, 7, −3, 0, 3, 0, 0}; {, −3, −4, 5, −1, 1, −7, 2, 5, 4, −3, 0, 0}; {, −5, −6, 3, −3, −1, 8, 1, 4, 4, −3, 0, 0}; {, −2, −5, 2, −6, −5, 2, −7, −5, 8, 0, 0, 0}; {, −1, −4, 3, −4, 6, 5, −1, 1, −7, −2, 0, 0}; {, −2, −5, 2, −5, 5, 4, −1, 1, −7, −2, 0, 0}; {, −4, −7, 0, −7, 5, 4, −3, −1, 8, −3, 0, 0}; {7, 3, −7, 2, −6, −3, 1, 0, 5, 5, 0, 0}; {, −4, −7, 0, −6, 4, 4, −2, 0, 8, −3, 0, 0}; {5, 1, 7, 0, −7, 8, 2, 4, −6, −1, 0, 0}; {, −6, 7, −2, 8, 3, 3, −3, −1, 8, −4, 0, 0}; {, −6, 7, −2, 8, 3, 3, −3, −1, 8, −3, 0, 0}; {, −7, 6, −3, 7, 2, 3, −3, −1, 8, −4, 0, 0}; {5, 1, 7, 0, −5, −7, 1, 3, −5, −1, 0, 0}; {2, −5, −2, 4, −1, 8, −5, −4, 3, 0, 0, 0}; {4, −1, 4, −3, 2, −3, −3, 2, −7, −7, 0, 0}; {, −1, −6, −1, 8, 0, −4, −6, 6, −7, −5, 0, 0}; {4, 0, 6, 0, −7, 8, 1, 3, −6, −1, 0, 0}; {2, −2, 4, −2, 7, 6, 1, 2, −7, −3, 0, 0}; {, −4, −7, 0, −5, 5, −6, −2, 7, −7, 1, 0, 0}; {2, −5, −2, 5, −4, 6, 1, −4, −4, −3, 0, 0}; {1, −3, 3, −3, 7, 6, 0, 2, −7, −2, 0, 0}; {1, −3, 3, −3, 7, 6, 0, 2, −6, −2, 0, 0}; {6, −2, 0, 6, −4, 8, 3, −1, −2, −2, 0, 0}; {8, 3, 8, 1, −3, −6, 1, 2, −6, −2, 0, 0}; {, −4, −7, 0, −5, −1, −6, −6, 4, 7, −4, 0, 0}; {7, −1, 1, 8, −7, 2, −4, 4, −1, 1, 0, 0}; {6, −2, 0, 7, 8, 2, −6, 2, −2, 0, 0, 0}; {1, 8, −7, −1, −1, 8, 0, 6, 1, 1, 0, 0}; {, −7, 2, 5, −3, 0, −5, 5, −3, −5, −1, 0, 0}; {, −1, 6, 7, −3, −2, 7, −1, 6, 1, 1, 0, 0}; {4, −4, −2, 5, 7, 1, −6, 3, −2, 0, 0, 0}; {1, −4, 1, −5, 1, −3, −5, 6, −7, −4, 0, 0}; {2, −6, −4, 3, 6, 0, 8, 1, −3, −1, 0, 0}; {1, −7, −5, 2, 5, −1, −7, −1, −4, −1, 0, 0}; {6, −1, 2, −6, −2, −7, 4, −5, −6, −2, 0, 0}; {2, −6, −4, 3, 7, 0, −6, 2, −1, −1, 0, 0}; {, −7, 3, 7, 0, 6, 2, −2, 7, 8, −4, 0, 0}; {4, −3, 0, 8, −3, −7, 3, −5, −6, −2, 0, 0}; {, −4, 4, 6, −3, 2, −5, 6, −1, −2, −1, 0, 0}; {, −2, 6, 8, −1, 4, −2, 7, −1, −3, −2, 0, 0}; {7, 1, 5, −2, 5, 1, −3, 6, −7, −4, 0, 0}; {2, −5, −2, 6, −4, 7, 2, −5, −6, −3, 0, 0}; {5, −1, 3, −4, 3, −1, −4, 7, −7, −4, 0, 0}; {5, −1, 3, −4, 3, −1, −4, 8, −6, −4, 0, 0}; {, −4, 4, 6, −3, 2, −3, 6, −2, −3, −3, 0, 0}; {6, 0, 4, −3, 5, −1, −3, 8, −6, −4, 0, 0}; {0, −7, −4, 4, −5, 5, 0, −5, −4, −4, 0, 0}; {0, −7, −4, 4, −5, 5, 1, −5, −4, −3, 0, 0}; {0, −7, −4, 4, −5, 5, 1, −5, −4, −2, 0, 0}; {, −5, 3, 5, −4, 2, −4, 5, −2, −4, −3, 0, 0}; {, −5, 3, 5, −4, 2, −4, 5, −2, −3, −2, 0, 0}; {5, −1, 3, −4, 4, 0, −4, 6, −7, −4, 0, 0}; {, −4, 4, 6, −3, 3, −2, 6, −2, −3, −1, 0, 0}; {4, −2, 2, −5, 4, −2, −5, 7, −7, −5, 0, 0}; {, −3, 5, 7, −2, 5, 2, −1, −4, −4, −3, 0, 0}; {, −1, 8, −5, 3, −2, 7, 8, −4, 1, 0, 0, 0}; {, −2, 7, −6, 2, −3, 6, −7, −5, 1, −1, 0, 0}; {6, −2, 0, 7, 1, −7, −3, −3, 3, 1, 0, 0}; {, −1, 8, −5, 3, −2, 8, 8, −4, 1, 0, 0, 0}; {7, −1, 1, 8, 2, −5, −3, −4, 3, −1, 0, 0}; {8, −3, −4, 0, 7, −1, −6, −7, 2, 4, 0, 0}; {, −3, 6, −7, 1, −3, 7, 7, −5, 0, 0, 0, 0}; {, −5, 4, 7, −1, −5, 5, 7, −7, 0, −2, 0, 0}; {, −6, 3, 6, −2, −6, 5, 6, −7, 0, −2, 0, 0}; {3, 8, 7, −4, 7, −6, 0, 8, 7, 4, 0, 0}; {, −2, 6, 8, 0, −1, 6, −2, −7, −1, 0, 0, 0}; {, −5, 2, 3, −6, 8, −3, 4, −2, 2, 1, 0, 0}; {0, 7, 8, −1, −2, 7, 0, 6, 1, 2, 0, 0}; {5, −3, −1, 7, 7, 2, −6, 1, −2, 0, 0, 0}; {8, 7, 0, −1, 6, −5, 2, −6, 1, −2, 0, 0}; {4, −4, −2, 6, 7, 1, −6, 1, −2, 0, 0, 0}; {, −2, 5, 6, −3, −3, 6, −1, 5, 0, 1, 0, 0}; {, −3, 4, 5, −4, −4, 6, −2, 4, 0, 1, 0, 0}; {, −4, 3, 4, −5, −5, 5, −2, 3, −1, 1, 0, 0}; {3, −5, −3, 5, 7, 0, −5, 3, −1, 0, 0, 0}; {, −3, 4, 5, −4, −3, 6, −1, 5, 1, 1, 0, 0}; {, −4, 3, 4, −5, −4, 5, −2, 4, 0, 1, 0, 0}; {, −3, 4, 5, −4, −3, 6, −1, 6, 1, 1, 0, 0}; {1, −7, −5, 3, 5, −1, −7, 1, −3, 0, 0, 0}; {2, −6, −4, 4, 6, 0, −6, 3, −2, 0, 0, 0}; {0, 8, −6, 2, 4, −2, −7, 0, −3, 0, 0, 0}; {1, −7, −5, 3, 5, −1, −6, 2, −2, 0, 0, 0}; {, −4, 3, 4, −5, −4, 6, −2, 4, 0, 0, 0, 0}; {, −5, 2, 3, −6, −5, 5, −3, 3, −1, 0, 0, 0}; {, −7, 3, 7, 1, 6, 1, −2, 8, −5, −3, 0, 0}; {6, −1, 2, −5, −1, −7, 5, −2, −4, −2, 0, 0}; {, −1, 7, −7, 1, 4, −2, 7, −1, −4, −1, 0, 0}; {4, −3, 0, −7, −3, 8, 3, −5, −6, −2, 0, 0}; {0, 8, −6, 2, 5, −1, −7, 1, −2, −1, 0, 0}; {0, 8, −6, 2, 5, −1, −7, 1, −2, 0, 0, 0}; {, −1, 7, −7, 1, 4, −2, 8, 0, −3, −1, 0, 0}; {4, −3, 0, −7, −3, 8, 4, −4, −6, −2, 0, 0}; {, −3, 5,

7, −1, 2, −3, 6, −2, −4, −1, 0, 0}; {, −1, 7, −7, 1, 5, −2, −7, 1, −1, −1, 0, 0}; {4, −3, 0, −7, −2, 8, 4, −3, −4, −2, 0, 0}; {6, 0, 4, −2, 4, −1, −4, 6, −6, −4, 0, 0}; {7, 1, 5, −1, 5, 0, −2, 8, −6, −4, 0, 0}; {7, 1, 5, −1, 5, 0, −2, 8, −6, −3, 0, 0}; {, −2, 6, 8, 0, 4, −2, 8, 0, −2, −2, 0, 0}; {, −3, 5, 7, −1, 3, −3, 7, 0, −3, −1, 0, 0}; {7, 1, 5, −1, 5, 1, −2, 7, −7, −3, 0, 0}; {, −4, 4, 6, −2, 2, −3, 6, −1, −4, −2, 0, 0}; {6, 0, 4, −2, 5, −1, −3, 8, −6, −4, 0, 0}; {7, −2, −1, 6, −6, 3, −5, 3, −1, −1, 0, 0}; {, −2, 7, −6, 3, −6, 4, 0, −6, −4, −3, 0, 0}; {3, −3, 1, −5, 3, −2, −5, 6, −7, −4, 0, 0}; {2, −4, 0, −6, 2, −3, −5, 6, −7, −5, 0, 0}; {6, −3, −2, 5, −4, 6, 3, 0, −2, −2, 0, 0}; {, −7, 2, 5, −2, −7, 3, 6, −7, 0, −1, 0, 0}; {5, −2, 1, −6, 7, 2, 3, 7, −1, −3, 0, 0}; {, −4, 4, 6, −1, −4, 6, −2, 4, 0, −1, 0, 0}; {5, −4, −3, 5, 1, −5, 2, 7, 2, 1, 0, 0}; {, −7, 1, 3, −4, −7, 4, −4, 2, −1, 0, 0, 0}; {2, −7, −6, 2, −2, −7, 0, 5, 1, 1, 0, 0}; {7, −3, −3, 4, −1, 4, −5, 4, 3, 1, 0, 0}; {, −1, 4, 3, −7, 4, 8, −1, 7, 6, 3, 0, 0}; {, −5, 1, 1, 8, 4, −2, 5, 8, 4, 3, 0, 0}; {0, 5, 4, −6, 5, 8, −1, 7, 6, 4, 0, 0}; {5, −5, −5, 2, −2, 2, −6, 3, 4, 1, 0, 0}; {5, −3, −1, 8, 7, 2, −6, 1, −2, 0, 0, 0}; {6, −3, −2, 6, 5, −6, 2, −4, 1, 0, 0, 0}; {7, −3, −3, 4, 2, −4, 2, 7, 2, 2, 0, 0}; {7, −3, −3, 4, 2, −4, 3, 7, 3, 3, 0, 0}; {4, −6, −6, 1, 0, −6, 1, 6, 1, 1, 0, 0}; {, −2, 6, 8, 1, 3, −2, 7, −1, −4, 0, 0, 0}; {8, −1, 0, 8, −7, 3, −4, 3, −2, 0, 0, 0}; {, −5, 3, 5, −2, 1, −4, 5, −3, −5, −1, 0, 0}; {0, 6, 6, −3, 3, −5, 7, 4, 0, −1, 0, 0}; {6, −1, 2, −4, 8, 2, 3, 8, −1, −2, 0, 0}; {, −5, 3, 5, −2, −6, 5, 5, −7, 1, −2, 0, 0}; {2, 7, 6, −4, 5, −6, 0, 8, 6, 3, 0, 0}; {, −1, 8, −5, 6, 3, −2, 0, 5, −2, −4, 0, 0}; {, −6, 2, 4, −2, −6, 5, −3, 3, −1, −1, 0, 0}; {1, 6, 5, −4, 5, −7, 0, 8, 5, 3, 0, 0}; {, −6, −2, −4, 2, −5, −2, 4, −5, 7, 4, 0, 0}; {, −6, −2, −4, 2, −5, −2, 4, −5, 8, 4, 0, 0}; {, −7, −3, −5, 1, −6, −3, 3, −6, 8, 3, 0, 0}; {8, −4, −6, 0, −7, −4, 3, −6, 8, 3, 0, 0}; {, −7, −3, −5, 1, −6, −2, 3, −6, 8, 3, 0, 0}; {, −2, 5, 6, −1, −4, 7, −2, 4, 0, 1, 0, 0}; {, −7, −1, −1, 8, 5, −3, −7, −2, 4, 0, 0, 0}; {, −7, −3, −5, 4, −7, 8, 1, −6, −4, 4, 0, 0}; {2, 5, 3, −5, −1, −3, 5, −3, −2, 6, 0, 0}; {1, 4, 2, −6, −2, −4, 5, −3, −2, 6, 0, 0}; {0, 3, 1, −7, −2, −4, 4, −4, −3, 5, 0, 0}; {, −1, 2, 0, −7, −4, −5, 5, −2, −1, 8, 0, 0}; {, −7, −5, 8, 0, 3, 0, −7, 0, 0, −7, 0, 0}; {3, 2, −4, 2, 4, −3, 4, −7, 6, −2, 0, 0}; {0, −3, 5, −6, 8, −2, 3, −2, 0, 5, 0, 0}; {2, 1, −5, 2, 3, −4, 4, 8, 5, −3, 0, 0}; {, −7, 3, 8, −4, 7, −1, −3, 3, 4, 5, 0, 0}; {, −7, 5, −4, 3, −3, 7, 7, −2, 1, 4, 0, 0}; {, −1, −6, 0, 6, 1, −7, −7, −1, 2, 4, 0, 0}; {, −3, −6, 2, −6, 7, −4, 2, −7, −3, 2, 0, 0}; {, −4, −7, 1, −6, 3, 3, −1, 0, −7, −3, 0, 0}; {2, −2, 5, −3, 5, 6, 3, 4, 7, 8, 0, 0}; {4, 0, 7, −1, 8, 7, 2, 3, −5, −2, 0, 0}; {, −6, 7, −1, 8, 2, 4, −2, 0, −7, −4, 0, 0}; {4, 0, 7, −1, 8, −5, 2, 3, −3, −3, 0, 0}; {, −7, 6, −2, 7, 4, −7, −1, 7, −5, 1, 0, 0}; {1, −5, 0, 6, 1, −6, −7, −1, 2, 3, 0, 0}; {, −5, 6, −4, 3, −1, −5, 4, 4, −3, 0, 0, 0}; {3, −1, 6, −1, 3, −3, −3, 7, −7, −3, 0, 0}; {7, 1, 6, −3, −1, 7, 6, −1, −3, 0, 0, 0}; {0, −4, 3, −4, 4, 5, 2, 3, 6, 8, 0, 0}; {3, −3, 2, −7, 0, −1, −5, −7, −5, −5, 0, 0}; {8, 3, −7, 1, −7, −6, 6, 5, −7, −7, 0, 0}; {1, −3, 4, −3, 7, 7, 0, 2, −6, −2, 0, 0}; {, −6, 2, 5, −6, 4, −4, −1, −2, 5, 1, 0, 0}; {, −7, 6, −2, 8, −4, 7, −7, 4, 7, −5, 0, 0}; {2, −2, 5, −1, 2, −3, −4, 6, −7, −3, 0, 0}; {, −5, 6, −4, 5, 7, 1, −1, 8, −4, −2, 0, 0}; {1, −3, 4, −2, 1, −4, −4, 6, −7, −4, 0, 0}; {, −1, −5, 2, −4, 0, −5, −5, 5, 8, −4, 0, 0}; {, −6, 5, −5, 4, −5, −5, 6, 7, −7, −7, 0, 0}; {5, 0, 6, −1, 6, 8, 5, 4, 8, 8, 0, 0}; {2, −4, 1, −7, 0, −2, −7, −7, −6, −6, 0, 0}; {1, −5, 0, 8, −1, −3, −6, 8, −6, −5, 0, 0}; {0, −6, −1, 7, −2, −3, −7, 8, −6, −6, 0, 0}; {, −3, 7, −4, 4, −5, −5, 8, 6, −7, −6, 0, 0}; {4, −2, 3, −5, 3, −2, −5, 6, −7, −5, 0, 0}; {, −7, 4, −6, 3, −4, −6, 4, 5, −4, −1, 0, 0}; {, −2, −6, 1, −5, 5, 5, −1, 1, −7, −3, 0, 0}; {, −7, 2, 6, −3, 4, 1, −3, −5, −5, −4, 0, 0}; {, −2, 8, −3, 5, −3, −5, 8, 8, −7, −6, 0, 0}; {, −4, 8, −1, −7, 3, 4, −2, 0, −7, −4, 0, 0}; {, −3, 7, −4, 4, −4, −5, 8, 7, −7, −6, 0, 0}; {, −3, −7, 0, −6, 4, 6, −1, 1, −6, −3, 0, 0}; {7, 4, −4, 7, 2, 7, −4, 5, 8, 0, 0, 0}; {, −3, 6, −6, 1, −7, 3, −1, −6, −5, −4, 0, 0}; {5, −3, 0, 6, −3, 7, 2, −3, −4, −3, 0, 0}; {8, 3, −7, 2, −4, −5, 3, 4, −4, −1, 0, 0}; {6, 1, 7, 0, −6, −7, 2, 3, −5, −2, 0, 0}; {, −5, 7, −2, 8, 3, 3, −2, 0, 8, −4, 0, 0}; {6, 1, 7, 0, −5, −7, 1, 2, −6, −2, 0, 0}; {0, −6, −1, 7, 2, −2, 6, 6, −2, 0, 0, 0}; {1, −6, −2, 5, 0, −7, −7, −2, 2, 1, 0, 0}; {, −4, 5, −7, 0, −5, 5, 8, −6, 0, 0, 0, 0}; {, −5, 4, 8, −1, −6, 4, 8, −7, 0, −1, 0, 0}; {5, −3, 0, 6, 1, −7, −3, −4, 3, 0, 0, 0}; {, −7, 2, 6, −3, −7, 3, 7, 8, 0, −2, 0, 0}; {1, −4, 2, −5, −6, 8, −3, −3, 7, −6, 0, 0}; {, −2, −2, −7, 8, 0, 4, −4, 5, −3, −3, 0, 0}; {0, 8, −5, 2, 4, −2, 8, −1, −4, −1, 0, 0}; {1, −6, −2, 6, −6, 6, 2, −6, 8, −2, 0, 0}; {7, −2, 0, 6, −7, 3, −5, 4, −1, 0, 0, 0}; {, −3, 6, −6, 2, −7, 3, −1, −6, −5, −4, 0, 0}; {, −4, 5, −7, 1, 8, 2, −2, −7, −5, −4, 0, 0}; {8, 0, 3, −6, 0, −6, 4, −3, −4, −3, 0, 0}; {, −5, 4, 8, 0, 7, 2, −2, −6, −5, −4, 0, 0}; {0, −6, −1, 8, 0, −4, −7, 6, −7, −5, 0, 0}; {, −4, 5, −7, 1, 8, 3, −1, −7, −7, −4, 0, 0}; {, −4, 5, −7, 1, 8, 3, −1, −7, −6, −4, 0, 0}; {, −4, 5, −7, 1, 8, 3, −1, −7, −5, −4, 0, 0}; {1, −5, 0, −7, 1, −3, −6, 6, −7, −5, 0, 0}; {, −6, 3, 7, −1, 6, 2, −2, 8, −7, −5, 0, 0}; {2, −6, −3, 4, −6, 5, 1, −2, −3, −2, 0, 0}; {5, 0, 6, 0, −7, 8, 2, 3, −5, −2, 0, 0}; {, −5, 4, 8, 0, 8, 2, −2, −7, −5, −4, 0, 0}; {0, −6, −1, 8, 1, −4, −6, 6, −7, −5, 0, 0}; {5, −3, 0, 7, −2, 8, 2, −4, −4, −3, 0, 0}; {0, −6, −1, 8, 1, −2, 7, 7, −2, 0, 0, 0}; {4, −1, 5, −1, −7, 7, 2, 3, −6, −2, 0, 0}; {, −1, −7, −2, 7, 1, −2, 6, 6, −2, 0, 0, 0}; {3, −2, 4, −2, −7, 7, 1, 2, −6, −2, 0, 0}; {3, −4, 0, 8, 3, −4, −6, −1, 1, 3, 0, 0}; {1, −6, −2, 6, 1, −6, −7, −2, 1, 2, 0, 0}; {2, −6, −3, 4, −1, 8, −5, −5, 2, −1, 0, 0}; {7, 0, 4, −4, 8, 2, 6, 7, −1, −2, 0, 0}; {1, −7, −4, 3, −2, 8, −6, −7, 1, −2, 0, 0}; {1, −7, −4, 3, −2, 8, −6, −6, 2, −2, 0, 0}; {6, −1, 3, −5, 7, 2, 5, 7, −1, −3, 0, 0}; {5, −2, 2, −6, 6, 1, 5, 7, −1, −2, 0, 0}; {3, −4, 0, 8, 6, 1, 6, 3, −4, −3, 0, 0}; {, −1, 8, −4, 5, 3, −1, 0, 5, −2, −4, 0, 0}; {6, −2, 1, −7, 8, 2, −5, 2, −1, 0, 0, 0}; {, −2, 5, 7, −2, −3, 6, −1, 5, 1, 1, 0, 0}; {0, 8, −5, 3, 4, −2, −7, 0, −3, 0, 0, 0}; {, −6, 1, 3, −6, −6, 4, −3, 3, −1, 0, 0, 0}; {5, −5, −4, 2, 1, −6, 2, 7, 2, 2, 0, 0}; {5, 4, −2, −3, 5, −6, 1, 8, −1, −3, 0, 0}; {, −7, 0, 2, −7, −6, 3, −3, 4, 0, 1, 0, 0}; {, −3, 5, 8, 0, 2, −4, 8, −1, −4, 0, 0, 0}; {, −4, 4, 7, −1, 1, −4, 6, −3, −5, −1, 0, 0}; {7, −2, 0, 7, 8, 2, −5, 2, −2, 0, 0, 0}; {8, −1, 1, 8, −7, 3, −4, 4, −1, 1, 0, 0}; {7, −1, 2, −6, −2, −7, 4, −4, −6, −2, 0, 0}; {8, 0, 3, −5, 0, −6, 5, −2, −4, −2, 0, 0}; {2, −3, 3, −2, 8, 6, 1, 2, −6, −2, 0, 0}; {, −1, 5, 6, −4, 1, −5, 7, 3, −1, 1, 0, 0}; {4, −5, −3, 4, −6, 5, 2, −1, −3, −2, 0, 0}; {4, −5, −3, 4, −5, 5, 2, 0, −3, −2, 0, 0}; {8, 0, 3, −5, 3, −2, −3, −5, −6, −4, 0, 0}; {, −1, 8, −4, 5, 0, −7, 8, −3, 0, 2, 0, 0}; {1, −7, −4, 4, −2, 7, −6, −7, 1, −1, 0, 0}; {3, −5, −2, 7, 5, 1, −7, 0, −2, 0, 0, 0}; {8, 2, 7, 2, 3, −7, 0, −2, −6, −6, 0, 0}; {7, 7, 2, 3, −5, 2, −6, 4, −4, −4, 0, 0}; {3, −7, −6, 1, 0, −7, 1, 7, 2, 2, 0, 0}; {5, −4, −2, 6, 7, 1, −5, 2, −2, 1, 0, 0}; {0, 6, 7, −2, −2, 7, 0, 7, 1, 2, 0, 0}; {, −5, 0, 0, 7, 0, 5, −3, 6, 5, 2, 0, 0}; {5, −7, 8, −2, 7, −5, 1, −7, 7, 3, 0, 0}; {2, −7, −5, 4, 0, −7, 7, −4, 2, 0, 0, 0}; {8, −2, −1, 7, 2, −3, 3, 7, 3, 2, 0, 0}; {, −3, 4, 6, −1, −5, 7, −2, 3, 1, 1, 0, 0}; {, −4, 3, 5, −2, −6, 6, −3, 3, 0, 1, 0, 0}; {4, −6, −5, 3, −1, −6, 1, 6, 2, 2, 0, 0}; {5, −1, 4, 0, 1, 7, 0, −3, 8, −6, 0, 0}; {8, −1, 2, −3, 8, 2, 3, 8, 1, −1, 0, 0}; {7, −7, 7, −2, 2, −1, 7, −1, −1, 7, 0, 0}; {, −6, 5, −4, −4, 3, 0, 7, −4, 3, 2, 0, 0}; {, −1, 0, −3, 4, 7, 3, −5, 2, 1, −7, 0, 0}; {, −2, −1, −4, 3, 6, 2, −6, 2, 1, 8, 0, 0}; {8, 8, 4, −5, −4, 8, −1, 5, 3, −6, 0, 0}; {, −7, −7, 5, −4, −3, 8, −1, 5, 3, −6, 0, 0}; {7, 7, 3, −6, −4, 7, −2, 5, 3, −6, 0, 0}; {, −6, −4, −6, 3, 7, 1, −7, −1, −1, −7, 0, 0}; {, −1, −2, −7, 0, 1, −5, 2, 7, 4, −4, 0, 0}; {, −4, −5, 6, −3, −1, −7, 1, 6, 4, −4, 0, 0}; {2, 0, −6, 1, 6, 1, 6, 4, 6, 8, 0, 0}; {, −7, 6, −1, 6, −3, 7, 7, 4, 7, −7, 0, 0}; {5, 1, −7, −1, −5, 2, 5, −4, 0, 3, 0, 0}; {1, −4, 3, 8, 3, −5, −6, 0, 2, 5, 0, 0}; {5, −1, 5, −7, 4, −4, −5, 2, 4, 4, 0, 0}; {5, 2, −5, 3, −3, 0, −3, −1, 8, −6, 0, 0}; {, −6, 5, −4, 2, −2, 7, 7, −2, 0, 3, 0, 0}; {1, −3, 5, −3, 1, −5, −4, 8, −7, −5, 0, 0}; {2, −2, 6, −2, 6, 6, 2, 2, −5, −3, 0, 0}; {1, −3, 5, −3, 6, 6, 1, 2, −6, −3, 0, 0}; {0, −4, 4, −4, 5, 6, 1, 2, −6, −4, 0, 0}; {, −6, 5, −4, 3, −5, −5, 5, 5, −3, −2, 0, 0}; {, −7, 4, −5, 2, −6, −5, 5, 5, −3, −3, 0, 0}; {7, 2, −7, 0, 8, −7, 6, 5, −7, −7, 0, 0}; {, −3, 8, −1, 6, −2, 0, 6, 6, −1, −1, 0, 0}; {, −4, 7, −2, 5, −2, −4, 5, 5, −3, −1, 0, 0}; {0, −4, 4, −4, 6, 8, 0, 2, −5, −3, 0, 0}; {, −2, −6, 2, −6, 4, 6, −1, 1, −6, −4, 0, 0}; {8, 3, −6, 1, −6, −5, 4, 4, −4, −3, 0, 0}; {, −2, 8, −2, 4, −4, −4, −7, 7, −6, −6, 0, 0}; {8, 3, −6, 1, −6, −4, 4, 4, −3, −3, 0, 0}; {, −1, −5, 3, −5, 5, −7, 0, 2, −4, −3, 0, 0}; {, −1, −5, 3, −5, 6, 7, −1, 1, −6, −3, 0, 0}; {, −3, −7, 1, −7, 4, 5, −2, 0, −7, −4, 0, 0}; {8, 3, −6, 1, −4, −6, 2, 3, −5, −2, 0, 0}; {6, 1, 8, −1, −5, 4, 5, −4, −1, 2, 0, 0}; {1, −5, 1, 7, 2, −5, −6, 0, 2, 4, 0, 0}; {6, 1, 8, −1, −4, 5, 5, −3, −1, 2, 0, 0}; {, −7, 1, 5, −7, 3, −4, −1, −2, 5, 1, 0, 0}; {, −2, −6, 2, −6, −5, 2, −7, −6, −6, 1, 0, 0}; {, −5, 8, 1, −6, −3, 7, −5, 7, 8, −6, 0, 0}; {7, 4, −3, 7, −5, 6, −7, 4, 7, −5, 0, 0}; {, −1, −5, 3, −4, −1, −7, −4, 7, 8, −4, 0, 0}; {0, −4, 4, −3, 1, −5, −3, 7, −7, −4, 0, 0}; {, −1, −5, 3, −4, 4, 5, 0, 1, −6, −3, 0, 0}; {, −3, −7, 1, −6, 2, 3, −1, 0, −7, −4, 0, 0}; {, −3, −7, 1, −6, 2, 4, −1, 0, −6, −4, 0, 0}; {, −5, 7, −1, 8, 0, 2, −1, 0, −7, −5, 0, 0}; {5, 0, 7, −1, 6, 8, 3, 3, −5, −4, 0, 0}; {, −6, 5, −4, 4, −4, −5, 5, 6, −4, −1, 0, 0}; {, −3, −7, 1, −6, 3, 4, −1, 0, −6, −3, 0, 0}; {6, 1, 8, 0, 8, 8, 5, 4, −7, −6, 0, 0}; {6, 1, 8, 0, 8, 8, 5, 5, 8, −7, 0, 0}; {, −1, −7, −1, 6, −3, −4, −7, 8, −6, −6, 0, 0}; {5, 0, 7, −1, 7, 8, 3, 3, −4, −3, 0, 0}; {5, 0, 7, −1, 7, 8, 5, 4, 8, −7, 0, 0}; {4, −1, 6, −2, 6, 8, 3, 3, −5, −4, 0, 0}; {, −6, 5, −4, 4, −3, −4, 4, 5, −3, −1, 0, 0}; {, −7, 4, −5, 3, −4, −5, 4, 5, −4, −1, 0, 0}; {7, 2, −7, 1, −6, −6, 3, 4, −4, −2, 0, 0}; {, −3, −7, 1, −6, 4, 6, −1, 1, −6, −3, 0, 0}; {6, 1, 8, 0, −7, −6, 3, 3, −4, −3, 0, 0}; {, −2, −6, 2, −5, 5, 8, −1, 1, −5, −3, 0, 0}; {6, 1, 8, 0, −7, −5, 3, 3, −2, −3, 0, 0}; {5, 2, −5, 5, 1, 6, −5, 5, 8, −1, 0, 0}; {7, 2, −7, 1, −5, −6, 3, 4, −4, −2, 0, 0}; {, −4, 8, 0, −7, 4, 4, −2, 0, −7, −3, 0, 0}; {6, 1, 8, 0, −6, −7, 2, 3, −5, −2, 0, 0}; {6, 1, 8, 0, −6, −6, 2, 3, −4, −3, 0, 0}; {4, −1, 6, −2, 8, 8, 2, 3, −5, −3, 0, 0}; {, −6, 4, −6, 1, −6, −6, 7, 6, −7, −6, 0, 0}; {3, 0, −7, 3, 0, 5, −4, 4, −7, −1, 0, 0}; {2, −4, 2, −7, 3, 0, 7, 7, −1, 0, 0, 0}; {, −5, 5, −5, 2, −3, 7, 7, −3, 0, 2, 0, 0}; {4, −1, 6, −2, −6, 8, 1, 2, −5, −2, 0, 0}; {3, −2, 5, −3, −6, 4, 4, −4, −2, 1, 0, 0}; {, −3, 7, −3, 4, 0, −7, 8, −1, 0, 3, 0, 0}; {, −2, 5, 8, −4, 6, −1, 1, −2, 5, 1, 0, 0}; {3, −1, 7, 0, 2, −4, −2, 8, −6, −5, 0, 0}; {3, −1, 7, 0, 2, −4, −2, 8, −6, −4, 0, 0}; {2, −2, 6, −1, 1, −5, −2, 8, −7, −5, 0, 0}; {2, −2, 6, −1, 1, −5, −2, 8, −7, −3, 0, 0}; {1, −6, −1, 6, 5, 0, 4, 1, −4, −4, 0, 0}; {0, −4, 4, −2, 0, −5, −5, 5, −7, −3, 0, 0}; {4, −2, 4, −4, −4, 5, 5, −2, −3, 0, 0, 0}; {, −2, 7, −4, 3, 2, −6, −7, 1, −1, 1, 0, 0}; {, −7, 4, −5, 4, 6, 0, −1, 8, −5, −1, 0, 0}; {, −2, −6, 2, −4, −1, −6, −5, 5, 8, −4, 0, 0}; {3, −3, 3, −5, −4, 5, 4, −3, −3, 0, 0, 0}; {, −2, 7, −4, 3, 3, −5, −7, 2, −1, 0, 0, 0}; {3, −3, 3, −5, −4, 5, 5, −2, −4, −1, 0, 0}; {8, 3, −6, 3, 5, −1, 0, −6, −6, −3, 0, 0}; {6, 1, 8, 1, 4, −2, −3, 7, −6, −3, 0, 0}; {0, −6, 0, 8, −6, 3, 1, −6, −3, −2, 0, 0}; {7, 2, −7, 2, 5, −1, −1, 8, −6, −2, 0, 0}; {, −4, 8, 0, −6, −2, −7, −6, 4, 7, −4, 0, 0}; {7, 2, −7, 2, 5, −1, −1, −7, −6, −4, 0, 0}; {7, 2, −7, 2, 5, −1, −1, −7, −6, −3, 0, 0}; {1, −5, 1, −7, −5, 4, 3, −4, −4, −1, 0, 0}; {, −4, 8, 0, −6, −2, −7, −6, 5, 8, −4, 0, 0}; {, −5, 7, −1, −7, −3, 8, −6, 4, 7, −5, 0, 0}; {6, 1, 8, 1, 4, −2, −1, −7, −6, −3, 0, 0}; {, −6, 3, 8, −1, 1, −7, 6, −1, −2, −1, 0, 0}; {, −4, 6, −4, 4, −5, −6, 7, 6, −7, −6, 0, 0}; {, −4, 6, −4, 4, −5, −6, 7, 7, −7, −6, 0, 0}; {1, −4, 3, −4, 4, 5, 3, 3, 7, 7, 0, 0}; {, −6, 4, −6, 2, −6, −7, 6, 6, 8, −6, 0, 0}; {, −3, 7, −3, 5, −3, −4, 6, 6, −3, −2, 0, 0}; {, −7, 5, −3, 7, 1, 3, −3, −1, −7, −4, 0, 0}; {3, −2, 5, −2, 7, 8, 2, 3, −5, −3, 0, 0}; {2, −3, 4, −3, 6, 7, 3, 4, 8, −7, 0, 0}; {2, −3, 4, −3, 7, −7, 1, 2, −4, −3, 0, 0}; {4, −4, 0, 6, −3, 7, 1, −4, −5, −4, 0, 0}; {, −2, 8, −2, 6, −1, −3, 6, 6, −2, −1, 0, 0}; {, −2, 8, −2, 6, −1, −2, 6, 6, −2, −1, 0, 0}; {3, −2, 5, −2, 8, 8, 1, 2, −5, −3, 0, 0}; {3, −2, 5, −2, 8, 8, 1, 2, −5, −2, 0, 0}; {2, −3, 4, −3, 7, 7, 1, 2, −5, −3, 0, 0}; {, −4, 6, −4, 4, −3, −4, 6, 6, −3, −2, 0, 0}; {, −1, 7, −5, 1, −7, 4, −1, −5, −5, −3, 0, 0}; {, −3, 7, −3, 5, −1, −4, 5, 5, −3, −1, 0, 0}; {, −3, 7, −3, 5, −1, −3, 5, 5, −3, −1, 0,

0}; {1, −4, 3, −4, 7, 7, 0, 1, −6, −3, 0, 0}; {, −7, 5, −3, 7, 4, 8, −2, 6, −6, 0, 0, 0}; {0, −5, 2, −5, 7, 2, 3, −6, −3, 1, 0, 0}; {, −4, 6, −4, 4, −1, −4, 5, 5, −3, −1, 0, 0}; {1, −4, 3, −4, 8, 7, −1, 1, −6, −3, 0, 0}; {, −7, 3, −7, 1, −2, 7, 6, −3, −1, 2, 0, 0}; {1, −7, −3, 3, −2, 7, −5, −6, 2, −1, 0, 0}; {1, −7, −3, 3, −2, 8, −5, −6, 1, 0, 0, 0}; {, −5, 2, 5, −6, 4, −3, −1, −3, 4, 0, 0, 0}; {6, −1, 4, −5, 7, 2, 6, 7, −2, −1, 0, 0}; {6, −1, 4, −5, 7, 2, 6, 7, −1, −2, 0, 0}; {1, −7, −3, 3, −2, 8, −5, −5, 2, 0, 0, 0}; {0, 8, −4, 2, −2, 7, −5, −6, 1, 0, 0, 0}; {4, −3, 2, −7, 6, 0, 6, 6, −2, −2, 0, 0}; {8, 2, 8, 0, −1, −4, 0, −1, −7, −5, 0, 0}; {, −6, 2, 6, −3, −6, 4, −7, 7, −1, −1, 0, 0}; {, −1, 8, −3, 5, 3, −1, 3, 1, −5, −4, 0, 0}; {, −7, 1, 5, −4, −7, 4, 8, 5, −2, −2, 0, 0}; {6, 3, −4, 8, −6, 5, −5, 3, 6, −4, 0, 0}; {3, −3, 3, −4, −5, 4, 4, −4, −3, 0, 0, 0}; {7, 2, −7, 3, 4, −2, 0, −7, −6, −3, 0, 0}; {0, −6, 0, −7, −7, 3, 2, −6, −3, −2, 0, 0}; {7, 2, −7, 3, 5, −1, 0, −7, −6, −4, 0, 0}; {7, 2, −7, 3, 5, −1, 0, −7, −6, −3, 0, 0}; {0, −6, 0, −7, −6, 4, 1, −6, −4, −2, 0, 0}; {0, −6, 0, −7, −6, 4, 2, −5, −3, −2, 0, 0}; {, −7, 2, 7, −1, −1, 8, 5, −3, −1, −1, 0, 0}; {0, −6, 0, −7, −5, 4, 4, −3, −4, −2, 0, 0}; {, −2, 8, −2, 7, −7, 3, 1, −6, −4, −2, 0, 0}; {, −3, 7, −3, 6, 8, 2, 0, −7, −4, −3, 0, 0}; {, −3, 7, −3, 6, 8, 2, 0, −7, −4, −2, 0, 0}; {4, −4, 0, 7, 7, −1, −5, 3, 0, 1, 0, 0}; {4, −4, 0, 7, 7, −1, −4, 4, 0, 1, 0, 0}; {7, 7, 3, 2, −6, 1, −7, 3, −5, −4, 0, 0}; {7, 0, 5, −3, −1, 8, 5, −2, −2, −1, 0, 0}; {, −5, 5, −5, 4, 7, 1, 0, −7, −5, −3, 0, 0}; {5, −2, 3, −5, −2, 7, 4, −3, −3, −2, 0, 0}; {, −1, −6, 1, −5, 2, 4, 0, 1, −7, −5, 0, 0}; {1, −4, 3, −3, 6, 8, 1, 2, −4, −3, 0, 0}; {7, 2, −7, 3, −4, −1, 2, −6, −4, 2, 0, 0}; {5, −3, 1, 8, −2, 8, 3, −4, −5, −3, 0, 0}; {, −2, 6, −6, 1, 7, 3, −1, −3, −4, −3, 0, 0}; {1, −4, 3, −3, 6, 6, 1, 2, −6, −3, 0, 0}; {, −2, −7, 0, −6, 4, 5, 0, 1, −6, −4, 0, 0}; {4, −1, 6, 0, −6, −3, 1, −7, −5, 1, 0, 0}; {8, 4, −4, 7, 2, 6, −4, 5, 8, −1, 0, 0}; {1, −7, −3, 4, −5, 5, 0, −5, −5, −4, 0, 0}; {, −5, 3, 7, −2, 5, 1, −2, −4, −5, −3, 0, 0}; {6, 0, 6, −1, 8, 7, 3, 5, −6, −3, 0, 0}; {, −6, 4, −6, 3, −4, −5, 5, 5, −3, −2, 0, 0}; {8, 0, 4, −5, 3, 0, −3, −5, −4, −4, 0, 0}; {0, 8, −4, 3, −5, 5, 0, −5, −4, −3, 0, 0}; {4, −3, 2, −6, 3, −2, −5, 7, −7, −5, 0, 0}; {, −2, 6, −6, 1, −7, 4, −1, −6, −5, −4, 0, 0}; {, −4, 4, 8, −1, 7, 2, −2, −5, −5, −4, 0, 0}; {, −7, 1, 5, −4, 4, 0, −3, −5, −5, −4, 0, 0}; {, −6, 4, −6, 3, −3, −5, 4, 4, −3, −1, 0, 0}; {7, −1, 3, −6, 3, −2, −4, −6, −6, −5, 0, 0}; {, −7, 0, 3, −7, 3, −4, −2, −3, 4, 0, 0, 0}; {, −2, 6, −6, 1, −4, 6, −7, −6, 1, 0, 0, 0}; {, −3, 5, −7, 0, −5, 5, −7, 8, 0, −1, 0, 0}; {3, −4, 1, −7, 5, 0, 5, 6, −2, −2, 0, 0}; {, −3, 5, −7, 0, −5, 5, −7, −7, 0, 0, 0, 0}; {, −3, 5, −7, 0, −5, 5, −7, −7, 1, −1, 0, 0}; {, −5, 3, 7, −2, −6, 4, 8, 8, 0, −1, 0, 0}; {, −5, 3, 7, −2, −6, 5, 8, 5, −2, −3, 0, 0}; {1, −5, 1, −5, −7, 3, 3, −5, −3, −1, 0, 0}; {, −2, 7, −4, 5, 2, −2, 2, 1, −5, −4, 0, 0}; {, −3, −7, 1, −3, −2, −7, −3, 6, 8, −5, 0, 0}; {, −6, 3, 8, 1, −1, 8, 6, −3, −1, 1, 0, 0}; {, −4, 5, −6, 3, 1, −3, 2, 0, −6, −4, 0, 0}; {, −3, −7, 1, −3, −2, 8, −2, 5, 7, −3, 0, 0}; {4, −1, 6, 1, 2, −4, 0, 8, −7, −3, 0, 0}; {4, −5, −2, 5, 6, 0, −6, 1, −3, 0, 0, 0}; {1, 8, −5, 2, 5, −1, 8, 1, −3, −1, 0, 0}; {, −2, 7, −4, 5, −3, −5, 8, 8, −7, −6, 0, 0}; {, −3, 6, −5, 4, −4, −6, 8, 7, −7, −6, 0, 0}; {6, −2, 2, −6, 2, −2, −4, −6, −6, −4, 0, 0}; {5, −3, 1, −7, 1, −3, −5, −6, −6, −5, 0, 0}; {, −1, 6, −7, 0, 7, 3, 0, −3, −4, −3, 0, 0}; {1, −6, −1, 8, 2, −2, 6, 6, −2, 0, 0, 0}; {8, 4, −4, −7, −6, 5, −4, 3, 6, −4, 0, 0}; {7, 0, 5, −1, −2, −6, 4, −4, −4, −1, 0, 0}; {8, 6, 0, −1, 6, −6, 1, −7, 0, −2, 0, 0}; {0, −1, −6, −6, 2, 8, −2, 7, −2, −4, 0, 0}; {, −5, −6, 5, 5, −2, 4, −4, 5, −3, −4, 0, 0}; {, −4, 3, 6, −2, 1, −4, 6, −2, −5, −2, 0, 0}; {, −4, 3, 6, −1, −5, 6, −2, 4, 1, 0, 0, 0}; {, −6, 1, 4, −3, −7, 5, −4, 3, 0, 0, 0, 0}; {, −4, 5, −6, 5, 5, −5, 2, −1, −5, −5, 0, 0}; {, −1, 5, 7, −1, −4, 7, −2, 4, 0, 1, 0, 0}; {1, −5, 1, −3, −1, 5, −3, −5, 8, −7, 0, 0}; {, −1, −6, 1, −2, 2, −4, 2, 5, 7, 6, 0, 0}; {1, −4, 3, 0, 6, −2, 3, 7, 6, 6, 0, 0}; {, −3, 3, 5, −2, −6, 6, −3, 3, 0, 2, 0, 0}; {, −3, 4, 8, 2, −5, −6, 0, 0, 4, 0, 0, 0}; {, −3, 5, −6, 5, 1, −1, 7, −3, −2, −1, 0, 0}; {6, −3, 1, −5, 6, 3, −6, 1, −1, −1, 0, 0}; {0, −7, −1,

−5, −7, 7, 0, 8, −6, −3, 0, 0}; {, −2, 5, −7, 4, −3, −6, 0, 1, 4, 2, 0, 0}; {, −6, 2, 7, 3, −1, −3, 5, −4, −3, −1, 0, 0}; {, −4, 8, 1, 2, −7, −7, −1, 6, −1, 1, 0, 0}; {0, −4, 5, 6, −2, 8, −2, 1, 3, −2, 0, 0}; {, −1, 1, 0, 8, −4, −5, 3, −4, −2, 6, 0, 0}; {3, 7, 8, 2, −7, 5, −2, 7, −7, 3, 0, 0}; {5, 3, −2, 2, −5, −3, 4, −3, −7, −3, 0, 0}; {, −1, −4, 6, −7, 1, 2, −7, 1, −4, −1, 0, 0}; {, −2, −3, −7, −1, −1, −5, 1, 8, 5, −6, 0, 0}; {1, 1, −2, 5, 8, 4, −5, 2, 1, 8, 0, 0}; {, −7, 8, 4, −6, 4, 7, −1, 8, 7, −5, 0, 0}; {1, −1, −6, −1, 8, −5, 2, −6, −7, −3, 0, 0}; {1, −1, −6, −1, 8, −5, 2, −5, −7, −2, 0, 0}; {, −3, 8, 0, 4, 0, 6, 8, −1, 2, 4, 0, 0}; {, −1, −5, 4, −6, 7, −2, 2, −6, −1, 2, 0, 0}; {, −3, 8, 0, 5, 1, 8, 8, −1, 2, 5, 0, 0}; {, −7, 4, −4, 1, −3, 4, 6, −3, 1, 3, 0, 0}; {2, −4, 3, 7, 2, −6, −6, 0, 3, 4, 0, 0}; {8, 3, −5, 0, −3, 3, 5, −4, 1, 3, 0, 0}; {, −3, −7, 2, 8, 6, −3, 1, −7, −2, 1, 0, 0}; {, −1, −7, 0, 4, 0, 7, 8, −1, 3, 3, 0, 0}; {1, −3, 6, −3, 1, −5, −4, 8, −6, −5, 0, 0}; {6, 1, −7, −1, −4, 5, 5, −2, −1, 2, 0, 0}; {, −1, −7, 0, 5, 1, −6, −7, −1, 1, 4, 0, 0}; {7, 4, −2, 6, −6, 5, 8, 5, 7, −6, 0, 0}; {5, 2, −4, 4, 8, 3, 7, 5, 6, −6, 0, 0}; {0, −4, 5, −3, 0, −6, −4, 8, −7, −4, 0, 0}; {0, −4, 5, −3, 0, −6, −4, 8, −7, −5, 0, 0}; {, −1, −5, 4, −4, 0, −6, −4, 7, −7, −5, 0, 0}; {, −1, −5, 4, −4, 0, −6, −4, 7, −7, −4, 0, 0}; {, −7, 4, −4, 3, 6, −1, 0, −5, −5, −3, 0, 0}; {5, 0, 8, −1, 2, −5, −2, −6, −7, −3, 0, 0}; {, −4, 8, 1, −7, −2, 8, −7, 5, 8, −5, 0, 0}; {, −3, −7, 2, −6, 2, 1, 3, −7, −2, 2, 0, 0}; {7, 2, −6, 1, 8, 8, 4, 4, −4, −2, 0, 0}; {1, −5, 2, 8, −2, −2, 8, 7, −1, −1, 0, 0}; {, −5, 7, 0, 8, 0, 2, −1, 0, −7, −5, 0, 0}; {7, 2, −6, 1, −7, −6, 3, 3, −3, −2, 0, 0}; {6, 1, −7, 0, 8, −7, 4, 4, −4, −3, 0, 0}; {5, 0, 8, −1, 7, 8, 3, 3, −4, −3, 0, 0}; {, −6, 6, −1, 7, 0, 2, −1, 0, −7, −5, 0, 0}; {4, −1, 7, −2, 6, 7, 5, 4, 8, −7, 0, 0}; {5, 0, 8, −1, 7, −7, 3, 3, −4, −3, 0, 0}; {, −4, 8, 1, −7, 3, 4, −2, −1, −6, −3, 0, 0}; {3, −2, 6, −3, 6, 6, 2, 3, −5, −3, 0, 0}; {, −7, 5, −2, 6, 0, 2, −2, 0, 8, −5, 0, 0}; {3, −2, 6, −3, 7, −6, 1, 2, −4, −4, 0, 0}; {4, −1, 7, −2, 8, 8, 2, 3, −5, −3, 0, 0}; {3, −2, 6, −3, 7, −7, 1, 2, −4, −4, 0, 0}; {2, −3, 5, −4, 6, 8, 1, 2, −5, −4, 0, 0}; {3, −2, 6, −3, −7, 7, 0, 1, −6, −2, 0, 0}; {3, −2, 6, −3, −6, 4, 4, −4, −2, 1, 0, 0}; {2, −3, 5, −4, −7, 3, 3, −4, −2, 1, 0, 0}; {0, −5, 3, −6, 8, 2, 3, −5, −3, 1, 0, 0}; {, −1, −5, 4, −3, −1, −6, −5, 6, −7, −4, 0, 0}; {3, −3, 4, −5, −5, 4, 4, −2, −3, 0, 0, 0}; {3, −3, 4, −5, −4, 5, 3, −3, −2, −3, 0, 0}; {8, 3, −5, 3, 5, −1, −1, −6, −5, −4, 0, 0}; {8, 3, −5, 3, 5, −1, −1, −6, −5, −3, 0, 0}; {, −3, −7, 2, −5, −2, −7, −6, 6, 8, −5, 0, 0}; {, −3, 6, −4, 2, 2, −6, −7, 2, −1, 1, 0, 0}; {7, 2, −6, 2, 4, −2, −1, −6, −6, −3, 0, 0}; {, −4, 8, 1, −6, −3, 8, −6, 6, 8, −5, 0, 0}; {, −4, 8, 1, −6, −3, 8, −6, 6, 8, −4, 0, 0}; {1, −5, 2, −7, −6, 3, 3, −2, −4, −1, 0, 0}; {6, 1, −7, 1, 3, −3, −1, −6, −6, −4, 0, 0}; {, −1, −5, 4, −3, 0, −6, −3, 7, −7, −5, 0, 0}; {, −1, −5, 4, −3, 0, −6, −3, 7, −7, −4, 0, 0}; {, −3, −7, 2, −5, −1, −6, −7, 4, −7, −3, 0, 0}; {, −5, 7, 0, −7, −3, 8, 8, 4, 8, −4, 0, 0}; {, −5, 7, 0, −7, −3, 8, −7, 5, 8, −4, 0, 0}; {4, −1, 7, −1, 5, 7, 3, 3, −5, −3, 0, 0}; {5, 0, 8, 0, 8, 8, 3, 4, −5, −2, 0, 0}; {, −2, 8, −1, 6, −3, −3, 7, 7, −2, −2, 0, 0}; {, −1, −6, 2, −6, 2, 4, 2, 2, 6, 7, 0, 0}; {, −2, −7, 1, −7, 1, 3, 2, 2, 6, 7, 0, 0}; {0, −5, 3, −5, 3, 5, 1, 1, −5, −4, 0, 0}; {6, 1, −7, 1, −7, −4, 3, 4, −2, −2, 0, 0}; {, −6, 4, −5, 2, −6, −7, 6, 6, 8, −7, 0, 0}; {3, −3, 4, −5, 3, 2, 8, −7, 0, 1, 0, 0}; {5, 0, 8, 0, −7, −7, 2, 3, −4, −2, 0, 0}; {, −2, 8, −1, 6, −2, −3, 6, 6, −2, −1, 0, 0}; {, −3, 7, −2, 5, −3, −4, 6, 6, −3, −2, 0, 0}; {, −4, 6, −3, 4, −4, −5, 6, 6, −3, −2, 0, 0}; {8, 2, −7, 0, 8, 8, 6, 5, 8, −7, 0, 0}; {, −2, 8, −1, 6, −2, −2, 7, 7, −2, −2, 0, 0}; {3, −2, 6, −2, 7, 8, 2, 3, −5, −3, 0, 0}; {2, −3, 5, −3, 6, 7, 1, 2, −5, −3, 0, 0}; {2, −3, 5, −3, 6, 7, 2, 3, −6, −4, 0, 0}; {1, −4, 4, −4, 5, 7, 1, 2, −5, −4, 0, 0}; {0, −5, 3, −5, 4, 6, 1, 2, −6, −5, 0, 0}; {8, 2, −7, 0, −7, −6, 6, 5, −6, −6, 0, 0}; {0, −5, 3, −5, 5, 7, 0, 1, −5, −4, 0, 0}; {0, −5, 3, −5, 5, 7, 1, 2, −5, −4, 0, 0}; {3, −2, 6, −2, 8, 8, 1, 2, −5, −2, 0, 0}; {5, 0, 8, 0, −6, −5, 2, 4, −4, −1, 0, 0}; {, −5, 5, −4, 3, −4, −4, 5, 5, −3, −2, 0, 0}; {, −2, 6, −5, 0, 8, 3, −2, −5, −5, −4, 0, 0}; {, −3, 7, −2, 5, −1, −3, 5, 5, −3, −1, 0, 0};

{1, −4, 4, −4, 7, 7, 0, 2, −6, −3, 0, 0}; {, −6, 4, −5, 2, −3, 8, 7, −2, 0, 3, 0, 0}; {, −5, 2, 6, −6, 4, −3, 0, −2, 5, 1, 0, 0}; {5, −1, 6, −3, −4, 5, 4, −3, −2, 1, 0, 0}; {8, 0, 5, −5, 8, 4, 7, 4, −3, −4, 0, 0}; {4, −2, 5, −3, −4, 5, 5, −3, −2, 0, 0, 0}; {2, −4, 3, −5, −6, 3, 3, −4, −3, 0, 0, 0}; {8, 3, −5, 4, 4, −2, 0, −7, −5, −2, 0, 0}; {, −4, 8, 1, −5, −3, 8, −6, 5, 8, −4, 0, 0}; {6, 1, −7, 2, 3, −3, −1, −7, −6, −2, 0, 0}; {6, 1, −7, 2, 3, −2, −3, 8, −5, −2, 0, 0}; {, −1, −5, 4, −2, 0, −6, −2, 7, −7, −5, 0, 0}; {, −1, −5, 4, −2, 0, −6, −2, 7, −7, −4, 0, 0}; {6, −7, 2, 4, −2, −1, 8, −5, −3, 0, 0}; {1, −5, 2, −6, −5, 4, 4, −3, −3, −2, 0, 0}; {5, 0, 8, 1, 3, −3, −2, 8, −6, −3, 0, 0}; {, −5, 4, −6, 1, 1, −7, 8, 1, −1, 0, 0, 0}; {4, −1, 7, 0, 2, −4, −2, 8, −7, −3, 0, 0}; {6, 1, −7, 2, 4, −1, −3, 7, −5, −2, 0, 0}; {, −6, 6, −1, −7, −4, 8, 8, 4, 8, −4, 0, 0}; {4, −1, 7, 0, 3, −3, −4, 7, −7, −3, 0, 0}; {, −1, −7, 0, 8, −6, 3, 2, −5, −3, −2, 0, 0}; {4, −1, 7, 0, 3, −3, −2, 8, −6, −4, 0, 0}; {4, −1, 7, 0, 3, −3, −2, 8, −6, −3, 0, 0}; {3, −2, 6, −1, 2, −4, −3, 7, −7, −3, 0, 0}; {, −2, 8, −1, 7, −7, 2, 2, −4, −4, −2, 0, 0}; {4, −1, 7, 0, 3, −2, −4, 7, −5, −2, 0, 0}; {2, −3, 5, −2, 1, −4, −5, 6, −6, −3, 0, 0}; {1, −4, 4, −3, 1, −5, −5, 6, −7, −4, 0, 0}; {, −5, 5, −4, 4, −6, −6, 5, 5, −3, −3, 0, 0}; {, −3, 7, −2, 6, −3, −4, 6, 6, −2, −1, 0, 0}; {, −7, 3, −6, 2, −7, −7, 6, 5, −7, −7, 0, 0}; {, −7, 3, −6, 2, −7, −7, 6, 5, −6, −6, 0, 0}; {8, 2, −7, 1, 8, 8, 6, 5, 8, −7, 0, 0}; {, −7, 3, −6, 2, −7, −7, 7, 6, 8, −7, 0, 0}; {, −6, 4, −5, 3, −6, −6, 5, 5, −3, −2, 0, 0}; {8, 2, −7, 1, 8, −7, 6, 5, −7, −7, 0, 0}; {, −4, 7, −1, 8, 0, 2, 1, 1, 6, 7, 0, 0}; {1, −4, 4, −3, 5, 7, 1, 2, −5, −3, 0, 0}; {, −1, −7, 0, 8, 0, 1, 7, 8, 0, 0, 0, 0}; {, −3, 7, −2, 6, −2, −3, 6, 6, −2, −1, 0, 0}; {7, 0, 6, −3, 4, 2, −6, −7, 1, 0, 0, 0}; {, −5, 5, −4, 4, −4, −5, 5, 5, −3, −2, 0, 0}; {, −7, 3, −6, 2, −6, −6, 6, 6, −7, −7, 0, 0}; {7, 1, 8, 0, 8, 8, 4, 4, −4, −3, 0, 0}; {7, 1, 8, 0, 8, 8, 5, 5, 8, −7, 0, 0}; {, −5, 5, −4, 4, −4, −4, 5, 5, −2, −2, 0, 0}; {, −5, 5, −4, 4, −4, −4, 5, 5, −2, −1, 0, 0}; {0, −5, 3, −4, 5, 6, 0, 1, −5, −3, 0, 0}; {, −7, 3, −6, 2, −5, −5, 5, 6, −4, −2, 0, 0}; {7, 1, 8, 0, −7, −7, 4, 5, −5, −3, 0, 0}; {7, 1, 8, 0, −7, −7, 5, 5, −7, −7, 0, 0}; {6, 0, 7, −1, 8, 8, 4, 4, −4, −3, 0, 0}; {7, 0, 6, −3, 5, 4, −6, −7, 2, 0, 0, 0}; {, −6, 4, −5, 3, −4, −4, 5, 5, −3, −2, 0, 0}; {, −2, −7, 1, −6, 4, 5, −1, 0, −5, −3, 0, 0}; {5, −1, 6, −2, 7, 8, 5, 4, −7, −7, 0, 0}; {, −2, −7, 1, −6, 4, 2, 2, −6, −2, 2, 0, 0}; {, −6, 4, −5, 3, −4, −5, 4, 4, −3, −2, 0, 0}; {, −6, 4, −5, 3, −4, −5, 5, 5, −3, −2, 0, 0}; {, −1, −6, 2, −5, 5, 5, 0, 1, −6, −3, 0, 0}; {7, 1, 8, 0, −6, −6, 4, 4, −4, −3, 0, 0}; {7, 1, 8, 0, −6, −5, 3, 3, −3, −3, 0, 0}; {5, −2, 4, −5, 5, 2, 8, 8, 0, 0, 0, 0}; {7, 1, 8, 0, −5, −6, 3, 3, −4, −2, 0, 0}; {6, 0, 7, −1, −6, 5, 5, −4, −1, 2, 0, 0}; {, −4, 4, −7, −1, −5, 4, −7, −7, 0, −1, 0, 0}; {, −5, 3, 8, −2, −6, 4, −7, 8, 0, −1, 0, 0}; {, −7, 1, 6, −4, 8, 4, 7, 4, −3, −4, 0, 0}; {1, −5, 2, −5, −7, 3, 3, −4, −3, −1, 0, 0}; {, −6, 1, 5, −5, 6, −3, −5, 2, 3, 2, 0, 0}; {4, −5, −1, 5, 0, −7, −4, −5, 2, 0, 0, 0}; {, −6, 3, −7, 1, −1, 8, 7, −1, −1, 1, 0, 0}; {4, −4, 1, 8, 5, −3, −5, 2, 1, 2, 0, 0}; {, −3, −7, 2, −3, −1, −7, −2, 6, 8, −4, 0, 0}; {5, 0, 8, 2, 3, −3, 0, −7, −6, −4, 0, 0}; {5, 0, 8, 2, 3, −3, 0, −7, −6, −3, 0, 0}; {4, −1, 7, 1, 2, −3, −3, 7, −6, −3, 0, 0}; {3, −5, 0, 7, 5, −3, −6, 2, 1, 1, 0, 0}; {3, −5, 0, 7, 5, −3, −6, 2, 1, 2, 0, 0}; {0, 7, −5, 1, −2, 8, −5, 8, 0, −1, 0, 0}; {4, −1, 7, 1, 3, −3, −1, 8, −6, −4, 0, 0}; {4, −1, 7, 1, 3, −3, −1, 8, −6, −3, 0, 0}; {, −7, 5, −2, −7, −4, 7, −5, 4, 7, −4, 0, 0}; {2, −3, 5, −1, 1, −5, −2, 8, −7, −4, 0, 0}; {2, −3, 5, −1, 1, −5, −2, 8, −7, −3, 0, 0}; {1, −4, 4, −2, 0, −6, −3, 8, −7, −4, 0, 0}; {1, 8, −4, 2, 0, 7, 2, 8, 5, 2, 0, 0}; {4, −4, 1, 8, 7, −1, −5, 3, 1, 0, 0, 0}; {, −3, 7, −2, 7, 8, 2, 0, −6, −4, −3, 0, 0}; {, −4, 6, −3, 6, 7, 1, 0, −7, −4, −2, 0, 0}; {8, 1, 7, −1, −1, 8, 6, −2, −1, 0, 0, 0}; {3, −5, 0, 7, 6, −2, −5, 3, 1, 1, 0, 0}; {8, 1, 7, −1, −1, 8, 6, −1, −2, −1, 0, 0}; {2, −6, −1, 6, 5, −3, −5, 3, 0, 1, 0, 0}; {1, −4, 4, −2, 0, −5, −3, 7, −7, −4, 0, 0}; {, −5, 5, −4, 5, 7, 1, −1, −7, −5, −3, 0, 0}; {, −5, 5, −4, 5, 7, 1, −1, −7, −5, −2, 0, 0}; {, −4, 6, −3, 6, 8, 2, 0, −6, −5, −3, 0, 0}; {1, −4, 4, −2, 1, −4, −4, 5, −7, −3, 0, 0}; {, −4, 6,

−3, 6, 8, 2, 1, −5, −4, −3, 0, 0}; {6, −1, 5, −3, −2, 7, 5, −2, −2, −1, 0, 0}; {6, −1, 5, −3, −2, 7, 5, −2, −2, 0, 0, 0}; {6, −1, 5, −3, −2, 7, 5, −2, −3, −1, 0, 0}; {0, −5, 3, −3, 0, −5, −4, 6, 8, −4, 0, 0}; {5, −2, 4, −4, −3, 6, 5, −2, −3, −1, 0, 0}; {5, −2, 4, −4, −3, 6, 5, −2, −3, 0, 0, 0}; {6, −1, 5, −3, −2, 7, 6, −1, −3, −1, 0, 0}; {5, −2, 4, −4, −2, 7, 4, −2, −3, −2, 0, 0}; {, −6, 4, −5, 4, 7, 1, 0, −6, −5, −3, 0, 0}; {4, −3, 3, −5, −3, 6, 4, −3, −3, −2, 0, 0}; {, −6, 4, −5, 4, 7, 1, 0, −6, −5, −2, 0, 0}; {4, −3, 3, −5, −3, 6, 4, −3, −3, −1, 0, 0}; {, −7, 3, −6, 3, 6, 0, −1, −7, −5, −3, 0, 0}; {, −1, −6, 2, −4, 0, −5, −5, 6, −7, −3, 0, 0}; {, −7, 3, −6, 3, 6, 0, −1, −7, −5, −2, 0, 0}; {, −3, 8, 0, −6, 1, 3, −1, 0, −7, −5, 0, 0}; {5, −1, 6, −1, 6, 7, 3, 3, −5, −4, 0, 0}; {5, −1, 6, −1, 6, 7, 4, 4, −7, −7, 0, 0}; {6, 0, 7, 0, 7, 7, 3, 4, −5, −3, 0, 0}; {7, 1, 8, 1, −7, −7, 4, 4, −4, −3, 0, 0}; {8, 2, −7, 2, −6, −5, 4, 4, −2, −2, 0, 0}; {6, 0, 7, 0, 8, −7, 3, 3, −3, −3, 0, 0}; {, −2, 7, −3, 5, −3, −4, 7, 7, −3, −2, 0, 0}; {2, −4, 3, −4, 5, 5, 2, 3, −6, −4, 0, 0}; {, −2, 7, −3, 5, −2, −4, 7, 7, −3, −2, 0, 0}; {5, −3, 2, −7, 2, −2, −5, −7, −6, −5, 0, 0}; {4, −2, 5, −2, −7, 5, 4, −4, −1, 2, 0, 0}; {, −4, 5, −5, 3, −2, 8, 7, −3, −1, 2, 0, 0}; {, −7, 1, 6, −3, 8, 3, −7, 8, 0, 0, 0, 0}; {, −3, 6, −4, 4, 0, 3, 3, 1, 6, 7, 0, 0}; {8, 3, −5, 5, 3, −2, 0, 8, −5, −1, 0, 0}; {, −6, 3, −7, 2, −2, 8, 7, −3, −1, 2, 0, 0}; {4, −1, 7, 2, 1, −4, −2, 7, −6, −2, 0, 0}; {2, −6, −1, 7, 3, −4, −6, 1, 1, 2, 0, 0}; {2, −6, −1, 7, 4, −3, −6, 2, 1, 1, 0, 0}; {, −4, 6, −3, 7, 7, 1, 1, −6, −4, −3, 0, 0}; {, −5, 5, −4, 6, 6, 0, 2, −5, −5, −3, 0, 0}; {5, −2, 4, −3, −4, 6, 4, −4, −2, −1, 0, 0}; {5, −2, 4, −3, −4, 6, 4, −4, −2, 0, 0, 0}; {8, 1, 7, 0, −1, −5, 0, −2, −7, −5, 0, 0}; {, −1, −6, 2, −3, −1, −6, −3, 6, 8, −4, 0, 0}; {, −7, 3, −6, 4, 5, −1, 1, −6, −6, −2, 0, 0}; {, −6, 4, −5, 5, 6, 1, −1, 8, −5, −3, 0, 0}; {, −6, 4, −5, 5, 6, 1, −1, 8, −5, −2, 0, 0}; {, −4, 3, 7, −2, −4, 4, −1, 6, 3, 2, 0, 0}; {4, −3, 3, −4, −4, 6, 4, −4, −3, 0, 0, 0}; {, −7, 3, −6, 4, 5, 0, −1, 8, −5, −3, 0, 0}; {, −2, −7, 1, −4, −1, −6, −5, 5, 8, −4, 0, 0}; {4, −3, 3, −4, −3, 6, 5, −2, −3, −1, 0, 0}; {8, 2, −7, 3, 5, −1, 0, −7, −6, −2, 0, 0}; {, −6, 1, 5, −4, −5, 3, −2, 5, 2, 1, 0, 0}; {, −1, 7, −4, 4, 4, −3, −7, 1, 0, −1, 0, 0}; {2, −5, 1, −6, −5, 5, 2, −5, −3, −2, 0, 0}; {8, 2, −7, 3, 5, 0, −1, 8, −6, −2, 0, 0}; {2, −5, 1, −6, −5, 5, 3, −5, −3, −1, 0, 0}; {2, −5, 1, −6, −5, 5, 3, −4, −3, −1, 0, 0}; {8, 2, −7, 3, 6, 0, −1, 8, −5, −2, 0, 0}; {2, −5, 1, −6, −4, 5, 4, −3, −3, −1, 0, 0}; {6, 0, 7, 1, 4, −2, −2, 8, −6, −3, 0, 0}; {, −3, 5, −6, 2, 3, −4, 8, 1, −1, −1, 0, 0}; {, −5, −6, 6, 5, −3, 4, −4, 5, −4, −4, 0, 0}; {1, −5, 2, −4, 4, 5, 1, 2, −6, −4, 0, 0}; {, −7, 2, 8, 1, −7, 8, 6, 6, 8, −7, 0, 0}; {3, −3, 4, −2, 8, 7, 0, 1, −5, −2, 0, 0}; {3, −5, 0, 8, 1, −2, 4, 4, 6, 5, 0, 0}; {3, −3, 4, −2, −6, −4, 2, −7, −4, 0, 0, 0}; {1, −4, 4, 0, 0, −5, −2, 7, −7, −4, 0, 0}; {4, −3, 3, −3, −5, 5, 4, −4, −2, −1, 0, 0}; {1, −7, −2, 7, 4, −1, 3, 1, −4, −4, 0, 0}; {, −2, −7, 1, −3, −2, −7, −3, 6, 8, −4, 0, 0}; {, −2, 6, −5, 4, 3, −2, 3, 0, −5, −4, 0, 0}; {, −1, 8, −2, 8, −7, 3, 1, −6, −3, −2, 0, 0}; {, −7, 8, 4, 4, −4, 2, −6, 4, −4, −4, 0, 0}; {4, −2, 5, 0, 5, 5, 8, −5, 4, 5, 0, 0}; {1, −5, 2, −3, 6, 6, 1, 2, −5, −2, 0, 0}; {, −1, −7, 0, −5, 4, 4, 0, 1, −6, −3, 0, 0}; {, −1, −7, 0, −5, 4, 5, 0, 1, −5, −3, 0, 0}; {, −1, 8, −2, 8, 2, 3, −7, −3, 0, 1, 0, 0}; {, −5, 4, −6, 5, 0, 0, 7, −5, −1, −1, 0, 0}; {3, −5, 0, −6, 4, 5, −5, −2, 1, 0, 0, 0}; {, −2, 5, −6, 3, −5, −6, 0, 0, 4, 2, 0, 0}; {6, −2, 4, −2, 8, 6, −3, −1, 2, 2, 0, 0}; {, −6, 3, −6, 5, 0, 0, 7, −5, −1, 0, 0, 0}; {4, −4, 2, −4, 6, 5, −5, −2, 1, 2, 0, 0}; {2, −6, 0, −6, 4, 4, −6, −2, 0, 1, 0, 0}; {1, 8, −3, 6, 0, −4, 2, 3, 5, 4, 0, 0}; {, −6, 1, 6, −1, −7, 8, −2, 1, 3, 2, 0, 0}; {3, 8, −5, 2, −5, 1, −2, 5, 4, 2, 0, 0}; {, −1, 7, −3, 7, 7, −5, 3, 0, −4, −5, 0, 0}; {4, −3, 4, −1, 1, 6, −2, −3, −6, −6, 0, 0}; {7, 0, 7, 2, 7, 7, −7, −4, 4, 5, 0, 0}; {, −7, 1, 7, 1, 6, 7, −3, −3, 4, 3, 0, 0}; {, −7, 1, 7, 1, 8, 8, −3, −3, 4, 3, 0, 0}; {7, −1, 5, −1, 6, 7, −3, −3, 3, 2, 0, 0}; {, −3, 5, −5, 6, −3, −7, 8, −5, −7, 7, 0, 0}; {, −1, 6, −5, 5, −2, −5, 1, 2, 4, 3, 0, 0}; {, −2, 5, −6, 4, −3, −6, 0, 1, 4, 3, 0, 0}; {3, −7, −3, 6, −2, −3, 3, 2, 5, 1, 0, 0}; {3, −7, −3, 6, −2, −3, 3, 2, 5, 2, 0, 0}; {, −7, 0, 5, −1, −7, 7, −3, 1, 2, 2, 0, 0}; {, −2, 6, −4, 7, 2, 1, 8, −3, −1, 0, 0, 0}; {2, 8, −4, 5, −2, −4, 1, 3, 4, 3, 0, 0}; {3, −6, −1, −7, 6, −1, 3, 1, −2, −4, 0, 0}; {0, −7, 0, −4, −2, 4, −4, −5, 8, −7, 0, 0}; {5, −5, −1, −7, 1, −3, 3, 3, 5, 4, 0, 0}; {6, −3, 2, −3, 7, 5, −4, −1, 2, 0, 0, 0}; {, −5, 3, −7, 5, 0, −1, 7, −5, −1, −2, 0, 0}; {, −3, −7, 3, 4, −3, 7, −3, −1, 3, −2, 0, 0}; {6, 1, −6, −6, 3, −5, 1, 4, 5, −1, 0, 0}; {4, −1, 8, −7, 1, −5, 0, 1, 5, −1, 0, 0}; {, −7, −4, −3, 6, −3, 8, 1, −7, −6, 5, 0, 0}; {7, −6, −5, 4, −5, 7, 0, 8, −6, 4, 0, 0}; {0, −2, −6, −1, 8, −6, 2, −5, 8, −4, 0, 0}; {3, −2, 7, −7, 0, −6, −1, 2, 3, −2, 0, 0}; {, −5, −4, −5, 3, 7, 1, −7, 0, −1, 8, 0, 0}; {0, 2, 2, −5, 1, −5, 4, −4, −4, 6, 0, 0}; {6, 5, 2, −7, 2, 6, −2, 6, 6, −6, 0, 0}; {5, 2, −3, 2, −5, −3, 4, −4, −6, −4, 0, 0}; {5, 2, −3, 2, −5, −3, 4, −4, −6, −3, 0, 0}; {, −5, 3, −7, −7, 2, 4, −5, 8, −2, 0, 0, 0}; {, −7, 8, 5, −4, 4, 8, −1, 8, 6, −4, 0, 0}; {1, −2, −7, −1, 8, −5, 2, −6, −6, −4, 0, 0}; {2, −1, −6, 2, 7, 2, 5, 3, 6, −6, 0, 0}; {, −4, 8, 2, −7, −3, 7, −6, 7, 8, −5, 0, 0}; {, −4, 8, 2, −7, −3, 7, −6, 7, 8, −4, 0, 0}; {0, −3, 8, 0, 5, 0, 4, 3, 5, −7, 0, 0}; {2, −4, 4, −7, 1, 3, 8, 7, 1, −1, 0, 0}; {0, −3, 8, 1, 5, 1, 4, 3, 5, −6, 0, 0}; {, −6, 6, 0, 8, −5, 6, −7, 6, 7, −4, 0, 0}; {, −5, 7, 1, −7, −3, 7, −7, 6, 8, −6, 0, 0}; {5, 0, −7, 0, 3, −3, −3, −6, −5, −5, 0, 0}; {, −6, 6, 0, 8, −4, 7, −7, 6, 8, −6, 0, 0}; {4, −1, 8, −1, 2, −4, −3, −6, −6, −5, 0, 0}; {, −3, 7, −1, 5, 7, 0, 1, −3, −5, −1, 0, 0}; {, −1, −6, 3, −6, −3, 7, −5, −7, 8, −6, 0, 0}; {3, −3, 5, −5, −2, 6, 4, −3, −1, −1, 0, 0}; {3, −2, 7, −2, 2, −4, −4, −7, −6, −5, 0, 0}; {, −2, −6, 4, −4, 3, 2, 3, −6, −2, 2, 0, 0}; {7, 2, −5, 2, 8, 7, 7, −2, 0, 4, 0, 0}; {7, 2, −5, 2, −7, 6, 7, −3, 1, 4, 0, 0}; {, −5, 7, 1, −7, 1, 1, 2, −7, −3, 2, 0, 0}; {, −4, 6, −2, 4, −6, −5, 6, 5, −2, −2, 0, 0}; {5, 0, −7, 0, 8, 5, 5, −4, −1, 2, 0, 0}; {2, −3, 6, −3, 5, 7, 1, 1, −4, −3, 0, 0}; {0, −5, 4, −5, 4, 5, 1, 2, −6, −4, 0, 0}; {, −7, 3, −5, 1, −5, −4, 4, 4, −3, −3, 0, 0}; {, −7, 3, −5, 1, −4, −5, 3, 4, −4, −2, 0, 0}; {, −3, 8, 1, 8, 4, 5, −2, 0, −7, −4, 0, 0}; {4, −1, 8, −1, −5, −2, 0, −2, 4, 6, 0, 0}; {, −5, 5, −3, 3, −2, 7, 7, −1, 2, 4, 0, 0}; {, −6, 4, −4, 2, −2, −5, 3, 4, −4, −1, 0, 0}; {7, 2, −5, 3, 3, −3, −2, −7, −5, −1, 0, 0}; {, −1, −7, 1, 8, 8, 1, 2, −3, −3, −3, 0, 0}; {1, −5, 3, −6, −5, 4, 3, −3, −2, −3, 0, 0}; {5, 0, −7, 1, 3, −3, −2, −7, −5, −4, 0, 0}; {4, −1, 8, 0, 2, −4, −2, −7, −6, −4, 0, 0}; {4, −1, 8, 0, 2, −4, −2, −7, −6, −3, 0, 0}; {3, −2, 7, −1, 1, −5, −3, −7, −7, −4, 0, 0}; {3, −2, 7, −1, 1, −5, −3, −7, −7, −3, 0, 0}; {3, −2, 7, −1, 1, −5, −3, −7, −6, −5, 0, 0}; {3, −2, 7, −1, 1, −5, −3, −7, −6, −4, 0, 0}; {3, −2, 7, −1, 1, −5, −3, −6, −7, −4, 0, 0}; {3, −2, 7, −1, 2, −4, −3, −7, −6, −4, 0, 0}; {, −3, 7, −1, 6, 8, 1, 1, −4, −4, −1, 0, 0}; {2, −3, 6, −2, 1, −5, −3, 8, −7, −3, 0, 0}; {1, −4, 5, −3, 0, −6, −4, 8, −7, −5, 0, 0}; {1, −4, 5, −3, 0, −6, −4, 8, −7, −4, 0, 0}; {, −4, 6, −2, 5, 7, 0, 1, −4, −5, −2, 0, 0}; {6, −1, 6, −4, −3, 5, 5, 0, −3, 0, 0, 0}; {8, 2, −6, 1, 3, −4, −1, −4, −6, −4, 0, 0}; {7, 2, −5, 3, −7, 7, 7, −3, 1, 4, 0, 0}; {4, −1, 8, 0, 7, 5, 5, −4, −1, 3, 0, 0}; {, −2, 8, 0, 7, −3, −4, 7, 7, −2, −1, 0, 0}; {3, −2, 7, −1, 6, 6, 2, 3, −5, −2, 0, 0}; {3, −2, 7, −1, 6, 6, 3, 3, −5, −3, 0, 0}; {, −4, 6, −2, 5, −5, −5, 6, 5, −2, −2, 0, 0}; {2, −3, 6, −2, 5, 6, 2, 3, −5, −3, 0, 0}; {0, −5, 4, −4, 3, 4, 1, 1, −6, −4, 0, 0}; {1, −4, 5, −3, 4, 6, 2, 3, −5, −3, 0, 0}; {, −4, 6, −2, 5, −4, −5, 5, 5, −2, −1, 0, 0}; {1, −4, 5, −3, 5, 5, 1, 1, −5, −3, 0, 0}; {5, −2, 5, −5, 1, 0, −6, −7, 0, −1, 0, 0}; {, −6, 4, −4, 3, −6, −5, 6, 6, −3, −3, 0, 0}; {, −1, −6, 3, −5, 3, 5, 1, 2, −6, −4, 0, 0}; {8, 2, −6, 1, −7, −6, 5, 5, −4, −3, 0, 0}; {7, 1, −7, 0, 8, −7, 4, 4, −4, −3, 0, 0}; {, −7, 3, −5, 2, −6, −5, 4, 3, −2, −2, 0, 0}; {, −6, 4, −4, 3, −5, −5, 5, 5, −3, −2, 0, 0}; {8, 2, −6, 1, −6, −6, 4, 4, −4, −3, 0, 0}; {8, 2, −6, 1, −6, −6, 5, 5, −4, −3, 0, 0}; {8, 1, 8, −2, 6, 5, −6, −6, 2, 1, 0, 0}; {, −7, 3, −5, 2, −5, −5, 4, 4, −3, −2, 0, 0}; {6, 0, 8, −1, 8, −7, 3, 3, −4, −3, 0, 0}; {, −5, 5, −3, 4, −3, −1, 5, 6, −1, −1, 0, 0}; {0, −5, 4, −4, 6, −7, 0, 2, −4, −2, 0, 0}; {5, −2, 5, −5, 4, 2, −7, −7, 0, 0, 0, 0}; {, −7, 3, −5, 2, −4, −4, 4, 5, −3, −2, 0, 0}; {, −2, −7, 2, −6, 5, 6, −1, 1, −6, −3, 0, 0}; {8, 2,

−6, 1, −5, −5, 3, 4, −3, −2, 0, 0}; {7, 0, 7, −3, 6, 7, 7, 3, −2, −4, 0, 0}; {, −3, 7, −1, 6, 0, 3, 4, 1, 6, 7, 0, 0}; {2, −5, 2, 8, 2, 0, 7, 7, −1, −1, 0, 0}; {6, 2, −4, 5, 2, 6, −3, 5, −6, −1, 0, 0}; {0, −7, 0, 6, 1, −2, 6, 6, −2, −1, 0, 0}; {4, −2, 6, −3, −6, 4, 4, −4, −2, 1, 0, 0}; {0, −6, 2, −6, 8, 2, 2, −5, −3, 0, 0, 0}; {0, −6, 2, −6, 8, 2, 2, −4, −3, 0, 0, 0}; {, −7, 4, −3, 6, 6, −1, 3, −6, −4, −1, 0, 0}; {2, −3, 6, −1, 0, −5, −4, 7, −6, −3, 0, 0}; {2, −3, 6, −1, 1, −5, −3, −7, −6, −5, 0, 0}; {6, −1, 6, −3, −3, 6, 5, 0, −3, −1, 0, 0}; {, −4, 6, −2, 6, 8, 1, 1, −5, −4, −2, 0, 0}; {0, −5, 4, −3, 0, −6, −4, 7, −7, −4, 0, 0}; {5, −2, 5, −4, −3, 5, 5, −1, −3, 0, 0, 0}; {, −7, 3, −5, 3, 5, −2, 0, −5, −6, −2, 0, 0}; {, −1, −6, 3, −4, −1, −6, −6, 6, −7, −3, 0, 0}; {0, 8, −2, 4, 4, −4, −7, 3, 0, 0, 0, 0}; {0, 8, −2, 4, 4, −4, −7, 3, 0, 1, 0, 0}; {, −1, −6, 3, −4, −1, −6, −5, 7, −7, −4, 0, 0}; {, −2, 6, −4, 2, 2, −6, 8, 2, −1, 1, 0, 0}; {, −7, 3, −5, 3, 5, −1, −1, −5, −5, −3, 0, 0}; {, −7, 3, −5, 3, 5, −1, −1, −5, −5, −2, 0, 0}; {, −2, −7, 2, −5, −1, −7, −7, 5, 8, −5, 0, 0}; {, −3, 8, 1, −6, −2, 8, −7, 5, 8, −5, 0, 0}; {6, 0, 8, 0, 4, −3, −4, 7, −6, −4, 0, 0}; {, −7, 3, −5, 3, 7, 0, 0, −6, −5, −3, 0, 0}; {7, 0, 7, −2, 2, −1, −1, 1, −7, 8, 0, 0}; {, −7, 3, −5, 3, −7, −6, 5, 5, −3, −2, 0, 0}; {, −4, 7, 0, −7, 0, 2, −1, 0, −7, −5, 0, 0}; {8, 2, −6, 2, −7, −6, 4, 4, −3, −2, 0, 0}; {2, −5, 2, −7, −1, −1, −7, 7, 0, −1, 0, 0}; {6, 0, 8, 0, 7, 8, 3, 3, −4, −3, 0, 0}; {8, 2, −6, 2, −7, −7, 4, 5, −4, −2, 0, 0}; {8, 2, −6, 2, −6, −6, 4, 4, −3, −2, 0, 0}; {7, 1, −7, 1, −7, −7, 3, 3, −3, −2, 0, 0}; {2, −5, 2, −7, 0, −1, −7, 8, −1, −2, 0, 0}; {5, −1, 7, −1, 7, 8, 3, 2, −3, −3, 0, 0}; {5, −1, 7, −1, 7, 8, 3, 3, −4, −3, 0, 0}; {, −3, 6, −3, 4, −4, −5, 8, 7, −7, −6, 0, 0}; {8, 2, −6, 2, −5, −5, 3, 4, −3, −1, 0, 0}; {5, −1, 7, −1, 8, −7, 2, 2, −3, −3, 0, 0}; {, −7, 3, −5, 3, −4, −3, 4, 5, −2, −1, 0, 0}; {2, −5, 2, −7, 2, 0, 8, 8, −1, 0, 0, 0}; {3, −3, 5, −3, 7, 7, 2, 3, −5, −3, 0, 0}; {3, −3, 5, −3, 7, 4, 4, −5, −1, 2, 0, 0}; {8, 0, 6, −4, 5, 0, −4, 8, −6, −4, 0, 0}; {4, −2, 6, −2, −7, 8, 1, 2, −5, −2, 0, 0}; {2, −4, 4, −4, 7, 6, 1, 2, −6, −3, 0, 0}; {2, −4, 4, −4, 7, 8, 2, 3, −5, −4, 0, 0}; {, −3, 8, 1, −6, 6, −6, −1, 7, −5, 0, 0, 0}; {1, −5, 3, −5, 7, 3, 3, −6, −3, 1, 0, 0}; {, −2, 7, −2, 5, 0, −3, 5, 5, −3, −1, 0, 0}; {0, −6, 2, −6, 6, 7, 0, 1, −5, −4, 0, 0}; {6, 0, 8, 0, −4, −1, 0, −1, 5, 6, 0, 0}; {2, −4, 4, −4, 8, 3, 3, −4, −1, 2, 0, 0}; {, −2, 7, −2, 5, 1, 3, 4, 1, 7, 7, 0, 0}; {2, −4, 4, −4, −7, 3, 3, −4, −2, 1, 0, 0}; {, −1, 6, −5, 1, −5, 4, −2, −5, −5, −5, 0, 0}; {8, 1, 8, 0, −4, 7, 6, −3, −1, 2, 0, 0}; {7, −1, 5, −4, 7, 8, 7, 4, −7, −7, 0, 0}; {, −4, 5, −4, 4, 0, 2, 3, 1, 6, 7, 0, 0}; {, −4, 5, −4, 4, 0, 3, 3, 0, 7, 7, 0, 0}; {, −6, 3, −6, 2, −1, 8, 8, −1, 0, 1, 0, 0}; {7, 0, 7, −1, −4, 6, 5, −2, −1, 1, 0, 0}; {, −5, 3, −7, 0, −4, 5, 5, −4, −1, 0, 0, 0}; {7, 0, 7, −1, −3, 6, 5, −2, −2, 0, 0, 0}; {5, −2, 5, −3, −5, 4, 4, −3, −2, −1, 0, 0}; {6, −1, 6, −2, −4, 6, 5, −4, −2, 1, 0, 0}; {, −5, 5, −3, 6, 5, 0, 0, −7, −4, −1, 0, 0}; {1, −7, −1, 6, 4, −4, −6, 2, 1, 1, 0, 0}; {, −5, 5, −3, 6, 6, 0, 0, −6, −4, −2, 0, 0}; {, −5, 2, 7, −3, −6, 1, −2, 6, 3, 2, 0, 0}; {, −1, 7, −3, 4, 2, −6, 8, 1, 0, 2, 0, 0}; {, −5, 5, −3, 6, 6, 0, 1, −5, −4, −3, 0, 0}; {, −6, 4, −4, 5, 5, −1, 0, −6, −5, −2, 0, 0}; {, −6, 4, −4, 5, 5, 0, 0, 8, −5, −1, 0, 0}; {, −6, 4, −4, 5, 6, −1, 1, −5, −5, −2, 0, 0}; {6, −1, 6, −2, −2, 7, 5, −2, −1, −2, 0, 0}; {0, 8, −2, 5, 4, −4, −7, 1, 1, 1, 0, 0}; {, −5, 2, 7, −3, −5, 2, −2, 6, 3, 2, 0, 0}; {, −6, 4, −4, 5, 6, 0, 0, −6, −4, −3, 0, 0}; {, −6, 4, −4, 5, 6, 0, 0, −6, −4, −2, 0, 0}; {4, −3, 4, −4, −4, 5, 4, −3, −2, −1, 0, 0}; {4, −3, 4, −4, −4, 5, 5, −2, −3, −1, 0, 0}; {, −7, 3, −5, 4, 5, −1, 0, −6, −5, −3, 0, 0}; {7, 1, −7, 2, 4, −3, −1, −6, −6, −3, 0, 0}; {4, −3, 4, −4, −3, 6, 4, −3, −2, −1, 0, 0}; {8, 2, −6, 3, 5, −1, −2, 8, −5, −3, 0, 0}; {8, 2, −6, 3, 5, −1, −2, 8, −5, −2, 0, 0}; {, −6, 1, 6, −4, −5, 2, −2, 6, 3, 2, 0, 0}; {3, −4, 3, −5, −4, 5, 3, −3, −3, −2, 0, 0}; {, −3, 8, 1, −5, −2, −7, −5, 5, 8, −4, 0, 0}; {8, 2, −6, 3, 5, −1, 0, −6, −5, −3, 0, 0}; {7, 1, −7, 2, 4, −2, −1, −6, −6, −3, 0, 0}; {1, −6, 1, −7, −6, 3, 3, −2, −4, −1, 0, 0}; {2, −4, 4, −3, 0, 6, −3, −4, −6, −5, 0, 0}; {7, 1, −7, 2, 5, −1, −2, 8, −5, −2, 0, 0}; {, −5, 6, −1, −7, −3, 8, 8, 4, 8, −4, 0, 0}; {6, 0, 8, 1, 4, −2, −2, 8, −6, −3, 0, 0}; {5, −1, 7, 0, 3, −3, −3, 8, −6, −4, 0, 0}; {5, −1, 7, 0, 3, −3, −3, 8, −6, −3, 0, 0}; {, −5, 5, −3, 6, −5, −7, −6, −2, 5, 6, 0, 0}; {4, −3, 4, −4, 0, −3, −2, 0, 8, 8, 0, 0}; {, −6, 4, −4, 5, −6, −7, −7, −3, 6, 6, 0, 0}; {4, −3, 4, −4, 0, −2, −2, 0, 8, 7, 0, 0}; {, −4, 6, −2, 7, −3, 1, 7, 8, 0, 0, 0, 0}; {, −2, 7, −2, 6, −4, −4, 7, 6, −2, −3, 0, 0}; {4, −2, 6, −1, 6, 7, 3, 3, −4, −3, 0, 0}; {, −2, 7, −2, 6, −4, −4, 7, 6, −2, −2, 0, 0}; {3, −3, 5, −2, 5, 6, 2, 2, −5, −4, 0, 0}; {, −7, 2, −7, 1, 7, 7, −5, −4, 3, 3, 0, 0}; {8, 1, 8, 0, 6, 7, −3, −3, 3, 2, 0, 0}; {6, −1, 6, −2, 4, 8, −7, 3, 0, −3, 0, 0}; {, −3, 6, −3, 5, −4, −4, 6, 5, −2, −2, 0, 0}; {3, −3, 5, −2, 6, 7, 2, 3, −5, −3, 0, 0}; {2, −4, 4, −3, 5, 6, 2, 3, −6, −4, 0, 0}; {, −5, 4, −5, 3, −6, −6, 6, 5, −3, −3, 0, 0}; {8, 1, 8, 0, 7, 7, −5, −4, 3, 3, 0, 0}; {6, −1, 6, −2, 5, 6, −4, −3, 2, 2, 0, 0}; {, −2, 7, −2, 6, −2, −3, 6, 5, −1, −1, 0, 0}; {, −3, 6, −3, 5, −3, −3, 6, 5, −1, −2, 0, 0}; {5, −2, 5, −3, 5, 5, −6, −5, 2, 2, 0, 0}; {6, 0, 8, 1, −6, −4, 3, 4, −2, −1, 0, 0}; {, −4, 5, −4, 4, −3, −6, 7, 4, 7, −7, 0, 0}; {, −7, 2, −7, 1, −6, −7, 6, 5, 8, −7, 0, 0}; {, −6, 4, −4, 5, −1, 0, 7, −5, −1, 1, 0, 0}; {, −7, 2, −7, 1, −6, −6, 5, 5, −4, −3, 0, 0}; {6, −2, 4, −5, 4, −1, −5, 7, −7, −6, 0, 0}; {6, −2, 4, −5, 4, −1, −5, 8, −6, −5, 0, 0}; {6, −1, 6, −2, 8, 7, −2, 0, 3, 3, 0, 0}; {8, 1, 8, 0, −6, −7, 6, 5, −7, −6, 0, 0}; {8, 1, 8, 0, −6, −6, 5, 5, −4, −3, 0, 0}; {7, 0, 7, −1, −7, −7, 5, 5, −5, −4, 0, 0}; {, −7, 1, 7, −2, 7, 8, 8, 3, −1, −4, 0, 0}; {, −7, 2, −7, 1, −4, −5, 4, 4, −3, −2, 0, 0}; {, −6, 2, 8, 0, −6, −7, −1, 1, 4, 3, 0, 0}; {1, −5, 3, −3, −7, −5, 1, 8, −5, 0, 0, 0}; {6, −1, 6, −1, −5, 5, 5, −4, −2, 1, 0, 0}; {5, −2, 5, −2, −6, 5, 5, −5, −2, 1, 0, 0}; {, −5, 5, −3, 7, 4, 0, 1, −7, −4, 0, 0, 0}; {, −2, 6, −4, 4, −1, −7, 8, −2, 0, 2, 0, 0}; {2, −6, 0, 8, 3, 5, 5, 3, 7, 8, 0, 0}; {, −7, 2, −7, 2, −2, 2, 2, 0, 6, 7, 0, 0}; {, −6, 4, −4, 6, 4, −1, 0, 8, −5, −1, 0, 0}; {, −2, 6, −4, 4, 0, −6, 8, −1, 0, 2, 0, 0}; {3, −4, 3, −4, −6, 4, 4, −4, −2, −1, 0, 0}; {4, −3, 4, −3, −5, 5, 5, −2, −2, −2, 0, 0}; {1, −4, 5, 0, 1, −5, −1, 7, −6, −3, 0, 0}; {0, −5, 4, −1, 0, −6, −1, 7, −7, −3, 0, 0}; {, −6, 4, −4, 6, 6, 0, 1, −6, −4, −3, 0, 0}; {, −6, 1, 6, −3, −6, 2, −2, 5, 3, 1, 0, 0}; {, −1, 7, −3, 5, 3, −4, −7, 1, 1, −1, 0, 0}; {, −1, 7, −3, 5, 3, −4, −7, 1, 1, 0, 0, 0}; {2, −5, 2, −5, −6, 4, 3, −5, −3, 0, 0, 0}; {3, −4, 3, −4, −5, 5, 4, −3, −2, −2, 0, 0}; {, −3, 5, −5, 3, 1, −6, 8, 1, 0, 0, 0, 0}; {2, −5, 2, −5, −6, 4, 4, −3, −3, −1, 0, 0}; {7, 1, −7, 3, 4, −2, −1, −7, −5, −3, 0, 0}; {8, 2, −6, 4, 5, −1, 1, −6, −5, −3, 0, 0}; {6, 0, 8, 2, 3, −3, −1, −7, −6, −3, 0, 0}; {6, 0, 8, 2, 3, −3, −1, −6, −6, −3, 0, 0}; {2, −5, 2, −5, −5, 5, 3, −4, −2, −2, 0, 0}; {2, −5, 2, −5, −5, 5, 3, −4, −2, −1, 0, 0}; {7, −2, 3, −6, 8, 0, −4, 4, 2, 1, 0, 0}; {7, −2, 3, −6, 8, 0, −4, 4, 2, 2, 0, 0}; {1, −6, 1, −6, −6, 4, 3, −4, −3, −1, 0, 0}; {6, −3, 2, −7, 7, −1, −4, 4, 1, 2, 0, 0}; {, −6, 3, −6, 3, 4, −4, 0, −2, −5, −4, 0, 0}; {, −6, 2, 8, 0, 0, 8, 7, 1, −2, 0, 0, 0}; {5, −1, 7, 1, 3, −2, −4, 7, −5, −2, 0, 0}; {, −5, 3, −7, 1, 1, −6, 7, 0, −1, −1, 0, 0}; {3, −3, 5, −1, 1, −3, −4, 5, −7, −3, 0, 0}; {, −2, 7, −2, 7, −7, 3, 1, −5, −3, −1, 0, 0}; {, −2, 7, −2, 7, −7, 3, 2, −4, −4, −2, 0, 0}; {, −2, 7, −2, 7, −6, −6, −5, −2, 8, 7, 0, 0}; {1, −6, 1, −6, −2, −4, −3, −1, 7, 7, 0, 0}; {1, −6, 1, −6, −2, −3, −3, −1, 7, 7, 0, 0}; {5, −1, 7, 1, 6, 6, 8, −5, 4, 5, 0, 0}; {0, −7, 0, −7, −2, −4, −4, −1, 7, 7, 0, 0}; {, −1, 8, −1, 8, −3, −5, −4, −2, 7, 7, 0, 0}; {, −1, 8, −1, 8, −3, −5, −4, −1, 5, 6, 0, 0}; {3, −4, 3, −4, 2, 4, −6, −6, 2, 1, 0, 0}; {0, 8, −2, 6, −5, −3, −3, 6, 3, −2, 0, 0}; {, −6, 3, −6, 3, −5, −5, 5, 4, −2, −2, 0, 0}; {8, 1, 8, 1, −7, −7, 5, 4, −3, −3, 0, 0}; {7, 0, 7, 0, 8, 8, 4, 4, −4, −3, 0, 0}; {6, −1, 6, −1, 8, 8, 4, 4, −4, −3, 0, 0}; {8, 1, 8, 1, −5, 7, 6, −3, 0, 3, 0, 0}; {7, 0, 7, 0, −6, 7, 5, −3, 0, 2, 0, 0}; {4, −4, 2, −6, 3, 0, 8, 7, 0, 0, 0, 0}; {, −7, 2, −7, 2, −4, −6, 3, 3, −3, −1, 0, 0}; {, −7, 2, −7, 2, −4, −6, 4, 4, −3, −1, 0, 0}; {8, 1, 8, 1, −5, −7, 4, 4, −4, −2, 0, 0}; {5, −4, 1, −7, 1, −1, 3, 2, 7, 5, 0, 0}; {3, −4, 3, −3, 8, 4, 4, −5, −2, 1, 0, 0}; {4, −5, 0, 8, 2, −2, 4, 4, 6, 5, 0, 0}; {, −1, 6, −5, 3, −3, −5, 1, 3, 5, 2, 0, 0}; {, −1, 6, −5, 3, −3, −5, 1, 3, 5, 3, 0, 0}; {6, −1, 6, 0, −4, 0, 0, −1, 6, 7, 0, 0};

{, −1, 7, −3, 6, 2, −5, −6, 1, 1, 1, 0, 0}; {, −5, 3, −7, 2, −2, 8, 7, −1, 0, 0, 0, 0}; {, −7, 0, 5, −3, −7, 1, −2, 5, 3, 1, 0, 0}; {, −3, 5, −5, 4, 1, −6, −7, 1, 0, 0, 0, 0}; {, −3, 8, 1, −3, −2, 8, −2, 6, 8, −3, 0, 0}; {, −7, 1, 7, 0, −2, 8, 6, −2, −1, 0, 0, 0}; {2, 8, −4, 3, −1, 8, −5, 8, 1, −1, 0, 0}; {, −1, 8, −1, −7, −7, 3, 1, −6, −3, −1, 0, 0}; {2, −4, 4, −1, 1, −4, −4, 6, −6, −3, 0, 0}; {3, −6, −1, 7, 6, −2, −5, 3, 1, 2, 0, 0}; {7, 0, 7, 1, 3, 7, −1, −2, −5, −6, 0, 0}; {5, −2, 5, −1, 1, 7, −1, −3, −6, −5, 0, 0}; {1, −5, 3, −2, 1, −4, −4, 6, −7, −3, 0, 0}; {2, −4, 4, −1, 3, 4, 7, −6, 4, 5, 0, 0}; {, −4, 4, −6, 3, 7, −4, −4, 4, 1, −2, 0, 0}; {, −4, 4, −6, 3, 8, −5, −4, 5, 2, −2, 0, 0}; {1, −6, 1, −5, 3, 3, −7, −5, 1, 2, 0, 0}; {, −4, 4, −6, 3, −6, −7, −1, −1, 4, 3, 0, 0}; {, −5, 3, −7, 2, −7, −7, −2, −2, 4, 3, 0, 0}; {5, −3, 4, −3, 5, 5, −5, −4, 2, 2, 0, 0}; {4, −4, 3, −4, 4, 4, −5, −4, 1, 1, 0, 0}; {, −6, 2, −7, 2, −6, −6, 6, 5, −3, −3, 0, 0}; {, −3, 4, −6, 2, −6, 8, −1, −1, 3, 2, 0, 0}; {, −4, 4, −5, 4, −3, −4, 5, 4, −1, −1, 0, 0}; {5, −3, 4, −3, 6, 6, −3, −2, 2, 2, 0, 0}; {, −7, 1, 8, 1, −6, −6, 6, 5, −3, −3, 0, 0}; {7, 0, 8, 2, −3, −2, 5, −6, −2, 0, 0, 0}; {2, −7, −1, 7, 1, −4, −7, 1, 2, 3, 0, 0}; {, −3, 6, −2, 8, 4, 1, 1, −7, −3, 0, 0, 0}; {7, −1, 6, −1, −6, 6, 5, −4, −1, 1, 0, 0}; {, −7, 1, 8, 1, −3, 7, 6, −2, −1, 1, 0, 0}; {, −2, 7, −1, −7, 7, −4, −3, 7, −7, 0, 0, 0}; {, −2, 7, −1, −7, 7, −4, −3, 7, −7, 1, 0, 0}; {8, 0, 7, 0, −3, 7, 6, −1, −1, 0, 0, 0}; {8, 0, 7, 0, −3, 7, 6, −1, −1, −1, 0, 0}; {7, −1, 6, −1, −4, 6, 5, −2, −1, 0, 0, 0}; {5, −1, 8, 3, 3, −3, 1, −7, −5, −2, 0, 0}; {8, 0, 7, 0, −2, 7, 7, 0, −1, −1, 0, 0}; {6, −2, 5, −2, −4, 6, 5, −2, −1, −1, 0, 0}; {1, 7, −4, 3, 0, 7, 3, 8, 6, 3, 0, 0}; {, −6, 3, −5, 5, 6, 0, 0, −6, −4, −2, 0, 0}; {, −3, 3, 8, −1, −3, 4, 0, 7, 4, 3, 0, 0}; {, −6, 3, −5, 5, 6, 0, −1, −7, −4, −2, 0, 0}; {1, −5, 4, −1, 2, 5, 6, −7, 4, 5, 0, 0}; {3, −4, 4, −2, 0, 7, −3, −4, −6, −5, 0, 0}; {, −2, 4, −7, 0, 1, −4, 7, −3, −6, 0, 0, 0}; {, −5, 4, −4, 6, −6, −7, −5, −3, 6, 6, 0, 0}; {5, −3, 4, −3, 0, −2, −1, 0, 8, 8, 0, 0}; {, −7, 2, −6, 4, 8, 8, −6, −4, 6, 6, 0, 0}; {7, 0, 8, 2, 6, 6, −7, −5, 5, 6, 0, 0}; {, −4, 4, −5, 4, 8, 8, −3, −3, 5, 4, 0, 0}; {, −1, 8, 0, −6, −1, 2, −7, −6, 2, 1, 0, 0}; {, −1, 7, −2, 7, −4, −5, −3, −2, 5, 5, 0, 0}; {, −1, 7, −2, 7, −4, −5, −3, −2, 6, 6, 0, 0}; {, −3, 6, −2, 8, −2, 1, 8, −7, 1, 1, 0, 0}; {, −7, 1, 8, 1, 6, −6, −5, 4, 1, −2, 0, 0}; {7, −1, 6, −1, 5, 6, −4, −4, 3, 2, 0, 0}; {, −4, 5, −3, 7, −2, 0, 7, 8, 0, 1, 0, 0}; {6, −2, 5, −2, 4, 5, −5, −5, 3, 2, 0, 0}; {0, 7, −3, 5, −5, −3, −2, 6, 3, −1, 0, 0}; {, −1, 6, −4, 5, −4, −5, −1, −1, 5, 4, 0, 0}; {, −2, 5, −5, 4, −5, −6, 0, 0, 4, 3, 0, 0}; {, −7, 1, 8, 2, −6, −6, 5, 4, −2, −2, 0, 0}; {2, −6, 1, −5, 4, 4, −5, −4, 1, 1, 0, 0}; {7, −1, 6, 0, −6, 7, 5, −3, 0, 2, 0, 0}; {6, −3, 3, −4, 5, 8, −7, 2, −1, −4, 0, 0}; {, −1, 7, −2, 8, 3, 2, −7, −3, 0, 1, 0, 0}; {, −7, 1, 8, 2, −1, 2, 1, 0, −7, −7, 0, 0}; {, −3, 6, −2, −7, 7, −4, −3, 7, 8, 0, 0, 0}; {, −3, 6, −2, −7, 7, −4, −3, 7, −7, 1, 0, 0}; {, −4, 5, −3, 8, 7, 1, 4, −4, −4, −2, 0, 0}; {0, −6, 3, −1, −1, −6, −1, 7, −7, −3, 0, 0}; {0, −6, 3, −1, −1, −6, −1, 7, −7, −2, 0, 0}; {, −1, 5, −6, 2, −1, 7, 2, 6, 6, 2, 0, 0}; {, −4, 5, −3, 8, −6, 3, 8, −7, −7, −7, 0, 0}; {, −6, 1, 7, 0, 1, 0, 2, 1, −6, 8, 0, 0}; {, −1, 8, 0, −5, −2, 3, −4, −5, 8, −7, 0, 0}; {, −1, 8, 0, −5, −2, 3, −4, −5, −7, −7, 0, 0}; {, −1, 8, 0, −5, −2, 4, −4, −5, −7, −6, 0, 0}; {, −1, 7, −2, 8, −5, −5, −3, −2, 7, 6, 0, 0}; {, −1, 7, −2, 8, −4, −5, −3, −2, 6, 6, 0, 0}; {, −3, 5, −4, 6, −6, −7, −4, −3, 6, 6, 0, 0}; {6, −1, 7, 2, 8, 6, 7, −5, 6, 6, 0, 0}; {2, −7, −1, −7, 0, −4, −6, −3, −6, 8, 0, 0}; {5, −5, 0, −7, 0, −3, 3, 2, 5, 4, 0, 0}; {, −7, 0, 6, 0, −7, 7, −2, −1, 2, 2, 0, 0}; {8, −1, 5, −1, 8, 7, −2, −1, 3, 1, 0, 0}; {2, 8, −3, 6, −2, −4, 2, 2, 5, 2, 0, 0}; {, −4, 1, 5, −3, 4, 1, 6, 5, 7, 3, 0, 0}; {2, 8, −3, 6, −2, −4, 2, 2, 5, 3, 0, 0}; {, −4, 1, 5, −3, 4, 1, 6, 5, 7, 4, 0, 0}; {1, 7, −4, 5, −3, −4, 0, 5, 3, 0, 0, 0}; {1, 7, −4, 5, −3, −4, 2, 1, 5, 2, 0, 0}; {, −5, 0, 4, −4, 3, 1, 6, 5, 7, 3, 0, 0}; {0, 6, −5, 4, −4, −5, 1, 1, 4, 2, 0, 0}; {5, −5, 0, −7, 2, −2, −6, 2, 3, 2, 0, 0}; {8, −1, 5, −1, −7, 6, −3, −1, 2, 2, 0, 0}; {, −3, 5, −4, 7, 2, 1, 8, −4, 0, 0, 0, 0}; {, −4, 4, −5, 6, 1, 0, 7, −5, −1, 0, 0, 0}; {8, −1, 5, −1, −7, 7, −2, 0, 3, 1, 0, 0}; {6, −3, 3, −3, 7, 5, −4, −1, 1, 2, 0, 0}; {, −1, 5, −6, 3, −4, −6, 0, 2, 3, 3, 0, 0}; {5, −4, 2, −4, 7, 5, −5, −1, 1, 2, 0, 0}; {4, −5, 1, −5, 6, 4, −5, −1, 1, 1, 0, 0}; {2, −7, −1, −7, 4, 3, −6, −2, 0, 1, 0, 0}; {2, −7, −1, −7, 8, −1, 3, 1, −3, −3, 0, 0}; {7, −2, 4, −1, 3, −6, −6, 2, 0, −3, 0, 0}; {, −6, 0, 5, −1, 5, 0, −3, −1, −4, −7, 0, 0}; {, −2, 4, −7, 3, −5, −6, 1, 0, 4, 1, 0, 0}; {7, −7, −6, 0, 5, −3, 3, −2, −6, 4, 0, 0}; {5, −4, 2, −3, 7, 5, −5, −3, 2, 1, 0, 0}; {, −1, 5, −6, 4, −3, −6, 0, 2, 4, 2, 0, 0}; {4, −5, 1, −4, 6, 4, −5, −2, 1, 0, 0, 0}; {4, −5, 1, −4, 6, 4, −5, −2, 1, 1, 0, 0}; {, −1, 5, −6, 4, −3, −5, 0, 0, 5, 2, 0, 0}; {8, 0, 7, 3, −2, −2, 6, −6, −2, −2, 0, 0}; {2, −7, −1, −6, 4, 3, −5, −3, 1, −1, 0, 0}; {2, −7, −1, −6, 5, 3, −6, −2, 1, 0, 0, 0}; {1, −7, 0, −4, −3, 6, −4, −5, −7, −6, 0, 0}; {6, 1, −5, −5, 2, −4, 0, 3, 5, −1, 0, 0}; {3, −2, 8, 8, 0, −6, −1, 2, 4, −1, 0, 0}; {, −6, 6, 1, 3, −5, 6, −5, −1, 2, −3, 0, 0}; {3, −2, 8, −7, 0, −6, −1, 2, 4, −2, 0, 0}; {0, −5, 5, 6, −2, −7, −2, 0, 4, −2, 0, 0}; {, −6, −1, 3, −2, 5, 3, −4, 5, 4, 4, 0, 0}; {, −3, 2, 6, 1, 8, 5, −2, 6, 5, 4, 0, 0}; {, −7, −2, 2, −3, 5, 2, −5, 4, 5, 4, 0, 0}; {6, −7, −5, 4, −5, 6, 0, 8, −7, 4, 0, 0}; {5, 8, −6, 3, −6, 6, −2, 8, −7, 4, 0, 0}; {4, 7, −7, 2, −6, 5, −2, 8, −7, 3, 0, 0}; {, −1, −5, 6, −7, 1, 2, −7, 0, −4, −2, 0, 0}; {, −1, −5, 6, −7, 1, 2, −7, 1, −4, −2, 0, 0}; {0, −1, −3, 3, −2, 3, −4, 4, 6, −7, 0, 0}; {, −3, −7, 4, 7, −1, 1, 8, −1, −4, −2, 0, 0}; {7, 1, −6, −5, 2, −4, 2, 3, 5, 0, 0, 0}; {, −4, 8, 3, 6, −1, 0, 7, −2, −4, −2, 0, 0}; {6, 1, −5, −3, 5, 5, −4, 2, −2, −1, 0, 0}; {7, 2, −4, −2, 6, 6, −3, 3, −2, −1, 0, 0}; {8, 2, −5, −4, 4, −3, 1, 4, 5, −1, 0, 0}; {1, −6, 2, 2, −7, 2, 5, 6, 8, 1, 0, 0}; {, −7, −2, 2, −2, 5, 3, −4, 5, 4, 4, 0, 0}; {, −3, 3, 8, 5, −3, −3, 6, 0, 1, 2, 0, 0}; {2, 6, −7, 4, −6, 8, −1, 7, 7, 4, 0, 0}; {6, −5, −1, −5, 3, 1, −7, 3, 5, 4, 0, 0}; {5, −6, −2, −6, 2, 0, −7, 2, 4, 2, 0, 0}; {5, −6, −2, −6, 2, 0, −7, 2, 4, 3, 0, 0}; {, −1, 3, 6, 1, 8, 5, −3, 6, 6, 3, 0, 0}; {, −1, 3, 6, 1, 8, 5, −3, 6, 6, 4, 0, 0}; {, −1, 1, 2, −5, 1, −5, 3, −4, −5, 7, 0, 0}; {, −5, −1, 2, −3, 5, 2, −5, 4, 6, 3, 0, 0}; {2, 1, −1, 6, 0, 4, −4, 5, 5, −6, 0, 0}; {, −4, −6, 7, −3, 6, −7, 0, −7, 7, −5, 0, 0}; {1, 0, −2, 5, −1, 4, −4, 4, 5, −7, 0, 0}; {, −5, −7, 6, −4, 5, −7, 0, 8, 7, −5, 0, 0}; {, −5, −7, 6, −4, 5, −7, 0, 8, 7, −4, 0, 0}; {3, 0, −4, 1, −6, −4, 3, −5, −7, −4, 0, 0}; {1, −2, −6, −1, 8, −5, 2, −6, −7, −4, 0, 0}; {5, 0, −6, −3, 4, 5, −5, 2, −2, −1, 0, 0}; {0, −3, −7, −2, 7, −6, 2, −7, −7, −5, 0, 0}; {0, −3, −7, −2, 7, −6, 2, −7, −7, −4, 0, 0}; {7, 3, −2, 2, −2, 8, −5, 0, −5, −3, 0, 0}; {2, 6, −7, 5, −5, 8, −1, 8, 5, 5, 0, 0}; {, −5, −2, 0, −5, 0, −4, 3, −5, 8, 6, 0, 0}; {1, 8, −2, −3, 6, 7, −1, −5, 0, 1, 0, 0}; {, −5, 1, 6, 4, −4, −4, 4, −2, 2, 1, 0, 0}; {0, 7, −3, −4, 5, 6, −1, −6, −1, 0, 0, 0}; {, −1, 6, −4, −5, 4, 5, −2, −7, −1, 0, 0, 0}; {, −2, 2, 5, 1, 8, 5, −3, 6, 6, 4, 0, 0}; {4, 7, −7, 4, −5, 7, −1, 7, 8, 5, 0, 0}; {0, −3, −7, −1, 8, −5, 2, −6, −7, −3, 0, 0}; {8, 4, −1, 4, −4, −2, 5, −3, −5, −3, 0, 0}; {, −1, −4, 8, −2, 7, −6, 2, −7, −7, −4, 0, 0}; {, −1, −4, 8, −2, 7, −6, 2, −7, −7, −3, 0, 0}; {, −2, −5, 7, −3, 6, −7, 1, 8, −7, −5, 0, 0}; {6, 2, −3, 2, −5, −3, 4, −4, −5, −3, 0, 0}; {8, 4, −1, 4, −1, 7, −4, 0, −5, −4, 0, 0}; {2, −1, −5, 2, −7, −3, 3, −5, −7, −3, 0, 0}; {8, 4, −1, 6, −5, 5, 8, 5, 8, −6, 0, 0}; {7, 3, −2, 5, −6, 4, 7, 5, 7, −7, 0, 0}; {2, −5, 3, 7, 2, −7, −7, 0, 3, 4, 0, 0}; {, −7, 3, −4, 1, −2, 6, 6, −2, 0, 3, 0, 0}; {, −5, 4, −4, 1, 1, 8, 3, 4, 6, 5, 0, 0}; {, −7, 2, −6, −1, −1, 6, 1, 3, 6, 3, 0, 0}; {8, 1, −7, −2, −2, 5, 1, 3, 6, 3, 0, 0}; {2, −6, 1, 5, 4, −5, 6, 6, 8, 5, 0, 0}; {, −5, 4, −4, 1, 1, 7, 2, 4, 7, 4, 0, 0}; {, −1, −6, 4, −5, −1, −7, −6, 8, −7, −6, 0, 0}; {, −1, −7, 2, 8, −2, −5, −7, 0, 2, 4, 0, 0}; {8, 2, −5, 1, 8, −6, 4, 3, −3, −2, 0, 0}; {, −1, −6, 4, −5, 3, 6, −1, −1, −4, −3, 0, 0}; {, −3, 8, 2, −7, 2, 4, −1, 0, −6, −4, 0, 0}; {7, 1, −6, 0, 8, −7, 4, 4, −4, −3, 0, 0}; {0, −5, 5, −4, 5, 5, −1, 0, −5, −2, 0, 0}; {7, 0, 8, −3, 6, 8, 8, 5, −7, −7, 0, 0}; {3, −3, 6, −4, −6, 3, 3, −3, −1, 2, 0, 0}; {2, −3, 7, −1, 2, −5, −1, −7, −6, −3, 0, 0}; {, −6, 4, −3, 4, 6, −1, 1, −4, −5, −2, 0, 0}; {, −1, −6, 4, −4, −1, −7, −4, 8, −7, −5, 0, 0}; {, −2, −7, 3, −5, −2, 8, −5, 8, 8, −4, 0, 0}; {, −3, 8, 2, −6, −3, 7, −6, 8, 8, −6, 0, 0};

{, −3, 8, 2, −6, −2, 8, −7, 6, 8, −6, 0, 0}; {, −4, 7, 1, −7, −3, 7, −7, 6, 8, −6, 0, 0}; {, −3, 8, 2, −6, −1, −7, −6, 6, −7, −4, 0, 0}; {4, −1, −7, 1, 7, 5, 6, −4, 0, 3, 0, 0}; {3, −2, 8, 0, 6, 4, 5, −5, −1, 3, 0, 0}; {5, 0, −6, 2, −7, 5, 6, −3, 0, 3, 0, 0}; {0, −5, 5, −3, 4, 3, 4, −5, −1, 3, 0, 0}; {, −2, −7, 3, −5, 3, 2, 3, −6, −2, 2, 0, 0}; {3, −1, −6, 3, −4, −3, −3, 6, −5, 0, 0, 0}; {8, 2, −5, 2, −7, −7, 4, 3, −3, −2, 0, 0}; {5, −1, 8, −1, 7, 8, 2, 1, −3, −2, 0, 0}; {0, −7, 1, 7, −2, −2, 8, 7, −1, −2, 0, 0}; {4, −2, 7, −2, 6, 7, 2, 2, −4, −3, 0, 0}; {8, 2, −5, 2, −6, 7, 6, −3, 0, 3, 0, 0}; {, −4, 7, 1, −7, 2, 1, 1, −7, −3, 1, 0, 0}; {4, −2, 7, −2, 7, 8, 2, 2, −4, −3, 0, 0}; {5, −1, 8, −1, −7, 8, 2, 3, −5, −2, 0, 0}; {3, −3, 6, −3, 7, 7, 1, 2, −5, −3, 0, 0}; {2, −4, 5, −4, 6, 7, 1, 2, −5, −4, 0, 0}; {, −6, 4, −3, 4, −2, 1, 3, 1, 5, 7, 0, 0}; {3, −3, 6, −3, 8, 7, 1, 2, −6, −3, 0, 0}; {3, −4, 4, −6, 4, 5, 5, 2, −4, −5, 0, 0}; {2, −5, 3, −7, 3, 6, 6, 3, 7, 8, 0, 0}; {, −4, 5, −3, 3, −2, −4, 5, 5, −3, −2, 0, 0}; {, −1, −7, 2, −7, 5, 6, 0, 1, −6, −4, 0, 0}; {8, 2, −5, 2, −2, 0, 0, 0, 6, 7, 0, 0}; {2, −5, 3, −7, 4, 5, 4, 3, −7, −7, 0, 0}; {0, −7, 1, 7, 2, 5, 5, 2, 7, 8, 0, 0}; {, −6, 3, −5, 1, −3, 8, 7, −3, −1, 3, 0, 0}; {8, 1, −7, −1, −5, 6, 6, −4, −1, 2, 0, 0}; {1, −6, 2, 8, 4, 5, 3, 3, 8, −7, 0, 0}; {0, −7, 1, 7, 3, 4, 3, 2, 8, −7, 0, 0}; {, −1, 8, 0, 6, 2, 4, 4, 1, 7, 8, 0, 0}; {8, 1, −7, 0, −4, −7, 3, 3, −5, −2, 0, 0}; {3, −5, 2, 8, 3, −1, 8, 7, −1, 0, 0, 0}; {, −7, 1, 8, −2, −7, −7, 6, 5, −5, −4, 0, 0}; {, −5, 4, −4, 3, −1, 1, 2, 0, 7, 7, 0, 0}; {4, −4, 3, −7, 4, 5, 5, 3, −7, −7, 0, 0}; {5, −3, 4, −6, 6, 7, 6, 3, −7, −7, 0, 0}; {, −2, 6, −3, 3, 1, −7, 5, 5, 7, 6, 0, 0}; {, −3, 8, 2, −5, −2, 8, −5, 7, −7, −4, 0, 0}; {, −4, 7, 1, −6, −3, 8, −7, 6, 8, −5, 0, 0}; {0, −7, 1, 8, −7, 2, 2, −2, −4, −2, 0, 0}; {0, −7, 1, 8, −7, 2, 2, −2, −4, −1, 0, 0}; {5, −1, 8, 0, 2, −4, −3, −6, −6, −4, 0, 0}; {, −1, 8, 0, 7, 8, 2, −2, −4, −2, 0, 0}; {4, −2, 7, −1, 1, −5, −3, −6, −7, −3, 0, 0}; {0, −7, 1, 8, −7, 2, 3, −2, −4, −2, 0, 0}; {0, −7, 1, 8, −7, 2, 3, −2, −4, −1, 0, 0}; {7, 1, −6, 2, 5, −2, −1, −6, −5, −3, 0, 0}; {, −4, 4, −5, 1, 2, −6, 7, 2, 0, −1, 0, 0}; {, −7, 3, −4, 4, −6, 8, 8, −2, 2, 5, 0, 0}; {, −1, 8, 0, 7, −3, −3, 7, 6, −1, −1, 0, 0}; {4, −2, 7, −1, 6, 7, 2, 2, −4, −3, 0, 0}; {5, −1, 8, 0, 7, 8, 3, 4, −4, −2, 0, 0}; {7, 0, 8, −1, −5, 8, −6, 3, 0, −2, 0, 0}; {7, 1, −6, 2, −7, 7, 6, −3, 0, 3, 0, 0}; {7, 1, −6, 2, −7, 7, 7, −2, 2, 5, 0, 0}; {6, 0, −7, 1, 8, 7, 6, −3, 0, 3, 0, 0}; {, −2, 7, −1, 6, −3, −3, 6, 5, −1, −1, 0, 0}; {3, −3, 6, −2, 6, 7, 1, 1, −4, −3, 0, 0}; {, −5, 4, −4, 3, −6, −6, 5, 5, −3, −3, 0, 0}; {7, 0, 8, −1, 6, 6, −5, −4, 2, 2, 0, 0}; {6, −1, 7, −2, 5, 5, −6, −5, 2, 2, 0, 0}; {1, −7, 0, 6, −4, −3, −3, 6, 2, −2, 0, 0}; {, −5, 4, −4, 3, −5, −5, 6, 5, −3, −3, 0, 0}; {1, −6, 2, −7, 2, 1, 7, 8, 0, 1, 0, 0}; {, −4, 5, −3, 4, −3, −4, 5, 5, −2, −1, 0, 0}; {, −5, 4, −4, 3, −4, −5, 4, 4, −2, −1, 0, 0}; {, −5, 4, −4, 3, −4, −5, 5, 5, −3, −2, 0, 0}; {, −6, 3, −5, 2, −5, −6, 5, 5, −4, −3, 0, 0}; {, −6, 3, −5, 2, −5, −5, 5, 5, −3, −3, 0, 0}; {, −4, 4, −5, 1, −7, −6, −6, 4, 0, −3, 0, 0}; {3, −5, 2, 8, 1, −3, −6, 6, 8, −6, 0, 0}; {7, −1, 6, −4, 5, 3, −6, −7, 1, 0, 0, 0}; {, −6, 3, −5, 2, −4, −5, 4, 4, −3, −2, 0, 0}; {, −7, 2, −6, 1, −5, −5, 4, 4, −3, −2, 0, 0}; {7, 0, 8, −1, −7, −7, 4, 4, −4, −3, 0, 0}; {, −7, 1, 8, −2, 7, 8, 8, 3, −2, −4, 0, 0}; {8, 0, 7, −3, 7, 7, 7, 3, −3, −4, 0, 0}; {, −2, 7, −1, 6, 1, 3, 3, 1, 8, 8, 0, 0}; {5, −2, 6, −2, −7, 5, 4, −4, −1, 2, 0, 0}; {4, −3, 5, −3, 8, 5, 4, −4, −1, 2, 0, 0}; {, −6, 1, 7, −3, 6, 1, −1, 1, −3, −5, 0, 0}; {2, −5, 3, −5, 6, 6, 2, 3, −6, −4, 0, 0}; {, −5, 4, −4, 4, −1, 1, 2, 1, 6, 7, 0, 0}; {, −5, 4, −4, 4, −1, 2, 3, 1, 6, 7, 0, 0}; {, −6, 1, 7, −3, 7, 1, −4, −7, −6, −6, 0, 0}; {4, −3, 5, −3, −7, 5, 4, −5, −2, 2, 0, 0}; {, −6, 3, −5, 3, −1, 1, 1, 1, 6, 7, 0, 0}; {4, −4, 3, −6, 5, 6, 5, 4, 8, −7, 0, 0}; {, −7, 0, 6, −4, 7, 1, −5, −7, −6, −6, 0, 0}; {4, −5, 1, 7, 2, −2, 5, 5, 7, 5, 0, 0}; {, −7, 2, −6, 2, −1, 1, 1, 0, 6, 7, 0, 0}; {2, −5, 3, −5, −7, 4, 3, −6, −3, 1, 0, 0}; {8, 1, −7, 1, −1, 1, 1, −1, 6, 7, 0, 0}; {, −4, 6, −1, 8, 8, 1, 4, −4, −3, −2, 0, 0}; {2, −5, 3, −5, −6, 3, 3, −3, −3, −1, 0, 0}; {, −5, 3, −6, 1, 0, 7, 3, 4, 7, 5, 0, 0}; {, −7, 3, −4, 5, 6, −1, 2, −5, −4, −2, 0, 0}; {, −2, −7, 3, −3, −1, −7, −2, 7, −7, −3, 0, 0}; {8, −1, 5, −5, −7, 0, −3, 5, 3, 2, 0, 0}; {6, 0, −7, 2, 3, −3, −3, 8, −5, −2, 0, 0}; {6, 0, −7, 2, 3, −3, −2, −7, −5, −3, 0, 0}; {6, 0, −7, 2, 3, −3, −2, −7, −5, −2, 0, 0}; {0, −7, 1, −7, −7, 2, 2, −3, −3, −3, 0, 0}; {1, −6, 2, −6, −6, 3, 4, −2, −3, −2, 0, 0}; {, −5, 2, 8, −2, −3, 4, 0, 6, 5, 2, 0, 0}; {1, −6, 2, −6, −5, 4, 3, −4, −2, −1, 0, 0}; {, −6, 5, −1, −7, −4, 7, 8, 4, 8, −4, 0, 0}; {6, −3, 3, −7, 8, −1, −4, 5, 2, 2, 0, 0}; {0, −7, 1, −7, −6, 3, 3, −3, −3, −2, 0, 0}; {3, −3, 6, −1, 1, −5, −3, −7, −7, −3, 0, 0}; {3, −3, 6, −1, 1, −5, −3, −7, −7, −4, 0, 0}; {3, −3, 6, −1, 1, −5, −3, −7, −6, −4, 0, 0}; {4, −2, 7, 0, 2, −4, −2, −7, −6, −4, 0, 0}; {4, −2, 7, 0, 2, −4, −2, −7, −6, −3, 0, 0}; {4, −2, 7, 0, 2, −3, −4, 6, −6, −2, 0, 0}; {8, −1, 5, −5, −5, 2, −2, 5, 4, 2, 0, 0}; {8, 0, 7, −2, −1, 7, 6, 0, −2, 0, 0, 0}; {, −3, 6, −2, 6, 8, 1, 1, −4, −4, −2, 0, 0}; {4, −3, 5, −3, 0, −2, −2, 0, 6, 7, 0, 0}; {, −4, −5, 2, 4, 2, 1, 2, −5, −7, 0, 0}; {, −3, 6, −2, 6, −6, −6, −5, −3, 7, 6, 0, 0}; {2, −5, 3, −5, 1, −4, −3, 0, 6, 7, 0, 0}; {2, −5, 3, −5, −1, −4, −3, 0, 7, 7, 0, 0}; {, −5, 4, −4, 4, −5, −5, 5, 4, −2, −2, 0, 0}; {, −6, 3, −5, 3, −6, −6, 5, 5, −3, −2, 0, 0}; {3, −4, 4, −4, 3, 4, −7, −6, 2, 2, 0, 0}; {2, −5, 3, −5, 2, 3, −7, −6, 1, 1, 0, 0}; {, −6, 3, −5, 3, −6, −5, 5, 4, −2, −2, 0, 0}; {, −3, 5, −4, 3, −7, −5, −5, 5, 1, −2, 0, 0}; {, −6, 3, −5, 3, −5, −5, 4, 3, −2, −2, 0, 0}; {8, −7, 1, −7, −7, 2, 2, −3, −2, 0, 0}; {, −7, 2, −6, 2, −6, −6, 4, 4, −3, −2, 0, 0}; {, −7, 2, −6, 2, −6, −6, 5, 5, −3, −2, 0, 0}; {, −7, 2, −6, 2, −6, −6, 5, 6, −4, −2, 0, 0}; {, −5, 3, −6, 1, 8, −6, −6, 4, 0, −3, 0, 0}; {, −7, 2, −6, 2, −5, −5, 5, 5, −3, −2, 0, 0}; {8, 1, −7, 1, −6, −6, 4, 4, −3, −2, 0, 0}; {8, 1, −7, 1, −6, −6, 5, 5, −4, −3, 0, 0}; {8, 1, −7, 1, −6, −6, 5, 6, −4, −2, 0, 0}; {5, −2, 6, −2, 7, 7, 4, 4, 8, −7, 0, 0}; {7, 0, 8, 0, −6, 6, 5, −3, 0, 3, 0, 0}; {6, −1, 7, −1, −7, −7, 3, 3, −4, −3, 0, 0}; {5, −2, 6, −2, 8, 8, 3, 3, −4, −3, 0, 0}; {3, −4, 4, −4, 6, 6, 2, 3, −6, −4, 0, 0}; {4, −3, 5, −2, 8, 5, 4, −5, −2, 2, 0, 0}; {, −2, 6, −3, 5, −2, −3, 6, 5, −1, −1, 0, 0}; {4, −3, 5, −2, −7, 5, 5, −4, −1, 2, 0, 0}; {3, −4, 4, −3, 8, 4, 4, −5, −2, 2, 0, 0}; {1, −6, 2, −5, 6, 3, 3, −6, −2, 1, 0, 0}; {, −5, 3, −6, 2, −4, −5, 7, 6, −3, −3, 0, 0}; {1, −6, 2, −5, 7, 3, 3, −6, −3, 1, 0, 0}; {6, −1, 7, 0, −4, −1, 0, −1, 5, 6, 0, 0}; {1, 7, −4, 2, −4, 5, −1, −4, −4, −5, 0, 0}; {, −6, 2, −7, 1, −3, 8, 6, −2, 0, 2, 0, 0}; {, −1, 8, 0, −7, 6, 2, 2, −6, −3, 0, 0, 0}; {, −4, 4, −5, 3, 0, −7, 8, 1, 0, −1, 0, 0}; {4, −3, 5, −2, −4, −1, −1, −2, 5, 6, 0, 0}; {, −5, 3, −6, 2, 0, −7, 7, 0, 0, 0, 0, 0}; {, −6, 2, −7, 1, −1, 8, 7, 0, −1, −1, 0, 0}; {, −6, 2, −7, 1, −1, 8, 7, 0, −1, 0, 0, 0}; {, −1, 8, 0, −7, 8, 2, 2, −4, −3, −2, 0, 0}; {, −1, 8, 0, −7, 8, 2, 2, −4, −3, −1, 0, 0}; {5, −4, 2, −7, 7, −1, −4, 4, 2, 1, 0, 0}; {, −6, 2, −7, 1, 0, −7, 7, 0, 0, −1, 0, 0}; {7, −1, 6, −2, −3, 6, 6, 0, −2, −1, 0, 0}; {1, 7, −4, 2, 0, 7, 2, 8, 6, 3, 0, 0}; {1, 8, −2, 5, 4, −4, −6, 3, 0, 1, 0, 0}; {6, −2, 5, −3, −3, 6, 5, −1, −2, 0, 0, 0}; {0, 7, −3, 4, 3, −5, −7, 3, 0, 1, 0, 0}; {0, 7, −3, 4, 3, −5, −7, 3, 0, 2, 0, 0}; {, −5, 4, −4, 5, 8, −7, −6, −4, 7, 6, 0, 0}; {, −7, 2, −6, 3, 6, 8, −7, −4, 7, 6, 0, 0}; {5, −2, 6, −1, 2, 7, −1, −3, −6, −5, 0, 0}; {4, −3, 5, −2, 1, 6, −1, −3, −6, −5, 0, 0}; {0, −7, 1, −6, −3, −5, −4, −1, 7, 8, 0, 0}; {, −3, 6, −2, 7, −5, −6, −5, −3, 7, 7, 0, 0}; {, −4, 5, −3, 6, −6, −6, −5, −3, 7, 6, 0, 0}; {, −6, 3, −5, 4, 8, 8, −6, −4, 6, 6, 0, 0}; {, −3, 6, −2, 7, −4, −6, −5, −2, 6, 6, 0, 0}; {, −5, 4, −4, 5, −6, −7, −6, −3, 6, 6, 0, 0}; {, −6, 3, −5, 4, −7, 8, −6, −4, 6, 6, 0, 0}; {6, −2, 5, −3, 2, −1, −2, 0, −6, −7, 0, 0}; {, −5, 4, −4, 5, −5, −7, −7, −4, 8, 7, 0, 0}; {, −3, 5, −4, 4, −7, −4, −3, 5, 2, −1, 0, 0}; {, −5, 3, −6, 2, 8, 7, −3, −3, 3, 3, 0, 0}; {, −1, −7, 2, −4, 4, 5, 1, 3, −6, −2, 0, 0}; {, −4, 4, −5, 3, −7, −7, −2, −2, 4, 3, 0, 0}; {4, −3, 5, −2, 5, 6, 2, 2, −5, −4, 0, 0}; {2, −6, 1, −7, 0, −1, 8, 6, 0, −1, 0, 0}; {7, −1, 6, −2, 5, 5, −4, −4, 2, 1, 0, 0}; {8, 0, 7, −1, 7, 7, −4, −4, 3, 2, 0, 0}; {, −4, 5, −3, 6, −1, 0, 7, −6, −2, 1, 0, 0}; and {2, −6, 1, −7, 1, 1, 8, 6, 2, −1, 0, 0}.

An equivalent sequence of a sequence in the foregoing sequence sets may be expressed as $\{q_n\}$. An element $q_n$ in the equivalent sequence $\{q_n\}$ meets $q_n = s_n + u_n \pmod{M}$.

In specific implementation, a sequence $\{u_n\}$ including $u_n$ includes:

$u_n=f+g\cdot n(\text{mod } M)$, where n=0, 1, . . . , and N−1, N is a sequence length, $f\in\{0, 1, 2, \ldots, M-1\}$, $g\in\{0, 1, 2, \ldots, M-1\}$, and M=12.

Herein, an equivalent sequence of $\{s_n\}$ is $\{q_n\}$. Therefore, a difference between a sequence $\{u\cdot e^{2\pi j s_n/M}\}$ and a sequence $\{u\cdot e^{2\pi j q_n/M}\}$ is a constant, or a constant and transformation of a cyclic shift, so that maximum values of absolute values of cyclic shift autocorrelation values of the two sequences are 1.

When M=16, an equivalent sequence has a same definition, but M=16 instead of 12, that is, an equivalent sequence of a sequence in the foregoing sequence sets may be expressed as $\{q_n\}$. An element $q_n$ in the equivalent sequence $\{q_n\}$ meets $q_n=s_n+u_n(\text{mod } M)$, where M=16.

In specific implementation, a sequence $\{u_n\}$ including $u_n$ includes:

$u_n=f+g\cdot n(\text{mod } M)$, where n=0, 1, . . . , N−1, N is a sequence length, $f\in\{0, 1, 2, \ldots, M-1\}$, $g\in\{0, 1, 2, \ldots, M-1\}$, and M=16.

Figure 2:
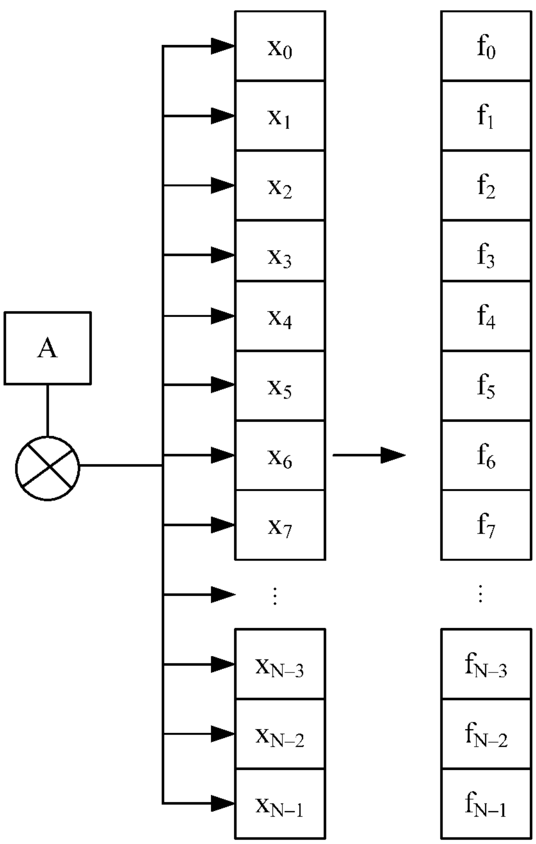
FIG. 2 is a schematic flowchart of determining a sequence $\{f_n\}$ by a terminal device according to an embodiment of this application.

In one embodiment, a process in which after accessing the network, the terminal device determines the sequence $\{f_n\}$ including the N elements may be shown in FIG. 2. A specific procedure is as follows:

The terminal device determines the sequence $\{x_n\}$ and A. A value of n ranges from 0 to N−1, and A is a non-zero complex number. The sequence $\{x_n\}$ may be stored in the terminal device, or may be configured by the network device for the terminal device, or may be obtained by the terminal device through calculation according to a predefined formula. For example, the sequence $\{x_n\}$ is obtained by using the foregoing disclosed element $x_n$ in $\{x_n\}$, where $x_n=u\cdot e^{2\pi\cdot j\cdot s_n/M}$, and M=12. A sequence $\{f_n=A\cdot x_n\}$ is obtained by multiplexing A and $x_n$. A value range of A is $\{1, -1, j, -j\}$.

In operation S102, the terminal device maps the sequence $\{f_n\}$ including the N elements to N subcarriers to generate a first signal, and sends the first signal to a network device.

Herein, operation S102 is mainly performed as follows: The terminal device respectively maps the N elements in the configured sequence $\{f_n\}$ to the N subcarriers to generate the first signal, and sends the first signal to the network device.

Figure 3:
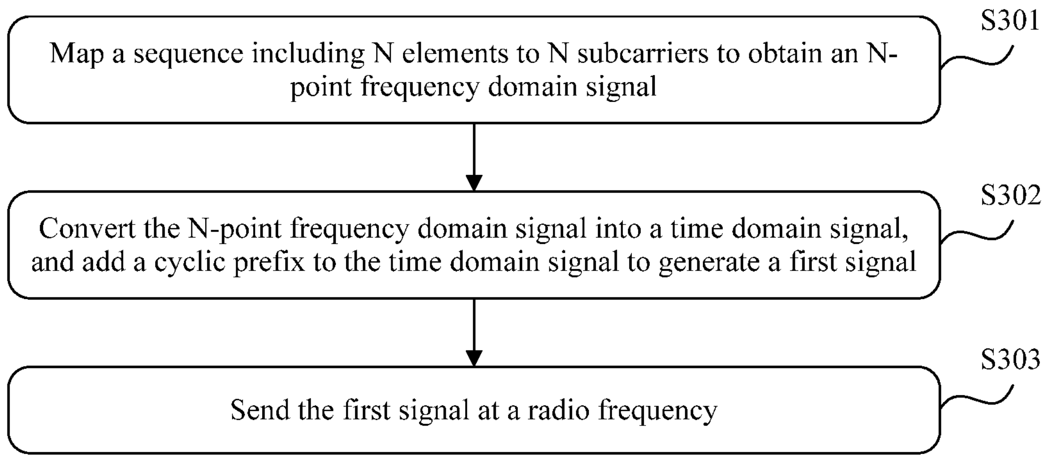
FIG. 3 is a schematic flowchart of generating and sending a first signal by a terminal device according to an embodiment of this application.

In one embodiment, a specific process in which the terminal device maps the sequence $\{f_n\}$ including the N elements to N subcarriers to generate a first signal, and sends the first signal to a network device is shown in FIG. 3 and includes the following operations.

S301. The terminal device maps the sequence $\{f_n\}$ including the N elements to the N subcarriers to obtain an N-point frequency domain signal (namely, a frequency domain signal including the N elements).

Figure 4A:
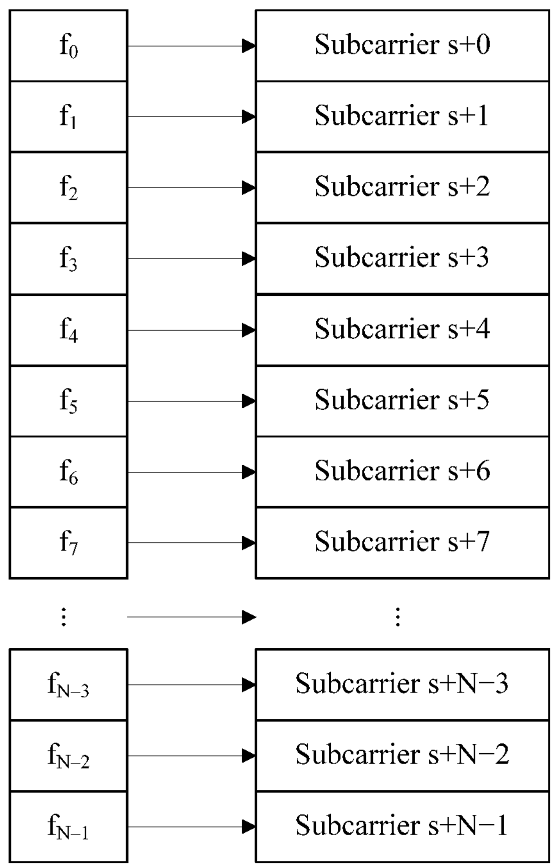
FIG. 4*a* and FIG. 4*b* are schematic diagrams of mapping a sequence $\{f_n\}$ including N elements to N subcarriers according to an embodiment of this application.
Figure 4B:
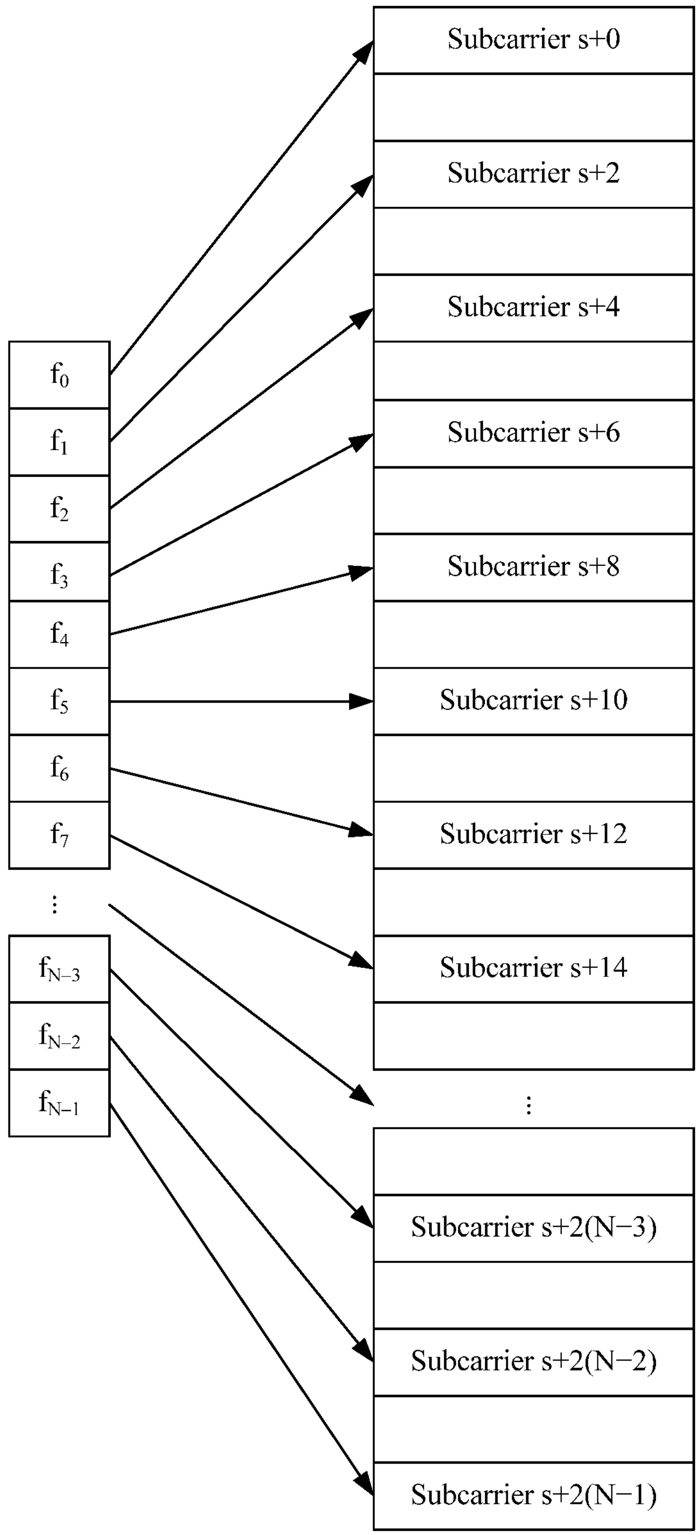

In FIG. 4*a* and FIG. 4*b* disclosed in the following embodiment of this application, s denotes an index of a first subcarrier, in subcarriers in a communications system, in the N subcarriers to which the sequence $\{f_n\}$ is mapped.

In one embodiment, the terminal device maps the sequence $\{f_n\}$ including the N elements to N consecutive subcarriers. As shown in FIG. 4*a*, elements $f_0$ to $f_{N-1}$ in the sequence $\{f_n\}$ are respectively mapped to N consecutive subcarriers, and the subcarriers are numbered s+0, s+1, . . . , s+N−1.

In one embodiment, the terminal device sequentially maps the N elements in the sequence $\{f_n\}$ to the N subcarriers in descending order of the subcarriers. One element in the sequence $\{f_n\}$ is mapped to one frequency domain subcarrier. The frequency domain subcarrier is a minimum unit of a frequency domain resource, and is used to carry data information.

In one embodiment, the terminal device sequentially maps the N elements in the sequence $\{f_n\}$ to the N subcarriers in ascending order of the subcarriers. Mapping one element in the sequence $\{f_n\}$ to one subcarrier means that the element is carried on the subcarrier. After the mapping, when the terminal device sends data at a radio frequency, it is equivalent to that the element is sent on the subcarrier. In the communications system, different terminal devices may occupy different subcarriers to send data. Locations of the N subcarriers in a plurality of subcarriers in the communications system may be predefined or may be configured by the network device by using signaling.

In one embodiment, the N elements in the sequence $\{f_n\}$ may be respectively mapped to N equally spaced subcarriers. As shown in FIG. 4*b*, a spacing between the N subcarriers is 1, and the N subcarriers are equally spaced in frequency domain. A spacing between subcarriers to which elements $f_0$ to $f_{N-1}$ in the sequence $\{f_n\}$ is one subcarrier. Specifically, the N elements in the sequence $\{f_n\}$ are respectively mapped to the N equally spaced subcarriers, and the subcarriers are numbered s+0, s+2, . . . , and s+2(N−1).

In this embodiment of this application, a manner of respectively mapping the N elements in the sequence $\{f_n\}$ to the N subcarriers is not limited to the foregoing manners.

S302. Transform the N-point frequency domain signal into a time domain signal through inverse fast Fourier transformation (inverse fast Fourier transformation, IFFT), and add a cyclic prefix to the time domain signal to generate the first signal.

S303. Send the first signal at a radio frequency.

In one embodiment, during execution of S302, the time-domain signal obtained by the terminal device by performing IFFT on the generated N-point frequency domain signal is an OFDM symbol. When performing S303, the terminal device sends the first signal at the radio frequency. In other words, the terminal device sends, on the N subcarriers, the first signal that carries the sequence $\{f_n\}$.

In one embodiment, the terminal device may send, on one OFDM symbol, the first signal that carries the sequence $\{f_n\}$, or may send, on a plurality of OFDM symbols, the first signal that carries the sequence $\{f_n\}$.

In one embodiment, the first signal is a reference signal. Specifically, the first signal may be UCI and a DMRS, or may be acknowledgment (ACK) information, or negative acknowledgment (NACK) information, or uplink scheduling request (SR) information. In this embodiment of this application, the first signal includes but is not limited to only the foregoing information.

In one embodiment, the first signal is a signal used to carry communication information. In specific implementation, the communication information may be carried through sequence selection or may be carried through sequence modulation, but a manner of carrying the communication information is not limited thereto.

In one embodiment, in the sequence selection manner, $2^n$ orthogonal sequences are allocated to one terminal device. The $2^n$ orthogonal sequences may be obtained by performing $2^n$ cyclic shifts on one root sequence, and the $2^n$ orthogonal sequences can carry n-bit information. For example, the $2^n$ orthogonal sequences are four sequences numbered 0, 1, 2, and 3. 00 corresponds to the sequence 0, 01 corresponds to the sequence 1, 10 corresponds to the sequence $\{2\}$, and 11 corresponds to the sequence 3. In this case, the four sequences can carry 2-bit information.

It should be noted that for the sequence selection manner, different cyclic shifts are indicated by using different values of a in the sequence $\{f_n\}$. In one embodiment, a may carry different pieces of information.

In one embodiment, in the sequence modulation manner, one sequence is allocated to one user, and a modulation symbol is generated for information that needs to be transmitted by the user. The modulation symbol includes but is not limited to a BPSK symbol, a QPSK symbol, an 8QAM symbol, a 16QAM symbol, and the like. The modulation symbol is multiplied by the sequence to generate an actual to-be-sent sequence. For example, one BPSK symbol may be 1 or −1. For one sequence $\{f_n\}$, a to-be-sent sequence may be $\{f_n\}$ or $\{, -f_n\}$ after modulation is performed based on the BPSK symbol.

In one embodiment, according to descriptions corresponding to FIG. 2 in the specification, after accessing the network, the terminal device may determine, based on A and the sequence $\{x_n\}$, the sequence $\{f_n\}$ that includes the N elements and that is configured by the network device.

It should be noted that for the sequence modulation manner, different pieces of information are carried by using different values of A in the sequence $\{f_n\}$.

In one embodiment, A may be a modulation symbol. In this case, A is obtained after a data information bit or a control information bit is modulated. A is carried on the N elements included in the sequence $\{f_n\}$, and A does not vary with n.

In one embodiment, A is a constant. For example, A=1. For example, A may be a symbol known to both the terminal device and the network device. Alternatively, A may indicate an amplitude.

It should be noted that, that A is a constant in a transmission time unit does not mean that A is fixed, and A may change when the first signal is sent at different moments. For example, all the N elements included in the sequence $\{f_n\}$ or the sequence $\{x_n\}$ are a reference signal, and A is an amplitude of the reference signal. When the terminal device sends the first signal for a first time, the terminal device may send the first signal based on A=1. When the terminal device sends the first signal for a second time, the terminal device may send the first signal based on A=2.

In operation S103, network device receives the first signal carried on the N subcarriers, to obtain the N elements in the sequence $\{f_n\}$.

It can be learned from operation S102 that the first signal is generated by respectively mapping the N elements in the sequence $\{f_n\}$ including the N elements to the N subcarriers. For detailed descriptions of the sequence $\{f_n\}$, refer to corresponding descriptions in operation S101 and operation S102. Details are not described herein again.

In one embodiment, during execution of operation S103, a process in which the network device receives the first signal carried on the N subcarriers is as follows: The time domain signal is obtained and the cyclic prefix is removed. Then M-point FFT is performed on a signal obtained after the cyclic prefix is removed, to obtain the N-point frequency domain signal, where M is greater than or equal to N. Then the terminal device receives the first signal carried on the N subcarriers. The first signal is the sequence $\{f_n\}$ including the N elements. For example, the receiving device receives the signal on the N subcarriers based on the locations that are of the N subcarriers in subcarriers in the communications system and that are predefined or are configured by a base station.

In one embodiment, after accessing the network, the terminal device sends a PUCCH by using the configured sequence $\{f_n\}$, and the network device receives the PUCCH by using the sequence $\{f_n\}$ configured for the terminal device.

In operation S104, the network device processes the first signal based on the N elements in the sequence $\{f_n\}$.

Figure 5:
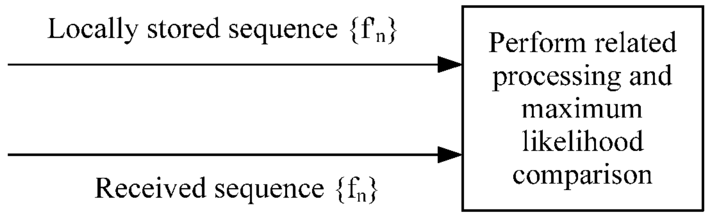
FIG. 5 is a schematic diagram of processing a first signal by a network device according to an embodiment of this application.

In one embodiment, FIG. 5 is a schematic diagram of a process in which the network device processes the first signal. The network device obtains all sequences by traversing a locally stored sequence $\{f'_n\}$, and separately performs related processing and maximum likelihood comparison on the obtained sequence $\{f_n\}$ and all the sequences of the sequence $\{f'_n\}$, to obtain data transmitted by the terminal device.

With reference to descriptions corresponding to operation S102 in the specification, a value combination of 2-bit information is $\{(0, 0), (0, 1), (1, 0), (1, 1)\}$. With reference to FIG. 2, when the two-bit information is (0, 0), the obtained sequence $\{f'_n\}$ is a sequence $\{f'_{1,n}\}$; when the two-bit information is (0, 1), the obtained sequence $\{f'_n\}$ is a sequence $\{f'_{2,n}\}$; when the two-bit information is (1, 0), the obtained sequence $\{f'_n\}$ is a sequence $\{f'_{3,n}\}$; and when the two-bit information is (1, 1), the obtained sequence $\{f'_n\}$ is a sequence $\{f'_{4,n}\}$. The four sequences $\{f'_{1,n}\}$, $\{f'_{2,n}\}$, $\{f'_{3,n}\}$, and $\{f'_{4,n}\}$, may be cyclic shift sequences of a same sequence, and the sequence $\{f_n\}$ is separately correlated to $\{f'_{1,n}\}$, $\{f'_{2,n}\}$, $\{f'_{3,n}\}$ and $\{f'_{4,n}\}$ to obtain four correlation values. A value of 2-bit information corresponding to a largest correlation value is the data obtained by the network device. For example, if the largest correlation value is obtained through a correlation between the sequences $\{f_n\}$ and $\{f'_{1,n}\}$, the 2-bit information is (0, 0).

According to the sequence-based signal processing method disclosed in this embodiment of this application, a sequence meeting a requirement for sending a signal by using a PUCCH is determined. The sequence is the sequence $\{f_n\}$ including the N elements, and $f_n$ is an element in the sequence $\{f_n\}$. The determined sequence $\{f_n\}$ is a sequence that meets the preset condition, and the preset condition is $f_n=A\cdot x_n\cdot e^{2\pi\cdot j\cdot a\cdot n}$, where the value of n ranges from 0 to N−1, A is a non-zero complex number, a is a real number and indicates a cyclic shift of the signal, $j=\sqrt{-1}$, for the element $x_n$, $x_n=u\cdot e^{2\pi\cdot j\cdot s_n/M}$, M=12, and u is a non-zero complex number. The set that includes the sequence $\{s_n\}$ including the element $s_n$ includes at least one of the sequences in the first sequence set or at least one of the equivalent sequences of the sequences in the first sequence set, or at least one of sequences in a second sequence set or at least one of equivalent sequences of the sequences in the second sequence set. Then the N elements in the sequence $\{f_n\}$ are respectively mapped to the N subcarriers to generate and send the first signal. With the determined sequence, when the signal is sent by using the PUCCH, a low cross-correlation between sequences can be maintained, and a relatively small PAPR value and a relatively small CM value can be maintained. Therefore, a requirement in a communications application environment in which the signal is sent by using the PUCCH is met.

Further, according to the sequence-based signal processing method disclosed in this embodiment of this application, for the sequence $\{s_n\}$ related to the sequence $\{f_n\}$ including the N elements that is determined in operation S101, the set that includes the sequence $\{s_n\}$ including the element $s_n$ includes at least a first sequence in the second sequence set or an equivalent sequence of the first sequence, and a second sequence in the second sequence set or an equivalent sequence of the second sequence. In other words, the set that includes the sequence $\{s_n\}$ including the element $s_n$ includes at least two non-equivalent sequences in the sequences in the second sequence set and the equivalent sequences of the sequences in the second sequence set. To be specific, the set that includes the sequence $\{s_n\}$ including the element $s_n$ includes at least two sequences in the second sequence set, or the set that includes the sequence $\{s_n\}$ including the element $s_n$ includes at least one sequence in the second sequence set and one equivalent sequence of another sequence in the second sequence set, or the set that includes the sequence $\{s_n\}$ including the element $s_n$ includes at least one equivalent sequence of one sequence in the second sequence set and one equivalent sequence of another sequence in the second sequence set. Herein, when the sequences in the first sequence set and the second sequence set overlap, one of the first sequence and the second sequence may be a sequence in the first sequence set, or neither the first sequence nor the second sequence is a sequence in the first sequence set.

The second sequence set is one of the following sets: a sequence set 1, a sequence set 2, a sequence set 3, a sequence set 4, a sequence set 5, a sequence set 6, a sequence set 7, a sequence set 8, a sequence set 9, a sequence set 10, a sequence set 11, a sequence set 12, a sequence set 13, and a sequence set 14. The sequence $\{s_n\}$ including the element $s_n$ is equivalent to the sequence $\{s_n\}$. A cross-correlation between $\{f_n\}$ determined based on sequences in each sequence set is relatively low. Therefore, if sequences include at least two non-equivalent sequences in sequences in a sequence set or at least two non-equivalent sequences in equivalent sequences of the sequences in the sequence set, it can be ensured that a correlation between the sequences is relatively low. In addition, a cross-correlation between an LTE sequence and a sequence in sequence sets 1 to 6 is relatively low, so that interference is reduced when an LTE system and a 5G system coexist.

Peak-to-average ratios of sequences $\{f_n\}$ corresponding to the sequences in the second sequence set are all less than 2.5 dB.

The sequence set 1 (which is marked as sh1_lte) includes some or all of the following 30 sequences, and PAPRs of sequences corresponding to the sequences are less than 2.1 dB. The 30 sequences are as follows:

{6, 2, −3, −3, 3, −3, 1, 2, 4, 0, 0, 0}; {1, −4, 2, −3, −1, −2, −3, 0, 5, 6, 0, 0}; {5, −5, 0, 6, 3, −5, 5, −4, 6, 5, 0, 0}; {2, 1, 3, −4, 5, −2, 5, 0, 1, 5, 0, 0}; {, −3, 2, 2, 6, −1, −5, 3, 3, 0, 3, 0, 0}; {, −1, −3, 6, 0, 3, −1, 2, 3, 3, −4, 0, 0}; {, −2, 2, 6, 6, −1, 5, 0, −1, −4, 1, 0, 0}; {, −4, 4, 3, −2, 1, 5, −1, −4, −1, −2, 0, 0}; {, −1, 2, −4, 2, −4, −4, −1, −2, 4, 2, 0, 0}; {3, −3, 0, 6, 5, 1, 4, 1, −3, −2, 0, 0}; {1, 4, −1, −3, −1, −4, 5, −2, −2, −5, 0, 0}; {, −3, 5, −3, 4, −2, −4, 6, 4, −5, −4, 0, 0}; {, −4, −5, 2, 1, 6, −3, 3, −3, 1, −1, 0, 0}; {4, −4, −3, 3, −3, 5, −4, −5, −5, 4, 0, 0}; {3, 6, −1, 5, 0, −2, 0, −2, −4, −5, 0, 0}; {5, 2, −2, 3, 1, 1, −4, −2, 5, −3, 0, 0}; {3, 0, −3, 3, −3, −1, −3, 5, −4, −1, 0, 0}; {3, 5, 0, 3, −4, 4, 2, −5, 5, −1, 0, 0}; {4, 2, −4, 4, 1, 5, −4, 4, 6, 0, 0, 0}; {2, −4, −5, 1, 1, −5, 2, 6, 1, 1, 0, 0}; {6, 1, 0, −2, 3, −5, −2, −3, 2, −2, 0, 0}; {, −2, 1, 0, 3, −3, −1, 5, −2, −5, 4, 0, 0}; {, −3, 1, −4, 3, 6, −2, −3, 5, 1, −1, 0, 0}; {2, −3, 4, −4, −5, 6, −1, −1, 3, 5, 0, 0}; {1, −4, 1, 0, 2, −2, 2, 5, −5, 4, 0, 0}; {, −3, 1, −5, −2, −2, 3, −1, 6, 5, 1, 0, 0}; {5, 1, −4, 2, −4, −1, 1, 0, 3, 4, 0, 0}; {2, −4, 0, −2, 6, 6, 1, −4, −2, 0, 0, 0}; {, −3, 6, −2, −5, −4, 2, −2, 1, 4, 6, 0, 0}; and {, −1, 6, 2, −2, 3, −4, 0, 3, 3, 3, 0, 0}.

The sequence set 2 (which is marked as sh2_lte) includes some or all of the following sequences, and PAPRs of sequences corresponding to the sequences are less than 2.2 dB. The sequences are as follows:

{6, 2, −3, −3, 3, −3, 1, 2, 4, 0, 0, 0}; {6, 0, −5, 1, 0, 2, 0, 0, 5, 5, 0, 0}; {6, −3, 1, −5, −2, −5, 3, −4, 6, 1, 0, 0}; {, −4, 2, 2, −4, 6, −1, 4, −1, 0, 0, 0, 0}; {, −3, −5, −1, −5, 4, 3, −3, −1, 5, −2, 0, 0}; {, −5, −2, 4, 4, −2, 3, 0, −2, −4, 0, 0, 0}; {, −2, −3, 5, −1, −2, 3, −4, 3, −5, 0, 0, 0}; {4, 2, −4, 2, 5, 1, 6, 5, 5, 6, 0, 0}; {, −2, −1, 1, −5, 3, 6, 2, 0, −1, 6, 0, 0}; {5, −4, 1, 6, 1, −1, 1, 0, 6, 3, 0, 0}; {, −3, 5, 4, 3, −3, 2, 5, −5, 0, −3, 0, 0}; {0, 2, 5, −2, 5, 3, 3, −3, 4, 0, 0, 0}; {4, −1, 4, 4, −1, 0, −4, 5, −2, 0, 0, 0}; {6, 1, −5, 4, 4, −1, 3, −5, −4, 0, 0, 0}; {4, −1, 1, −2, 6, −3, −5, −1, −1, −5, 0, 0}; {3, −3, 2, 4, −3, 5, 3, 4, −1, −2, 0, 0}; {, −3, 1, −1, 1, 5, 1, −3, 5, 3, 4, 0, 0}; {, −5, 6, −3, −5, 3, −1, 2, −2, 3, 6, 0, 0}; {, −3, 1, −3, 6, −4, 6, 5, −1, −5, −4, 0, 0}; {6, −2, −2, 2, 3, −2, 3, −3, 3, 2, 0, 0}; {, −1, −5, 4, −4, 3, 5, 0, 6, −5, −1, 0, 0}; {, −2, −3, 2, 6, 1, −5, −3, 3, 1, −2, 0, 0}; {, −3, −5, 0, −2, 2, 4, −3, 2, 5, 2, 0, 0}; {4, −5, −5, −1, 4, −1, 2, 0, −2, 5, 0, 0}; {2, −1, −5, 2, 6, 3, 2, 2, −5, −2, 0, 0}; {3, 0, −5, 0, −5, −2, 1, 0, 3, 4, 0, 0}; {, −1, 4, 1, −5, −3, 3, 4, −1, 0, −2, 0, 0}; {, −5, 5, −3, 6, −4, 1, −3, 1, 4, 6, 0, 0}; {, −5, 4, −2, 2, −3, −1, 3, 3, −1, −2, 0, 0}; and {0, 4, 0, −4, 2, −2, −2, 6, −4, 0, 0, 0}.

The sequence set 3 (which is marked as sh5_lte) includes some or all of the following sequences, and PAPRs of sequences corresponding to the sequences are less than 2.5 dB. The sequences are as follows:

{6, 2, −3, −3, 3, −3, 1, 2, 4, 0, 0, 0}; {4, 5, 6, −2, 3, −1, 4, −1, −2, 4, 0, 0}; {2, −5, 3, −4, 3, 3, 6, −5, 4, 5, 0, 0}; {5, 1, 1, 6, −1, 2, −2, −5, −3, −3, 0, 0}; {0, 4, 4, 2, 2, −3, −1, 4, −2, −5, 0, 0}; {, −5, 4, 0, −5, −5, 5, −5, 2, 5, −2, 0, 0}; {6, −4, 2, −4, −1, 4, 1, −5, 3, 0, 0, 0}; {, −3, 5, −4, 2, 2, −2, 2, −1, −4, −3, 0, 0}; {, −2, −3, 3, 1, −4, −3, 4, −4, 2, −2, 0, 0}; {3, −1, −3, 1, 2, 5, 3, −5, 1, 4, 0, 0}; {, −1, 4, −4, −5, 1, 4, 2, −1, −3, 2, 0, 0}; {, −3, 3, 5, 0, −4, 1, −2, −4, −3, −4, 0, 0}; {2, −4, 2, 1, 6, 4, −5, −1, 3, 1, 0, 0}; {3, −3, −4, −1, 3, −2, −5, −5, −1, 4, 0, 0}; {, −5, 2, 6, 3, 4, 6, −1, 0, −3, 6, 0, 0}; {6, 6, −3, −5, 3, −2, 2, −4, 3, 5, 0, 0}; {4, −5, 0, −5, −4, 0, 2, 1, 5, 1, 0, 0}; {3, −2, 2, 5, 5, 5, 6, 1, 6, 4, 0, 0}; {0, 1, 6, −1, 6, 3, 4, −1, −2, 2, 0, 0}; {, −3, −5, −2, −4, 4, −4, 1, 6, −4, 6, 0, 0}; {, −3, −1, 6, −2, 3, 1, 0, 5, 3, −2, 0, 0}; {3, −5, 3, −1, −5, 6, 2, 5, −2, 0, 0, 0}; {3, 6, 2, 5, −5, 2, −2, 5, 5, 5, 0, 0}; {, −4, 5, −2, 0, 6, −4, 5, 2, −3, 0, 0, 0}; {1, 3, 2, 6, 0, −5, −1, −1, 5, 3, 0, 0}; {4, −5, 4, −2, −2, 3, −2, 1, 4, 3, 0, 0}; {, −1, −1, −3, 1, −5, 4, 1, −1, 5, −3, 0, 0}; {, −3, 4, −3, 1, 5, 2, −1, 0, −2, −4, 0, 0}; {, −5, 4, 6, 4, −3, 0, −4, 2, 2, −4, 0, 0}; and {3, −1, 5, −5, 6, −1, 2, 1, 0, 4, 0, 0}.

The sequence set 4 (which is marked as seq_out22_1{10}) includes some or all of the following sequences, and PAPRs of sequences corresponding to the sequences are less than 2.2 dB. The sequences are as follows:

{0, −2, 4, 2, −4, −3, −4, −4, −4, 2, −5, −1}; {, −2, −2, −5, 6, 0, 5, −1, 4, −3, −3, 0, 0}; {, −1, 6, 0, −4, −4, 2, 6, −4, −2, 1, 0, 0}; {, −2, 2, −2, 1, 5, −2, −2, 6, 4, −1, 0, 0}; {, −4, 0, −1, 6, 0, 1, −5, 3, 5, 1, 0, 0}; {6, 5, 1, −5, −5, 0, 5, 1, 6, −1, 0, 0}; {3, −4, 3, −4, 5, 5, 2, 2, −4, −3, 0, 0}; {5, −1, 6, 6, 5, 2, −5, 4, 6, −4, 0, 0}; {, −4, 1, −5, 4, −4, −5, −4, −2, 5, 4, 0, 0}; {, −1, 5, −4, 6, 1, 6, 4, −4, −3, 3, 0, 0}; {1, −5, 2, 1, 5, 0, 1, −3, −5, −4, 0, 0}; {, −5, 2, 6, −5, −4, −2, 4, −3, 5, 3, 0, 0}; {0, 0, 1, 6, 3, −1, 4, 6, 1, 5, 0, 0}; {, −4, −5, 0, −2, −4, −3, 3, 6, 2, −5, 0, 0}; {5, 1, 2, 6, 0, 2, −2, 6, −3, −4, 0, 0}; {3, −3, 2, 4, −3, 5, 3, 4, −1, −2, 0, 0}; {, −4, −1, −5, 1, 0, 5, 0, 3, 5, 4, 0, 0}; {6, −3, −2, 3, −3, 4, −3, −2, 6, 2, 0, 0}; {, −2, −3, 2, 6, 1, −5, −3, 3, 1, −2, 0, 0}; {, −3, 6, 1, −5, 1, 1, −1, 2, 5, −1, 0, 0}; {6, 1, −3, 3, −4, 0, 4, 6, 6, 5, 0, 0}; {, −5, 1, −4, −5, −1, 5, −5, −5, −4, 2, 0, 0}; {4, 2, 6, 4, 6, 0, −4, 0, 3, 6, 0, 0}; {, −5, −1, 0, 4, −2, 5, 2, 2, −2, 2, 0, 0}; {6, 3, −1, 5, −5, 3, 6, 5, 5, −2, 0, 0}; {1, −1, −5, 2, −4, −3, −2, 4, −4, 0, 0, 0}; {, −1, 0, 3, 1, 0, −5, −2, 5, 1, 6, 0, 0}; {, −3, 0, 6, 5, 0, 2, −4, 4, −1, −1, 0, 0}; {, −4, −1, −4, 1, −3, 2, 3, −3, 4, 3, 0, 0}; and {0, −4, −5, 1, −5, −2, 5, −4, −5, −1, 0, 0}.

The sequence set 5 (which is marked as seq_out25_1{1}) includes some or all of the following sequences, and PAPRs of these sequences are less than 2.5 dB. The sequences are as follows:

{0, 0, 8, 7, 6, 0, 6, 4, 9, 5, 7, 10}; {0, 0, 5, 2, 1, 2, 1, 9, 6, 10, 3, 8}; {0, 0, 1, 3, 11, 7, 11, 4, 5, 0, 0, 7}; {0, 0, 10, 5, 5, 10, 3, 9, 10, 10, 2, 9}; {0, 0, 3, 4, 11, 1, 7, 10, 5, 11, 6, 3}; {0, 0, 4, 8, 6, 2, 2, 11, 3, 4, 0, 5}; {0, 0, 2, 10, 4, 0, 11, 9, 6, 0, 3, 5}; {0, 0, 9, 2, 3, 1, 9, 1, 10, 5, 6, 9}; {0, 0, 7, 11, 5, 3, 6, 3, 0, 0, 4, 3}; {0, 0, 8, 8, 0, 10, 8, 2, 7, 2, 9, 0}; {0, 0, 4, 10, 2, 4, 7, 6, 10, 7, 5, 3}; {0, 0, 5, 2, 1, 5, 2, 5, 0, 10, 0, 7}; {0, 0, 3, 3, 7, 1, 5, 3, 1, 11, 7, 11}; {0, 0, 9, 5, 11, 11, 0, 4, 8, 3, 6, 7}; {0, 0, 2, 11, 10, 4, 6, 9, 3, 8, 2, 9}; {0, 0, 9, 0, 5, 10, 10, 10, 3, 11, 5, 3}; {0, 0, 9, 8, 2, 5, 0, 6, 7, 11, 9, 2}; {0, 0, 1, 10, 1, 8, 11, 3, 2, 8, 7, 2}; {0, 0, 1, 6, 11, 3, 10, 7, 4, 11, 2, 1}; {0, 0, 11, 7, 8, 4, 11, 10, 2, 2, 9, 2}; {0, 0, 4, 8, 10, 3, 11, 4, 2, 2, 11, 6}; {0, 0, 6, 7, 5, 5, 0, 4, 6, 3, 10, 4}; {0, 0, 2, 7, 6, 4, 11, 8, 5, 9, 4, 7}; {0, 0, 7, 11, 10, 11, 4, 3, 7, 0, 8, 8}; {0, 0, 1, 5, 9, 2, 10, 3, 0, 8, 4, 4}; {0, 0, 0, 1, 10, 8, 5, 0, 4, 9, 10, 2}; {0, 0, 9, 5, 10, 0, 5, 1, 6, 6, 8, 4}; {0, 0, 11, 4, 1, 7, 8, 1, 3, 9, 0, 9}; {0, 0, 1, 9, 0, 1, 6, 1, 8, 8, 5, 0}; and {0, 0, 8, 10, 0, 7, 2, 0, 4, 8, 6, 9}.

The sequence set 6 (which is marked as seq_out25_1{2}) includes some or all of the following sequences, and PAPRs of these sequences are less than 2.5 dB. The sequences are as follows:

{0, 0, 8, 4, 6, 1, 9, 1, 1, 8, 0, 0}; {0, 0, 1, 9, 2, 5, 4, 8, 5, 1, 0, 6}; {0, 0, 10, 1, 8, 1, 4, 5, 10, 10, 4, 1}; {0, 0, 3, 6, 5, 2, 7, 4, 3, 1, 7, 0}; {0, 0, 2, 11, 11, 5, 6, 2, 5, 10, 6, 1}; {0, 0, 3, 3, 11, 8, 5, 7, 3, 6, 11, 4}; {0, 0, 8, 11, 9, 4, 11, 2, 6, 5, 5, 10}; {0, 0, 11, 6, 1, 0, 4, 7, 10, 5, 8, 4}; {0, 0, 6, 10, 2, 1, 4, 0, 8, 8, 11, 8}; {0, 0, 10, 11, 0, 2, 6, 10, 8, 3, 10, 3}; {0, 0, 9, 3, 10, 3, 4, 1, 4, 9, 10, 1}; {0, 0, 7, 5, 0, 9, 2, 9, 3, 6, 4, 5}; {0, 0, 0, 4, 8, 11, 9, 6, 10, 5, 0, 11}; {0, 0, 11, 9, 4, 9, 3, 9, 3, 4, 8, 8}; {0, 0, 8, 3, 3, 2, 4, 10, 2, 0, 8, 0}; {0, 0, 3, 8, 2, 2, 9, 7, 6, 2, 6, 3}; {0, 0, 4, 11, 11, 0, 11, 9, 3, 5, 2, 8}; {0, 0, 6, 5, 8, 6, 6, 8, 1, 6, 11, 7}; {0, 0, 6, 9, 6, 10, 5, 9, 8, 1, 11, 9}; {0, 0, 11, 1, 3, 9, 8, 5, 1, 6, 0, 8}; {0, 0, 7, 8, 2, 1, 9, 4, 9, 7, 8, 10}; {0, 0, 2, 0, 8, 9, 6, 10, 3, 9, 9, 2}; {0, 0, 4, 0, 6, 1, 9, 7, 6, 2, 5, 8}; {0, 0, 10, 7, 3, 8, 3, 7, 6, 8, 11, 4}; {0, 0, 10, 2, 3, 8, 9, 10, 6, 1, 7, 0}; {0, 0, 7, 6, 9, 3, 3, 1, 3, 5, 1, 5}; {0, 0, 4, 1, 8, 3, 5, 3, 2, 9, 11, 4}; {0, 0, 6, 9, 11, 3, 11, 3, 0, 1, 9, 4}; {0, 0, 3, 8, 10, 7, 4, 3, 8, 4, 8, 6}; and {0, 0, 8, 8, 2, 8, 3, 10, 2, 0, 2, 4}.

The sequence set 7 (which is marked as seq_out20{2}) includes some or all of the following sequences, and PAPRs of these sequences are less than 2.0 dB. The sequences are as follows:

{0, 4, −4, −2, 4, 3, 0, −4, −2, −4, −1, −3}; {, −4, −1, 0, 5, −1, 6, −2, −2, −5, 3, 0, 0}; {, −5, 5, −1, 1, −2, 3, −4, 1, 1, −3, 0, 0}; {, −4, 2, −5, 3, 4, 6, 0, 0, −3, −5, 0, 0}; {, −1, 5, 0, −5, 3, 2, 2, −5, −2, 1, 0, 0}; {, −5, 0, −5, 1, 3, −4, −4, 2, 1, 0, 0, 0}; {1, −3, 0, −4, 1, −2, −4, 4, −5, −3, 0, 0}; {, −1, −3, 6, 0, 3, −1, 2, 3, 3, −4, 0, 0}; {1, 3, −3, 4, 6, −3, 2, 0, 5, 1, 0, 0}; {, −2, 2, 6, 6, −1, 5, 0, −1, −4, 1, 0, 0}; {2, −4, 3, −5, −5, 5, −2, 0, 4, 4, 0, 0}; {3, 3, 0, 1, −5, 0, 6, 2, −4, −4, 0, 0}; {5, 3, −1, 4, 4, −1, 4, −5, 5, −2, 0, 0}; {3, 3, −5, −5, 1, −3, 3, −4, 2, 3, 0, 0}; {, −2, 4, 5, 1, −2, 4, 4, −4, 1, −1, 0, 0}; {5, 1, 0, 5, −2, 2, −3, 6, −2, 0, 0, 0}; {, −5, −1, 6, 0, 6, 6, −4, −4, 6, 5, 0, 0}; {3, 2, 4, −3, 6, −1, 5, 0, 1, 5, 0, 0}; {, −5, 1, −5, 6, −1, 5, −5, 6, −5, 1, 0, 0}; {2, −1, 4, −1, 6, 5, 1, 2, −4, −1, 0, 0}; {3, −3, 0, 6, 5, 1, 5, 2, −3, −2, 0, 0}; {2, −4, −5, −1, 2, −4, −4, 4, −1, 1, 0, 0}; {, −1, 3, −5, 1, −4, −3, −3, 4, 1, −2, 0, 0}; {, −4, 1, 0, 5, 1, 4, −2, 4, 4, 1, 0, 0}; {, −5, −2, 4, −5, −1, −5, 4, −4, 6, 0, 0, 0}; {, −2, 4, −4, 3, −4, −5, −1, −1, 3, 3, 0, 0}; {1, −3, 1, −4, 0, −3, −3, 0, 6, 6, 0, 0}; {2, −2, 5, 1, 2, −3, 1, 6, −4, −1, 0, 0}; {1, −5, 1, −3, −5, −1, −1, 6, −5, 1, 0, 0}; and {4, 6, −4, 4, −3, 6, 0, 6, 6, 3, 0, 0}.

The sequence set 8 (which is marked as seq_out21{5}) includes some or all of the following sequences, and PAPRs of these sequences are less than 2.1 dB. The sequences are as follows:

{0, −3, −5, 2, −3, 1, −2, −1, −1, 2, 6, −4}; {, −5, 3, 5, 0, 5, 1, −1, 6, −4, −2, 0, 0}; {0, −2, 6, 0, −1, 3, −4, −5, 0, 0, 0}; {, −3, 0, 5, 0, −5, −3, −5, 3, 0, −2, 0, 0}; {, −2, 4, 4, 1, −2, 3, 4, −4, 1, −2, 0, 0}; {, −3, 0, 5, 2, −5, 3, −1, −2, 2, 2, 0, 0}; {5, −3, −1, 1, −2, 5, 2, 3, 0, 4, 0, 0}; {1, 6, 0, −5, 4, −2, 0, 3, 3, 3, 0, 0}; {5, 0, 0, 5, −4, 3, 5, 1, −3, 0, 0, 0}; {0, 5, −4, −4, 1, 6, 1, −2, −3, 2, 0, 0}; {, −3, −3, 5, −2, −1, −5, 1, 5, 3, −3, 0, 0}; {1, 6, 2, −4, −2, 0, −2, −1, 4, 3, 0, 0}; {, −1, −4, 0, −4, −1, −1, 3, −5, −4, 4, 0, 0}; {3, 1, −4, −2, −4, 1, 6, −1, 0, −4, 0, 0}; {6, 0, 5, −3, 5, 5, 5, 3, −3, −4, 0, 0}; {, −4, −1, 2, −4, 6, −2, −4, −5, −4, 3, 0, 0}; {6, 6, −2, −3, 4, −2, 5, −3, 3, 3, 0, 0}; {, −3, 1, 1, 6, 3, −1, 4, 6, 3, 2, 0, 0}; {, −5, 4, −1, 6, −3, 6, 5, 3, −5, −2, 0, 0}; {, −4, 2, 6, 3, 4, 6, −1, 0, −3, 6, 0, 0}; {4, −2, 6, −3, −4, 6, 1, 0, 3, 6, 0, 0}; {, −2, −5, 5, −4, 4, 6, 1, 6, −4, −4, 0, 0}; {4, −5, 4, −3, 2, 4, −2, −4, 4, 0, 0, 0}; {, −4, −5, 0, −2, −4, −3, 3, 6, 2, −5, 0, 0}; {, −4, 4, −1, 3, −2, 1, 3, 2, 4, 5, 0, 0}; {6, −1, 0, 6, 5, −4, 2, −3, 1, 0, 0, 0}; {, −4, 2, −5, 2, −3, 6, 5, −2, 0, 2, 0, 0}; {0, 3, 1, 5, −2, 3, 4, −3, 5, 2, 0, 0}; {, −5, 4, 5, −1, 6, −5, 1, 5, 5, −2, 0, 0}; and {0, −1, 3, 5, 4, −1, 4, 5, 0, 4, 0, 0}.

The sequence set 9 (which is marked as seq_out22{21}) includes some or all of the following sequences, and PAPRs of these sequences are less than 2.2 dB. The sequences are as follows:

{0, 4, 0, −2, 1, −2, −4, 1, 2, 0, 5, −5}; {1, 4, −1, 4, −3, −3, 0, −2, 6, 2, 0, 0}; {0, −5, −1, 4, 4, 0, 3, 1, −3, −3, 0, 0}; {1, 6, −3, −4, 2, 6, 2, −1, −2, 2, 0, 0}; {5, 3, 1, 5, 1, 3, −2, 5, 6, −3, 0, 0}; {2, −2, 3, −2, 4, 5, 2, 2, 5, 5, 0, 0}; {4, −5, 0, 4, 2, 6, 3, −4, 6, 4, 0, 0}; {3, −2, 5, −2, 0, −2, −3, 3, 3, −2, 0, 0}; {, −1, 6, 3, 1, 6, −1, −2, 0, −5, −1, 0, 0}; {, −1, 2, −4, 2, −4, 6, 1, 2, −2, −2, 0, 0}; {, −5, 3, 2, 5, 3, 0, 4, −3, 5, −4, 0, 0}; {1, 0, −3, −4, 1, 5, −2, 5, −2, −3, 0, 0}; {, −4, 0, 0, 6, 0, −5, −2, −4, −4, 5, 0, 0}; {6, 4, −3, 2, −2, 5, 5, −2, 0, 3, 0, 0}; {, −4, 6, −2, −3, 1, −5, 0, 3, 6, 3, 0, 0}; {, −4, 2, 1, −4, −2, 3, −3, 6, −2, 0, 0, 0}; {4, −2, 6, −3, −4, 6, 1, 0, 3, 6, 0, 0}; {6, −3, 6, −3, 3, 6, −5, −1, −5, 4, 0, 0}; {, −5, 6, −3, −5, 3, −1, 2, −2, 3, 6, 0, 0}; {4, 0, 6, −5, 4, −5, −1, 4, 3, −2, 0, 0}; {, −5, 2, 6, −5, −4, −2, 4, −3, 5, 3, 0, 0}; {, −3, 1, 5, 0, −5, −3, −4, 3, 0, −2, 0, 0}; {0, 5, −5, −2, −1, −3, −4, 3, −3, 3, 0, 0}; {6, 3, 4, 0, 6, 4, −2, 4, 6, −2, 0, 0}; {, −5, −4, 6, 3, 6, −1, 5, 5, −2, −5, 0, 0}; {, −3, 2, −5, 0, −1, −3, −5, 5, −3, −4, 0, 0}; {4, 2, −5, 0, −3, 6, 0, 2, −4, 0, 0, 0}; {, −1, 6, 5, 4, −2, 1, −2, 0, 1, −4, 0, 0}; {, −4, 0, 5, 2, −3, −4, 4, −2, 1, 1, 0, 0}; and {, −5, 6, 1, 0, 2, −1, 4, −1, 2, −5, 0, 0}.

The sequence set 10 (which is marked as sh1) includes some or all of the following sequences, and PAPRs of these sequences are less than 2.1 dB. The sequences are as follows:

{6, 0, 6, 0, 4, −5, −4, 2, 0, −2, 0, 0}; {2, −4, 3, −5, −5, 5, −1, 0, 3, 4, 0, 0}; {, −4, 0, 4, 3, −2, 3, −1, −2, −5, 0, 0, 0}; {0, 4, −2, 4, −3, −4, −1, −2, 6, 5, 0, 0}; {3, 0, 4, −2, 0, 6, 0, −3, −5, −3, 0, 0}; {, −1, 0, 3, 4, −1, −5, 2, −5, 2, 3, 0, 0}; {, −1, −1, 1, −4, 6, −3, 3, −2, −1, 5, 0, 0}; {, −1, 6, −4, 2, −5, 3, 0, −4, −3, −2, 0, 0}; {6, 3, −1, 5, −1, 0, −1, 6, −3, 0, 0, 0}; {3, −2, 3, 2, −3, 2, 4, 5, −5, 1, 0, 0}; {, −5, 0, 0, −5, 4, −3, −5, −1, 3, 0, 0, 0}; {3, −3, 5, 2, 2, −3, 1, −5, −3, −1, 0, 0}; {, −2, −3, 2, −1, 3, 4, −3, 2, 5, 2, 0, 0}; {, −2, 3, −4, 4, 5, 6, 1, 1, −3, −5, 0, 0}; {2, 1, −4, 2, 3, −3, 3, 6, 4, −2, 0, 0}; {, −4, 0, 2, −3, 3, 0, 4, 6, 3, 1, 0, 0}; {0, 3, 1, 5, −2, 3,

4, −3, 5, 2, 0, 0}; {1, −2, −5, 0, 5, 0, 3, 2, 4, 6, 0, 0}; {, −5, 3, −2, 1, −4, −1, 3, 3, −1, −2, 0, 0}; {, −4, 3, −5, −1, −5, −4, 6, 4, −5, −5, 0, 0}; {, −4, −1, 2, −4, 6, −2, −4, −5, −4, 3, 0, 0}; {2, −4, −4, −1, 2, −3, −4, 4, −1, 2, 0, 0}; {, −1, −1, 4, −5, −4, 3, −2, 1, −3, 2, 0, 0}; {4, 0, −4, 2, 1, 4, −4, 3, 5, 0, 0, 0}; {4, −5, 4, −3, 2, 4, −2, −4, 4, 0, 0, 0}; {, −2, −5, 0, −4, 6, 5, −4, −1, 5, −3, 0, 0}; {0, −4, −3, 4, −2, −5, 1, 6, −5, −1, 0, 0}; {, −5, −1, −5, −2, 4, −1, −4, 4, 5, 6, 0, 0}; {, −4, 3, −1, 0, 6, 6, −1, 3, −1, −1, 0, 0}; and {, −1, 1, 2, −2, 2, −1, 3, −3, 6, 5, 0, 0}.

The sequence set 11 (which is marked as sh2) includes some or all of the following sequences, and PAPRs of sequences corresponding to the sequences are less than 2.2 dB. The sequences are as follows:

{6, 0, 6, 0, 4, −5, −4, 2, 0, −2, 0, 0}; {, −2, 1, −4, −4, 4, −4, 3, −1, −4, −2, 0, 0}; {5, 2, 4, −1, 5, 6, 1, 5, 5, −3, 0, 0}; {3, 3, 0, 5, −5, 4, −3, 2, 1, 6, 0, 0}; {, −5, 1, 6, 0, −4, 5, 5, −3, 0, 1, 0, 0}; {, −1, 4, 2, −3, −4, 0, 6, −2, 2, 0, 0, 0}; {, −4, 6, 1, 2, −4, 4, −3, −1, 2, −1, 0, 0}; {3, 6, −1, −2, 3, −5, 3, 1, −2, 2, 0, 0}; {0, 0, 1, 6, 3, −1, 4, 6, 1, 5, 0, 0}; {5, −1, 5, −2, 0, 0, −1, 0, −4, 6, 0, 0}; {, −4, 1, 6, 1, −2, 6, 0, 2, 4, 3, 0, 0}; {, −5, −5, −5, 2, 6, −2, 6, 4, −3, 6, 0, 0}; {1, −3, 1, 6, 6, −3, 1, 0, −2, 3, 0, 0}; {0, −3, −1, −5, 2, −3, −4, 3, −5, −2, 0, 0}; {, −5, 2, −4, −2, 1, 3, −3, 5, 1, 1, 0, 0}; {0, 3, 1, 5, −2, 3, 4, −3, 5, 2, 0, 0}; {, −1, 6, −2, 1, −3, −2, −5, 4, −5, −5, 0, 0}; {2, −2, −3, −5, 0, 5, −4, −4, 1, −3, 0, 0}; {1, −4, 2, 6, −4, 3, 1, 0, −2, −3, 0, 0}; {2, 4, −5, 1, 5, 0, −5, 5, 3, −1, 0, 0}; {, −3, −1, 6, −3, 1, 0, 4, 2, −5, 3, 0, 0}; {3, −5, −4, −3, 3, −2, −5, 5, 0, 3, 0, 0}; {5, 4, 0, −5, 3, −4, 2, 5, −4, 0, 0, 0}; {, −1, 0, 6, −3, 6, −2, 6, −1, −4, 6, 0, 0}; {3, −3, −1, 5, 5, 1, 5, 1, −3, −1, 0, 0}; {4, 1, 6, 5, −3, 5, −2, 2, 5, 2, 0, 0}; {0, 0, −5, −1, 6, −4, 1, −3, 6, −1, 0, 0}; {, −2, −4, 6, 0, 5, −3, −5, 3, −4, −1, 0, 0}; {2, −2, 3, −1, 6, 5, 1, 2, −4, −1, 0, 0}; and {, −3, 1, −3, 6, −4, 6, 5, −1, −5, −4, 0, 0}.

The sequence set 12 (which is marked as seq_out21_1{1}) includes some or all of the following sequences, and PAPRs of sequences corresponding to the sequences are less than 2.1 dB. The sequences are as follows:

{0, 0, 11, 6, 7, 7, 10, 4, 9, 9, 3, 10}; {0, 0, 7, 4, 9, 6, 3, 3, 4, 9, 3, 6}; {0, 0, 2, 5, 1, 2, 10, 10, 6, 1, 7, 4}; {0, 0, 1, 3, 3, 9, 6, 2, 4, 11, 2, 9}; {0, 0, 10, 0, 7, 11, 7, 4, 11, 11, 2, 5}; {0, 0, 7, 8, 10, 9, 11, 2, 9, 1, 8, 4}; {0, 0, 11, 8, 9, 3, 9, 0, 9, 2, 1, 6}; {0, 0, 11, 4, 1, 0, 7, 1, 6, 6, 10, 2}; {0, 0, 4, 8, 8, 3, 9, 0, 7, 1, 10, 10}; {0, 0, 10, 11, 2, 7, 8, 2, 10, 2, 8, 4}; {0, 0, 3, 1, 11, 6, 7, 1, 4, 11, 7, 11}; {0, 0, 6, 6, 1, 3, 4, 4, 5, 0, 6, 0}; {0, 0, 8, 4, 4, 9, 3, 0, 5, 11, 2, 2}; {0, 0, 5, 4, 2, 0, 2, 0, 7, 1, 6, 9}; {0, 0, 1, 4, 7, 3, 1, 3, 9, 3, 0, 9}; {0, 0, 8, 6, 9, 3, 11, 3, 4, 0, 4, 5}; {0, 0, 0, 0, 3, 6, 0, 10, 6, 3, 8, 1}; {0, 0, 3, 1, 10, 11, 8, 2, 6, 1, 2, 7}; {0, 0, 3, 7, 1, 4, 7, 6, 4, 0, 5, 2}; {0, 0, 8, 5, 7, 10, 2, 10, 0, 11, 4, 11}; {0, 0, 3, 6, 10, 8, 8, 3, 11, 9, 0, 8}; {0, 0, 3, 0, 9, 4, 3, 3, 9, 1, 8, 0}; {0, 0, 2, 5, 3, 1, 5, 0, 0, 9, 3, 8}; {0, 0, 6, 5, 3, 5, 1, 5, 1, 8, 1, 2}; {0, 0, 11, 6, 5, 0, 8, 1, 0, 4, 10, 1}; {0, 0, 7, 7, 11, 8, 7, 1, 7, 0, 9, 0}; {0, 0, 11, 9, 4, 4, 6, 9, 5, 11, 4, 7}; {0, 0, 9, 1, 3, 9, 9, 9, 3, 0, 5, 0}; {0, 0, 6, 8, 1, 3, 1, 4, 9, 5, 11, 8}; and {0, 0, 7, 8, 8, 6, 2, 9, 6, 10, 3, 9}.

The sequence set 13 (which is marked as seq_out20_1{9}) includes some or all of the following sequences, and PAPRs of sequences corresponding to the sequences are less than 2.0 dB. The sequences are as follows:

{0, 0, 0, 5, 3, 2, 11, 4, 10, 10, 3, 8}; {0, 0, 8, 7, 6, 8, 11, 2, 8, 3, 11, 4}; {0, 0, 11, 8, 5, 9, 11, 9, 3, 9, 0, 3}; {0, 0, 3, 5, 8, 4, 2, 11, 4, 0, 3, 11}; {0, 0, 4, 7, 7, 1, 7, 10, 5, 10, 8, 7}; {0, 0, 4, 0, 1, 6, 11, 4, 2, 4, 11, 9}; {0, 0, 0, 3, 6, 1, 0, 1, 7, 1, 9, 6}; {0, 0, 2, 3, 10, 7, 11, 7, 6, 0, 3, 9}; {0, 0, 9, 10, 4, 9, 3, 11, 5, 5, 9, 9}; {0, 0, 0, 3, 9, 10, 8, 2, 6, 2, 11, 6}; {0, 0, 4, 1, 11, 7, 8, 1, 5, 0, 8, 11}; {0, 0, 1, 0, 4, 0, 8, 8, 3, 3, 8, 0}; {0, 0, 7, 6, 7, 7, 4, 10, 8, 1, 6, 11}; {0, 0, 2, 7, 1, 3, 10, 10, 6, 2, 7, 5}; {0, 0, 11, 7, 0, 10, 3, 6, 8, 3, 9, 11}; {0, 0, 7, 8, 11, 10, 11, 2, 8, 2, 8, 4}; {0, 0, 1, 0, 7, 11, 11, 7, 4, 0, 3, 8}; {0, 0, 11, 5, 6, 1, 1, 5, 3, 11, 5, 11}; {0, 0, 11, 3, 0, 4, 0, 8, 8, 1, 4, 8}; {0, 0, 0, 7, 8, 8, 0, 7, 0, 0, 7, 1}; {0, 0, 7, 7, 4, 6, 7, 6, 11, 7, 2, 7}; {0, 0, 1, 0, 5, 10, 4, 8, 7, 2, 1, 8}; {0, 0, 11, 8, 6, 1, 9, 2, 1, 5, 10, 2}; {0, 0, 5, 5, 1, 3, 8, 0, 7, 2, 7, 5}; {0, 0, 0, 10, 6, 8, 2, 1, 6, 6, 1, 7}; {0, 0, 2, 6, 4, 5, 1, 3, 9, 3, 1, 8}; {0, 0, 10, 8, 6, 1, 6, 9, 4, 9, 8, 0}; {0, 0, 2, 5, 9, 7, 6, 3, 6, 1, 8, 5}; {0, 0, 0, 11, 8, 0, 5, 0, 2, 7, 6, 0}; and {0, 0, 4, 3, 11, 9, 8, 10, 7, 2, 7, 0}.

The sequence set 14 includes some or all of the following sequences: sequences in a union set of the first sequence set and a sequence set IDC.

Sequences in the sequence set IDC are 120 sequences in the InterDigital proposal R1-1716478:

{0, 0, 8, 7, 6, 0, 6, 4, 9, 5, 7, 10}; {0, 5, 6, 0, 7, 0, 11, 1, 4, 2, 0, 0}; {0, 7, 2, 0, 9, 10, 7, 10, 1, 2, 5, 10}; {0, 2, 0, 1, 0, 4, 7, 9, 3, 2, 11, 6}; {0, 10, 8, 5, 6, 0, 4, 6, 5, 9, 6, 11}; {0, 4, 4, 4, 10, 9, 9, 5, 9, 8, 4, 8}; {0, 9, 8, 1, 11, 11, 1, 6, 10, 7, 1, 5}; {0, 1, 3, 2, 11, 11, 5, 6, 0, 6, 0, 9}; {0, 7, 3, 1, 7, 8, 10, 3, 0, 2, 11, 1}; {0, 11, 1, 2, 3, 10, 8, 3, 8, 2, 4, 0}; {0, 10, 1, 10, 3, 10, 8, 7, 1, 3, 8, 11}; {0, 3, 10, 7, 5, 1, 5, 10, 1, 1, 3, 1}; {0, 3, 9, 11, 9, 7, 5, 10, 8, 0, 10, 1}; {0, 1, 3, 5, 2, 1, 2, 9, 2, 9, 9, 4}; {0, 7, 2, 2, 7, 2, 5, 5, 8, 2, 2, 1}; {0, 9, 0, 7, 9, 8, 0, 3, 4, 0, 6, 5}; {0, 7, 2, 6, 4, 9, 10, 5, 7, 8, 9}; {0, 5, 11, 10, 1, 8, 7, 6, 0, 11, 10, 2}; {0, 11, 1, 3, 2, 1, 8, 10, 3, 8, 5, 0}; {0, 5, 11, 3, 2, 8, 3, 4, 6, 5, 1, 0}; {0, 6, 8, 0, 8, 7, 0, 10, 0, 7, 5, 7}; {0, 3, 1, 6, 4, 8, 5, 3, 2, 8, 0, 3}; {0, 1, 0, 9, 6, 1, 3, 9, 3, 9, 9, 0}; {0, 3, 0, 2, 7, 11, 11, 2, 10, 6, 3, 3}; {0, 5, 8, 8, 9, 7, 9, 4, 1, 10, 6, 10}; {0, 6, 7, 6, 0, 1, 10, 1, 1, 9, 1, 11}; {0, 10, 6, 6, 2, 4, 5, 11, 4, 1, 4, 5}; {0, 6, 4, 2, 9, 10, 9, 11, 7, 9, 10, 3}; {0, 9, 2, 2, 1, 9, 10, 0, 4, 5, 0, 5}; {0, 3, 11, 8, 3, 4, 9, 11, 0, 11, 1, 8}; {0, 5, 10, 3, 7, 4, 2, 3, 11, 9, 2, 1}; {0, 11, 8, 0, 9, 7, 11, 1, 0, 5, 8, 3}; {0, 4, 9, 2, 1, 5, 4, 8, 6, 4, 2, 1}; {0, 1, 10, 9, 11, 11, 4, 2, 9, 4, 7, 1}; {0, 1, 0, 11, 1, 6, 6, 0, 0, 7, 2, 8}; {0, 6, 1, 9, 3, 4, 10, 11, 6, 6, 5, 7}; {0, 3, 11, 2, 7, 9, 9, 11, 8, 4, 0, 10}; {0, 8, 4, 10, 7, 11, 1, 0, 5, 7, 3, 4}; {0, 1, 5, 6, 5, 5, 2, 5, 11, 5, 2, 9}; {0, 9, 6, 7, 2, 10, 3, 5, 8, 5, 6, 8}; {0, 11, 0, 11, 9, 1, 5, 5, 10, 0, 7, 2}; {0, 0, 0, 7, 8, 9, 1, 7, 0, 0, 8, 2}; {0, 0, 9, 10, 0, 5, 4, 11, 7, 11, 4, 11}; {0, 1, 5, 2, 7, 6, 0, 6, 8, 6, 3, 4}; {0, 7, 4, 9, 2, 3, 10, 8, 9, 11, 10, 10}; {0, 8, 10, 5, 10, 6, 4, 11, 1, 3, 5, 5}; {0, 0, 10, 4, 4, 2, 4, 9, 1, 0, 5, 11}; {0, 7, 11, 2, 11, 10, 10, 4, 3, 6, 5, 11}; {0, 10, 11, 1, 9, 3, 8, 7, 1, 3, 9, 8}; {0, 8, 3, 5, 10, 10, 1, 5, 2, 2, 4, 1}; {0, 4, 0, 10, 1, 10, 8, 1, 2, 0, 5, 7}; {0, 7, 4, 2, 11, 1, 6, 9, 9, 0, 9, 0}; {0, 1, 9, 11, 3, 2, 4, 8, 4, 11, 7, 2}; {0, 10, 10, 7, 3, 8, 6, 9, 11, 5, 10, 0}; {0, 6, 3, 9, 9, 11, 11, 9, 9, 3, 6, 0}; {0, 10, 8, 7, 0, 11, 7, 10, 0, 5, 1, 5}; {0, 7, 2, 6, 6, 1, 9, 11, 2, 1, 10, 11}; {0, 10, 4, 2, 8, 9, 8, 8, 8, 2, 7, 11}; {0, 0, 8, 7, 8, 11, 4, 10, 2, 0, 6, 2}; {0, 10, 6, 6, 11, 2, 7, 2, 7, 5, 7, 7}; {0, 5, 3, 8, 5, 8, 0, 5, 7, 5, 3, 2}; {0, 10, 9, 8, 1, 11, 4, 1, 6, 9, 1, 6}; {0, 0, 0, 11, 3, 8, 2, 7, 5, 0, 11, 5}; {0, 1, 1, 4, 2, 8, 3, 0, 1, 8, 10, 4}; {0, 9, 7, 2, 9, 1, 10, 11, 11, 2, 6, 8}; {0, 10, 7, 10, 6, 3, 9, 1, 4, 2, 5, 7}; {0, 6, 11, 6, 1, 0, 5, 6, 9, 9, 7, 7}; {0, 3, 1, 3, 4, 6, 0, 3, 0, 9, 7, 2}; {0, 4, 2, 6, 6, 0, 4, 7, 3, 2, 1, 10}; {0, 11, 6, 2, 1, 11, 1, 8, 1, 6, 6, 9}; {0, 1, 0, 11, 5, 5, 11, 0, 5, 0, 7, 0}; {0, 4, 7, 9, 1, 9, 1, 10, 2, 0, 10, 7}; {0, 2, 6, 8, 9, 4, 11, 2, 10, 3, 1, 11}; {0, 0, 11, 6, 7, 7, 10, 4, 9, 9, 3, 10}; {0, 8, 4, 0, 4, 11, 1, 9, 10, 10, 0, 3}; {0, 4, 10, 4, 8, 8, 1, 0, 5, 3, 1, 1}; {0, 0, 8, 1, 2, 10, 4, 8, 6, 0, 3, 3}; {0, 3, 6, 3, 6, 10, 7, 3, 7, 5, 2, 3}; {0, 5, 7, 11, 7, 2, 3, 2, 7, 4, 5, 4}; {0, 0, 4, 7, 11, 7, 6, 3, 9, 6, 9, 6}; {0, 3, 6, 9, 3, 2, 11, 6, 9, 7, 9, 7}; {0, 8, 4, 5, 0, 7, 0, 1, 4, 0, 2, 3}; {0, 10, 3, 0, 4, 5, 10, 3, 5, 2, 11, 0}; {0, 0, 4, 3, 9, 5, 3, 4, 0, 3, 9, 1}; {0, 6, 1, 3, 3, 8, 3, 4, 6, 4, 0, 0}; {0, 3, 11, 2, 6, 7, 6, 4, 3, 9, 6, 2}; {0, 1, 2, 10, 9, 3, 1, 11, 3, 8, 3, 8}; {0, 3, 2, 2, 9, 7, 6, 1, 5, 5, 10, 4}; {0, 4, 5, 7, 2, 9, 6, 6, 1, 5, 2, 2}; {0, 6, 0, 1, 8, 3, 1, 1, 1, 7, 8, 9}; {0, 10, 8, 8, 7, 0, 10, 3, 0, 4, 8, 1}; {0, 4, 8, 10, 4, 3, 0, 8, 10, 8, 11, 9}; {0, 10, 10, 8, 6, 9, 0, 11, 3, 4, 10, 4}; {0, 10, 6, 2, 6, 3, 5, 2, 6, 9, 1, 3}; {0, 9, 7, 5, 10, 7, 11, 8, 11, 1, 5, 9}; {0, 8, 4, 7, 1, 2, 7, 0, 11, 11, 1, 1}; {0, 11, 10, 4, 5, 5, 7, 1, 6, 5, 11, 5}; {0, 8, 7, 6, 1, 10, 2, 1, 3, 5, 11, 3}; {0, 8, 3, 6, 4, 0, 11, 1, 2, 10, 1, 4}; {0, 9, 1, 10, 4, 1, 1, 10, 1, 4, 8, 9}; {0, 7, 0, 5, 10, 10, 4, 3, 10, 10, 11, 10}; {0, 11, 3, 3, 6, 3, 2, 1, 9, 2, 6, 11}; {0, 11, 10, 8, 9, 0, 0, 5, 4, 10, 4, 9}; {0, 1, 11, 1, 3, 9, 9, 4, 2, 6, 0, 8}; {0, 8, 2, 10, 7, 10, 1, 8, 10, 3, 3, 3}; {0, 7, 2, 10, 2, 2, 3, 6, 1, 2, 10, 10}; {0, 1, 10, 10, 1, 3, 0, 7, 7, 0, 7, 2}; {0, 1, 8, 9, 6, 9, 10, 10, 3, 11, 7, 1}; {0, 8, 4, 5, 11, 6, 11, 0, 2, 10, 11, 0}; {0, 5, 5, 6, 10, 1, 8, 8, 6, 5, 9, 5}; {0, 8, 9, 5, 4, 10, 5, 2, 5, 5, 6, 9}; {0, 7, 5, 2, 11, 2, 7, 10, 11, 1, 11, 2}; {0, 3, 6, 11, 0, 8, 6, 5, 8, 5, 10, 7}; {0, 2, 4, 0, 4, 2, 7, 1, 11, 10, 6, 5}; {0, 10, 8, 5, 5, 10, 2, 4, 2, 6, 3, 7}; {0, 8, 7, 3, 0, 1, 3, 0, 3, 2, 7, 0}; {0, 9, 6, 5, 9, 6, 1, 3, 4, 8, 3, 6}; {0, 10, 10, 5, 1, 6, 4, 3, 7, 0, 3, 5}; {0, 11, 10, 7, 11, 10, 11, 5, 0, 4, 5, 10}; and {0, 3, 4, 9, 6, 9, 10, 5, 11, 9, 9, 6}.

Generally, a sequence with a relatively small PAPR also has a relatively small CM value. Through verification, the foregoing sequences all have very small CM values.

According to the sequence-based signal processing method disclosed in this embodiment of this application, an equivalent sequence of a sequence $\{s_n\}$ in the foregoing sequence sets may be expressed as $\{q_n\}$. An element $q_n$ in the equivalent sequence $\{q_n\}$ meets $q_n=s_n+u_n \pmod M$.

In specific implementation, the sequence $\{u_n\}$ including $u_n$ includes:

$u_n=f+g\cdot n \pmod M$, where n=0, 1, . . . , N−1, N is a sequence length, $f\in\{0, 1, 2, \ldots, M-1\}$, $g\in\{0, 1, 2, \ldots, M-1\}$, and M=12.

Herein, (mod M) indicates that the foregoing equation holds true in a mod M case.

According to the sequence-based signal processing method provided in this embodiment of this application, a sequence meeting a requirement for sending a signal by using a PUCCH is determined. The sequence is the sequence $\{f_n\}$ including the N elements, and $f_n$ is an element in the sequence $\{f_n\}$. The determined sequence $\{f_n\}$ is a sequence that meets the preset condition. Then the N elements in the sequence $\{f_n\}$ are respectively mapped to the N subcarriers to generate and send the first signal. With the determined sequence, when the signal is sent by using the PUCCH, a low cross-correlation between sequences can be maintained, and a relatively small PAPR value and a relatively small CM value can be maintained. Therefore, a requirement in a communications application environment in which the signal is sent by using the PUCCH is met.

According to the sequence-based signal processing method disclosed in the embodiments of this application, the embodiments of this application further disclose a sequence-based signal processing apparatus and a communications system.

Figure 6:
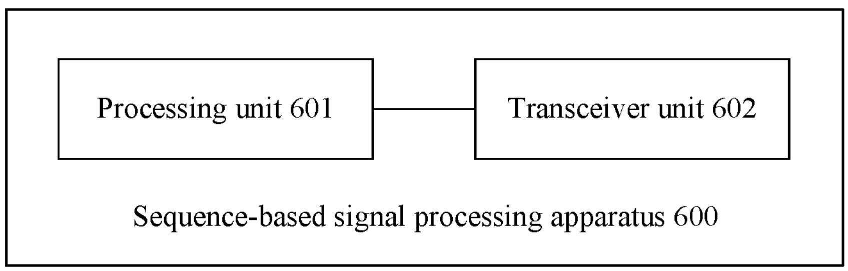
FIG. 6 is a schematic structural diagram of a terminal device according to an embodiment of this application.

FIG. 6 is a schematic structural diagram of a sequence-based signal processing apparatus 600 according to an embodiment of this application. The signal processing apparatus 600 may be a communications device, or may be a chip in the communications device. The signal processing apparatus 600 includes a processing unit 601 and a transceiver unit 602.

The processing unit 601 is configured to determine a sequence $\{f_n\}$ including N elements, where $f_n$ an element in the sequence $\{f_n\}$, and the sequence $\{f_n\}$ is a sequence that meets a preset condition.

For the preset condition related to the processing unit 601, refer to the preset condition disclosed in the sequence-based signal processing method disclosed in the foregoing embodiment of this application. The two preset conditions are consistent, and details are not described herein again.

The processing unit 601 is further configured to respectively map the N elements in the sequence $\{f_n\}$ to N subcarriers to generate a first signal.

The transceiver unit 602 is configured to send the first signal.

For a corresponding operation related to the signal processing apparatus 600 disclosed in this embodiment of this application, refer to a corresponding operation performed in the sequence-based signal processing method disclosed in the embodiments of this application. Details are not described herein again.

With reference to the sequence-based signal processing method disclosed in the embodiments of this application, the signal processing apparatus disclosed in this embodiment of this application may also be implemented directly by using hardware, a memory executed by a processor, or a combination thereof.

Figure 7:
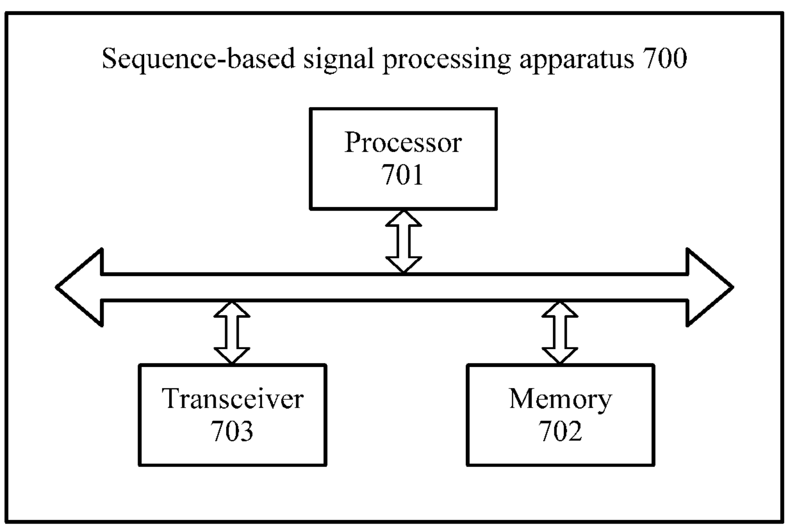
FIG. 7 is a schematic structural diagram of another terminal device according to an embodiment of this application.

As shown in FIG. 7, a signal processing apparatus 700 includes a processor 701 and a transceiver 703. In one embodiment, the signal processing apparatus 700 further includes a memory 702.

The processor 701 is coupled to the memory 702 by using a bus, and the processor 701 is coupled to the transceiver 703 by using the bus.

The processor 701 may be specifically a CPU, a network processor (NP), an ASIC, or a programmable logic device (PLD). The PLD may be a complex programmable logical device (CPLD), a field-programmable gate array (FPGA), or generic array logic (GAL).

The memory 702 may be specifically a content addressable memory (CAM) or a RAM. The CAM may be a ternary content addressable memory (TCAM).

When the signal processing apparatus 700 is a communications device, the transceiver 703 may be a radio frequency circuit. When the signal processing apparatus 700 is a chip in a terminal device, the transceiver 703 may be an input/output interface, a pin, or a circuit in the chip.

The memory 702 may alternatively be integrated in the processor 701. If the memory 702 and the processor 701 are devices independent of each other, the memory 702 is connected to the processor 701, for example, the memory 702 may communicate with the processor 701 by using the bus. The transceiver 703 and the processor 701 may communicate with each other by using the bus, or the transceiver 703 may be directly connected to the processor 701.

The memory 702 is configured to store an operation program, code, or an instruction for sequence-based signal processing. In one embodiment, the memory 702 includes an operating system and an application program and is configured to store an operation program, code, or an instruction for sequence-based signal processing.

When the processor 701 or a hardware device needs to perform an operation related to sequence-based signal processing, the processor 701 or the hardware device may invoke and execute the operation program, the code, or the instruction stored in the memory 702, to complete a sequence-based signal processing process performed by the terminal device in FIG. 1 to FIG. 6. For a specific process, refer to a corresponding part of the foregoing embodiments of this application. Details are not described herein again.

It may be understood that, FIG. 7 shows merely a simplified design of the signal processing apparatus 700. In actual application, the signal processing apparatus 700 may include any quantity of transceivers, processors, memories, and the like, and all signal processing apparatuses 700 that can implement the embodiments of this application fall within the protection scope of the embodiments of this application.

Figure 8:
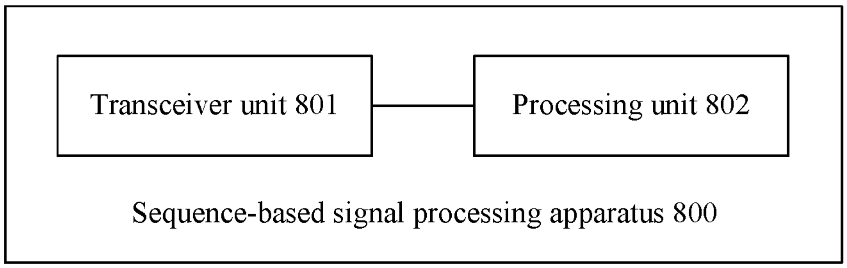
FIG. 8 is a schematic structural diagram of a network device according to an embodiment of this application.

FIG. 8 is a schematic structural diagram of a sequence-based signal processing apparatus 800 according to an embodiment of this application. The signal processing apparatus 800 may be a communications device, or may be a chip in the communications device. The signal processing apparatus 800 includes a transceiver unit 801 and a processing unit 802.

The transceiver unit 801 is configured to receive a first signal carried on N subcarriers.

The processing unit 802 is configured to obtain N elements in a sequence $\{f_n\}$, where the first signal is generated by respectively mapping the N elements in the sequence $\{f_n\}$ including the N elements to the N subcarriers, $f_n$ is an element in the sequence $\{f_n\}$, and the sequence $\{f_n\}$ is a sequence that meets a preset condition.

For the preset condition related to the transceiver unit 801, refer to the preset condition disclosed in the sequence-based signal processing method disclosed in the foregoing embodiments of this application. The two preset conditions are consistent, and details are not described herein again.

The processing unit 802 is further configured to process the first signal based on the N elements in the sequence $\{f_n\}$.

For a corresponding operation related to the signal processing apparatus 800 disclosed in this embodiment of this application, refer to a corresponding operation performed in the sequence-based signal processing method disclosed in the embodiments of this application. Details are not described herein again.

With reference to the sequence-based signal processing method disclosed in the embodiments of this application, the signal processing apparatus disclosed in this embodiment of this application may also be implemented directly by using hardware, a memory executed by a processor, or a combination thereof.

Figure 9:
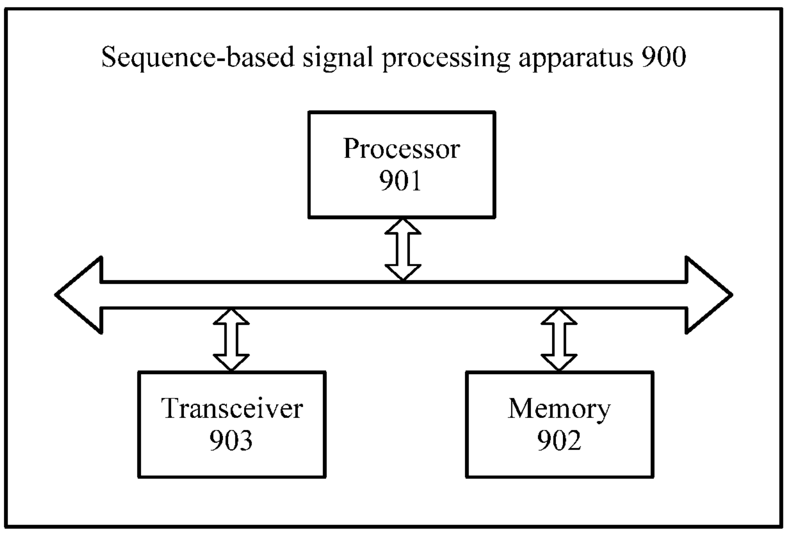
FIG. 9 is a schematic structural diagram of another network device according to an embodiment of this application.

As shown in FIG. 9, the signal processing apparatus 900 includes a processor 901 and a transceiver 903. In one embodiment, the signal processing apparatus 900 further includes a memory 902.

The processor 901 is coupled to the memory 902 by using a bus, and the processor 901 is coupled to the transceiver 903 by using the bus.

The processor 901 may be specifically a CPU, an NP, an ASIC, or a PLD. The PLD may be a CPLD, an FPGA, or GAL.

The memory 902 may be specifically a CAM or a RAM. The CAM may be a TCAM.

When the signal processing apparatus 900 is a communications device, the transceiver 903 may be a radio frequency circuit. When the signal processing apparatus 900 is a chip in a terminal device, the transceiver 903 may be an input/output interface, a pin, or a circuit in the chip.

The memory 902 may alternatively be integrated in the processor 901. If the memory 902 and the processor 901 are devices independent of each other, the memory 902 is connected to the processor 901, for example, the memory 902 may communicate with the processor 901 by using the bus. The transceiver 903 and the processor 901 may communicate with each other by using the bus, or the transceiver 903 may be directly connected to the processor 901.

The memory 902 is configured to store an operation program, code, or an instruction for sequence-based signal processing. In one embodiment, the memory 902 includes an operating system and an application program and is configured to store an operation program, code, or an instruction for sequence-based signal processing.

When the processor 901 or a hardware device needs to perform an operation related to sequence-based signal processing, the processor 901 or the hardware device may invoke and execute the operation program, the code, or the instruction stored in the memory 902, to complete a sequence-based signal processing process performed by the network device in FIG. 1 to FIG. 5. For a specific process, refer to a corresponding part of the foregoing embodiments of this application. Details are not described herein again.

It may be understood that, FIG. 9 shows merely a simplified design of the signal processing apparatus 900. In actual application, the signal processing apparatus 900 may include any quantity of interfaces, processors, memories, and the like, and all signal processing apparatuses 900 that can implement the embodiments of this application fall within the protection scope of the embodiments of this application.

Figure 10:
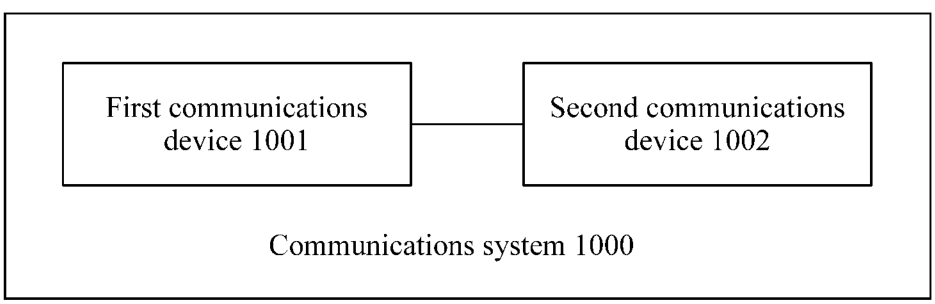
FIG. 10 is a schematic structural diagram of a communications system according to an embodiment of this application.

FIG. 10 shows a communications system 1000 according to an embodiment of this application. The communications system 1000 includes a first communications device 1001 and a second communications device 1002. The first communications device 1001 is a device on a transmitter side, and the second communications device 1002 is a device on a terminal side.

The first communications device 1001 is configured to: determine a sequence $\{f_n\}$ including N elements, respectively map the N elements in the sequence $\{f_n\}$ to N subcarriers to generate a first signal, and send the first signal to the second communications device 1002.

The second communications device 1002 is configured to: receive the first signal on the N subcarriers that is sent by the first communications device, obtain the N elements in the sequence $\{f_n\}$, and process the first signal based on the N elements in the sequence $\{f_n\}$.

In the foregoing communications system disclosed in this embodiment of this application, a quantity of first communications devices 1001 and a quantity of second communications devices 1002 are not limited. The first communications device 1001 may be specifically the communications devices disclosed in FIG. 6 and FIG. 7. In one embodiment, the first communications device 1001 may be configured to perform a corresponding operation performed by the terminal devices in FIG. 1 to FIG. 5 in the embodiments of this application. The second communications device 1002 may be specifically the communications devices disclosed in FIG. 8 and FIG. 9. In one embodiment, the second communications device 1002 may be configured to perform a corresponding operation performed by the network devices in FIG. 1 to FIG. 5 in the embodiments of this application. For a specific process and an execution principle, refer to the foregoing descriptions. Details are not described herein again.

Persons skilled in the art should be aware that in the foregoing one or more examples, functions described in this application may be implemented by hardware, software, firmware, or any combination thereof. When this application is implemented by software, the foregoing functions may be stored in a computer readable medium or transmitted as one or more instructions or code in the computer readable medium. The computer readable medium includes a computer storage medium and a communications medium. The communications medium includes any medium that enables a computer program to be transmitted from one place to another. The storage medium may be any available medium accessible to a general-purpose or dedicated computer.

The embodiments in this specification are all described in a progressive manner, for same or similar parts in the embodiments, refer to these embodiments, and each embodiment focuses on a difference from other embodiments. Especially, apparatus and system embodiments are basically similar to a method embodiment, and therefore are described briefly. For related parts, refer to descriptions in the method embodiment.

Finally, it should be noted that the foregoing embodiments are merely intended for describing examples of the technical solutions of this application, but not for limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A sequence-based signal processing method, wherein the signal processing method comprises:

determining a sequence $\{f_n\}$ comprising N elements, wherein $f_n$ is an element in the sequence $\{f_n\}$, wherein the sequence is a sequence that meets a preset condition, the preset condition being $f_n = A \cdot x_n \cdot e^{2\pi \cdot j \cdot a \cdot n}$, which is a value of n ranges from 0 to N−1, wherein A is a non-zero complex number, a is a real number, $j=\sqrt{-1}$, and for an element $x_n$, $x_n = u \cdot e^{2\pi \cdot j \cdot s_n / M}$, wherein M=12, u is a non-zero complex number, and a set of sequences $\{s_n\}$ consisting of an element $s_n$ comprises at least one of sequences in a first sequence set or at least one of equivalent sequences of the sequences in the first sequence set, wherein the sequences in the first sequence set comprise one or more of the following sequences:

{, −2, 4, −2, 4, 0, 2, 2, 0, 5, 5, 0, 0}; {, −1, 6, 1, −4, −2, 4, −5, −5, 6, −5, 0, 0}; {3, −3, 3, −3, 0, −2, −2, 0, −5, −5, 0, 0}; {2, −4, 2, −4, −1, −2, −2, −1, −5, 6, 0, 0}; {, −4, 2, −4, 3, −1, 1, 2, 1, 4, 5, 0, 0}; {0, 6, 0, −5, −2, −4, −3, −1, 6, 6, 0, 0}; {0, 6, 0, −5, −2, −3, −3, −1, 6, 6, 0, 0}; {, −1, 5, −1, 6, −2, −3, −3, −1, 5, 5, 0, 0}; {, −4, 2, −4, 4, −4, −5, −4, −2, 5, 5, 0, 0}; {, −5, 1, −5, 3, −5, 6, −5, −3, 5, 5, 0, 0}; {4, −2, 4, 0, −4, −1, 0, −1, 3, 4, 0, 0}; {0, 4, −4, 2, −3, −2, −3, 4, 1, −2, 0, 0}; {, −1, 3, −5, 1, −4, −3, −3, 4, 1, −2, 0, 0}; {0, 5, −2, 5, 2, 4, 3, 1, −3, −4, 0, 0}; {, −3, 1, 5, −1, −5, −4, −5, 3, 0, −3, 0, 0}; {3, −3, 3, −1, 0, 6, −3, −3, −5, −4, 0, 0}; {1, 6, −1, 6, 6, 0, 2, 0, −3, −1, 0, 0}; {5, −2, 3, −2, 0, −1, 0, 0, −5, 6, 0, 0}; {, −3, 3, −3, 5, −4, −4, −4, −2, 5, 5, 0, 0}; {, −3, 0, 3, −3, 3, 1, 3, −5, 4, 1, 0, 0}; {, −1, 4, −3, 5, 4, −2, 1, 0, −3, −2, 0, 0}; {3, −1, −5, −5, 1, −4, 0, 1, 4, −1, 0, 0}; {2, −2, 6, 6, 1, −5, 0, 1, 4, −1, 0, 0}; {0, −5, 2, 2, −5, 1, 4, 4, 6, 1, 0, 0}; {1, −3, 5, 6, 0, −5, −1, 1, 3, −1, 0, 0}; {, −3, 4, −1, −1, 5, −1, 3, 4, 5, 0, 0, 0}; {, −5, 1, −5, 6, −1, 4, −5, −5, −5, 1, 0, 0}; {, −2, 5, 0, 0, 6, 0, 3, 4, 5, 0, 0, 0}; {, −5, 1, −5, 6, −1, 5, −5, 6, −5, 1, 0, 0}; {3, −3, 3, 3, −4, 2, 5, 5, 6, 0, 0, 0}; {, −3, 3, −3, −3, 4, −2, −5, −5, 6, 0, 0, 0}; {4, −3, 2, 2, −4, 1, −2, −3, −5, 0, 0, 0}; {5, −1, 5, 6, 1, −5, 5, 6, 5, −1, 0, 0}; {5, −1, 5, 6, 1, −4, 5, 5, 5, −1, 0, 0}; {3, −4, 1, 1, −5, 1, −3, −4, −5, 0, 0, 0}; {, −1, 3, −5, 6, 0, 5, 1, −1, −3, 1, 0, 0}; {0, 5, −2, −2, 5, −1, −4, −4, 6, −1, 0, 0}; {, −2, 2, 6, 6, −1, 5, 0, −1, −4, 1, 0, 0}; {, −2, 2, 6, 6, 0, 5, 1, −1, −3, 1, 0, 0}; {, −3, 1, 5, 5, −1, 4, 0, −2, −4, 1, 0, 0}; {, −3, 1, 5, 5, −1, 4, 0, −1, −4, 1, 0, 0}; {, −2, 3, −4, −3, 4, −2, −5, −5, 6, −1, 0, 0}; {3, 0, −3, 3, −3, −1, −3, 5, −4, −1, 0, 0}; {4, −2, 4, −4, 4, 5, 4, 2, −5, −5, 0, 0}; {, −5, 2, −3, 2, 0, 1, 0, 0, 5, 6, 0, 0}; {, −1, 5, −1, 3, 5, 1, 1, 6, 5, −1, 0, 0}; {0, −5, 2, −5, −2, −4, −3, −1, 3, 4, 0, 0}; {4, −2, 4, −3, 6, 6, 4, 3, −5, −5, 0, 0}; {2, −4, 2, −5, 4, 5, 3, 2, −5, −5, 0, 0}; {, −3, 3, −3, 2, 0, −5, 4, 3, −1, 0, 0, 0}; {0, 6, 0, 5, 3, 4, 3, 1, 6, 6, 0, 0}; {6, 0, 6, −1, 2, 0, −1, 0, −4, −5, 0, 0}; {, −4, 4, 1, −4, −4, 0, 4, 0, 3, −1, 0, 0}; {, −1, 5, 0, 5, 3, 3, 2, 1, 6, −5, 0, 0}; {, −3, 2, −4, 0, −2, −4, −5, 4, −4, −4, 0, 0}; {, −1, 6, 2, −4, −2, −3, 4, −5, −1, 2, 0, 0}; {5, −2, 4, −3, 5, 6, 5, 3, −5, −5, 0, 0}; {, −1, 5, 0, 6, −3, −4, −4, −2, 6, 6, 0, 0}; {, −5, 1, −4, 3, −5, 6, −5, −3, 5, 5, 0, 0}; {5, −3, 2, −5, −3, 6, 3, −4, 6, 0, 0}; {3, −5, 0, 5, −4, 5, 2, −5, 5, 0, 0, 0}; {0, 5, −1, 5, 5, −2, −2, 2, 2, 2, 0, 0}; {, −5, 0, 6, 0, 2, 0, 0, 1, −4, −5, 0, 0}; {, −4, 1, −5, 3, −5, 6, −4, −3, 5, 5, 0, 0}; {, −3, 1, 6, 1, −5, −4, −4, 3, 1, −2, 0, 0}; {6, −3, 1, −5, 1, 0, 1, 6, 3, 0, 0, 0}; {, −5, −1, 4, 0, 3, −3, −4, 2, 0, −2, 0, 0}; {5, 0, −4, −4, 2, −3, 1, 2, 4, −1, 0, 0}; {3, −2, 6, 6, 1, −4, 0, 1, 4, −1, 0, 0}; {, −1, 5, 0, 0, 5, 0, 4, 4, 5, 0, 0, 0}; {5, −1, 6, 6, −1, −2, 4, 6, 2, 0, 0, 0}; {, −1, 5, 0, 0, 6, 0, 3, 4, 5, 0, 0, 0}; {, −1, 4, −2, −2, 4, −1, −4, −4, 6, −1, 0, 0}; {, −5, −1, 4, 3, −3, 3, −1, −2, −4, 0, 0, 0}; {, −3, 1, 6, 5, −1, 4, 0, −2, −3, 1, 0, 0}; {, −2, 3, −3, −3, 4, −2, −5, −5, 6, −1, 0, 0}; {, −5, −1, 4, 3, −2, 3, −1, −2, −4, 0, 0, 0}; {, −4, 1, −5, −5, 3, −3, 6, 6, 6, −1, 0, 0}; {6, −2, 3, 2, −3, 2, −1, −3, −4, 0, 0, 0}; {3, 6, −2, −3, 3, −5, 3, 1, −2, 2, 0, 0}; {, −5, −1, 4, 4, −3, 3, −1, −2, −4, 1, 0, 0}; {6, −2, 3, 3, −3, 3, −1, −2, −4, 0, 0, 0}; {5, −3, 2, 2, −4, 2, −2, −3, −5, 0, 0, 0}; {5, 1, −2, 4, −2, 0, −3, 6, −4, −1, 0, 0}; {3, −2, 6, −1, 4, 5, 1, −2, −2, 0, 0, 0}; {5, −1, −5, −1, 1, 3, −3, 3, 3, 1, 0, 0}; {4, 1, 0, −5, 1, 6, 2, 2, 5, −3, 0, 0}; {3, −1, −3, 3, −3, −1, 6, −4, −5, −1, 0, 0}; {1, −3, −5, 1, −5, −2, 6, −5, 6, −3, 0, 0}; {2, −5, 2, −5, 4, 5, 3, 2, −5, −5, 0, 0}; {, −1, 3, −3, 1, 0, 4, 1, −5, 6, 2, 0, 0}; {, −2, 2, −4, 0, −1, 3, 1, 6, 5, 3, 0, 0}; {5, −1, −5, 2, −5, −1, 3, 5, 4, 4, 0, 0}; {5, −1, −5, 2, −5, −1, 3, 6, 5, 4, 0, 0}; {0, 4, −2, 3, 6, 4, 0, 6, 4, 0, 0, 0}; {, −3, 3, −1, 6, −5, −2, −4, −2, 3, 3, 0, 0}; {, −4, −1, 4, −3, −1, −5, 3, −4, 5, 0, 0, 0}; {, −5, −2, 3, −4, −2, −5, 4, −4, 6, 0, 0, 0}; {0, 4, −2, 4, −2, −3, −1, −1, 4, 3, 0, 0}; {6, −3, 2, −5, 4, −5, −5, −3, 6, 3, 0, 0}; {6, −2, 4, −2, −4, 1, 0, 4, 4, 2, 0, 0}; {6, −2, 4, −2, −3, 2, 1, 5, 4, 2, 0, 0}; {4, −3, 4, 0, 0, 6, −5, −1, 1, −1, 0, 0}; {, −1, 2, −5, 1, 0, 4, 3, 6, 5, 3, 0, 0}; {3, 5, −3, 2, 3, −1, 6, −1, −5, 1, 0, 0}; {, −2, 1, 6, 0, −5, −4, −2, −2, 4, 2, 0, 0}; {, −3, 2, −3, 6, −3, 3, 4, −1, −2, −3, 0, 0}; {1, 3, −5, 1, 2, −3, 4, −3, 5, 0, 0, 0}; {0, 2, 6, 0, 1, −3, 4, −3, 5, 0, 0, 0}; {, −3, −1, 3, −2, 6, −2, −5, −3, −5, 5, 0, 0}; {0, 3, −4, −5, 1, 6, 1, 0, −3, 1, 0, 0}; {, −4, 3, 0, 4, −4, −3, 4, 0, 0, −1, 0, 0}; {, −4, 4, 2, −5, 0, 3, −2, −5, −2, 0, 0, 0}; {, −5, 3, 1, 6, −1, 2, −2, −5, −2, 0, 0, 0}; {5, 1, 0, 5, −2, 2, −3, 6, −2, 0, 0, 0}; {, −4, 4, 3, −3, 3, −5, 4, 5, 5, −4, 0, 0}; {4, −1, −3, 3, −3, −1, −5, −4, 6, −2, 0, 0}; {, −1, 5, 2, −4, −4, 1, 5, −1, 1, 0, 0, 0}; {, −3, 3, 0, 6, −5, −1, −5, −2, 3, 2, 0, 0}; {2, 6, 1, 6, 6, −1, −2, 4, 3, 1, 0, 0}; {, −1, 2, −4, 0, 0, 4, 2, −5, 5, 2, 0, 0}; {, −2, 4, 1, −4, 3, −5, −1, 4, 4, 3, 0, 0}; {, −5, −1, 6, −1, −3, 1, 2, −5, 4, 2, 0, 0}; {4, −4, 3, −4, −5, 0, −1, 4, 4, 1, 0, 0}; {4, −4, 3, −4, −5, 0, −1, 4, 4, 2, 0, 0}; {2, 5, −1, 3, 1, 5, 3, −4, 6, 3, 0, 0}; {1, 4, −2, 3, 1, 5, 3, −5, 6, 3, 0, 0}; {3, −4, 4, −1, −1, 5, 6, −1, 1, −1, 0, 0}; {, −2, 1, −5,

0, −1, 3, 2, 6, 5, 3, 0, 0}; {, −2, 4, 1, −3, 3, −5, 0, 3, 3, 3, 0, 0}; {6, −2, 5, −1, 5, 5, −4, −4, 5, 5, 0, 0}; {5, −3, 4, −2, 5, 5, −5, −4, 5, 5, 0, 0}; {5, −2, 6, 1, 0, 6, −5, 0, 2, 0, 0, 0}; {1, 4, −2, 3, 0, 4, 4, −4, 6, 3, 0, 0}; {0, 2, −5, 0, 1, −3, 4, −3, 5, 0, 0, 0}; {, −2, 0, 5, −2, 0, −4, 4, −3, 6, 0, 0, 0}; {5, −5, 0, 6, 3, −5, 5, −4, 6, 5, 0, 0}; {, −5, −2, 4, −1, 5, −4, −5, 3, 0, −2, 0, 0}; {, −3, −1, 4, 2, 4, −1, 6, 1, 0, 4, 0, 0}; {5, −5, 1, −1, 2, −3, 4, −1, −1, 3, 0, 0}; {, −2, −5, −4, 2, −3, 2, 0, 2, 3, −5, 0, 0}; {0, −5, 6, −1, 3, 6, 1, −3, −1, −1, 0, 0}; {5, 0, −1, 5, 5, −3, 3, −2, 1, 0, 0, 0}; {1, −4, −5, 1, 3, −5, 1, −3, 0, −1, 0, 0}; {, −5, 2, 1, −5, −2, 3, −3, 6, −2, 0, 0, 0}; {0, 6, 4, −2, −4, 1, 5, −1, 1, 1, 0, 0}; {, −1, 4, 1, −5, −3, 3, 4, −1, 0, −2, 0, 0}; {, −2, 4, 2, −3, 1, 5, 4, 5, −1, 2, 0, 0}; {, −3, −1, 5, −2, −1, −5, 3, −4, 5, −1, 0, 0}; {, −5, −3, 3, −4, −2, 6, 1, −5, 4, −1, 0, 0}; {6, −5, 0, 4, 5, 0, −5, −1, −5, 1, 0, 0}; {0, 4, 0, −5, −1, 4, 5, 1, −1, −3, 0, 0}; {2, −3, −3, 3, 5, 1, −4, 1, −2, −1, 0, 0}; {, −3, 3, 2, −4, −3, 5, −1, 3, 0, 0, 0, 0}; {, −4, 2, 1, −5, −4, 4, −2, 2, 0, 0, 0, 0}; {, −3, −1, 6, −4, 6, −2, 5, −1, −4, 5, 0, 0}; {1, −4, −4, 3, 2, 6, 0, −3, 0, −1, 0, 0}; {, −1, 5, 4, −2, −4, 0, 5, 0, 2, 1, 0}; {0, −5, −5, 2, 1, 6, 0, −4, −1, −1, 0, 0}; {, −1, 6, 6, 1, 1, 6, 0, −4, −1, −1, 0, 0}; {, −4, 2, 1, −5, 6, −1, 3, −2, 1, 0, 0, 0}; {, −3, 4, 4, −1, −1, 5, −2, 6, −2, −2, 0, 0}; {, −4, 3, 3, −2, −2, 4, −2, 6, −2, −1, 0, 0}; {, −4, 3, 3, −2, −1, 4, −2, −5, −1, −1, 0, 0}; {, −5, 1, 0, 6, 6, −2, 4, −1, 1, 0, 0, 0}; {, −4, 3, 3, −2, −1, 4, −1, −5, −1, −1, 0, 0}; {3, 5, 0, 3, −4, 4, 2, −5, 5, −1, 0, 0}; {, −3, 3, 2, −3, 6, −3, 3, 0, 1, −1, 0, 0}; {1, 4, 0, −5, −1, 4, 5, 1, −1, −4, 0, 0}; {, −3, −2, 4, −2, −1, −5, 2, −5, 4, −1, 0, 0}; {, −4, 2, 2, −5, −3, 4, −2, 3, 0, 0, 0, 0}; {5, −3, −5, −1, −3, 4, −4, −3, 5, 4, 0, 0}; {, −5, 3, 5, 1, 3, −4, 4, 3, −5, −4, 0, 0}; {6, 0, 0, 6, −5, 3, −2, 2, −1, 0, 0, 0}; {6, 0, 0, 6, −5, 3, −2, 3, −1, 0, 0, 0}; {, −4, 2, 2, −4, 6, −2, 4, −1, 1, 1, 0, 0}; {, −5, 1, 1, −5, 5, −3, 3, −2, 1, 1, 0, 0}; {6, 0, 0, 6, 5, −3, 2, −2, 1, 0, 0, 0}; {6, 0, 0, 6, 5, −3, 3, −2, 1, 0, 0, 0}; {4, −2, −2, 5, 3, −4, 2, −3, 0, 0, 0, 0}; {6, 3, −5, 2, −4, 6, 5, 3, 6, −5, 0, 0}; {, −3, −5, 0, −3, 4, −4, −2, 5, −5, 1, 0, 0}; {, −4, 3, 5, −1, −5, 2, 6, −5, 0, 0, 0, 0}; {4, −2, −1, 5, 4, −4, 2, −2, 0, 0, 0, 0}; {, −1, 4, 4, −3, −2, 6, 0, 3, 0, 1, 0, 0}; {0, −5, −3, 4, −4, 5, 1, −5, −5, −2, 0, 0}; {5, −2, −2, 3, 0, 4, −4, 3, 1, 2, 0, 0}; {0, 6, −5, 2, 0, 5, 0, −4, −1, 0, 0, 0}; {, −2, 3, 3, −3, −5, −1, 4, −1, 2, 1, 0, 0}; {3, −4, −4, 2, −2, 1, −5, 3, 1, 1, 0, 0}; {2, −4, −3, 4, 1, 6, 1, −3, −1, 0, 0, 0}; {0, 4, 3, −4, 3, 6, −1, 6, 4, 2, 0, 0}; {, −5, 5, −1, 1, −2, 3, −4, 1, 1, −3, 0, 0}; {, −1, −3, 3, −4, 6, 3, −2, 0, −5, −1, 0, 0}; {, −4, 4, −4, 1, −5, −4, 6, 4, −5, −5, 0, 0}; {6, 5, 0, −4, −5, 0, 5, 1, 5, −1, 0, 0}; {5, 3, −3, 4, 2, 6, −1, 5, −4, 1, 0, 0}; {3, 1, −5, 2, 1, 5, −3, 4, −5, 1, 0, 0}; {4, −1, 2, −5, 0, −1, −3, −5, −4, −3, 0, 0}; {3, −2, 1, −5, 1, −2, −4, 6, −5, −3, 0, 0}; {, −4, 1, 2, −5, −4, 4, −2, 5, 0, 1, 0, 0}; {2, −4, −2, 4, 0, 5, −3, −3, 1, −1, 0, 0}; {5, −2, −1, 5, 2, −3, 3, 6, 2, 0, 0, 0}; {2, 5, 4, −2, 3, −2, 0, −2, −3, 5, 0, 0}; {, −5, −1, 0, −5, 2, −2, 3, 6, 2, 0, 0, 0}; {3, 1, −4, −2, −4, 1, 6, −1, 0, −4, 0, 0}; {2, −1, 5, −2, −5, 5, 0, 1, −4, −1, 0, 0}; {2, 0, −5, 2, 0, 4, −4, 3, 6, 0, 0, 0}; {0, −2, 5, 0, −1, 3, −4, 3, −5, 0, 0, 0}; {4, −1, 3, −4, 2, −1, −4, 6, −5, −4, 0, 0}; {2, −4, −1, 3, −3, 5, 0, −3, −3, −3, 0, 0}; {4, −2, 1, 6, 0, −1, −3, −5, −4, −3, 0, 0}; {, −1, 5, −4, 1, −5, 3, −1, −4, −4, −3, 0, 0}; {, −2, 4, −5, 0, 6, 2, −1, −4, −4, −3, 0, 0}; {3, −3, 0, 6, 5, 1, 5, 2, −3, −2, 0, 0}; {5, 2, −4, 5, 5, −4, 4, 6, 0, 0, 0}; {3, 3, 0, 1, −5, 0, 2, −4, −4, 0, 0}; {4, −4, −3, 3, −3, 5, −4, −5, −5, 4, 0, 0}; {, −1, 3, 5, −1, 5, 2, 6, 5, 6, 3, 0, 0}; {, −3, 1, 3, −3, 3, 1, 6, 4, 5, 1, 0, 0}; {, −4, −1, 0, 5, −1, 6, −2, −2, −5, 3, 0, 0}; {, −5, −1, 1, −4, 2, −1, 3, 6, 4, 1, 0, 0};

{5, −3, −1, 6, 1, −2, 2, 5, 2, 0, 0, 0}; {4, −4, −2, 5, 0, −3, 2, 5, 2, 0, 0, 0}; {4, −3, 0, −4, 4, 3, −4, 0, 0, 1, 0, 0}; {4, −2, 2, −1, −1, 6, −1, −3, −5, −4, 0, 0}; {0, −3, 4, 5, −1, 6, −1, 0, 3, −1, 0, 0}; {0, −2, 6, 0, −1, 3, −4, 3, −5, 0, 0, 0}; {, −1, −3, 5, −1, −2, 3, −4, 3, −5, 0, 0, 0}; {, −5, 2, −5, −1, 6, −5, 6, 4, −5, −5, 0, 0}; {, −5, 3, −3, 2, −2, 0, 1, 0, 4, 5, 0, 0}; {, −3, −5, 3, −2, −3, 1, 6, 1, 5, −1, 0, 0}; {, −3, 5, −1, 5, −1, 1, 2, 1, 4, 5, 0, 0}; {, −4, 4, −2, 4, −2, 1, 2, 1, 4, 5, 0, 0}; {, −5, 3, −3, 3, −2, 0, 1, 0, 4, 5, 0, 0}; {4, −1, 4, −3, 4, 5, 5, 3, 6, 6, 0, 0}; {1, −4, 1, 6, 1, 2, 6, 5, 1, −1, 0, 0}; {2, −3, 2, −5, 3, 4, 4, 2, 6, 6, 0, 0}; {5, 2, −3, 4, 2, 5, −4, 4, 6, 0, 0, 0}; {4, 1, −4, 3, 1, 5, −3, 4, −5, 0, 0, 0}; {, −5, 3, −3, 5, 3, −5, −3, 4, 6, 0, 0, 0}; {, −2, 6, 0, −4, 4, −5, −2, 5, −5, 0, 0, 0}; {3, −2, 3, −1, 0, 6, −2, −3, −5, −4, 0, 0}; {0, −5, 0, −4, 1, 3, 2, 1, 5, 5, 0, 0}; {, −1, 6, 0, −4, 3, 2, 2, −4, −1, 2, 0, 0}; {6, 1, −5, 3, −5, 6, −5, −2, 3, 4, 0, 0}; {, −1, 5, −2, 6, −1, 2, 2, 0, 4, 4, 0, 0}; {, −3, 2, 6, 1, −4, −5, −1, 2, 2, 0, 0, 0}; {, −5, −1, 2, −4, 2, 0, 3, 6, 4, 1, 0, 0}; {5, −1, 4, 1, −2, −3, 3, −4, −2, −1, 0, 0}; {0, −4, 3, 3, −4, −4, 0, 4, 0, 1, 0, 0}; {, −5, 3, −2, −2, 4, −2, 2, 3, 5, 0, 0, 0}; {6, 2, −3, −3, 3, −3, 1, 2, 4, 0, 0, 0}; {5, 1, −4, −4, 3, −3, 1, 2, 4, −1, 0, 0}; {6, 2, −3, −2, 3, −2, 1, 3, 4, 0, 0, 0}; {4, −1, 5, 5, −3, 3, 6, 6, 6, 1, 0, 0}; {5, 1, −4, −3, 2, −3, 1, 2, 4, 0, 0, 0}; {5, 1, −4, −3, 3, −3, 1, 2, 4, 0, 0, 0}; {2, −3, 3, 3, −4, 2, 5, 5, 6, 1, 0, 0}; {1, −4, 2, 2, −4, 1, 4, 4, 6, 1, 0, 0}; {1, −5, 0, 0, 6, 0, −3, −4, −5, 0, 0, 0}; {, −5, 1, 6, 6, 1, 2, −4, 6, −2, 0, 0, 0}; {1, −5, 0, 0, −5, 0, −4, −4, −5, 0, 0, 0}; {, −3, 2, 6, 6, −1, 4, 0, −1, −4, 1, 0, 0}; {, −5, 0, 4, 4, −2, 3, −1, −2, −4, 0, 0, 0}; {6, −1, 3, 3, −2, 3, −1, −3, −4, 1, 0, 0}; {, −1, −3, 6, 0, 3, −1, 2, 3, 3, −4, 0, 0}; {6, 3, −1, 5, −1, 0, −1, 6, −3, 0, 0, 0}; {6, 2, −3, 2, −4, −1, 3, 4, −1, −1, 0, 0}; {3, −2, 4, −4, 3, 4, 5, 3, 6, 6, 0, 0}; {4, −1, 5, −3, 5, 6, 4, 3, −5, −5, 0, 0}; {1, −4, 2, 6, 2, 3, 4, 2, 6, 6, 0, 0}; {1, −4, 2, −5, 3, 4, 3, 2, 6, 6, 0, 0}; {, −2, 5, −1, 4, 1, 2, 2, 1, 5, 6, 0, 0}; {5, −1, 4, −3, 5, 6, 5, 3, −5, −5, 0, 0}; {, −5, 3, −2, 5, 3, 6, −3, 4, 6, 0, 0, 0}; {, −3, 4, −2, 4, −1, 1, 2, 1, 4, 5, 0, 0}; {, −5, 2, −4, 2, −2, 0, 1, 0, 4, 5, 0, 0}; {, −3, 5, 0, −5, 4, −5, −2, 5, −5, 0, 0, 0}; {6, 0, 5, −1, −5, −5, 5, 4, −4, −4, 0, 0}; {2, −4, 1, −5, 3, 4, 4, 2, 6, 6, 0, 0}; {2, −4, 1, −5, 4, 4, 4, 2, 6, −5, 0, 0}; {, −1, 6, 0, −5, −2, −4, −3, −1, 5, 5, 0, 0}; {, −1, 6, 0, −5, −2, −3, −3, −1, 5, 5, 0, 0}; {, −4, 3, −3, 4, −4, −5, −4, −2, 5, 5, 0, 0}; {, −5, 2, −4, 3, −5, 6, −5, −3, 5, 5, 0, 0}; and {, −5, 2, −4, 3, −4, −5, −5, −1, 2, 4, 0, 0}; and {, −2, 5, −1, 6, −1, 2, 3, 4, 5, 0, 0}; {, −3, 2, −5, 0, −1, −3, −5, 5, −3, −4, 0, 0}; {6, 0, 6, 0, −5, −4, 2, 0, −2, 0, 0}; {0, 0, 0, 1, 10, 8, 5, 0, 4, 9, 10, 2}; {1, −5, 1, −3, −5, −1, −1, 6, −5, 1, 0, 0}; {, −4, 1, 6, 1, −2, 6, 0, 2, 4, 3, 0, 0}; {, −3, 1, 5, 0, −5, −3, −4, 3, 0, −2, 0, 0}; {4, 5, 6, −2, 3, −1, 4, −1, −2, 4, 0, 0}; {, −4, −1, 2, −4, 6, −2, −4, −5, −4, 3, 0, 0}; {, −2, 3, −4, 4, 5, 6, 1, 1, −3, −5, 0, 0}; {0, 0, 0, 4, 8, 11, 9, 6, 10, 5, 0, 11}; {2, −4, 2, 1, 6, 4, −5, −1, 3, 1, 0, 0}; {5, 3, 1, 5, 1, 3, −2, 5, 6, −3, 0, 0}; {4, 6, −4, 4, −3, 6, 0, 6, 6, 3, 0, 0}; {, −4, 0, 4, 3, −2, 3, −1, −2, −5, 0, 0, 0}; {, −5, −5, −5, 2, 6, −2, 6, 4, −3, 6, 0, 0}; {, −2, −4, 6, 0, 5, −3, −5, 3, −4, −1, 0, 0}; {1, −2, −5, 0, 5, 0, 3, 2, 4, 6, 0, 0}; {2, −3, 4, −4, −5, 6, −1, −1, 3, 5, 0, 0}; {4, 0, −4, 2, 1, 4, −4, 3, 5, 0, 0, 0}; {3, −2, 5, −2, 0, −2, −3, 3, 3, −2, 0, 0}; {5, −1, 5, −2, 0, 0, −1, 0, −4, 6, 0, 0}; {6, 1, −3, 3, −4, 0, 4, 6, 6, 5, 0, 0}; {6, 0, −5, 1, 0, 2, 0, 0, 5, 5, 0, 0}; {, −1, 6, 2, −2, 3, −4, 0, 3, 3, 3, 0, 0}; {, −1, 5, 0, −5, 3, 2, 2, −5, −2, 1, 0, 0}; {1, 6, 0, −5, 4, −2, 0, 3, 3, 3, 0, 0}; {0, 0, 1, 3, 11, 7, 11, 4, 5, 0, 0, 7}; {6, −3, 1, −5, −2, −5, 3, −4, 6, 1, 0, 0}; {0, 2, 5, −2, 5, 3, 3, −3, 4, 0, 0, 0}; {, −4, 1, −5, 4, −4, −5, −4, −2, 5, 4, 0, 0}; {2, 4, −5, 1, 5, 0, −5, 5, 3, −1, 0, 0}; {0, 0, 1, 5, 9, 2, 10, 3, 0, 8, 4, 4}; {, −2, −1, 1, −5, 3, 6, 2, 0, −1, 6, 0, 0}; {0, 0, 1, 6, 3, −1, 4, 6, 1, 5, 0, 0}; {, −5, 1, −4, −5, −1, 5, −5, −5, −4, 2, 0, 0}; {1, −5, 2, 1, 5, 0, 1, −3, −5, −4, 0, 0}; {, −4, 0, 5, 2, −3, −4, 4, −2, 1, 1, 0, 0}; {0, 0, 1, 6, 11, 3, 10, 7, 4, 11, 2, 1}; {5, −1, 6, 6, 5, 2, −5, 4, 6, −4, 0, 0}; {, −2, −5, 5, −4, 4, 6, 1, 6, −4, −4, 0, 0}; {, −4, 3, −1, 0, 6, 6, −1, 3, −1, −1, 0, 0}; {0, 0, 1, 9, 0, 1, 6, 1, 8, 8, 5, 0}; {0, 0, 1, 9, 2, 5, 4, 8, 5, 1, 0, 6}; {, −1, −5, 4, −4, 3, 5, 0, 6, −5, −1, 0, 0}; {0, 0, 1, 10, 1, 8, 11, 3, 2, 8, 7, 2}; {2, −4, 3, −5, −5, 5, −2, 0, 4, 4, 0, 0}; {2, −4, 3, −5, −5, 5, −1, 0, 3, 4, 0, 0}; {0, 0, 2, 0, 8, 9, 6, 10, 3, 9, 9, 2}; {, −3, 1, −5, −2, −2, 3, −1, 6, 5, 1, 0, 0}; {3, −4, 3, −4, 5, 5, 2, 2, −4, −3, 0, 0}; {, −1, 0, 3, 4, −1, −5, 2, −5, 2, 3, 0, 0}; {, −5, 0, −5, 1, 3, −4, −4, 2, 1, 0, 0, 0}; {4, −5, 0, 4, 2, 6, 3, −4, 6, 4, 0, 0}; {0, 4, −2, 4, −3, −4, −1, −2, 6, 5, 0, 0}; {5, −4, 1, 6, 1, −1, 1, 0, 6, 3, 0, 0}; {, −1, 6, 3, 1, 6, −1, −2, 0, −5, −1, 0, 0}; {3, 6, −1, 5, 0, −2, 0, −2, −4, −5, 0, 0}; {3, −3, 5, 2, 2, −3, 1, −5, −3, −1, 0, 0}; {4, −5, 0, −5, −4, 0, 2, 1, 5, 1, 0, 0}; {, −3, 0, 5, 0, −5, −3, −5, 3, 0, −2, 0, 0}; {0, 0, 2, 7, 6, 4, 11, 8, 5, 9, 4, 7}; {, −3, 0, 5, 2, −5, 3, −1, −2, 2, 2, 0, 0}; {, −1, −1, 1, −4, 6, −3, 3, −2, −1, 5, 0, 0}; {3, 6, −1, −2, 3, −5, 3, 1, −2, 2, 0, 0}; {3, −1, −3, 1, 2, 5, 3, −5, 1, 4, 0, 0}; {0, 0, 2, 10, 4, 0, 11, 9, 6, 0, 3, 5}; {4, −2, 6, −3, −4, 6, 1, 0, 3, 6, 0, 0}; {, −1, 0, 3, 1, 0, −5, −2, 5, 1, 6, 0, 0}; {0, 0, 2, 11, 10, 4, 6, 9, 3, 8, 2, 9}; {0, 0, 2, 11, 11, 5, 6, 2, 5, 10, 6, 1}; {, −5, −2, 4, 4, −2, 3, 0, −2, −4, 0, 0, 0}; {6, 6, −3, −5, 3, −2, 2, −4, 3, 5, 0, 0}; {0, −4, −5, 1, −5, −2, 5, −4, −5, −1, 0, 0}; {, −4, 4, 3, −2, 1, 5, −1, −4, −1, −2, 0, 0}; {2, −5, 3, −4, 3, 3, 6, −5, 4, 5, 0, 0}; {0, 0, 3, 3, 7, 1, 5, 3, 1, 11, 7, 11}; {0, 0, 3, 3, 11, 8, 5, 7, 3, 6, 11, 4}; {1, 6, 2, −4, −2, 0, −2, −1, 4, 3, 0, 0}; {0, 0, 3, 4, 11, 1, 7, 10, 5, 11, 6, 3}; {2, −2, −3, −5, 0, 5, −4, −4, 1, −3, 0, 0}; {, −3, 5, 4, 3, −3, 2, 5, −5, 0, −3, 0, 0}; {0, 0, 3, 6, 5, 2, 7, 4, 3, 1, 7, 0}; {, −3, 1, −4, 3, 6, −2, −3, 5, 1, −1, 0, 0}; {, −1, 2, −4, 2, −4, 6, 1, 2, −2, −2, 0, 0}; {, −1, 2, −4, 2, −4, −4, −1, −2, 4, 2, 0, 0}; {0, 0, 3, 8, 2, 2, 9, 7, 6, 2, 6, 3}; {0, 0, 3, 8, 10, 7, 4, 3, 8, 4, 8, 6}; {3, 2, 4, −3, 6, −1, 5, 0, 1, 5, 0, 0}; {2, 1, 3, −4, 5, −2, 5, 0, 1, 5, 0, 0}; {, −5, 3, 2, 5, 3, 0, 4, −3, 5, −4, 0, 0}; {, −3, 0, 6, 5, 0, 2, −4, 4, −1, −1, 0, 0}; {0, 0, 4, 0, 6, 1, 9, 7, 6, 2, 5, 8}; {, −2, 1, −4, −4, 4, −4, 3, −1, −4, −2, 0, 0}; {0, 0, 4, 1, 8, 3, 5, 3, 2, 9, 11, 4}; {5, 1, 1, 6, −1, 2, −2, −5, −3, −3, 0, 0}; {, −5, 4, 5, −1, 6, −5, 1, 5, 5, −2, 0, 0}; {6, 3, 4, 0, 6, 4, −2, 4, 6, −2, 0, 0}; {, −5, 6, −3, −5, 3, −1, 2, −2, 3, 6, 0, 0}; {, −2, 2, −2, 1, 5, −2, −2, 6, 4, −1, 0, 0}; {, −5, −1, −5, −2, 4, −1, −4, 4, 5, 6, 0, 0}; {6, 6, −2, −3, 4, −2, 5, −3, 3, 3, 0, 0}; {3, 3, −5, −5, 1, −3, 3, −4, 2, 3, 0, 0}; {1, 4, −1, 4, −3, −3, 0, −2, 6, 2, 0, 0}; {6, 1, 0, −2, 3, −5, −2, −3, 2, −2, 0, 0}; {3, −5, 3, −1, −5, 6, 2, 5, −2, 0, 0, 0}; {0, 1, 6, −1, 6, 3, 4, −1, −2, 2, 0, 0}; {0, 0, 4, 8, 6, 2, 2, 11, 3, 4, 0, 5}; {, −1, 6, 5, 4, −2, 1, −2, 0, 1, −4, 0, 0}; {6, −4, 2, −4, −1, 4, 1, −5, 3, 0, 0, 0}; {0, 4, 0, −4, 2, −2, −2, 6, −4, 0, 0, 0}; {0, 0, 4, 8, 10, 3, 11, 4, 2, 2, 11, 6}; {, −3, 1, −3, 6, −4, 6, 5, −1, −5, −4, 0, 0}; {1, 3, −3, 4, 6, −3, 2, 0, 5, 1, 0, 0}; {0, 0, 4, 10, 2, 4, 7, 6, 10, 7, 5, 3}; {1, 4, −1, −3, −1, −4, 5, −2, −2, −5, 0, 0}; {0, 0, 4, 11, 11, 0, 11, 9, 3, 5, 2, 8}; {5, 1, 2, 6, 0, 2, −2, 6, −3, −4, 0, 0}; {3, −3, −4, −1, 3, −2, −5, −5, −1, 4, 0, 0}; {0, 0, 5, 2, 1, 2, 1, 9, 6, 10, 3, 8}; {0, 0, 5, 2, 1, 5, 2, 5, 0, 10, 0, 7}; {2, −4, −5, −1, 2, −4, −4, 4, −1, 1, 0, 0}; {5, 2, 4, −1, 5, 6, 1, 5, 5, −3, 0, 0}; {5, 0, 0, 5, −4, 3, 5, 1, −3, 0, 0, 0}; {0, −3, −1, −5, 2, −3, −4, 3, −5, −2, 0, 0}; {0, −4, −3, 4, −2, −5, 1, 6, −5, −1, 0, 0}; {, −3, −5, −2, −4, 4, −4, 1, 6, −4, 6, 0, 0}; {3, 6, 2, 5, −5, 2, −2, 5, 5, 5, 0, 0}; {2, −4, −5, 1, 1, −5, 2, 6, 1, 1, 0, 0}; {, −4, 2, 1, −4, −2, 3, −3, 6, −2, 0, 0, 0}; {, −5, 4, 6, 4, −3, 0, −4, 2, 2, −4, 0, 0}; {, −3, −1, 6, −3, 1, 0, 4, 2, −5, 3, 0, 0}; {, −1, 4, 2, −3, −4, 0, 6, −2, 2, 0, 0, 0}; {, −1, 0, 6, −3, 6, −2, 6, −1, −4, 6, 0, 0}; {, −3, −1, 6, −2, 3, 1, 0, 5, 3, −2, 0, 0}; {, −4, −1, −5, 1, 0, 5, 0, 3, 5, 4, 0, 0}; {0, −1, 3, 5, 4, −1, 4, 5, 0, 4, 0, 0}; {, −1, −1, 4, −5, −4, 3, −2, 1, −3, 2, 0, 0}; {2, −4, −4, −1, 2, −3, −4, 4, −1, 2, 0, 0}; {, −3, −5, −1, −5, 4, 3, −3, −1, 5, −2, 0, 0}; {, −3, 1, −1, 1, 5, 1, −3, 5, 3, 4, 0, 0}; {, −2, −3, 2, −1, 3, 4, −3, 2, 5, 2, 0, 0}; {, −4, −5, 0, −2, −4, −3, 3, 6, 2, −5, 0, 0}; {0, 0, 6, 5, 8, 6, 6, 8, 1, 6, 11, 7}; {, −5, 5, −3, 6, −4, 1, −3, 1, 4, 6, 0, 0}; {, −4, 1, 0, 5, 1, 4, −2, 4, 4, 1, 0, 0}; {6, −3, 6, −3, 3, 6, −5, −1, −5, 4, 0, 0}; {4, 2, 6, 4, 6, 0, −4, 0, 3, 6, 0, 0}; {, −4, 2, 2, −4, 6, −1, 4, −1, 0, 0, 0, 0}; {, −4, 6, −2, −3, 1, −5, 0, 3, 6, 3, 0, 0}; {0, 0, 6, 7, 5, 5, 0, 4, 6, 3, 10, 4}; {, −4, −1, −4, 1, −3, 2, 3, −3, 4, 3, 0, 0}; {4, −5, 4, −3, 2, 4, −2, −4, 4, 0, 0, 0}; {, −2, 4, 4, 1, −2, 3, 4, −4, 1, −2, 0, 0}; {4, −5, 4, −2, −2, 3, −2, 1, 4, 3, 0, 0}; {0, 0, 6, 9, 6, 10, 5, 9, 8, 1, 11, 9}; {0, 0, 6, 9, 11, 3, 11, 3, 0, 1, 9, 4}; {0, 0, 6, 10, 2, 1, 4, 0, 8, 8, 11, 8}; {, −2, −3, 2, 6, 1, −5, −3, 3, 1, −2, 0, 0}; {6, 4, −3, 2, −2, 5, 5, −2, 0, 3, 0, 0}; {4, 2, −5, 0, −3, 6, 0, 2, −4, 0, 0, 0}; {3, 0, 4, −2, 0, 6, 0, −3, −5, −3, 0, 0}; {0, 0, 7, 5, 0, 9, 2, 9, 3, 6, 4, 5}; {, −3, 5, −4, 2, 2, −2, 2, −1, −4, −3, 0, 0}; {, −2, −3, 3, 1, −4, −3, 4, −4, 2, −2, 0, 0}; {, −1, 6, −4, 2, −5, 3, 0, −4, −3, −2, 0, 0}; {, −3, 2, 2, 6, −1, −5, 3, 3, 0, 3, 0, 0}; {0, 0, 7, 6, 9, 3, 3, 1, 3, 5, 1, 5}; {, −3, −5, 0, −2, 2, 4, −3, 2, 5, 2, 0, 0}; {1, −3, 0, −4, 1, −2, −4, 4, −5, −3, 0, 0}; {, −3, 6, −2, −5, −4, 2, −2, 1, 4, 6, 0, 0}; {0, 0, 7, 8, 2, 1, 9, 4, 9, 7, 8, 10}; {0, 3, 1, 5, −2, 3, 4, −3, 5, 2, 0, 0}; {, −2, 4, 5, 1, −2, 4, 4, −4, 1, −1, 0, 0}; {, −5, 0, 0, −5, 4, −3, −5, −1, 3, 0, 0, 0}; {4, −1, 1, −2, 6, −3, −5, −1, −1, −5, 0, 0}; {, −4, 0, −1, 6, 0, 1, −5, 3, 5, 1, 0, 0}; {0, 0, 7, 11, 5, 3, 6, 3, 0, 0, 4, 3}; {0, 0, −5, −1, 6, −4, 1, −3, 6, −1, 0, 0}; {0, 0, 7, 11, 10, 11, 4, 3, 7, 0, 8, 8}; {, −4, 5, −2, 0, 6, −4, 5, 2, −3, 0, 0, 0}; {0, 4, 4, 2, 2, −3, −1, 4, −2, −5, 0, 0}; {0, 0, 8, 3, 3, 2, 4, 10, 2, 0, 8, 0}; {2, 1, −4, 2, 3, −3, 3, 6, 4, −2, 0, 0}; {4, 2, −4, 2, 5, 1, 6, 5, 5, 6, 0, 0}; {1, −3, 1, 6, 6, −3, 1, 0, −2, 3, 0, 0}; {2, −1, 4, −1, 6, 5, 1, 2, −4, −1, 0, 0}; {4, 2, −4, 4, 1, 5, −4, 4, 6, 0, 0, 0}; {1, −3, 1, −4, 0, −3, −3, 0, 6, 6, 0, 0}; {, −3, 5, −3, 4, −2, −4, 6, 4, −5, −4, 0, 0}; {, −2, −5, 0, −4, 6, 5, −4, −1, 5, −3, 0, 0}; {0, 0, 8, 8, 0, 10, 8, 2, 7, 2, 9, 0}; {3, −3, −1, 5, 5, 1, 5, 1, −3, −1, 0, 0}; {, −4, −5, 2, 1, 6, −3, 3, −3, 1, −1, 0, 0}; {0, 0, 8, 8, 2, 8, 3, 10, 2, 0, 2, 4}; {6, −2, −2, 2, 3, −2, 3, −3, 3, 2, 0, 0}; {, −5, 6, 1, 0, 2, −1, 4, −1, 2, −5, 0, 0}; {, −2, 1, 0, 3, −3, −1, 5, −2, −5, 4, 0, 0}; {, −3, 1, 1, 6, 3, −1, 4, 6, 3, 2, 0, 0}; {6, −1, 0, 6, 5, −4, 2, −3, 1, 0, 0, 0}; {, −3, 3, 5, 0, −4, 1, −2, −4, −3, −4, 0, 0}; {, −4, 0, 0, 6, 0, −5, −2, −4, −4, 5, 0, 0}; {0, 0, 8, 10, 0, 7, 2, 0, 4, 8, 6, 9}; {4, 1, 6, 5, −3, 5, −2, 2, 5, 2, 0, 0}; {0, 0, 8, 11, 9, 4, 11, 2, 6, 5, 5, 10}; {0, 0, 9, 0, 5, 10, 10, 10, 3, 11, 5, 3}; {, −4, 6, 1, 2, −4, 4, −3, −1, 2, −1, 0, 0}; {, −1, 5, −4, 6, 1, 6, 4, −4, −3, 3, 0, 0}; {0, 0, 9, 2, 3, 1, 9, 1, 10, 5, 6, 9}; {3, 3, 0, 5, −5, 4, −3, 2, 1, 6, 0, 0}; {, −5, 2, 6, −5, −4, −2, 4, −3, 5, 3, 0, 0}; {0, 0, 9, 3, 10, 3, 4, 1, 4, 9, 10, 1}; {, −5, 4, −2, 2, −3, −1, 3, 3, −1, −2, 0, 0}; {, −2, −3, 5, −1, −2, 3, −4, 3, −5, 0, 0, 0}; {6, 5, 1, −5, −5, 0, 5, 1, 6, −1, 0, 0}; {5, 4, 0, −5, 3, −4, 2, 5, −4, 0, 0, 0}; {, −1, 6, −2, 1, −3, −2, −5, 4, −5, −5, 0, 0}; {0, 0, 9, 5, 10, 0, 5, 1, 6, 6, 8, 4}; {3, −2, 2, 5, 5, 5, 6, 1, 6, 4, 0, 0}; {0, 0, 9, 5, 11, 11, 0, 4, 8, 3, 6, 7}; {, −4, 3, −5, −1, −5, −4, 6, 4, −5, −5, 0, 0}; {3, −5, −4, −3, 3, −2, −5, 5, 0, 3, 0, 0}; {0, −5, −1, 4, 4, 0, 3, 1, −3, −3, 0, 0}; {0, 5, −5, −2, −1, −3, −4, 3, −3, 3, 0, 0}; {0, 0, 9, 8, 2, 5, 0, 6, 7, 11, 9, 2}; {, −2, −2, −5, 6, 0, 5, −1, 4, −3, −3, 0, 0}; {2, −2, 3, −2, 4, 5, 2, 2, 5, 5, 0, 0}; {3, −3, 0, 6, 5, 1, 4, 1, −3, −2, 0, 0}; {2, −2, 3, −1, 6, 5, 1, 2, −4, −1, 0, 0}; {, −5, −1, 0, 4, −2, 5, 2, 2, −2, 2, 0, 0}; {4, −5, −5, −1, 4, −1, 2, 0, −2, 5, 0, 0}; {1, 3, 2, 6, 0, −5, −1, −1, 5, 3, 0, 0}; {, −5, 2, 6, 3, 4, 6, −1, 0, −3, 6, 0, 0}; {6, −3, −2, 3, −3, 4, −3, −2, 6, 2, 0, 0}; {, −4, 0, 2, −3, 3, 0, 4, 6, 3, 1, 0, 0}; {0, 0, 10, 1, 8, 1, 4, 5, 10, 10, 4, 1}; {, −4, 2, 6, 3, 4, 6, −1, 0, −3, 6, 0, 0}; {3, −2, 3, 2, −3, 2, 4, 5, −5, 1, 0, 0}; {0, 0, 10, 2, 3, 8, 9, 10, 6, 1, 7, 0}; {2, −4, 0, −2, 6, 6, 1, −4, −2, 0, 0, 0}; {, −1, −1, −3, 1, −5, 4, 1, −1, 5, −3, 0, 0}; {1, −4, 1, 0, 2, −2, 2, 5, −5, 4, 0, 0}; {4, −1, 4, 4, −1, 0, −4, 5, −2, 0, 0, 0}; {4, 0, 6, −5, 4, −5, −1, 4, 3, −2, 0, 0}; {1, 6, −3, −4, 2, 6, 2, −1, −2, 2, 0, 0}; {3, −1, 5, −5, 6, −1, 2, 1, 0, 4, 0, 0}; {0, 5, −4, −4, 1, 6, 1, −2, −3, 2, 0, 0}; {0, 0, 10, 5, 5, 10, 3, 9, 10, 10, 2, 9}; {5, 3, −1, 4, 4, −1, 4, −5, 5, −2, 0, 0}; {3, 0, −5, 0, −5, −2, 1, 0, 3, 4, 0, 0}; {1, −1, −5, 2, −4, −3, −2, 4, −4, 0, 0, 0}; {0, 0, 10, 7, 3, 8, 3, 7, 6, 8, 11, 4}; {, −3, 4, −3, 1, 5, 2, −1, 0, −2, −4, 0, 0}; {, −3, 6, 1, −5, 1, 1, −1, 2, 5, −1, 0, 0}; {5, −3, −1, 1, −2, 5, 2, 3, 0, 4, 0, 0}; {, −5, 4, −1, 6, −3, 6, 5, 3, −5, −2, 0, 0}; {1, 0, −3, −4, 1, 5, −2, 5, −2, −3, 0, 0}; {0, 0, 10, 11, 0, 2, 6, 10, 8, 3, 10, 3}; {, −2, 4, −4, 3, −4, −5, −1, −1, 3, 3, 0, 0}; {, −4, 2, −5, 2, −3, 6, 5, −2, 0, 2, 0, 0}; {, −1, 6, 0, −4, −4, 2, 6, −4, −2, 1, 0, 0}; {0, 0, 11, 1, 3, 9, 8, 5, 1, 6, 0, 8}; {6, 1, −5, 4, 4, −1, 3, −5, −4, 0, 0, 0}; {, −4, 2, −5, 3, 4, 6, 0, 0, −3, −5, 0, 0}; {0, 0, 11, 4, 1, 7, 8, 1, 3, 9, 0, 9}; {, −1, 4, −4, −5, 1, 4, 2, −1, −3, 2, 0, 0}; {, −1, 1, 2, −2, 2, −1, 3, −3, 6, 5, 0, 0}; {0, 0, 11, 6, 1, 0, 4, 7, 10, 5, 8, 4}; {, −5, 2, −4, −2, 1, 3, −3, 5, 1, 1, 0, 0}; {, −5, 3, −2, 1, −4, −1, 3, 3, −1, −2, 0, 0}; {, −4, 4, −1, 3, −2, 1, 3, 2, 4, 5, 0, 0}; {3, −3, 2, 4, −3, 5, 3, 4, −1, −2, 0, 0}; {0, 0, 11, 7, 8, 4, 11, 10, 2, 2, 9, 2}; {5, 2, −2, 3, 1, 1, −4, −2, 5, −3, 0, 0}; {6, 3, −1, 5, −5, 3, 6, 5, 5, −2, 0, 0}; {1, −4, 2, 6, −4, 3, 1, 0, −2, −3, 0, 0}; {, −5, 4, 0, −5, −5, 5, −5, 2, 5, −2, 0, 0}; {2, −1, −5, 2, 6, 3, 2, 2, −5, −2, 0, 0}; {0, 0, 11, 9, 4, 9, 3, 9, 3, 4, 8, 8}; {5, 1, −4, 2, −4, −1, 1, 0, 3, 4, 0, 0}; {6, 0, 5, −3, 5, 5, 5, 3, −3, −4, 0, 0}; {, −5, 1, 6, 0, −4, 5, 5, −3, 0, 1, 0, 0}; {2, −2, 5, 1, 2, −3, 1, 6, −4, −1, 0, 0}; and {1, −4, 2, −3, −1, −2, −3, 0, 5, 6, 0, 0}; and {0, 0, 0, 0, 3, 6, 0, 10, 6, 3, 8, 1}; {0, 0, 1, 3, 3, 9, 6, 2, 4, 11, 2, 9}; {0, 0, 3, 0, 9, 4, 3, 3, 9, 1, 8, 0}; {0, 0, 3, 1, 10, 11, 8, 2, 6, 1, 2, 7}; {0, 0, 3, 1, 11, 6, 7, 1, 4, 11, 7, 11}; {0, 0, 3, 6, 10, 8, 8, 3, 11, 9, 0, 8}; {0, 0, 3, 7, 1, 4, 7, 6, 4, 0, 5, 2}; {0, 0, 4, 8, 8, 3, 9, 0, 7, 1, 10, 10}; {0, 0, 6, 3, 5, 1, 5, 1, 8, 1, 2}; {0, 0, 6, 6, 1, 3, 4, 4, 5, 0, 6, 0}; {0, 0, 6, 8, 1, 3, 1, 4, 9, 5, 11, 8}; {0, 0, 7, 8, 6, 2, 9, 6, 10, 3, 9}; {0, 0, 7, 8, 10, 9, 11, 2, 9, 1, 8, 4}; {0, 0, 8, 4, 4, 9, 3, 0, 5, 11, 2, 2}; {0, 0, 8, 5, 7, 10, 2, 10, 0, 11, 4, 11}; {0, 0, 8, 6, 9, 3, 11, 3, 4, 0, 4, 5}; {0, 0, 9, 1, 3, 9, 9, 9, 3, 0, 5, 0}; {0, 0, 10, 0, 7, 11, 7, 4, 11, 11, 2, 5}; {0, 0, 10, 11, 2, 7, 8, 2, 10, 2, 8, 4}; and {0, 0, 11, 6, 5, 0, 8, 1, 0, 4, 10, 1}; and mapping the sequence $\{f_n\}$ to N subcarriers to generate and send a first signal.

2. The signal processing method according to claim 1, wherein the mapping of the sequence $\{f_n\}$ to the N subcarriers comprises:

respectively mapping the N elements in the sequence $\{f_n\}$ to N consecutive subcarriers; or respectively mapping the N elements in the sequence $\{f_n\}$ to N equally spaced subcarriers.

3. The signal processing method according to claim 2, wherein the first signal is a reference signal, or a signal used to carry communication information.

4. The signal processing method according to claim 3, wherein the equivalent sequence is $\{q_n\}$, for $q_n$ in the equivalent sequence $\{q_n\}$, $q_n=s_n+u_n \pmod M$, and for $u_n$ in a sequence $\{u_n\}$ consisting of $u_n$, $u_n=f+g\cdot n \pmod M$, wherein $f\in\{0, 1, 2, \ldots, M-1\}$, $g\in\{0, 1, 2, \ldots, M-1\}$, and M=12.

5. The signal processing method according to claim 2, wherein the equivalent sequence is $\{q_n\}$, for $q_n$ in the equivalent sequence $\{q_n\}$, $q_n=s_n+u_n \pmod M$, and for $u_n$ in a sequence $\{u_n\}$ consisting of $u_n$, $u_n=f+g\cdot n \pmod M$, wherein $f\in\{0, 1, 2, \ldots, M-1\}$, $g\in\{0, 1, 2, \ldots, M-1\}$, and M=12.

6. The signal processing method according to claim 1, wherein the first signal is a reference signal, or a signal used to carry communication information.

7. The signal processing method according to claim 6, wherein the equivalent sequence is $\{q_n\}$, for $q_n$ in the equivalent sequence $\{q_n\}$, $q_n=s_n+u_n \pmod M$, and for $u_n$ in a sequence $\{u_n\}$ consisting of $u_n$, $u_n=f+g\cdot n \pmod M$, wherein $f\in\{0, 1, 2, \ldots, M-1\}$, $g\in\{0, 1, 2, \ldots, M-1\}$, and M=12.

8. The signal processing method according to claim 1, wherein the set of sequences $\{s_n\}$ consisting of an element $s_n$ comprises at least a first sequence in a second sequence set or an equivalent sequence of the first sequence, and a second sequence in the second sequence set or an equivalent sequence of the second sequence;

wherein the second sequence set is one of the following sets: a sequence set 1, a sequence set 2, a sequence set 3, a sequence set 4, a sequence set 5, a sequence set 6, a sequence set 7, a sequence set 8, a sequence set 9, a sequence set 10, a sequence set 11, a sequence set 12, a sequence set 13, or a sequence set 14;

sequences in the sequence set 1 comprise one or more of the following sequences:

{6, 2, −3, −3, 3, −3, 1, 2, 4, 0, 0, 0}; {1, −4, 2, −3, −1, −2, −3, 0, 5, 6, 0, 0}; {5, −5, 0, 6, 3, −5, 5, −4, 6, 5, 0, 0}; {2, 1, 3, −4, 5, −2, 5, 0, 1, 5, 0, 0}; {, −3, 2, 2, 6, −1, −5, 3, 3, 0, 3, 0, 0}; {, −1, −3, 6, 0, 3, −1, 2, 3, 3, −4, 0, 0}; {, −2, 2, 6, 6, −1, 5, 0, −1, −4, 1, 0, 0}; {, −4, 4, 3, −2, 1, 5, −1, −4, −1, −2, 0, 0}; {, −1, 2, −4, 2, −4, −4, −1, −2, 4, 2, 0, 0}; {3, −3, 0, 6, 5, 1, 4, 1, −3, −2, 0, 0}; {1, 4, −1, −3, −1, −4, 5, −2, −2, −5, 0, 0}; {, −3, 5, −3, 4, −2, −4, 6, 4, −5, −4, 0, 0}; {, −4, −5, 2, 1, 6, −3, 3, −3, 1, −1, 0, 0}; {4, −4, −3, 3, −3, 5, −4, −5, −5, 4, 0, 0}; {3, 6, −1, 5, 0, −2, 0, −2, −4, −5, 0, 0}; {5, 2, −2, 3, 1, 1, −4, −2, 5, −3, 0, 0}; {3, 0, −3, 3, −3, −1, −3, 5, −4, −1, 0, 0}; {3, 5, 0, 3, −4, 4, 2, −5, 5, −1, 0, 0}; {4, 2, −4, 4, 1, 5, −4, 4, 6, 0, 0, 0}; {2, −4, −5, 1, 1, −5, 2, 6, 1, 1, 0, 0}; {6, 1, 0, −2, 3, −5, −2, −3, 2, −2, 0, 0}; {, −2, 1, 0, 3, −3, −1, 5, −2, −5, 4, 0, 0}; {, −3, 1, −4, 3, 6, −2, −3, 5, 1, −1, 0, 0}; {2, −3, 4, −4, −5, 6, −1, −1, 3, 5, 0, 0}; {1, −4, 1, 0, 2, −2, 2, 5, −5, 4, 0, 0}; {, −3, 1, −5, −2, −2, 3, −1, 6, 5, 1, 0, 0}; {5, 1, −4, 2, −4, −1, 1, 0, 3, 4, 0, 0}; {2, −4, 0, −2, 6, 6, 1, −4, −2, 0, 0, 0}; {, −3, 6, −2, −5, −4, 2, −2, 1, 4, 6, 0, 0}; and {−1, 6, 2, −2, 3, −4, 0, 3, 3, 3, 0, 0};

sequences in the sequence set 2 comprise one or more of the following sequences:

{6, 2, −3, −3, 3, −3, 1, 2, 4, 0, 0, 0}; {6, 0, −5, 1, 0, 2, 0, 0, 5, 5, 0, 0}; {6, −3, 1, −5, −2, −5, 3, −4, 6, 1, 0, 0}; {, −4, 2, 2, −4, 6, −1, 4, −1, 0, 0, 0, 0}; {, −3, −5, −1, −5, 4, 3, −3, −1, 5, −2, 0, 0}; {, −5, −2, 4, 4, −2, 3, 0, −2, −4, 0, 0, 0}; {, −2, −3, 5, −1, −2, 3, −4, 3, −5, 0, 0, 0}; {4, 2, −4, 2, 5, 1, 6, 5, 5, 6, 0, 0}; {, −2, −1, 1, −5, 3, 6, 2, 0, −1, 6, 0, 0}; {5, −4, 1, 6, 1, −1, 1, 0, 6, 3, 0, 0}; {, −3, 5, 4, 3, −3, 2, 5, −5, 0, −3, 0, 0}; {0, 2, 5, −2, 5, 3, 3, −3, 4, 0, 0, 0}; {4, −1, 4, 4, −1, 0, −4, 5, −2, 0, 0, 0}; {6, 1, −5, 4, 4, −1, 3, −5, −4, 0, 0, 0}; {4, −1, 1, −2, 6, −3, −5, −1, −1, −5, 0, 0}; {3, −3, 2, 4, −3, 5, 3, 4, −1, −2, 0, 0}; {, −3, 1, −1, 1, 5, 1, −3, 5, 3, 4, 0, 0}; {, −5, 6, −3, −5, 3, −1, 2, −2, 3, 6, 0, 0}; {, −3, 1, −3, 6, −4, 6, 5, −1, −5, −4, 0, 0}; {6, −2, −2, 2, 3, −2, 3, −3, 3, 2, 0, 0}; {, −1, −5, 4, −4, 3, 5, 0, 6, −5, −1, 0, 0}; {, −2, −3, 2, 6, 1, −5, −3, 3, 1, −2, 0, 0}; {, −3, −5, 0, −2, 2, 4, −3, 2, 5, 2, 0, 0}; {4, −5, −5, −1, 4, −1, 2, 0, −2, 5, 0, 0}; {2, −1, −5, 2, 6, 3, 2, 2, −5, −2, 0, 0}; {3, 0, −5, 0, −5, −2, 1, 0, 3, 4, 0, 0}; {, −1, 4, 1, −5, −3, 3, 4, −1, 0, −2, 0, 0}; {, −5, 5, −3, 6, −4, 1, −3, 1, 4, 6, 0, 0}; {, −5, 4, −2, 2, −3, −1, 3, 3, −1, −2, 0, 0}; {0, 4, 0, −4, 2, −2, −2, 6, −4, 0, 0, 0};

sequences in the sequence set 3 comprise one or more of the following sequences:

{6, 2, −3, −3, 3, −3, 1, 2, 4, 0, 0, 0}; {4, 5, 6, −2, 3, −1, 4, −1, −2, 4, 0, 0}; {2, −5, 3, −4, 3, 3, 6, −5, 4, 5, 0, 0}; {5, 1, 1, 6, −1, 2, −2, −5, −3, −3, 0, 0}; {0, 4, 4, 2, 2, −3, −1, 4, −2, −5, 0, 0}; {, −5, 4, 0, −5, −5, 5, −5, 2, 5, −2, 0, 0}; {6, −4, 2, −4, −1, 4, 1, −5, 3, 0, 0, 0}; {, −3, 5, −4, 2, 2, −2, 2, −1, −4, −3, 0, 0}; {, −2, −3, 3, 1, −4, −3, 4, −4, 2, −2, 0, 0}; {3, −1, −3, 1, 2, 5, 3, −5, 1, 4, 0, 0}; {, −1, 4, −4, −5, 1, 4, 2, −1, −3, 2, 0, 0}; {, −3, 3, 5, 0, −4, 1, −2, −4, −3, −4, 0, 0}; {2, −4, 2, 1, 6, 4, −5, −1, 3, 1, 0, 0}; {3, −3, −4, −1, 3, −2, −5, −5, −1, 4, 0, 0}; {, −5, 2, 6, 3, 4, 6, −1, 0, −3, 6, 0, 0}; {6, 6, −3, −5, 3, −2, 2, −4, 3, 5, 0, 0}; {4, −5, 0, −5, −4, 0, 2, 1, 5, 1, 0, 0}; {3, −2, 2, 5, 5, 5, 6, 1, 6, 4, 0, 0}; {0, 1, 6, −1, 6, 3, 4, −1, −2, 2, 0, 0}; {, −3, −5, −2, −4, 4, −4, 1, 6, −4, 6, 0, 0}; {, −3, −1, 6, −2, 3, 1, 0, 5, 3, −2, 0, 0}; {3, −5, 3, −1, −5, 6, 2, 5, −2, 0, 0, 0}; {3, 6, 2, 5, −5, 2, −2, 5, 5, 5, 0, 0}; {, −4, 5, −2, 0, 6, −4, 5, 2, −3, 0, 0, 0}; {1, 3, 2, 6, 0, −5, −1, −1, 5, 3, 0, 0}; {4, −5, 4, −2, −2, 3, −2, 1, 4, 3, 0, 0}; {, −1, −1, −3, 1, −5, 4, 1, −1, 5, −3, 0, 0}; {, −3, 4, −3, 1, 5, 2, −1, 0, −2, −4, 0, 0}; {, −5, 4, 6, 4, −3, 0, −4, 2, 2, −4, 0, 0}; and {3, −1, 5, −5, 6, −1, 2, 1, 0, 4, 0, 0};

sequences in the sequence set 4 comprise one or more of the following sequences:

{0, −2, 4, 2, −4, −3, −4, −4, −4, 2, −5, −1}; {, −2, −2, −5, 6, 0, 5, −1, 4, −3, −3, 0, 0}; {, −1, 6, 0, −4, −4, 2, 6, −4, −2, 1, 0, 0}; {, −2, 2, −2, 1, 5, −2, −2, 6, 4, −1, 0, 0}; {, −4, 0, −1, 6, 0, 1, −5, 3, 5, 1, 0, 0}; {6, 5, 1, −5, −5, 0, 5, 1, 6, −1, 0, 0}; {3, −4, 3, −4, 5, 5, 2, 2, −4, −3, 0, 0}; {5, −1, 6, 6, 5, 2, −5, 4, 6, −4, 0, 0}; {, −4, 1, −5, 4, −4, −5, −4, −2, 5, 4, 0, 0}; {, −1, 5, −4, 6, 1, 6, 4, −4, −3, 3, 0, 0}; {1, −5, 2, 1, 5, 0, 1, −3, −5, −4, 0, 0}; {, −5, 2, 6, −5, −4, −2, 4, −3, 5, 3, 0, 0}; {0, 0, 1, 6, 3, −1, 4, 6, 1, 5, 0, 0}; {, −4, −5, 0, −2, −4, −3, 3, 6, 2, −5, 0, 0}; {5, 1, 2, 6, 0, 2, −2, 6, −3, −4, 0, 0}; {3, −3, 2, 4, −3, 5, 3, 4, −1, −2, 0, 0}; {, −4, −1, −5, 1, 0, 5, 0, 3, 5, 4, 0, 0}; {6, −3, −2, 3, −3, 4, −3, −2, 6, 2, 0, 0}; {, −2, −3, 2, 6, 1, −5, −3, 3, 1, −2, 0, 0}; {, −3, 6, 1, −5, 1, 1, −1, 2, 5, −1, 0, 0}; {6, 1, −3, 3, −4, 0, 4, 6, 6, 5, 0, 0}; {, −5, 1, −4, −5, −1, 5, −5, −5, −4, 2, 0, 0}; {4, 2, 6, 4, 6, 0, −4, 0, 3, 6, 0, 0}; {, −5, −1, 0, 4, −2, 5, 2, 2, −2, 2, 0, 0}; {6, 3, −1, 5, −5, 3, 6, 5, 5, −2, 0, 0}; {1, −1, −5, 2, −4, −3, −2, 4, −4, 0, 0, 0}; {, −1, 0, 3, 1, 0, −5, −2, 5, 1, 6, 0, 0}; {, −3, 0, 6, 5, 0, 2, −4, 4, −1, −1, 0, 0}; {, −4, −1, −4, 1, −3, 2, 3, −3, 4, 3, 0, 0}; and {0, −4, −5, 1, −5, −2, 5, −4, −5, −1, 0, 0};

sequences in the sequence set 5 comprise one or more of the following sequences:

{0, 0, 8, 7, 6, 0, 6, 4, 9, 5, 7, 10}; {0, 0, 5, 2, 1, 2, 1, 9, 6, 10, 3, 8}; {0, 0, 1, 3, 11, 7, 11, 4, 5, 0, 0, 7}; {0, 0, 10, 5, 5, 10, 3, 9, 10, 10, 2, 9}; {0, 0, 3, 4, 11, 1, 7, 10, 5, 11, 6, 3}; {0, 0, 4, 8, 6, 2, 2, 11, 3, 4, 0, 5}; {0, 0, 2, 10, 4, 0, 11, 9, 6, 0, 3, 5}; {0, 0, 9, 2, 3, 1, 9, 1, 10, 5, 6, 9}; {0, 0, 7, 11, 5, 3, 6, 3, 0, 0, 4, 3}; {0, 0, 8, 8, 0, 10, 8, 2, 7, 2, 9, 0}; {0, 0, 4, 10, 2, 4, 7, 6, 10, 7, 5, 3}; {0, 0, 5, 2, 1, 5, 2, 5, 0, 10, 0, 7}; {0, 0, 3, 3, 7, 1, 5, 3, 1, 11, 7, 11}; {0, 0, 9, 5, 11, 11, 0, 4, 8, 3, 6, 7}; {0, 0, 2, 11, 10, 4, 6, 9, 3, 8, 2, 9}; {0, 0, 9, 0, 5, 10, 10, 10, 3, 11, 5, 3}; {0, 0, 9, 8, 2, 5, 0, 6, 7, 11, 9, 2}; {0, 0, 1, 10, 1, 8, 11, 3, 2, 8, 7, 2}; {0, 0, 1, 6, 11, 3, 10, 7, 4, 11, 2, 1}; {0, 0, 11, 7, 8, 4, 11, 10, 2, 2, 9, 2}; {0, 0, 4, 8, 10, 3, 11, 4, 2, 2, 11, 6}; {0, 0, 6, 7, 5, 5, 0, 4, 6, 3, 10, 4}; {0, 0, 2, 7, 6, 4, 11, 8, 5, 9, 4, 7}; {0, 0, 7, 11, 10, 11, 4, 3, 7, 0, 8, 8}; {0, 0, 1, 5, 9, 2, 10, 3, 0, 8, 4, 4}; {0, 0, 0, 1, 10, 8, 5, 0, 4, 9, 10, 2}; {0, 0, 9, 5, 10, 0, 5, 1, 6, 6, 8, 4}; {0, 0, 11, 4, 1, 7, 8, 1, 3, 9, 0, 9}; {0, 0, 1, 9, 0, 1, 6, 1, 8, 8, 5, 0}; and {0, 0, 8, 10, 0, 7, 2, 0, 4, 8, 6, 9};

sequences in the sequence set 6 comprise one or more of the following sequences:

{0, 0, 8, 4, 6, 1, 9, 1, 1, 8, 0, 0}; {0, 0, 1, 9, 2, 5, 4, 8, 5, 1, 0, 6}; {0, 0, 10, 1, 8, 1, 4, 5, 10, 10, 4, 1}; {0, 0, 3, 6, 5, 2, 7, 4, 3, 1, 7, 0}; {0, 0, 2, 11, 11, 5, 6, 2, 5, 10, 6, 1}; {0, 0, 3, 3, 11, 8, 5, 7, 3, 6, 11, 4}; {0, 0, 8, 11, 9, 4, 11, 2, 6, 5, 5, 10}; {0, 0, 11, 6, 1, 0, 4, 7, 10, 5, 8, 4}; {0, 0, 6, 10, 2, 1, 4, 0, 8, 8, 11, 8}; {0, 0, 10, 11, 0, 2, 6, 10, 8, 3, 10, 3}; {0, 0, 9, 3, 10, 3, 4, 1, 4, 9, 10, 1}; {0, 0, 7, 5, 0, 9, 2, 9, 3, 6, 4, 5}; {0, 0, 0, 4, 8, 11, 9, 6, 10, 5, 0, 11}; {0, 0, 11, 9, 4, 9, 3, 9, 3, 4, 8, 8}; {0, 0, 8, 3, 3, 2, 4, 10, 2, 0, 8, 0}; {0, 0, 3, 8, 2, 2, 9, 7, 6, 2, 6, 3}; {0, 0, 4, 11, 11, 0, 11, 9, 3, 5, 2, 8}; {0, 0, 6, 5, 8, 6, 6, 8, 1, 6, 11, 7}; {0, 0, 6, 9, 6, 10, 5, 9, 8, 1, 11, 9}; {0, 0, 11, 1, 3, 9, 8, 5, 1, 6, 0, 8}; {0, 0, 7, 8, 2, 1, 9, 4, 9, 7, 8, 10}; {0, 0, 2, 0, 8, 9, 6, 10, 3, 9, 9, 2}; {0, 0, 4, 0, 6, 1, 9, 7, 6, 2, 5, 8}; {0, 0, 10, 7, 3, 8, 3, 7, 6, 8, 11, 4}; {0, 0, 10, 2, 3, 8, 9, 10, 6, 1, 7, 0}; {0, 0, 7, 6, 9, 3, 3, 1, 3, 5, 1, 5}; {0, 0, 4, 1, 8, 3, 5, 3, 2, 9, 11, 4}; {0, 0, 6, 9, 11, 3, 11, 3, 0, 1, 9, 4}; {0, 0, 3, 8, 10, 7, 4, 3, 8, 4, 8, 6}; and {0, 0, 8, 8, 2, 8, 3, 10, 2, 0, 2, 4};

sequences in the sequence set 7 comprise one or more of the following sequences:

{0, 4, −4, −2, 4, 3, 0, −4, −2, −4, −1, −3}; {, −4, −1, 0, 5, −1, 6, −2, −2, −5, 3, 0, 0}; {, −5, 5, −1, 1, −2, 3, −4, 1, 1, −3, 0, 0}; {, −4, 2, −5, 3, 4, 6, 0, 0, −3, −5, 0, 0}; {, −1, 5, 0, −5, 3, 2, 2, −5, −2, 1, 0, 0}; {, −5, 0, −5, 1, 3, −4, −4, 2, 1, 0, 0, 0}; {1, −3, 0, −4, 1, −2, −4, 4, −5, −3, 0, 0}; {, −1, −3, 6, 0, 3, −1, 2, 3, 3, −4, 0, 0}; {1, 3, −3, 4, 6, −3, 2, 0, 5, 1, 0, 0}; {, −2, 2, 6, 6, −1, 5, 0, −1, −4, 1, 0, 0}; {2, −4, 3, −5, −5, 5, −2, 0, 4, 4, 0, 0}; {3, 3, 0, 1, −5, 0, 6, 2, −4, −4, 0, 0}; {5, 3, −1, 4, 4, −1, 4, −5, 5, −2, 0, 0}; {3, 3, −5, −5, 1, −3, 3, −4, 2, 3, 0, 0}; {, −2, 4, 5, 1, −2, 4, 4, −4, 1, −1, 0, 0}; {5, 1, 0, 5, −2, 2, −3, 6, −2, 0, 0, 0}; {, −5, −1, 6, 0, 6, 6, −4, −4, 6, 5, 0, 0}; {3, 2, 4, −3, 6, −1, 5, 0, 1, 5, 0, 0}; {, −5, 1, −5, 6, −1, 5, −5, 6, −5, 1, 0, 0}; {2, −1, 4, −1, 6, 5, 1, 2, −4, −1, 0, 0}; {3, −3, 0, 6, 5, 1, 5, 2, −3, −2, 0, 0}; {2, −4, −5, −1, 2, −4, −4, 4, −1, 1, 0, 0}; {, −1, 3, −5, 1, −4, −3, −3, 4, 1, −2, 0, 0}; {, −4, 1, 0, 5, 1, 4, −2, 4, 4, 1, 0, 0}; {, −5, −2, 4, −5, −1, −5, 4, −4, 6, 0, 0, 0}; {, −2, 4, −4, 3, −4, −5, −1, −1, 3, 3, 0, 0}; {1, −3, 1, −4, 0, −3, −3, 0, 6, 6, 0, 0}; {2, −2, 5, 1, 2, −3, 1, 6, −4, −1, 0, 0}; {1, −5, 1, −3, −5, −1, −1, 6, −5, 1, 0, 0}; and {4, 6, −4, 4, −3, 6, 0, 6, 6, 3, 0, 0};

sequences in the sequence set 8 comprise one or more of the following sequences:

{0, −3, −5, 2, −3, 1, −2, −1, −1, 2, 6, −4}; {, −5, 3, 5, 0, 5, 1, −1, 6, −4, −2, 0, 0}; {0, −2, 6, 0, −1, 3, −4, 3, −5, 0, 0, 0}; {, −3, 0, 5, 0, −5, −3, −5, 3, 0, −2, 0, 0}; {, −2, 4, 4, 1, −2, 3, 4, −4, 1, −2, 0, 0}; {, −3, 0, 5, 2, −5, 3, −1, −2, 2, 2, 0, 0}; {5, −3, −1, 1, −2, 5, 2, 3, 0, 4, 0, 0}; {1, 6, 0, −5, 4, −2, 0, 3, 3, 3, 0, 0}; {5, 0, 0, 5, −4, 3, 5, 1, −3, 0, 0, 0}; {0, 5, −4, −4, 1, 6, 1, −2, −3, 2, 0, 0}; {, −3, −3, 5, −2, −1, −5, 1, 5, 3, −3, 0, 0}; {1, 6, 2, −4, −2, 0, −2, −1, 4, 3, 0, 0}; {, −1, −4, 0, −4, −1, −1, 3, −5, −4, 4, 0, 0}; {3, 1, −4, −2, −4, 1, 6, −1, 0, −4, 0, 0}; {6, 0, 5, −3, 5, 5, 5, 3, −3, −4, 0, 0}; {, −4, −1, 2, −4, 6, −2, −4, −5, −4, 3, 0, 0}; {6, 6, −2, −3, 4, −2, 5, −3, 3, 3, 0, 0}; {, −3, 1, 1, 6, 3, −1, 4, 6, 3, 2, 0, 0}; {, −5, 4, −1, 6, −3, 6, 5, 3, −5, −2, 0, 0}; {, −4, 2, 6, 3, 4, 6, −1, 0, −3, 6, 0, 0}; {4, −2, 6, −3, −4, 6, 1, 0, 3, 6, 0, 0}; {, −2, −5, 5, −4, 4, 6, 1, 6, −4, −4, 0, 0}; {4, −5, 4, −3, 2, 4, −2, −4, 4, 0, 0, 0}; {, −4, −5, 0, −2, −4, −3, 3, 6, 2, −5, 0, 0}; {, −4, 4, −1, 3, −2, 1, 3, 2, 4, 5, 0, 0}; {6, −1, 0, 6, 5, −4, 2, −3, 1, 0, 0, 0}; {, −4, 2, −5, 2, −3, 6, 5, −2, 0, 2, 0, 0}; {0, 3, 1, 5, −2, 3, 4, −3, 5, 2, 0, 0}; {, −5, 4, 5, −1, 6, −5, 1, 5, 5, −2, 0, 0}; and {0, −1, 3, 5, 4, −1, 4, 5, 0, 4, 0, 0};

sequences in the sequence set 9 comprise one or more of the following sequences:

{0, 4, 0, −2, 1, −2, −4, 1, 2, 0, 5, −5}; {1, 4, −1, 4, −3, −3, 0, −2, 6, 2, 0, 0}; {0, −5, −1, 4, 4, 0, 3, 1, −3, −3, 0, 0}; {1, 6, −3, −4, 2, 6, 2, −1, −2, 2, 0, 0}; {5, 3, 1, 5, 1, 3, −2, 5, 6, −3, 0, 0}; {2, −2, 3, −2, 4, 5, 2, 2, 5, 5, 0, 0}; {4, −5, 0, 4, 2, 6, 3, −4, 6, 4, 0, 0}; {3, −2, 5, −2, 0, −2, −3, 3, 3, −2, 0, 0}; {, −1, 6, 3, 1, 6, −1, −2, 0, −5, −1, 0, 0}; {, −1, 2, −4, 2, −4, 6, 1, 2, −2, −2, 0, 0}; {, −5, 3, 2, 5, 3, 0, 4, −3, 5, −4, 0, 0}; {1, 0, −3, −4, 1, 5, −2, 5, −2, −3, 0, 0}; {, −4, 0, 0, 6, 0, −5, −2, −4, −4, 5, 0, 0}; {6, 4, −3, 2, −2, 5, 5, −2, 0, 3, 0, 0}; {, −4, 6, −2, −3, 1, −5, 0, 3, 6, 3, 0, 0}; {, −4, 2, 1, −4, −2, 3, −3, 6, −2, 0, 0, 0}; {4, −2, 6, −3, −4, 6, 1, 0, 3, 6, 0, 0}; {6, −3, 6, −3, 3, 6, −5, −1, −5, 4, 0, 0}; {, −5, 6, −3, −5, 3, −1, 2, −2, 3, 6, 0, 0}; {4, 0, 6, −5, 4, −5, −1, 4, 3, −2, 0, 0}; {, −5, 2, 6, −5, −4, −2, 4, −3, 5, 3, 0, 0}; {, −3, 1, 5, 0, −5, −3, −4, 3, 0, −2, 0, 0}; {0, 5, −5, −2, −1, −3, −4, 3, −3, 3, 0, 0}; {6, 3, 4, 0, 6, 4, −2, 4, 6, −2, 0, 0}; {, −5, −4, 6, 3, 6, −1, 5, 5, −2, −5, 0, 0}; {, −3, 2, −5, 0, −1, −3, −5, 5, −3, −4, 0, 0}; {4, 2, −5, 0, −3, 6, 0, 2, −4, 0, 0, 0}; {, −1, 6, 5, 4, −2, 1, −2, 0, 1, −4, 0, 0}; {, −4, 0, 5, 2, −3, −4, 4, −2, 1, 1, 0, 0}; and {, −5, 6, 1, 0, 2, −1, 4, −1, 2, −5, 0, 0};

sequences in the sequence set 10 comprise one or more of the following sequences:

{6, 0, 6, 0, 4, −5, −4, 2, 0, −2, 0, 0}; {2, −4, 3, −5, −5, 5, −1, 0, 3, 4, 0, 0}; {, −4, 0, 4, 3, −2, 3, −1, −2, −5, 0, 0, 0}; {0, 4, −2, 4, −3, −4, −1, −2, 6, 5, 0, 0}; {3, 0, 4, −2, 0, 6, 0, −3, −5, −3, 0, 0}; {, −1, 0, 3, 4, −1, −5, 2, −5, 2, 3, 0, 0}; {, −1, −1, 1, −4, 6, −3, 3, −2, −1, 5, 0, 0}; {, −1, 6, −4, 2, −5, 3, 0, −4, −3, −2, 0, 0}; {6, 3, −1, 5, −1, 0, −1, 6, −3, 0, 0, 0}; {3, −2, 3, 2, −3, 2, 4, 5, −5, 1, 0, 0}; {, −5, 0, 0, −5, 4, −3, −5, −1, 3, 0, 0, 0}; {3, −3, 5, 2, 2, −3, 1, −5, −3, −1, 0, 0}; {, −2, −3, 2, −1, 3, 4, −3, 2, 5, 2, 0, 0}; {, −2, 3, −4, 4, 5, 6, 1, 1, −3, −5, 0, 0}; {2, 1, −4, 2, 3, −3, 3, 6, 4, −2, 0, 0}; {, −4, 0, 2, −3, 3, 0, 4, 6, 3, 1, 0, 0}; {0, 3, 1, 5, −2, 3, 4, −3, 5, 2, 0, 0}; {1, −2, −5, 0, 5, 0, 3, 2, 4, 6, 0, 0}; {, −5, 3, −2, 1, −4, −1, 3, 3, −1, −2, 0, 0}; {, −4, 3, −5, −1, −5, −4, 6, 4, −5, −5, 0, 0}; {, −4, −1, 2, −4, 6, −2, −4, −5, −4, 3, 0, 0}; {2, −4, −4, −1, 2, −3, −4, 4, −1, 2, 0, 0}; {, −1, −1, 4, −5, −4, 3, −2, 1, −3, 2, 0, 0}; {4, 0, −4, 2, 1, 4, −4, 3, 5, 0, 0, 0}; {4, −5, 4, −3, 2, 4, −2, −4, 4, 0, 0, 0}; {, −2, −5, 0, −4, 6, 5, −4, −1, 5, −3, 0, 0}; {0, −4, −3, 4, −2, −5, 1, 6, −5, −1, 0, 0}; {, −5, −1, −5, −2, 4, −1, −4, 4, 5, 6, 0, 0}; {, −4, 3, −1, 0, 6, 6, −1, 3, −1, −1, 0, 0}; and {, −1, 1, 2, −2, 2, −1, 3, −3, 6, 5, 0, 0};

sequences in the sequence set 11 comprise one or more of the following sequences:

{6, 0, 6, 0, 4, −5, −4, 2, 0, −2, 0, 0}; {, −2, 1, −4, −4, 4, −4, 3, −1, −4, −2, 0, 0}; {5, 2, 4, −1, 5, 6, 1, 5, 5, −3, 0, 0}; {3, 3, 0, 5, −5, 4, −3, 2, 1, 6, 0, 0}; {, −5, 1, 6, 0, −4, 5, 5, −3, 0, 1, 0, 0}; {, −1, 4, 2, −3, −4, 0, 6, −2, 2, 0, 0, 0}; {, −4, 6, 1, 2, −4, 4, −3, −1, 2, −1, 0, 0}; {3, 6, −1, −2, 3, −5, 3, 1, −2, 2, 0, 0}; {0, 0, 1, 6, 3, −1, 4, 6, 1, 5, 0, 0}; {5, −1, 5, −2, 0, 0, −1, 0, −4, 6, 0, 0}; {, −4, 1, 6, 1, −2, 6, 0, 2, 4, 3, 0, 0}; {, −5, −5, −5, 2, 6, −2, 6, 4, −3, 6, 0, 0}; {1, −3, 1, 6, 6, −3, 1, 0, −2, 3, 0, 0}; {0, −3, −1, −5, 2, −3, −4, 3, −5, −2, 0, 0}; {, −5, 2, −4, −2, 1, 3, −3, 5, 1, 1, 0, 0}; {0, 3, 1, 5, −2, 3, 4, −3, 5, 2, 0, 0}; {, −1, 6, −2, 1, −3, −2, −5, 4, −5, −5, 0, 0}; {2, −2, −3, −5, 0, 5, −4, −4, 1, −3, 0, 0}; {1, −4, 2, 6, −4, 3, 1, 0, −2, −3, 0, 0}; {2, 4, −5, 1, 5, 0, −5, 5, 3, −1, 0, 0}; {, −3, −1, 6, −3, 1, 0, 4, 2, −5, 3, 0, 0}; {3, −5, −4, −3, 3, −2, −5, 5, 0, 3, 0, 0}; {5, 4, 0, −5, 3, −4, 2, 5, −4, 0, 0, 0}; {, −1, 0, 6, −3, 6, −2, 6, −1, −4, 6, 0, 0}; {3, −3, −1, 5, 5, 1, 5, 1, −3, −1, 0, 0}; {4, 1, 6, 5, −3, 5, −2, 2, 5, 2, 0, 0}; {0, 0, −5, −1, 6, −4, 1, −3, 6, −1, 0, 0}; {, −2, −4, 6, 0, 5, −3, −5, 3, −4, −1, 0, 0}; {2, −2, 3, −1, 6, 5, 1, 2, −4, −1, 0, 0}; and {, −3, 1, −3, 6, −4, 6, 5, −1, −5, −4, 0, 0};

sequences in the sequence set 12 comprise one or more of the following sequences:

{0, 0, 11, 6, 7, 7, 10, 4, 9, 9, 3, 10}; {0, 0, 7, 4, 9, 6, 3, 3, 4, 9, 3, 6}; {0, 0, 2, 5, 1, 2, 10, 10, 6, 1, 7, 4}; {0, 0, 1, 3, 3, 9, 6, 2, 4, 11, 2, 9}; {0, 0, 10, 0, 7, 11, 7, 4, 11, 11, 2, 5}; {0, 0, 7, 8, 10, 9, 11, 2, 9, 1, 8, 4}; {0, 0, 11, 8, 9, 3, 9, 0, 9, 2, 1, 6}; {0, 0, 11, 4, 1, 0, 7, 1, 6, 6, 10, 2}; {0, 0, 4, 8, 8, 3, 9, 0, 7, 1, 10, 10}; {0, 0, 10, 11, 2, 7, 8, 2, 10, 2, 8, 4}; {0, 0, 3, 1, 11, 6, 7, 1, 4, 11, 7, 11}; {0, 0, 6, 6, 1, 3, 4, 4, 5, 0, 6, 0}; {0, 0, 8, 4, 4, 9, 3, 0, 5, 11, 2, 2}; {0, 0, 5, 4, 2, 0, 2, 0, 7, 1, 6, 9}; {0, 0, 1, 4, 7, 3, 1, 3, 9, 3, 0, 9}; {0, 0, 8, 6, 9, 3, 11, 3, 4, 0, 4, 5}; {0, 0, 0, 0, 3, 6, 0, 10, 6, 3, 8, 1}; {0, 0, 3, 1, 10, 11, 8, 2, 6, 1, 2, 7}; {0, 0, 3, 7, 1, 4, 7, 6, 4, 0, 5, 2}; {0, 0, 8, 5, 7, 10, 2, 10, 0, 11, 4, 11}; {0, 0, 3, 6, 10, 8, 8, 3, 11, 9, 0, 8}; {0, 0, 3, 0, 9, 4, 3, 3, 9, 1, 8, 0}; {0, 0, 2, 5, 3, 1, 5, 0, 0, 9, 3, 8}; {0, 0, 6, 5, 3, 5, 1, 5, 1, 8, 1, 2}; {0, 0, 11, 6, 5, 0, 8, 1, 0, 4, 10, 1}; {0, 0, 7, 7, 11, 8, 7, 1, 7, 0, 9, 0}; {0, 0, 11, 9, 4, 4, 6, 9, 5, 11, 4, 7}; {0, 0, 9, 1, 3, 9, 9, 9, 3, 0, 5, 0}; {0, 0, 6, 8, 1, 3, 1, 4, 9, 5, 11, 8}; and {0, 0, 7, 8, 8, 6, 2, 9, 6, 10, 3, 9};

sequences in the sequence set 13 comprise one or more of the following sequences:

{0, 0, 0, 5, 3, 2, 11, 4, 10, 10, 3, 8}; {0, 0, 8, 7, 6, 8, 11, 2, 8, 3, 11, 4}; {0, 0, 11, 8, 5, 9, 11, 9, 3, 9, 0, 3}; {0, 0, 3, 5, 8, 4, 2, 11, 4, 0, 3, 11}; {0, 0, 4, 7, 7, 1, 7, 10, 5, 10, 8, 7}; {0, 0, 4, 0, 1, 6, 11, 4, 2, 4, 11, 9}; {0, 0, 0, 3, 6, 1, 0, 1, 7, 1, 9, 6}; {0, 0, 2, 3, 10, 7, 11, 7, 6, 0, 3, 9}; {0, 0, 9, 10, 4, 9, 3, 11, 5, 5, 9, 9}; {0, 0, 0, 3, 9, 10, 8, 2, 6, 2, 11, 6}; {0, 0, 4, 1, 11, 7, 8, 1, 5, 0, 8, 11}; {0, 0, 1, 0, 4, 0, 8, 8, 3, 3, 8, 0}; {0, 0, 7, 6, 7, 7, 4, 10, 8, 1, 6, 11}; {0, 0, 2, 7, 1, 3, 10, 10, 6, 2, 7, 5}; {0, 0, 11, 7, 0, 10, 3, 6, 8, 3, 9, 11}; {0, 0, 7, 8, 11, 10, 11, 2, 8, 2, 8, 4}; {0, 0, 1, 0, 7, 11, 11, 7, 4, 0, 3, 8}; {0, 0, 11, 5, 6, 1, 1, 5, 3, 11, 5, 11}; {0, 0, 11, 3, 0, 4, 0, 8, 8, 1, 4, 8}; {0, 0, 0, 7, 8, 8, 0, 7, 0, 0, 7, 1}; {0, 0, 7, 7, 4, 6, 7, 6, 11, 7, 2, 7}; {0, 0, 1, 0, 5, 10, 4, 8, 7, 2, 1, 8}; {0, 0, 11, 8, 6, 1, 9, 2, 1, 5, 10, 2}; {0, 0, 5, 5, 1, 3, 8, 0, 7, 2, 7, 5}; {0, 0, 0, 10, 6, 8, 2, 1, 6, 6, 1, 7}; {0, 0, 2, 6, 4, 5, 1, 3, 9, 3, 1, 8}; {0, 0, 10, 8, 6, 1, 6, 9, 4, 9, 8, 0}; {0, 0, 2, 5, 9, 7, 6, 3, 6, 1, 8, 5}; {0, 0, 0, 11, 8, 0, 5, 0, 2, 7, 6, 0}; and {0, 0, 4, 3, 11, 9, 8, 10, 7, 2, 7, 0}; and sequences in the sequence set 14 comprise one or more of sequences in a union set of the sequences in the first sequence set and the following sequences:

{0, 0, 8, 7, 6, 0, 6, 4, 9, 5, 7, 10}; {0, 5, 6, 0, 7, 0, 11, 1, 4, 2, 0, 0}; {0, 7, 2, 0, 9, 10, 7, 10, 1, 2, 5, 10}; {0, 2, 0, 1, 0, 4, 7, 9, 3, 2, 11, 6}; {0, 10, 8, 5, 6, 0, 4, 6, 5, 9, 6, 11}; {0, 4, 4, 4, 10, 9, 9, 5, 9, 8, 4, 8}; {0, 9, 8, 1, 11, 11, 1, 6, 10, 7, 1, 5}; {0, 1, 3, 2, 11, 11, 5, 6, 0, 6, 0, 9}; {0, 7, 3, 1, 7, 8, 10, 3, 0, 2, 11, 1}; {0, 11, 1, 2, 3, 10, 8, 3, 8, 2, 4, 0}; {0, 10, 1, 10, 3, 10, 8, 7, 1, 3, 8, 11}; {0, 3, 10, 7, 5, 1, 5, 10, 1, 1, 3, 1}; {0, 3, 9, 11, 9, 7, 5, 10, 8, 0, 10, 1}; {0, 1, 3, 5, 2, 1, 2, 9, 2, 9, 9, 4}; {0, 7, 2, 2, 7, 2, 5, 5, 8, 2, 2, 1}; {0, 9, 0, 7, 9, 8, 0, 3, 4, 0, 6, 5}; {0, 7, 2, 6, 4, 1, 9, 10, 5, 7, 8, 9}; {0, 5, 11, 10, 1, 8, 7, 6, 0, 11, 10, 2}; {0, 11, 1, 3, 2, 1, 8, 10, 3, 8, 5, 0}; {0, 5, 11, 3, 2, 8, 3, 4, 6, 5, 1, 0}; {0, 6, 8, 0, 8, 7, 0, 10, 0, 7, 5, 7}; {0, 3, 1, 6, 4, 8, 5, 3, 2, 8, 0, 3}; {0, 1, 0, 9, 6, 1, 3, 9, 3, 9, 9, 0}; {0, 3, 0, 2, 7, 11, 11, 2, 10, 6, 3, 3}; {0, 5, 8, 8, 9, 7, 9, 4, 1, 10, 6, 10}; {0, 6, 7, 6, 0, 1, 10, 1, 1, 9, 1, 11}; {0, 10, 6, 6, 2, 4, 5, 11, 4, 1, 4, 5}; {0, 6, 4, 2, 9, 10, 9, 11, 7, 9, 10, 3}; {0, 9, 2, 2, 1, 9, 10, 0, 4, 5, 0, 5}; {0, 3, 11, 8, 3, 4, 9, 11, 0, 11, 1, 8}; {0, 5, 10, 3, 7, 4, 2, 3, 11, 9, 2, 1}; {0, 11, 8, 0, 9, 7, 11, 1, 0, 5, 8, 3}; {0, 4, 9, 2, 1, 5, 4, 8, 6, 4, 2, 1}; {0, 1, 10, 9, 11, 11, 4, 2, 9, 4, 7, 1}; {0, 1, 0, 11, 1, 6, 6, 0, 0, 7, 2, 8}; {0, 6, 1, 9, 3, 4, 10, 11, 6, 6, 5, 7}; {0, 3, 11, 2, 7, 9, 9, 11, 8, 4, 0, 10}; {0, 8, 4, 10, 7, 11, 1, 0, 5, 7, 3, 4}; {0, 1, 5, 6, 5, 5, 2, 5, 11, 5, 2, 9}; {0, 9, 6, 7, 2, 10, 3, 5, 8, 5, 6, 8}; {0, 11, 0, 11, 9, 1, 5, 5, 10, 0, 7, 2}; {0, 0, 0, 7, 8, 9, 1, 7, 0, 0, 8, 2}; {0, 0, 9, 10, 0, 5, 4, 11, 7, 11, 4, 11}; {0, 1, 5, 2, 7, 6, 0, 6, 8, 6, 3, 4}; {0, 7, 4, 9, 2, 3, 10, 8, 9, 11, 10, 10}; {0, 8, 10, 5, 10, 6, 4, 11, 1, 3, 5, 5}; {0, 0, 10, 4, 4, 2, 4, 9, 1, 0, 5, 11}; {0, 7, 11, 2, 11, 10, 10, 4, 3, 6, 5, 11}; {0, 10, 11, 1, 9, 3, 8, 7, 1, 3, 9, 8}; {0, 8, 3, 5, 10, 10, 1, 5, 2, 2, 4, 1}; {0, 4, 0, 10, 1, 10, 8, 1, 2, 0, 5, 7}; {0, 7, 4, 2, 11, 1, 6, 9, 9, 0, 9, 0}; {0, 1, 9, 11, 3, 2, 4, 8, 4, 11, 7, 2}; {0, 10, 10, 7, 3, 8, 6, 9, 11, 5, 10, 0}; {0, 6, 3, 9, 9, 11, 11, 9, 9, 3, 6, 0}; {0, 10, 8, 7, 0, 11, 7, 10, 0, 5, 1, 5}; {0, 7, 2, 6, 6, 1, 9, 11, 2, 1, 10, 11}; {0, 10, 4, 2, 8, 9, 8, 8, 8, 2, 7, 11}; {0, 0, 8, 7, 8, 11, 4, 10, 2, 0, 6, 2}; {0, 10, 6, 6, 11, 2, 7, 2, 7, 5, 7, 7}; {0, 5, 3, 8, 5, 8, 0, 5, 7, 5, 3, 2}; {0, 10, 9, 8, 1, 11, 4, 1, 6, 9, 1, 6}; {0, 0, 0, 11, 3, 8, 2, 7, 5, 0, 11, 5}; {0, 1, 1, 4, 2, 8, 3, 0, 1, 8, 10, 4}; {0, 9, 7, 2, 9, 1, 10, 11, 11, 2, 6, 8}; {0, 10, 7, 10, 6, 3, 9, 1, 4, 2, 5, 7}; {0, 6, 11, 6, 1, 0, 5, 6, 9, 9, 7, 7}; {0, 3, 1, 3, 4, 6, 0, 3, 0, 9, 7, 2}; {0, 4, 2, 6, 6, 0, 4, 7, 3, 2, 1, 10}; {0, 11, 6, 2, 1, 11, 1, 8, 1, 6, 6, 9}; {0, 1, 0, 11, 5, 5, 11, 0, 5, 0, 7, 0}; {0, 4, 7, 9, 1, 9, 1, 10, 2, 0, 10, 7}; {0, 2, 6, 8, 9, 4, 11, 2, 10, 3, 1, 11}; {0, 0, 11, 6, 7, 7, 10, 4, 9, 9, 3, 10}; {0, 8, 4, 0, 4, 11, 1, 9, 10, 10, 0, 3}; {0, 4, 10, 4, 8, 8, 1, 0, 5, 3, 1, 1}; {0, 0, 8, 1, 2, 10, 4, 8, 6, 0, 3, 3}; {0, 3, 6, 3, 6, 10, 7, 3, 7, 5, 2, 3}; {0, 5, 7, 11, 7, 2, 3, 2, 7, 4, 5, 4}; {0, 0, 4, 7, 11, 7, 6, 3, 9, 6, 9, 6}; {0, 3, 6, 9, 3, 2, 11, 6, 9, 7, 9, 7}; {0, 8, 4, 5, 0, 7, 0, 1, 4, 0, 2, 3}; {0, 10, 3, 0, 4, 5, 10, 3, 5, 2, 11, 0}; {0, 0, 4, 3, 9, 5, 3, 4, 0, 3, 9, 1}; {0, 6, 1, 3, 3, 8, 3, 4, 6, 4, 0, 0}; {0, 3, 11, 2, 6, 7, 6, 4, 3, 9, 6, 2}; {0, 1, 2, 10, 9, 3, 1, 11, 3, 8, 3, 8}; {0, 3, 2, 2, 9, 7, 6, 1, 5, 5, 10, 4}; {0, 4, 5, 7, 2, 9, 6, 6, 1, 5, 2, 2}; {0, 6, 0, 1, 8, 3, 1, 1, 1, 7, 8, 9}; {0, 10, 8, 8, 7, 0, 10, 3, 0, 4, 8, 1}; {0, 4, 8, 10, 4, 3, 0, 8, 10, 8, 11, 9}; {0, 10, 10, 8, 6, 9, 0, 11, 3, 4, 10, 4}; {0, 10, 6, 2, 6, 3, 5, 2, 6, 9, 1, 3}; {0, 9, 7, 5, 10, 7, 11, 8, 11, 1, 5, 9}; {0, 8, 4, 7, 1, 2, 7, 0, 11, 11, 1, 1}; {0, 11, 10, 4, 5, 5, 7, 1, 6, 5, 11, 5}; {0, 8, 7, 6, 1, 10, 2, 1, 3, 5, 11, 3}; {0, 8, 3, 6, 4, 0, 11, 1, 2, 10, 1, 4}; {0, 9, 1, 10, 4, 1, 1, 10, 1, 4, 8, 9}; {0, 7, 0, 5, 10, 10, 4, 3, 10, 10, 11, 10}; {0, 11, 3, 3, 6, 3, 2, 1, 9, 2, 6, 11}; {0, 11, 10, 8, 9, 0, 0, 5, 4, 10, 4, 9}; {0, 1, 11, 1, 3, 9, 9, 4, 2, 6, 0, 8}; {0, 8, 2, 10, 7, 10, 1, 8, 10, 3, 3, 3}; {0, 7, 2, 10, 2, 2, 3, 6, 1, 2, 10, 10}; {0, 1, 10, 10, 1, 3, 0, 7, 7, 0, 7, 2}; {0, 1, 8, 9, 6, 9, 10, 10, 3, 11, 7, 1}; {0, 8, 4, 5, 11, 6, 11, 0, 2, 10, 11, 0}; {0, 5, 5, 6, 10, 1, 8, 8, 6, 5, 9, 5}; {0, 8, 9, 5, 4, 10, 5, 2, 5, 5, 6, 9}; {0, 7, 5, 2, 11, 2, 7, 10, 11, 1, 11, 2}; {0, 3, 6, 11, 0, 8, 6, 5, 8, 5, 10, 7}; {0, 2, 4, 0, 4, 2, 7, 1, 11, 10, 6, 5}; {0, 10, 8, 5, 5, 10, 2, 4, 2, 6, 3, 7}; {0, 8, 7, 3, 0, 1, 3, 0, 3, 2, 7, 0}; {0, 9, 6, 5, 9, 6, 1, 3, 4, 8, 3, 6}; {0, 10, 10, 5, 1, 6, 4, 3, 7, 0, 3, 5}; {0, 11, 10, 7, 11, 10, 11, 5, 0, 4, 5, 10}; and {0, 3, 4, 9, 6, 9, 10, 5, 11, 9, 9, 6}.

9. The signal processing method according to claim 8, wherein the equivalent sequence is $\{q_n\}$, for $q_n$ in the equivalent sequence $\{q_n\}$, and for $u_n$ in a sequence $\{u_n\}$ consisting of $u_n$, $u_n = f + g \cdot n \pmod{M}$, wherein $f \in \{0, 1, 2, \ldots, M-1\}$, $g \in \{0, 1, 2, \ldots, M-1\}$, and M=12.

10. The signal processing method according to claim 1, wherein the equivalent sequence is $\{q_n\}$, for $q_n$ in the equivalent sequence $\{q_n\}$, $q_n = s_n + u_n \pmod{M}$, and for $u_n$ in a sequence $\{u_n\}$ consisting of $u_n$, $u_n = f + g \cdot n \pmod{M}$, wherein $f \in \{0, 1, 2, \ldots, M-1\}$, $g \in \{0, 1, 2, \ldots, M-1\}$, and M=12.

11. A sequence-based signal processing method, wherein the signal processing method comprises:

receiving a first signal carried on N subcarriers, and obtaining N elements in a sequence $\{f_n\}$, wherein $f_n$ is an element in the sequence $\{f_n\}$, which is a sequence that meets a preset condition, the preset condition being $f_n = A \cdot x_n \cdot e^{2\pi \cdot j \cdot a \cdot n}$, which is a value of n ranges from 0 to N−1, wherein A is a non-zero complex number, a is a real number, $j = \sqrt{-1}$, and for an element $x_n$, $x_n = u \cdot e^{2\pi \cdot j \cdot s_n / M}$, wherein M=12, u is a non-zero complex number, and a set that consists of a sequence $\{s_n\}$ consisting of an element $s_n$ comprises at least one of sequences in a first sequence set or at least one of equivalent sequences of the sequences in the first sequence set, wherein the sequences in the first sequence set comprise one or more of the following sequences:

{, −2, 4, −2, 4, 0, 2, 2, 0, 5, 5, 0, 0}; {, −1, 6, 1, −4, −2, 4, −5, −5, 6, −5, 0, 0}; {3, −3, 3, −3, 0, −2, −2, 0, −5, −5, 0, 0}; {2, −4, 2, −4, −1, −2, −2, −1, −5, 6, 0, 0}; {, −4, 2, −4, 3, −1, 1, 2, 1, 4, 5, 0, 0}; {0, 6, 0, −5, −2, −4, −3, −1, 6, 6, 0, 0}; {0, 6, 0, −5, −2, −3, −3, −1, 6, 6, 0, 0}; {, −1, 5, −1, 6, −2, −3, −3, −1, 5, 5, 0, 0}; {, −4, 2, −4, 4, −4, −5, −4, −2, 5, 5, 0, 0}; {, −5, 1, −5, 3, −5, 6, −5, −3, 5, 5, 0, 0}; {4, −2, 4, 0, −4, −1, 0, −1, 3, 4, 0, 0}; {0, 4, −4, 2, −3, −2, −3, 4, 1, −2, 0, 0}; {, −1, 3, −5, 1, −4, −3, −3, 4, 1, −2, 0, 0}; {0, 5, −2, 5, 2, 4, 3, 1, −3, −4, 0, 0}; {, −3, 1, 5, −1, −5, −4, −5, 3, 0, −3, 0, 0}; {3, −3, 3, −1, 0, 6, −3, −3, −5, −4, 0, 0}; {1, 6, −1, 6, 6, 0, 2, 0, −3, −1, 0, 0}; {5, −2, 3, −2, 0, −1, 0, 0, −5, 6, 0, 0}; {, −3, 3, −3, 5, −4, −4, −4, −2, 5, 5, 0, 0}; {, −3, 0, 3, −3, 3, 1, 3, −5, 4, 1, 0, 0}; {, −1, 4, −3, 5, 4, −2, 1, 0, −3, −2, 0, 0}; {3, −1, −5, −5, 1, −4, 0, 1, 4, −1, 0, 0}; {2, −2, 6, 6, 1, −5, 0, 1, 4, −1, 0, 0}; {0, −5, 2, 2, −5, 1, 4, 4, 6, 1, 0, 0}; {1, −3, 5, 6, 0, −5, −1, 1, 3, −1, 0, 0}; {, −3, 4, −1, −1, 5, −1, 3, 4, 5, 0, 0, 0}; {, −5, 1, −5, 6, −1, 4, −5, −5, −5, 1, 0, 0}; {, −2, 5, 0, 0, 6, 0, 3, 4, 5, 0, 0, 0}; {, −5, 1, −5, 6, −1, 5, −5, 6, −5, 1, 0, 0}; {3, −3, 3, 3, −4, 2, 5, 5, 6, 0, 0, 0}; {, −3, 3, −3, −3, 4, −2, −5, −5, 6, 0, 0, 0}; {4, −3, 2, 2, −4, 1,

−2, −3, −5, 0, 0, 0}; {5, −1, 5, 6, 1, −5, 5, 6, 5, −1, 0, 0}; {5, −1, 5, 6, 1, −4, 5, 5, 5, −1, 0, 0}; {3, −4, 1, 1, −5, 1, −3, −4, −5, 0, 0, 0}; {, −1, 3, −5, 6, 0, 5, 1, −1, −3, 1, 0, 0}; {0, 5, −2, −2, 5, −1, −4, −4, 6, −1, 0, 0}; {, −2, 2, 6, 6, −1, 5, 0, −1, −4, 1, 0, 0}; {, −2, 2, 6, 6, 0, 5, 1, −1, −3, 1, 0, 0}; {, −3, 1, 5, 5, −1, 4, 0, −2, −4, 1, 0, 0}; {, −3, 1, 5, 5, −1, 4, 0, −1, −4, 1, 0, 0}; {, −2, 3, −4, −3, 4, −2, −5, −5, 6, −1, 0, 0}; {3, 0, −3, 3, −3, −1, −3, 5, −4, −1, 0, 0}; {4, −2, 4, −4, 4, 5, 4, 2, −5, −5, 0, 0}; {, −5, 2, −3, 2, 0, 1, 0, 0, 5, 6, 0, 0}; {, −1, 5, −1, 3, 5, 1, 1, 6, 5, −1, 0, 0}; {0, −5, 2, −5, −2, −4, −3, −1, 3, 4, 0, 0}; {4, −2, 4, −3, 6, 6, 4, 3, −5, −5, 0, 0}; {2, −4, 2, −5, 4, 5, 3, 2, −5, −5, 0, 0}; {, −3, 3, −3, 2, 0, −5, 4, 3, −1, 0, 0, 0}; {0, 6, 0, 5, 3, 4, 3, 1, 6, 6, 0, 0}; {6, 0, 6, −1, 2, 0, −1, 0, −4, −5, 0, 0}; {, −4, 4, 1, −4, −4, 0, 4, 0, 3, −1, 0, 0}; {, −1, 5, 0, 5, 3, 3, 2, 1, 6, −5, 0, 0}; {, −3, 2, −4, 0, −2, −4, −5, 4, −4, −4, 0, 0}; {, −1, 6, 2, −4, −2, −3, 4, −5, −1, 2, 0, 0}; {5, −2, 4, −3, 5, 6, 5, 3, −5, −5, 0, 0}; {, −1, 5, 0, 6, −3, −4, −4, −2, 6, 6, 0, 0}; {, −5, 1, −4, 3, −5, 6, −5, −3, 5, 5, 0, 0}; {5, −3, 2, −5, −3, 6, 3, −4, 6, 0, 0}; {3, −5, 0, 5, −4, 5, 2, −5, 5, 0, 0, 0}; {0, 5, −1, 5, 5, −2, −2, 2, 2, 2, 0, 0}; {, −5, 0, 6, 0, 2, 0, 0, 1, −4, −5, 0, 0}; {, −4, 1, −5, 3, −5, 6, −4, −3, 5, 5, 0, 0}; {, −3, 1, 6, 1, −5, −4, −4, 3, 1, −2, 0, 0}; {6, −3, 1, −5, 1, 0, 1, 6, 3, 0, 0, 0}; {, −5, −1, 4, 0, 3, −3, −4, 2, 0, −2, 0, 0}; {5, 0, −4, −4, 2, −3, 1, 2, 4, −1, 0, 0}; {3, −2, 6, 6, 1, −4, 0, 1, 4, −1, 0, 0}; {, −1, 5, 0, 0, 5, 0, 4, 4, 5, 0, 0, 0}; {5, −1, 6, 6, −1, −2, 4, 6, 2, 0, 0, 0}; {, −1, 5, 0, 0, 6, 0, 3, 4, 5, 0, 0, 0}; {, −1, 4, −2, −2, 4, −1, −4, −4, 6, −1, 0, 0}; {, −5, −1, 4, 3, −3, 3, −1, −2, −4, 0, 0, 0}; {, −3, 1, 6, 5, −1, 4, 0, −2, −3, 1, 0, 0}; {, −2, 3, −3, −3, 4, −2, −5, −5, 6, −1, 0, 0}; {, −5, −1, 4, 3, −2, 3, −1, −2, −4, 0, 0, 0}; {, −4, 1, −5, −5, 3, −3, 6, 6, 6, −1, 0, 0}; {6, −2, 3, 2, −3, 2, −1, −3, −4, 0, 0, 0}; {3, 6, −2, −3, 3, −5, 3, 1, −2, 2, 0, 0}; {, −5, −1, 4, 4, −3, 3, −1, −2, −4, 1, 0, 0}; {6, −2, 3, 3, −3, 3, −1, −2, −4, 0, 0, 0}; {5, −3, 2, 2, −4, 2, −2, −3, −5, 0, 0, 0}; {5, 1, −2, 4, −2, 0, −3, 6, −4, −1, 0, 0}; {3, −2, 6, −1, 4, 5, 1, −2, −2, 0, 0, 0}; {5, −1, −5, −1, 1, 3, −3, 3, 3, 1, 0, 0}; {4, 1, 0, −5, 1, 6, 2, 2, 5, −3, 0, 0}; {3, −1, −3, 3, −3, −1, 6, −4, −5, −1, 0, 0}; {1, −3, −5, 1, −5, −2, 6, −5, 6, −3, 0, 0}; {2, −5, 2, −5, 4, 5, 3, 2, −5, −5, 0, 0}; {, −1, 3, −3, 1, 0, 4, 1, −5, 6, 2, 0, 0}; {, −2, 2, −4, 0, −1, 3, 1, 6, 5, 3, 0, 0}; {5, −1, −5, 2, −5, −1, 3, 5, 4, 4, 0, 0}; {5, −1, −5, 2, −5, −1, 3, 6, 5, 4, 0, 0}; {0, 4, −2, 3, 6, 4, 0, 6, 4, 0, 0, 0}; {, −3, 3, −1, 6, −5, −2, −4, −2, 3, 3, 0, 0}; {, −4, −1, 4, −3, −1, −5, 3, −4, 5, 0, 0, 0}; {, −5, −2, 3, −4, −2, −5, 4, −4, 6, 0, 0, 0}; {0, 4, −2, 4, −2, −3, −1, −1, 4, 3, 0, 0}; {6, −3, 2, −5, 4, −5, −5, −3, 6, 3, 0, 0}; {6, −2, 4, −2, −4, 1, 0, 4, 4, 2, 0, 0}; {6, −2, 4, −2, −3, 2, 1, 5, 4, 2, 0, 0}; {4, −3, 4, 0, 0, 6, −5, −1, 1, −1, 0, 0}; {, −1, 2, −5, 1, 0, 4, 3, 6, 5, 3, 0, 0}; {3, 5, −3, 2, 3, −1, 6, −1, −5, 1, 0, 0}; {, −2, 1, 6, 0, −5, −4, −2, −2, 4, 2, 0, 0}; {, −3, 2, −3, 6, −3, 3, 4, −1, −2, −3, 0, 0}; {1, 3, −5, 1, 2, −3, 4, −3, 5, 0, 0, 0}; {0, 2, 6, 0, 1, −3, 4, −3, 5, 0, 0, 0}; {, −3, −1, 3, −2, 6, −2, −5, −3, −5, 5, 0, 0}; {0, 3, −4, −5, 1, 6, 1, 0, −3, 1, 0, 0}; {, −4, 3, 0, 4, −4, −3, 4, 0, 0, −1, 0, 0}; {, −4, 4, 2, −5, 0, 3, −2, −5, −2, 0, 0, 0}; {, −5, 3, 1, 6, −1, 2, −2, −5, −2, 0, 0, 0}; {5, 1, 0, 5, −2, 2, −3, 6, −2, 0, 0, 0}; {, −4, 4, 3, −3, 3, −5, 4, 5, 5, −4, 0, 0}; {4, −1, −3, 3, −3, −1, −5, −4, 6, −2, 0, 0}; {, −1, 5, 2, −4, −4, 1, 5, −1, 1, 0, 0, 0}; {, −3, 3, 0, 6, −5, −1, −5, −2, 3, 2, 0, 0}; {2, 6, 1, 6, 6, −1, −2, 4, 3, 1, 0, 0}; {, −1, 2, −4, 0, 0, 4, 2, −5, 5, 2, 0, 0}; {, −2, 4, 1, −4, 3, −5, −1, 4, 4, 3, 0, 0}; {, −5, −1, 6, −1, −3, 1, 2, −5, 4, 2, 0, 0}; {4, −4, 3, −4, −5, 0, −1, 4, 4, 1, 0, 0}; {4,

−4, 3, −4, −5, 0, −1, 4, 4, 2, 0, 0}; {2, 5, −1, 3, 1, 5, 3, −4, 6, 3, 0, 0}; {1, 4, −2, 3, 1, 5, 3, −5, 6, 3, 0, 0}; {3, −4, 4, −1, −1, 5, 6, −1, 1, −1, 0, 0}; {, −2, 1, −5, 0, −1, 3, 2, 6, 5, 3, 0, 0}; {, −2, 4, 1, −3, 3, −5, 0, 3, 3, 3, 0, 0}; {6, −2, 5, −1, 5, 5, −4, −4, 5, 5, 0, 0}; {5, −3, 4, −2, 5, 5, −5, −4, 5, 5, 0, 0}; {5, −2, 6, 1, 0, 6, −5, 0, 2, 0, 0, 0}; {1, 4, −2, 3, 0, 4, 4, −4, 6, 3, 0, 0}; {0, 2, −5, 0, 1, −3, 4, −3, 5, 0, 0, 0}; {, −2, 0, 5, −2, 0, −4, 4, −3, 6, 0, 0, 0}; {5, −5, 0, 6, 3, −5, 5, −4, 6, 5, 0, 0}; {, −5, −2, 4, −1, 5, −4, −5, 3, 0, −2, 0, 0}; {, −3, −1, 4, 2, 4, −1, 6, 1, 0, 4, 0, 0}; {5, −5, 1, −1, 2, −3, 4, −1, −1, 3, 0, 0}; {, −2, −5, −4, 2, −3, 2, 0, 2, 3, −5, 0, 0}; {0, −5, 6, −1, 3, 6, 1, −3, −1, −1, 0, 0}; {5, 0, −1, 5, 5, −3, 3, −2, 1, 0, 0, 0}; {1, −4, −5, 1, 3, −5, 1, −3, 0, −1, 0, 0}; {, −5, 2, 1, −5, −2, 3, −3, 6, −2, 0, 0, 0}; {0, 6, 4, −2, −4, 1, 5, −1, 1, 1, 0, 0}; {, −1, 4, 1, −5, −3, 3, 4, −1, 0, −2, 0, 0}; {, −2, 4, 2, −3, 1, 5, 4, 5, −1, 2, 0, 0}; {, −3, −1, 5, −2, −1, −5, 3, −4, 5, −1, 0, 0}; {, −5, −3, 3, −4, −2, 6, 1, −5, 4, −1, 0, 0}; {6, −5, 0, 4, 5, 0, −5, −1, −5, 1, 0, 0}; {0, 4, 0, −5, −1, 4, 5, 1, −1, −3, 0, 0}; {2, −3, −3, 3, 5, 1, −4, 1, −2, −1, 0, 0}; {, −3, 3, 2, −4, −3, 5, −1, 3, 0, 0, 0, 0}; {, −4, 2, 1, −5, −4, 4, −2, 2, 0, 0, 0, 0}; {, −3, −1, 6, −4, 6, −2, 5, −1, −4, 5, 0, 0}; {1, −4, −4, 3, 2, 6, 0, −3, 0, −1, 0, 0}; {, −1, 5, 4, −2, −4, 0, 5, 0, 2, 1, 0, 0}; {0, −5, −5, 2, 1, 6, 0, −4, −1, −1, 0, 0}; {, −1, 6, 6, 1, 1, 6, 0, −4, −1, −1, 0, 0}; {, −4, 2, 1, −5, 6, −1, 3, −2, 1, 0, 0, 0}; {, −3, 4, 4, −1, −1, 5, −2, 6, −2, −2, 0, 0}; {, −4, 3, 3, −2, −2, 4, −2, 6, −2, −1, 0, 0}; {, −4, 3, 3, −2, −1, 4, −2, −5, −1, −1, 0, 0}; {, −5, 1, 0, 6, 6, −2, 4, −1, 1, 0, 0, 0}; {, −4, 3, 3, −2, −1, 4, −1, −5, −1, −1, 0, 0}; {3, 5, 0, 3, −4, 4, 2, −5, 5, −1, 0, 0}; {, −3, 3, 2, −3, 6, −3, 3, 0, 1, −1, 0, 0}; {1, 4, 0, −5, −1, 4, 5, 1, −1, −4, 0, 0}; {, −3, −2, 4, −2, −1, −5, 2, −5, 4, −1, 0, 0}; {, −4, 2, 2, −5, −3, 4, −2, 3, 0, 0, 0, 0}; {5, −3, −5, −1, −3, 4, −4, −3, 5, 4, 0, 0}; {, −5, 3, 5, 1, 3, −4, 4, 3, −5, −4, 0, 0}; {6, 0, 0, 6, −5, 3, −2, 2, −1, 0, 0, 0}; {6, 0, 0, 6, −5, 3, −2, 3, −1, 0, 0, 0}; {, −4, 2, 2, −4, 6, −2, 4, −1, 1, 1, 0, 0}; {, −5, 1, 1, −5, 5, −3, 3, −2, 1, 1, 0, 0}; {6, 0, 0, 6, 5, −3, 2, −2, 1, 0, 0, 0}; {6, 0, 0, 6, 5, −3, 3, −2, 1, 0, 0, 0}; {4, −2, −2, 5, 3, −4, 2, −3, 0, 0, 0, 0}; {6, 3, −5, 2, −4, 6, 5, 3, 6, −5, 0, 0}; {, −3, −5, 0, −3, 4, −4, −2, 5, −5, 1, 0, 0}; {, −4, 3, 5, −1, −5, 2, 6, −5, 0, 0, 0, 0}; {4, −2, −1, 5, 4, −4, 2, −2, 0, 0, 0, 0}; {, −1, 4, 4, −3, −2, 6, 0, 3, 0, 1, 0, 0}; {0, −5, −3, 4, −4, 5, 1, −5, −5, −2, 0, 0}; {5, −2, −2, 3, 0, 4, −4, 3, 1, 2, 0, 0}; {0, 6, −5, 2, 0, 5, 0, −4, −1, 0, 0, 0}; {, −2, 3, 3, −3, −5, −1, 4, −1, 2, 1, 0, 0}; {3, −4, −4, 2, −2, 1, −5, 3, 1, 1, 0, 0}; {2, −4, −3, 4, 1, 6, 1, −3, −1, 0, 0, 0}; {0, 4, 3, −4, 3, 6, −1, 6, 4, 2, 0, 0}; {, −5, 5, −1, 1, −2, 3, −4, 1, 1, −3, 0, 0}; {, −1, −3, 3, −4, 6, 3, −2, 0, −5, −1, 0, 0}; {, −4, 4, −4, 1, −5, −4, 6, 4, −5, −5, 0, 0}; {6, 5, 0, −4, −5, 0, 5, 1, 5, −1, 0, 0}; {5, 3, −3, 4, 2, 6, −1, 5, −4, 1, 0, 0}; {3, 1, −5, 2, 1, 5, −3, 4, −5, 1, 0, 0}; {4, −1, 2, −5, 0, −1, −3, −5, −4, −3, 0, 0}; {3, −2, 1, −5, 1, −2, −4, 6, −5, −3, 0, 0}; {, −4, 1, 2, −5, −4, 4, −2, 5, 0, 1, 0, 0}; {2, −4, −2, 4, 0, 5, −3, −3, 1, −1, 0, 0}; {5, −2, −1, 5, 2, −3, 3, 6, 2, 0, 0, 0}; {2, 5, 4, −2, 3, −2, 0, −2, −3, 5, 0, 0}; {, −5, −1, 0, −5, 2, −2, 3, 6, 2, 0, 0, 0}; {3, 1, −4, −2, −4, 1, 6, −1, 0, −4, 0, 0}; {2, −1, 5, −2, −5, 5, 0, 1, −4, −1, 0, 0}; {2, 0, −5, 2, 0, 4, −4, 3, 6, 0, 0, 0}; {0, −2, 5, 0, −1, 3, −4, 3, −5, 0, 0, 0}; {4, −1, 3, −4, 2, −1, −4, 6, −5, −4, 0, 0}; {2, −4, −1, 3, −3, 5, 0, −3, −3, −3, 0, 0}; {4, −2, 1, 6, 0, −1, −3, −5, −4, −3, 0, 0}; {, −1, 5, −4, 1, −5, 3, −1, −4, −4, −3, 0, 0}; {, −2, 4, −5, 0, 6, 2, −1, −4, −4, −3, 0, 0}; {3, −3, 0, 6, 5, 1, 5, 2, −3, −2, 0, 0}; {5, 2, −4, 5, 5, −4, 4, 6, 0, 0}; {3, 3, 0, 1, −5, 0, 6, 2, −4, −4, 0, 0}; {4, −4, −3, 3, −3, 5, −4, −5, −5, 4, 0, 0}; {, −1, 3, 5, −1, 5, 2, 6, 5, 6, 3, 0, 0}; {, −3, 1, 3, −3, 3, 1, 6, 4, 5, 1, 0, 0}; {, −4, −1, 0, 5, −1, 6, −2, −2, −5, 3, 0, 0}; {, −5, −1, 1, −4, 2, −1, 3, 6, 4, 1, 0, 0}; {5, −3, −1, 6, 1, −2, 2, 5, 2, 0, 0, 0}; {4, −4, −2, 5, 0, −3, 2, 5, 2, 0, 0, 0}; {4, −3, 0, −4, 4, 3, −4, 0, 0, 1, 0, 0}; {4, −2, 2, −1, −1, 6, −1, −3, −5, −4, 0, 0}; {, −3, 4, 5, −1, 6, −1, 0, 3, −1, 0, 0}; {0, −2, 6, 0, −1, 3, −4, 3, −5, 0, 0, 0}; {, −1, −3, 5, −1, −2, 3, −4, 3, −5, 0, 0, 0}; {, −5, 2, −5, −1, 6, −5, 6, 4, −5, −5, 0, 0}; {, −5, 3, −3, 2, −2, 0, 1, 0, 4, 5, 0, 0}; {, −3, −5, 3, −2, −3, 1, 6, 1, 5, −1, 0, 0}; {, −3, 5, −1, 5, −1, 1, 2, 1, 4, 5, 0, 0}; {, −4, 4, −2, 4, −2, 1, 2, 1, 4, 5, 0, 0}; {, −5, 3, −3, 3, −2, 0, 1, 0, 4, 5, 0, 0}; {4, −1, 4, −3, 4, 5, 5, 3, 6, 6, 0, 0}; {1, −4, 1, 6, 1, 2, 6, 5, 1, −1, 0, 0}; {2, −3, 2, −5, 3, 4, 4, 2, 6, 6, 0, 0}; {5, 2, −3, 4, 2, 5, −4, 4, 6, 0, 0, 0}; {4, 1, −4, 3, 1, 5, −3, 4, −5, 0, 0, 0}; {, −5, 3, −3, 5, 3, −5, −3, 4, 6, 0, 0, 0}; {, −2, 6, 0, −4, 4, −5, −2, 5, −5, 0, 0, 0}; {3, −2, 3, −1, 0, 6, −2, −3, −5, −4, 0, 0}; {0, −5, 0, −4, 1, 3, 2, 1, 5, 5, 0, 0}; {, −1, 6, 0, −4, 3, 2, 2, −4, −1, 2, 0, 0}; {6, 1, −5, 3, −5, 6, −5, −2, 3, 4, 0, 0}; {, −1, 5, −2, 6, −1, 2, 2, 0, 4, 4, 0, 0}; {, −3, 2, 6, 1, −4, −5, −1, 2, 2, 0, 0, 0}; {, −5, −1, 2, −4, 2, 0, 3, 6, 4, 1, 0, 0}; {5, −1, 4, 1, −2, −3, 3, −4, −2, −1, 0, 0}; {0, −4, 3, 3, −4, −4, 0, 4, 0, 1, 0, 0}; {, −5, 3, −2, −2, 4, −2, 2, 3, 5, 0, 0, 0}; {6, 2, −3, −3, 3, −3, 1, 2, 4, 0, 0, 0}; {5, 1, −4, −4, 3, −3, 1, 2, 4, −1, 0, 0}; {6, 2, −3, −2, 3, −2, 1, 3, 4, 0, 0, 0}; {4, −1, 5, 5, −3, 3, 6, 6, 6, 1, 0, 0}; {5, 1, −4, −3, 2, −3, 1, 2, 4, 0, 0, 0}; {5, 1, −4, −3, 3, −3, 1, 2, 4, 0, 0, 0}; {2, −3, 3, 3, −4, 2, 5, 5, 6, 1, 0, 0}; {1, −4, 2, 2, −4, 1, 4, 4, 6, 1, 0, 0}; {1, −5, 0, 0, 6, 0, −3, −4, −5, 0, 0, 0}; {, −5, 1, 6, 6, 1, 2, −4, 6, −2, 0, 0, 0}; {1, −5, 0, 0, −5, 0, −4, −4, −5, 0, 0, 0}; {, −3, 2, 6, 6, −1, 4, 0, −1, −4, 1, 0, 0}; {, −5, 0, 4, 4, −2, 3, −1, −2, −4, 0, 0, 0}; {6, −1, 3, 3, −2, 3, −1, −3, −4, 1, 0, 0}; {, −1, −3, 6, 0, 3, −1, 2, 3, 3, −4, 0, 0}; {6, 3, −1, 5, −1, 0, −1, 6, −3, 0, 0, 0}; {6, 2, −3, 2, −4, −1, 3, 4, −1, −1, 0, 0}; {3, −2, 4, −4, 3, 4, 5, 3, 6, 6, 0, 0}; {4, −1, 5, −3, 5, 6, 4, 3, −5, −5, 0, 0}; {1, −4, 2, 6, 2, 3, 4, 2, 6, 6, 0, 0}; {1, −4, 2, −5, 3, 4, 3, 2, 6, 6, 0, 0}; {, −2, 5, −1, 4, 1, 2, 2, 1, 5, 6, 0, 0}; {5, −1, 4, −3, 5, 6, 5, 3, −5, −5, 0, 0}; {, −5, 3, −2, 5, 3, 6, −3, 4, 6, 0, 0, 0}; {, −3, 4, −2, 4, −1, 1, 2, 1, 4, 5, 0, 0}; {, −5, 2, −4, 2, −2, 0, 1, 0, 4, 5, 0, 0}; {, −3, 5, 0, −5, 4, −5, −2, 5, −5, 0, 0, 0}; {6, 0, 5, −1, −5, −5, 5, 4, −4, −4, 0, 0}; {2, −4, 1, −5, 3, 4, 4, 2, 6, 6, 0, 0}; {2, −4, 1, −5, 4, 4, 4, 2, 6, −5, 0, 0}; {, −1, 6, 0, −5, −2, −4, −3, −1, 5, 5, 0, 0}; {, −1, 6, 0, −5, −2, −3, −3, −1, 5, 5, 0, 0}; {, −4, 3, −3, 4, −4, −5, −4, −2, 5, 5, 0, 0}; {, −5, 2, −4, 3, −5, 6, −5, −3, 5, 5, 0, 0}; {, −5, 2, −4, 3, −4, −5, −5, −1, 2, 4, 0, 0}; and {, −2, 5, −1, 6, −1, 2, 3, 1, 4, 5, 0, 0};

{, −3, 2, −5, 0, −1, −3, −5, 5, −3, −4, 0, 0}; {6, 0, 6, 0, 4, −5, −4, 2, 0, −2, 0, 0}; {0, 0, 0, 1, 10, 8, 5, 0, 4, 9, 10, 2}; {1, −5, 1, −3, −5, −1, −1, 6, −5, 1, 0, 0}; {, −4, 1, 6, 1, −2, 6, 0, 2, 4, 3, 0, 0}; {, −3, 1, 5, 0, −5, −3, −4, 3, 0, −2, 0, 0}; {4, 5, 6, −2, 3, −1, 4, −1, −2, 4, 0, 0}; {, −4, −1, 2, −4, 6, −2, −4, −5, −4, 3, 0, 0}; {, −2, 3, −4, 4, 5, 6, 1, 1, −3, −5, 0, 0}; {0, 0, 0, 4, 8, 11, 9, 6, 10, 5, 0, 11}; {2, −4, 2, 1, 6, 4, −5, −1, 3, 1, 0, 0}; {5, 3, 1, 5, 1, 3, −2, 5, 6, −3, 0, 0}; {4, 6, −4, 4, −3, 6, 0, 6, 6, 3, 0, 0}; {, −4, 0, 4, 3, −2, 3, −1, −2, −5, 0, 0, 0}; {, −5, −5, −5, 2, 6, −2, 6, 4, −3, 6, 0, 0}; {, −2, −4, 6, 0, 5, −3, −5, 3, −4, −1, 0, 0}; {1, −2, −5, 0, 5, 0, 3, 2, 4, 6, 0, 0}; {2, −3, 4, −4, −5, 6, −1, −1, 3, 5, 0, 0}; {4, 0, −4, 2, 1, 4, −4, 3, 5, 0, 0, 0}; {3, −2, 5, −2, 0, −2, −3, 3, 3, −2, 0, 0}; {5, −1, 5, −2, 0, 0, −1, 0, −4, 6, 0, 0}; {6, 1, −3, 3, −4, 0, 4, 6, 6, 5, 0, 0}; {6, 0, −5, 1, 0, 2, 0, 0, 5, 5, 0, 0}; {, −1, 6, 2, −2, 3, −4, 0, 3, 3, 3, 0, 0}; {, −1, 5, 0, −5, 3, 2, 2, −5, −2, 1, 0, 0}; {1, 6, 0, −5, 4, −2, 0, 3, 3, 3, 0, 0}; {0, 0, 1, 3, 11, 7, 11, 4, 5, 0, 0, 7}; {6, −3, 1, −5, −2, −5, 3, −4, 6, 1, 0, 0}; {0, 2, 5, −2, 5, 3, 3, −3, 4, 0, 0, 0}; {, −4, 1, −5, 4, −4, −5, −4, −2, 5, 4, 0, 0}; {2, 4, −5, 1, 5, 0, −5, 5, 3, −1, 0, 0}; {0, 0, 1, 5, 9, 2, 10, 3, 0, 8, 4, 4}; {, −2, −1, 1, −5, 3, 6, 2, 0, −1, 6, 0, 0}; {0, 0, 1, 6, 3, −1, 4, 6, 1, 5, 0, 0}; {, −5, 1, −4, −5, −1, 5, −5, −5, −4, 2, 0, 0}; {1, −5, 2, 1, 5, 0, 1, −3, −5, −4, 0, 0}; {, −4, 0, 5, 2, −3, −4, 4, −2, 1, 1, 0, 0}; {0, 0, 1, 6, 11, 3, 10, 7, 4, 11, 2, 1}; {5, −1, 6, 6, 5, 2, −5, 4, 6, −4, 0, 0}; {, −2, −5, 5, −4, 4, 6, 1, 6, −4, −4, 0, 0}; {, −4, 3, −1, 0, 6, 6, −1, 3, −1, −1, 0, 0}; {0, 0, 1, 9, 0, 1, 6, 1, 8, 8, 5, 0}; {0, 0, 1, 9, 2, 5, 4, 8, 5, 1, 0, 6}; {, −1, −5, 4, −4, 3, 5, 0, 6, −5, −1, 0, 0}; {0, 0, 1, 10, 1, 8, 11, 3, 2, 8, 7, 2}; {2, −4, 3, −5, −5, 5, −2, 0, 4, 4, 0, 0}; {2, −4, 3, −5, −5, 5, −1, 0, 3, 4, 0, 0}; {0, 0, 2, 0, 8, 9, 6, 10, 3, 9, 9, 2}; {, −3, 1, −5, −2, −2, 3, −1, 6, 5, 1, 0, 0}; {3, −4, 3, −4, 5, 5, 2, 2, −4, −3, 0, 0}; {, −1, 0, 3, 4, −1, −5, 2, −5, 2, 3, 0, 0}; {, −5, 0, −5, 1, 3, −4, −4, 2, 1, 0, 0, 0}; {4, −5, 0, 4, 2, 6, 3, −4, 6, 4, 0, 0}; {0, 4, −2, 4, −3, −4, −1, −2, 6, 5, 0, 0}; {5, −4, 1, 6, 1, −1, 1, 0, 6, 3, 0, 0}; {, −1, 6, 3, 1, 6, −1, −2, 0, −5, −1, 0, 0}; {3, 6, −1, 5, 0, −2, 0, −2, −4, −5, 0, 0}; {3, −3, 5, 2, 2, −3, 1, −5, −3, −1, 0, 0}; {4, −5, 0, −5, −4, 0, 2, 1, 5, 1, 0, 0}; {, −3, 0, 5, 0, −5, −3, −5, 3, 0, −2, 0, 0}; {0, 0, 2, 7, 6, 4, 11, 8, 5, 9, 4, 7}; {, −3, 0, 5, 2, −5, 3, −1, −2, 2, 2, 0, 0}; {, −1, −1, 1, −4, 6, −3, 3, −2, −1, 5, 0, 0}; {3, 6, −1, −2, 3, −5, 3, 1, −2, 2, 0, 0}; {3, −1, −3, 1, 2, 5, 3, −5, 1, 4, 0, 0}; {0, 0, 2, 10, 4, 0, 11, 9, 6, 0, 3, 5}; {4, −2, 6, −3, −4, 6, 1, 0, 3, 6, 0, 0}; {, −1, 0, 3, 1, 0, −5, −2, 5, 1, 6, 0, 0}; {0, 0, 2, 11, 10, 4, 6, 9, 3, 8, 2, 9}; {0, 0, 2, 11, 11, 5, 6, 2, 5, 10, 6, 1}; {, −5, −2, 4, 4, −2, 3, 0, −2, −4, 0, 0, 0}; {6, 6, −3, −5, 3, −2, 2, −4, 3, 5, 0, 0}; {0, −4, −5, 1, −5, −2, 5, −4, −5, −1, 0, 0}; {, −4, 4, 3, −2, 1, 5, −1, −4, −1, −2, 0, 0}; {2, −5, 3, −4, 3, 3, 6, −5, 4, 5, 0, 0}; {0, 0, 3, 3, 7, 1, 5, 3, 1, 11, 7, 11}; {0, 0, 3, 3, 11, 8, 5, 7, 3, 6, 11, 4}; {1, 6, 2, −4, −2, 0, −2, −1, 4, 3, 0, 0}; {0, 0, 3, 4, 11, 1, 7, 10, 5, 11, 6, 3}; {2, −2, −3, −5, 0, 5, −4, −4, 1, −3, 0, 0}; {, −3, 5, 4, 3, −3, 2, 5, −5, 0, −3, 0, 0}; {0, 0, 3, 6, 5, 2, 7, 4, 3, 1, 7, 0}; {, −3, 1, −4, 3, 6, −2, −3, 5, 1, −1, 0, 0}; {, −1, 2, −4, 2, −4, 6, 1, 2, −2, −2, 0, 0}; {, −1, 2, −4, 2, −4, −4, −1, −2, 4, 2, 0, 0}; {0, 0, 3, 8, 2, 2, 9, 7, 6, 2, 6, 3}; {0, 0, 3, 8, 10, 7, 4, 3, 8, 4, 8, 6}; {3, 2, 4, −3, 6, −1, 5, 0, 1, 5, 0, 0}; {2, 1, 3, −4, 5, −2, 5, 0, 1, 5, 0, 0}; {, −5, 3, 2, 5, 3, 0, 4, −3, 5, −4, 0, 0}; {, −3, 0, 6, 5, 0, 2, −4, 4, −1, −1, 0, 0}; {0, 0, 4, 0, 6, 1, 9, 7, 6, 2, 5, 8}; {, −2, 1, −4, −4, 4, −4, 3, −1, −4, −2, 0, 0}; {0, 0, 4, 1, 8, 3, 5, 3, 2, 9, 11, 4}; {5, 1, 1, 6, −1, 2, −2, −5, −3, −3, 0, 0}; {, −5, 4, 5, −1, 6, −5, 1, 5, 5, −2, 0, 0}; {6, 3, 4, 0, 6, 4, −2, 4, 6, −2, 0, 0}; {, −5, 6, −3, −5, 3, −1, 2, −2, 3, 6, 0, 0}; {, −2, 2, −2, 1, 5, −2, −2, 6, 4, −1, 0, 0}; {, −5, −1, −5, −2, 4, −1, −4, 4, 5, 6, 0, 0}; {6, 6, −2, −3, 4, −2, 5, −3, 3, 3, 0, 0}; {3, 3, −5, −5, 1, −3, 3, −4, 2, 3, 0, 0}; {1, 4, −1, 4, −3, −3, 0, −2, 6, 2, 0, 0}; {6, 1, 0, −2, 3, −5, −2, −3, 2, −2, 0, 0}; {3, −5, 3, −1, −5, 6, 2, 5, −2, 0, 0, 0}; {0, 1, 6, −1, 6, 3, 4, −1, −2, 2, 0, 0}; {0, 0, 4, 8, 6, 2, 2, 11, 3, 4, 0, 5}; {, −1, 6, 5, 4, −2, 1, −2, 0, 1, −4, 0, 0}; {6, −4, 2, −4, −1, 4, 1, −5, 3, 0, 0, 0}; {0, 4, 0, −4, 2, −2, −2, 6, −4, 0, 0, 0}; {0, 0, 4, 8, 10, 3, 11, 4, 2, 2, 11, 6}; {, −3, 1, −3, 6, −4, 6, 5, −1, −5, −4, 0, 0}; {1, 3, −3, 4, 6, −3, 2, 0, 5, 1, 0, 0}; {0, 0, 4, 10, 2, 4, 7, 6, 10, 7, 5, 3}; {1, 4, −1, −3, −1, −4, 5, −2, −2, −5, 0, 0}; {0, 0, 4, 11, 11, 0, 11, 9, 3, 5, 2, 8}; {5, 1, 2, 6, 0, 2, −2, 6, −3, −4, 0, 0}; {3, −3, −4, −1, 3, −2, −5, −5, −1, 4, 0, 0}; {0, 0, 5, 2, 1, 2, 1, 9, 6, 10, 3, 8}; {0, 0, 5, 2, 1, 5, 2, 5, 0, 10, 0, 7}; {2, −4, −5, −1, 2, −4, −4, 4, −1, 1, 0, 0}; {5, 2, 4, −1, 5, 6, 1, 5, 5, −3, 0, 0}; {5, 0, 0, 5, −4, 3, 5, 1, −3, 0, 0, 0}; {0, −3, −1, −5, 2, −3, −4, 3, −5, −2, 0, 0}; {0, −4, −3, 4, −2, −5, 1, 6, −5, −1, 0, 0}; {, −3, −5, −2, −4, 4, −4, 1, 6, −4, 6, 0, 0}; {3, 6, 2, 5, −5, 2, −2, 5, 5, 5, 0, 0}; {2, −4, −5, 1, 1, −5, 2, 6, 1, 1, 0, 0}; {, −4, 2, 1, −4, −2, 3, −3, 6, −2, 0, 0, 0}; {, −5, 4, 6, 4, −3, 0, −4, 2, 2, −4, 0, 0}; {, −3, −1, 6, −3, 1, 0, 4, 2, −5, 3, 0, 0}; {, −1, 4, 2, −3, −4, 0, 6, −2, 2, 0, 0, 0}; {, −1, 0, 6, −3, 6, −2, 6, −1, −4, 6, 0, 0}; {, −3, −1, 6, −2, 3, 1, 0, 5, 3, −2, 0, 0}; {, −4, −1, −5, 1, 0, 5, 0, 3, 5, 4, 0, 0}; {0, −1, 3, 5, 4, −1, 4, 5, 0, 4, 0, 0}; {, −1, −1, 4, −5, −4, 3, −2, 1, −3, 2, 0, 0}; {2, −4, −4, −1, 2, −3, −4, 4, −1, 2, 0, 0}; {, −3, −5, −1, −5, 4, 3, −3, −1, 5, −2, 0, 0}; {, −3, 1, −1, 1, 5, 1, −3, 5, 3, 4, 0, 0}; {, −2, −3, 2, −1, 3, 4, −3, 2, 5, 2, 0, 0}; {, −4, −5, 0, −2, −4, −3, 3, 6, 2, −5, 0, 0}; {0, 0, 6, 5, 8, 6, 6, 8, 1, 6, 11, 7}; {, −5, 5, −3, 6, −4, 1, −3, 1, 4, 6, 0, 0}; {, −4, 1, 0, 5, 1, 4, −2, 4, 4, 1, 0, 0}; {6, −3, 6, −3, 3, 6, −5, −1, −5, 4, 0, 0}; {4, 2, 6, 4, 6, 0, −4, 0, 3, 6, 0, 0}; {, −4, 2, 2, −4, 6, −1, 4, −1, 0, 0, 0, 0}; {, −4, 6, −2, −3, 1, −5, 0, 3, 6, 3, 0, 0}; {0, 0, 6, 7, 5, 5, 0, 4, 6, 3, 10, 4}; {, −4, −1, −4, 1, −3, 2, 3, −3, 4, 3, 0, 0}; {4, −5, 4, −3, 2, 4, −2, −4, 4, 0, 0, 0}; {, −2, 4, 4, 1, −2, 3, 4, −4, 1, −2, 0, 0}; {4, −5, 4, −2, −2, 3, −2, 1, 4, 3, 0, 0}; {0, 0, 6, 9, 6, 10, 5, 9, 8, 1, 11, 9}; {0, 0, 6, 9, 11, 3, 11, 3, 0, 1, 9, 4}; {0, 0, 6, 10, 2, 1, 4, 0, 8, 8, 11, 8}; {, −2, −3, 2, 6, 1, −5, −3, 3, 1, −2, 0, 0}; {6, 4, −3, 2, −2, 5, 5, −2, 0, 3, 0, 0}; {4, 2, −5, 0, −3, 6, 0, 2, −4, 0, 0, 0}; {3, 0, 4, −2, 0, 6, 0, −3, −5, −3, 0, 0}; {0, 0, 7, 5, 0, 9, 2, 9, 3, 6, 4, 5}; {, −3, 5, −4, 2, 2, −2, 2, −1, −4, −3, 0, 0}; {, −2, −3, 3, 1, −4, −3, 4, −4, 2, −2, 0, 0}; {, −1, 6, −4, 2, −5, 3, 0, −4, −3, −2, 0, 0}; {, −3, 2, 2, 6, −1, −5, 3, 3, 0, 3, 0, 0}; {0, 0, 7, 6, 9, 3, 3, 1, 3, 5, 1, 5}; {, −3, −5, 0, −2, 2, 4, −3, 2, 5, 2, 0, 0}; {1, −3, 0, −4, 1, −2, −4, 4, −5, −3, 0, 0}; {, −3, 6, −2, −5, −4, 2, −2, 1, 4, 6, 0, 0}; {0, 0, 7, 8, 2, 1, 9, 4, 9, 7, 8, 10}; {0, 3, 1, 5, −2, 3, 4, −3, 5, 2, 0, 0}; {, −2, 4, 5, 1, −2, 4, 4, −4, 1, −1, 0, 0}; {, −5, 0, 0, −5, 4, −3, −5, −1, 3, 0, 0, 0}; {4, −1, 1, −2, 6, −3, −5, −1, −1, −5, 0, 0}; {, −4, 0, −1, 6, 0, 1, −5, 3, 5, 1, 0, 0}; {0, 0, 7, 11, 5, 3, 6, 3, 0, 0, 4, 3}; {0, 0, −5, −1, 6, −4, 1, −3, 6, −1, 0, 0}; {0, 0, 7, 11, 10, 11, 4, 3, 7, 0, 8, 8}; {, −4, 5, −2, 0, 6, −4, 5, 2, −3, 0, 0, 0}; {0, 4, 4, 2, 2, −3, −1, 4, −2, −5, 0, 0}; {0, 0, 8, 3, 3, 2, 4, 10, 2, 0, 8, 0}; {2, 1, −4, 2, 3, −3, 3, 6, 4, −2, 0, 0}; {4, 2, −4, 2, 5, 1, 6, 5, 5, 6, 0, 0}; {1, −3, 1, 6, 6, −3, 1, 0, −2, 3, 0, 0}; {2, −1, 4, −1, 6, 5, 1, 2, −4, −1, 0, 0}; {4, 2, −4, 4, 1, 5, −4, 4, 6, 0, 0, 0}; {1, −3, 1, −4, 0, −3, −3, 0, 6, 6, 0, 0}; {, −3, 5, −3, 4, −2, −4, 6, 4, −5, −4, 0, 0}; {, −2, −5, 0, −4, 6, 5, −4, −1, 5, −3, 0, 0}; {0, 0, 8, 8, 0, 10, 8, 2, 7, 2, 9, 0}; {3, −3, −1, 5, 5, 1, 5, 1, −3, −1, 0, 0}; {, −4, −5, 2, 1, 6, −3, 3, −3, 1, −1, 0, 0}; {0, 0, 8, 8, 2, 8, 3, 10, 2, 0, 2, 4}; {6, −2, −2, 2, 3, −2, 3, −3, 3, 2, 0, 0}; {, −5, 6, 1, 0, 2, −1, 4, −1, 2, −5, 0, 0}; {, −2, 1, 0, 3, −3, −1, 5, −2, −5, 4, 0, 0}; {, −3, 1, 1, 6, 3, −1, 4, 6, 3, 2, 0, 0}; {6, −1, 0, 6, 5, −4, 2, −3, 1, 0, 0, 0}; {, −3, 3, 5, 0, −4, 1, −2, −4, −3, −4, 0, 0}; {, −4, 0, 0, 6, 0, −5, −2, −4, −4, 5, 0, 0}; {0, 0, 8, 10, 0, 7, 2, 0, 4, 8, 6, 9}; {4, 1, 6, 5, −3, 5, −2, 2, 5, 2, 0, 0}; {0, 0, 8, 11, 9, 4, 11, 2, 6, 5, 5, 10}; {0, 0, 9, 0, 5, 10, 10, 10, 3, 11, 5, 3}; {, −4, 6, 2, −4, 4, −3, −1, 2, −1, 0, 0}; {, −1, 5, −4, 6, 1, 6, 4, −4, −3, 3, 0, 0}; {0, 0, 9, 2, 3, 1, 9, 1, 10, 5, 6, 9}; {3, 3, 0, 5, −5, 4, −3, 2, 1, 6, 0, 0}; {, −5, 2, 6, −5, −4, −2, 4, −3, 5, 3, 0, 0}; {0, 0, 9, 3, 10, 3, 4, 1, 4, 9, 10, 1}; {, −5, 4, −2, 2, −3, −1, 3, 3, −1, −2, 0, 0}; {, −2, −3, 5, −1, −2, 3, −4, 3, −5, 0, 0, 0}; {6, 5, 1, −5, −5, 0, 5, 1, 6, −1, 0, 0}; {5, 4, 0, −5, 3, −4, 2, 5, −4, 0, 0, 0}; {, −1, 6, −2, 1, −3, −2, −5, 4, −5, −5, 0, 0}; {0, 0, 9, 5, 10, 0, 5, 1, 6, 6, 8, 4}; {3, −2, 2, 5, 5, 5, 6, 1, 6, 4, 0, 0}; {0, 0, 9, 5, 11, 11, 0, 4, 8, 3, 6, 7}; {, −4, 3, −5, −1, −5, −4, 6, 4, −5, −5, 0, 0}; {3, −5, −4, −3, 3, −2, −5, 5, 0, 3, 0, 0}; {0, −5, −1, 4, 4, 0, 3, 1, −3, −3, 0, 0}; {0, 5, −5, −2, −1, −3, −4, 3, −3, 3, 0, 0}; {0, 0, 9, 8, 2, 5, 0, 6, 7, 11, 9, 2}; {, −2, −2, −5, 6, 0, 5, −1, 4, −3, −3, 0, 0}; {2, −2, 3, −2, 4, 5, 2, 2, 5, 5, 0, 0}; {3, −3, 0, 6, 5, 1, 4, 1, −3, −2, 0, 0}; {2, −2, 3, −1, 6, 5, 1, 2, −4, −1, 0, 0}; {, −5, −1, 0, 4, −2, 5, 2, 2, −2, 2, 0, 0}; {4, −5, −5, −1, 4, −1, 2, 0, −2, 5, 0, 0}; {1, 3, 2, 6, 0, −5, −1, −1, 5, 3, 0, 0}; {, −5, 2, 6, 3, 4, 6, −1, 0, −3, 6, 0, 0}; {6, −3, −2, 3, −3, 4, −3, −2, 6, 2, 0, 0}; {, −4, 0, 2, −3, 3, 0, 4, 6, 3, 1, 0, 0}; {0, 0, 10, 1, 8, 1, 4, 5, 10, 10, 4, 1}; {, −4, 2, 6, 3, 4, 6, −1, 0, −3, 6, 0, 0}; {3, −2, 3, 2, −3, 2, 4, 5, −5, 1, 0, 0}; {0, 0, 10, 2, 3, 8, 9, 10, 6, 1, 7, 0}; {2, −4, 0, −2, 6, 6, 1, −4, −2, 0, 0, 0}; {, −1, −1, −3, 1, −5, 4, 1, −1, 5, −3, 0, 0}; {1, −4, 1, 0, 2, −2, 2, 5, −5, 4, 0, 0}; {4, −1, 4, 4, −1, 0, −4, 5, −2, 0, 0, 0}; {4, 0, 6, −5, 4, −5, −1, 4, 3, −2, 0, 0}; {1, 6, −3, −4, 2, 6, 2, −1, −2, 2, 0, 0}; {3, −1, 5, −5, 6, −1, 2, 1, 0, 4, 0, 0}; {0, 5, −4, −4, 1, 6, 1, −2, −3, 2, 0, 0}; {0, 0, 10, 5, 5, 10, 3, 9, 10, 10, 2, 9}; {5, 3, −1, 4, 4, −1, 4, −5, 5, −2, 0, 0}; {3, 0, −5, 0, −5, −2, 1, 0, 3, 4, 0, 0}; {1, −1, −5, 2, −4, −3, −2, 4, −4, 0, 0, 0}; {0, 0, 10, 7, 3, 8, 3, 7, 6, 8, 11, 4}; {, −3, 4, −3, 1, 5, 2, −1, 0, −2, −4, 0, 0}; {, −3, 6, 1, −5, 1, 1, −1, 2, 5, −1, 0, 0}; {5, −3, −1, 1, −2, 5, 2, 3, 0, 4, 0, 0}; {, −5, 4, −1, 6, −3, 6, 5, 3, −5, −2, 0, 0}; {1, 0, −3, −4, 1, 5, −2, 5, −2, −3, 0, 0}; {0, 0, 10, 11, 0, 2, 6, 10, 8, 3, 10, 3}; {, −2, 4, −4, 3, −4, −5, −1, −1, 3, 3, 0, 0}; {, −4, 2, −5, 2, −3, 6, 5, −2, 0, 2, 0, 0}; {, −1, 6, 0, −4, −4, 2, 6, −4, −2, 1, 0, 0}; {0, 0, 11, 1, 3, 9, 8, 5, 1, 6, 0, 8}; {6, 1, −5, 4, 4, −1, 3, −5, −4, 0, 0, 0}; {, −4, 2, −5, 3, 4, 6, 0, 0, −3, −5, 0, 0}; {0, 0, 11, 4, 1, 7, 8, 1, 3, 9, 0, 9}; {, −1, 4, −4, −5, 1, 4, 2, −1, −3, 2, 0, 0}; {, −1, 1, 2, −2, 2, −1, 3, −3, 6, 5, 0, 0}; {0, 0, 11, 6, 1, 0, 4, 7, 10, 5, 8, 4}; {, −5, 2, −4, −2, 1, 3, −3, 5, 1, 1, 0, 0}; {, −5, 3, −2, 1, −4, −1, 3, 3, −1, −2, 0, 0}; {, −4, 4, −1, 3, −2, 1, 3, 2, 4, 5, 0, 0}; {3, −3, 2, 4, −3, 5, 3, 4, −1, −2, 0, 0}; {0, 0, 11, 7, 8, 4, 11, 10, 2, 2, 9, 2}; {5, 2, −2, 3, 1, 1, −4, −2, 5, −3, 0, 0}; {6, 3, −1, 5, −5, 3, 6, 5, 5, −2, 0, 0}; {1, −4, 2, 6, −4, 3, 1, 0, −2, −3, 0, 0}; {, −5, 4, 0, −5, −5, 5, −5, 2, 5, −2, 0, 0}; {2, −1, −5, 2, 6, 3, 2, 2, −5, −2, 0, 0}; {0, 0, 11, 9, 4, 9, 3, 9, 3, 4, 8, 8}; {5, 1, −4, 2, −4, −1, 1, 0, 3, 4, 0, 0}; {6, 0, 5, −3, 5, 5, 5, 3, −3, −4, 0, 0}; {, −5, 1, 6, 0, −4, 5, 5, −3, 0, 1, 0, 0}; {2, −2, 5, 1, 2, −3, 1, 6, −4, −1, 0, 0}; and {1, −4, 2, −3, −1, −2, −3, 0, 5, 6, 0, 0}; and {0, 0, 0, 0, 3, 6, 0, 10, 6, 3, 8, 1}; {0, 0, 1, 3, 3, 9, 6, 2, 4, 11, 2, 9}; {0, 0, 3, 0, 9, 4, 3, 3, 9, 1, 8, 0}; {0, 0, 3, 1, 10, 11, 8, 2, 6, 1, 2, 7}; {0, 0, 3, 1, 11, 6, 7, 1, 4, 11, 7, 11}; {0, 0, 3, 6, 10, 8, 8, 3, 11, 9, 0, 8}; {0, 0, 3, 7, 1, 4, 7, 6, 4, 0, 5, 2}; {0, 0, 4, 8, 8, 3, 9, 0, 7, 1, 10, 10}; {0, 0, 6, 5, 3, 5, 1, 5, 1, 8, 1, 2}; {0, 0, 6, 6, 1, 3, 4, 4, 5, 0, 6, 0}; {0, 0, 6, 8, 1, 3, 1, 4, 9, 5, 11, 8}; {0, 0, 7, 8, 8, 6, 2, 9, 6, 10, 3, 9}; {0, 0, 7, 8, 10, 9, 11, 2, 9, 1, 8, 4}; {0, 0, 8, 4, 4, 9, 3, 0, 5, 11, 2, 2}; {0, 0, 8, 5, 7, 10, 2, 10, 0, 11, 4, 11}; {0, 0, 8, 6, 9, 3, 11, 3, 4, 0, 4, 5}; {0, 0, 9, 1, 3, 9, 9, 9, 3, 0, 5, 0}; {0, 0, 10, 0, 7, 11, 7, 4, 11, 11, 2, 5}; {0, 0, 10, 11, 2, 7, 8, 2, 10, 2, 8, 4}; and {0, 0, 11, 6, 5, 0, 8, 1, 0, 4, 10, 1}; and processing the first signal based on the N elements in the sequence $\{f_n\}$.

12. The signal processing method according to claim 11, wherein the receiving of the first signal carried on N subcarriers comprises:

obtaining the first signal on the N subcarriers on N consecutive subcarriers; or obtaining the first signal on the N subcarriers on N equally spaced subcarriers.

13. The signal processing method according to claim 12, wherein the first signal is a reference signal, or a signal used to carry communication information.

14. The signal processing method according to claim 13, wherein the equivalent sequence is $\{q_n\}$, for $q_n$ in the equivalent sequence $\{q_n\}$, $q_n=s_n+u_n(\text{mod } M)$, and for $u_n$ in a sequence $\{u_n\}$ consisting of $u_n$, $u_n=f+g\cdot n(\text{mod } M)$, wherein $f\in\{0, 1, 2, \ldots, M-1\}$, $g\in\{0, 1, 2, \ldots, M-1\}$, and M=12.

15. The signal processing method according to claim 12, wherein the equivalent sequence is $\{q_n\}$, for $q_n$ in the equivalent sequence $\{q_n\}$, $q_n=s_n+u_n(\text{mod } M)$, and for $u_n$ in a sequence $\{u_n\}$ consisting of $u_n$, $u_n=f+g\cdot n(\text{mod } M)$, wherein $f\in\{0, 1, 2, \ldots, M-1\}$, $g\in\{0, 1, 2, \ldots, M-1\}$, and M=12.

16. The signal processing method according to claim 11, wherein the first signal is a reference signal, or a signal used to carry communication information.

17. The signal processing method according to claim 16, wherein the equivalent sequence is $\{q_n\}$, for $q_n$ in the equivalent sequence $\{q_n\}$, $q_n=s_n+u_n(\text{mod } M)$, and for $u_n$ in a sequence $\{u_n\}$ consisting of $u_n$, $u_n=f+g\cdot n(\text{mod } M)$, wherein $f\in\{0, 1, 2, \ldots, M-1\}$, $g\in\{0, 1, 2, \ldots, M-1\}$, and M=12.

18. The signal processing method according to claim 11, wherein the equivalent sequence is $\{q_n\}$, for $q_n$ in the equivalent sequence $\{q_n\}$, $q_n=s_n+u_n(\text{mod } M)$, and for $u_n$ in a sequence $\{u_n\}$ consisting of $u_n$, $u_n=f+g\cdot n(\text{mod } M)$, wherein $f\in\{0, 1, 2, \ldots, M-1\}$, $g\in\{0, 1, 2, \ldots, M-1\}$, and M=12.

19. A non-transitory computer readable storage medium, configured to store a set of computer instructions, wherein the computer instructions are used to perform the signal processing method according to claim 1.

20. The non-transitory computer readable storage medium according to claim 19, wherein the computer instructions are further used to perform the signal processing method according to claim 2.

* * * * *

UNITED STATES PATENT AND TRADEMARK OFFICE

CERTIFICATE OF CORRECTION

PATENT NO. : 11,252,003 B2
APPLICATION NO. : 16/723712
DATED : February 15, 2022
INVENTOR(S) : Bingyu Qu and Hao Sun It is certified that error appears in the above-identified patent and that said Letters Patent is hereby corrected as shown below:

In the Claims

Starting at Column 155, Line 27 through Column 161, Line 60, please replace Claim 1 with the following:

--1. A sequence-based signal processing method, wherein the signal processing method comprises:

determining a sequence $\{f_n\}$ comprising N elements, wherein $f_n$ is an element in the sequence $\{f_n\}$, wherein the sequence $\{f_n\}$ is a sequence that meets a preset condition, the preset condition being $f_n = A \cdot x_n \cdot e^{2\pi \cdot j \cdot a \cdot n}$, which is a value of n ranges from 0 to N–1, wherein A is a non-zero complex number, $a$ is a real number, $j = \sqrt{-1}$, and for an element $x_n$, $x_n = u \cdot e^{2\pi \cdot j \cdot s_n / M}$, wherein M=12, u is a non-zero complex number, and a set of sequences $\{s_n\}$ consisting of an element $s_n$ comprises at least one of sequences in a first sequence set or at least one of equivalent sequences of the sequences in the first sequence set, wherein the sequences in the first sequence set comprise one or more of the following sequences:

{−2, 4, −2, 4, 0, 2, 2, 0, 5, 5, 0, 0}; {−1, 6, 1, −4, −2, 4, −5, −5, 6, −5, 0, 0}; {3, −3, 3, −3, 0, −2, −2, 0, −5, −5, 0, 0}; {2, −4, 2, −4, −1, −2, −2, −1, −5, 6, 0, 0}; {−4, 2, −4, 3, −1, 1, 2, 1, 4, 5, 0, 0}; {0, 6, 0, −5, −2, −4, −3, −1, 6, 6, 0, 0}; {0, 6, 0, −5, −2, −3, −3, −1, 6, 6, 0, 0}; {−1, 5, −1, 6, −2, −3, −3, −1, 5, 5, 0, 0}; {−4, 2, −4, 4, −4, −5, −4, −2, 5, 5, 0, 0}; {−5, 1, −5, 3, −5, 6, −5, −3, 5, 5, 0, 0}; {4, −2, 4, 0, −4, −1, 0, −1, 3, 4, 0, 0}; {0, 4, −4, 2, −3, −2, −3, 4, 1, −2, 0, 0}; {−1, 3, −5, 1, −4, −3, −3, 4, 1, −2, 0, 0}; {0, 5, −2, 5, 2, 4, 3, 1, −3, −4, 0, 0}; {−3, 1, 5, −1, −5, −4, −5, 3, 0, −3, 0, 0}; {3, −3, 3, −1, 0, 6, −3, −3, −5, −4, 0, 0}; {1, 6, −1, 6, 6, 0, 2, 0, −3, −1, 0, 0}; {5, −2, 3, −2, 0, −1, 0, 0, −5, 6, 0, 0}; {−3, 3, −3, 5, −4, −4, −4, −2, 5, 5, 0, 0}; {−3, 0, 3, −3, 3, 1, 3, −5, 4, 1, 0, 0}; {−1, 4, −3, 5, 4, −2, 1, 0, −3, −2, 0, 0}; {3, −1, −5, −5, 1, −4, 0, 1, 4, −1, 0, 0}; {2, −2, 6, 6, 1, −5, 0, 1, 4, −1, 0, 0}; {0, −5, 2, 2, −5, 1, 4, 4, 6, 1, 0, 0}; {1, −3, 5, 6, 0, −5, −1, 1, 3, −1, 0, 0}; {−3, 4, −1, −1, 5, −1, 3, 4, 5, 0, 0, 0}; {−5, 1, −5, 6, −1, 4, −5, −5, −5, 1, 0, 0}; {−2, 5, 0, 0, 6, 0, 3, 4, 5, 0, 0,

Signed and Sealed this
Twenty-ninth Day of November, 2022

Katherine Kelly Vidal

Katherine Kelly Vidal
*Director of the United States Patent and Trademark Office*

0}; {−5, 1, −5, 6, −1, 5, −5, 6, −5, 1, 0, 0}; {3, −3, 3, 3, −4, 2, 5, 5, 6, 0, 0, 0}; {−3, 3, −3, −3, 4, −2, −5, −5, 6, 0, 0, 0}; {4, −3, 2, 2, −4, 1, −2, −3, −5, 0, 0, 0}; {5, −1, 5, 6, 1, −5, 5, 6, 5, −1, 0, 0}; {5, −1, 5, 6, 1, −4, 5, 5, 5, −1, 0, 0}; {3, −4, 1, 1, −5, 1, −3, −4, −5, 0, 0, 0}; {−1, 3, −5, 6, 0, 5, 1, −1, −3, 1, 0, 0}; {0, 5, −2, −2, 5, −1, −4, −4, 6, −1, 0, 0}; {−2, 2, 6, 6, −1, 5, 0, −1, −4, 1, 0, 0}; {−2, 2, 6, 6, 0, 5, 1, −1, −3, 1, 0, 0}; {−3, 1, 5, 5, −1, 4, 0, −2, −4, 1, 0, 0}; {−3, 1, 5, 5, −1, 4, 0, −1, −4, 1, 0, 0}; {−2, 3, −4, −3, 4, −2, −5, −5, 6, −1, 0, 0}; {3, 0, −3, 3, −3, −1, −3, 5, −4, −1, 0, 0}; {4, −2, 4, −4, 4, 5, 4, 2, −5, −5, 0, 0}; {−5, 2, −3, 2, 0, 1, 0, 0, 5, 6, 0, 0}; {−1, 5, −1, 3, 5, 1, 1, 6, 5, −1, 0, 0}; {0, −5, 2, −5, −2, −4, −3, −1, 3, 4, 0, 0}; {4, −2, 4, −3, 6, 6, 4, 3, −5, −5, 0, 0}; {2, −4, 2, −5, 4, 5, 3, 2, −5, −5, 0, 0}; {−3, 3, −3, 2, 0, −5, 4, 3, −1, 0, 0, 0}; {0, 6, 0, 5, 3, 4, 3, 1, 6, 6, 0, 0}; {6, 0, 6, −1, 2, 0, −1, 0, −4, −5, 0, 0}; {−4, 4, 1, −4, −4, 0, 4, 0, 3, −1, 0, 0}; {−1, 5, 0, 5, 3, 3, 2, 1, 6, −5, 0, 0}; {−3, 2, −4, 0, −2, −4, −5, 4, −4, −4, 0, 0}; {−1, 6, 2, −4, −2, −3, 4, −5, −1, 2, 0, 0}; {5, −2, 4, −3, 5, 6, 5, 3, −5, −5, 0, 0}; {−1, 5, 0, 6, −3, −4, −4, −2, 6, 6, 0, 0}; {−5, 1, −4, 3, −5, 6, −5, −3, 5, 5, 0, 0}; {5, −3, 2, −5, −3, 6, 3, −4, 6, 0, 0, 0}; {3, −5, 0, 5, −4, 5, 2, −5, 5, 0, 0, 0}; {0, 5, −1, 5, 5, −2, −2, 2, 2, 2, 0, 0}; {−5, 0, 6, 0, 2, 0, 0, 1, −4, −5, 0, 0}; {−4, 1, −5, 3, −5, 6, −4, −3, 5, 5, 0, 0}; {−3, 1, 6, 1, −5, −4, −4, 3, 1, −2, 0, 0}; {6, −3, 1, −5, 1, 0, 1, 6, 3, 0, 0, 0}; {−5, −1, 4, 0, 3, −3, −4, 2, 0, −2, 0, 0}; {5, 0, −4, −4, 2, −3, 1, 2, 4, −1, 0, 0}; {3, −2, 6, 6, 1, −4, 0, 1, 4, −1, 0, 0}; {−1, 5, 0, 0, 5, 0, 4, 4, 5, 0, 0, 0}; {5, −1, 6, 6, −1, −2, 4, 6, 2, 0, 0, 0}; {−1, 5, 0, 0, 6, 0, 3, 4, 5, 0, 0, 0}; {−1, 4, −2, −2, 4, −1, −4, −4, 6, −1, 0, 0}; {−5, −1, 4, 3, −3, 3, −1, −2, −4, 0, 0, 0}; {−3, 1, 6, 5, −1, 4, 0, −2, −3, 1, 0, 0}; {−2, 3, −3, −3, 4, −2, −5, −5, 6, −1, 0, 0}; {−5, −1, 4, 3, −2, 3, −1, −2, −4, 0, 0, 0}; {−4, 1, −5, −5, 3, −3, 6, 6, 6, −1, 0, 0}; {6, −2, 3, 2, −3, 2, −1, −3, −4, 0, 0, 0}; {3, 6, −2, −3, 3, −5, 3, 1, −2, 2, 0, 0}; {−5, −1, 4, 4, −3, 3, −1, −2, −4, 1, 0, 0}; {6, −2, 3, 3, −3, 3, −1, −2, −4, 0, 0, 0}; {5, −3, 2, 2, −4, 2, −2, −3, −5, 0, 0, 0}; {5, 1, −2, 4, −2, 0, −3, 6, −4, −1, 0, 0}; {3, −2, 6, −1, 4, 5, 1, −2, −2, 0, 0, 0}; {5, −1, −5, −1, 1, 3, −3, 3, 3, 1, 0, 0}; {4, 1, 0, −5, 1, 6, 2, 2, 5, −3, 0, 0}; {3, −1, −3, 3, −3, −1, 6, −4, −5, −1, 0, 0}; {1, −3, −5, 1, −5, −2, 6, −5, 6, −3, 0, 0}; {2, −5, 2, −5, 4, 5, 3, 2, −5, −5, 0, 0}; {−1, 3, −3, 1, 0, 4, 1, −5, 6, 2, 0, 0}; {−2, 2, −4, 0, −1, 3, 1, 6, 5, 3, 0, 0}; {5, −1, −5, 2, −5, −1, 3, 5, 4, 4, 0, 0}; {5, −1, −5, 2, −5, −1, 3, 6, 5, 4, 0, 0}; {0, 4, −2, 3, 6, 4, 0, 6, 4, 0, 0, 0}; {−3, 3, −1, 6, −5, −2, −4, −2, 3, 3, 0, 0}; {−4, −1, 4, −3, −1, −5, 3, −4, 5, 0, 0, 0}; {−5, −2, 3, −4, −2, −5, 4, −4, 6, 0, 0, 0}; {0, 4, −2, 4, −2, −3, −1, −1, 4, 3, 0, 0}; {6, −3, 2, −5, 4, −5, −5, −3, 6, 3, 0, 0}; {6, −2, 4, −2, −4, 1, 0, 4, 4, 2, 0, 0}; {6, −2, 4, −2, −3, 2, 1, 5, 4, 2, 0, 0}; {4, −3, 4, 0, 0, 6, −5, −1, 1, −1, 0, 0}; {−1, 2, −5, 1, 0, 4, 3, 6, 5, 3, 0, 0}; {3, 5, −3, 2, 3, −1, 6, −1, −5, 1, 0, 0}; {−2, 1, 6, 0, −5, −4, −2, −2, 4, 2, 0, 0}; {−3, 2, −3, 6, −3, 3, 4, −1, −2, −3, 0, 0}; {1, 3, −5, 1, 2, −3, 4, −3, 5, 0, 0, 0}; {0, 2, 6, 0, 1, −3, 4, −3, 5, 0, 0, 0}; {−3, −1, 3, −2, 6, −2, −5, −3, −5, 5, 0, 0}; {0, 3, −4, −5, 1, 6, 1, 0, −3, 1, 0, 0}; {−4, 3, 0, 4, −4, −3, 4, 0, 0, −1, 0, 0}; {−4, 4, 2, −5, 0, 3, −2, −5, −2, 0, 0, 0}; {−5, 3, 1, 6, −1, 2, −2, −5, −2, 0, 0, 0}; {5, 1, 0, 5, −2, 2, −3, 6, −2, 0, 0, 0}; {−4, 4, 3, −3, 3, −5, 4, 5, 5, −4, 0, 0};

{4, −1, −3, 3, −3, −1, −5, −4, 6, −2, 0, 0}; {−1, 5, 2, −4, −4, 1, 5, −1, 1, 0, 0, 0}; {−3, 3, 0, 6, −5, −1, −5, −2, 3, 2, 0, 0}; {2, 6, 1, 6, 6, −1, −2, 4, 3, 1, 0, 0}; {−1, 2, −4, 0, 0, 4, 2, −5, 5, 2, 0, 0}; {−2, 4, 1, −4, 3, −5, −1, 4, 4, 3, 0, 0}; {−5, −1, 6, −1, −3, 1, 2, −5, 4, 2, 0, 0}; {4, −4, 3, −4, −5, 0, −1, 4, 4, 1, 0, 0}; {4, −4, 3, −4, −5, 0, −1, 4, 4, 2, 0, 0}; {2, 5, −1, 3, 1, 5, 3, −4, 6, 3, 0, 0}; {1, 4, −2, 3, 1, 5, 3, −5, 6, 3, 0, 0}; {3, −4, 4, −1, −1, 5, 6, −1, 1, −1, 0, 0}; {−2, 1, −5, 0, −1, 3, 2, 6, 5, 3, 0, 0}; {−2, 4, 1, −3, 3, −5, 0, 3, 3, 3, 0, 0}; {6, −2, 5, −1, 5, 5, −4, −4, 5, 5, 0, 0}; {5, −3, 4, −2, 5, 5, −5, −4, 5, 5, 0, 0}; {5, −2, 6, 1, 0, 6, −5, 0, 2, 0, 0, 0}; {1, 4, −2, 3, 0, 4, 4, −4, 6, 3, 0, 0}; {0, 2, −5, 0, 1, −3, 4, −3, 5, 0, 0, 0}; {−2, 0, 5, −2, 0, −4, 4, −3, 6, 0, 0, 0}; {5, −5, 0, 6, 3, −5, 5, −4, 6, 5, 0, 0}; {−5, −2, 4, −1, 5, −4, −5, 3, 0, −2, 0, 0}; {−3, −1, 4, 2, 4, −1, 6, 1, 0, 4, 0, 0}; {5, −5, 1, −1, 2, −3, 4, −1, −1, 3, 0, 0}; {−2, −5, −4, 2, −3, 2, 0, 2, 3, −5, 0, 0}; {0, −5, 6, −1, 3, 6, 1, −3, −1, −1, 0, 0}; {5, 0, −1, 5, 5, −3, 3, −2, 1, 0, 0, 0}; {1, −4, −5, 1, 3, −5, 1, −3, 0, −1, 0, 0}; {−5, 2, 1, −5, −2, 3, −3, 6, −2, 0, 0, 0}; {0, 6, 4, −2, −4, 1, 5, −1, 1, 1, 0, 0}; {−1, 4, 1, −5, −3, 3, 4, −1, 0, −2, 0, 0}; {−2, 4, 2, −3, 1, 5, 4, 5, −1, 2, 0, 0}; {−3, −1, 5, −2, −1, −5, 3, −4, 5, −1, 0, 0}; {−5, −3, 3, −4, −2, 6, 1, −5, 4, −1, 0, 0}; {6, −5, 0, 4, 5, 0, −5, −1, −5, 1, 0, 0}; {0, 4, 0, −5, −1, 4, 5, 1, −1, −3, 0, 0}; {2, −3, −3, 3, 5, 1, −4, 1, −2, −1, 0, 0}; {−3, 3, 2, −4, −3, 5, −1, 3, 0, 0, 0, 0}; {−4, 2, 1, −5, −4, 4, −2, 2, 0, 0, 0, 0}; {−3, −1, 6, −4, 6, −2, 5, −1, −4, 5, 0, 0}; {1, −4, −4, 3, 2, 6, 0, −3, 0, −1, 0, 0}; {−1, 5, 4, −2, −4, 0, 5, 0, 2, 1, 0, 0}; {0, −5, −5, 2, 1, 6, 0, −4, −1, −1, 0, 0}; {−1, 6, 6, 1, 1, 6, 0, −4, −1, −1, 0, 0}; {−4, 2, 1, −5, 6, −1, 3, −2, 1, 0, 0, 0}; {−3, 4, 4, −1, −1, 5, −2, 6, −2, −2, 0, 0}; {−4, 3, 3, −2, −2, 4, −2, 6, −2, −1, 0, 0}; {−4, 3, 3, −2, −1, 4, −2, −5, −1, −1, 0, 0}; {−5, 1, 0, 6, 6, −2, 4, −1, 1, 0, 0, 0}; {−4, 3, 3, −2, −1, 4, −1, −5, −1, −1, 0, 0}; {3, 5, 0, 3, −4, 4, 2, −5, 5, −1, 0, 0}; {−3, 3, 2, −3, 6, −3, 3, 0, 1, −1, 0, 0}; {1, 4, 0, −5, −1, 4, 5, 1, −1, −4, 0, 0}; {−3, −2, 4, −2, −1, −5, 2, −5, 4, −1, 0, 0}; {−4, 2, 2, −5, −3, 4, −2, 3, 0, 0, 0, 0}; {5, −3, −5, −1, −3, 4, −4, −3, 5, 4, 0, 0}; {−5, 3, 5, 1, 3, −4, 4, 3, −5, −4, 0, 0}; {6, 0, 0, 6, −5, 3, −2, 2, −1, 0, 0, 0}; {6, 0, 0, 6, −5, 3, −2, 3, −1, 0, 0, 0}; {−4, 2, 2, −4, 6, −2, 4, −1, 1, 1, 0, 0}; {−5, 1, 1, −5, 5, −3, 3, −2, 1, 1, 0, 0}; {6, 0, 0, 6, 5, −3, 2, −2, 1, 0, 0, 0}; {6, 0, 0, 6, 5, −3, 3, −2, 1, 0, 0, 0}; {4, −2, −2, 5, 3, −4, 2, −3, 0, 0, 0, 0}; {6, 3, −5, 2, −4, 6, 5, 3, 6, −5, 0, 0}; {−3, −5, 0, −3, 4, −4, −2, 5, −5, 1, 0, 0}; {−4, 3, 5, −1, −5, 2, 6, −5, 0, 0, 0, 0}; {4, −2, −1, 5, 4, −4, 2, −2, 0, 0, 0, 0}; {−1, 4, 4, −3, −2, 6, 0, 3, 0, 1, 0, 0}; {0, −5, −3, 4, −4, 5, 1, −5, −5, −2, 0, 0}; {5, −2, −2, 3, 0, 4, −4, 3, 1, 2, 0, 0}; {0, 6, −5, 2, 0, 5, 0, −4, −1, 0, 0, 0}; {−2, 3, 3, −3, −5, −1, 4, −1, 2, 1, 0, 0}; {3, −4, −4, 2, −2, 1, −5, 3, 1, 1, 0, 0}; {2, −4, −3, 4, 1, 6, 1, −3, −1, 0, 0, 0}; {0, 4, 3, −4, 3, 6, −1, 6, 4, 2, 0, 0}; {−5, 5, −1, 1, −2, 3, −4, 1, 1, −3, 0, 0}; {−1, −3, 3, −4, 6, 3, −2, 0, −5, −1, 0, 0}; {−4, 4, −4, 1, −5, −4, 6, 4, −5, −5, 0, 0}; {6, 5, 0, −4, −5, 0, 5, 1, 5, −1, 0, 0}; {5, 3, −3, 4, 2, 6, −1, 5, −4, 1, 0, 0}; {3, 1, −5, 2, 1, 5, −3, 4, −5, 1, 0, 0}; {4, −1, 2, −5, 0, −1, −3, −5, −4, −3, 0, 0}; {3, −2, 1, −5, 1, −2, −4, 6, −5, −3, 0, 0}; {−4, 1, 2, −5, −4, 4, −2, 5, 0, 1, 0, 0}; {2, −4, −2, 4, 0, 5, −3, −3, 1, −1, 0, 0}; {5, −2, −1, 5, 2, −3, 3, 6, 2, 0, 0, 0}; {2, 5, 4, −2, 3, −2, 0, −2, −3, 5, 0, 0}; {−5,

−1, 0, −5, 2, −2, 3, 6, 2, 0, 0, 0}; {3, 1, −4, −2, −4, 1, 6, −1, 0, −4, 0, 0}; {2, −1, 5, −2, −5, 5, 0, 1, −4, −1, 0, 0}; {2, 0, −5, 2, 0, 4, −4, 3, 6, 0, 0, 0}; {0, −2, 5, 0, −1, 3, −4, 3, −5, 0, 0, 0}; {4, −1, 3, −4, 2, −1, −4, 6, −5, −4, 0, 0}; {2, −4, −1, 3, −3, 5, 0, −3, −3, −3, 0, 0}; {4, −2, 1, 6, 0, −1, −3, −5, −4, −3, 0, 0}; {−1, 5, −4, 1, −5, 3, −1, −4, −4, −3, 0, 0}; {−2, 4, −5, 0, 6, 2, −1, −4, −4, −3, 0, 0}; {3, −3, 0, 6, 5, 1, 5, 2, −3, −2, 0, 0}; {5, 2, −4, 5, 1, 5, −4, 4, 6, 0, 0, 0}; {3, 3, 0, 1, −5, 0, 6, 2, −4, −4, 0, 0}; {4, −4, −3, 3, −3, 5, −4, −5, −5, 4, 0, 0}; {−1, 3, 5, −1, 5, 2, 6, 5, 6, 3, 0, 0}; {−3, 1, 3, −3, 3, 1, 6, 4, 5, 1, 0, 0}; {−4, −1, 0, 5, −1, 6, −2, −2, −5, 3, 0, 0}; {−5, −1, 1, −4, 2, −1, 3, 6, 4, 1, 0, 0}; {5, −3, −1, 6, 1, −2, 2, 5, 2, 0, 0, 0}; {4, −4, −2, 5, 0, −3, 2, 5, 2, 0, 0, 0}; {4, −3, 0, −4, 4, 3, −4, 0, 0, 1, 0, 0}; {4, −2, 2, −1, −1, 6, −1, −3, −5, −4, 0, 0}; {0, −3, 4, 5, −1, 6, −1, 0, 3, −1, 0, 0}; {0, −2, 6, 0, −1, 3, −4, 3, −5, 0, 0, 0}; {−1, −3, 5, −1, −2, 3, −4, 3, −5, 0, 0, 0}; {−5, 2, −5, −1, 6, −5, 6, 4, −5, −5, 0, 0}; {−5, 3, −3, 2, −2, 0, 1, 0, 4, 5, 0, 0}; {−3, −5, 3, −2, −3, 1, 6, 1, 5, −1, 0, 0}; {−3, 5, −1, 5, −1, 1, 2, 1, 4, 5, 0, 0}; {−4, 4, −2, 4, −2, 1, 2, 1, 4, 5, 0, 0}; {−5, 3, −3, 3, −2, 0, 1, 0, 4, 5, 0, 0}; {4, −1, 4, −3, 4, 5, 5, 3, 6, 6, 0, 0}; {1, −4, 1, 6, 1, 2, 6, 5, 1, −1, 0, 0}; {2, −3, 2, −5, 3, 4, 4, 2, 6, 6, 0, 0}; {5, 2, −3, 4, 2, 5, −4, 4, 6, 0, 0, 0}; {4, 1, −4, 3, 1, 5, −3, 4, −5, 0, 0, 0}; {−5, 3, −3, 5, 3, −5, −3, 4, 6, 0, 0, 0}; {−2, 6, 0, −4, 4, −5, −2, 5, −5, 0, 0, 0}; {3, −2, 3, −1, 0, 6, −2, −3, −5, −4, 0, 0}; {0, −5, 0, −4, 1, 3, 2, 1, 5, 5, 0, 0}; {−1, 6, 0, −4, 3, 2, 2, −4, −1, 2, 0, 0}; {6, 1, −5, 3, −5, 6, −5, −2, 3, 4, 0, 0}; {−1, 5, −2, 6, −1, 2, 2, 0, 4, 4, 0, 0}; {−3, 2, 6, 1, −4, −5, −1, 2, 2, 0, 0, 0}; {−5, −1, 2, −4, 2, 0, 3, 6, 4, 1, 0, 0}; {5, −1, 4, 1, −2, −3, 3, −4, −2, −1, 0, 0}; {0, −4, 3, 3, −4, −4, 0, 4, 0, 1, 0, 0}; {−5, 3, −2, −2, 4, −2, 2, 3, 5, 0, 0, 0}; {6, 2, −3, −3, 3, −3, 1, 2, 4, 0, 0, 0}; {5, 1, −4, −4, 3, −3, 1, 2, 4, −1, 0, 0}; {6, 2, −3, −2, 3, −2, 1, 3, 4, 0, 0, 0}; {4, −1, 5, 5, −3, 3, 6, 6, 6, 1, 0, 0}; {5, 1, −4, −3, 2, −3, 1, 2, 4, 0, 0, 0}; {5, 1, −4, −3, 3, −3, 1, 2, 4, 0, 0, 0}; {2, −3, 3, 3, −4, 2, 5, 5, 6, 1, 0, 0}; {1, −4, 2, 2, −4, 1, 4, 4, 6, 1, 0, 0}; {1, −5, 0, 0, 6, 0, −3, −4, −5, 0, 0, 0}; {−5, 1, 6, 6, 1, 2, −4, 6, −2, 0, 0, 0}; {1, −5, 0, 0, −5, 0, −4, −4, −5, 0, 0, 0}; {−3, 2, 6, 6, −1, 4, 0, −1, −4, 1, 0, 0}; {−5, 0, 4, 4, −2, 3, −1, −2, −4, 0, 0, 0}; {6, −1, 3, 3, −2, 3, −1, −3, −4, 1, 0, 0}; {−1, −3, 6, 0, 3, −1, 2, 3, 3, −4, 0, 0}; {6, 3, −1, 5, −1, 0, −1, 6, −3, 0, 0, 0}; {6, 2, −3, 2, −4, −1, 3, 4, −1, −1, 0, 0}; {3, −2, 4, −4, 3, 4, 5, 3, 6, 6, 0, 0}; {4, −1, 5, −3, 5, 6, 4, 3, −5, −5, 0, 0}; {1, −4, 2, 6, 2, 3, 4, 2, 6, 6, 0, 0}; {1, −4, 2, −5, 3, 4, 3, 2, 6, 6, 0, 0}; {−2, 5, −1, 4, 1, 2, 2, 1, 5, 6, 0, 0}; {5, −1, 4, −3, 5, 6, 5, 3, −5, −5, 0, 0}; {−5, 3, −2, 5, 3, 6, −3, 4, 6, 0, 0, 0}; {−3, 4, −2, 4, −1, 1, 2, 1, 4, 5, 0, 0}; {−5, 2, −4, 2, −2, 0, 1, 0, 4, 5, 0, 0}; {−3, 5, 0, −5, 4, −5, −2, 5, −5, 0, 0, 0}; {6, 0, 5, −1, −5, −5, 5, 4, −4, −4, 0, 0}; {2, −4, 1, −5, 3, 4, 4, 2, 6, 6, 0, 0}; {2, −4, 1, −5, 4, 4, 4, 2, 6, −5, 0, 0}; {−1, 6, 0, −5, −2, −4, −3, −1, 5, 5, 0, 0}; {−1, 6, 0, −5, −2, −3, −3, −1, 5, 5, 0, 0}; {−4, 3, −3, 4, −4, −5, −4, −2, 5, 5, 0, 0}; {−5, 2, −4, 3, −5, 6, −5, −3, 5, 5, 0, 0}; and {−5, 2, −4, 3, −4, −5, −5, −1, 2, 4, 0, 0}; and {−2, 5, −1, 6, −1, 2, 3, 1, 4, 5, 0, 0};

{−3, 2, −5, 0, −1, −3, −5, 5, −3, −4, 0, 0}; {6, 0, 6, 0, 4, −5, −4, 2, 0, −2, 0, 0}; {0, 0, 0, 1, 10, 8, 5, 0, 4, 9, 10, 2}; {1, −5, 1, −3, −5, −1, −1, 6, −5, 1, 0, 0}; {−4, 1, 6, 1, −2, 6, 0, 2, 4, 3, 0, 0}; {−3, 1, 5, 0, −5, −3, −4, 3, 0, −2, 0, 0}; {4, 5, 6, −2, 3, −1, 4, −1, −2, 4, 0, 0}; {−4, −1, 2, −4, 6, −2, −4, −5, −4, 3, 0, 0}; {−2, 3, −4, 4, 5, 6, 1, 1, −3, −5, 0, 0}; {0, 0, 0, 4, 8, 11, 9, 6, 10, 5, 0, 11}; {2, −4, 2, 1, 6, 4, −5, −1, 3, 1, 0, 0}; {5, 3, 1, 5, 1, 3, −2, 5, 6, −3, 0, 0}; {4, 6, −4, 4, −3, 6, 0, 6, 6, 3, 0, 0}; {−4, 0, 4, 3, −2, 3, −1, −2, −5, 0, 0, 0}; {−5, −5, −5, 2, 6, −2, 6, 4, −3, 6, 0, 0}; {−2, −4, 6, 0, 5, −3, −5, 3, −4, −1, 0, 0}; {1, −2, −5, 0, 5, 0, 3, 2, 4, 6, 0, 0}; {2, −3, 4, −4, −5, 6, −1, −1, 3, 5, 0, 0}; {4, 0, −4, 2, 1, 4, −4, 3, 5, 0, 0, 0}; {3, −2, 5, −2, 0, −2, −3, 3, 3, −2, 0, 0}; {5, −1, 5, −2, 0, 0, −1, 0, −4, 6, 0, 0}; {6, 1, −3, 3, −4, 0, 4, 6, 6, 5, 0, 0}; {6, 0, −5, 1, 0, 2, 0, 0, 5, 5, 0, 0}; {−1, 6, 2, −2, 3, −4, 0, 3, 3, 3, 0, 0}; {−1, 5, 0, −5, 3, 2, 2, −5, −2, 1, 0, 0}; {1, 6, 0, −5, 4, −2, 0, 3, 3, 3, 0, 0}; {0, 0, 1, 3, 11, 7, 11, 4, 5, 0, 0, 7}; {6, −3, 1, −5, −2, −5, 3, −4, 6, 1, 0, 0}; {0, 2, 5, −2, 5, 3, 3, −3, 4, 0, 0, 0}; {−4, 1, −5, 4, −4, −5, −4, −2, 5, 4, 0, 0}; {2, 4, −5, 1, 5, 0, −5, 5, 3, −1, 0, 0}; {0, 0, 1, 5, 9, 2, 10, 3, 0, 8, 4, 4}; {−2, −1, 1, −5, 3, 6, 2, 0, −1, 6, 0, 0}; {0, 0, 1, 6, 3, −1, 4, 6, 1, 5, 0, 0}; {−5, 1, −4, −5, −1, 5, −5, −5, −4, 2, 0, 0}; {1, −5, 2, 1, 5, 0, 1, −3, −5, −4, 0, 0}; {−4, 0, 5, 2, −3, −4, 4, −2, 1, 1, 0, 0}; {0, 0, 1, 6, 11, 3, 10, 7, 4, 11, 2, 1}; {5, −1, 6, 6, 5, 2, −5, 4, 6, −4, 0, 0}; {−2, −5, 5, −4, 4, 6, 1, 6, −4, −4, 0, 0}; {−4, 3, −1, 0, 6, 6, −1, 3, −1, −1, 0, 0}; {0, 0, 1, 9, 0, 1, 6, 1, 8, 8, 5, 0}; {0, 0, 1, 9, 2, 5, 4, 8, 5, 1, 0, 6}; {−1, −5, 4, −4, 3, 5, 0, 6, −5, −1, 0, 0}; {0, 0, 1, 10, 1, 8, 11, 3, 2, 8, 7, 2}; {2, −4, 3, −5, −5, 5, −2, 0, 4, 4, 0, 0}; {2, −4, 3, −5, −5, 5, −1, 0, 3, 4, 0, 0}; {0, 0, 2, 0, 8, 9, 6, 10, 3, 9, 9, 2}; {−3, 1, −5, −2, −2, 3, −1, 6, 5, 1, 0, 0}; {3, −4, 3, −4, 5, 5, 2, 2, −4, −3, 0, 0}; {−1, 0, 3, 4, −1, −5, 2, −5, 2, 3, 0, 0}; {−5, 0, −5, 1, 3, −4, −4, 2, 1, 0, 0, 0}; {4, −5, 0, 4, 2, 6, 3, −4, 6, 4, 0, 0}; {0, 4, −2, 4, −3, −4, −1, −2, 6, 5, 0, 0}; {5, −4, 1, 6, 1, −1, 1, 0, 6, 3, 0, 0}; {−1, 6, 3, 1, 6, −1, −2, 0, −5, −1, 0, 0}; {3, 6, −1, 5, 0, −2, 0, −2, −4, −5, 0, 0}; {3, −3, 5, 2, 2, −3, 1, −5, −3, −1, 0, 0}; {4, −5, 0, −5, −4, 0, 2, 1, 5, 1, 0, 0}; {−3, 0, 5, 0, −5, −3, −5, 3, 0, −2, 0, 0}; {0, 0, 2, 7, 6, 4, 11, 8, 5, 9, 4, 7}; {−3, 0, 5, 2, −5, 3, −1, −2, 2, 2, 0, 0}; {−1, −1, 1, −4, 6, −3, 3, −2, −1, 5, 0, 0}; {3, 6, −1, −2, 3, −5, 3, 1, −2, 2, 0, 0}; {3, −1, −3, 1, 2, 5, 3, −5, 1, 4, 0, 0}; {0, 0, 2, 10, 4, 0, 11, 9, 6, 0, 3, 5}; {4, −2, 6, −3, −4, 6, 1, 0, 3, 6, 0, 0}; {−1, 0, 3, 1, 0, −5, −2, 5, 1, 6, 0, 0}; {0, 0, 2, 11, 10, 4, 6, 9, 3, 8, 2, 9}; {0, 0, 2, 11, 11, 5, 6, 2, 5, 10, 6, 1}; {−5, −2, 4, 4, −2, 3, 0, −2, −4, 0, 0, 0}; {6, 6, −3, −5, 3, −2, 2, −4, 3, 5, 0, 0}; {0, −4, −5, 1, −5, −2, 5, −4, −5, −1, 0, 0}; {−4, 4, 3, −2, 1, 5, −1, −4, −1, −2, 0, 0}; {2, −5, 3, −4, 3, 3, 6, −5, 4, 5, 0, 0}; {0, 0, 3, 3, 7, 1, 5, 3, 1, 11, 7, 11}; {0, 0, 3, 3, 11, 8, 5, 7, 3, 6, 11, 4}; {1, 6, 2, −4, −2, 0, −2, −1, 4, 3, 0, 0}; {0, 0, 3, 4, 11, 1, 7, 10, 5, 11, 6, 3}; {2, −2, −3, −5, 0, 5, −4, −4, 1, −3, 0, 0}; {−3, 5, 4, 3, −3, 2, 5, −5, 0, −3, 0, 0}; {0, 0, 3, 6, 5, 2, 7, 4, 3, 1, 7, 0}; {−3, 1, −4, 3, 6, −2, −3, 5, 1, −1, 0, 0}; {−1, 2, −4, 2, −4, 6, 1, 2, −2, −2, 0, 0}; {−1, 2, −4, 2, −4, −4, −1, −2, 4, 2, 0, 0}; {0, 0, 3, 8, 2, 2, 9, 7, 6, 2, 6, 3}; {0, 0, 3, 8, 10, 7, 4, 3, 8, 4, 8, 6}; {3, 2, 4, −3, 6, −1, 5, 0, 1, 5, 0, 0}; {2, 1, 3, −4, 5, −2, 5, 0, 1, 5, 0, 0}; {−5, 3, 2, 5, 3, 0, 4, −3, 5, −4, 0, 0}; {−3, 0, 6, 5, 0, 2, −4, 4, −1, −1, 0, 0}; {0, 0, 4, 0, 6, 1, 9, 7, 6, 2, 5, 8}; {−2, 1, −4, −4, 4, −4, 3, −1, −4, −2, 0, 0}; {0, 0, 4, 1, 8, 3, 5, 3, 2, 9, 11, 4}; {5, 1, 1, 6, −1, 2, −2, −5, −3, −3, 0, 0}; {−5, 4, 5, −1, 6, −5, 1, 5, 5, −2, 0, 0}; {6, 3, 4, 0, 6, 4, −2, 4, 6, −2, 0, 0}; {−5, 6, −3, −5, 3, −1, 2, −2, 3, 6, 0, 0}; {−2, 2, −2, 1, 5, −2, −2, 6, 4, −1, 0, 0}; {−5, −1, −5, −2, 4, −1, −4, 4, 5, 6, 0, 0}; {6, 6, −2, −3, 4, −2, 5, −3, 3, 3, 0, 0}; {3, 3, −5, −5, 1, −3, 3, −4, 2, 3, 0, 0}; {1, 4, −1, 4, −3, −3, 0, −2, 6, 2, 0, 0}; {6, 1, 0, −2, 3, −5, −2, −3, 2, −2, 0, 0}; {3, −5, 3, −1, −5, 6, 2, 5, −2, 0, 0, 0}; {0, 1, 6, −1, 6, 3, 4, −1, −2, 2, 0, 0}; {0, 0, 4, 8, 6, 2, 2, 11, 3, 4, 0, 5}; {−1, 6, 5, 4, −2, 1, −2, 0, 1, −4, 0, 0}; {6, −4, 2, −4, −1, 4, 1, −5, 3, 0, 0, 0}; {0, 4, 0, −4, 2, −2, −2, 6, −4, 0, 0, 0}; {0, 0, 4, 8, 10, 3, 11, 4, 2, 2, 11, 6}; {−3, 1, −3, 6, −4, 6, 5, −1, −5, −4, 0, 0}; {1, 3, −3, 4, 6, −3, 2, 0, 5, 1, 0, 0}; {0, 0, 4, 10, 2, 4, 7, 6, 10, 7, 5, 3}; {1, 4, −1, −3, −1, −4, 5, −2, −2, −5, 0, 0}; {0, 0, 4, 11, 11, 0, 11, 9, 3, 5, 2, 8}; {5, 1, 2, 6, 0, 2, −2, 6, −3, −4, 0, 0}; {3, −3, −4, −1, 3, −2, −5, −5, −1, 4, 0, 0}; {0, 0, 5, 2, 1, 2, 1, 9, 6, 10, 3, 8}; {0, 0, 5, 2, 1, 5, 2, 5, 0, 10, 0, 7}; {2, −4, −5, −1, 2, −4, −4, 4, −1, 1, 0, 0}; {5, 2, 4, −1, 5, 6, 1, 5, 5, −3, 0, 0}; {5, 0, 0, 5, −4, 3, 5, 1, −3, 0, 0, 0}; {0, −3, −1, −5, 2, −3, −4, 3, −5, −2, 0, 0}; {0, −4, −3, 4, −2, −5, 1, 6, −5, −1, 0, 0}; {−3, −5, −2, −4, 4, −4, 1, 6, −4, 6, 0, 0}; {3, 6, 2, 5, −5, 2, −2, 5, 5, 5, 0, 0}; {2, −4, −5, 1, 1, −5, 2, 6, 1, 1, 0, 0}; {−4, 2, 1, −4, −2, 3, −3, 6, −2, 0, 0, 0}; {−5, 4, 6, 4, −3, 0, −4, 2, 2, −4, 0, 0}; {−3, −1, 6, −3, 1, 0, 4, 2, −5, 3, 0, 0}; {−1, 4, 2, −3, −4, 0, 6, −2, 2, 0, 0, 0}; {−1, 0, 6, −3, 6, −2, 6, −1, −4, 6, 0, 0}; {−3, −1, 6, −2, 3, 1, 0, 5, 3, −2, 0, 0}; {−4, −1, −5, 1, 0, 5, 0, 3, 5, 4, 0, 0}; {0, −1, 3, 5, 4, −1, 4, 5, 0, 4, 0, 0}; {−1, −1, 4, −5, −4, 3, −2, 1, −3, 2, 0, 0}; {2, −4, −4, −1, 2, −3, −4, 4, −1, 2, 0, 0}; {−3, −5, −1, −5, 4, 3, −3, −1, 5, −2, 0, 0}; {−3, 1, −1, 1, 5, 1, −3, 5, 3, 4, 0, 0}; {−2, −3, 2, −1, 3, 4, −3, 2, 5, 2, 0, 0}; {−4, −5, 0, −2, −4, −3, 3, 6, 2, −5, 0, 0}; {0, 0, 6, 5, 8, 6, 6, 8, 1, 6, 11, 7}; {−5, 5, −3, 6, −4, 1, −3, 1, 4, 6, 0, 0}; {−4, 1, 0, 5, 1, 4, −2, 4, 4, 1, 0, 0}; {6, −3, 6, −3, 3, 6, −5, −1, −5, 4, 0, 0}; {4, 2, 6, 4, 6, 0, −4, 0, 3, 6, 0, 0}; {−4, 2, 2, −4, 6, −1, 4, −1, 0, 0, 0, 0}; {−4, 6, −2, −3, 1, −5, 0, 3, 6, 3, 0, 0}; {0, 0, 6, 7, 5, 5, 0, 4, 6, 3, 10, 4}; {−4, −1, −4, 1, −3, 2, 3, −3, 4, 3, 0, 0}; {4, −5, 4, −3, 2, 4, −2, −4, 4, 0, 0, 0}; {−2, 4, 4, 1, −2, 3, 4, −4, 1, −2, 0, 0}; {4, −5, 4, −2, −2, 3, −2, 1, 4, 3, 0, 0}; {0, 0, 6, 9, 6, 10, 5, 9, 8, 1, 11, 9}; {0, 0, 6, 9, 11, 3, 11, 3, 0, 1, 9, 4}; {0, 0, 6, 10, 2, 1, 4, 0, 8, 8, 11, 8}; {−2, −3, 2, 6, 1, −5, −3, 3, 1, −2, 0, 0}; {6, 4, −3, 2, −2, 5, 5, −2, 0, 3, 0, 0}; {4, 2, −5, 0, −3, 6, 0, 2, −4, 0, 0, 0}; {3, 0, 4, −2, 0, 6, 0, −3, −5, −3, 0, 0}; {0, 0, 7, 5, 0, 9, 2, 9, 3, 6, 4, 5}; {−3, 5, −4, 2, 2, −2, 2, −1, −4, −3, 0, 0}; {−2, −3, 3, 1, −4, −3, 4, −4, 2, −2, 0, 0}; {−1, 6, −4, 2, −5, 3, 0, −4, −3, −2, 0, 0}; {−3, 2, 2, 6, −1, −5, 3, 3, 0, 3, 0, 0}; {0, 0, 7, 6, 9, 3, 3, 1, 3, 5, 1, 5}; {−3, −5, 0, −2, 2, 4, −3, 2, 5, 2, 0, 0}; {1, −3, 0, −4, 1, −2, −4, 4, −5, −3, 0, 0}; {−3, 6, −2, −5, −4, 2, −2, 1, 4, 6, 0, 0}; {0, 0, 7, 8, 2, 1, 9, 4, 9, 7, 8, 10}; {0, 3, 1, 5, −2, 3, 4, −3, 5, 2, 0, 0}; {−2, 4, 5, 1, −2, 4, 4, −4, 1, −1, 0, 0}; {−5, 0, 0, −5, 4, −3, −5, −1, 3, 0, 0, 0}; {4, −1, 1, −2, 6, −3, −5, −1, −1, −5, 0, 0}; {−4, 0, −1, 6, 0, 1, −5, 3, 5, 1, 0, 0}; {0, 0, 7, 11, 5, 3, 6, 3, 0, 0, 4, 3}; {0, 0, −5, −1, 6, −4, 1, −3, 6, −1, 0, 0}; {0, 0, 7, 11, 10, 11, 4, 3, 7, 0, 8, 8}; {−4, 5, −2, 0, 6, −4, 5, 2, −3, 0, 0, 0}; {0, 4, 4, 2, 2, −3, −1, 4, −2, −5, 0, 0}; {0, 0, 8, 3, 3, 2, 4, 10, 2, 0, 8, 0}; {2, 1, −4, 2, 3, −3, 3, 6, 4, −2, 0, 0};

{4, 2, −4, 2, 5, 1, 6, 5, 5, 6, 0, 0}; {1, −3, 1, 6, 6, −3, 1, 0, −2, 3, 0, 0}; {2, −1, 4, −1, 6, 5, 1, 2, −4, −1, 0, 0}; {4, 2, −4, 4, 1, 5, −4, 4, 6, 0, 0, 0}; {1, −3, 1, −4, 0, −3, −3, 0, 6, 6, 0, 0}; {−3, 5, −3, 4, −2, −4, 6, 4, −5, −4, 0, 0}; {−2, −5, 0, −4, 6, 5, −4, −1, 5, −3, 0, 0}; {0, 0, 8, 8, 0, 10, 8, 2, 7, 2, 9, 0}; {3, −3, −1, 5, 5, 1, 5, 1, −3, −1, 0, 0}; {−4, −5, 2, 1, 6, −3, 3, −3, 1, −1, 0, 0}; {0, 0, 8, 8, 2, 8, 3, 10, 2, 0, 2, 4}; {6, −2, −2, 2, 3, −2, 3, −3, 3, 2, 0, 0}; {−5, 6, 1, 0, 2, −1, 4, −1, 2, −5, 0, 0}; {−2, 1, 0, 3, −3, −1, 5, −2, −5, 4, 0, 0}; {−3, 1, 1, 6, 3, −1, 4, 6, 3, 2, 0, 0}; {6, −1, 0, 6, 5, −4, 2, −3, 1, 0, 0, 0}; {−3, 3, 5, 0, −4, 1, −2, −4, −3, −4, 0, 0}; {−4, 0, 0, 6, 0, −5, −2, −4, −4, 5, 0, 0}; {0, 0, 8, 10, 0, 7, 2, 0, 4, 8, 6, 9}; {4, 1, 6, 5, −3, 5, −2, 2, 5, 2, 0, 0}; {0, 0, 8, 11, 9, 4, 11, 2, 6, 5, 5, 10}; {0, 0, 9, 0, 5, 10, 10, 10, 3, 11, 5, 3}; {−4, 6, 1, 2, −4, 4, −3, −1, 2, −1, 0, 0}; {−1, 5, −4, 6, 1, 6, 4, −4, −3, 3, 0, 0}; {0, 0, 9, 2, 3, 1, 9, 1, 10, 5, 6, 9}; {3, 3, 0, 5, −5, 4, −3, 2, 1, 6, 0, 0}; {−5, 2, 6, −5, −4, −2, 4, −3, 5, 3, 0, 0}; {0, 0, 9, 3, 10, 3, 4, 1, 4, 9, 10, 1}; {−5, 4, −2, 2, −3, −1, 3, 3, −1, −2, 0, 0}; {−2, −3, 5, −1, −2, 3, −4, 3, −5, 0, 0, 0}; {6, 5, 1, −5, −5, 0, 5, 1, 6, −1, 0, 0}; {5, 4, 0, −5, 3, −4, 2, 5, −4, 0, 0, 0}; {−1, 6, −2, 1, −3, −2, −5, 4, −5, −5, 0, 0}; {0, 0, 9, 5, 10, 0, 5, 1, 6, 6, 8, 4}; {3, −2, 2, 5, 5, 5, 6, 1, 6, 4, 0, 0}; {0, 0, 9, 5, 11, 11, 0, 4, 8, 3, 6, 7}; {−4, 3, −5, −1, −5, −4, 6, 4, −5, −5, 0, 0}; {3, −5, −4, −3, 3, −2, −5, 5, 0, 3, 0, 0}; {0, −5, −1, 4, 4, 0, 3, 1, −3, −3, 0, 0}; {0, 5, −5, −2, −1, −3, −4, 3, −3, 3, 0, 0}; {0, 0, 9, 8, 2, 5, 0, 6, 7, 11, 9, 2}; {−2, −2, −5, 6, 0, 5, −1, 4, −3, −3, 0, 0}; {2, −2, 3, −2, 4, 5, 2, 2, 5, 5, 0, 0}; {3, −3, 0, 6, 5, 1, 4, 1, −3, −2, 0, 0}; {2, −2, 3, −1, 6, 5, 1, 2, −4, −1, 0, 0}; {−5, −1, 0, 4, −2, 5, 2, 2, −2, 2, 0, 0}; {4, −5, −5, −1, 4, −1, 2, 0, −2, 5, 0, 0}; {1, 3, 2, 6, 0, −5, −1, −1, 5, 3, 0, 0}; {−5, 2, 6, 3, 4, 6, −1, 0, −3, 6, 0, 0}; {6, −3, −2, 3, −3, 4, −3, −2, 6, 2, 0, 0}; {−4, 0, 2, −3, 3, 0, 4, 6, 3, 1, 0, 0}; {0, 0, 10, 1, 8, 1, 4, 5, 10, 10, 4, 1}; {−4, 2, 6, 3, 4, 6, −1, 0, −3, 6, 0, 0}; {3, −2, 3, 2, −3, 2, 4, 5, −5, 1, 0, 0}; {0, 0, 10, 2, 3, 8, 9, 10, 6, 1, 7, 0}; {2, −4, 0, −2, 6, 6, 1, −4, −2, 0, 0, 0}; {−1, −1, −3, 1, −5, 4, 1, −1, 5, −3, 0, 0}; {1, −4, 1, 0, 2, −2, 2, 5, −5, 4, 0, 0}; {4, −1, 4, 4, −1, 0, −4, 5, −2, 0, 0, 0}; {4, 0, 6, −5, 4, −5, −1, 4, 3, −2, 0, 0}; {1, 6, −3, −4, 2, 6, 2, −1, −2, 2, 0, 0}; {3, −1, 5, −5, 6, −1, 2, 1, 0, 4, 0, 0}; {0, 5, −4, −4, 1, 6, 1, −2, −3, 2, 0, 0}; {0, 0, 10, 5, 5, 10, 3, 9, 10, 10, 2, 9}; {5, 3, −1, 4, 4, −1, 4, −5, 5, −2, 0, 0}; {3, 0, −5, 0, −5, −2, 1, 0, 3, 4, 0, 0}; {1, −1, −5, 2, −4, −3, −2, 4, −4, 0, 0, 0}; {0, 0, 10, 7, 3, 8, 3, 7, 6, 8, 11, 4}; {−3, 4, −3, 1, 5, 2, −1, 0, −2, −4, 0, 0}; {−3, 6, 1, −5, 1, 1, −1, 2, 5, −1, 0, 0}; {5, −3, −1, 1, −2, 5, 2, 3, 0, 4, 0, 0}; {−5, 4, −1, 6, −3, 6, 5, 3, −5, −2, 0, 0}; {1, 0, −3, −4, 1, 5, −2, 5, −2, −3, 0, 0}; {0, 0, 10, 11, 0, 2, 6, 10, 8, 3, 10, 3}; {−2, 4, −4, 3, −4, −5, −1, −1, 3, 3, 0, 0}; {−4, 2, −5, 2, −3, 6, 5, −2, 0, 2, 0, 0}; {−1, 6, 0, −4, −4, 2, 6, −4, −2, 1, 0, 0}; {0, 0, 11, 1, 3, 9, 8, 5, 1, 6, 0, 8}; {6, 1, −5, 4, 4, −1, 3, −5, −4, 0, 0, 0}; {−4, 2, −5, 3, 4, 6, 0, 0, −3, −5, 0, 0}; {0, 0, 11, 4, 1, 7, 8, 1, 3, 9, 0, 9}; {−1, 4, −4, −5, 1, 4, 2, −1, −3, 2, 0, 0}; {−1, 1, 2, −2, 2, −1, 3, −3, 6, 5, 0, 0}; {0, 0, 11, 6, 1, 0, 4, 7, 10, 5, 8, 4}; {−5, 2, −4, −2, 1, 3, −3, 5, 1, 1, 0, 0}; {−5, 3, −2, 1, −4, −1, 3, 3, −1, −2, 0, 0}; {−4, 4, −1, 3, −2, 1, 3, 2, 4, 5, 0, 0}; {3, −3, 2, 4, −3, 5, 3, 4, −1, −2, 0, 0}; {0, 0, 11, 7, 8, 4, 11, 10, 2, 2, 9, 2}; {5, 2, −2, 3, 1, 1, −4, −2, 5, −3, 0, 0}; {6, 3, −1,

5, −5, 3, 6, 5, 5, −2, 0, 0}; {1, −4, 2, 6, −4, 3, 1, 0, −2, −3, 0, 0}; {−5, 4, 0, −5, −5, 5, −5, 2, 5, −2, 0, 0}; {2, −1, −5, 2, 6, 3, 2, 2, −5, −2, 0, 0}; {0, 0, 11, 9, 4, 9, 3, 9, 3, 4, 8, 8}; {5, 1, −4, 2, −4, −1, 1, 0, 3, 4, 0, 0}; {6, 0, 5, −3, 5, 5, 5, 3, −3, −4, 0, 0}; {−5, 1, 6, 0, −4, 5, 5, −3, 0, 1, 0, 0}; {2, −2, 5, 1, 2, −3, 1, 6, −4, −1, 0, 0}; and {1, −4, 2, −3, −1, −2, −3, 0, 5, 6, 0, 0}; and {0, 0, 0, 0, 3, 6, 0, 10, 6, 3, 8, 1}; {0, 0, 1, 3, 3, 9, 6, 2, 4, 11, 2, 9}; {0, 0, 3, 0, 9, 4, 3, 3, 9, 1, 8, 0}; {0, 0, 3, 1, 10, 11, 8, 2, 6, 1, 2, 7}; {0, 0, 3, 1, 11, 6, 7, 1, 4, 11, 7, 11}; {0, 0, 3, 6, 10, 8, 8, 3, 11, 9, 0, 8}; {0, 0, 3, 7, 1, 4, 7, 6, 4, 0, 5, 2}; {0, 0, 4, 8, 8, 3, 9, 0, 7, 1, 10, 10}; {0, 0, 6, 5, 3, 5, 1, 5, 1, 8, 1, 2}; {0, 0, 6, 6, 1, 3, 4, 4, 5, 0, 6, 0}; {0, 0, 6, 8, 1, 3, 1, 4, 9, 5, 11, 8}; {0, 0, 7, 8, 8, 6, 2, 9, 6, 10, 3, 9}; {0, 0, 7, 8, 10, 9, 11, 2, 9, 1, 8, 4}; {0, 0, 8, 4, 4, 9, 3, 0, 5, 11, 2, 2}; {0, 0, 8, 5, 7, 10, 2, 10, 0, 11, 4, 11}; {0, 0, 8, 6, 9, 3, 11, 3, 4, 0, 4, 5}; {0, 0, 9, 1, 3, 9, 9, 9, 3, 0, 5, 0}; {0, 0, 10, 0, 7, 11, 7, 4, 11, 11, 2, 5}; {0, 0, 10, 11, 2, 7, 8, 2, 10, 2, 8, 4}; and {0, 0, 11, 6, 5, 0, 8, 1, 0, 4, 10, 1}; and mapping the sequence $\{f_n\}$ to N subcarriers to generate and send a first signal.--.

Starting at Column 162, Line 22 through Column 168, Line 17, please replace Claim 8 with the following:

--8. The signal processing method according to claim 1, wherein the set of sequences $\{s_n\}$ consisting of an element $s_n$ comprises at least a first sequence in a second sequence set or an equivalent sequence of the first sequence, and a second sequence in the second sequence set or an equivalent sequence of the second sequence;

wherein the second sequence set is one of the following sets: a sequence set 1, a sequence set 2, a sequence set 3, a sequence set 4, a sequence set 5, a sequence set 6, a sequence set 7, a sequence set 8, a sequence set 9, a sequence set 10, a sequence set 11, a sequence set 12, a sequence set 13, or a sequence set 14, sequences in the sequence set 1 comprise one or more of the following sequences:

{6, 2, −3, −3, 3, −3, 1, 2, 4, 0, 0, 0}; {1, −4, 2, −3, −1, −2, −3, 0, 5, 6, 0, 0}; {5, −5, 0, 6, 3, −5, 5, −4, 6, 5, 0, 0}; {2, 1, 3, −4, 5, −2, 5, 0, 1, 5, 0, 0}; {−3, 2, 2, 6, −1, −5, 3, 3, 0, 3, 0, 0}; {−1, −3, 6, 0, 3, −1, 2, 3, 3, −4, 0, 0}; {−2, 2, 6, 6, −1, 5, 0, −1, −4, 1, 0, 0}; {−4, 4, 3, −2, 1, 5, −1, −4, −1, −2, 0, 0}; {−1, 2, −4, 2, −4, −4, −1, −2, 4, 2, 0, 0}; {3, −3, 0, 6, 5, 1, 4, 1, −3, −2, 0, 0}; {1, 4, −1, −3, −1, −4, 5, −2, −2, −5, 0, 0}; {−3, 5, −3, 4, −2, −4, 6, 4, −5, −4, 0, 0}; {−4, −5, 2, 1, 6, −3, 3, −3, 1, −1, 0, 0}; {4, −4, −3, 3, −3, 5, −4, −5, −5, 4, 0, 0}; {3, 6, −1, 5, 0, −2, 0, −2, −4, −5, 0, 0}; {5, 2, −2, 3, 1, 1, −4, −2, 5, −3, 0, 0}; {3, 0, −3, 3, −3, −1, −3, 5, −4, −1, 0, 0}; {3, 5, 0, 3, −4, 4, 2, −5, 5, −1, 0, 0}; {4, 2, −4, 4, 1, 5, −4, 4, 6, 0, 0, 0}; {2, −4, −5, 1, 1, −5, 2, 6, 1, 1, 0, 0}; {6, 1, 0, −2, 3, −5, −2, −3, 2, −2, 0, 0}; {−2, 1, 0, 3, −3, −1, 5, −2, −5, 4, 0, 0}; {−3, 1, −4, 3, 6, −2, −3, 5, 1, −1, 0, 0}; {2, −3, 4, −4, −5, 6, −1, −1, 3, 5, 0, 0}; {1, −4, 1, 0, 2, −2, 2, 5, −5, 4, 0, 0}; {−3, 1, −5, −2, −2, 3, −1, 6, 5, 1, 0, 0}; {5, 1, −4, 2, −4, −1, 1, 0, 3, 4, 0, 0}; {2, −4, 0, −2, 6, 6, 1, −4, −2, 0, 0, 0}; {−3, 6, −2, −5, −4, 2, −2, 1, 4, 6, 0, 0}; and {−1, 6, 2, −2, 3, −4, 0, 3, 3, 3, 0, 0};

sequences in the sequence set 2 comprise one or more of the following sequences:

{6, 2, −3, −3, 3, −3, 1, 2, 4, 0, 0, 0}; {6, 0, −5, 1, 0, 2, 0, 0, 5, 5, 0, 0}; {6, −3, 1, −5, −2, −5, 3, −4, 6, 1, 0, 0}; {−4, 2, 2, −4, 6, −1, 4, −1, 0, 0, 0, 0}; {−3, −5, −1, −5, 4, 3, −3, −1, 5, −2, 0, 0}; {−5, −2, 4, 4, −2, 3, 0, −2, −4, 0, 0, 0}; {−2, −3, 5, −1, −2, 3, −4, 3, −5, 0, 0, 0}; {4, 2, −4, 2, 5, 1, 6, 5, 5, 6, 0, 0}; {−2, −1, 1, −5, 3, 6, 2, 0, −1, 6, 0, 0}; {5, −4, 1, 6, 1, −1, 1, 0, 6, 3, 0, 0}; {−3, 5, 4, 3, −3, 2, 5, −5, 0, −3, 0, 0}; {0, 2, 5, −2, 5, 3, 3, −3, 4, 0, 0, 0}; {4, −1, 4, 4, −1, 0, −4, 5, −2, 0, 0, 0}; {6, 1, −5, 4, 4, −1, 3, −5, −4, 0, 0, 0}; {4, −1, 1, −2, 6, −3, −5, −1, −1, −5, 0, 0}; {3, −3, 2, 4, −3, 5, 3, 4, −1, −2, 0, 0}; {−3, 1, −1, 1, 5, 1, −3, 5, 3, 4, 0, 0}; {−5, 6, −3, −5, 3, −1, 2, −2, 3, 6, 0, 0}; {−3, 1, −3, 6, −4, 6, 5, −1, −5, −4, 0, 0}; {6, −2, −2, 2, 3, −2, 3, −3, 3, 2, 0, 0}; {−1, −5, 4, −4, 3, 5, 0, 6, −5, −1, 0, 0}; {−2, −3, 2, 6, 1, −5, −3, 3, 1, −2, 0, 0}; {−3, −5, 0, −2, 2, 4, −3, 2, 5, 2, 0, 0}; {4, −5, −5, −1, 4, −1, 2, 0, −2, 5, 0, 0}; {2, −1, −5, 2, 6, 3, 2, 2, −5, −2, 0, 0}; {3, 0, −5, 0, −5, −2, 1, 0, 3, 4, 0, 0}; {−1, 4, 1, −5, −3, 3, 4, −1, 0, −2, 0, 0}; {−5, 5, −3, 6, −4, 1, −3, 1, 4, 6, 0, 0}; {−5, 4, −2, 2, −3, −1, 3, 3, −1, −2, 0, 0}; {0, 4, 0, −4, 2, −2, −2, 6, −4, 0, 0, 0};

sequences in the sequence set 3 comprise one or more of the following sequences:

{6, 2, −3, −3, 3, −3, 1, 2, 4, 0, 0, 0}; {4, 5, 6, −2, 3, −1, 4, −1, −2, 4, 0, 0}; {2, −5, 3, −4, 3, 3, 6, −5, 4, 5, 0, 0}; {5, 1, 1, 6, −1, 2, −2, −5, −3, −3, 0, 0}; {0, 4, 4, 2, 2, −3, −1, 4, −2, −5, 0, 0}; {−5, 4, 0, −5, −5, 5, −5, 2, 5, −2, 0, 0}; {6, −4, 2, −4, −1, 4, 1, −5, 3, 0, 0, 0}; {−3, 5, −4, 2, 2, −2, 2, −1, −4, −3, 0, 0}; {−2, −3, 3, 1, −4, −3, 4, −4, 2, −2, 0, 0}; {3, −1, −3, 1, 2, 5, 3, −5, 1, 4, 0, 0}; {−1, 4, −4, −5, 1, 4, 2, −1, −3, 2, 0, 0}; {−3, 3, 5, 0, −4, 1, −2, −4, −3, −4, 0, 0}; {2, −4, 2, 1, 6, 4, −5, −1, 3, 1, 0, 0}; {3, −3, −4, −1, 3, −2, −5, −5, −1, 4, 0, 0}; {−5, 2, 6, 3, 4, 6, −1, 0, −3, 6, 0, 0}; {6, 6, −3, −5, 3, −2, 2, −4, 3, 5, 0, 0}; {4, −5, 0, −5, −4, 0, 2, 1, 5, 1, 0, 0}; {3, −2, 2, 5, 5, 5, 6, 1, 6, 4, 0, 0}; {0, 1, 6, −1, 6, 3, 4, −1, −2, 2, 0, 0}; {−3, −5, −2, −4, 4, −4, 1, 6, −4, 6, 0, 0}; {−3, −1, 6, −2, 3, 1, 0, 5, 3, −2, 0, 0}; {3, −5, 3, −1, −5, 6, 2, 5, −2, 0, 0, 0}; {3, 6, 2, 5, −5, 2, −2, 5, 5, 5, 0, 0}; {−4, 5, −2, 0, 6, −4, 5, 2, −3, 0, 0, 0}; {1, 3, 2, 6, 0, −5, −1, −1, 5, 3, 0, 0}; {4, −5, 4, −2, −2, 3, −2, 1, 4, 3, 0, 0}; {−1, −1, −3, 1, −5, 4, 1, −1, 5, −3, 0, 0}; {−3, 4, −3, 1, 5, 2, −1, 0, −2, −4, 0, 0}; {−5, 4, 6, 4, −3, 0, −4, 2, 2, −4, 0, 0}; and {3, −1, 5, −5, 6, −1, 2, 1, 0, 4, 0, 0};

sequences in the sequence set 4 comprise one or more of the following sequences:

{0, −2, 4, 2, −4, −3, −4, −4, −4, 2, −5, −1}; {−2, −2, −5, 6, 0, 5, −1, 4, −3, −3, 0, 0}; {−1, 6, 0, −4, −4, 2, 6, −4, −2, 1, 0, 0}; {−2, 2, −2, 1, 5, −2, −2, 6, 4, −1, 0, 0}; {−4, 0, −1, 6, 0, 1, −5, 3, 5, 1, 0, 0}; {6, 5, 1, −5, −5, 0, 5, 1, 6, −1, 0, 0}; {3, −4, 3, −4, 5, 5, 2, 2, −4, −3, 0, 0}; {5, −1, 6, 6, 5, 2, −5, 4, 6, −4, 0, 0}; {−4, 1, −5, 4, −4, −5, −4, −2, 5, 4, 0, 0}; {−1, 5, −4, 6, 1, 6, 4, −4, −3, 3, 0, 0}; {1, −5, 2, 1, 5, 0, 1, −3, −5, −4, 0, 0}; {−5, 2, 6, −5, −4, −2, 4, −3, 5, 3, 0, 0}; {0, 0, 1, 6, 3, −1, 4, 6, 1, 5, 0, 0}; {−4, −5, 0, −2, −4, −3, 3, 6, 2, −5, 0, 0}; {5, 1, 2, 6, 0, 2, −2, 6, −3, −4, 0, 0}; {3, −3, 2, 4, −3, 5, 3, 4, −1, −2, 0, 0}; {−4, −1, −5, 1, 0, 5, 0, 3, 5, 4, 0, 0}; {6, −3, −2, 3, −3, 4, −3, −2, 6, 2, 0, 0}; {−2, −3, 2, 6, 1, −5, −3, 3, 1, −2, 0, 0}; {−3, 6, 1, −5, 1, 1, −1, 2, 5, −1, 0, 0}; {6, 1, −3, 3, −4, 0, 4, 6, 6, 5, 0, 0}; {−5, 1, −4, −5, −1, 5, −5, −5, −4, 2, 0, 0}; {4, 2, 6, 4, 6, 0, −4, 0, 3, 6, 0, 0}; {−5, −1, 0, 4, −2, 5, 2, 2, −2, 2, 0, 0}; {6, 3, −1, 5, −5, 3, 6, 5, 5, −2, 0, 0}; {1, −1, −5, 2, −4, −3, −2, 4, −4, 0, 0, 0}; {−1, 0, 3, 1, 0, −5, −2, 5, 1, 6, 0, 0}; {−3, 0, 6, 5, 0, 2, −4, 4, −1, −1, 0, 0}; {−4, −1, −4, 1, −3, 2, 3, −3, 4, 3, 0, 0}; and {0, −4, −5, 1, −5, −2, 5, −4, −5, −1, 0, 0};

sequences in the sequence set 5 comprise one or more of the following sequences:

{0, 0, 8, 7, 6, 0, 6, 4, 9, 5, 7, 10}; {0, 0, 5, 2, 1, 2, 1, 9, 6, 10, 3, 8}; {0, 0, 1, 3, 11, 7, 11, 4, 5, 0, 0, 7}; {0, 0, 10, 5, 5, 10, 3, 9, 10, 10, 2, 9}; {0, 0, 3, 4, 11, 1, 7, 10, 5, 11, 6, 3}; {0, 0, 4, 8, 6, 2, 2, 11, 3, 4, 0, 5}; {0, 0, 2, 10, 4, 0, 11, 9, 6, 0, 3, 5}; {0, 0, 9, 2, 3, 1, 9, 1, 10, 5, 6, 9}; {0, 0, 7, 11, 5, 3, 6, 3, 0, 0, 4, 3}; {0, 0, 8, 8, 0, 10, 8, 2, 7, 2, 9, 0}; {0, 0, 4, 10, 2, 4, 7, 6, 10, 7, 5, 3}; {0, 0, 5, 2, 1, 5, 2, 5, 0, 10, 0, 7}; {0, 0, 3, 3, 7, 1, 5, 3, 1, 11, 7, 11}; {0, 0, 9, 5, 11, 11, 0, 4, 8, 3, 6, 7}; {0, 0, 2, 11, 10, 4, 6, 9, 3, 8, 2, 9}; {0, 0, 9, 0, 5, 10, 10, 10, 3, 11, 5, 3}; {0, 0, 9, 8, 2, 5, 0, 6, 7, 11, 9, 2}; {0, 0, 1, 10, 1, 8, 11, 3, 2, 8, 7, 2}; {0, 0, 1, 6, 11, 3, 10, 7, 4, 11, 2, 1}; {0, 0, 11, 7, 8, 4, 11, 10, 2, 2, 9, 2}; {0, 0, 4, 8, 10, 3, 11, 4, 2, 2, 11, 6}; {0, 0, 6, 7, 5, 5, 0, 4, 6, 3, 10, 4}; {0, 0, 2, 7, 6, 4, 11, 8, 5, 9, 4, 7}; {0, 0, 7, 11, 10, 11, 4, 3, 7, 0, 8, 8}; {0, 0, 1, 5, 9, 2, 10, 3, 0, 8, 4, 4}; {0, 0, 0, 1, 10, 8, 5, 0, 4, 9, 10, 2}; {0, 0, 9, 5, 10, 0, 5, 1, 6, 6, 8, 4}; {0, 0, 11, 4, 1, 7, 8, 1, 3, 9, 0, 9}; {0, 0, 1, 9, 0, 1, 6, 1, 8, 8, 5, 0}; and {0, 0, 8, 10, 0, 7, 2, 0, 4, 8, 6, 9};

sequences in the sequence set 6 comprise one or more of the following sequences:

{0, 0, 8, 4, 6, 1, 9, 1, 1, 8, 0, 0}; {0, 0, 1, 9, 2, 5, 4, 8, 5, 1, 0, 6}; {0, 0, 10, 1, 8, 1, 4, 5, 10, 10, 4, 1}; {0, 0, 3, 6, 5, 2, 7, 4, 3, 1, 7, 0}; {0, 0, 2, 11, 11, 5, 6, 2, 5, 10, 6, 1}; {0, 0, 3, 3, 11, 8, 5, 7, 3, 6, 11, 4}; {0, 0, 8, 11, 9, 4, 11, 2, 6, 5, 5, 10}; {0, 0, 11, 6, 1, 0, 4, 7, 10, 5, 8, 4}; {0, 0, 6, 10, 2, 1, 4, 0, 8, 8, 11, 8}; {0, 0, 10, 11, 0, 2, 6, 10, 8, 3, 10, 3}; {0, 0, 9, 3, 10, 3, 4, 1, 4, 9, 10, 1}; {0, 0, 7, 5, 0, 9, 2, 9, 3, 6, 4, 5}; {0, 0, 0, 4, 8, 11, 9, 6, 10, 5, 0, 11}; {0, 0, 11, 9, 4, 9, 3, 9, 3, 4, 8, 8}; {0, 0, 8, 3, 3, 2, 4, 10, 2, 0, 8, 0}; {0, 0, 3, 8, 2, 2, 9, 7, 6, 2, 6, 3}; {0, 0, 4, 11, 11, 0, 11, 9, 3, 5, 2, 8}; {0, 0, 6, 5, 8, 6, 6, 8, 1, 6, 11, 7}; {0, 0, 6, 9, 6, 10, 5, 9, 8, 1, 11, 9}; {0, 0, 11, 1, 3, 9, 8, 5, 1, 6, 0, 8}; {0, 0, 7, 8, 2, 1, 9, 4, 9, 7, 8, 10}; {0, 0, 2, 0, 8, 9, 6, 10, 3, 9, 9, 2}; {0, 0, 4, 0, 6, 1, 9, 7, 6, 2, 5, 8}; {0, 0, 10, 7, 3, 8, 3, 7, 6, 8, 11, 4}; {0, 0, 10, 2, 3, 8, 9, 10, 6, 1, 7, 0}; {0, 0, 7, 6, 9, 3, 3, 1, 3, 5, 1, 5}; {0, 0, 4, 1, 8, 3, 5, 3, 2, 9, 11, 4}; {0, 0, 6, 9, 11, 3, 11, 3, 0, 1, 9, 4}; {0, 0, 3, 8, 10, 7, 4, 3, 8, 4, 8, 6}; and {0, 0, 8, 8, 2, 8, 3, 10, 2, 0, 2, 4};

sequences in the sequence set 7 comprise one or more of the following sequences:

{0, 4, −4, −2, 4, 3, 0, −4, −2, −4, −1, −3}; {−4, −1, 0, 5, −1, 6, −2, −2, −5, 3, 0, 0}; {−5, 5, −1, 1, −2, 3, −4, 1, 1, −3, 0, 0}; {−4, 2, −5, 3, 4, 6, 0, 0, −3, −5, 0, 0}; {−1, 5, 0, −5, 3, 2, 2, −5, −2, 1, 0, 0}; {−5, 0, −5, 1, 3, −4, −4, 2, 1, 0, 0, 0}; {1, −3, 0, −4, 1, −2, −4, 4, −5, −3, 0, 0}; {−1, −3, 6, 0, 3, −1, 2, 3, 3, −4, 0, 0}; {1, 3, −3, 4, 6, −3, 2, 0, 5, 1, 0, 0}; {−2, 2, 6, 6, −1, 5, 0, −1, −4, 1, 0, 0}; {2, −4, 3, −5, −5, 5, −2, 0, 4, 4, 0, 0}; {3, 3, 0, 1, −5, 0, 6, 2, −4, −4, 0, 0}; {5, 3, −1, 4, 4, −1, 4, −5, 5, −2, 0, 0}; {3, 3, −5, −5, 1, −3, 3, −4, 2, 3, 0, 0}; {−2, 4, 5, 1, −2, 4, 4, −4, 1, −1, 0, 0}; {5, 1, 0, 5, −2, 2, −3, 6, −2, 0, 0, 0}; {−5, −1, 6, 0, 6, 6, −4, −4, 6, 5, 0, 0}; {3, 2, 4, −3, 6, −1, 5, 0, 1, 5, 0, 0}; {−5, 1, −5, 6, −1, 5, −5, 6, −5, 1, 0, 0}; {2, −1, 4, −1, 6, 5, 1, 2, −4, −1, 0, 0}; {3, −3, 0, 6, 5, 1, 5, 2, −3, −2, 0, 0}; {2, −4, −5, −1, 2, −4, −4, 4, −1, 1, 0, 0}; {−1, 3, −5, 1, −4, −3, −3, 4, 1, −2, 0, 0}; {−4, 1, 0, 5, 1, 4, −2, 4, 4, 1, 0, 0}; {−5, −2, 4, −5, −1, −5, 4, −4, 6, 0, 0, 0}; {−2, 4, −4, 3, −4, −5, −1, −1, 3, 3, 0, 0}; {1, −3, 1, −4, 0, −3, −3, 0, 6, 6, 0, 0}; {2, −2, 5, 1, 2, −3, 1, 6, −4, −1, 0, 0}; {1, −5, 1, −3, −5, −1, −1, 6, −5, 1, 0, 0}; and {4, 6, −4, 4, −3, 6, 0, 6, 6, 3, 0, 0};

sequences in the sequence set 8 comprise one or more of the following sequences:

{0, −3, −5, 2, −3, 1, −2, −1, −1, 2, 6, −4}; {−5, 3, 5, 0, 5, 1, −1, 6, −4, −2, 0, 0}; {0, −2, 6, 0, −1, 3, −4, 3, −5, 0, 0, 0}; {−3, 0, 5, 0, −5, −3, −5, 3, 0, −2, 0, 0}; {−2, 4, 4, 1, −2, 3, 4, −4, 1, −2, 0, 0}; {−3, 0, 5, 2, −5, 3, −1, −2, 2, 2, 0, 0}; {5, −3, −1, 1, −2, 5, 2, 3, 0, 4, 0, 0}; {1, 6, 0, −5, 4, −2, 0, 3, 3, 3, 0, 0}; {5, 0, 0, 5, −4, 3, 5, 1, −3, 0, 0, 0}; {0, 5, −4, −4, 1, 6, 1, −2, −3, 2, 0, 0}; {−3, −3, 5, −2, −1, −5, 1, 5, 3, −3, 0, 0}; {1, 6, 2, −4, −2, 0, −2, −1, 4, 3, 0, 0}; {−1, −4, 0, −4, −1, −1, 3, −5, −4, 4, 0, 0}; {3, 1, −4, −2, −4, 1, 6, −1, 0, −4, 0, 0}; {6, 0, 5, −3, 5, 5, 5, 3, −3, −4, 0, 0}; {−4, −1, 2, −4, 6, −2, −4, −5, −4, 3, 0, 0}; {6, 6, −2, −3, 4, −2, 5, −3, 3, 3, 0, 0}; {−3, 1, 1, 6, 3, −1, 4, 6, 3, 2, 0, 0}; {−5, 4, −1, 6, −3, 6, 5, 3, −5, −2, 0, 0}; {−4, 2, 6, 3, 4, 6, −1, 0, −3, 6, 0, 0}; {4, −2, 6, −3, −4, 6, 1, 0, 3, 6, 0, 0}; {−2, −5, 5, −4, 4, 6, 1, 6, −4, −4, 0, 0}; {4, −5, 4, −3, 2, 4, −2, −4, 4, 0, 0, 0}; {−4, −5, 0, −2, −4, −3, 3, 6, 2, −5, 0, 0}; {−4, 4, −1, 3, −2, 1, 3, 2, 4, 5, 0, 0}; {6, −1, 0, 6, 5, −4, 2, −3, 1, 0, 0, 0}; {−4, 2, −5, 2, −3, 6, 5, −2, 0, 2, 0, 0}; {0, 3, 1, 5, −2, 3, 4, −3, 5, 2, 0, 0}; {−5, 4, 5, −1, 6, −5, 1, 5, 5, −2, 0, 0}; and {0, −1, 3, 5, 4, −1, 4, 5, 0, 4, 0, 0};

sequences in the sequence set 9 comprise one or more of the following sequences:

{0, 4, 0, −2, 1, −2, −4, 1, 2, 0, 5, −5}; {1, 4, −1, 4, −3, −3, 0, −2, 6, 2, 0, 0}; {0, −5, −1, 4, 4, 0, 3, 1, −3, −3, 0, 0}; {1, 6, −3, −4, 2, 6, 2, −1, −2, 2, 0, 0}; {5, 3, 1, 5, 1, 3, −2, 5, 6, −3, 0, 0}; {2, −2, 3, −2, 4, 5, 2, 2, 5, 5, 0, 0}; {4, −5, 0, 4, 2, 6, 3, −4, 6, 4, 0, 0}; {3, −2, 5, −2, 0, −2, −3, 3, 3, −2, 0, 0}; {−1, 6, 3, 1, 6, −1, −2, 0, −5, −1, 0, 0}; {−1, 2, −4, 2, −4, 6, 1, 2, −2, −2, 0, 0}; {−5, 3, 2, 5, 3, 0, 4, −3, 5, −4, 0, 0}; {1, 0, −3, −4, 1, 5, −2, 5, −2, −3, 0, 0}; {−4, 0, 0, 6, 0, −5, −2, −4, −4, 5, 0, 0}; {6, 4, −3, 2, −2, 5, 5, −2, 0, 3, 0, 0}; {−4, 6, −2, −3, 1, −5, 0, 3, 6, 3, 0, 0}; {−4, 2, 1, −4, −2, 3, −3, 6, −2, 0, 0, 0}; {4, −2, 6, −3, −4, 6, 1, 0, 3, 6, 0, 0}; {6, −3, 6, −3, 3, 6, −5, −1, −5, 4, 0, 0}; {−5, 6, −3, −5, 3, −1, 2, −2, 3, 6, 0, 0}; {4, 0, 6, −5, 4, −5, −1, 4, 3, −2, 0, 0}; {−5, 2, 6, −5, −4, −2, 4, −3, 5, 3, 0, 0}; {−3, 1, 5, 0, −5, −3, −4, 3, 0, −2, 0, 0}; {0, 5, −5, −2, −1, −3, −4, 3, −3, 3, 0, 0}; {6, 3, 4, 0, 6, 4, −2, 4, 6, −2, 0, 0}; {−5, −4, 6, 3, 6, −1, 5, 5, −2, −5, 0, 0}; {−3, 2, −5, 0, −1, −3, −5, 5, −3, −4, 0, 0}; {4, 2, −5, 0, −3, 6, 0, 2, −4, 0, 0, 0}; {−1, 6, 5, 4, −2, 1, −2, 0, 1, −4, 0, 0}; {−4, 0, 5, 2, −3, −4, 4, −2, 1, 1, 0, 0}; and {−5, 6, 1, 0, 2, −1, 4, −1, 2, −5, 0, 0};

sequences in the sequence set 10 comprise one or more of the following sequences:

{6, 0, 6, 0, 4, −5, −4, 2, 0, −2, 0, 0}; {2, −4, 3, −5, −5, 5, −1, 0, 3, 4, 0, 0}; {−4, 0, 4, 3, −2, 3, −1, −2, −5, 0, 0, 0}; {0, 4, −2, 4, −3, −4, −1, −2, 6, 5, 0, 0}; {3, 0, 4, −2, 0, 6, 0, −3, −5, −3, 0, 0}; {−1, 0, 3, 4, −1, −5, 2, −5, 2, 3, 0, 0}; {−1, −1, 1, −4, 6, −3, 3, −2, −1, 5, 0, 0}; {−1, 6, −4, 2, −5, 3, 0, −4, −3, −2, 0, 0}; {6, 3, −1, 5, −1, 0, −1, 6, −3, 0, 0, 0}; {3, −2, 3, 2, −3, 2, 4, 5, −5, 1, 0, 0}; {−5, 0, 0, −5, 4, −3, −5, −1, 3, 0, 0, 0}; {3, −3, 5, 2, 2, −3, 1, −5, −3, −1, 0, 0}; {−2, −3, 2, −1, 3, 4, −3, 2, 5, 2, 0, 0}; {−2, 3, −4, 4, 5, 6, 1, 1, −3, −5, 0, 0}; {2, 1, −4, 2, 3, −3, 3, 6, 4, −2, 0, 0}; {−4, 0, 2, −3, 3, 0, 4, 6, 3, 1, 0, 0}; {0, 3, 1, 5, −2, 3, 4, −3, 5, 2, 0, 0}; {1, −2, −5, 0, 5, 0, 3, 2, 4, 6, 0, 0}; {−5, 3, −2, 1, −4, −1, 3, 3, −1, −2, 0, 0}; {−4, 3, −5, −1, −5, −4, 6, 4, −5, −5, 0, 0}; {−4, −1, 2, −4, 6, −2, −4, −5, −4, 3, 0, 0}; {2, −4, −4, −1, 2, −3, −4, 4, −1, 2, 0, 0}; {−1, −1, 4, −5, −4, 3, −2, 1, −3, 2, 0, 0}; {4, 0, −4, 2, 1, 4, −4, 3, 5, 0, 0, 0}; {4, −5, 4, −3, 2, 4, −2, −4, 4, 0, 0, 0}; {−2, −5, 0, −4, 6, 5, −4, −1, 5, −3, 0, 0}; {0, −4, −3, 4, −2, −5, 1, 6, −5, −1, 0, 0}; {−5, −1, −5, −2, 4, −1, −4, 4, 5, 6, 0, 0}; {−4, 3, −1, 0, 6, 6, −1, 3, −1, −1, 0, 0};and {−1, 1, 2, −2, 2, −1, 3, −3, 6, 5, 0, 0};

sequences in the sequence set 11 comprise one or more of the following sequences:

{6, 0, 6, 0, 4, −5, −4, 2, 0, −2, 0, 0}; {−2, 1, −4, −4, 4, −4, 3, −1, −4, −2, 0, 0}; {5, 2, 4, −1, 5, 6, 1, 5, 5, −3, 0, 0}; {3, 3, 0, 5, −5, 4, −3, 2, 1, 6, 0, 0}; {−5, 1, 6, 0, −4, 5, 5, −3, 0, 1, 0, 0}; {−1, 4, 2, −3, −4, 0, 6, −2, 2, 0, 0, 0}; {−4, 6, 1, 2, −4, 4, −3, −1, 2, −1, 0, 0}; {3, 6, −1, −2, 3, −5, 3, 1, −2, 2, 0, 0}; {0, 0, 1, 6, 3, −1, 4, 6, 1, 5, 0, 0}; {5, −1, 5, −2, 0, 0, −1, 0, −4, 6, 0, 0}; {−4, 1, 6, 1, −2, 6, 0, 2, 4, 3, 0, 0}; {−5, −5, −5, 2, 6, −2, 6, 4, −3, 6, 0, 0}; {1, −3, 1, 6, 6, −3, 1, 0, −2, 3, 0, 0}; {0, −3, −1, −5, 2, −3, −4, 3, −5, −2, 0, 0}; {−5, 2, −4, −2, 1, 3, −3, 5, 1, 1, 0, 0}; {0, 3, 1, 5, −2, 3, 4, −3, 5, 2, 0, 0}; {−1, 6, −2, 1, −3, −2, −5, 4, −5, −5, 0, 0}; {2, −2, −3, −5, 0, 5, −4, −4, 1, −3, 0, 0}; {1, −4, 2, 6, −4, 3, 1, 0, −2, −3, 0, 0}; {2, 4, −5, 1, 5, 0, −5, 5, 3, −1, 0, 0}; {−3, −1, 6, −3, 1, 0, 4, 2, −5, 3, 0, 0}; {3, −5, −4, −3, 3, −2, −5, 5, 0, 3, 0, 0}; {5, 4, 0, −5, 3, −4, 2, 5, −4, 0, 0, 0}; {−1, 0, 6, −3, 6, −2, 6, −1, −4, 6, 0, 0}; {3, −3, −1, 5, 5, 1, 5, 1, −3, −1, 0, 0}; {4, 1, 6, 5, −3, 5, −2, 2, 5, 2, 0, 0}; {0, 0, −5, −1, 6, −4, 1, −3, 6, −1, 0, 0}; {−2, −4, 6, 0, 5, −3, −5, 3, −4, −1, 0, 0}; {2, −2, 3, −1, 6, 5, 1, 2, −4, −1, 0, 0}; and {−3, 1, −3, 6, −4, 6, 5, −1, −5, −4, 0, 0};

sequences in the sequence set 12 comprise one or more of the following sequences:

{0, 0, 11, 6, 7, 7, 10, 4, 9, 9, 3, 10}; {0, 0, 7, 4, 9, 6, 3, 3, 4, 9, 3, 6}; {0, 0, 2, 5, 1, 2, 10, 10, 6, 1, 7, 4}; {0, 0, 1, 3, 3, 9, 6, 2, 4, 11, 2, 9}; {0, 0, 10, 0, 7, 11, 7, 4, 11, 11, 2, 5}; {0, 0, 7, 8, 10, 9, 11, 2, 9, 1, 8, 4}; {0, 0, 11, 8, 9, 3, 9, 0, 9, 2, 1, 6}; {0, 0, 11, 4, 1, 0, 7, 1, 6, 6, 10, 2}; {0, 0, 4, 8, 8, 3, 9, 0, 7, 1, 10, 10}; {0, 0, 10, 11, 2, 7, 8, 2, 10, 2, 8, 4}; {0, 0, 3, 1, 11, 6, 7, 1, 4, 11, 7, 11}; {0, 0, 6, 6, 1, 3, 4, 4, 5, 0, 6, 0}; {0, 0, 8, 4, 4, 9, 3, 0, 5, 11, 2, 2}; {0, 0, 5, 4, 2, 0, 2, 0, 7, 1, 6, 9}; {0, 0, 1, 4, 7, 3, 1, 3, 9, 3, 0, 9}; {0, 0, 8, 6, 9, 3, 11, 3, 4, 0, 4, 5}; {0, 0, 0, 0, 3, 6, 0, 10, 6, 3, 8, 1}; {0, 0, 3, 1, 10, 11, 8, 2, 6, 1, 2, 7}; {0, 0, 3, 7, 1, 4, 7, 6, 4, 0, 5, 2}; {0, 0, 8, 5, 7, 10, 2, 10, 0, 11, 4, 11}; {0, 0, 3, 6, 10, 8, 8, 3, 11, 9, 0, 8}; {0, 0, 3, 0, 9, 4, 3, 3, 9, 1, 8, 0}; {0, 0, 2, 5, 3, 1, 5, 0, 0, 9, 3, 8}; {0, 0, 6, 5, 3, 5, 1, 5, 1, 8, 1, 2}; {0, 0, 11, 6, 5, 0, 8, 1, 0, 4, 10, 1}; {0, 0, 7, 7, 11, 8, 7, 1, 7, 0, 9, 0}; {0, 0, 11, 9, 4, 4, 6, 9, 5, 11, 4, 7}; {0, 0, 9, 1, 3, 9, 9, 9, 3, 0, 5, 0}; {0, 0, 6, 8, 1, 3, 1, 4, 9, 5, 11, 8}; and {0, 0, 7, 8, 8, 6, 2, 9, 6, 10, 3, 9};

sequences in the sequence set 13 comprise one or more of the following sequences:

{0, 0, 0, 5, 3, 2, 11, 4, 10, 10, 3, 8}; {0, 0, 8, 7, 6, 8, 11, 2, 8, 3, 11, 4}; {0, 0, 11, 8, 5, 9, 11, 9, 3, 9, 0, 3}; {0, 0, 3, 5, 8, 4, 2, 11, 4, 0, 3, 11}; {0, 0, 4, 7, 7, 1, 7, 10, 5, 10, 8, 7}; {0, 0, 4, 0, 1, 6, 11, 4, 2, 4, 11, 9}; {0, 0, 0, 3, 6, 1, 0, 1, 7, 1, 9, 6}; {0, 0, 2, 3, 10, 7, 11, 7, 6, 0, 3, 9}; {0, 0, 9, 10, 4, 9, 3, 11, 5, 5, 9, 9}; {0, 0, 0, 3, 9, 10, 8, 2, 6, 2, 11, 6}; {0, 0, 4, 1, 11, 7, 8, 1, 5, 0, 8, 11}; {0, 0, 1, 0, 4, 0, 8, 8, 3, 3, 8, 0}; {0, 0, 7, 6, 7, 7, 4, 10, 8, 1, 6, 11}; {0, 0, 2, 7, 1, 3, 10, 10, 6, 2, 7, 5}; {0, 0, 11, 7, 0, 10, 3, 6, 8, 3, 9, 11}; {0, 0, 7, 8, 11, 10, 11, 2, 8, 2, 8, 4}; {0, 0, 1, 0, 7, 11, 11, 7, 4, 0, 3, 8}; {0, 0, 11, 5, 6, 1, 1, 5, 3, 11, 5, 11}; {0, 0, 11, 3, 0, 4, 0, 8, 8, 1, 4, 8}; {0, 0, 0, 7, 8, 8, 0, 7, 0, 0, 7, 1}; {0, 0, 7, 7, 4, 6, 7, 6, 11, 7, 2, 7}; {0, 0, 1, 0, 5, 10, 4, 8, 7, 2, 1, 8}; {0, 0, 11, 8, 6, 1, 9, 2, 1, 5, 10, 2}; {0, 0, 5, 5, 1, 3, 8, 0, 7, 2, 7, 5}; {0, 0, 0, 10, 6, 8, 2, 1, 6, 6, 1, 7}; {0, 0, 2, 6, 4, 5, 1, 3, 9, 3, 1, 8}; {0, 0, 10, 8, 6, 1, 6, 9, 4, 9, 8, 0}; {0, 0, 2, 5, 9, 7, 6, 3, 6, 1, 8, 5}; {0, 0, 0, 11, 8, 0, 5, 0, 2, 7, 6, 0}; and {0, 0, 4, 3, 11, 9, 8, 10, 7, 2, 7, 0}; and sequences in the sequence set 14 comprise one or more of sequences in a union set of the sequences in the first sequence set and the following sequences:

{0, 0, 8, 7, 6, 0, 6, 4, 9, 5, 7, 10}; {0, 5, 6, 0, 7, 0, 11, 1, 4, 2, 0, 0}; {0, 7, 2, 0, 9, 10, 7, 10, 1, 2, 5, 10}; {0, 2, 0, 1, 0, 4, 7, 9, 3, 2, 11, 6}; {0, 10, 8, 5, 6, 0, 4, 6, 5, 9, 6, 11}; {0, 4, 4, 4, 10, 9, 9, 5, 9, 8, 4, 8}; {0, 9, 8, 1, 11, 11, 1, 6, 10, 7, 1, 5}; {0, 1, 3, 2, 11, 11, 5, 6, 0, 6, 0, 9}; {0, 7, 3, 1, 7, 8, 10, 3, 0, 2, 11, 1}; {0, 11, 1, 2, 3, 10, 8, 3, 8, 2, 4, 0}; {0, 10, 1, 10, 3, 10, 8, 7, 1, 3, 8, 11}; {0, 3, 10, 7, 5, 1, 5, 10, 1, 1, 3, 1}; {0, 3, 9, 11, 9, 7, 5, 10, 8, 0, 10, 1}; {0, 1, 3, 5, 2, 1, 2, 9, 2, 9, 9, 4}; {0, 7, 2, 2, 7, 2, 5, 5, 8, 2, 2, 1}; {0, 9, 0, 7, 9, 8, 0, 3, 4, 0, 6, 5}; {0, 7, 2, 6, 4, 1, 9, 10, 5, 7, 8, 9}; {0, 5, 11, 10, 1, 8, 7, 6, 0, 11, 10, 2}; {0, 11, 1, 3, 2, 1, 8, 10, 3, 8, 5, 0}; {0, 5, 11, 3, 2, 8, 3, 4, 6, 5, 1, 0}; {0, 6, 8, 0, 8, 7, 0, 10, 0, 7, 5, 7}; {0, 3, 1, 6, 4, 8, 5, 3, 2, 8, 0, 3}; {0, 1, 0, 9, 6, 1, 3, 9, 3, 9, 9, 0}; {0, 3, 0, 2, 7, 11, 11, 2, 10, 6, 3, 3}; {0, 5, 8, 8, 9, 7, 9, 4, 1, 10, 6, 10}; {0, 6, 7, 6, 0, 1, 10, 1, 1, 9, 1, 11}; {0, 10, 6, 6, 2, 4, 5, 11, 4, 1, 4, 5}; {0, 6, 4, 2, 9, 10, 9, 11, 7, 9, 10, 3}; {0, 9, 2, 2, 1, 9, 10, 0, 4, 5, 0, 5}; {0, 3, 11, 8, 3, 4, 9, 11, 0, 11, 1, 8}; {0, 5, 10, 3, 7, 4, 2, 3, 11, 9, 2, 1}; {0, 11, 8, 0, 9, 7, 11, 1, 0, 5, 8, 3}; {0, 4, 9, 2, 1, 5, 4, 8, 6, 4, 2, 1}; {0, 1, 10, 9, 11, 11, 4, 2, 9, 4, 7, 1}; {0, 1, 0, 11, 1, 6, 6, 0, 0, 7, 2, 8}; {0, 6, 1, 9, 3, 4, 10, 11, 6, 6, 5, 7}; {0, 3, 11, 2, 7, 9, 9, 11, 8, 4, 0, 10}; {0, 8, 4, 10, 7, 11, 1, 0, 5, 7, 3, 4}; {0, 1, 5, 6, 5, 5, 2, 5, 11, 5, 2, 9}; {0, 9, 6, 7, 2, 10, 3, 5, 8, 5, 6, 8}; {0, 11, 0, 11, 9, 1, 5, 5, 10, 0, 7, 2}; {0, 0, 0, 7, 8, 9, 1, 7, 0, 0, 8, 2}; {0, 0, 9, 10, 0, 5, 4, 11, 7, 11, 4, 11}; {0, 1, 5, 2, 7, 6, 0, 6, 8, 6, 3, 4}; {0, 7, 4, 9, 2, 3, 10, 8, 9, 11, 10, 10}; {0, 8, 10, 5, 10, 6, 4, 11, 1, 3, 5, 5}; {0, 0, 10, 4, 4, 2, 4, 9, 1, 0, 5, 11}; {0, 7, 11, 2, 11, 10, 10, 4, 3, 6, 5, 11}; {0, 10, 11, 1, 9, 3, 8, 7, 1, 3, 9, 8}; {0, 8, 3, 5, 10, 10, 1, 5, 2, 2, 4, 1}; {0, 4, 0, 10, 1, 10, 8, 1, 2, 0, 5, 7}; {0, 7, 4, 2, 11, 1, 6, 9, 9, 0, 9, 0}; {0, 1, 9, 11, 3, 2, 4, 8, 4, 11, 7, 2}; {0, 10, 10, 7, 3, 8, 6, 9, 11, 5, 10, 0}; {0, 6, 3, 9, 9, 11, 11, 9, 9, 3, 6, 0}; {0, 10, 8, 7, 0, 11, 7, 10, 0, 5, 1, 5}; {0, 7, 2, 6, 6, 1, 9, 11, 2, 1, 10, 11}; {0, 10, 4, 2, 8, 9, 8, 8, 8, 2, 7, 11}; {0, 0, 8, 7, 8, 11, 4, 10, 2, 0, 6, 2}; {0, 10, 6, 6, 11, 2, 7, 2, 7, 5, 7, 7}; {0, 5, 3, 8, 5, 8, 0, 5, 7, 5, 3, 2}; {0, 10, 9, 8, 1, 11, 4, 1, 6, 9, 1, 6}; {0, 0, 0, 11, 3, 8, 2, 7, 5, 0, 11, 5}; {0, 1, 1, 4, 2, 8, 3, 0, 1, 8, 10, 4}; {0, 9, 7, 2, 9, 1, 10, 11, 11, 2, 6, 8}; {0, 10, 7, 10, 6, 3, 9, 1, 4, 2, 5, 7}; {0, 6, 11, 6, 1, 0, 5, 6, 9, 9, 7, 7}; {0, 3, 1, 3, 4, 6, 0, 3, 0, 9, 7, 2}; {0, 4, 2, 6, 6, 0, 4, 7, 3, 2, 1, 10}; {0, 11, 6, 2, 1, 11, 1, 8, 1, 6, 6, 9}; {0, 1, 0, 11, 5, 5, 11, 0, 5, 0, 7, 0}; {0, 4, 7, 9, 1, 9, 1, 10, 2, 0, 10, 7}; {0, 2, 6, 8, 9, 4, 11, 2, 10, 3, 1, 11}; {0, 0, 11, 6, 7, 7, 10, 4, 9, 9, 3, 10}; {0, 8, 4, 0, 4, 11, 1, 9, 10, 10, 0, 3}; {0, 4, 10, 4, 8, 8, 1, 0, 5, 3, 1, 1}; {0, 0, 8, 1, 2, 10, 4, 8, 6, 0, 3, 3}; {0, 3, 6, 3, 6, 10, 7, 3, 7, 5, 2, 3}; {0, 5, 7, 11, 7, 2, 3, 2, 7, 4, 5, 4}; {0, 0, 4, 7, 11, 7, 6, 3, 9, 6, 9, 6}; {0, 3, 6, 9, 3, 2, 11, 6, 9, 7, 9, 7}; {0, 8, 4, 5, 0, 7, 0, 1, 4, 0, 2, 3}; {0, 10, 3, 0, 4, 5, 10, 3, 5, 2, 11, 0}; {0, 0, 4, 3, 9, 5, 3, 4, 0, 3, 9, 1}; {0, 6, 1, 3, 3, 8, 3, 4, 6, 4, 0, 0}; {0, 3, 11, 2, 6, 7, 6, 4, 3, 9, 6, 2}; {0, 1, 2, 10, 9, 3, 1, 11, 3, 8, 3, 8}; {0, 3, 2, 2, 9, 7, 6, 1, 5, 5, 10, 4}; {0, 4, 5, 7, 2, 9, 6, 6, 1, 5, 2, 2}; {0, 6, 0, 1, 8, 3, 1, 1, 1, 7, 8, 9}; {0, 10, 8, 8, 7, 0, 10, 3, 0, 4, 8, 1}; {0, 4, 8, 10, 4, 3, 0, 8, 10, 8, 11, 9}; {0, 10, 10, 8, 6, 9, 0, 11, 3, 4, 10, 4}; {0, 10, 6, 2, 6, 3, 5, 2, 6, 9, 1, 3}; {0, 9, 7, 5, 10, 7, 11, 8, 11, 1, 5, 9}; {0, 8, 4, 7, 1, 2, 7, 0, 11, 11, 1, 1}; {0, 11, 10, 4, 5, 5, 7, 1, 6, 5, 11, 5}; {0, 8, 7, 6, 1, 10, 2, 1, 3, 5, 11, 3}; {0, 8, 3, 6, 4, 0, 11, 1, 2, 10, 1, 4}; {0, 9, 1, 10, 4, 1, 1, 10, 1, 4, 8, 9}; {0, 7, 0, 5, 10, 10, 4, 3, 10, 10, 11, 10}; {0, 11, 3, 3, 6, 3, 2, 1, 9, 2, 6, 11}; {0, 11, 10, 8, 9, 0, 0, 5, 4, 10, 4, 9}; {0, 1, 11, 1, 3, 9, 9, 4, 2, 6, 0, 8}; {0, 8, 2, 10, 7, 10, 1, 8, 10, 3, 3, 3}; {0, 7, 2, 10, 2, 2, 3, 6, 1, 2, 10, 10}; {0, 1, 10, 10, 1, 3, 0, 7, 7, 0, 7, 2}; {0, 1, 8, 9, 6, 9, 10, 10, 3, 11, 7, 1}; {0, 8, 4, 5, 11, 6, 11, 0, 2, 10, 11, 0}; {0, 5, 5, 6, 10, 1, 8, 8, 6, 5, 9, 5}; {0, 8, 9, 5, 4, 10, 5, 2, 5, 5, 6, 9}; {0, 7, 5, 2, 11, 2, 7, 10, 11, 1, 11, 2}; {0, 3, 6, 11, 0, 8, 6, 5, 8, 5, 10, 7}; {0, 2, 4, 0, 4, 2, 7, 1, 11, 10, 6, 5}; {0, 10, 8, 5, 5, 10, 2, 4, 2, 6, 3, 7}; {0, 8, 7, 3, 0, 1, 3, 0, 3, 2, 7, 0}; {0, 9, 6, 5, 9, 6, 1, 3, 4, 8, 3, 6}; {0, 10, 10, 5, 1, 6, 4, 3, 7, 0, 3, 5}; {0, 11, 10, 7, 11, 10, 11, 5, 0, 4, 5, 10}; and

{0, 3, 4, 9, 6, 9, 10, 5, 11, 9, 9, 6}.--.

Starting at Column 168, Line 28 through Column 174, Line 65, please replace Claim 11 with the following:

--11. A sequence-based signal processing method, wherein the signal processing method comprises:

receiving a first signal carried on N subcarriers, and obtaining N elements in a sequence $\{f_n\}$, wherein $f_n$ is an element in the sequence $\{f_n\}$, which is a sequence that meets a preset condition, the preset condition being $f_n = A \cdot x_n \cdot e^{2\pi \cdot j \cdot a \cdot n}$, which is a value of n ranges from 0 to N–1, wherein A is a non-zero complex number, $a$ is a real number, $j = \sqrt{-1}$, and for an element $x_n$, $x_n = u \cdot e^{2\pi \cdot j \cdot s_n / M}$, wherein M=12, u is a non-zero complex number, and a set that consists of a sequence $\{s_n\}$ consisting of an element $s_n$ comprises at least one of sequences in a first sequence set or at least one of equivalent sequences of the sequences in the first sequence set, wherein the sequences in the first sequence set comprise one or more of the following sequences:

{−2, 4, −2, 4, 0, 2, 2, 0, 5, 5, 0, 0}; {−1, 6, 1, −4, −2, 4, −5, −5, 6, −5, 0, 0}; {3, −3, 3, −3, 0, −2, −2, 0, −5, −5, 0, 0}; {2, −4, 2, −4, −1, −2, −2, −1, −5, 6, 0, 0}; {−4, 2, −4, 3, −1, 1, 2, 1, 4, 5, 0, 0}; {0, 6, 0, −5, −2, −4, −3, −1, 6, 6, 0, 0}; {0, 6, 0, −5, −2, −3, −3, −1, 6, 6, 0, 0}; {−1, 5, −1, 6, −2, −3, −3, −1, 5, 5, 0, 0}; {−4, 2, −4, 4, −4, −5, −4, −2, 5, 5, 0, 0}; {−5, 1, −5, 3, −5, 6, −5, −3, 5, 5, 0, 0}; {4, −2, 4, 0, −4, −1, 0, −1, 3, 4, 0, 0}; {0, 4, −4, 2, −3, −2, −3, 4, 1, −2, 0, 0}; {−1, 3, −5, 1, −4, −3, −3, 4, 1, −2, 0, 0}; {0, 5, −2, 5, 2, 4, 3, 1, −3, −4, 0, 0}; {−3, 1, 5, −1, −5, −4, −5, 3, 0, −3, 0, 0}; {3, −3, 3, −1, 0, 6, −3, −3, −5, −4, 0, 0}; {1, 6, −1, 6, 6, 0, 2, 0, −3, −1, 0, 0}; {5, −2, 3, −2, 0, −1, 0, 0, −5, 6, 0, 0}; {−3, 3, −3, 5, −4, −4, −4, −2, 5, 5, 0, 0}; {−3, 0, 3, −3, 3, 1, 3, −5, 4, 1, 0, 0}; {−1, 4, −3, 5, 4, −2, 1, 0, −3, −2, 0, 0}; {3, −1, −5, −5, 1, −4, 0, 1, 4, −1, 0, 0}; {2, −2, 6, 6, 1, −5, 0, 1, 4, −1, 0, 0}; {0, −5, 2, 2, −5, 1, 4, 4, 6, 1, 0, 0}; {1, −3, 5, 6, 0, −5, −1, 1, 3, −1, 0, 0}; {−3, 4, −1, −1, 5, −1, 3, 4, 5, 0, 0, 0}; {−5, 1, −5, 6, −1, 4, −5, −5, −5, 1, 0, 0}; {−2, 5, 0, 0, 6, 0, 3, 4, 5, 0, 0, 0}; {−5, 1, −5, 6, −1, 5, −5, 6, −5, 1, 0, 0}; {3, −3, 3, 3, −4, 2, 5, 5, 6, 0, 0, 0}; {−3, 3, −3, −3, 4, −2, −5, −5, 6, 0, 0, 0}; {4, −3, 2, 2, −4, 1, −2, −3, −5, 0, 0, 0}; {5, −1, 5, 6, 1, −5, 5, 6, 5, −1, 0, 0}; {5, −1, 5, 6, 1, −4, 5, 5, 5, −1, 0, 0}; {3, −4, 1, 1, −5, 1, −3, −4, −5, 0, 0, 0}; {−1, 3, −5, 6, 0, 5, 1, −1, −3, 1, 0, 0}; {0, 5, −2, −2, 5, −1, −4, −4, 6, −1, 0, 0}; {−2, 2, 6, 6, −1, 5, 0, −1, −4, 1, 0, 0}; {−2, 2, 6, 6, 0, 5, 1, −1, −3, 1, 0, 0}; {−3, 1, 5, 5, −1, 4, 0, −2, −4, 1, 0, 0}; {−3, 1, 5, 5, −1, 4, 0, −1, −4, 1, 0, 0}; {−2, 3, −4, −3, 4, −2, −5, −5, 6, −1, 0, 0}; {3, 0, −3, 3, −3, −1, −3, 5, −4, −1, 0, 0}; {4, −2, 4, −4, 4, 5, 4, 2, −5, −5, 0, 0}; {−5, 2, −3, 2, 0, 1, 0, 0, 5, 6, 0, 0}; {−1, 5, −1, 3, 5, 1, 1, 6, 5, −1, 0, 0}; {0, −5, 2, −5, −2, −4, −3, −1, 3, 4, 0, 0}; {4, −2, 4, −3, 6, 6, 4, 3, −5, −5, 0, 0}; {2, −4, 2, −5, 4, 5, 3, 2, −5, −5, 0, 0}; {−3, 3, −3, 2, 0, −5, 4, 3, −1, 0, 0, 0}; {0, 6, 0, 5, 3, 4, 3, 1, 6, 6, 0, 0}; {6, 0, 6, −1, 2, 0, −1, 0, −4, −5, 0, 0}; {−4, 4, 1, −4, −4, 0, 4, 0, 3, −1, 0, 0}; {−1, 5, 0, 5, 3, 3, 2, 1, 6, −5, 0, 0}; {−3, 2, −4, 0, −2, −4, −5, 4, −4, −4, 0, 0}; {−1, 6, 2, −4, −2, −3, 4, −5, −1, 2, 0, 0}; {5, −2, 4, −3, 5, 6, 5, 3, −5, −5, 0, 0}; {−1, 5, 0, 6, −3, −4, −4, −2, 6, 6, 0, 0}; {−5, 1, −4, 3, −5, 6, −5, −3, 5, 5, 0, 0}; {5, −3, 2, −5, −3, 6, 3, −4, 6, 0, 0, 0}; {3, −5, 0, 5, −4, 5, 2, −5, 5, 0, 0, 0}; {0, 5, −1, 5, 5, −2, −2, 2, 2, 2, 0, 0}; {−5, 0, 6, 0, 2, 0, 0, 1, −4, −5, 0, 0}; {−4, 1, −5, 3, −5, 6, −4, −3, 5, 5, 0, 0}; {−3, 1, 6, 1, −5, −4, −4, 3, 1, −2, 0, 0}; {6, −3, 1, −5, 1, 0, 1, 6, 3, 0, 0, 0}; {−5, −1, 4, 0, 3, −3, −4, 2, 0, −2, 0, 0}; {5, 0, −4, −4, 2, −3, 1, 2, 4, −1, 0, 0}; {3, −2, 6, 6, 1, −4, 0, 1, 4, −1, 0, 0}; {−1, 5, 0, 0, 5, 0, 4, 4, 5, 0, 0, 0}; {5, −1, 6, 6, −1, −2, 4, 6, 2, 0, 0, 0}; {−1, 5, 0, 0, 6, 0, 3, 4, 5, 0, 0, 0}; {−1, 4, −2, −2, 4, −1, −4, −4, 6, −1, 0, 0}; {−5, −1, 4, 3, −3, 3, −1, −2, −4, 0, 0, 0}; {−3, 1, 6, 5, −1, 4, 0, −2, −3, 1, 0, 0}; {−2, 3, −3, −3, 4, −2, −5, −5, 6, −1, 0, 0}; {−5, −1, 4, 3, −2, 3, −1, −2, −4, 0, 0, 0}; {−4, 1, −5, −5, 3, −3, 6, 6, 6, −1, 0, 0}; {6, −2, 3, 2, −3, 2, −1, −3, −4, 0, 0, 0}; {3, 6, −2, −3, 3, −5, 3, 1, −2, 2, 0, 0}; {−5, −1, 4, 4, −3, 3, −1, −2, −4, 1, 0, 0}; {6, −2, 3, 3, −3, 3, −1, −2, −4, 0, 0, 0}; {5, −3, 2, 2, −4, 2, −2, −3, −5, 0, 0, 0}; {5, 1, −2, 4, −2, 0, −3, 6, −4, −1, 0, 0}; {3, −2, 6, −1, 4, 5, 1, −2, −2, 0, 0, 0}; {5, −1, −5, −1, 1, 3, −3, 3, 3, 1, 0, 0}; {4, 1, 0, −5, 1, 6, 2, 2, 5, −3, 0, 0}; {3, −1, −3, 3, −3, −1, 6, −4, −5, −1, 0, 0}; {1, −3, −5, 1, −5, −2, 6, −5, 6, −3, 0, 0}; {2, −5, 2, −5, 4, 5, 3, 2, −5, −5, 0, 0}; {−1, 3, −3, 1, 0, 4, 1, −5, 6, 2, 0, 0}; {−2, 2, −4, 0, −1, 3, 1, 6, 5, 3, 0, 0}; {5, −1, −5, 2, −5, −1, 3, 5, 4, 4, 0, 0}; {5, −1, −5, 2, −5, −1, 3, 6, 5, 4, 0, 0}; {0, 4, −2, 3, 6, 4, 0, 6, 4, 0, 0, 0}; {−3, 3, −1, 6, −5, −2, −4, −2, 3, 3, 0, 0}; {−4, −1, 4, −3, −1, −5, 3, −4, 5, 0, 0, 0}; {−5, −2, 3, −4, −2, −5, 4, −4, 6, 0, 0, 0}; {0, 4, −2, 4, −2, −3, −1, −1, 4, 3, 0, 0}; {6, −3, 2, −5, 4, −5, −5, −3, 6, 3, 0, 0}; {6, −2, 4, −2, −4, 1, 0, 4, 4, 2, 0, 0}; {6, −2, 4, −2, −3, 2, 1, 5, 4, 2, 0, 0}; {4, −3, 4, 0, 0, 6, −5, −1, 1, −1, 0, 0}; {−1, 2, −5, 1, 0, 4, 3, 6, 5, 3, 0, 0}; {3, 5, −3, 2, 3, −1, 6, −1, −5, 1, 0, 0}; {−2, 1, 6, 0, −5, −4, −2, −2, 4, 2, 0, 0}; {−3, 2, −3, 6, −3, 3, 4, −1, −2, −3, 0, 0}; {1, 3, −5, 1, 2, −3, 4, −3, 5, 0, 0, 0}; {0, 2, 6, 0, 1, −3, 4, −3, 5, 0, 0, 0}; {−3, −1, 3, −2, 6, −2, −5, −3, −5, 5, 0, 0}; {0, 3, −4, −5, 1, 6, 1, 0, −3, 1, 0, 0}; {−4, 3, 0, 4, −4, −3, 4, 0, 0, −1, 0, 0}; {−4, 4, 2, −5, 0, 3, −2, −5, −2, 0, 0, 0}; {−5, 3, 1, 6, −1, 2, −2, −5, −2, 0, 0, 0}; {5, 1, 0, 5, −2, 2, −3, 6, −2, 0, 0, 0}; {−4, 4, 3, −3, 3, −5, 4, 5, 5, −4, 0, 0}; {4, −1, −3, 3, −3, −1, −5, −4, 6, −2, 0, 0}; {−1, 5, 2, −4, −4, 1, 5, −1, 1, 0, 0, 0}; {−3, 3, 0, 6, −5, −1, −5, −2, 3, 2, 0, 0}; {2, 6, 1, 6, 6, −1, −2, 4, 3, 1, 0, 0}; {−1, 2, −4, 0, 0, 4, 2, −5, 5, 2, 0, 0}; {−2, 4, 1, −4, 3, −5, −1, 4, 4, 3, 0, 0}; {−5, −1, 6, −1, −3, 1, 2, −5, 4, 2, 0, 0}; {4, −4, 3, −4, −5, 0, −1, 4, 4, 1, 0, 0}; {4, −4, 3, −4, −5, 0, −1, 4, 4, 2, 0, 0}; {2, 5, −1, 3, 1, 5, 3, −4, 6, 3, 0, 0}; {1, 4, −2, 3, 1, 5, 3, −5, 6, 3, 0, 0}; {3, −4, 4, −1, −1, 5, 6, −1, 1, −1, 0, 0}; {−2, 1, −5, 0, −1, 3, 2, 6, 5, 3, 0, 0}; {−2, 4, 1, −3, 3, −5, 0, 3, 3, 3, 0, 0}; {6, −2, 5, −1, 5, 5, −4, −4, 5, 5, 0, 0}; {5, −3, 4, −2, 5, 5, −5, −4, 5, 5, 0, 0}; {5, −2, 6, 1, 0, 6, −5, 0, 2, 0, 0, 0}; {1, 4, −2, 3, 0, 4, 4, −4, 6, 3, 0, 0}; {0, 2, −5, 0, 1, −3, 4, −3, 5, 0, 0, 0}; {−2, 0, 5, −2, 0, −4, 4, −3, 6, 0, 0, 0}; {5, −5, 0, 6, 3,

−5, 5, −4, 6, 5, 0, 0}; {−5, −2, 4, −1, 5, −4, −5, 3, 0, −2, 0, 0}; {−3, −1, 4, 2, 4, −1, 6, 1, 0, 4, 0, 0}; {5, −5, 1, −1, 2, −3, 4, −1, −1, 3, 0, 0}; {−2, −5, −4, 2, −3, 2, 0, 2, 3, −5, 0, 0}; {0, −5, 6, −1, 3, 6, 1, −3, −1, −1, 0, 0}; {5, 0, −1, 5, 5, −3, 3, −2, 1, 0, 0, 0}; {1, −4, −5, 1, 3, −5, 1, −3, 0, −1, 0, 0}; {−5, 2, 1, −5, −2, 3, −3, 6, −2, 0, 0, 0}; {0, 6, 4, −2, −4, 1, 5, −1, 1, 1, 0, 0}; {−1, 4, 1, −5, −3, 3, 4, −1, 0, −2, 0, 0}; {−2, 4, 2, −3, 1, 5, 4, 5, −1, 2, 0, 0}; {−3, −1, 5, −2, −1, −5, 3, −4, 5, −1, 0, 0}; {−5, −3, 3, −4, −2, 6, 1, −5, 4, −1, 0, 0}; {6, −5, 0, 4, 5, 0, −5, −1, −5, 1, 0, 0}; {0, 4, 0, −5, −1, 4, 5, 1, −1, −3, 0, 0}; {2, −3, −3, 3, 5, 1, −4, 1, −2, −1, 0, 0}; {−3, 3, 2, −4, −3, 5, −1, 3, 0, 0, 0, 0}; {−4, 2, 1, −5, −4, 4, −2, 2, 0, 0, 0, 0}; {−3, −1, 6, −4, 6, −2, 5, −1, −4, 5, 0, 0}; {1, −4, −4, 3, 2, 6, 0, −3, 0, −1, 0, 0}; {−1, 5, 4, −2, −4, 0, 5, 0, 2, 1, 0, 0}; {0, −5, −5, 2, 1, 6, 0, −4, −1, −1, 0, 0}; {−1, 6, 6, 1, 1, 6, 0, −4, −1, −1, 0, 0}; {−4, 2, 1, −5, 6, −1, 3, −2, 1, 0, 0, 0}; {−3, 4, 4, −1, −1, 5, −2, 6, −2, −2, 0, 0}; {−4, 3, 3, −2, −2, 4, −2, 6, −2, −1, 0, 0}; {−4, 3, 3, −2, −1, 4, −2, −5, −1, −1, 0, 0}; {−5, 1, 0, 6, 6, −2, 4, −1, 1, 0, 0, 0}; {−4, 3, 3, −2, −1, 4, −1, −5, −1, −1, 0, 0}; {3, 5, 0, 3, −4, 4, 2, −5, 5, −1, 0, 0}; {−3, 3, 2, −3, 6, −3, 3, 0, 1, −1, 0, 0}; {1, 4, 0, −5, −1, 4, 5, 1, −1, −4, 0, 0}; {−3, −2, 4, −2, −1, −5, 2, −5, 4, −1, 0, 0}; {−4, 2, 2, −5, −3, 4, −2, 3, 0, 0, 0, 0}; {5, −3, −5, −1, −3, 4, −4, −3, 5, 4, 0, 0}; {−5, 3, 5, 1, 3, −4, 4, 3, −5, −4, 0, 0}; {6, 0, 0, 6, −5, 3, −2, 2, −1, 0, 0, 0}; {6, 0, 0, 6, −5, 3, −2, 3, −1, 0, 0, 0}; {−4, 2, 2, −4, 6, −2, 4, −1, 1, 1, 0, 0}; {−5, 1, 1, −5, 5, −3, 3, −2, 1, 1, 0, 0}; {6, 0, 0, 6, 5, −3, 2, −2, 1, 0, 0, 0}; {6, 0, 0, 6, 5, −3, 3, −2, 1, 0, 0, 0}; {4, −2, −2, 5, 3, −4, 2, −3, 0, 0, 0, 0}; {6, 3, −5, 2, −4, 6, 5, 3, 6, −5, 0, 0}; {−3, −5, 0, −3, 4, −4, −2, 5, −5, 1, 0, 0}; {−4, 3, 5, −1, −5, 2, 6, −5, 0, 0, 0, 0}; {4, −2, −1, 5, 4, −4, 2, −2, 0, 0, 0, 0}; {−1, 4, 4, −3, −2, 6, 0, 3, 0, 1, 0, 0}; {0, −5, −3, 4, −4, 5, 1, −5, −5, −2, 0, 0}; {5, −2, −2, 3, 0, 4, −4, 3, 1, 2, 0, 0}; {0, 6, −5, 2, 0, 5, 0, −4, −1, 0, 0, 0}; {−2, 3, 3, −3, −5, −1, 4, −1, 2, 1, 0, 0}; {3, −4, −4, 2, −2, 1, −5, 3, 1, 1, 0, 0}; {2, −4, −3, 4, 1, 6, 1, −3, −1, 0, 0, 0}; {0, 4, 3, −4, 3, 6, −1, 6, 4, 2, 0, 0}; {−5, 5, −1, 1, −2, 3, −4, 1, 1, −3, 0, 0}; {−1, −3, 3, −4, 6, 3, −2, 0, −5, −1, 0, 0}; {−4, 4, −4, 1, −5, −4, 6, 4, −5, −5, 0, 0}; {6, 5, 0, −4, −5, 0, 5, 1, 5, −1, 0, 0}; {5, 3, −3, 4, 2, 6, −1, 5, −4, 1, 0, 0}; {3, 1, −5, 2, 1, 5, −3, 4, −5, 1, 0, 0}; {4, −1, 2, −5, 0, −1, −3, −5, −4, −3, 0, 0}; {3, −2, 1, −5, 1, −2, −4, 6, −5, −3, 0, 0}; {−4, 1, 2, −5, −4, 4, −2, 5, 0, 1, 0, 0}; {2, −4, −2, 4, 0, 5, −3, −3, 1, −1, 0, 0}; {5, −2, −1, 5, 2, −3, 3, 6, 2, 0, 0, 0}; {2, 5, 4, −2, 3, −2, 0, −2, −3, 5, 0, 0}; {−5, −1, 0, −5, 2, −2, 3, 6, 2, 0, 0, 0}; {3, 1, −4, −2, −4, 1, 6, −1, 0, −4, 0, 0}; {2, −1, 5, −2, −5, 5, 0, 1, −4, −1, 0, 0}; {2, 0, −5, 2, 0, 4, −4, 3, 6, 0, 0, 0}; {0, −2, 5, 0, −1, 3, −4, 3, −5, 0, 0, 0}; {4, −1, 3, −4, 2, −1, −4, 6, −5, −4, 0, 0}; {2, −4, −1, 3, −3, 5, 0, −3, −3, −3, 0, 0}; {4, −2, 1, 6, 0, −1, −3, −5, −4, −3, 0, 0}; {−1, 5, −4, 1, −5, 3, −1, −4, −4, −3, 0, 0}; {−2, 4, −5, 0, 6, 2, −1, −4, −4, −3, 0, 0}; {3, −3, 0, 6, 5, 1, 5, 2, −3, −2, 0, 0}; {5, 2, −4, 5, 1, 5, −4, 4, 6, 0, 0, 0}; {3, 3, 0, 1, −5, 0, 6, 2, −4, −4, 0, 0}; {4, −4, −3, 3, −3, 5, −4, −5, −5, 4, 0, 0}; {−1, 3, 5, −1, 5, 2, 6, 5, 6, 3, 0, 0}; {−3, 1, 3, −3, 3, 1, 6, 4, 5, 1, 0, 0}; {−4, −1, 0, 5, −1, 6, −2, −2, −5, 3, 0, 0}; {−5, −1, 1, −4, 2, −1, 3, 6, 4, 1, 0, 0}; {5, −3, −1, 6, 1, −2, 2, 5, 2, 0, 0, 0}; {4, −4, −2, 5, 0, −3, 2, 5, 2, 0, 0, 0}; {4, −3, 0, −4, 4, 3, −4, 0, 0, 1, 0, 0}; {4, −2, 2, −1, −1, 6, −1, −3, −5, −4, 0, 0}; {0, −3, 4, 5, −1, 6, −1, 0, 3, −1, 0, 0}; {0, −2, 6, 0, −1, 3, −4, 3, −5, 0, 0, 0}; {−1, −3, 5, −1, −2, 3, −4, 3, −5, 0, 0, 0}; {−5, 2, −5, −1, 6, −5, 6, 4, −5, −5, 0, 0}; {−5, 3, −3, 2, −2, 0, 1, 0, 4, 5, 0, 0}; {−3, −5, 3, −2, −3, 1, 6, 1, 5, −1, 0, 0}; {−3, 5, −1, 5, −1, 1, 2, 1, 4, 5, 0, 0}; {−4, 4, −2, 4, −2, 1, 2, 1, 4, 5, 0, 0}; {−5, 3, −3, 3, −2, 0, 1, 0, 4, 5, 0, 0}; {4, −1, 4, −3, 4, 5, 5, 3, 6, 6, 0, 0}; {1, −4, 1, 6, 1, 2, 6, 5, 1, −1, 0, 0}; {2, −3, 2, −5, 3, 4, 4, 2, 6, 6, 0, 0}; {5, 2, −3, 4, 2, 5, −4, 4, 6, 0, 0, 0}; {4, 1, −4, 3, 1, 5, −3, 4, −5, 0, 0, 0}; {−5, 3, −3, 5, 3, −5, −3, 4, 6, 0, 0, 0}; {−2, 6, 0, −4, 4, −5, −2, 5, −5, 0, 0, 0}; {3, −2, 3, −1, 0, 6, −2, −3, −5, −4, 0, 0}; {0, −5, 0, −4, 1, 3, 2, 1, 5, 5, 0, 0}; {−1, 6, 0, −4, 3, 2, 2, −4, −1, 2, 0, 0}; {6, 1, −5, 3, −5, 6, −5, −2, 3, 4, 0, 0}; {−1, 5, −2, 6, −1, 2, 2, 0, 4, 4, 0, 0}; {−3, 2, 6, 1, −4, −5, −1, 2, 2, 0, 0, 0}; {−5, −1, 2, −4, 2, 0, 3, 6, 4, 1, 0, 0}; {5, −1, 4, 1, −2, −3, 3, −4, −2, −1, 0, 0}; {0, −4, 3, 3, −4, −4, 0, 4, 0, 1, 0, 0}; {−5, 3, −2, −2, 4, −2, 2, 3, 5, 0, 0, 0}; {6, 2, −3, −3, 3, −3, 1, 2, 4, 0, 0, 0}; {5, 1, −4, −4, 3, −3, 1, 2, 4, −1, 0, 0}; {6, 2, −3, −2, 3, −2, 1, 3, 4, 0, 0, 0}; {4, −1, 5, 5, −3, 3, 6, 6, 6, 1, 0, 0}; {5, 1, −4, −3, 2, −3, 1, 2, 4, 0, 0, 0}; {5, 1, −4, −3, 3, −3, 1, 2, 4, 0, 0, 0}; {2, −3, 3, 3, −4, 2, 5, 5, 6, 1, 0, 0}; {1, −4, 2, 2, −4, 1, 4, 4, 6, 1, 0, 0}; {1, −5, 0, 0, 6, 0, −3, −4, −5, 0, 0, 0}; {−5, 1, 6, 6, 1, 2, −4, 6, −2, 0, 0, 0}; {1, −5, 0, 0, −5, 0, −4, −4, −5, 0, 0, 0}; {−3, 2, 6, 6, −1, 4, 0, −1, −4, 1, 0, 0}; {−5, 0, 4, 4, −2, 3, −1, −2, −4, 0, 0, 0}; {6, −1, 3, 3, −2, 3, −1, −3, −4, 1, 0, 0}; {−1, −3, 6, 0, 3, −1, 2, 3, 3, −4, 0, 0}; {6, 3, −1, 5, −1, 0, −1, 6, −3, 0, 0, 0}; {6, 2, −3, 2, −4, −1, 3, 4, −1, −1, 0, 0}; {3, −2, 4, −4, 3, 4, 5, 3, 6, 6, 0, 0}; {4, −1, 5, −3, 5, 6, 4, 3, −5, −5, 0, 0}; {1, −4, 2, 6, 2, 3, 4, 2, 6, 6, 0, 0}; {1, −4, 2, −5, 3, 4, 3, 2, 6, 6, 0, 0}; {−2, 5, −1, 4, 1, 2, 2, 1, 5, 6, 0, 0}; {5, −1, 4, −3, 5, 6, 5, 3, −5, −5, 0, 0}; {−5, 3, −2, 5, 3, 6, −3, 4, 6, 0, 0, 0}; {−3, 4, −2, 4, −1, 1, 2, 1, 4, 5, 0, 0}; {−5, 2, −4, 2, −2, 0, 1, 0, 4, 5, 0, 0}; {−3, 5, 0, −5, 4, −5, −2, 5, −5, 0, 0, 0}; {6, 0, 5, −1, −5, −5, 5, 4, −4, −4, 0, 0}; {2, −4, 1, −5, 3, 4, 4, 2, 6, 6, 0, 0}; {2, −4, 1, −5, 4, 4, 4, 2, 6, −5, 0, 0}; {−1, 6, 0, −5, −2, −4, −3, −1, 5, 5, 0, 0}; {−1, 6, 0, −5, −2, −3, −3, −1, 5, 5, 0, 0}; {−4, 3, −3, 4, −4, −5, −4, −2, 5, 5, 0, 0}; {−5, 2, −4, 3, −5, 6, −5, −3, 5, 5, 0, 0}; {−5, 2, −4, 3, −4, −5, −5, −1, 2, 4, 0, 0}; and {−2, 5, −1, 6, −1, 2, 3, 1, 4, 5, 0, 0};

{−3, 2, −5, 0, −1, −3, −5, 5, −3, −4, 0, 0}; {6, 0, 6, 0, 4, −5, −4, 2, 0, −2, 0, 0}; {0, 0, 0, 1, 10, 8, 5, 0, 4, 9, 10, 2}; {1, −5, 1, −3, −5, −1, −1, 6, −5, 1, 0, 0}; {−4, 1, 6, 1, −2, 6, 0, 2, 4, 3, 0, 0}; {−3, 1, 5, 0, −5, −3, −4, 3, 0, −2, 0, 0}; {4, 5, 6, −2, 3, −1, 4, −1, −2, 4, 0, 0}; {−4, −1, 2, −4, 6, −2, −4, −5, −4, 3, 0, 0}; {−2, 3, −4, 4, 5, 6, 1, 1, −3, −5, 0, 0}; {0, 0, 0, 4, 8, 11, 9, 6, 10, 5, 0, 11}; {2, −4, 2, 1, 6, 4, −5, −1, 3, 1, 0, 0}; {5, 3, 1, 5, 1, 3, −2, 5, 6, −3, 0, 0}; {4, 6, −4, 4, −3, 6, 0, 6, 6, 3, 0, 0}; {−4, 0, 4, 3, −2, 3, −1, −2, −5, 0, 0, 0}; {−5, −5, −5, 2, 6, −2, 6, 4, −3, 6, 0, 0}; {−2, −4, 6, 0, 5, −3, −5, 3, −4, −1, 0, 0}; {1, −2, −5, 0, 5, 0, 3, 2, 4, 6, 0, 0}; {2, −3, 4, −4, −5, 6, −1, −1, 3, 5, 0, 0}; {4, 0, −4, 2, 1, 4, −4, 3, 5, 0, 0, 0}; {3, −2, 5, −2, 0, −2, −3, 3, 3, −2, 0, 0}; {5, −1, 5, −2, 0, 0, −1, 0, −4, 6, 0, 0}; {6, 1, −3, 3, −4, 0, 4, 6, 6, 5, 0, 0}; {6, 0, −5, 1, 0, 2, 0, 0, 5, 5, 0, 0}; {−1, 6, 2, −2, 3, −4, 0, 3, 3, 3, 0, 0}; {−1, 5, 0, −5, 3, 2, 2, −5, −2, 1, 0, 0}; {1, 6, 0, −5, 4, −2, 0, 3, 3, 3, 0, 0}; {0, 0, 1, 3, 11, 7, 11, 4, 5, 0, 0, 7}; {6, −3, 1, −5, −2, −5, 3, −4, 6, 1, 0, 0}; {0, 2, 5, −2, 5, 3, 3, −3, 4, 0, 0, 0}; {−4, 1, −5, 4, −4, −5, −4, −2, 5, 4, 0, 0}; {2, 4, −5, 1, 5, 0, −5, 5, 3, −1, 0, 0}; {0, 0, 1, 5, 9, 2, 10, 3, 0, 8, 4, 4}; {−2, −1, 1, −5, 3, 6, 2, 0, −1, 6, 0, 0}; {0, 0, 1, 6, 3, −1, 4, 6, 1, 5, 0, 0}; {−5, 1, −4, −5, −1, 5, −5, −5, −4, 2, 0, 0}; {1, −5, 2, 1, 5, 0, 1, −3, −5, −4, 0, 0}; {−4, 0, 5, 2, −3, −4, 4, −2, 1, 1, 0, 0}; {0, 0, 1, 6, 11, 3, 10, 7, 4, 11, 2, 1}; {5, −1, 6, 6, 5, 2, −5, 4, 6, −4, 0, 0}; {−2, −5, 5, −4, 4, 6, 1, 6, −4, −4, 0, 0}; {−4, 3, −1, 0, 6, 6, −1, 3, −1, −1, 0, 0}; {0, 0, 1, 9, 0, 1, 6, 1, 8, 8, 5, 0}; {0, 0, 1, 9, 2, 5, 4, 8, 5, 1, 0, 6}; {−1, −5, 4, −4, 3, 5, 0, 6, −5, −1, 0, 0}; {0, 0, 1, 10, 1, 8, 11, 3, 2, 8, 7, 2}; {2, −4, 3, −5, −5, 5, −2, 0, 4, 4, 0, 0}; {2, −4, 3, −5, −5, 5, −1, 0, 3, 4, 0, 0}; {0, 0, 2, 0, 8, 9, 6, 10, 3, 9, 9, 2}; {−3, 1, −5, −2, −2, 3, −1, 6, 5, 1, 0, 0}; {3, −4, 3, −4, 5, 5, 2, 2, −4, −3, 0, 0}; {−1, 0, 3, 4, −1, −5, 2, −5, 2, 3, 0, 0}; {−5, 0, −5, 1, 3, −4, −4, 2, 1, 0, 0, 0}; {4, −5, 0, 4, 2, 6, 3, −4, 6, 4, 0, 0}; {0, 4, −2, 4, −3, −4, −1, −2, 6, 5, 0, 0}; {5, −4, 1, 6, 1, −1, 1, 0, 6, 3, 0, 0}; {−1, 6, 3, 1, 6, −1, −2, 0, −5, −1, 0, 0}; {3, 6, −1, 5, 0, −2, 0, −2, −4, −5, 0, 0}; {3, −3, 5, 2, 2, −3, 1, −5, −3, −1, 0, 0}; {4, −5, 0, −5, −4, 0, 2, 1, 5, 1, 0, 0}; {−3, 0, 5, 0, −5, −3, −5, 3, 0, −2, 0, 0}; {0, 0, 2, 7, 6, 4, 11, 8, 5, 9, 4, 7}; {−3, 0, 5, 2, −5, 3, −1, −2, 2, 2, 0, 0}; {−1, −1, 1, −4, 6, −3, 3, −2, −1, 5, 0, 0}; {3, 6, −1, −2, 3, −5, 3, 1, −2, 2, 0, 0}; {3, −1, −3, 1, 2, 5, 3, −5, 1, 4, 0, 0}; {0, 0, 2, 10, 4, 0, 11, 9, 6, 0, 3, 5}; {4, −2, 6, −3, −4, 6, 1, 0, 3, 6, 0, 0}; {−1, 0, 3, 1, 0, −5, −2, 5, 1, 6, 0, 0}; {0, 0, 2, 11, 10, 4, 6, 9, 3, 8, 2, 9}; {0, 0, 2, 11, 11, 5, 6, 2, 5, 10, 6, 1}; {−5, −2, 4, 4, −2, 3, 0, −2, −4, 0, 0, 0}; {6, 6, −3, −5, 3, −2, 2, −4, 3, 5, 0, 0}; {0, −4, −5, 1, −5, −2, 5, −4, −5, −1, 0, 0}; {−4, 4, 3, −2, 1, 5, −1, −4, −1, −2, 0, 0}; {2, −5, 3, −4, 3, 3, 6, −5, 4, 5, 0, 0}; {0, 0, 3, 3, 7, 1, 5, 3, 1, 11, 7, 11}; {0, 0, 3, 3, 11, 8, 5, 7, 3, 6, 11, 4}; {1, 6, 2, −4, −2, 0, −2, −1, 4, 3, 0, 0}; {0, 0, 3, 4, 11, 1, 7, 10, 5, 11, 6, 3}; {2, −2, −3, −5, 0, 5, −4, −4, 1, −3, 0, 0}; {−3, 5, 4, 3, −3, 2, 5, −5, 0, −3, 0, 0}; {0, 0, 3, 6, 5, 2, 7, 4, 3, 1, 7, 0}; {−3, 1, −4, 3, 6, −2, −3, 5, 1, −1, 0, 0}; {−1, 2, −4, 2, −4, 6, 1, 2, −2, −2, 0, 0}; {−1, 2, −4, 2, −4, −4, −1, −2, 4, 2, 0, 0}; {0, 0, 3, 8, 2, 2, 9, 7, 6, 2, 6, 3}; {0, 0, 3, 8, 10, 7, 4, 3, 8, 4, 8, 6}; {3, 2, 4, −3, 6, −1, 5, 0, 1, 5, 0, 0}; {2, 1, 3, −4, 5, −2, 5, 0, 1, 5, 0, 0}; {−5, 3, 2, 5, 3, 0, 4, −3, 5, −4, 0, 0}; {−3, 0, 6, 5, 0, 2, −4, 4, −1, −1, 0, 0}; {0, 0, 4, 0, 6, 1, 9, 7, 6, 2, 5, 8}; {−2, 1, −4, −4, 4, −4, 3, −1, −4, −2, 0, 0}; {0, 0, 4, 1, 8, 3, 5, 3, 2, 9, 11, 4}; {5, 1, 1, 6, −1, 2, −2, −5, −3, −3, 0, 0}; {−5, 4, 5, −1, 6, −5, 1, 5, 5, −2, 0, 0}; {6, 3, 4, 0, 6, 4, −2, 4, 6, −2, 0, 0}; {−5, 6, −3, −5, 3, −1, 2, −2, 3, 6, 0, 0}; {−2, 2, −2, 1, 5, −2, −2, 6, 4, −1, 0, 0}; {−5, −1, −5, −2, 4, −1, −4, 4, 5, 6, 0, 0}; {6, 6, −2, −3, 4, −2, 5, −3, 3, 3, 0, 0}; {3, 3, −5, −5, 1, −3, 3, −4, 2, 3, 0, 0}; {1, 4, −1, 4, −3, −3, 0, −2, 6, 2, 0, 0}; {6, 1, 0, −2, 3, −5, −2, −3, 2, −2, 0, 0}; {3, −5, 3, −1, −5, 6, 2, 5, −2, 0, 0, 0}; {0, 1, 6, −1, 6, 3, 4, −1, −2, 2, 0, 0}; {0, 0, 4, 8, 6, 2, 2, 11, 3, 4, 0, 5}; {−1, 6, 5, 4, −2, 1, −2, 0, 1, −4, 0, 0}; {6, −4, 2, −4, −1, 4, 1, −5, 3, 0, 0, 0}; {0, 4, 0, −4, 2, −2, −2, 6, −4, 0, 0, 0}; {0, 0, 4, 8, 10, 3, 11, 4, 2, 2, 11, 6}; {−3, 1, −3, 6, −4, 6, 5, −1, −5, −4, 0, 0}; {1, 3, −3, 4, 6, −3, 2, 0, 5, 1, 0, 0}; {0, 0, 4, 10, 2, 4, 7, 6, 10, 7, 5, 3}; {1, 4, −1, −3, −1, −4, 5, −2, −2, −5, 0, 0}; {0, 0, 4, 11, 11, 0, 11, 9, 3, 5, 2, 8}; {5, 1, 2, 6, 0, 2, −2, 6, −3, −4, 0, 0}; {3, −3, −4, −1, 3, −2, −5, −5, −1, 4, 0, 0}; {0, 0, 5, 2, 1, 2, 1, 9, 6, 10, 3, 8}; {0, 0, 5, 2, 1, 5, 2, 5, 0, 10, 0, 7}; {2, −4, −5, −1, 2, −4, −4, 4, −1, 1, 0, 0}; {5, 2, 4, −1, 5, 6, 1, 5, 5, −3, 0, 0}; {5, 0, 0, 5, −4, 3, 5, 1, −3, 0, 0, 0}; {0, −3, −1, −5, 2, −3, −4, 3, −5, −2, 0, 0}; {0, −4, −3, 4, −2, −5, 1, 6, −5, −1, 0, 0}; {−3, −5, −2, −4, 4, −4, 1, 6, −4, 6, 0, 0}; {3, 6, 2, 5, −5, 2, −2, 5, 5, 5, 0, 0}; {2, −4, −5, 1, 1, −5, 2, 6, 1, 1, 0, 0}; {−4, 2, 1, −4, −2, 3, −3, 6, −2, 0, 0, 0}; {−5, 4, 6, 4, −3, 0, −4, 2, 2, −4, 0, 0}; {−3, −1, 6, −3, 1, 0, 4, 2, −5, 3, 0, 0}; {−1, 4, 2, −3, −4, 0, 6, −2, 2, 0, 0, 0}; {−1, 0, 6, −3, 6, −2, 6, −1, −4, 6, 0, 0}; {−3, −1, 6, −2, 3, 1, 0, 5, 3, −2, 0, 0}; {−4, −1, −5, 1, 0, 5, 0, 3, 5, 4, 0, 0}; {0, −1, 3, 5, 4, −1, 4, 5, 0, 4, 0, 0}; {−1, −1, 4, −5, −4, 3, −2, 1, −3, 2, 0, 0}; {2, −4, −4, −1, 2, −3, −4, 4, −1, 2, 0, 0}; {−3, −5, −1, −5, 4, 3, −3, −1, 5, −2, 0, 0}; {−3, 1, −1, 1, 5, 1, −3, 5, 3, 4, 0, 0}; {−2, −3, 2, −1, 3, 4, −3, 2, 5, 2, 0, 0}; {−4, −5, 0, −2, −4, −3, 3, 6, 2, −5, 0, 0}; {0, 0, 6, 5, 8, 6, 6, 8, 1, 6, 11, 7}; {−5, 5, −3, 6, −4, 1, −3, 1, 4, 6, 0, 0}; {−4, 1, 0, 5, 1, 4, −2, 4, 4, 1, 0, 0}; {6, −3, 6, −3, 3, 6, −5, −1, −5, 4, 0, 0}; {4, 2, 6, 4, 6, 0, −4, 0, 3, 6, 0, 0}; {−4, 2, 2, −4, 6, −1, 4, −1, 0, 0, 0, 0}; {−4, 6, −2, −3, 1, −5, 0, 3, 6, 3, 0, 0}; {0, 0, 6, 7, 5, 5, 0, 4, 6, 3, 10, 4}; {−4, −1, −4, 1, −3, 2, 3, −3, 4, 3, 0, 0}; {4, −5, 4, −3, 2, 4, −2, −4, 4, 0, 0, 0}; {−2, 4, 4, 1, −2, 3, 4, −4, 1, −2, 0, 0}; {4, −5, 4, −2, −2, 3, −2, 1, 4, 3, 0, 0}; {0, 0, 6, 9, 6, 10, 5, 9, 8, 1, 11, 9}; {0, 0, 6, 9, 11, 3, 11, 3, 0, 1, 9, 4}; {0, 0, 6, 10, 2, 1, 4, 0, 8, 8, 11, 8}; {−2, −3, 2, 6, 1, −5, −3, 3, 1, −2, 0, 0}; {6, 4, −3, 2, −2, 5, 5, −2, 0, 3, 0, 0}; {4, 2, −5, 0, −3, 6, 0, 2, −4, 0, 0, 0}; {3, 0, 4, −2, 0, 6, 0, −3, −5, −3, 0, 0}; {0, 0, 7, 5, 0, 9, 2, 9, 3, 6, 4, 5}; {−3, 5, −4, 2, 2, −2, 2, −1, −4, −3, 0, 0}; {−2, −3, 3, 1, −4, −3, 4, −4, 2, −2, 0, 0}; {−1, 6, −4, 2, −5, 3, 0, −4, −3, −2, 0, 0}; {−3, 2, 2, 6, −1, −5, 3, 3, 0, 3, 0, 0}; {0, 0, 7, 6, 9, 3, 3, 1, 3, 5, 1, 5}; {−3, −5, 0, −2, 2, 4, −3, 2, 5, 2, 0, 0}; {1, −3, 0, −4, 1, −2, −4, 4, −5, −3, 0, 0}; {−3, 6, −2, −5, −4, 2, −2, 1, 4, 6, 0, 0}; {0, 0, 7, 8, 2, 1, 9, 4, 9, 7, 8, 10}; {0, 3, 1, 5, −2, 3, 4, −3, 5, 2, 0, 0}; {−2, 4, 5, 1, −2, 4, 4, −4, 1, −1, 0, 0}; {−5, 0, 0, −5, 4, −3, −5, −1, 3, 0, 0, 0}; {4, −1, 1, −2, 6, −3, −5, −1, −1, −5, 0, 0}; {−4, 0, −1, 6, 0, 1, −5, 3, 5, 1, 0, 0}; {0, 0, 7, 11, 5, 3, 6, 3, 0, 0, 4, 3}; {0, 0, −5, −1, 6, −4, 1, −3, 6, −1, 0, 0}; {0, 0, 7, 11, 10, 11, 4, 3, 7, 0, 8, 8}; {−4, 5, −2, 0, 6, −4, 5, 2, −3, 0, 0, 0}; {0, 4, 4, 2, 2, −3, −1, 4, −2, −5, 0, 0}; {0, 0, 8, 3, 3, 2, 4, 10, 2, 0, 8, 0}; {2, 1, −4, 2, 3, −3, 3, 6, 4, −2, 0, 0}; {4, 2, −4, 2, 5, 1, 6, 5, 5, 6, 0, 0}; {1, −3, 1, 6, 6, −3, 1, 0, −2, 3, 0, 0}; {2, −1, 4, −1, 6, 5, 1, 2, −4, −1, 0, 0}; {4, 2, −4, 4, 1, 5, −4, 4, 6, 0, 0, 0}; {1, −3, 1, −4, 0, −3, −3, 0, 6, 6, 0, 0}; {−3, 5, −3, 4, −2, −4, 6, 4, −5, −4, 0, 0}; {−2, −5, 0, −4, 6, 5, −4, −1, 5, −3, 0, 0}; {0, 0, 8, 8, 0, 10, 8, 2, 7, 2, 9, 0}; {3, −3, −1, 5, 5, 1, 5, 1, −3, −1, 0, 0}; {−4, −5, 2, 1, 6, −3, 3, −3, 1, −1, 0, 0}; {0, 0, 8, 8, 2, 8, 3, 10, 2, 0, 2, 4}; {6, −2, −2, 2, 3, −2, 3, −3, 3, 2, 0, 0}; {−5, 6, 1, 0, 2, −1, 4, −1, 2, −5, 0, 0}; {−2, 1, 0, 3, −3, −1, 5, −2, −5, 4, 0, 0}; {−3, 1, 1, 6, 3, −1, 4, 6, 3, 2, 0, 0}; {6, −1, 0, 6, 5, −4, 2, −3, 1, 0, 0, 0}; {−3, 3, 5, 0, −4, 1, −2, −4, −3, −4, 0, 0}; {−4, 0, 0, 6, 0, −5, −2, −4, −4, 5, 0, 0}; {0, 0, 8, 10, 0, 7, 2, 0, 4, 8, 6, 9}; {4, 1, 6, 5, −3, 5, −2, 2, 5, 2, 0, 0}; {0, 0, 8, 11, 9, 4, 11, 2, 6, 5, 5, 10}; {0, 0, 9, 0, 5, 10, 10, 10, 3, 11, 5, 3}; {−4, 6, 1, 2, −4, 4, −3, −1, 2, −1, 0, 0}; {−1, 5, −4, 6, 1, 6, 4, −4, −3, 3, 0, 0}; {0, 0, 9, 2, 3, 1, 9, 1, 10, 5, 6, 9}; {3, 3, 0, 5, −5, 4, −3, 2, 1, 6, 0, 0}; {−5, 2, 6, −5, −4, −2, 4, −3, 5, 3, 0, 0}; {0, 0, 9, 3, 10, 3, 4, 1, 4, 9, 10, 1}; {−5, 4, −2, 2, −3, −1, 3, 3, −1, −2, 0, 0}; {−2, −3, 5, −1, −2, 3, −4, 3, −5, 0, 0, 0}; {6, 5, 1, −5, −5, 0, 5, 1, 6, −1, 0, 0}; {5, 4, 0, −5, 3, −4, 2, 5, −4, 0, 0, 0}; {−1, 6, −2, 1, −3, −2, −5, 4, −5, −5, 0, 0}; {0, 0, 9, 5, 10, 0, 5, 1, 6, 6, 8, 4}; {3, −2, 2, 5, 5, 5, 6, 1, 6, 4, 0, 0}; {0, 0, 9, 5, 11, 11, 0, 4, 8, 3, 6, 7}; {−4, 3, −5, −1, −5, −4, 6, 4, −5, −5, 0, 0}; {3, −5, −4, −3, 3, −2, −5, 5, 0, 3, 0, 0}; {0, −5, −1, 4, 4, 0, 3, 1, −3, −3, 0, 0}; {0, 5, −5, −2, −1, −3, −4, 3, −3, 3, 0, 0}; {0, 0, 9, 8, 2, 5, 0, 6, 7, 11, 9, 2}; {−2, −2, −5, 6, 0, 5, −1, 4, −3, −3, 0, 0}; {2, −2, 3, −2, 4, 5, 2, 2, 5, 5, 0, 0}; {3, −3, 0, 6, 5, 1, 4, 1, −3, −2, 0, 0}; {2, −2, 3, −1, 6, 5, 1, 2, −4, −1, 0, 0}; {−5, −1, 0, 4, −2, 5, 2, 2, −2, 2, 0, 0}; {4, −5, −5, −1, 4, −1, 2, 0, −2, 5, 0, 0}; {1, 3, 2, 6, 0, −5, −1, −1, 5, 3, 0, 0}; {−5, 2, 6, 3, 4, 6, −1, 0, −3, 6, 0, 0}; {6, −3, −2, 3, −3, 4, −3, −2, 6, 2, 0, 0}; {−4, 0, 2, −3, 3, 0, 4, 6, 3, 1, 0, 0}; {0, 0, 10, 1, 8, 1, 4, 5, 10, 10, 4, 1}; {−4, 2, 6, 3, 4, 6, −1, 0, −3, 6, 0, 0}; {3, −2, 3, 2, −3, 2, 4, 5, −5, 1, 0, 0}; {0, 0, 10, 2, 3, 8, 9, 10, 6, 1, 7, 0}; {2, −4, 0, −2, 6, 6, 1, −4, −2, 0, 0, 0}; {−1, −1, −3, 1, −5, 4, 1, −1, 5, −3, 0, 0}; {1, −4, 1, 0, 2, −2, 2, 5, −5, 4, 0, 0}; {4, −1, 4, 4, −1, 0, −4, 5, −2, 0, 0, 0}; {4, 0, 6, −5, 4, −5, −1, 4, 3, −2, 0, 0}; {1, 6, −3, −4, 2, 6, 2, −1, −2, 2, 0, 0}; {3, −1, 5, −5, 6, −1, 2, 1, 0, 4, 0, 0}; {0, 5, −4, −4, 1, 6, 1, −2, −3, 2, 0, 0}; {0, 0, 10, 5, 5, 10, 3, 9, 10, 10, 2, 9}; {5, 3, −1, 4, 4, −1, 4, −5, 5, −2, 0, 0}; {3, 0, −5, 0, −5, −2, 1, 0, 3, 4, 0, 0}; {1, −1, −5, 2, −4, −3, −2, 4, −4, 0, 0, 0}; {0, 0, 10, 7, 3, 8, 3, 7, 6, 8, 11, 4}; {−3, 4, −3, 1, 5, 2, −1, 0, −2, −4, 0, 0}; {−3, 6, 1, −5, 1, 1, −1, 2, 5, −1, 0, 0}; {5, −3, −1, 1, −2, 5, 2, 3, 0, 4, 0, 0}; {−5, 4, −1, 6, −3, 6, 5, 3, −5, −2, 0, 0}; {1, 0, −3, −4, 1, 5, −2, 5, −2, −3, 0, 0}; {0, 0, 10, 11, 0, 2, 6, 10, 8, 3, 10, 3}; {−2, 4, −4, 3, −4, −5, −1, −1, 3, 3, 0, 0}; {−4, 2, −5, 2, −3, 6, 5, −2, 0, 2, 0, 0}; {−1, 6, 0, −4, −4, 2, 6, −4, −2, 1, 0, 0}; {0, 0, 11, 1, 3, 9, 8, 5, 1, 6, 0, 8}; {6, 1, −5, 4, 4, −1, 3, −5, −4, 0, 0, 0}; {−4, 2, −5, 3, 4, 6, 0, 0, −3, −5, 0, 0}; {0, 0, 11, 4, 1, 7, 8, 1, 3, 9, 0, 9}; {−1, 4, −4, −5, 1, 4, 2, −1, −3, 2, 0, 0}; {−1, 1, 2, −2, 2, −1, 3, −3, 6, 5, 0, 0}; {0, 0, 11, 6, 1, 0, 4, 7, 10, 5, 8, 4}; {−5, 2, −4, −2, 1, 3, −3, 5, 1, 1, 0, 0}; {−5, 3, −2, 1, −4, −1, 3, 3, −1, −2, 0, 0}; {−4, 4, −1, 3, −2, 1, 3, 2, 4, 5, 0, 0}; {3, −3, 2, 4, −3, 5, 3, 4, −1, −2, 0, 0}; {0, 0, 11, 7, 8, 4, 11, 10, 2, 2, 9, 2}; {5, 2, −2, 3, 1, 1, −4, −2, 5, −3, 0, 0}; {6, 3, −1, 5, −5, 3, 6, 5, 5, −2, 0, 0}; {1, −4, 2, 6, −4, 3, 1, 0, −2, −3, 0, 0}; {−5, 4, 0, −5, −5, 5, −5, 2, 5, −2, 0, 0}; {2, −1, −5, 2, 6, 3, 2, 2, −5, −2, 0, 0}; {0, 0, 11, 9, 4, 9, 3, 9, 3, 4, 8, 8}; {5, 1, −4, 2, −4, −1, 1, 0, 3, 4, 0, 0}; {6, 0, 5, −3, 5, 5, 5, 3, −3, −4, 0, 0}; {−5, 1, 6, 0, −4, 5, 5, −3, 0, 1, 0, 0}; {2, −2, 5, 1, 2, −3, 1, 6, −4, −1, 0, 0}; and {1, −4, 2, −3, −1, −2, −3, 0, 5, 6, 0, 0}; and {0, 0, 0, 0, 3, 6, 0, 10, 6, 3, 8, 1}; {0, 0, 1, 3, 3, 9, 6, 2, 4, 11, 2, 9}; {0, 0, 3, 0, 9, 4, 3, 3, 9, 1, 8, 0}; {0, 0, 3, 1, 10, 11, 8, 2, 6, 1, 2, 7}; {0, 0, 3, 1, 11, 6, 7, 1, 4, 11, 7, 11}; {0, 0, 3, 6, 10, 8, 8, 3, 11, 9, 0, 8}; {0, 0, 3, 7, 1, 4, 7, 6, 4, 0, 5, 2}; {0, 0, 4, 8, 8, 3, 9, 0, 7, 1, 10, 10}; {0, 0, 6, 5, 3, 5, 1, 5, 1, 8, 1, 2}; {0, 0, 6, 6, 1, 3, 4, 4, 5, 0, 6, 0}; {0, 0, 6, 8, 1, 3, 1, 4, 9, 5, 11, 8}; {0, 0, 7, 8, 8, 6, 2, 9, 6, 10, 3, 9}; {0, 0, 7, 8, 10, 9, 11, 2, 9, 1, 8, 4}; {0, 0, 8, 4, 4, 9, 3, 0, 5, 11, 2, 2}; {0, 0, 8, 5, 7, 10, 2, 10, 0, 11, 4, 11}; {0, 0, 8, 6, 9, 3, 11, 3, 4, 0, 4, 5}; {0, 0, 9, 1, 3, 9, 9, 9, 3, 0, 5, 0}; {0, 0, 10, 0, 7, 11, 7, 4, 11, 11, 2, 5}; {0, 0, 10, 11, 2, 7, 8, 2, 10, 2, 8, 4}; and {0, 0, 11, 6, 5, 0, 8, 1, 0, 4, 10, 1}; and processing the first signal based on the N elements in the sequence $\{f_n\}$.--.